US005245535A

United States Patent [19]

Weiss et al.

[11] Patent Number: 5,245,535

[45] Date of Patent: Sep. 14, 1993

[54] SYSTEM FOR DEMONSTRATING FINANCIAL CONCEPTS AND DISPLAYING FINANCIAL DATA

[75] Inventors: Lawrence D. Weiss, Skaneateles; Wanda Rapaczynski, New York, both of N.Y.; Alexis Arlett-Gould, Millburn, N.J.; Brian C. Bock, New York, N.Y.; Walter Edelstein, Bayside, N.Y.; Mark Eisner, Briarwood, N.Y.; Meryl Enerson, Staten Island, N.Y.; Michael Green, Long Island City, N.Y.; Hanno Hinsch, New York; Juliet A. Jacobson, New York, N.Y.; Lynn Lucivansky, New York, N.Y.; Thomas J. Nicholson, New York, N.Y.; William B. Paley, New York, N.Y.; Patrick T. Reilly, Somerville, N.J.

[73] Assignee: Citibank, N.A., Stamford, Conn.

[21] Appl. No.: 682,240

[22] Filed: Apr. 5, 1991

[51] Int. Cl.[5] .................... G06F 15/00; G06F 15/20; G09B 19/00

[52] U.S. Cl. .................... 364/407; 364/408; 434/118

[58] Field of Search .................... 364/401, 407, 408; 395/155, 156, 157; 340/722, 752; 434/41 B

[56] References Cited

U.S. PATENT DOCUMENTS

| | | | |
|---|---|---|---|
| 4,406,998 | 3/1981 | Willough | 340/815 |
| 4,651,299 | 4/1984 | Miyazaki et al. | 364/900 |
| 4,652,240 | 11/1984 | Wackym | 434/118 |
| 4,715,818 | 12/1984 | Shapiro et al. | 434/118 |
| 4,839,829 | 6/1989 | Freedman | 395/155 |
| 4,953,085 | 4/1987 | Atkins | 364/408 |

OTHER PUBLICATIONS

Hansell, "Will Rick Braddock's Retail Gamble Pay Off For Citi?", *Institutional Investor*, Apr. 1990, pp. 56-61.

*Primary Examiner*—Roy N. Envall, Jr.
*Assistant Examiner*—Khai Tran
*Attorney, Agent, or Firm*—Mason, Fenwick & Lawrence

[57] ABSTRACT

A system for demonstrating financial and financially related concepts and displaying financial and financially related information is provided. The system includes a central processing unit for processing financial information and for creating graphic displays from numerical data, a demonstrator station and at least one viewer station. Both demonstrator and viewer stations include display means for displaying financial information in graphic and textual form. The demonstrator station further comprises data entry means for entering alphanumeric data, and input means for inputting signals to direct the display of information on the display means of both the demonstrator station and the viewer station or stations. The graphic information displayed on the viewer station display means is a subset of the information displayed on the demonstrator station displaying means. The system also includes means for generating graphic displays based on entered data. Additional graphic displays can be generated based on altered or additional numerical data. The system can generate two different graphic displays generated from two different sets of entered data. The system further includes means for printing the entered data.

29 Claims, 18 Drawing Sheets

SYSTEM FOR DEMONSTRATING FINANCIAL CONCEPTS AND DISPLAYING FINANCIAL DATA

BACKGROUND OF THE INVENTION

The present invention relates to demonstration systems, particularly systems that demonstrate financial and financially related concepts and display financial and financially related information. Financially related concepts include insurance, tax advice, inventory processing and other, similar concepts; as used herein and in the claims which follow, the term "financial" also refers to such financially related concepts.

Many people are confused about investing and find it difficult to wade through vast amounts of financial information. Moreover, until a person feels that he (or she) grasps some of the basic principles of investing, that person is likely to keep all of his assets in one or two familiar investment vehicles. Often this lack of knowledge will subject the investor to unnecessary risks or, more likely, limit the growth potential of the investor's assets.

Education of the potential investor is the only way of combatting this lack of knowledge. Understanding financial concepts and information, however, necessarily involves working with numerical data, trends and concepts.

Many people find financial concepts and trends difficult to grasp. Columns of financial data are meaningless to many people. Thus previously known financial presentation systems have relied heavily on graphic representations of trends, such as the historical price of a stock.

Graphic representations of numerical data are difficult to create. There are software packages specifically designed to create graphs demonstrating financial concepts. However these products can be difficult to use and generally require each user (or small group of users) of the product to own or purchase expensive hardware.

Moreover, previously known financial graphics systems utilize only one screen. Thus such systems are not suited for use in a demonstration, as the person viewing the demonstration must also operate the demonstration. Furthermore, in such one-screen systems, certain aspects of the interface of the systems are often present on the display screen. These interface prompts, menus or "icons" are not part of the demonstration and detract from the demonstration by displaying distracting and unnecessary information to the person viewing the demonstration.

It is possible to avoid these problems by creating a simple linear presentation that needs only to be started by the operator or user. However, such simple systems lack the ability to interact with the user in a personalized manner. For example, the user of a linear presentation cannot review a portion of the demonstration that the user did not understand without having to review the entire demonstration. Similarly, the user of such a system cannot easily review one piece of information, such as historical price data of a particular investment vehicle, without wading through large amounts of irrelevant information. Thus the ability to interact personally with and direct the demonstration system contributes to the usefulness of the system, from both an educational and informational point of view.

Accordingly, there is a need for a system for demonstrating financial concepts which overcomes these disadvantages of previously known systems. Such a system must also be easy to operate, so as to permit the demonstrator easily to direct the demonstration without having to devote undue attention to the operation of the demonstration system itself.

SUMMARY OF THE INVENTION

It is an object of this invention to provide a demonstration system which can be easily operated by a demonstrator, and which displays to a viewer graphic information in an effective manner.

It is also an object of this invention to provide a system for generating graphic displays from numerical data.

In accordance with this invention, a system for demonstrating financial concepts and displaying financial information is provided. The system includes a central processing unit for processing financial information and for creating graphic displays from numerical data. The system also includes a demonstrator station and at least one viewer station. Both demonstrator and viewer stations include display means for displaying financial information in graphic and textual form. The demonstrator station further comprises data entry means for entering alphanumeric data, and input means for inputting signals to direct the display of information on the display means of both the demonstrator station and the viewer station or stations. The graphic information displayed on the viewer station display means is a subset of the information displayed on the demonstrator station displaying means.

The system also includes means for generating graphic displays based on entered data. Additional graphic displays can be generated based on additional or altered numerical data. The system can also generate two different graphic displays generated from two different sets of entered data. The system further includes means for printing the entered data.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

Figure 3:
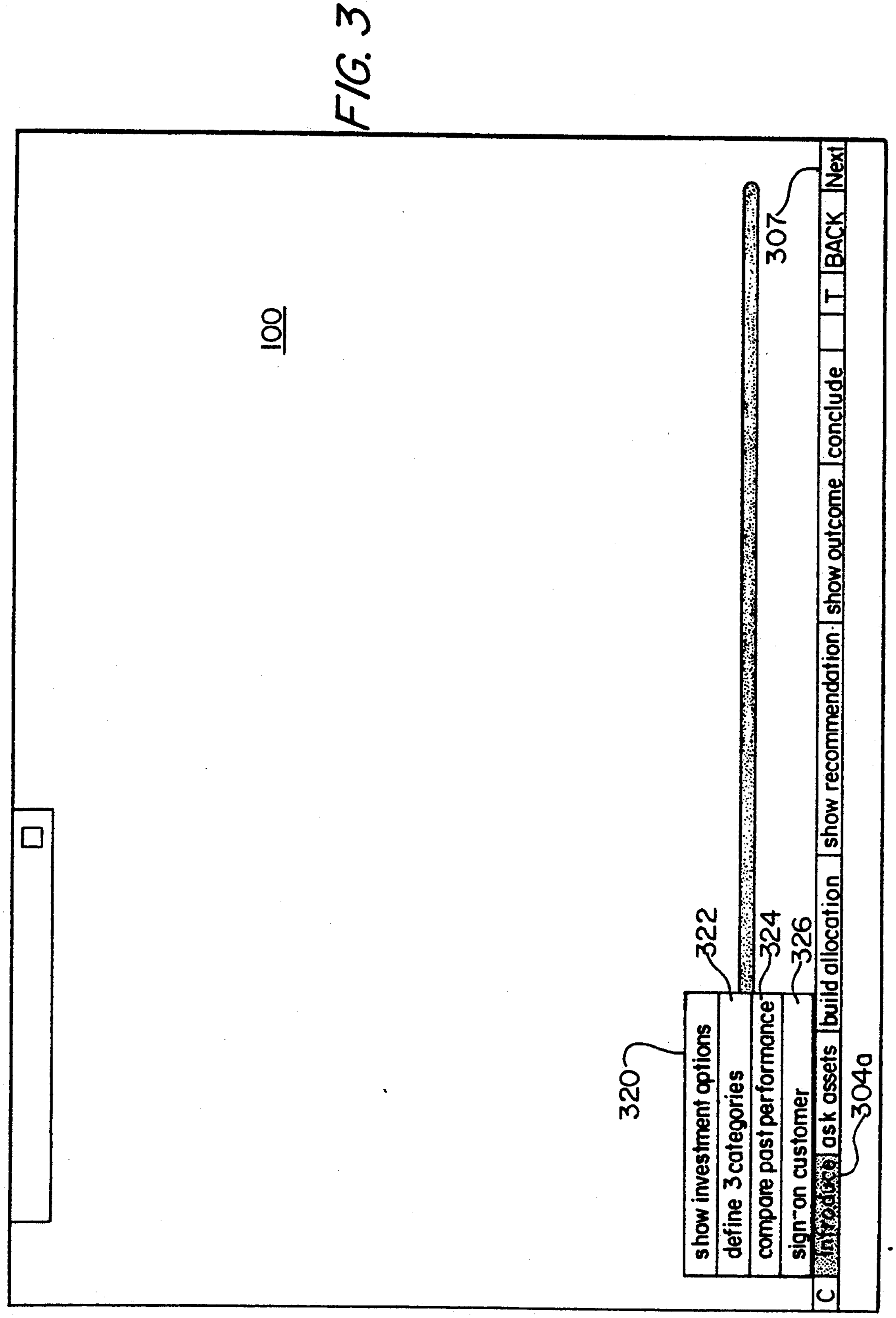
Figure 4:
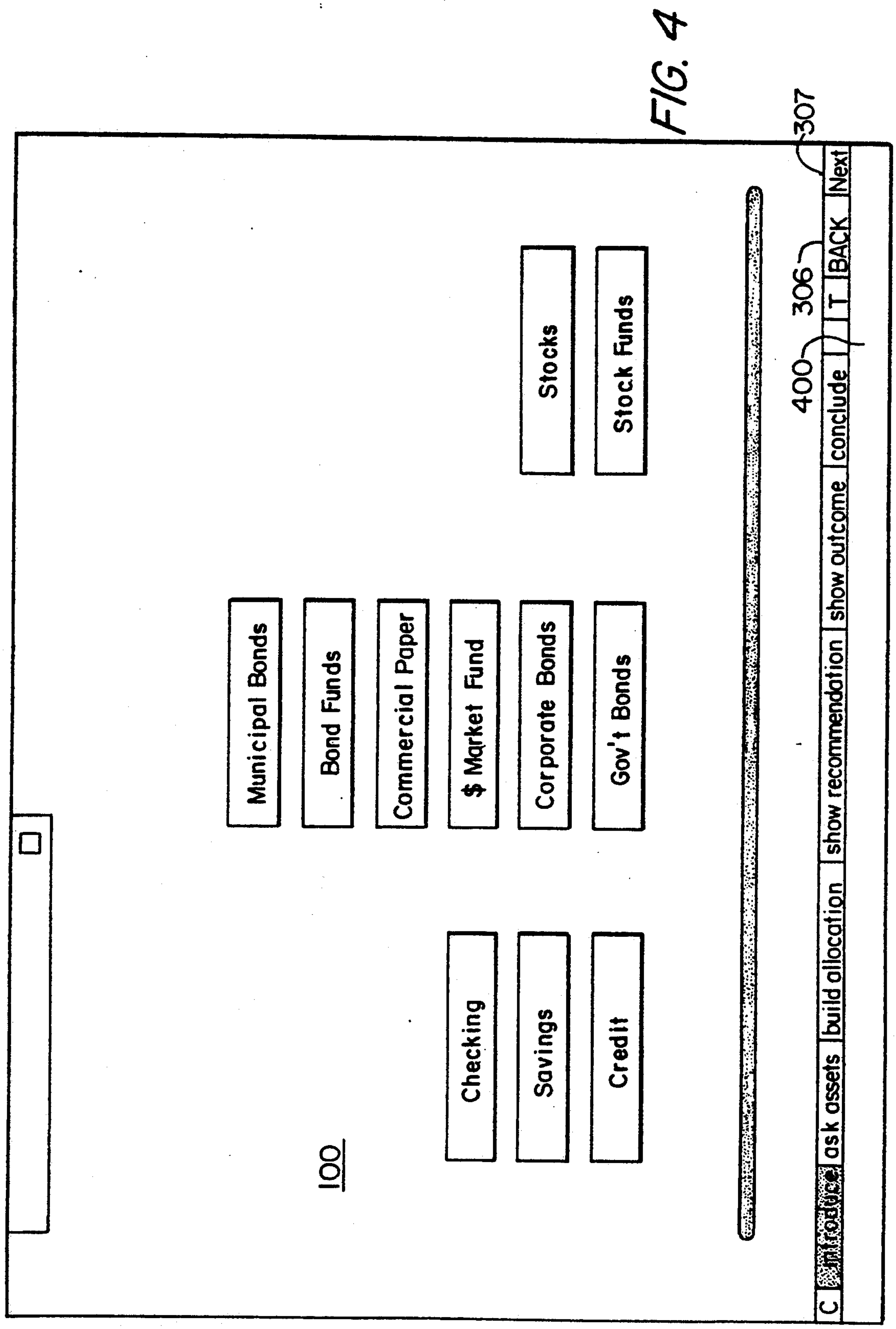
Figure 15:
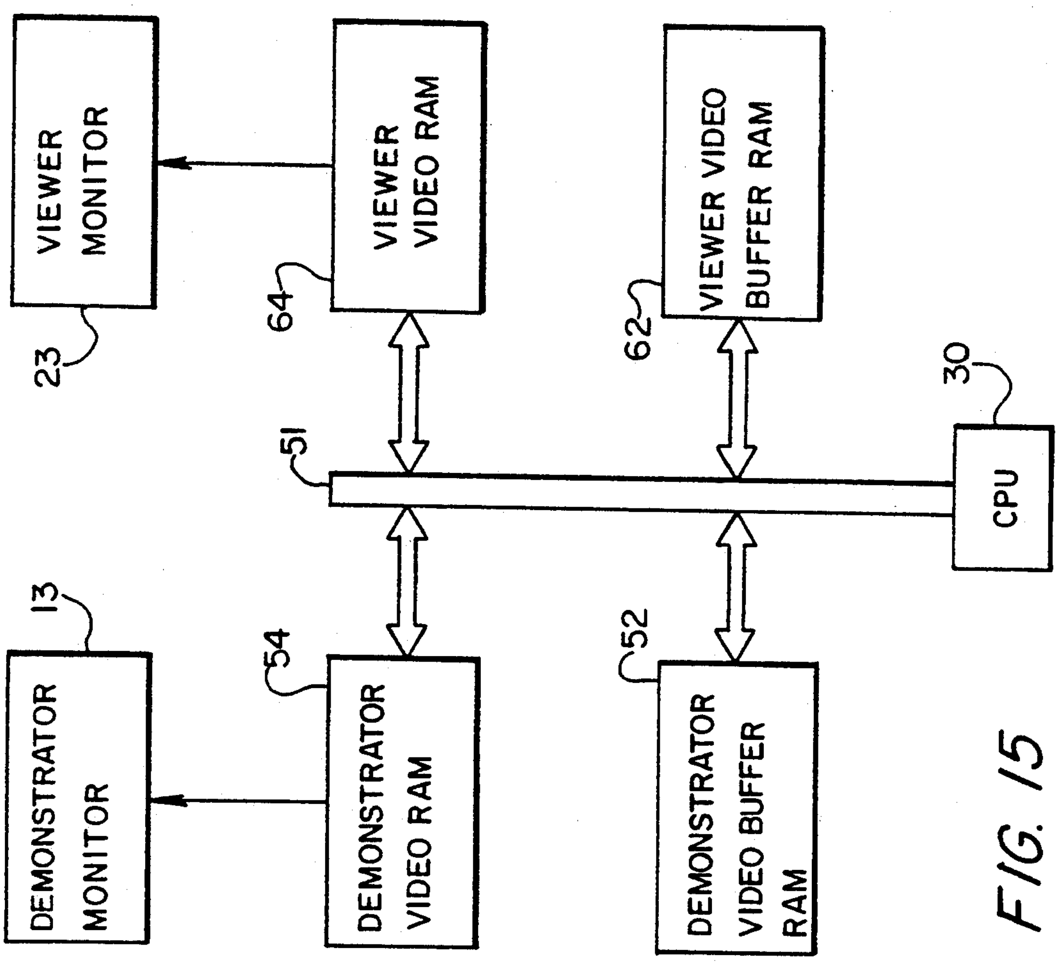
Figure 14:
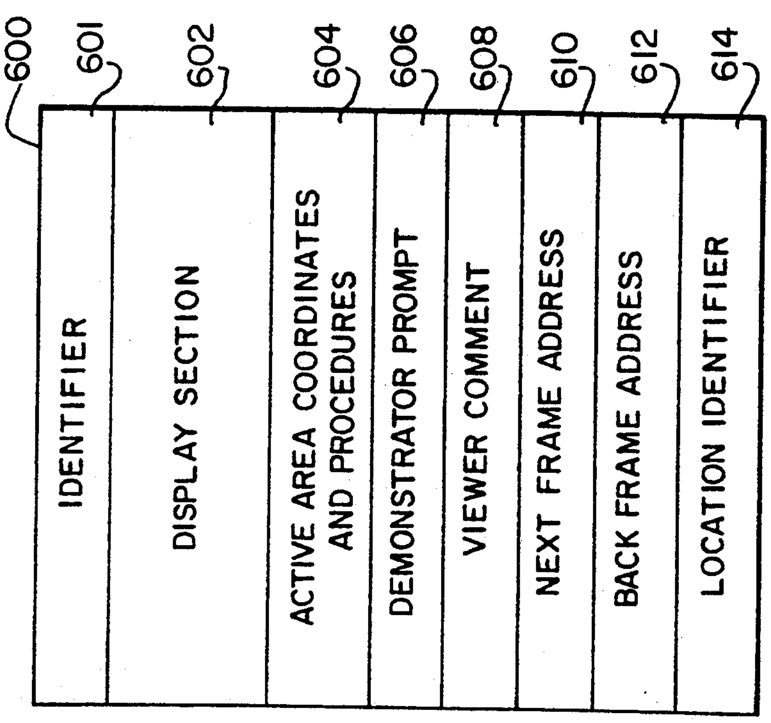
Figure 16:
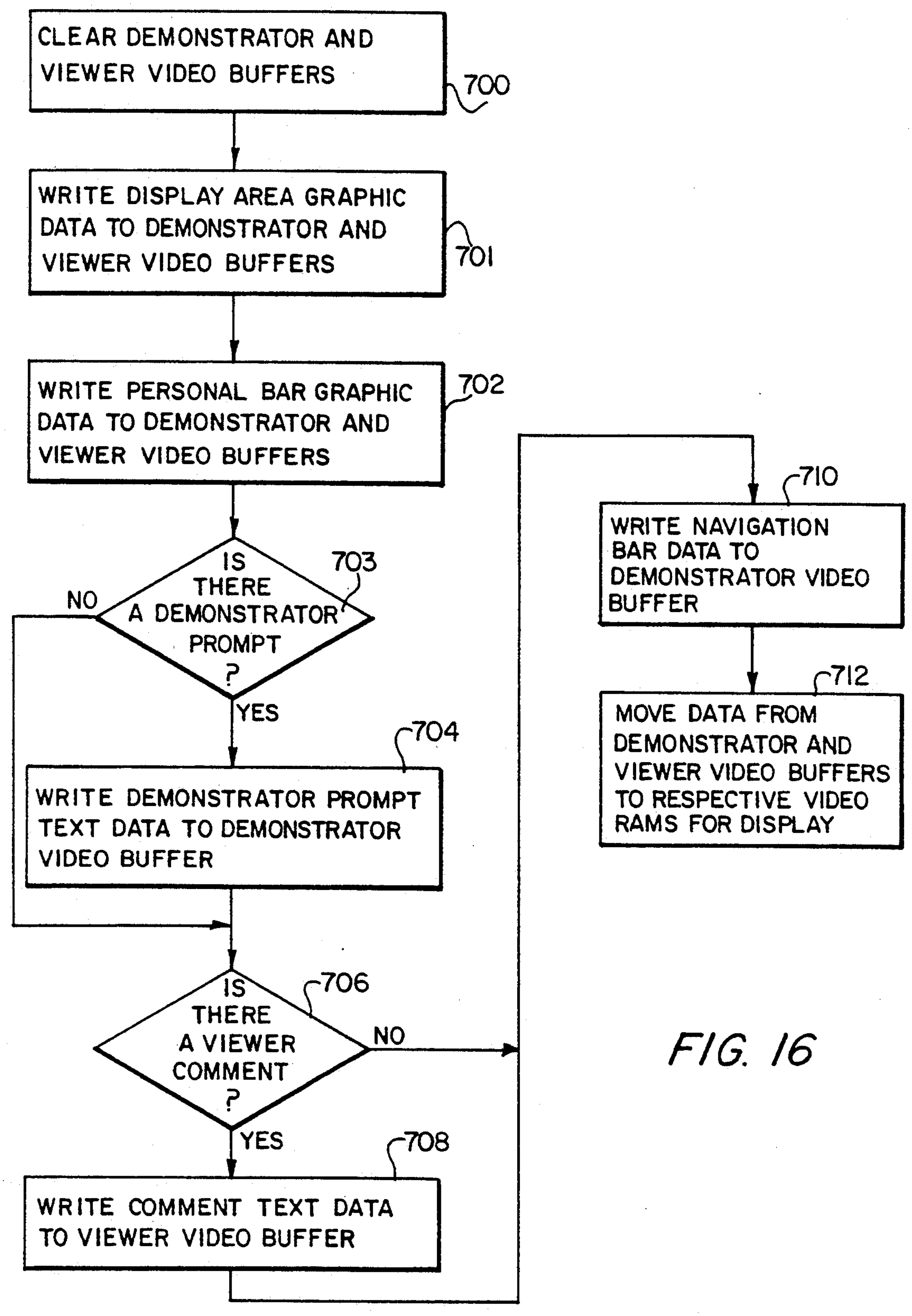
Figure 17:
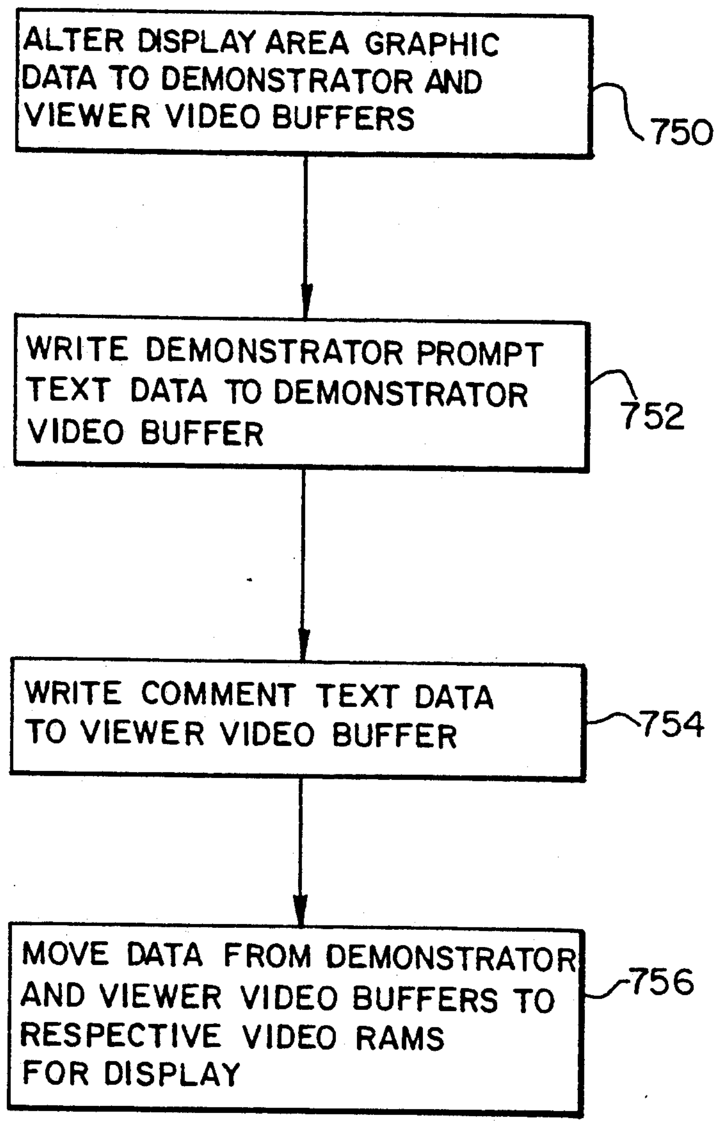

FIG. **2*a*** is a representation of a computer display shown at a demonstrator station, the display showing various regions defined thereon according to the present invention;

FIG. **2*b*** is a representation of a computer display shown at a viewer station, the display showing various regions defined thereon according to the present invention;

FIGS. 3 and 4 are representations of computer displays shown at a demonstrator station, the display showing various regions defined thereon according to the present invention;

FIG. **5*a*** is a representation of a computer display shown at a demonstrator station, the display showing various regions defined thereon according to the present invention;

FIG. **5*b*** is a representation of a computer display shown at a viewer station, the display showing various regions defined thereon according to the present invention;

FIGS. 6 through 13 are representations of computer displays shown at a demonstrator station, the display showing various regions defined thereon according to the present invention;

FIG. 14 is a diagram of a data structure used in accordance with the present invention;

FIG. 15 is a block diagram of an exemplary hardware configuration for a computer on which the system of the invention is implemented;

FIG. 16 is a flow diagram of a portion of a process implemented by the system of the invention when a demonstrator activates a new frame of the demonstration; and FIG. 17 is a flow diagram of a portion of an alternative process implemented by the system of the invention when a demonstrator activates a new frame of the demonstration.

DETAILED DESCRIPTION OF THE INVENTION

The present invention is a system for demonstrating financial concepts and displaying financial information. The system includes at least two stations, one for a demonstrator and one for a viewer. Optionally, additional viewer stations may be added. Preferably, the system is housed in a single desk-like unit 10, shown in FIG. 1. This unit is preferably divided into two stations—a demonstrator station 12 and a viewer station 22.

Both demonstrator and viewer stations include monitors 13 and 23 or other means for displaying financial information in graphic form. Monitors 13 and 23 are preferably 13-inch color monitors, such as those sold by Apple Computer, Inc.

Monitors 13 and 23 are connected to the same central processing unit 30, which is preferably hidden in the desk portion of demonstrator station 12. Central processing unit 30 provides video signals to monitors 13 and 23. Central processing unit 30 is preferably a Macintosh IIci microcomputer having at least eight megabytes of RAM, a hard disk drive of at least 40 megabytes and two Apple Computer, Inc. 256-color video graphics controller cards. Monitors 13 and 23 are each connected to one of the video graphics controller cards.

The demonstrator station 12 also includes means for selectively controlling the display of information on both demonstrator and viewer monitors 13 and 23. Means for entering data into the system are also provided at the demonstrator station. Preferably, the demonstrator station 12 includes a keyboard 14 and a mouse 15 for entering information and directing the display of information on monitors 13 and 23. Keyboard 14 and mouse 15 are connected to central processing unit 30.

Central processing unit 30 is connected to a printer 35, which is preferably a laser printer such as the LaserWriter® IINT printer available from Apple Computer, Inc.

All of the hardware elements described in the system of the present invention could be replaced with other equivalent hardware elements that perform similar functions. Many different types of central processing units could be substituted for the Macintosh unit described above. Similarly, touch screen displays, light pens, track balls, keyboards, keypads, stylus-type input devices or any other input device could be used instead of or in addition to keyboard 14, mouse 15 or both.

Figure 1:
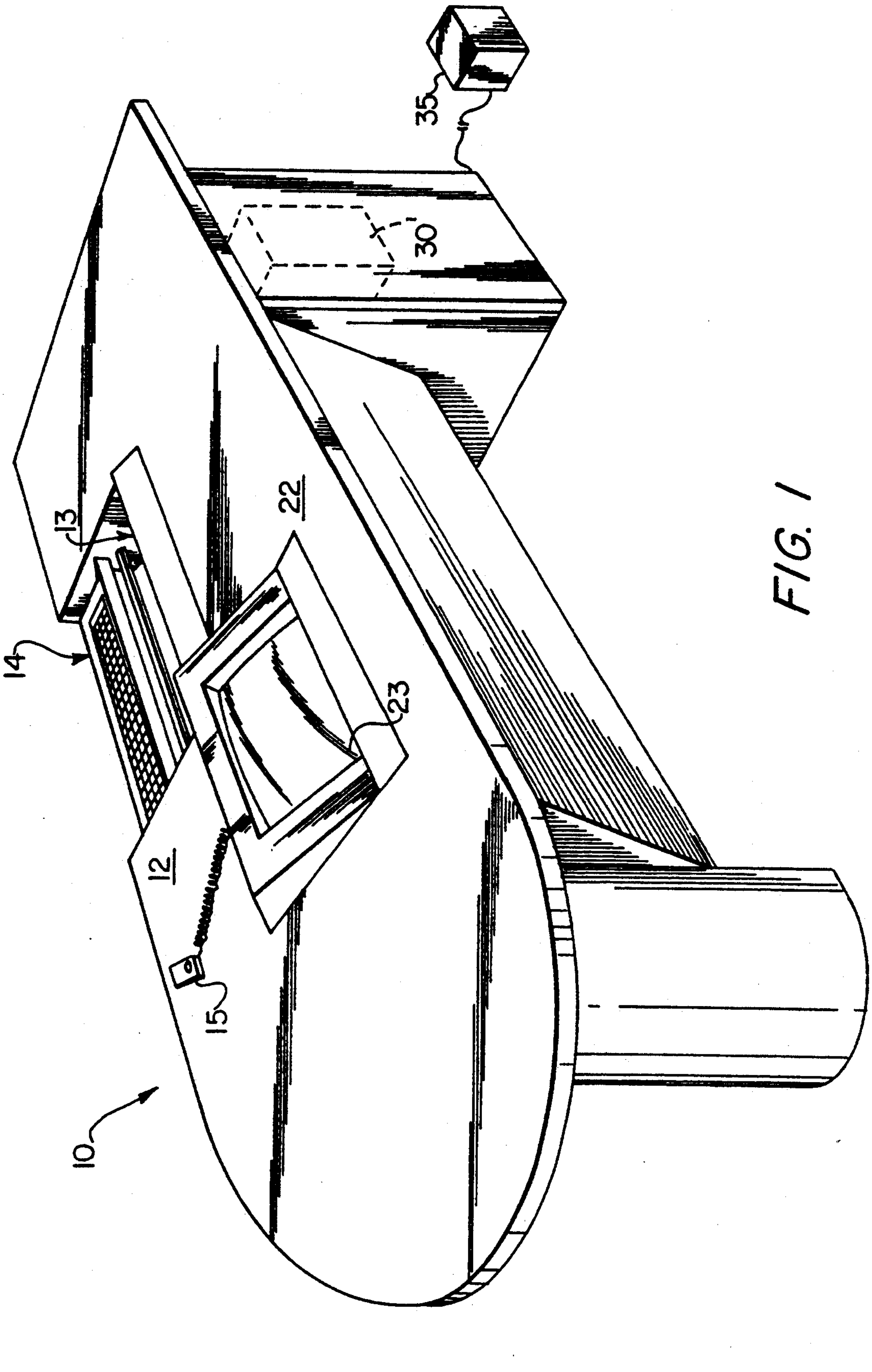
FIG. 1 is a diagram of a demonstration station according to the present invention.

Although demonstrator station 12 and viewer station 22 are preferably housed in a single desk-like unit as shown in FIG. 1, in an alternative embodiment, viewer station 22 may be located in a remote location, away from demonstrator station 12. In such an embodiment, viewer station 22 may comprise a separate terminal (either with or without its own central processing unit) which is electronically connected to central processing unit 30 via a network, or modems or any other means of linking terminals or computers. Graphic display data at the remote viewer station 22 may be transmitted from one of the video graphics controller cards at central processing unit 30; alternatively, the graphic display on viewer screen 23 may be generated by a video graphics controller located at viewer station 22 using data transmitted by central processing unit 30. In such a remote embodiment, a voice communications system such as a telephone or intercom may also be employed to enable the viewer to speak with the demonstrator. The viewer station 22 may also include a printer.

FIG. *2a* depicts a typical display that would be shown at demonstrator station monitor 13 of the present invention. FIG. *2b* shows a display that would be shown at viewer station monitor 23 at the same time that the display of FIG. *2a* is shown at the demonstrator station. The demonstrator's display shown in FIG. *2a* has four distinct regions—display region 100, personal bar 200, navigation bar 300 and prompt field 400.

Everything displayed on demonstration station monitor 13 is in display region 100, except for the personal bar 200, the navigation bar 300 and prompt field 400. Display region 100 can be used to display text and graphic information, including information tables, line, bar and pie charts, and other graphic displays. Display region 100 may also contain active areas that permit the demonstrator to enter data or display additional information in a manner that is well known to those familiar with hypertext programs.

Viewer station display region 100*a*, shown in FIG. *2b*, displays virtually the same information shown in display region 100 at the demonstrator station 12. In the preferred embodiment of the present invention, navigation bar 300 (or the menu headings and menu subheadings associated with the navigation bar) on the demonstrator display may overlay and cover a portion of display region 100 on the demonstrator monitor 13 as will be described below. Except for differences caused by the presence of navigation bar 300 (and various warning and error messages which appear on only demonstrator display region 100), display regions 100 and 100*a* always display the same graphic image or information.

Personal bar 200 shown in FIG. *2a* overlays display region 100. Similarly, personal bar 200*a* in FIG. *2b* overlays display region 100*a* on the display 23 at the viewer station 22. The personal bar 200 and its associated menus (not shown in FIG. *2a*) may include active areas as will be described below. These menus (and the personal bar 200) can be used by the demonstrator to enter information about the viewer during the demonstration. As with display areas 100 and 100*a*, personal bars 200 and 200*a* (and their associated menus) displayed on the demonstrator and viewer displays always have the same appearance. Personal bar 200 will be more fully described below. FIG. *2a*, appear on only the demonstrator display. The navigation bar 300 comprises Clear Screen region 302, menu headings 304*a* through 304*f*, "T" menu heading 305, Back region 306 and Next region 307. Pointer 310 is moved across the display by mouse 15. The regions and menus of navigation bar 300 are used to direct the demonstration program; these regions and menus can be activated by touching a mouse button when pointer 310 is directly over the active region. This action is referred to as "clicking on" the active region. Alternatively, where a touch screen or light pen is used, an active area can be activated by touching the screen within the active area (in which case a pointer is not needed). Navigation bar 300 will be more fully described below.

In an alternate embodiment, the viewer station 22 might have an associated input means, such as a keyboard, keypad, mouse, touch screen, track ball, light pen or a stylus-type input device. For example, the viewer station 22 in the remote embodiment discussed above might have an associated keyboard or keypad to permit the viewer to enter data. While such an alternate embodiment is within the scope of the present invention, the embodiment described herein (and in the Computer Program Appendix) does not include input means at the viewer station.

Figure 2A:
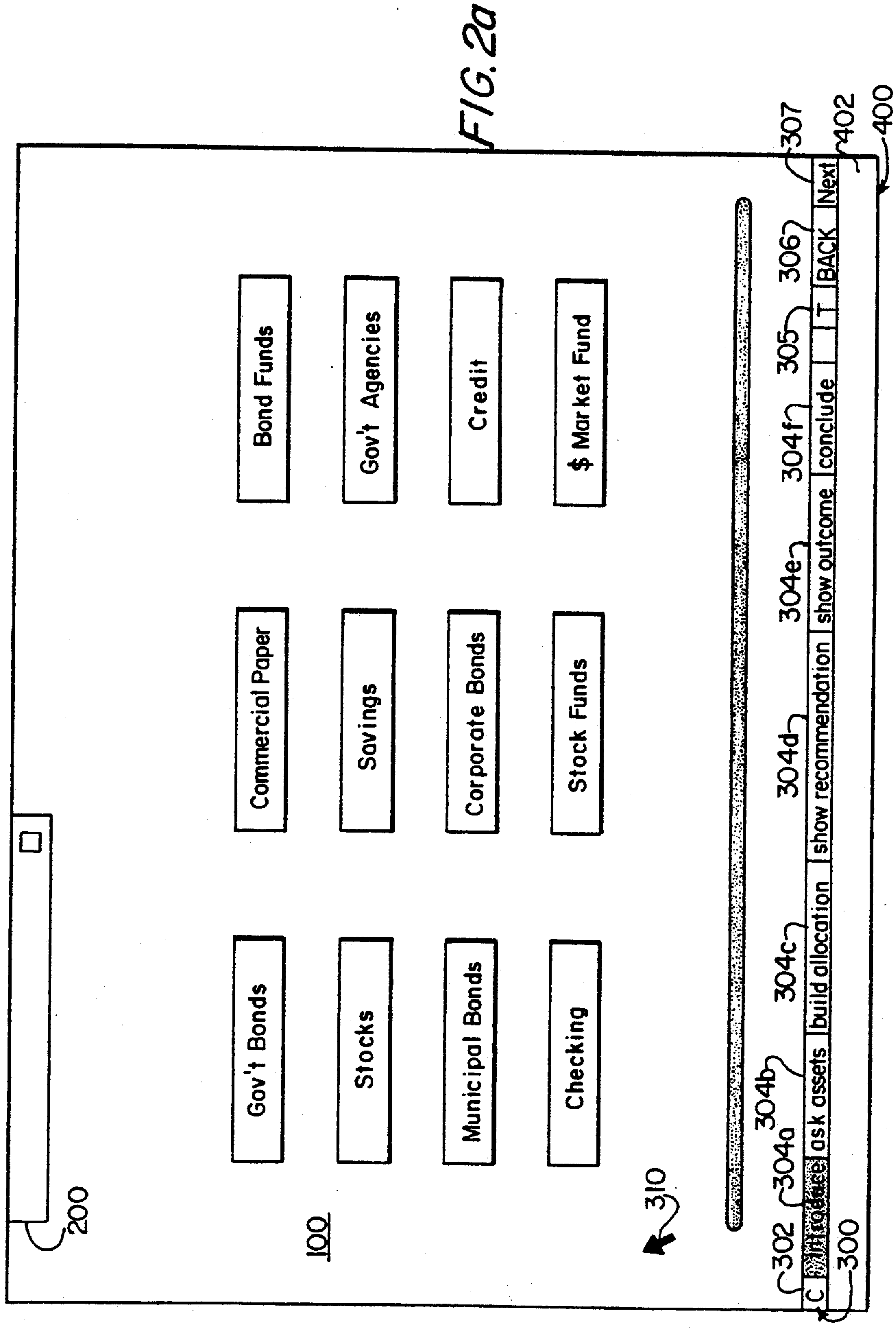

Prompt field 400 shown in FIG. 2*a* appears only on the demonstrator display 13. Prompt field 400 displays notices (e.g., a copyright notice or a disclaimer) and textual prompts or comments to assist the demonstrator in explaining the graphic information that is simultaneously displayed in display areas 100 100*a*. Alternatively, prompt field 400 may display textual prompts to assist the demonstrator in interacting with the demonstration system (e.g., directing the demonstrator to click on a particular portion of the display.) Prompt field 400 may also include active area 402 which can be touched or clicked on by the demonstrator to provide additional prompt text (which replaces the text previously located in prompt field 400.) This feature permits prompts to be of more than one line of text where necessary.

Figure 2B:
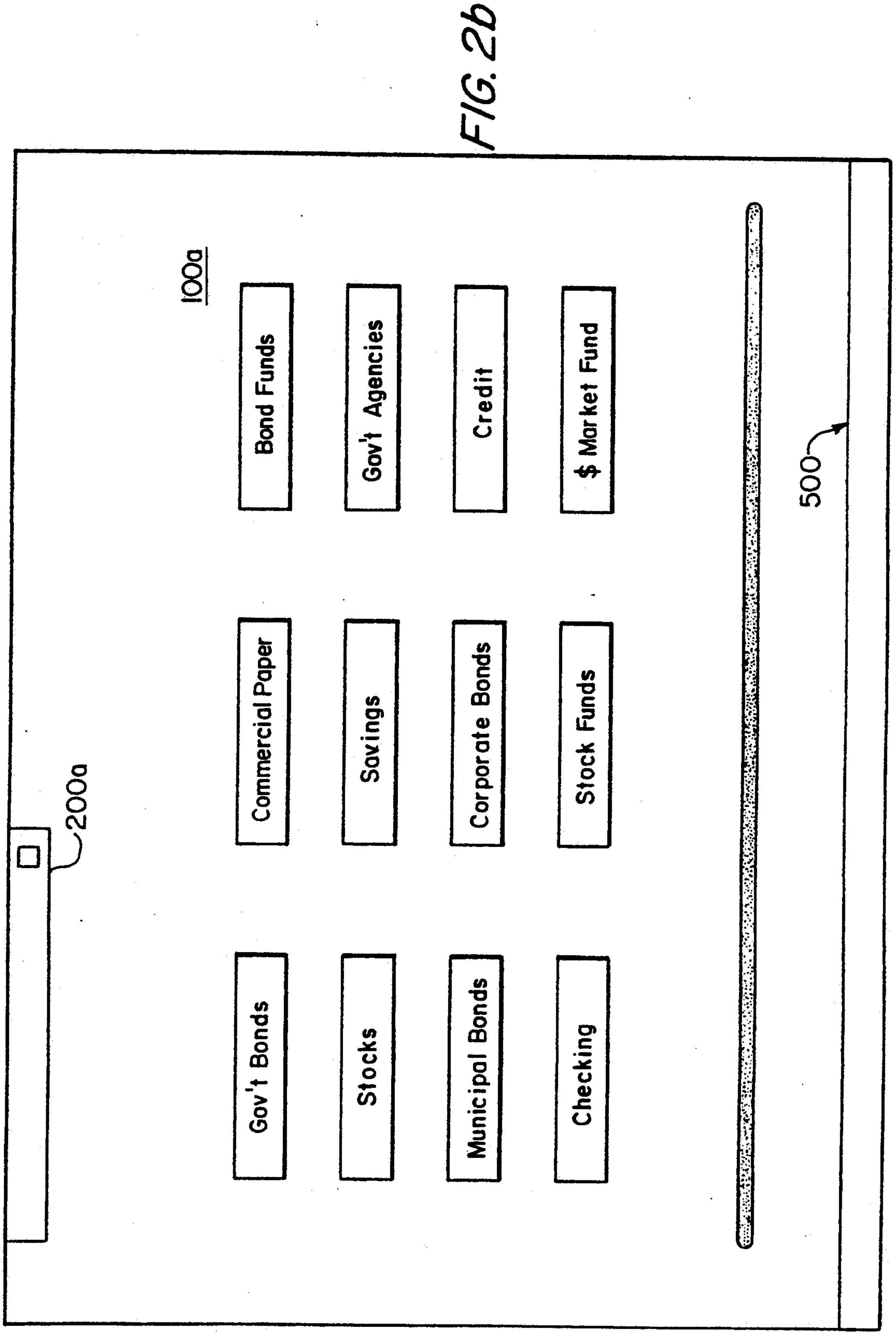

Comment field 500 shown in FIG. 2*b* appears only on the viewer display 23. Like prompt field 400 on the demonstrator display 13, comment field 500 on the viewer display 23 can display text messages associated with the graphic image being displayed in display areas 100 and 100*a*. However, prompt field 400 and comment field 500 do not generally display the same text messages. Furthermore, comment field 500 has no active areas. In FIG. 2*b*, no text is displayed in comment field 500.

Thus the viewer display shown in FIG. 2*b* comprises display region 100*a*, personal bar 200*a* and comment field 500. Unlike the demonstrator display shown in FIG. 2*a*, the viewer display has no active areas. While most of the FIGURES discussed subsequently will depict only the demonstrator display (and thus show navigation bar 300), it is understood that the viewer display associated with each demonstrator display shown is the same as the demonstration display with four exceptions: (1) the viewer display does not have a navigation bar; (2) the viewer display does not have prompt field 400, but rather comment field 500 which occupies the same area of the viewer display as the prompt field does on the demonstrator display, but displays different text; (3) the viewer display does not have a pointer in the normal operation of the system (although the software in the attached Computer Program appendix may cause a pointer to appear on the viewer monitor if pointer 310 is moved off one edge of demonstrator monitor 13); and (4) various system messages and error messages appear only on demonstrator monitor 13.

Navigation bar 300 shown in FIG. 2*a* will now be described in more detail in the context of an asset allocation demonstration. As noted above, the regions and menus of navigation bar 300 are used to direct the demonstration program. Menu headings 304*a* through 304*f* divide the demonstration into discrete sections. In the example shown in FIG. 2*a*, there are six sections—the first two being "introduce" 304*a* and "ask assets" 304*b*. The text in the remaining four menu headings, 304*c* through 304*f*, is shaded (as opposed to the solid text in menu headings 304*a* and 304*b*). The menu headings having shaded text indicate that those menus are inactive, and thus cannot be opened.

The "introduce" menu heading 304*a* is highlighted in FIG. 2*a*. This menu heading is highlighted because the frame being displayed in FIG. 2*a* is located in the "introduce" section of the demonstration. While particular label names for the menus described are based on a particular asset allocation demonstration, the present invention is in no way limited to menus using the labels mentioned or to any particular application. Similarly, the invention is in no way limited to the particular graphic screens disclosed.

Clicking on any of the active menu headings 304*a* through 304*f* causes the heading to be highlighted (while any previously highlighted heading is unhighlighted) and the corresponding men is displayed.

Clicking on "T" menu heading 305 provides access to a menu that allows the demonstrator to access a number of tools, such as an on-screen calculator. Other customized calculators, such as a monthly mortgage payment calculator or marginal tax rate calculator may be accessed through this menu heading.

Clicking on the Back 306 or Next 307 region allows the demonstrator to move to the previous or next frame of the demonstration (when these regions are active). In FIG. 2*a*, the Back region 306 is inactive (as the label "BACK" is displayed in shaded text) and thus cannot be used. The Back region 306 is inactive because the frame being displayed in FIG. 2*a* is the first frame of the "introduce" section. A mouse click on Next region 307 will, however, move the demonstration to the next frame.

When a new frame is displayed (e.g., by clicking on an active Next region 307), new information is displayed in display regions 100 and 100*a*. Prompt field 400 and Comment field 500 are also updated with the new text (or blank field) associated with the new frame. Personal bars 200 and 200*a* are displayed as they were in the previous frame. The navigation bar 300 is again displayed on only the demonstrator display.

Clear Screen region 302 enables the demonstrator to clear display region 100 (and 100*a*) as well as prompt field 400 and comment field 500. Clicking on the Clear Screen region 302 also moves the demonstration to an empty frame at the beginning of the section that was highlighted on navigation bar 300 when the Clear Screen region was clicked on. Thus if the Clear Screen region 302 as shown in FIG. 2*a* is clicked on, display region 100 will appear empty as shown in FIG. 3. If menu heading 304*a* is then clicked on, the "introduce" menu will be displayed as shown in FIG. 3. Any of the active menus can be displayed at any time by clicking on the appropriate menu heading, such as 304*a*, 304*b* or 305 in FIG. 2*a*. Inactive menus are not displayed when the mouse clicks on the associated heading.

The "introduce" menu shown in FIG. 3 has four entries or subheadings—"show investment options" 320, "define 3 categories" 322, "compare past performance" 324 and "sign-on customer" 326. Each of these entries corresponds to a particular frame or set of frames in the demonstration. By clicking on the one of the entries, the demonstration is advanced (or moved back) to the frame corresponding to the menu entry selected. If the entry corresponds to a set of frames, clicking on the entry moves the demonstration to the first frame in that set of frames. The top entry, "show investment options" 320, corresponds to the first frame, or first set of frames in the demonstration. The bottom entry, "sign-on customer" 326 corresponds to the last frame or set of frames in the "introduce" section.

Because Clear Screen region 302 was clicked while in the "introduce" section of the demonstration, FIG. 3 shows the demonstrator display at the very beginning of the "introduce" section. The demonstrator can move the demonstration to the next frame by clicking on either the "show investment options" entry 320, or by clicking on the Next region 307. If either of these regions is clicked on, the demonstration system would then display the displays shown in FIG. 2*a* and FIG. 2*b* on the demonstrator and viewer displays respectively. These screens display the frame "show investment options".

Alternatively, the person conducting the demonstration may not wish to return to this frame, having already viewed it. Thus the demonstrator may click on "define 3 categories" 322 of the "introduce menu shown in FIG. 3. The demonstrator display would then appear as shown in FIG. 4 (the corresponding viewer display is not shown.) The frame shown in FIG. 4 has a different graphic image in display region 100, and a different prompt for the demonstrator in prompt region 400. Both the Back and Next regions 306 and 307 are active in FIG. 4, indicating that the demonstrator can both move back to the previous frame, or forward to the next frame.

It will be noted that FIGS. 3 and 4, and the subsequent FIGURES showing the display at demonstrator station 12 omit pointer 310 for the sake of simplicity. If a mouse is used in the system of the present invention, a pointer 310 will always appear on demonstration monitor 13 unless the pointer 310 is moved off the edge of demonstration monitor 13.

Figure 5A:
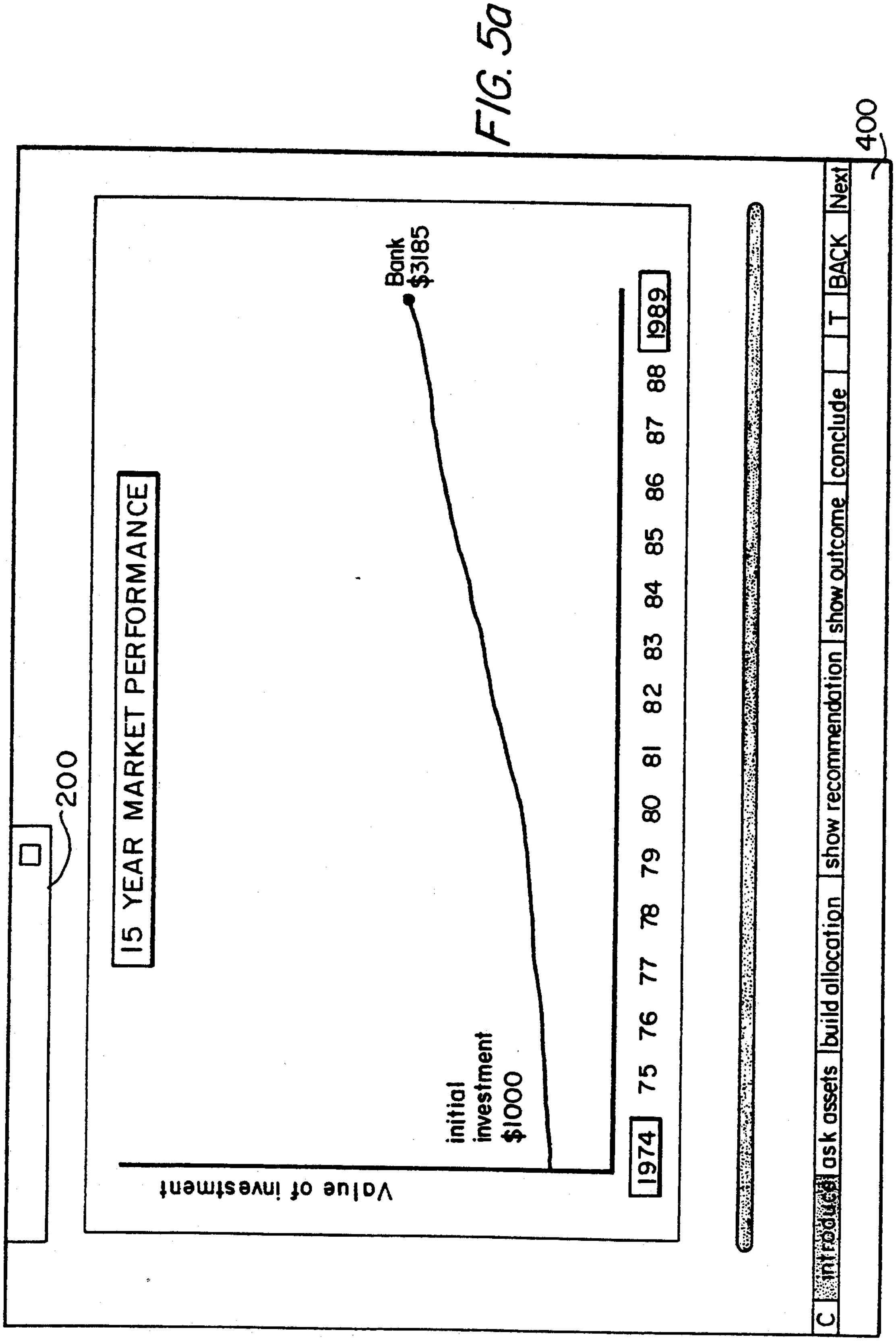
Figure 5B:
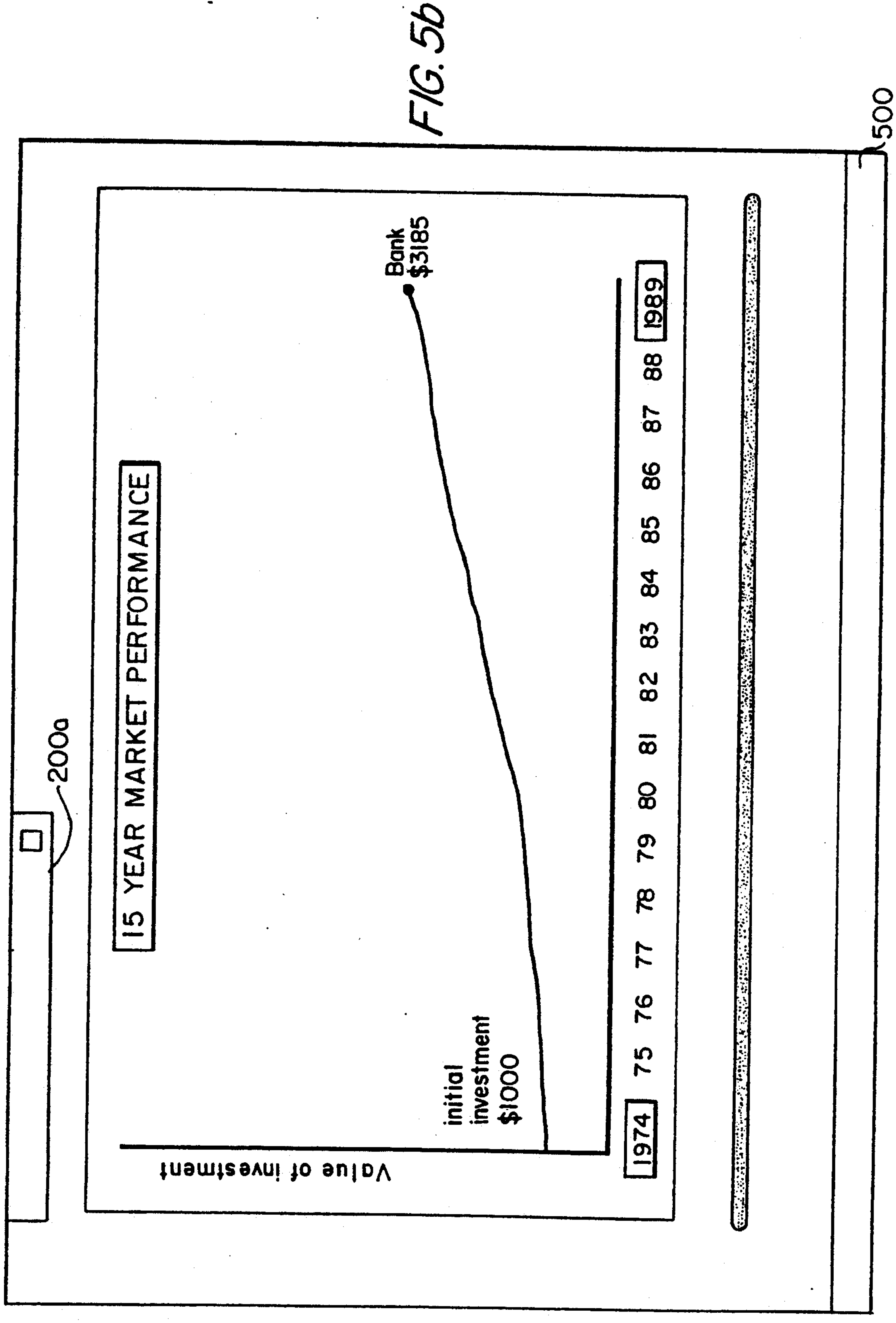

FIGS. 5*a* and 5*b* depict the demonstrator and viewer displays for a subsequent frame in the "introduce section". Comment region 500 of FIG. 5*b* displays a viewer comment. This comment differs from the prompt visible in the prompt field 400 of the demonstration display shown in FIG. 5*a*.

Figure 6:
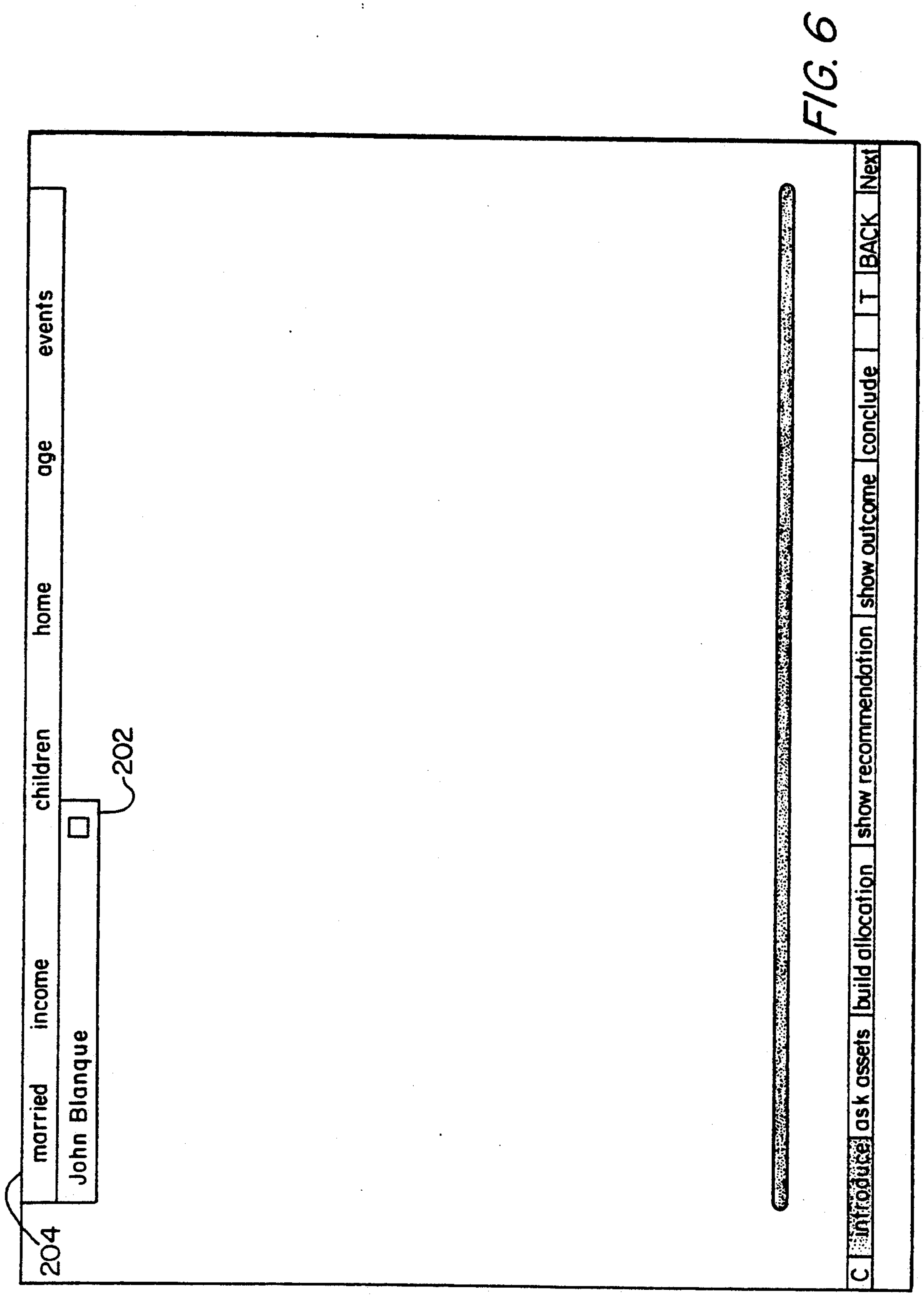

FIGS. 5*a* and 5*b* (and all of the Figures discussed thus far) have shown the personal bar 200 (200*a*) in the closed condition. The personal bar also has an open condition. If the fourth entry from the "introduce" menu shown in FIG. 3—"sign-on customer" 326 is selected, the personal bar is automatically opened and a cursor is activated in viewer field 202. (If a name has already been entered in viewer field 202, choosing "sign-on customer" 326 will not cause a cursor to appear in viewer field 202, which will already display the previously entered name.) Alternatively, the personal bar 200 can be opened at any time by clicking on box 203. Once personal bar 200 is open, the demonstrator can enter the viewer's name into viewer field 202 using the keyboard 14. FIG. 6 shows the open personal bar after the name "John Blanque" has been entered into viewer field 202. (The viewer name can always be entered or edited by clicking on viewer field 202 or personal bar 200 to activate a cursor in that field. Once entered, the name is always displayed in viewer field 202 or on personal bar 200.)

Figure 7:
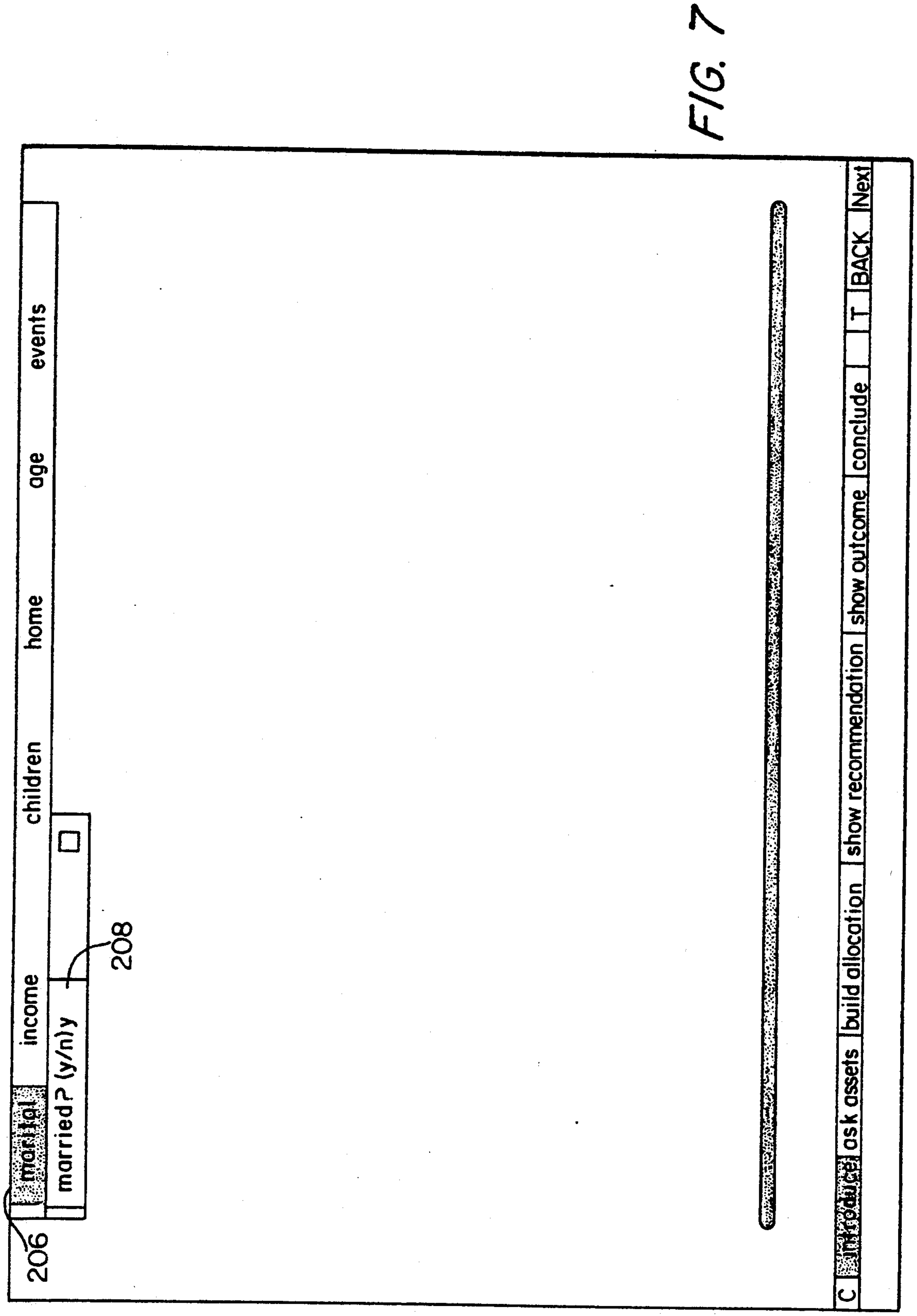
Figure 8:
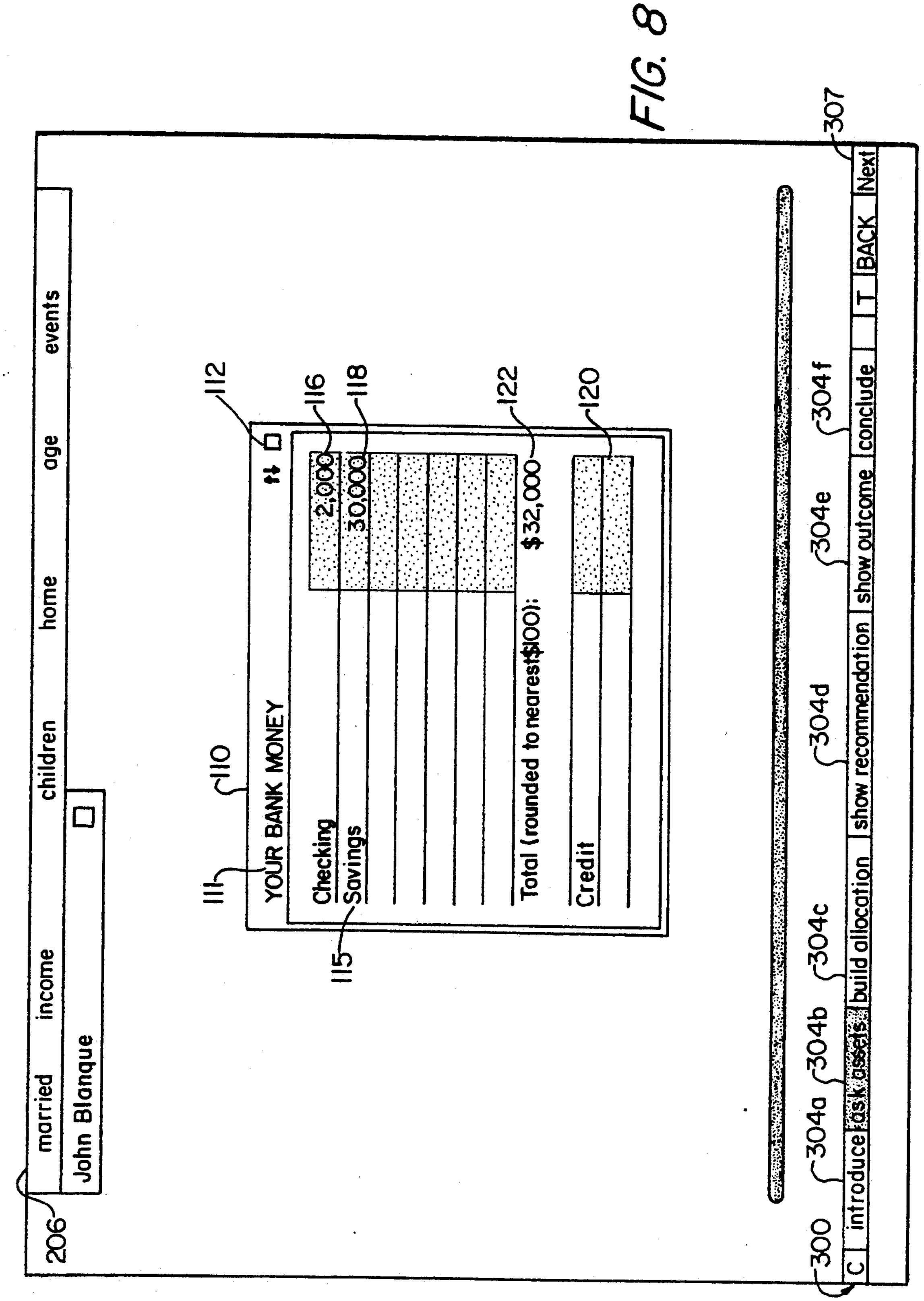

The open personal bar shown in FIG. 6 displays data menu headings bar 204. (Data menu headings bar 204 and viewer field 202 are also displayed on the viewer display.) Data menu headings bar 204 contains several data menu headings. By clicking near a particular heading, a data entry field is displayed. For example, by clicking the mouse button when the pointer 310 is near the "marital" heading and over the data menu headings bar 204, the data entry field 208 is displayed, as shown in FIG. 7. This field is displayed with an active "I-bar" cursor. In the example shown, the demonstrator would ask the viewer if he or she is married and enter "y" or "n" accordingly. As shown in FIG. 7, the demonstrator has entered "y" using keyboard 14. When the demonstrator hits the "return" or "enter" key on the keyboard 14, data entry field 208 disappears and the "marital" heading of the data menu headings bar 206 changes to "married", as shown in FIG. 8.

If the demonstrator has made a mistake, he can click near the "married" heading of the data menu headings bar 206 to again display data entry field 208. By entering "n" for "no", the heading of the data menu headings bar 206 would be changed to display "single".

Thus the data menus activated by the data menu headings bar 206 can be used to enter and edit information about the viewer of the demonstration. This information can be displayed on the data menu headings bar 206 as described above with regard to the marital heading. Other information that might be entered through data entry fields associated with data menu headings bar 206 includes: annual income, monthly expenses, marginal tax rate, number of children and their ages, whether the viewer expects to pay for the college costs of the children, whether the viewer owns a home or rents, the viewer's age, and the age at which he expects to retire.

This information about the viewer of the demonstration may be used by the demonstrator to assist him in advising the viewer with regard to the viewer's financial affairs. While the present invention includes the described system and method of entering data about the viewer of the demonstration, the present invention does not encompass any particular method or system of creating a recommendation based on the collected information. The system of the present invention could, however, be utilized to gather information to serve as the basis for generating such recommendations.

FIG. 8 also depicts data entry card 110. Title bar 111 identifies the type of data to be entered into data entry card 110. This card contains several shaded fields 116, 118 and 120 which can be clicked on to open a data entry field to allow data to be entered or edited using keyboard 14; pressing "return" or "enter" closes the data field. The data to be entered in each field are indicated by labels 115 ("Checking", "Savings" and "Credit" in FIG. 8) located on the left side of the data entry card 110. In the data entry card 110 shown in FIG. 8, "2000" has been entered in to field 116 and "30000" has been entered into field 118. After the "return" or "enter" key is pressed, the fields are formatted (with commas, dollar signs in the fields at the top of columns, etc.) and displayed in their respective locations as shown in FIG. 8. The data entry card 110 shown in FIG. 8 adds the values in fields 116 and 118 and displays the formatted, rounded sum in area 122, in a manner similar to a conventional spreadsheet.

It will be noted that the "Credit" label near the bottom left corner of data entry card 110 is shaded. This is in contrast to the "Checking" and "Savings" labels which are in solid lettering. The labels appear in solid lettering if the demonstrator clicked on the boxes shown in FIGS. 2a and 2b having the corresponding label on them. Thus the "Credit" label is shaded because the "Credit" box was not clicked on. However, if numerical data is entered in field 120, the "Credit" label will be displayed in solid lettering.

While this description discusses labels and menu headings as being displayed in solid or shaded fonts, it will be understood that the actual programming used to achieve this effect may not be a change in the color of a font per se. For example, the apparent color of a text segment may be "changed" by replacing the bit-map used to generate the entire region containing the text with a second bit-map that differs from the initial bit map only in the appearance (color or shade) of the lettering that will be generated by that bit-map. Alternatively, a similar procedure can be used to "highlight" menu headings 304a–f, etc.

It will also be noted that the "ask assets" heading 304b of navigation bar 300 is now highlighted because the frame being displayed is located in the "ask assets" section of the demonstration program.

Clicking on the Close Box 114 in the title bar 111 enables the demonstrator to close data entry card 110, causing data entry card 110 to disappear from the display. Clicking on Up and Down Arrows Symbol 112 will cause the next data entry card to be displayed. Clicking on Next region 307 will also cause the next data entry card (frame) to be displayed. Clicking on the "ask assets" region 304b of navigation bar 300 will display the subheadings in the "ask assets" menu, which subheadings correspond to particular frames in the "ask assets" section of the demonstration program. Clicking one of these subheadings (if it is active) will cause the associated frame to be displayed.

Figure 9:
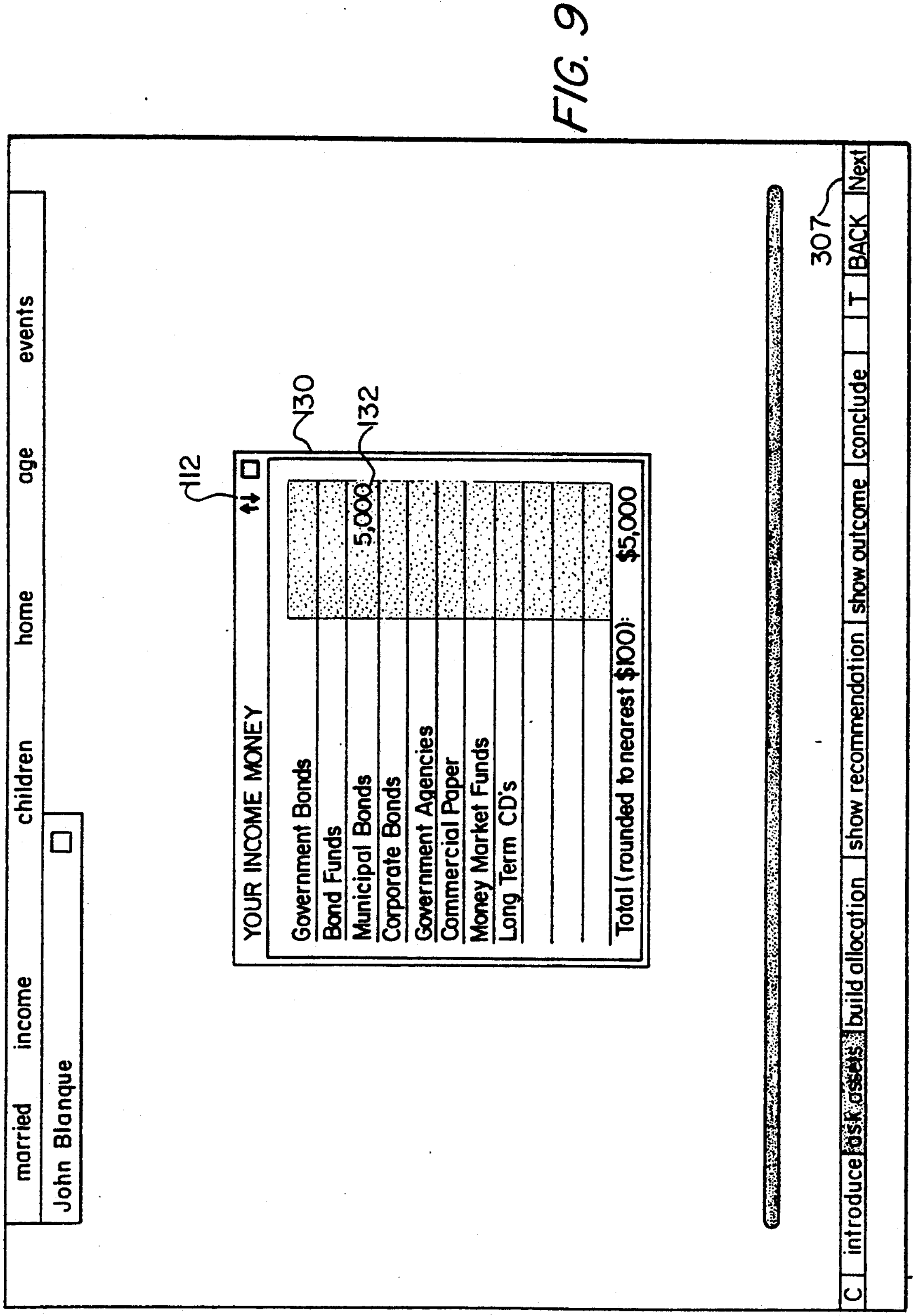

If either Next region 307 or Up and Down Arrows Symbol shown in FIG. 8 is clicked on, the display will then appear as shown in FIG. 9. Data entry card 130 shown in FIG. 9 is functionally similar to data entry card 110 shown in FIG. 8. The main difference between data entry cards 110 and 130 is the nature of the data intended to be entered by the demonstrator in each card. In the examples shown in FIGS. 8 and 9, data entry card 110 is for entering "Bank" information, whereas data entry card 130 is formatted for entering "Income" information. Data entry card 130 functions as described with regard to data entry card 110; data is entered by clicking on a shaded field to the right of its associated label, entering or editing the data using keyboard 14, and pressing the "return" or "enter" key to close the data entry field. In the data entry card 130 shown in FIG. 9, "5000" has been entered in field 132.

Figure 10:
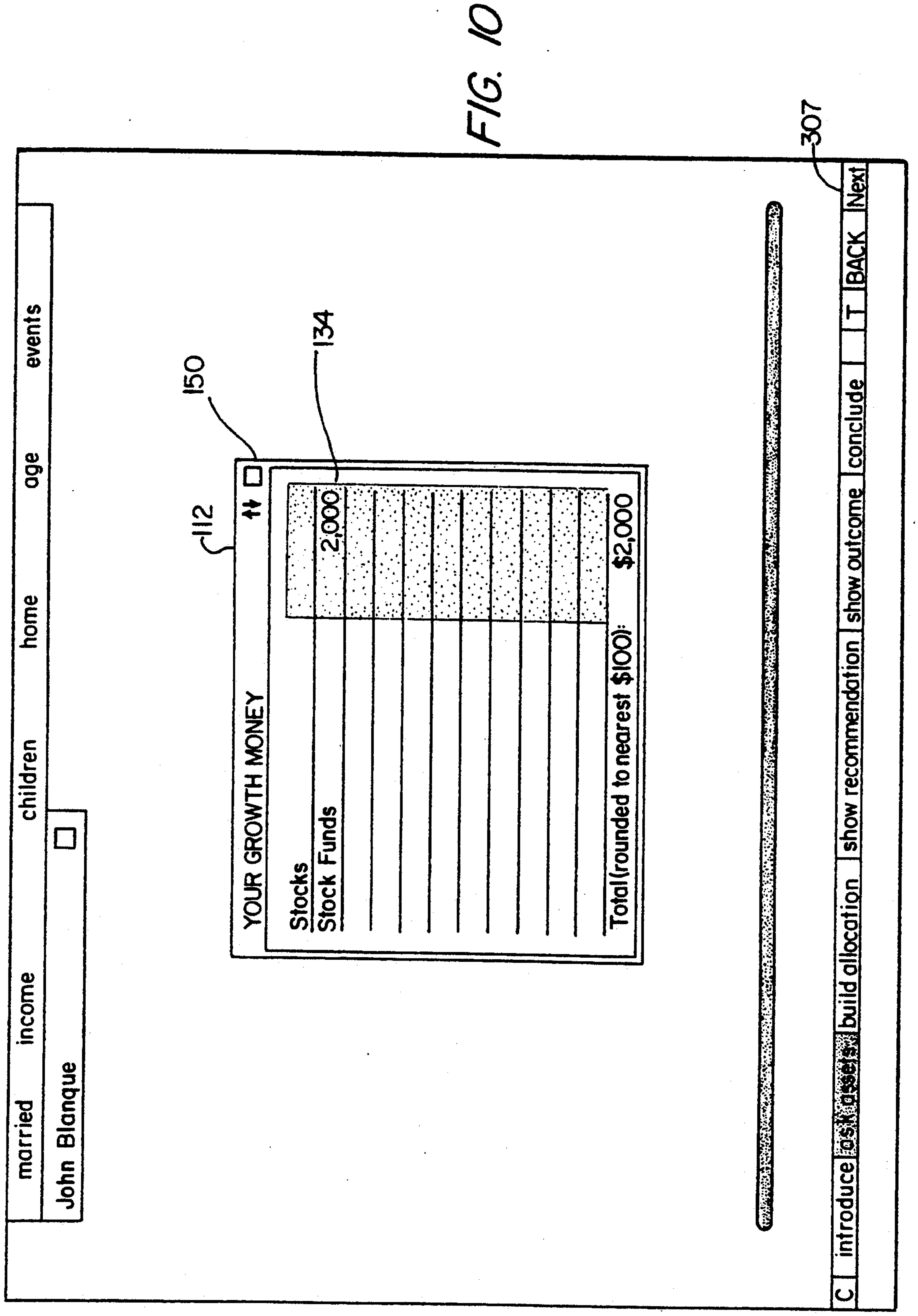

If either Next region 307 or Up and Down Arrows Symbol 112 shown in FIG. 9 is clicked on, the display will then appear as shown in FIG. 10. Data entry card 150 displayed in FIG. 10 is used for "Growth" information, but functions in the said manner as data entry cards 110 and 130. In the data entry card 150 shown in FIG. 10, "2000" has been entered in field 134. The demonstration incorporating the frames shown in FIGS. 8, 9 and 10 has only three cards in this sequence of frames. Consequently, clicking on the Up and Down Arrows Symbol 112 on data entry card 150 (the last of the three cards) causes the first data entry card, 110 to be displayed, as shown in FIG. 8. Thus data entry cards 110, 130 and 150 can be reviewed and the information in the various data entry fields altered in the manner described above.

Figure 11:
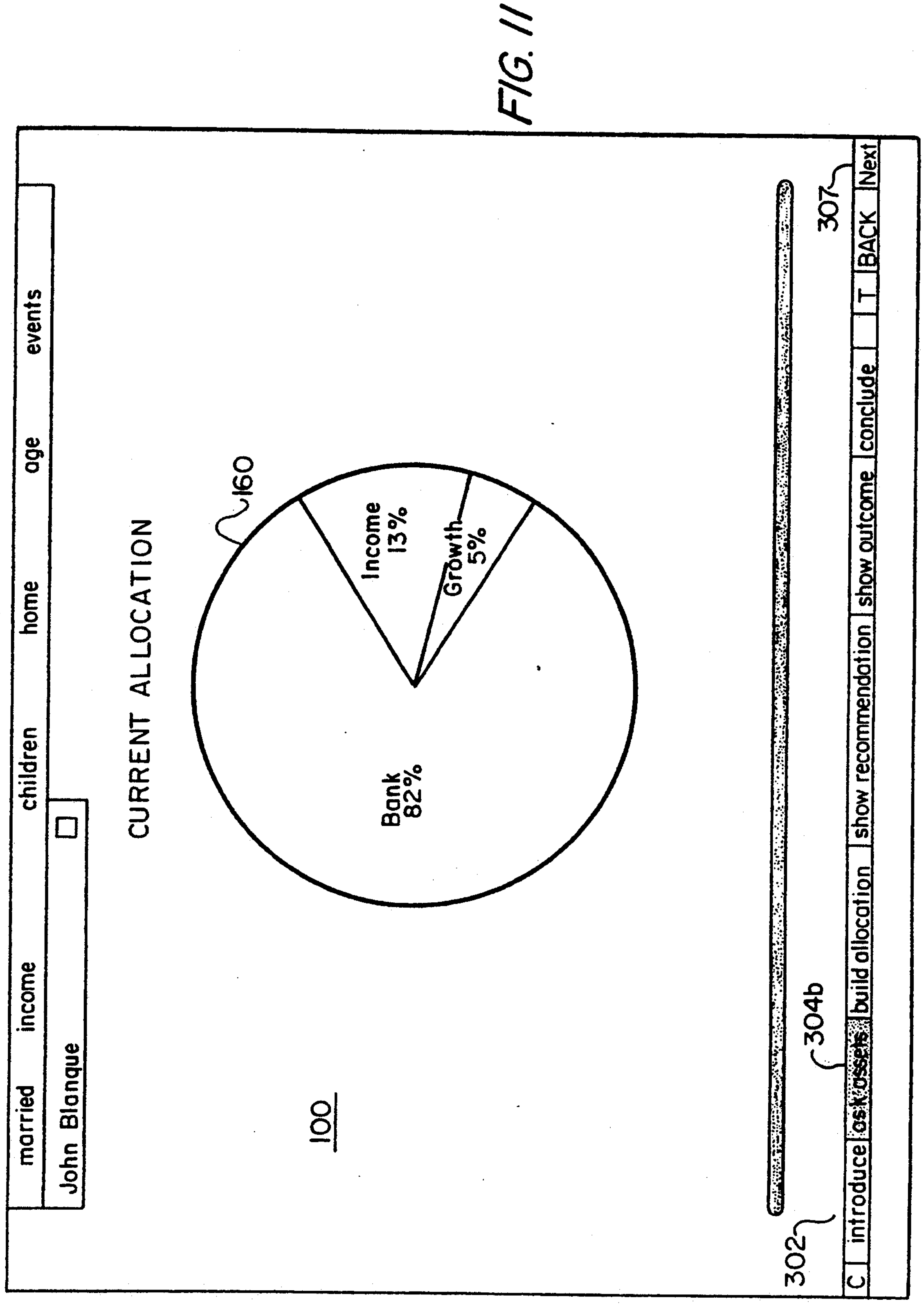

If Next region 307 shown in FIG. 10 is clicked on, the display appears as shown in FIG. 11. Next region 307 will not be active when data entry card 150 is being displayed unless some numerical data has been entered in the fields of data entry cards 110, 130 and 150. Display area 100 displays pie chart 160, which is generated from the "Bank", "Income" and "Growth" data entered in data entry cards 110, 130 and 150. Pie chart 160 displays the proportionate contribution of each of the three categories ("Bank", "Income" and "Growth") to the total of the viewer's investment assets.

Figure 12:
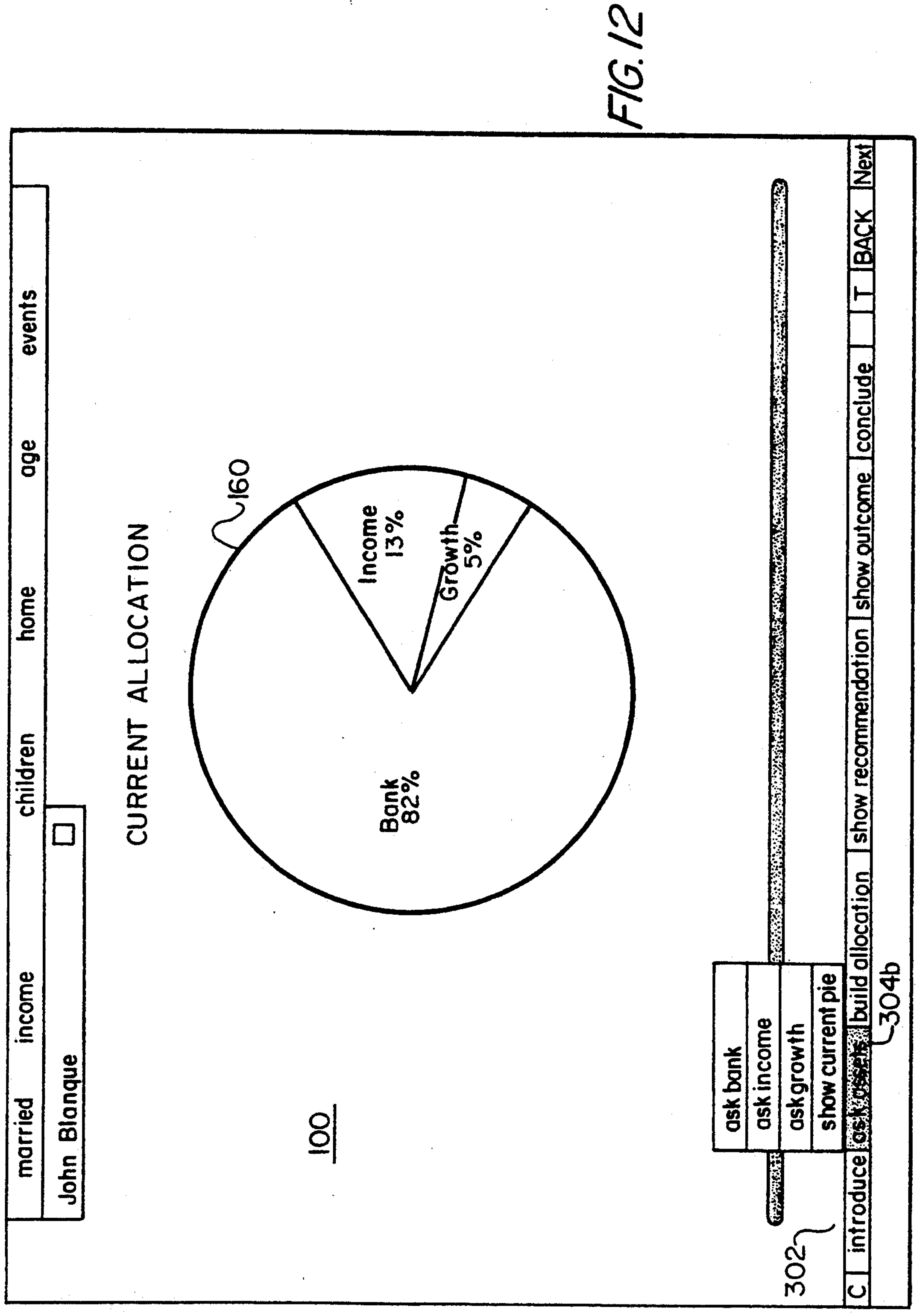

If, while viewing the pie chart 160 shown in FIG. 11, the demonstrator wishes for some reason to change a data entry in one of data entry cards 110, 130 region 304b. This will cause the "ask assets" menu to be displayed as shown in FIG. 12. If the first subheading in this menu, "ask bank", is clicked on, data entry card 110, as shown in FIG. 8, will be displayed on the screen. Data in any of the fields of this data entry card can then be edited by opening the data entry fields as described above. Data on the other data entry cards 130 and 150 can be edited in a similar manner. When the editing is complete, the demonstrator can again click on the "ask assets" region 304b to display the "ask assets" menu. Then, by clicking on the bottom entry, "show current pie", a new pie chart 160 generated from the edited data will be displayed.

After the information about the viewer has been gathered using the system of the present invention, the demonstrator may use the information for a number of purposes. One such purpose might be to propose a new allocation for the viewer's assets. The new allocation might be generated by a securities broker or even a computer program. As noted above, the generation of new ways to allocate assets is not a part of the present invention. However, after a new manner of allocating assets has been proposed, the data concerning the new allocation could be entered using data entry cards in a manner similar to that described above. This data could then be used to generate a new pie chart similar to the one shown in FIG. 11.

Figure 13:
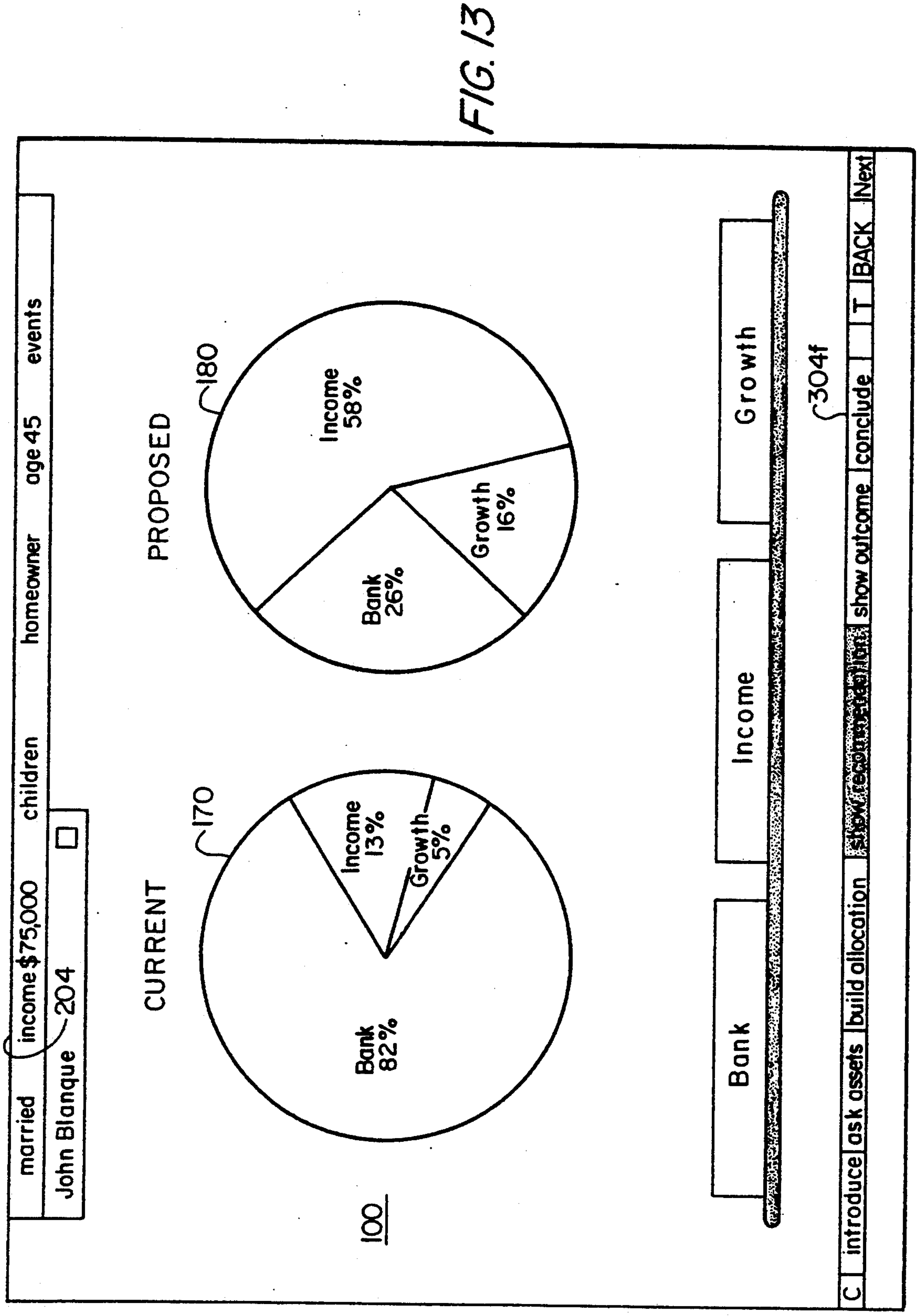

The system of the present invention could then be used to compare the current and proposed allocations, as shown in FIG. 13. It will be noted that data menu headings bar 204 now displays additional information that was entered in the manner described in connection with FIG. 7. Thus data menu headings bar 204 now indicates that John Blanque, the viewer: is married, has an annual income of $75,000, has one child, owns a home, and is forty-five years old.

Display region 100 shows pie chart representations of both the current and proposed asset allocations 170 and 180.

By clicking on "conclude" heading 304f of navigation bar 300, the demonstrator can access a menus subheading that will enable him to print a summary of the asset and personal information entered into the system of the present invention. Such a printed summary could include information entered using the data menu headings bar 204, including: the viewer's name, an indication of the viewer's marital status, the viewer's gross annual income, the viewer's monthly cash needs, the viewer's marginal tax rate, ages of the viewer's children (if the viewer has children), an indication of whether the viewer intends to provide college expenses for the children (if the viewer has children), an indication of whether the viewer owns a home, the viewer's age and the viewer's planned retirement age.

The printed summary also preferably includes all of the information entered in data entry cards 110, 130 and 150 along with the associated labels. If a proposal for a different asset allocation (i.e., a proposed allocation) has been provided (by a person such as a securities broker, or through a system other than that of the present invention), information concerning the proposed allocation analogous to that contained on data entry cards may also be included in the printed summary.

The data collected from the viewer can be saved in a file (preferably under the viewer's name) at the end of a session. This file can then be accessed subsequently using the demonstration system of the present invention to add, edit, display or print information regarding the viewer as described above.

The demonstration system of the present invention may be implemented with a computer program (hereafter the demonstration system program) running on a conventional microcomputer. A conventional computer operating system and the demonstration system program are contained on the hard disk drive (or other storage means) of central processing unit 30. A database of customer files (that have been saved) is also stored on the hard disk. The demonstration system program actually comprises two programs—a compiled interpreter program called "bscan" and a program that runs on the "bscan" interpreter called "scan". These programs access data from two "libraries"—one containing numerical data and the other containing data for generating graphic images. The data in the graphic image library are divided into numerous image files, each of which has an associated identifier. A particular image file contains data needed to generate a single graphic image. Copies of source code listings of the "bscan" program, and of the "scan" program that creates the sample demonstration referred to herein are submitted with this application in a Computer Program Appendix.

The "bscan" program is an application comprising numerous low-level routines that are essential to the creation of any particular demonstration program. These low-level routines include, for example, routines for generating menus, active areas, icons and dialogue boxes that can be used by the demonstrator to control the demonstration program. The bscan program, which is coded in the C programming language, includes a toolbox of routines that create graphically displayed control elements that can be displayed simultaneously with graphic images. In addition to these low-level, interface routines, bscan also includes routines for generating line, bar and pie charts from stored or entered data. Additionally, bscan includes routines for creating tables of data (which the demonstrator can used to enter information) and to perform simple calculations on data (such as adding a column of numbers.) The bscan routines are accessed or "called" by a high-level "bscan language". The bscan program also includes an interpreter for interpreting files written in the bscan language. Thus the bscan program shares many similarities with Apple Computer's Hypercard, Silicon Beach's SuperCard and other well-known hypertext programs.

The second subprogram of the system of the present invention is the "scan" program. The scan program is a series of high-level "bscan language" instructions that creates a particular demonstration by calling various bscan routines in conjunction with a selected portions of a particular library of graphic images and data. Thus a particular scan program creates a unique demonstration by invoking the bscan interpreter in conjunction with the data representing graphic images stored in a particular library.

The scan program includes high level instructions that create and link a series of screen displays or frames. At most, only a single frame can be displayed at any one time on monitors 13 and 23. The scan program also includes high level instructions that invoke various bscan routines to create the navigation bar 300, its menus and active areas, and the personal bar 200 (200*a*) and its menus.

THE FRAME STRUCTURE

As discussed above, a scan program and its associated data files create a number of frames, only one of which is displayed at any one time when the scan program is being executed. As shown in FIG. 14, each includes a display section 602 containing graphic information for generating a graphic display for display areas 100 and 100*a*.

Display section 602 may comprise identifiers for one or more graphic images which may be stored in the data library, and instructions for displaying the graphic images (including the locations of the stored images on the display screen.) The graphic images stored in the data library are preferably bit-map images stored in a compressed form.

Alternatively, display section 602 may comprise a program for generating a graphic display based on stored or entered data. The pie chart display shown in FIGS. 11 and 13 and the line graph display shown in FIGS. 5*a* and 5*b* are examples of displays generated by frames which employ graphics programs to generate images.

Frame 600 also includes an active area section 604 containing coordinates specifying any active areas on display area 100. The active area section 604 also includes coordinates of the next and back areas of the navigation bar, if these areas are active for this frame. Each set of active area coordinates has at least one associated software routine for performing the action associated with each active area.

For example, a box pictured in display area 100 (and 100*a*) may have screen coordinates that coincide with those of an active area such that, if the mouse button is held down when pointer 310 is in the box (and thus in the active area), an "I-bar" cursor appears which allows text or numerical data to be entered or edited in the box using the keyboard 14. Whenever an "I-bar" cursor is present in a data entry field, pointer 310 assumes a "waffle" shape formed by a three-by-three grid of boxes. When the "return" or "enter" key on keyboard 14 is pressed, the "I-bar" cursor disappears, the pointer 310 resumes its usual arrow shape, and the entered text or numerical data is displayed in the box.

Frame 600 also comprises a demonstrator prompt section 606 that includes the text of any prompts that are to appear in prompt field 400 when the frame 600 is the active frame. Similarly, viewer comment section 608 includes the text of any comments that are to appear in the comment field 500 on the viewer display when frame 600 is the active frame.

Frame 600 also includes NextFrame 610 and BackFrame 612 sections, which may contain the identifiers of the frames to be activated when the mouse is clicked in the next and back active areas, 307 and 306, respectively (when frame 600 is the active frame.) If either the next or the back area 307 or 306 is inactive (i.e., not currently an active area), the corresponding NextFrame or BackFrame section will not contain a frame identifier.

Frame 600 also includes a Location Identifier section 614. The Location Identifier indicates the section of the demonstration in which frame 600 is located. Thus Location Identifier section 614 may have any one of a fixed number of values. The fixed number is determined by the number of sections in the particular demonstration, which is the same as the number of menu headings on navigation bar 300. Thus, for the demonstration discussed above, Location Identifier section 614 could have any of six values, which values correspond to the six sections (and menu headings) of the demonstration—"introduce", "ask assets", "build allocation", "show recommendation", "show outcome" and "conclude".

It will be understood by those of ordinary skill in the art that the frame structure shown in FIG. 14 can be implemented or programmed in a number of forms. For example, rather than being a grouping of data files and identifiers, each frame 600 may be implemented as a separate subroutine. Thus the frame identifier 601 would be the name of the subroutine, with each of the remaining sections of the frame comprising one or more high-level commands.

It will also be understood by those of ordinary skill in the art that a subroutine corresponding to a particular frame might merely add or remove elements from the graphic display of the previous frame, rather than redrawing the elements of the two frames which are identical. Thus a frame which can only be displayed immediately after a certain prior frame is displayed might merely alter the display from the prior frame to generate a new display.

FIG. 15 illustrates the manner in which two screens of data are displayed in the system of the present invention. Central processing unit 30, operating under the control of the demonstration program, transmits data along bus 51 to and between demonstrator video buffer RAM 52, demonstrator video RAM 54, viewer video buffer RAM 62 and viewer video RAM 64. The display of demonstrator monitor 13 is controlled by the contents on demonstrator video RAM in a conventional manner. Similarly, the display on viewer monitor 23 is controlled by the contents of viewer video RAM 64. Central processing unit 30 prepares the contents of each monitor screen by using conventional graphics programs to write to demonstrator video buffer RAM 52 and viewer video buffer RAM 62. Where the same images are to appear on both demonstrator and viewer monitors 13 and 23, central processing unit 30 sends the same data to demonstrator video buffer RAM 52 and viewer video buffer RAM 62. The data creating images that are to appear on only one monitor are sent to only one video buffer RAM.

When the central processing unit 30 has completed both displays and has thus finished writing to video RAM buffers 52 and 62, the contents of these buffers are moved to demonstrator video RAM 54 and viewer video RAM 64, respectively. Thus the displays on demonstrator monitor 13 and viewer monitor 23 are updated. It should be noted that it may be preferable to have more than one video buffer for each monitor.

FIG. 16 is a flowchart illustrating the manner in which screen displays in accordance with the present invention are generated. Whenever a new frame is activated, the screen display subroutine represented in FIG. 16 is invoked. In step 700, the contents of demonstrator and viewer video buffers 52 and 62 are cleared. In step 701, graphic image data as indicated in display section 602 of the newly activated frame is written to both demonstrator and viewer video buffers 52 and 62. Alternatively, if a graphic program resides in section 602 of the newly activated frame, the program is executed and its graphic image data output written to both demonstrator and viewer video buffers 52 and 62.

In step 702, graphic image data reflecting the current status of the personal bar 200 is directed to both demonstrator and viewer video buffers 52 and 62.

In step 703, demonstrator prompt section 606 of the newly activated frame is checked to determine if there is a prompt to be displayed. If there is a prompt, textual data for displaying the prompt are written to demonstrator video buffer 52 in step 704. If there is nothing in demonstrator prompt section 606, control passes directly to step 706.

In step 706, viewer comment section 608 of the newly activated frame is checked to determine if there is a comment to be displayed. If there is a comment, textual data for displaying the comment are written to viewer video buffer 62 in step 708. If there is nothing in viewer comment section 608, control passes directly to step 710.

In step 710, graphic image data reflecting the current status of the navigation bar 300 is directed to the demonstrator video buffer 52. This step is described in further detail below.

In step 712, data in demonstrator video buffer 52 is moved to demonstrator video RAM 54 and the data in viewer video buffer 62 is moved to viewer video RAM 64. Thus demonstrator monitor 13 displays the image corresponding to the data in demonstrator Video RAM 54, while viewer monitor 23 displays the image corresponding to the data in viewer video RAM 64.

It should be noted that, if an arrow cursor is to be displayed on the demonstrator display (e.g., for use with a mouse), the display of the cursor is handled by a conventional cursor control program that operates at a lower system level than the demonstration program of the present invention.

The writing of image data for displaying the navigation bar 300 to the demonstrator video buffer, shown in step 710 of FIG. 16 will now be described in more detail. Most features of the navigation bar 300 remain the same throughout the demonstration. The navigation bar 300 appears as exactly the same static image in each frame, with two exceptions. Thus the data and subroutines for generating the navigation bar 300 in step 710 are the same for each frame except as to these exceptions. The first of these exceptions is that the text in each menu heading and active area may be shaded or solid depending upon whether the menu or area is currently inactive or active. The second difference is that one of the menu headings 304*a* through 304*f* is highlighted in each frame, depending on the location of the frame being displayed in the demonstration. This highlighted heading is changed if the mouse is clicked on a different heading.

The displaying of text as either shaded or solid is handled in the conventional manner of associating an activity flag with each menu heading or region that indicates whether the subheading or region is active or inactive. These activity flags are then set by other subroutines in the program. For example, the activity flag associated with Back region 306 can be set by a program that checks to see if an address (i.e., a frame identifier) is located in Back Frame Address section 612 of the currently active frame. If there is an address in section 612, the text in Back region 306 is displayed in a solid font; if there is no address in section 612, the text in Back region 306 is displayed in a shaded font. Obviously, more complicated subroutines may also be employed to set the activity flags—such as basing the status of the activity flag on whether data has been entered in each of several data entry fields. Alternatively, if a menu is always active, the flag can be permanently set at the start of the demonstration and never altered.

Thus in step 710, the activity flag for each menu heading 304*a* through 304*f* and 305 and region 302, 306 and 307 is checked and the data written to demonstrator video buffer RAM 52 modified to display the text in each heading or region in solid or shaded as indicated by the associated activity flags.

It will be noted that each of the individual menu subheadings (which are displayed when an active menu heading is clicked on) also has an associated activity flag. As with the menu headings, the text in menu subheadings is displayed in either a solid or shaded font depending upon whether the menu subheading is currently active.

The second aspect of the navigation bar 300 that changes as the demonstration progresses is the highlighted portion which corresponds to the section of the demonstration in which the currently active frame is located. Thus, in step 710 of FIG. 16, the Location Identifier is read from Location Identifier section 614 of the currently active frame. The image data that generates the navigation bar 300 are then modified in a conventional manner so as to highlight the menu heading corresponding to the Location Identifier in Location Identifier section 614.

As discussed above, in some instances the screen display for a new frame can be generated by making changes to the previous frame. FIG. 17 describes the process by which this is accomplished. Because the demonstrator and viewer video buffers have not been cleared, the buffers contain the same data currently in the respective video RAMs 54 and 64. In Step 750 alterations are made to the data in the demonstrator and viewer video buffers 52 and 62. These alterations may consist of writing new blocks of data to the respective buffers to modify the graphic display of corresponding segments of the screen displays. The instructions directing the computer to perform these alterations can be located in display section 602 of the newly activated of frame 600. Alternatively, where the frame is implemented as a subroutine, instructions for implementing the alterations are simply a part of the subroutine.

In step 752, demonstrator prompt section 606 of the newly activated frame is accessed and the textual data for displaying the prompt are written to demonstrator video buffer 52. If there is nothing in demonstrator prompt section 606, a blank field is written to demonstrator video buffer 52.

In step 754, viewer comment section 608 of the newly activated frame is accessed and the textual data for displaying the comment are written to the viewer video buffer 62. If there is nothing in viewer comment section 608, a blank field is written to viewer video buffer 62.

In step 756, data in demonstrator video buffer 52 is moved to demonstrator video RAM 54 and the data in viewer video buffer 62 is moved to viewer video RAM 64. Thus, demonstrator monitor 13 displays the image corresponding to the data in demonstrator video RAM 54, while viewer monitor 23 displays the image corresponding to the data in viewer video RAM 64.

The operation of the regions and menus of navigation bar 300 will now be discussed. A mouse click occurring in Clear Screen region 302 activates the Clear Screen subroutine. Clear Screen region 302 is always active during the demonstration, so that the Clear Screen subroutine can be called at any time in a demonstration. When invoked, the Clear Screen subroutine sets the activity flag for Back region 306 to inactive and accesses the Location Identifier section 614 of the frame that was active when the Clear Screen subroutine was invoked to determine which Clear Screen Frame to activate. There is one Clear Screen Frame for each section of the demonstration, i.e., one Clear Screen Frame for each menu heading 304*a* through 304*f*.

Each Clear Screen Frame has the same blank display section 602 which contains graphic data for generating only a background pattern and color. Each Clear Screen Frame also has only one active area in section 604. This active area is Next region 307, which has the associated subroutine (as do all frames) which makes the frame designated in Next Frame Address section 610 the active frame upon a mouse click in Next region 307. Each Clear Screen Frame also has Demonstrator Prompt and Viewer Comment sections 606 and 608 which contain no text data. The Next Frame Address section 610 contains the identifier of the first frame in the section of the demonstration designated in the Location Identifier section 614 of the frame that was active when the Clear Screen subroutine was invoked. The Back Frame Address section 612 is empty, and Location Identifier section 614 contains the same identifier as was in the Location Identifier section 614 of the frame that was active when the Clear Screen subroutine was invoked.

The activation of the particular Clear Screen Frame then proceeds as was described in conjunction with FIG. 16.

Thus, as described above, the Clear Screen subroutine blanks out display regions 100 and 100*a*, prompt field 400, and Comment Field 500. Personal bar 200 is displayed as it was before the Clear Screen subroutine was invoked. Navigation bar 300 is displayed on the demonstrator display with the same highlighted menu heading, with Back region 306 inactive and Next region 307 active. Clicking on Next region 307 of navigation bar 300 of the Clear Screen Frame will activate the first frame in the section of the demonstration corresponding to the highlighted menu heading.

Clicking on any of the active menu headings 304*a* through 304*f* causes the associated menu to be displayed, with each of the active menu subheadings having an associated active area. When activated by a mouse click in the area of the active menu subheading, the frame corresponding to the label in the menu subheading is made active. Alternatively, if the label in the menu subheading corresponds to a set of frames, the first frame in the set is made the active frame.

As discussed above, clicking on the "T" menu heading 305 provides access to a menu that allows the demonstrator to access a number of tools, such as an on-

BEST AVAILABLE COPY screen calculator in the conventional manner well known in the art.

The operation of the Next region 307 on navigation bar 300 has already been discussed in connection with the Clear Screen Frames. The Back region 306 functions in a similar manner using the identifier or address in BackFrame section 612.

Personal bar 200, in both its open and closed states, operates in a conventional manner, with the status of the data menu headings bar 204 (i.e., the open personal bar) being stored as a series of flags and data fields in a manner that is well known. Once personal bar 200 is opened, the display of data menu headings bar 204 does not change until data is entered or edited through the data menu headings bar 204, or until the personal bar is again closed. Similarly, data entry using data entry cards 110, 130 and 150 also operates in a manner that is well known.

The subroutines for generating and displaying one or more pie charts from entered data also operate in a manner that is well known. Numerical data entered in each of the three data entry cards 110, 130 and 150 is summed to arrive at a total for each of the data entry cards. These totals correspond to the values of "Bank", "Income", and "Growth" used to generate pie chart shown in FIGS. 11 and 12. The two pie charts shown in FIG. 13 are generated in the same manner, with the data used to generate pie chart 180 being entered on data entry cards similar to those discussed above.

Similarly, the printing and storage of the entered data along with identifying labels operate in a conventional manner.

One skilled in the art will appreciate that the present invention can be practiced by other than the described embodiments, which are presented for the purposes of illustration and not of limitation, and the present invention is limited only by the claims which follow.

COMPUTER PROGRAM APPENDIX

BSCAN (Compilable using the Think C compiler by

Copyright 1991 Citibank, N.A.
As an unpublished work.
All Rights Reserved.

BEST AVAILABLE COPY

```
/* miscellianeous Advisory Terminal fns */

#include    "standard.h"
#include    "glue.h"
#define     APP_ADTERM
#include    "varFns.h"
#include    "tglMain.h"
#include    "libLibrary.h"
#include    "tchTouch.h"
#include    "atfMisc.h"
#include    "stkDetail.h"
#include    "bndDetail.h"
#include    "bnkDetail.h"
#include    "format.h"
#include    "scrScreen.h"
#include    "fileAccess.h"


/****************************************************************************
atfRound100() -- local rounding function (rounds to nearest 100)
****************************************************************************/
Real80T atfRound100( Real80T num )
{
Real80T ip;

ip= 100.0 * floor( (num + 50.0)/ 100.0 );
return( ip );
}


/****************************************************************************
*
initialize water and bucket variables
****************************************************************************
/
void atfSmearInit()
{
        Int32T i;
/*
        i=0;
        sscanf( ( varPtr(25)  ), "%*d , %ld", &i );
        sprintf( varPtr(25) , "100,%ld", i);

        i=0;
        sscanf( ( varPtr(26)  ), "%*d , %ld", &i );
        sprintf( varPtr(26) , "100,%ld", i);

        i=0;
        sscanf( ( varPtr(27)  ), "%*d , %ld", &i );
        sprintf( varPtr(27) , "100,%ld", i);

        i=0;
        sscanf( ( varPtr(45)  ), "%*d , %ld", &i );
        sprintf( varPtr(45) , "0,%ld", i);

        i=0;
        sscanf( ( varPtr(46)  ), "%*d , %ld", &i );
        sprintf( varPtr(46) , "0,%ld", i);

        i=0;
        sscanf( ( varPtr(47)  ), "%*d , %ld", &i );
        sprintf( varPtr(47) , "0,%ld", i);
*/
}
```

BEST AVAILABLE COPY

```
/*************************************************************************
 *
        mortgage UFF calculations
 *************************************************************************
 /
void atfMortgageUFF()
{
        Real80T     income, monthly, mortgage, total, down, interestPercent, downPerc
        Real80T     interestMonth;

        /* given gross income, calculate max monthly pmnt */
        income= varVal( vGrossIncome );
        monthly= (income / 12.0 ) * 0.28;
        varSetF( vMonMortPmnt, monthly );

        /* given monthly pmnt and interest, calculate total value of mortgage */
        interestPercent= varValF( vMortIntRate );

        interestMonth= (interestPercent/ 100.0) / 12.0;

        mortgage=  (Real80T) monthly * ( 1.0 -  pow( (1.0 + interestMonth ), -360.0 ) )/ int
*** get correct formula *** */

        varSetF( vTotalMort, mortgage );

        /* given downPercent, figure down payment and total home cost */
        downPercent= varValF( vMortPercentDown );

        total= mortgage / ( 1.0 - downPercent / 100 );
        varSetF( vMortTotalHomeCost, total );

        down= total - mortgage;
        varSetF( vMortDownAmt, down );

}

/*************************************************************************
 *
        college UFF calculations
 *************************************************************************
 /

#define             PUBLIC1988         5041.0
#define             PRIVATE1988        14509.0
#define             INFLATION   1.07

void atfCollegeUFF()
{
        Real80T costPublic, costPrivate, sumPublic, sumPrivate;
        char s[ 100 ];
        RGBColor    uffFGColor;
        Int32T              firstYear, years;
        char tempDollars[30];
        Int32T              maxDollarWidth;

        if ( varVal( vUFFYrToCollege ) != 0  )          /* use edit variable if defined */
                years = varVal( vUFFYrToCollege );
        else
                {
                if( varVal( vYrToCollege ) != 0 )
                        years =  varVal( vYrToCollege );
                else
                        return;
                }

        firstYear= years + varVal( vCurYr );
```

BEST AVAILABLE COPY

```
costPublic= (Real80T) PUBLIC1988 * pow( INFLATION, (Real80T) (years + varVal( v
costPrivate= (Real80T) PRIVATE1988 * pow( INFLATION, (Real80T) (years + varVal(

sumPublic= sumPrivate= 0.0;

TGL_SETRGB( uffFGColor, 21845, 21845, 21845 );
RGBForeColor( &uffFGColor );

TextFont( 3 );      /* Geneva */
TextSize( 12 );
TextFace( normal );

/* children's ages */
MoveTo( 300,177 );
drawstring( varPtr( vChildAges ) );

/* eldest attending in %d years */
sprintf( s, "%ld", years );
MoveTo( 377,200 );
drawstring( s );

/* get the largest width that is likely in the matrix */
maxDollarWidth = stringwidth( "$123,456" );

/* first line of matrix */

MoveTo( 220, 255 );
sprintf( s, "%ld", firstYear );
drawstring( s );

sprintf( s, "%ld", (Int32T) costPublic );
formatNumber( &tempDollars[0], s, 100, FALSE, 0, TRUE, 'L', TRUE, FALSE, '$' );
MoveTo( 279 + maxDollarWidth - stringwidth(tempDollars),255 );
drawstring( tempDollars );

sprintf( s, "%ld", (Int32T) costPrivate );
formatNumber( &tempDollars[0], s, 29, FALSE, 0, TRUE, 'L', TRUE, FALSE, '$' );
MoveTo( 361 + maxDollarWidth - stringwidth(tempDollars),255 );
drawstring( tempDollars );

sumPublic += costPublic;
sumPrivate += costPrivate;

/* second line of matrix */
costPublic *= INFLATION;
costPrivate *= INFLATION;

MoveTo( 220,275 );
sprintf( s, "%ld", firstYear + 1 );
drawstring( s );

sprintf( s, "%ld", (Int32T) costPublic );
formatNumber( &tempDollars[0], s, 29, FALSE, 0, TRUE, 'L', TRUE, FALSE, '\0' );
MoveTo( 279 + maxDollarWidth - stringwidth(tempDollars),275 );
drawstring( tempDollars );

sprintf( s, "%ld", (Int32T) costPrivate );
formatNumber( &tempDollars[0], s, 29, FALSE, 0, TRUE, 'L', TRUE, FALSE, '\0' );
MoveTo( 361 + maxDollarWidth - stringwidth(tempDollars),275 );
drawstring( tempDollars );

sumPublic += costPublic;
sumPrivate += costPrivate;


/* third line of matrix */
costPublic *= INFLATION;
costPrivate *= INFLATION;
```

```
        MoveTo( 220,295 );
        sprintf( s, "%ld", firstYear + 2 );
        drawstring( s );

        sprintf( s, "%ld", (Int32T) costPublic );
        formatNumber( &tempDollars[0], s, 29, FALSE, 0, TRUE, 'L', TRUE, FALSE, '\0' );
        MoveTo( 279 + maxDollarWidth - stringwidth(tempDollars),295 );
        drawstring( tempDollars );

        sprintf( s, "%ld", (Int32T) costPrivate );
        formatNumber( &tempDollars[0], s, 29, FALSE, 0, TRUE, 'L', TRUE, FALSE, '\0' );
        MoveTo( 361 + maxDollarWidth - stringwidth(tempDollars),295 );
        drawstring( tempDollars );

        sumPublic += costPublic;
        sumPrivate += costPrivate;


        /* fourth line of matrix */
        costPublic *= INFLATION;
        costPrivate *= INFLATION;

        MoveTo( 220,315 );
        sprintf( s, "%ld", firstYear + 3 );
        drawstring( s );

        sprintf( s, "%ld", (Int32T) costPublic );
        formatNumber( &tempDollars[0], s, 29, FALSE, 0, TRUE, 'L', TRUE, FALSE, '\0' );
        MoveTo( 279 + maxDollarWidth - stringwidth(tempDollars),315 );
        drawstring( tempDollars );

        sprintf( s, "%ld", (Int32T) costPrivate );
        formatNumber( &tempDollars[0], s, 29, FALSE, 0, TRUE, 'L', TRUE, FALSE, '\0' );
        MoveTo( 361 + maxDollarWidth - stringwidth(tempDollars),315 );
        drawstring( tempDollars );

        sumPublic += costPublic;
        sumPrivate += costPrivate;


        /* total line */

        sprintf( s, "%ld", (Int32T) sumPublic );
        formatNumber( &tempDollars[0], s, 29, FALSE, 0, TRUE, 'L', TRUE, FALSE, '$' );
        MoveTo( 279 + maxDollarWidth - stringwidth(tempDollars),342 );
        drawstring( tempDollars );

        sprintf( s, "%ld", (Int32T) sumPrivate );
        formatNumber( &tempDollars[0], s, 29, FALSE, 0, TRUE, 'L', TRUE, FALSE, '$' );
        MoveTo( 361 + maxDollarWidth - stringwidth(tempDollars),342 );
        drawstring( tempDollars );

        scrRestoreColors();
}

/*************************************************************************
*
 recalc earmark detail page totals ( currently unused )
*************************************************************************
/
void atfRecalcEarmark()
{
        Int32T total;
        Int32T i;

        total= 0;
```

BEST AVAILABLE COPY

```
	for( i= 61; i <= 63; i++ )
		total += varVal( i );
	varSetL( 60, total );
}

/**************************************************************************
*
	append vital stats to DATA CAPTURE file
***************************************************************************
/

#ifdef THINK_C

	static OSType			osTypeBLNK = '????';
	static OSType			osTypeTEXT = 'TEXT';

#else

	static OSType			osTypeBLNK = { '????' };
	static OSType			osTypeTEXT = { 'TEXT' };

#endif

#define STUFF n= strlen( s ); FSWrite( fRefNum, &n, s );

void atfDataCapture()
{
	Int32T		n;
	Int16T		vRefNum, fRefNum;
	char s[ 1000 ];
	char fName[ 100 ];
	char temp[ 255 ];

	strcpy( fName, "DataFile" );

	getvol( s, &vRefNum );			/* get current volume number */

	create( filePrependDir( temp, FILE_DATA_DIR, fName ), vRefNum, osTypeBLNK, c
	fsopen( filePrependDir( temp, FILE_DATA_DIR, fName ), vRefNum, &fRefNum );
	SetFPos( fRefNum, 2, 0 );			/* set pointer to end of file */

	sprintf( s, "\n\n\n" );
	STUFF;
	sprintf( s, "			name: %s\n", varPtr( 1 ) );
	STUFF;
	sprintf( s, "			age: %s\n", varPtr( 2 ) );
	STUFF;
	sprintf( s, "	planned retirement age: %s\n", varPtr( 3 ) );
	STUFF;

	sprintf( s, "		children under 18: %s\n", varPtr( 130 ) );
	STUFF;
	sprintf( s, "		ages of children: %s\n", varPtr( 5 ) );
	STUFF;
	sprintf( s, "		# of children: %s\n", varPtr( 4 ) );
	STUFF;
	sprintf( s, "		expect tuition costs: %s\n", varPtr( 134 ) );
	STUFF;

	sprintf( s, "		yrs to retirement: %s\n", varPtr( 35 ) );
	STUFF;
	sprintf( s, "		yrs to college: %s\n", varPtr( 36 ) );
	STUFF;

	sprintf( s, "		own/rent/buy: %s\n", varPtr( 6 ) );
	STUFF;

	sprintf( s, "		gross income: %s\n", varPtr( 7 ) );
```

BEST AVAILABLE COPY

```
STUFF;
sprintf( s, "  avg. monthly expenses (calculated): %s\n", varPtr( 8 ) );
STUFF;

sprintf( s, "          current checking balance: %s\n", varPtr( 10 ) );
STUFF;
sprintf( s, "           current savings balance: %s\n", varPtr( 11 ) );
STUFF;
sprintf( s, "         current money mkt. savings: %s\n", varPtr( 12 ) );
STUFF;
sprintf( s, "     current CDs -- 3 months or less: %s\n", varPtr( 13 ) );
STUFF;
sprintf( s, "                     current bonds: %s\n", varPtr( 14 ) );
STUFF;
sprintf( s, "                     curent stocks: %s\n", varPtr( 15 ) );
STUFF;
sprintf( s, "            current long term CDs: %s\n", varPtr( 16 ) );
STUFF;
sprintf( s, "             current checking plus: %s\n", varPtr( 17 ) );
STUFF;
sprintf( s, "            current lines of credit: %s\n", varPtr( 18 ) );
STUFF;
sprintf( s, "        current stock mutual funds: %s\n", varPtr( 19 ) );
STUFF;
sprintf( s, "                current treasuries: %s\n", varPtr( 37 ) );
STUFF;
sprintf( s, "           current money mkt funds: %s\n", varPtr( 38 ) );
STUFF;
sprintf( s, "                current bond funds: %s\n", varPtr( 39 ) );
STUFF;

sprintf( s, "                   current bank $: %s\n", varPtr( 42 ) );
STUFF;
sprintf( s, "                 current income $: %s\n", varPtr( 43 ) );
STUFF;
sprintf( s, "                 current growth $: %s\n", varPtr( 44 ) );
STUFF;
sprintf( s, "                 current bank %%: %s\n", varPtr( 45 ) );
STUFF;
sprintf( s, "               current income %%: %s\n", varPtr( 46 ) );
STUFF;
sprintf( s, "               current growth %%: %s\n", varPtr( 47 ) );
STUFF;

sprintf( s, "          total of current assets: %s\n", varPtr( 20 ) );
STUFF;
sprintf( s, "                        a/l ratio: %s\n", varPtr( 21 ) );
STUFF;

sprintf( s, "                      rec liquid $: %s\n", varPtr( 28 ) );
STUFF;
sprintf( s, "                        rec IMRA $: %s\n", varPtr( 29 ) );
STUFF;
sprintf( s, " rec $ for planned purch/emergencies: %s\n", varPtr( 62 ) );
STUFF;

sprintf( s, "                        rec bank $: %s\n", varPtr( 22 ) );
STUFF;
sprintf( s, "                      rec income $: %s\n", varPtr( 23 ) );
STUFF;
sprintf( s, "                      rec growth $: %s\n", varPtr( 24 ) );
STUFF;

sprintf( s, "         total rec growth+income $: %s\n", varPtr( 69 ) );
STUFF;

sprintf( s, "                        rec bank %%: %s\n", varPtr( 25 ) );
STUFF;
```

BEST AVAILABLE COPY

```
sprintf( s, "                   rec income %%: %s\n", varPtr( 26 ) );
STUFF;
sprintf( s, "                   rec growth %%: %s\n", varPtr( 27 ) );
STUFF;

sprintf( s, "                   take home pay: %s\n", varPtr( 34 ) );
STUFF;

sprintf( s, "        calculated investable assets: %s\n", varPtr( 41 ) );
STUFF;

sprintf( s, "              home purchase earmark: %s\n", varPtr( 64 ) );
STUFF;
sprintf( s, "                   tuition earmark: %s\n", varPtr( 65 ) );
STUFF;
sprintf( s, "                     total earmark: %s\n", varPtr( 67 ) );
STUFF;


sprintf( s, "              checking plus limit: %s\n", varPtr( 116 ) );
STUFF;
sprintf( s, "               ready credit limit: %s\n", varPtr( 117 ) );
STUFF;

#ifdef FOO
/* need to handle stock and bond detail recommendations here */
n= 1;
while( 0 <= (i= GetStockIndex( n++ )) )
        {
        s[0]= '\0';
        SPrintSpecBond( i, s );
        STUFF;
        }

n= 1;
while( 0 <= (i= GetBondIndex( n++ )) )
        {
        s[0]= '\0';
        SPrintSpecBond( i, s );
        STUFF;
        }

#endif

sprintf( s, "******************** end of session ****************************\
STUFF;

FSClose( fRefNum );
flushvol( NULL, vRefNum );
}
```

BEST AVAILABLE CO

BEST AVAILABLE COPY

```
/*
 * Historical Performance bar chart functions (specific to Advisory Terminal)
 */

#include    "standard.h"
#include    "glue.h"
#define     APP_ADTERM
#include    "varFns.h"
#include    "tglMain.h"
#include    "libLibrary.h"
#include    "tchTouch.h"
#include    "barChart.h"
#include    "fileAccess.h"


#define D( s ) /* */


/***********************************************************************
***

DrawRange()

***********************************************************************
***/

void  barDrawRange( xBase, yBase, pixScale, barWidth, hiValue, midValue, loValue )
      Int32T xBase;
      Int32T yBase;
      Int32T pixScale;
      Int32T barWidth;
      Real80T hiValue;
      Real80T midValue;
      Real80T loValue;
{
      Int32T hiPixel, loPixel, midPixel;
      Rect r;
      RGBColor   barColor;
      Int32T ticWidth;
      char s[100];
      Int32T offset;

      ticWidth= barWidth + barWidth + 5;

      hiPixel= (hiValue * pixScale) / 10;
      loPixel= (loValue * pixScale) / 10;
      midPixel= (midValue * pixScale ) / 10;

      TGL_SETRECT( &r, xBase - barWidth, yBase - hiPixel, xBase + barWidth, yBase - loPi

      TGL_SETRGB( barColor, 0, 13107, 65535 );
      RGBBackColor( &barColor );

      EraseRect( &r );          /* draw bar */

      RGBForeColor( &tglRgbBlack );
      RGBBackColor( &tglRgbWhite );

      /* draw tic marks */

      TextFont( 3 );
      TextSize( 10 );
      TextFace( normal );

      MoveTo( xBase - barWidth, yBase - hiPixel );
      Line( ticWidth, 0 );
      offset= MIN( hiPixel - midPixel, 6 );
```

```
        offset -= 6;
        Move( 5, offset );
        sprintf( s, "%2.1Lf", hiValue );
        drawstring( s );

        MoveTo( xBase - barWidth, yBase - midPixel );
        Line( ticWidth, 0 );
        Move( 5, 4 );
        sprintf( s, "%2.1Lf", midValue );
        drawstring( s );

        MoveTo( xBase - barWidth, yBase - loPixel );
        Line( ticWidth, 0 );
        offset= MAX( 14 - (midPixel - loPixel), 8 );
        Move( 5, offset );
        sprintf( s, "%2.1Lf", loValue );
        drawstring( s );

}


void    barDrawRange2( xBase, yBase, pixScale, barWidth, hiValue, midValue, loValue )
        Int32T xBase;
        Int32T yBase;
        Int32T pixScale;
        Int32T barWidth;
        Real80T hiValue;
        Real80T midValue;
        Real80T loValue;
{
        Int32T hiPixel, loPixel, midPixel;
        Rect r;
        RGBColor    barColor;
        Int32T ticWidth;
        char s[100];
        Int32T offset;

        ticWidth= barWidth + barWidth + 5;

        hiPixel= (hiValue * pixScale) / 10;
        loPixel= (loValue * pixScale) / 10;
        midPixel= (midValue * pixScale ) / 10;

        TGL_SETRECT( &r, xBase - barWidth, yBase - hiPixel, xBase + barWidth, yBase - loP

        TGL_SETRGB( barColor, 0, 13107, 65535 );
        RGBBackColor( &barColor );

        EraseRect( &r );            /* draw bar */

        RGBForeColor( &tglRgbBlack );
        RGBBackColor( &tglRgbWhite );

        /* draw tic marks */

        TextFont( 3 );
        TextSize( 10 );
        TextFace( normal );

        MoveTo( xBase - barWidth , yBase - hiPixel );
        Line( ticWidth, 0 );
        offset= MIN( hiPixel - midPixel, 6 );
        offset -= 6;
        Move( 5, offset );
        sprintf( s, "%2.1Lf", hiValue );
        drawstring( s );

        MoveTo( xBase - barWidth, yBase - midPixel );
```

BEST AVAILABLE COPY

```
        Line( ticWidth, 0 );
        Move( 5, 4 );
        sprintf( s, "%2.1Lf", midValue );
        drawstring( s );

        MoveTo( xBase - barWidth, yBase - loPixel );
        Line( ticWidth, 0 );
        offset= MAX( 14 - (midPixel - loPixel), 8 );
        Move( 5, offset );
        sprintf( s, "%2.1Lf", loValue );
        drawstring( s );

}
```

BEST AVAILABLE COPY

```
/*********************************************************************
***

LoadData()

**********************************************************************
***/

#define iBANK     0
#define iINCOME   1
#define iGROWTH        2

#define      iHIGH            0
#define      iLOW             1
#define iMID             2

Real80T      dataTable[ 3 ] [ 3 ];

Int32T       barLoadData( period )
       Int32T period;
{
       FILE   *dataFile;
       Int16T        rc;
       char   s[100], fileName[100], temp[255];


       sprintf( fileName, "HP.%ld.year", period );

       dataFile= fopen( filePrependDir( temp, FILE_DATA_DIR, fileName ), "r" );

       if( dataFile == NULL )
              {
              return( -1 );
              }

       fgets( s, sizeof( s ), dataFile );          /* throw away first line */


       rc= fscanf( dataFile, " \"%*[^\"]\" %nf %nf %nf \n",
              &(dataTable[ iBANK ][ iHIGH ]),
              &(dataTable[ iBANK ][ iLOW ]),
              &(dataTable[ iBANK ][ iMID ])
              );

       rc= fscanf( dataFile, " \"%*[^\"]\"  %nf %nf %nf \n",
              &(dataTable[ iINCOME ][ iHIGH ]),
              &(dataTable[ iINCOME ][ iLOW ]),
              &(dataTable[ iINCOME ][ iMID ])
              );

       rc= fscanf( dataFile, " \"%*[^\"]\"  %nf %nf %nf \n",
              &(dataTable[ iGROWTH ][ iHIGH ]),
```

```
        &(dataTable[ IGROWTH ][ iLOW ]),
        &(dataTable[ IGROWTH ][ iMID ])
        );
```

BEST AVAILABLE COPY

```
    fclose( dataFile );
    return( 0 );

}

/*************************************************************************
***

DoHPGraph()

**************************************************************************
***/
Int32T       barDoHPGraph()
{
    Real80T hiSynth, loSynth, midSynth;
    Int32T years, percentBank, percentIncome, percentGrowth;
    Int32T       rc;

    /* get period (years), and BIG percentages from shared variables */

    years= varVal( vHistPerfPeriod );
    percentBank= varVal( vABankPercent );
    percentIncome= varVal( vAIncomePercent );
    percentGrowth= varVal( vAGrowthPercent );

    #ifdef USE_LOCAL_DATA
    years= 1;
    percentBank= 30;
    percentIncome= 40;
    percentGrowth= 30;
    #endif

    /* build data table for given period (in years) */

    rc= barLoadData( years );
    if( rc )
     {
     return( rc );
     }

    /* calculate statistics for synthetic portfolio */
    hiSynth= percentBank * dataTable[ iBANK ] [ iHIGH ] +
                percentIncome * dataTable[ iINCOME ] [ iHIGH ] +
                percentGrowth * dataTable[ iGROWTH ] [ iHIGH ];

    hiSynth= hiSynth / 100;

    midSynth= percentBank * dataTable[ iBANK ] [ iMID ] +
                percentIncome * dataTable[ iINCOME ] [ iMID ] +
                percentGrowth * dataTable[ iGROWTH ] [ iMID ];

    midSynth= midSynth / 100;

    loSynth= percentBank * dataTable[ iBANK ] [ iLOW ] +
                percentIncome * dataTable[ iINCOME ] [ iLOW ] +
                percentGrowth * dataTable[ iGROWTH ] [ iLOW ];

    loSynth= loSynth / 100;


    /* given vertical pixel range, horizontal baseline, and places for vertical graphs, c
```

```
        barDrawRange( 190, 214, 35, 15, dataTable[ iBANK] [ iHIGH ],   dataTable[ iBANK
iBANK] [ iLOW ] );

        barDrawRange( 270, 214, 35, 15, dataTable[ iINCOME] [ iHIGH ], dataTable[ iINCC
iINCOME] [ iLOW ] );

        barDrawRange( 350, 214, 35, 15, dataTable[ iGROWTH] [ iHIGH ], dataTable[ iGR(
dataTable[ iGROWTH] [ iLOW ] );

        barDrawRange( 470, 214, 35, 15, hiSynth, midSynth, loSynth );

        return( 0 );
}

/*************************************************************************
***

DoHPGraph()

*************************************************************************
***/

Int32T        barDoHPCmpGraph()
{
        Real80T hiSynth, loSynth, midSynth;
        Real80T hiRec, loRec, midRec;
        Int32T years, actPercentBank, actPercentIncome, actPercentGrowth;
        Int32T recPercentBank, recPercentIncome, recPercentGrowth;
        Int32T        rc;


        years= varVal( vHistPerfPeriod );

        /* build data table for given period (in years) */

        rc= barLoadData( years );
        if( rc )
         {
         return( rc );
         }

        /* get  BIG percentages from shared variables */

        actPercentBank= varVal( vABankPercent );
        actPercentIncome= varVal( vAIncomePercent );
        actPercentGrowth= varVal( vAGrowthPercent );

        /* calculate statistics for synthetic portfolio */
        hiSynth= actPercentBank * dataTable[ iBANK ] [ iHIGH ] +
                actPercentIncome * dataTable[ iINCOME ] [ iHIGH ] +
                actPercentGrowth * dataTable[ iGROWTH ] [ iHIGH ];

        hiSynth= hiSynth / 100;

        midSynth= actPercentBank * dataTable[ iBANK ] [ iMID ] +
                actPercentIncome * dataTable[ iINCOME ] [ iMID ] +
                actPercentGrowth * dataTable[ iGROWTH ] [ iMID ];

        midSynth= midSynth / 100;

        loSynth= actPercentBank * dataTable[ iBANK ] [ iLOW ] +
                actPercentIncome * dataTable[ iINCOME ] [ iLOW ] +
                actPercentGrowth * dataTable[ iGROWTH ] [ iLOW ];

        loSynth= loSynth / 100;

        /* NOW DO RECOMMENDED */
```

BEST AVAILABLE COPY

```
recPercentBank= varVal( vRBankPercent );
recPercentIncome= varVal( vRIncomePercent );
recPercentGrowth= varVal( vRGrowthPercent );

/* calculate statistics for synthetic portfolio */
hiRec= recPercentBank * dataTable[ iBANK ] [ iHIGH ] +
            recPercentIncome * dataTable[ iINCOME ] [ iHIGH ] +
            recPercentGrowth * dataTable[ iGROWTH ] [ iHIGH ];

hiRec= hiRec / 100;

midRec= recPercentBank * dataTable[ iBANK ] [ iMID ] +
            recPercentIncome * dataTable[ iINCOME ] [ iMID ] +
            recPercentGrowth * dataTable[ iGROWTH ] [ iMID ];

midRec= midRec / 100;

loRec= recPercentBank * dataTable[ iBANK ] [ iLOW ] +
            recPercentIncome * dataTable[ iINCOME ] [ iLOW ] +
            recPercentGrowth * dataTable[ iGROWTH ] [ iLOW ];

loRec= loRec / 100;


/* given vertical pixel range, horizontal baseline, and places for vertical graphs, d

barDrawRange2( 250, 214, 35, 50, hiSynth, midSynth, loSynth );

barDrawRange2( 450, 214, 35, 50, hiRec, midRec, loRec);

return( 0 );
}
```

BEST AVAILABLE COP

```
/*
 * bigPlot.c produce charts for Bank Income Growth charts
 *
 *
 *
 *
 */


#define     APP_ADTERM 1                                         BEST AVAILABLE COPY
#include    "standard.h"
#include    "varfns.h"
#include    "tglMain.h"
#include    "excExcelRead.h"
#include    "bigplot.h"
#include    "scrScreen.h"
#include    "glue.h"

/* this was where Citibank's fee was kept, now it's kept in 'vCitibankFee' */
#define                     PRINCIPAL_AFTER_FEE_REMOVED     0.99

/* Former graphics-defining user inputs, now hard-wired into the code */
#define                     DATA_WHITESPACE_RATIO     3.8
#define                     EXCEL_FILE_NAME                    "High.Low.Index.Text"
                                                  /* top, left, bottom, right */
static Rect        BoundsRect                     = {128, 106, 303, 541};
static Int32T      Hues[]                         = {80, 81};
static Int32T      AverageHues[]                  = {81, 80};
static Point S     hadowOffset                    = {5, 5};

/* useful pseudo function */
#define SIGN(a) ((a) >= 0 ? 1 : -1)

/*********************************************************
 * Data points for a single measure in a chart.
 *
 * For simplicity, we assume that there is a fixed maximum
 * number of data points
 *
 *********************************************************/
#define MAX_BIG_DATA_POINTS           17
#define MAX_BIG_NUM_MEASURES  3
typedef Real80T                bigDataPointsT[MAX_BIG_DATA_POINTS];
typedef bigDataPointsT  *      bigDataPointsPT;
typedef bigDataPointsPT        *bigDataPointsHT;


/*********************************************************
 * Data points for all measures in a chart.
 *
 * Since this information is dynamically allocated, it
 * is safe to give it size 1. The real data will possible
 * be bigger than one, but the typedef still holds.
 *********************************************************/
typedef bigDataPointsT         bigChartDataT[1];
typedef bigChartDataT          *bigChartDataPT;
typedef bigChartDataPT         *bigChartDataHT;


*********************************************************
 * Constants for finding things in the Excel data file for
 * the Bank, Income, Growth charts
 *********************************************************/
#define NUM_TIME_POINTS                    16L

#define FIRST_AVERAGE_ROW                  5
#define LAST_AVERAGE_ROW                   20
#define FIRST_HIGH_ROW                     22
```

```
#define LAST_HIGH_ROW                    37
#define FIRST_LOW_ROW                    39
#define LAST_LOW_ROW                     54

#define     BANK_COL                     1
#define INCOME_COL                       2
#define GROWTH_COL                       3
```

BEST AVAILABLE COPY

```
/******************************/
/* local function prototypes */
/******************************/
void bigDrawstringCenteredWithLimit( char *string,
                                            Int32T h,
                                            Int32T v,
                                            Int32T hLimit );

void bigGetBar ( Rect *r,
                   Int32T timeNumber, Int32T numDataPoints,
                   Int32T measureNumber, Int32T numMeasures,
                   Real80T normalizedDataHeight,
                   Rect boundsRect, Real80T dataWhitespaceRatio );

void bigPlotBar( Rect      r,
                   Int32T      hue,
                   Point       offset);

void bigBarChart( Int32T                       numMeasures,
                   Int32T                      numDataPoints,
                   Int32T                      numDataPointsToPlot,
                   bigChartDataHT              chartData,
                   Real80T                     maxDataPoint,
                   Rect                            boundsRect,
                   Real80T                     dataWhitespaceRatio,
                   Int32T                      hues[],
                   Point                           offset,
                   BooleanT                    piledUp,
                   BooleanT                    firstBarOnly );

Real80T bigLookup ( excFileIdT        fileId,
                     Int32T            row,
                     Int32T            col );

void bigHiLoTransform( excFileIdT           fileId,
                         bigChartDataHT         chartDataH,
                         Real80PT               maxDataPointP,
                         Int32T                 basis,
                         BooleanT               *firstBarOnly );

void bigAvgTransform( excFileIdT            fileId,
                        bigChartDataHT  chartDataH,
                        Real80PT                maxDataPointP,
                        Int32T                  basis,
                        BooleanT                includeNetValues,
                        BooleanT                *firstBarOnly );

void bigLabel ( char *line1, Int32T hue1,
                  char *line2, Int32T hue2,
                  char *line3, Int32T hue3,
                  Int32T attachX, Int32T attachY, Int32T offsetX );

void bigStartLabel( bigChartDataHT chartDataH,
                      Real80T maxDataPoint,
                      Rect boundsRect );

void bigAbbreviateNumber( char *string, Real80T number, BooleanT forceMM );

void bigFeeNumber( char *string, Real80T number );
```

```
void bigHiLoComparisonBar( bigChartDataHT hChartData,
                           Int32T timeNumber,
                           Real80T maxDataPoint,
                           Rect boundsRect );

void bigHiLoComparison( excFileIdT fileId,
                        Int32T numRowsInBigData,
                        Int32T timeNumber );

void bigAvgComparisonBar( bigChartDataHT hChartData,
                          Int32T timeNumber,
                          Real80T maxDataPoint,
                          Rect boundsRect );

void bigAvgComparisonBarNet( bigChartDataHT hChartData,
                             Int32T timeNumber,
                             Real80T maxDataPoint,
                             Rect boundsRect );

void bigAvgComparison( excFileIdT fileId,
                       Int32T numRowsInBigData,
                       Int32T timeNumber,
                       BooleanT showGross );

void bigHiLoLabel( Int32T timeNumber,
                   bigChartDataHT chartDataH,
                   Real80T maxDataPoint,
                   Rect boundsRect );

void bigAvgLabel( Int32T timeNumber,
                  bigChartDataHT chartDataH,
                  Real80T maxDataPoint,
                  Rect boundsRect );

void bigHiLoChart ( BooleanT showChart );

void bigAvgChart ( BooleanT showChart );


/* ----------------------------------------
 *
 *                   Bar Chart Routines
 *
 * ----------------------------------------*/


/*********************************************************************
 * bigDrawstringCenteredWithLimit
 *********************************************************************
 * does a drawstring horizontally centered on the given coordinates
 * but without passing the given limit
 *********************************************************************/
void bigDrawstringCenteredWithLimit( char *string,
                                     Int32T h,
                                     Int32T v,
                                     Int32T hLimit )
    {
    Int32T width;
    BooleanT leftLimit;

    leftLimit = ( BooleanT ) ( hLimit < h );
    width = stringwidth( string );

    if ( leftLimit ) MoveTo( MAX( hLimit + 1, h - width / 2 ), v );
    else MoveTo( MIN( hLimit - 1 - width, h - width / 2 ), v );
```

BEST AVAILABLE COPY

```
        drawstring( string );
        }

/*****************************************************************
 * bigGetBar
 * ****************************************************************
 * R is returned as the rectangle of the bar and dropshadow
 * of the specified position and height
 *****************************************************************/
void bigGetBar ( Rect *r,
                        Int32T timeNumber, Int32T numDataPoints,
                        Int32T measureNumber, Int32T numMeasures,
                        Real80T normalizedDataHeight,
                        Rect boundsRect, Real80T dataWhitespaceRatio )
        {
        Real80T         timeUnitWidth;
        Real80T         maxHeight;
        Real80T         whitespaceWidth;
        Real80T         barWidth;

        /*****************************************************************
         * width for 1 time unit is the overall width divided by the number of
         * time units
         *****************************************************************
        timeUnitWidth = ((Real80T) (boundsRect.right - boundsRect.left)) /
                numDataPoints;

        /*****************************************************************
         * height for 1 data point is the overall height divided by the value
         * of this data normalized point (which is in the range 0 - 1)
         *****************************************************************
        maxHeight = ((Real80T) (boundsRect.bottom - boundsRect.top));

        /*****************************************************************
         * the width of the white space between bars is based on the whitespace
         * ratio and the number of bars per time unit.
         *****************************************************************
        whitespaceWidth =  timeUnitWidth / (dataWhitespaceRatio + 1);

        /*****************************************************************
         * the width of the bars is a fraction of whatever is left over
         * after the whitespace width is removed from the width for the year.
         * The number of bars is 1 in this context, since all of the bars
         * are piled on top of each other.
         * (cast it as an int so fractions don't add up to introduce unexpected
         * pixel jumps between bars)
         *****************************************************************
        barWidth = (Int32T) ( ( timeUnitWidth - whitespaceWidth ) / numMeasures );

        /*****************************************************************
         * bottom is always the same (at the bottom of the graph)
         * left starts half the width of a whitespace from the left
         * right is 1 bar width to the right of left
         * top depends on the value of the data
         *****************************************************************
        r->bottom = boundsRect.bottom;
        r->left   = boundsRect.left +
                        ( timeUnitWidth * timeNumber ) +
                        ( barWidth * measureNumber ) +
                        whitespaceWidth / 2;
        r->right  = r->left + barWidth;
        r->top    = r->bottom - maxHeight * normalizedDataHeight;
        }


/*****************************************************************
 * bigPlotBar
 * ****************************************************************
```

BEST AVAILABLE COPY

```
* Draws a single vertical bar with a drop shadow
*
* R is the rectangle of the bar and its drop shadow.  Hue is the
* color of the bar and corresponds to the hues used in a scan file.
* Offset is the offset of the drop shadow from the bar.
*
*******************************************************************/
void bigPlotBar( Rect      r,
                 Int32T    hue,
                 Point     offset)
{

        /***********************************************************
         * set the drop shadow color
         ***********************************************************/
        scrSetHueNow( 2 );

        /***********************************************************
         * move the topleft down and to the right for the drop shadow
         ***********************************************************/
        r.top += offset.v;
        r.left += offset.h;

        /***********************************************************
         * draw the shadow
         ***********************************************************/
        PaintRect( &r );

        /***********************************************************
         * set the hue
         ***********************************************************/
        scrSetHueNow( hue );

        /***********************************************************
         * move the rectangle up and left before drawing in the
         * foreground color
         ***********************************************************/
        OffsetRect( &r, -offset.h, -offset.v );

        /***********************************************************
         * draw the rectangle
         ***********************************************************/
        PaintRect( &r );

        /***********************************************************
         * reset bottom and right to full rectangle position
         ***********************************************************/
        r.bottom += offset.v;
        r.right += offset.h;

} /* bigPlotBar */


/*******************************************************************
 * bigBarChart
 *******************************************************************
 * Plots the data in the chartData table into a bar graph.  Information
 * for a particular time unit is grouped together, separated by whitespace.
 * Bars for a given time unit appear next to each other.
 *
 * numMeasures is the number of separate series which need to be plotted
 * numDataPoints is the number of values for each measure.  ChartData
 * is the data to be plotted, with data in 1 row for each measure.
 * BoundsRect is the rectangle into which the entire chart is supposed
 * to fit.  DataToWhitespaceRatio is the ratio of the width of one
 * bar of data to the width of the bar of whitespace separating
 * different time points.  Hues is a table of colors, one per meausure.
 * ShadowOffset is the amount the drop shadows are offset from the
```

BEST AVAILABLE COPY

```
 * bars.
 * piledUp is set to true if the measures should be plotted on top of one another,
 * FALSE if they are to be plotted next to one another.
 *********************************************************************/
void bigBarChart( Int32T            numMeasures,
                  Int32T            numDataPoints,
                  Int32T            numDataPointsToPlot,
                  bigChartDataHT    chartData,
                  Real80T           maxDataPoint,
                  Rect              boundsRect,
                  Real80T           dataWhitespaceRatio,
                  Int32T            hues[],
                  Point             offset,
                  BooleanT          piledUp,
                  BooleanT          firstBarOnly)
{
    Rect        r;      /* the rectangle for a single bar, including shadow */
    Int32T      i;
    Int32T      j;

    /*****************************************************************
     * march from left to right on graph
     *****************************************************************/
    for (i = 0; i < numDataPointsToPlot; i++) {
        for (j = 0; j < numMeasures; j++) {

            /*****************************************************
             * get the bar for this time period and data point height
             *****************************************************/
            bigGetBar( &r, i, numDataPoints,
                       piledUp ? 0 : j, piledUp ? 1 : numMeasures,
                       (**chartData)[j][i] / maxDataPoint,
                       boundsRect, dataWhitespaceRatio );

            /*****************************************************
             * plot a single bar with a drop shadow
             *****************************************************/
            bigPlotBar( r, hues[j], offset );
        }

        if ( firstBarOnly ) break;
    }

    RGBForeColor( &tglRgbBlack );
    RGBBackColor( &tglRgbWhite );

} /* bigBarChart */


/* ------------------------------------------
 *
 *                  Data Gathering Routines
 *
 * ------------------------------------------*/


/*********************************************************************
 * bigLookup
 *********************************************************************
 * Utility function to look up a cell in an excel spreadsheet and
 * return its value as a Real80T. As a side effect, it updates
 * maxDataPointP if the looked-up value is greater than the last
 * value of maxDataPointP.
 *
 * fileId is the id of the spreadsheet. Row and col specify where
```

BEST AVAILABLE COPY

```
 * to look in the spreadsheet.  MaxDataPointP is the maximum data
 * point found in the spreadsheet so far.
 ********************************************************************/
Real80T bigLookup ( excFileIdT       fileId,
                    Int32T           row,
                    Int32T           col )
{
     Real80T          x;
     char        cellValue[255];

     excLookupCell( fileId, row, col, cellValue );
     x = varAtof( cellValue );
     return (x);
}

/********************************************************************
 * bigHiLoTransform
 ********************************************************************
 * Translates input spreadsheet into output data and fills in part of
 * infoP.  This for weighted transformation of BANK, INCOME, GROWTH data
 ********************************************************************/
void bigHiLoTransform( excFileIdT          fileId,
                       bigChartDataHT       chartDataH,
                       Real80PT             maxDataPointP,
                       Int32T               basis,
                       BooleanT             *firstBarOnly)
{
     Int32T      line;
     Int32T      count;
     Real80T     percentB, percentI, percentG, percentMM;
     Real80T     x;

     *firstBarOnly = FALSE;

     switch ( basis )
          {
          case 3 :  /*  alternate allocation  */
               percentB = varValF( vAltBankDollars ) * 100 / varValF( vTotalAssets ;
               percentI = varValF( vAltIncomeDollars ) * 100 / varValF( vTotalAssets
               percentG = varValF( vAltGrowthDollars ) * 100 / varValF( vTotalAsse
               percentMM = 0;
               if ( percentB + percentI + percentG  == 0 )
                    {
                    *firstBarOnly = TRUE;
                    percentB = 100;
                    }
               break;
          case 1 :  /*  current allocation  */
               percentB = varValF( vABankDollars ) * 100 / varValF( vTotalAssets );
               percentI = varValF( vAIncomeDollars ) * 100 / varValF( vTotalAssets )
               percentG = varValF( vAGrowthDollars ) * 100 / varValF( vTotalAssets
               percentMM = 0;
               break;
          default:  /*  recommended allocation  */
               percentB = varValF( vRBankDollars ) * 100 / varValF( vTotalAssets );
               percentI = varValF( vRIncomeDollars ) * 100 / varValF( vTotalAssets ).
               percentG = varValF( vRGrowthDollars ) * 100 / varValF( vTotalAssets
               percentMM = ( varValF( vRMMFDollars ) + varValF( vIncomeSlush ) *
vTotalAssets );
               break;
          }

     *maxDataPointP = -1;

     count = 0;
     for (line = FIRST_HIGH_ROW; line <= LAST_HIGH_ROW; line++) {

          /* add up the three values, bank, income, growth */
```

BEST AVAILABLE COPY

```
        x = bigLookup( fileld, line, BANK_COL );
        *maxDataPointP = MAX( *maxDataPointP, x );
        (**chartDataH)[0][count] = ((Real80T) percentB + percentMM ) / 100.0 * x;

        x = bigLookup( fileld, line, INCOME_COL );
        *maxDataPointP = MAX( *maxDataPointP, x );
        (**chartDataH)[0][count] += ((Real80T) percentI - percentMM ) / 100.0 * x;

        x = bigLookup( fileld, line, GROWTH_COL );
        *maxDataPointP = MAX( *maxDataPointP, x );
        (**chartDataH)[0][count] += ((Real80T) percentG ) / 100.0 * x;

        /* bump the count of values */
        count++;
    }

    count = 0;
    for (line = FIRST_LOW_ROW; line <= LAST_LOW_ROW; line++) {

        /* add up the three values, bank, income, growth */
        x = bigLookup( fileld, line, BANK_COL );
        *maxDataPointP = MAX( *maxDataPointP, x );
        (**chartDataH)[1][count] = ((Real80T) percentB + percentMM ) / 100.0 * x;

        x = bigLookup( fileld, line, INCOME_COL );
        *maxDataPointP = MAX( *maxDataPointP, x );
        (**chartDataH)[1][count] += ((Real80T) percentI - percentMM ) / 100.0 * x;

        x = bigLookup( fileld, line, GROWTH_COL );
        *maxDataPointP = MAX( *maxDataPointP, x );
        (**chartDataH)[1][count] += ((Real80T) percentG ) / 100.0 * x;

        /* bump the count of values */
        count++;
    }
} /* bigHiLoTransform */


/**********************************************************************
 * bigAvgTransform
 **********************************************************************
 * Translates input spreadsheet into output data and fills in part of
 * infoP.  This for weighted transformation of BANK, INCOME, GROWTH data
 **********************************************************************/
void bigAvgTransform( excFileldT         fileld,
                      bigChartDataHT  chartDataH,
                      Real80PT            maxDataPointP,
                      Int32T              basis,
                      BooleanT            includeNetValues,
                      BooleanT            *firstBarOnly )
{
    Int32T      line;
    Int32T      count;
    Real80T     x;
    Real80T     percentB, percentI, percentG, percentMM;
    Real80T     principleAfterFee;

    *firstBarOnly = FALSE;

    switch ( basis )
        {
        case 3 :  /*  alternate allocation  */
            percentB = varValF( vAltBankDollars ) * 100 / varValF( vTotalAssets );
            percentI = varValF( vAltIncomeDollars ) * 100 / varValF( vTotalAssets
            percentG = varValF( vAltGrowthDollars ) * 100 / varValF( vTotalAsset
            if ( percentB + percentI + percentG  == 0 )
                {
                *firstBarOnly = TRUE;
```

BEST AVAILABLE COPY

BEST AVAILABLE COPY

```
                        percentB = 100;
                        }
                percentMM = 0;
                break;
        case 1 :  /*  current allocation  */
                percentB = varValF( vABankDollars ) * 100 / varValF( vTotalAssets );
                percentI = varValF( vAIncomeDollars ) * 100 / varValF( vTotalAssets )
                percentG = varValF( vAGrowthDollars ) * 100 / varValF( vTotalAssets
                percentMM = 0;
                break;
        default:  /*  recommended allocation  */
                percentB = varValF( vRBankDollars ) * 100 / varValF( vTotalAssets );
                percentI = varValF( vRIncomeDollars ) * 100 / varValF( vTotalAssets )
                percentG = varValF( vRGrowthDollars ) * 100 / varValF( vTotalAssets
                percentMM = ( varValF( vRMMFDollars ) + varValF( vIncomeSlush ) )
vTotalAssets );
                break;
        }

    count = 0;
    for (line = FIRST_AVERAGE_ROW; line <= LAST_AVERAGE_ROW; line++) {

        /* add up the three values, bank, income, growth */
        x = bigLookup( fileId, line, BANK_COL );
        *maxDataPointP = MAX( *maxDataPointP, x );
        (**chartDataH)[0][count] = ( percentB + percentMM ) / 100.0 * x;

        x = bigLookup( fileId, line, INCOME_COL );
        *maxDataPointP = MAX( *maxDataPointP, x );
        (**chartDataH)[0][count] += ( percentI - percentMM ) / 100.0 * x;

        x = bigLookup( fileId, line, GROWTH_COL );
        *maxDataPointP = MAX( *maxDataPointP, x );
        (**chartDataH)[0][count] += percentG / 100.0 * x;

        /* bump the count of values */
        count++;
    }

    if ( includeNetValues )
        {
        principleAfterFee = 1.0 - ( varValF( vCitibankFee ) / 100.0 );

        /*  put the average amounts with the fee removed into the second part of
        count = 0;
        for (line = FIRST_AVERAGE_ROW; line <= LAST_AVERAGE_ROW; line++) {

            /* add up the three values, bank, income, growth */
            /*  (calculate the growth of the money market portion using the ban

            x = bigLookup( fileId, line, BANK_COL );
            *maxDataPointP = MAX( *maxDataPointP, x );
            (**chartDataH)[1][count] = ( percentB + percentMM ) / 100.0 * x;

            x = bigLookup( fileId, line, INCOME_COL ) * pow( principleAfterFee,
            *maxDataPointP = MAX( *maxDataPointP, x );
            (**chartDataH)[1][count] += ( percentI - percentMM ) / 100.0 * x;

            x = bigLookup( fileId, line, GROWTH_COL ) * pow( principleAfterFee
            *maxDataPointP = MAX( *maxDataPointP, x );
            (**chartDataH)[1][count] += percentG / 100.0 * x;

            /* bump the count of values */
            count++;
        }
    }

    /*
```

```
find the highest data point in this family of bar graphs, for scaling purposes only
*/
for (line = FIRST_HIGH_ROW; line <= LAST_HIGH_ROW; line++) {

        x = bigLookup( fileId, line, BANK_COL );
        *maxDataPointP = MAX( *maxDataPointP, x );
        x = bigLookup( fileId, line, INCOME_COL );
        *maxDataPointP = MAX( *maxDataPointP, x );
        x = bigLookup( fileId, line, GROWTH_COL );
        *maxDataPointP = MAX( *maxDataPointP, x );
}
for (line = FIRST_LOW_ROW; line <= LAST_LOW_ROW; line++) {

        x = bigLookup( fileId, line, BANK_COL );
        *maxDataPointP = MAX( *maxDataPointP, x );
        x = bigLookup( fileId, line, INCOME_COL );
        *maxDataPointP = MAX( *maxDataPointP, x );
        x = bigLookup( fileId, line, GROWTH_COL );
        *maxDataPointP = MAX( *maxDataPointP, x );
}

} /* bigAvgTransform */


/* ------------------------------------------------
 *
 *
 *                              Labelling Tools
 * ------------------------------------------------*/


/*********************************************************************
 * bigLabel
 *********************************************************************
 * draws a supplied label above a given attachment point (with a given X offset),
 * and a line from that label to the attachment point
 *********************************************************************/
void bigLabel ( char *line1, Int32T hue1,
                        char *line2, Int32T hue2,
                        char *line3, Int32T hue3,
                        Int32T attachX, Int32T attachY, Int32T offsetX )
    {
    FontInfo    thisFont;
    Int32T              centerY, centerX, lineHeight, textBottom;

    /*  find out about the font that we are using  */
    scrSetHueNow( hue1 );
    GetFontInfo( &thisFont );
    lineHeight = thisFont.ascent + thisFont.descent - 2;

    /*  find the center of the second line in the label  */
    centerX = attachX + offsetX;
    centerY = attachY - abs( offsetX ) * 2;

    /*  put up the label  */
    MoveTo( centerX - stringwidth( line1 ) / 2, centerY - lineHeight - 3 );
    drawstring( line1 );
    scrSetHueNow( hue2 );
    MoveTo( centerX - stringwidth( line2 ) / 2, centerY );
    drawstring( line2 );
    scrSetHueNow( hue3 );
    MoveTo( centerX - stringwidth( line3 ) / 2, centerY + lineHeight );
    drawstring( line3 );

    /*  draw the attaching line  */
    textBottom = centerY + lineHeight + thisFont.descent + thisFont.leading - 1;
```

BEST AVAILABLE COPY

```
        MoveTo( attachX, attachY );
        LineTo( attachX + SIGN( offsetX ) * ( attachY - textBottom ) / 2,
             attachY - ( attachY - textBottom ) );
        }
```

BEST AVAILABLE COPY

```
/*****************************************************************
 * bigStartLabel
 *****************************************************************
 * draws  label for the first time period
 *****************************************************************/
void bigStartLabel( bigChartDataHT chartDataH,
                        Real80T maxDataPoint,
                        Rect boundsRect )
        {
        char s[MAX_FILE_NAME_LENGTH], szTemp[MAX_FILE_NAME_LENGTH];
        Int32T centerY, centerX, attachY, attachX, lineHeight, textBottom;
        FontInfo     thisFont;
        Rect barRect;

        /*  get start value, format and remove the fractional dollars  */
        bigAbbreviateNumber( s, varValF( vTotalAssets ), FALSE );

        /*  get the extent of the bar that we plotted  */
        bigGetBar ( &barRect,
                        0, NUM_TIME_POINTS,
                        0, 1,
                        (**chartDataH)[0][0] / maxDataPoint,
                        boundsRect, DATA_WHITESPACE_RATIO );

        /*  label  */
        attachX = (barRect.right + barRect.left - ShadowOffset.h ) / 2;
        attachY = barRect.top + 3;

        /*  find out about the font that we are using  */
        scrSetHueNow( 35 );
        GetFontInfo( &thisFont );
        lineHeight = thisFont.ascent + thisFont.descent - 2;

        /*  find the center of the second line in the label  */
        centerX = attachX + -7;
        centerY = attachY - abs( -7 ) * 4;

        /*  put up the label  */
        scrSetHueNow( 35 );
        MoveTo( centerX - stringwidth( "value today" ) / 2, centerY );
        drawstring( "value today" );
        scrSetHueNow( 36 );
        MoveTo( centerX - stringwidth( s ) / 2, centerY + lineHeight );
        drawstring( s );

        /*  draw the attaching line  */
        textBottom = centerY + lineHeight + thisFont.descent + thisFont.leading - 1;
        MoveTo( attachX, attachY );
        LineTo( attachX - ( attachY - textBottom ) / 3,
             attachY - ( attachY - textBottom ) );
        }

/*****************************************************************
 * bigAbbreviateNumber
 *****************************************************************
 * puts a given real into a given string in abbreviated number format
 *****************************************************************/
void bigAbbreviateNumber( char *string, Real80T number, BooleanT forceMM )
        {
        char szTemp[MAX_FILE_NAME_LENGTH];
```

```
/* try to format it as a normal number first (rounding to the nearest ten) */
sprintf( szTemp, "%ld", ((Int32T) ( number + 5 ) / 10 ) * 10 );

/* check the length */
if ( strlen( szTemp ) > 6 || forceMM )
    {
    /* get the number of millions we are dealing with */
    sprintf( szTemp, "%8.1f", number / 1000000);

    /* format, remove hundredths of millions and add "MM" */
    varDollarFmt( string, szTemp, TRUE );
    if ( strchr( string, '.' ) != NULL ) *(strchr( string, '.' ) + 2) = '\0';
    strcat( string, "MM");
    }
else
    {
    /* format and remove pennies */
    varDollarFmt( string, szTemp, TRUE );
    if ( strchr( string, '.' ) != NULL ) *strchr( string, '.' ) = '\0';
    }
}
```

BEST AVAILABLE COPY

```
/**********************************************************************
 * bigFeeNumber
 **********************************************************************
 * puts a given real into a given string in abbreviated number format
 * specifically abbreviated for use in the fee amount in the hi-lo comparison box
 **********************************************************************/
void bigFeeNumber( char *string, Real80T number )
{
char szTemp[MAX_FILE_NAME_LENGTH];

/* try to format it as a normal number first */
sprintf( szTemp, "%ld", ((Int32T) number ) );

/* check the length */
if ( strlen( szTemp ) > 3 )
    {
    /* get the number of thousands we are dealing with */
    sprintf( szTemp, "%ld", (Int32T) ( number / 1000 ) );

    /* if it's still too long, do it in millions */
    if ( strlen( szTemp ) > 2 )
        {
        bigAbbreviateNumber( string, number, TRUE );
        strcpy( string, string+1 );
        return;
        }

    /* get the number of thousands we are dealing with */
    sprintf( szTemp, "%8.1f", number / 1000 );

    /* format, remove hundredths of thousands and add "M" */
    varDollarFmt( string, szTemp, FALSE );
    if ( strchr( string, '.' ) != NULL ) *(strchr( string, '.' ) + 2) = '\0';
    strcat( string, "M");
    }
else
    {
    /* format and remove pennies */
    varDollarFmt( string, szTemp, TRUE );
    if ( strchr( string, '.' ) != NULL ) *strchr( string, '.' ) = '\0';
    }
}
```

```
/* ----------------------------------------------------------
 *
 *                   High-Low Comparison Box
 *
 * ----------------------------------------------------------*/
```

BEST AVAILABLE COPY

```
/*****************************************************************
 * bigHiLoComparisonBar
 *****************************************************************
 * draws hi lo bar and label for a given time period in comparison window
 *****************************************************************/
void bigHiLoComparisonBar( bigChartDataHT hChartData,
                           Int32T timeNumber,
                           Real80T maxDataPoint,
                           Rect boundsRect )
    {
    Rect barRect;
    char s1[MAX_FILE_NAME_LENGTH], s2[MAX_FILE_NAME_LENGTH];

    /* get hi and lo values (in millions) */
    bigAbbreviateNumber( s1, ((**hChartData)[0][timeNumber] * varVal( vTotalAss
    strcat( s1, " hi");
    bigAbbreviateNumber( s2, ((**hChartData)[1][timeNumber] * varVal( vTotalAss
                           ((BooleanT) ( strchr( s1, 'M' ) != 0 )) );
    strcat( s2, " lo");


    /* get the hi bar size and placement and plot it */
    bigGetBar( &barRect,
               0, 1,
               0, 1,
               (**hChartData)[0][timeNumber] / maxDataPoint,
               boundsRect, 10000 );
    scrSetHueNow( Hues[0] );
    PaintRect( &barRect );

    /* put up the labels */
    scrSetHueNow( 36 );
    bigDrawstringCenteredWithLimit( s1,
                                    (barRect.right+barRect.left)
                                    barRect.top - 16, 333 );
    bigDrawstringCenteredWithLimit( s2,
                                    (barRect.right+barRect.left)
                                    barRect.top - 6, 333 );

    /* get the lo bar size and placement and plot it */
    bigGetBar( &barRect,
               0, 1,
               0, 1,
               (**hChartData)[1][timeNumber] / maxDataPoint,
               boundsRect, 10000 );
    scrSetHueNow( Hues[1] );
    PaintRect( &barRect );
    }


/*****************************************************************
 * bigHiLoComparison
 *****************************************************************
 * computes and draws hi lo comparison box contents for a given time period
 *****************************************************************
void bigHiLoComparison( excFileIdT fileId,
                        Int32T numRowsInBigData,
                        Int32T timeNumber )
    {
    char s0[MAX_FILE_NAME_LENGTH], s1[MAX_FILE_NAME_LENGTH], s2[MAX
szTemp[MAX_FILE_NAME_LENGTH];
```

```
Rect                barRect, smallBoundsRect;
Real80T                  maxDataPoint;
bigChartDataHT      hChartDataCur, hChartDataRec;
BooleanT            firstBarOnly;

/* year title */
sprintf( s0, "%d YEAR PERIOD", (Int16T) timeNumber );
scrSetHueNow( 29 );
MoveTo( 333 - stringwidth( s0 ) / 2, 118 );
drawstring( s0 );
```

BEST AVAILABLE COPY

```
/* allocate space for both sets of data points */
numRowsInBigData = excNumRows( fileId );
hChartDataCur = ( bigChartDataHT ) NewHandle( numRowsInBigData * sizeof( I
if ( hChartDataCur == NULL ) { TGL_ERROR( "can't allocate data" ); }
hChartDataRec = ( bigChartDataHT ) NewHandle( numRowsInBigData * sizeof( I
if ( hChartDataRec == NULL ) { TGL_ERROR( "can't allocate data" ); }

/* transform data with each allocation */
maxDataPoint = -1;
bigHiLoTransform( fileId, hChartDataCur, &maxDataPoint, 1, &firstBarOnly );
bigHiLoTransform( fileId, hChartDataRec, &maxDataPoint, 2, &firstBarOnly );

/* max data point is only for this time period in the comparison box */
maxDataPoint = MAX( (**hChartDataCur)[0][timeNumber],
                    (**hChartDataRec)[0][timeNumber] );

/* put up the bars for the two allocations */
TGL_SETRECT( &smallBoundsRect, 296, 163, 326, 293 );
bigHiLoComparisonBar( hChartDataCur, timeNumber, maxDataPoint, smallBo
TGL_SETRECT( &smallBoundsRect, 343, 163, 373, 293 );
bigHiLoComparisonBar( hChartDataRec, timeNumber, maxDataPoint, smallBo

DisposHandle( (Handle) hChartDataCur );
DisposHandle( (Handle) hChartDataRec );
}


/* ------------------------------------------
 *
 *                        Average Comparison Box
 *
 * ------------------------------------------*/


/*********************************************************************
 * bigAvgComparisonBar
 *********************************************************************
 * draws average bar and label for a given time period in comparison window
 *********************************************************************/
void bigAvgComparisonBar( bigChartDataHT hChartData,
                          Int32T timeNumber,
                          Real80T maxDataPoint,
                          Rect boundsRect )
{
Rect barRect;
char s1[MAX_FILE_NAME_LENGTH], s2[MAX_FILE_NAME_LENGTH];

/* get average value (in millions) */
bigAbbreviateNumber( s1, ((**hChartData)[0][timeNumber] * varVal( vTotalA


/* get the average bar size and placement and plot it */
bigGetBar( &barRect,
           0, 1,
           0, 1,
           (**hChartData)[0][timeNumber] / maxDataPoint,
```

BEST AVAILABLE COPY

```
            boundsRect, 10000 );
    scrSetHueNow( Hues[1] );
    PaintRect( &barRect );

    /* put up the label */
    scrSetHueNow( 36 );
    bigDrawstringCenteredWithLimit( s1,
                                        (barRect.right+barRect.left) / 2,
                                        barRect.top - 6, 333 );
    }

/**********************************************************************
 * bigAvgComparisonBarNet
 **********************************************************************
 * draws average bar and label for a given time period in comparison window (net of fe
 **********************************************************************/
void bigAvgComparisonBarNet( bigChartDataHT hChartData,
                            Int32T timeNumber,
                            Real80T maxDataPoint,
                            Rect boundsRect )
    {
    Rect barRect;
    char s1[MAX_FILE_NAME_LENGTH], s2[MAX_FILE_NAME_LENGTH];

    /* get average value (in millions) */
    bigAbbreviateNumber( s1, ((**hChartData)[1][timeNumber] * varVal( vTotalAsset:

    /* get the average bar size and placement and plot it */
    bigGetBar( &barRect,
            0, 1,
            0, 1,
            (**hChartData)[1][timeNumber] / maxDataPoint,
            boundsRect, 10000 );
    scrSetHueNow( Hues[1] );
    PaintRect( &barRect );

    /* put up the label */
    scrSetHueNow( 36 );
    bigDrawstringCenteredWithLimit( s1,
                                        (barRect.right+barRect.left) / 2,
                                        barRect.top - 6, 333 );

    /* put up a line */
    if ( strlen( s1 ) < 8 )
        {
        MoveTo( ((barRect.right+barRect.left) / 2 + stringwidth( s1 ) / 2 + 1 +
                (399 - stringwidth( "net" ) - 1 ) ) / 2 - stringwidth( "-" ) / 2,
            barRect.top - 6 );
        drawstring( "-" );
        }

    /* and the words */
    MoveTo( 399 - stringwidth( "net" ), barRect.top - 6 );
    drawstring( "net" );
    MoveTo( 399 - stringwidth( "after" ), barRect.top + 4 );
    drawstring( "after" );
    MoveTo( 399 - stringwidth( "fee" ), barRect.top + 14 );
    drawstring( "fee" );
    }

/**********************************************************************
 * bigAvgComparison
 **********************************************************************
 * computes and draws average comparison box contents for a given time period
 **********************************************************************/
void bigAvgComparison( excFileIdT fileId,
                    Int32T numRowsInBigData,
                    Int32T timeNumber,
```

```
                                        BooleanT showGross )
        {
        char s0[MAX_FILE_NAME_LENGTH], s1[MAX_FILE_NAME_LENGTH], s2[MAX_FILE_
  szTemp[MAX_FILE_NAME_LENGTH];
        Rect                    barRect, smallBoundsRect;
        Real80T                         maxDataPoint;
        bigChartDataHT          hChartDataCur, hChartDataRec;
        BooleanT                firstBarOnly;

        /* year title */
        sprintf( s0, "%d YEAR PERIOD", (Int16T) timeNumber );
        scrSetHueNow( 29 );
        MoveTo( 333 - stringwidth( s0 ) / 2, 118 );
        drawstring( s0 );

        /* allocate space for both sets of data points */
        numRowsInBigData = excNumRows( fileId );
        hChartDataCur = ( bigChartDataHT ) NewHandle( numRowsInBigData * sizeof( bi
        if ( hChartDataCur == NULL ) { TGL_ERROR( "can't allocate data" ); }
        hChartDataRec = ( bigChartDataHT ) NewHandle( numRowsInBigData * sizeof( bi
        if ( hChartDataRec == NULL ) { TGL_ERROR( "can't allocate data" ); }

        /* transform data with each allocation */
        maxDataPoint = -1;
        bigAvgTransform( fileId, hChartDataCur, &maxDataPoint, 1, TRUE, &firstBarOnly
        bigAvgTransform( fileId, hChartDataRec, &maxDataPoint, 2, TRUE, &firstBarOnly

        /* max data point is only for this time period in the comparison box */
        maxDataPoint = MAX( (**hChartDataCur)[0][timeNumber],
                                (**hChartDataRec)[1][timeNumber] );

        /* put up the bars for the two allocations */
        TGL_SETRECT( &smallBoundsRect, 296, 163, 326, 293 );
        bigAvgComparisonBar( hChartDataCur, timeNumber, maxDataPoint, smallBound
        TGL_SETRECT( &smallBoundsRect, 343, 163, 373, 293 );
        if ( showGross ) bigAvgComparisonBar( hChartDataRec, timeNumber, maxDataPo
        else         bigAvgComparisonBarNet( hChartDataRec, timeNumber, maxDataPoint

        DisposHandle( (Handle) hChartDataCur );
        DisposHandle( (Handle) hChartDataRec );
        }


/* ------------------------------------------------
 *
 *                              Labellers
 *
 * ------------------------------------------------*/


/*********************************************************************
 * bigHiLoLabel
 *********************************************************************
 * draws hi lo label for a given time period
 *********************************************************************/
void bigHiLoLabel( Int32T timeNumber,
                        bigChartDataHT chartDataH,
                        Real80T maxDataPoint,
                        Rect boundsRect )
        {
        char s0[MAX_FILE_NAME_LENGTH], s1[MAX_FILE_NAME_LENGTH], s2[MAX_FILE_N
szTemp[MAX_FILE_NAME_LENGTH];
        Rect                    barRect;

        /* year */
        sprintf( s0, "%dyr value", (Int16T) timeNumber );
```

BEST AVAILABLE COPY

```
/* get hi value (in millions) */
bigAbbreviateNumber( s1, ((**chartDataH)[0][timeNumber] * varVal( vTotalAsse
strcat( s1, " hi");

/* get lo value */
bigAbbreviateNumber( s2, ((**chartDataH)[1][timeNumber] * varVal( vTotalAsse
                        ((BooleanT) ( strchr( s1, 'M' ) != 0 )) );
strcat( s2, " lo");

/* get the bar size and placement */
bigGetBar ( &barRect,
            timeNumber, NUM_TIME_POINTS,
            0, 1,
            (**chartDataH)[0][timeNumber] / maxDataPoint,
            boundsRect, DATA_WHITESPACE_RATIO );

/* put up the label */
bigLabel( s0, 35,
          s1, 36,
          s2, 36,
          (barRect.right + barRect.left - ShadowOffset.h ) / 2,
          barRect.top + 3, ( timeNumber == 1 ) ? 25 : ( timeNumber == 2 ) ? 1!
}

/*************************************************************************
 * bigAvgLabel
 *************************************************************************
 * draws average label for a given time period
 *************************************************************************/
void bigAvgLabel( Int32T timeNumber,
                  bigChartDataHT chartDataH,
                  Real80T maxDataPoint,
                  Rect boundsRect )
{
char s0[MAX_FILE_NAME_LENGTH], s1[MAX_FILE_NAME_LENGTH], szTemp[MA>
Rect            barRect;

/* year */
sprintf( s0, "%dyr value", (Int16T) timeNumber );

/* get average value */
bigAbbreviateNumber( s1, ((**chartDataH)[0][timeNumber] * varVal( vTotalAsset

/* get the bar size and placement */
bigGetBar ( &barRect,
            timeNumber, NUM_TIME_POINTS,
            0, 1,
            (**chartDataH)[0][timeNumber] / maxDataPoint,
            boundsRect, DATA_WHITESPACE_RATIO );

/* put up the label */
bigLabel( "", 35,
          s0, 35,
          s1, 36,
          (barRect.right + barRect.left - ShadowOffset.h ) / 2,
          barRect.top + 3, ( timeNumber == 1 ) ? 20 : ( timeNumber == 2 ) ? 15
}


/* ----------------------------------------
 *
 *                     Charts
 *
 * ----------------------------------------*/
```

BEST AVAILABLE COPY

```
/*****************************************************************
 * bigHiLoChart
 *****************************************************************
 * Plots bar chart comparing high and low return from Bank, Income and
 * Growth investments. Plots a "PiledUp" style bar chart, which is
 * to say, data for high and low are plotted with the same origin,
 * one on top of the other
 *****************************************************************/
void bigHiLoChart ( BooleanT showChart )
    {
    static Int32T            lastBarTouched = -1;
    Int32T                          thisBarTouched ;
    Real80T                         maxDataPoint;
    excFileIdT               fileId;
    bigChartDataHT           chartDataH;
    Int32T                          numRowsInBigData;
    Rect                     barRect;
    BooleanT                 firstBarOnly;

    /* open excel file */
    excOpenFile( EXCEL_FILE_NAME, &fileId, FALSE );
    numRowsInBigData = excNumRows( fileId );

    /* allocate space for the data points */
    chartDataH = (bigChartDataHT)
          NewHandle( numRowsInBigData * sizeof( bigDataPointsT ));
    if (chartDataH == NULL) {
          TGL_ERROR( "can't allocate data" );
    }

    /* transform data collecting information about hi and low */
    bigHiLoTransform( fileId, chartDataH, &maxDataPoint, varPtr( vBarDisplayBasis )[

    if ( showChart )
          {
          /* draw the bar chart */
          bigBarChart( 2, NUM_TIME_POINTS, NUM_TIME_POINTS, chartDataH, maxD
                            DATA_WHITESPACE_RATIO, Hues, ShadowOffset, TRUE,

          /* put in start label */
       bigStartLabel( chartDataH, maxDataPoint, BoundsRect );

       /* we have not yet touched a bar on this chart */
       lastBarTouched = -1;
       }
    else
          {
          thisBarTouched = atoi( varPtr( vBarTouched ) );

          if ( lastBarTouched == thisBarTouched )
                /* show the comparison window for this bar */
             bigHiLoComparison( fileId, numRowsInBigData, thisBarTouched );
          else
                /* show the value requested by the scanfile */
             bigHiLoLabel( thisBarTouched, chartDataH, maxDataPoint, BoundsRect )

          /* remember the bar that we touched */
          lastBarTouched = thisBarTouched;
       }

    /* clean up */
    excCloseFile( fileId );
    DisposHandle( (Handle) chartDataH );
    scrRestoreColors();

    } /* bigHiLoChart */
```

BEST AVAILABLE COPY

```
/***********************************************************************
 * bigAvgChart
 ***********************************************************************
 * Plots bar chart of average return from Bank, Income and
 * Growth investments. Plots a "PiledUp" style bar chart, which is
 * to say, data are plotted with the same origin,
 * one on top of the other
 ***********************************************************************/
void bigAvgChart ( BooleanT showChart )
	{
	static Int32T		lastBarTouched = -1, touchedHowManyTimes = 0;
	Int32T			thisBarTouched;
	Real80T			maxDataPoint = -1;
	excFileIdT		fileId;
	bigChartDataHT		chartDataH;
	Real80T			dataPointHeight;
	Int32T			numRowsInBigData;
	BooleanT		firstBarOnly;

	/* open excel file */
	excOpenFile( EXCEL_FILE_NAME, &fileId, FALSE );
	numRowsInBigData = excNumRows( fileId );

	/* allocate space for the data points */
	chartDataH = (bigChartDataHT)
		NewHandle( numRowsInBigData * sizeof( bigDataPointsT ));
	if (chartDataH == NULL) {
		TGL_ERROR( "Can't allocate data." );
	}

	/* transform data collecting information about maximum data point */
	bigAvgTransform( fileId, chartDataH, &maxDataPoint,
				varPtr( vBarDisplayBasis )[0] - '0', FALSE, &firstBarOnly );


	if ( showChart )
		{
		/* draw the bar chart, or a single bar if the current allocation totals to 0 */
		if ( (**chartDataH)[0][0] == 0 )
			{
			(**chartDataH)[0][0] = 1;
			bigBarChart( 1, NUM_TIME_POINTS, 1, chartDataH, maxDataPoint, B(
					DATA_WHITESPACE_RATIO, AverageHues, Shadov
firstBarOnly );
			}
		else
			bigBarChart( 1, NUM_TIME_POINTS, NUM_TIME_POINTS, chartDataH,
BoundsRect,
					DATA_WHITESPACE_RATIO, AverageHues, Shado
firstBarOnly );

		/* put in start label */
		bigStartLabel( chartDataH, maxDataPoint, BoundsRect );

		/* we have not yet touched a bar on this chart */
		lastBarTouched = -1;
		}
	else
		{
		thisBarTouched = atoi( varPtr( vBarTouched ) );

		if ( lastBarTouched == thisBarTouched )
			{
			/* show the comparison window for this bar */
			/* (show the gross on touches 2, 4, 6... and net on 3, 7, 9...) */
			touchedHowManyTimes++;
			bigAvgComparison( fileId, numRowsInBigData, thisBarTouched,
					( touchedHowManyTimes % 2 == 0 ) );
```

BEST AVAILABLE COPY

```
        }
    else
        {
        /* show the value requested by the scanfile */
        bigAvgLabel( thisBarTouched, chartDataH, maxDataPoint, BoundsRect ).
        touchedHowManyTimes = 1;
        }

    /* remember the bar that we touched */
    lastBarTouched = thisBarTouched;
    }

/* clean up */
excCloseFile( fileId );
DisposHandle( (Handle) chartDataH );
scrRestoreColors();
} /* bigAvgChart */
```

BEST AVAILABLE COPY

```
/* ___________________________________________
 * ___________________________________________
 *
 *              Highest Level Commands: (called by (Y) commands)
 *
 * ___________________________________________
 * ___________________________________________*/


/**********************************************************************
 * bigAltAllocate
 **********************************************************************
 * fills all allocation variables (percentages and dollar amounts)
 * based on two input percentages in the vAlt.*Percent variables
 * called by (Y) 177
 **********************************************************************/
void bigAltAllocate ( void )
    {
    Int32T          suppliedPercent1, suppliedPercent2, unsuppliedPercent;

    /* find out which two input variables have been supplied */
    /* (there's probably some elegant way to do this, tell me if you think of it) */
    if ( varNotBlank( varPtr( vAltBankPercent ) ) )
        {
        suppliedPercent1 = vAltBankPercent;
        if ( varNotBlank( varPtr( vAltIncomePercent ) ) )
            {
            suppliedPercent2 = vAltIncomePercent;
            unsuppliedPercent = vAltGrowthPercent;
            }
        else
            {
            suppliedPercent2 = vAltGrowthPercent;
            unsuppliedPercent = vAltIncomePercent;
            }
        }
    else
        {
        unsuppliedPercent = vAltBankPercent;
        suppliedPercent1 = vAltIncomePercent;
        suppliedPercent2 = vAltGrowthPercent;
        }

    /* be sure that they add to at most 100 */
    if ( varVal( suppliedPercent1 ) > 100 )
        {
```

BEST AVAILABLE COPY

```
        varSetL( suppliedPercent1, 100 );
        varSetL( suppliedPercent2, 0 );
        }
    else if ( varVal( suppliedPercent1 ) +
        varVal( suppliedPercent2 ) > 100 )
        varSetL( suppliedPercent2, 100 - varVal( suppliedPercent1 ) );

    /* fill in the percentage that was not supplied */
    varSetL( unsuppliedPercent, 100 - varVal( suppliedPercent1 ) - varVal( suppliedPer

    /* fill any percent variable that has remained blank with a zero */
    if ( ! varNotBlank( varPtr( vAltBankPercent ) ) ) sprintf( varPtr( vAltBankPercent ), '
    if ( ! varNotBlank( varPtr( vAltIncomePercent ) ) ) sprintf( varPtr( vAltIncomePercer
    if ( ! varNotBlank( varPtr( vAltGrowthPercent ) ) ) sprintf( varPtr( vAltGrowthPerce

    /* fill in the dollar amounts */
    /* bank */
    if ( varVal( vAltBankPercent ) == 0 ) sprintf( varPtr( vAltBankDollars ), "0" );
    else sprintf( varPtr( vAltBankDollars ), "%ld", varVal( vAltBankPercent ) *
                                        varVal( vTotalAssets ) / 100 );

    /* income */
    if ( varVal( vAltIncomePercent ) == 0 ) sprintf( varPtr( vAltIncomeDollars ), "0" );
    else sprintf( varPtr( vAltIncomeDollars ), "%ld", varVal( vAltIncomePercent ) *
                                        varVal( vTotalAssets ) / 100 );

    /* growth */
    if ( varVal( vAltGrowthPercent ) == 0 )
        {
        /* if there's a residue due to rounding errors */
        if ( varVal( vTotalAssets ) -
             varVal( vAltBankDollars ) - varVal( vAltIncomeDollars ) != 0 )
            /* put it into income */
            sprintf( varPtr( vAltIncomeDollars ), "%ld", varVal( vTotalAssets ) -
                                                varVal( vAltBankDollars
        sprintf( varPtr( vAltGrowthDollars ), "0" );
        }
    else sprintf( varPtr( vAltGrowthDollars ), "%ld", varVal( vTotalAssets ) -
                                        varVal( vAltBankDollars ) -
                                        varVal( vAltIncomeDollars ) );
    }

/***********************************************************************
 * bigChart
 ***********************************************************************
 * Plots bar chart comparing return from Bank, Income and
 * Growth investments. Calls average or hi-lo chart depending on
 * vBarDisplayHiLoOrAverage ($177)
 * called by (Y) 176
 ***********************************************************************/
void bigChart ()
    {
    switch ( varPtr( vBarDisplayHiLoOrAverage )[0] )
        {
        case '1' : /* average display */
            bigAvgChart( TRUE );
            break;

        default: /* hi lo display */
            bigHiLoChart( TRUE );
            break;

        }
    }

/***********************************************************************
```

```
* bigInfo
**********************************************************************
* Plots label for bar chart comparing return from Bank, Income and
* Growth investments. Calls average or hi-lo chart depending on
* vBarDisplayHiLoOrAverage ($177)
* called by (Y) 178
**********************************************************************/
void bigInfo ()
	{
	switch ( varPtr( vBarDisplayHiLoOrAverage )[0] )
		{
		case '1' : /*  average info display  */
			bigAvgChart( FALSE );
			break;

		default: /*  hi lo info display  */
			bigHiLoChart( FALSE );
			break;
		}
	}
```

BEST AVAILABLE COPY

BEST AVAILABLE COPY

```
/**********************************************************************/
/**********************************************************************/
#include "standard.h"
#include "glue.h"
#include "tglMain.h"
#include "bldBuild.h"
#include "bioBuildIO.h"
#include "sniSnip.h"
#include "libLibrary.h"
#include "lblLabel.h"
#include "grfGraphics.h"
#include "fileAccess.h"

/**********************************************************************/
/**********************************************************************/
#define GENERIC_OK_CANCEL_ID    2004
#define CANCEL                  2
#define     BAK_EXTENSION   ".bak"

/**********************************************************************/
/**********************************************************************/
typedef enum {
        BIO_OUTPUT_LIB,
        BIO_INPUT_LIB,
        BIO_SNIP,
        BIO_EMPTY
        } bioCommandT;

typedef struct {
        char   name[50];
        Int32T       tag;
        } bioTableEntryT;

typedef bioTableEntryT bioTableT[500];
typedef bioTableT               **bioTableHT;

/**********************************************************************/
/**********************************************************************/
static SFTypeList               TextFileType = { 'TEXT' }; /* text-file type */
static CharsHandle              InputTextH = NULL;
static Int32T                   InputPosition = 0;
static Boolean                  InputDefined;
static Boolean                  OutputDefined;
static Int32T                   NumCharsInInputText;
static Boolean                  FoundError;
static char                     InputLibraryName[50];
static bioTableHT               bioTableH = NULL;

/**********************************************************************/
/**********************************************************************/
Boolean bioGetLine( char *line );
Boolean bioParseLine( bioCommandT *command, char *name );
Boolean bioError( char *message );
Boolean bioIsDuplicateName( Boolean reset, char *name );


/**********************************************************************/
/**********************************************************************/

/**********************************************************************
 * bioIsDuplicateName returns true if we've seen this name before
 * since the last time the 'reset' flag was true.
 **********************************************************************/
Boolean bioIsDuplicateName( Boolean reset, char *name )
{
        static          Int32T      count = 0;
        register        Int32T      tag;
        register        Int32T      i;
```

```
	/*
	 * allocate the table if necessary
	 */
	if (bioTableH == NULL) {
		bioTableH = (bioTableHT) NewHandle( sizeof( bioTableT ));
	}

	/*
	 * reset the table if 'reset' is true
	 */
	if (reset) {
		count = 0;
		return (FALSE);
	}

	/*
	 * try to find the tag, then the string name
	 */
	HLock( (Handle) bioTableH );
	tag = lblGetTag( name );
	for (i = 0; i < count; i++) {

		if ((**bioTableH)[i].tag == tag) {

			if (!strcmp( (**bioTableH)[i].name, name )) {
				HUnlock( (Handle) bioTableH );
				return (TRUE);
			}
		}
	}

	/*
	 * add the name if it wasn't found
	 */
	(**bioTableH)[count].tag = tag;
	strcpy( (**bioTableH)[count++].name, name );
	HUnlock( (Handle) bioTableH );

}

/**********************************************************************
 * bioError reports an error in the input-text library and asks whether
 * to go on checking for more errors or not. Any error prevents the
 * output file from being created. Returns true if the user says we're
 * done.
 **********************************************************************/
Boolean bioError( char *message )
{
	char		locMessage[256];
	DialogPtr	dialogP;
	Int16T		itemHit;

	/*
	 * set the text of the message
	 */
	strcpy( locMessage, message );
	CtoPstr( locMessage );
	ParamText( locMessage, "\p", "\p", "\p" );


	/*
	 * show the cursor
	 */
	tglPushCursor();
	tglCursorOnOff( TRUE );
```

BEST AVAILABLE COPY

```
	/*
	 * find out whether we should go on or not
	 */
	dialogP = GetNewDialog( GENERIC_OK_CANCEL_ID, NULL, (WindowPtr) -1 );
	do {
		ModalDialog( NULL, &itemHit );
	} while ((itemHit != OK) && (itemHit != CANCEL));
	DisposDialog( dialogP );
	FoundError = TRUE;

	tglPopCursor();

	return (itemHit == CANCEL);

}

/***********************************************************************
 * bioGetLine returns a pointer to the current line in the InputText.
 * It works destructively, replacing '\r' characters with '\0' characters.
 * If we hit the last line, then return true, otherwise false
 ***********************************************************************/
Boolean bioGetLine( char *line )
{
	Int32T		length;

	if (InputPosition >= NumCharsInInputText) {
		return( TRUE );
	}
	HLock( InputTextH );
	length = strcspn( &(*InputTextH)[InputPosition], "\r" );
	strncpy( line, &(*InputTextH)[InputPosition], length );
	line[length] = '\0';
	InputPosition += length + 1;
	HUnlock( InputTextH );
	return( FALSE );
}

/***********************************************************************
 * bioParseLine reads a line of input-text and decides what command
 * is on that line.  Command is the command from the line, and name
 * is the string on the line.  Returns true if the input is exhausted.
 ***********************************************************************/
Boolean bioParseLine( bioCommandT *command, char *name )
{
	char	currentLine[256];
	char	copyOfLine[256];
	char	*token;
	char	error[100];
	char	*tempName;

	/*
	 * done?
	 */
	if (bioGetLine( currentLine )) {
		return (TRUE);
	}
	strcpy( copyOfLine, currentLine );
	*command = BIO_EMPTY;

	/*
	 * read a token
	 */
	token = strtok( currentLine, "\t " );
	if ((token == NULL) || (token[0] == ';')) {
		return (FALSE);
	}
	else if (token[2] != ')') {
		sprintf( error, "Don't understand '%s'", copyOfLine );
```

BEST AVAILABLE COPY

```
            return (bioError( error ));
        }
        else {

            tempName = strtok( NULL, "\"" );
            if (tempName == NULL) {
                sprintf( error, "Don't understand '%s'", copyOfLine );
                return (bioError( error ));
            }
            strcpy( name, tempName );
            switch (token[1] ) {

                case 'N':
                    *command = BIO_OUTPUT_LIB;
                    return (FALSE);

                case 'L':
                    *command = BIO_INPUT_LIB;
                    return (FALSE);

                case 'S':
                    *command = BIO_SNIP;
                    return (FALSE);
            }
        }
}
```

BEST AVAILABLE COPY

```
/******************************************************************
 * bioReadLibrary reads an input-text file and creates a new output
 * snip library based on the commands in the input-text file. The
 * commands are each on a separate line. Comments start with a ';'
 * and continue to the end of the line. There are three commands:
 *
 *          (N)         name of the output library
 *          (L)         name of an input library
 *          (S)         name of a snip to copy from input library to output
 *
 * There can be only one (N) command in a file, and it must appear
 * before any (S) commands. Each (L) command introduces a new
 * input library from which the following (S) commands will name
 * snips. (S) commands must follow an (L) command. To switch
 * input libraries use a new (L) command. Each snip must be found
 * in the input library named by the last (L) command which preceeded
 * the (S) command.
 ******************************************************************/
void bioReadLibrary( void )
{
    SFReply             fileReply;
    SFTypeList          typeList;
    Int16T              fRefNum;
    OSErr               err;
    char                error[100];
    Boolean             done;
    char                name[100];
    bioCommandT         command;
    Handle              hSnip;
    Rect                snipRect;
    struct libFPrefix   libPrefix;
    char                outputFileName[50];
    libFatPT            fatTableP;
    Int32T              pixNum = 0;
    Int32T              totalSnipSize = 0;
    Ptr                 snipP;
    Int32T              size;
    Int32T              cBytes;
    Int32T              fPos;
```

```
char            temp[255];

/*
 * get the file name using a dialog box
 */
if (!bidGetFileName( &fileReply, TextFileType )) {
        return;
}

/*
 * turn the menu bar off
 */
SetCursor(*tglWatch);
tglToggleMenu();

/*
 * open the text-input file
 */
PtoCstr( (char *) fileReply.fName );
err = fsopen( (char *) fileReply.fName, fileReply.vRefNum, &fRefNum );
if (err != noErr) {
        sprintf( error, "Error opening file \"%s\"\n\n", fileReply.fName );
        TGL_ERROR( error );
}

/*
 * read in the text-input file
 */
GetEOF( fRefNum, &NumCharsInInputText);
if( InputTextH != NULL ) {
        DisposHandle( InputTextH );
}
InputTextH = NewHandle( NumCharsInInputText + 1 );
if (SetFPos( fRefNum, 1, 0 ) != noErr) {
        DisposHandle( InputTextH );
        InputTextH = NULL;
        FSClose( fRefNum );
        TGL_ERROR( "Couldn't find position in file" );
}
HLock( InputTextH );
if (FSRead( fRefNum, &NumCharsInInputText, *InputTextH ) != noErr) {
        DisposHandle( InputTextH );
        InputTextH = NULL;
        FSClose( fRefNum );
        TGL_ERROR( "Couldn't read file" );
}
(*InputTextH)[NumCharsInInputText] = '\0';
HUnlock( InputTextH );
if (FSClose( fRefNum ) != noErr) {
        DisposHandle( InputTextH );
        InputTextH = NULL;
        TGL_ERROR( "Couldn't read file" );
}


/*
 * check each line of the text-input file to see if there
 * are any errors
 */
pixNum = 0;
InputPosition = 0;
InputDefined = FALSE;
OutputDefined = FALSE;
FoundError = FALSE;
bioIsDuplicateName( TRUE, "" );
done = bioParseLine( &command, name );
while (!done) {
```

BEST AVAILABLE COPY

```
switch (command) {

        case BIO_OUTPUT_LIB:
                if (OutputDefined) {
                        done = bioError( "Only one (N) command allowed per f
                }
                OutputDefined = TRUE;
                break;

        case BIO_INPUT_LIB:
                InputDefined = TRUE;
                libLoadLib( name, FALSE, false );
                strcpy( InputLibraryName, name );
                break;

        case BIO_SNIP:
                if (!OutputDefined) {
                        done = bioError( "Snip found before output file named
                }
                else if (!InputDefined) {
                        done = bioError( "Snip found before input file named" .
                }
                else {
                        if (bioIsDuplicateName( FALSE, name )) {
                                sprintf( error, "Snip '%s' has already appeared in
                                        name );
                                done = bioError( error );
                        }
                        else {
                                hSnip = libGetPicHandle( libApLib[libCurrentLibIr
                                        libApLib[libCurrentLibIndex].vRefNum, nan
                                if (hSnip == NULL) {
                                        sprintf( error, "Snip %s not in library %s",
                                                name, InputLibraryName );
                                        done = bioError( error );
                                }
                                pixNum++;
                        }
                }
                break;

        case BIO_EMPTY:
                break;

        }
        if (!done) {
                done = bioParseLine( &command, name );
        }
}

/*
 * if there were any errors, then skip out without doing anything
 */
if (FoundError) {
        DisposHandle( InputTextH );
        InputTextH = NULL;
        return;
}


/*
 * open a temporary output file, and allocate space for the FAT table
 */
bldOpenTempFile( &fRefNum );
fatTableP = (libFatPT) NewPtr( sizeof( libFatT ) * pixNum );

/*
 * set up data for an empty library
```

BEST AVAILABLE COPY

```
*/
libPrefix.Signature= libLibSignature;
libPrefix.Version= libSysVersion;
libPrefix.PixNum= 0;
libPrefix.FATstart= sizeof( libFPrefixT );

/*
 * write data for an empty library
 */
cBytes= sizeof( struct libFPrefix );
if (FSWrite( fRefNum, &cBytes, &libPrefix ) != noErr) {
	TGL_ERROR( "Write failed" );
}


/*
 * now, actually build the library
 */
inputPosition = 0;
inputDefined = FALSE;
OutputDefined = FALSE;
FoundError = FALSE;
pixNum = 0;
totalSnipSize = 0;
done = bioParseLine( &command, name );
while (!done) {

	switch (command) {

		case BIO_OUTPUT_LIB:
			strcpy( outputFileName, name );
			break;

		case BIO_INPUT_LIB:
			libLoadLib( name, FALSE, FALSE );
			break;

		case BIO_SNIP:
			sniPutUpSnip( name );
			sniCurrentSnip( &snipP, &size );
			fatTableP[pixNum].SnipSize = size;
			strcpy( fatTableP[pixNum].SnipName, name );
			fatTableP[pixNum].hSnip = 0;
			if (pixNum > 0) {
				fatTableP[pixNum].SnipFOffset =
					fatTableP[pixNum - 1].SnipFOffset + fatTableP[pixN
			}
			else {
				fatTableP[pixNum].SnipFOffset = sizeof( libFPrefixT );
			}
			if (FSWrite( fRefNum, &size, snipP ) != noErr) {
				TGL_ERROR( "Couldn't write snip onto disk" );
			}
			DisposPtr( snipP );
			pixNum++;
			totalSnipSize += size;
			break;

		case BIO_EMPTY:
			break;

	}
	done = bioParseLine( &command, name );
}

/*
 * write the FAT entries to the disk
 */
```

BEST AVAILABLE COPY

```
        cBytes = sizeof( libFatT ) * (pixNum);
        if (FSWrite( fRefNum, &cBytes, fatTableP ) != noErr) {
                TGL_ERROR( "Couldn't write snip table onto disk" );
        }

        /*
         * update the prefix information at the start of the file
         */
        libPrefix.PixNum = pixNum;
        libPrefix.FATstart = sizeof( libFPrefixT ) + totalSnipSize;
        cBytes = sizeof( libFPrefixT );
        if (GetFPos( fRefNum, &fPos ) != noErr) {
                FSClose( fRefNum );
                TGL_ERROR( "Couldn't get position in file" );
        }
        if (SetFPos( fRefNum, fsFromStart, 0 ) != noErr) {
                FSClose( fRefNum );
                TGL_ERROR( "Couldn't find position in file for prefix" );
        }
        if (FSWrite( fRefNum, &cBytes, &libPrefix ) != noErr) {
                FSClose( fRefNum );
                TGL_ERROR( "Couldn't write file prefix onto disk" );
        }
        if (SetFPos( fRefNum, fsFromStart, fPos ) != noErr) {
                FSClose( fRefNum );
                TGL_ERROR( "Couldn't find position in file for prefix" );
        }

        /*
         * close file and rename it
         */
        if (FSClose( fRefNum ) != noErr) {
                TGL_ERROR( "Couldn't close file" );
        }
        CtoPstr( outputFileName );
        bldRenameTempFile( outputFileName );

        /*
         * open it again, as if it were an old library
         */
        PtoCstr( outputFileName );
        libLoadLib( outputFileName, TRUE, FALSE );

        /*
         * cleanup
         */
        DisposHandle( inputTextH );
        inputTextH = NULL;
        DisposPtr( fatTableP );

        /*
         * turn the menu bar on
         */
        SetCursor( *tglCrossHairs );
        tglToggleMenu();

}


/*********************************************************************
 * bioWriteLibrary writes the names of the snips in the current library
 * into a file on the disk
 *********************************************************************/
void bioWriteLibrary( void )
{
        Point           dialogLocation;
        Int16T                  libRefNum;
```

BEST AVAILABLE COPY

```
SFReply                 fileReply;
Int32T                  count;
OSErr                   err;
DateTimeRec             date;
char                comment[100];
char                *name;
CharsPtr            namesCopy;
Int16T                  i;
char                temp[255];

/*
 * show cursor
 */
tglPushCursor();
tglCursorOnOff( TRUE );

/*
 * get the name of the file
 */
dialogLocation.v = 100;
dialogLocation.h = 150;
sfputfile( &dialogLocation, "Snip output file:", "", NULL, &fileReply );
sniRedrawScreen();

tglPopCursor();
SetCursor( *tglCrossHairs );
if (!fileReply.good) {
        return;
}

/*
 * create the file
 */
PtoCstr( (char *) fileReply.fName );
err = create( (char *) fileReply.fName, fileReply.vRefNum, '????', 'TEXT' );
if (err == dupFNErr) {
        if ( fsdelete( (char *) fileReply.fName, fileReply.vRefNum ) != noErr) {
                TGL_ERROR( "Can't delete old version of file" );
        }
        err = create( (char *) fileReply.fName, fileReply.vRefNum, '????', 'TEXT' );
}
if (err != noErr) {
        TGL_ERROR( "Couldn't create file" );
}


/*
 * open the file
 */
err = fsopen( (char *) fileReply.fName, fileReply.vRefNum, &libRefNum );
if (err != noErr ) {
        TGL_ERROR( "File open failed" );
}

/*
 * write a comment about this output
 */
GetTime( &date );
sprintf( comment, "; Snips in library \"%s,\" at %d/%d/%d %02d:%02d:%2d\r\r",
        libApLib[libCurrentLibIndex].libName, date.month, date.day, date.year,
        date.hour, date.minute, date.second );
count = strlen( comment );
err = FSWrite( libRefNum, &count, comment );
if (err != noErr) {
        TGL_ERROR( "File write failed" );
}

/*
```

BEST AVAILABLE COPY

```
 * write the name of the output file
 */
sprintf( comment, "(N) \"%s\"\r", libApLib[libCurrentLibIndex].libName );
count = strlen( comment );
err = FSWrite( libRefNum, &count, comment );
if (err != noErr) {
	TGL_ERROR( "File write failed" );
}

/*
 * write the name of the input file
 */
sprintf( comment, "(L) \"%s\"\r", libApLib[libCurrentLibIndex].libName );
count = strlen( comment );
err = FSWrite( libRefNum, &count, comment );
if (err != noErr) {
	TGL_ERROR( "File write failed" );
}


/*
 * copy the snip names to a local pointer
 */
HLock( libApLib[libCurrentLibIndex].snipNames );
count = strlen( *libApLib[libCurrentLibIndex].snipNames );
namesCopy = (CharsPtr) NewPtr( count + 1 );
strcpy( namesCopy, *libApLib[libCurrentLibIndex].snipNames );
HUnlock( libApLib[libCurrentLibIndex].snipNames );

name = strtok( namesCopy, "\r" );
for (i = 0; i < libApLib[libCurrentLibIndex].numSnips; i++) {
	sprintf( comment, "(S) \"%s\"\r", name );
	count = strlen( comment );
	err = FSWrite( libRefNum, &count, comment );
	if (err != noErr) {
		TGL_ERROR( "File write failed" );
	}
	name = strtok( NULL, "\r" );
}
DisposPtr( namesCopy );

/*
 * close the file
 */
if (FSClose( libRefNum ) != noErr) {
	TGL_ERROR( "Couldn't save file" );
}
}
```

BEST AVAILABLE COPY

```
/*******************************************************************/
/*******************************************************************/
#include "standard.h"
#include "glue.h"
#include "tglmain.h"
#include "bldBuild.h"
#include "libLibrary.h"
#include "dlgDialog.h"
#include "sniSnip.h"
#include "grfGraphics.h"
#include "snpSnapshot.h"
#include "fileAccess.h"

/*******************************************************************/
/*******************************************************************/
#define SNIP_NAME_ID   2002
#define ARE_YOU_SURE_ID    2004
#define SNIP_NAME_ITEM      3
#define      OK                  1
#define      CANCEL              2
#define      TEMP_FILE           "..ASCAN.TEMP.FILE.."
#define      BAK_EXTENSION   ".bak"


#define CHECK_OS_ERROR( ERR, MESSAGE )

        if (ERR != noErr) {                                             \

                char LOCAL[256];

                sprintf( LOCAL, "%s, error: %d", MESSAGE, ERR );        \
                TGL_ERROR( LOCAL );                                     \
        }

#define CHECK_OS_ERROR_WITH_NAME( ERR, MESSAGE, NAME )

        \
        if (ERR != noErr) {

        \
                char LOCAL[256];

        \
                sprintf( LOCAL, "%s: \"%s\", error: %d", MESSAGE, NAME, ERR );    \
                TGL_ERROR( LOCAL );
        }


/*******************************************************************/
/*******************************************************************/
static SFTypeList          BuildFileType = { 'SNLB' }; /* library-file type */


/*******************************************************************/
void bldDeleteDirectory( Int16T wdRefNum, Int32T dirId, char *name );

/*******************************************************************
 * bldOpenLibrary: opens a library using a standard file open box and
 * stores a handle to it locally.  This handle is the 'current library'
 * used by other functions in this file
 *******************************************************************/
void bldOpenLibrary( void )
{
        SFReply                fileReply;
        SFTypeList         typeList;
        Handle                 libData;
```

BEST AVAILABLE COPY

```
    CGrafPtr          oldImage = NULL;

    if (bldGetFileName( &fileReply, BuildFileType )) {
        PtoCstr( (char *) fileReply.fName );
        libData = libOpenPicLib( fileReply.vRefNum, (char *) fileReply.fName, FALS!
    }
}
```

BEST AVAILABLE COPY

```
/*******************************************************************
 * bldViewSnip: gets a snip out of the current library and displays it.
 *******************************************************************/
void bldViewSnip( void )
{
    char   name[64];
    Handle      hSnip;
    Int32T      number;
    Rect   r;
    char   label[200];
    Boolean turnMenuBackOn = FALSE;
    Rect   menuR;

    /*
     * show cursor
     */
    tglPushCursor();
    tglCursorOnOff( TRUE );
    SetCursor( &arrow );


    sprintf( label, "Display which snip from '%s'?",
        libApLib[libCurrentLibIndex].libName );
    if (dlgSelectByDialog( libApLib[libCurrentLibIndex].snipNames,
        label, libApLib[libCurrentLibIndex].numSnips,
        FALSE, name, &number )) {

        sniPutUpSnip( name );
    }


    /*
     * restore cursor
     */
    tglPopCursor();
    SetCursor( *tglCrossHairs );
}

/*******************************************************************
 * bldGetFileName puts up a dialog box to get a file name for input
 *******************************************************************/
Boolean bldGetFileName( SFReply *fileReply, SFTypeList fileType )
{
    Point       dialogLocation;

    /*
     * show cursor
     */
    tglPushCursor();
    tglCursorOnOff( TRUE );


    dialogLocation.v = 100;
    dialogLocation.h = 150;
    sfgetfile( &dialogLocation, "", NULL, 1, fileType, NULL, fileReply );
    sniRedrawScreen();

    tglPopCursor();
    SetCursor( *tglCrossHairs );
    return (fileReply->good);
```

```
}

/*********************************************************************
 * bldOpenTempFile creates a new file with a fixed name and returns
 * its librefnum.  It complains if it can't open the file.
 *********************************************************************/
void bldOpenTempFile( Int16PT libRefNumP )
{
        char            dummyString[64];
        Int16T                  vRefNum;
        OSErr                   err;
        Int32T                  byteCount;
        libFPrefixT     libPrefix;

        if (GetVol( dummyString, &vRefNum ) != noErr) {
                TGL_ERROR( "Couldn't get volume" );
        }
        err = create( TEMP_FILE, vRefNum, 'GUST', 'SNLB' );
        if (err == dupFNErr) {
                if (fsdelete( TEMP_FILE, vRefNum ) != noErr) {
                        TGL_ERROR( "Can't delete old temporary file" );
                }
                err = create( TEMP_FILE, vRefNum, 'GUST', 'SNLB' );
        }
        if (err != noErr) {
                TGL_ERROR( "Couldn't create temporary file" );
        }
        if (fsopen( TEMP_FILE, vRefNum, libRefNumP ) != noErr )
                {
                TGL_ERROR( "Temporary file open failed" );
                }

}

/*********************************************************************
 * bldRenameTempFile moves the file named 'name' to 'name.bak' and
 * then moves the temporary file to 'name'
 *
 * Name is a PASCAL string, not a C string!
 *********************************************************************/
void bldRenameTempFile( char *name )
{
        char            bakName[50];
        OSErr                   err;
        Int16T                  vRefNum;
        char            dummyString[255];

        /*
         * move the real file to '.bak', and move the temporary file
         * to the real name
         */
        if (GetVol( dummyString, &vRefNum ) != noErr) {
                TGL_ERROR( "Couldn't get volume" );
        }
        PtoCstr( name );
        sprintf( bakName, "%s%s", name, BAK_EXTENSION );
        CtoPstr( name );
        CtoPstr( bakName );

        err = Rename( name, vRefNum, bakName );
        if (err == dupFNErr) {
                if (fsdelete( bakName, vRefNum ) != noErr) {
                        TGL_ERROR( "Error deleting old backup file" );
                }
                err = Rename( name, vRefNum, bakName );
        }
```

BEST AVAILABLE COPY

```
	if ((err != noErr) && (err != fnfErr)) {
		TGL_ERROR( "Error making backup file" );
	}

	strcpy( dummyString, TEMP_FILE );
	CtoPstr( dummyString );
	if (Rename( dummyString, vRefNum, name ) != noErr ) {
		TGL_ERROR( "Error moving temporary file" );
	}
}

/**********************************************************************
 * bldCreateNewLibrary: creates a new library.
 *
 * Name is a PASCAL string, not a C string!
 **********************************************************************/
void bldCreateNewLibrary( char *name )
{
	Int32T			byteCount;
	Handle			libData;
	Int16T			OSrc;
	Int16T			libRefNum;
	OSErr			err;
	libFPrefixT		libPrefix;

	/*
	 * create the temporary file
	 */
	bldOpenTempFile( &libRefNum );

	/*
	 * set up data for an empty library
	 */
	libPrefix.Signature= libLibSignature;
	libPrefix.Version= libSysVersion;
	libPrefix.PixNum= 0;
	libPrefix.FATstart= sizeof( libFPrefixT );

	/*
	 * write data for an empty library
	 */
	byteCount= sizeof( struct libFPrefix );
	if (FSWrite( libRefNum, &byteCount, &libPrefix ) != noErr) {
		TGL_ERROR( "Write failed" );
	}

	/*
	 * close the library file and rename it
	 */
	if (FSClose( libRefNum ) != noErr) {
		TGL_ERROR( "Couldn't save temporary file" );
	}
	bldRenameTempFile( name );

	/*
	 * open it again, as if it were an old library
	 */
	PtoCstr( (char *) name );
	libData = libOpenPicLib( 0, name, FALSE );
}

void bldNewLibrary( void )
{
	SFReply			fileReply;
	Point			dialogLocation;

	/*
```

BEST AVAILABLE COPY

BEST AVAILABLE COPY

```
	 * show cursor
	 */
	tglPushCursor();
	tglCursorOnOff( TRUE );

	/*
	 * get the name of the file
	 */
	dialogLocation.v = 100;
	dialogLocation.h = 150;
	sfputfile( &dialogLocation, "New Library Name:", "", NULL, &fileReply );
	sniRedrawScreen();

	tglPopCursor();
	SetCursor( *tglCrossHairs );
	if (!fileReply.good) {
		return;
	}

	/*
	 * create the library
	 */
	bldCreateNewLibrary( (char *) fileReply.fName );
}

/*******************************************************************
 * bldAddSnip: puts the current screen snip into the current library
 *******************************************************************/
void bldAddSnipToLibrary( char *name )
{
	char		dummy[64];
	Int16T			vRefNum;
	Int16T			libRefNum;
	Handle			libH;
	libInfoPT	libInfoP;
	libFatPT	fatP;
	libFatT			fat;
	Ptr			snipP;
	Int32T			size;
	Int32T			newSizeOfLibH;
	Handle			h;
	Int32T			pixNum;
	Int32T			cBytes;
	char		temp[255];
	/*
	 * open file
	 */
	if (GetVol( dummy, &vRefNum ) != noErr) {
		TGL_ERROR( "Couldn't get volume" );
	}
	if (fsopen( libApLib[libCurrentLibIndex].libName,
			libApLib[libCurrentLibIndex].vRefNum, &libRefNum ) != noErr )
		{
		if (fileOpenWithPrepend( FILE_LIBS_DIR, libApLib[libCurrentLibIndex].libNa
			libApLib[libCurrentLibIndex].vRefNum, &libRefNum ) != noErr )
			{ TGL_ERROR( "File open failed" ); }
		}

	/*
	 * get the current snip and info for the current table (prefix
	 * and FAT entries for the library)
	 */
	sniCurrentSnip( &snipP, &size );
	libH = libApLib[libCurrentLibIndex].libData;
	HLock( libH );
	libInfoP = (libInfoPT) *libH;
	fatP = (libFatPT) (((Int32T) (*libH)) + sizeof( libInfoT ));
```

BEST AVAILABLE COPY

```
/*
 * create a FAT entry for the new snip
 */
pixNum = libInfoP->fp.PixNum;
libInfoP->fp.PixNum++;
libInfoP->fp.FATstart += size;
fat.SnipSize = size;
strcpy( fat.SnipName, name );
if (pixNum > 0) {
        fat.SnipFOffset = fatP[pixNum - 1].SnipFOffset + fatP[pixNum - 1].SnipSize;
}
else {
        fat.SnipFOffset = sizeof( libFPrefixT );
}
fat.hSnip = 0;

/*
 * add the new FAT entry to the table of FAT entries
 */
newSizeOfLibH = sizeof( libInfoT ) + sizeof( libFatT ) * (pixNum + 1);
h = NewHandle( newSizeOfLibH );
HLock( h );
BlockMove( *libH, *h, newSizeOfLibH );
HUnlock( libH );
DisposHandle( libH );
libH = h;
libInfoP = (libInfoPT) *libH;
fatP = (libFatPT) (((Int32T) (*libH)) + sizeof( libInfoT ) +
        sizeof( libFatT ) * pixNum);
BlockMove( &fat, fatP, sizeof( libFatT ));

/*
 * write the new prefix to the disk
 */
cBytes = sizeof( libFPrefixT );
if (SetFPos( libRefNum, fsFromStart, 0 ) != noErr) {
        TGL_ERROR( "Couldn't find position in file for prefix" );
}
if (FSWrite( libRefNum, &cBytes, &libInfoP->fp ) != noErr) {
        TGL_ERROR( "Couldn't write file prefix onto disk" );
}

/*
 * write the snip onto the disk
 */
if (SetFPos( libRefNum, fsFromStart, fat.SnipFOffset ) != noErr) {
        TGL_ERROR( "Couldn't find position in file for snip" );
}
if (FSWrite( libRefNum, &fat.SnipSize, snipP ) != noErr) {
        TGL_ERROR( "Couldn't write snip onto disk" );
}

/*
 * write the FAT entries to the disk
 */
cBytes = sizeof( libFatT ) * (pixNum + 1);
fatP = (libFatPT) (((Int32T) (*libH)) + sizeof( libInfoT ));
if (FSWrite( libRefNum, &cBytes, fatP ) != noErr) {
        TGL_ERROR( "Couldn't write snip table onto disk" );
}

/*
 * cleanup
 */
if (FSClose( libRefNum ) != noErr) {
        TGL_ERROR( "Couldn't close file" );
}
```

```
	HUnlock( libH );
	DisposPtr( snipP );

	/*
	 * reopen the file to get the new snip name
	 */
	libAddLibToList( libApLib[libCurrentLibIndex].libName,
		libApLib[libCurrentLibIndex].vRefNum, libH );
}


void bldAddSnip( void )
{
	DialogPtr	dialogP;
	Handle		item;
	Int16T		itemType;
	Int16T		itemHit;
	Rect		r;
	char		name[64];
	char		*pSnipNames;
	char		*pC;
	char		error[50];
	Int32T		length;

	/*
	 * show the cursor
	 */
	tglPushCursor();
	tglCursorOnOff( TRUE );
	SetCursor( &arrow );


	/*
	 * get the name of the new snip
	 */
	ParamText( "\pNew Snip Name:", "\p", "\p", "\p" );
	dialogP = GetNewDialog( SNIP_NAME_ID, NULL, (WindowPtr) -1 );
	do {
		ModalDialog( NULL, &itemHit );
	} while ((itemHit != OK) && (itemHit != CANCEL));
	GetDItem( dialogP, SNIP_NAME_ITEM, &itemType, &item, &r );
	GetIText( item, name );
	PtoCstr( name );
	DisposDialog( dialogP );

	/*
	 * restore the current buffer
	 */
	snlRedrawScreen();
	tglPopCursor();
	SetCursor( *tglCrossHairs );


	/*
	 * skip out if the name is empty
	 */
	if ((itemHit == CANCEL) || (name[0] == '\0')) {
		return;
	}
	HLock( libApLib[libCurrentLibIndex].snipNames );
	pSnipNames = *libApLib[libCurrentLibIndex].snipNames;
	pC = strstr( pSnipNames, name );
	if (pC != NULL) {

		length = strlen( name );
		if ((pC == pSnipNames) && (pC[length] == '\r')) {
			sprintf( error, "Snip \"%s\" already appears in library \"%s\"\r\r",
```

BEST AVAILABLE COPY

```
				name, libApLib[libCurrentLibIndex].libName );
			TGL_ERROR( error );
		}
		else if ((pC[-1] == '\r') && (pC[length] == '\r')) {
			sprintf( error, "Snip \"%s\" already appears in library \"%s\"\r\r",
				name, libApLib[libCurrentLibIndex].libName );
			TGL_ERROR( error );
		}
	}
	HUnlock( libApLib[libCurrentLibIndex].snipNames );
```

BEST AVAILABLE COPY

```
	/*
	 * add snip to library
	 */
	bidAddSnipToLibrary( name );
}


/*********************************************************************
 * bidDeleteSnip: removes a snip from the current library
 *********************************************************************/
void bidDeleteSnip( void )
{
	char		name[64];
	char		dummy[64];
	Int32T			number;
	Int16T			vRefNum;
	Int16T			libRefNum;
	Handle			libH;
	libInfoPT	libInfoP;
	libFatPT	fatP;
	Int32T			numBytesInLaterSnips;
	Int32T			numBytesInFat;
	Int32T			numBytesInPrefix;
	Ptr			tempP;
	Int32T			i;
	char		label[200];
	DialogPtr	dialogP;
	Int16T			itemHit;
	char		temp[255];

	/*
	 * show the cursor
	 */
	tglPushCursor();
	tglCursorOnOff( TRUE );
	SetCursor( &arrow );


	/*
	 * choose a snip to delete
	 */
	sprintf( label, "Delete which snip from '%s'?",
		libApLib[libCurrentLibIndex].libName );
	if (!dlgSelectByDialog( libApLib[libCurrentLibIndex].snipNames,
		label,libApLib[libCurrentLibIndex].numSnips,
		FALSE, name, &number )) {


		/*
		 * restore screen and cursor
		 */
		sniRedrawScreen();
		tglPopCursor();
		SetCursor( *tglCrossHairs );
		return;
```

```
}


/*
 * make sure they really want to delete it
 */
sprintf( label, "Are you sure you want to delete %s?", name );
CtoPstr( label );
ParamText( label, "\p", "\p", "\p" );
dialogP = GetNewDialog( ARE_YOU_SURE_ID, NULL, (WindowPtr) -1 );
do {
	ModalDialog( NULL, &itemHit );
} while ((itemHit != OK) && (itemHit != CANCEL));


/*
 * ditch dialog and restore cursor
 */
DisposDialog( dialogP );
sniRedrawScreen();
tglPopCursor();
SetCursor( *tglCrossHairs );

if (itemHit == CANCEL) {
	return;
}

/*
 * open file
 */
if (GetVol( dummy, &vRefNum ) != noErr) {
	TGL_ERROR( "Couldn't get volume" );
}
if (fsopen( libApLib[libCurrentLibIndex].libName,
			libApLib[libCurrentLibIndex].vRefNum, &libRefNum ) != noErr
	{
	if (fileOpenWithPrepend( FILE_LIBS_DIR, libApLib[libCurrentLibIndex].libN
		libApLib[libCurrentLibIndex].vRefNum, &libRefNum ) != noErr )
		{ TGL_ERROR( "File open failed" ); }
	}

/*
 * get info for the current table (prefix and FAT entries for the library)
 */
libH = libApLib[libCurrentLibIndex].libData;
HLock( libH );
libInfoP = (libInfoPT) *libH;
fatP = (libFatPT) (((Int32T) (*libH)) + sizeof( libInfoT ));

/*
 * correlate the name selected with a number from the FAT table
 */
for (i = 0; i < libInfoP->fp.PixNum; i++) {
	if (!strcmp( name, fatP[i].SnipName )) {
		number = i;
		break;
	}
}


/*
 * read the snips after the deleted snip into memory, but only
 * if this isn't the last snip
 */
if (number + 1 < libInfoP->fp.PixNum) {

	numBytesInLaterSnips = ((Int32T) libInfoP->fp.FATstart) -
		((Int32T) fatP[number + 1].SnipFOffset);
```

BEST AVAILABLE COPY

```
        tempP = NewPtr( numBytesInLaterSnips );
        if (SetFPos( libRefNum, fsFromStart, fatP[number+1].SnipFOffset ) != noErr)
              TGL_ERROR( "Couldn't locate snips in file" );
        }
        if (FSRead( libRefNum, &numBytesInLaterSnips, tempP ) != noErr ) {
              TGL_ERROR( "Couldn't read snips from file" );
        }
  }
  else {
        numBytesInLaterSnips = 0;
        tempP = NewPtr( 1 );
  }

  /*
   * subtract the size of the deleted snip from the offset of
   * each snip which follows it in order to compact space
   */
  for (i = number + 1; i < libInfoP->fp.PixNum; i++) {
        fatP[i].SnipFOffset -= fatP[number].SnipSize;
  }
  libInfoP->fp.FATstart -= fatP[number].SnipSize;

  /*
   * delete the FAT entry from the table of FAT entries and decrement
   * the number of pictures in the library
   */
  if (number + 1 < libInfoP->fp.PixNum) {
        BlockMove( &fatP[number+1], &fatP[number],
              sizeof( libFatT ) * (libInfoP->fp.PixNum - number - 1));
  }
  libInfoP->fp.PixNum--;

  /*
   * write new prefix out to disk
   */
  numBytesInPrefix = sizeof( libFPrefixT );
  if (SetFPos( libRefNum, fsFromStart, 0)) {
        TGL_ERROR( "Couldn't find PixNum in file" );
  }
  if (FSWrite( libRefNum, &numBytesInPrefix, &libInfoP->fp ) != noErr) {
        TGL_ERROR( "Couldn't write PixNum to file" );
  }


  /*
   * write the snips after the deleted snip back out onto the disk
   */
  if (SetFPos( libRefNum, fsFromStart, fatP[number].SnipFOffset ) != noErr) {
        TGL_ERROR( "Couldn't find position in file" );
  }
  if (FSWrite( libRefNum, &numBytesInLaterSnips, tempP ) != noErr) {
        TGL_ERROR( "Couldn't write snips to file" );
  }

  /*
   * write the new FAT out to disk
   */
  numBytesInFat = sizeof( libFatT ) * libInfoP->fp.PixNum;
  if (FSWrite( libRefNum, &numBytesInFat, fatP ) != noErr) {
        TGL_ERROR( "Couldn't write snip table to file" );
  }


  /*
   * cleanup
   */
  if (FSClose( libRefNum ) != noErr) {
        TGL_ERROR( "Couldn't close file" );
```

BEST AVAILABLE COPY

BEST AVAILABLE COPY

```
        }
        DisposPtr( tempP );
        HUnlock( libH );

        /*
         * reopen the file to get the new snip name
         */
        libAddLibToList( libApLib[libCurrentLibIndex].libName,
                libApLib[libCurrentLibIndex].vRefNum, libH );
}


/*****************************************************************
 * bldDumpLibrary: dumps out all of the snips in the current library
 * into separate snip files
 *****************************************************************/
void bldDumpLibrary( void )
{
        DialogPtr       dialogP;
        Handle                  item;
        Int16T                  itemType;
        Int16T                  itemHit;
        Rect            r;
        char            dirName[255];
        char            snipName[255];
        libFatPT        pFAT;
        Int32T                  i;
        OSErr                   err;
        SFReply                 fileReply;
        Point           dialogLocation;
        Int32T                  parentDirId;
        Int32T                  newDirId;
        Int32T                  procId;
        Int16T                  volRefNum;
        Int16T                  newWD;
        char            bakName[32];

        /*
         * show the cursor
         */
        tglPushCursor();
        tglCursorOnOff( TRUE );
        SetCursor( &arrow );


        /*
         * get the name of the directory
         */
        dialogLocation.v = 100;
        dialogLocation.h = 150;
        sfputfile( &dialogLocation, "New library to hold snips:", "", NULL, &fileReply );
        sniRedrawScreen();

        if (!fileReply.good) {

                tglPopCursor();
                SetCursor( *tglCrossHairs );
                return;
        }

        else {

                SetCursor( *tglWatch );
        }

        /*
         * read information about the current working directory in advance of creating
```

BEST AVAILABLE COPY

```
 * a new sub-directory. Standard file function SFPutFile actually returns
 * a working directory reference number in fileReply.vRefNum, not a volume
 * reference number. GetWDInfo gets information about this working directory:
 * the volume reference number of the volume the file is on, the
 * directory id of the working directory, and the procid for the working
 * directory (which I can't make heads or tails of). DirCreate expects the
 * directory id of its parent directory, and other functions will need to
 * know the volRefNum and procid.
 */
GetWDInfo( fileReply.vRefNum, &volRefNum, &parentDirId, &procid );
err = DirCreate( fileReply.vRefNum, parentDirId, fileReply.fName, &newDirId );


/*
 * If this file (named, for instance, 'myDir') already exists, then rename
 * it to 'myDir.bak'. If 'myDir.bak' already exists, then delete the old
 * 'myDir.bak' directory before renaming the old 'myDir' to 'myDir.bak'.
 * Got that?
 */
if (err == dupFNErr) {

        PtoCstr( (char *) fileReply.fName );
        sprintf( bakName, "%s%s", fileReply.fName, BAK_EXTENSION );
        CtoPstr( (char *) fileReply.fName );
        CtoPstr( bakName );
        err = HRename( volRefNum, parentDirId, fileReply.fName, bakName );


        /*
         * If there is already a backup directory ('myDir.bak'), then delete that
         * directory
         */
        if (err == dupFNErr) {


                bldDeleteDirectory( fileReply.vRefNum, parentDirId, bakName );


                /*
                 * and rename the old file again ('myDir' -> 'myDir.bak')
                 */
                err = HRename( volRefNum, parentDirId, fileReply.fName, bakName
        }


        CHECK_OS_ERROR_WITH_NAME( err, "Can't rename directory to", bakNan


        /*
         * try to create the new directory ('myDir') again
         */
        err = DirCreate( fileReply.vRefNum, parentDirId, fileReply.fName, &newDir!
}


CHECK_OS_ERROR( err, "Can't create directory" );


/*
 * Call OpenWD in order to get a working directory reference number for the nev
 * directory. This number will be passed into sniWriteOutSnip
 * as the vRefNum (a working directory reference number can always be used
 * as a vRefNum).
 */
err = OpenWD( volRefNum, newDirId, procid, &newWD );
CHECK_OS_ERROR( err, "Can't create working directory data structure" );
```

BEST AVAILABLE COPY

```
	/*
	 * draw each snip and then write it out to a file
	 */
	PtoCstr( dirName );
	HLock( libApLib[libCurrentLibIndex].libData );
	pFAT = (libFatT *) (((Int32T) *libApLib[libCurrentLibIndex].libData) + sizeof( libInf
	for (i = 0; i < libApLib[libCurrentLibIndex].numSnips; i++, pFAT++) {
		sprintf( snipName, "%s", pFAT->SnipName );
		sniPutUpSnip( pFAT->SnipName );
		HLock( libApLib[libCurrentLibIndex].libData );
		sniWriteOutSnip( snipName, newWD );
		HUnlock( libApLib[libCurrentLibIndex].libData );
	}
	HUnlock( libApLib[libCurrentLibIndex].libData );


	/*
	 * close the working directory
	 */
	err = CloseWD( newWD );
	CHECK_OS_ERROR( err, "Can't delete working directory data structure" );


	/*
	 * restore the crosshairs
	 */
	tglPopCursor();
	SetCursor( *tglCrossHairs );
}




void bldDeleteDirectory( Int16T vRefNum, Int32T parentDirId, char *subDirectoryName
{
	CInfoPBRec		parameters;
	Int32T				dirId;
	OSErr				err;
	Str255				localString;


	/*
	 * get the directory id for the directory we're trying to delete
	 */
	PtoCstr( subDirectoryName );
	strcpy( (char *) localString, subDirectoryName );
	CtoPstr( subDirectoryName );
	CtoPstr( (char *) localString );
	parameters.hFileInfo.ioCompletion	= NULL;
	parameters.hFileInfo.ioVRefNum			= vRefNum;
	parameters.hFileInfo.ioFVersNum			= 0;
	parameters.hFileInfo.ioFDirIndex	= 0;
	parameters.hFileInfo.ioDirID		= parentDirId;
	parameters.hFileInfo.ioNamePtr			= localString;
	err							= PBGetCatInfo( &parameters
	dirId							= parameters.hFileInfo.ioDirI[


	/*
	 * loop through each file (or directory) in the current directory. Get enough
	 * information for each file to be able to delete it, and then delete it. We're
	 * through when the call to get information returns a file not found error.
	 */
	while( TRUE ) {
```

BEST AVAILABLE COPY

```
        /*
         * get information about the i'th file
         */
        parameters.hFileInfo.ioFDirIndex      = 1;
        parameters.hFileInfo.ioDirID          = dirId;
        err = PBGetCatInfo( &parameters, FALSE );


        /*
         * file-not-found error indicates that there are no more files in the
         * directory (we're done)
         */
        if (err == fnfErr) {

                break;
        }
        else {

                CHECK_OS_ERROR( err, "Couldn't get file info" );
        }


        /*
         * if it's a directory, recursively delete it
         */
        if (parameters.hFileInfo.ioFlAttrib & 0x10) {


                bldDeleteDirectory( vRefNum, dirId, (char *) parameters.hFileInfo.ioI
        }


        /*
         * if it's a file, delete it
         */
        else {

                err = HDelete( vRefNum, dirId, parameters.hFileInfo.ioNamePtr );
                PtoCstr( (char *) parameters.hFileInfo.ioNamePtr );
                CHECK_OS_ERROR_WITH_NAME( err, "Couldn't delete", parameters
                CtoPstr( (char *) parameters.hFileInfo.ioNamePtr );
        }
    }


    /*
     * make sure to delete the empty sub-directory also
     */
    err = HDelete( vRefNum, parentDirId, subDirectoryName );
    PtoCstr( (char *) subDirectoryName );
    CHECK_OS_ERROR_WITH_NAME( err, "Couldn't delete", subDirectoryName );
    CtoPstr( subDirectoryName );

}
```

BEST AVAILABLE COPY

```
#include "standard.h"
#include "EventHandlers.h"
#include "tglmain.h"
#include "snpSnapshot.h"

#define ABOUT_ID       1010

/************************************************************************
 * ISnipEH initializes a CAscanEH.
 ************************************************************************/
void CAscanEH::IAscanEH( void )
{

      inherited::IEventHandler();

}



/************************************************************************
 * StartHandler sets up the initial menu configuration and starts the
 * Scan handler
 ************************************************************************
void CAscanEH::StartHandler( void )
{
      /*
       * start a generic EventHandler
       */
      inherited::StartHandler();


      /*
       * initialize the menus
       */
      SetItem( tglFileMenuH, TGL_MODE_ITEM, "\pSnip Mode" );
      EnableItem( tglAppleMenuH, 0 );
      EnableItem( tglFileMenuH, 0 );
      DisableItem( tglEditMenuH, 0 );
      DisableItem( tglSnipMenuH, 0 );
      DisableItem( tglBuildMenuH, 0 );


      /*
       * draw menu
       */
      if (tglMenuVisible) {

            DrawMenuBar();
      }

}



/************************************************************************
 * TurningMyselfOff checks to see who's turning off, and turns the other
 * one on.
 ************************************************************************/
void CAscanEH::TurningMyselfOff( CEventHandler *whoAmI )
{

      if (whoAmI == tglScanGopher) {

            tglSnipGopher->StartHandler();
      }
      else {
```

```
        tglScanGopher->StartHandler();
    }
}
```

BEST AVAILABLE COPY

```
/**********************************************************************
 * KeyDown handles the 'Pause' key
 **********************************************************************/
Boolean CAscanEH::KeyDown( EventRecord myEvent )
{

    return (inherited::KeyDown( myEvent ));
}


/**********************************************************************
 * DoCommand handles commands whether from the menu or by keyboard
 * equivalent. The default method handles generic sorts of things:
 *
 *    - all of the Apple menu, including "About Ascan" and the DA's
 *    - some of the File menu, including "Quit" and the three toggle items:
 *          one screen or two, menu visible or not and cursor visible or not
 *
 **********************************************************************/
Boolean CAscanEH::DoCommand( Int16T menuId, Int16T menuItem, Int32T modifiers )
{
    char        name[50];
    CGrafPtr    oldImage;

    switch (menuId) {


        /*
         * APPLE MENU
         */
        case TGL_APPLE_MENU_ID:

            switch (menuItem) {


                case TGL_ABOUT_ITEM:

                    oldImage = snpSaveBoxUnderDialog( ABOUT_ID, 'ALRT'
                    Alert( ABOUT_ID, NULL );
                    snpRestoreBoxUnderDialog( &oldImage );

                    return (FALSE);


                default:

                    GetItem( tglAppleMenuH, menuItem, name );
                    OpenDeskAcc( name );
                    return (FALSE);
            }
            break;


        /*
         * FILE MENU
         */
        case TGL_FILE_MENU_ID:

            switch (menuItem) {
```

```
case TGL_TOGGLE_MENU_BAR_ITEM:

        tglToggleMenu();
        return (FALSE);


case TGL_TOGGLE_CURSOR_ITEM:

        tglCursorOnOff( !tglCursorVisible );
        return (FALSE);


case TGL_TWO_SCREENS_ITEM:

        tglToggleScreens();
        return (FALSE);


/*
 * Quit
 */
case TGL_QUIT_ITEM:

        return (TRUE);
        }
        break;
    }

    return (FALSE);
}
```

BEST AVAILABLE COPY

BEST AVAILABLE COPY

```
#include "standard.h"
#include "CATCalcEH.h"
#include "clcCalculator.h"
#include "tglmain.h"
#include "tchtouch.h"

/*************************************************************************
 * IATCalcEH initializes a CATCalcEH.
 ************************************************************************/
void CATCalcEH::IATCalcEH( void )
{

        inherited::IEventHandler();

}

/**********************************************************************
 * StartHandler sets up the touch areas for the AT calculator
 *********************************************************************/
void CATCalcEH::StartHandler( void )
{

        inherited::StartHandler();


        /*
         * show the calculator
         */
        clcATShowNumPad();


        /*
         * set up the touches
         */
        tchPushTouches( &tglScreenRect );
        tchClrTouchAreas();
        clcATActivateNumPad();
}

/*****************************************************************
 * StopHandler turns off the AT calculator touches
 *****************************************************************/
void CATCalcEH::StopHandler( void )
{

        /*
         * remove the touches
         */
        tchPopTouches();

        inherited::StopHandler();
}



/**********************************************************************
 * KeyDown catches keys which should work on the AT calculator
 *********************************************************************/
Boolean CATCalcEH::KeyDown( EventRecord myEvent )
{

        /*
         * 'clear' key
         */
        if ((myEvent.message & keyCodeMask) == 0x4700) {
```

```
        clcATNumPad( 'C' );
    }


    /*
     * 'enter' key
     */
    else if ((myEvent.message & keyCodeMask) == 0x4C00 ) {

        clcATNumPad( '=' );
    }


    /*
     * number or +, -, *, /, %, . and = keys
     */
    switch (myEvent.message & charCodeMask) {

        case '0':
        case '1':
        case '2':
        case '3':
        case '4':
        case '5':
        case '6':
        case '7':
        case '8':
        case '9':
        case '-':
        case '+':
        case '*':
        case '/':
        case '%':
        case '.':
        case '=':

            clcATNumPad( myEvent.message & charCodeMask );
    }

    return (FALSE);
}


/*************************************************************************
 * MouseDown reacts to touch areas
 *************************************************************************/
Boolean CATCalcEH::MouseDown( Point where, Int32T modifiers )
{

    /*
     * check to see if a button was touched
     */
    if (tchTouchHandler( &where )) {

        /*
         * if the clcATNumPad returns FALSE, then either there was
         * an error, of the user closed the calculator
         */
        if (!clcATNumPad( ' ' )) {
```

BEST AVAILABLE COPY

```
            StopHandler();
        }
    }

    return (FALSE);
}
```

BEST AVAILABLE COPY

CATCalcEH.c

```
#include "standard.h"
#include "CClickEH.h"
#include "tglmain.h"
#include "tchtouch.h"

/***********************************************************************
 * IClickEH initializes a CClickEH.
 ***********************************************************************/
void CClickEH::IClickEH( void )
{

        inherited::IEventHandler();

}


/***********************************************************************
 * MouseDown reacts to the mouse
 ***********************************************************************/
Boolean CClickEH::MouseDown( Point where, Int32T modifiers )
{

        /*
         * if we touched a valid touch area then exit
         */
        if (tchTouchHandler( &where )) {

                StopHandler();
                return (TRUE);
        }


        /*
         * otherwise, keep going
         */
        else {

                return (FALSE);
        }
}


/***********************************************************************
 * KeyDown disables the 'enter' button so that if we're in single step
 * mode, the enter button won't drop us through
 ***********************************************************************/
Boolean CClickEH::KeyDown( EventRecord myEvent )
{

        /*
         * enter key
         */
        if ((myEvent.message & keyCodeMask) == 0x4C00) {

                return (FALSE);
        }

        return (inherited::KeyDown( myEvent ));
}
```

BEST AVAILABLE COPY

BEST AVAILABLE COPY

```
#include "standard.h"
#include "CCursiveEH.h"
#include "tchTouch.h"
#include "tglMain.h"

/************************************************************************
 * ICursiveEH initializes a CCursiveEH.
 ************************************************************************/
void CCursiveEH::ICursiveEH( void )
{

	inherited::IEventHandler();

}

/************************************************************************
 * StartHandler sets up the instance variables
 ************************************************************************/
void CCursiveEH::StartHandler( void )
{

	inherited::StartHandler();


	/*
	 * set the variables
	 */
	PenDown = FALSE;
	GetMouse( &MousePoint );

}



/************************************************************************
 * MouseUp means that the user lifted his finger off the screen
 ************************************************************************/
Boolean CCursiveEH::MouseUp( Point where, Int32T modifiers )
{

	/*
	 * if the mouse is in a valid touch area, then leave
	 */
	if (tchValidTouch( &MousePoint )) {

		tchTouchHandler( &MousePoint );
		StopHandler();
	}


	PenDown = FALSE;
	return (FALSE);
}

/************************************************************************
 * EveryCycle does something every cycle. In this case, it responds to
 * the user writing his name with his finger
 ************************************************************************/
Boolean CCursiveEH::EveryCycle( void )
{
	Point mouseLoc;

	/*
	 * if the pen is down, then draw between the last point
	 * and the current one
	 */
	if (PenDown) {
```

```
        RgnHandle originalRegion;
        Rect paperRect;

        originalRegion = NewRgn();
        GetClip( originalRegion );
        TGL_SETRECT( &paperRect, 24, 73, 608, 417 );
        ClipRect( &paperRect );

        MoveTo( MousePoint.h, MousePoint.v );
        GetMouse( &MousePoint );
        PenSize( 3, 3);
        LineTo( MousePoint.h, MousePoint.v );
        SetClip( originalRegion );
    }

    /*
     * otherwise, If the user touches somewhere, put the pen down and
     * store the new position
     */
    else {

        mouseLoc = MousePoint;
        GetMouse( &MousePoint );
        if ((mouseLoc.v != MousePoint.v) || (mouseLoc.h != MousePoint.h)) {
            PenDown= TRUE;
        }
    }

    return (FALSE);
}
```

BEST AVAILABLE COPY

```
#include "standard.h"
#include "CEditEH.h"
#include "edtEdit.h"

/* Beep generation structure: this is a copy of the one in tchTouch.c */
static struct
{
  Int16T   mode;
  Tone    beep;
}  ShortBadBeep
=
{
  swMode,
  { 3709, 100, 4 }
};

/*********************************************************************
 * IEditEH initializes a CEditEH.
 *********************************************************************/
void CEditEH::IEditEH( void )
{

      inherited::IEventHandler();

}


/*********************************************************************
 * EditSetup prepares for text input
 *********************************************************************/
void CEditEH::EditSetup( Point        tgt,
                                     char         *iniText,
                                     Boolean      useFormat,
                                     Int32T           varNum,
                                     Boolean      secondScreen,
                                     char         justify,
                                     Boolean      commas,
                                     Boolean      euroStyle,
                                     Int32T           length,
                                     Int32T           decimals,
                                     Boolean      forceLength,
                                     Boolean      forceDecimals,
                                     char         floatingID,
                                     Rect         *EditRect )
{

      edtEditSetup( tgt,
                         iniText,
                         useFormat,
                         varNum,
                         secondScreen,
                         justify,
                         commas,
                         euroStyle,
                         length,
                         decimals,
                         forceLength,
                         forceDecimals,
                         floatingID, EditRect );

}

/*********************************************************************
 * KeyDown adds a character to the current edit environment
 *********************************************************************/
Boolean CEditEH::KeyDown( EventRecord myEvent )
      {
```

BEST AVAILABLE COPY

```
char thisChar;

/* process it if it's a normal character */
thisChar = myEvent.message & charCodeMask;
if ( ( thisChar >= 0x20 && thisChar <= 0x8e ) ||
    ( thisChar == 0x03 ) || /* ETX, the enter key on the numeric keypad */
    ( thisChar == 0x08 ) || /* BS */
    ( thisChar == 0x09 ) || /* HT */
    ( thisChar == 0x0d ) || /* CR */
    ( thisChar == 0x1b ) || /* ESC */
    ( thisChar == 0x1c ) || /* FS */
    ( thisChar == 0x1d ) || /* GS */
    ( thisChar == 0x1e ) || /* RS */
    ( thisChar == 0x1f ) ) /* US */
        edtEditAction( thisChar );

/* otherwise pass it to my supervisor */
else inherited::KeyDown( myEvent );

return (FALSE);

}

/*******************************************************************
 * MouseDown handles mouse down events. Pretend that the user hit return.
 *******************************************************************/
Boolean CEditEH::MouseDown( Point where, Int32T modifiers )
{

    edtEditAction( '\r' );
    StartSound( (Ptr) &ShortBadBeep, 8L, (Ptr) -1 );

    return (FALSE);
}

/*******************************************************************
 * EveryCycle blinks the cursor every cycle
 *******************************************************************/
Boolean CEditEH::EveryCycle( void )
{

    TEIdle( edtHEdit );
    return (FALSE);

}
```

BEST AVAILABLE COPY

BEST AVAILABLE COPY

```
#include "standard.h"
#include "EventHandlers.h"
#include "tglmain.h"

/**********************************************************************
 * IEventHandler initializes an EventHandler. The default method sets its
 * own supervisor to point to nothing.
 **********************************************************************/
void CEventHandler::IEventHandler( void )
{

        itsSupervisor = NULL;

}


/**********************************************************************
 * Cleanup cleans up an EventHandler.  The default method doesn't have
 * anything to clean up
 **********************************************************************/
void CEventHandler::Cleanup( void )
{
}


/**********************************************************************
 * StartHandler sets up this handler when it's started.  The default is
 * just to set the gopher.
 **********************************************************************/
void CEventHandler::StartHandler( void )
{

        /*
         * set up my supervisor
         */
        itsSupervisor = tglGopher;


        /*
         * make me the first event handler in the chain
         */
        tglGopher = this;

}


/**********************************************************************
 * StopHandler resets this handler when it's stopped
 **********************************************************************/
void  CEventHandler::StopHandler( void )
{

        /*
         * take myself out of the event chain
         */
        tglGopher = itsSupervisor;


        /*
         * tell my supervisor that I'm out of business
         */
        if (itsSupervisor != NULL) {
                itsSupervisor->TurningMyselfOff( this );
        }

}
```

```
/**********************************************************************
 * TurningMyselfOff tells an EventHandler that a subservient event handler
 * has gone away, and allows this handler to do something about it.
 **********************************************************************/
void CEventHandler::TurningMyselfOff( CEventHandler *whoAmI )
{
}
```

BEST AVAILABLE COPY

```
/**********************************************************************
 * MouseDown handles mouse down events for an EventHandler. The default
 * method doesn't know anything about the mouse.
 **********************************************************************/
Boolean CEventHandler::MouseDown( Point where, Int32T modifiers )
{
	return (FALSE);
}


/**********************************************************************
 * MouseUp handles mouse up events for an EventHandler. The default
 * method doesn't know anything about the mouse.
 **********************************************************************/
Boolean CEventHandler::MouseUp( Point where, Int32T modifiers )
{
	return (FALSE);
}


/**********************************************************************
 * KeyPressed handles non-command keys. The default is to pass the
 * question to the supervisor
 **********************************************************************/
Boolean CEventHandler::KeyDown( EventRecord myEvent )
{
	return (itsSupervisor->KeyDown( myEvent ));
}


/**********************************************************************
 * DoCommand handles commands. The default action is to pass the command
 * to the supervisor
 **********************************************************************/
Boolean CEventHandler::DoCommand( Int16T menuId, Int16T menuItem, Int32T modifi
{

	return (itsSupervisor->DoCommand( menuId, menuItem, modifiers ));

}

/**********************************************************************
 * Idle does something when the mac didn't generate an event.
 * The default version doesn't do anything
 **********************************************************************/
Boolean CEventHandler::Idle( void )
{
	return (FALSE);
}
```

```
/***********************************************************************
 * EveryCycle does something in every cycle through the main loop.
 * The default version doesn't do anything
 ***********************************************************************/
Boolean CEventHandler::EveryCycle( void )
{
	return (FALSE);
}


/***********************************************************************
 * Draw draws whatever is reasonable for the current event handler
 * The default version doesn't do anything
 ***********************************************************************/
void CEventHandler::Draw( void )
{
}


/***********************************************************************
 * Suspend is called when a Multi-Finder suspend event happens
 ***********************************************************************/
void CEventHandler::Suspend( void )
{

	if (itsSupervisor != NULL) {

		itsSupervisor->Suspend();
	}
}


/***********************************************************************
 * Resume is called when a Multi-Finder resume event happens
 ***********************************************************************/
void CEventHandler::Resume( void )
{
	if (itsSupervisor != NULL) {

		itsSupervisor->Resume();
	}
}
```

BEST AVAILABLE COPY

BEST AVAILABLE COPY

```
/**********************************************************************
 *
  GRAPHIC CALCULATOR subroutines; Chile version
  The Chilean telephone also lives here.
*********************************** :**********************************
*/


#include     "standard.h"
#include     "glue.h"
#define      APP_CHILE
#include     "varFns.h"
#include     "tglMain.h"
#include     "clcCalculator.h"
#include     "libLibrary.h"
#include     "tchTouch.h"
#include     "chfLoanFns.h"
#include     "grfGraphics.h"
#include     "format.h"
#include     "scrScreen.h"
#include     "snpSnapshot.h"


/*calculator units */
static BooleanT    bValueIsPesos;

/* placement point for calculator snip */
#define NUMPAD_H       200
#define NUMPAD_V       200

/* telephone display points, with full-space snip points */
Point PhoneDigiSpots[]={
  183, 228,
  180, 243,
  178, 259,
  176, 275,
  174, 290,
  172, 306,
  170, 322,
  168, 338,
  167, 353,
  166, 369
 };

/* AT calculator variables */
Real80T          ATCalcOldValue                = 0.0;            /* left side of bina
char       ATCalcCurrentValueS[20] = { "0" };   /* value currently on screen */
Boolean          ATCalcFoundDecimal            = FALSE;    /* already found dec nur
Boolean          ATCalcRestartNumber      = TRUE;            /* true after any operat

char       ATCalcOperator               = 'E';        /* last operator seen */
Boolean          ATJustHadOp            = FALSE;      /* last button was an operator
Int32T           ATDigitCount           = 0;          /* number of digits in current r
CGrafPtr   ATSnipUnderCalc              = NULL;
Point      ATCalcOrigin                 = { 82 - 130, 117 - 143 };

Int32T           calcVar;               /* active variable number; should be kept f
BooleanT         bPesosValid;           /* stored value in savedPesos is still valid */
Real80T          savedPesos;            /* peso value stored upon currency switch t
Int32T           phoneVar;              /* active variable number; always keep forr

char   szTouch[ 100 ];          /* string to hold touch return value */

/**********************************************************************
/**********************************************************************
void   clcATShowVal(      char *input );
Boolean clcStripNumber( char *input, char *output );
void   clcStripTrailingZeros( char *string );
```

BEST AVAILABLE COPY

```
/***********************************************************************
/***********************************************************************
#define FIND_PIC_PTR( HSNIP, NAME )                                        \
       HSNIP = libFindPicPtr( NAME, TRUE );                       \
       if (HSNIP == NULL) {                                                \
              char   ERROR[50];                                            \
              sprintf( ERROR, "Couldn't find %s", NAME );              \
              TGL_ERROR( ERROR );
       }

/***********************************************************************
****
SHOW VAL
***********************************************************************
***/
void clcShowVal( )
{
       char   szTemp[ 30 ], szValue[ 30 ];
       char   Name[32];
       Int16T        i, pos, increment;
       Handle        hSnip;
       Point  spot;

       /* get the value into the right currency */

       chfPutMoney( szTemp,
                      chfGetMoney( varPtr( calcVar) ),
                      (bValueIsPesos) ? CUR_ALT_PESO: CUR_ALT_UF );


       sprintf( szValue, "%13.13s", szTemp );

       FIND_PIC_PTR( hSnip, "CalcWindow.s" );
       grfMDrawPic( hSnip, NULL, 0 );

       if( bValueIsPesos )
              {
              FIND_PIC_PTR( hSnip, "ClearCalc.$.s" );
              grfMDrawPic( hSnip, NULL, 0 );
              }
       else
              {
              FIND_PIC_PTR( hSnip, "ClearCalc.UF.s" );
              grfMDrawPic( hSnip, NULL, 0 );
              }

       pos= 0;
       for( i= strlen( szValue ) - 1; i >= 0; i--)
              {
              switch( szValue[ i ] )
                {
                case '0':
                case '1':
                case '2':
                case '3':
                case '4':
                case '5':
                case '6':
                case '7':
                case '8':
                case '9':
                       sprintf( Name, "ClearCalc.%c.s", szValue[i] );
                       FIND_PIC_PTR( hSnip, Name );
                       increment= 2;
                       break;

                case '$': /* don't float */
```

BEST AVAILABLE COPY

```
            FIND_PIC_PTR( hSnip, "ClearCalc.$.s" );
                increment= 2;
                break;

        case ' ':
                FIND_PIC_PTR( hSnip, "ClearCalc.b.s" );
                increment= 2;
                break;

        case '.':
        case ',':
                FIND_PIC_PTR( hSnip, "ClearCalc.,.s" );
                increment= 1;
                break;

        default:
                /* error */
        break;
    }


      pos += increment;
      spot.v= 109 + pos;
      spot.h= 411 - 7 * pos;
      grfDrawPic( hSnip, &spot );
      }

    return;
}


/*********************************************************************
****
S H O W  N U M  P A D -- shows initial calculator; does all set up except touches
*********************************************************************
***/
void clcShowNumPad( varNum )
    Int32T      varNum;
{
    Handle      hSnip;

    FIND_PIC_PTR( hSnip, "big.calc.s" );
    grfMDrawPic( hSnip, NULL, 0 );

    FIND_PIC_PTR( hSnip, "ClearCalc.$.s" );
    grfMDrawPic( hSnip, NULL, 0 );


    calcVar= varNum;              /* remember active variable */

    /* start the calculator with the currency of the target variable */
    bValueIsPesos= (NULL != strchr( varPtr( calcVar), '$' ));

    varSetS( calcVar, "");                    /* clear variable before use */

    if( 1 == varVal( vcCalcSwitch ))         /* currency switch on? */
        {
        if( bValueIsPesos )
            {
            bPesosValid= FALSE;                          /* saved value is cc
            savedPesos= 0;
            FIND_PIC_PTR( hSnip, "ClearCalc.$.s" );
            grfMDrawPic( hSnip, NULL, 0 );

            FIND_PIC_PTR( hSnip, "UF.switch.s" );
            grfMDrawPic( hSnip, NULL, 0 );
            }
        else
```

```
                {
                bPesosValid= FALSE;                    /* saved value is r

                FIND_PIC_PTR( hSnip, "ClearCalc.UF.s" )
                grfMDrawPic( hSnip, NULL, 0 );

                FIND_PIC_PTR( hSnip, "$.switch.s" )
                grfMDrawPic( hSnip, NULL, 0 );
                }
            }

    clcShowVal();

    return;
}

/**********************************************************************
****
ACTIVATE NUM PAD - enable touch areas
**********************************************************************
***/
void clcActivateNumPad( void )
{
    Rect    r;

    /*          left, top, right, bottom            */
    TGL_SETRECT( &r, 203, 196, 248, 244 );      /* 1 */
    tchTouchDef( &r, szTouch, "!1" );
    TGL_SETRECT( &r, 292, 180, 344, 231 );      /* 2 */
    tchTouchDef( &r, szTouch, "!2" );
    TGL_SETRECT( &r, 388, 169, 436, 223 );      /* 3 */
    tchTouchDef( &r, szTouch, "!3" );
    TGL_SETRECT( &r, 212, 255, 261, 308 );      /* 4 */
    tchTouchDef( &r, szTouch, "!4" );
    TGL_SETRECT( &r, 308, 245, 354, 295 );      /* 5 */
    tchTouchDef( &r, szTouch, "!5" );
    TGL_SETRECT( &r, 401, 232, 446, 286 );      /* 6 */
    tchTouchDef( &r, szTouch, "!6" );
    TGL_SETRECT( &r, 226, 326, 276, 374 );      /* 7 */
    tchTouchDef( &r, szTouch, "!7" );
    TGL_SETRECT( &r, 313, 314, 363, 365 );      /* 8 */
    tchTouchDef( &r, szTouch, "!8" );
    TGL_SETRECT( &r, 410, 303, 456, 359 );      /* 9 */
    tchTouchDef( &r, szTouch, "!9" );
    TGL_SETRECT( &r, 328, 386, 372, 433 );      /* zero */
    tchTouchDef( &r, szTouch, "!0" );

    TGL_SETRECT( &r, 220, 384, 320, 454 );      /* clear */
    tchTouchDef( &r, szTouch, "!C" );

    TGL_SETRECT( &r, 387, 369, 471, 435 );      /* next */
    tchTouchDef( &r, szTouch, "!N" );

    if( 1 == varVal( vcCalcSwitch ))
        {
        TGL_SETRECT( &r, 68, 130, 161, 210 ); /* currency switch */
        tchTouchDef( &r, szTouch, "!S" );
        }

    szTouch[ 0 ]= '\0';
    return;
}

/**********************************************************************
***
NUM PAD
```

```
*********************************************************************
**/
BooleanT clcNumPad( )
{
	char	Name[32];
	Handle	hSnip;
	char	T;
	Real80T	Val;
	char	szTemp[ 100 ];


	Val= chfMakeReal( varPtr( calcVar ) );

	/* normal labels start with a colon, not an exclamation point */

	if( szTouch[0] != '!' )
		return( FALSE );

	T= szTouch[1] ;
	szTouch[ 0 ]= '\0';			/* always clear this guy after use */

	switch( T )
		{
		case '0':
		case '1':
		case '2':
		case '3':
		case '4':
		case '5':
		case '6':
		case '7':
		case '8':
		case '9':
			/*  don't allow numbers that will blow our boolean evaluator (10 dig
			if ( Val < 1.0e8 )
				{
				/* BeepNow( GOOD_BEEP ); */
				Val *=  10.0;
				if( T != '0' )
					Val +=  (Real80T) (T - '0') ;
				}
			else
				{
				/*	BeepNow( BAD_BEEP ); */
				}

			/* hilite */
			sprintf( Name, "CalcButton!.%c.s", T);
			FIND_PIC_PTR( hSnip, Name  )
			grfDrawPic( hSnip, NULL );



			if( bValueIsPesos )
				{
				bPesosValid= TRUE;
				savedPesos= Val;

				sprintf( szTemp, "$ %.0lf", Val );	/* make parseable by chf
				chfPutMoney( varPtr( calcVar ),
						chfGetMoney( szTemp ),
						CUR_PESO);
				}
			else
				{
				bPesosValid= FALSE;

				sprintf( szTemp, "%.0lf UF", Val );	/* make parseable by chf
```

```
                    chfPutMoney( varPtr( calcVar ),
                                chfGetMoney( szTemp ),
                                CUR_UF);
                    }
```

BEST AVAILABLE COPY

```
            clcShowVal();

            /* unhilite */
            sprintf( Name, "CalcButton.%c.s", T );
            FIND_PIC_PTR( hSnip, Name  )
            grfDrawPic( hSnip, NULL );

            return TRUE;
            break;

        case 'C':   /* the clear key */
            bPesosValid= FALSE;

            FIND_PIC_PTR( hSnip, "ClearButton!.s" )
            grfDrawPic( hSnip, NULL );

            /* BeepNow( GOOD_BEEP ); */

            chfPutMoney( varPtr( calcVar),
                        (Real80T) 0.0,
                        (bValueIsPesos) ? CUR_PESO: CUR_UF );

            clcShowVal( );
            FIND_PIC_PTR( hSnip, "ClearButton.s" )
            grfDrawPic( hSnip, NULL );

            return TRUE;
            break;

        case 'N':   /* the enter key */
            /* BeepNow( GOOD_BEEP ); */

            FIND_PIC_PTR( hSnip, "EnterButton!.s" )
            grfDrawPic( hSnip, NULL );

            clcShowVal( );

            FIND_PIC_PTR( hSnip, "EnterButton.s" )
            grfDrawPic( hSnip, NULL );

            return FALSE;
            break;

        case 'S':   /* currency switch (touch enabling controled by vcCalcSwitch) *

            bValueIsPesos = !bValueIsPesos;

            FIND_PIC_PTR( hSnip, "switch!.s" )

            /* egads! I don't have a real "wait" function */
            {
            Int16T      i;

            for( i=0; i < 20; i++ )
                {
                grfMDrawPic( hSnip, NULL, 0 );
                }
            }

            if( bValueIsPesos )
                {
                FIND_PIC_PTR( hSnip, "ClearCalc.$.s" )
```

BEST AVAILABLE COPY

```
                    grfMDrawPic( hSnip, NULL, 0 );

                    FIND_PIC_PTR( hSnip, "UF.switch.s" )
                    grfMDrawPic( hSnip, NULL, 0 );

                    /*
                    to avoid the emabarassment of having the user see the round
                    after entering a peso value, switching to UFs, and switching b:
                    pesos, we store the last peso value and restore it (in the case v
                    the user did not make any changes while in the UF mode) – H
                    */
                    if( bPesosValid )
                        Val= savedPesos;
                    else
                        Val= chfGetMoney( varPtr( calcVar) );

                    chfPutMoney( varPtr( calcVar), Val, CUR_PESO );

                    }
                else
                    {
                    FIND_PIC_PTR( hSnip, "ClearCalc.UF.s" )
                    grfMDrawPic( hSnip, NULL, 0 );

                    FIND_PIC_PTR( hSnip, "$.switch.s" )
                    grfMDrawPic( hSnip, NULL, 0 );

                    Val= chfGetMoney( varPtr( calcVar) );
                    chfPutMoney( varPtr( calcVar), Val, CUR_UF );
                    }

                clcShowVal( );
                return( TRUE );
                break;

            default:
                break;
            }

    return FALSE;           /* shouldn't get here */
}


/*********************************************************************
****
 PHONE S H O W  V A L
*********************************************************************
***/
void clcPhoneShowVal( void )
{
    char   szValue[ 30 ];
    char   Name[32];
    Int16T      i;
    Handle      hSnip;

    /* format variable */
    sprintf( szValue, "%9.9s", varPtr( phoneVar) );

    FIND_PIC_PTR( hSnip, "PhoneWindow.s" )
    grfMDrawPic( hSnip, NULL, 0 );

    for( i= 0 ; szValue[ i ]; i++)
        {
        switch( szValue[ i ] )
          {
          case '0':
          case '1':
          case '2':
```

BEST AVAILABLE COPY

```
            case '3':
            case '4':
            case '5':
            case '6':
            case '7':
            case '8':
            case '9':
                    sprintf( Name, "phone.%c.s", szValue[i] );
                    FIND_PIC_PTR( hSnip, Name  )
                    break;

            case ' ':
                    FIND_PIC_PTR( hSnip, "phone.b.s" )
                    break;

            default:
                    /* error */
            break;
            }

          grfDrawPic( hSnip, &PhoneDigiSpots[ i ] );
          }

      return;
}

/*********************************************************************
****
SHOW  T E L E P H O N E -- do all setup except touch areas
*********************************************************************
***/
void clcShowPhonePad( varNum )
      Int32T        varNum;
{
      Rect   r;
      Handle       hSnip;

      phoneVar= varNum;                   /* remember which variable we're using */
      varSetS( phoneVar, "" );

      FIND_PIC_PTR( hSnip, "phone.s" )
      grfMDrawPic( hSnip, NULL, 0 );

      clcPhoneShowVal( );

      return;
}

/*********************************************************************
****
ACTIVATE  T E L E P H O N E --  activate touch areas
*********************************************************************
***/
void clcActivatePhonePad( void )
{
      Rect   r;

      /* left, top, right, bottom */
      TGL_SETRECT( &r, 251, 221, 300, 270 );      /* 1 */
      tchTouchDef( &r, szTouch, "!1" );
      TGL_SETRECT( &r, 317, 213, 367, 263 );      /* 2 */
      tchTouchDef( &r, szTouch, "!2" );
      TGL_SETRECT( &r, 383, 209, 433, 259 );      /* 3 */
      tchTouchDef( &r, szTouch, "!3" );
      TGL_SETRECT( &r, 265, 277, 315, 327 );      /* 4 */
      tchTouchDef( &r, szTouch, "!4" );
```

BEST AVAILABLE COPY

```
    TGL_SETRECT( &r, 332, 270, 382, 320 );      /* 5 */
    tchTouchDef( &r, szTouch, "!5" );
    TGL_SETRECT( &r, 403, 266, 453, 316 );      /* 6 */
    tchTouchDef( &r, szTouch, "!6" );
    TGL_SETRECT( &r, 282, 334, 332, 384 );      /* 7 */
    tchTouchDef( &r, szTouch, "!7" );
    TGL_SETRECT( &r, 350, 328, 400, 438 );      /* 8 */
    tchTouchDef( &r, szTouch, "!8" );
    TGL_SETRECT( &r, 423, 323, 473, 373 );      /* 9 */
    tchTouchDef( &r, szTouch, "!9" );
    TGL_SETRECT( &r, 362, 381, 412, 431 );      /* zero */
    tchTouchDef( &r, szTouch, "!0" );

    TGL_SETRECT( &r, 270, 390, 370, 440 );      /* clear */
    tchTouchDef( &r, szTouch, "!C" );

    TGL_SETRECT( &r, 421, 375, 515, 430 );      /* next */
    tchTouchDef( &r, szTouch, "!N" );

    return;
}

/*********************************************************************
***
NUM PAD
*********************************************************************
**/
BooleanT clcPhonePad( void )
{
    char   Name[32];
    Handle      hSnip;
    char   T;
    char szTemp[20];

    /* normal labels start with a colon, not an exclamation point */

    if( szTouch[0] != '!' )
        return( FALSE );

    T= szTouch[1];
    szTouch[0]= '\0';

    switch( T )
        {
        case '0':
        case '1':
        case '2':
        case '3':
        case '4':
        case '5':
        case '6':
        case '7':
        case '8':
        case '9':

            if( strlen( varPtr( phoneVar)) <= 9 )
                {
                sprintf( szTemp, "%s%c", varPtr( phoneVar ), T );
                }
            else
                {
                /*      BeepNow( BAD_BEEP ); */
                sprintf( szTemp, "%s", varPtr( phoneVar ));
                }

            varSetS( phoneVar, szTemp );

            /* hilite */
```

BEST AVAILABLE COPY

```
			sprintf( Name, "PhoneButton%c!.s", T);
			FIND_PIC_PTR( hSnip, Name )
			grfDrawPic( hSnip, NULL );

			clcPhoneShowVal( );

			/* unhilite */
			sprintf( Name, "PhoneButton%c.s", T );
			FIND_PIC_PTR( hSnip, Name )
			grfDrawPic( hSnip, NULL );

			return TRUE;
			break;

		case 'C':	/* the clear key */

			FIND_PIC_PTR( hSnip, "ClearPhone!.s" )
			grfDrawPic( hSnip, NULL );

			/* BeepNow( GOOD_BEEP ); */
			varSetS( phoneVar, "" );
			clcPhoneShowVal( );
			FIND_PIC_PTR( hSnip, "ClearPhone.s" )
			grfDrawPic( hSnip, NULL );

			return TRUE;
			break;

		case 'N':	/* the enter key */
			/* BeepNow( GOOD_BEEP ); */

			FIND_PIC_PTR( hSnip, "EnterPhone!.s" )
			grfDrawPic( hSnip, NULL );

			clcPhoneShowVal( );	/* this is here mostly to waste a little time */

			/* unhilite enter key */
			FIND_PIC_PTR( hSnip, "EnterPhone.s" )
			grfDrawPic( hSnip, NULL );

			return FALSE;
			break;

		default:
			break;
		}

	return FALSE;		/* shouldn't get here */
}

/***********************************************************************
 * clcStripTrailingZeros removes any unnecessary trailing zeros.
 ***********************************************************************/
void clcStripTrailingZeros( char *string )
{
	char	*decimalP;
	char	*p;
	char	*endP;

	/*
	 * delete trailing zeros
	 */
	endP = &string[strlen( string )];
	decimalP = strchr( string, '.' );
	if (decimalP != NULL) {
		for (p = endP - 1; p > decimalP; p--) {
			if ((*p) == '0') {
```

```
                        *p = '\0';
                    }
                    else {
                        break;
                    }
            }
        }
}
```

BEST AVAILABLE COPY

```
/*********************************************************************
 * clcStripNumber removes leading zeros, makes sure only 8 digits
 * are present in the number, and makes sure the number is not greater than
 * abs( 99,999,999 )
 *********************************************************************
Boolean clcStripNumber( char *input, char *output )
{
        char   *startP;
        char   *decimalP;
        char   *p;
        char   *endP;
        char   tempS[30];
        Int32T         count;
        Real80T        value;
        Boolean        roundUp = FALSE;

        strcpy( tempS, input );
        endP = &tempS[strlen( tempS )];

        /*
         * is number bigger than abs( 99,999,999 )?
         */
        value = atof( tempS );
        value = fabs( value );
        if (value > 99999999) {
                sprintf( output, "E" );
                return (FALSE);
        }

        /*
         * skip leading zeros (let one in if the decimal point would otherwise start the
         * number
         */
        startP = strpbrk( tempS, "123456789-." );
        if (startP == NULL) {
                startP = endP - 1;
        }
        else if ((*startP) == '.') {
                startP--;
        }

        /*
         * fix the length of the string so that it has a maximum of 8 digits
         */
        count = 0;
        for (p = startP; p < endP; p++) {
                if (((*p) >= '0') && ((*p) <= '9')) {
                        count++;
                        if (count > 8) {
                                endP = p;
                                roundUp = ((*p >= '5') && (*p <= '9'));
                                (*p) = '\0';
                                break;
                        }
                }
        }

        /*
```

BEST AVAILABLE COPY

```
	 * round up if necessary
	 */
	if (roundUp) {
		for (p = endP - 1; p >= startP; p--) {
			if ((*p >= '0') && (*p <= '8')) {
				(*p)++;
				break;
			}
			else if (*p == '9') {
				(*p) = '0';
			}
		}
	}

	strcpy( output, startP );
	return (TRUE);
}

/*************************************************************************
 * clcATShowVal puts a value in the window of the AT calculator
 *************************************************************************/
void clcATShowVal( char *input )
{
	char	output[20];
	Handle	hSnip;
	Int32T	l;

	/*
	 * fix up the number
	 */
	if (!clcStripNumber( input, output )) {
		ATCalcOldValue = 0;
		ATJustHadOp = FALSE;
		ATCalcFoundDecimal = FALSE;
		ATCalcRestartNumber = TRUE;
		goto Printout;
	}
	else {
		if (ATCalcRestartNumber) {
			clcStripTrailingZeros( output );
		}
		strcpy( ATCalcCurrentValueS, output );
	}
	strcpy( input, output );

	/*
	 * format number
	 */
	formatNumber( output, input, 50, FALSE, 2, FALSE, 'r', TRUE, FALSE, '\0' );

	/*
	 * rescue a trailing '.'
	 */
	if (ATCalcFoundDecimal && (input[strlen( input ) - 1] == '.')) {
		l = strlen( output );
		output[l] = '.';
		output[l + 1] = '\0';
	}

Printout:

	/*
	 * erase old number
	 */
	FIND_PIC_PTR( hSnip, "n.calc.window.s" )
	grfDrawPic( hSnip, NULL );

	/*
```

BEST AVAILABLE COPY

```
        * display it
        */
        scrSetHueNow( 80 );
        MoveTo( ATCalcOrigin.h + 91 - stringwidth( output ), ATCalcOrigin.v + 40 );
        drawstring( output );
        scrRestoreColors();

}


/*************************************************************************
 * clcATShowNumPad puts up the AT calculator, without activating any touches
 *************************************************************************
void clcATShowNumPad( void )
{

        Handle      hSnip;
        Rect   r;

        FIND_PIC_PTR( hSnip, "n.calc.s" );
        if (hSnip == NULL) {
                TGL_ERROR( "Couldn't find ATCalc.s snip" );
        }

        /*
         * save image under calculator
         */
        libGetPicRect( hSnip, &r );
        ATSnipUnderCalc = snpSaveWindow3( tglMyCWindow, &r );
        ATCalcOrigin.h      = r.left;
        ATCalcOrigin.v      = r.top;

        /*
         * draw calculator
         */
        grfMDrawPic( hSnip, NULL, 0 );

        ATCalcOldValue = 0.0;
        strcpy( ATCalcCurrentValueS, "0" );
        ATCalcRestartNumber = TRUE;
        ATCalcFoundDecimal = FALSE;
        ATCalcOperator = 'E';

        for( scrScreenSet(0, 1); scrScreenSet(1, 1); ) {
                clcATShowVal( ATCalcCurrentValueS );
        } .
}

/*************************************************************************
 * clcATActivateNumPad activates the touches for the AT calculator
 *************************************************************************
#define SET_UP_BUTTON( DT, DL, DB, DR, NAME )                                \
        TGL_SETRECT( &r, ATCalcOrigin.h + DL, ATCalcOrigin.v + DT,   \
                ATCalcOrigin.h + DR, ATCalcOrigin.v + DB );                  \
        tchTouchDef( &r, szTouch, NAME );

void clcATActivateNumPad( void )
{
        Rect   r;

        /*
         * close button
         */
        SET_UP_BUTTON(  4,  93,  14, 103, "!Q" );    /* close */

        /*
         * top line
         */
```

BEST AVAILABLE COPY

```
	SET_UP_BUTTON( 53, 10, 73, 30, "!C" );     /* clear */
	SET_UP_BUTTON( 53, 34, 73, 54, "!%" );     /* percent */
	SET_UP_BUTTON( 53, 58, 73, 78, "!/" );     /* divide */
	SET_UP_BUTTON( 53, 82, 73, 102, "!*" );    /* multiply */

	/*
	 * second line
	 */
	SET_UP_BUTTON( 76, 10, 96, 30, "!7" );     /* 7 */
	SET_UP_BUTTON( 76, 34, 96, 54, "!8" );     /* 8 */
	SET_UP_BUTTON( 76, 58, 96, 78, "!9" );     /* 9 */
	SET_UP_BUTTON( 76, 82, 96, 102, "!-" );    /* minus */

	/*
	 * third line
	 */
	SET_UP_BUTTON( 99, 10, 119, 30, "!4" );    /* 4 */
	SET_UP_BUTTON( 99, 34, 119, 54, "!5" );    /* 5 */
	SET_UP_BUTTON( 99, 58, 119, 78, "!6" );    /* 6 */
	SET_UP_BUTTON( 99, 82, 119, 102, "!+" );   /* plus */

	/*
	 * fourth line
	 */
	SET_UP_BUTTON( 122, 10, 142, 30, "!1" );   /* 1 */
	SET_UP_BUTTON( 122, 34, 142, 54, "!2" );   /* 2 */
	SET_UP_BUTTON( 122, 58, 142, 78, "!3" );   /* 3 */

	/*
	 * last line
	 */
	SET_UP_BUTTON( 145, 10, 165, 54, "!0" );   /* 0 */
	SET_UP_BUTTON( 145, 58, 165, 78, "!." );   /* . */
	SET_UP_BUTTON( 122, 82, 165, 102, "!=" );  /* enter */

	szTouch[ 0 ]= '\0';

}

/************************************************************************
 * clcATNumPad handles a button
 ************************************************************************/
Boolean clcATNumPad( char key )
{
	char		tempS[20];
	char		error[40];
	Handle			hSnip;
	Real80T			value;
	Int32T			dummy;

	/*
	 * a key overrides the value of szTouch
	 * normal touches start with a ':' not a '!'
	 */
	if (key != ' ') {
		szTouch[1] = key;
	}
	else if (szTouch[0] != '!') {
		return( FALSE );
	}

	/*
	 * handle the key pushed
	 */
	switch (szTouch[1]) {

		case 'Q':
```

BEST AVAILABLE COPY

```
        tchClrTouchAreas();
        snpRestoreWindow3( 0, ATSnipUnderCalc );
        return( FALSE );

    case '0':
    case '1':
    case '2':
    case '3':
    case '4':
    case '5':
    case '6':
    case '7':
    case '8':
    case '9':

        ATJustHadOp = FALSE;
        if (ATCalcRestartNumber) {
            sprintf( tempS, "%c", szTouch[1] );
            ATCalcRestartNumber = FALSE;
            ATDigitCount = 1;
        }
        else if (ATDigitCount == 8) {
            return (TRUE);
        }
        else {
            sprintf( tempS, "%s%c", ATCalcCurrentValueS, szTouch[1] );
            ATDigitCount++;
        }
        strcpy( ATCalcCurrentValueS, tempS );
        break;

    case '.':

        if (ATCalcFoundDecimal) {
            return( TRUE );
        }
        ATJustHadOp = FALSE;
        ATCalcFoundDecimal = TRUE;
        if (ATCalcRestartNumber) {
            sprintf( ATCalcCurrentValueS, "0." );
            ATCalcRestartNumber = FALSE;
            ATDigitCount = 1;
        }
        else {
            sprintf( tempS, "%s.", ATCalcCurrentValueS );
            strcpy( ATCalcCurrentValueS, tempS );
        }
        break;

    case 'C':

        sprintf( ATCalcCurrentValueS, "0" );
        ATJustHadOp = FALSE;
        ATCalcRestartNumber = TRUE;
        ATCalcOldValue = 0.0;
        ATCalcFoundDecimal = FALSE;
        ATCalcOperator = 'E';
        break;

    case '+':
    case '-':
    case '*':
    case '/':
    case '=':
    case 'N':

        if (ATJustHadOp) {
            ATCalcOperator = szTouch[1];
```

```
        break;
    }

    switch (ATCalcOperator) {

        case '+':
            sprintf( ATCalcCurrentValueS, "%Lf",
                ATCalcOldValue + atof( ATCalcCurrentValueS ));
            break;

        case '-':
            sprintf( ATCalcCurrentValueS, "%Lf",
                ATCalcOldValue - atof( ATCalcCurrentValueS ));
            break;

        case '*':
            sprintf( ATCalcCurrentValueS, "%Lf",
                ATCalcOldValue * atof( ATCalcCurrentValueS ));
            break;

        case '/':
            if (atof( ATCalcCurrentValueS ) == 0.0) {
                sprintf( ATCalcCurrentValueS, "0" );
            }
            else {
                sprintf( ATCalcCurrentValueS, "%Lf",
                    ATCalcOldValue / atof( ATCalcCurrentValu
            }
            break;

    }

    ATCalcOperator = szTouch[1];
    ATJustHadOp = TRUE;
    sscanf( ATCalcCurrentValueS, "%Lf", &ATCalcOldValue );
    ATCalcFoundDecimal = FALSE;
    ATCalcRestartNumber = TRUE;
    break;

case '%':

    value = atof( ATCalcCurrentValueS );
    switch (ATCalcOperator) {

        case '+':
            sprintf( ATCalcCurrentValueS, "%Lf",
                ATCalcOldValue + (ATCalcOldValue * value / 100
            break;

        case '-':
            sprintf( ATCalcCurrentValueS, "%Lf",
                ATCalcOldValue - (ATCalcOldValue * value / 100)
            break;

        case '*':
            sprintf( ATCalcCurrentValueS, "%Lf",
                ATCalcOldValue * (value / 100));
            break;

        case '/':
            if (atof( ATCalcCurrentValueS ) == 0.0) {
                sprintf( ATCalcCurrentValueS, "0" );
            }
            else {
                sprintf( ATCalcCurrentValueS, "%Lf",
                    ATCalcOldValue / (value / 100));
            }
            break;
```

BEST AVAILABLE COPY

```
            }

            ATCalcOperator = ' ';
            ATJustHadOp = FALSE;
            ATCalcFoundDecimal = FALSE;
            ATCalcRestartNumber = TRUE;
            break;

        default:
            return (TRUE);

    }


    /* hilite */
    for( scrScreenSet(0, 1); scrScreenSet(1, 1); ) {
        sprintf( tempS, "n.calc%c!.s", szTouch[1] );
        FIND_PIC_PTR( hSnip, tempS );
        grfDrawPic( hSnip, NULL );

        /* show value */
        clcATShowVal( ATCalcCurrentValueS );
        Delay( 6, &dummy );

        /* unhilite */
        sprintf( tempS, "n.calc%c.s", szTouch[1] );
        FIND_PIC_PTR( hSnip, tempS );
        grfDrawPic( hSnip, NULL );
    }

    szTouch[0] = '\0';
    return( TRUE );
}
```

BEST AVAILABLE COPY

```
/*********************************************************************
CONSTRAINED (MIN-MAX) ALLOCATION MODULE
*********************************************************************

#include    "standard.h"
#include    "glue.h"
#define     APP_ADTERM
#include    "varFns.h"
#include    "brdAlloc.h"
#include    "cmmMinMax.h"


/*==================================================================
===========
STATIC VARIABLES & DEFINITIONS
===================================================================
============*/

typedef struct
      {
      Real80T     Bank;
      Real80T     Mmf;
      Real80T     Bonds;
      Real80T     Growth;
      Real80T     Income;
      Real80T     Cash;
      Real80T     Long;
      Real80T     Total;
      Real80T     Score;
      } allocationT, *allocationPT;

static allocationT  rec;
static allocationT  min;
static allocationT  max;


/*==================================================================
===========
LOCAL FUNCTION PROTOTYPES
===================================================================
============*/
void cmmInitialize( Real80T bank, Real80T mmf, Real80T bonds, Real80T growth );
void setScore( allocationPT trial );
void distribute( Real80T delta, allocationPT pBest, allocationT current, Int32T dBank, Int
dBonds, Int32T dGrowth );
Real80T chkConstraint( Real80T current, Real80T min, Real80T max );

/*********************************************************************
***
initialize globals: buckets, recommended amts, totals...

*********************************************************************
***/
void cmmInitialize(  Real80T bank, Real80T mmf, Real80T bonds, Real80T growth  )
{

rec.Bank= bank,
rec.Mmf= mmf;
rec.Bonds= bonds;
rec.Growth= growth;

rec.Cash= bank + mmf;
rec.Long= growth + bonds;
rec.Income= bonds + mmf;

rec.Total= bank + mmf + bonds + growth;

if( varQDef( vCashMin ) )
```

BEST AVAILABLE COPY

```
        min.Cash= brdGetValue( vCashMin );
else
        min.Cash= 0;

if( varQDef( vLongMin ) )
        min.Long= brdGetValue( vLongMin );
else
        min.Long= 0;

if( varQDef( vBankMin ) )
        min.Bank= brdGetValue( vBankMin );
else
        min.Bank= 0;

if( varQDef( vGrowthMin ) )
        min.Growth= brdGetValue( vGrowthMin );
else
        min.Growth= 0;

if( varQDef( vIncomeMin ) )
        min.Income= brdGetValue( vIncomeMin );
else
        min.Income= 0;

min.Mmf= 0;
min.Bonds= 0;

min.Total= 0;

if( varQDef( vLongMax ) )
        max.Long= brdGetValue( vLongMax );
else
        max.Long= rec.Total;

if( varQDef( vCashMax ) )
        max.Cash= brdGetValue( vCashMax );
else
        max.Cash= rec.Total;

if( varQDef( vBankMax ) )
        max.Bank= brdGetValue( vBankMax );
else
        max.Bank= rec.Total;

if( varQDef( vIncomeMax ) )
        max.Income= brdGetValue( vIncomeMax );
else
        max.Income= rec.Total;

if( varQDef( vGrowthMax ) )
        max.Growth= brdGetValue( vGrowthMax );
else
        max.Growth= rec.Total;

max.Mmf= rec.Total;
max.Bonds= rec.Total;
max.Total= rec.Total;

/* note that this setScore has to be done after the mins and maxes have been se
setScore( &rec );

}

/*********************************************************************************
***
 find the best constrained allocation
```

```
**********************************************************************
***/
Int32T cmmConstraintAlloc( Real80PT pBank, Real80PT pMmf, Real80PT pBonds, Real8
{
Real80T delta;
allocationT  best, current;

cmmInitialize( *pBank, *pMmf, *pBonds, *pGrowth );

/* how many dollars to move at a time (start with a million) */
delta= 1000000.0;

/*
Transfer money around one delta unit at a time, looking for the lowest possible measu
Decrease delta when no improvement is possible at current delta.
Stop when delta becomes less than $100, unless we haven't met constraints (in which ca
Always stop when delta becomes less than a penny.
*/

/*
start with the currently recommended allocation
*/
best= rec;
current= rec;


while( delta >= 100.0 || ( current.Score >= 1.0 && delta >= 0.01 ) )
        {

        /*
        now check all possible transfers to see which offers the most improvement
        */

        /* mmf to bank */
        distribute( delta, &best, current, 1, -1, 0, 0 );
        distribute( delta, &best, current, 1, -1, 1, -1 );
        distribute( delta, &best, current, 1, -1, -1, 1 );

        /* bond to bank */
        distribute( delta, &best, current, 1, 0, -1, 0 );
        distribute( delta, &best, current, 1, 1, -1, -1 );
        distribute( delta, &best, current, 1, -1, -1, 1 );

        /* growth to bank */
        distribute( delta, &best, current, 1, 0, 0, -1 );
        distribute( delta, &best, current, 1, 1, -1, -1 );
        distribute( delta, &best, current, 1, -1, 1, -1 );

        /* bank to mmf */
        distribute( delta, &best, current, -1, 1, 0, 0 );
        distribute( delta, &best, current, -1, 1, 1, -1 );
        distribute( delta, &best, current, -1, 1, -1, 1 );

        /* bond to mmf */
        distribute( delta, &best, current, 0, 1, -1, 0 );
        distribute( delta, &best, current, 1, 1, -1, -1 );
        distribute( delta, &best, current, -1, 1, -1, 1 );

        /* growth to mmf */
        distribute( delta, &best, current, 0, 1, 0, -1 );
        distribute( delta, &best, current, 1, 1, -1, -1 );
        distribute( delta, &best, current, -1, 1, 1, -1 );

        /* bank to bond */
        distribute( delta, &best, current, -1, 0, 1, 0 );
        distribute( delta, &best, current, -1, 1, 1, -1 );
        distribute( delta, &best, current, -1, -1, 1, 1 );
```

BEST AVAILABLE COPY

```
        /* mmf to bond */
        distribute( delta, &best, current, 0, -1, 1, 0 );
        distribute( delta, &best, current, 1, -1, 1, -1 );
        distribute( delta, &best, current, -1, -1, 1, 1 );

        /* growth to bond */
        distribute( delta, &best, current, 0, 0, 1, -1 );
        distribute( delta, &best, current, 1, -1, 1, -1 );
        distribute( delta, &best, current, -1, 1, 1, -1 );

        /* bank to growth */
        distribute( delta, &best, current, -1, 0, 0, 1 );
        distribute( delta, &best, current, -1, 1, -1, 1 );
        distribute( delta, &best, current, -1, -1, 1, 1 );

        /* mmf to growth */
        distribute( delta, &best, current, 0, -1, 0, 1 );
        distribute( delta, &best, current, 1, -1, -1, 1 );
        distribute( delta, &best, current, -1, -1, 1, 1 );

        /* bond to growth */
        distribute( delta, &best, current, 0, 0, -1, 1 );
        distribute( delta, &best, current, 1, -1, -1, 1 );
        distribute( delta, &best, current, -1, 1, -1, 1 );


        /* now execute the best transfer */

        if( best.Score < current.Score )
                {
                current= best;
                }
        else
                {
                delta /= 10.0;          /* no good transfer found -- try a smaller delta */
                }

        } /* end while */


if( current.Score < 1.0 )              /* all constraints were met */
        {
        *pBank= current.Bank;
        *pMmf= current.Mmf;
        *pBonds= current.Bonds;
        *pGrowth= current.Growth;

        return( 0 );
        }
else
        return( 1 );
}

/***********************************************************************
***
distribute: check the proposed allocation and set &best if it's better than current
************************************************************************
***/
void distribute( Real80T delta, allocationPT pBest, allocationT trial, Int32T dBank, Int32
Int32T dGrowth)
{

trial.Bank += dBank * delta;
trial.Mmf += dMmf * delta;
trial.Bonds += dBonds * delta;
trial.Growth += dGrowth * delta;
```

BEST AVAILABLE COPY

```
setScore( &trial);

if( trial.Score < pBest->Score )
        {
        *pBest= trial;
        };

}

/***********************************************************************
Figure out how close this allocation is to meeting our expectations.
Smaller is better.
If result is greater than 1.0, then allocation violates at least one constraint.
If result > 0.0, then it is not equivalent to recommended allocation.
************************************************************************
void setScore( allocationPT trial )
{
Real80T cDistance, iDistance, i;

cDistance= 0;

/* solitairy constraints */
cDistance+= chkConstraint( trial->Bank, min.Bank, max.Bank );

cDistance+= chkConstraint( trial->Mmf, 0, rec.Total );

cDistance+= chkConstraint( trial->Bonds, 0, rec.Total );

cDistance+= chkConstraint( trial->Growth, min.Growth, max.Growth );

/* composite constraints */
cDistance+=  chkConstraint( trial->Mmf + trial->Bonds, min.Income, max.Income );

cDistance+= chkConstraint( trial->Mmf + trial->Bank, min.Cash, max.Cash );

cDistance+= chkConstraint( trial->Growth + trial->Bonds, min.Long, max.Long );

/*
measure closeness to ideal allocation (result between 0 and 1, smaller is better)
*/

iDistance= 0;

/*
high penalty for cash difference
*/

if( trial->Bank + trial->Mmf < rec.Cash )
        iDistance+= 0.2 * ( rec.Cash - trial->Bank - trial->Mmf ) / rec.Total;
else
        iDistance+= 0.2 * (trial->Bank + trial->Mmf - rec.Cash) / rec.Total;

/*
very high penalty for bank difference
*/

if( trial->Bank < rec.Bank )
        iDistance+= 0.4 * (rec.Bank - trial->Bank) / rec.Total;
else
        iDistance+= 0.4 * (trial->Bank - rec.Bank) / rec.Total;


/*
standard penalty for bond and growth differences
*/
```

```
i= (rec.Bonds - trial->Bonds) / rec.Total;
iDistance+= 0.05 * i * i;

i= (rec.Growth - trial->Growth) / rec.Total;
iDistance+= 0.05 * i * i;


trial->Score= cDistance + iDistance;
}


/***********************************************************************
****
check number against min and max
***********************************************************************,
****/
Real80T chkConstraint( Real80T current, Real80T min, Real80T max )
{

/* allow differences if they're less than a dollar */

if( min - current >= 1.0 )
        {
        return( min - current );
        }
else if( current - max >= 1.0 )
        {
        return( current - max );
        }
else
        return( 0.0 );
}
```

BEST AVAILABLE COPY

BEST AVAILABLE COPY

```
/*
 * File cmpCompress.c
 */

#ifdef THINK_C

	/* macheaders as well */
	#include	<color.h>
	#include	<colortoolbox.h>
	#include	<stdio.h>
	#include	<stdlib.h>
	#include	<ctype.h>
	#include	<math.h>
	#include	<string.h>

#else

		#include	<types.h>
		#include	<memory.h>
		#include	<palette.h>
		#include	<quickdraw.h>
		#include	<toolutils.h>
		#include	<fonts.h>
		#include	<events.h>
		#include	<windows.h>
		#include	<dialogs.h>
		#include	<menus.h>
		#include	<desk.h>
		#include	<textedit.h>
		#include	<scrap.h>
		#include	<segload.h>
		#include	<packages.h>
		#include	<errors.h>
		#include	<files.h>
		#include	<stdio.h>

	#pragma	segment Seg2

#endif

#include	"standard.h"
#include	"glue.h"
#include	"varFns.h"
#include	"tglMain.h"
#include	"scnScan.h"
#include	"libLibrary.h"
#include	"cmpCompress.h"

/****************************************************************************
 *
 Compress4
 ****************************************************************************
/
Int32T		cmpCompress4( h_src, sqz, pRect )
	PixMap		**h_src;
	libSQZPictPT	sqz;
	Rect	*pRect;
{
	Int32UT		dp;
	unsigned	char	c,*s,*pixcodes;

	unsigned	char	runchar, runlen;
	Int32UT		rptr;
	Int32UT		top, left, bottom, right;
	Int32UT		rowbytes;
	Int32UT		row, col;
```

BEST AVAILABLE COPY

```
Int32T *pFTable;
Int32T  m, F;
Int32UT x;
Int32T Lindex, i, j;

/* set boundaries */

sqz->dst.top= pRect->top;
top= pRect->top;
sqz->bounds.top= top;

sqz->dst.bottom= pRect->bottom;
bottom= pRect->bottom;
sqz->bounds.bottom= bottom;

sqz->dst.left= pRect->left;
left= pRect->left;
left= left & 0xFFFC;                    /* align on fullword boundary */
sqz->bounds.left= left;

sqz->dst.right= pRect->right;
right= pRect->right;
right= (right + 3) & 0xFFFC;        /* align on fullword boundary */
sqz->bounds.right= right;


rowbytes=  0x1FFF & (*h_src)->rowBytes;
sqz->rowBytes= sqz->bounds.right - sqz->bounds.left;

s= (unsigned char*) &(*h_src)->baseAddr[0];



/* get frequency table */
#define FTABLEMAX    32768
pFTable =  (Int32PT) NewPtr( (Int32T) 4 * (Int32T) FTABLEMAX );  /* range of half
if( pFTable == NULL )
      TGL_FATAL_ERROR( "cmp pFTable allocation failed" );
for( i=0; i < FTABLEMAX; i++ ) pFTable[i]= 0;

/* now do trial compression of image into 2-byte run lengths to build frequency t
for( row= top; row < bottom; row++ )
      {
      rptr= row * rowbytes;
      runlen= 0;

      for( col= left; col < right; col++ )
            {
            c= s[ rptr + col ];

            if( !runlen )
                  {
                  runchar= c;
                  runlen= 1;
                  }
            else
                  {
                  if( c == runchar && runlen < 127 )
                        runlen++;
                  else
                        {
                        /* note occurence of half-word in frequency table */
                        x= runlen; x *= 256; x += runchar;
                        (*(pFTable + x))++;

                        runchar= c;
                        runlen= 1;
```

BEST AVAILABLE COPY

```
                }
            }
        } /* for col */

        /* note occurence of half-word in frequency table */
        x= runlen; x *= 256; x += runchar;
        (*(pFTable + x))++;

    } /* for row */


/* now find the 128 most frequent half-words and enter them into LTable */

Lindex=0;

while ( Lindex < 128 )
    {
    /* get highest value */
    for( m=i= 0; i < FTABLEMAX; i++ )
      {
      F= *( pFTable + i );
      if ( F > m )                  /* note: previous maxima are now negati
            {
            m= F;
            j= i;  /* save index of most frequent half-word */
            }
      }

    /* enter Ftable index of maximum into Ltable; negated Ltable index goes
    /* remember that the index is really a two-byte run */

    *( pFTable + j) = - Lindex;
    (sqz->LTable)[ Lindex++ ]= (Int16UT) j;

    }


/* now compress again, this time looking up values in table, using one-byte code
sqz->DataOffset= sizeof( libSQZPictT );
pixcodes= (unsigned char *) ((Int32T) sqz + (Int32T) sqz->DataOffset);
dp= 0;
for( row= top; row < bottom; row++ )
    {
    rptr= row * rowbytes;
    runlen= 0;

    for( col= left; col < right; col++ )
        {
        c= s[ rptr + col ];

        if( !runlen )
            {
            runchar= c;
            runlen= 1;
            }
        else
            {
            if( c == runchar && runlen < 127 )
                runlen++;
            else
                {
                x= runlen; x *= 256; x += runchar;
                F= (* (pFTable + x));
                if ( F < 0 )               /* indices are negative */
                    {
                    pixcodes[dp++]= 0x80 | ((unsigned char) (- F));
                    }
                else                          /* no one-byte code avai
```

```
                        {
                        pixcodes[dp++]= runlen;
                        pixcodes[dp++]= runchar;
                        }
                    runchar= c;
                    runlen= 1;
                    }
                }
            } /* for col */

            x= runlen; x *= 256; x += runchar;
            F= (* (pFTable + x));
            if ( F < 0 )                /* indices are negative */
                {
                pixcodes[dp++]= 0x80 | ((unsigned char) (- F));
                }
            else                            /* no one-byte code available */
                {
                pixcodes[dp++]= runlen;
                pixcodes[dp++]= runchar;
                }
        } /* for row */

    sqz->numBytes= dp;
    sqz->Signature= libSnipSignature;
    sqz->Version= libSysVersion;
    sqz->CompAlgVer = 1;          /* Compression algorithm version */

    DisposPtr( (Ptr) pFTable );

    return( dp + sizeof( libSQZPictT ) );
}


/***********************************************************************
*
 FastCompress4; doesn't build the 128-most-frequent table, is therefore faster but resu
                    bulkier compressed file
***********************************************************************
/
Int32T      cmpFastCompress4( h_src, sqz, pRect )
    PixMap      **h_src;
    libSQZPictPT        sqz;
    Rect   *pRect;
{
    Int32UT             dp;
    unsigned    char    c,*s,*pixcodes;

    unsigned    char    runchar, runlen;
    Int32UT             rptr;
    Int32UT             top, left, bottom, right;
    Int32UT             rowbytes;
    Int32UT             row, col;

    Int32UT x;

    /* set boundaries */

    sqz->dst.top= pRect->top;
    top= pRect->top;
    sqz->bounds.top= top;

    sqz->dst.bottom= pRect->bottom;
    bottom= pRect->bottom;
    sqz->bounds.bottom= bottom;

    sqz->dst.left= pRect->left;
    left= pRect->left;
```

BEST AVAILABLE COPY

```
        left= left & 0xFFFC;                          /* align on fullword boundary */
        sqz->bounds.left= left;

        sqz->dst.right= pRect->right;
        right= pRect->right;
        right= (right + 3) & 0xFFFC;             /* align on fullword boundary */
        sqz->bounds.right= right;


        rowbytes=  0x1FFF & (*h_src)->rowBytes;
        sqz->rowBytes= sqz->bounds.right - sqz->bounds.left;

        s= (unsigned char*) &(*h_src)->baseAddr[0];

        sqz->DataOffset= sizeof( libSQZPictT );
        pixcodes= (unsigned char *) ((Int32T) sqz + (Int32T) sqz->DataOffset);
        dp= 0;
        for( row= top; row < bottom; row++ )
                {
                rptr= row * rowbytes;
                runlen= 0;

                for( col= left; col < right; col++ )
                        {
                        c= s[ rptr + col ];

                        if( !runlen )
                                {
                                runchar= c;
                                runlen= 1;
                                }
                        else
                                {
                                if( c == runchar && runlen < 127 )
                                        runlen++;
                                else
                                        {
                                        x= runlen; x *= 256; x += runchar;

                                        pixcodes[dp++]= runlen;
                                        pixcodes[dp++]= runchar;

                                        runchar= c;
                                        runlen= 1;
                                        }
                                }
                        } /* for col */

                        x= runlen; x *= 256; x += runchar;
                        pixcodes[dp++]= runlen;
                        pixcodes[dp++]= runchar;
                } /* for row */

        sqz->numBytes= dp;
        sqz->Signature= libSnipSignature;
        sqz->Version= libSysVersion;
        sqz->CompAlgVer = 1;             /* Compression algorithm version */

        return( dp + sizeof( libSQZPictT ) );
}


/****************************************************************************
*
 Expand4:
*****************************************************************************
/
void cmpExpand4( sqz, h_dst, pRect )
```

```
        libSQZPictPT        sqz;
        PixMap **h_dst;
        Rect   *pRect;
{
        register      unsigned    char   c, r;
        register      unsigned    char   *pSource, *pSourceLimit, *pDest;
                            unsigned    char   *pTable;
        Int32UT             TabIndex;
        Int32UT             temp;

#define USE_ASM_CODE_FOR_EXPAND
#ifndef USE_ASM_CODE_FOR_EXPAND

                            unsigned    char   *pByteDestLimit;
        register                        Int32UT       FourChars;

#endif


        pDest=                    (unsigned char*) &(*h_dst)->baseAddr[0];
        pTable=             (unsigned char*) &(sqz->LTable[0]);
        pSource=            (unsigned char *) ((Int32T) sqz + (Int32T) sqz->DataOffset);
        pSourceLimit=       pSource + sqz->numBytes;

        while( pSource < pSourceLimit )
                {
                r= *(pSource++);                        /* purported run  length */
                if ( r > 127 )                          /* it's a one-byte code */
                 {
                 TabIndex= 2 * (r & 0x7f);              /* make into a Int16T index */
                 r= *(pTable + TabIndex);                         /* get runlength and ch.
                 c= *(pTable + TabIndex + 1);
                 }
                else
                 {
                 c= *(pSource++);                       /* char */
                 }

#ifdef USE_ASM_CODE_FOR_EXPAND

                asm {
                        /*  get the variables that we need into registers  */
                        move.l      pDest,a0                    ;  A0 = pDest
                        clr.l   d1                              ;  D1.L = (long) 0
                        move.b      c,d1                        ;  D1.B = (unsigned char) c
                        clr.l   d2                              ;  D2.L = (long) 0
                        move.b      r,d2                        ;  D2.L = r

                        /*  use different logic for short and long lengths  */
                        cmpi.b      #12,r
                        bgt    @3

                @1      move.b      d1,(a0)+
                        subq  #1,d2
                        bgt         @1

                        jmp         @end

                        /********************/
                        /*  long word moves for long lengths  */
                        /********************/

                        /*  grab four copies of c into the register  */
                @3      move.l      d1,d0
                        lsl.l   #8,d0                           ;  D0 << 8
                        or.l    d1,d0                           ;  D0 |= (unsigned char) c
                        move.l      d0,d1
                        swap  d0
```

BEST AVAILABLE COPY

```
        or.l    d0,d1

        /* fill bytes up to a full word boundry */
        move.l      a0,d0                         ; get our destination int
        andi  #3,d0                       ; find out the byte we're at (re

        /* the andi sets the Z flag if we're at the boundry, */
        /* just like the cmpi #4 will do below, so use the same test for both
        jmp           @preLongMoveTest

@preLongMove
        move.b      d1,(a0)+
        subq  #1,d2                       ; decrement our length
        addq  #1,d0                       ; increment our counter
        cmpi  #4,d0                       ; see if we're at the word bour

@preLongMoveTest
        bne           @preLongMove

        /* move a long word as long as it will fit */
@4      move.l      d1,(a0)+
        subq  #4,d2
        cmpi  #4,d2
        bgt         @4

        /* when there're less than four bytes left to move, */
        /* compare to 0 (like the subq) will do, and go to the test */
        cmpi  #0,d2
        jmp @postLongMoveTest

@postLongMove
        move.b      d1,(a0)+
        subq  #1,d2                       ; decrement our length

@postLongMoveTest
        bgt           @postLongMove

@end
        nop
        }

pDest += r;

#else
pByteDestLimit= pDest + r;

if ( r > 12 )                          /* fast write for long strings */
        {
        *(pDest++)= c;
        *(pDest++)= c;
        *(pDest++)= c;
        *(pDest++)= c;

        FourChars= * ((Int32T *) (pDest - 4));                 /* get 4 cha

        pDest= (unsigned char *) (((Int32UT) pDest) & 0xFFFFFFFC);

        /* note that the following use of the byte limit implies that we may \
           3 more characters than the runlength specifies. This is ok since we l
           pointing to the correct next character, and the DECOMPRESSED IM
           FULLWORD BOUNDARY (this assures we'll never overrun our alloc
        */

        while( pDest < pByteDestLimit )
                {
                *((Int32UPT) pDest)= FourChars;
                pDest += 4;
                }
```

```
                pDest= pByteDestLimit;                          /* correct fo
far */

                } /* end fast write */
        else
                {
                while (pDest < pByteDestLimit)                  /* slow write */
                        {
                        *(pDest++)= c;
                        }
                }
#endif

        } /* while source available */

    /* propagate snippet size information */
    (*h_dst)->rowBytes= 0x8000 | sqz->rowBytes;
    (*h_dst)->bounds= sqz->bounds;
    *pRect= sqz->dst;

}
```

BEST AVAILABLE COPY

BEST AVAILABLE COPY

```
/*
 * control structure code
 *
 * WBP October 9, 1989
 *
 */

#include "standard.h"
#undef EXTGEN
#include "tglMain.h"
#include "control.h"
#include "lblLabel.h"
#define         APP_ADTERM
#include "varFns.h"
#include "scnScan.h"
#include "format.h"
#include "chfLoanFns.h"
#include "glue.h"
#include "edtEdit.h"
#include "scrScreen.h"
#include "grfGraphics.h"
#include "dataStructures.h"
#include "errHandler.h"
#include "serialPrint.h"
#include "EventHandlers.h"
#include "fileAccess.h"
#include "bndDetail.h"
#include "introGraph.h"

/* * * * * * * * * * * * * * */
/* structures and types   */
/* * * * * * * * * * * * * * */

/* control structure interpreter states */
typedef enum
        {
        conExecuteLines = 0,
        conExecuteLine,
        conSkipLine,
        conExecuteElse,
        conSkipElse,
        conGotoAddress,
        conGotoWhile,
        conExecuteCompound,
        conSkipCompound,
        conBreakCompound,
        conContinueCompound,
        conLastState
        } ConStateT;

/* a place to keep interpreter states */
typedef struct
        {
        ConStateT   state;
        char        *address;
        } ConStateRecordT;

/* control commands */
typedef enum
        {
        conIf,
        conElse,
        conLeftBrace,
        conRightBrace,
        conQuit,
        conNotControl
        } ConControlIDT;
```

```
/*  a way to associate control commands with the text that invokes them  */
typedef void (*ConVoidFunctionP)();
typedef BooleanT (*ConBooleanTFunctionP)();

typedef struct
      {
      ConControlIDT            command;
      char                     *name;
      Int32T                   nameTag;
      ConBooleanTFunctionP  functions[conLastState + 1];
      } ConControlT;

/*  atomic commands  */
typedef enum
      {
      conAtomOldStyle,
      conAtomStringFormat,
      conAtomDisplayLeft,
      conAtomDisplayLeft2,
      conAtomDisplay,
      conAtomDisplay2,
      conAtomDisplayCenter,
      conAtomDisplayCenter2,
      conAtomDisplayAround,
      conAtomDisplayAround2,
      conAtomSubroutineCall,
      conAtomSubroutineReturn,
      conAtomJump,
      conAtomTime,
      conAtomDate,
      conAtomDateTime,
      conAtomConvertToPesos,
      conAtomFormattedInput,
      conAtomCursor,
      conAtomBeep,
      conAtomSwitchCursor,
      conAtomCommandKeys,
      conAtomIncrement,
      conAtomDecrement,
      conAtomStartTimer,
      conAtomStopTimer,
      conAtomShadow,
      conAtomReplaceSubstring,
      conAtomAssign,
      conAtomTest,
      conAtomFirstLine,
      conAtomMISSaveList,
      conAtomRoundNumber,
      conAtomTestValid,            /* variable string inclusion in set test */
      conAtomTestEmpty,            /* variable string empty test */
      conAtomBondCardHasMMF,
      conAtomLeftChars,            /* copy left N chars from one var to anoth
      conAtomRememberChileTimeout,
      conAtomRememberChileAbandoned,
      conAtomRememberChileTerminar,
      conAtomSetUpChileBadTouch,
      conAtomRememberChileClient,
      conAtomRememberChileWhatIf,
      conAtomDrawIntroGraph,

      conAtomUndefined
      } ConCommandIDT;

/*  a way to associate atomic commands with the text that invokes them  */
typedef struct
      {
      ConCommandIDT            command;
      char                     *name;
```

BEST AVAILABLE COPY

BEST AVAILABLE COPY

```
    Int32T                  nameTag;
    ConVoidFunctionP        function;
    } ConCommandT;

/* * * * * * * * * * */
/*  useful numbers  */
/* * * * * * * * * * */

#define CON_STACK_SIZE      300


/* * * * * * * * * * * * */
/*  function prototypes  */
/* * * * * * * * * * * * */

void conGetFormat ( char *format, Int32T *formatOffset, char *justify, Boolean *comr
    Boolean *euroStyle, Int32PT length, Int32PT decimals, Boolean *forceLength,
    Boolean *forceDecimals, char *floatingID );
BooleanT conGetVariable ( Int32T *variable, char *line, Int16T *offset );

/*  control commands  */
BooleanT con_If                 ( char *line, Int16T *offset, char *token );
BooleanT con_EL_If              ( char *line, Int16T *offset, char *token );
BooleanT con_SL_If              ( char *line, Int16T *offset, char *token );
BooleanT con_EE_If              ( char *line, Int16T *offset, char *token );
BooleanT con_SE_If              ( char *line, Int16T *offset, char *token );
BooleanT con_SC_If              ( char *line, Int16T *offset, char *token );

BooleanT con_Else               ( char *line, Int16T *offset, char *token );
BooleanT con_EE_Else            ( char *line, Int16T *offset, char *token );
BooleanT con_SE_Else            ( char *line, Int16T *offset, char *token );

BooleanT con_NotControl         ( char *line, Int16T *offset, char *token );
BooleanT con_EE_NotControl      ( char *line, Int16T *offset, char *token );
BooleanT con_SE_NotControl      ( char *line, Int16T *offset, char *token );
BooleanT con_EL_NotControl      ( char *line, Int16T *offset, char *token );
BooleanT con_SL_NotControl      ( char *line, Int16T *offset, char *token );
BooleanT con_EC_NotControl      ( char *line, Int16T *offset, char *token );
BooleanT con_SC_NotControl      ( char *line, Int16T *offset, char *token );

BooleanT con_LeftBrace          ( char *line, Int16T *offset, char *token );
BooleanT con_EL_LeftBrace       ( char *line, Int16T *offset, char *token );
BooleanT con_SL_LeftBrace       ( char *line, Int16T *offset, char *token );
BooleanT con_EE_LeftBrace       ( char *line, Int16T *offset, char *token );
BooleanT con_SE_LeftBrace       ( char *line, Int16T *offset, char *token );
BooleanT con_SC_LeftBrace       ( char *line, Int16T *offset, char *token );

BooleanT con_RightBrace         ( char *line, Int16T *offset, char *token );
BooleanT con_EE_RightBrace      ( char *line, Int16T *offset, char *token );
BooleanT con_SE_RightBrace      ( char *line, Int16T *offset, char *token );
BooleanT con_EC_RightBrace      ( char *line, Int16T *offset, char *token );
BooleanT con_SC_RightBrace      ( char *line, Int16T *offset, char *token );

BooleanT con_Quit               ( char *line, Int16T *offset, char *token );
BooleanT con_SL_Quit            ( char *line, Int16T *offset, char *token );
BooleanT con_SE_Quit            ( char *line, Int16T *offset, char *token );
BooleanT con_SC_Quit            ( char *line, Int16T *offset, char *token );


/* * * * * * * * * * */
/*  atomic commands  */
/* * * * * * * * * * */

void con_AtomStringFormat       ( char *line, Int16T *offset );
void con_AtomDisplayLeft        ( char *line, Int16T *offset );
void con_AtomDisplayLeft2       ( char *line, Int16T *offset );
void con_AtomDisplay            ( char *line, Int16T *offset );
void con_AtomDisplay2           ( char *line, Int16T *offset );
```

BEST AVAILABLE COP

```
void con_AtomDisplayCenter              ( char *line, Int16T *offset );
void con_AtomDisplayCenter2             ( char *line, Int16T *offset );
void con_AtomDisplayAround              ( char *line, Int16T *offset );
void con_AtomDisplayAround2             ( char *line, Int16T *offset );
void con_AtomOldStyle                   ( char *line, Int16T *offset );
void con_AtomSubroutineCall             ( char *line, Int16T *offset );
void con_AtomSubroutineReturn           ( char *line, Int16T *offset );
void con_AtomJump                       ( char *line, Int16T *offset );
void con_AtomTime                       ( char *line, Int16T *offset );
void con_AtomDate                       ( char *line, Int16T *offset );
void con_AtomDateTime                   ( char *line, Int16T *offset );
void con_AtomConvertToPesos             ( char *line, Int16T *offset );
void con_AtomCursor                     ( char *line, Int16T *offset );
void con_AtomBeep                       ( char *line, Int16T *offset );
void con_AtomSwitchCursor               ( char *line, Int16T *offset );
void con_AtomCommandKeys                ( char *line, Int16T *offset );
void con_AtomIncrement                  ( char *line, Int16T *offset );
void con_AtomDecrement                  ( char *line, Int16T *offset );
void con_AtomStartTimer                 ( char *line, Int16T *offset );
void con_AtomStopTimer                  ( char *line, Int16T *offset );
void con_AtomShadow                     ( char *line, Int16T *offset );
void con_AtomReplaceSubstring           ( char *line, Int16T *offset );
void con_AtomAssign                     ( char *line, Int16T *offset );
void con_AtomTest                       ( char *line, Int16T *offset );
void con_AtomFirstLine                  ( char *line, Int16T *offset );
void con_AtomMISSaveList                ( char *line, Int16T *offset );
void con_AtomRoundNumber                ( char *line, Int16T *offset );
void con_AtomTestValid                  ( char *line, Int16T *offset );
void con_AtomTestEmpty                  ( char *line, Int16T *offset );
void con_AtomBondCardHasMMF             ( char *line, Int16T *offset );
void con_AtomLeftChars                  ( char *line, Int16T *offset );
void con_AtomRememberChileTimeout       ( char *line, Int16T *offset );
void con_AtomRememberChileAbandoned ( char *line, Int16T *offset );
void con_AtomRememberChileTerminar      ( char *line, Int16T *offset );
void con_AtomSetUpChileBadTouch         ( char *line, Int16T *offset );
void con_AtomRememberChileClient        ( char *line, Int16T *offset );
void con_AtomRememberChileWhatIf        ( char *line, Int16T *offset );
void con_AtomDrawIntroGraph             ( char *line, Int16T *offset );

void con_AtomUndefined                  ( char *line, Int16T *offset );

/* atomic helpers */
void conDisplayLeft ( char *line, Int16T *offset, BooleanT twoScreens );
void conDisplay ( char *line, Int16T *offset, BooleanT twoScreens );
void conDisplayCenter ( char *line, Int16T *offset, BooleanT twoScreens );
void conDisplayAround ( char *line, Int16T *offset, BooleanT twoScreens );

void conFormat ( char *target, Int32T *targetOffset,
                 char *format, Int32T *formatOffset,
                 char *source );

/* functions to get arguments from the scan file line */
BooleanT conGetString ( char *token, char *line, Int16T *offset, Int16T length );
BooleanT conGetPosition ( Int32T *x, Int32T *y, char *line, Int16T *offset );

/* other */
void conInitStateStack ( void );
ConStateRecordT *conPopState ( ConStateRecordT *inRec );
ConStateRecordT *conTopState ( ConStateRecordT *inRec );
void conPushState ( ConStateT thisState, char *thisAddress );
ConControlT *conGetControl ( char *token );
ConCommandT *conGetCommand ( char *token );
char *conGetToken ( char *token, char *line, Int16T *offset, Int16T length );
BooleanT conIsOldLine ( char *line );
BooleanT conIsComment ( char *line );
```

control.c

BEST AVAILABLE COPY

```
void conTruncateComment ( char *line );
DatInt16Stack conSubroutineStack;

/* * * * * * * * * * * * * * * * * * * */
/*  control interpreter state stack  */
/* * * * * * * * * * * * * * * * * * * */

ConStateRecordT   *conStateStack;
Int16T                conStateStackTop;

/*  control command table  */
ConControlT       conControls[] =
      {
      /*
      command,            name,              nameTag,   function: state_cor

      conIf,              "IF",              0,              con_If,
                                                                  con_E
                                                                  con_S
                                                                  con_E
                                                                  con_S
                                                                  con_If
                                                                  con_If
                                                                  con_If
                                                                  con_S
                                                                  con_If
                                                                  con_If
                                                                  con_If
      conElse,            "ELSE",            0,              con_Else,
                                                                  con_E
                                                                  con_E
                                                                  con_E
                                                                  con_S
                                                                  con_E
                                                                  con_E
                                                                  con_E
                                                                  con_E
                                                                  con_E
                                                                  con_E
                                                                  con_E
      conLeftBrace,       "{",          0,              con_LeftBrace,
                                                                  con_E
                                                                  con_S
                                                                  con_E
                                                                  con_S
                                                                  con_L
                                                                  con_L
                                                                  con_L
                                                                  con_S
                                                                  con_L
                                                                  con_L
                                                                  con_L
      conRightBrace,      "}",          0,
                                                                  con_F
                                                                  con_F
                                                                  con_F
                                                                  con_E
                                                                  con_S
                                                                  con_F
                                                                  con_F
                                                                  con_E
                                                                  con_S
                                                                  con_F
                                                                  con_F
                                                                  con_F
      conQuit,            "QUIT",            0,              con_Quit,
                                                                  con_(
                                                                  con_S
```

BEST AVAILABLE COPY

```
                                                                con_C
                                                                con_S
                                                                con_C
                                                                con_C
                                                                con_C
                                                                con_S
                                                                con_C
                                                                con_C
                                                                con_C
    conNotControl,       "",              0,                 con_NotCor
                                                                con_E
                                                                con_S
                                                                con_E
                                                                con_S
                                                                con_I
                                                                con_I
                                                                con_I
                                                                con_S
                                                                con_I
                                                                con_I
    };                                                          con_I

/* pointer to last command record (the one for non-control commands) */
ConControlT      *conNotControlRecord;

/***************/
/* atomic command table */
/***************/
ConCommandT   conCommands[] =
    {
    /*
    command,                   name,                      nameTag,  funct

    conAtomStringFormat,       "STRINGFORMAT",            0,        con_/
    conAtomDisplayLeft,        "DISPLAYLEFT",        0,             con_/
    conAtomDisplayLeft2,       "DISPLAYLEFT*",       0,             con_/
    conAtomDisplay,            "DISPLAY",            0,             con_/
    conAtomDisplay2,           "DISPLAY*",                0,        con_/
    conAtomDisplayCenter,      "DISPLAYCENTER",      0,             con_/
    conAtomDisplayCenter2,     "DISPLAYCENTER*",     0,             con_/
    conAtomDisplayAround,      "DISPLAYAROUND",      0,             con_/
    conAtomDisplayAround2,     "DISPLAYAROUND*",     0,             con_/
    conAtomOldStyle,           "",                        0,
    conAtomSubroutineCall,     "(G)",                     0,
    con_AtomSubroutineCall,
    conAtomSubroutineReturn,"(R)",                   0,             con_/
    conAtomJump,               "(J)",                0,             con_/
    conAtomTime,               "TIME",                    0,
    conAtomDate,               "DATE",                    0,
    conAtomDateTime,           "DATETIMESTAMP",      0,             con_/
    conAtomConvertToPesos,     "CONVERTTOPESOS",     0,             con_/
    conAtomFormattedInput,     "FORMATTEDINPUT",     0,             con_/
    conAtomCursor,             "CURSOR",             0,             con_/
    conAtomBeep,               "BEEP",                    0,
    conAtomSwitchCursor,   "SWITCHCURSOR",           0,             con_/
    conAtomCommandKeys,              "COMMANDKEYS",            0,
    con_AtomCommandKeys,
    conAtomIncrement,          "INCREMENT",          0,             con_/
    conAtomDecrement,          "DECREMENT",          0,             con_/
    conAtomStartTimer,         "STARTTIMER",         0,             con_/
    conAtomStopTimer,          "STOPTIMER",          0,             con_/
    conAtomShadow,                   "SHADOW",                 0,
    con_AtomShadow,
    conAtomReplaceSubstring,"REPLACEPART",           0,             con_/
    conAtomAssign,             "$",                  0,             con_/
    conAtomTest,               "[TEST]",             0,             con_/
    conAtomFirstLine,          "FIRSTLINE",          0,             con_/
```

BEST AVAILABLE COPY

```
        conAtomMISSaveList,          "MISSAVELIST",        0,              con_A
        conAtomRoundNumber,               "ROUNDNUMBER",          0,
        con_AtomRoundNumber,
        conAtomTestValid,            "TESTVALID",          0,              con_A
        conAtomTestEmpty,            "TESTEMPTY",          0,              con_A
        conAtomBondCardHasMMF,       "BONDCARDHASMMF",         0,
        con_AtomBondCardHasMMF,
        conAtomLeftChars,            "LEFTCHARS",          0,              con_A

        conAtomRememberChileTimeout,    "REMEMBERCHILETIMEOUT",        0,
        con_AtomRememberChileTimeout,
        conAtomRememberChileAbandoned,      "REMEMBERCHILEABANDONED",
        con_AtomRememberChileAbandoned,
        conAtomRememberChileTerminar,   "REMEMBERCHILETERMINAR",       0,
        con_AtomRememberChileTerminar,
        conAtomSetUpChileBadTouch,          "SETUPCHILEBADTOUCH",
        con_AtomSetUpChileBadTouch,
        conAtomRememberChileClient,         "REMEMBERCHILECLIENT",
        con_AtomRememberChileClient,
        conAtomRememberChileWhatIf,         "REMEMBERCHILEWHATIF",
        con_AtomRememberChileWhatIf,

        conAtomDrawIntroGraph,      "DRAWINTROGRAPH",  0,     con_AtomDrawInt

        /* send OldStyle everything we can't identify while we still have old style comman
        conAtomUndefined,             "",                      0,
    };
ConCommandT *conAtomUndefinedRecord;

#ifdef CONTEXT

        Int32T               conCurrentHistoryLine = 0;
        Boolean              conHistorySpillOver = FALSE;
        conHistoryPT      conHistoryP;

#endif

        CursHandle  CursorH;

/*************************************************************************
** .
        conInitStateStack()
**************************************************************************
* */
void conInitStateStack ( void )
        {
        extern ConStateRecordT         *conStateStack;
        extern Int16T                  conStateStackTop;

        /* grab dynamic memory for the stack */
        if ( conStateStack == (ConStateRecordT *) NULL )
                conStateStack = (ConStateRecordT *)
                        NewPtr( ((Int32T) sizeof( ConStateRecordT )) *
                                ((Int32T) CON_STACK_SIZE) );
        if ( conStateStack == (ConStateRecordT *) NULL )
                TGL_FATAL_ERROR( "Can't allocate space for control state stack." );

        /* empty the stack */
        conStateStackTop = -1;

        /* Initialize the subroutine stack */
        datInt16Init( &conSubroutineStack );
        }


/*************************************************************************
**
        conPushState()
```

BEST AVAILABLE COPY

```
*************************************************************************
* */
void conPushState ( ConStateT thisState, char *thisAddress )
	{
	extern ConStateRecordT		*conStateStack;
	extern Int16T			conStateStackTop;

	if (++conStateStackTop >= CON_STACK_SIZE)
		TGL_FATAL_ERROR("Control state stack overflow.");

	conStateStack[conStateStackTop].state = thisState;
	conStateStack[conStateStackTop].address = thisAddress;
	}


/*************************************************************************
**
	conPopState()
*************************************************************************
* */
ConStateRecordT *conPopState ( ConStateRecordT *inRec )
	{
	extern ConStateRecordT		*conStateStack;
	extern Int16T			conStateStackTop;

	/* copy the top of stack into the space provided */
	memcpy( (void *) inRec,
		(void *) &conStateStack[conStateStackTop],
		(size_t) sizeof(ConStateRecordT) );

	/* and decrement the top of stack pointer */
	if (--conStateStackTop < 0)
		TGL_FATAL_ERROR("Control state stack underflow.");

	return( inRec );
	}


/*************************************************************************
**
	conTopState()
*************************************************************************
* */
ConStateRecordT *conTopState ( ConStateRecordT *inRec )
	{
	extern ConStateRecordT		*conStateStack;
	extern Int16T			conStateStackTop;

	/* copy the top of stack into the space provided */
	memcpy( (void *) inRec,
		(void *) &conStateStack[conStateStackTop],
		(size_t) sizeof(ConStateRecordT) );

	return( inRec );
	}


/*************************************************************************
**
	conInit()
*************************************************************************
* */
void conInit ( void )
	{
	extern ConControlT	conControls[];
	extern ConControlT	*conNotControlRecord;
	extern ConCommandT	conCommands[];
	extern ConCommandT	*conAtomUndefinedRecord;
```

```
Int16T i;

/* initialize the state stack */
conInitStateStack();
conPushState(conExecuteLines, (char *) NULL);

/* initialize the command table and the pointer to the not control command */
for (i = 0; conControls[i].command != conNotControl; i++)
      conControls[i].nameTag = lblGetTag( conControls[i].name );
conNotControlRecord = conControls + i;

/* initialize the atomic command table */
for (i = 0; conCommands[i].command != conAtomUndefined; i++)
      conCommands[i].nameTag = lblGetTag( conCommands[i].name );
conAtomUndefinedRecord = conCommands + i;

#ifdef CONTEXT

      /* initialize the context table */
      conHistoryP = (conHistoryPT) NewPtr( CON_MAX_HISTORY_LINES * CON_H

#endif
}

/**********************************************************************
*
      conGetControl()
***********************************************************************
/
ConControlT *conGetControl ( char *token )
  {
      extern ConControlT conControls[], *conNotControlRecord;
      register Int32T tempTag, fastLast, i;
      register ConControlT *thisCommand;

  /* we can't find a null token */
      if ( ! token[0] ) return( conNotControlRecord );

      /* calculate the tag for the label that we are looking for */
      tempTag = lblGetTag( token );

      /* use register variables for speed in the loop */
      thisCommand = conControls;

      /* do the string compare only if the tags match */
      while (thisCommand != conNotControlRecord)
            {
        if ( thisCommand->nameTag == tempTag )
            if ( strncmp( thisCommand->name, token, MAXLABELLEN ) == 0)
                  return( thisCommand );
        thisCommand++;
       }

      /* we can't find it */
      return( conNotControlRecord );
      }

/**********************************************************************
*
      conGetCommand()
***********************************************************************
/
ConCommandT *conGetCommand ( char *token )
  {
      extern ConCommandT conCommands[], *conAtomUndefinedRecord;
      register Int32T tempTag, fastLast, i;
      register ConCommandT *thisCommand;
```

BEST AVAILABLE COPY

```
/*  we can't find a null token  */
    if ( ! token[0] ) return( conAtomUndefinedRecord );

    /*  if it's a variable, just use the '$' as a token  */
    /*  (so we don't have to look for the infix ':=')  */
    if ( token[0] == '$' ) token[1] = '\0';

    /*  calculate the tag for the label that we are looking for  */
    tempTag = lblGetTag( token );

    /*  use register variables for speed in the loop  */
    thisCommand = conCommands;

    /*  do the string compare only if the tags match  */
    while (thisCommand != conAtomUndefinedRecord)
        {
        if ( thisCommand->nameTag == tempTag )
            if ( strncmp( thisCommand->name, token, MAXLABELLEN ) == 0)
                return( thisCommand );
        thisCommand++;
        }

    /*  we can't find it  */
    return( conAtomUndefinedRecord );
    }

/*******************************************************************
**
    conIsOldLine()
*******************************************************************
* */
BooleanT conIsOldLine ( char *line )
  {
  register char *p;

  p = line;
  while (isspace(*p)) p++;

  return( (*p == '(') ||          /*  old style command  */
      (*p == ';') ||              /*  comment  */
      (*p == '\0') );             /*  blank line  */
  }

/*******************************************************************
**
    conIsComment()
*******************************************************************
* */
BooleanT conIsComment ( char *line )
  {
  register char *p;

  p = line;
  while (isspace(*p)) p++;

  return( ((*p == '(') && toupper(*(p + 1)) == 'C') ||      /*  old style comment commar
      (*p == ';') ||                                        /*  commer
      (*p == '\0') );                                       /*  blank lir
  }

/*******************************************************************
**
    conExecute()
```

control.c

BEST AVAILABLE COPY

```
*************************************************************************
* */
BooleanT traceOn = FALSE;
FILE *traceFp = NULL;
BooleanT conExecute ( char *line )
	{
	ConStateRecordT currentState;
	ConControlT *currentControl;
	Int16T offset = 0;
	char token[300];

	/* get the control record appropriate for this line */
	if ( conGetToken( &token[0], line, &offset, 300 )[0] != '\0' )
		{
		#define TRACE
		#ifdef TRACE
			extern BooleanT traceOn;
			char shortLine[30];
			extern FILE *traceFp;
		#endif

		/* get our current state */
		conTopState( &currentState );

		#ifdef CONTEXT

			/* (don't write it if our state tells us that we are skipping) */
			if ( currentState.state != conSkipLine &&
				currentState.state != conSkipElse &&
				currentState.state != conSkipCompound ) {

		strncpy( (*conHistoryP)[conCurrentHistoryLine], line, CON_HISTORY_LINE_LE
		(*conHistoryP)[conCurrentHistoryLine][CON_HISTORY_LINE_LENGTH - 1] = '\
				conCurrentHistoryLine++;
				if (conCurrentHistoryLine >= CON_MAX_HISTORY_LINES) {
					conCurrentHistoryLine = 0;
					conHistorySpillOver = TRUE;
				}
			}

		#endif

		#ifdef TRACE
			if ( traceOn )
				{
				strncpy( shortLine, line, 29 );
				shortLine[29] = '\0';

				if ( traceFp == NULL) traceFp = fopen( "trace.scan", "w" );

				/* (don't write it if our state tells us that we are skipping) *
				if ( currentState.state != conSkipLine &&
					currentState.state != conSkipElse &&
					currentState.state != conSkipCompound )
					{
					fputs( &shortLine[0], traceFp );
					fputs( "\n", traceFp );
					}

				if ( strstr( line, ";trace off" ) == line )
					{
					fclose( traceFp );
					traceFp = NULL;
					traceOn = FALSE;
					}
				}
			else if ( strstr( line, ";trace on" ) == line ) traceOn = TRUE;
		#endif
```

BEST AVAILABLE COPY

```
        /* see what kind of command our token is */
        currentControl = conGetControl( token );

        /* execute the appropriate function */
        return( (*currentControl->functions[currentState.state])( line, &offset, &toke
        }

    return( FALSE );
    }
```

BEST AVAILABLE COPY

```
/**************************************************************************
**
    conTruncateComment()
***************************************************************************
* */
void conTruncateComment ( char *line )
    {
    register char *place;

    place = line;

    while (*place)
        {
        if (*place == ';')
            {
            *place = '\0';
            break;
            }
        place++;
        }
    }


/* * * * * * * * * * * * * * * * * * * * */
/*                                       */
/*  C O M M A N D   F U N C T I O N S    */
/*                                       */
/* * * * * * * * * * * * * * * * * * * * */

/* * * * * * * * * * * */
/*  control commands   */
/* * * * * * * * * * * */

/**************************************************************************
**
    if
***************************************************************************
* */
BooleanT con_If ( char *line, Int16T *offset, char *token )
    {
    conTruncateComment( line + *offset );
    if ( scnEvaluateBoolean( line + *offset ) )
        {
        conPushState( conSkipElse, (char *) NULL );
        conPushState( conExecuteLine, (char *) NULL );
        }
    else
        {
        conPushState( conExecuteElse, (char *) NULL );
        conPushState( conSkipLine, (char *) NULL );
        }

    return( FALSE );
    }

/*----------------------------------------------------------------------*/
```

control.c

BEST AVAILABLE COPY

```
BooleanT con_EL_If ( char *line, Int16T *offset, char *token )
	{
	ConStateRecordT currentState;

	conPopState( &currentState );
	con_If( line, offset, token );

	return( FALSE );
	}

/*----------------------------------------------------------------------*/
BooleanT con_SL_If ( char *line, Int16T *offset, char *token )
	{
	ConStateRecordT currentState;

	conPopState( &currentState );
	conPushState( conSkipElse, (char *) NULL );
	conPushState( conSkipLine, (char *) NULL );

	return( FALSE );
	}

/*----------------------------------------------------------------------*/
BooleanT con_EE_If ( char *line, Int16T *offset, char *token )
	{
	ConStateRecordT currentState;

	conPopState( &currentState );
	con_If( line, offset, token );

	return( FALSE );
	}

/*----------------------------------------------------------------------*/
BooleanT con_SE_If ( char *line, Int16T *offset, char *token )
	{
	ConStateRecordT currentState;

	conPopState( &currentState );
	conTopState( &currentState );

	if (currentState.state != conSkipCompound)
		con_If( line, offset, token );
	else
		con_SC_If( line, offset, token );

	return( FALSE );
	}

/*----------------------------------------------------------------------*/
BooleanT con_SC_If ( char *line, Int16T *offset, char *token )
	{
	conPushState( conSkipElse, (char *) NULL );
	conPushState( conSkipLine, (char *) NULL );

	return( FALSE );
	}

/*********************************************************************
**
	else
*********************************************************************
* */
BooleanT con_Else ( char *line, Int16T *offset, char *token )
	{
	/*  this is executed whenever an unexpected else appears (no else state on stac
	TGL_ERROR("Unexpected else.");
```

BEST AVAILABLE COPY

```
        return( FALSE );
        }

/*----------------------------------------------------------------------*/
BooleanT con_SE_Else ( char *line, Int16T *offset, char *token )
        {
        ConStateRecordT currentState;

        conPopState( &currentState );
        conPushState( conSkipLine, (char *) NULL );

        return( FALSE );
        }

/*----------------------------------------------------------------------*/
BooleanT con_EE_Else ( char *line, Int16T *offset, char *token )
        {
        ConStateRecordT currentState;

        conPopState( &currentState );
        conPushState( conExecuteLine, (char *) NULL );

        return( FALSE );
        }

/*******************************************************************
**
        leftBrace
*******************************************************************
* */
BooleanT con_LeftBrace ( char *line, Int16T *offset, char *token )
        {
        conPushState( conExecuteCompound, (char *) NULL );

        return( FALSE );
        }

/*----------------------------------------------------------------------*/
BooleanT con_EL_LeftBrace ( char *line, Int16T *offset, char *token )
        {
        ConStateRecordT currentState;

        conPopState( &currentState );
        conPushState( conExecuteCompound, (char *) NULL );

        return( FALSE );
        }

/*----------------------------------------------------------------------*/
BooleanT con_SL_LeftBrace ( char *line, Int16T *offset, char *token )
        {
        ConStateRecordT currentState;

        conPopState( &currentState );
        conPushState( conSkipCompound, (char *) NULL );

        return( FALSE );
        }

/*----------------------------------------------------------------------*/
BooleanT con_EE_LeftBrace ( char *line, Int16T *offset, char *token )
        {
        ConStateRecordT currentState;

        conPopState( &currentState );
        conPushState( conExecuteCompound, (char *) NULL );

        return( FALSE );
```

BEST AVAILABLE COPY

```
      }

/*---------------------------------------------------------------------------*/
BooleanT con_SE_LeftBrace ( char *line, Int16T *offset, char *token )
      {
      ConStateRecordT currentState;

      conPopState( &currentState );  /*  get rid of the skipElse state  */

      conTopState( &currentState );  /*  see if we are skipping a compound  */

      if (currentState.state == conSkipCompound)        /*  if we are, keep skipping  */
            conPushState( conSkipCompound, (char *) NULL );
      else
            conPushState( conExecuteCompound, (char *) NULL );

      return( FALSE );
      }

/*---------------------------------------------------------------------------*/
BooleanT con_SC_LeftBrace ( char *line, Int16T *offset, char *token )
      {
      conPushState( conSkipCompound, (char *) NULL );

      return( FALSE );
      }

/***************************************************************************
**
      rightBrace
****************************************************************************
* */
BooleanT con_RightBrace ( char *line, Int16T *offset, char *token )
      {
      /*  this is executed whenever an unexpected '}' appears (TOS is not a compound sta
      TGL_ERROR("Unexpected '}'.");

      return( FALSE );
      }

/*---------------------------------------------------------------------------*/
BooleanT con_SE_RightBrace ( char *line, Int16T *offset, char *token )
      {
      ConStateRecordT currentState;

      /*  pop the skip else record  */
      conPopState( &currentState );

      /*  pop the next record (which should be some kind of compound statement state)
      conPopState( &currentState );
      if ( currentState.state != conSkipCompound &&
           currentState.state != conExecuteCompound )
          con_RightBrace (line, offset, token );

      return( FALSE );
      }

/*---------------------------------------------------------------------------*/
BooleanT con_EE_RightBrace ( char *line, Int16T *offset, char *token )
      {
      ConStateRecordT currentState;

      /*  pop the execute else record (a '}' is not an else)  */
      conPopState( &currentState );

      /*  pop the next record (which should be some kind of compound statement state)
      conPopState( &currentState );
      if ( currentState.state != conSkipCompound &&
```

```
        currentState.state != conExecuteCompound )
        con_RightBrace (line, offset, token );

    return( FALSE );
    }

/*------------------------------------------------------------------------*/
BooleanT con_EC_RightBrace ( char *line, Int16T *offset, char *token )
    {
    ConStateRecordT currentState;

    conPopState( &currentState );

    return( FALSE );
    }

/*------------------------------------------------------------------------*/
BooleanT con_SC_RightBrace ( char *line, Int16T *offset, char *token )
    {
    ConStateRecordT currentState;

    conPopState( &currentState );

    return( FALSE );
    }

/***********************************************************************
**
    notControl
***********************************************************************
* */
BooleanT con_NotControl ( char *line, Int16T *offset, char *token )
    {
    ConStateRecordT currentState;
    ConCommandT  *currentCommand;

    /*  don't do anything if it's only a comment  */
    if (conIsComment(line)) return( FALSE );

    /*  don't execute the command if our underlying state was a skip state  */
    conTopState( &currentState );
    if ( currentState.state == conSkipLine ||
            currentState.state == conSkipCompound )
            return( FALSE );

    /*  get the control record appropriate for this line  */
    currentCommand = conGetCommand( token );

    /*  execute the appropriate function  */
    (*currentCommand->function)( line, offset );

    return( FALSE );
    }

/*------------------------------------------------------------------------*/
BooleanT con_EL_NotControl ( char *line, Int16T *offset, char *token )
    {
    ConStateRecordT currentState;

    /*  don't change state if it's only a comment  */
    if (conIsComment(line)) return( FALSE );

    conPopState( &currentState );
    con_NotControl( line, offset, token );

    return( FALSE );
    }
```

```
/*---------------------------------------------------------------------------*/
BooleanT con_SL_NotControl ( char *line, Int16T *offset, char *token )
    {
    ConStateRecordT currentState;

    /* don't change state if it's only a comment */
    if (conIsComment(line)) return( FALSE );

    conPopState( &currentState );

    return( FALSE );
    }

/*---------------------------------------------------------------------------*/
BooleanT con_EE_NotControl ( char *line, Int16T *offset, char *token )
    {
    ConStateRecordT currentState;

    /* don't change state if it's only a comment */
    if (conIsComment(line)) return( FALSE );

    /* remove this skip else state record */
    /* and any other else state records */
    do {
        conPopState( &currentState );
        conTopState( &currentState );
        }
    while ( currentState.state == conExecuteElse ||
            currentState.state == conSkipElse );

    /* (perhaps) execute the command */
    con_NotControl( line, offset, token );

    return( FALSE );
    }

/*---------------------------------------------------------------------------*/
BooleanT con_SE_NotControl ( char *line, Int16T *offset, char *token )
    {
    ConStateRecordT currentState;

    /* don't change state if it's only a comment */
    if (conIsComment(line)) return( FALSE );

    /* remove this skip else state record */
    /* and any other else state records */
    do {
        conPopState( &currentState );
        conTopState( &currentState );
        }
    while ( currentState.state == conExecuteElse ||
            currentState.state == conSkipElse );

    /* (perhaps) execute the command */
    con_NotControl( line, offset, token );

    return( FALSE );
    }

/*---------------------------------------------------------------------------*/
BooleanT con_SC_NotControl ( char *line, Int16T *offset, char *token )
    {
    /* skip it */
    return( FALSE );
    }


/*---------------------------------------------------------------------------*/
```

control.c

BEST AVAILABLE COPY

```
BooleanT con_Quit ( char *line, Int16T *offset, char *token )
      {
      return( TRUE );
      }

/*------------------------------------------------------------------------*/
BooleanT con_SL_Quit ( char *line, Int16T *offset, char *token )
      {
      ConStateRecordT currentState;

      conPopState( &currentState );

      return( FALSE );
      }

/*------------------------------------------------------------------------*/
BooleanT con_SE_Quit ( char *line, Int16T *offset, char *token )
      {
      ConStateRecordT currentState;

      conPopState( &currentState );

      return( FALSE );
      }

/*------------------------------------------------------------------------*/
BooleanT con_SC_Quit ( char *line, Int16T *offset, char *token )
      {
      return( FALSE );
      }


/* * * * * * * * * * * */
/*  atomic commands  */
/* * * * * * * * * * * */


/*************************************************************************
*
      conFormat()
*************************************************************************
/
void conFormat ( char *target, Int32T *targetOffset,
                          char *format, Int32T *formatOffset,
                          char *source )
      {
      Int32T tO, fO, sO;
      char varType;
      char justify, *sourcePointer, floatingID, tempNumber[50];
      Int32T length, decimals;
      BooleanT forceLength, forceDecimals, commas, euroStyle;
      char   error[100];

      /*  copy the offsets for our internal use  */
      tO = *targetOffset;
      fO = *formatOffset;
      sO = 0;

      /*  set the defaults for the flags we need to call forViewFormat  */
      justify = 'r';
      commas = FALSE;
      euroStyle = FALSE;
      length = 100;
      decimals = 0;
      forceLength = FALSE;
      forceDecimals = FALSE;
      floatingID = '\0';
```

BEST AVAILABLE COPY

```
/* set the flags per the user's instructions */
varType = '\0';
while ( ! varType )
      {
      fO++;
      switch ( toupper( format[fO] ) )
            {
            case '%' :
            case 'S' :
            case 'N' : varType = format[fO];        break;

            case '-' : justify = 'l';               break;
            case ',' : commas = TRUE;                       break;
            case ';' : euroStyle = TRUE;            break;
            case '$' : floatingID = format[fO];     break;
            case 'W' : forceLength = TRUE;          break;
            case 'T' : forceDecimals = TRUE;        break;
            case '0' :
            case '1' :
            case '2' :
            case '3' :
            case '4' :
            case '5' :
            case '6' :
            case '7' :
            case '8' :
            case '9' : length = MIN( 50, atoi( format + fO ) );
                        while ( isdigit( format[++fO] ) );
                        fO--;
                        break;
            case '.' : decimals = atoi( format + ++fO );
                        while ( isdigit( format[++fO] ) );
                        fO--;
                        break;
            default :  sprintf( error, "Unrecognized formatting flag: %c.",
                                format[fO] );
                        TGL_ERROR( error );
            }
      }

/* do the formatting */
switch ( toupper( varType ) )
      {
      case '%' :
            /* put in a single % sign */
            target[tO] = '%';
            tO++;
            break;

      case 'S' :
            /* copy the whole variable to our target */
            target[tO] = '\0';
            strcpy( target + tO, source );
            tO += strlen( source );
            break;

      case 'N' :
            formatNumber( &tempNumber[0], source, length, forceLength, decima
                          justify, commas, euroStyle, floatingID );

            /* copy the temporary number to our target */
            target[tO] = '\0';
            strcpy( target + tO, tempNumber );
            tO += strlen( tempNumber );
            break;
      }
```

```
	/* set the user's offsets (all went well) */
	*formatOffset = fO;
	*targetOffset = tO;
	}
```

BEST AVAILABLE COPY

```
/*-----------------------------------------------------------------------*/
void con_AtomStringFormat ( char *line, Int16T *offset )
	{
	char formatString[VAR_MAXVARLEN], temp[VAR_MAXVARLEN], tempTarget[
*targetString, *thisPtr;
	Int32T targetVar, thisVar, i, j;
	char error[VAR_MAXVARLEN + 100];

	/* find out where to put our newly formatted variable */
	targetVar = atoi( conGetToken( &temp[0], line, offset, VAR_MAXVARLEN ) + 1 '
	targetString = varPtr( targetVar );

	/* get the format string */
	if (! conGetString( &formatString[0], line, offset, VAR_MAXVARLEN ))
		{
		sprintf( error, "stringFormat: bad format string: %s", formatString );
		TGL_ERROR( error );
		return;
		}

	/* go through this format string */
  j = 0;
	for ( i = 0; formatString[i]; i++ )
		{
		switch (formatString[i])
			{
			case '%' :
				/* just copy a "...%%..." as "...%..." */
				if ( formatString[i + 1] == '%' )
					tempTarget[j++] = formatString[i++];
				else
					{
					/* get a variable */
					thisVar = atoi( conGetToken( &temp[0], line, offset, VAI
					thisPtr = varPtr( thisVar );

					/* send the target string, the format string, and the sour

					conFormat( tempTarget, &j, formatString, &i, thisPtr );
					}
				break;
			default :
				tempTarget[j++] = formatString[i];
			}
		}

	/* end the new variable */
	tempTarget[j] = '\0';
	strcpy( targetString, tempTarget );
	}

/*-----------------------------------------------------------------------*/
RGBColor conTempForeColor, conTempBackColor;

void conSetUpTextAttributes ( void )
	{
	/* get the current colors */
	GetForeColor( &conTempForeColor );
	GetBackColor( &conTempBackColor );

	/* set up the text display attributes */
	RGBForeColor( &tglTextFGColor );
	RGBBackColor( &tglTextBGColor );
```

BEST AVAILABLE COPY

```
        TextFont( tglTextFont );
        TextSize( tglTextSize );
        TextFace( tglTextFace );
        }

/*------------------------------------------------------------------------*/
void conFixTextAttributes ( void )
        {
        /*  reset the previous colors  */
        RGBForeColor( &conTempForeColor );
        RGBBackColor( &conTempBackColor );
        }

/*------------------------------------------------------------------------*/
void con_AtomDisplayLeft ( char *line, Int16T *offset )
        {
        conDisplayLeft( line, offset, FALSE );
        }

void con_AtomDisplayLeft2 ( char *line, Int16T *offset )
        {
        conDisplayLeft( line, offset, TRUE );
        }

void conDisplayLeft ( char *line, Int16T *offset, BooleanT twoScreens )
        {
        Int32T x, y;
        char string[200];
        Point lastPosition;
        char   error[300];

        /*  get the string to be displayed  */
        if (! conGetString( &string[0], line, offset, 200 ))
                {
                sprintf( error, "displayLeft: bad string: %s", string );
                TGL_ERROR( error );
                return;
                }

        /*  get the pixel address  */
        if ( ! conGetPosition( &y, &x, line, offset ) )
                {
                GetPen( &lastPosition );
                x = lastPosition.h;
                y = lastPosition.v;
                }

        /*  display the text  */
        for( scrScreenSet( 0, twoScreens ); scrScreenSet(1, twoScreens ); )
                {
                conSetUpTextAttributes();
                MoveTo( x - stringwidth( string ), y );
                drawstring( string );
                conFixTextAttributes();
                }
        }
/*------------------------------------------------------------------------*/
void con_AtomDisplay ( char *line, Int16T *offset )
        {
        conDisplay( line, offset, FALSE );
        }

void con_AtomDisplay2 ( char *line, Int16T *offset )
        {
        conDisplay( line, offset, TRUE );
        }
```

control.c

BEST AVAILABLE COPY

```
void conDisplay ( char *line, Int16T *offset, BooleanT twoScreens )
    {
    Int32T x, y;
    char string[200];
    BooleanT foundAddress;
    char   error[300];

    /*  get the string to be displayed  */
    if (! conGetString( &string[0], line, offset, 200 ))
        {
        sprintf( error, "display: bad string: %s", string );
        TGL_ERROR( error );
        return;
        }

    /*  get the pixel address  */
    foundAddress = conGetPosition( &y, &x, line, offset );

    /*  display the text  */
    for( scrScreenSet( 0, twoScreens ); scrScreenSet(1, twoScreens ); )
        {
        if ( foundAddress ) MoveTo( x, y );
        conSetUpTextAttributes();
        drawstring( string );
        conFixTextAttributes();
        }
    }

/*------------------------------------------------------------------------------*/
void con_AtomDisplayCenter ( char *line, Int16T *offset )
    {
    conDisplayCenter( line, offset, FALSE );
    }

void con_AtomDisplayCenter2 ( char *line, Int16T *offset )
    {
    conDisplayCenter( line, offset, TRUE );
    }

void conDisplayCenter ( char *line, Int16T *offset, BooleanT twoScreens )
    {
    Int32T x, y;
    char string[200];
    Point lastPosition;
    char   error[300];

    /*  get the string to be displayed  */
    if (! conGetString( &string[0], line, offset, 200 ))
        {
        sprintf( error, "displayCenter: bad string: %s", string );
        TGL_ERROR( error );
        return;
        }

    /*  get the pixel address  */
    if ( ! conGetPosition( &y, &x, line, offset ) )
        {
        GetPen( &lastPosition );
        x = lastPosition.h;
        y = lastPosition.v;
        }

    /*  display the text  */
    for( scrScreenSet( 0, twoScreens ); scrScreenSet(1, twoScreens ); )
        {
        conSetUpTextAttributes();
        MoveTo( x - stringwidth( string ) / 2, y );
        drawstring( string );
```

BEST AVAILABLE COPY

```
        conFixTextAttributes();
        }
    }

/*----------------------------------------------------------------------*/
void con_AtomDisplayAround ( char *line, Int16T *offset )
    {
    conDisplayAround( line, offset, FALSE );
    }

void con_AtomDisplayAround2 ( char *line, Int16T *offset )
    {
    conDisplayAround( line, offset, TRUE );
    }

void conDisplayAround ( char *line, Int16T *offset, BooleanT twoScreens )
    {
    Int32T x, y;
    char *centerPosition, string[200], center[200];
    Point lastPosition;
    char  error[300];

    /* get the string to be displayed */
    if (! conGetString( &string[0], line, offset, 200 ))
        {
        sprintf( error, "displayAround: bad string: %s", string );
        TGL_ERROR( error );
        return;
        }

    /* get the string with the center character */
    if (! conGetString( &center[0], line, offset, 200 ))
        {
        sprintf( error, "displayAround: bad center: %s", string );
        TGL_ERROR( error );
        return;
        }

    /* find the center in the string */
    centerPosition = strstr( string, center );

    /* center it around the end if there's no instance of the center in the string */
    if ( centerPosition == (char *) NULL )
        centerPosition = string + strlen( string );

    /* get the pixel address */
    if ( ! conGetPosition( &y, &x, line, offset ) )
        {
        GetPen( &lastPosition );
        x = lastPosition.h;
        y = lastPosition.v;
        }

    /* display the text */
    for( scrScreenSet( 0, twoScreens ); scrScreenSet(1, twoScreens ); )
        {
        conSetUpTextAttributes();
        MoveTo( x - (stringwidth( string ) - stringwidth( centerPosition )), y );
        drawstring( string );
        conFixTextAttributes();
        }
    }

/*----------------------------------------------------------------------*/
void con_AtomOldStyle ( char *line, Int16T *offset )
    {
    /* execute it (it is an old style command line) */
    scnExecuteOldLine( line );
```

```
}
```

BEST AVAILABLE COPY

```
/*---------------------------------------------------------------------------*/
void con_AtomSubroutineCall ( char *line, Int16T *offset )
	{
	extern DatInt16Stack conSubroutineStack;
	extern Int16T			conStateStackTop;

	/* treat it like a left brace for our control stack */
	con_LeftBrace( line, offset, "" );

	/* remember where we were in case we return from a taller stack */
	datInt16Push( &conSubroutineStack, conStateStackTop );

	/* and execute it (it is an old style command line) */
	scnExecuteOldLine( line );
	}

/*---------------------------------------------------------------------------*/
void con_AtomSubroutineReturn ( char *line, Int16T *offset )
	{
	extern DatInt16Stack conSubroutineStack;
	extern Int16T		conStateStackTop;

	/* execute it (it is an old style command line) */
	scnExecuteOldLine( line );

	/* pop back to the stack as it was when we got here */
	conStateStackTop = datInt16Pop( &conSubroutineStack );

	/* treat it like a right brace for our control stack */
	con_EC_RightBrace( line, offset, "" );
	}

/*---------------------------------------------------------------------------*/
void con_AtomJump ( char *line, Int16T *offset )
	{
	extern DatInt16Stack conSubroutineStack;
	extern Int16T		conStateStackTop;

	/* execute it (it is an old style command line) */
	scnExecuteOldLine( line );

	/* pop back to the stack as it was at the last (G) command */
	/* (but leave the subroutine stack at the same level pending an (R)) */
	conStateStackTop = datInt16Pop( &conSubroutineStack );
	datInt16Push( &conSubroutineStack, conStateStackTop );
	}

/*---------------------------------------------------------------------------*/
void con_AtomTime ( char *line, Int16T *offset )
	{
	char userVar[6];

	conGetToken( &userVar[0], line, offset, 6 );

	if ( ( !*userVar ) ||
		( *userVar != '$') ||
		( atoi(userVar+1) >= VAR_MAXVAR) ||
		( atoi(userVar+1) == 0) )
		{
		TGL_ERROR( "time: bad or missing variable name." );
		return;
		}

	/* return the system time into the user's variable */
	formatTime( varPtr( atoi(userVar+1) ) );
```

BEST AVAILABLE COPY

```
	}

/*-----------------------------------------------------------------------------*/
void con_AtomDate ( char *line, Int16T *offset )
	{
	char userVar[6];

	conGetToken( &userVar[0], line, offset, 6 );

	if ( ( !*userVar ) ||
		( *userVar != '$') ||
		( atoi(userVar+1) >= VAR_MAXVAR) ||
		( atoi(userVar+1) == 0) )
		{
		TGL_ERROR( "date: bad or missing variable name." );
		return;
		}

	/* return the system time into the user's variable */
	formatDate( varPtr( atoi(userVar+1) ) );
	}

/*-----------------------------------------------------------------------------*/
void con_AtomDateTime ( char *line, Int16T *offset )
	{
	char userVar[6];

	conGetToken( &userVar[0], line, offset, 6 );

	if ( ( !*userVar ) ||
		( *userVar != '$') ||
		( atoi(userVar+1) >= VAR_MAXVAR) ||
		( atoi(userVar+1) == 0) )
		{
		TGL_ERROR( "dateTimeStamp: bad or missing variable name." );
		return;
		}

	/* return the system time into the user's variable */
	formatDateTime( varPtr( atoi(userVar+1) ) );
	}

/*-----------------------------------------------------------------------------*/
void con_AtomConvertToPesos ( char *line, Int16T *offset )
	{
	char userVar[6], source[100];
	int toVarNumber;

	conGetToken( &userVar[0], line, offset, 6 );

	/*  get the destination variable number  */
	if ( ( !*userVar ) ||
		( *userVar != '$') ||
		( atoi(userVar+1) >= VAR_MAXVAR) ||
		( atoi(userVar+1) == 0) )
		{
		TGL_ERROR( "convertToPesos: bad or missing variable name." );
		return;
		}
	toVarNumber = atoi(userVar+1);

	/*  get the source string  */
	if (! conGetString( &source[0], line, offset, 100 ))
		{
		TGL_ERROR( "convertToPesos: bad source" );
		return;
		}
```

BEST AVAILABLE COPY

```
        chfPutMoney( varPtr( toVarNumber ), chfGetMoney( source ), CUR_PESO );
        }

/*---------------------------------------------------------------------------*/
void con_AtomIncrement ( char *line, Int16T *offset )
        {
        char userVar[6], source[100];
        int toVarNumber;

        conGetToken( &userVar[0], line, offset, 6 );

        /*  get the destination variable number  */
        if ( ( !*userVar ) ||
                ( *userVar != '$') ||
                ( atoi(userVar+1) >= VAR_MAXVAR) ||
                ( atoi(userVar+1) == 0) )
                {
                TGL_ERROR( "increment: bad or missing variable name." );
                return;
                }

        toVarNumber = atoi(userVar+1);
        varSetL( toVarNumber, varVal( toVarNumber ) + 1 );
        }

/*---------------------------------------------------------------------------*/
void con_AtomDecrement ( char *line, Int16T *offset )
        {
        char userVar[6], source[100];
        int toVarNumber;

        conGetToken( &userVar[0], line, offset, 6 );

        /*  get the destination variable number  */
        if ( ( !*userVar ) ||
                ( *userVar != '$') ||
                ( atoi(userVar+1) >= VAR_MAXVAR) ||
                ( atoi(userVar+1) == 0) )
                {
                TGL_ERROR( "decrement: bad or missing variable name." );
                return;
                }

        toVarNumber = atoi(userVar+1);
        varSetL( toVarNumber, varVal( toVarNumber ) - 1 );
        }

/*---------------------------------------------------------------------------*/
void con_AtomStartTimer ( char *line, Int16T *offset )
        {
        char                    userVar[6], source[100];
        Int32T                          toVarNumber, seconds;

        conGetToken( &userVar[0], line, offset, 6 );

        /*  get the destination variable number  */
        if ( ( !*userVar ) ||
                ( *userVar != '$') ||
                ( atoi(userVar+1) >= VAR_MAXVAR) ||
                ( atoi(userVar+1) == 0) )
                {
                TGL_ERROR( "startTimer: bad or missing variable name." );
                return;
                }

        /*  get the time in seconds since midnight, January 1, 1904  */
        /*  note: this is inaccurate -- it does not take into account leap-second yea
        GetDateTime( &seconds );
```

```
        /* save it in the supplied variable */
        toVarNumber = atoi(userVar+1);
        varSetL( toVarNumber, seconds );
        }

/*-------------------------------------------------------------------------*/
void con_AtomStopTimer ( char *line, Int16T *offset )
        {
        char                userVar[6], source[100];
        Int32T                  toVarNumber, seconds;

        conGetToken( &userVar[0], line, offset, 6 );

        /* get the destination variable number */
        if ( ( !*userVar ) ||
                ( *userVar != '$') ||
                ( atoi(userVar+1) >= VAR_MAXVAR) ||
                ( atoi(userVar+1) == 0) )
                {
                TGL_ERROR( "stopTimer: bad or missing variable name." );
                return;
                }

        /* get the time in seconds since midnight, January 1, 1904 */
        /* note: this is inaccurate -- it does not take into account leap-second years like
        GetDateTime( &seconds );

        toVarNumber = atoi(userVar+1);
        varSetL( toVarNumber, seconds - varVal( toVarNumber ) );
        }

/*-------------------------------------------------------------------------*/
void con_AtomShadow ( char *line, Int16T *offset )
        {
        char                userVar[6], source[100];
        Int32T                  slot, shadowSlot;

        conGetToken( &userVar[0], line, offset, 6 );

        /* get the destination variable number */
        if ( ! *userVar )       grfShadowTableInit(); /* lookup table for shadow indexes

        else
                {
                slot = atoi( userVar );

                conGetToken( &userVar[0], line, offset, 6 );
                shadowSlot = atoi( userVar );

                if ( slot >= 256 || slot < 0 || shadowSlot >= 256 || shadowSlot < 0 )
                        {
                        TGL_ERROR( "shadow: bad color lookup table slot." );
                        return;
                        }

                shadowTable[slot] = shadowSlot;
                }
        }

/*-------------------------------------------------------------------------*
void con_AtomCursor( char *line, Int16T *offset )
        {
        extern Boolean                  tglCursorVisible;
        Int32T i;

        /* capitalize the line */
        for ( i = 0; line[i] != '\0'; i++ ) line[i] = toupper( line[i] );
```

BEST AVAILABLE COPY

BEST AVAILABLE COPY

```
	/* switch the cursor */
	if ( strstr( line + *offset, "ON" ) != NULL ) tglCursorOnOff( TGL_ON );
	else if ( strstr( line + *offset, "OFF" ) != NULL ) tglCursorOnOff( TGL_OFF );
	else if ( strstr( line + *offset, "TOGGLE" ) != NULL ) tglCursorOnOff( TGL_TOGGLE

	/* report an unrecognised argument */
	else TGL_ERROR( "cursor: bad argument" );
	}

/*------------------------------------------------------------------------*/
void con_AtomBeep( char *line, Int16T *offset )
	{
	static		Boolean		stack[10];
	static Int16T		top = 0;
	Int32T i;

	/* capitalize the line */
	for ( i = 0; line[i] != '\0'; i++ ) line[i] = toupper( line[i] );

	/* set the beep variable */
	if ( strstr( line + *offset, "ON" ) != NULL ) tglBeep = TRUE;
	else if ( strstr( line + *offset, "OFF" ) != NULL ) tglBeep = FALSE;
	else if ( strstr( line + *offset, "PUSH" ) != NULL ) {
		if (top == 10) {
			TGL_ERROR( "beep: overflowing stack" );
		}
		else {
			stack[top++] = tglBeep;
		}
	}
	else if ( strstr( line + *offset, "POP" ) != NULL ) {
		if (top == 0) {
			TGL_ERROR( "beep: popping from empty stack" );
		}
		else {
			tglBeep = stack[--top];
		}
	}

	/* report an unrecognised argument */
	else TGL_ERROR( "beep: bad argument" );
	}

/*------------------------------------------------------------------------*/
void con_AtomSwitchCursor( char *line, Int16T *offset )
{
	Int32T		i;
	char	name[50];

	/* capitalize the line */
	for ( i = 0; line[i] != '\0'; i++ ) line[i] = toupper( line[i] );

	/* get the name of the new cursor */
	conGetToken( name, line, offset, 50 );

	if ( strstr( name, "WATCH" ) != NULL ) {
		SetCursor( *tglWatch );
	}
	else if ( strstr( name, "ARROW" ) != NULL ) {
		SetCursor( &arrow );
	}
	else {
		CtoPstr( name );
		CursorH = (CursHandle) GetNamedResource( 'CURS', name );
		if (CursorH == NULL) {
			TGL_ERROR( "SwitchCursor: bad argument" );
		}
```

BEST AVAILABLE COPY

```
        else {
            SetCursor( *CursorH );
            }
    }
}

/*------------------------------------------------------------------------*/
void con_AtomCommandKeys( char *line, Int16T *offset )
    {
    Int32T i;

    /* capitalize the line */
    for ( i = 0; line[i] != '\0'; i++ ) line[i] = toupper( line[i] );

    /*
     * turn command keys on
     */
    if ( strstr( line + *offset, "ON" ) != NULL ) {

        tglScanGopher->SetCmdKeys( TRUE );
    }


    /*
     * turn command keys off
     */
    else if ( strstr( line + *offset, "OFF" ) != NULL ) {

        tglScanGopher->SetCmdKeys( FALSE );
    }


    /*
     * report an unrecognised argument
     */
    else TGL_ERROR( "commandKeys: bad argument" );
    }


/*------------------------------------------------------------------------*/
void con_AtomReplaceSubstring ( char *line, Int16T *offset )
    {
    Int32T varNumber;
    char *oldPosition, string[300], old[200], new[200];
    Point lastPosition;
    char  error[300];

    /* get the variable to be modified */
    if (! conGetVariable( &varNumber, line, offset ))
        {
        sprintf( error, "replacePart: bad variable" );
        TGL_ERROR( error );
        return;
        }

    /* get the string to be replaced */
    if (! conGetString( &old[0], line, offset, 200 ))
        {
        sprintf( error, "replacePart: bad old substring: %s", string );
        TGL_ERROR( error );
        return;
        }

    /* get the string to replace with */
    if (! conGetString( &new[0], line, offset, 200 ))
        {
        sprintf( error, "replacePart: bad new substring: %s", string );
        TGL_ERROR( error );
```

```
		return;
		}

	/*  find the 'to be replaced' string in the big string  */
	oldPosition = strstr( varPtr( varNumber ), old );

	/*  (give up if there's no instance of it)  */
	if ( oldPosition == (char *) NULL )
		return;

	/*  do the replacement  */
	strcpy( string, varPtr( varNumber ) );
	strcpy( string + ( oldPosition - varPtr( varNumber ) ), new );
	strcat( string, oldPosition + strlen( old ) );
	strcpy(  varPtr( varNumber ), string );
	}

/*-----------------------------------------------------------------------*/
void con_AtomAssign ( char *line, Int16T *offset )
	{
	errEvalString( line );
	}

/*-----------------------------------------------------------------------*/
void con_AtomFirstLine ( char *line, Int16T *offset )
	{
	/*	What this really wants is a variable to load and the notepad number to l
		as well as a number of pixels to load in. */

	char	temp[20];
	Int32T		varNum;
	Int16T		noteNum, pixWide;

	conGetVariable ( &varNum, line, offset );
	conGetToken( &temp[0], line, offset, 20 );
	noteNum = atoi( temp );
	conGetToken( &temp[0], line, offset, 20 );
	pixWide = atoi( temp );

	tglTextEditGopher->FirstLine( varPtr(varNum), noteNum, pixWide );

	}


/*-----------------------------------------------------------------------*/
void con_AtomMISSaveList ( char *line, Int16T *offset )
	{
	extern Boolean misSaveList[];
	char	temp[20];
	Int32T		varNum, oldOffset, i;

	/*  check for a "clear"  */
	oldOffset = *offset;
	conGetToken( &temp[0], line, offset, 20 );
	if ( strcmp( temp, "CLEAR" ) == 0 )
		{
		for ( i = 0; i < VAR_MAXVAR; i++ ) misSaveList[i] = FALSE;
		return;
		}
	*offset = oldOffset;

	do {
		conGetToken( &temp[0], line, offset, 20 );
		varNum = atoi( temp );
		if ( varNum < 0 || varNum >= VAR_MAXVAR )
			{
			TGL_ERROR( "MISSaveList: bad variable number" );
			}
```

BEST AVAILABLE COPY

```
		else if ( varNum != 0 ) misSaveList[varNum] = TRUE;
		}
	while ( varNum != 0 );
	}

/*-------------------------------------------------------------------------*/
/*	TestValid
	Tests the contents of a variable against of string of space-delimited words,
	and sets the result variable vErrorFlag to 0 (not found) or 1 (found in set).
	Format of the command is expected to be:
	TESTVALID $<varnum> "<valid set>"
	*/

void con_AtomTestValid ( char *line, Int16T *offset )
	{
	char	*pC,
			validSet[255],
			temp[20];
	Int32T		varNum;

	conGetToken( &temp[0], line, offset, 20 );
	varNum = atoi( temp+1 );				/* skip the dollar
	if ( varNum < 0 || varNum >= VAR_MAXVAR )
		{
		TGL_ERROR( "TestValid: bad variable number" );
		}

	conGetString(validSet, line, offset, 254);

	pC = strtok( validSet, " " );
	while ( pC != NULL )
		{
		if ( ! strcmp ( pC, varPtr ( varNum ) ) )
			{
			varSetS ( vErrorFlag, "1" );
			return;
			}
		pC = strtok ( NULL, " ");
		}

	/* else no matches */
	varSetS ( vErrorFlag, "0" );
	}

/*-------------------------------------------------------------------------*/
/*	TestEmpty
	Tests the contents of a variable, returns 1 in errorFlag if it is empty
	*/

void con_AtomTestEmpty ( char *line, Int16T *offset )
	{
	char	*pC,
			*validSet,
			temp[20];
	Int32T		varNum;

	conGetToken( &temp[0], line, offset, 20 );
	varNum = atoi( temp+1 );				/* skip the dolla
	if ( varNum < 0 || varNum >= VAR_MAXVAR )
		{
		TGL_ERROR( "TestEmpty: bad variable number" );
		}

	if ( strlen ( varPtr ( varNum ) ) == 0 )
		{
		varSetS ( vErrorFlag, "1" );
		}
	else
```

BEST AVAILABLE COPY

```
        {
        varSetS ( vErrorFlag, "0" );
        }
    return;
    }

/*-------------------------------------------------------------------------*/
/*  BondCardHasMMF returns TRUE iff there is a MMF already on the card  */

void con_AtomBondCardHasMMF ( char *line, Int16T *offset )
    {
    char   temp[20];
    Int32T         varNum;

    conGetToken( &temp[0], line, offset, 20 );
    varNum = atoi( temp+1 );                          /* skip the dollar
    if ( varNum < 0 || varNum >= VAR_MAXVAR )
        {
        TGL_ERROR( "BondCardHasMMF: bad variable number" );
        }

    sprintf( temp, "%d", ( Int16T ) ( bndMMFSlot() != -1 ) );
    varSetS ( varNum, temp );

    return;
    }

/*-------------------------------------------------------------------------*/
/*  LeftChars
    Copies the first N chars from one variable to another. Format:

    LEFTCHARS $<source> <numChars> $<destination>

    */

void con_AtomLeftChars ( char *line, Int16T *offset )
    {
    char   temp[20];
    Int32T         numChars,
                   srcVar,
                   destVar;

    conGetToken( &temp[0], line, offset, 20 );
    srcVar = atoi( temp+1 );                          /* skip the dollar sigr
    if ( srcVar < 0 || srcVar >= VAR_MAXVAR )
        {
        TGL_ERROR( "TestValid: bad variable number" );
        }

    conGetToken( &temp[0], line, offset, 20 );
    numChars = atoi( temp );
    if ( numChars < 0 || numChars >= VAR_MAXVARLEN )
        {
        TGL_ERROR( "TestValid: bad character count" );
        }

    conGetToken( &temp[0], line, offset, 20 );
    destVar = atoi( temp+1 );                         /* skip the do
    if ( destVar < 0 || destVar >= VAR_MAXVAR )
        {
        TGL_ERROR( "TestValid: bad variable number" );
        }

    strncpy (varPtr(destVar), varPtr(srcVar), numChars);
    *(varPtr(destVar)+numChars) = '\0';               /* gotta tacka NULl

    }
```

BEST AVAILABLE COPY

```
/*---------------------------------------------------------------------------*/
void con_AtomRoundNumber ( char *line, Int16T *offset )
	{
	char   temp[20];
	Int32T        toNum, fromNum;
	Int32T        roundNum;

	conGetVariable( &toNum, line, offset );
	conGetVariable( &fromNum, line, offset );
	conGetToken( &temp[0], line, offset, 20 );
	roundNum = atol( temp );
	varSetL( toNum,( ( varVal( fromNum ) + roundNum / 2 ) / roundNum ) * roundNu
	}


/*---------------------------------------------------------------------------*/
/* These next 'RememberChile' routines are used for reporting in the Chile project */
/*---------------------------------------------------------------------------*/
void conRememberChile ( char *line );
void conRememberChile ( char *line )
	{
	FILE *fp;
	Int32T writeReturn;
	char temp[255];

	/* open the output file */
	if (NULL == (fp = fopen( filePrependDir( temp, FILE_DATA_DIR, REMEMBER_CHIL
		TGL_ERROR("Cannot open 'Chile Remembered' file");
		return;
	}

	/* save this line in the file */
	writeReturn = fprintf( fp, "%s\n", line );
	if ( writeReturn < 0) TGL_ERROR("Cannot write to 'Chile Events' file");

	/* close the file */
	fclose(fp);
	}

/*---------------------------------------------------------------------------*/
void con_AtomRememberChileTimeout ( char *line, Int16T *offset )
	{
	Int32T        commentNum;
	char temp[255];

	/* get the variable of the screen name (or other comment) */
	conGetVariable( &commentNum, line, offset );

	/* format this line */
	sprintf( temp, "%s\t%s\t%s\t%s\t%s\t%s\t",
			varPtr( 398 ), /* date time stamp */
			varPtr( 12 ), /* date */
			varPtr( 13 ), /* time */
			"Timeout",
			"_",
			varPtr( commentNum )
		);

	/* save it */
	conRememberChile( temp );
	}

/*---------------------------------------------------------------------------*/
void con_AtomRememberChileAbandoned ( char *line, Int16T *offset )
	{
	Int32T        commentNum;
	char temp[255];
```

BEST AVAILABLE COPY

```
	/* get the variable of the screen name (or other comment) */
	conGetVariable( &commentNum, line, offset );

	/* format this line */
	sprintf( temp, "%s\t%s\t%s\t%s\t%s\t%s\t",
			varPtr( 398 ), /* date time stamp */
			varPtr( 12 ), /* date */
			varPtr( 13 ), /* time */
			"Abandoned",
			"_",
			varPtr( commentNum )
		);

	/* save it */
	conRememberChile( temp );
	}

/*----------------------------------------------------------------------*/
void con_AtomRememberChileTerminar ( char *line, Int16T *offset )
	{
	Int32T		commentNum;
	char temp[255];

	/* get the variable of the screen name (or other comment) */
	conGetVariable( &commentNum, line, offset );

	/* format this line */
	sprintf( temp, "%s\t%s\t%s\t%s\t%s\t%s\t",
			varPtr( 398 ), /* date time stamp */
			varPtr( 12 ), /* date */
			varPtr( 13 ), /* time */
			"Terminar",
			"_",
			varPtr( commentNum )
		);

	/* save it */
	conRememberChile( temp );
	}

/*----------------------------------------------------------------------*/
static Int32T conCommentNum = 0;
void con_AtomSetUpChileBadTouch ( char *line, Int16T *offset )
	{
	extern Int32T conCommentNum;

	/* get the variable of the screen name (or other comment) */
	conGetVariable( &conCommentNum, line, offset );
	}

/*----------------------------------------------------------------------*/
void conRememberChileBadTouch ( void )
	{
	extern Int32T conCommentNum;
	char temp[255];
	Point mouseLoc;

	/* exit if the comment number has not been set up */
	if ( conCommentNum == 0 ) return;

	/* get the position of the mouse */
	GetMouse( &mouseLoc );

	/* format this line */
	sprintf( temp, "%s\t%s\t%s\t%s\t%s\t%s\t",
			varPtr( 398 ), /* date time stamp */
			varPtr( 12 ), /* date */
			varPtr( 13 ), /* time */
```

BEST AVAILABLE COPY

```
                "Bad Touch",
                mouseLoc.h,
                mouseLoc.v,
                varPtr( conCommentNum )
            );

    /* save it */
    conRememberChile( temp );
    }

/*-----------------------------------------------------------------------*/
void con_AtomRememberChileClient ( char *line, Int16T *offset )
    {
    char temp[255];
    FILE *fp;
    Int32T writeReturn;

    /* open the output file */
    if (NULL == (fp = fopen( filePrependDir( temp, FILE_DATA_DIR, REMEMBER_CL
        TGL_ERROR("Cannot open 'Chile Remembered' file");
        return;
    }

    /* common record header */
    writeReturn = fprintf( fp, "%s\t%s\t%s\t",
                        varPtr( 398 ),    /* date time stamp */
                        varPtr( 12 ),     /* date */
                        varPtr( 13 )      /* time */
                    );
    if ( writeReturn < 0) TGL_ERROR("Can't write to 'Chile Clients' file");

    /* elapsed time */
    if ( fprintf( fp, "%s\t", varPtr( 326     ) ) < 0) TGL_ERROR("Can't write to 'Chi

    /* profession */
    if ( fprintf( fp, "%s\t", varPtr( 19      ) ) < 0) TGL_ERROR("Can't write to 'Ch

    /* client type */
    if ( fprintf( fp, "%s\t", varPtr( 320     ) ) < 0) TGL_ERROR("Can't write to 'Ch

    /* marital status */
    if ( fprintf( fp, "%s\t", varPtr( 21      ) ) < 0) TGL_ERROR("Can't write to 'Cl

    /* income */
    if ( fprintf( fp, "%s\t", varPtr( 24      ) ) < 0) TGL_ERROR("Can't write to 'C

    /* expenses */
    if ( fprintf( fp, "%s\t", varPtr( 26      ) ) < 0) TGL_ERROR("Can't write to 'C

    /* phone number */
    if ( fprintf( fp, "%s\t", varPtr( 32      ) ) < 0) TGL_ERROR("Can't write to '(

    /* time to call */
    if ( fprintf( fp, "%s\t", varPtr( 35      ) ) < 0) TGL_ERROR("Can't write to '

    /* path */
    if ( fprintf( fp, "%s\t", varPtr( 10      ) ) < 0) TGL_ERROR("Can't write to '

    /* qualified */
    if ( fprintf( fp, "%s\t", varPtr( 36      ) ) < 0) TGL_ERROR("Can't write to

    /* amount */
    if ( varVal( 10 ) != 5 )
        {
        if ( fprintf( fp, "%s\t", varPtr( 104     ) ) < 0) TGL_ERROR("Can't w
        }
    else
        {
```

BEST AVAILABLE COPY

```
        if ( fprintf( fp, "%s\t", varPtr( 131      ) ) < 0) TGL_ERROR("Can't write to 'C
        }

    /* payment */
    if ( fprintf( fp, "%s\t", varPtr( 103      ) ) < 0) TGL_ERROR("Can't write to 'Chile C

    /* term */
    if ( fprintf( fp, "%s\t", varPtr( 105      ) ) < 0) TGL_ERROR("Can't write to 'Chile C

    /* what ifs */
    if ( fprintf( fp, "%s\t", varPtr( 6              ) ) < 0) TGL_ERROR("Can't write to '

    /* end of record */
    if ( fprintf( fp, "\n"                              ) < 0) TGL_ERROR("Can't wri

    /* close the file */
    fclose(fp);
    }

/*-----------------------------------------------------------------------*/
void con_AtomRememberChileWhatIf ( char *line, Int16T *offset )
    {
    chfRememberWhatIf();
    }

/*-----------------------------------------------------------------------*/
void con_AtomDrawIntroGraph ( char *line, Int16T *offset )
    {
    introDrawGraph( line + *offset );
    }


/*-----------------------------------------------------------------------*/
/*-----------------------------------------------------------------------*/
void con_AtomTest ( char *line, Int16T *offset )
    {
    }

/*-----------------------------------------------------------------------*/
void con_AtomUndefined ( char *line, Int16T *offset )
    {
    }


/* * * * * * * * * * * * * * * * * * * * * * * * * * * */
/* routines to pull arguments out of function line */
/* * * * * * * * * * * * * * * * * * * * * * * * * * * */

/*********************************************************************
*
      conGetString()
*********************************************************************
/
BooleanT conGetString ( char *token, char *line, Int16T *offset, Int16T length )
  {
  register Int16T i, j, registerLength;
  int thisVar;
  register char *thisPtr;

  registerLength = length;

  /* pass the whitespace and commas */
  i = *offset;
  while ( isspace(line[i]) || line[i] == ',' ) i++;

  /* find a quotation mark or a variable (denoted by $) */
```

BEST AVAILABLE COPY

```
  if ( line[i] == '"' )
      {
      /* skip the initial '"' */
      i++;

      /* copy the stuff inside the string */
      j = 0;
            while ( line[i] &&
            line[i] != '"' &&
            j < registerLength )
      token[j++] = line[i++];

     /* pass the closing quotation mark */
     i++;
     }
  else if ( line[i] == '$' )
      {
      /* skip the initial '$' */
      i++;

      /* get a pointer to this string variable */
            thisVar = atoi( line + i );
            while ( isdigit( line[i++] ) );
            thisPtr = varPtr( thisVar );

            /* copy it */
      j = 0;
            while ( *thisPtr && j < registerLength )
                  {
      token[j++] = *thisPtr;
      thisPtr++;
      }
      }
  else
      return( FALSE );

  /* blank out the passed string if we've used the whole thing and aren't done */
  if ( j == registerLength ) return( FALSE );

  /* end the string */
  token[j] = '\0';
  *offset = i;

  return( TRUE );
      }

/************************************************************************
*
      conGetPosition()
************************************************************************
/
BooleanT conGetPosition ( Int32T *x, Int32T *y, char *line, Int16T *offset )
  {
  char token[30];

  if ( conGetToken( &token[0], line, offset, 30 )[0] == '\0' ) return( FALSE );
  if ( token[0] == '@' ) *x = atoi( token + 1 );
  else *x = atoi( token );

  if ( conGetToken( &token[0], line, offset, 30 )[0] == '\0' ) return( FALSE );
  *y = atoi( token );

  return( TRUE );
      }
```

BEST AVAILABLE COPY

```
/************************************************************************
*
      conGetVariable()
*************************************************************************
/
BooleanT conGetVariable ( Int32T *variable, char *line, Int16T *offset )
  {
  char token[30];

  if ( conGetToken( &token[0], line, offset, 30 )[0] == '\0' ) return( FALSE );
  if ( token[0] == '$' ) *variable = atoi( token + 1 );
  else return( FALSE );
      }

/************************************************************************
*
      conGetToken()
*************************************************************************
/
char *conGetToken ( char *token, char *line, Int16T *offset, Int16T length )
  {
  register Int16T i, j, registerLength;

  if ( *offset >= strlen( line ) )
      {
      token[0] = '\0';
        return( token );
        }

  registerLength = length;

  /*  pass the whitespace and commas  */
  i = *offset;
  while ( isspace(line[i]) || line[i] == ',' ) i++;

  /*  copy the token  */
  j = 0;
  while ( line[i] &&
        ! isspace(line[i]) &&
       (line[i] != ',') &&
       j < registerLength )
     token[j++] = toupper(line[i++]);

  /*  blank out the passed string or update the offset  */
  if (j == registerLength)
      token[0] = '\0';
  else
      {
      token[j] = '\0';
      *offset = i;
      }

  return( token );
      }


/************************************************************************
*
      conGetFormat()
*************************************************************************
/
void conGetFormat ( char *format, Int32T *formatOffset,  char *justify, Boolean *comn
      Boolean *euroStyle, Int32PT length, Int32PT decimals, Boolean *forceLength,
      Boolean *forceDecimals, char *floatingID )
{
      Int32T fO;
      char  *sourcePointer, tempNumber[50];
      char   error[50];
```

BEST AVAILABLE COPY

```
	/* copy the offsets for our internal use */
	fO = *formatOffset;

	/* set the defaults for the flags we need to call forViewFormat */
	*justify = 'r';
	*commas = FALSE;
	*euroStyle = FALSE;
	*length = 100;
	*decimals = 0;
	*forceLength = FALSE;
	*forceDecimals = FALSE;
	*floatingID = '\0';

	/* set the flags again per the user's instructions */
	while ( (format[++fO] != '\0') && (toupper( format[fO] ) != 'N') ) {
		switch ( toupper( format[fO] ) ) {
			case '-' : *justify = 'l';		break;
			case ',' : *commas = TRUE;		break;
			case ';' : *euroStyle = TRUE;		break;
			case '$' : *floatingID = format[fO];	break;
			case 'W' : *forceLength = TRUE;		break;
			case 'T' : *forceDecimals = TRUE;	break;
			case '0' :
			case '1' :
			case '2' :
			case '3' :
			case '4' :
			case '5' :
			case '6' :
			case '7' :
			case '8' :
			case '9' : *length = MIN( 50, atoi( format + fO ) );
					while ( isdigit( format[++fO] ) );
					fO--;
					break;
			case '.' : *decimals = atoi( format + ++fO );
					while ( isdigit( format[++fO] ) );
					fO--;
					break;
			default : sprintf( error, "Unrecognized formatting flag: %c.",
						format[fO] );
					TGL_ERROR( error );
		}
	}

	*formatOffset = fO;
}

void con_AtomFormattedInput( char *line, Int16T *offset )
{
	char		formatString[100], *targetString;
	Int32T		targetVar;
	char		justify, floatingID, temp[20];
	Int32T		length, decimals, i, j, x, y;
	Boolean		forceLength, forceDecimals, commas, euroStyle, foundFormat
	char		error[128];
	Boolean		twoScreens;
	Point		p;
	char		iniText[256];
	char		err[256];
	Int32T		numChars;

	/* find out if there is a star in the command */
	conGetToken( temp, line, offset, 20 );
	if (temp[0] == '*') {
		twoScreens = TRUE;
	}
```

BEST AVAILABLE COPY

```
else {
        twoScreens = FALSE;
        (*offset) -= strlen( temp );
}

/*  find out where to put our newly formatted variable  */
if (!conGetVariable( &targetVar, line, offset )) {
        sprintf( err, "Target missing or out of order:\r'%s'\r", line );
        TGL_ERROR( err );
}
strcpy( iniText, varPtr( targetVar ));

/*  get the format string  */
if (!conGetString( &formatString[0], line, offset, 100 )) {
        sprintf( err, "Formatting string missing or out of order:\r'%s'\r", line );
        TGL_ERROR( err );
}

/*  find out where on the screen to accept into */
conGetToken( temp, line, offset, 20 );
if (temp[0] != '@') {
        sprintf( err, "Position missing or out of order:\r'%s'\r", line );
        TGL_ERROR( err );
}
else {
        (*offset) -= strlen( temp );
        if (conGetPosition ( &y, &x, line, offset )) {
                p.h = x;
                p.v = y;
        }
        else {
                sprintf( err, "Position missing or out of order:\r'%s'\r", line );
                TGL_ERROR( err );
        }
}

/* get the number of characters */
numChars = atoi( conGetToken( temp, line, offset, 20 ));

/* get the number of pixels in the input field if specified */
edtEditWidth = atoi( conGetToken( temp, line, offset, 20 ));

/*  go through the format string and see if there is any formatting */
foundFormatting = FALSE;
for ( i = 0; formatString[i]; i++ ) {

        if (formatString[i] == '%') {

                /*  send the target string, the format string, and the source string  */
                conGetFormat( formatString, &i,  &justify, &commas,
                        &euroStyle, &length, &decimals, &forceLength, &forceDecimal
                foundFormatting = TRUE;
                break;
        }
}

/*  add room for commas  */
if ( commas ) numChars += ( numChars - 1 ) / 3;

if (length > numChars) {
        length = numChars;
}
```

BEST AVAILABLE COPY

```
edtEditLen= numChars;
tglEditGopher->StartHandler();
tglEditGopher->EditSetup( p, iniText, TRUE, targetVar, twoScreens,
        justify, commas, euroStyle, length, decimals,
        forceLength, forceDecimals, floatingID, NULL );


        }
```

BEST AVAILABLE COPY

```
#include "standard.h"
#include "CPauseEH.h"
#include "tglMain.h"
#include "prtPrint.h"

/*******************************************************************
 * IPauseEH initializes a CPauseEH.
 *******************************************************************/
void CPauseEH::IPauseEH( void )
{

	inherited::IEventHandler();

}



/*******************************************************************
 * StartHandler changes the text of the 'Pause' item
 *******************************************************************/
void CPauseEH::StartHandler( void )
{

	inherited::StartHandler();


	/*
	 * change the text of the pause item
	 */
	SetItem( tglScanMenuH, TGL_PAUSE_ITEM, "\pResume" );

}

/*******************************************************************
 * StopHandler changes the text of the 'Resume' item back to 'Pause'
 *******************************************************************/
void CPauseEH::StopHandler( void )
{

	/*
	 * change the text of the pause item
	 */
	SetItem( tglScanMenuH, TGL_PAUSE_ITEM, "\pPause" );


	inherited::StopHandler();

}

/*******************************************************************
 * DoCommand handles commands whether from the menu or by keyboard
 * equivalent:
 *
 *	- turns 'pause' off
 *
 *******************************************************************/
Boolean CPauseEH::DoCommand( Int16T menuId, Int16T menuItem, Int32T modifiers )
{

	switch (menuId) {


		/*
		 * SCAN MENU
```

```
        */
        case TGL_SCAN_MENU_ID:

            switch (menuItem) {

                /*
                 * Pause
                 */
                case TGL_PAUSE_ITEM:

                    StopHandler();
                    return (FALSE);
            }
    }

    return (inherited::DoCommand( menuId, menuItem, modifiers ));
}


/**********************************************************************
 * KeyDown handles the 'Pause' key
 **********************************************************************/
Boolean CPauseEH::KeyDown( EventRecord myEvent )
{

    switch (myEvent.message & keyCodeMask) {

        /* 'Pause' key */
        case 0x00007100:

            StopHandler();
            return (FALSE);
            break;

        /* 'Print Screen' key */
        case 0x00006900:

            SetCursor( *tglWatch );
            if ( myEvent.modifiers & controlKey )
                prtScreenSave( 1 );
            else
                prtPrintIt( 0 );
            SetCursor( &arrow );
            return (FALSE);
            break;

        /* 'F12' key: print both screens */
        case 0x00006F00:

            SetCursor( *tglWatch );
            if ( myEvent.modifiers & controlKey )
                prtScreenSave( 2 );
            else
                prtPrintIt( -1 );
            SetCursor( &arrow );
            return (FALSE);
            break;
    }

    return (inherited::KeyDown( myEvent ));
}
```

CPauseEH.c

```
/*********************************************************************
 * MouseDown captures mouse events so they don't do anything
 *********************************************************************/
Boolean CPauseEH::MouseDown( Point where, int32T modifiers )
{

	return (FALSE);
}
```

BEST AVAILABLE COPY

BEST AVAILABLE COPY

```
#include "standard.h"
#include "EventHandlers.h"
#include "tglmain.h"
#include "tchTouch.h"
#include "scnScan.h"
#include "snlSnip.h"
#include "scrScreen.h"


/* ------------------------------------------------ */
static Boolean      SingleStep = FALSE;

/*********************************************************************
 * ICScanEH initializes a CScanEH.
 *********************************************************************
void CScanEH::IScanEH( void )
{

        inherited::IEventHandler();

        itUnderstandsCommandKeys = TRUE;

}


/*********************************************************************
 * StartHandler sets the environment for scan mode
 *********************************************************************/
void CScanEH::StartHandler( void )
{

        /*
         * start a generic event handler
         */
        inherited::StartHandler();


        /*
         * set up menus for scanning
         */
        SetItem( tglFileMenuH, TGL_MODE_ITEM, "\pSnip Mode" );
        EnableItem( tglScanMenuH, 0 );
        SetCursor( &arrow );


        /*
         * draw menu
         */
        if (tglMenuVisible) {

                DrawMenuBar();
        }
}

/*********************************************************************
 * StopHandler undoes the environment for scan mode
 *********************************************************************/
void CScanEH::StopHandler( void )
{

        /*
         * turn off the scan menu
         */
        DisableItem( tglScanMenuH, 0 );
```

BEST AVAILABLE COPY

```
	/*
	 * draw menu
	 */
	if (tglMenuVisible) {

		DrawMenuBar();
	}


	/*
	 * stop a generic event handler
	 */
	inherited::StopHandler();

}


/**********************************************************************
 * MouseDown handles mouse down events.  The default method gives a bad
 * beep, since we're not supposed to do anything with mouse events here,
 * but we're in scan mode
 **********************************************************************/
Boolean CScanEH::MouseDown( Point where, Int32T modifiers )
{
	if (!tchTouchHandler( &where )) {

		tchBeepNow( TGL_BAD_BEEP );
	}

	return (FALSE);
}


/**********************************************************************
 * KeyDown handles non-command keys. These are recognized here:
 *
 *	- f15, the pause key, which is the same as the Pause command
 *	- the enter key if 'SingleStep' is on
 *	- keys defined in the scan file itself
 *
 **********************************************************************/
Boolean CScanEH::KeyDown( EventRecord myEvent )
{
	Boolean		done;

	/*
	 * pause key
	 */
	if ((myEvent.message & keyCodeMask) == 0x00007100) {

		tglPauseGopher->StartHandler();
		return (FALSE);

	}


	/*
	 * enter key (only valid in single step mode)
	 */
	else if (SingleStep && (myEvent.message & keyCodeMask) == 0x4C00) {


		/*
		 * execute the line
		 */
```

BEST AVAILABLE COPY

```
        done = scnExecuteScan();

        /*
         * If the enter key is held down, then don't show the context,
         * otherwise show it
         */
        if (myEvent.what == keyDown) {

            scnShowNextLine( TRUE );
        }

        else {

            scnShowNextLine( FALSE );
        }
        return (done);
    }

    else {

        scnHotKeys(myEvent.message & charCodeMask);
        return (FALSE);
    }
}


/*********************************************************************
 * DoCommand handles commands whether from the menu or by keyboard
 * equivalent. The default method handles generic sorts of things:
 *
 *      - "Snip Mode" from the File Menu
 *      - all of the Scan menu
 *
 *********************************************************************/
Boolean CScanEH::DoCommand( Int16T menuId, Int16T menuItem, Int32T modifiers )
{

    /*
     * if command keys are turned off, then skip it
     */
    if (!itUnderstandsCommandKeys) {

        return (FALSE);
    }


    /*
     * process a command key
     */
    switch (menuId) {


        /*
         * FILE MENU
         */
        case TGL_FILE_MENU_ID:


            switch (menuItem) {


                case TGL_MODE_ITEM:

                    StopHandler();
                    return (FALSE);
```

```
            }
            break;

        /*
         * SCAN MENU
         */
        case TGL_SCAN_MENU_ID:

            switch (menuItem) {

                case TGL_NEW_SCAN_ITEM:

                    scnStartNewScan();
                    return (FALSE);

                case TGL_RESTART_ITEM:

                    scnRestartScan();
                    return (FALSE);

                case TGL_SPEEDUP_ITEM:

                    tglSpeedup = !tglSpeedup;
                    CheckItem( tglScanMenuH, TGL_SPEEDUP_ITEM, tglSp
                    return (FALSE);

                case TGL_PAUSE_ITEM:

                    tglPauseGopher->StartHandler();
                    return (FALSE);

                case TGL_SINGLE_STEP_ITEM:

                    SetSingleStep( !SingleStep );
                    return (FALSE);

                case TGL_ENTER_COMMAND_ITEM:

                    tglEnterCommand();
                    return (FALSE);

                case TGL_BREAK_AT_ITEM:

                    tglBreakAt();
                    return (FALSE);

                case TGL_VARIABLES_ITEM:

                    scnVariables();
                    return (FALSE);

                case TGL_CONTEXT_ITEM:

                    scnSwitchContext();
                    return (FALSE);
            }
            break;
    }
```

BEST AVAILABLE COPY

CScanEH.c

BEST AVAILABLE COPY

```
        /*
         * see if the supervisor can handle this
         */
        return (itsSupervisor->DoCommand( menuId, menuItem, modifiers ));
}


/**********************************************************************
 * Idle does something when the mac didn't generate an event.
 * In this case, read the next line from the scan file
 **********************************************************************/
Boolean CScanEH::Idle( void )
{

        if (SingleStep) {

                return (FALSE);
        }


        else {

                return (scnExecuteScan());
        }
}


/**********************************************************************
 * TurningMyselfOff is called when a subservient event handler stops.  In
 * this case, we're only interested in Clicks, and even then, only when in
 * single step mode.
 **********************************************************************/
void CScanEH::TurningMyselfOff( CEventHandler *whoAmI )
{


        /*
         * show the next line in SingleStep mode after a click
         */
        if (SingleStep && ((whoAmI == tglClickGopher) || (whoAmI == tglTimedClick

                scnShowNextLine( TRUE );
        }


        Inherited::TurningMyselfOff( whoAmI );

}


/**********************************************************************
 * Draw draws whatever is reasonable for the current event handler
 * Needs to redraw the current window
 **********************************************************************/
void CScanEH::Draw( void )
{


}


/**********************************************************************
 * SetCmdKeys turns the command keys on or off.
 **********************************************************************/
```

BEST AVAILABLE COPY

```
void CScanEH::SetCmdKeys( Boolean on )
{

	itUnderstandsCommandKeys = on;

}


/***********************************************************************
 * SetSingleStep turns single step mode on or off. Also puts a check
 * mark in the menu to indicate if single step is on.
 ***********************************************************************/
void CScanEH::SetSingleStep( Boolean on )
{
	static Rect r = { 470, 3, 480, 637 };


	SingleStep = on;
	CheckItem( tglScanMenuH, TGL_SINGLE_STEP_ITEM, SingleStep );

	if (SingleStep) {

		EnableItem( tglScanMenuH, TGL_CONTEXT_ITEM );
		scnShowCurrentLine();
	}


	else {

		DisableItem( tglScanMenuH, TGL_CONTEXT_ITEM );
		EraseRect( &r );
	}

}



/***********************************************************************
 * Suspend saves the current contents of the screen for later resuming
 ***********************************************************************/
void CScanEH::Suspend( void )
{
	Rect	r;


	scrRestoreColors();


	/*
	 * copy the main screen into the third snip buffer
	 */
	CopyBits( (BitMap*) *(tglMainCWindow->portPixMap),
		(BitMap*) *(sniBufRecs[2].pPort->portPixMap),
		&tglScreenRect, &tglScreenRect, srcCopy, (RgnHandle) NULL );

	/*
	 * copy the alternate screen into the second snip buffer
	 */
	if (tglNumVisibleScreens == 2) {

		TGL_SETRECT( &r, 0, 0, 640, 480 );

		CopyBits( (BitMap*) *(tglAltCWindow->portPixMap),
			(BitMap*) *(sniBufRecs[1].pPort->portPixMap),
			&r, &r, srcCopy, (RgnHandle) NULL );
	}
}
```

BEST AVAILABLE COPY

```
/*************************************************************************
 * Resume restores the current contents of the screen for later resuming
 *************************************************************************/
void CScanEH::Resume( void )
{
	Rect	r;


	scrRestoreColors();


	/*
	 * copy the third snip buffer into the main screen
	 */
	CopyBits( (BitMap*) *(sniBufRecs[2].pPort->portPixMap),
		(BitMap*) *(tglMainCWindow->portPixMap),
		&tglScreenRect, &tglScreenRect, srcCopy, (RgnHandle) NULL );

	/*
	 * copy the second snip buffer into the alternate screen
	 */
	if (tglNumVisibleScreens == 2) {

		TGL_SETRECT( &r, 0, 0, 640, 480 );

		CopyBits( (BitMap*) *(sniBufRecs[1].pPort->portPixMap),
			(BitMap*) *(tglAltCWindow->portPixMap),
			&r, &r, srcCopy, (RgnHandle) NULL );
	}
}
```

```
#include "standard.h"
#include "CSnipDefineEH.h"
#include "tglMain.h"
#include "sniSnip.h"
```

BEST AVAILABLE COPY

```
/*********************************************************************
 * ISnipDefineEH initializes a CSnipDefineEH.
 *********************************************************************/
void CSnipDefineEH::ISnipDefineEH( void )
{

	inherited::IEventHandler();

}


/*********************************************************************
 * StartHandler starts the definition a new snip
 *********************************************************************
void CSnipDefineEH::StartHandler( void )
{
	Point mouseLoc;

	inherited::StartHandler();


	/*
	 * initialize the snip
	 */
	GetMouse( &mouseLoc );
	sniStartDefine( mouseLoc );

}


/*********************************************************************
 * StoptHandler ends the definition
 *********************************************************************
void CSnipDefineEH::StopHandler( void )
{

	/*
	 * stop defining the snip
	 */
	sniEndDefine();


	inherited::StopHandler();

}


/*********************************************************************
 * MouseDown handles mouse down events.  We already got a mouse down
 * in order to get here, so report an error
 *********************************************************************
Boolean CSnipDefineEH::MouseDown( Point where, int32T modifiers )
{

	TGL_ERROR( "Extra mouse down in define snip" );

}


/*********************************************************************
 * MouseUp handles mouse up events. Here a mouse up finishes the
 * definition of the snip and returns us to snip mode
```

BEST AVAILABLE COPY

```
*************************************************************************/
Boolean CSnipDefineEH::MouseUp( Point where, Int32T modifiers )
{

	StopHandler();
	return (FALSE);

}


/*************************************************************************
 * sniEveryCycle does something every cycle
 * In this case it rubberbands the rectangle
 *************************************************************************/
Boolean CSnipDefineEH::EveryCycle( void )
{
	Point mouseLoc;
	static Point lastMouseLoc = { -1, -1 };

	/*
	 * get the current mouse location
	 */
	GetMouse( &mouseLoc );


	/*
	 * If the mouse didn't move, then forget it
	 */
	if ((mouseLoc.h == lastMouseLoc.h) && (mouseLoc.v == lastMouseLoc.v)) {

		return (FALSE);
	}


	/*
	 * otherwise, record the new position and redefine the snip
	 */
	lastMouseLoc = mouseLoc;
	sniExpandSnip( mouseLoc );


	/*
	 * put the coordinates into the coordinate window
	 */
	if (tglMouseCoordsVisible) {

		sniWriteCoordinates( FALSE );
	}


	return (FALSE);
}
```

BEST AVAILABLE COPY

```
#include "standard.h"
#include "CSnipDragEH.h"
#include "tglMain.h"
#include "sniSnip.h"


/*-----------------------------------------------------------*/
static Point LastMouseLoc = { -1, -1 };


/************************************************************************
 * ISnipDefineEH initializes a CSnipDefineEH.
 ************************************************************************/
void CSnipDragEH::ISnipDragEH( void )
{

	inherited::IEventHandler();

}


/************************************************************************
 * StartHandler starts to drag the snip
 ************************************************************************/
void CSnipDragEH::StartHandler( void )
{

	inherited::StartHandler();


	/*
	 * collect the last position
	 */
	GetMouse( &LastMouseLoc );

	/*
	 * start to drag the snip
	 */
	sniStartDrag( LastMouseLoc );

}

/************************************************************************
 * StoptHandler starts to drag the snip
 ************************************************************************/
void CSnipDragEH::StopHandler( void )
{

	/*
	 * stop dragging the snip
	 */
	sniEndDrag();

	inherited::StopHandler();

}

/************************************************************************
 * MouseDown handles mouse down events.  We already got a mouse down
 * in order to get here, so report an error.
 ************************************************************************/
Boolean CSnipDragEH::MouseDown( Point where, Int32T modifiers )
{
```

```
    TGL_ERROR( "Extra mouse down in drag snip" );

}


/**********************************************************************
 * MouseUp handles mouse up events. Here a mouse up finishes the
 * definition of the snip and returns us to snip mode
 **********************************************************************/
Boolean CSnipDragEH::MouseUp( Point where, Int32T modifiers )
{

    StopHandler();
    return (FALSE);

}


/**********************************************************************
 * EveryCycle does something every cycle
 * In this case it drags the rectangle
 **********************************************************************/
Boolean CSnipDragEH::EveryCycle( void )
{
    Point mouseLoc;

    /*
     * get the current mouse location
     */
    GetMouse( &mouseLoc );


    /*
     * if the mouse didn't move, then forget it
     */
    if ((mouseLoc.h == LastMouseLoc.h) && (mouseLoc.v == LastMouseLoc.v)) {

        return (FALSE);
    }


    /*
     * otherwise, record the new position and drag the snip
     */
    LastMouseLoc = mouseLoc;
    sniMoveSnip( mouseLoc );


    /*
     * put the coordinates into the coordinate window
     */
    if (tglMouseCoordsVisible) {

        sniWriteCoordinates( FALSE );
    }
    return (FALSE);
}
```

BEST AVAILABLE COPY

```
#include "standard.h"
#include "EventHandlers.h"
#include "tglmain.h"
#include "sniSnip.h"
#include "bldBuild.h"
#include "bioBuildIO.h"
#include "libLibrary.h"

extern void         tglMouseCoords( Boolean on );

/*******************************************************************
 * ISnipEH initializes a CSnipEH.
 *******************************************************************
void CSnipEH::ISnipEH( void )
{

	/*
	 * Initialize a generic event handler
	 */
	inherited::IEventHandler();

}


/*******************************************************************
 * StartHandler sets the environment for snip mode
 *******************************************************************/
void CSnipEH::StartHandler( void )
{

	/*
	 * start a generic event handler
	 */
	inherited::StartHandler();


	/*
	 * initialize menus for snipping
	 */
	SetItem( tglFileMenuH, TGL_MODE_ITEM, "\pScan Mode" );
	EnableItem( tglEditMenuH, 0 );
	EnableItem( tglSnipMenuH, 0 );
	EnableItem( tglBuildMenuH, 0 );
	SetCursor( *tglCrossHairs );


	/*
	 * draw menu
	 */
	if (tglMenuVisible) {

		DrawMenuBar();
	}


	/*
	 * copy whatever is on the screen into the first snip buffer
	 */
	sniCopyScreenToBuf();

}

/*******************************************************************
```

BEST AVAILABLE COPY

```
 * StopHandler undoes the environment for snip mode
 **************************************************************************/
void CSnipEH::StopHandler( void )
{

	/*
	 * make sure the selection is copied to the snip buffer
	 */
	sniFuseSelections();


	/*
	 * turn off snip menus
	 */
	DisableItem( tglEditMenuH, 0 );
	DisableItem( tglSnipMenuH, 0 );
	DisableItem( tglBuildMenuH, 0 );


	/*
	 * draw menu
	 */
	if (tglMenuVisible) {

		DrawMenuBar();
	}


	/*
	 * turn off mouse coordinate window
	 */
	tglMouseCoords( FALSE );


	/*
	 * stop a generic event handler
	 */
	inherited::StopHandler();

}



/**************************************************************************
 * MouseDown handles mouse down events.  We have to check to see if
 * we've moused down in the current snip or not
 **************************************************************************/
Boolean CSnipEH::MouseDown( Point where, Int32T modifiers )
{

	if (sniPointInSnip( where )) {

		tglSnipDragGopher->StartHandler();
		return (FALSE);
	}

	else {

		/*
		 * make sure the old selection is copied to the snip buffer
		 * before defining a new one
		 */
		sniFuseSelections();


		tglSnipDefineGopher->StartHandler();
		return (FALSE);
```

BEST AVAILABLE COPY

```
    }
}

/**********************************************************************
 * KeyDown handles non-command keys. These are recognized here:
 *
 *      - the arrow keys nudge the current snip rect around pixel by pixel
 *
 **********************************************************************
Boolean CSnipEH::KeyDown( EventRecord myEvent )
{

        switch (myEvent.message & charCodeMask) {

                /*
                 * delete key (same as 'clear' item in Edit menu)
                 */
                case 0x08:

                        sniEraseSelection();
                        return (FALSE);


                /*
                 * left arrow
                 */
                case 0x1c:

                        sniNudgeSelection( 0x1c, myEvent.modifiers );
                        return (FALSE);


                /*
                 * right arrow
                 */
                case 0x1d:

                        sniNudgeSelection( 0x1d, myEvent.modifiers );
                        return (FALSE);


                /*
                 * up arrow
                 */
                case 0x1e:

                        sniNudgeSelection( 0x1e, myEvent.modifiers );
                        return (FALSE);


                /*
                 * down arrow
                 */
                case 0x1f:

                        sniNudgeSelection( 0x1f, myEvent.modifiers );
                        return (FALSE);
        }

        return (FALSE);
}


/**********************************************************************
 * DoCommand handles commands whether from the menu or by keyboard
```

BEST AVAILABLE COPY

```
 * equivalent. The default method handles generic sorts of things:
 *
 *     - "Scan Mode" from the File Menu
 *     - all of the Edit, Snip and Build Menus
 *
 ***********************************************************************/
Boolean CSnipEH::DoCommand( Int16T menuId, Int16T menuItem, Int32T modifiers )
{

	/*
	 * make sure the selection is copied to the snip buffer
	 */
	sniFuseSelections();


	switch (menuId) {

		/*
		 * FILE MENU
		 */
		case TGL_FILE_MENU_ID:

			switch (menuItem) {

				case TGL_MODE_ITEM:

					StopHandler();
					return (FALSE);
			}
			break;

		/*
		 * EDIT MENU
		 */
		case TGL_EDIT_MENU_ID:

			/*
			 * let desk accessories have their commands
			 */
			if (SystemEdit( menuItem - 1 )) {
				return (FALSE);
			}


			switch (menuItem) {

				case TGL_COPY_ITEM:
					sniCopy();
					return (FALSE);

				case TGL_PASTE_ITEM:
					sniPaste();
					return (FALSE);

				case TGL_CUT_ITEM:
					sniCopy();
					sniEraseSelection();
					return (FALSE);

				case TGL_CLEAR_ITEM:
					sniEraseSelection();
					return (FALSE);
			}
```

BEST AVAILABLE COPY

```
        break;

    /*
     * SNIP MENU
     */
    case TGL_SNIP_MENU_ID:

        switch (menuItem) {

            case TGL_LOAD_PICT_ITEM:
                sniLoadPict();
                return (FALSE);

            case TGL_SAVE_PICT_ITEM:
                sniSavePict();
                return (FALSE);

            case TGL_LOAD_SNIP_ITEM:
                sniLoadSnip();
                return (FALSE);

            case TGL_SAVE_SNIP_ITEM:
                sniSaveSnip();
                return (FALSE);

            case TGL_MOUSE_COORDS_ITEM:

                tglMouseCoords( !tglMouseCoordsVisible );
                return (FALSE);

            case TGL_BUFFER_1_ITEM:
            case TGL_BUFFER_2_ITEM:
            case TGL_BUFFER_3_ITEM:
                sniChangeBuffer( menuItem - TGL_BUFFER_1_ITEM );
                return (FALSE);

            case TGL_OVERLAY_1_ITEM:
            case TGL_OVERLAY_2_ITEM:
            case TGL_OVERLAY_3_ITEM:
                sniOverlayBuffer( menuItem - TGL_OVERLAY_1_ITEM );
                return (FALSE);

        }
        break;

    /*
     * BUILD MENU
     */
    case TGL_BUILD_MENU_ID:

        switch( menuItem ) {

            case TGL_NEW_LIB_ITEM:
                bldNewLibrary();
                return( FALSE );

            case TGL_OPEN_LIB_ITEM:
```

BEST AVAILABLE COPY

```
                    bldOpenLibrary();
                    return( FALSE );

                case TGL_WRITE_LIB_ITEM:
                    bioWriteLibrary();
                    return( FALSE );

                case TGL_DUMP_LIB_ITEM:
                    bldDumpLibrary();
                    return( FALSE );

                case TGL_READ_LIB_ITEM:
                    bioReadLibrary();
                    return( FALSE );

                case TGL_VIEW_SNIP_ITEM:
                    bldViewSnip();
                    return( FALSE );

                case TGL_ADD_SNIP_ITEM:
                    bldAddSnip();
                    return( FALSE );

                case TGL_DEL_SNIP_ITEM:
                    bldDeleteSnip();
                    return( FALSE );

                default:
                    libSwitchLibraries( menuItem );
                    return( FALSE );
            }
    }

    /*
     * see if the supervisor can handle this since we couldn't
     */
    return (itsSupervisor->DoCommand( menuId, menuItem, modifiers ));
}


/***********************************************************************
 * Draw redraws the current buffer
 ***********************************************************************/
void CSnipEH::Draw( void )
{
    sniRedrawScreen();
}


/***********************************************************************
 * EveryCycle draws the mouse location if the mouse window is on
 ***********************************************************************/
Boolean CSnipEH::EveryCycle( void )
{
    /*
     * put the coordinates into the coordinate window
     */
```

```
    if (tglMouseCoordsVisible) {
        snlWriteCoordinates( FALSE );
    }

    return (FALSE);
}
```

BEST AVAILABLE COPY

CSnipEH.c

BEST AVAILABLE COPY

```
#include "standard.h"
#include "CTaxCalcEH.h"
#include "taxCalc.h"
#include "tglmain.h"
#include "EventHandlers.h"

/**********************************************************************
 * ITaxCalcEH initializes a CTaxCalcEH.
 **********************************************************************
void CTaxCalcEH::ITaxCalcEH( void )
{

        inherited::IEventHandler();

}

/**********************************************************************
 * StartHandler sets up the touch areas
 **********************************************************************
void CTaxCalcEH::StartHandler( void )
{

        inherited::StartHandler();


        /*
         * start tax calculator
         */
        taxCalcSetup();

}


/**********************************************************************
 * StopHandler turns off the AT calculator touches
 **********************************************************************/
void CTaxCalcEH::StopHandler( void )
{

        /*
         * cleanup tax calculator
         */
        taxCalcCleanup();


        inherited::StopHandler();

}


/**********************************************************************
 * TurningMyselfOff is called by a subservient event handler. Since the
 * tax calculator has only one, it must the edit event handler, indicating
 * that the user finished entering information. Which means that the tax
 * rate has to be recalculated
 **********************************************************************/
void CTaxCalcEH::TurningMyselfOff( CEventHandler *whoAmI )
{

        if (whoAmI == tglEditGopher) {

                tax_rate();
        }


        inherited::TurningMyselfOff( whoAmI );
}
```

CTaxClacEH.c

```
/**********************************************************************
 * KeyDown catches keys
 **********************************************************************/
Boolean CTaxCalcEH::KeyDown( EventRecord myEvent )
{


        /*
         * let the tax calculator get first crack at the key,
         * but if it doesn't want it, then pass it along
         */
        if (!taxCalcKeyDown( myEvent )) {

                itsSupervisor->KeyDown( myEvent );
        }

        return (FALSE);

}


/**********************************************************************
 * MouseDown reacts to the mouse
 **********************************************************************/
Boolean CTaxCalcEH::MouseDown( Point where, Int32T modifiers )
{

        /*
         * taxCalcMouseDown returns TRUE if the calculator is supposed
         * to stop
         */
        if (taxCalcMouseDown( where )) {

                StopHandler();
        }

        return (FALSE);
}
```

BEST AVAILABLE COPY

BEST AVAILABLE COPY

```
/*      ------------------------------------------------------------------------
--------------------------------------------
        CTextEditEH.c
        Money Advisor module
        generic text block editing functions
        1/11/90     djs     started
        ?           wbp     added showNote stuff
        3/21/90     jmg     added object as part of new object/class tglMain
        ------------------------------------------------------------------------
----------------------------------------- */

#include    "standard.h"
#include    "CTextEditEH.h"
#include    "tglmain.h"
#include    "libLibrary.h"
#include    "scnScan.h"
#include    "tchTouch.h"
#include    "grfGraphics.h"
#include    "scrScreen.h"
#include    "control.h"
#include    "varFns.h"

#define     deleteKey   8           /* used in the key handler */

/*      ------------------------------------------------------------------------
--------------------------------------------
        COLLECT_SNIP
        macro function for getting a snip from the library with error checking
        ------------------------------------------------------------------------
----------------------------------------- */
#define COLLECT_SNIP( NAME, SNIP )                                          \
        SNIP = libFindPicPtr ( NAME, TRUE );                                    \
        if (SNIP == NULL)                                                   \
            scnScanError( "Image not in library", NAME );

#define SHOW_SNIP( SNIP )                   \
        /* conFixTextAttributes();      */                  \
        grfDrawPic ( SNIP, NULL );          \
        /* conSetUpTextAttributes();    */

#define SHOW_SNIP_AT( SNIP, AT )                    \
        conFixTextAttributes();                     \
        grfDrawPic ( SNIP, AT );        \
        conSetUpTextAttributes();


/*      ------------------------------------------------------------------------
--------------------------------------------
        Setup
        Initialize the data structures for editing
        ------------------------------------------------------------------------
----------------------------------------- */

void    CTextEditEH::Setup ()
        {
        Int32T      selPoint;
        Rect        destRect;

        ValidNextEvent = FALSE;
        SetPt ( &TheNextEventPoint , -1, -1 );

        if ( itsScrollable )
            {
            libGetPicRect ( itsUpSnip, &itsUpSnipRect );
            libGetPicRect ( itsDownSnip, &itsDownSnipRect );
            libGetPicRect ( itsThumbAreaSnip, &itsThumbAreaSnipRect );
            }
```

BEST AVAILABLE COPY

```
destRect      = itsText->destRect;
selPoint      = itsText->selPoint;

if ( destRect.left == 0 )              /* assume it's not yet initialized */
      {
      destRect = itsViewRect;
      selPoint = 0;
      }

itsTERec = TENew(&destRect, &itsViewRect);

/*    this sets the text handle of the TE rec to the text handle of the textBlock p
      persistent storage of the text block exists in the program, instead of a cop

HLock ( (Handle) itsTERec);
HLock ( (Handle) (**itsTERec).hText );

(**itsTERec).hText        = itsText->content;
(**itsTERec).txFont       = tglTextFont;
(**itsTERec).txFace       = tglTextFace;
(**itsTERec).txSize       = tglTextSize;

HUnlock ((Handle) (**itsTERec).hText);
HUnlock ((Handle) itsTERec);

conSetUpTextAttributes();              /*  pay attention to (H) commands
TESetSelect( selPoint, selPoint, itsTERec );
TECalText ( itsTERec );
TEUpdate ( &itsViewRect, itsTERec );
itsLineHeight = TEGetHeight( 1, 1, itsTERec );          /* get one line's heigh
TEActivate(itsTERec);
conFixTextAttributes();

if ( itsScrollable )
      {
      conSetUpTextAttributes();
      TEAutoView(itsScrollable, itsTERec);                /* autoview for
      conFixTextAttributes();
      UpdateThumb ();
      }
}

/*    ------------------------------------------------------------------------
-----------------------------------
      EveryCycle
      does something every time through the event loop
      checks the current mouse position to see if it is in the active text area.
      If it is, the cursor is changed to an I-beam, else back to the arrow.
      Should be called once each time through the event loop.
      ------------------------------------------------------------------------
----------------------------------- */

Boolean CTextEditEH::EveryCycle( void )
      {
      CursHandle  iBeam;
      Point              mouseLoc;

      TEIdle ( itsTERec );
      GetMouse (&mouseLoc);
      if (PtInRect ( mouseLoc, &itsViewRect ) )
            {
            iBeam = GetCursor( iBeamCursor);
            SetCursor(*iBeam);
            }
      else
            {
            InitCursor();
```

BEST AVAILABLE COPY

```
	}
	return (FALSE);
	}


/*	------------------------------------------------------------------------
---------------------------------------
	KeyDown
	handles all keyDown events for the event loop of the Edit() call.
	Checks for non-scrolling Edit type, and if so deletes back a keystroke that would p
	the last character out of the viewRect.
	------------------------------------------------------------------------
--------------------------------------- */

Boolean CTextEditEH::KeyDown( EventRecord theEvent )
	{
	char		theChar;

	theChar		= (theEvent.message & charCodeMask);

	conSetUpTextAttributes();
	TEKey ( theChar, itsTERec );
	TESelView ( itsTERec );

	if ((! itsScrollable ) && ((**itsTERec).teLength > 0 ))		/* non-scrolling ed
		{
		itsLineHeight		= TEGetHeight( 1, 1, itsTERec );	/* get one line's he
		itsTotalHeight		= ((**itsTERec).nLines ) * itsLineHeight;
		if ( itsTotalHeight + (**itsTERec).viewRect.top > (**itsTERec).viewRect.bott
			{
			SysBeep(1);
			TEKey (deleteKey, itsTERec);
			}
		}

	conFixTextAttributes();

	if ( itsScrollable )
		UpdateThumb();
	return (FALSE);
	}


/*	------------------------------------------------------------------------
---------------------------------------
	MouseDown
	handler for MouseDown events while editing
	if EditMouseDown returns TRUE, then editing is done
	------------------------------------------------------------------------
--------------------------------------- */

Boolean CTextEditEH::MouseDown ( Point where, Int32T modifiers )
	{
	if ( PtInRect( where, &itsViewRect ) )
		{
		conSetUpTextAttributes();
		TEClick(where, modifiers & shiftKey, itsTERec);
		conFixTextAttributes();
		if ( itsScrollable )
			UpdateThumb ();
		return (FALSE);
		}

	if ( itsScrollable )		/* only if there were valid rects specified */
		{
		if ( PtInRect( where, &itsUpSnipRect ) )
			{
```

```
            SHOW_SNIP ( itsUpHighSnip );
            while (StillDown())
                {
                if ( itsViewRect.top > ((**itsTERec).destRect.top) )
/*              if ( itsViewRect.top >= ((**itsTERec).destRect.top)  + itsLineHei
*/                  {
                    conSetUpTextAttributes();
                    TEScroll ( 0, itsLineHeight, itsTERec );
                    conFixTextAttributes();
                    UpdateThumb ();
                    }
                }
            SHOW_SNIP ( itsUpSnip );
            return (FALSE);
            }

        if ( PtInRect( where, &itsDownSnipRect)  )
            {
            SHOW_SNIP ( itsDownHighSnip );
            while (StillDown())
                {
                itsTotalHeight =  ((**itsTERec).nLines ) * itsLineHeight;
                if  ( itsTotalHeight + (**itsTERec).destRect.top > itsViewRect.b
                    {
                    conSetUpTextAttributes();
                    TEScroll ( 0, -itsLineHeight, itsTERec );
                    conFixTextAttributes();
                    UpdateThumb ();
                    }
                }
            SHOW_SNIP ( itsDownSnip);
            return (FALSE);
            }
        } /* end of scrolling checks */

    if ( tchValidTouch ( (Point *) &(where) ) )
        {
        ValidNextEvent = TRUE;
        TheNextEventPoint = where;
        StopHandler();
        }
    else
        tchBeepNow( TGL_BAD_BEEP );
    return (FALSE);
    }


/*  ----------------------------------------------------------------------
-------------------------------
    Cleanup
    Deconstruction / close up shop and save the channel
    ----------------------------------------------------------------------
------------------------------- */

void  CTextEditEH::Cleanup( void )
    {
    conSetUpTextAttributes();
    itsText->selPoint = (**itsTERec).selStart;
    itsText->destRect = (**itsTERec).destRect;
    TEDeactivate (itsTERec);
    TEUpdate (&itsViewRect, itsTERec);
    (**itsTERec).hText = NULL;          /* protect the text from being wiped out
    TEDispose (itsTERec);
    conFixTextAttributes();        /*  new stuff: clean up after (H) commands  */
    InitCursor();
    if (ValidNextEvent)            /* they exited via a valid touch area outside */
        {
        tchTouchHandler( &TheNextEventPoint);
```

```
		ValidNextEvent = FALSE;
		}

	}
```

BEST AVAILABLE COPY

```
/*	------------------------------------------------------------------------
---------------------------------------
	UpdateThumb
	redraws the thumb in the scroll bar area to the correct current position
	------------------------------------------------------------------------
--------------------------------------- */

void	CTextEditEH::UpdateThumb ( void )
	{
	Point			atLoc;
	Int16T				viewHeight,
				vertOffset,
				newVert,
				i;
	Real80T				percDisp;
	Rect			thumbRect;
	static Int16T			oldVert = 0,
				thumbAreaHeight = 0;

	if ( ! itsScrollable )
		return;


	atLoc.h		= itsThumbAreaSnipRect.left;
	itsLineHeight		= TEGetHeight( 1, 1, itsTERec );
	itsTotalHeight		= ((**itsTERec).nLines) * itsLineHeight;
	viewHeight		= (**itsTERec).viewRect.top - (**itsTERec).destRect.top;

	/*
	* compensate the height of the visible rectangle of text when there is more than
	*/

	if ( (itsTotalHeight > ((**itsTERec).viewRect.bottom - (**itsTERec).viewRect.top) )
	   ( viewHeight > 0 ) )
		{
		viewHeight += ((**itsTERec).viewRect.bottom - (**itsTERec).viewRect.top);
		}

	percDisp	= ( viewHeight == 0) ? 0 : (Real80T) viewHeight / itsTotalHeight;

	if ( percDisp > 1 ) percDisp = 1.0;

	if ( ! thumbAreaHeight )			/* init the ACTUAL thumb area height */
		{
		/*
		 * Note: thumb snip is drawn from top, so the atLoc.v should
		 * be compared to the thumb area minus the height of the thumb
		 */
		libGetPicRect( itsThumbSnip, &thumbRect);
		thumbAreaHeight =
			( (itsThumbAreaSnipRect.bottom - itsThumbAreaSnipRect.top) -
			( thumbRect.bottom - thumbRect.top) );			/* tl
		}

	vertOffset	= thumbAreaHeight * percDisp;
	newVert		= itsThumbAreaSnipRect.top + vertOffset;

	if ( ! oldVert )
		oldVert = newVert;

	if ( newVert > oldVert )	/* going down */
		{
```

BEST AVAILABLE COPY

```
        for ( i = oldVert; i <= newVert; i++ )
            {
            atLoc.v = i;
            grfDrawPic ( itsThumbSnip, &atLoc );
            }
        }
    else
        {
        for ( i = oldVert; i >= newVert; i-- )
            {
            atLoc.v = i;
            grfDrawPic ( itsThumbSnip, &atLoc );
            }
        }

    oldVert = atLoc.v;
    }


/*  ------------------------------------------------------------------
------------------------------------
    FirstLine
    Displays the first line of the text block in the rectange,
    followed by an ellipsis.
    ------------------------------------------------------------------
------------------------------------ */

void CTextEditEH::FirstLine ( char *dest, Int16T blockNum , Int16T maxPixels )
    {
    char            *next, *prev;
    Int32T              spaceLeft = maxPixels,
                    maxLen,
                    spaceElls,
                    subLen;

    spaceElls       = StringWidth("\p...");         /* length of the ellipsis */
    spaceLeft       -= spaceElls;

    itsText         = GetEditBlock ( blockNum );
    HLock ( itsText->content );
    maxLen = GetHandleSize(itsText->content);

    if ( maxLen == 0 )          /* nothing to display */
        {
        dest[0] = '\0';
        return;
        }

    next            = *itsText->content;

    /*
     *  quick check to see if the whole thing fits...
     */
    if ( TextWidth( *itsText->content, 1, maxLen) <= spaceLeft )
        {
        strncpy ( dest, (char *) *itsText->content, maxLen);
        dest[maxLen] = '\0';
        strcat (dest, "...");
        HUnlock (itsText->content);
        return;
        }

    /*
     *  then search forward a token at a time...
     */
    do  {
        prev        = next;
```

BEST AVAILABLE COPY

```
		next		= strpbrk ( prev+1, "\n\r\t ");
		subLen			= next - (char *) *itsText->content;
		}
		while ( (*next ) &&
			( TextWidth( *itsText->content, 1, subLen) <= spaceLeft ) &&
			( subLen <= maxLen ) );

	/*
	 *	grab the fitting portion and tack on ellipsis
	 */
	subLen = prev - (char *) *itsText->content;
	strncpy ( dest, (char *) *itsText->content, subLen);
	dest[subLen] = '\0';
	if ( prev = strchr(dest,'\r') )
		{
		*prev = '\0';
		}
	if (strlen(dest) > 0 )
		{
		strcat (dest, "...");
		}
	HUnlock (itsText->content);
	}

/*	--------------------------------------------------------------------
----------------------------------------
	ClearBlocks
	Resets the contents of the blocks.
	--------------------------------------------------------------------
---------------------------------------- */

void	CTextEditEH::ClearBlocks()
	{
	Int16T			i;

	for (i = 0; i < TXT_MAX_TEXT_BLOCKS; i++ )
		{
		SetHandleSize( textBlocks[i].content, 0);
		SetRect ( &(textBlocks[i].destRect), 0, 0, 0, 0 );
		textBlocks[i].selPoint = 0;
		}
	}


/*	--------------------------------------------------------------------
----------------------------------------
	ITextEditEH
	Initializes a CTextEditEH
	allocates the handle to the text itself, inits to NULL string.
	sets the destRect to 0,0,0,0 to signal init
	insertion point to 0.
	--------------------------------------------------------------------
---------------------------------------- */

void	CTextEditEH::ITextEditEH( void )
	{
	Int16T		i;

	inherited::IEventHandler();
	for (i = 0; i < TXT_MAX_TEXT_BLOCKS; i++ )
		{
		textBlocks[i].content = NewHandle(0);
		}
	ClearBlocks();
	}
```

BEST AVAILABLE COPY

```
/*	------------------------------------------------------------------
------------------------------------------
	StartHandler
	sets up the touch areas
	------------------------------------------------------------------
------------------------------------------ */

void	CTextEditEH::StartHandler( void )
	{

	inherited::StartHandler();

	/*
	 * initialize the snips
	 */
	itsUpSnip		= NULL;
	itsDownSnip		= NULL;
	itsUpHighSnip		= NULL;
	itsDownHighSnip		= NULL;
	itsThumbAreaSnip	= NULL;
	itsThumbSnip		= NULL;

	}

/*	------------------------------------------------------------------
------------------------------------------
	StopHandler
	turns off the AT calculator touches
	------------------------------------------------------------------
------------------------------------------ */
void	CTextEditEH::StopHandler( void )
	{

	/*
	 * cleanup txt
	 */
	Cleanup();


	/*
	 * make snips purgable if necessary
	 */
	if (itsUpSnip != NULL)
		{
		HPurge ( itsUpSnip );
		HPurge ( itsDownSnip );
		HPurge ( itsUpHighSnip );
		HPurge ( itsDownHighSnip );
		HPurge ( itsThumbAreaSnip );
		HPurge ( itsThumbSnip );
		}

	inherited::StopHandler();
	}
/*	------------------------------------------------------------------
------------------------------------------
	GetText
	external access function to get a handle to the text itself.
	------------------------------------------------------------------
------------------------------------------ */

Handle CTextEditEH::GetText ( Int16T blockNum )
	{
	return ( textBlocks [blockNum].content);
	}
```

BEST AVAILABLE COPY

```
/*  ------------------------------------------------------------------
-------------------------------------------
    GetEditBlock
    external access to a specific block by number
    ------------------------------------------------------------------
------------------------------------------- */

EditBlock *CTextEditEH::GetEditBlock ( Int16T blockNum )
    {
    return ( & (textBlocks [blockNum] ) );
    }


/*  ==================================================================
    APPLICATION-SPECIFIC  Y-COMMANDS
    For editing the different notepads.

    Called from scnScan.c
    ================================================================== */

#define     VIEW_RECT_INSET         2       /* pixels in from the snip rect */

/*  ------------------------------------------------------------------
-------------------------------------------
    CSRNotes
    sets up the CSR notes
    ------------------------------------------------------------------
------------------------------------------- */

void    CTextEditEH::CSRNotes( void )
    {
    Handle          theViewSnip;

    COLLECT_SNIP ( CSR_DOWN_SNIP,           itsDownSnip )
    COLLECT_SNIP ( CSR_UP_SNIP,                 itsUpSnip )
    COLLECT_SNIP ( CSR_HI_UP_SNIP,              itsUpHighSnip )
    COLLECT_SNIP ( CSR_HI_DOWN_SNIP,            itsDownHighSnip )
    COLLECT_SNIP ( CSR_THUMB_AREA_SNIP,     itsThumbAreaSnip )
    COLLECT_SNIP ( CSR_THUMB_SNIP,          itsThumbSnip )
    COLLECT_SNIP ( CSR_VIEW_SNIP,               theViewSnip )
    libGetPicRect( theViewSnip, &itsViewRect );
    InsetRect(&itsViewRect, VIEW_RECT_INSET, VIEW_RECT_INSET);

    itsText         = GetEditBlock ( CSR_NOTES_BLOCK );
    itsScrollable   = TRUE;
    Setup();
    }


/*  ------------------------------------------------------------------
-------------------------------------------
    EditNoteNum
    edits one of the ten special edit notepads 1-10, selected by number
    ------------------------------------------------------------------
------------------------------------------- */
void    CTextEditEH::EditNoteNum ( Int16T noteNum )
    {
    Handle      hSnip;

    if ( noteNum < 1 || noteNum > (TXT_MAX_TEXT_BLOCKS) )
        TGL_ERROR ( "Bad note number for editing (out of range)");

    COLLECT_SNIP ( NOTE_VIEW_SNIP, hSnip );
    libGetPicRect ( hSnip, &itsViewRect );
    InsetRect(&itsViewRect, VIEW_RECT_INSET, VIEW_RECT_INSET);
```

BEST AVAILABLE COPY

```
itsText        = GetEditBlock ( noteNum );
itsScrollable  = FALSE;
Setup();
}

/*  ------------------------------------------------------------------------
    ------------------------------------------------------
    End of File
    ------------------------------------------------------------------------
    ------------------------------------------------------ */
```

```
#include "standard.h"
#include "CTimedClickEH.h"
#include "tglmain.h"
#include "tchTouch.h"
#include "lblLabel.h"
#include "scnScan.h"
```

BEST AVAILABLE COPY

```
/*********************************************************************
 * ITimedClickEH initializes a CTimedClickEH.
 *********************************************************************/
void CTimedClickEH::ITimedClickEH( void )
{

	inherited::IEventHandler();

	itsTimeout = 0;
	itsDuration = 0;

}


/*********************************************************************
 * SetTimeout sets up the timeout: 'label' is the label to jump to if
 * the timeout occurs, 'tenths' is the number of tenths to wait before
 * the jumping
 *********************************************************************/
void CTimedClickEH::SetTimeout( char *label, Int32T tenths )
{
	char   error[50];


	/*
	 * lookup the label
	 */
	itsLabel = lblLookupLabel( label );


	/*
	 * error if the label is bad
	 */
	if (itsLabel == NULL) {

		StopHandler();
		sprintf( error, "Can't find label %s", label );
		TGL_ERROR( error );
	}


	/*
	 * set the timeout
	 */
	itsTimeout = TickCount() + 6 * tenths;
	itsDuration = tenths;

}


/*********************************************************************
 * TurningMyselfOff is called when a subservient gopher turns itself
 * off (right now only the 'pause' gopher can be subservient to the
 * the TimedClick gopher.
 *********************************************************************/
void CTimedClickEH::TurningMyselfOff( CEventHandler *whoAmI )
```

BEST AVAILABLE COPY

```
{
	/*
	 * no matter who turned off, reset my timeout again
	 * (normally only 'pause' is subservient to TimedClick)
	 */
	itsTimeout = TickCount() + 6 * itsDuration;

}


/**********************************************************************
 * MouseDown reacts to the mouse
 **********************************************************************/
Boolean CTimedClickEH::MouseDown( Point where, int32T modifiers )
{

	/*  reset the timer (we're here)  */
	itsTimeout = TickCount() + 6 * itsDuration;

	/*
	 * if we touched a valid touch area then exit
	 */
	if (tchTouchHandler( &where )) {

		StopHandler();
		return (TRUE);
	}


	/*
	 * otherwise, keep going
	 */
	else {

		return (FALSE);
	}
}


/**********************************************************************
 * EveryCycle checks to see if the timeout period has elapsed, and if
 * it has, the handler exits after jumping
 **********************************************************************/
Boolean CTimedClickEH::EveryCycle( void )
{

	if (TickCount() > itsTimeout) {

		scnTimeout( itsLabel );
		StopHandler();
	}

	return (FALSE);
}


/**********************************************************************
 * KeyDown disables the 'enter' button so that if we're in single step
 * mode, the enter button won't drop us through
 **********************************************************************/
Boolean CTimedClickEH::KeyDown( EventRecord myEvent )
{

	/*
	 * enter key
	 */
```

```
    If ((myEvent.message & keyCodeMask) == 0x4C00) {
        return (FALSE);
    }

    return (inherited::KeyDown( myEvent ));
}
```

BEST AVAILABLE COPY

BEST AVAILABLE COPY

```
#include "standard.h"
#include "CWaitEH.h"
#include "tglMain.h"
#include "tchTouch.h"

/*******************************************************************
 * IWaitEH initializes a CWaitEH.
 *******************************************************************
void CWaitEH::IWaitEH( void )
{

        inherited::IEventHandler();


        /*
         * set the default timeout
         */
        itsTimeout = 0;

}


/*******************************************************************
 * SetTimeout sets the timeout for a wait
 *******************************************************************/
void CWaitEH::SetTimeout( Int32T tenths )
{

        /*
         * if we're not in speedup mode, then set the time at which this wait
         * is supposed to end
         */
        if (!tglSpeedup) {

                itsTimeout = TickCount() + tenths * 6;
        }


        /*
         * if we ARE in speedup mode, then don't wait at all
         */
        else {

                itsTimeout = 0;
        }

}


/*******************************************************************
 * EveryCycle does something every cycle. In this case, it just checks to
 * see if enough time has elapsed, and turns itself off
 *******************************************************************/
Boolean CWaitEH::EveryCycle( void )
{

        /*
         * at the timeout time, remove the wait handler
         */
        if (TickCount() >= itsTimeout) {

                StopHandler();
        }

        return (FALSE);
}
```

CWaitEH.c

BEST AVAILABLE COPY

```
/**********************************************************************
 * MouseDown reacts to the mouse
 **********************************************************************/
Boolean CWaitEH::MouseDown( Point where, Int32T modifiers )
{

	/*
	 * If we touched a valid touch area then exit
	 */
	if (tchTouchHandler( &where )) {

		StopHandler();
		return (TRUE);
	}


	/*
	 * otherwise, keep going
	 */
	else {

		return (FALSE);
	}
}
```

BEST AVAILABLE COPY

```
/*
 *        dataStructures.c
 */

#include "standard.h"
#include "dataStructures.h"

/*-----------------------------------------
 *
 *                       Stack management
 *
 -----------------------------------------*/


Int32T datPtrNumItems ( DatPointerStack *pStack )
      {
      return ( pStack->numItems );
      }

void datPtrInit ( DatPointerStack *pStack )
      {
      pStack->numItems = pStack->top = pStack->start = 0;
      }

void datPtrPush ( DatPointerStack *pStack, char *ptr )
      {
      pStack->numItems++;
      pStack->stack[ pStack->top++ ] = ptr;
      if( pStack->top == DAT_STACK_SIZE ) pStack->top = 0;
      if( pStack->top == DAT_STACK_SIZE ) pStack->start++;
      }

void *datPtrPop ( DatPointerStack *pStack )
      {
      if( pStack->top == pStack->start ) return( NULL );

      if( pStack->top == 0 )
            pStack->top= DAT_STACK_SIZE - 1;
      else
            pStack->top--;

      pStack->numItems--;
      return( pStack->stack[ pStack->top ] );
      }


Int32T datInt16NumItems ( DatInt16Stack *pStack )
      {
      return ( pStack->numItems );
      }

void datInt16Init ( DatInt16Stack *pStack )
      {
      pStack->numItems = pStack->top = pStack->start = 0;
      }

void datInt16Push ( DatInt16Stack *pStack, Int16T integer )
      {
      pStack->numItems++;
      pStack->stack[ pStack->top++ ] = integer;
      if( pStack->top == DAT_STACK_SIZE ) pStack->top = 0;
      if( pStack->top == DAT_STACK_SIZE ) pStack->start++;
      }

Int16T datInt16Pop ( DatInt16Stack *pStack )
      {
      if( pStack->top == pStack->start ) return( (Int16T) NULL );
```

```
if( pStack->top == 0 )
      pStack->top= DAT_STACK_SIZE - 1;
else
      pStack->top--;

pStack->numItems--;
return( pStack->stack[ pStack->top ] );
}
```

BEST AVAILABLE COPY

BEST AVAILABLE COPY

```
/*****************************************************************/
/*****************************************************************/
/*

    algDialog.c creates a dialog box like the standard-file dialog,
    except that the contents of the scrolling window on the left need
    not be file names. There is lots of data global to this file,
    since most of the functions are actually called by the dialog
    manager, not by the application directly.

    dlgSelectByDialog puts up the dialog box and waits for the user
    to double click, press ok or press cancel, and returns the string
    which was selected. All other functions in this file are support
    functions to handle the details of getting that dialog box to work.

    dlgDrawNames, dlgDrawScroll and dlgDrawOkBox are functions called
    by the dialog manager to handle the 'userItems' in the dialog.
    dlgDrawNames puts the carriage-return separated names into the
    dialog. dlgDrawScroll puts the scroll bar in, and turns it on
    if necessary. dlgDrawOkBox draws the round-rectangle around the
    ok box to indicate the default action which would be taken by
    pressing the return button.

    dlgFilterProc is called by the dialog manager to decide what to
    do with the 'userItems' in the dialog. This particular filterProc
    responds to the mouse going down in the names window or the scroll
    bar, and to the alphabetic keys being pressed. Other actions
    are handled by the dialog manager itself.

    dlgActionProc is called by dlgFilterProc in order to handle the
    scroll bar properly.

    dlgSelectLine makes a line from the list of names the current line,]
    and makes sure that it appears on the screen.

    dlgScrollLineIntoView makes a line from the list of names visible
    to the user, even if this requires scrolling the window.

    dlgFindLineByName returns the number of the first line in the
    list of names that starts with whatever string is passed as
    the key. dlgFindLineByName is used to determine which line
    should be highlighted when the user types a letter (or letters),
    expecting to select a name.

*/


/*****************************************************************/
/*****************************************************************/
#include "standard.h"
#include "dlgDialog.h"
#include "tglmain.h"
#include "snpSnapshot.h"

/*****************************************************************/
/*****************************************************************/
#define SCROLL_BAR_ID        2001           /* scroll bar id          */
#define SELECT_BY_DIALOG_ID        2001     /* dialog box id          */
#define LIST_DIALOG_ID       2003           /* simple list dialog box id*/
#define OK                   1                  /* ok button
#define     CANCEL                2                    /* cancel button
#define NAMES                3                  /* scrolling names
#define SCROLL               4                  /* scroll bar
#define OK_BOX               5                  /* box around ok button
#define LABEL                6                  /* dialog's label

/*****************************************************************/
/*****************************************************************/
static Handle                ItemsH          = NULL;        /* text in wir
```

BEST AVAILABLE COPY

```
static TEHandle         NamesH          = NULL;        /* text edit window */
static ControlHandle    ScrollBarH  = NULL;        /* scroll bar        */
static Rect             ScrollR;                   /* loc of scroll bar */
static Rect             NamesRect;                     /* loc of names box
static Rect             OKRect;                        /* loc of ok button */
static char             ResultName[50];            /* selected name    */
static Int32T                   ResultNumber;          /* num of selected name
static Int32T                   NumLinesOfText;        /* lines in the source text
static Int32T                   NumLinesInWindow;      /* lines visable at once *
static Boolean                  ListOnly;              /* just list items in dialog

/*****************************************************************/
/*****************************************************************/
pascal      void  dlgActionProc( ControlHandle control, Int16T partCode );
pascal      Boolean dlgFilterProc( DialogPtr dialogP, EventRecord *eventP, Int16T *ite
pascal      Boolean dlgListFilterProc( DialogPtr dialogP, EventRecord *eventP, Int16T
pascal      void  dlgDrawScroll( DialogPtr theDialog, Int16T theItem );
pascal      void  dlgDrawNames( DialogPtr theDialog, Int16T theItem );
pascal      void  dlgDrawOKBox( DialogPtr theDialog, Int16T theItem );
            void  dlgActivateOkButton( DialogPtr dialogP );
            void  dlgSelectLine( DialogPtr dialogP, Int16T line );
            Int16T      dlgFindLineByName( char *name );
            void  dlgScrollLineIntoView( Int16T line, Boolean forceScrolling );

/*******************************************************
 * dlgScrollLineIntoView: makes sure the specified line
 * is visible in the text window.  In addition, if
 * 'forceScrolling' then the
 *******************************************************/
void dlgScrollLineIntoView( Int16T line, Boolean forceScrolling )
{
      Int16T                  currentValue;

      /*
       * get the current value in the scroll bar
       */
      currentValue = GetCtlValue( ScrollBarH );

      /*
       * if forceScrolling is on, or the current line is
       * not currently visible in the text window, then scroll
       */
      if (forceScrolling ||
            (line < currentValue) ||
            (line >= currentValue + NumLinesInWindow)) {

            /*
             * set the scroll bar's new value and scroll the text window
             */
            SetCtlValue( ScrollBarH, line );
            line = GetCtlValue( ScrollBarH );
            TEScroll( 0, (*NamesH)->lineHeight * (currentValue - line),
                  NamesH );
      }
}

/*******************************************************
 * dlgSelectLine: makes a line the "current" line.  This
 * means highlighting it, scrolling it into view if
 * necessary and storing its value for future reference.
 *******************************************************/
void dlgSelectLine( DialogPtr dialogP, Int16T line )
{
      Int32T                  itemType;
      Rect              r;
      Handle                  itemH;
      Int16T                  start;
```

BEST AVAILABLE COPY

```
	Int16T			end;
	Int16T			i;
	Int16T			currentValue;
	Int16T			linesInBox;

	/*
	 * find the start and end of the line
	 */
	start = (**NamesH).lineStarts[line];
	if (line < NumLinesOfText) {
		end = (**NamesH).lineStarts[line + 1] - 1;
	}
	else {
		end = (**NamesH).teLength;
	}

	/*
	 * select the line
	 */
	TESetSelect( start, end, NamesH );
	TEActivate( NamesH );

	/*
	 * scroll the line into view
	 */
	dlgScrollLineIntoView( line + 1, FALSE );

	/*
	 * copy the selection into the result buffer
	 */
	for (i = start; i <= end; i++) {
		ResultName[i - start] = (*(**NamesH).hText)[i];
	}
	ResultName[end - start] = '\0';
	ResultNumber = line;

}

/*****************************************************
 * dlgFindLineByName: looks for the substring specified
 * by 'name' at the beginning of each line of the text
 * in the text window.  It returns the line number of
 * the first line which matches.
 *****************************************************/
Int16T dlgFindLineByName( char *name )
{
	Int32T		i;
	char	string[256];
	Int32T		length;
	Int32T		start;
	Int32T		end;

	/*
	 * hold the TextEdit record and the Text itself down
	 */
	HLock( (Handle) NamesH );
	HLock( (**NamesH).hText );

	/*
	 * upper-case the name
	 */
	length = strlen( name );
	CtoPstr( name );
	UprString( name, FALSE );
	PtoCstr( name );

	/*
	 * loop through each line of the TextEdit record looking for
```

BEST AVAILABLE COPY

```
 * a match.  The TextEdit record contains an array of 'lineStarts'
 * which give an offset for each line in the TextEdit text.
 */
for ( i = 0; i < (**NamesH).nLines; i++ ) {
	start = (**NamesH).lineStarts[i];
	end = (**NamesH).lineStarts[i+1];
	strncpy( string, &(*(**NamesH).hText)[start], end - start );
	string[end - start - 1] = '\0';
	CtoPstr( string );
	UprString( string, FALSE );
	PtoCstr( string );
	if (strncmp( name, string, length ) <= 0) {
		HUnlock( (Handle) NamesH );
		HUnlock( (**NamesH).hText );
		return (i);
	}
}

/*
 * unlock everything
 */
HUnlock( (Handle) NamesH );
HUnlock( (**NamesH).hText );
return ((**NamesH).nLines - 1);

}

/******************************************************
 * dlgActionProc: handle user input for the scroll bar.
 * This function is called by the dialog manager (and
 * indirectly by dlgFilterProc) when the mouse is pressed
 * in the scroll bar, but not in the thumb of the scroll
 * bar.  The partCode indicates which part of the scroll
 * bar was touched.  It works by scrolling an appropriate
 * line into view.
 ******************************************************/
pascal void dlgActionProc( ControlHandle control, Int16T partCode )
{
	Int16T		currentValue = GetCtlValue( control );

	switch (partCode) {

	case inDownButton:
		dlgScrollLineIntoView( currentValue + 1, TRUE );
		return;

	case inUpButton:
		dlgScrollLineIntoView( currentValue - 1, TRUE );
		return;

	case inPageDown:
		dlgScrollLineIntoView( currentValue + NumLinesInWindow, TRUE );
		return;

	case inPageUp:
		dlgScrollLineIntoView( currentValue - NumLinesInWindow, TRUE );
		return;

	default:
		return;

	}
}

/******************************************************
 * dlgFilterProc: handle user input for the special parts
 * of this dialog box. DialogP is the
 * dialog and eventP is the event that occurred in that
```

```
 * dialog.  If this function discovers that the dialog
 * should be exited, then it returns TRUE and puts the
 * item number of the value that should be returned into
 * itemHit.  This function handles the following:
 *
 *      - clicking on a name in the text window highlights the
 *              name and saves it as the current choice
 *  - double clicking on a name selects the name as if
 *              the ok button had been hit after the choosing a name
 *      - typing works as it does in the standard-file dialog
 *  - mousing in the scroll bar works as expected
 *
 *****************************************************/
pascal Boolean dlgFilterProc( DialogPtr dialogP, EventRecord *eventP, Int16T *itemHit )
{
    Int16T              whichPart;
    ControlHandle   whichControl;
    Int32T              origValue;
    Int32T              newValue;
    Int16T              selectionChar;
    Point           hitPt;
    GrafPtr             port;
    Int16T              line;
    Int16T              i;
    Int16T              key;
    Int16T              start;
    static char  string[256];
    static Int16T       lastLine = -1;
    static Int32T       lastClickTime  = -1;
    static Int16T       stringLength = 0;
    static Int32T       lastKeyTime = -1;

    switch (eventP->what) {

        case mouseDown:

            /*
             * find out where the mouseclick was
             */
            GetPort( &port );
            hitPt = eventP->where;
            SetPort( dialogP );
            GlobalToLocal( &hitPt );

            /*
             * If the mouse was in the text window then calculate
             * which line it touched by knowing the coordinates
             * of the point, and how many lines are "above" the
             * window.  Select this line, highlighting it and
             * making it the current choice.  If this line is
             * the same as the last line, and very little time
             * elapsed, then it was the second click of a double
             * click, so tell the dialog manager that the ok
             * button was hit.
             *
             * Note
             */
            if (!ListOnly) {
                if (PtInRect( hitPt, &NamesRect )) {
                    line = (hitPt.v - NamesRect.top) / (**NamesH).lineHeight;
                    line += GetCtlValue( ScrollBarH ) - 1;

                    /*
                     * double click?
                     */
                    if ((line == lastLine) &&
                        (TickCount() - lastClickTime < GetDblTime())) {
                        *itemHit = OK;
```

BEST AVAILABLE COPY

BEST AVAILABLE COPY

```
                        return (TRUE);
                }

                /*
                 * select a new line and keep track of it
                 */
                else {
                        dlgSelectLine( dialogP, line );
                        lastLine = line;
                        lastClickTime = TickCount();
                        return (TRUE);
                }
        }
}

/*
 * If the mouse was in the scroll bar, then find out
 * which exactly part it was in.  If it was in the
 * thumb, then let the control manager track the
 * user's movements, then scroll an appropriate
 * line into view.  If it was not in the thumb
 * then let the control manager track the user's
 * movements, but have dlgActionProc handle the
 * details
 */
whichPart = FindControl( hitPt, dialogP, &whichControl);
if (whichPart >= inThumb) {

        /*
         * save the current value of the scroll, let the
         * user finish moving the thumb and get the new value
         * of the scroll.  Scroll the new line into view.
         */
        origValue = GetCtlValue(whichControl);
        TrackControl(whichControl, hitPt, 0 );
        newValue = GetCtlValue(whichControl);
        SetCtlValue( whichControl, origValue );
        dlgScrollLineIntoView( newValue, FALSE );
        SetPort( port );
        return (TRUE);
}
else if (whichPart >= inUpButton) {

        /*
         * have the dialog manager call dlgActionProc
         * to handle
         */
        TrackControl(whichControl, hitPt, dlgActionProc );
        SetPort( port );
        return (TRUE);
}
break;

case keyDown:
case autoKey:

        /*
         * return and enter keys are the same as hitting the
         * 'ok' button
         */
        key = eventP->message & charCodeMask;
        if ((key == '\r') || (key == '\n')) {
                *itemHit = OK;
                return (TRUE);
        }
```

BEST AVAILABLE COPY

```
        /*
         * if a key was pressed, then try to match the current
         * substring with a name in the list.  If the key was
         * pressed shortly after a different key, then extend
         * the substring to include the new key.  If the key
         * was not pressed shortly after another key, then
         * get rid of the old substring and start a new one
         * with this key.
         */
        else if (isprint( key )) {
                if (TickCount() - lastKeyTime < GetDblTime()) {
                        stringLength++;
                }
                else {
                        stringLength = 0;
                }
                string[stringLength] = key;
                string[stringLength+1] = '\0';
                line = dlgFindLineByName( string );
                dlgSelectLine( dialogP, line );
                lastKeyTime          = TickCount();
        }
        break;
    }
    return (FALSE);
}


/*******************************************************
 * dlgDrawScroll: put the scroll bar up.  This function
 * is called whenever the dialog manager has to redraw
 * the dialog box (which, since this is a modal dialog
 * box, should be just once at the start). TheDialog is
 * the dialog in question and theItem specifies which
 * item we're drawing.
 *******************************************************/
pascal void dlgDrawScroll( DialogPtr theDialog, Int16T theItem )
{
    /*
     * If there is not yet a ScrollBar control handle, then this is the
     * first time the names are being drawn.  Create a generic scroll
     * bar using the control manager and resize it to fit
     * in the location specified in the resource file.  Then set the
     * values of the scroll bar: minimum is 1, maximum is the
     * number of lines in the text less the number of lines that
     * can appear on the screen at once.  Finally, show the scroll
     * bar, and turn it on if there are more lines in the text than
     * will fit on the screen
     */
    if (ScrollBarH == NULL) {

        /*
         * draw the scroll bar
         */
        ScrollBarH = GetNewControl( SCROLL_BAR_ID, theDialog );
        MoveControl( ScrollBarH, ScrollR.left, ScrollR.top );
        SizeControl( ScrollBarH, ScrollR.right - ScrollR.left,
                ScrollR.bottom - ScrollR.top );

        /*
         * set the values of the scroll bar control
         */
        NumLinesInWindow = (ScrollR.bottom - ScrollR.top) /
                (**NamesH).lineHeight;
        SetCtlMin( ScrollBarH, 1 );
        SetCtlMax( ScrollBarH, MAX( 1, NumLinesOfText - NumLinesInWindow + 1 ;

        /*
```

BEST AVAILABLE COPY

```
		 * show the control and turn it on if there are enough lines
		 * to justify it being on
		 */
		ShowControl( ScrollBarH );
		if (NumLinesInWindow > NumLinesOfText) {
			HiliteControl( ScrollBarH, 255 );
		}
		else {
			HiliteControl( ScrollBarH, 0 );
		}
	}
}

/*******************************************************
 * DrawNames: put the names to be selected into the names
 * box on the left of the dialog box. This function
 * is called whenever the dialog manager has to redraw
 * the dialog box (which, since this is a modal dialog
 * box, should be just once at the start). TheDialog is
 * the dialog in question and theItem specifies which
 * item we're drawing.
 *******************************************************/
pascal void dlgDrawNames( DialogPtr theDialog, Int16T theItem )
{
	Int32T		firstLineEnd;

	/*
	 * if there is not yet a TextEdit handle, then this is the
	 * first time the names are being drawn. Allocate a
	 * TextEdit handle which is slightly smaller than the size of
	 * rectangle specified in the resource, so that the letters
	 * all fit
	 */
	if (NamesH == NULL) {
		InsetRect( &NamesRect, 2, 2 );
		NamesH = TENew( &NamesRect, &NamesRect );
		InsetRect( &NamesRect, -2, -2 );
		HLock( ItemsH );
		TESetText( *ItemsH, strlen( *ItemsH ), NamesH );
		firstLineEnd = (**NamesH).lineStarts[1] - 1;
		if (!ListOnly) {
			TESetSelect( 0, firstLineEnd, NamesH );
		}
		TEActivate( NamesH );
		HUnlock( ItemsH );
	}

	/*
	 * always update the text and put a frame around it
	 */
	TEUpdate( &NamesRect, NamesH );
	FrameRect( &NamesRect );
}

/*******************************************************
 * DrawOKBox: Draw the lovely rounded rectangle outside the
 * ok button. This function
 * is called whenever the dialog manager has to redraw
 * the dialog box (which, since this is a modal dialog
 * box, should be just once at the start). TheDialog is
 * the dialog in question and
 * theItem specifies which item we're drawing.
 *******************************************************/
pascal void dlgDrawOKBox( DialogPtr theDialog, Int16T theItem )
{
	PenState	state;
	Int32T		itemType;
```

BEST AVAILABLE COPY

```
    Handle          ItemH;

    /*
     * save the pen state, make the pen fat, find out where
     * the OK button goes, draw a round-rect outside the
     * OK button and restore the pen state
     */
    GetPenState( &state );
    PenSize( 3, 3 );
    InsetRect( &OKRect, -4, -4 );
    FrameRoundRect( &OKRect, 16, 16 );
    InsetRect( &OKRect, 4, 4 );
    SetPenState( &state );

}



/*******************************************************************
 * SelectByDialog puts up a dialog box with a scrolling text area.
 * The list of names passed to SelectByDialog is put in the scrolling
 * area, which works just like the standard file dialog box: the user
 * highlights a name by clicking on it or by typing some of the letters
 * that start the name; the user selects a name by hitting ok after
 * a name is highlighted or by double clicking on a name. NamesP is
 * list of names that should appear in the list, separated by carriage
 * returns, and ended with a '\0' character. Result is the selected
 * name. The function returns FALSE if the user pressed cancel
 * to get out of the dialog box, TRUE otherwise.
 *
 * !! The list of names is assumed to be in alphabetical order !!
 * Use dlgAlphabetize before calling this function.
 *******************************************************************/
Boolean dlgSelectByDialog( CharsHandle namesH, char *label, Int32T numLines, Boolea
Int32PT numberP)
{
    DialogPtr       dialogP;
    Boolean         done = FALSE;
    Int16T              itemType;
    Rect            r;
    Int16T              itemHit, i;
    Handle              itemH;
    OSErr               err;
    char            localLabel[64];
    CGrafPtr        port;
    CGrafPtr        oldImage = NULL;

    GetPort( (GrafPtr*) &port );

    /*
     * initialize
     */
    NumLinesOfText = numLines;
    ListOnly = listOnly;
    HLock( namesH );
    for (i = 0; i < strlen( *namesH ); i++ ) {
        if (((*namesH)[i] == '\r') || ((*namesH)[i] == '\0')) {
            ResultName[i] = '\0';
            break;
        }
        else {
            ResultName[i] = (*namesH)[i];
        }
    }
    ResultNumber = 0;
    HUnlock( namesH );
```

BEST AVAILABLE COPY

```
/*
 * copy the label and turn it into a pascal string
 */
strcpy( localLabel, label );
CtoPstr( localLabel );

/*
 * make a copy of the list of names
 */
itemsH = namesH;
err = HandToHand( &itemsH );

/*
 * save the image under the dialog and then read in the dialog
 */
if (listOnly) {
        oldImage = snpSaveBoxUnderDialog( LIST_DIALOG_ID, 'DLOG' );
        dialogP = GetNewDialog( LIST_DIALOG_ID, 0, (WindowPtr) -1 );
}
else {
        oldImage = snpSaveBoxUnderDialog( SELECT_BY_DIALOG_ID, 'DLOG' );
        dialogP = GetNewDialog( SELECT_BY_DIALOG_ID, 0, (WindowPtr) -1 );
}

/*
 * change the text of the label
 */
GetDItem( dialogP, LABEL,    &itemType,  &itemH,          &r );
SetIText( itemH, localLabel );

/*
 * tell the dialog manager how to draw the scroll bar
 */
GetDItem( dialogP, SCROLL,   &itemType,  &itemH,      &ScrollR );
SetDItem( dialogP, SCROLL,   itemType,   (Handle) dlgDrawScroll,  &ScrollR );

/*
 * tell the dialog manager how to draw the list of names
 */
GetDItem( dialogP, NAMES,    &itemType,  &itemH,          &NamesRect );
SetDItem( dialogP, NAMES,    itemType,   (Handle) dlgDrawNames,       &Name

/*
 * find out where the ok button is
 */
GetDItem( dialogP, OK,  &itemType,  &itemH,     &OKRect );

/*
 * tell the dialog manager how to draw the round-rectangle
 * around the ok box
 */
GetDItem( dialogP, OK_BOX,  &itemType,  &itemH,          &r );
SetDItem( dialogP, OK_BOX,  itemType,   (Handle) dlgDrawOKBox,      &r );

/*
 * let the dialog manager handle the dialog (with the
 * filter procedure dlgFilterProc) until the user
 * fights his way out of the dialog.
 */
SetPort( dialogP );
ShowWindow( dialogP );
do {
        if (listOnly) {
```

BEST AVAILABLE COPY

```
                ModalDialog( (ProcPtr) dlgFilterProc, &itemHit );
                done = (itemHit == OK);
        }
        else {
                ModalDialog( (ProcPtr) dlgFilterProc, &itemHit );
                done = (itemHit == OK) || (itemHit == CANCEL);
        }
} while (!done);

/*
 * ditch things: dispose of the dialog box itself, the extra
 * copy of the names made, and the
 * the text edit data for the names window.
 */
DisposDialog( dialogP );
ScrollBarH = NULL;
if (ItemsH != NULL) {
        DisposHandle( ItemsH );
}
ItemsH = NULL;
if (NamesH != NULL) {
        TEDispose( NamesH );
}
NamesH = NULL;

/*
 * restore the background after putting up the dialog
 */
snpRestoreBoxUnderDialog( &oldImage );

/*
 * return
 */
strcpy( result, ResultName );
*numberP = ResultNumber;
return ((itemHit == OK) && (ResultNumber >= 0) &&
        (ResultNumber <= numLines - 1));

}
```

BEST AVAILABLE COPY

```
/*
 * File edtEdit.c
 */

#include     "standard.h"
#include    "tglMain.h"
#include     "glue.h"
#include     "format.h"

#define          APP_CHILE
#define          APP_ADTERM
#include     "varFns.h"
#include     "EventHandlers.h"

#define EXTGEN
#include     "edtEdit.h"
#undef EXTGEN


Boolean TwoScreens = FALSE;
char   edtUseFormat;
char   edtJustify;
Boolean edtCommas;
Boolean edtEuroStyle;
Int32T       edtLength;
Int32T       edtDecimals;
Boolean edtForceLength;
Boolean edtForceDecimals;
char   edtFloatingID;


/* local function prototypes */
void edtFormatInput( char key, char *inText, char *outText );
Boolean edtCharacterFitsInEditRect ( char key );

/***********************************************************************
*
       EditSetup()
***********************************************************************
/
void edtEditSetup(        Point        tgt,
                          char         *iniText,
                          Boolean          useFormat,
                          Int32T           VarNum,
                          Boolean          secondScreen,
                          char         justify,
                          Boolean          commas,
                          Boolean          euroStyle,
                          Int32T           length,
                          Int32T           decimals,
                          Boolean          forceLength,
                          Boolean          forceDecimals,
                          char         floatingID,
                          Rect         *EditRect )
{
       FontInfo  info;
       Int32T i;
       char           outText[256];

       edtEditVar= VarNum;

       edtUseFormat          = useFormat;
       edtJustify            = justify;
       edtCommas                   = commas;
       edtEuroStyle          = euroStyle;
       edtLength             = length;
       edtDecimals                 = decimals;
       edtForceLength        = forceLength;
```

BEST AVAILABLE COPY

```
edtForceDecimals = forceDecimals;
edtFloatingID          = floatingID;

RGBForeColor( &tglTextFGColor );
RGBBackColor( &tglTextBGColor );
TextFont( tglTextFont );
TextSize( tglTextSize );
TextFace( tglTextFace );

TwoScreens = secondScreen && (tglNumVisibleScreens == 2);
if( TwoScreens )
        {
        SetPort( (GrafPtr) tglAltCWindow );
        RGBForeColor( &tglTextFGColor );
        RGBBackColor( &tglTextBGColor );
        TextFont( tglTextFont );
        TextSize( tglTextSize );
        TextFace( tglTextFace );
        SetPort( (GrafPtr) tglMainCWindow );
        }

GetFontInfo( &info );

if (EditRect == NULL) {
        if ((justify == 'r') || (justify == 'R')) {
                edtEditRect.top= tgt.v - info.ascent;
                /* for reasons unknown, the edit rectangle needs to be shifted left o
                match drawstring and the other QD routines  -HMH
                */
                edtEditRect.right= tgt.h - 1;
                edtEditRect.bottom= edtEditRect.top + info.ascent + info.descent + i
                if (edtEditWidth > 0) {
                        edtEditRect.left= edtEditRect.right - edtEditWidth;
                        edtEditWidth = 0;
                }
                else {
                        edtEditRect.left= edtEditRect.right - (edtEditLen * info.widMax
                }
        }
        else {
                edtEditRect.top= tgt.v - info.ascent;
                /* for reasons unknown, the edit rectangle needs to be shifted left or
                match drawstring and the other QD routines  -HMH
                */
                edtEditRect.left= tgt.h - 1;
                edtEditRect.bottom= edtEditRect.top + info.ascent + info.descent + ir
                if (edtEditWidth > 0) {
                        edtEditRect.right= edtEditRect.left + edtEditWidth;
                        edtEditWidth = 0;
                }
                else {
                        edtEditRect.right= edtEditRect.left + (edtEditLen * info.widMax)
                }
        }
} else {
        edtEditRect = *EditRect;
}

edtEditBaseLine= tgt.v;

edtHEdit= TENew( &edtEditRect, &edtEditRect );
if ((justify == 'r') || (justify == 'R')) {
        TESetJust( teJustRight, edtHEdit );
}
if (useFormat) {
        edtFormatInput( ' ', iniText, outText );
        strcpy( iniText, outText );
```

BEST AVAILABLE COPY

```
		/*  don't make the user backspace to remove a '0'  */
		if ( iniText[0] == '0' && iniText[1] == '\0' ) iniText[0] = '\0';
	}
	i = strlen( iniText );
	TESetText( iniText, i, edtHEdit );

	TESetSelect( (Int32T) i, (Int32T) i, edtHEdit );

	(*edtHEdit)->crOnly= -1;				/* no autowrap */

	EraseRect( &edtEditRect );

	TEUpdate( &edtEditRect, edtHEdit );
	TEActivate( edtHEdit );					/* wrong place, but must for
	ObscureCursor();
	if( TwoScreens ) edtEditAlt();

}


void edtFormatInput( char key, char *inText, char *outText )
{
	Int32T		len;
	Int32T		i;
	Int32T		count;
	Boolean		hadPlusOrMinus	= FALSE /*  (key == '+') || (key == '-')  */;
	Boolean		minusAllowed = FALSE;  /*  we may want to add a way to set
								/*  for now,  it is always
	Boolean		hadPercentOrDollar= FALSE /*  (key == '%') || (key == '$')  */;
	char		plusOrMinus = key;
	char		percentOrDollar = key;
	char		tempText[256];

	/*
	 * convert the number to a bland, American style number
	 */
	count = 0;
	for (i = 0; i < strlen( inText ); i++) {

		switch (inText[i]) {

#ifdef NO_EXTRA_CHARS
			case '+':
				/*
				 * make sure to note a plus sign for later restoring
				 */
				hadPlusOrMinus = TRUE;
				plusOrMinus = '+';
				outText[count++] = inText[i];
				break;

			case '-':
				/*
				 * make sure to note a minus sign for later restoring
				 */
				if ( minusAllowed )
					{
					hadPlusOrMinus = TRUE;
					plusOrMinus = '-';
					outText[count++] = inText[i];
					}
				break;

			case '%':
				/*
				 * make sure to note a percent sign for later restoring
				 */
				hadPercentOrDollar = TRUE;
```

BEST AVAILABLE COPY

```
                percentOrDollar = '%';
                outText[count++] = inText[i];
                break;

            case '$':
                /*
                 * make sure to note a dollar sign for later restoring
                 */
                hadPercentOrDollar = TRUE;
                percentOrDollar = '$';
                outText[count++] = inText[i];
                break;
#endif
            case '.':
            case ',':
            case '0':
            case '1':
            case '2':
            case '3':
            case '4':
            case '5':
            case '6':
            case '7':
            case '8':
            case '9':
                outText[count++] = inText[i];
                break;

            default:
                break;
        }
    }
    outText[count] = '\0';
    strcpy( inText, outText );

    /*
     * reformat the number according to the specification passed in earlier
     */
    formatNumber ( outText, inText, edtLength,
        edtForceLength, edtDecimals, edtForceDecimals,
        edtJustify, edtCommas, edtEuroStyle, edtFloatingID );


    /*
     * A HACK: if there was a plus or minus then make sure it stays in the number
     */
    if (hadPlusOrMinus && !strpbrk( outText, ".,0123456789+-%$")) {
        count = strlen( outText );
        outText[count++] = plusOrMinus;
        outText[count] = '\0';
    }

    /*
     * A HACK: if the key was a decimal (or comma in European numbers)
     * then add the decimal at the end, since formatNumber will have removed it
     */
    if ((key == '.') && (edtDecimals) && (!edtEuroStyle) && !strchr( outText, '.')) {
        count = strlen( outText );
        outText[count++] = '.';
        outText[count] = '\0';
    }
    else if ((key == ',') && (edtDecimals) && (edtEuroStyle) && !strchr( outText, ',')) {
        count = strlen( outText );
        outText[count++] = ',';
        outText[count] = '\0';
    }
```

BEST AVAILABLE COPY

```
/*
 * A HACK: make sure that (at least) the floatingID character
 * is present in the string, since formatNumber will have removed it
 */
if ((edtFloatingID) && (!strchr( outText, edtFloatingID ))) {
        if ((edtJustify == 'l') || (edtJustify == 'L')) {
                outText[0] = edtFloatingID;
                outText[1] = '\0';
        }
        else if ((edtJustify == 'r') || (edtJustify == 'R')) {
                count = strlen( outText );
                if (count > 0) {
                        outText[count-1] = edtFloatingID;
                        outText[count] = '\0';
                }
                else {
                        outText[0] = edtFloatingID;
                        outText[1] = '\0';
                }
        }
}


/*
 * A HACK: if the number is left-justified then delete any
 * trailing spaces which formatNumber may have added
 */
if ((edtJustify == 'l') || (edtJustify == 'L')) {
        count = strlen( outText );
        if (count > 0) {
                for (i = count - 1; i >= 0; i--) {
                        if (outText[i] != ' ') {
                                outText[i+1] = '\0';
                                break;
                        }
                }
        }
}


/*
 * A HACK: if the number is right-justified then delete any
 * leading spaces (which formatNumber may have added), to make sure
 * there is room for more input from the user
 */
if ((edtJustify == 'r') || (edtJustify == 'R')) {
        while (outText[0] == ' ') {
                strcpy( outText, &outText[1] );
        }
}

/*
 * A HACK: if there was a '$' or '%' then make sure it stays in the number
 */
if (hadPercentOrDollar && !strpbrk( outText, "$%")) {
        if (percentOrDollar == '$') {
                if (outText[0] == '-' || outText[0] == '+') {
                    tempText[0] = outText[0];
                    tempText[1] = '\0';
                    strcat( tempText, "$" );
                    strcat( tempText, outText + 1 );
                    strcpy( outText, tempText );
            } else {
                    strcpy( tempText, "$" );
                    strcat( tempText, outText );
                    strcpy( outText, tempText );
                }
        } else {
```

BEST AVAILABLE COPY

```
			strcat( outText, "%" );
		}
	}
}

/*****************************************************************
*
	edtCharacterFitsInEditRect()
******************************************************************
/
Boolean edtCharacterFitsInEditRect ( char key )
	{
	char tempString[256];

	/*  return immediately if it's a backspace  */
	if ( key == '\b' ) return( TRUE );

	/*  get the string as it is so far and add the new character  */
	strncpy( tempString, (char*) *TEGetText( edtHEdit ), (*edtHEdit)->teLength );
	tempString[(*edtHEdit)->teLength] = key;
	tempString[(*edtHEdit)->teLength + 1] = '\0';

	/*  see if it fits  */
	return( stringwidth( tempString ) < edtEditRect.right - edtEditRect.left );
	}

/*****************************************************************
*
	EditAction()
******************************************************************
/
int32T		edtEditAction( key )
	char key;
{
	char		*p;
	int32T			len;
	char		inText[256];
	char		outText[256];
	CharsHandle		h;

	if ( key == '\n' ||
	   key == 0x0D ||
	   key == 0x03 )  /*  ETX, the enter key on the numeric keypad  */
	{
	p= (char*) *TEGetText( edtHEdit );
	len= (*edtHEdit)->teLength;

	strncpy( varPtr(edtEditVar) , p, len );
	varPtr(edtEditVar)[len] = '\0';

	TEDeactivate( edtHEdit );			/* hmmm. shouldn't really be ca
	TEDispose( edtHEdit );
	edtHEdit = NULL;

	RGBForeColor( &tglRgbBlack );
	RGBBackColor( &tglRgbWhite );
	if( TwoScreens )
		{
		SetPort( (GrafPtr) tglAltCWindow );
		RGBForeColor( &tglRgbBlack );
		RGBBackColor( &tglRgbWhite );
		SetPort( (GrafPtr) tglMainCWindow );
		}


		/*
```

BEST AVAILABLE COPY

```
         * turn off the edit gopher
         */
        tglEditGopher->StopHandler();

    }
    else
    {
    if ( ( (*edtHEdit)->teLength < edtEditLen || key == '\b' ) &&
            /*  ignore it if if dosen't fit in the window that we have cleared on the scr
        ( edtCharacterFitsInEditRect( key ) ) )
      {
        TEKey( key, edtHEdit );

        if (edtUseFormat) {

                /*
                 * get the current text from the text edit field
                 */
                h = TEGetText( edtHEdit );
                HLock( h );
                len = (*edtHEdit)->teLength;
            strncpy( inText, *h, len );
            HUnlock( h );
            inText[len] = '\0';

        /*
         * format
         */
                edtFormatInput( key, inText, outText );

                /*
                 * set the TextEdit record again
                 */
                TESetText( outText, strlen( outText ), edtHEdit );

        }
    }

    EraseRect( &edtEditRect );
    TEUpdate( &edtEditRect, edtHEdit );
    if( TwoScreens ) edtEditAlt();
    }

}

/*************************************************************************
*
      edtEditAlt() -- show contents of edit window on alternate screen
*************************************************************************
/
void edtEditAlt()
{
      char *p;
      Int32T len;

      if( tglMyCWindow == tglAltCWindow )
            {       /* default window is alternate -- case not handled */
            return;
            }

      SetPort( (GrafPtr) tglAltCWindow );

      EraseRect( &edtEditRect );
      p= (char*) *TEGetText( edtHEdit );
      len= (*edtHEdit)->teLength;

      strncpy( varPtr(edtEditVar) , p, len );
```

BEST AVAILABLE COPY

```
    varPtr(edtEditVar)[len] = '\0';

    switch (edtJustify) {

        case 'l':
        case 'L':
        case ' ':
            MoveTo( edtEditRect.left, edtEditBaseLine );
            drawstring( varPtr(edtEditVar) );
            break;

        case 'r':
        case 'R':
            MoveTo( edtEditRect.right - stringwidth( varPtr(edtEditVar)), edtEditB
            drawstring( varPtr(edtEditVar) );
            break;
    }

    SetPort( (GrafPtr) tglMainCWindow );

    return;
}
```

BEST AVAILABLE COPY

```
/* Error Checking & Handling                          */
/* CitiBank Money Advisor          */
/* Error Handler.c           */
/* 1/28/90 - JDT             */

#ifdef THINK_C

        /* macheaders */

#else

                #include    <types.h>
                #include    <memory.h>
                #include    <palette.h>
                #include    <quickdraw.h>
                #include    <toolutils.h>
                #include    <fonts.h>
                #include    <events.h>
                #include    <windows.h>
                #include    <dialogs.h>
                #include    <menus.h>
                #include    <desk.h>
                #include    <textedit.h>
                #include    <scrap.h>
                #include    <segload.h>
                #include    <packages.h>
                #include    <errors.h>
                #include    <files.h>
                #include    <stdio.h>

        #pragma    segment Seg2

#endif

#define APP_ADTERM 1

#include "standard.h"
#include "glue.h"
#include "tglMain.h"
#include "scrScreen.h"
#include "libLibrary.h"
#include "edtEdit.h"
#include "grfGraphics.h"
#include "varFns.h"
#include "errHandler.h"

#define max(a,b) (((a) > (b)) ? (a) : (b))

/* Local Prototypes */
void eval(char *);
Int16T get_token(char *, Int16T *);
void scan(char *);
void parse(void);
Int16T overflow_check(Int16T);
void apply(void);
Int16T underflow_check(Int16T);
Int16T stype(char *);
void fetch(Int16T);
Int16T count_dp(char *);

/* Evaluate an expression */

#define MAX_TERMS 50           /* Maximum Number of Terms */
#define MAX_STACK 15           /* Maximum Stack Sizes */

/* Operators */
```

```
#define ANCHOR_OP 30000
#define LP_OP    30001
#define ASSIGN_OP 30002
#define AND_OP   30003
#define OR_OP    30004
#define EQUAL_OP 30005
#define LT_OP    30006
#define GT_OP    30007
#define LE_OP    30008
#define GE_OP    30009
#define NE_OP    30010
#define NOT_OP   30011
#define PLUS_OP  30012
#define MINUS_OP 30013
#define CAT_OP   30014
#define MULT_OP  30015
#define DIV_OP   30016
/* Always at end */
#define RP_OP    30017
#define EOF_OP   30018
#define BAD_OP   30019
#define LITERAL  -1

/* Possible Errors */
/* 1 - Expression too complex */
/* 2 - Bad Token              */
/* 3 - Unknown Operation      */
/* 4 - Stack underflow        */
/* 5 - Type mismatch          */
/* 6 - Variable overflow      */

typedef struct logic_tag {
  Int32T op;              /* lit, val or OP */
  char *lp;               /* Literal pointer */
} logic;

#define INT_TYPE 0
#define FLOAT_TYPE 1
#define STRING_TYPE 2
#define VAR_TYPE 3

static logic filter[MAX_TERMS];        /* Article filter */
static Int16T st_pos;                  /* Search term position */
static Int16T scanp;                   /* Position in Scanned string */
static error;                          /* Test for syntax error */
static Int16T opstack[MAX_STACK];      /* Operator Stack */
static Int16T opstack_ptr;             /* Operator Stack Pointer */
static Int16T typestack[MAX_STACK];    /* Type Stack */
static Int32T valstacki[MAX_STACK];    /* Integer Value Stack */
static Real80T valstackf[MAX_STACK];   /* Floating Value Stack */
static char *valstacks[MAX_STACK];     /* String Value Stack */
static Int16T valstack_ptr;            /* Value Stack Pointer */
static char stoken[VAR_MAXVARLEN];     /* String Token */
static Int16T dec_pts;                                  /* Decimal P
Conversion */


/* Evaluate an expression passed in variable errReturnCode (180) */
void errEval()
{
  char test[VAR_MAXVARLEN];
  Int16T x;

  errEvalString(varPtr(errReturnCode));
}

void errEvalString(input)
char *input;               /* Input string */
```

errHandler.c

BEST AVAILABLE COPY

BEST AVAILABLE COPY

```
{
 int16T i;

 /* Clear things */
      dec_pts=0;
 error=0;

 /* Convert input string to a logic filter */
 scan(input);

 /* Look for syntax error */
 if (error == 0) parse();

 /* Clean up */
 for (i=0; i<MAX_TERMS; i++) {
  if (filter[i].lp != NULL) {
    DisposPtr(filter[i].lp);
    filter[i].lp = NULL;
  }
 }
 for (i=0; i<MAX_STACK; i++) {
  if (valstacks[i] != NULL) {
    DisposPtr(valstacks[i]);
    valstacks[i] = NULL;
  }
 }

      switch (error) {
       case 0: return;
       case 1:     TGL_FATAL_ERROR( "err - Expression too complex" );
       case 2:     TGL_FATAL_ERROR( "err - Bad Token" );
       case 3:     TGL_FATAL_ERROR( "err - Unknown Operation" );
       case 4:     TGL_FATAL_ERROR( "err - Stack underflow" );
       case 5:     TGL_FATAL_ERROR( "err - Type mismatch" );
       case 6:     TGL_FATAL_ERROR( "err - Variable overflow" );
      }
}

int16T get_token(s, pos)
char *s;              /* String to Parse */
int16T *pos;            /* Current Pos in String */
{
 char *st;            /* String Token */
 int16T tpos = 0;        /* String token Position */
 char c;

 /* Zero string */
 st = stoken;
 stoken[0] = '\0';

 /* Skip any leading spaces */
 while (isspace(s[*pos])) (*pos)++;

 /* Transition Diagram Encoded as a case */
 switch (s[*pos]) {
   case '\0': (*pos)++; return EOF_OP;
   case '(':  (*pos)++; return LP_OP;
   case ')':  (*pos)++; return RP_OP;
   case '+':  (*pos)++; return PLUS_OP;
   case '*':  (*pos)++; return MULT_OP;
   case '/':  (*pos)++; return DIV_OP;
   case '&':  (*pos)++; return CAT_OP;
   case '=':  (*pos)++; return EQUAL_OP;
   case ':':
    (*pos)++;
    if (s[*pos] != '=') return BAD_OP;
    (*pos)++; return ASSIGN_OP;
   case '!':
```

errHandler.c

```
(*pos)++;
if (s[*pos] != '=') return BAD_OP;
(*pos)++; return NE_OP;
case '<':
(*pos)++;
switch (s[*pos]) {
case '=': (*pos)++; return LE_OP;
case '>': (*pos)++; return NE_OP;
}
return LT_OP;
case '>':
(*pos)++;
switch (s[*pos]) {
case '=': (*pos)++; return GE_OP;
}
return GT_OP;
case 'A':
case 'a':
(*pos)++;
if (toupper(s[*pos]) != 'N') {
(*pos)--;
goto var_lookup;
}
(*pos)++;
if (toupper(s[*pos]) != 'D') {
(*pos) -= 2;
goto var_lookup;
}
(*pos)++;
return AND_OP;
case 'O':
case 'o':
(*pos)++;
if (toupper(s[*pos]) != 'R') {
(*pos)--;
goto var_lookup;
}
(*pos)++;
return OR_OP;
case 'N':
case 'n':
(*pos)++;
if (toupper(s[*pos]) != 'O') {
(*pos)--;
goto var_lookup;
}
(*pos)++;
if (toupper(s[*pos]) != 'T') {
(*pos) -= 2;
goto var_lookup;
}
(*pos)++;
return NOT_OP;
case '\"':
/* Literal, go until next " or null hit */
(*pos)++;
while ((s[*pos] != '\"') && (s[*pos] != '\0')) *st++ = s[(*pos)++];
(*pos)++;
*st++ = '\0';
return LITERAL;
case '$':
(*pos)++;
*st++ = s[(*pos)++];
while ((isdigit(s[*pos])) || (s[*pos] == '.')) *st++ = s[(*pos)++];
*st++ = '\0';
return atoi(stoken);
case '-':
/* Minus or Neg Number ? */
```

errHandler.c

BEST AVAILABLE COPY

BEST AVAILABLE COPY

```
      (*pos)++;
      if ((isdigit(s[*pos])) || (s[*pos]=='.')) {
        (*pos)--;
        goto lit_num;
      }
      return MINUS_OP;
    case '0':
    case '1':
    case '2':
    case '3':
    case '4':
    case '5':
    case '6':
    case '7':
    case '8':
    case '9':
    case '.':
    lit_num:
      /* Literal, go until not a valid numeric character */
      *st++ = s[(*pos)++];
      while ((isdigit(s[*pos])) || (s[*pos] == '.')) *st++ = s[(*pos)++];
      *st++ = '\0';
      return LITERAL;
    default:
    var_lookup:
      /* Future: add variable name lookup here */
      return BAD_OP;
  }

}

void scan(input)
char *input;             /* Input string */
{
  int16T inp;             /* Position in input string */
  int16T prev_token;          /* Previous Token returned */
  int16T token;             /* Token returned */

  inp = scanp = 0;

  for (;;) {
    token = get_token(input, &inp);
    filter[scanp].op = token;
    if (token == LITERAL) {
      filter[scanp].lp = NewPtr(strlen(stoken) + 1);
      strcpy(filter[scanp].lp, stoken);
    }
    scanp++;
    if (scanp==MAX_TERMS) {
      error=1;
      break;
    }
    if (token==BAD_OP) {
      error=2;
      break;
    }
    if (token==EOF_OP) break;
  }
}

/*
 Parsing Precendence
 8  7  6  5    4  3   2   1  0
 (  *  +  NOT  =  AND  :=  (  #
    /  -       <  OR
       &       >
               <=
               >=
*/
```

errHandler.c

BEST AVAILABLE COPY

```
*/
/* Parsir.j precendence */
int16T f[] = {
  0, /* ANCHOR_OP */
  1, /* LP_OP */
  2, /* ASSIGN_OP */
  3, /* AND_OP */
  3, /* OR_OP */
  4, /* EQUAL_OP */
  4, /* LT_OP */
  4, /* GT_OP */
  4, /* LE_OP */
  4, /* GE_OP */
  4, /* NE_OP */
  5, /* NOT_OP */
  6, /* PLUS_OP */
  6, /* MINUS_OP */
  6, /* CAT_OP */
  7, /* MULT_OP */
  7, /* DIV_OP */
};

void parse()
{
  int16T more;          /* More operators to be applied? */
  int16T token;         /* The current token */
  int16T stp;           /* Position in scanned string */

  /* Empty stacks */
  opstack_ptr = valstack_ptr = -1;
  opstack[++opstack_ptr] = ANCHOR_OP;

  stp = 0;
  token = filter[stp++].op;

  /* Parse Loop */
  for (;;) {
   switch (token) {

     case LP_OP:
      if (overflow_check(opstack_ptr)) return;
      opstack[++opstack_ptr] = token;
      token = filter[stp++].op;
      break;

     case RP_OP:
      more = 1;
      while (more) {
        if (opstack[opstack_ptr] == LP_OP) {
         opstack_ptr--;
         more=0;
         token = filter[stp++].op;
       } else {
         apply();
        if (error) return;
       }
      }
      break;

    case EOF_OP:
      while (opstack[opstack_ptr] != ANCHOR_OP) {
       apply();
       if (error) return;
      }
      return;
```

errHandler.c

BEST AVAILABLE COPY

```
        case MULT_OP:
        case DIV_OP:
        case PLUS_OP:
        case MINUS_OP:
        case CAT_OP:
        case AND_OP:
        case OR_OP:
        case NOT_OP:
        case EQUAL_OP:
        case LT_OP:
        case GT_OP:
        case LE_OP:
        case GE_OP:
        case NE_OP:
        case ASSIGN_OP:
          more=1;
          while (more) {
            if (f[opstack[opstack_ptr]-ANCHOR_OP] < f[token-ANCHOR_OP]) {
              if (overflow_check(opstack_ptr)) return;
              opstack[++opstack_ptr] = token;
              more=0;
              token = filter[stp++].op;
            } else {
              apply();
              if (error) return;
            }
          }
          break;

        case LITERAL:
          if (overflow_check(valstack_ptr)) return;
          switch (stype(filter[stp-1].lp)) {
            case INT_TYPE:
              valstacki[++valstack_ptr] = atol(filter[stp-1].lp);
              typestack[valstack_ptr] = INT_TYPE;
              break;
            case FLOAT_TYPE:
              dec_pts = max(count_dp(filter[stp-1].lp),dec_pts);
              valstackf[++valstack_ptr] = atof(filter[stp-1].lp);
              typestack[valstack_ptr] = FLOAT_TYPE;
              break;
            case STRING_TYPE:
              if (valstacks[++valstack_ptr] == NULL) {
                valstacks[valstack_ptr] = NewPtr(VAR_MAXVARLEN);
              }
              strcpy(valstacks[valstack_ptr], filter[stp-1].lp);
              typestack[valstack_ptr] = STRING_TYPE;
              break;
          }
          token = filter[stp++].op;
          break;

        default: /* Variable */
          if (overflow_check(valstack_ptr)) return;
          valstacki[++valstack_ptr] = token;
          typestack[valstack_ptr] = VAR_TYPE;
          token = filter[stp++].op;
          break;
      }
    }
}

Int16T overflow_check(a)
Int16T a;
{
 if (a>MAX_STACK) error = 1;
 return error;
```

errHandler.c

BEST AVAILABLE COPY

```
}

#define TYPE1 (typestack[valstack_ptr-1])
#define TYPE2 (typestack[valstack_ptr])

void apply()
{
 int16T op;

 op = opstack[opstack_ptr--];

 if (op==NOT_OP) {
  if (underflow_check(1)) return;
 } else {
  if (underflow_check(2)) return;
 }

 switch (op) {
  case AND_OP:
   fetch(0); fetch(1);
   if ((!(TYPE1==INT_TYPE) && (TYPE2==INT_TYPE))) {
    error = 5;
    return;
   }
   valstacki[valstack_ptr-1] = valstacki[valstack_ptr-1] && valstacki[valstack_ptr];
   valstack_ptr--;
   break;
  case OR_OP:
   fetch(0); fetch(1);
   if ((!(TYPE1==INT_TYPE) && (TYPE2==INT_TYPE))) {
    error = 5;
    return;
   }
   valstacki[valstack_ptr-1] = valstacki[valstack_ptr-1] || valstacki[valstack_ptr];
   valstack_ptr--;
   break;
  case NOT_OP:
   fetch(0);
   if (TYPE2 != INT_TYPE) {
    error = 5;
   } else {
    valstacki[valstack_ptr] = !valstacki[valstack_ptr];
   }
   break;
  case MULT_OP:
   fetch(0); fetch(1);
   if ((!(TYPE1!=STRING_TYPE) && (TYPE2!=STRING_TYPE))) {
    error = 5;
    return;
   }
   if ((TYPE1 == TYPE2) && (TYPE1 == INT_TYPE)) {
    valstacki[valstack_ptr-1] = valstacki[valstack_ptr-1] * valstacki[valstack_ptr];
   } else if (TYPE1 == TYPE2) {
    valstackf[valstack_ptr-1] = valstackf[valstack_ptr-1] * valstackf[valstack_ptr];
   } else {
    if (TYPE1 == INT_TYPE) valstackf[valstack_ptr-1] = (Real80T) valstacki[valstack_ptr-1];
    if (TYPE2 == INT_TYPE) valstackf[valstack_ptr] = (Real80T) valstacki[valstack_ptr];
    valstackf[valstack_ptr-1] = valstackf[valstack_ptr-1] * valstackf[valstack_ptr];
    typestack[valstack_ptr-1] = FLOAT_TYPE;
   }
   valstack_ptr--;
   break;
  case DIV_OP:
   fetch(0); fetch(1);
   if ((!(TYPE1!=STRING_TYPE) && (TYPE2!=STRING_TYPE))) {
    error = 5;
    return;
   }
```

errHandler.c

BEST AVAILABLE COPY

```
    if ((TYPE1 == TYPE2) && (TYPE1 == INT_TYPE)) {
      valstacki[valstack_ptr-1] = valstacki[valstack_ptr-1] / valstacki[valstack_ptr];
    } else if (TYPE1 == TYPE2) {
      valstackf[valstack_ptr-1] = valstackf[valstack_ptr-1] / valstackf[valstack_ptr];
    } else {
      if (TYPE1 == INT_TYPE) valstackf[valstack_ptr-1] = (Real80T) valstacki[valstack_ptr-1].
      if (TYPE2 == INT_TYPE) valstackf[valstack_ptr] = (Real80T) valstacki[valstack_ptr];
      valstackf[valstack_ptr-1] = valstackf[valstack_ptr-1] / valstackf[valstack_ptr];
      typestack[valstack_ptr-1] = FLOAT_TYPE;
    }
    valstack_ptr--;
    break;
  case PLUS_OP:
    fetch(0); fetch(1);
    if ((!(TYPE1!=STRING_TYPE) && (TYPE2!=STRING_TYPE))) {
      error = 5;
      return;
    }
    if ((TYPE1 == TYPE2) && (TYPE1 == INT_TYPE)) {
      valstacki[valstack_ptr-1] = valstacki[valstack_ptr-1] + valstacki[valstack_ptr];
    } else if (TYPE1 == TYPE2) {
      valstackf[valstack_ptr-1] = valstackf[valstack_ptr-1] + valstackf[valstack_ptr];
    } else {
      if (TYPE1 == INT_TYPE) valstackf[valstack_ptr-1] = (Real80T) valstacki[valstack_ptr-1]
      if (TYPE2 == INT_TYPE) valstackf[valstack_ptr] = (Real80T) valstacki[valstack_ptr];
      valstackf[valstack_ptr-1] = valstackf[valstack_ptr-1] + valstackf[valstack_ptr];
      typestack[valstack_ptr-1] = FLOAT_TYPE;
    }
    valstack_ptr--;
    break;
  case MINUS_OP:
    fetch(0); fetch(1);
    if ((!(TYPE1!=STRING_TYPE) && (TYPE2!=STRING_TYPE))) {
      error = 5;
      return;
    }
    if ((TYPE1 == TYPE2) && (TYPE1 == INT_TYPE)) {
      valstacki[valstack_ptr-1] = valstacki[valstack_ptr-1] - valstacki[valstack_ptr];
    } else if (TYPE1 == TYPE2) {
      valstackf[valstack_ptr-1] = valstackf[valstack_ptr-1] - valstackf[valstack_ptr];
    } else {
      if (TYPE1 == INT_TYPE) valstackf[valstack_ptr-1] = (Real80T) valstacki[valstack_ptr-1]
      if (TYPE2 == INT_TYPE) valstackf[valstack_ptr] = (Real80T) valstacki[valstack_ptr];
      valstackf[valstack_ptr-1] = valstackf[valstack_ptr-1] - valstackf[valstack_ptr];
      typestack[valstack_ptr-1] = FLOAT_TYPE;
    }
    valstack_ptr--;
    break;
  case CAT_OP:
    if ((!(TYPE1==STRING_TYPE) && (TYPE2==STRING_TYPE))) {
      error = 5;
      return;
    }
    if ((strlen(valstacks[valstack_ptr-1]) + strlen(valstacks[valstack_ptr]) + 1) > VAR_MAX\
      error = 6;
      return;
    }
    strcat(valstacks[valstack_ptr-1],valstacks[valstack_ptr]);
    valstack_ptr--;
    break;
  case EQUAL_OP:
    fetch(0); fetch(1);
    if ((TYPE1 == TYPE2) && (TYPE1 == INT_TYPE)) {
      valstacki[valstack_ptr-1] = (valstacki[valstack_ptr-1] == valstacki[valstack_ptr]);
    } else if ((TYPE1 == TYPE2) && (TYPE1 == FLOAT_TYPE)) {
      valstacki[valstack_ptr-1] = (valstackf[valstack_ptr-1] == valstackf[valstack_ptr]);
    } else if (TYPE1 == TYPE2) {
      valstacki[valstack_ptr-1] = (strcmp(valstacks[valstack_ptr-1],valstacks[valstack_ptr]) =
```

errHandler.c

```
        } else {
          if ((!(TYPE1!=STRING_TYPE) && (TYPE2!=STRING_TYPE))) {
            error = 5;
            return;
          }
          if (TYPE1 == INT_TYPE) valstackf[valstack_ptr-1] = (Real80T) valstacki[valstack_ptr-
          if (TYPE2 == INT_TYPE) valstackf[valstack_ptr] = (Real80T) valstacki[valstack_ptr];
          valstacki[valstack_ptr-1] = (valstackf[valstack_ptr-1] == valstackf[valstack_ptr]);
        }
        typestack[valstack_ptr-1] = INT_TYPE;
        valstack_ptr--;
        break;
      case LT_OP:
        fetch(0); fetch(1);
        if ((TYPE1 == TYPE2) && (TYPE1 == INT_TYPE)) {
          valstacki[valstack_ptr-1] = (valstacki[valstack_ptr-1] < valstacki[valstack_ptr]);
        } else if ((TYPE1 == TYPE2) && (TYPE1 == FLOAT_TYPE)) {
          valstacki[valstack_ptr-1] = (valstackf[valstack_ptr-1] < valstackf[valstack_ptr]);
        } else if (TYPE1 == TYPE2) {
          valstacki[valstack_ptr-1] = (strcmp(valstacks[valstack_ptr-1],valstacks[valstack_ptr])
        } else {
          if ((!(TYPE1!=STRING_TYPE) && (TYPE2!=STRING_TYPE))) {
            error = 5;
            return;
          }
          if (TYPE1 == INT_TYPE) valstackf[valstack_ptr-1] = (Real80T) valstacki[valstack_ptr-1
          if (TYPE2 == INT_TYPE) valstackf[valstack_ptr] = (Real80T) valstacki[valstack_ptr];
          valstacki[valstack_ptr-1] = (valstackf[valstack_ptr-1] < valstackf[valstack_ptr]);
        }
        typestack[valstack_ptr-1] = INT_TYPE;
        valstack_ptr--;
        break;
      case GT_OP:
        fetch(0); fetch(1);
        if ((TYPE1 == TYPE2) && (TYPE1 == INT_TYPE)) {
          valstacki[valstack_ptr-1] = (valstacki[valstack_ptr-1] > valstacki[valstack_ptr]);
        } else if ((TYPE1 == TYPE2) && (TYPE1 == FLOAT_TYPE)) {
          valstacki[valstack_ptr-1] = (valstackf[valstack_ptr-1] > valstackf[valstack_ptr]);
        } else if (TYPE1 == TYPE2) {
          valstacki[valstack_ptr-1] = (strcmp(valstacks[valstack_ptr-1],valstacks[valstack_ptr]) :
        } else {
          if ((!(TYPE1!=STRING_TYPE) && (TYPE2!=STRING_TYPE))) {
            error = 5;
            return;
          }
          if (TYPE1 == INT_TYPE) valstackf[valstack_ptr-1] = (Real80T) valstacki[valstack_ptr-1]
          if (TYPE2 == INT_TYPE) valstackf[valstack_ptr] = (Real80T) valstacki[valstack_ptr];
          valstacki[valstack_ptr-1] = (valstackf[valstack_ptr-1] > valstackf[valstack_ptr]);
        }
        typestack[valstack_ptr-1] = INT_TYPE;
        valstack_ptr--;
        break;
      case LE_OP:
        fetch(0); fetch(1);
        if ((TYPE1 == TYPE2) && (TYPE1 == INT_TYPE)) {
          valstacki[valstack_ptr-1] = (valstacki[valstack_ptr-1] <= valstacki[valstack_ptr]);
        } else if ((TYPE1 == TYPE2) && (TYPE1 == FLOAT_TYPE)) {
          valstacki[valstack_ptr-1] = (valstackf[valstack_ptr-1] <= valstackf[valstack_ptr]);
        } else if (TYPE1 == TYPE2) {
          valstacki[valstack_ptr-1] = (strcmp(valstacks[valstack_ptr-1],valstacks[valstack_ptr]) <:
        } else {
          if ((!(TYPE1!=STRING_TYPE) && (TYPE2!=STRING_TYPE))) {
            error = 5;
            return;
          }
          if (TYPE1 == INT_TYPE) valstackf[valstack_ptr-1] = (Real80T) valstacki[valstack_ptr-1];
          if (TYPE2 == INT_TYPE) valstackf[valstack_ptr] = (Real80T) valstacki[valstack_ptr];
          valstacki[valstack_ptr-1] = (valstackf[valstack_ptr-1] <= valstackf[valstack_ptr]);
```

BEST AVAILABLE COPY errHandler.c

BEST AVAILABLE COPY

```
      }
      typestack[valstack_ptr-1] = INT_TYPE;
      valstack_ptr--;
      break;
    case GE_OP:
      fetch(0); fetch(1);
      if ((TYPE1 == TYPE2) && (TYPE1 == INT_TYPE)) {
        valstacki[valstack_ptr-1] = (valstacki[valstack_ptr-1] >= valstacki[valstack_ptr]);
      } else if ((TYPE1 == TYPE2) && (TYPE1 == FLOAT_TYPE)) {
        valstacki[valstack_ptr-1] = (valstackf[valstack_ptr-1] >= valstackf[valstack_ptr]);
      } else if (TYPE1 == TYPE2) {
        valstacki[valstack_ptr-1] = (strcmp(valstacks[valstack_ptr-1],valstacks[valstack_ptr])
      } else {
        if ((!(TYPE1!=STRING_TYPE) && (TYPE2!=STRING_TYPE))) {
          error = 5;
          return;
        }
        if (TYPE1 == INT_TYPE) valstackf[valstack_ptr-1] = (Real80T) valstacki[valstack_ptr-1
        if (TYPE2 == INT_TYPE) valstackf[valstack_ptr] = (Real80T) valstacki[valstack_ptr];
        valstacki[valstack_ptr-1] = (valstackf[valstack_ptr-1] >= valstackf[valstack_ptr]);
      }
      typestack[valstack_ptr-1] = INT_TYPE;
      valstack_ptr--;
      break;
    case NE_OP:
      fetch(0); fetch(1);
      if ((TYPE1 == TYPE2) && (TYPE1 == INT_TYPE)) {
        valstacki[valstack_ptr-1] = (valstacki[valstack_ptr-1] != valstacki[valstack_ptr]);
      } else if ((TYPE1 == TYPE2) && (TYPE1 == FLOAT_TYPE)) {
        valstacki[valstack_ptr-1] = (valstackf[valstack_ptr-1] != valstackf[valstack_ptr]);
      } else if (TYPE1 == TYPE2) {
        valstacki[valstack_ptr-1] = (strcmp(valstacks[valstack_ptr-1],valstacks[valstack_ptr]) !
      } else {
        if ((!(TYPE1!=STRING_TYPE) && (TYPE2!=STRING_TYPE))) {
          error = 5;
          return;
        }
        if (TYPE1 == INT_TYPE) valstackf[valstack_ptr-1] = (Real80T) valstacki[valstack_ptr-1]
        if (TYPE2 == INT_TYPE) valstackf[valstack_ptr] = (Real80T) valstacki[valstack_ptr];
        valstacki[valstack_ptr-1] = (valstackf[valstack_ptr-1] != valstackf[valstack_ptr]);
      }
      typestack[valstack_ptr-1] = INT_TYPE;
      valstack_ptr--;
      break;
    case ASSIGN_OP:
      fetch(0);
      if (TYPE2 == INT_TYPE) {
        /* "Assign $%d <- %d",valstacki[valstack_ptr-1],valstacki[valstack_ptr]) */
                        varSetL(valstacki[valstack_ptr-1],valstacki[valstack_ptr]);
      } else if (TYPE2 == FLOAT_TYPE) {
        /* "Assign $%d <- %f",valstacki[valstack_ptr-1],valstackf[valstack_ptr]) */
                        sprintf(varPtr(valstacki[valstack_ptr-1]),"%1.*Lf",dec_pts,valsta
      } else {
        /* "Assign $%d <- %s",valstacki[valstack_ptr-1],valstacks[valstack_ptr]) */
        strcpy(varPtr(valstacki[valstack_ptr-1]),valstacks[valstack_ptr]);
      }
      valstack_ptr -= 2;
      break;
    default:
      error=3;
      return;
  }
}

Int16T underflow_check(a)
Int16T a;
{
  if (a < valstack_ptr-1) error = 4;
```

errHandler.c

BEST AVAILABLE COPY

```
  return error;
 }

 /* Determine the type represented by a string */

 Int16T stype(s)
 char *s;
 {
  Int16T t;

  t = INT_TYPE;
  while (*s) {
   if ((*s=='.') && (t==INT_TYPE)) t = FLOAT_TYPE;
   if ( (!(isdigit(*s))) && (*s!='.') ) return STRING_TYPE;
   s++;
  }
  return t;
 }

 /* Handle Variable Lookups */

 void fetch(n)
 Int16T n;
 {
  if (typestack[valstack_ptr-n] != VAR_TYPE) return;
  /* Look up the string and return a type */
  /* Just like the literal code */
  switch (stype(varPtr(valstacki[valstack_ptr-n]))) {
   case INT_TYPE:
     valstacki[valstack_ptr-n] = atol(varPtr(valstacki[valstack_ptr-n]));
     typestack[valstack_ptr-n] = INT_TYPE;
     break;
   case FLOAT_TYPE:
     dec_pts = max(count_dp(varPtr(valstacki[valstack_ptr-n])),dec_pts);
     valstackf[valstack_ptr-n] = varAtof(varPtr(valstacki[valstack_ptr-n]));
     typestack[valstack_ptr-n] = FLOAT_TYPE;
     break;
   case STRING_TYPE:
     if (valstacks[valstack_ptr-n] == NULL) {
      valstacks[valstack_ptr-n] = NewPtr(VAR_MAXVARLEN);
     }
     strcpy(valstacks[valstack_ptr-n], varPtr(valstacki[valstack_ptr-n]));
     typestack[valstack_ptr-n] = STRING_TYPE;
     break;
  }
 }


Int16T count_dp(s)
char *s;
{

  while (*s) if (*s++=='.') goto gotdp;
  return 0;

  gotdp:
  return strlen(s);
}
```

errHandler.c

BEST AVAILABLE COPY

```
/*
 * excExcelRead.c
 *
 * Reads data from an Excel file into an in-memory data structure.
 * Up to MAX_FILES_OPEN can be open at once.
 *
 * When a file is opened, the characters from the file are read into an
 * array of characters, and each tab character is replaced with a \0
 * character. (Tab characters separate fields in an Excel file, and
 * must be converted to \0 characters if a particular field is
 * to be used as a C string.) In addition, a data structure is created
 * which has an offset to the start of each field of the data. Using
 * the offsets, the string for any particular cell of the spreadsheet
 * can be found.
 *
 * excOpenFile opens a file, reads data into memory, creates the data
 *           structures for it, closes the file and returns an id for this
 *           file which is used by all of the other functions in this file
 *
 * excCloseFile deletes the data and data structure corresponding to
 *           the id which it is passed
 *
 * excLookupCell copies information from a particular cell of a
 *           spreadsheet and returns a string with the data from that cell
 *
 * excNumRows returns the number of rows in a spreadsheet.
 *
 * djs 4/23/90
 * modified to filter the .Text files by program version "S" or "F"
 *
 */


#include     "standard.h"
#include     "tglMain.h"
#include     "excExcelRead.h"
#define APP_ADTERM
#include     "varfns.h"
#include     "fileAccess.h"
#include     "glue.h"

#define MAX_NUM_COLUMNS                  81    /* max num of columns in a spr
#define MAX_NUM_SPREADSHEETS   10     /* max num of spreadsheets open at once *

/*********************************************************
 * spreadsheet data is stored in an array of bytes. Since
 * the bytes are allocated dynamically, but accessed as if
 * they were an array, the declaration is for 1 element.
 *********************************************************/
typedef char                excRawDataT[1];
typedef      excRawDataT           *excRawDataPT;
typedef excRawDataPT   *excRawDataHT;

/*********************************************************
 * offset information is organized by row, and within rows
 * by column.
 *
 * A row is currently arbitrarily set to have
 * MAX_NUM_COLUMNS of columns, although a small amount of
 * space could be saved by finding out exactly how many
 * columns the spreadsheet in question actually has.
 *
 * A spreadsheet is an array of rows. Since the number of
 * rows is determined dynamically, the declaration is for
 * 1 element.
 *********************************************************/
typedef int32T                    excRowOffsetsT[MAX_NUM_COLUMNS];
typedef excRowOffsetsT        *excRowOffsetsPT;
```

BEST AVAILABLE COPY

```
typedef excRowOffsetsPT              *excRowOffsetsHT;

typedef     excRowOffsetsT           excSpreadsheetT[1];
typedef excSpreadsheetT              *excSpreadsheetPT;
typedef excSpreadsheetPT          *excSpreadsheetHT;

/*********************************************************
 * data structures to hold both the raw data and the offsets
 *********************************************************/
excSpreadsheetHT          excSpreadsheets[MAX_NUM_SPREADSHEETS] =
      { NULL, NULL, NULL, NULL, NULL, NULL, NULL, NULL, NULL, NULL };
excRawDataHT              excRawData[MAX_NUM_SPREADSHEETS] =
      { NULL, NULL, NULL, NULL, NULL, NULL, NULL, NULL, NULL, NULL };
Int32T                        excRows[MAX_NUM_SPREADSHEETS] =
      { 0, 0, 0, 0, 0, 0, 0, 0, 0, 0 };


/*********************************************************
 * local function prototypes
 *********************************************************/
Int32T        excReadFiltered ( char *dest, Int32T numBytes );


/*********************************************************
 * check for OS errors
 *********************************************************/
#define CHECK_OS_ERROR( RC )       {                   \
      char   ERROR[100];                                  \
                                                            \
      if (RC == fnfErr) {                                \
            sprintf( ERROR, "File not found: %s", fileName );\
            TGL_ERROR( ERROR )                            \
      }                                                     \
      else if (RC != 0) {                                 \
            TGL_ERROR( "OS error." );             \
      }                                                     \
}


/*******************************************************************
 * excOpenFile
 * *****************************************************************
 * - Opens an Excel file (in text form), copies its contents into
 *           memory and closes the file
 * - Finds out how many rows there are in the data, and then
 *           allocates enough data offset pointers to handle the entire
 *           spreadsheet.
 * - Sets up an offset for each cell in the spreadsheet, and replaces
 *           tab characters with \0 characters for use by C string manipulation
 *           functions
 *
 * fileName is the name of the excel file to be opened. This file
 * is assumed to be in text. FileIdP is a pointer to a excFileIdT
 * which will be filled in if everything goes well with the open
 * function. If there is an error, fileIdP is set to EXC_BAD_FILE_ID.
 *
 * the useFilter flag tells the function to use the filter flag character
 * for the program version (Stock or Fund). This effectively limits the
 * lines read in from the file to be only those matching the flag character
 * for the current program version.
 *******************************************************************/
void excOpenFile( char *fileName, excFileIdPT fileIdP, Boolean useFilter )
     {

     Int16T                       rc;
     Int32T                       lineCount;
     excSpreadsheetHT          oP;
```

BEST AVAILABLE COPY ·

```
excRawDataHT        h;
Int32T                  i;
char                volName[255];
Int16T                  vRefNum;
Int16T                  refNum;
Int32T                  bytesInSpreadsheet;
Int32T                  currentRow;
Int32T                  currentCol;
char                error[100];
char                localName[100];
char                temp[255];

/*****************************************************************
 * Initialize, find a fileId to use by finding the first NULL
 * entry in excSpreadsheets. If there is none, then too
 * many spreadsheets are open.
 *****************************************************************/
*fileIdP = EXC_BAD_FILE_ID;
for (i = 0; i < MAX_NUM_SPREADSHEETS; i++) {
        if (excSpreadsheets[i] == NULL) {
                *fileIdP = i;
                break;
        }
}
if (*fileIdP == EXC_BAD_FILE_ID) {
        TGL_ERROR( "Too many spreadsheets open." );
}

/*****************************************************************
 * open the file
 *****************************************************************/
rc = GetVol( volName, &vRefNum );
CHECK_OS_ERROR( rc );
strcpy( localName, fileName );
rc = fsopen( filePrependDir( temp, FILE_DATA_DIR, localName ), vRefNum, &refNu
CHECK_OS_ERROR( rc );

/*****************************************************************
 * find out how many bytes are in the file, allocate enough
 * space for that many bytes
 *****************************************************************/
rc = GetEOF( refNum, &bytesInSpreadsheet );
CHECK_OS_ERROR( rc );
h = (excRawDataHT) NewHandle( bytesInSpreadsheet + 2 );
if (h == NULL) {
        TGL_ERROR( "Can't allocate space to hold spreadsheet's text" );
}

/*****************************************************************
 * copy file info into memory
 *****************************************************************/
MoveHHi( (Handle) h );
HLock((Handle) h );
rc = FSRead( refNum, &bytesInSpreadsheet, **h );
CHECK_OS_ERROR( rc );
HUnlock((Handle) h );

/*****************************************************************
 * close file
 *****************************************************************/
rc = FSClose( refNum );
CHECK_OS_ERROR( rc );


if (useFilter)
        {
        HLock((Handle) h );
```

```
        bytesInSpreadsheet = excReadFiltered( (char *) *h, bytesInSpreadsheet );
        HUnlock((Handle) h );
        }
```

BEST AVAILABLE COPY

```
    /*****************************************************************
     * find out how many lines there are in the data
     *****************************************************************/
    lineCount = 0;
    for (i = 0; i < bytesInSpreadsheet; i++) {
        if ((**h)[i] == '\r') {
            lineCount++;
        }
    }

    /*****************************************************************
     * allocate (and clear) space for offset pointers
     *****************************************************************/
    oP = (excSpreadsheetHT) NewHandle( (lineCount + 1) * sizeof( excRowOffsetsT ));
    if (oP == NULL) {
        TGL_ERROR( "Can't allocate enough space for spreadsheet pointers" );
    }
    for (currentRow = 0; currentRow <= lineCount; currentRow++ )
        for (currentCol = 0; currentCol < MAX_NUM_COLUMNS; currentCol++ )
            (**oP)[currentRow][currentCol] = 0;

    /*****************************************************************
     * go through data, setting up offsets and converting tabs to \0's
     *****************************************************************/
    (**oP)[0][0] = 0;
    currentRow = 0;
    currentCol = 1;
    for (i = 0; i < bytesInSpreadsheet; i++) {

        /*************************************************************
         * convert tab to \0, set the next offset
         *************************************************************/
        switch ((**h)[i]) {

        case '\t':
            (**h)[i] = '\0';
            (**oP)[currentRow][currentCol] = i + 1;
            currentCol++;
            if (currentCol > MAX_NUM_COLUMNS) {
                sprintf( error, "Spreadsheet %s too wide: %d columns",
                    fileName, MAX_NUM_COLUMNS );
                TGL_ERROR( error );
            }
            break;

        case '\n':
        case '\r':
            (**h)[i] = '\0';
            currentRow++;
            (**oP)[currentRow][0] = i + 1;
            currentCol = 1;
            break;
        }
    }
    (**h)[bytesInSpreadsheet] = '\0';

    excRawData[*fileIdP]        = h;
    excSpreadsheets[*fileIdP]   = oP;
    excRows[*fileIdP]           = lineCount;

}
```

excExcelRead.c

BEST AVAILABLE COPY

```
/*****************************************************************
 * excCloseFile
 * ****************************************************************
 * - Deallocates any space used by the spreadsheet
 *
 * FileId is id of the file to be closed
 *
 *****************************************************************/
void excCloseFile( fileId )
	excFileIdT	fileId;
{
	char	error[100];

	if ((fileId < 0) ||
		(fileId > MAX_NUM_SPREADSHEETS) ||
		(excSpreadsheets[fileId] == NULL)) {
		sprintf( error, "excCloseFile: Bad file id: %ld", fileId );
		TGL_ERROR( error );
	}

	DisposHandle( (Handle) excSpreadsheets[fileId] );
	DisposHandle( (Handle) excRawData[fileId] );

	excSpreadsheets[fileId] = NULL;
	excRawData[fileId] = NULL;
}


/*****************************************************************
 * excLookupCell
 * ****************************************************************
 * - copies a string from a cell in the spreadsheet
 *
 * FileId is id of the file to be copied from.  Row and col specify
 * which cell is to be copied, and str is space into which the
 * string is to be copied.  (Str should be allocated before calling
 * this function.)
 *
 *****************************************************************/
void excLookupCell( fileId, row, col, str )
	excFileIdT	fileId;
	Int32T		row;
	Int32T		col;
	char		*str;
{
	char		*p;
	Int32T		offset;
	char		error[100];

	if ((fileId < 0) ||
		(fileId > MAX_NUM_SPREADSHEETS) ||
		(excSpreadsheets[fileId] == NULL)) {
		sprintf( error, "excLookupCell: Bad file id: %ld", fileId );
		TGL_ERROR( error );
	}

	if ((row < 0) ||
		(row > excRows[fileId])) {
		sprintf( error, "Bad spreadsheet row: %ld out of %ld",
			row, excRows[fileId] );
		TGL_ERROR( error );
	}

	if ((col < 0) ||
		(col > MAX_NUM_COLUMNS)) {
		sprintf( error, "Bad spreadsheet column: %ld out of %ld",
			col, MAX_NUM_COLUMNS );
		TGL_ERROR( error );
```

BEST AVAILABLE COPY

```
	}

	MoveHHi( (Handle) excRawData[fileId] );
	HLock( (Handle) excRawData[fileId] );
	offset = (**excSpreadsheets[fileId])[row][col];
	p = &((**(excRawData[fileId]))[offset]);
	strcpy( str, p );
	HUnlock( (Handle) excRawData[fileId] );

}

/*******************************************************************
 * excNumRows
 * *****************************************************************
 * return the number of rows for a given spreadsheet
 *
 *******************************************************************/
Int32T		excNumRows( fileId )
	excFileIdT		fileId;
{
	char	error[100];

	if ((fileId < 0) ||
		(fileId > MAX_NUM_SPREADSHEETS) ||
		(excSpreadsheets[fileId] == NULL)) {
		sprintf( error, "excNumRows: Bad file id: %ld", fileId );
		TGL_ERROR( error );
	}

	return( excRows[fileId] );
}

/******************************************************************
 * ADDED: djs 4/23/90
 * Instead of reading in all lines, filter through only those matching
 * the flag for the current program version: (S)tock or (F)und.
 ******************************************************************/

Int32T		excReadFiltered ( char *dest, Int32T numBytes )
	{
	char			*pC,
				flagFilter;		/* used to filter stocks/funds by versio
	char			*src;
	register Int32T		bytesCopied = 0;

	/*
	 * allocate temp buffer
	 */
	src = NewPtr( numBytes+2 );
	if (src == NULL)
		TGL_ERROR( "Can't allocate temp space to hold spreadsheet's data" );

	memcpy ( src, dest, numBytes );		/* load up the src */
	src[numBytes] = '\r';
	src[numBytes + 1] = '\0';

	/*
	 * set up the filter based on the program version
	 */
	if ( *varPtr ( vProgramVersion ) == '1' )
		flagFilter = 'F';		/*	FUND version */
	else
		flagFilter = 'S';		/*	STOCK version */

	/*
	 * copy over only the valid lines to the dest (real) data buffer
	 */
	pC = (char *) src;
```

BEST AVAILABLE COPY

```
bytesCopied = 0;
while ( pC <= src+numBytes )
    {
    /* check the flag: first char in the first field */
    if ( *pC == flagFilter ||          /* it matches stuff we want, take th
        *pC == 'B' )
        {
        pC = strchr ( pC, '\t');       /* skip over the first field */
        if ( pC == NULL ) break;       /* bad file format? */
                                                /* (break to outs
        pC++;                                   /* skip over the t

        while ( pC <= src+numBytes )   /* copy the rest of this line to the da
            {
            *(dest+bytesCopied) = *pC;
            bytesCopied++;
            pC++;
            if ( *(pC-1) == '\r' )            /* break to inside first while
                break;
            }
        }
    else
        {
        pC = strchr ( pC, '\r');       /* skip this line to begin of next */
        if ( pC == NULL ) break;       /* break to outside first while */
        pC++;                                   /* skip over the CF
        }
    }

DisposPtr ( (Ptr) src );

if (*(dest+bytesCopied-1) != '\r')
    {
    *(dest+bytesCopied) = '\r';
    bytesCopied++;
    }
*(dest+bytesCopied) = '\0';
bytesCopied++;

return( bytesCopied );
}

/*  EOF */
```

BEST AVAILABLE COPY

```
/*      fileAccess.c
        4/11/90

*/

#include      "standard.h"
#include      "fileAccess.h"
#include      "glue.h"

char *filePrependDir ( char *buf, char *dirName, char *fileName)
        {
        strcpy ( buf, ":" );
        strcat ( buf, dirName);
        strcat ( buf, ":" );
        strcat ( buf, fileName );
        return ( buf);
        }

/* ------------------------------------------------------------
 * fileOpenWithPrepend
 *
 *      opens a file with the file name 'fName' in the directory 'dirName'. If the
 *      the file is not found in that directory, then look for fName in the current
 *      directory.
 * ---------------------------------------------------------------- */
OSErr fileOpenWithPrepend( char *dirName, char *fName, int vRefNum, int *fRefNum
{
        OSErr           err;
        char    temp[255];


        /*
         * try to open the file with the directory name prepended
         */
        err = fsopen( filePrependDir( temp, dirName, fName ), vRefNum, fRefNum );

        /*
         * if the file was not found in that directory, then look in the current one
         */
        if ((err == fnfErr) || (err == dirNFErr)) {

                err = fsopen( fName, vRefNum, fRefNum );
        }

        return (err);

}
```

BEST AVAILABLE COPY

```
/*
 * variable formatting
 *
 * WBP October 23, 1989
 *
 */

#include "standard.h"
#include "tglMain.h"
#include "lblLabel.h"
#include "scnScan.h"
#include "format.h"


/**********************************************************************
*********
        formatVariable

        NOTE: the decimal stuff does not have all of the bugs worked out yet

        -- Added support for + and - signs 12/6/89 JMG

**********************************************************************
********/
void formatNumber (char *to,
                                  char *inFrom,
                                  Int16T length,
                                  BooleanT forceLength,
                                  Int16T decimals,
                                  BooleanT forceDecimals,
                                  char justify,
                              BooleanT commas,
                                  BooleanT euroStyle,
                                  char floatingID
                                  )
        {
        register Int16T i, j;
        Int16T formattedLength, preDecLength = 0, postDecLength = 0, countToComma,
        char *thisChar, commaChar, decimalChar, from[255];
        Boolean      hasNegative = FALSE;
        Boolean      hasPositive = FALSE;

        strcpy( from, inFrom );

        /* use the right kind of comma and decimal separator */
        commaChar = euroStyle ? '.' : ',';
        decimalChar = euroStyle ? ',' : '.';

        /* count digits */
        for (i = 0; from[i]; i++) if ( isdigit( from[i] ) ) preDecLength++;

        /* find out if the number has a positive or negative sign */
        /* (if the sign comes after a digit, then it's illegal) */
        /* (also strip out leading zeroes at this point */
        for (i = 0; from[i]; i++) {
                if (isdigit( from[i])) {
                        /*
                         *      check to strip out leading zeroes ONLY if string is not
                         *      just one zero, as in "0"
                         */
                        if ( ( from[i] == '0' ) && ( strlen ( from ) > 1 ) )
                                from[i] = ' ';
                        else break;
                }
                else if ( from[i] == '-' ) {
                        hasNegative = TRUE;
                        break;
                }
```

```
            else if ( from[i] == '+' ) {
                hasPositive = TRUE;
                'break;
            }
        }

        /*  adjust for post decimal point digits  */
        if ( (thisChar = strchr( from, decimalChar )) != (char *) NULL )
            while ( *thisChar )
                {
                if ( isdigit( *thisChar ) )
                    {
                    preDecLength--;
                    postDecLength++;
                    }
                thisChar++;
                }

        /*
         * turn off commas if there are fewer than three digits to the left of the decimal
         */
        if (preDecLength < 3) {
            commas = FALSE;
        }

        /*  find out how much room we would like  */
        formattedLength = preDecLength;
        if ( commas ) formattedLength += (formattedLength - 1) / 3;
        if ( floatingID ) formattedLength++;
        if ( hasNegative ) formattedLength++;
        if ( hasPositive ) formattedLength++;
        if ( decimals )
            {
            if ( forceDecimals ) formattedLength += decimals + 1;
            else if ( postDecLength ) formattedLength += postDecLength + 1;
              else decimals = 0;      /*  we have no decimals to copy  */
            }

        /*  drop out the commas if there's no room  * /
        if ( formattedLength > length && commas )
            {
            formattedLength -= (preDecLength - 1) / 3;
            commas = FALSE;
            }

        /*  fill with asterisks and return if there's still not enough room  */
        if ( formattedLength > length )
            {
            j = forceLength ? length : 1;
            for ( i = 0; i < j; i++ )
                to[i] = '*';
            to[i] = '\0';
            return;
            }

/*  start the string  */
        i = j = 0;

        /* put in the positive or negative sign if present */
        if (hasPositive) to[j++] = '+';
        if (hasNegative) to[j++] = '-';

        /*  put in the floating dollar sign (or whatever)  */
        if ( floatingID ) to[j++] = floatingID;

        /*  copy the pre decimal point digits (and insert commas if desired)  */
        if ( commas )
```

```
        {
        countToComma = ( preDecLength ) % 3;
        if ( countToComma == 0 ) countToComma = 3;
        }

    else countToComma = length + 1;          /* we never get this far */

    for ( i = 0; from[i] && from[i] != decimalChar; i++ )
        {
        if ( isdigit( from[i] ) )
            {
            to[j++] = from[i];
            countToComma--;
            if ( countToComma == 0 )
                {
                to[j++] = commaChar;
                countToComma = 3;
                }
            }
        }

    /* remove the (unneeded) final comma if we put it there */
    if ( commas && j > 0 ) j--;

    /* put in the post decimal place digits if desired */
    if ( decimals )
        {
        /* find out how many decimal digits we need */
        if (forceDecimals) decCount = decimals;
        else decCount = postDecLength;

        /* put in the decimal character */
        to[j++] = decimalChar;

        /* copy those in the supplied string */
        for ( ; from[i] && decCount; i++ )
            if ( isdigit( from[i] ) )
                {
                to[j++] = from[i];
                decCount--;
                }

        /* add trailing zeroes if necessary */
        for ( ; decCount; decCount--) to[j++] = '0';
        }

    /* justify the string */
    if ( forceLength )
        {
        if ( 'L' == toupper( justify ) )
            while ( j < length ) to[j++] = ' ';
        else if ( 'R' == toupper( justify ) )
            {
            for ( i = 0; i < j; i++ ) to[length - 1 - i] = to[j - 1 - i];
            for ( ; i < length; i++ ) to[length - 1 - i] = ' ';
            j = length;
            }
        }

    /* end the string */
    to[j] = '\0';
    }

/* System Time and Date functions */

void formatDate(str)
```

format.c

BEST AVAILABLE COPY

```
char *str;
{
	Int32T secs;
	GetDateTime(&secs);
	/*IUDateString(secs, abbrevDate, str);*/
	IUDateString(secs, longDate, str);
	PtoCstr(str);
}

void formatTime(str)
char *str;
{
	Int32T secs;
	GetDateTime(&secs);
	IUTimeString(secs, FALSE, str);
	PtoCstr(str);
}

void formatDateTime(str)
char *str;
{
	Int32T secs;
	GetDateTime(&secs);
	sprintf(str, "%lu", secs);
}


float dollar2float ( char *str )
	{
	int		i,j=0;
	char	buf[30];

	for ( i=0; i < strlen(str) ; i++ )
		{
		if ( isdigit(str[i]) || str[i] == '.' )
			{
			buf[j] = str[i];
			j++;
			}
		}
	return ( atof ( buf ) );
	}
```

```
/***************************************************************
 *
 * Glue functions for translating between C and pascal functions
 * (Just enough to get scanx to work) (for Think_C only)
 *
 * JMG 8/3/89
 *
 ***************************************************************/

#ifdef THINK_C


	#include	"standard.h"
	#include	"glue.h"

/***************************************************************
 * drawstring
 ***************************************************************/
void		drawstring( s )
	char	*s;
{
	char	localString[256];

#ifdef ASSEMBLY_DOESNT_HELP

	asm {
		lea	localString,a0		; A0 = localString
		addq.l		#1,a0		; A0 = localString[1]
		movea.l		s,a1		; A1 = s

		cmp		#0,(a1)		; s[0] == '\0'?
		beq		@2

@1		move.b		(a1)+,(a0)+	; copy s to localString
		cmp.b		#0,(a1)
		bne.s	@1

@2		lea		localString,a0	; A0 = localString
		suba.l		s,a1		; A1 = length of string
		move.l		a1,d0		; D0 = length of string
		move.b		d0,(a0)		; localString[0] = length c
	}

#endif

	strcpy( localString, s );
	CtoPstr( localString );
	DrawString( localString );

}


/***************************************************************
 * stringwidth
 ***************************************************************/
int16T		stringwidth( s )
	char	*s;
{
	char	localString[256];

	strcpy( localString, s );
	CtoPstr( localString );
	return (StringWidth( localString ));

}

/***************************************************************
```

```
 * newcwindow
 ***************************************************************/
CGrafPtr    newcwindow( wStorage, boundsRect, title, visible, procID, behind, goAway
        Ptr             wStorage;
        Rect        *boundsRect;
        char        *title;
        BooleanT    visible;
        Int16T          procID;
        WindowPtr   behind;
        BooleanT    goAwayFlag;
        Int32T      .   refCon;
{
        char  localString[256];

        strcpy( localString, title );
        CtoPstr( localString );
        return ((CGrafPtr) NewCWindow( wStorage, boundsRect, localString, visible, proc
refCon ));

}

/***************************************************************
 * ptinrect
 ***************************************************************/
BooleanT    ptinrect( pt, r )
        Point  *pt;
        Rect   *r;
{
        Point  localPoint;

        localPoint = *pt;
        return( PtInRect( localPoint, r ));
}

/***************************************************************
 * getvol
 ***************************************************************/
OSErr               getvol( volName, vRefNum )
        char   *volName;
    -   Int16PT        vRefNum;
{
        OSErr          err;
        char   localString[256];

        err = GetVol( localString, vRefNum );
        PtoCstr( localString );
        strcpy( volName, localString );

        return ( err );
}

/***************************************************************
 * setvol
 ***************************************************************/
OSErr               setvol( volName, vRefNum )
        char   *volName;
        Int16T         vRefNum;
{
        char   localString[256];

        strcpy( localString, volName );
        CtoPstr( localString );
        return ( SetVol( localString, vRefNum ));
}

/***************************************************************
 * flushvol
 ***************************************************************/
```

```
OSErr           flushvol( volName, vRefNum )
        char   *volName;
        Int16T        vRefNum;
{
        char   localString[256];

        strcpy( localString, volName );
        CtoPstr( localString );
        return ( FlushVol( localString, vRefNum ));
}

/**************************************************************
 * fsopen
 **************************************************************/
OSErr           fsopen( volName, vRefNum, refNum )
        char   *volName;
        Int16T        vRefNum;
        Int16PT       refNum;
{
        char   localString[256];

        strcpy( localString, volName );
        CtoPstr( localString );
        return ( FSOpen( localString, vRefNum, refNum ));
}

/**************************************************************
 * fsdelete
 **************************************************************/
OSErr           fsdelete( volName, vRefNum)
        char   *volName;
        Int16T        vRefNum;
{
        char   localString[256];

        strcpy( localString, volName );
        CtoPstr( localString );
        return ( FSDelete( localString, vRefNum));
}

/**************************************************************
 * create
 **************************************************************/
OSErr           create( fileName, vRefNum, creator, fileType )
        char   *fileName;
        Int16T        vRefNum;
        OSType        creator;
        OSType        fileType;
{
        char   localString[256];

        strcpy( localString, fileName );
        CtoPstr( localString );
        return ( Create( localString, vRefNum, creator, fileType  ));
}

/**************************************************************
 * sfputfile
 **************************************************************/
void        sfputfile( where, prompt, origName, dlgHook, reply )
        Point *where;
        char   *prompt;
        char   *origName;
        ProcPtr       dlgHook;
        SFReply *reply;
{
        Point localPoint;
        char   localPrompt[256];
```

```
	char	localOrigName[256];

	strcpy( localPrompt, prompt );
	strcpy( localOrigName, origName );
	CtoPstr( localPrompt );
	CtoPstr( localOrigName );

	localPoint = *where;
	SFPutFile( localPoint, localPrompt, localOrigName, dlgHook, reply );
}

/*****************************************************************
 * sfgetfile
 *****************************************************************/
void		sfgetfile( where, prompt, fileFilter, numTypes, typeList, dlgHook, reply )
	Point		*where;
	char		*prompt;
	ProcPtr			fileFilter;
	Int16T			numTypes;
	SFTypeList	typeList;
	ProcPtr			dlgHook;
	SFReply		*reply;
{
	Point	localPoint;
	char	localString[256];

	strcpy( localString, prompt );
	CtoPstr( localString );
	localPoint = *where;
	SFGetFile( localPoint, localString, fileFilter, numTypes, typeList, dlgHook, reply );
}

#endif
```

```
* File grfGraphics.c
*/

#include    "standard.h"
#include    "glue.h"
#include    "varFns.h"
#include    "tglMain.h"
#include    "scnScan.h"
#include    "libLibrary.h"
#include    "cmpCompress.h"

#define     EXTGEN
#include    "grfGraphics.h"

#ifdef      DEBUGLIBSUB
#define     D(x) x
#else
#define     D(x)
#endif

#define HACKED_NUMBER       1

/* constant determines speed of dissolves and fadeout */
#define DelayConstant           1L
#define SmearIncrement              1L


/**********************************************************************
*
 InitPics()
**********************************************************************
/

static CGrafPtr             pWorkPort;
static Ptr                  pWorkBits;
static PixMapHandle         hWorkMap;

void grfInitPics()
      {
      Rect   bigR;

      TGL_SETRECT( &bigR, 0, 0, 640, 480 );

      /* create an off-screen grafport */

      pWorkPort= (CGrafPtr) NewPtr( sizeof(CGrafPort));
      if( pWorkPort == NULL )
            TGL_FATAL_ERROR( "grf pWorkPort allocation failed" );

      OpenCPort( pWorkPort );
      hWorkMap= pWorkPort->portPixMap;

      pWorkBits= NewPtr( TGL_cSCREEN_BYTES );
      if( pWorkBits == NULL )
            TGL_FATAL_ERROR( "grf pWorkBits allocation failed" );

      (*hWorkMap)->baseAddr= pWorkBits;
      (*hWorkMap)->rowBytes= 0x8000 | 640;
      (*hWorkMap)->bounds= bigR;

      SetPort( (GrafPtr) pWorkPort );
      RGBForeColor( &tglRgbBlack );
      RGBBackColor( &tglRgbWhite );
      }
```

```
/* S N I P  T O  S C R E E N */
Int32T      grfSnipToScreen( hScreen, hSnip, pRect )
       Handle hScreen;
       Handle hSnip;
       Rect * pRect;
{
       libSQZPictPT       PicPtr;
       if( hSnip == NULL ) return FALSE;

       /* Lock down the snip data.  May be paranoid.  Depends on what Expand4 does.
       HLock( (Handle) hSnip );
       PicPtr = (libSQZPictPT) *hSnip;

       D( sprintf( szBuf, "%ld %ld (%ld,%ld,%ld,%ld) (%ld,%ld,%ld,%ld)", )
       D(     PicPtr->numBytes, PicPtr->rowBytes, )
       D(     PicPtr->bounds.top, PicPtr->bounds.left, PicPtr->bounds.bottom, PicPtr->bo
       D(     PicPtr->dst.top, PicPtr->dst.left, PicPtr->dst.bottom, PicPtr->dst.right )
       D(     ); )
       D( PutText( NULL, szBuf ); )

       HLock( (Handle) hScreen );
       cmpExpand4( PicPtr, (PixMap**) hScreen, pRect );
       HUnlock( (Handle) hScreen );

       D( PutText( NULL, " Expanded" );PutNL(1); )
       HUnlock( hSnip );
       return TRUE;
}


/* D R A W  D E S T  S R C */
void grfDrawDestSrc( hDestMap, pRect, hSrcMap, pAt )
       PixMapHandle hDestMap;
       Rect *pRect;
       PixMapHandle hSrcMap;
       Point * pAt;
       {
       Rect   t;

       if( pAt != NULL )
              {
              t.top =             pAt->v;
              t.left =       pAt->h;
              t.bottom =  t.top +  ( pRect->bottom - pRect->top );
              t.right =      t.left + ( pRect->right -  pRect->left );
              }
       else t = *pRect;

       CopyBits( (BitMap*) *hSrcMap, (BitMap*) *hDestMap,
                     pRect, &t,
                     srcCopy, (RgnHandle) NULL );
       return;
       }

#ifdef BOB
/*  ASM D R A W  D E S T  S R C */
void grfAsmDrawDestSrc( hDestMap, pRect, hSrcMap, pAt )
       PixMapHandle hDestMap;
       Rect *pRect;
       PixMapHandle hSrcMap;
       Point * pAt;
       {
       Rect   t;

       if( pAt != NULL )
              {
              t.top =             pAt->v;
```

```
        t.left =        pAt->h;
        t.bottom =  t.top +  ( pRect->bottom - pRect->top );
        t.right =       t.left + ( pRect->right -  pRect->left );
        }
    else t = *pRect;

/* CopyBits( (BitMap*) *hSrcMap, (BitMap*) *hDestMap,
            pRect, &t,
            srcCopy, (RgnHandle) NULL ); */
        asm {
            /* get the variables that we need into registers */
            move.l      pDst,a0                     ; A0 = pDest
            move.l      pDst,a0                     ; A0 = pDest
            clr.l   d1                          ; D1.L = (long) 0
            move.b      c,d1                    ; D1.B = (unsigned char) c
            clr.l   d2                          ; D2.L = (long) 0
            move.b      r,d2                    ; D2.L = r

            /* use different logic for short and long lengths */
            cmpi.b      #12,r
            bgt     @3

        @1  move.b      d1,(a0)+
            subq  #1,d2
            bgt         @1

            jmp         @end

            /********************/
            /* long word moves for long lengths */
            /********************/

            /* grab four copies of c into the register */
        @3  move.l      d1,d0
            lsl.l   #8,d0                       ; D0 << 8
            or.l    d1,d0                       ; D0 |= (unsigned char) c
            move.l      d0,d1
            swap  d0
            or.l    d0,d1

            /* fill bytes up to a full word boundry */
            move.l      a0,d0                       ; get our destination int
            andi  #3,d0                         ; find out the byte we're at (re

            /* the andi sets the Z flag if we're at the boundry, */
            /* just like the cmpi #4 will do below, so use the same test for both
            jmp         @preLongMoveTest

        @preLongMove
            move.b      d1,(a0)+
            subq  #1,d2                         ; decrement our length
            addq  #1,d0                         ; increment our counter
            cmpi  #4,d0                         ; see if we're at the word bour

        @preLongMoveTest
            bne         @preLongMove

            /* move a long word as long as it will fit */
        @4  move.l      d1,(a0)+
            subq  #4,d2
            cmpi  #4,d2
            bgt         @4

            /* when there're less than four bytes left to move, */
            /* compare to 0 (like the subq) will do, and go to the test */
            cmpi  #0,d2
            jmp @postLongMoveTest
```

BEST AVAILABLE COPY

```
            @postLongMove
                move.b      d1,(a0)+
                subq  #1,d2                         ; decrement our length

            @postLongMoveTest
                bgt         @postLongMove

            @end
                nop
                }
        return;
        }
#endif

/* A S M  D R A W  D E S T  S R C */
void    grfAsmDrawDestSrc(  hDestMap, pRect, hSrcMap, pAt )
        PixMapHandle hDestMap;
        Rect * pRect;
        PixMapHandle hSrcMap;
        Point * pAt;
{
        Int32UT                 top, bottom, left, right;
        Int32UT                 row;
        Int32UT                 dOffset, sOffset;
        register unsigned char  *pSrc, *pDst, *pSrcRowLim;
        register      Int32UT   wS;
        register unsigned char  c;
        Int32T                  sRowBytes, dRowBytes;
        unsigned char                   *pSrcA, *pDstA;

        top    = pRect->top;
        left   = pRect->left;
        bottom = pRect->bottom;
        right  = pRect->right;

        if( pAt == NULL )
                pAt= (Point *) pRect;           /* first half of r is the point we want */

        /* bounds of hPixMap vary */
        /* Set up for source */
        sRowBytes= ( 0x0FFF & ((*hSrcMap)->rowBytes));
        sOffset= (left - (*hSrcMap)->bounds.left)
                + ((top - (*hSrcMap)->bounds.top) * sRowBytes);
        pSrc= pSrcA= (unsigned char*) ((Int32T) sOffset + (Int32T) (*hSrcMap)->baseAddr);

        /* Set up for destination */
/*
note the implicit assumption that the bounds of the destination device are 0,0
This works on the physical PixMaps set up by tglMain; it may be inappropriate for other
*/
        dRowBytes= ( 0x0FFF & (*hDestMap)->rowBytes);
        dOffset= pAt->h + (pAt->v * dRowBytes);
        pDst= pDstA= (unsigned char*) ((Int32T) dOffset + (Int32T) (*hDestMap)->baseAd

                for( row= top; row < bottom; row++ )
                        {
                        pSrcRowLim= pSrc + (right - left);

                        asm {
                                /*  get the variables that we need into registers  */
                                move.l      pSrc,a0                     ; A0 = pSrc
                                move.l      pDst,a1.                    ; A0 = pDst
                                clr.l   d0                          ; D1 = (long) 0
                                move.l      pSrcRowLim,d0               ; D0 = pSrcRowLim
                                sub.l  a0,d0                        ; D0 -= pSrc

                                ; move a byte until we're done or we're at a long word bound
                        @1      move.b      (a0)+,(a1)+
```

```
            ; end of line test
            subq.l      #1,d0
            beq         @done

            ; see if we're at a long word boundry for the write
            move.l      a1,d1
            andi.l      #0xfffffffc,d1
            bgt         @1

            ; move a long word until we're done or we have fewer than 4
        @2  move.l      (a0)+,(a1)+
            ; end of line test
            subq.l      #4,d0
            beq         @done
            cmpi.l      #4,d0
            bgt         @2

            ; move a byte until we're done
        @3  move.b      (a0)+,(a1)+
            ; end of line test
            subq.l      #1,d0
            bgt         @3

        @done
            }

        pDst= pDstA += dRowBytes;
        pSrc= pSrcA += sRowBytes;
        }
    return;
}

/* M DRAW DEST SRC */
void grfMDrawDestSrc( hDestMap, pRect, hSrcMap, pAt , tColorIndex )
    PixMapHandle hDestMap;
    Rect * pRect;
    PixMapHandle hSrcMap;
    Point * pAt;
    Int32T tColorIndex;
{
    Int32UT                 top, bottom, left, right;
    Int32UT                 row;
    Int32UT                 dOffset, sOffset;
    register unsigned char  *pSrc, *pDst, *pSrcRowLim;
    register     Int32UT    wS;
    register unsigned char  c;
    Int32T                  sRowBytes, dRowBytes;
    unsigned char                   *pSrcA, *pDstA;

    top    = pRect->top;
    left   = pRect->left;
    bottom = pRect->bottom;
    right  = pRect->right;

    if( pAt == NULL )
        pAt= (Point *) pRect;           /* first half of r is the point we want */

    /* bounds of hPixMap vary */
    /* Set up for source */
    sRowBytes= ( 0x0FFF & ((*hSrcMap)->rowBytes));
    sOffset= (left - (*hSrcMap)->bounds.left)
          + ((top - (*hSrcMap)->bounds.top) * sRowBytes);
    pSrc= pSrcA= (unsigned char*) ((Int32T) sOffset + (Int32T) (*hSrcMap)->baseAddr);

    /* Set up for destination */
/*
note the implicit assumption that the bounds of the destination device are 0,0
This works on the physical PixMaps set up by tglMain; it may be inappropriate for other
```

```
*/
        dRowBytes= ( 0x0FFF & (*hDestMap)->rowBytes);
        dOffset= pAt->h + (pAt->v * dRowBytes);
        pDst= pDstA= (unsigned char*) ((Int32T) dOffset + (Int32T) (*hDestMap)->baseA

        if( TRUE || /* opt. disabled */ tColorIndex )          /* non white tranparent color
                {

                for( row= top; row < bottom; row++ )
                        {
                        pSrcRowLim= pSrc + (right - left);

#ifndef NO_ASM
                        asm {

                                /*  get the variables that we need into registers  */
                                move.l      pSrc,a0                         ; A0 = pSrc
                                move.l      pDst,a1                         ; A0 = pDst
                                clr.l    d0                               ; D1 = (long) 0
                                move.l      pSrcRowLim,d0                 ; D0 = pSrcRowLim
                                sub.l  a0,d0                              ; D0 -= pSrc

                                ; zero (transparent color) test
                        @1      cmpi.b      #0,(a0)
                                beq         @2

                                ; move the byte
                                move.b      (a0)+,(a1)+
                                ; end of line test
                                subq  #1,d0
                                bgt         @1
                                jmp         @3

                                ; don't move the byte
                        @2      adda  #1,a0
                                adda  #1,a1
                                ; end of line test
                                subq  #1,d0
                                bgt         @1

                        @3      nop
                                }
#else
                        while ( pSrc < pSrcRowLim )
                                {
                                c= *(pSrc++);                   /* do 'em one at a time */
                                if (c!= tColorIndex) *(pDst)= c;
                                pDst++;
                                }
#endif

                        pDst= pDstA += dRowBytes;
                        pSrc= pSrcA += sRowBytes;
                        }
                }
        else    /* white -- special case */
                {

                /* the idea here is to take advantage of whole word moves when possible *

                for( row= top; row < bottom; row++ )
                        {
                        pSrcRowLim= pSrc + (right - left);

                        while ( pSrc < pSrcRowLim )
                                {
                                if( !(0x00000007 & (         Int32UT) pSrc) && pSrcRowLim - pSrc
check word alignment, too */
```

BEST AVAILABLE COPY

```
                {
                wS= *( (      Int32UT *) pSrc);
                if( wS )      /* any non-transparent ? */
                        {
                        if( wS & 0xff000000 && wS & 0x000000ff && w
0x00ff0000)
                                {
                                *( (    Int32UT *) pDst)= wS;
                                pDst += 4;
                                pSrc += 4;
                                }
                        else
                                {
                                c= *(pSrc++);                      /* do 'em
                                if (c) *(pDst++)= c;
                                c= *(pSrc++);
                                if (c) *(pDst++)= c;
                                c= *(pSrc++);
                                if (c) *(pDst++)= c;
                                c= *(pSrc++);
                                if (c) *(pDst++)= c;
                                }
                        }
                else   /* all transparent */
                        {
                        pDst+= 4;
                        pSrc+= 4;
                        }
                }
        else
                {
                c= *(pSrc++);                      /* do 'em one at a time
                if (c) *(pDst++)= c;
                }

        }
    pDst= pDstA += dRowBytes;
    pSrc= pSrcA += sRowBytes;
    }
  }
  return;
}

/*************************************************************************
*
        DrawPic()
        Receives handle to snip data - Magic cookie.
        Needs to be able to determine pointer to location of start of snip header
*************************************************************************
/
void grfDrawPic( hSnip, pAt)
        Handle hSnip;
        Point *pAt;
{
        Rect   r;
        Rect   bounds;
        Int16T        rowBytes;

        D( PutNL( 1 ); PutText( NULL, "DrawPic" ); )

        /* these variables are clobbered by Expand, need to be restored */
        bounds= (*hWorkMap)->bounds;
        rowBytes= (*hWorkMap)->rowBytes;

        if( ! grfSnipToScreen( (Handle) hWorkMap, (Handle) hSnip, &r ) )
                return;
```

BEST AVAILABLE COPY

```
	SetPort( (GrafPtr) tglMyCWindow );

	grfDrawDestSrc( /* tglHCurPixMap */ (tglMyCWindow->portPixMap), &r, hWo

	(*hWorkMap)->bounds= bounds;
	(*hWorkMap)->rowBytes= rowBytes;

	return;
}

/*********************************************************************
*
	MDrawPic() draw only non-transparent pixels
	Figure out index of transparent color from snip header (not in practice!)
**********************************************************************
/
void grfMDrawPic( hSnip, pAt, tColorIndex)
	Handle hSnip;
	Point *pAt;
	Int32T tColorIndex;
{
	Rect		r;
	Rect		bounds;
	Int16T			rowBytes;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	if( ! grfSnipToScreen( (Handle) hWorkMap, (Handle) hSnip, &r ) )
		return;

	grfMDrawDestSrc( tglHCurPixMap , &r, hWorkMap, pAt, tColorIndex );

	/* restore saved values */
	(*hWorkMap)->bounds= bounds;
	(*hWorkMap)->rowBytes= rowBytes;

	return;
}

/* Added JDT */
void grfMDrawPicPortion( hSnip, pAt, tColorIndex, rpart)
	Handle hSnip;
	Point *pAt;
	Int32T tColorIndex;
	Rect rpart;
{
	Rect		r;
	Rect		bounds;
	Int16T			rowBytes;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	if( ! grfSnipToScreen( (Handle) hWorkMap, (Handle) hSnip, &r ) )
		return;

	grfMDrawDestSrc( tglHCurPixMap , &rpart, hWorkMap, pAt, tColorIndex );

	/* restore saved values */
	(*hWorkMap)->bounds= bounds;
	(*hWorkMap)->rowBytes= rowBytes;
```

BEST AVAILABLE COPY

```
        return;
}

/* patterns for DissolvePic function */

Pattern         Mask12= { 0x80, 0x02, 0x40, 0x01, 0x08, 0x20, 0x04, 0x10 };
Pattern         Fast12= {  0,  14,   1,  15,  4,  10,  5,  11 };
Pattern         Fast12a= {  8,   6,   9,   7, 12,   2, 13,   3 };

Pattern         Mask25= { 0x08, 0x20, 0x04, 0x10, 0x80, 0x02, 0x40, 0x01 };
Pattern         Fast25= {  12,   2,  13,   3,   8,   6,   9,   7 };
Pattern         Fast25a= {  4,  10,   5,  11,   0,  14,   1,  15 };

Pattern         Mask37= { 0x20, 0x01, 0x80, 0x04, 0x02, 0x10, 0x08, 0x40 };
Pattern         Fast37= {  2,  15,   0,  13,   6,  11,   4,   9 };
Pattern         Fast37a= {  10,   7,   8,   5,  14,   3,  12,   1 };

Pattern         Mask50= { 0x02, 0x10, 0x08, 0x40, 0x20, 0x01, 0x80, 0x04 };
Pattern         Fast50= {  14,   3,  12,   1,  10,   7,   8,   5 };
Pattern         Fast50a= {  6,  11,   4,   9,   2,  15,   0,  13 };

Pattern         Mask62= { 0x40, 0x08, 0x10, 0x02, 0x04, 0x80, 0x01, 0x20 };
Pattern         Fast62= {  1,  12,   3,  14,   5,   8,   7,  10 };
Pattern         Fast62a= {  9,   4,  11,   6,  13,   0,  15,   2 };

Pattern         Mask75= { 0x04, 0x80, 0x01, 0x20, 0x40, 0x08, 0x10, 0x02 };
Pattern         Fast75= {  13,   0,  15,   2,   9,   4,  11,   6 };
Pattern         Fast75a= {  5,   8,   7,  10,   1,  12,   3,  14 };

Pattern         Mask87= { 0x10, 0x04, 0x20, 0x08, 0x01, 0x40, 0x02, 0x80 };
Pattern         Fast87= {  3,  13,   2,  12,   7,   9,   6,   8 };
Pattern     Fast87a= {  11,   5,  10,   4,  15,   1,  14,   0 };

Pattern         Mask100= { 0x01, 0x40, 0x02, 0x80, 0x10, 0x04, 0x20, 0x08 };
Pattern         Fast100= {  15,   1,  14,   0,  11,   5,  10,   4 };
Pattern    Fast100a={  7,   9,   6,   8,   3,  13,   2,  12 };

Pattern         *FastList16[]={     &Fast12, &Fast12a, &Fast25, &Fast25a, &Fast37, &
&Fast50a,
                                       &Fast62, &Fast62a, &Fast75, &Fast75a, &Fas
&Fast100a };


/* D I S S O L V E   D E S T   S R C */
void    grfDissolveDestSrc( hDestMap, pRect, hSrcMap, pAt, tColorIndex )
        PixMapHandle hDestMap;
        Rect * pRect;
        PixMapHandle hSrcMap;
        Point * pAt;
        Int32T tColorIndex;
{
        register        Int32T              xDelay;
        register unsigned char      *pSrc, *pDst, *pSrcRowLim;

        Int32T          PatIndex;

        register Int32T         CalcDelay;
        Int16T          density;
        register Int32UT                row;
        Int32UT             top, bottom, left, right;
        register Int32UT                offset;
        register Int32UT                FirstPixel;
        unsigned char           *pPat;
        unsigned char           c
```

```
top    = pRect->top;
left   = pRect->left;
bottom = pRect->bottom;
right  = pRect->right;

if( pAt == NULL )
        pAt= (Point *) pRect;           /* first half of r is the point we want */

/* calculate area-constant delay **** BUG *** convert below to 32 bit arithmetic!!!*
CalcDelay = ( 640L * 200L /* 480 */ * DelayConstant ) / (Int32T) ( (right-left) * (bottor
if( CalcDelay <= 0 )
        CalcDelay= 1;


for( density= 0; density < 16; density++ )
{

        pPat= *FastList16[ density ];

        PatIndex=0;

        for( row= top; row < bottom; row++ )
        {
                /* bounds of hPixMap vary */
                /* set up for source */
                offset= (left - (*hSrcMap)->bounds.left) +
                                ( (row - (*hSrcMap)->bounds.top)
                                  * ( 0x0FFF & (*hSrcMap)->rowBytes) );

                pSrc = (unsigned char*) ((Int32UT) offset + (Int32UT) (*hSrcMap)->baseAc
                pSrcRowLim = pSrc + (right - left);

                /* set up for destination */
/*
note the implicit assumption that the bounds of the destination device are 0,0
This works on the physical PixMaps set up by tglMain; it may be inappropriate for other de
*/
                offset = pAt->h + (row - top + pAt->v) * ( 0x0FFFL & (*hDestMap)->rowE

                pDst = (unsigned char*) ((Int32T) offset + (Int32T) (*hDestMap)->baseAdc

                FirstPixel = pPat[ PatIndex ];
                PatIndex = (PatIndex + 1) & 7;
                pSrc += FirstPixel;
                pDst += FirstPixel;

                while ( pSrc < pSrcRowLim )
                        {
                        xDelay = CalcDelay;
                        while( xDelay-- )
                                {
                                c= *(pSrc);
                                if( c != tColorIndex)
                                        *(pDst) = c;          /* don't overwrite with transparent
                                }
                        pDst+= 16;
                        pSrc+= 16;

                        }
        }       /* end for row */
        } /* end for density */
        return;
}

/****************************************************************************
*
        DissolvePic()

grfGraphics.c
```

```
*****************************************************************
/

void grfDissolvePic( hSnip, pAt, tColorIndex )
	Handle hSnip;
	Point *pAt;
	Int32T tColorIndex;
{
	Rect		r;
	Rect		bounds;
	Int16T			rowBytes;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	If( ! grfSnipToScreen( (Handle) hWorkMap, (Handle) hSnip, &r ) )
		return;

	grfDissolveDestSrc( tglHCurPixMap , &r, hWorkMap, pAt, tColorIndex );

	/* restore saved values */
	(*hWorkMap)->bounds= bounds;
	(*hWorkMap)->rowBytes= rowBytes;

	return;
}

/* F A D E O U T  D E S T  S R C */
void	grfFadeoutDestSrc( hDestMap, pRect, hSrcMap, pAt, tColorIndex, fast )
	PixMapHandle hDestMap;
	Rect * pRect;
	PixMapHandle hSrcMap;
	Point * pAt;
	Int32T tColorIndex;
	BooleanT fast;
{
	Int32T			PatIndex;
	Int32T			CalcDelay;
	register Int32T			xDelay;
	Int16T			density;
	Int32UT		row;
	Int32UT		top, bottom, left, right;
	Int32UT		offset;
	register unsigned char	*pSrc, *pDst, *pSrcRowLim;
			unsigned char	c;
	Int32UT		FirstPixel;
			unsigned char	*pPat;

	SetPort( (GrafPtr) tglMyCWindow );

	top    = pRect->top;
	left   = pRect->left;
	bottom = pRect->bottom;
	right  = pRect->right;

	If( pAt == NULL )
		pAt = (Point *) pRect;		/* first half of r is the point we want */

	CalcDelay= ( 640L * 50L /* 480 */ * DelayConstant ) / (Int32T)( (right-left) * (bottom
	If( !CalcDelay )
		CalcDelay = 1;

	for( density= 0; density < 16; density++ )
	{
		pPat= *FastList16[ density ];
```

```
PatIndex=0;

for( row= top; row < bottom; row++ )
{
	/* bounds of hPixMap vary */
	/* set up for source */
	offset = (left - (*hSrcMap)->bounds.left) +
			( (row - (*hSrcMap)->bounds.top)
			 * ( 0x0FFF & (*hSrcMap)->rowBytes));

	pSrc= (unsigned char*) ((Int32T) offset + (Int32T) (*hSrcMap)->baseA
	pSrcRowLim= pSrc + (right - left);

	/* set up for destination */
	offset = pAt->h + ( (row - top + pAt->v) * ( 0x0FFF & (*hDestMap)->

	pDst = (unsigned char*) ((Int32T) offset + (Int32T) (*hDestMap)->bas

	FirstPixel = pPat[ PatIndex ];
	PatIndex = (PatIndex + 1) & 7;
	pSrc += FirstPixel;
	pDst += FirstPixel;

	if ( fast )
		{
		asm {
			/*  get the variables we need into registers  */
			move.l		pSrc,a0
			move.l		pDst,a1
			move.l		pSrcRowLim,d0
			sub.l	a0,d0
			clr.l	d1

		@getPixel
			move.b		(a0),d1
			cmpi.b		#0,d1
			beq		@dontMove

			move.b		#0,(a1)

		@dontMove
			addi.l		#16,a0
			addi.l		#16,a1

			subi.l #16,d0
			bgt		@getPixel
			}
		}
	else
		{
		while ( pSrc < pSrcRowLim )
			{
			xDelay= CalcDelay;
			while( xDelay-- )
				{
				c = *(pSrc);
				if( c!=tColorIndex )
					*(pDst) = 0;		/* fade only non-white sc
				}

			pDst+= 16;
			pSrc+= 16;
			}
		}
	}	/* end for row */
} /* end for density */
return;
}
```

grfGraphics.c

```
/***********************************************************************
**
	Fadeout
***********************************************************************
* */
void grfFadeout( hSnip, pAt, tColorIndex)
	Handle hSnip;
	Point *pAt;
	Int32T tColorIndex;
{
	Rect		r;
	Rect		bounds;
	Int16T			rowBytes;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	if( ! grfSnipToScreen( (Handle) hWorkMap, (Handle) hSnip, &r ) )
		return;

	grfFadeoutDestSrc( tglHCurPixMap, &r, hWorkMap, pAt, tColorIndex, FALSE );

	/* restore saved values */
	(*hWorkMap)->bounds= bounds;
	(*hWorkMap)->rowBytes= rowBytes;
	return;
}

/***********************************************************************
**
	fastFadeout
***********************************************************************
* */
void grfFastFadeout( hSnip, pAt, tColorIndex)
	Handle hSnip;
	Point *pAt;
	Int32T tColorIndex;
{
	Rect		r;
	Rect		bounds;
	Int16T			rowBytes;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	if( ! grfSnipToScreen( (Handle) hWorkMap, (Handle) hSnip, &r ) )
		return;

	grfFadeoutDestSrc( tglHCurPixMap, &r, hWorkMap, pAt, tColorIndex, TRUE );

	/* restore saved values */
	(*hWorkMap)->bounds= bounds;
	(*hWorkMap)->rowBytes= rowBytes;
	return;
}

/***********************************************************************
*
	MyCopyBits()		draws only non-white pixels; this should be replaced by the Drav
```

BEST AVAILABLE COPY

```
                                once I figure out whether multi-screen stuff can be dor
*************************************************************************
/
void grfMyCopyBits( hSourceMap, hDestMap, pSrcRect, pDestRect)
	PixMapHandle hSourceMap;
	PixMapHandle hDestMap;
	Rect *pSrcRect;
	Rect *pDestRect;
{
	Int32UT			row;
	Int32UT			top, bottom, left, right;
	Int32UT			dOffset, sOffset;
	register	unsigned	char	*pSrc, *pDst, *pSrcRowLim;
	register	unsigned	char	c
	Int32T			sRowBytes, dRowBytes;
	unsigned	char		*pSrcA, *pDstA;

	top= pSrcRect->top;
	left= pSrcRect->left;
	bottom= pSrcRect->bottom;
	right= pSrcRect->right;

	/* bounds of hPixMap vary */
	sRowBytes= ( 0x0FFF & (*hSourceMap)->rowBytes);
	sOffset= (left - (*hSourceMap)->bounds.left) + ((top - (*hSourceMap)->bounds.tc
	pSrc= pSrcA= (unsigned char *) ((Int32T) sOffset + (Int32T) (*hSourceMap)->base

	dRowBytes= ( 0x0FFF & (*hDestMap)->rowBytes);
	dOffset= ( pDestRect->left ) + (pDestRect->top * dRowBytes);
	pDst= pDstA= (unsigned char *) ((Int32T) dOffset + (Int32T) (*hDestMap)->baseA

		for( row= top; row < bottom; row++ )
			{

			pSrcRowLim= pSrc + (right - left);

			while ( pSrc < pSrcRowLim )
				{
				c= *(pSrc++);
				if (c) *(pDst)= c;		/* don't overwrite with white (zero)
				pDst++;
				}

			pDst= pDstA += dRowBytes;
			pSrc= pSrcA += sRowBytes;
			}	/* end for row */
}

/*************************************************************************
*
	Smear()	draw the whole snip over and over, from here to there, thereby "sm
*************************************************************************
/
void grfSmear( hSnip, hFullSnip, here, there )
	Handle hSnip;
	Handle hFullSnip;
	Int32T here;
	Int32T there;
{
	Rect	r,t;
	Rect	bounds;
	Int16T		rowBytes;
	Int32T			size;
	Int16T hereBottom, thereBottom;
	PixMapHandle	hScreenMap;

	if( hSnip == NULL || hFullSnip == NULL ) return;
```

```
	SetPort( (GrafPtr) tglMyCWindow );
	hScreenMap= tglHCurPixMap;

	/* these variables are clobbered by Expand, need to be restored */
	bounds= (*hWorkMap)->bounds;
	rowBytes= (*hWorkMap)->rowBytes;

	if( !grfSnipToScreen( (Handle) hWorkMap, (Handle) hSnip, &r ))
		return;

	libGetPicRect( (Handle) hFullSnip, &t );
	size= (t.bottom - t.top) - (r.bottom - r.top);

	hereBottom= t.bottom - (Int16T) ( size * here ) / 100;
	thereBottom= t.bottom - (Int16T) ( size * there ) / 100;

	if( hereBottom < thereBottom )
	 {
	 for( t.bottom= hereBottom; t.bottom + SmearIncrement <= thereBottom ; t.bot
		{
		t.top= t.bottom - (r.bottom - r.top);
		grfMyCopyBits( hWorkMap, hScreenMap, &r, &t ); /*  handle masked bits
		}
	 }
	else
	 {
	 for( t.bottom= hereBottom; t.bottom - SmearIncrement >= thereBottom ; t.bott
		{
		t.top= t.bottom - (r.bottom - r.top);
		grfMyCopyBits( hWorkMap, hScreenMap, &r, &t ); /*  handle masked bits
		}
	 }


	(*hWorkMap)->bounds= bounds;
	(*hWorkMap)->rowBytes= rowBytes;
}

/*************************************************************************
WipeDnDestSrc()
*************************************************************************
void	grfWipeDnDestSrc( hDestMap, pRect, hSrcMap, pTarget, percent )
	PixMapHandle hDestMap;
	Rect * pRect;
	PixMapHandle hSrcMap;
	Point * pTarget;
	Int32T percent;
{
	Int32UT				row;
	Int32UT				top, bottom, left, right;
	Int32UT				numRows;
	Int32UT				dOffset, sOffset;
	register	unsigned	char	*pSrc, *pDst, *pSrcRowLim;
	register	unsigned	char		c
	Int32T				sRowBytes, dRowBytes;
	unsigned	char		*pSrcA, *pDstA;

	Int32T		xDelay;

	top= pRect->top;
	left= pRect->left;
	bottom= pRect->bottom;
	right= pRect->right;

	if( pTarget == NULL ) pTarget= (Point *) pRect;		/* first half of r is the poi

	/* bounds of hPixMap vary */
```

```
	sRowBytes= ( 0x0FFF & (*hSrcMap)->rowBytes);
	sOffset= (left - (*hSrcMap)->bounds.left) +
		((top - (*hSrcMap)->bounds.top) * sRowBytes);

	pSrc= pSrcA= (unsigned char*) ((Int32T) sOffset + (Int32T) (*hSrcMap)->baseAddr,

	dRowBytes= ( 0x0FFF & (*hDestMap)->rowBytes);
	dOffset= ( pTarget->h ) + (pTarget->v * dRowBytes);
	pDst= pDstA= (unsigned char*) ((Int32T) dOffset + (Int32T) (*hDestMap)->baseAc

	numRows= (( bottom - top ) * percent ) / 100;

	for( row= top; row < top + numRows; row++ )
		{

		pSrcRowLim= pSrc + (right - left);

		while ( pSrc < pSrcRowLim )
			{
			c= *(pSrc);
			if (c) *(pDst)= c;		/* don't overwrite with white (zero) pixels *

			pDst++;
			pSrc++;
			}

		xDelay= grfGetWipeDelay();
		while( xDelay-- )
			{
			c= *(pSrc + xDelay);	/* I hope this isn't optimized away */
			}

		pDst= pDstA += dRowBytes;
		pSrc= pSrcA += sRowBytes;
		}	/* end for row */

}	/* WipeDnDestSrc */

/*************************************************************************
WipeUpDestSrc()
*************************************************************************
void	grfWipeUpDestSrc( hDestMap, pRect, hSrcMap, pTarget, percent )
	PixMapHandle hDestMap;
	Rect * pRect;
	PixMapHandle hSrcMap;
	Point * pTarget;
	Int32T percent;
{
	Int32UT			row;
	Int32UT			top, bottom, left, right;
	Int32UT			numRows;
	Int32UT			dOffset, sOffset;
	register	unsigned	char	*pSrc, *pDst, *pSrcRowLim;
	register	unsigned	char	c
	Int32T			sRowBytes, dRowBytes;
	unsigned	char		*pSrcA, *pDstA;

	Int32T			xDelay;

	top= pRect->top;
	left= pRect->left;
	bottom= pRect->bottom;
	right= pRect->right;

	if( pTarget == NULL ) pTarget= (Point *) pRect;		/* first half of r is the poir

	/* if percent < 100, select topmost portion of snip to draw */
```

```
numRows= ((bottom - top) * percent) / 100 ;

/* bounds of hPixMap vary */
sRowBytes= ( 0x0FFF & (*hSrcMap)->rowBytes);
sOffset= (left - (*hSrcMap)->bounds.left) + ((top - (*hSrcMap)->bounds.top) * sR
pSrc= pSrcA= (unsigned char*) ((Int32T) sOffset + (Int32T) (*hSrcMap)->baseAddr
pSrc= pSrcA += (numRows - 1) * sRowBytes;                        /* start at l

dRowBytes= ( 0x0FFF & (*hDestMap)->rowBytes);
dOffset= ( pTarget->h ) + (pTarget->v * dRowBytes);
pDst= pDstA= (unsigned char*) ((Int32T) dOffset + (Int32T) (*hDestMap)->baseAc
pDst= pDstA += (bottom - top - 1) * dRowBytes;                   /* start at t

for( row= top + numRows; row > top; row-- )
        {

        pSrcRowLim= pSrc + (right - left);

        while ( pSrc < pSrcRowLim )
                {
                c= *(pSrc);
                if (c) *(pDst)= c;          /* don't overwrite with white (zero) pixels *

                pDst++;
                pSrc++;
                }


        xDelay= grfGetWipeDelay();
        while( xDelay-- )
                {
                c= *(pSrc + xDelay);
                }

        pDst= pDstA -= dRowBytes;
        pSrc= pSrcA -= sRowBytes;
        }       /* end for row */

}

/*************************************************************************
WipeLeftDestSrc()
*************************************************************************
void    grfWipeLeftDestSrc( hDestMap, pRect, hSrcMap, pTarget, percent )
        PixMapHandle hDestMap;
        Rect * pRect;
        PixMapHandle hSrcMap;
        Point * pTarget;
        Int32T percent;
{
        Int32UT                         row, col;
        Int32UT                         top, bottom, left, right;
        Int32UT                         numRows;
        Int32UT                         dOffset, sOffset;
        register        unsigned        char   *pSrc, *pDst;
        register        unsigned        char          c
        Int32T                          sRowBytes, dRowBytes;
        unsigned        char            *pSrcA, *pDstA;
        Int32T                  xDelay;

        top= pRect->top;
        left= pRect->left;
        bottom= pRect->bottom;
        right= pRect->right;

        if( pTarget == NULL ) pTarget= (Point *) pRect;          /* first half of r is the poir

        /* bounds of hPixMap vary */
```

BEST AVAILABLE COPY

```
sRowBytes= ( 0x0FFF & (*hSrcMap)->rowBytes);
sOffset= (left - (*hSrcMap)->bounds.left) + ((top - (*hSrcMap)->bounds.top) * sR
pSrc= pSrcA= (unsigned char*) (sOffset + (*hSrcMap)->baseAddr);

dRowBytes= ( 0x0FFF & (*hDestMap)->rowBytes);
dOffset= ( pTarget->h ) + (pTarget->v * dRowBytes);
pDst= pDstA= (unsigned char*) ((Int32T) dOffset + (Int32T) (*hDestMap)->baseA

numRows= (( bottom - top ) * percent ) / 100;

/* start at end of line */

pSrc= pSrcA += (right - left);
pDst= pDstA += (right - left);

for( col= right; col > left; col-- )
        {

        for( row= top; row < bottom; row++ )
                {
                c= *(pSrc);
                if (c) *(pDst)= c;              /* don't overwrite with white (zero) pixels

                pDst += dRowBytes;
                pSrc += sRowBytes;
                }

        xDelay= grfGetWipeDelay();
        while( xDelay-- )
                {
                c= *(pSrc + xDelay );
                }


        pSrc= pSrcA --;
        pDst= pDstA --;
        }

}

/***********************************************************************
WipeRightDestSrc()
************************************************************************
void    grfWipeRightDestSrc( hDestMap, pRect, hSrcMap, pTarget, percent )
        PixMapHandle hDestMap;
        Rect * pRect;
        PixMapHandle hSrcMap;
        Point * pTarget;
        Int32T percent;
{
        Int32UT                         row, col;
        Int32UT                         top, bottom, left, right;
        Int32UT                         numCols;
        Int32UT                         dOffset, sOffset;
        register    unsigned    char  *pSrc, *pDst;
        register    unsigned    char     c
        Int32T                          sRowBytes, dRowBytes;
        unsigned    char                *pSrcA, *pDstA;
        Int32T              xDelay;

        top= pRect->top;
        left= pRect->left;
        bottom= pRect->bottom;
        right= pRect->right;

        if( pTarget == NULL ) pTarget = (Point *) pRect;          /* first half of r is the point
```

BEST AVAILABLE COPY

```
        /* bounds of hPixMap vary */
        sRowBytes= ( 0x0FFF & (*hSrcMap)->rowBytes);
        sOffset= (left - (*hSrcMap)->bounds.left) + ((top - (*hSrcMap)->bounds.top) * sR
        pSrc= pSrcA= (unsigned char*) ((Int32T) sOffset + (Int32T) (*hSrcMap)->baseAddr

        dRowBytes= ( 0x0FFF & (*hDestMap)->rowBytes);
        dOffset= ( pTarget->h ) + (pTarget->v * dRowBytes);
        pDst= pDstA= (unsigned char*) ((Int32T) dOffset + (Int32T) (*hDestMap)->baseA

        numCols= (( bottom - top ) * percent ) / 100;


        for( col= left; col < right; col++ )
                {

                for( row= top; row < bottom; row++ )
                        {
                        c= *(pSrc);
                        if (c) *(pDst)= c;              /* don't overwrite with white (zero) pixels

                        pDst += dRowBytes;
                        pSrc += sRowBytes;
                        }

                xDelay= grfGetWipeDelay();
                while( xDelay-- )
                        {
                        c= *(pSrc + xDelay);
                        }

                pSrc= pSrcA ++;
                pDst= pDstA ++;
                }

}

/*************************************************************************
*
        WipeDnPic()        draw slowly, from top down
**************************************************************************
/
void grfWipeDnPic( hSnip, target, percent )
        Handle hSnip;
        Point *target;
        Int32T percent;
{
        Rect            r;
        Rect            bounds;
        Int16T                  rowBytes;

        if( hSnip == NULL ) return;

        SetPort( (GrafPtr) tglMyCWindow );

        /* these variables are clobbered by Expand, need to be restored */
        bounds= (*hWorkMap)->bounds;
        rowBytes= (*hWorkMap)->rowBytes;

        /* decompress new image onto offscreen PixMap */

        if( !grfSnipToScreen( (Handle) hWorkMap, (Handle) hSnip, &r ))
                return;

        grfWipeDnDestSrc( tglHCurPixMap, &r, hWorkMap, target, percent );

        /* restore saved values */
        (*hWorkMap)->bounds= bounds;
```

BEST AVAILABLE COPY

```
        (*hWorkMap)->rowBytes= rowBytes;
}

/************************************************************************
*
        grfWipeUpPic()  draw slowly, from bottom up
*************************************************************************
/
void grfWipeUpPic( hSnip, target, percent)
        Handle hSnip;
        Point *target;
        Int32T percent;
{
        Rect            r;
        Rect            bounds;
        Int16T                  rowBytes;

        if( hSnip == NULL ) return;

        SetPort( (GrafPtr) tglMyCWindow );

        /* these variables are clobbered by Expand, need to be restored */
        bounds= (*hWorkMap)->bounds;
        rowBytes= (*hWorkMap)->rowBytes;

        /* decompress new image onto offscreen PixMap */
        if( !grfSnipToScreen( (Handle) hWorkMap, (Handle) hSnip, &r ))
                return;

        grfWipeUpDestSrc( tglHCurPixMap, &r, hWorkMap, target, percent );

        /* restore saved values */
        (*hWorkMap)->bounds= bounds;
        (*hWorkMap)->rowBytes= rowBytes;
}

/************************************************************************
*
        WipeRightPic()      draw slowly, from left to right
                (N.B. percent not implemented)
*************************************************************************
/
void grfWipeRightPic( hSnip, target, percent)
        Handle hSnip;
        Point *target;
        Int32T percent;
{
        Rect            r;
        Rect            bounds;
        Int16T                  rowBytes;

        if( hSnip == NULL ) return;

        SetPort( (GrafPtr) tglMyCWindow );

        /* these variables are clobbered by Expand, need to be restored */
        bounds= (*hWorkMap)->bounds;
        rowBytes= (*hWorkMap)->rowBytes;

        /* decompress new image onto offscreen PixMap */
        if( !grfSnipToScreen( (Handle) hWorkMap, (Handle) hSnip, &r ))
                return;

        grfWipeRightDestSrc( tglHCurPixMap, &r, hWorkMap, target, percent );

        /* restore saved values */
        (*hWorkMap)->bounds= bounds;
```

BEST AVAILABLE COPY

```
	(*hWorkMap)->rowBytes= rowBytes;
}

/*******************************************************************
*
	grfWipeLeftPic()	draw slowly, from right to left
		(N.B. percent not implemented)
********************************************************************
/
void grfWipeLeftPic( hSnip, target, percent)
	Handle hSnip;
	Point *target;
	Int32T percent;
{
	Rect		r;
	Rect		bounds;
	Int16T		rowBytes;

	if( hSnip == NULL ) return;

	SetPort( (GrafPtr) tglMyCWindow );

	/* these variables are clobbered by Expand, need to be restored */
	bounds= (*hWorkMap)->bounds;
	rowBytes= (*hWorkMap)->rowBytes;

	/* decompress new image onto offscreen PixMap */
	if( !grfSnipToScreen( (Handle) hWorkMap, (Handle) hSnip, &r ))
		return;

	grfWipeLeftDestSrc( tglHCurPixMap, &r, hWorkMap, target, percent );

	/* restore saved values */
	(*hWorkMap)->bounds= bounds;
	(*hWorkMap)->rowBytes= rowBytes;
}


/*************************************************************************
 GetWipeDelay() -- called by grfsub.c wipe functions
(this clearing business doesn't work on two screen system)
**************************************************************************
/

#define		WIPEDELAY 5000;

Int32T		grfGetWipeDelay()
{
	Int32T rc, delay;

	/* wipedelay may be specified in shared variable */
	rc= sscanf( varPtr( vWipeDelay ) , "%ld", &delay );
	if( rc == 1 )
		{
		/* *(varPtr( vWipeDelay ) ) = '/0'; */	/* clear after use */
		}
	else
		delay= WIPEDELAY;

	return( delay );
}

/**************************************************************************
 Interchange Color translation function
***************************************************************************
/
```

```
void    grfInterchange( oldSlot, newSlot, pRect)
Int32T oldSlot;
Int32T newSlot;
Rect * pRect;
{
        Int32UT                             row;
        Int32UT                             sOffset;
        Int32T                              sRowBytes;
        Int32T                              rectWidth, rectHeight;
        unsigned char                   *pSrcA;
        PixMapHandle                    hSrcMap;
        register unsigned char    *pSrc, *pSrcRowLim;
        register Int32T                 fastOldSlot, fastNewSlot;

        hSrcMap = tglMyCWindow->portPixMap;          /* working within the global r

        /* bounds of hPixMap vary */
        /* Set up for source */

        /* get the number of bytes per row for the rect */

        sRowBytes= ( 0x0FFF & ((*tglHCurPixMap)->rowBytes));

        sOffset= ( pRect->left ) + (pRect->top * sRowBytes);

        pSrc = pSrcA = (unsigned char*) ((Int32T) sOffset +
               (Int32T) (*tglHCurPixMap)->baseAddr);

/*      WAS:
        sRowBytes= ( 0x0FFF & ((*hSrcMap)->rowBytes));

        sOffset= (pRect->left - (*hSrcMap)->bounds.left)
                 + ((pRect->top - (*hSrcMap)->bounds.top) * sRowBytes);
        pSrc= pSrcA= (unsigned char*) ((Int32T) sOffset + (Int32T) (*hSrcMap)->baseAddr)
*/

/*
note the implicit assumption that the bounds of the destination device are 0,0
This works on the physical PixMaps set up by tglMain; it may be inappropriate for
other devices
*/

#ifdef NO_ASM
        rectWidth = (pRect->right - pRect->left);

        for( row = pRect->top; row < pRect->bottom; row++ )  {       /* down the rows c

               pSrcRowLim = pSrc + rectWidth;        /* width of rect within the map */

               while ( pSrc < pSrcRowLim )    {                                /* acrc

                      if (*pSrc == oldSlot)                                       /* if it
                             *pSrc = newSlot;                                     /* mal

                      pSrc++;
next pixel/byte */
               }

               pSrc= pSrcA += sRowBytes;                                          /* adv.
        }

#else

        rectWidth = pRect->right - pRect->left;
        rectHeight = pRect->bottom - pRect->top;
        fastOldSlot = oldSlot;
        fastNewSlot = newSlot << 24 | newSlot << 16 | newSlot << 8 | newSlot;
```

```
	asm {
		/* get the variables we need into registers */
		move.l		pSrc, a0			; pointer into bitmap
		move.l		rectHeight, d0			; number of rows to check

	@rowLoop
		move.l		rectWidth, d1			; number of cols to check
		move.l		a0, a1				; pointer into bitmap, moving

	@colLoop

		/* see if we should interchange */
		cmp.b		(a1), fastOldSlot
		bne		@dontWrite

		/* write */
		move.b		fastNewSlot, (a1)

	@dontWrite
		addq.l		#1, a1

	@colLoopTest
		subq.w		#1, d1
		bgt		@colLoop

		/* start at the beginning of the next line */
		add.l	sRowBytes, a0

	@rowLoopTest
		subq.w		#1, d0
		bgt		@rowLoop

		}
#endif


	return;
}


/* ..................................................................................................
/* AutoShadow
	given a Rect from a snip, this function checks to determine the offset for the shad
	the amount of whitespace to the right and below the color portion of the snip.
	*/

void	grfAutoShadow ( Rect *pRect , Int16T offset )
	{
	Int32UT				row, sOffset, numRows;
	Int32T				sRowBytes, rectWidth, clutIndex;
	unsigned char			*pSrcA;
	PixMapHandle			hSrcMap;
	register unsigned char		*pSrc, *pSrcRowLim;
	Rect				shadowRect;

	hSrcMap = tglMyCWindow->portPixMap;		/* working within the global m

	/* get the number of bytes per row for the rect */

	sRowBytes= ( 0x0FFF & ((*tglHCurPixMap)->rowBytes));

	/* first the rect below */

	shadowRect.left = pRect->left + offset;
	shadowRect.top = pRect->bottom;
	shadowRect.right = pRect->right+offset;
	shadowRect.bottom = pRect->bottom+offset;
```

```
sOffset= ( shadowRect.left ) + (shadowRect.top * sRowBytes);

pSrc = pSrcA = (unsigned char*) ((Int32T) sOffset +
      (Int32T) (*tglHCurPixMap)->baseAddr);

rectWidth = (shadowRect.right - shadowRect.left);

for( row = shadowRect.top; row < shadowRect.bottom; row++ )          /* dov
      {
      pSrcRowLim = pSrc + rectWidth;                          /* width of rect wi

      while ( pSrc < pSrcRowLim )                             /* across bytes in e
            {
            *pSrc = shadowTable[*pSrc];
            pSrc++;                                           /* move on t
            }

      pSrc = pSrcA+= sRowBytes;                               /* advance down c
      }

/* now the rect to the right */

shadowRect.left =  pRect->right;
shadowRect.top = pRect->top + offset;
shadowRect.right = pRect->right+offset;
shadowRect.bottom = pRect->bottom;

sOffset= ( shadowRect.left ) + (shadowRect.top * sRowBytes);

pSrc = pSrcA = (unsigned char*) ((Int32T) sOffset + (Int32T) (*tglHCurPixMap)->bas

/*
      sOffset= (shadowRect.left - (*hSrcMap)->bounds.left) +
            ((shadowRect.top - (*hSrcMap)->bounds.top) * sRowBytes);
      pSrc = pSrcA = (unsigned char*) ((Int32T) sOffset + (Int32T) (*hSrcMap)->baseAddr
*/

rectWidth = (shadowRect.right - shadowRect.left);

for( row = shadowRect.top; row < shadowRect.bottom; row++ )          /* dov
      {
      pSrcRowLim = pSrc + rectWidth;                          /* width of rect wi

      while ( pSrc < pSrcRowLim )                             /* across bytes in e
            {
            *pSrc = shadowTable[*pSrc];
            pSrc++;                                           /* move on t
            }

      pSrc = pSrcA+= sRowBytes;                               /* advance down c
      }

return;
}



/*.......................................................................................
/* ShadowInit
      fills in the shadow lookup table for each index in the CLUT
      */

void grfShadowTableInit()
      {
      register Int16T         index;
      RGBColor                rgb;
```

BEST AVAILABLE COPY

```
for (index = 0; index <= 255; index++)
        {

        /*      convert to rgb  */
        Index2Color(index, &rgb);
        rgb.red *= .8125;
        rgb.blue *= .8125;
        rgb.green *= .8125;

        /*      get the new index  */
        shadowTable[index] = Color2Index(&rgb);
        }

/* to add manual overrides to the shadow table's automatically-calc'd values,
        just enter a line like:
        shadowTable[23] = 57;  which means that the shadow value for CLUT index
        23 will be clut index number 57.
*/

}

/*  E N D  O F  grfGraphics.c  */
```

```
#define     APP_ADTERM
#include    "standard.h"
#include    "glue.h"
#include    "varFns.h"
#include    "tglMain.h"
#include    "stkDetail.h"
#include    "bndDetail.h"
#include    "excExcelRead.h"
#include    "hotSheet.h"
#include    "scrScreen.h"
#include    "libLibrary.h"
#include    "grfGraphics.h"
#include    "fileAccess.h"
#include    "format.h"

#define     MAX_STRING_LENGTH         500L

/**********************************************************
 * Constants for finding things in the Excel data file for
 * the Hotsheet
 **********************************************************/
/* Stocks */
#define NUM_QUARTERS                        26L

#define M_OR_S_COL                          0
#define CATEGORY_COL                        1
#define STOCK_SYMBOL_COL                    2
#define STOCK_NAME_COL                      3
#define STOCK_DESC_COL                      4
#define CURRENT_PRICE_INT_COL               5
#define CURRENT_PRICE_FRAC_COL              6
#define YEAR_HIGH_INT_COL                   7
#define YEAR_HIGH_FRAC_COL                  8
#define YEAR_LOW_INT_COL                    9
#define YEAR_LOW_FRAC_COL                   10
#define ASSETS_COL                          11
#define DIVIDENDS_COL                       12
#define PE_COL                              13
#define BETA_COL                            14
#define EXPECTED_RETURN_COL                 15
#define ANNUAL_EARNINGS_COL                 16
#define NET_EARNINGS_COL                    17
#define SALES_COL                           18
#define YEAR_YIELD_COL                      19
#define PORTFOLIO_TURNOVER_COL              20
#define LARGEST_COMPANY_COL                 21
#define PORTFOLIO_CASH_COL                  22
#define MIN_INVESTMENT_COL                  23
#define FIRST_PRICE_COL                     25
#define LAST_PRICE_COL                      50
#define STOCK_INFO_AS_OF                    51

/* Mutual Fund variants */

#define     INVESTMENT_OBJECTIVE_COL  4
#define     ONE_YR_TOTAL_RTN_COL            16
#define     FIVE_YR_TOTAL_RTN_COL           17
#define     TEN_YR_TOTAL_RTN_COL            18
#define     LOADS_COL                       19
#define MANAGEMENT_FEE_COL                  24

/* Additional defines for Bonds */

#define FIRST_BOND_ROW                      1

#define NUM_BOND_QTRS                       24L

#define BOND_TYPE_COL                       0
```

```
#define CUSIP_ID_COL                    1
#define S_M_L_COL                       2
#define BONDNAME_COL                    3
#define SP_RATE_COL                     4
#define OFFER_RATE_COL                  5
#define PAR_VAL_COL                     6
#define MATUR_DATE_COL                  7
#define COUPON_RT_COL                   8
#define YIELD_2_MAT_COL                 9
#define MIN_PURCH_AMT_COL               10
#define MIN_INCR_PUR_COL                11
#define SEC_BND_DESC                    12
#define PAY_DATE_DESC                   13
#define CALL_DATE_DESC                  14
#define BOND_INFO_AS_OF                 15

/* for bonds */
#define FIRST_GPRICE_COL                17
#define LAST_GPRICE_COL                 41

/*
 * money market variations
 */

#define SYMBOL_ID_COL                   1
#define ISSUER_COL                      4
#define YIELD_COL                       5
#define ANNUAL_FEES_COL                 6
#define MMF_ASSETS_COL                  7
#define AVERAGE_MATURITY_COL            8
#define AGE_OF_FUND_COL                 9
#define CHECK_WRITING_COL               10
#define MMF_MIN_PURCH_AMT_COL           11
#define MMF_MIN_INCR_PUR_COL            12
#define MMF_INFO_AS_OF                  13


/* this is NOT the apparent line in the excel file because we filter */
/* out all lines that do not start with our 'S' or 'F' pprogram version */
/* inclusion flag in exeExcelRead.c */
#define FIRST_DATA_ROW                  0


/*********************************************************
 * Former user inputs, now hard-wired into the code
 *********************************************************/
#define         DATA_WHITESPACE_RATIO           1.0
#define         EXCEL_STOCK_FILE                "Stock.Text"
#define         EXCEL_BOND_FILE         "Bonds.Text"

static Rect     BoundsRect              = {223, 224, 304, 482};
static Int32T   Hues[]                  = {84, 83, 35, 1, 2};


/* this stuff is used to read in variables that are set in the spreadsheets */
#define VARIABLE_TYPE_COL 0
#define VARIABLE_NAME_COL       1
#define VARIABLE_VALUE_COL      2
void hotGetBondVariables ( excFileIdT fileId, Real80T *muniCutoffRate );
void hotGetStockVariables ( excFileIdT fileId );
void hotGetIntroVariables ( excFileIdT fileId, Int16T *introEndYear );


/*-----------------------------------------------------------*/
/* variables for the sliding stock performance graph window shown in the hotsheet */
/* these variables are set in the excel spreadsheet, read in hotGetVariables() */

static Int32T           hotLastDataYear;
```

```
static Int32T        notLastDataQuarter;
static char          *hotQuarterNames[] = { "fourth", "first", "second", "third" };

/* ____________________________________________
 * ____________________________________________
 *
 *
 *                     Former tbk functions
 *
 * ____________________________________________
 * ____________________________________________*/
/*
 *     text block load and retrieval functions
 *     1989 august 22 djs
 *
 *     these functions provide for the loading of a text file containing the text blocks, w
 *     block preceded by the key value (identifier) alone on a separate line. Each key val
 *     preceded by a left curly brace { and can only be one word long. The successive line
 *     the text block until the next curly brace is encountered.
 *
 *     When loaded into memory by hotBlksLoad(), each text block is terminated by a \
 *     and hotBlkGet() returns a pointer to a specific block's beginning. Any operation c
 *     block pointed to can safely assume that a \0 will terminate the text.
 */

#define D( s ) /* */


static char          *hots;


/* *********************************************************************
/*     Function:  hotBlksLoad()
 *     Loads the text blocks from the data file and stores them in the heap, retaining th
 *     in a local static variable.
 */

Int32T hotBlksLoad( hot_file_txt )
char hot_file_txt[];
{
    /*     open the file, get the size, allocate the memory, and read it into the block.
    /*     parse out the first curly brace and replace all successives with \0 to terminat
    /*     make sure there is a final \0 on the last block, too. */

    FILE          *hotsFile;
    char          fileName[MAX_FILE_NAME_LENGTH];
    char          *curChar;
    Int32T              charCnt,
                        blkCnt = 0;
    char          temp[255];

    /* Original : strcpy( fileName, HOT_DATA_FILE );
     * **>> !! NOW CALLED FROM BOND OR STOCKS !! 10/20/89
     */

    strcpy( fileName, hot_file_txt );

    if ( (hotsFile= fopen( filePrependDir( temp, FILE_DATA_DIR, fileName ), "r" )) == N
          TGL_ERROR("Text Block Data file not accessible." );
          return ( -1 );
    }
    charCnt = hotGetSize(hotsFile);

    /* rem +2 to leave room for the terminating \0\0 */
    if ( (hots = (char *) NewPtr( charCnt+100 /* hmh */ )) == NULL) {
          TGL_FATAL_ERROR("Cannot allocate memory for text blocks");
          return (-2 );
    }
```

```
	/* read in the data in one swoop */
	fseek( hotsFile, 0, SEEK_SET );
	if ( charCnt != fread( hots, sizeof(char), charCnt, hotsFile) ) {
		TGL_ERROR("Error reading in text blocks from file" );
		return (-3);
	}

	/* add the terminating \0\0 */
	*(hots+charCnt) = '\0';
	*(hots+charCnt+1) = '\0';

	/* go through the entire hotsheet file */
	curChar = hots;
	while ( *curChar != '\0')
		{
		/* translate each { to a \0 */
		if (*curChar == '{')
			{
			blkCnt++;
			*curChar = '\0';
			}

		/* convert carriage returns to newlines */
		if (*curChar == '\r') *curChar = '\n';

		/* next character */
		curChar++;
		}

	fclose( hotsFile );
	return ( blkCnt );

}
/* hotBlksLoad() */

/* ***********************************************************************
/*	Function hotBlkGet()
 *	Returns a pointer to the start of the requested text block. Blocks are requested ar
 *	by their key values (see the introduction, above). Returns NULL if not found.
 */

char *hotBlkGet(keyVal)
char *keyVal;
{
	char *tptr;

	tptr = hots;			/* start out pointing to the beginning of the first block, 

	while ( *(++tptr) != '\0') {			/* always skip the delimiting \0 to poi

		if ( strncmp( keyVal, tptr, strlen(keyVal)) == 0 &&
		   tptr[strlen(keyVal)] == '}' ) {						/* FOUND */

		tptr = strchr( tptr, '\n');
line */
		return (++tptr);
assumed to begin on next line */
		}
	tptr = strchr( tptr, '\0' );
	}
return( NULL );
}

Int32T hotGetSize(fp)
FILE *fp;
{
	fseek(fp,0,SEEK_END);
	return( ftell(fp));

hotSheet.c
```

```
}

BooleanT hotDisposBlock( void )
{
DisposPtr( hots );
return( FALSE );
}

/* ————————————————————————————————————
 * ————————————————————————————————————
 *
 *                     Line Graphs
 *
 * ————————————————————————————————————
 * ————————————————————————————————————*/

/*****************************************************************
 * hotLineGraph
 *****************************************************************
 * Plots the data in the chartData table into a line graph.  Different
 * measures are plotted in different colors
 *
 * numMeasures is the number of separate series which need to be plotted
 * numDataPoints is the number of values for each measure.  ChartData
 * is the data to be plotted, with data in 1 row for each measure.
 * BoundsRect is the rectangle into which the entire chart is supposed
 * to fit.  Hues is a table of colors, one per measure.
 *****************************************************************/
void hotLineGraph( numMeasures, numDataPoints, chartData, maxDataPoint, boundsR
      Int32T              numMeasures;
      Int32T              numDataPoints;
      hotChartDataHT   chartData;
      Real80T             maxDataPoint;
      Rect             boundsRect;
      Int32T              hues[MAX_HOT_NUM_MEASURES];
{
      Int32T           i;
      Int32T           j;
      Int16T           hPos;
      Int16T           vPos;
      PenState    state;
      Real80T          timeUnitWidth;
      Real80T          dataPointHeight;

      /*****************************************************************
       * save the pen size
       *****************************************************************
      GetPenState( &state );

      /*****************************************************************
       * width for 1 time unit is the overall width divided by the number of
       * time units
       *****************************************************************
      timeUnitWidth = ((Real80T) (boundsRect.right - boundsRect.left - 2)) /
            (Real80T) ( numDataPoints - 1 );

      /*****************************************************************
       * height for 1 data point is the overall height divided by the value
       * of the maximum datapoint in any bar
       *****************************************************************
      dataPointHeight = ((Real80T) (boundsRect.bottom - boundsRect.top)) /
           maxDataPoint;

      /*****************************************************************
       * do each measure
       *****************************************************************
      for (i = 0; i < numMeasures; i++) {
```

BEST AVAILABLE COPY

```
/*********************************************************
 * set the color (also happens to set pen size)
 *********************************************************/
scrSetHueNow( hues[i] );

/*********************************************************
 * Move to the first point of the line graph
 *********************************************************
hPos = boundsRect.left + 2;
vPos = boundsRect.bottom - (**chartData)[i][0] * dataPointHeight;
MoveTo( hPos, vPos );

/*********************************************************
 * march from left to right
 *********************************************************
for (j = 1; j < numDataPoints; j++) {

	/***************************************************
	 * draw a line to the next point
	 ***************************************************
	hPos = boundsRect.left + j * timeUnitWidth;
	vPos = boundsRect.bottom -
		(**chartData)[i][j] * dataPointHeight;

	/***************************************************
	 * skip "no trade" values, but draw lines for all others
	 ***************************************************
	if ((**chartData)[i][j] == 0 ||
	  (**chartData)[i][j-1] == 0 )
		MoveTo( hPos, vPos );
	else LineTo( hPos, vPos );
	}
}

RGBForeColor( &tglRgbBlack );
RGBBackColor( &tglRgbWhite );

/*************************************************************
 * reset the pen size
 *************************************************************
PenSize( state.pnSize.h, state.pnSize.v );

}
/* hotLineGraph() */


/* ______________________________________________
 * ______________________________________________
 *
 *                                  Export Stock Data
 *
 * ______________________________________________
 * ______________________________________________*/
void	hotStockLoad( pT, pStockIndex )
	void		*pT;
	Int32T			*pStockIndex;
{
	Int32T			line;
	Int32T			stockIndex;
	struct			STOCK *stockTable;
	Int32T			error;
	excFileIdT	fileId;
	char		cellValue[MAX_STRING_LENGTH];

	/* pT is really a pointer to a STOCK struct, but I didn't want to export
	 * the definition to all corners of the world.			/hmh
	 */
```

```
stockTable= (struct STOCK *) pT;

excOpenFile( EXCEL_STOCK_FILE, &fileld, TRUE );                    /* read ir
*/

line = FIRST_DATA_ROW;

stockIndex= 0;
do {

        excLookupCell( fileId, line, M_OR_S_COL, cellValue );
        strncpy( stockTable[ stockIndex ].typeOfStock,
                cellValue, sizeof( stockTable->typeOfStock ));

        excLookupCell( fileId, line, CATEGORY_COL, cellValue );
        strncpy( stockTable[ stockIndex ].basketABC,
                cellValue, sizeof( stockTable->basketABC ));

        excLookupCell( fileId, line, STOCK_SYMBOL_COL, cellValue );
        strncpy( stockTable[ stockIndex ].issueSymbol,
                cellValue, sizeof( stockTable->nameOfIssue ));

        excLookupCell( fileId, line, STOCK_NAME_COL, cellValue );
        strncpy( stockTable[ stockIndex ].nameOfIssue,
                cellValue, sizeof( stockTable->nameOfIssue ));

        excLookupCell( fileId, line, CURRENT_PRICE_INT_COL, cellValue );
        strncpy( stockTable[ stockIndex ].priceShareW,
                cellValue, sizeof( stockTable->priceShareW ));

        excLookupCell( fileId, line, CURRENT_PRICE_FRAC_COL, cellValue );

        if ( stockTable[ stockIndex ].typeOfStock[0] == 'S' )
            {
            hotPrice2Fract( stockTable[ stockIndex ].priceShareF, cellValue)
            }
        else
            {
            strncpy( stockTable[ stockIndex ].priceShareF,
                cellValue, sizeof( stockTable->priceShareF ));
            }

        excLookupCell( fileId, line, YEAR_HIGH_INT_COL, cellValue );
        strncpy( stockTable[ stockIndex ].rangeHighW,
                cellValue, sizeof( stockTable->rangeHighW ));

        excLookupCell( fileId, line, YEAR_HIGH_FRAC_COL, cellValue );
        hotPrice2Fract( stockTable[ stockIndex ].rangeHighF, cellValue);

        excLookupCell( fileId, line, YEAR_LOW_INT_COL, cellValue );
        strncpy( stockTable[ stockIndex ].rangeLowW,
                cellValue, sizeof( stockTable->rangeLowW ));

        excLookupCell( fileId, line, YEAR_LOW_FRAC_COL, cellValue );
        hotPrice2Fract( stockTable[ stockIndex ].rangeLowF, cellValue);

        excLookupCell( fileId, line, DIVIDENDS_COL, cellValue );
        strncpy( stockTable[ stockIndex ].dividend,
                cellValue, sizeof( stockTable->dividend ));

        excLookupCell( fileId, line, PE_COL, cellValue );
        strncpy( stockTable[ stockIndex ].peRatio,
                cellValue, sizeof( stockTable->peRatio ));

        excLookupCell( fileId, line, BETA_COL, cellValue );
        strncpy( stockTable[ stockIndex ].beta,
                cellValue, sizeof( stockTable->beta ));
```

BEST AVAILABLE COPY

```
                excLookupCell( fileId, line, EXPECTED_RETURN_COL, cellValue );
                strncpy( stockTable[ stockIndex ].expectedValue,
                        cellValue, sizeof( stockTable->expectedValue ));

                excLookupCell( fileId, line, MIN_INVESTMENT_COL, cellValue );
                stockTable[ stockIndex ].minimumInitial= varAtof( cellValue );

                excLookupCell( fileId, line, ONE_YR_TOTAL_RTN_COL, cellValue );
                strncpy( stockTable[ stockIndex ].OneYrTotalReturn,
                        cellValue, sizeof( stockTable->OneYrTotalReturn));

                excLookupCell( fileId, line, LOADS_COL, cellValue );
                strncpy( stockTable[ stockIndex ].Load,
                        cellValue, sizeof( stockTable->Load ));

                excLookupCell( fileId, line, ASSETS_COL, cellValue );
                strncpy( stockTable[ stockIndex ].assets,
                        cellValue, sizeof( stockTable->assets ));

            line++;
            stockIndex++;

            } while( line <= excNumRows( fileId ) && stockIndex < MAXSTOCK );

        *pStockIndex= stockIndex;

        excCloseFile( fileId );
}

/* ---------------------------------------------
 * ---------------------------------------------
 *
 *                  Transform input to output
 *
 * ---------------------------------------------
 * ---------------------------------------------*/
/*****************************************************************
 * hotLookupAndCalcMax
 *****************************************************************
 * Utility function to look up a cell in an excel spreadsheet and
 * return its value as a Real80T. As a side effect, it updates
 * maxDataPointP if the looked-up value is greater than the last
 * value of maxDataPointP.
 *
 * fileId is the id of the spreadsheet. Row and col specify where
 * to look in the spreadsheet. MaxDataPointP is the maximum data
 * point found in the spreadsheet so far.
 *****************************************************************/
Real80T hotLookupAndCalcMax( fileId, row, col, maxDataPointP )
        excFileIdT      fileId;
        Int32T          row;
        Int32T          col;
        Real80PT        maxDataPointP;
{
        Real80T         x;
        char            cellValue[255];

        excLookupCell( fileId, row, col, cellValue );
        x = varAtof( cellValue );
        (*maxDataPointP) = MAX( (*maxDataPointP), x );
        return (x);
}

/*****************************************************************
 * hotStockFind
 *****************************************************************
```

```
 * Translates the name of the chosen stock into a number which can
 * be used to index a row of the spreadsheet
 ******************************************************************/
void hotStockFind( fileld, stockName, stockNumber, numLinesInSpreadsheet )
        excFileldT    fileld;
        char          *stockName;
        Int32PT              stockNumber;
        Int32T               numLinesInSpreadsheet;
{
        Int32T        i;
        char   cellValue[MAX_STRING_LENGTH];

        /****************************************************************
         * get the stock's name
         ****************************************************************/
        strcpy( stockName, varPtr( vCurrentInstName )  );

        /****************************************************************
         * find the stock name in the spreadsheet
         ****************************************************************/
        *stockNumber = -1;
        for (i = 0; i <= numLinesInSpreadsheet; i++) {
                excLookupCell( fileld, i, STOCK_NAME_COL, cellValue );
                if (!strncmp( cellValue, stockName, strlen(stockName) )) {
                        *stockNumber = i;
                        break;
                }
        }
        if (*stockNumber == -1) {
                TGL_ERROR( "No such stock." );
        }

}
/* hotStockFind() */


/******************************************************************
 * hotStockTransform
 ******************************************************************
 * Translates input information about a stock's past performance from
 * an Excel spreadsheet and plots it as a line graph.  Also expects
 * to plot the S&P average on the same line.  Collects the name of
 * the stock to be plotted from the user.
 *
 * Actually, the values plotted are the percent change from the first
 * value.
 ******************************************************************/
void hotStockTransform( fileld, chartDataH, maxDataPointP, numLinesInSpreadsheet )
        excFileldT              fileld;
        hotChartDataHT          chartDataH;
        Real80PT                maxDataPointP;
        Int32T                          numLinesInSpreadsheet;
{
        Int32T                  line;
        Int32T                  column, baseColumn;
        Int32T                  count;
        Int32T                  i, s_and_p_row;
        Real80T                 x;
        Real80T                 dummy;
        Real80T                 baseValue;
        Int32T                  stockNumber;
        char                stockName[MAX_STRING_LENGTH];
        char                cellValue[MAX_STRING_LENGTH];

        /****************************************************************
         * find the stock's number
         ****************************************************************/
        hotStockFind( fileld, stockName, &stockNumber, numLinesInSpreadsheet );
```

BEST AVAILABLE COPY

```
/**************************************************************
 * initialize the maximum data point
 **************************************************************/
(*maxDataPointP) = -1;

/**************************************************************
 * fill in zero values for everything
 **************************************************************/
baseValue = 0;
for (i = 0; i < NUM_QUARTERS + 1; i++) {
        (**chartDataH)[0][i] = 0;
        (**chartDataH)[1][i] = 0;
}

/**************************************************************
 * collect data for the selected stock
 **************************************************************/
count = 0;
for (column = FIRST_PRICE_COL; column <= LAST_PRICE_COL; column++) {

        /**********************************************************
         * if the value not numeric, then exit
         **********************************************************
        excLookupCell( fileId, stockNumber, column, cellValue );
        if ( strlen( cellValue) != strspn( cellValue, "0123456789.,")) {
        }
        else {

                /**************************************************
                 * if the baseValue is 0 then set the baseValue
                 **************************************************
                if (baseValue == 0) {
                        baseValue = varAtof( cellValue );
                        baseColumn= column;
                }

                x= varAtof( cellValue );
                (**chartDataH)[0][count] = x / baseValue;

                if ((**chartDataH)[0][count] > (*maxDataPointP)) {
                        (*maxDataPointP) = (**chartDataH)[0][count];
                }
        }

        /* bump the count of values */
        count++;
}

/**************************************************************
 * collect data for the S & P
 **************************************************************/

/* use as base the value corresponding to first real stock data point */

/*
 * WAS: hotStockFind( fileId, "SPX.I", &s_and_p_row, numLinesInSpreadsheet );
 * but there's a problem with StockFind overriding the parameter value.
 */
for (i = 0; i <= numLinesInSpreadsheet; i++)
        {
        excLookupCell( fileId, i, STOCK_SYMBOL_COL, cellValue );
        if (!strcmp( cellValue, "SPX.I" ))
                {
                s_and_p_row = i;
                break;
                }
        }
```

```
	excLookupCell( fileld, s_and_p_row, baseColumn, cellValue );
	baseValue = varAtof( cellValue );

	count = 0;
	for (column = FIRST_PRICE_COL; column <= LAST_PRICE_COL; column++) {

		/*************************************************************
		 * If the value is not numeric then exit
		 *************************************************************
		excLookupCell( fileld, s_and_p_row, column, cellValue );
		if ( strlen( cellValue) != strspn( cellValue, "0123456789.,")) {
		}
		else {

			x= varAtof( cellValue );
			(**chartDataH)[1][count] = x / baseValue;

			if ((**chartDataH)[1][count] > (*maxDataPointP)) {
				(*maxDataPointP) = (**chartDataH)[1][count];
			}
		}

		/* bump the count of values */
		count++;
	}

}
/* hotStockTransform() */

/* ______________________________________________
 * ______________________________________________
 *
 *
 *                    Top Level functions
 * ______________________________________________
 * ______________________________________________*/

/*******************************************************************
 * hotStockInvestSum
 *******************************************************************
 * Prints out the "Investment Summary" card of the hotsheet (STOCKS)
 *******************************************************************/
void hotStockInvestSum()
{
	Int32T		stockNumber;
	char		stockName[MAX_STRING_LENGTH];
	char		*stockSymbol;
	Rect		r;
	char		*s;
	PenState	state;
	char		*pC;
	char		tempStr[MAX_STRING_LENGTH];
	Int16T		hPos;
	Int16T		vPos;
	Handle		h;
	excFileldT	fileld;
	char		cellValue[MAX_STRING_LENGTH];

	/*************************************************************
	 * open excel file
	 *************************************************************/
	excOpenFile( EXCEL_STOCK_FILE, &fileld, TRUE );

	/*************************************************************
	 * find the stock's number
	 *************************************************************/
	hotStockFind( fileld, stockName, &stockNumber, excNumRows( fileld ));
```

```
/**************************************************************
 * print out the generic information
 **************************************************************/

/* stock name */
scrSetHueNow( 12 );
MoveTo( 181, 138 );
excLookupCell( fileId, stockNumber, STOCK_NAME_COL, cellValue );
CtoPstr( cellValue );
DrawString( cellValue );

/* as of date */
scrSetHueNow( 64 );
MoveTo( 436, 137 );
excLookupCell( fileId, stockNumber, STOCK_INFO_AS_OF, cellValue );
DrawString( "\pAs of " );
CtoPstr( cellValue );
DrawString( cellValue );

/* objective */
excLookupCell( fileId, stockNumber, M_OR_S_COL, cellValue);
scrSetHueNow( 37 );
MoveTo( 181, 165 );
if ( 'S' == *cellValue )                                  /* Stock Prof
      DrawString( "\pCompany Profile" );
else
      DrawString( "\pInvestment Objective" ); /* MF Profile Format */

/* description */
scrSetHueNow( 35 );
MoveTo( 200, 185 );
excLookupCell( fileId, stockNumber, STOCK_DESC_COL, cellValue );
CtoPstr( cellValue );
DrawString( cellValue );

/**************************************************************
 * print out the specific information
 **************************************************************/
scrSetHueNow( 37 );
MoveTo( 181, 209 );
DrawString( "\pInvestment Summary" );

/**************************************************************
 * load the stock description blocks into memory
 **************************************************************/
hotBlksLoad( HOT_DATA_FILE );

/**************************************************************
 * get the stock's symbol
 **************************************************************/
excLookupCell( fileId, stockNumber, STOCK_SYMBOL_COL, cellValue );
stockSymbol = cellValue;

/**************************************************************
 * print the stock descriptive text in a box
 **************************************************************/
s = hotBlkGet( stockSymbol );
if ( s != NULL )
      {
      h = NewHandle( strlen( s ) + 1 );

      if( h == NULL ) {
            TGL_ERROR( "Allocation error in stock summary" );
      }
      else
            {
            MoveHHi( h );
```

BEST AVAILABLE COPY

```
                    HLock( h );
                    strcpy( *h, s );
                    s = *h;
                    pC = strtok( s, "\r\n" );
                    hPos = 200;
                    vPos = 229;

                    scrSetHueNow( 35 );
                    while (pC != NULL)
                        {
                        MoveTo( hPos, vPos );
                        vPos += 12;
                        strcpy( tempStr, pC );
                        CtoPstr( tempStr );
                        DrawString( tempStr );
                        pC = strtok( NULL, "\n" );
                        }
                    DisposHandle( h );
                    }
            }

        hotDisposBlock();        /* release memory */

        /****************************************************************
         * cleanup
         ****************************************************************/
        excCloseFile( fileId );
        scrRestoreColors();

}
/* hotStockInvestSum() */


/******************************************************************
 * hotStripQuotes
 ******************************************************************
 * Strips the quotes off a string, in place.  If the first character
 * of the string is a quote, then the first and last characters are
 * stripped off, and the middle section returned.
 ******************************************************************/
void hotStripQuotes( s )
        char *s;
{
        char  tempStr[MAX_STRING_LENGTH];

        if (s[0] == '"') {
                sscanf( s, "\"%[^\"]\"", tempStr );
                strcpy( s, tempStr );
        }
}


/******************************************************************
 * hotStockProfile
 ******************************************************************
 * Prints out the "Investment Profile" card of the hotsheet (STOCKS)
 ******************************************************************/
void hotStockProfile()
{
        Int32T          i;
        Int32T          stockNumber;
        char            stockName[MAX_STRING_LENGTH];
        Rect            r;
        char            s[MAX_STRING_LENGTH];
        char            cellValue[MAX_STRING_LENGTH];
        char            highInt[10];
        char            highFrac[10];
        char            lowInt[10];
```

```
char            lowFrac[10];
excFileIdT      fileId;

/****************************************************************
 * open excel file
 ****************************************************************/
excOpenFile( EXCEL_STOCK_FILE, &fileId, TRUE );                   /* us

/****************************************************************
 * find the stock's number
 ****************************************************************/
hotStockFind( fileId, stockName, &stockNumber, excNumRows( fileId ) );

/****************************************************************
 * print out the generic information
 ****************************************************************/
scrSetHueNow( 12 );
MoveTo( 181, 138 );
excLookupCell( fileId, stockNumber, STOCK_NAME_COL, cellValue );
drawstring( cellValue );

scrSetHueNow( 35 );
MoveTo( 200, 185 );
excLookupCell( fileId, stockNumber, STOCK_DESC_COL, cellValue );
drawstring( cellValue );

/****************************************************************
 * print out the specific information
 ****************************************************************/
excLookupCell( fileId, stockNumber, M_OR_S_COL, cellValue);

/*
 * Standard Stock Profile Format
 */
if ( 'S' == *cellValue )
    {
    scrSetHueNow( 37 );
    MoveTo( 181, 209 );
    drawstring( "Investment Profile" );
    TextSize( 10 );

    scrSetHueNow( 35 );
    MoveTo( 200, 229 );
    excLookupCell( fileId, stockNumber, ANNUAL_EARNINGS_COL, cellValue );
    hotStripQuotes( cellValue );
    sprintf( s, "Annual earnings/share: $%s", cellValue );
    drawstring( s );

    MoveTo( 200, 249 );
    excLookupCell( fileId, stockNumber, NET_EARNINGS_COL, cellValue );
    hotStripQuotes( cellValue );
    sprintf( s, "Net earnings: %s M", cellValue );
    drawstring( s );

    MoveTo( 200, 269 );
    excLookupCell( fileId, stockNumber, SALES_COL, cellValue );
    hotStripQuotes( cellValue );
    sprintf( s, "Sales: %s M", cellValue );
    drawstring( s );

    MoveTo( 200, 289 );
    excLookupCell( fileId, stockNumber, ASSETS_COL, cellValue );
    hotStripQuotes( cellValue );
    sprintf( s, "Assets: %s M", cellValue );
    drawstring( s );

    MoveTo( 200, 309 );
```

BEST AVAILABLE COPY

```
        excLookupCell( fileId, stockNumber, PE_COL, cellValue );
        hotStripQuotes( cellValue );
        sprintf( s, "Price/earnings (P/E): %s", cellValue );
        drawstring( s );

        MoveTo( 200, 329 );
        excLookupCell( fileId, stockNumber, YEAR_HIGH_INT_COL, highInt );
        hotStripQuotes( highInt );
        excLookupCell( fileId, stockNumber, YEAR_HIGH_FRAC_COL, highFrac );
        hotStripQuotes( highFrac );
        excLookupCell( fileId, stockNumber, YEAR_LOW_INT_COL, lowInt );
        hotStripQuotes( lowInt );
        excLookupCell( fileId, stockNumber, YEAR_LOW_FRAC_COL, lowFrac );
        hotStripQuotes( lowFrac );
        drawstring( "52 week high/low: $" );
        drawstring( highInt );
        hotPrice2Fract( s, highFrac );
        stkDrawFraction( s );
        drawstring( " - " );
        drawstring( lowInt );
        hotPrice2Fract( s, lowFrac );
        stkDrawFraction( s );
        }
/*
 * Mutual Fund Profile Format
 */
else
        {
        #define     lnHi   15

        Int16T      ln = 209;

        scrSetHueNow( 37 );

        MoveTo( 181, ln );
        drawstring( "Fund Information" );
        TextSize( 10 );

        scrSetHueNow( 35 );

        ln += lnHi;
        MoveTo( 200, ln );
        drawstring( "Total Return:" );

        MoveTo( 280, ln );
        excLookupCell( fileId, stockNumber, ONE_YR_TOTAL_RTN_COL, cellValue );
        hotStripQuotes( cellValue );
        sprintf( s, "1 yr. - %s%%", cellValue);
        drawstring( s );

        MoveTo( 350, ln );
        excLookupCell( fileId, stockNumber, FIVE_YR_TOTAL_RTN_COL, cellValue );
        hotStripQuotes( cellValue );
        sprintf( s, "5 yr. - %s%%", cellValue );
        drawstring( s );

        MoveTo( 420, ln );
        excLookupCell( fileId, stockNumber, TEN_YR_TOTAL_RTN_COL, cellValue );
        hotStripQuotes( cellValue );
        sprintf( s, "10 yr. - %s%%", cellValue );
        drawstring( s );

        ln += lnHi;
        MoveTo( 200, ln );
        excLookupCell( fileId, stockNumber, ASSETS_COL, cellValue );
        hotStripQuotes( cellValue );
        sprintf( s, "Assets (Millions): %s", cellValue );
        drawstring( s );
```

```
        ln += lnHi;
        MoveTo( 200, ln );
        excLookupCell( fileld, stockNumber, PORTFOLIO_TURNOVER_COL, cellV
        hotStripQuotes( cellValue );
        sprintf( s, "Average Annual Portfolio Turnover: %s", cellValue );
        drawstring( s );

        ln += lnHi;
        MoveTo( 200, ln );
        excLookupCell( fileld, stockNumber, LARGEST_COMPANY_COL, cellValue
        hotStripQuotes( cellValue );
        sprintf( s, "Largest held security: %s", cellValue );
        drawstring( s );

        ln += lnHi;
        MoveTo( 200, ln );
        excLookupCell( fileld, stockNumber, PORTFOLIO_CASH_COL, cellValue );
        hotStripQuotes( cellValue );
        sprintf( s, "Portfolio Cash: %s", cellValue );
        drawstring( s );

        ln += lnHi;
        MoveTo( 200, ln );
        excLookupCell( fileld, stockNumber, BETA_COL, cellValue );
        hotStripQuotes( cellValue );
        sprintf( s, "Beta: %s", cellValue );
        drawstring( s );

        ln += lnHi;
        MoveTo( 200, ln );
        excLookupCell( fileld, stockNumber, MANAGEMENT_FEE_COL, cellValue );
        hotStripQuotes( cellValue );
        sprintf( s, "Management Fee: %s", cellValue );
        drawstring( s );

        ln += lnHi;
        MoveTo( 200, ln );
        excLookupCell( fileld, stockNumber, LOADS_COL, cellValue );
        hotStripQuotes( cellValue );
        sprintf( s, "Sales Charge/Loads: %s", cellValue );
        drawstring( s );

        }

    /****************************************************************
     * cleanup
     ****************************************************************/
    excCloseFile( fileld );
    scrRestoreColors();
}
/* hotStockProfile() */


/*******************************************************************
 * hotStockPerformance
 *******************************************************************
 * Plots line graph of past performance of a stock from data in an
 * Excel spreadsheet
 *******************************************************************/
void hotStockPerformance()
{
    extern Int32T       hotLastDataYear;
    extern Int32T       hotLastDataQuarter;

    Real80T                 maxDataPoint;
    Real80T                 deltaPercent;
    Int32T                  stockNumber;
```

BEST AVAILABLE COPY

```
char                    stockName[MAX_STRING_LENGTH];
char                    s[MAX_STRING_LENGTH];
Rect                    r;
Real80T                         acceptablePercentages[] =
                                        { 0.05, 0.10, 0.20, 0.25, 0.50, 1.0, 2.0, 3.0 };
Int32T                          numAcceptablePercentages = 8;
Int32T                          i, firstYear, numberOfLabels;
Int16T                          fullPercent;
Int16T                          hPos;
Int16T                          vPos, vStock;
excFileIdT              fileId;
char                    cellValue[MAX_STRING_LENGTH];
hotChartDataHT          chartDataH;
Real80T                         timeUnitWidth;
Real80T                         dataPointHeight;

/****************************************************************
 * open excel file
 ****************************************************************/
excOpenFile( EXCEL_STOCK_FILE, &fileId, TRUE ); /* use version filter */
hotGetStockVariables( fileId ); /*  read in the variables from this exec file  */

/****************************************************************
 * find the stock's number
 ****************************************************************/
hotStockFind( fileId, stockName, &stockNumber, excNumRows( fileId ));

/****************************************************************
 * print out the generic information
 ****************************************************************/
scrSetHueNow( 12 );
MoveTo( 181, 138 );
excLookupCell( fileId, stockNumber, STOCK_NAME_COL, cellValue );
CtoPstr( cellValue );
DrawString( cellValue );

excLookupCell( fileId, stockNumber, M_OR_S_COL, cellValue);
scrSetHueNow( 37 );
MoveTo( 181, 165 );
if ( 'S' == *cellValue )                                        /* Stock Prof
        DrawString( "\pCompany Profile" );
else
        DrawString( "\pInvestment Objective" ); /* MF Profile Format */


scrSetHueNow( 35 );
MoveTo( 200, 185 );
excLookupCell( fileId, stockNumber, STOCK_DESC_COL, cellValue );
CtoPstr( cellValue );
DrawString( cellValue );

/****************************************************************
 * allocate space for the data points
 ****************************************************************/
chartDataH = (hotChartDataHT)
        NewHandle( excNumRows( fileId ) * sizeof( hotDataPointsT ));
if (chartDataH == NULL) {
        TGL_ERROR( "Cant allocate data." );
}

/****************************************************************
 * transform data collecting information about hi and low
 ****************************************************************/
hotStockTransform( fileId, chartDataH, &maxDataPoint, excNumRows( fileId ) );
maxDataPoint *= 1.1;            /* make scale 10% bigger */

/****************************************************************
 * put in labels
```

```
*****************************************************************/

/* figure out the label for the first year's line */
firstYear = hotLastDataYear - 5;
if ( hotLastDataQuarter == 1 ) firstYear--;

sprintf( cellValue, "%% change since the %s quarter of %ld",
            hotQuarterNames[hotLastDataQuarter - 1], firstYear - 1 );
scrSetHueNow( Hues[2] );
MoveTo( ( Int32T ) ( BoundsRect.left +
            (BoundsRect.right - BoundsRect.left - 2) / 2 -
                        stringwidth( cellValue ) / 2 ), 214 );
drawstring( cellValue );

/*****************************************************************
 * width for 1 time unit is the overall width divided by the number of
 * time units
 *****************************************************************
timeUnitWidth = ((Real80T) (BoundsRect.right - BoundsRect.left - 2)) /
                    (Real80T) ( NUM_QUARTERS - 1 );

/*****************************************************************
 * put in years
 *****************************************************************/

/* how many labels should we put up? */
if ( hotLastDataQuarter == 2 || hotLastDataQuarter == 3 )
      numberOfLabels = 6;
else numberOfLabels = 7;

/* paint the lines and labels */
PenSize(1,1);
for (i = 0; i < numberOfLabels; i++)
      {
      /* find the position of this year's line */
      hPos = BoundsRect.left +
            i * 4 * timeUnitWidth +
            ( ( 5 - hotLastDataQuarter ) % 4 ) * timeUnitWidth;

      /* line */
      MoveTo( hPos, BoundsRect.bottom - 1);
      scrSetHueNow( Hues[4] );
      LineTo( hPos, BoundsRect.top );

      /* label */
      sprintf( s, "%ld", i + firstYear );
      MoveTo( hPos - stringwidth( s ) / 2, BoundsRect.bottom + 15 );
      scrSetHueNow( Hues[2] );
      drawstring( s );
      }

/*****************************************************************
 * put the names of the stocks on the right of the line graph
 *****************************************************************/
dataPointHeight = ((Real80T) (BoundsRect.bottom - BoundsRect.top)) /
      maxDataPoint;
hPos = BoundsRect.right + 9;
vPos = BoundsRect.bottom - dataPointHeight * (**chartDataH)[0][25];
vStock= vPos;
MoveTo( hPos, vPos + 4 );
scrSetHueNow( Hues[0] );
excLookupCell( fileId, stockNumber, STOCK_SYMBOL_COL, cellValue );
CtoPstr( cellValue );
DrawString( cellValue );

/* put up the s&p label */
hPos = BoundsRect.right + 9;
vPos = BoundsRect.bottom - dataPointHeight * (**chartDataH)[1][25];
```

```
if( vPos < vStock && vStock - vPos < 20 )
  vPos= vStock - 17;
else if( vPos > vStock && vPos - vStock < 20 )
        vPos= vStock + 17;
MoveTo( hPos, vPos + 4 );
scrSetHueNow( Hues[1] );
DrawString( "\pS & P" );

/****************************************************************
 * put in the vertical tick marks.  Loop through the acceptable
 * percent arrays, until the maximum value divided by the percentage
 * yields less than 7.  Using this value as the percentage difference,
 * plot tick marks.  For instance, if the highest value was 2.43, then
 * the first acceptable percentage would be 0.5 since this produces
 * four tick marks to cover the range from 0 to 2.43.  Tick marks
 * start at the 1.0 value, not at 0.0, and the tick labels are
 * not decimal numbers, but percentages.
 ****************************************************************/
deltaPercent = 0;
for (i = 0; i < numAcceptablePercentages; i++) {
        if (maxDataPoint / acceptablePercentages[i] < 7) {
                deltaPercent = acceptablePercentages[i];
                break;
        }
}
if (deltaPercent == 0) {
        TGL_ERROR( "No reasonable percentage could be found." );
}

/****************************************************************
 * put in the vertical tick marks above 1.0.
 ****************************************************************/
for (i = 0; i < 7; i++) {
        if (maxDataPoint > 1.0 + i * deltaPercent) {

                /*******************************************************
                 * put in the tick mark
                 *******************************************************
                vPos = BoundsRect.bottom -
                        (1.0 + i * deltaPercent) * dataPointHeight;
                MoveTo( BoundsRect.left + 2, vPos );
                scrSetHueNow( Hues[4] );
                LineTo( BoundsRect.right - 3, vPos );

                /*******************************************************
                 * put in the label
                 *******************************************************
                fullPercent = i * deltaPercent * 100;
                sprintf( s, "%d", fullPercent);
                CtoPstr( s );
                hPos = BoundsRect.left - StringWidth( s ) - 5;
                vPos += 5;
                MoveTo( hPos, vPos );
                scrSetHueNow( Hues[2] );
                DrawString( s );
        }
}

/****************************************************************
 * put in the vertical tick marks below 1.0.
 ****************************************************************/
for (i = 1; i < 7; i++) {
        if (0 < 1.0 - i * deltaPercent) {

                /*******************************************************
                 * put in the tick mark
                 *******************************************************
                vPos = BoundsRect.bottom -
```

```
                (1.0 - i * deltaPercent) * dataPointHeight;
            MoveTo( BoundsRect.left + 2, vPos );
            scrSetHueNow( Hues[4] );
            LineTo( BoundsRect.right - 3, vPos );

            /*****************************************************
             * put in the label
             *****************************************************
            fullPercent = i * deltaPercent * 100;
            sprintf( s, "-%d", fullPercent );
            CtoPstr( s );
            hPos = BoundsRect.left - StringWidth( s ) - 5;
            vPos += 5;
            MoveTo( hPos, vPos );
            scrSetHueNow( Hues[2] );
            DrawString( s );
        }
    }

    /****************************************************************
     * draw the line graph
     ****************************************************************/
    hotLineGraph( 2, NUM_QUARTERS, chartDataH, maxDataPoint, BoundsRect, Hue

    /****************************************************************
     * draw the box that the line graph fits into
     ****************************************************************/
    scrSetHueNow( Hues[3] );
    PenSize(2,2);
    FrameRect( &BoundsRect );

    /****************************************************************
     * clean up
     ****************************************************************/
    excCloseFile( fileId );
    DisposHandle( (Handle) chartDataH );
    scrRestoreColors();

}
/* hotStockPerformance() */

/*******************************************************************
 * hotBondInvestSum
 *******************************************************************
 * Prints out the "Investment Summary" card of the hotsheet (BONDS)
 *******************************************************************/
void hotBondInvestSum()
{
    Int32T          bondNumber;
    char            bondName[MAX_STRING_LENGTH];
    char            *bondSymbol;
    Rect            r;
    char            *s;
    PenState        state;
    char            *pC;
    char            tempStr[MAX_STRING_LENGTH];
    Int16T          hPos;
    Int16T          vPos;
    Handle          h;
    excFileIdT      fileId;
    char            cellValue[MAX_STRING_LENGTH];

    /****************************************************************
```

BEST AVAILABLE COPY

```
 * open excel file containing all bonds and munis
 ****************************************************************/
excOpenFile( EXCEL_BOND_FILE, &fileId, TRUE );

/****************************************************************
 * find the bond's number
 ****************************************************************/
hotBondFind( fileId, bondName, &bondNumber, excNumRows( fileId ));

/****************************************************************
 * print out the generic information
 ****************************************************************/

/* bond name */
scrSetHueNow( 12 );
MoveTo( 181, 138 );
excLookupCell( fileId, bondNumber, BONDNAME_COL, cellValue );
CtoPstr( cellValue );
DrawString( cellValue );

/*
 * Heading info for MMF
 */
if (!strcmp( varPtr( visitMMF ), "1")) {

        /* as of date */
        scrSetHueNow( 63 );
        MoveTo( 436, 137 );
        excLookupCell( fileId, bondNumber, MMF_INFO_AS_OF, cellValue );
        DrawString( "\pAs of " );
        CtoPstr( cellValue );
        DrawString( cellValue );

        scrSetHueNow( 37 );
        MoveTo( 181, 165 );
        DrawString( "\pSponsor" );

        scrSetHueNow( 35 );
        MoveTo( 200, 185 );
        excLookupCell( fileId, bondNumber, ISSUER_COL, cellValue );
        hotStripQuotes( cellValue );
        CtoPstr( cellValue );
        DrawString( cellValue );
}

/*
 * Heading info for bonds
 */
else {

        /* as of date */
        scrSetHueNow( 63 );
        MoveTo( 436, 137 );
        excLookupCell( fileId, bondNumber, BOND_INFO_AS_OF, cellValue );
        DrawString( "\pAs of " );
        CtoPstr( cellValue );
        DrawString( cellValue );

        scrSetHueNow( 37 );
        MoveTo( 181, 165 );
        DrawString( "\pSecurity Description" );

        scrSetHueNow( 35 );
        MoveTo( 200, 185 );
        excLookupCell( fileId, bondNumber, SEC_BND_DESC, cellValue );
        hotStripQuotes( cellValue );
        CtoPstr( cellValue );
        DrawString( cellValue );
```

```
}

/****************************************************************
 * print out the specific information
 ****************************************************************/
scrSetHueNow( 37 );
MoveTo( 181, 209 );
DrawString( "\pInvestment Summary" );

/****************************************************************
 * load the stock description blocks into memory
 ****************************************************************/
hotBlksLoad( HOT_BOND_FILE );

/****************************************************************
 * print the text in a box
 ****************************************************************/
s = hotBlkGet( bondName );
if( s != NULL )
        {
        h = NewHandle( strlen( s ) + 1 );

        if( h == NULL ) {
                TGL_ERROR( "Allocation error in stock summary" );
        }
        else
                {
                MoveHHi( h );
                HLock( h );
                strcpy( *h, s );
                s = *h;
                pC = strtok( s, "\r\n" );
                hPos = 200;
                vPos = 229;

                scrSetHueNow( 35 );
                while (pC != NULL)
                        {
                        /*
                                SetRect( &r, 200, 239, 520, 400 );
                                RGBForeColor( &tglRgbBlack );
                                RGBBackColor( &tglRgbBlack );
                                PenMode( blend );
                                TextMode( srcOr );
                                TextBox( s, strlen( s ), &r, teJustLeft );
                        */
                        MoveTo( hPos, vPos );
                        vPos += 12;
                        strcpy( tempStr, pC );
                        CtoPstr( tempStr );
                        DrawString( tempStr );
                        pC = strtok( NULL, "\n" );
                        }
                DisposHandle( h );
                }
        }

hotDisposBlock();        /* release memory */

/****************************************************************
 * cleanup
 ****************************************************************/
excCloseFile( fileId );
scrRestoreColors();

}
/* hotBondInvestSum() */
```

hotSheet.c

BEST AVAILABLE COPY

```
/*****************************************************************
 * hotBondProfile
 *****************************************************************
 * Prints out the "Investment Profile" card of the hotsheet (BONDS)
 *****************************************************************/
void hotBondProfile()
{
    Int32T          i;
    Int32T          bondNumber;
    char            cusip_ID[MAX_STRING_LENGTH];
    Rect            r;
    char            s[MAX_STRING_LENGTH];
    char            cellValue[MAX_STRING_LENGTH];
    char            temp[MAX_STRING_LENGTH];
    char            highInt[10];
    char            highFrac[10];
    char            lowInt[10];
    char            lowFrac[10];
    excFileIdT      fileId;
  char          bondTypeFilter;
  char              *fileName;


    /*****************************************************************
     * open excel file
     *****************************************************************/
    /* Check income level and associate with relevant investment data */
    bondTypeFilter = ( varVal( vGrossIncome ) > 50000 ) ? 'M' : 'B';

    excOpenFile( EXCEL_BOND_FILE, &fileId, TRUE );


    /*****************************************************************
     * Find the appropriate BOND by CUSIPID number
     *****************************************************************/
    hotBondFind( fileId, cusip_ID, &bondNumber, excNumRows( fileId ) );

    /*****************************************************************
     * print out the generic information
     *****************************************************************/
    scrSetHueNow( 12 );
    MoveTo( 181, 138 );
    excLookupCell( fileId, bondNumber, BONDNAME_COL, cellValue );
    CtoPstr( cellValue );
    DrawString( cellValue );

    /*
     * Heading info for MMF
     */
    if (!strcmp( varPtr( visitMMF ), "1")) {

        scrSetHueNow( 37 );
        MoveTo( 181, 165 );
        DrawString( "\pSponsor" );

        scrSetHueNow( 35 );
        MoveTo( 200, 185 );
        excLookupCell( fileId, bondNumber, ISSUER_COL, cellValue );
        hotStripQuotes( cellValue );
        CtoPstr( cellValue );
        DrawString( cellValue );
    }

    /*
     * Heading info for bonds
     */
    else {
```

BEST AVAILABLE COPY

```
        scrSetHueNow( 37 );
        MoveTo( 181, 165 );
        DrawString( "\pSecurity Description" );

        scrSetHueNow( 35 );
        MoveTo( 200, 185 );
        excLookupCell( fileId, bondNumber, SEC_BND_DESC, cellValue );
        hotStripQuotes( cellValue );
        CtoPstr( cellValue );
        DrawString( cellValue );
}

/**************************************************************
 * print out the specific information
 **************************************************************/


/*
 * profile info for MMF
 */
if (!strcmp( varPtr( visitMMF ), "1")) {

        scrSetHueNow( 37 );
        MoveTo( 181, 209 );
        DrawString( "\pFund Information" );
        TextSize( 10 );
        scrSetHueNow( 35 );

        MoveTo( 200, 229 );
        excLookupCell( fileId, bondNumber,  YIELD_COL, cellValue );
        hotStripQuotes( cellValue );
        formatNumber( temp, cellValue, MAX_STRING_LENGTH, FALSE, 0, FALSE, '
        sprintf( s, "Yield: %s\%%", temp );
        CtoPstr( s );
        DrawString( s );

        MoveTo( 200, 249 );
        excLookupCell( fileId, bondNumber, MMF_ASSETS_COL, cellValue );
        hotStripQuotes( cellValue );
        formatNumber( temp, cellValue, MAX_STRING_LENGTH, FALSE, 0, FALSE, 'L
        sprintf( s, "Assets (Millions): %s", temp );
        CtoPstr( s );
        DrawString( s );

        MoveTo( 200, 269 );
        excLookupCell( fileId, bondNumber, ANNUAL_FEES_COL, cellValue );
        hotStripQuotes( cellValue );
        formatNumber( temp, cellValue, MAX_STRING_LENGTH, FALSE, 2, TRUE, 'L',
        if ((cellValue[0] == '0') || (cellValue[0] == '.')) {

                sprintf( s, "Annual Fee: 0%s\%%", temp );
        }
        else {

                sprintf( s, "Annual Fee: %s\%%", temp );
        }
        CtoPstr( s );
        DrawString( s );

        MoveTo( 200, 289 );
        excLookupCell( fileId, bondNumber,  AVERAGE_MATURITY_COL, cellValue );
        hotStripQuotes( cellValue );
        sprintf( s, "Average Maturity: %s days", cellValue );
        CtoPstr( s );
        DrawString( s );
```

BEST AVAILABLE COPY

```
        MoveTo( 200, 309 );
        excLookupCell( fileId, bondNumber,  AGE_OF_FUND_COL, cellValue );
        hotStripQuotes( cellValue );
        sprintf( s, "Age of Fund: %s years", cellValue );
        CtoPstr( s );-
        DrawString( s );

        MoveTo( 200, 329 );
        excLookupCell( fileId, bondNumber, CHECK_WRITING_COL, cellValue );
        hotStripQuotes( cellValue );
    sprintf( s, "Check Writing: %s", cellValue );
        CtoPstr( s );
        DrawString( s );
}


/*
 * profile info for bond
 */
else {

        scrSetHueNow( 37 );
        MoveTo( 181, 209 );
        DrawString( "\pInvestment Profile" );
        TextSize( 10 );
        scrSetHueNow( 35 );

        MoveTo( 200, 229 );
        excLookupCell( fileId, bondNumber,  SP_RATE_COL, cellValue );
        hotStripQuotes( cellValue );
        sprintf( s, "Rating: %s", cellValue );
        CtoPstr( s );
        DrawString( s );

        MoveTo( 200, 249 );
        excLookupCell( fileId, bondNumber, COUPON_RT_COL, cellValue );
        hotStripQuotes( cellValue );
        sprintf( s, "Coupon Rate: %s\%%", cellValue );
        CtoPstr( s );
        DrawString( s );

        MoveTo( 200, 269 );
        excLookupCell( fileId, bondNumber, MATUR_DATE_COL, cellValue );
        hotStripQuotes( cellValue );
        hotconvASC_Date( cellValue );
        sprintf( s, "Maturity Date: %s", cellValue );
        CtoPstr( s );
        DrawString( s );

        MoveTo( 200, 289 );
        excLookupCell( fileId, bondNumber,  PAY_DATE_DESC, cellValue );
        hotStripQuotes( cellValue );
        sprintf( s, "Pay Dates: %s", cellValue );
        CtoPstr( s );
        DrawString( s );

        MoveTo( 200, 309 );
        excLookupCell( fileId, bondNumber, CALL_DATE_DESC, cellValue );
        hotStripQuotes( cellValue );
    sprintf( s, "Optional Refunding & Call Dates: %s", cellValue );
        CtoPstr( s );
        DrawString( s );
}


/***************************************************************
 * cleanup
 ***************************************************************/
```

```
    excCloseFile( fileId );
    scrRestoreColors();
}
/* hotBondProfile() */


/*****************************************************************
 * hotBondPerformance
 *****************************************************************
 * Plots line graph of past performance of a stock from data in an
 * Excel spreadsheet
 *****************************************************************/
void hotBondPerformance()
{
    Real80T             maxDataPoint;
    Real80T             deltaPercent;
    Int32T              bondNumber;
    char                cusip_ID[MAX_STRING_LENGTH];
    char                s[MAX_STRING_LENGTH];
    Rect                r;
    Real80T             acceptablePercentages[] =
                        { 100, 200, 250, 300, 350, 400, 500 };
    Int32T              numAcceptablePercentages = 7;
    Int32T              i;
    Int32T              fullPercent;
    Int16T              hPos;
    Int16T              vPos;
    excFileIdT          fileId;
    char                cellValue[MAX_STRING_LENGTH];
    hotChartDataHT      chartDataH;
    Real80T             timeUnitWidth;
    Real80T             dataPointHeight;
  char                  *fileName;
    char                bondTypeFilter;


    /* Check income level and associate with relevant investment data */
    bondTypeFilter = ( varVal( vGrossIncome ) > 50000 ) ? 'M' : 'B';

    /*************************************************************
     * open excel file
     *************************************************************/
    excOpenFile( EXCEL_BOND_FILE, &fileId, TRUE );

    /*************************************************************
     * Find the appropriate BOND by CUSIPID number
     *************************************************************/
    hotBondFind( fileId, cusip_ID, &bondNumber, excNumRows( fileId ) );

    /*************************************************************
     * allocate space for the data points
     *************************************************************/
    chartDataH = (hotChartDataHT)
        NewHandle( excNumRows( fileId ) * sizeof( hotDataPointsT ));

    if (chartDataH == NULL) {
        TGL_ERROR( "Cant allocate data." );
    }

    /*************************************************************
     * transform data collecting information about hi and low
     *************************************************************/
  hotBondTransform (fileId, chartDataH, &maxDataPoint, excNumRows( fileId ) );
  maxDataPoint *= 1.1;            /* provide a little headroom */

    /*************************************************************
     * put in labels
     *************************************************************/
```

BEST AVAILABLE COPY

```
scrSetHueNow( Hues[2] );
MoveTo( 270, 214 );
DrawString( "\pBond Historical Performance" );

/****************************************************************
 * width for 1 time unit is the overall width divided by the number of
 * time units
 ****************************************************************
timeUnitWidth = ((Real80T) (BoundsRect.right - BoundsRect.left)) /
        NUM_BOND_QTRS;

/**************************************************************
 * put in years
 **************************************************************/
for (i = 1983; i < 1990; i++) {
        sprintf( s, "%ld", i );
        CtoPstr( s );
        hPos = (BoundsRect.left - StringWidth( s ) / 2) +
                (i - 1983) * timeUnitWidth * 4;
        MoveTo( hPos, BoundsRect.bottom + 15 );
        scrSetHueNow( Hues[2] );
        DrawString( s );

        /**********************************************************
         * put in line for year
         **********************************************************/
        hPos += StringWidth( s ) / 2;
        MoveTo( hPos, BoundsRect.bottom - 1);
        scrSetHueNow( Hues[4] );
        if (i < 1989)  /* kludge coverage on last line not in line */
                LineTo( hPos, BoundsRect.top );
}

/**************************************************************
 * draw the box that the line graph fits into
 **************************************************************/
scrSetHueNow( Hues[3] );
PenSize(2,2);
FrameRect( &BoundsRect );

/**************************************************************
 * put the names of the bonds on the right of the line graph
 **************************************************************/
dataPointHeight = ((Real80T) (BoundsRect.bottom - BoundsRect.top)) /
        maxDataPoint;
hPos = BoundsRect.right + 10;
/* vPos = BoundsRect.bottom - dataPointHeight * (**chartDataH)[0][25]; */
/* Changed to support the smaller data series in Bonds */

vPos = BoundsRect.bottom - dataPointHeight * (**chartDataH)[0][4];
MoveTo( hPos, vPos );
scrSetHueNow( Hues[0] );

PenSize(1,1);

/**************************************************************
 * put in the vertical tick marks.  Loop through the acceptable
 * percent arrays, until the maximum value divided by the percentage
 * yields less than 7.  Using this value as the percentage difference,
 * plot tick marks.  For instance, if the highest value was 2.43, then
 * the first acceptable percentage would be 0.5 since this produces
 * four tick marks to cover the range from 0 to 2.43.  Tick marks
 * start at the 1.0 value, not at 0.0, and the tick labels are
 * not decimal numbers, but percentages.
 **************************************************************/
deltaPercent = 0;
for (i = 0; i < numAcceptablePercentages; i++) {
        if (maxDataPoint / acceptablePercentages[i] < 7) {
```

BEST AVAILABLE COPY

```
                deltaPercent = acceptablePercentages[i];
                break;
            }
        }
        if (deltaPercent == 0) {
            TGL_ERROR( "No reasonable percentage could be found." );
        }

        /***************************************************************
         * put in the vertical tick marks above 1.000
         ***************************************************************/
        for (i = 1; i < 7; i++) {

            /*********************************************************
             * put in the tick mark
             *********************************************************/
            vPos = BoundsRect.bottom -
                    (i * deltaPercent) * dataPointHeight;
            MoveTo( BoundsRect.left, vPos );
            scrSetHueNow( Hues[4] );
            LineTo( BoundsRect.right - 1, vPos );

            /*********************************************************
             * put in the label
             *********************************************************/
            fullPercent = i * deltaPercent;
            sprintf( s, "%li", fullPercent);

/*          sprintf( s, "%ld, %lf, %li, %lu", fullPercent, fullPercent, fullPercent, fullPerc
        */  CtoPstr( s );
            hPos = BoundsRect.left - StringWidth( s ) - 5;

            vPos += 5;
            MoveTo( hPos, vPos );
            scrSetHueNow( Hues[2] );
            DrawString( s );

        }

        /***************************************************************
         * draw the line graph
         ***************************************************************/
        hotBondGraph( 1, NUM_BOND_QTRS, chartDataH, maxDataPoint, BoundsRect, I

        /***************************************************************
         * clean up
         ***************************************************************/
        excCloseFile( fileId );
        DisposHandle( (Handle) chartDataH );
        scrRestoreColors();

}
/* hotBondPerformance() */


/*******************************************************************
 * hotBondTransform
 *******************************************************************
 * Translates input information about a stock's past performance from
 * an Excel spreadsheet and plots it as a line graph.  Also expects
 * to plot the S&P average on the same line.  Collects the name of
 * the stock to be plotted from the user.
 *
 * Actually, the values plotted are the percent change from the first
 * value.
 *******************************************************************/
void hotBondTransform( fileId, chartDataH, maxDataPointP, numLinesInSpreadsheet )
    excFileIdT              fileId;
```

BEST AVAILABLE COPY

```
        hotChartDataHT          chartDataH;
        Real80PT                maxDataPointP;
        Int32T                        numLinesInSpreadsheet;
{
        Int32T                  line;
        Int32T                  column;
        Int32T                  count;
        Int32T                  i;
        Real80T                 x;
        Real80T                 dummy;
        Real80T                 baseValue;
        Int32T                  bondNumber;
        char                bondName[MAX_STRING_LENGTH];
        char                cellValue[MAX_STRING_LENGTH];

        /* Find the apprpriate bond. User has clicked on */
        hotBondFind( fileId, bondName, &bondNumber, numLinesInSpreadsheet );

        /****************************************************************
         * initialize the maximum data point
         ****************************************************************/
        (*maxDataPointP) = -1;

        /****************************************************************
         * fill in zero values for everything
         ****************************************************************/
        baseValue = 0;
        for (i = 0; i < NUM_BOND_QTRS + 1; i++) {
                (**chartDataH)[0][i] = 0;
                (**chartDataH)[1][i] = 0;
        }

        /****************************************************************
         * collect data for the selected bond
         ****************************************************************/
        count = 0;
        for (column = FIRST_GPRICE_COL; column <= LAST_GPRICE_COL; column++) {

                /**********************************************************
                 * if the value is not numeric then exit
                 **********************************************************.
                excLookupCell( fileId, bondNumber, column, cellValue );

                if ( strlen( cellValue) != strspn( cellValue, "0123456789.," ) ) {
                }
                else {

                        /**************************************************
                         * If the baseValue is 0 then set the baseValue
                         **************************************************.
                        if (baseValue == 0) {
                                baseValue = varAtof( cellValue );
                        }

                        x= varAtof( cellValue );
                        (**chartDataH)[0][count] = x ;  /* / baseValue; */

                        if ((**chartDataH)[0][count] > (*maxDataPointP)) {
                                (*maxDataPointP) = (**chartDataH)[0][count];
                        }
                }

                /* bump the count of values */
                count++;
        }

}
```

hotSheet.c

BEST AVAILABLE COPY

```
/* hotBondTransform() */


/*****************************************************************
 * hotBondFind
 *****************************************************************
 * Translates the name of the chosen bond into a number which can
 * be used to index a row of the spreadsheet
 *****************************************************************/

void hotBondFind( fileId, cusipID, bondNumber, numLinesInSpreadsheet )
	excFileIdT	fileId;
	char		*cusipID;
	Int32PT			bondNumber;
	Int32T			numLinesInSpreadsheet;
{
	Int32T		i;
	char	cellValue[MAX_STRING_LENGTH];

	/*************************************************************
	 * get the bond's name
	 *************************************************************/
	strcpy( cusipID, varPtr( vBondCUSIP ) );

	/*************************************************************
	 * find the bond in the spreadsheet
	 *************************************************************/
	*bondNumber = -1;
	for (i = FIRST_BOND_ROW; i <= numLinesInSpreadsheet; i++) {
		excLookupCell( fileId, i, CUSIP_ID_COL, cellValue );
		if (!strcmp( cellValue, cusipID )) {
			*bondNumber = i;
			break;
		}
	}

	if (*bondNumber == -1) {
		TGL_ERROR( "No such bond." );
	}
}
/* hotBondFind() */


/*******************************************************************
 * hotBondLoad
 *******************************************************************
void hotBondLoad ( void		*pT, Int32T *pBondIndex, Real80T *muniCutoffRate )
{
	Int32T		line;
	Int32T		bondIndex;
	struct		BOND *bondTable;
	Int32T		error;
	excFileIdT	fileId;
	char		cellValue[MAX_STRING_LENGTH];

	bondTable= (struct BOND *) pT;

	excOpenFile( EXCEL_BOND_FILE, &fileId, TRUE );

	/* first get the municipal bond selection cutoff rate */
	hotGetBondVariables( fileId, muniCutoffRate );

	/* start at the first line (that is loaded by the excel loading code) */
	line = 0;
```

BEST AVAILABLE COPY

```
/* now fill up the table */
bondIndex= 0;
do {
      excLookupCell( fileId, line, BOND_TYPE_COL, cellValue );
      bondTable[ bondIndex ].bondType= cellValue[0];

      excLookupCell( fileId, line, S_M_L_COL, cellValue );
      bondTable[ bondIndex ].termSML= cellValue[0];


      /*
       * read in data for MMF's
       */
      if (cellValue[0] == 'F') {

            excLookupCell( fileId, line, SYMBOL_ID_COL, cellValue );
            strncpy( bondTable[ bondIndex ].CUSIP,
                        cellValue, sizeof( bondTable->CUSIP ));

            excLookupCell( fileId, line, BONDNAME_COL, cellValue );
            strncpy( bondTable[ bondIndex ].nameOfIssue,
                        cellValue, sizeof( bondTable->nameOfIssue  ));

            excLookupCell( fileId, line, ISSUER_COL, cellValue );
            strncpy( bondTable[ bondIndex ].issuer,
                        cellValue, sizeof( bondTable->issuer  ));

            excLookupCell( fileId, line, YIELD_COL, cellValue );
            strncpy( bondTable[ bondIndex ].yieldToMaturity,
                        cellValue, sizeof( bondTable->yieldToMaturity  ));

            excLookupCell( fileId, line, ANNUAL_FEES_COL, cellValue );
            strncpy( bondTable[ bondIndex ].annualFees,
                        cellValue, sizeof( bondTable->annualFees  ));

            excLookupCell( fileId, line, MMF_ASSETS_COL, cellValue );
            strncpy( bondTable[ bondIndex ].assets,
                        cellValue, sizeof( bondTable->assets  ));

            excLookupCell( fileId, line, AVERAGE_MATURITY_COL, cellValue );
            strncpy( bondTable[ bondIndex ].averageMaturity,
                        cellValue, sizeof( bondTable->averageMaturity  ));

            excLookupCell( fileId, line, AGE_OF_FUND_COL, cellValue );
            strncpy( bondTable[ bondIndex ].ageOfFund,
                        cellValue, sizeof( bondTable->ageOfFund  ));

            excLookupCell( fileId, line, CHECK_WRITING_COL, cellValue );
            strncpy( bondTable[ bondIndex ].checkWriting,
                        cellValue, sizeof( bondTable->checkWriting  ));

            excLookupCell( fileId, line, MMF_MIN_PURCH_AMT_COL, cellValue );
            strncpy( bondTable[ bondIndex ].minInitial,
                        cellValue, sizeof( bondTable->minInitial  ));

            excLookupCell( fileId, line, MMF_MIN_INCR_PUR_COL, cellValue );
            strncpy( bondTable[ bondIndex ].minIncrement,
                        cellValue, sizeof( bondTable->minIncrement  ));

            strncpy( bondTable[ bondIndex ].offeringPrice,
                        "1", sizeof( bondTable->offeringPrice  ));
      }


      /*
       * read in data for real bonds
       */
```

BEST AVAILABLE COPY

```
        else {

                excLookupCell( fileld, line, CUSIP_ID_COL, cellValue );
                strncpy( bondTable[ bondIndex ].CUSIP,
                        cellValue, sizeof( bondTable->CUSIP ));

                excLookupCell( fileld, line, BONDNAME_COL, cellValue );
                strncpy( bondTable[ bondIndex ].nameOfIssue,
                        cellValue, sizeof( bondTable->nameOfIssue ));

                excLookupCell( fileld, line, SP_RATE_COL, cellValue );
                strncpy( bondTable[ bondIndex ].spRating,
                        cellValue, sizeof( bondTable->spRating ));

                excLookupCell( fileld, line, OFFER_RATE_COL, cellValue );
                strncpy( bondTable[ bondIndex ].offeringPrice,
                        cellValue, sizeof( bondTable->offeringPrice ));

                excLookupCell( fileld, line, PAR_VAL_COL, cellValue );
                strncpy( bondTable[ bondIndex ].parValue,
                        cellValue, sizeof( bondTable->parValue ));

                excLookupCell( fileld, line, MATUR_DATE_COL, cellValue );
                strncpy( bondTable[ bondIndex ].maturityDate,
                        cellValue, sizeof( bondTable->maturityDate ));

                excLookupCell( fileld, line, COUPON_RT_COL, cellValue );
                strncpy( bondTable[ bondIndex ].couponRate,
                        cellValue, sizeof( bondTable->couponRate ));

                excLookupCell( fileld, line, YIELD_2_MAT_COL, cellValue );
                strncpy( bondTable[ bondIndex ].yieldToMaturity,
                        cellValue, sizeof( bondTable->yieldToMaturity ));

                excLookupCell( fileld, line, MIN_PURCH_AMT_COL, cellValue );
                strncpy( bondTable[ bondIndex ].minInitial,
                        cellValue, sizeof( bondTable->minInitial ));

                excLookupCell( fileld, line, MIN_INCR_PUR_COL, cellValue );
                strncpy( bondTable[ bondIndex ].minIncrement,
                        cellValue, sizeof( bondTable->minIncrement ));
        }


        line++;
        bondIndex++;

        } while( line <= excNumRows( fileld ) && bondIndex < MAXBOND );

    *pBondIndex= bondIndex;

    excCloseFile( fileld );
}
/* hotBondLoad() */


/** ************************************************************************
 * hotconvASC_Date - Converts a string "10/4/89" to "Oct. 4, 1959".
 *
 * ***********************************************************************/
void hotconvASC_Date( dte_str )
char *dte_str;
{
    char mm[3], dd[3], yy[3];
    char  mms[4], yys[5];
    static char *mons[] =
    {"Jan", "Feb", "Mar", "Apr", "May", "Jun", "Jul", "Aug", "Sep", "Oct", "Nov", "D
```

BEST AVAILABLE COPY

```
        /* Token out */
        strcpy(mm, strtok(dte_str, "/"));
        strcpy(dd, strtok(NULL, "/"));
        strcpy(yy, strtok(NULL, NULL));

        /* Assume from 1989 onwards - century (end) */
    if (atoi(yy) >= 89 && atoi(yy) <= 99)
      sprintf(yys, "19%s", yy);
    else
              sprintf(yys, "20%s", yy);

    /* Build final string */
        sprintf(dte_str, "%s %s, %s", mons[atoi(mm) - 1], dd, yys);

}/*  hotconvASC_Date() */

/*******************************************************************
 * hotBondGraph
 *******************************************************************
 * Plots the data in the chartData table into a line graph.  Different
 * measures are plotted in different colors
 *
 * numMeasures is the number of separate series which need to be plotted
 * numDataPoints is the number of values for each measure.  ChartData
 * is the data to be plotted, with data in 1 row for each measure.
 * BoundsRect is the rectangle into which the entire chart is supposed
 * to fit.  Hues is a table of colors, one per measure.
 *******************************************************************/
void hotBondGraph( numMeasures, numDataPoints, chartData, maxDataPoint, bound
        Int32T                  numMeasures;
        Int32T                  numDataPoints;
        hotChartDataHT  chartData;
        Real80T                 maxDataPoint;
        Rect            boundsRect;
        Int32T                  hues[MAX_HOT_NUM_MEASURES];
{
        Int32T          i;
        Int32T          j;
        Int16T          hPos;
        Int16T          vPos;
        PenState    state;
        Real80T         timeUnitWidth;
        Real80T         dataPointHeight;

        /*******************************************************************
         * save the pen size
         *******************************************************************
        GetPenState( &state );

        /*******************************************************************
         * width for 1 time unit is the overall width divided by the number of
         * time units
         *******************************************************************
        timeUnitWidth = ((Real80T) (boundsRect.right - boundsRect.left)) /
                numDataPoints;

        /*******************************************************************
         * height for 1 data point is the overall height divided by the value
         * of the maximum datapoint in any bar
         *******************************************************************
        dataPointHeight = ((Real80T) (boundsRect.bottom - boundsRect.top)) /
                maxDataPoint;

        /*******************************************************************
         * do each measure
         *******************************************************************
        for (i = 0; i < numMeasures; i++) {
```

```
        /*************************************************************
         * set the color (also happens to set pen size )
         *************************************************************/
        scrSetHueNow( hues[i] );

        /*************************************************************
         * Move to the first point of the line graph:  somewhere above the
         * center of the first time unit
         *************************************************************
        hPos = boundsRect.left + timeUnitWidth / 2;
        vPos = boundsRect.bottom - (**chartData)[i][0] * dataPointHeight;
        MoveTo( hPos, vPos );

        /*************************************************************
         * march from left to right
         *************************************************************
        for (j = 1; j < numDataPoints; j++) {

            /*********************************************************
             * draw a line to the next point
             *********************************************************
            hPos = boundsRect.left + (j-1) * timeUnitWidth;
            vPos = boundsRect.bottom -
                (**chartData)[i][j] * dataPointHeight;

            /*********************************************************
             * skip "no trade" values but draw lines for everything else (don't
             draw line to first point, though)
             *********************************************************
            if ((**chartData)[i][j] == 0 || j<=1 || (**chartData)[i][j-1] == 0 ) {
                MoveTo( hPos, vPos );
            }
            else {
                LineTo( hPos, vPos );
            }

        }
    }

    RGBForeColor( &tglRgbBlack );
    RGBBackColor( &tglRgbWhite );

    /*****************************************************************
     * reset the pen size
     *****************************************************************/
    PenSize( state.pnSize.h, state.pnSize.v );

}
/* hotBondGraph() */

/*********************************************************************
hotGlossary() -- look up word in glossary file, then display entry on screen
*********************************************************************
void hotGlossary( char *term )
{
    char            *s;
    char            *pC;
    char            tempStr[MAX_STRING_LENGTH];
    Int16T              hPos;
    Int16T              vPos;
    Handle              hSnip;
    FontInfo        info;
    Int32T              i;

    /* load glossary */
```

```
hotBlksLoad( /* GLOSSARY_FILE */ "glossary.text" );

/* find term */
s = hotBlkGet( term );
if( s == NULL )
      TGL_ERROR( "Glossary text not found" );

/* get to text */
pC = strtok( s, "\r\n" );

/*
if first line of text is a string of the form ##string##, then assume the
string is a snipname, and display the snip.  Otherwise, display the text.
*/
i= sscanf( pC, "##%[^#]##", tempStr );
if( i == 1 )
      {
      hSnip= libFindPicPtr( tempStr, TRUE );
      grfMDrawPic( hSnip, NULL, 0 );
      }
else
      {

      hPos = 145;
      vPos = 106;

      /* write first line BOLD */
      scrSetHueNow( 85 );
      GetFontInfo( &info );

      MoveTo( hPos, vPos );
      vPos += info.ascent + info.descent + info.leading;
      strcpy( tempStr, pC );
      CtoPstr( tempStr );
      DrawString( tempStr );
      pC = strtok( NULL, "\n" );

      /* now write body of text */
      scrSetHueNow( 86 );
      GetFontInfo( &info );

      while (pC != NULL)
            {
            MoveTo( hPos, vPos );
            vPos += info.ascent + info.descent + info.leading;;
            strcpy( tempStr, pC );
            CtoPstr( tempStr );
            DrawString( tempStr );
            pC = strtok( NULL, "\n" );
            }
      }

/* release memory */
hotDisposBlock();
scrRestoreColors();

}     /* hotGlossary */

void hotPrice2Fract ( char *dest, char *decValue )
      {
      char   *theChar;

      theChar = strchr ( decValue, '.' ) +1;

      switch ( *theChar )                    /* skip the decimal point, as in : 0.125 */
          {
          case ( '1' )   :     strcpy ( dest, "1/8" ); break;
          case ( '2' )   :     strcpy ( dest, "1/4" ); break;
```

BEST AVAILABLE COPY

```
        case ( '3' )    :       strcpy ( dest, "3/8" ); break;
        case ( '5' )    :       strcpy ( dest, "1/2" ); break;
        case ( '6' )    :       strcpy ( dest, "5/8" ); break;
        case ( '7' )    :       strcpy ( dest, "3/4" ); break;
        case ( '8' )    :       strcpy ( dest, "7/8" ); break;
        default                 :       strcpy ( dest, "-" ); break;
        }
    }

/**************************************************************************
get the values of the variables that are set in the STOCKS.TEXT spreadsheet
**************************************************************************/
void hotGetStockVariables ( excFileldT fileld )
    {
    extern Int32T       hotLastDataYear;
    extern Int32T       hotLastDataQuarter;

    static BooleanT alreadyGot = FALSE;

    char cellValue[MAX_STRING_LENGTH], error[MAX_STRING_LENGTH];
    Int32T numLinesInSpreadsheet;
    int i, j;

    /* Haven't I seen you here before? */
    if ( alreadyGot ) return;

    /* look through the spreadsheet for variables */
    numLinesInSpreadsheet = excNumRows( fileld );
    for (i = 0; i <= numLinesInSpreadsheet; i++)
        {
        /* see if this line is a variable */
        excLookupCell( fileld, i, VARIABLE_TYPE_COL, cellValue );
        if ( toupper(cellValue[0]) == 'V' )
            {
            /* get and capitalize the variable name */
            excLookupCell( fileld, i, VARIABLE_NAME_COL, cellValue );
            for (j = 0; cellValue[j] != '\0'; j++) cellValue[j] = toupper(cellValue[j]);

            /* compare it to the ones we expect, and set ours if it matches */
            if ( strcmp( "LASTDATAYEAR", cellValue ) == 0 )
                {
                excLookupCell( fileld, i, VARIABLE_VALUE_COL, cellValue );
                hotLastDataYear = atoi( cellValue );
                continue;
                }

            if ( strcmp( "LASTDATAQUARTER", cellValue ) == 0 )
                {
                excLookupCell( fileld, i, VARIABLE_VALUE_COL, cellValue );
                hotLastDataQuarter = atoi( cellValue );
                continue;
                }

            sprintf( error, "Unrecognized excel variable: '%s'", cellValue );
            TGL_ERROR( error );
            }
        }

    /* and don't come back */
    alreadyGot = TRUE;
    }

/**************************************************************************
get the values of the variables that are set in the BONDS.TEXT spreadsheet
**************************************************************************/
void hotGetBondVariables ( excFileldT fileld,  Real80T *muniCutoffRate )
```

BEST AVAILABLE COPY

```
{
static BooleanT alreadyGot = FALSE;

char cellValue[MAX_STRING_LENGTH], error[MAX_STRING_LENGTH];
Int32T numLinesInSpreadsheet;
int i, j;

/* Haven't I seen you here before? */
if ( alreadyGot ) return;

/* look through the spreadsheet for variables */
numLinesInSpreadsheet = excNumRows( fileId );
for (i = 0; i <= numLinesInSpreadsheet; i++)
    {
    /* see if this line is a variable */
    excLookupCell( fileId, i, VARIABLE_TYPE_COL, cellValue );
    if ( toupper(cellValue[0]) == 'V' )
        {
        /* get and capitalize the variable name */
        excLookupCell( fileId, i, VARIABLE_NAME_COL, cellValue );
        for (j = 0; cellValue[j] != '\0'; j++) cellValue[j] = toupper(cellValue[j]);

        /* compare it to the ones we expect, and set ours if it matches */
        if ( strcmp( "MUNICUTOFF", cellValue ) == 0 )
            {
            excLookupCell( fileId, i, VARIABLE_VALUE_COL, cellValue );
            *muniCutoffRate = varAtof( cellValue );
            continue;
            }

        sprintf( error, "Unrecognized excel variable: '%s'", cellValue );
        TGL_ERROR( error );
        }
    }

/* and don't come back */
alreadyGot = TRUE;
}

/* ---------------------------------------------
 * ---------------------------------------------
 *
 *                Export Intro Graph Data
 *
 * ---------------------------------------------
 * ---------------------------------------------*/

/************************************************************************
get the values of the variables that are set in the BONDS.TEXT spreadsheet
************************************************************************
void hotGetIntroVariables ( excFileIdT fileId, Int16T *introEndYear )
    {
    static BooleanT alreadyGot = FALSE;

    char cellValue[MAX_STRING_LENGTH], error[MAX_STRING_LENGTH];
    Int32T numLinesInSpreadsheet;
    int i, j;

    /* Haven't I seen you here before? */
    if ( alreadyGot ) return;

    /* look through the spreadsheet for variables */
    numLinesInSpreadsheet = excNumRows( fileId );
    for (i = 0; i <= numLinesInSpreadsheet; i++)
        {
        /* see if this line is a variable */
        excLookupCell( fileId, i, VARIABLE_TYPE_COL, cellValue );
```

BEST AVAILABLE COPY

```
        if ( toupper(cellValue[0]) == 'V' )
            {
            /*  get and capitalize the variable name  */
            excLookupCell( fileId, i, VARIABLE_NAME_COL, cellValue );
            for (j = 0; cellValue[j] != '\0'; j++) cellValue[j] = toupper(cellValue[j]);

            /*  compare it to the ones we expect, and set ours if it matches  */
            if ( strcmp( "ENDYEAR", cellValue ) == 0 )
                {
                excLookupCell( fileId, i, VARIABLE_VALUE_COL, cellValue );
                *introEndYear = atoi( cellValue );
                continue;
                }

            sprintf( error, "Unrecognized excel variable: '%s'", cellValue );
            TGL_ERROR( error );
            }
        }

    /*  and don't come back  */
    alreadyGot = TRUE;
    }


/*  this is where the data for each series starts  */
#define CPI_ROW 2
#define BANK_ROW 8
#define INCOME_ROW 14
#define SMOOTH_INCOME_ROW 20
#define GROWTH_ROW 26

void hotIntroLoad( char *fileName,
                   Int16T *introEndYear,
                   Real80T *introCPIAmounts,
                   Real80T *introBankAmounts,
                   Real80T *introIncomeAmounts,
                   Real80T *introSmoothIncomeAmounts,
                   Real80T *introGrowthAmounts,
                   Int16T *firstValidQuarter,
                   Int16T maxQuarters )
    {
    static BooleanT beenHereBefore = FALSE;
    Int32T          row, col, quartersRead;
    Int32T          error;
    excFileIdT   fileId;
    char         cellValue[MAX_STRING_LENGTH];

    if (beenHereBefore) return;
    beenHereBefore = TRUE;

    excOpenFile( fileName, &fileId, FALSE );  /*  no version specific data  */

    /*  find the first quarter for which we have data  */
    for (row = 3; row >= 0; row--)
        {
        excLookupCell( fileId, CPI_ROW + row, 1, cellValue );
        if ( atoi( cellValue ) != 0 ) break;
        }
    *firstValidQuarter = row;

    /*  now read in the numbers for each quarter  */
    quartersRead = 0;

    /*  go through the columns left to right  */
    for ( col = 1; quartersRead < maxQuarters; col++ )

        /*  go through the rows bottom to top (3 to 0)  */
        /*  (start at the first valid quarter (determined above) in the first column)  *
```

```
for ( row = ( ( col == 1 ) ? *firstValidQuarter : 3 );
    row >= 0 && quartersRead < maxQuarters; row --)
      {
      /* CPI */
      excLookupCell( fileId, CPI_ROW + row, col, cellValue );
      introCPIAmounts[quartersRead] = varAtof( cellValue );

      /* bank */
      excLookupCell( fileId, BANK_ROW + row, col, cellValue );
      introBankAmounts[quartersRead] = varAtof( cellValue );

      /* income */
      excLookupCell( fileId, INCOME_ROW + row, col, cellValue );
      introIncomeAmounts[quartersRead] = varAtof( cellValue );

      /* smooth income */
      excLookupCell( fileId, SMOOTH_INCOME_ROW + row, col, cellValue
      introSmoothIncomeAmounts[quartersRead] = varAtof( cellValue );

      /* growth */
      excLookupCell( fileId, GROWTH_ROW + row, col, cellValue );
      introGrowthAmounts[quartersRead] = varAtof( cellValue );

      /* we have read a quarter */
      quartersRead++;
      }

hotGetIntroVariables( fileId, introEndYear );

excCloseFile( fileId );
}
```

BEST AVAILABLE COPY

```
#include    "standard.h"
#include    "glue.h"
#define     APP_ADTERM
#include    "varFns.h"
#include    "tglMain.h"
#include    "libLibrary.h"
#include    "excExcelRead.h"
#include    "hotSheet.h"
#include    "grfGraphics.h"
#include    "scrScreen.h"
#include    "introGraph.h"
#include    "format.h"

/*------------------------------------------------------------------*/
/* definitions */

#define MAX_QUARTERS        121

#define CPI                 1
#define BANK                2
#define INCOME              3
#define SMOOTH_INCOME       4
#define GROWTH                  5
#define YEARS               10
#define YEARS_PLUS          11
#define YEARS_MINUS         12

#define SHADOW              0
#define OVERLAY             1

/*------------------------------------------------------------------*/
/* variables global to all files */

/*------------------------------------------------------------------*/
/* variables global to this file */
static Int16T       introFirstValidQuarter;
static Int16T       introEndYear;
static Int16T       introEndQuarter;

static Real80T      *introCPIAmounts                = NULL;
static Real80T      *introBankAmounts               = NULL;
static Real80T      *introIncomeAmounts             = NULL;
static Real80T      *introSmoothIncomeAmounts       = NULL;
static Real80T      *introGrowthAmounts             = NULL;

static unsigned char introShadowValues[255];

/* shadow and original window pointers */
static CWindowPtr       introOriginalPCWindow;      /* the one that we came here v
static PixMapHandle     introOriginalHPixMap;
static CGrafPtr         introShadowPPort;           /* the one we draw on */
static PixMapHandle     introShadowHMap;

static Real80T maxGraphPoint30, maxGraphPoint15;


/*------------------------------------------------------------------*/
void introShadowInit ( void );
void introShadowInit ( void )
    {
    register Int16T         index;
    RGBColor                rgb;

    for ( index = 0; index <= 255; index++ )
        {
        /*    convert to rgb */
        Index2Color(index, &rgb);
```

```
        /* drop the value by 3/16  */
        rgb.red *= .8125;
        rgb.blue *= .8125;
        rgb.green *= .8125;

        /*     get the new index  */
        introShadowValues[index] = Color2Index(&rgb);
        }
    }

/*-----------------------------------------------------------------------*/
void introInitialize ( void )
    {
    /* initialize: */
    /* this ought to be done at beginning of session, */
    /* so data lies undisturbed at bottom of heap */
    Ptr                                     p = 0;
    extern Real80T     *introCPIAmounts;
    extern Real80T     *introBankAmounts;
    extern Real80T     *introIncomeAmounts;
    extern Real80T     *introSmoothIncomeAmounts;
    extern Real80T     *introGrowthAmounts;


    if ( introCPIAmounts != NULL )                    { TGL_FATAL_ERROR( "introIni
NULL" ); }
        introCPIAmounts =                             (Real80T*) NewPtr((Int32T) size
MAX_QUARTERS);
    if ( introCPIAmounts == NULL )                    { TGL_FATAL_ERROR( "memory

    if ( introBankAmounts != NULL )           { TGL_FATAL_ERROR( "introInitialize:
}
        introBankAmounts =                            (Real80T*) NewPtr((Int32T) size
MAX_QUARTERS);
    if ( introBankAmounts == NULL )           { TGL_FATAL_ERROR( "memory alloc.

    if ( introIncomeAmounts != NULL )         { TGL_FATAL_ERROR( "introInitialize:
}
        introIncomeAmounts =                          (Real80T*) NewPtr((Int32T) size
MAX_QUARTERS);
    if ( introIncomeAmounts == NULL )         { TGL_FATAL_ERROR( "memory alloc.

    if ( introSmoothIncomeAmounts != NULL ) { TGL_FATAL_ERROR( "introInitialize:
}
        introSmoothIncomeAmounts =            (Real80T*) NewPtr((Int32T) sizeof(Real
MAX_QUARTERS);
    if ( introSmoothIncomeAmounts == NULL ) { TGL_FATAL_ERROR( "memory alloca

    if ( introGrowthAmounts != NULL )         { TGL_FATAL_ERROR( "introInitialize:
}
        introGrowthAmounts =                          (Real80T*) NewPtr((Int32T) size
MAX_QUARTERS);
    if ( introGrowthAmounts == NULL )         { TGL_FATAL_ERROR( "memory alloc.

    /* create the offscreen pixamp for shadows (640 x 480) */
    introShadowPPort                          = (CGrafPort*) NewPtr( sizeof(CGrafP
    OpenCPort( introShadowPPort );
    introShadowHMap                                   = introShadowPPort->portPixM
    p                                                 = NewPtr( TGL_cSCREEN_BYTES
    (*introShadowHMap)->baseAddr       = p;
    (*introShadowHMap)->rowBytes       = 0x800C | 640;
    (*introShadowHMap)->bounds                 = tglScreenRect;
    introShadowPPort->portPixMap       = introShadowHMap;

    /* initialize the offscreen pixmap  */
    SetPort( (GrafPtr) introShadowPPort );
```

BEST AVAILABLE COPY

```
        RGBForeColor( &tglRgbBlack );
        RGBBackColor( &tglRgbWhite );

        /*  initialize our local shadow table  */
        introShadowInit();
        }


/*-------------------------------------------------------------------------*/
void introUseShadowScreen ( void );
void introUseShadowScreen ( void )
        {
        extern CWindowPtr       introOriginalPCWindow;      /*  the one that we came
        extern PixMapHandle     introOriginalHPixMap;
        extern CGrafPtr         introShadowPPort;               /*  the one we dra
        extern PixMapHandle     introShadowHMap;

        /*  remember what we came here with  */
        introOriginalPCWindow = tglMyCWindow;
        introOriginalHPixMap = tglHCurPixMap;

        /*  draw to our own offscreen pixmap  */
        SetPort( (GrafPtr) introShadowPPort );
        }


/*-------------------------------------------------------------------------*/
void introUseOriginalScreen ( void );
void introUseOriginalScreen ( void )
        {
        extern CWindowPtr       introOriginalPCWindow;      /*  the one that we came
        extern PixMapHandle     introOriginalHPixMap;
        extern CGrafPtr         introShadowPPort;               /*  the one we dra
        extern PixMapHandle     introShadowHMap;

        /*  reset the global screen pointers to what we came here with  */
        tglMyCWindow = introOriginalPCWindow;
        tglHCurPixMap = introOriginalHPixMap;

        /*  draw to our own offscreen pixmap  */
        SetPort( (GrafPtr) tglMyCWindow );
        }


/*-------------------------------------------------------------------------*/
void introCombineScreen ( Rect bounds, int combinationType );
void introCombineScreen ( Rect bounds, int combinationType )
        {
        extern PixMapHandle     introOriginalHPixMap;
        extern PixMapHandle     introShadowHMap;
        extern unsigned char introShadowValues[255];

        register unsigned char *introShadows = introShadowValues;
        Int32T                              row, topLeftOffsetSource, topLeftOffsetTar
                                            bytesPerSourceRow,bytesPerTargetRow,
                                            width, clutIndex, temp;
        unsigned char                   *sourceLineStart, *targetLineStart;

        #ifdef NO_ASM
        register
        #endif
        unsigned char       *source, *target, *rowEnd;

        /*  get the number of bytes per row for the screen pixmaps  */
        bytesPerSourceRow = ( 0x0FFF & ((*introShadowHMap)->rowBytes));
        bytesPerTargetRow = ( 0x0FFF & ((*introOriginalHPixMap)->rowBytes));

        /*  make a pointer to the top left of the boundry for each screen  */
```

BEST AVAILABLE COPY

```
topLeftOffsetSource = bounds.left + bounds.top * bytesPerSourceRow;
source =
sourceLineStart = (unsigned char *) ((*introShadowHMap)->baseAddr     + topLef
topLeftOffsetTarget = bounds.left + bounds.top * bytesPerTargetRow;
target =
targetLineStart = (unsigned char *) ((*introOriginalHPixMap)->baseAddr + topLef

/*  figure out the width of the rectangle  */
width = (bounds.right - bounds.left);

/*  move down the rows of the rectangle  */
for ( row = bounds.top; row < bounds.bottom; row++ )
        {
        /*  figure out where we stop  */
        rowEnd = source + width;

        /*  move across bytes in each row  */
        /*  (this whole loop is duplicated to prevent many checks of shadow boolea
        if ( combinationType == SHADOW )
                {
                #ifdef NO_ASM

                        while ( source < rowEnd )
                                {
                                /* if the source is not white replace this pixel with it's ow

                                if ( *source != 0x00 )
                                        *target = introShadows[*target];

                                /*  move on to the next pixel/byte  */
                                source++;  target++;
                                }
                #else

                        asm {
                                /*  get the variables that we need into registers  */
                                clr.l    d1                                  ; D1 = (long)
                                move.l          source,a0                    ; A0 = sourc
                                move.l          target,a1                    ; A0 = targe
                                clr.l    d0                                  ; D0 = (long)
                                move.l          rowEnd,d0                    ; D0 = rowEr
                                sub.l   a0,d0                                ; D0 -= sourc

                                ; check a byte until we're done or we're at a long word b

                                ; don't shadow it if the source is white
                        @1      cmpi.b          #0,(a0)
                                beq             @2

                                ; get the value of the destination pixel into data register
                                move.b  (a1),d1

                                ; move the entry of the shadow table (at index d1) to the
                                move.b          (introShadows,d1.l),(a1)

                                ; end of line test
                        @2      addi   #1,a0
                                addi   #1,a1
                                subq.l          #1,d0
                                bgt             @1
                                }

                #endif
                }
        else
                {
                #ifdef NO_ASM
```

BEST AVAILABLE COPY

```
                while ( source < rowEnd )
                    {
                    /*  If the source is not white replace this pixel with the o

                    if ( *source != 0x00 )
                        *target = *source;

                    /*  move on to the next pixel/byte  */
                    source++;  target++;
                    }

            #else

                asm {
                    /*  get the variables that we need into registers  */
                    move.l      source,a0                       ; A0 = pSrc
                    move.l      target,a1                       ; A0 = pDst
                    clr.l   d0                                  ; D1 = (long
                    move.l      rowEnd,d0                       ; D0 = pSrcF
                    sub.l   a0,d0                               ; D0 -= pSrc

                    ; check a byte until we're done or we're at a long word l

                    ; don't copy it if the source is white
                @10 cmpi.b      #0,(a0)
                    beq         @20

                    move.b      (a0),(a1)


                    ; end of line test
                @20 addi  #1,a0
                    addi  #1,a1
                    subq.l      #1,d0
                    bgt         @10
                    }

            #endif
            }

        /* advance down one row */
        source = sourceLineStart += bytesPerSourceRow;
        target = targetLineStart += bytesPerTargetRow;
        }
    }

/*------------------------------------------------------------------------*/
void introOverlayScreen ( Rect bounds );
void introOverlayScreen ( Rect bounds )
    {
    introCombineScreen ( bounds, OVERLAY );
    }


/*------------------------------------------------------------------------*/
void introShadowScreen ( Rect bounds );
void introShadowScreen ( Rect bounds )
    {
    introCombineScreen ( bounds, SHADOW );
    }

#define SHADE           0x10000
#define END_CIRCLE      0x20000
#define END_CIRCLE_RADIUS 3
/*------------------------------------------------------------------------*/
void introDrawLine ( int years, int index, Real80T *data, int shadowOffset,
                    BooleanT endSpot, BooleanT shade, BooleanT endCircle,
```

```
                    char *label, Rect bounds );
void introDrawLine( int years, int index, Real80T *data, int shadowOffset,
                    BooleanT endSpot, BooleanT shade, BooleanT endCircle,
                    char *label, Rect bounds )
    {
    extern Real80T maxGraphPoint30, maxGraphPoint15;
    static RGBColor colorOflabels =     { 8738, 8738, 8738 };
    register int i;
    Real80T     pixelsPerQuarter, pixelsPerDollar;
    register Real80T dollarsThisQuarter, *fastData, thisQuartersPixel;
    Rect endCircleRect;
    int shadowOffsetHalves = shadowOffset / 2;

    pixelsPerDollar = ( bounds.bottom - bounds.top ) /
            ( 1000.0 * ( ( years == 15 ) ? maxGraphPoint15 : maxGraphPoint30 ) );
    pixelsPerQuarter = (Real80T) ( bounds.right -  bounds.left ) /
            ( (Real80T) index );
    dollarsThisQuarter = 1000.0;

    /*  draw the shade if necessary  */
    if ( shade )
        {
        RgnHandle shadeRegion;

        shadeRegion = NewRgn();
        OpenRgn();

        thisQuartersPixel = bounds.left;
        MoveTo( bounds.left, bounds.bottom );
        LineTo( thisQuartersPixel,
                    bounds.bottom -
            dollarsThisQuarter * pixelsPerDollar + shadowOffset );

        fastData = data + (index - 1);
        if ( shadowOffset == 0 )
            for ( i = index - 1; i > 0; i-- )
                {
                dollarsThisQuarter *= *fastData;
                fastData--;
                thisQuartersPixel += pixelsPerQuarter;
                LineTo( thisQuartersPixel,
                            bounds.bottom -
                    dollarsThisQuarter * pixelsPerDollar );

                }
        else
            for ( i = index - 1; i > 0; i-- )
                {
                dollarsThisQuarter *= *fastData;
                fastData--;
                thisQuartersPixel += pixelsPerQuarter;
                LineTo( thisQuartersPixel + shadowOffsetHalves,
                            bounds.bottom -
                    dollarsThisQuarter * pixelsPerDollar + shadowOffset );

                }
        dollarsThisQuarter *= *fastData;
        LineTo( bounds.right, bounds.bottom -
            dollarsThisQuarter * pixelsPerDollar + shadowOffset );
        LineTo( bounds.right, bounds.bottom );
        LineTo( bounds.left, bounds.bottom );
        CloseRgn( shadeRegion );

        /*  we don't care about the color since this is only used to shadow  */
        PaintRgn( shadeRegion );
        DisposeRgn( shadeRegion );
        }
```

BEST AVAILABLE COPY

```
/* draw the line */
thisQuartersPixel = bounds.left;
dollarsThisQuarter = 1000.0;
MoveTo( thisQuartersPixel,
        bounds.bottom -
      dollarsThisQuarter * pixelsPerDollar + shadowOffset );

fastData = data + (index - 1);
if ( shadowOffset == 0 )
    for ( i = index - 1; i > 0; i-- )
        {
        dollarsThisQuarter *= *fastData;
        fastData--;
        thisQuartersPixel += pixelsPerQuarter;
        LineTo( thisQuartersPixel,
                bounds.bottom -
            dollarsThisQuarter * pixelsPerDollar );
        }
else
    for ( i = index - 1; i > 0; i-- )
        {
        dollarsThisQuarter *= *fastData;
        fastData--;
        thisQuartersPixel += pixelsPerQuarter;
        LineTo( thisQuartersPixel + shadowOffsetHalves,
                bounds.bottom -
            dollarsThisQuarter * pixelsPerDollar + shadowOffset );
        }
dollarsThisQuarter *= *fastData;
thisQuartersPixel += pixelsPerQuarter;
LineTo( bounds.right - 1,
        bounds.bottom -
      dollarsThisQuarter * pixelsPerDollar + shadowOffset );

/* draw a circle at the end of the line */
if ( endCircle )
    {
    TGL_SETRECT( &endCircleRect,
            bounds.right - END_CIRCLE_RADIUS - 1 + shadowOffsetHalves,
        bounds.bottom -
            dollarsThisQuarter * pixelsPerDollar +
            shadowOffset - END_CIRCLE_RADIUS + 2,
        bounds.right + END_CIRCLE_RADIUS - 1 + shadowOffsetHalves,
        bounds.bottom -
            dollarsThisQuarter * pixelsPerDollar +
            shadowOffset + END_CIRCLE_RADIUS + 2
        );
    PaintOval( &endCircleRect );
    }

/* put up a label */
if ( label[0] != '\0' )
    {
    scrSetHueNow( 1001 );
    RGBForeColor( &colorOflabels );
    MoveTo( bounds.right + 9,
     bounds.bottom -
        dollarsThisQuarter * pixelsPerDollar +
        shadowOffset + (( label[0] == 'C' ) ? 5 : -1 ) );
  drawstring( label );

  if ( label[0] != 'C' )
    {
        char amountString[20];

      sprintf( amountString, "%d", (int16T) dollarsThisQuarter );
        formatNumber( amountString, amountString, 20, FALSE, 0, FALSE, 'L',
        MoveTo( bounds.right + 9,
```

BEST AVAILABLE COPY

```
                bounds.bottom -
                dollarsThisQuarter * pixelsPerDollar +
                shadowOffset + 9 );
               drawstring( amountString );
               }
          }
     }


/*-------------------------------------------------------------------------*/
void introDrawEndYears ( Int16T years, Rect bounds );
void introDrawEndYears ( Int16T years, Rect bounds )
     {
     extern Real80T maxGraphPoint30, maxGraphPoint15;
     Real80T     pixelsPerDollar;

     extern Int16T      introFirstValidQuarter;
     extern Int16T      introEndYear;
     static char *quarters[] = { "1st", "2nd", "3rd", "4th" };
     static RGBColor colorOfTics = { 30583, 30583, 30583 };
     static Int16T lastYears = 0;
     static char leftYearLabel[10], righttYearLabel[10],
            leftQuarterLabel[10], righttQuarterLabel[10];
     Real80T ticPosition, ticIncrement;
     int i;

     /* draw the end year labels in the boxes */

     /* left year */
     MoveTo( bounds.left - 20, bounds.bottom + 22 );
     scrSetHueNow( 1000 );
     if ( lastYears != years )
          sprintf( leftYearLabel, "%d", introEndYear - years );
     drawstring( leftYearLabel );

     /* left quarter */
     MoveTo( bounds.left - 18, bounds.bottom + 32 );
     scrSetHueNow( 1001 );
     /* (don't do expensive sprintfs if we have them from last time) */
     if ( lastYears != years )
          sprintf( leftQuarterLabel, "%s qtr", quarters[introFirstValidQuarter] );
     drawstring( leftQuarterLabel );

     /* right year */
     MoveTo( bounds.right - 12, bounds.bottom + 22 );
     scrSetHueNow( 1000 );
     if ( lastYears != years )
          sprintf( righttYearLabel, "%d", introEndYear );
     drawstring( righttYearLabel );

     /* right quarter */
     MoveTo( bounds.right - 11, bounds.bottom + 32 );
     scrSetHueNow( 1001 );
     if ( lastYears != years )
          sprintf( righttQuarterLabel, "%s qtr", quarters[introFirstValidQuarter] );
     drawstring( righttQuarterLabel );

     /* put up the $1000 tic mark if this is a 15 year graph */
     if ( years == 15 )
          {
          pixelsPerDollar = ( bounds.bottom - bounds.top ) /
                    ( 1000.0 * maxGraphPoint15 );
          RGBForeColor( &colorOfTics );
          PenSize ( 3, 3 );
          MoveTo( bounds.left, bounds.bottom - ( ( int ) 1000.0 * pixelsPerDollar ) + 1
          LineTo( bounds.left + 3, bounds.bottom - ( ( int ) 1000.0 * pixelsPerDollar ) +
          }
```

```
/* remember this call's years so we can tell next time if we already have sprintf'e
lastYears = years;
}

/*---------------------------------------------------------------------------*/
void introDrawLabels ( Int16T years, Rect bounds, Int16T highlightYear );
void introDrawLabels ( Int16T years, Rect bounds, Int16T highlightYear )
	{
	extern Int16T		introFirstValidQuarter;
	extern Int16T		introEndYear;
	static char *quarters[] = { "1st", "2nd", "3rd", "4th" };
	static RGBColor colorOfTics = { 30583, 30583, 30583 };
	static char labels[15][10];
	static Int16T lastYears = 0;
	Real80T ticPosition, ticIncrement;
	register int i, thisLabel = 0;

	/* first draw the end ones in the boxes */
	introDrawEndYears( years, bounds );

	/* now draw the intermediate ones */
	ticIncrement = ( bounds.right - bounds.left ) / years;
	ticPosition = bounds.left;
	PenSize( 2, 2 );
	for ( i = years; i >= 0; i-- )
		{
		/* draw the tic mark */
		RGBForeColor( &colorOfTics );
		MoveTo( (Int16T) ticPosition, bounds.bottom + 4 );
		LineTo( (Int16T) ticPosition, bounds.bottom + 7 );

		/* only show the half-decade year labels on the 30 year graph */
		if ( ! ( years == 30 && i % 5 != 0 ) )
			{
			/* draw the year label if there's room */
			if ( ticPosition-bounds.left > 30 && bounds.right-ticPosition > 30 )
				{
				if ( highlightYear == introEndYear - i - 1900 ) scrSetHueNow( 1
				else scrSetHueNow( 1021 );

				/* don't do expensive sprintfs if we have them from last time
				if ( lastYears != years )
					sprintf( labels[thisLabel], "%d", introEndYear - i - 1900 ;

				MoveTo( (Int16T) ticPosition - stringwidth(labels[thisLabel])/2,
					bounds.bottom + 22 );
				drawstring( labels[thisLabel++] );
				}
			}

		/* calculate our next position */
		ticPosition += ticIncrement;
		}

	/* kludge: draw the 30th year's tic mark */
	if ( years == 30 )
		{
		RGBForeColor( &colorOfTics );
		MoveTo( bounds.right, bounds.bottom + 4 );
		LineTo( bounds.right, bounds.bottom + 7 );
		}

	/* remember this call's years so we can tell next time if we already have sprintf'e
	lastYears = years;
	}
```

BEST AVAILABLE COPY

```
/*-----------------------------------------------------------------------*/
void introDrawElement ( int yearScale, int32T line, Rect bounds, int overlayOrShadow );
void introDrawElement ( int yearScale, int32T line, Rect bounds, int overlayOrShadow )
	{
	static RGBColor colorOfCPI =   { 17476, 17476, 1747F };
	static RGBColor colorOfBank =         { 00000, 34952, 00000 };
	static RGBColor colorOfIncome = { 00000, 00000, 56797 };
	static RGBColor colorOfGrowth = { 65535, 26214, 00000 };
	extern Real80T      *introCPIAmounts;
	extern Real80T      *introBankAmounts;
	extern Real80T      *introIncomeAmounts;
	extern Real80T      *introSmoothIncomeAmounts;
	extern Real80T      *introGrowthAmounts;
	extern Int16T       introFirstValidQuarter;
	extern Int16T       introEndYear;
	extern Int16T       introEndQuarter;
	int shadowOffset, thisQuartersIndex;
	BooleanT isOverlay;

	isOverlay = overlayOrShadow == OVERLAY;
	shadowOffset = isOverlay ? 0 : ( ( line & SHADE ) != 0 ) ? 0 : 3;

	switch ( line & 0xffff )
		{
		case CPI:
			/* never draw a shadow under CPI */
			if ( ! isOverlay ) break;

			RGBForeColor( &colorOfCPI );
			PenSize ( 2, 2 );
			thisQuartersIndex = yearScale * 4;
			introDrawLine( yearScale, thisQuartersIndex, introCPIAmounts,
					shadowOffset,
					FALSE, ( line & SHADE ) != 0,
					FALSE, isOverlay ? "CPI" : "", bounds );
			break;

		case BANK:
			RGBForeColor( &colorOfBank );
			PenSize ( 3, 3 );
			thisQuartersIndex = yearScale * 4;
			introDrawLine( yearScale, thisQuartersIndex, introBankAmounts,
					shadowOffset,
					TRUE, isOverlay ? 0 : ( line & SHADE ) != 0,
					TRUE, isOverlay ? "Bank" : "", bounds );
			break;

		case INCOME:
			RGBForeColor( &colorOfIncome );
			PenSize ( 3, 3 );
			thisQuartersIndex = yearScale * 4;
			introDrawLine( yearScale, thisQuartersIndex, introIncomeAmounts,
					shadowOffset,
					TRUE, ( line & SHADE ) != 0,
					TRUE, isOverlay ? "Income" : "", bounds );
			break;

		case SMOOTH_INCOME:
			RGBForeColor( &colorOfIncome );
			PenSize ( 3, 3 );
			thisQuartersIndex = yearScale * 4;
			introDrawLine( yearScale, thisQuartersIndex, introSmoothIncomeAm
					shadowOffset,
					TRUE, ( line & SHADE ) != 0,
					TRUE, isOverlay ? "Income" : "", bounds );
			break;

		case GROWTH:
```

```
            RGBForeColor( &colorOfGrowth );
            PenSize ( 3, 3 );
            thisQuartersIndex = yearScale * 4;
            introDrawLine( yearScale, thisQuartersIndex, introGrowthAmounts,
                    shadowOffset,
                    TRUE, ( line & SHADE ) != 0,
                    TRUE, isOverlay ? "Growth" : "", bounds );
            break;

        case YEARS_MINUS:
            /*  never draw a shadow under labels  */
            if ( ! isOverlay ) break;
            introDrawEndYears( yearScale, bounds );

            break;

        case YEARS:
            /*  never draw a shadow under labels  */
            if ( ! isOverlay ) break;
            introDrawLabels( yearScale, bounds, 0 );

            break;

        case YEARS_PLUS:
            /*  never draw a shadow under labels  */
            if ( ! isOverlay ) break;
            introDrawLabels( yearScale, bounds, (line >> 16) & 0xffff );

            break;
        }
    }

/*----------------------------------------------------------------------*/
introGetMaxGraphPoints ( void );
introGetMaxGraphPoints ( void )
    {
    extern Real80T      *introGrowthAmounts;
    extern Real80T maxGraphPoint30, maxGraphPoint15;
    int i;
    Real80T this, max;

    /*  loop through growth because it will always contain the highest point  */

    /*  15 year max  */
    this = 1.0;
    max = -1.0;
    for ( i = 15 * 4 - 1; i >= 0; i-- )
        {
        this *= introGrowthAmounts[i];
        if ( this > max ) max = this;
        }
    maxGraphPoint15 = max;

    /*  30 year max  */
    this = 1.0;
    max = -1.0;
    for ( i = 30 * 4 - 1; i >= 0; i-- )
        {
        this *= introGrowthAmounts[i];
        if ( this > max ) max = this;
        }
    maxGraphPoint30 = max;
    }

/*----------------------------------------------------------------------*/
void introDrawGraph ( char *description )
    {
```

BEST AVAILABLE COPY

```
extern Real80T      *introGrowthAmounts;
static Rect    wholeScreenRect = { 0, 0, 480, 640 };
static Rect    boundryRect = { 75, 86, 333, 553 };
char *thisDescriptor;
int this, lastThis, i, years;
Int32T  descriptors[20];
static BooleanT alreadyLoaded = FALSE;

/*  get our data from the spreadsheet  */
if ( ! alreadyLoaded )
        {
        hotIntroLoad("Intro.Text",
                        &introEndYear,
                        introCPIAmounts,
                        introBankAmounts,
                        introIncomeAmounts,
                        introSmoothIncomeAmounts,
                        introGrowthAmounts,
                        &introFirstValidQuarter,
                        MAX_QUARTERS );

        /*  get our maximum multiplier  */
        introGetMaxGraphPoints();

        /*  don't do it twice  */
        alreadyLoaded = TRUE;
        }

/*  get our descriptors  */
this = 0;
thisDescriptor = strtok( description, " \t," );

/*  first descriptor is the span of years  */
descriptors[this++] = atoi( thisDescriptor );
if ( descriptors[0] != 15 && descriptors[0] != 30 )
    TGL_ERROR( "drawIntroGraph: must be 15 or 30 years" );

/*  get the next one  */
thisDescriptor = strtok( NULL, " \t," );

while ( thisDescriptor != NULL )
        {
        for (i = 0; thisDescriptor[i] != '\0'; i++ )
                thisDescriptor[i] = toupper(thisDescriptor[i]);

        if     ( strcmp( "CPI",        thisDescriptor ) == 0 )
                descriptors[this++] = CPI;
        else if ( strcmp( "CPI+SHADE",    thisDescriptor ) == 0 )
                descriptors[this++] = CPI | SHADE;
        else if ( strcmp( "BANK",        thisDescriptor ) == 0 )
                descriptors[this++] = BANK;
        else if ( strcmp( "BANK+SHADE",   thisDescriptor ) == 0 )
                descriptors[this++] = BANK | SHADE;
        else if ( strcmp( "INCOME",      thisDescriptor ) == 0 )
                descriptors[this++] = INCOME;
        else if ( strcmp( "SMOOTHINCOME", thisDescriptor ) == 0 )
                descriptors[this++] = SMOOTH_INCOME;
        else if ( strcmp( "GROWTH",      thisDescriptor ) == 0 )
                descriptors[this++] = GROWTH;
        else if ( strcmp( "YEARS-",      thisDescriptor ) == 0 )
                descriptors[this++] = YEARS_MINUS;
        else if ( strcmp( "YEARS",       thisDescriptor ) == 0 )
                descriptors[this++] = YEARS;
        else if ( strncmp( "YEARS+",   thisDescriptor, 6 ) == 0 )
                descriptors[this++] = YEARS_PLUS | ( atol( thisDescriptor+6 ) << 16 ) ;
        else TGL_ERROR( "drawIntroGraph: unrecognized line to draw" );

        /*  get the next one  */
```

BEST AVAILABLE COPY

```
        thisDescriptor = strtok( NULL, " \t," );
        }
    lastThis = this;

    /* use our shadow screen */
    introUseShadowScreen();

    /* draw a lighter shade if there's a CPI+SHADE descriptor */
    for ( i = 1; i < lastThis; i++ )
        if ( descriptors[i] == ( CPI | SHADE ) )
            {
            Int16T savedShade;

            RGBBackColor( &tglRgbWhite );
            EraseRect( &wholeScreenRect );
            introDrawElement( descriptors[0], CPI | SHADE,
                    boundryRect, OVERLAY ); /* pretend its an overlay (no shift

            /* set the lighter shadow color that we need for this shade, then unset
            savedShade = introShadowValues[248]; introShadowValues[248] = 86;
            introShadowScreen( wholeScreenRect );
            introShadowValues[248] = savedShade;

            /* just draw the line from now on */
            descriptors[i] = CPI;
            break;
            }

    /* draw our shadows */
    RGBBackColor( &tglRgbWhite );
    EraseRect( &wholeScreenRect );
    for ( i = 1; i < lastThis; i++ )
        introDrawElement( descriptors[0], descriptors[i],
                boundryRect, SHADOW );
    introShadowScreen( wholeScreenRect );

    /* draw our overlays */
    RGBBackColor( &tglRgbWhite );
    EraseRect( &wholeScreenRect );
    for ( i = 1; i < lastThis; i++ )
        introDrawElement( descriptors[0], descriptors[i],
                boundryRect, OVERLAY );
    introOverlayScreen( wholeScreenRect );

    /* clean up */
    introUseOriginalScreen();
    RGBForeColor( &tglRgbBlack );
    RGBBackColor( &tglRgbWhite );
}
```

```
 * label handling
 */

#ifdef THINK_C

        /* macheaders */

#else

                #include        <types.h>
                #include        <memory.h>
                #include        <palette.h>
                #include        <quickdraw.h>
                #include        <toolutils.h>
                #include        <fonts.h>
                #include        <events.h>
                #include        <windows.h>
                #include        <dialogs.h>
                #include        <menus.h>
                #include        <desk.h>
                #include        <textedit.h>
                #include        <scrap.h>
                #include        <segload.h>
                #include        <packages.h>
                #include        <String.h>
                #include        <stdio.h>
                #include        <CType.h>
                #include        <Math.h>
                #include        <printing.h>
                #include        <setjmp.h>

        #pragma segment Seg1

#endif

#include "standard.h"
#include "tglMain.h"
#include "varFns.h"
#include "glue.h"
#include "lblLabel.h"

/* this is our table entry structure */
typedef struct LblLabelEntry
        {
        char    label[MAXLABELLEN];
        Int32T          tag;
        Boolean         breakAt;
        struct          CMDREC *pEvent;
        } LblLabelEntryT;

/* this points to a dynamically allocated table of LblLabelEntryT */
static LblLabelEntryT *lblLabelTable = NULL;

/* this always points to the next available slot in the above table */
static Int32T lblLastEntry = 0;

Boolean lblBreakSet = FALSE;

LblLabelEntryT *lblGetLabelStructure( char *label );

/*************************************************************************
        Initialize()
*************************************************************************/
void lblInitialize ( void )
        {

        /* we wouldn't wont to reallocate for a new file, without giving
```

BEST AVAILABLE COPY

```
 * back what we had for the last file, right? */
if (lblLabelTable != NULL) {
        DisposPtr( (Ptr) lblLabelTable);
        lblLabelTable = NULL;
        lblLastEntry = 0;
}

/* create the table for all labels */
lblLabelTable = (LblLabelEntryT *)
    NewPtr( (Int32T) (MAXLABEL * sizeof(LblLabelEntryT)));
if(lblLabelTable == NULL ) TGL_FATAL_ERROR( "lbl Init: label table allocation fail
}

/*************************************************************************
*
        EnterLabel()
*************************************************************************
/
Int32T lblEnterLabel (char *label, char *offset)
    {
    extern Int32T lblLastEntry;
    char errorString[80];

    /* exit with an error if the label has already been defined */
    if (lblLookupLabel(label) != ((char *) NULL))
        {
        sprintf(errorString, "'%s' already defined.", label);
        TGL_ERROR( errorString );
        return(0);
        }

    /* exit with an error if we overrun the table */
    if (lblLastEntry >= MAXLABEL)
        {
        TGL_FATAL_ERROR("EnterLabel: label table overflow");
        return(0);
        }
    else
        {
        /* otherwise add this label entry and fill it */
        strncpy(lblLabelTable[lblLastEntry].label, label, MAXLABELLEN - 1);
        if (strlen(label) >= MAXLABELLEN - 1)
            lblLabelTable[lblLastEntry].label[MAXLABELLEN - 1] = '\0';
        lblLabelTable[lblLastEntry].tag = lblGetTag(label);
        lblLabelTable[lblLastEntry].breakAt = FALSE;
        lblLabelTable[lblLastEntry].pEvent = (struct CMDREC*) offset;
        lblLastEntry++;
        return(1);
        }
    }
/*************************************************************************
*
        LookupLabel()
*************************************************************************
/
char *lblLookupLabel (char *label)
  {
  extern LblLabelEntryT *lblLabelTable;
    extern Int32T lblLastEntry;
    register Int32T tempTag, fastLast;
  register LblLabelEntryT *fastTable;

  /* we can't find a null label */
    if (! label[0]) return((char *) NULL);

    /* calculate the tag for the label that we are looking for */
```

```
        tempTag = lblGetTag(label);

        /*  use register variables for speed in the loop  */
        fastTable = lblLabelTable;
        fastLast = lblLastEntry;

        /*  do the string compare only if the tags match  */
        for (; fastLast; fastLast--)
          {
          if (fastTable->tag == tempTag)
              if (strncmp(fastTable->label, label, MAXLABELLEN) == 0)
                    return((char *) fastTable->pEvent);
          fastTable++;
          }

        /*  we can't find it  */
        return((char *) NULL);
        }


/*************************************************************************
***
        lblGetTag() -- return the tag for a given variable name
*************************************************************************
/
int32T lblGetTag (char *string)
        {
        register int32T i, tempTag;
        register char *fastString;

        fastString = string;
        tempTag = 0;
        for (i = MAXLABELLEN - 1; i && *fastString; i--)
                {
                tempTag += *fastString;
                fastString++;
                }

        return(tempTag);
        }


LblLabelEntryT *lblGetLabelStructure( char *label )
{
   extern LblLabelEntryT *lblLabelTable;
        extern int32T lblLastEntry;
        register int32T tempTag, fastLast;
   register LblLabelEntryT *fastTable;
   char      error[50];
   Boolean found = FALSE;

   /*  we can't find a null label  */
        if (! label[0]) {
              TGL_ERROR( "Can't find empty label" );
        }

        /*  calculate the tag for the label that we are looking for  */
        tempTag = lblGetTag(label);

        /*  use register variables for speed in the loop  */
        fastTable = lblLabelTable;
        fastLast = lblLastEntry;

        /*  do the string compare only if the tags match  */
        for (; fastLast; fastLast--) {
           if (fastTable->tag == tempTag) {
                if (strncmp(fastTable->label, label, MAXLABELLEN) == 0) {
                        return (fastTable);
```

BEST AVAILABLE COPY

```
        fastTable++;
    }

    return (NULL);
}

/******************************************************************************
 * lblBreakAt modifies the label table to mark a particular label as a break
 * point.  When anyone hits this label, the program goes into single step mode
 ******************************************************************************/
void lblBreakAt( char *label )
{
  LblLabelEntryT *lP;
  char        error[50];

    lP = lblGetLabelStructure( label );

    /*  we can't find it  */
    if (lP == NULL) {
        sprintf( error, "Can't find label: '%s.'", label );
        TGL_ERROR( error );
    }

    lP->breakAt = !lP->breakAt;
    lblBreakSet = TRUE;
}

Boolean lblIsBreakpoint( char *label )
{
  LblLabelEntryT *lP;
  char        error[50];

    lP = lblGetLabelStructure( label );

    /*  we can't find it  */
    if (lP == NULL) {
        sprintf( error, "Can't find label: '%s.'", label );
        TGL_ERROR( error );
    }

    return( lP->breakAt );
}
```

BEST AVAILABLE COPY

```
 * File libLibrary.c
 */

#include     "standard.h"
#include     "glue.h"
#include     "tglMain.h"
#include     "scnScan.h"
#include     "fileAccess.h"

#define      EXTGEN
#include     "libLibrary.h"

#define HACKED_NUMBER     1

/* ------------------------------------------------------------------ */
typedef struct {
        Int32T              tag;
        char          name[32];
        Int32T              FATId;
        Int32T              libId;
        }      libTagT, *libTagPT;

/* ------------------------------------------------------------------ */
libTagPT     tagsP = NULL;
Int32T             numTags = 0;
static             Int32T        CheckMarkedItem = -1;


/* ------------------------------------------------------------------ */
Int16T        libstrcmp( char **s1, char **s2 );
Int32T        libGetTag (char *string);
void   libAddNewTags( Handle libDataH, Int32T libId );
Int16T        libSortTags( libTagPT tagA, libTagPT tagB );
void   libAddLibrary( char *libName );
void   libHighlightBuildMenu( void );
void   libDeleteLibraries( void );


/***************************************************************************
 *
 * libAddLibToList adds a new library to the lis of libraries in libApLib
 
***************************************************************************
/
void libAddLibToList( char *libName, Int16T vRefNum, Handle libData )
{
        Int16T        oldIndex;
        Int16T        newIndex;
        Int32T        i;
        Boolean       duplicateName = FALSE;

        /*
         * see if the library is already in the list
         */
        newIndex = libLibIndex;
        for (i = 0; i < MaxLib; i++) {
                if (!strcmp( libName, libApLib[i].libName )) {
                        newIndex = i;
                        duplicateName = TRUE;
                        break;
                }
        }

        if( newIndex < MaxLib ) {

                libAddNewTags( libData, newIndex );
                libApLib[newIndex].libData      = libData;
```

BEST AVAILABLE COPY

```
		libApLib[newIndex].vRefNum    = vRefNum;
		strcpy( libApLib[newIndex].libName, libName );
		libListSnips( libApLib[newIndex].libData,
			&libApLib[newIndex].snipNames,
			&libApLib[newIndex].numSnips );
		oldIndex = libCurrentLibIndex;
		libCurrentLibIndex = newIndex;
		if (!duplicateName) {
			libLibIndex++;
			libAddLibrary( libName );
		}
		libHighlightBuildMenu();

	}
	else {
		scnScanError( "Too many open Libraries", libName );
	}
}


#ifdef NEVER_USED
/************************************************************************
*
 LoadPicLib()
 New function.  Read in the data for an open picture library.  Do it by successive calls to
 GetPicHandle() alias GetPicPtr().
 Accepts magic cookie for the library.  Doesn't return anything.  Does the best it can;
*************************************************************************
/
void	libLoadPicLib( hLibInfo )
	Handle hLibInfo;
{

	Int32T			i, imax;
	libInfoT		*pLibInfo;
	libFatT		*pFAT;
	Int16T			refnumLibFile;
	Int32T			lcBytes;
	Int16T			bErrors = FALSE;
	OSErr			ErrCode;
	char			temp[255];


		/* Lock the movable memory area containing pointer to: file name, FPrefix
		/* Don't leave this block without unlocking hLib */
		/* MoveHHi( hLibInfo );  *hmh* don't want stuff in high heap */
		HLock( (Handle) hLibInfo );

		/* Dereference the handle to get pointers into the now locked block */
		pLibInfo = (libInfoT *) *hLibInfo;
		imax = pLibInfo->fp.PixNum;

		/* Now see if we can open the library file */

		ErrCode = fsopen( filePrependDir ( temp, FILE_LIBS_DIR,
					&(pLibInfo->szLibName[0])), 0, &refnumLibFile );
		if( ErrCode )
			{
			/* File open failed */
			bErrors = TRUE;
			}
		else
			{
			/* File is open.  Don't leave this block without closing it */


			/* Go through the FAT entries and read in the snip dat a for each one
			pFAT = (libFatT *) ( (*hLibInfo) + sizeof( libInfoT ) );
```

BEST AVAILABLE COPY

```
    for( i = 0; i < imax; ++i, ++pFAT )
    {
        /* Next FAT entry */

        /* See if the data need to be read in */
        if( pFAT->hSnip == NULL )
        {
            /* Need to be read in */

            /* Allocate space */
            if( ( pFAT->hSnip = NewHandle( pFAT->SnipSize ) ) == N
            {
                /* Allocation failed */

                TGL_FATAL_ERROR( "getPicHandle() allocation fa
                bErrors = TRUE;
            }
            else
            {
                /* We got the space */

                /* Don't leave this block without releasing pFAT->
*/

                /* Position file to read snip data */
                ErrCode = SetFPos( refnumLibFile, fsFromStart, pF

                /* Lock down the destination */
                /* Assert: pFAT->hSnip is a valid handle */
                HLock( (Handle) pFAT->hSnip );

                /* pFAT->hSnip is locked.  Don't leave this block w

                lcBytes = pFAT->SnipSize;
                /* Read the data */
                ErrCode = FSRead( refnumLibFile,
                                  &lcBytes,
                                  *(pFAT->hSnip)
                                  );

                if( lcBytes != pFAT->SnipSize )
                {
                    /* Read failed somehow */

                    bErrors = TRUE;
                }

                HUnlock( pFAT->hSnip );

                /* If there was a problem, free the space */
                if( bErrors )
                {
                    DisposHandle( pFAT->hSnip );
                    pFAT->hSnip = NULL;
                    bErrors = FALSE;
                }
            }
        }
        /* Either the data for this snip were already in or have been re
        /* Loop back for the next FAT entry */
    }
    /* End of for loop */

    /* Done with file: close it */
    ErrCode = FSClose( refnumLibFile );
}
```

liblibrary.c

BEST AVAILABLE COPY

```
        HUnlock( hLibInfo );

        return;

} /* end LoadPicLib */
#endif

/***********************************************************************
*
 OpenPicLib()
 Modified function.  Read in the index, but not the data, of the named picture library.
 Returns magic cookie for the library.  Make it a handle so index is movable.
 To load the data, use LoadPicLib()
***********************************************************************
/
Handle      libOpenPicLib( Int16T vRefNum, char *LibName, Boolean prepend )
{
    Int16T      refnumLibFile;
    Int32T      cBytes;
    Int32T      AllPicSize;
    Handle      hPicInfo;
    Ptr         pPicInfo;
    OSErr       ErrCode;
    libInfoT    PicInfo;
    Int32T      n;
    libFatT *pFAT;
    char  temp[255];

    if (prepend) {

        ErrCode = fsopen( filePrependDir ( temp, FILE_LIBS_DIR, LibName),
              vRefNum, &refnumLibFile );
    }

    else {

        ErrCode = fsopen( LibName, vRefNum, &refnumLibFile );

    }
    if( /* ErrCode */ refnumLibFile == 0 )
        return( NULL );

    /* move library file prefix and FAT to RAM */

    /* First, we have to figure out how big the FAT is */
    cBytes = sizeof( struct libFPrefix );
    ErrCode = FSRead( refnumLibFile, &cBytes, (Ptr) &PicInfo.fp );

    /* Verify that this is indeed a library file */
    if( PicInfo.fp.Signature != libLibSignature ||
        PicInfo.fp.Version > libSysVersion
     )
    {
        ErrCode = FSClose( refnumLibFile );
        return( NULL );
    }




    GetEOF( refnumLibFile, &AllPicSize );


    /* Allocate enough (moveable) space for file name pointer, file prefix, and FAT */
    cBytes = sizeof( libInfoT ) + AllPicSize - PicInfo.fp.FATstart;
```

BEST AVAILABLE COPY

```
        hPicInfo= NewHandle( cBytes );
        if( hPicInfo == NULL )
        {
                TGL_FATAL_ERROR( "getPicHandle() allocation failed" );
                ErrCode = FSClose( refnumLibFile );
                return( NULL );
        }


        /* Lock it down */
        HLock( (Handle) hPicInfo );
        /* Dereference it to get actual pointer to space */
        pPicInfo = *hPicInfo;

        /* Fill in the file name */
        strcpy( &(((libInfoT *) pPicInfo)->szLibName[0]), LibName );

        /* Reread file prefix -- this time into allocated space */
        ErrCode = SetFPos( refnumLibFile, fsFromStart, 0L );
        cBytes = sizeof( struct libFPrefix );
        ErrCode = FSRead( refnumLibFile, &cBytes, pPicInfo + LIBNAMEMAXCHARS );

        /* Read FAT entries */
        ErrCode = SetFPos( refnumLibFile, fsFromStart, PicInfo.fp.FATstart );
        cBytes = AllPicSize  - PicInfo.fp.FATstart;
        ErrCode = FSRead( refnumLibFile,
                        &cBytes,
                        pPicInfo + sizeof( libInfoT )
                        );

        /* Done with file: close it */
        ErrCode = FSClose( refnumLibFile );

        pFAT = (libFatT *) ( pPicInfo + sizeof( libInfoT ) );

        /* set all initial snip handles to NULL (even though they are 0 in file) */
        for( n = 0; n < PicInfo.fp.PixNum; ++n, ++pFAT )
                {
                pFAT->hSnip = NULL;


                }

        /*
         * add this library to the list of libraries
         */
        libAddLibToList( LibName, vRefNum, hPicInfo );

        /* Unlock this block */
        HUnlock( hPicInfo );

        return( hPicInfo );         /* hPicInfo is a magic cookie */
}

/************************************************************************
*
        ClosePicLib()
*************************************************************************
/
void libClosePicLib( hLib )
        Handle hLib;
{
        int32T                          i, imax;
        libInfoT                *pLibInfo;
        libFatT         *pFAT;
```

```
/* The file is already closed, all we need to do is release memory */

/* Lock the movable block containing pointer to file name, libFPrefix and FATs */
HLock( (Handle) hLib );
/* Dereference the handle to get pointers into the now locked block */
pLibInfo = (libInfoT *) *hLib;
imax = pLibInfo->fp.PixNum;



pFAT = (libFatT *) ( *hLib + sizeof( libInfoT ) );

/* Release memory blocks allocated to individual snips */
for( i = 0; i < imax; i++ )
{
        if( pFAT->hSnip != NULL )
                DisposHandle( pFAT->hSnip );
        ++pFAT;
}

/* Unlock */
HUnlock( hLib );
DisposHandle( hLib );
return;
}

/***********************************************************************
*
        GetPicRect()
        Now that GetPicHandle() alias GetPicPtr returns a handle rather than a SQZPTR, th
        needs to do a bit more.
************************************************************************
/
void libGetPicRect( hSnip, pRect )
        Handle hSnip;
        Rect *pRect;
{
        libSQZPictPT        PicPtr;

        /* Don't need to lock the handle because assignment statements can't cause move
        PicPtr = (libSQZPictPT) *hSnip;
        pRect->top= PicPtr->dst.top;
        pRect->bottom= PicPtr->dst.bottom;
        pRect->left= PicPtr->dst.left;
        pRect->right= PicPtr->dst.right;
        return;
}


/***********************************************************************
*
        GetPicHandle() alias GetPicPtr()
        If the named snip is not in memory at this time, read it in.
        The way to find out is to look at the hSnip.  If it is NULL, the snip is not in memory
        Otherwise, it is (or was), and hSnip is the handle to the memory area containing tl
        If the value pointed to by the hSnip is NULL, then the snip data was purged and it
        reloaded again.
        Returns magic cookie that is the handle to the memory area containing the snip d
        Eventually, PurgeFlag will have three values
                RETAIN          Meaning the handle should be marked NoPurge
                RELEASE         Meaning the handle should be marked Purge
                NOCHANGE        Meaning don't mess with the Purge/NoPurge status of th
************************************************************************
/
Handle     libGetPicHandle( Handle hLib, Int16T vRefNum, char *PicName, Int32T Purge
{
        #ifndef THINK_C
                #pragma unused (PurgeFlag)
```

```
#endif
Int32T          i, imax;
libInfoT        *pLibInfo;
libFatT     *pFAT;
Int16T          refnumLibFile;
Int32T          lcBytes;
Int16T          bErrors = FALSE;
OSErr           ErrCode;
Handle          h;
char            temp[255];

if( PicName[0] == '\0' ) return( NULL );


/* Lock the movable memory area containing pointer to file name, libFPrefix and
/* Don't leave this block without unlocking hLib */
/* MoveHHi( hLib ); *hmh* I don't want stuff high in the heap */
HLock( (Handle) hLib );
/* Dereference the handle to get pointers into the now locked block */
pLibInfo = (libInfoT *) *hLib;
imax = pLibInfo->fp.PixNum;


pFAT = (libFatT *) ( *hLib + sizeof( libInfoT ) );

for( i = 0; i < imax; ++i, ++pFAT )
{

    if(!strcmp( PicName, &pFAT->SnipName[0] ))
    {
        /* Found FAT entry for this snip */

        /* See if the data need to be read in */
        if( ( pFAT->hSnip && *(pFAT->hSnip) == NULL )
         || pFAT->hSnip == NULL )
        {
            /* Data need to be read in */

            /* There are two cases: */
            if( pFAT->hSnip == NULL )
            {
                /* Handle has not yet been allocated to this snip */
                /* Allocate one now of the appropriate size */
                if( ( pFAT->hSnip = NewHandle( pFAT->SnipSize ) ) == NU
                {
                    /* Allocation failed */
                    TGL_FATAL_ERROR( "getPicHandle() allocation fai

                    bErrors = TRUE;
                }
                else
                {
                    /* Mark as not purgeable */
                    HNoPurge( pFAT->hSnip );
                }
            }
            else
            {

                /* Handle exists and points to NULL pointer.  Data was p
                /* Allocate a new relocatable block of the appropriate si
                ReallocHandle( pFAT->hSnip, pFAT->SnipSize );
                if( MemError() == memFullErr || MemError() == memWZE
                {
```

```
            /* Reallocation failed */

            TGL_FATAL_ERROR( "getPicHandle() allocation fa
            bErrors = TRUE;
        }
        else
        {
            /* Mark as not purgeable */
            HNoPurge( pFAT->hSnip );
        }
}
/* If the handle points to a non-NULL pointer, try to read data
If( *(pFAT->hSnip) )
{
        /* See if we can open the file */

        /* Don't leave this block without releasing pFAT->hSnip

        if (prepend) {

            ErrCode = fsopen( filePrependDir ( temp, FILE_LIE
                &(pLibInfo->szLibName[0])), vRefNum, &ref
        }
        else {

            ErrCode = fsopen( &(pLibInfo->szLibName[0]), vRe

        }
        if( ErrCode )
        {
            /* File open failed */

            bErrors = TRUE;
        }
        else
        {
            /* File is open.  Don't leave this block without clos

            /* Position file to read snip data */
            ErrCode = SetFPos( refnumLibFile, fsFromStart, pF

            /* Lock down the destination */
            /* Assert: pFAT->hSnip is a valid handle */
            HLock( (Handle) pFAT->hSnip );

            /* pFAT->hSnip is locked.  Don't leave this block w

            lcBytes = pFAT->SnipSize;
            /* Read the data */
            ErrCode = FSRead( refnumLibFile,
                              &lcBytes,
                              *(pFAT->hSnip)
                              );

            If( lcBytes != pFAT->SnipSize )
            {
                /* Read failed somehow */

                bErrors = TRUE;
            }

            HUnlock( pFAT->hSnip );

            /* Done with file: close it */
            ErrCode = FSClose( refnumLibFile );
        }
        if( bErrors )
        {
```

BEST AVAILABLE COPY

```
                        DisposHandle( pFAT->hSnip );
                        pFAT->hSnip = NULL;
                    }
                }
            }
            /* Leave the for loop.  We found the snip and either it was already *
            /* in memory or we tried to read it in.                        */
            break;
        }
        /* Name not found yet, keep going */
    }
    /* End of for loop.  See if we failed to find the desired snip name */
    if( ! ( i < imax ) )
    {

        bErrors = TRUE;
    }

    h = pFAT->hSnip;
    HUnlock( hLib );

    if( bErrors )
    {

        return( NULL );
    }
    else
    {

        return( h );
    }

} /* end GetPicHandle */


/*********************************************************************
*
    ReleasePic()
    We don't need the named snip in the library corresponding to the magic cookie
**********************************************************************
/
void  libReleasePic( hLib, PicName)
      Handle hLib;
      char *PicName;
{
      Int32T              i, imax;
      libInfoT          *pLibInfo;
      libFatT      *pFAT;

      if( ! *PicName ) return;

      /* Lock the movable memory area containing pointer to file name, libFPrefix anc
      /* Don't leave this block without unlocking hLib */
      HLock( (Handle) hLib );
      /* Dereference the handle to get pointers into the now locked block */
      pLibInfo = (libInfoT *)  *hLib;
      imax = pLibInfo->fp.PixNum;

      pFAT = (libFatT *) ( *hLib + sizeof( libInfoT ) );

      imax = pLibInfo->fp.PixNum;

      for( i = 0; i < imax; ++i, ++pFAT )
      {
            if( !strcmp( PicName, pFAT->SnipName ))
            {
```

```
                /* Found FAT entry for this snip */
                /* See if it has a non-null handle */
                if( pFAT->hSnip != NULL )
                {
                        /* Cancel this handle */
                        DisposHandle( pFAT->hSnip );
                        /* and set it to NULL */
                        pFAT->hSnip = NULL;
                }
                /* Leave the for loop.  We found the snip */
                /* and did what needed to be done.       */
                break;
            }
            /* Name not found yet, keep going */
        }
        /* End of for loop */

        HUnlock( hLib );
        return;

}


/*
**************************************************************************
        libFindPicPtr  -- search open libraries for named pic; return a pointer
**************************************************************************
* */
Handle libFindPicPtr(char * PicName, Boolean prepend )
{
        Handle          hSnip;
        libTagT         tag;
        libTagPT        tagP;
        libFatPT        pFAT;
        OSErr           err;
        char            error[40];
        Int16T          refnumLibFile;
        Int32T          lcBytes;
        char            temp[255];

        /*
         * find the proper tag using bsearch and the tag id for PicName
         */
        tag.tag = libGetTag( PicName );
        strcpy( tag.name, PicName );
        tagP = bsearch( &tag, tagsP, numTags, sizeof( libTagT ), libSortTags );

        if (tagP == NULL) {
                sprintf( error, "Can't find snip %s", PicName );
                TGL_ERROR( error );
        }

        /*
         * find the proper pFAT
         */
        HLock( libApLib[tagP->libId].libData );
        pFAT = (libFatT *) ( ((Int32T) *(libApLib[tagP->libId].libData)) + sizeof( libInfoT ));
        pFAT += tagP->FATId;

        /*
         * If the snip is already in memory then return the handle
         */
        if((pFAT->hSnip != NULL) && (*(pFAT->hSnip) != NULL)) {
                return (pFAT->hSnip);
        }

        /*
```

```
 * otherwise, if the snip has never been read then allocate space for it
 */
else if (pFAT->hSnip == NULL) {
        pFAT->hSnip = NewHandle( pFAT->SnipSize );
}

/*
 * otherwise the snip was previously read and purged and needs
 * to be reallocated
 */
else {
        ReallocHandle( pFAT->hSnip, pFAT->SnipSize );
}

/*
 * make sure the snip doesn't get purged while we fill it up
 */
HNoPurge( pFAT->hSnip );
HLock( pFAT->hSnip );

/*
 * open the file
 */
if (prepend) {

        err = fsopen( filePrependDir ( temp, FILE_LIBS_DIR, libApLib[tagP->libId].lit
                              libApLib[tagP->libId].vRefNum, &refnumLibFile );
}
else {


        err = fsopen( libApLib[tagP->libId].libName,
                              libApLib[tagP->libId].vRefNum, &refnumLibFile );
}
if (err != noErr) {
        sprintf( error, "Can't open file %s", libApLib[tagP->libId].libName );
        TGL_ERROR( error );
}

/*
 * move to the proper position
 */
if (SetFPos( refnumLibFile, fsFromStart, pFAT->SnipFOffset ) != noErr) {
        TGL_ERROR( "Can't set file position" );
}

/*
 * read the snip
 */
lcBytes = pFAT->SnipSize;
if ((FSRead( refnumLibFile, &lcBytes, *(pFAT->hSnip)) != noErr)
        || (lcBytes != pFAT->SnipSize)) {
        TGL_ERROR( "Can't read snip" );
}

/*
 * unlock stuff
 */
HUnlock( pFAT->hSnip );
HUnlock( libApLib[tagP->libId].libData );

/*
 * close the file
 */
if (FSClose( refnumLibFile ) != noErr) {
        TGL_ERROR( "Can't close file" );
}
```

```
	/*
	 * return the snip
	 */
	return (pFAT->hSnip);
}

/*
*********************************************************************
	CloseAllPicLibs  — close all open pic libs
*********************************************************************
* */
void libCloseAllPicLibs()
{
	Int32T		i;

	for( i=0; i < libLibIndex; i++ )
		{
		libClosePicLib( libApLib[i].libData );
		DisposHandle( libApLib[i].snipNames );
		libApLib[i].libData = NULL;
		libApLib[i].libName[0] = '\0';
		libApLib[i].snipNames = '\0';
		libApLib[i].numSnips = 0;

		}


	libLibIndex= 0;
	libCurrentLibIndex = 0;


	/*
	 * get rid of the tags
	 */
	numTags = 0;
	if (tagsP != NULL) {
		DisposPtr( tagsP );
	}
}

/*********************************************************************
 * libLoadLib loads another library if there's room
 *********************************************************************/
void libLoadLib( char *libName, Boolean reload, Boolean prepend )
{
	Handle		data;
	Int32T		i;
	char	dummyString[50];
	Int16T		vRefNum;

	/*
	 * if we're not supposed to reload the library, then
	 * see if the name is already in the list of open libraries
	 */
	if (!reload) {
		for (i = 0; i < MaxLib; i++) {
			if (!strcmp( libApLib[i].libName, libName )) {
				libCurrentLibIndex = i;
				return;
			}
		}
	}

	if( libLibIndex < MaxLib ) {
		if (GetVol( dummyString, &vRefNum ) != noErr) {
			TGL_ERROR( "Couldn't get volume" );
		}
		data = libOpenPicLib( 0, libName, prepend );
```

BEST AVAILABLE COPY

```
			if( data == NULL) {
				scnScanError( "Library file open failed", libName );
			}
		}
		else {
			scnScanError( "Too many open Libraries", libName );
		}
}

/*********************************************************************
 * libListSnips: put the names of all of the snips in this library into a list
 *********************************************************************
void libListSnips( Handle hLib, CharsHandle *snipNames, Int32PT numSnipsP )
{
	Int32T			i, imax;
	libInfoT		*pLibInfo;
	libFatT		*pFAT;
	Int32T			length;

	/*
	 * batten down the hatches
	 */
	HLock( hLib );

	/* Dereference the handle to get pointers into the now locked block */
	pLibInfo = (libInfoT *) *hLib;
	imax = pLibInfo->fp.PixNum;

	/* find out how much space we'll need for the names */
	pFAT = (libFatT *) ( *hLib + sizeof( libInfoT ) );
	length = 0;
	for( i = 0; i < imax; ++i, ++pFAT ) {
		length += strlen( pFAT->SnipName ) + 1;
	}

	/* allocate space for the names */
	(*snipNames) = (CharsHandle) NewHandle( length + 1 );
	HLock( *snipNames );

	/* copy the names into the allocated space */
	pFAT = (libFatT *) ( *hLib + sizeof( libInfoT ) );
	length = 0;
	(*numSnipsP) = 0;
	for( i = 0; i < imax; ++i, ++pFAT ) {
		strcpy( &(**snipNames)[length], pFAT->SnipName );
		length += strlen( pFAT->SnipName );
		(**snipNames)[length] = '\r';
		length ++;
		(*numSnipsP)++;
	}
	(**snipNames)[length] = '\0';

	/*
	 * finally, alphabetize the names
	 */
	libAlphabetize( *snipNames );
	HUnlock( *snipNames );
}

/*********************************************************************
 * bidAlphabetize: alphabetizes a list separated by carriage returns
 * in place. Works by bubble sort, isn't there a better way?
 * List is the list to be alphabetized.
 *********************************************************************/
	Int16T libstrcmp( char **s1, char **s2 )
	{
		return (strcmp( *s1, *s2 ));
```

BEST AVAILABLE COPY

```
	}

void libAlphabetize( CharsHandle list )
{
	char	*linePtrs[1000];
	Int32T		numLinePtrs = 0;
	Int32T		i, j;
	Int32T		length;
	Int32T		count;
	char	*tempCopy;
	char	*temp;

	/*
	 * make a temporary copy of the list to work with
	 */
	HLock( list );
	length = strlen( *list );
	tempCopy = NewPtr( length + 1 );
	strcpy( tempCopy, *list );
	HUnlock( list );

	/*
	 * create an array of pointers, one for each line of the text
	 * (just loops through the text looking for carriage returns)
	 */
	linePtrs[0] = tempCopy;
	for (i = 0; i < length; i++) {

		if ((tempCopy[i] == '\r') || (tempCopy[i] == '\n')) {
			linePtrs[++numLinePtrs] = &tempCopy[i + 1];
			tempCopy[i] = '\0';
			if (numLinePtrs >= 1000) {
				TGL_ERROR( "Too many items to alphabetize" );
			}
		}
	}

	qsort( (void *) linePtrs, (size_t) numLinePtrs,
		(Int16T) sizeof( char* ), libstrcmp );
	/*
	 * now that the array of pointers is sorted, copy each string
	 * in order back into the original string, separated by a
	 * carriage return.  Make sure to put a '\0' at the end.
	 */
	HLock( list );
	count = 0;
	for (i = 0; i < numLinePtrs; i++) {
		strcpy( &(*list)[count], linePtrs[i] );
		count += strlen( linePtrs[i] );
		(*list)[count++] = '\r';
	}
	(*list)[count] = '\0';
	HUnlock( list );

	/*
	 * get rid of the temporary copy
	 */
	DisposPtr( tempCopy );
}


/***************************************************************************
***
	libGetTag() - return the tag for a given variable name
****************************************************************************
/
Int32T libGetTag (char *string)
	{
```

BEST AVAILABLE COPY

```
register Int32T i, tempTag;
register char *fastString;

fastString = string;
tempTag = 0;
for (i = 0; (i < 32) && *fastString; i++)
        {
        tempTag += *fastString;
        fastString++;
        }

return(tempTag);
}


/*******************************************************************************
***
 * libAddNewTags adds hash tags for each snip name in the library.  libData is a handle
 * to the memory representation of a library, which is to say, a libInfoT followed
 * by a number of FAT entries.  The number of entries is stored in the libInfoT.
 *******************************************************************************/
void    libAddNewTags( Handle libDataH, Int32T libId )
{
        libTagPT        newTagsP;
        libTagPT        tempTagsP;
        libInfoPT       pLibInfo;
        libFatPT        pFAT;
        Int32T                  i, j, k;

        /*
         * lock the data down and get the first pFAT
         */
        HLock( libDataH );
        pLibInfo = (libInfoPT) *libDataH;
        pFAT = (libFatT *) ( ((Int32T) pLibInfo) + sizeof( libInfoT ) );

        /*
         * put new tags into a buffer with their names and ids, then sort them
         */
        tempTagsP = (libTagPT) NewPtr( sizeof( libTagT ) * pLibInfo->fp.PixNum);
        for (i = 0; i < pLibInfo->fp.PixNum; i++, pFAT++) {
                tempTagsP[i].tag = libGetTag( pFAT->SnipName );
                strcpy( tempTagsP[i].name,  pFAT->SnipName );
                tempTagsP[i].FATId = i;
                tempTagsP[i].libId = libId;
        }
        qsort( tempTagsP, pLibInfo->fp.PixNum, sizeof( libTagT ), libSortTags );

        /*
         * allocate a new, bigger buffer and merge the two other buffers into that one
         */
        newTagsP = (libTagPT) NewPtr( sizeof( libTagT ) * (pLibInfo->fp.PixNum + numTags
        i = 0;
        j = 0;
        k = 0;
        if ((numTags > 0) && (pLibInfo->fp.PixNum > 0 )) {
                for ( ; i < numTags + pLibInfo->fp.PixNum; i++) {

                        /*
                         * next old tag goes before next new tag
                         */
                        if (tagsP[j].tag < tempTagsP[k].tag) {
                                memcpy( &newTagsP[i], &tagsP[j++], sizeof( libTagT ));
                                if (j == numTags) {
                                        i++;
                                        break;
                                }
```

```
			}

			/*
			 * next new tag goes before next old tag
			 */
			else if (tagsP[j].tag > tempTagsP[k].tag) {
				memcpy( &newTagsP[i], &tempTagsP[k++], sizeof( libTagT ));
				if (k == pLibInfo->fp.PixNum) {
					i++;
					break;
				}
			}

			/*
			 * next old name goes before next new name
			 */
			else if (strcmp( tagsP[j].name, tempTagsP[k].name ) <= 0) {
				memcpy( &newTagsP[i], &tagsP[j++], sizeof( libTagT ));
				if (j == numTags) {
					i++;
					break;
				}
			}

			/*
			 * next new name goes before next old name
			 */
			else {
				memcpy( &newTagsP[i], &tempTagsP[k++], sizeof( libTagT ));
				if (k == pLibInfo->fp.PixNum) {
					i++;
					break;
				}
			}
		}
	}

	/*
	 * copy any remaining ones
	 */
	if (j < numTags) {
		memcpy( &newTagsP[i], &tagsP[j], sizeof( libTagT ) * (numTags - j));
	}
	else if (k < pLibInfo->fp.PixNum) {
		memcpy( &newTagsP[i], &tempTagsP[k], sizeof( libTagT ) * (pLibInfo->fp.Pi
	}

	/*
	 * clean up
	 */
	numTags += pLibInfo->fp.PixNum;
	HUnlock( libDataH );
	if (tagsP != NULL) {
		DisposPtr( tagsP );
	}
	if (tempTagsP != NULL) {
		DisposPtr( tempTagsP );
	}
	tagsP = newTagsP;

}

Int16T		libSortTags( libTagPT tagA, libTagPT tagB )
{

	/* compare the tags */
	if (tagA->tag < tagB->tag) {
```

BEST AVAILABLE COPY

```
        return (-1);
    }
    else if (tagA->tag > tagB->tag) {
        return (1);
    }

    /* compare the strings */
    return (strcmp( tagA->name, tagB->name ));

}


/*************************************************************************
 * libAddLibrary adds libraries to the build menu as they are opened
 *************************************************************************/
void libAddLibrary( char *name )
{
    char    string[64];

    /*
     * copy the name and convert it to pascal
     */
    strcpy( string, name );
    CtoPstr( string );


    /*
     * add the new name to the build menu
     */
    AppendMenu( tglBuildMenuH, " " );
    SetItem( tglBuildMenuH, CountMItems( tglBuildMenuH ), string );


    /*
     * put a check mark next to the new library (after making sure
     * to erase the check mark from its previous position)
     */
    if (CheckMarkedItem >= 0) {
        CheckItem( tglBuildMenuH, TGL_FIRST_LIBRARY + CheckMarkedItem, FAL!
    }
    CheckItem( tglBuildMenuH,
        TGL_FIRST_LIBRARY + libCurrentLibIndex, TRUE );
    CheckMarkedItem = libCurrentLibIndex;


    /*
     * redraw the menu if it's visible
     */
    if (tglMenuVisible) {
        DrawMenuBar();
    }
}


/*************************************************************************
 * libDeleteLibraries removes the names of the libraries at the end of the
 * build menu by reading the build menu from the disk again
 *************************************************************************/
void libDeleteLibraries( void )
{

    /*
     * completely remove the build menu from the menu bar
     */
    DeleteMenu( TGL_BUILD_MENU_ID );
    ReleaseResource( (Handle) tglBuildMenuH );
```

BEST AVAILABLE COPY

```
	 * get an empty build menu from the resource
	 */
	tglBuildMenuH = GetMenu( TGL_BUILD_MENU_ID );
	InsertMenu( tglBuildMenuH, 0 );
	DisableItem( tglBuildMenuH, 0 );

	/*
	 * show the new menu
	 */
	if (tglMenuVisible) {
		DrawMenuBar();
	}

	/*
	 * nothing is checked in the Build menu
	 */
	CheckMarkedItem = -1;
}

/***************************************************************************
 * libSwitchLibraries changes the current library. The new library
 * is taken from the build menu item specified by 'menuItem.'
 ***************************************************************************/
void libSwitchLibraries( Int16T menuItem )
{

	/*
	 * if the item isn't a library, then forget it
	 */
	if (menuItem < TGL_FIRST_LIBRARY) {

		return;
	}

	/*
	 * turn off the old check mark
	 */
	if (CheckMarkedItem >= 0) {
		CheckItem( tglBuildMenuH, TGL_FIRST_LIBRARY + CheckMarkedItem, FALS
	}

	/*
	 * set the current library index
	 */
	libCurrentLibIndex = menuItem - TGL_FIRST_LIBRARY;

	/*
	 * put a check mark next to the current library
	 */
	CheckItem( tglBuildMenuH, TGL_FIRST_LIBRARY + libCurrentLibIndex, TRUE );
	CheckMarkedItem = libCurrentLibIndex;

	/*
	 * highlight the appropriate items in the build menu
	 */
	libHighlightBuildMenu();
}
```

BEST AVAILABLE COPY

```
/**********************************************************************
 * libHighlightBuildMenu enables or dims menu items in the build menu
 * depending on whether there are any libraries or not and whether the
 * current library has any snips in it.
 **********************************************************************
void libHighlightBuildMenu( void )
{
        if (libApLib[libCurrentLibIndex].numSnips <= 0) {
                DisableItem( tglBuildMenuH, TGL_VIEW_SNIP_ITEM );
                DisableItem( tglBuildMenuH, TGL_DEL_SNIP_ITEM );
                DisableItem( tglBuildMenuH, TGL_WRITE_LIB_ITEM );
                DisableItem( tglBuildMenuH, TGL_DUMP_LIB_ITEM );
        }
        else {
                EnableItem( tglBuildMenuH, TGL_VIEW_SNIP_ITEM );
                EnableItem( tglBuildMenuH, TGL_DEL_SNIP_ITEM );
                EnableItem( tglBuildMenuH, TGL_WRITE_LIB_ITEM );
                EnableItem( tglBuildMenuH, TGL_DUMP_LIB_ITEM );
        }
        if (libLibIndex > 0) {
                EnableItem( tglBuildMenuH, TGL_ADD_SNIP_ITEM );
        }


        /*
         * draw menu
         */
        if (tglMenuVisible) {

                DrawMenuBar();
        }

}
```

BEST AVAILABLE COPY

```
/*  ----------------------------------------------------------------
 *      misData.c
 *      Money Advisor database i/o functions
 *
 *  ----------------------------------------------------------------
 *
 *      djs 1/5/90
 *
 *      Two major function groups in this module:
 *      Write functions and Read functions.
 *
 *      Within each group, there is a driver function, such as misWriteInfo() for Writing, a
 *      misRetrieve() for Reading.
 *
 *      There are also data groups: Vars, Notes, Picks.
 *      Each of these is stored in one combined file, and read and written through a func
 *      specific to the group, such as misReadNotes() and misWriteNotes().
 *
 *      The variables and picks are stored in a comma-delimited format, with quotes aro
 * each field and one record per line, with a blank line between the groups.
 *
 *      The notes are just stored as text streams, where there are 11 notepads
 * (CSR + 5 Edit + 5 Special Edit ) each terminated with a NULL character.
 * Even if there were no text, there should be 11 NULLs, no more or less.
 *
 *      The data files are read and written to the "MIS files" subdirectory, assumed to be
 *      in the same folder as the .SCAN file.
 *
 *      2/18/90 djs
 *      converted all file i/o to mac file system calls from old stdlib c file calls.
 *      3/30/90 djs
 *      all data for one person, one session now in one file in the MIS subdirectory.
 *      Picks/prefs now reloaded.
 * 5/20/90 djs
 * General maintenance and debugging for MA 3.2F version.
 */

#include    "standard.h"
#include    "tglMain.h"
#define     APP_ADTERM      1       /* needed for money advisor variable access
#include    "varFns.h"
#include    "misData.h"
#include    "bndDetail.h"
#include    "stkDetail.h"
#include    "bnkDetail.h"
#include    "format.h"
#include    "CTextEditEH.h"
#include    "snpSnapShot.h"
#include    "msgSnipDialogs.h"
#include    "EventHandlers.h"

/* Internal constants */

#define     KEY_DELIMITER       "."             /* separate fields in the k
#define     SESSION_PAD_NUMBER      0

#define INCOME   1
#define GROWTH       2

/* Internal data structs */

typedef struct
    {
    char        typeFlag;               /* G for growth or I for income. */
    char        nameOfIssue[ 80 ];
    char        itemID [20 ];           /* Bond CUSIP or Stock symbol. */
    Int32T      numUnits;           /* Shares or whatever */
    char        curPrice [ 20 ];    /* Dollar price per unit as of that session */
```

BEST AVAILABLE COPY

```
char       BuyListFlag;                    /* flag for buyList */
}
PickInfoRec;

/* the list of variables to save (set up in MISSaveList commands in control.c) */
Boolean misSaveList[VAR_MAXVAR];

/* Internal function prototypes */

Int32T          misGetMISDir (void);
Int32T          misGetOldFilesDir (void);
Int16T          misGetMAVref (void);
void            misGenKeyID (char *keyID);
Int16T          misFCreate ( char *fileName );
void            misFClose ( Int16T refNum );
OSErr           misFWrite ( Int16T refNum, char *buf );
OSErr           misFWriteCh ( Int16T refNum, char *theChar );
OSErr           misFReadLn ( Int16T refNum, char *buf );
OSErr           misFReadCh ( Int16T refNum, char *pc );
OSErr           misGetLn( Int16T refNum, char *dest, int bufLen);
void            misDirChk(void);
void            misChkNMove(char *CustName);

void            misWriteVars (Int16T refNum);
void            misWritePicks (Int16T refNum);
void            misWriteIncomePicks(Int16T refNum);
void            misWriteGrowthPicks(Int16T refNum);
void            misDateStamp ( Int16T    refNum );
void            misWriteNotes (Int16T refNum);

void            misWriteVersions (Int16T refNum);
void            misGetFileVers ( char *fileName, char *buf);

Boolean         misReadVars ( Int16T refNum);
void            misReadNotes ( Int16T refNum);
Int16T                  misReadPicks ( Int16T refNum);
void            misSkipPicks ( Int16T       refNum );
void            misSkipIncomePicks ( Int16T      refNum );
void            misReadBlock ( Int16T refNum, Handle tb );

            /* Interactive Retrieval Functions */

void            misLoadErr ( char *itemID );
Boolean         misCheckValidFile ( Int16T refNum );
void            misAllocCheck (void);

/*      The sysFiles[] array contains the names of those files whose version information is
        be saved. To add files to the list, REMEMBER to increment the NUM_SYS_FILES co
        */

#define     NUM_SYS_FILES    6
char        *sysFiles[] =
                {
                "Ascan",
                "Bond.Summaries",
                "Bonds.Text",
                "High.Low.Index.Text",
                "Stock.Summaries",
                "Stock.Text"
                };

/* == F I L E   A C C E S S   F U N C T I O N S ===============================
/*      these are the general-purpose functions for opening and writing and reading file
        */

#define     OS_FILE_CREATOR        'SCAN'
#define     OS_FILE_TYPE           'TEXT'
```

BEST AVAILABLE COPY

```
#define      OLD_FILES_DIRECTORY  "Old files"
#define      MIS_FILE_DIRECTORY        "MIS files"

#define      SET_CurDirStore(X)      (CurDirStore = (X))

/* ..................................................................................................
/* GetMISDir
      gets the directory ID for the "MIS files" folder in the MA program directory. */

Int32T        misGetMISDir ()
      {
      DirInfo              cpb;
      char                 buf[255];
      OSErr                rc;
      Int16T               vRef;
      static Int32T        MISDirID = 0;

      if ( ! MISDirID )           /* has not been set? */
            {
            strcpy(buf, MIS_FILE_DIRECTORY);
            CtoPstr(buf);

            cpb.ioCompletion = NULL;
            cpb.ioNamePtr = (StringPtr) buf;
            cpb.ioFDirIndex = 0;
            cpb.ioDrDirID = 0;
            cpb.ioVRefNum = misGetMAVref();

            rc = PBGetCatInfo ( (CInfoPBPtr) &cpb, FALSE );

            MISDirID = cpb.ioDrDirID;

            misGetOldFilesDir();              /* make sure it's initialized, too. */
            }

      return (MISDirID);
      }

/* ..................................................................................................
/* GetOldFilesDir
      gets the directory ID of the "Old files" folder within the "MIS files" folder. */

Int32T        misGetOldFilesDir ()
      {
      DirInfo              cpb;
      char                 buf[255];
      OSErr                rc;
      Int16T               vRef;
      static Int32T        OldFilesDirID = 0;

      if ( ! OldFilesDirID )           /* has not been set? */
            {
            strcpy(buf, ":");
            strcat(buf,OLD_FILES_DIRECTORY);
            CtoPstr(buf);

            cpb.ioCompletion = NULL;
            cpb.ioNamePtr = (StringPtr) buf;
            cpb.ioFDirIndex = 0;
            cpb.ioDrDirID = misGetMISDir();
            cpb.ioVRefNum = misGetMAVref();

            rc = PBGetCatInfo ( (CInfoPBPtr) &cpb, FALSE );

            OldFilesDirID = cpb.ioDrDirID;
            }
```

```
      return (OldFilesDirID);
      }


/* ..........................................................................................................
/* GetMAVref
      gets the original volume reference number from the MA program directory. */

Int16T      misGetMAVref ()
      {
      WDPBRec   wdpb;
      char              buf[255];
      OSErr             rc;
      static int16T     MAVRefNum = 0;
      static int32T     MADirID;

      if ( ! MAVRefNum )          /* has not been set? */
            {

            wdpb.ioCompletion = NULL;
            wdpb.ioNamePtr = (StringPtr) buf;

            rc = PBHGetVol ( (WDPBPtr) &wdpb, FALSE);

            MAVRefNum = wdpb.ioVRefNum;
            MADirID = wdpb.ioWDDirID;         /* not currently used, but... */
            }

      return (MAVRefNum);
      }


/* ..........................................................................................................
/* DirChk
      insure that the MIS subs are there: just try to make it, and if you fail, assume it ex

void  misDirChk ()
      {
      HFileParam        pb;
      char              buf[255];
      OSErr             rc;

      strcpy(buf,MIS_FILE_DIRECTORY);
      CtoPstr(buf);

      pb.ioCompletion = NULL;
      pb.ioNamePtr = (StringPtr) buf;
      pb.ioVRefNum = misGetMAVref();
      pb.ioDirID = 0;

      rc = PBDirCreate ( (HParmBlkPtr) &pb, FALSE );

      strcpy(buf,OLD_FILES_DIRECTORY);
      CtoPstr(buf);

      pb.ioCompletion = NULL;
      pb.ioNamePtr = (StringPtr) buf;
      pb.ioVRefNum = misGetMAVref();
      pb.ioDirID = misGetMISDir();

      rc = PBDirCreate ( (HParmBlkPtr) &pb, FALSE );

      }

/* ..........................................................................................................
int16T misFCreate ( char *fileName )
      {
```

BEST AVAILABLE COPY

```
OSErr          rc;
Int16T         refNum;
int            vRefNum;
char           name[255],
               msg[200],
               *pC;
FInfo          finfo;
HFileParam     fp;
HParamBlockRec     io;

misDirChk();           /* check to make sure the folder's avail, or create it. */

strcpy(name, fileName);
pC = strrchr(name, '-');        /* strip out the name from the KeyID */
*(++pC) = '\0';
misChkNMove(name);              /* check for earlier record, move to Old files folde

strcpy (name, fileName);
CtoPstr(name);

SET_CurDirStore(misGetMAVref());
GetVol ( msg, &vRefNum );
strcpy(msg,":MIS files:");
strcat(msg, PtoCstr(name) );
CtoPstr(msg);
rc = Create ( msg, vRefNum, OS_FILE_CREATOR, OS_FILE_TYPE );


if ( noErr != rc )
       {
       sprintf ( msg, "Cannot create new file: %s. (Err: %i)", fileName, rc);
       TGL_ERROR(msg);
       return (0);
       }


rc = FSOpen( msg, vRefNum, &refNum );
if ( noErr != rc )
       {
       sprintf ( msg, "Cannot open new file: %s", fileName);
       TGL_ERROR(msg);
       return (0);
       }

return ( refNum );
}

/* ..........................................................................................................
/* FClose
       just close it.
       */

void misFClose ( Int16T refNum )
       {
       OSErr         rc;

       if ( noErr != ( rc = FSClose ( refNum )))
              {
              TGL_ERROR("Error closing file.");
              }
       }

/* ..........................................................................................................
/* FWrite
       writes out a string to the given file reference
       */
```

BEST AVAILABLE COPY

```
OSErr misFWrite ( Int16T refNum, char *buf )
	{
	Int32T		numBytes;
	OSErr		rc;

	numBytes = strlen(buf);
	rc = FSWrite( refNum, &numBytes, buf );
	return (rc);
	}

/* ..........................................................................................
/* FWrite
	writes out a string to the given file reference
	*/

OSErr misFWriteCh ( Int16T refNum, char *theChar )
	{
	Int32T		numBytes = 1;
	OSErr		rc;

	rc = FSWrite( refNum, &numBytes, theChar );
	return (rc);
	}

/* ..........................................................................................
/* GetLn
	Reads a line from the file terminated by \r and replaces the CR with a NULL.
	*/

OSErr misGetLn( Int16T refNum, char *dest, int bufLen)
{
	OSErr		theErr;
	IOParam		pb;

	pb.ioCompletion = NULL;
	pb.ioRefNum = refNum;
	pb.ioBuffer = dest;
	pb.ioReqCount = bufLen;
	pb.ioPosOffset = 0L;

	pb.ioPosMode = fsAtMark;

	BitSet( (void *) &(pb.ioPosMode), 8L );
	pb.ioPosMode |= 0x0D00;		/* put the CR char into the high 8 bits for detect *

	theErr = PBRead(  (ParmBlkPtr) &pb, FALSE);

	dest[pb.ioActCount-1] = '\0';	/* make it a C string  (overwrite the \r with the \0

	return (theErr);
}

/* ..........................................................................................

OSErr misFReadCh ( Int16T refNum, char *pc )
	{
	OSErr		rc;
	Int32T		numBytes = 1;

	rc = FSRead ( refNum, &numBytes,  pc );
	return (rc);
	}

/* == S T O R A G E   F U N C T I O N S ===================================
/*	the first group of functions deals with the writing out of the different sets of infc
	Variables, Stock/Bond Picks, Notepads, Version information.
```

```
    See the full notes in the file "MIS notes" in this directory.
    */
```

BEST AVAILABLE COPY

```
/* ..............................................................................................
/* GenKeyID
    creates the semi-unique keyID for this set of info records. The key identifies
    them across files for later importing into relational databases. The key is also use
    some functions to loop through records in a file. Note that in most cases, the actu
    records are located within the file for retrieving through the use of the offsets sto
    in the index record for that info set. The KeyID consists of Name, Age and a date:
    */

void    misGenKeyID (char *keyID)                        /* put together the keyID stam
    {
    char        buf[100], *pC;
    int32T      secs;

    strcpy ( keyID, varPtr (vName) );                         /* customer's name */
    if (strlen ( keyID ) > 15 )                               /* trunc after 15 chars. */
            keyID[15] = '\0';
    strcat ( keyID, KEY_DELIMITER);

    GetDateTime ( &secs);
    IUDateString ( secs, shortDate, buf);                /* current Date and time stamp
    PtoCstr ( buf);
    strcat ( keyID, buf);

    strcat ( keyID, " ");
    IUTimeString ( secs, FALSE, buf);
    PtoCstr ( buf);
    pC = strchr(buf,':');
    *pC = '.';                                      /* convert the colon to a period */
    pC = strchr(buf,' ');
    *pC = '\0';                                     /* truncate before the am/pm */
    strcat ( keyID, buf);

    }

/* ..............................................................................................
/* WriteInfo
    is the high-level driver function that makes a sweeping save of all data in the
    program, available for later restoration. should be called after printing report
    Note that the fields of the index file record are filled in with the return values
    from each of the subfunctions, which returns their physical file offsets.
    */

void misWriteInfo()
    {
    char                keyID[100],
                                volName [100];
    int16T              refNum;

    volName[0] = '\0';

    misDirChk();

    misAllocCheck();

    misGenKeyID (keyID);                              /* generate the keyID for this ru

    refNum = misFCreate ( keyID );

    misWriteVars ( refNum );
    misWritePicks ( refNum );
    misWriteNotes ( refNum );
```

BEST AVAILABLE COPY

```
/*      NOT connected right now
        misWriteVersions ( refNum );
*/

        misFClose ( refNum );

        FlushVol ( volName, 0 );
        }


/* ..........................................................................
/* WriteVars
        takes care of outputting the variables table to the file.
        subfunction of WriteInfo()
        */

void    misWriteVars (Int16T refNum)
        {
        extern          Boolean misSaveList[];
        Int32T          vNum,                   /* current var num */
                        numBytes;
        Int16T          rc;                     /* file i/o return code */
        char            *vPtr,
                        buf[500];

        for (   vNum = 1;   vNum < VAR_MAXVAR;      vNum++)         /* seq thru
                {
                vPtr = varPtr ( vNum );

                if ( vPtr )                                             /* ch
                        {
                        if ( (strlen(vPtr) <= VAR_MAXVARLEN) &&         /* legal length */
                                misSaveList[vNum]       )       /* MISSaveList told us to save i
                                {
                                sprintf ( buf, "\"%ld\",\"%s\"\r", vNum, vPtr );
                                if ( noErr != (rc = misFWrite ( refNum, buf ) ))
                                        {
                                        TGL_ERROR("Cannot complete vars write");
                                        break;
                                        }
                                }
                        }
                }

        misFWrite ( refNum, "\r");                      /*  write a CR at end of record.

        return;
        }


/* ..........................................................................
/* WritePicks
        opens the picks file then calls WriteBondPicks() and WriteStockPicks()
        to dump out the specifics. A subfunction of WriteInfo()
        */

void    misWritePicks (Int16T refNum)
        {

        if ( ! bndBondTableInitialized  && ! stkStockTableInitialized )
                {
                /* FUTURE site of the allocations request to insure the cards are detailed. *.

                return;                 /* nothing to save */
                }

        misWriteIncomePicks(refNum);
```

```
	misWriteGrowthPicks(refNum);
	misFWrite ( refNum, "\r");				/* write a CR at end of record

	return;
	}
```

BEST AVAILABLE COPY

```
/* ..........................................................................................
/* WriteIncomePicks
	Writes out only those Bonds in the table with purchased shares
	one line to each bond, with number of shares and current price.
	A subfunction of WritePicks.
	*/

void	misWriteIncomePicks (Int16T refNum)
	{
	PickInfoRec		pRec;
	struct BOND			*BondTable;
	Int16T				index;
	char				buf[200];

	if (bndBondTableInitialized)
		{
		BondTable = bndGetTablePtr();

		pRec.typeFlag = 'I';

		for ( index = 0; index < bndGetMaxBondIndex() ; index++)
			{
			/* save it if it has any amount, it's a never-pick, or it's a fund */
			if (BondTable[index].numberOfIssues > 0 ||
				BondTable[index].BuyListFlag == 'X' ||
				BondTable[index].termSML == 'F')
				{
				strcpy( pRec.itemID,		BondTable[index].CUSIP );
				strcpy( pRec.nameOfIssue,	BondTable[index].nameOfIssue
				strcpy( pRec.curPrice,		BondTable[index].offeringPrice
				pRec.BuyListFlag	=		BondTable[index].BuyListFlag;

				/* use the numUnits slot for dollars for MMFs */
				if (BondTable[index].termSML == 'F')
					pRec.numUnits	=		BondTable[index].dollar
				else pRec.numUnits	=		BondTable[index].numb

				sprintf( buf, "\"%c\",\"%s\",\"%s\",\"%ld\",\"%s\",\"%c\"\r",
					pRec.typeFlag,
					pRec.nameOfIssue,
					pRec.itemID,
					pRec.numUnits,
					pRec.curPrice,
					pRec.BuyListFlag);

				misFWrite ( refNum, buf );
				}
			}
		}
	}

/* ..........................................................................................
/* WriteGrowthPicks
	writes out only those stocks in the table with purchased shares
	one line to each stock, with number of shares and current price.
	*/

void	misWriteGrowthPicks(Int16T refNum)
	{
	PickInfoRec		pRec;
	struct STOCK		*StockTable;
	char				buf[200],
```

BEST AVAILABLE COPY

```
                    *symStart,
                    *symEnd;
Int16T              Index;

if (stkStockTableInitialized)
    {
    StockTable = stkGetTablePtr();
    pRec.typeFlag = 'G';

    for ( index = 0; index < stkGetMaxStockIndex() ; index++)
        {
        if (    ( StockTable[index].sharesPurchased > 0 ) ||
                ( StockTable[index].BuyListFlag == 'X' ) )
                {

                strcpy( pRec.nameOfIssue, StockTable[index].nameOfIssue );
                strcpy( pRec.itemID, StockTable[index].issueSymbol);

                strcpy( pRec.curPrice,     StockTable[index].priceShareW );
                strcat( pRec.curPrice,     "+");
                strcat( pRec.curPrice,     StockTable[index].priceShareF );
                pRec.numUnits                  =      StockTable[index].shares
                pRec.BuyListFlag   =       StockTable[index].BuyListFlag;

                sprintf( buf, "\"%c\",\"%s\",\"%s\",\"%ld\",\"%s\",\"%c\"\r",
                        pRec.typeFlag,
                        pRec.nameOfIssue,
                        pRec.itemID,
                        pRec.numUnits,
                        pRec.curPrice,
                        pRec.BuyListFlag);

                misFWrite ( refNum, buf );
                }
        }
    }
}


/* ..............................................................................................................
/* WriteNotes
    dumps out the text blocks sequentially into the notes file.
    Note that when writing out the current notes, for the CSR notepad, the datestam
    a line are added to the top of the note to separate it from the next session's note
    */


void  misWriteNotes (Int16T refNum)
    {
    Int32T                  numBytes;
    Int16T                  blockNum;
    Handle                  tb;
    Boolean             chkFlag = FALSE;
    OSErr                   rc;

    /*
     * First check to see that there are actually notes to be written somewhere
     */
    for ( blockNum = 0; blockNum < TXT_MAX_TEXT_BLOCKS; blockNum++ )
        {
        tb = tglTextEditGopher->GetText (blockNum);
        if ( strlen(*tb) )
            chkFlag = TRUE;
        }

    if ( ! chkFlag )                    /* there were no notes to be written */
        return;
```

BEST AVAILABLE COPY

```
for ( blockNum = 0; blockNum < TXT_MAX_TEXT_BLOCKS; blockNum++ )
      {
      static      char   nullChar = '\0';

      tb                        = tglTextEditGopher->GetText (blockNum);
      numBytes    = GetHandleSize ( tb );
of chars */
/*    numBytes    -= 1;
      /* don't count the term NULL */

      if ( numBytes > 0 )
            {
            if ( blockNum == SESSION_PAD_NUMBER )        /* special case for :
                  misDateStamp ( refNum );

            HLock (tb);
            rc = FSWrite ( refNum, &numBytes, *tb );
            HUnlock (tb);

            if ( noErr != rc )
                  TGL_ERROR ( "MIS: Error writing notepads.");

            }

      /*
       * write a NULL terminator aftdr each text block, even if it is empty.
       */
      misFWriteCh ( refNum, &nullChar );
      }

   return;
   }


/* ..................................................................................................................
/* DateStamp
   Used for the Session Notepad to date stamp the last session's notes.
   Writes out a the date in Short format, then a line of dashes.
   */

void  misDateStamp ( Int16T   refNum )
   {
   Int32T            secs;
   char              buf[100],
                           buf2[200];

   GetDateTime(&secs);
   IUDateString(secs, shortDate, buf);
   PtoCstr(buf);
   sprintf (buf2, "\r\r%s\r-----------------------\r",buf);
   misFWrite ( refNum, buf2 );
   }

/* ..................................................................................................................
/* WriteVersions
   gets the system file datestamps and writes them out to the versions file
   subfunction of WriteInfo()
   */

void  misWriteVersions (Int16T refNum)
   {
   Int16T            i;
   char              buf[100];

   for ( i=0; i < NUM_SYS_FILES; i++ )      /*  for each file in the list of files */
      {
      misGetFileVers ( sysFiles[i], buf );       /* get the file info */
      if ( i )
```

```
                {
                misFWrite (refNum, ",");                /* commas after the first one *
                }
            misFWrite( refNum, buf );                   /* write out the date/time */
            }

        misFWrite ( refNum, "\r");                      /*  write a CR+NULL at end of 
        return;
        }

/* ..............................................................................................
/* GetFileVers
        gets the datestamp for one file by name,
        subfunction of writeVersions()
        */

void    misGetFileVers ( char *fileName, char *buf)
        {
        FileParam   fp;
        OSErr               theErr;
        char                theVol[35],
                            theFile[40];
        Int16T              vRefNum;

        theErr = GetVol ( theVol, &vRefNum);
        strcpy(theFile,fileName);
        CtoPstr(theFile);

        fp.ioNamePtr = (StringPtr) theFile;
        fp.ioCompletion = NULL;
        fp.ioVRefNum = vRefNum;
        fp.ioFVersNum = 0;
        fp.ioFDirIndex = 0;

        theErr = PBGetFInfo ( (ParmBlkPtr) &fp, FALSE);

        if ( theErr != noErr )
            {
            *buf = '\0';
            }
        else
            {
            IUDateString ( fp.ioFlMdDat, shortDate, buf );
            PtoCstr(buf);
            }
        return;
        }

/* == R E T R I E V A L   F U N C T I O N S ================================

/*      The second group of functions in this module mirror the first, providing the mean
        restore the data from the info files. The key information is the name of the perso
        retrieve by, which leads to an index record for their most recent visit, and that giv
        the file offsets for each of the related info files.
        */

/* ..............................................................................................
/* Retrieve
        Returns false if there are no matches.
        Loads all data if the match is correct.
        */

void    misRetrieve ()
        {
        Int16T              refNum;
        SFReply             theReply;
        ioParam             ioPB;
        Point       where = { 200, 150 };
```

BEST AVAILABLE COPY

```
WDPBRec       pB;
char          buf[255];
OSErr         rc;
CGrafPtr      theArea;
Rect          boundsRect;
SFTypeList    misTypeList;
Int16T        readPickResult;

misTypeList[0] = 'TEXT';

misDirChk();
SET_CurDirStore(misGetMISDir());

SetRect ( &boundsRect, where.h, where.v, where.h+388, where.v+260 );
InsetRect ( &boundsRect, -20, -20);
theArea = snpSaveWindow3 ( tglMainCWindow, &boundsRect );
tglPushCursor();
tglCursorOnOff( TGL_ON );
SetCursor( &arrow );
SFGetFile( where, NULL, NULL, 1, misTypeList, NULL, &theReply );
tglCursorOnOff( TGL_OFF );
snpRestoreWindow3 ( 0, theArea );
tglPopCursor();


if ( ! theReply.good )
        {
        varSetS ( vErrorFlag, "99" );
        return;
        }
else
        {
        varSetS ( vErrorFlag, "0" );
        }

ioPB.ioNamePtr = (StringPtr) &theReply.fName;
ioPB.ioVRefNum = theReply.vRefNum;
ioPB.ioVersNum = theReply.version;
ioPB.ioPermssn = fsRdPerm;
ioPB.ioMisc = NULL;

rc = PBOpen ( (ParmBlkPtr) &ioPB, FALSE );
if (rc)
        {
        TGL_FATAL_ERROR ( "misRetrieve: Cannot open the file for reading.");
        return;
        }

refNum = ioPB.ioRefNum;

if ( ! misReadVars (refNum))
        {
        varSetS ( vErrorFlag, "99" );
        msgAlert ( "This file is not a valid MIS Data file." );
        misFClose(refNum);
        return;
        }

stkResetStocks();
bndResetBonds();

strcpy ( buf, "Would you like to reload stock and bond selections from the previc

if ( msgAskYes( buf ) )
        {
        /* If the load went fine (no picks that are no longer recommended) tell the
        if ( ( readPickResult = misReadPicks(refNum) ) == 0 )
                {
```

BEST AVAILABLE COPY

```
                /* force $244, $245 & $246 to "1" to prevent reloading    */
                varSetS( vBankEditFlag, "1" );
                varSetS( vIncomeEditFlag, "1" );
                varSetS( vGrowthEditFlag, "1" );
                stkStockTableInitialized = TRUE;
                bndBondTableInitialized = TRUE;
                }
        else
                {
                /* repick bonds? */
                strcpy ( buf, "Would you like Money Advice to pick new Income ins
your previous picks are no longer recommended?" );
                if ( ( ( readPickResult & INCOME ) == INCOME ) &&
                   msgAskYes( buf ) )
                        {
                        varSetS ( vIncomeEditFlag, "0" );
                        bndBondTableInitialized = FALSE;
                        }
                else
                        {
                        varSetS( vIncomeEditFlag, "1" );
                        bndBondTableInitialized = TRUE;
                        }

                /* repick stocks? */
                strcpy ( buf, "Would you like Money Advice to pick new Growth ins
your previous picks are no longer recommended?" );
                if ( ( ( readPickResult & GROWTH ) == GROWTH ) &&
                   msgAskYes( buf ) )
                        {
                        varSetS ( vGrowthEditFlag, "0" );
                        stkStockTableInitialized = FALSE;
                        }
                else
                        {
                        varSetS( vGrowthEditFlag, "1" );
                        stkStockTableInitialized = TRUE;
                        }

                /* always reload the bank picks and leave them alone */
                varSetS( vBankEditFlag, "1" );
                }
        }
    else
        {
        misSkipPicks ( refNum );
        /* set $244, $245 and $246 to determine whether to run new detail/picks o
        varSetS (vBankEditFlag, "0");
        varSetS (vIncomeEditFlag, "0");
        varSetS (vGrowthEditFlag, "0");
        stkStockTableInitialized = FALSE;
        bndBondTableInitialized = FALSE;
        }

    misReadNotes (refNum);
    misFClose (refNum);
    }


/* ......................................................................................
Boolean misReadVars ( Int16T refNum)
    {
    OSErr           rc;
    Int16T          numRead;
    Int32T          varNum;
    char            varValue[VAR_MAXVARLEN],
                            buf[500],
```

BEST AVAILABLE COPY

```
                        tempNum[10];
Boolean                 validFlag = FALSE;

rc = misGetLn ( refNum, buf, 500) ;
while ( (rc == noErr)  && (strlen(buf) > 0) )
      {
      varValue[0] = '\0';

      numRead = sscanf(buf, "\"%[^\"]\",\"%[^\"]\"", tempNum, varValue);

      if ( numRead == 0 )
            TGL_ERROR ( "Error read variable data from MIS file.");

      varNum = atoi ( tempNum);

      if ( !validFlag )
            if ( varNum != 1 )
                  return (FALSE);
            else
                  validFlag = TRUE;

      if ( (varNum > VAR_MAXVAR ) || (varNum < 1 ) )
            TGL_ERROR("Invalid variable number while reading.");

      varSetS(varNum, varValue);

      rc = misGetLn ( refNum, buf, 500) ;
      }

return (TRUE);
}

/* ..........................................................................................
Int16T misReadPicks ( Int16T refNum)
      {
      char        buf[500];
      PickInfoRec pRec;
      Int16T              rc;
      Int16T              foundNotRecommendedItem = 0;

      while ( noErr == (rc = misGetLn ( refNum, buf,500 ) ))
            {
            rc = sscanf( buf, "\"%c\",\"%[^\"]\",\"%[^\"]\",\"%ld\",\"%[^\"]\",\"%c\"",
read, i know. */
                        &pRec.typeFlag, &pRec.nameOfIssue, &pRec.itemID,
                        &pRec.numUnits, &pRec.curPrice, &pRec.BuyListFlag);

            if ( rc != 6 )
                  break;

            if (pRec.typeFlag == 'I')
                  {
                  /* deal with an unselectable instrument differently than a bought on
                  if ( pRec.BuyListFlag == 'X' )
                        if ( !bndRemoveFromBuyList( (char *) &pRec.itemID ) )
                              {
                              sprintf ( buf, "%s is no longer recommended.  It is no lor
it from being selected.", &pRec.nameOfIssue );
                              msgAlert( buf );
                              }

                  if ( pRec.BuyListFlag == 'S' )
                        if ( !bndReload( (char *) &pRec.itemID, pRec.numUnits) )
                              {
                              sprintf ( buf, "%s is no longer recommended.  The mone
put into residual.", &pRec.nameOfIssue );
                              msgAlert( buf );
                              foundNotRecommendedItem |= INCOME;
```

BEST AVAILABLE COPY

```
                }
        /* we currently do nothing if pRec.BuyListFlag is something unrecog
        }
    else
        {
        if ( !stkReload( (char *) &pRec.itemID, pRec.numUnits) )
            {
            sprintf ( buf, "%s is no longer recommended.  The money allo
residual.", &pRec.nameOfIssue );
            msgAlert( buf );
            foundNotRecommendedItem |= GROWTH;
            }
        }

    }

stkReloadCleanup();
bndReloadCleanup();

return( foundNotRecommendedItem );
}


void  misSkipPicks ( Int16T       refNum )
    {
    OSErr               rc;
    char          buf[255];
    while ( noErr == (rc = misGetLn ( refNum, buf,500 ) ))
        {
        if ( strlen ( buf ) == 0 )
            break;
        }
    }

/* ..........................................................................................
void misReadNotes ( Int16T refNum)
    {
    Int16T              blockNum;
    Handle              tb;
    char                c,
                        buf[200];

    tglTextEditGopher->ClearBlocks();          /* clear out the current text data */

    /* read in the text blocks to the constant handles */
    for (blockNum = 0; blockNum < TXT_MAX_TEXT_BLOCKS; blockNum++ )
        {
        tb = tglTextEditGopher->GetText ( blockNum );
        misReadBlock( refNum, tb );
        }
    }

/* ..........................................................................................
/* ReadBlock() reads in a block of text from the file until EOF or a NULL terminator is
    reached, possibly including CRs. Gets the correct size and reallocs the Handle tb.

void misReadBlock ( Int16T refNum, Handle tb )
    {
    Int16T              i = 0;
    char                *buf,
                         c
    OSErr               rc;

    if ( NULL == ( buf = NewPtr( TXT_MAX_TEXT_SIZE ) ) )
        {
        TGL_ERROR ( "MIS: Cannot allocate input buffer" );
        return;
```

BEST AVAILABLE COPY

```
		}

	while ( noErr == ( rc = misFReadCh ( refNum, &c) ) )		/* not EOF and not end
		{
		if ( c == '\0' )
			break;

		if ( c == '\n' )
			c = '\r';				/* convert any \n to \r */

		buf [i++] = c;
		}

	SetHandleSize(tb, (Size) i );
	if ( i > 0 )
		{
		HLock (tb);
		memcpy (*tb, buf, i );
		HUnlock (tb);
		}
	DisposPtr(buf);
	}


void			misChkNMove(char *CustName)
	{
	HFileParam			fp;
	CMovePBRec		cmp;
	char				buf [255];
	OSErr				rc = noErr;

	for ( fp.ioFDirIndex = 1; rc == noErr; fp.ioFDirIndex++)		/* search MIS direc
		{
		fp.ioCompletion	= NULL;
		fp.ioNamePtr		= (StringPtr) buf;
		fp.ioVRefNum	= 0;
		fp.ioFVersNum	= 0;
		fp.ioDirID		= misGetMISDir();

		rc = PBHGetFInfo ( (HParmBlkPtr) &fp, FALSE);		/* get each file's n
		if ( rc == noErr )
			{
			if ( ! strncmp ( CustName, PtoCstr(buf), strlen(CustName) ) )
				{
				/*
				 * found a previous file for them, now move it...
				 */
				char		newName[255];

				strcpy ( newName, "\pOld Files");

				cmp.ioCompletion		= NULL;
				cmp.ioNamePtr		= (StringPtr) CtoPstr(buf);
				cmp.ioNewName	= (StringPtr) newName;

				cmp.ioVRefNum		= 0;
*/				cmp.ioDirID				= misGetMISDir();

				cmp.ioNewDirID	= cmp.ioDirID;

				rc = PBCatMove ( (CMovePBPtr) &cmp, FALSE);
				if ( rc != noErr )
					{
					switch ( rc )
						{
						case ( dupFNErr ) :
```

```
                        /* They must be trying to save a second tim
so the names
                                are the same. Just delete the existinc
the new one. */

                        fp.ioVRefNum      = misGetMAVref();
                        fp.ioDirID                = misGetMISDir();
                        rc = PBHDelete ( ( HParmBlkPtr) &fp, FALSE
                        if ( rc != noErr )
                                {
                                sprintf ( buf, "Error (%ld) deleting pr
(MIS)", rc );
                                TGL_ERROR ( buf );
                                }
                        break;

                case ( bdNamErr ) :
                        TGL_ERROR ( "Bad file name while managi
                        break;

                case ( badMovErr ) :
                        TGL_ERROR ( "Bad file name or attemp to
                        break;

                case ( fnfErr ) :
                        TGL_ERROR ( "The file being moved canno
                        break;

                default :
                        sprintf ( buf, "Non-fatal error (%ld) while r
PtoCstr( (char *) fp.ioNamePtr) );
                        msgAlert ( buf );
                        break;
                }
            }
        FlushVol ( NULL, cmp.ioVRefNum);

        return;
        }
    }
  else if ( rc != fnfErr )
    {
    sprintf ( buf, "Error (%ld) while check files. (MIS)", rc );
    TGL_ERROR ( buf );
    }
  }


}

Boolean                 misCheckValidFile ( Int16T refNum )
    {
    return ( TRUE );
    }


void  misAllocCheck ()
    {
    if ( !stkStockTableInitialized )
        {
        stkPickGrowth();
        stkRecalcStock();
        }

    if ( ! bndBondTableInitialized )
        {
        bndPickBond();
        bndRecalcBond();
```

BEST AVAILABLE COPY

```
        }

    if ( varVal (vBankEditFlag ) != 1)
        {
        bnkPickBank();
        bnkRecalcBank();
        }
    }

/* eof */
```

```
/* Communicate with Home Base Program  */
/* CitiBank Money Advisor          */
/* Modem io.c                   */
/* 1/24/90 - JDT                */

#define APP_ADTERM

#include <SerialDvr.h>

#include "standard.h"
#include "glue.h"
#include "tglMain.h"
#include "scrScreen.h"
#include "libLibrary.h"
#include "grfGraphics.h"
#include "tchTouch.h"
#include "varFns.h"
#include "modIO.h"


/*
 * external definitions which shouldn't be used
 */
void  tglTask( EventRecord myEvent );
Boolean      tglEvent( EventRecord myEvent );



/* Local prototypes */
void parse_parms(void);
Boolean dialin(void);
void PutSnip(char *, Rect *);
void snip_cleanup(void);
void dialin_failure(char *);
void alldone(void);
Boolean user_canned_it(void);
void rename_problem(void);
void general_problem(void);
void DuringDownloadEvent(void);
void DialHomeBase(void);
Int16T DoModemOpen(void);
void modem_out(char *);
void modem_byte_out(char);
void get_modem_data(Int32T);
void timer_hit(void);
void handle_track_hit(Int16T);
void start_timer(Int32T);
Int16T md_get(Int16T);
void md_iflush(Int16T);
void md_xflush(void);
void md_put(Int16T);
void md_write(unsigned char *,Int16T);
Int16T track_add(char *);
void track_free(Int16T *);
void free_all_tracks(void);
Int16T track_char(char);
void strpcpy(char *, char *);
Int16T strplen(char *);
Int16T get_files(void);
Int16T rcv_batch(Int16T);
static Int16T rcvdata(void);
void OpenStatusBox(void);
void DrawProgressBar(void);
void UpdateProgress(void);
Int16T IsMacBinary(unsigned char *);
void SetFileInfo(unsigned char *);
void SetTextBoxString(DialogPtr,Int16T, char *);
void SetTextBoxNumber(DialogPtr,Int16T,Int32T);
```

```
void CopyString(unsigned char *, unsigned char *);
void CVPString(unsigned char *, unsigned char *);
void info(char *,...);
void say(char *,...);
Int16T OpenOrCreate(char *,Int16T,Int16T *);
Int16T mputc(char, Int16T);
Int16T mgetc(Int16T);
Int16T xy_sinit(void);
Int16T xy_sndeot(void);
Int16T xy_rinit(Int16T);
Int16T xy_rcvhdr(Int16T,char *,Int32T *);
Int16T xy_rcvblk(unsigned char *, Int16T *);
void xy_sndack(void);
void xy_cancel(void);
static Int16T startxfr(void);
static Int16T sendhdr(char *,Int32T);
static Int16T sndblk(Int16T, unsigned char *, Int16T);
Int16T sndpkt(unsigned char *, Int16T);
static Int16T processhdr(unsigned char *, Int16T, char *, Int32T *);
static Int16T rcvblk(Int16T, unsigned char *, Int16T *);
static Int16T rcvpkt(Int16T *, unsigned char *, Int16T *);
static Int16T rcvhdr(Int16T *, Int16T *);
static Int16T rcvchk(unsigned char *, Int16T);
Int16T shortblock_get(char *, Int16T);
void DoModemHangup(void);
Boolean rename_files(void);
void MakeFake(char *fake, char *real, Int16T n);

/* block lengths */
#define SBLKLEN         128
#define LBLKLEN         1024

/* error codes */
#define ER_OK               0
#define ER_INIT         1
#define ER_DATA         2
#define ER_EOT          3
#define ER_CANCEL       4
#define ER_EOF          5
#define ER_DONE         6
#define ER_HEAD         7

/* useful constants */
#define DT_TIME  -1          /* return value for timeout */
#define RETRY    4                /* number of times to retry */

/* Global Variables */
Int16T baud = baud2400;                         /* Current Baud Rate */
Int16T stop = stop10;                                /* Current # of stop bits */
Int16T parity = noParity;                   /* Current parity setting */
Int16T databits = data8;                    /* Current databits setting */
char phonenumber[32];                                /* Current Phone Number */
Int16T aOutRef;                                              /* File handle for
Int16T aInRef;                                               /* File handle for
Int16T io_open;                                              /* Modem open ?
Int16T timer;
Int32T timerLength;
Int32T timerStart;
#define MAX_FSEND 64                                 /* Allow 64 files to be sent */
Int16T numFsend;                                          /* Number of files sent *
char *fsend[MAX_FSEND];                              /* True names of sent files */

/* Local variables */
Int16T hello_track;                                                    /* Sel
Int16T busy_track;                                                  /* Busy pho
#define IBSIZE      4096                                            /* port inpu
unsigned char InBuf[IBSIZE];                         /* Input buffer */
unsigned char *iptr;                                                /* Current P
```

```
SerShk handshake;
Handle hSnip_bar;
Rect cancel_rect;                                                          /* W!
char vdata[16];
us */

/* Tracking Variables */
#define MAX_TSTRING 5
Int16T tstrings;                                                        /* Number
Int16T mpos[MAX_TSTRING];                                        /* Maximum pos match
char *mstring[MAX_TSTRING];                                    /* Strings being matched */

/* protocol characters */
#define SOH      0x01  /* start of a 128 byte block */
#define STX      0x02  /* start of a 1024 byte block */
#define EOT      0x04  /* end of a complete file */
#define ACK      0x06  /* positive acknowledgement */
#define NAK      0x15  /* negative acknowledgement */
#define CAN      0x18  /* cancel transfer */
#define CRC      'C'        /* CRC request (instead of NAK to start a transfer) */

/* timeout values (in seconds) */
#define STIME    6          /* timeout between characters of a packet */
#define ITIME    5          /* timeout sending initial NAK or 'C' */
#define XTIME    60   /* timeout waiting for initial NAK */
#define LTIME    20   /* timeout waiting for an ACK/NAK */
#define FTIME    1          /* timeout for flushing the line */

/* Dialin conditions */
#define mio_READY 1L        /* Ready to transfer files */
#define mio_BUSY 2L              /* Got a busy signal */
#define mio_TIMEOUT 3L      /* Never got a 'hello' */

/* global variables */
Int16T blknum;                               /* current block number */

/* local variables */
static Int16T crcmode;    /* TRUE for CRC mode, FALSE for checksum */
static Int16T timeout;    /* current receive timeout */
static Int16T needack;    /* need an ACK for the previous block */
static Int16T nak;             /* NAK character on receive */

/* crctab calculated by Mark G. Mendel, Network Systems Corporation */
static unsigned short crctab[256] = {
   0x0000, 0x1021, 0x2042, 0x3063, 0x4084, 0x50a5, 0x60c6, 0x70e7,
   0x8108, 0x9129, 0xa14a, 0xb16b, 0xc18c, 0xd1ad, 0xe1ce, 0xf1ef,
   0x1231, 0x0210, 0x3273, 0x2252, 0x52b5, 0x4294, 0x72f7, 0x62d6,
   0x9339, 0x8318, 0xb37b, 0xa35a, 0xd3bd, 0xc39c, 0xf3ff, 0xe3de,
   0x2462, 0x3443, 0x0420, 0x1401, 0x64e6, 0x74c7, 0x44a4, 0x5485,
   0xa56a, 0xb54b, 0x8528, 0x9509, 0xe5ee, 0xf5cf, 0xc5ac, 0xd58d,
   0x3653, 0x2672, 0x1611, 0x0630, 0x76d7, 0x66f6, 0x5695, 0x46b4,
   0xb75b, 0xa77a, 0x9719, 0x8738, 0xf7df, 0xe7fe, 0xd79d, 0xc7bc,
   0x48c4, 0x58e5, 0x6886, 0x78a7, 0x0840, 0x1861, 0x2802, 0x3823,
   0xc9cc, 0xd9ed, 0xe98e, 0xf9af, 0x8948, 0x9969, 0xa90a, 0xb92b,
   0x5af5, 0x4ad4, 0x7ab7, 0x6a96, 0x1a71, 0x0a50, 0x3a33, 0x2a12,
   0xdbfd, 0xcbdc, 0xfbbf, 0xeb9e, 0x9b79, 0x8b58, 0xbb3b, 0xab1a,
   0x6ca6, 0x7c87, 0x4ce4, 0x5cc5, 0x2c22, 0x3c03, 0x0c60, 0x1c41,
   0xedae, 0xfd8f, 0xcdec, 0xddcd, 0xad2a, 0xbd0b, 0x8d68, 0x9d49,
   0x7e97, 0x6eb6, 0x5ed5, 0x4ef4, 0x3e13, 0x2e32, 0x1e51, 0x0e70,
   0xff9f, 0xefbe, 0xdfdd, 0xcffc, 0xbf1b, 0xaf3a, 0x9f59, 0x8f78,
   0x9188, 0x81a9, 0xb1ca, 0xa1eb, 0xd10c, 0xc12d, 0xf14e, 0xe16f,
   0x1080, 0x00a1, 0x30c2, 0x20e3, 0x5004, 0x4025, 0x7046, 0x6067,
   0x83b9, 0x9398, 0xa3fb, 0xb3da, 0xc33d, 0xd31c, 0xe37f, 0xf35e,
   0x02b1, 0x1290, 0x22f3, 0x32d2, 0x4235, 0x5214, 0x6277, 0x7256,
   0xb5ea, 0xa5cb, 0x95a8, 0x8589, 0xf56e, 0xe54f, 0xd52c, 0xc50d,
   0x34e2, 0x24c3, 0x14a0, 0x0481, 0x7466, 0x6447, 0x5424, 0x4405,
   0xa7db, 0xb7fa, 0x8799, 0x97b8, 0xe75f, 0xf77e, 0xc71d, 0xd73c,
   0x26d3, 0x36f2, 0x0691, 0x16b0, 0x6657, 0x7676, 0x4615, 0x5634,
```

modio.c

```
    0xd94c, 0xc96d, 0xf90e, 0xe92f, 0x99c8, 0x89e9, 0xb98a, 0xa9ab,
    0x5844, 0x4865, 0x7806, 0x6827, 0x18c0, 0x08e1, 0x3882, 0x28a3,
    0xcb7d, 0xdb5c, 0xeb3f, 0xfb1e, 0x8bf9, 0x9bd8, 0xabbb, 0xbb9a,
    0x4a75, 0x5a54, 0x6a37, 0x7a16, 0x0af1, 0x1ad0, 0x2ab3, 0x3a92,
    0xfd2e, 0xed0f, 0xdd6c, 0xcd4d, 0xbdaa, 0xad8b, 0x9de8, 0x8dc9,
    0x7c26, 0x6c07, 0x5c64, 0x4c45, 0x3ca2, 0x2c83, 0x1ce0, 0x0cc1,
    0xef1f, 0xff3e, 0xcf5d, 0xdf7c, 0xaf9b, 0xbfba, 0x8fd9, 0x9ff8,
    0x6e17, 0x7e36, 0x4e55, 0x5e74, 0x2e93, 0x3eb2, 0x0ed1, 0x1ef0
};

#define updcrc(crc,ch) (crctab[((crc >> 8) & 0xFF)] ^ (crc << 8) ^ ch)

/* resource ID's */
#define STATUS    128          /* transfer status dialog */
#define SALERT    130          /* success alert */
#define FALERT    131          /* failure alert */

/* items in the transfer status dialog */
#define FNAME          2            /* file name */
#define RBLOCKS        4            /* blocks received */
#define RBYTES         6            /* bytes received */
#define ERRORS         8            /* error count */
#define MESSAGE        10           /* last message */
#define PROGRESS       11           /* progress bar */
#define TOTAL          13           /* total size */
#define MACBIN         14           /* MacBinary */

/* global variables */
Int16T crc;                              /* crc mode flag */
Int16T big;                              /* big block mode flag *
Int16T fRefNum;                          /* transfer file reference numb
Int32T fsize;                            /* size of current file */
Int32T big_fsize;                        /* size of all accumlated bytes */
Int32T ftotal;                           /* total size of current file */
Int32T big_ftotal;                       /* total size of all files to be sent */
char fName[256];                         /* filename */
Int16T vRefNum;                          /* volume reference number */
Int16T binaryMode;                       /* MacBinary mode */
Int32T rForkLen;                         /* resource fork length (for MacBinar
Int32T dForkLen;                         /* data fork length (for MacBinary) *
Int32T version;                          /* Last version sent */
Int16T status_active;                    /* Statys box up ? */

/* MacBinary modes */
#define MB_OFF      0                    /* not a MacBinary file */
#define MB_DFORK    1                    /* reading data fork */
#define MB_RFORK    2                    /* reading resource fork */

/* external variables */
Int16T filesend;                 /* In progress of sending a file */

/* local variables */
static DialogRecord dRecord;
static DialogPtr xfrDialog;
static jmp_buf abort_xfr;
static Int16T errors;
static Rect pRect;

void modIOmain()
{
        int sts;

        parse_parms();

try_again:
  numFsend = 0;
        scrRestoreColors();
```

BEST AVAILABLE COPY

```
	PutSnip("blank.s", NULL);

	tglCursorOnOff(TGL_ON);
	if (!dialin()) goto done;
	sts = get_files();
	switch (sts) {
	  case ER_CANCEL:
			snip_cleanup();
			md_xflush();
			break;
	  case ER_DONE:
			if (rename_files()) {
			alldone();
			} else {
			rename_problem();
		}
		break;
	  default:
		general_problem();
		md_xflush();
		break;
	}

done:
	snip_cleanup();
	scrRestoreColors();
}

Boolean dialin()
{
	Boolean done;
	EventRecord theEvent = { 0, 0L, 0L, {0, 0}, 0 };
	Int32T count;

	tglCursorOnOff(TGL_OFF);
	scrRestoreColors();
	PutSnip("blank bot.s", NULL);
	PutSnip("cancel.s", &cancel_rect);

	/* Text */
	scrSetHueNow(6);
	MoveTo(210, 200);
	drawstring("Now calling MA Host.");
	MoveTo(210, 230);
	drawstring("Please wait...");
	scrRestoreColors();

	DialHomeBase();

	/* Event Loop */
	tglCursorOnOff(TGL_ON);
	done = FALSE;
	while (!done) {
		tglTask(theEvent);
		/* IO Port */
		if (io_open && (!filesend)) {
			SerGetBuf(alnRef, &count);
			if (count > 0) get_modem_data(count);
		}

		/* Check timer */
		if (timer)
			if ((TickCount() - timerStart) > timerLength)
				timer_hit();

	 GetNextEvent(everyEvent, &theEvent);
	 switch (theEvent.what) {
	   case (mouseDown):
```

```
        if (PtInRect(theEvent.where, &cancel_rect)) {
                tchBeepNow(TCH_GOOD_BEEP);
                DoModemHangup();
            return FALSE;
                dialin_failure("Cancelled by user.");
            return FALSE;
        }
        tchBeepNow(TCH_BAD_BEEP);
        break;
            case app1Evt:
                switch (theEvent.message) {
                  case mio_READY:
                        return TRUE;
                  case mio_BUSY:
                    dialin_failure("Busy signal was received.");
                        DoModemHangup();
                    return FALSE;
                  case mio_TIMEOUT:
                        dialin_failure("No answer was received.");
                        DoModemHangup();
                        return FALSE;
                  default:
                        dialin_failure("Unknown reason.");
                        DoModemHangup();
                        return FALSE;
                }
                break;
            case nullEvent:
                break;
      default:
          done = tglEvent(theEvent);
                break;
      }
    }
    if (done) PostEvent(theEvent.what, theEvent.message);
}

void dialin_failure(mess)
char *mess;
{
    Rect continue_rect;
    Boolean done;
    EventRecord theEvent = { 0, 0L, 0L, {0, 0}, 0 };

    tglCursorOnOff(TGL_OFF);
    scrRestoreColors();
    PutSnip("blank bot.s", NULL);
    PutSnip("continue.s", &continue_rect);

    /* Text */
    scrSetHueNow(6);
    MoveTo(210, 200);
    drawstring("Unable to reach MA Host");
    MoveTo(210, 230);
    drawstring(mess);
    scrRestoreColors();

    /* Event Loop */
    tglCursorOnOff(TGL_ON);
    done = FALSE;
    while (!done) {
          tglTask(theEvent);
      GetNextEvent(everyEvent, &theEvent);
      switch (theEvent.what) {
        case mouseDown:
          if (PtInRect(theEvent.where, &continue_rect)) {
                tchBeepNow(TCH_GOOD_BEEP);
            return;
```

```
        }
         tchBeepNow(TCH_BAD_BEEP);
        break;
                case nullEvent:
                    break;
      default:
          done = tglEvent(theEvent);
                    break;
    }
   }
   if (done) PostEvent(theEvent.what, theEvent.message);
}

void DuringDownloadEvent()
{
        EventRecord theEvent = { 0, 0L, 0L, {0, 0}, 0 };

        /* Event Loop */
        tglTask(theEvent);
        GetNextEvent(everyEvent, &theEvent);
        switch (theEvent.what) {
          case mouseDown:
            if (PtInRect(theEvent.where, &cancel_rect)) {
                        tchBeepNow(TCH_GOOD_BEEP);
                        xy_cancel();
                        longjmp(abort_xfr,ER_CANCEL);
            }
            break;
                tchBeepNow(TCH_BAD_BEEP);
                break;
        }
}

void alldone()
{
        Rect continue_rect;
        Boolean done;
        EventRecord theEvent = { 0, 0L, 0L, {0, 0}, 0 };

        tglCursorOnOff(TGL_OFF);
        scrRestoreColors();
        PutSnip("blank bot.s", NULL);
        PutSnip("continue.s", &continue_rect);

        /* Text */
        scrSetHueNow(6);
        MoveTo(210, 200);
        drawstring("File transfer complete!");
        tchBeepNow(TCH_GOOD_BEEP);
        scrRestoreColors();

        /* Event Loop */
        tglCursorOnOff(TGL_ON);
        done = FALSE;
        while (!done) {
                tglTask(theEvent);
         GetNextEvent(everyEvent, &theEvent);
         switch (theEvent.what) {
           case mouseDown:
            if (PtInRect(theEvent.where, &continue_rect)) {
                tchBeepNow(TCH_GOOD_BEEP);
                        return;
            }
                        tchBeepNow(TCH_BAD_BEEP);
            break;
                case nullEvent:
                        break;
          default:
```

```
			done = tglEvent(theEvent);
				break;
		}
	}
	if (done) PostEvent(theEvent.what, theEvent.message);
}

void rename_problem()
{
	Rect continue_rect;
	Boolean done;
	EventRecord theEvent = { 0, 0L, 0L, {0, 0}, 0 };

	tglCursorOnOff(TGL_OFF);
	scrRestoreColors();
	PutSnip("blank bot.s", NULL);
	PutSnip("continue.s", &continue_rect);

	/* Text */
	scrSetHueNow(6);
	MoveTo(210, 200);
	drawstring("File transfer unsuccessful!");
	MoveTo(210, 230);
	drawstring("Problem naming files.");
	tchBeepNow(TCH_BAD_BEEP);
	scrRestoreColors();

	/* Event Loop */
	tglCursorOnOff(TGL_ON);
	done = FALSE;
	while (!done) {
		tglTask(theEvent);
	  GetNextEvent(everyEvent, &theEvent);
	  switch (theEvent.what) {
	    case mouseDown:
	     if (PtInRect(theEvent.where, &continue_rect)) {
		tchBeepNow(TCH_GOOD_BEEP);
				return;
	     }
				tchBeepNow(TCH_BAD_BEEP);
	     break;
			case nullEvent:
				break;
	    default:
		done = tglEvent(theEvent);
				break;
	  }
	}
	if (done) PostEvent(theEvent.what, theEvent.message);
}

void general_problem()
{
	Rect continue_rect;
	Boolean done;
	EventRecord theEvent = { 0, 0L, 0L, {0, 0}, 0 };

	tglCursorOnOff(TGL_OFF);
	scrRestoreColors();
	PutSnip("blank bot.s", NULL);
	PutSnip("continue.s", &continue_rect);

	/* Text */
	scrSetHueNow(6);
	MoveTo(210, 200);
	drawstring("File transfer unsuccessful!");
	MoveTo(210, 230);
	drawstring("Communications failure.");
```

```
        tchBeepNow(TCH_BAD_BEEP);
        scrRestoreColors();

        /* Event Loop */
        tglCursorOnOff(TGL_ON);
        done = FALSE;
        while (!done) {
                tglTask(theEvent);
          GetNextEvent(everyEvent, &theEvent);
          switch (theEvent.what) {
            case mouseDown:
             if (PtInRect(theEvent.where, &continue_rect)) {
                tchBeepNow(TCH_GOOD_BEEP);
                                return;
             }
                        tchBeepNow(TCH_BAD_BEEP);
             break;
                        case nullEvent:
                                break;
           default:
                done = tglEvent(theEvent);
                                break;
          }
        }
        if (done) PostEvent(theEvent.what, theEvent.message);
}

Boolean user_canned_it()
{
        Rect retry_rect;
        Rect cancel_rect;
        Boolean done;
        EventRecord theEvent = { 0, 0L, 0L, {0, 0}, 0 };

        tglCursorOnOff(TGL_OFF);
        scrRestoreColors();
        PutSnip("blank bot.s", NULL);
        PutSnip("retry.s", &retry_rect);
        PutSnip("cancel.s", &cancel_rect);

        /* Text */
        scrSetHueNow(6);
        MoveTo(210, 200);
        drawstring("The update is not complete.");
        MoveTo(210, 215);
        drawstring("What would you like to do?");
        scrRestoreColors();

        /* Event Loop */
        tglCursorOnOff(TGL_ON);
        done = FALSE;
        while (!done) {
                tglTask(theEvent);
          GetNextEvent(everyEvent, &theEvent);
          switch (theEvent.what) {
           case mouseDown:
             if (PtInRect(theEvent.where, &retry_rect)) {
                tchBeepNow(TCH_GOOD_BEEP);
                                return TRUE;
                        }
             if (PtInRect(theEvent.where, &cancel_rect)) {
                tchBeepNow(TCH_GOOD_BEEP);
                return FALSE;
             }
             tchBeepNow(TCH_BAD_BEEP);
           break;
                        case nullEvent:
                                break;
```

BEST AVAILABLE COPY

```
        default:
            done = tglEvent(theEvent);
                        break;
        }
    }
    if (done) PostEvent(theEvent.what, theEvent.message);
}

void PutSnip(name, r)
char *name;                                                    /* Snip
Rect *r;                                                       /* Opt
*/
{
    Handle hSnip;
    Rect theRect;
    Point p;

    hSnip= libFindPicPtr(name, TRUE);
    libGetPicRect(hSnip, &theRect);
    p = topLeft(theRect);
    grfDrawPic( hSnip, &p);
    if (r != NULL) *r = theRect;
}

void snip_cleanup()
{
    Handle hSnip;
    Int16T i;

    hSnip = libFindPicPtr("blank bot.s", TRUE);
    HPurge(hSnip);
    hSnip = libFindPicPtr("blank.s", TRUE);
    HPurge(hSnip);
    hSnip = libFindPicPtr("indent.s", TRUE );
    HPurge(hSnip);
    hSnip = libFindPicPtr("retry.s", TRUE );
    HPurge(hSnip);
    hSnip = libFindPicPtr("cancel.s", TRUE );
    HPurge(hSnip);
    hSnip = libFindPicPtr("continue.s", TRUE );
    HPurge(hSnip);
    hSnip = libFindPicPtr("bar.s", TRUE );
    HPurge(hSnip);
    hSnip = libFindPicPtr("yes.s", TRUE );
    HPurge(hSnip);
    hSnip = libFindPicPtr("no.s", TRUE );
    HPurge(hSnip);
    for (i=0; i<numFsend; i++) DisposPtr(fsend[i]);
}

void DialHomeBase()
{
    DoModemOpen();

    /* Dial */
    modem_out("ATDT");
    modem_out(phonenumber);
    modem_out("\r");

    hello_track = track_add("Hello");
    busy_track = track_add("BUSY");
    start_timer(60*40);
}

Int16T DoModemOpen()
{
    Int16T rc;
    Int32T final;
```

```
	/* Open the Drivers? */
	if (!io_open) {
		rc = OpenDriver("\p.AOut",&aOutRef);
		if (rc != noErr) return 1;
		rc = OpenDriver("\p.AIn",&aInRef);
		if (rc != noErr) return 1;
	SerSetBuf(aInRef,inBuf,IBSIZE);
	/* setup default handshaking */
	handshake.fXOn = FALSE;
	handshake.fCTS = FALSE;
	handshake.xOn = 0x11;
	handshake.xOff = 0x13;
	handshake.errs = 0;
	handshake.evts = 0;
	handshake.fInX = TRUE;
	handshake.fDTR = TRUE;
	SerHShake(aInRef,&handshake);
		SerReset(aOutRef,baud+stop+parity+databits);
		SerReset(aInRef,baud+stop+parity+databits);
		io_open = 1;
	}
	modem_out("ATZ\r");
	Delay(120, &final);
	modem_out("ATV1\r");
	Delay(120, &final);
}

void modem_out(s)
char *s;
{
	Int32T count;

	count = strlen(s);
	FSWrite(aOutRef,&count,s);
}

void modem_byte_out(c)
char c;
{
	Int32T count;

	count = 1;
	FSWrite(aOutRef,&count,&c);
}

void get_modem_data(count)
Int32T count;
{
	char data[256];
	Int32T i;
	char c;
	Int16T rc;

	FSRead(aInRef,&count,&data);
	for (i=0; i<count; i++) {
		/* Mess with character */
		/* Strip high bit */
		switch (c=data[i]&127) {
			case 13: c='\r'; break;
			case 10: c=0; break;
		}
		if (c) {
			rc = track_char(c);
			if (rc != -1) handle_track_hit(rc);
		}
	}
}
```

modio.c

```
void timer_hit()
{
        timer = 0;

        /* When ? */
        if (hello_track) {
                track_free(&hello_track);
                track_free(&busy_track);
                DoModemHangup();
                PostEvent(app1Evt, mio_TIMEOUT);
        }

}

void handle_track_hit(message)
int16T message;
{
        static char temp[32];
        char temp2[32];
        int32T final;

        /* Got here, kill Timer */
        timer = 0;

        /* Self test */
        if (message == hello_track) {
                track_free(&hello_track);
                /* Get Files Event */
                PostEvent(app1Evt, mio_READY);
                return;
        }

        /* Busy Signal ? */
        if (message == busy_track) {
                track_free(&busy_track);
                track_free(&hello_track);
          DoModemHangup();
                PostEvent(app1Evt, mio_BUSY);
          return;
        }
}

void start_timer(ticks)
int32T ticks;
{
        timer = 1;
        timerLength = ticks;
        timerStart = TickCount();
}

/* ------------------------- */
/* Modem IO for File Transfer */
/* ------------------------- */
static int32T icnt;

/* md_get - get a character with timeout */
int16T md_get(tmo)
int16T tmo;
{
        int32T clk;

        if (--icnt >= 0L) return (*iptr++);

        clk = TickCount() + (int32T)tmo * 60L;
 for (;;) {
                SerGetBuf(ainRef,&icnt);
                if (icnt > 0L) {
```

BEST AVAILABLE COPY

```
            if (icnt > (Int32T)IBSIZE) icnt = IBSIZE;
            FSRead(aInRef,&icnt,inBuf);
            iptr = inBuf; --icnt;
            return (*iptr++);
                }
                if (TickCount() >= clk) return (DT_TIME);
                DuringDownloadEvent();
  }
}

/* md_iflush - flush the modem input buffer */
void md_iflush(flag)
Int16T flag;
{
        unsigned char ch;
  Int32T inCnt,cnt;

  SerGetBuf(aInRef,&inCnt);
  while (--inCnt >= 0L) {
                cnt = 1L;
                FSRead(aInRef,&cnt,&ch);
        }
  icnt = 0L;
}

/* md_xflush - totally flush the modem input buffer */
void md_xflush()
{
        unsigned char ch;
  Int32T inCnt,cnt;

  SerGetBuf(aInRef,&inCnt);
  while (--inCnt >= 0L) {
                cnt = 1L;
                FSRead(aInRef,&cnt,&ch);
        }
  icnt = 0L;
}

/* md_put - output a character to the modem */
void md_put(ch)
Int16T ch;
{
        char buf[1];
  Int32T cnt;

  cnt = 1L;
  buf[0] = ch;
  FSWrite(aOutRef,&cnt,buf);
}

/* md_write - write a packet to the modem */
void md_write(buf,len)
unsigned char *buf;
Int16T len;
{
        Int32T cnt;

  cnt = (Int32T)len;
  FSWrite(aOutRef,&cnt,buf);
}

Int16T track_add(s)
char *s;                                                          /* String to t
{
        Int16T i;

        for (i=0; i<MAX_TSTRING; i++) {
```

modio.c

BEST AVAILABLE COPY

```
			if (mstring[i]==NULL) {
				/* Found place to stick one */
				mstring[i] = NewPtr(strlen(s)+1);
				strcpy(mstring[i], s);
				mpos[i] = 0;
				return i+1;
			}
		}
		/* Failure */
		return -1;
}

void track_free(i)
int16T *i;
{
		if (mstring[(*i)-1] != NULL) {
			DisposPtr(mstring[(*i)-1]);
			mstring[(*i)-1] = NULL;
		}
		*i = 0;
}

void free_all_tracks()
{
		int16T i;

		for (i=0; i<MAX_TSTRING; i++) {
			if (mstring[i]!=NULL) {
				DisposPtr(mstring[i]);
				mstring[i] = NULL;
			}
		}
}

int16T track_char(c)
char c;
{
		int16T i;

		for (i=0; i<MAX_TSTRING; i++) {
			if (mstring[i] != NULL) {
			 if ( (mstring[i][mpos[i]]==c) || (mstring[i][mpos[i]]=='~') ) {
				if (++mpos[i]==strlen(mstring[i])) {
					mpos[i]=0;
					return i+1;
				}
			 }
			}
		}
		return -1;
}

void strpcpy(d, s)
char *d, *s;
{
 int16T cnt,i;

 cnt = s[0] + 1;
 for (i=0; i<cnt; i++) *d++=*s++;
}

int16T strplen(s)
char *s;
{
		return ((int) *s) + 1;
}

int16T get_files()
```

modio.c

BEST AVAILABLE COPY

```
{
        char volName[255];
        char *files[8];
        Int16T volume, sts, vfRefNum, rc;
        Int32T final, count;

        /* Figure what they need, get the version number */
        big_fsize = 0L;
        filesend=1;
        Delay(60, &final);
        md_xflush();

        GetVol(volName, &volume);

        /* Read in and tell them the version number */
   if (FSOpen("\pVersion number",volume, &vfRefNum) == noErr) {
                count=4;
                FSRead(vfRefNum, &count, vdata);
                FSClose(vfRefNum);
                If (count==0) goto UseZero;
        } else {
        Create("\pVersion number",volume,'????','TEXT');
        UseZero:
                strcpy(vdata,"0000");
   }
        sndpkt((unsigned char *)vdata,4);

        /* Get new version # */
        shortblock_get(vdata, 4);
        vdata[4] = '\0';
        version = atoi(vdata);

        crc = TRUE;
        big = TRUE;

        /* Prep for and call get_batch */
        sts = rcv_batch(volume);
        filesend=0;

        /* Get ready for next time */
        Delay(4*60,&final);
        DoModemHangup();

        If (sts==ER_DONE) {
          If (rc=(FSOpen("\pVersion number",volume, &vfRefNum) == noErr)) {
                        SetEOF(vfRefNum,0L);
                        count = 4;
                        FSWrite(vfRefNum, &count, vdata);
                        FSClose(vfRefNum);
                }
        }
        return sts;
}

void DoModemHangup()
{
        Int32T final;

        modem_out("+++");
        Delay(120, &final);
        modem_out("ATH0\r");
        free_all_tracks();
        Delay(30, &final);
}

/* rcv_batch - receive files in batch mode */
Int16T rcv_batch(volume)
Int16T volume;
```

BEST AVAILABLE COPY

```
{
	Int16T sts;
	char sdata[30];

	/* Get the total size */
	shortblock_get(sdata, 16);
	big_ftotal = atol(sdata);

	/* transfer each file */
  OpenStatusBox();
  fRefNum = -1; vRefNum = volume;
  if ((sts = setjmp(abort_xfr)) == 0) {
		for (sts = ER_OK; sts == ER_OK; ) {
	  if ((sts = xy_rcvhdr(crc,fName,&ftotal)) == ER_OK) {
			CtoPstr((char *)fName); /* convert to a pascal string */
			if (OpenOrCreate(fName,vRefNum,&fRefNum) == noErr) {
		xy_sndack();
		fsize = 0L;
		sts = rcvdata();
		FSClose(fRefNum);
		fRefNum = -1;
			}	else {
		xy_cancel();
		sts = ER_CANCEL;
			}
	  }
		}
	}
	if (fRefNum >= 0) FSClose(fRefNum);

	return sts;
}

/* rcvdata - receive data using x/ymodem */
static Int16T rcvdata()
{
	unsigned char buf[LBLKLEN],*bp;
	int bc,sts;

	/* transfer the data */
  if ((sts = xy_rinit(crc)) == ER_OK) {
		binaryMode = MB_OFF;

		/* receive each data block */
		while ((sts = xy_rcvblk(buf,&bc)) == ER_OK) {
	  bp = buf; /* setup the buffer pointer */
	  if (fsize == 0L && IsMacBinary(bp)) {
			SetFileInfo(bp);
			bc -= 128L;
			bp += 128;
	  }
	  for (;;) {
		if (ftotal < 0L) {
				mputc(*bp++,fRefNum);
			++fsize;
			++big_fsize;
			bc--;
			} else if (fsize < ftotal) {
			  mputc(*bp++,fRefNum);
			++fsize;
			++big_fsize;
			bc--;
			} else if (binaryMode == MB_DFORK) {
			FSClose(fRefNum);
		ftotal = ((ftotal + 127L) / 128L) * 128L;
		while (fsize < ftotal) {
			--bc; ++fsize; ++big_fsize;
		}
```

BEST AVAILABLE COPY

```
			if (OpenRF(fName,vRefNum,&fRefNum)) {
					xy_cancel();
	!				return (ER_DATA);
			}
			binaryMode = MB_RFORK;
			ftotal += rForkLen;
			SetEOF(fRefNum,0L);
				} else {
				  break;
				}
				if (bc==0) break;
			}
			UpdateProgress();
		}
	}
	return (sts == ER_EOF ? ER_OK : sts);
}

/* OpenStatusBox - open the status dialog box */
void OpenStatusBox()
{
	Rect indent_rect;
is */

	tglCursorOnOff(TGL_OFF);
	scrRestoreColors();
	PutSnip("blank bot.s", NULL);
	PutSnip("indent.s", &indent_rect);
	PutSnip("cancel.s", &cancel_rect);
	hSnip_bar = libFindPicPtr("bar.s", TRUE );

	/* Text */
	scrSetHueNow(6);
	MoveTo(indent_rect.left+3, indent_rect.top+12);
	drawstring("0 %");
	MoveTo(indent_rect.left+50, indent_rect.top+12);
	drawstring("of files are transferred.");

	tglCursorOnOff(TGL_ON);
}

/* Update  the progress bar */
void UpdateProgress()
{
	Int32T percent,w;
	char temp[32];
	Rect indent_rect;
is */
	Rect theRect;
	Point  p;

	/* Update the text */
	scrRestoreColors();
	PutSnip("indent.s", &indent_rect);
	percent = (big_fsize * 100L) / big_ftotal;
	sprintf(temp,"%ld %%",percent);
	scrSetHueNow(6);
	MoveTo(indent_rect.left+3, indent_rect.top+12);
	drawstring(temp);

	/* Update the bar */
	libGetPicRect(hSnip_bar, &theRect);
	p = topLeft(theRect);
	w = (theRect.right - theRect.left) + 1;
	theRect.right = theRect.left + (w * big_fsize) / big_ftotal;

	grfMDrawPicPortion( hSnip_bar, &p, 0L, theRect);
}

modio.c
```

BEST AVAILABLE COPY

```
Int16T IsMacBinary(buf)
unsigned char *buf;
{
        if (buf[0] != 0 || buf[74] != 0 || buf[82] != 0) return (FALSE);
        if (buf[1] < 1 || buf[1] > 63) return (FALSE);
  return (TRUE);
}

void SetFileInfo(buf)
unsigned char *buf;
{
        FileParam filePB;
  FInfo info;
  Int16T sts;

  /* display MacBinary */
  SetTextBoxString(xfrDialog,MACBIN,"\PMacBinary");

  /* check to see if the file already exists */
  /* if (GetFInfo(&buf[1],0,&info)) {
                If (Rename(fName,0,&buf[1]) == noErr) {
            CopyString(&buf[1],(unsigned char *)fName);
            SetTextBoxString(xfrDialog,FNAME,fName);
                }
        } */

  /* get the data and resource fork lengths */
  BlockMove(&buf[83],&dForkLen,4L);
  BlockMove(&buf[87],&rForkLen,4L);

  /* get the current file information */
  filePB.ioNamePtr = (unsigned char *)fName;        /* file name */
  filePB.ioVRefNum = 0;  /* volume reference number */
  filePB.ioFVersNum = 0;  /* file version number */
  filePB.ioFDirIndex = 0;   /* find the file by name */
  if (sts = PBGetFInfo( (ParmBlkPtr) &filePB,0)) {
        say("can't get file information -- error=%d",sts);
  }

  /* set the finder information and the creation/modification dates */
  BlockMove(&buf[65],&filePB.ioFlFndrInfo.fdType,4L);
  BlockMove(&buf[69],&filePB.ioFlFndrInfo.fdCreator,4L);
  filePB.ioFlFndrInfo.fdFlags = (buf[73] & 0xF8) << 8;
  BlockMove(&buf[91],&filePB.ioFlCrDat,4L);
  BlockMove(&buf[95],&filePB.ioFlMdDat,4L);
  if (sts = PBSetFInfo( (ParmBlkPtr) &filePB,0)) {
                say("can't set file information -- error=%d",sts);
        }

  /* setup for receiving the data */
  binaryMode = MB_DFORK;
  ftotal = dForkLen;
}

void SetTextBoxString(d,itemNumber,value)
DialogPtr d;
Int16T itemNumber;
char *value;
{
        Handle itemHandle;
        Rect dispRect;
        Int16T itemType;

return;
        GetDItem(d,itemNumber,&itemType,&itemHandle,&dispRect);
  SetIText(itemHandle,value);
}
```

modio.c

BEST AVAILABLE COPY

```
void SetTextBoxNumber(d,itemNumber,value)
DialogPtr d;
Int16T itemNumber;
Int32T value;
{
	Handle itemHandle;
  Rect dispRect;
  Int16T itemType;
  char buf[20];
return;
  NumToString(value,buf);
  GetDItem(d,itemNumber,&itemType,&itemHandle,&dispRect);
  SetIText(itemHandle,buf);
}

/* CopyString - copy a pascal string */
void CopyString(src,dst)
unsigned char *src,*dst;
{
	Int16T len;

	for (len = *dst++ = *src++; --len >= 0; ) *dst++ = *src++;
}

/* CVPString - convert a Pascal string to a C string */
void CVPString(cstr,pstr)
unsigned char *cstr,*pstr;
{
	register Int16T len;

	for (len = *pstr++; --len >= 0; )*cstr++ = *pstr++;
  *cstr = '\0';
}

/* info - display a message */
void info(fmt,a1,a2,a3,a4,a5,a6,a7,a8)
char *fmt;
{
	char buf[100];
return;
	sprintf(buf,fmt,a1,a2,a3,a4,a5,a6,a7,a8);
  SetTextBoxString(xfrDialog,MESSAGE,CtoPstr(buf));
}

/* log - log an error */
void say(fmt,a1,a2,a3,a4,a5,a6,a7,a8)
char *fmt;
{
return;
  if (!status_active) return;
	++errors;
  info(fmt,a1,a2,a3,a4,a5,a6,a7,a8);
  SetTextBoxNumber(xfrDialog,ERRORS,(Int32T)errors);
}

int OpenOrCreate(fName,vRefNum,pfRefNum)
char *fName;
Int16T vRefNum,*pfRefNum;
{
	Int16T sts;

  if (FSOpen(fName,vRefNum,pfRefNum) == noErr) {
		If (sts = SetEOF(*pfRefNum,0L)) FSClose(*pfRefNum);
		return (sts);
  } else if (sts = Create(fName,vRefNum,'????','TEXT')) {
	return (sts);
  }
```

modio.c

BEST AVAILABLE COPY

```
	return (FSOpen(fName,vRefNum,pfRefNum));
}

Int16T mputc(c, refNum)
char c;                                         /* Character to write */
Int16T refNum;                      /* File reference handle */
{
	Int32T count;

	count=1;
	FSWrite(refNum, &count, &c);
}

Int16T mgetc(refNum)
Int16T refNum;                                  /* File reference handle */
{
	Int32T count;
	unsigned char c;

	count=1;
	FSRead(refNum, &count, &c);
	if (count==0L) return EOF; else return c;
}

/* xy_sinit - initialize to send data using x/ymodem */
Int16T xy_sinit()
{
	blknum = 0;
	return (startxfr());
}

/* xy_sndeot - end a data transfer using x/ymodem */
Int16T xy_sndeot()
{
	unsigned char buf[1];

	buf[0] = EOT;                                   /* make an EOT packet
	return (sndpkt(buf,1));          /* send it */
}

/* xy_rinit - initialize to receive data using x/ymodem */
Int16T xy_rinit(usecrc)
Int16T usecrc;                  /* TRUE for CRC transfers, FALSE for checksum */
{
	timeout = ITIME;                                /* use shorter initial timeout *.
	nak = (usecrc ? CRC : NAK);     /* initial NAK sets crc/checksum mode */
	crcmode = usecrc;                               /* remember if crc is in use */
	blknum = 0;                                                 /* start at b
header) */
	needack = FALSE;                                /* don't need an ACK the first
	md_put(nak);                                            /* send the initial
	md_iflush(0);
	return (ER_OK);                                 /* return successfully */
}

/* xy_rcvhdr - receive a ymodem batch header */
Int16T xy_rcvhdr(usecrc,name,psize)
Int16T usecrc;                  /* TRUE for CRC transfers, FALSE for checksum */
char *name;                     /* file name (output) */
Int32T *psize;          /* file size (output) */
{
	unsigned char buf[LBLKLEN];
	Int16T bc,sts;

	/* initialize */
	if ((sts = xy_rinit(usecrc)) != ER_OK) return (sts);

	/* receive the header */
```

BEST AVAILABLE COPY

```
        if ((sts = rcvblk(blknum,buf,&bc)) != ER_OK) return (sts);

        /* process the header */
    return (processhdr(buf,bc,name,psize));
}

/* xy_rcvblk - receive a data block using x/ymodem */
Int16T xy_rcvblk(buf,plen)
unsigned char *buf;             /* data buffer (output) */
Int16T *plen;                   /* data length (output) */
{

        if (needack) xy_sndack();                       /* send ACK for previo
        return (rcvblk(++blknum,buf,plen));   /* receive the next block */
}

/* xy_sndack - send an ack for a header packet */
void xy_sndack()
{
    md_put(ACK);   /* send an ACK */
    md_iflush(0);     /* flush the input buffer */
}

/* xy_cancel - cancel a transfer */
void xy_cancel()
{
        md_iflush(1);                   /* flush the input buffer */
        md_put(CAN);                    /* cancel the transfer */
        md_put(CAN); md_put(CAN); md_put(CAN);
}

/* startxfr - wait for the initial NAK or 'C' to start transfer */
static Int16T startxfr()
{
        Int16T lastch,ch;

        /* wait for the initial NAK or 'C' */
        for (lastch = -1; ; lastch = ch) {
                ch = md_get(XTIME);             /* get the next character */
                if (ch == DT_TIME) {            /* check for timeout */
            say("timeout waiting for initial NAK");
            return (ER_INIT);
                } else if (ch == NAK) {         /* start of checksum transfer */
            crcmode = FALSE;
            say("starting checksum transfer");
            return (ER_OK);
                } else if (ch == CRC) {         /* start of CRC transfer */
            crcmode = TRUE;
            say("starting CRC transfer");
            return (ER_OK);
                } else if (ch == CAN) {         /* abort transfer on CAN/CAN */
            if (lastch == CAN) return (ER_CANCEL);
                }       else {
                        /* garbage character */
            say("expecting initial NAK, ch=%02x",ch);
          }
        }
}

/* sendhdr - send block zero header */
static Int16T sendhdr(name,size)
char *name;
Int32T size;
{
        unsigned char buf[SBLKLEN],*bp;
        Int16T bc;

        /* initialize the block */
```

BEST AVAILABLE COPY

```
        for (bp = buf, bc = SBLKLEN; --bc >= 0; ) *bp++ = '\0';
        blknum = 0;

        /* insert the filename */
  strcpy((char *)buf,name);

        /* insert the size (if necessary) */
  if (size >= 0) sprintf((char *)&buf[strlen((char *)buf)+1],"%ld",size);

        /* send the block */
  return (sndblk(blknum,buf,SBLKLEN));
}

/* sndblk - send a data packet */
static Int16T sndblk(n,buf,len)
Int16T n;                                               /* block number */
unsigned char *buf;                     /* data buffer */
Int16T len;                                     /* data length (either SBLKLEN
{
        unsigned char packet[LBLKLEN+5],*p;
        Int16UT chk;

        /* setup the packet header */
        p = packet;
        *p++ = (len == SBLKLEN ? SOH : STX);
        *p++ = n;
        *p++ = ~n;

        /* compute the block check code */
        if (crcmode) {
                /* compute the CRC */
                for (chk = 0; --len >= 0; ) chk = updcrc(chk,(*p++ = *buf++));
                chk = updcrc(chk,'\0');
                chk = updcrc(chk,'\0');
                *p++ = chk >> 8;
                *p++ = chk;
        }       else {
                /* compute the checksum */
                for (chk = 0; --len >= 0; ) chk += (*p++ = *buf++);
                *p++ = chk;
  }

  /* send the packet */
  return (sndpkt(packet,(Int16T)(p-packet)));
}

/* sndpkt - send a packet and wait for a response */
Int16T sndpkt(packet,plength)
unsigned char *packet;
Int16T plength;
{
        Int16T retries,lastch,ch;

        /* send data and wait for an ACK */
        for (retries = RETRY; retries > 0; --retries) {

                /* send the data */
                md_write(packet,plength);
                md_iflush(0);

                /* wait for ACK, NAK or CAN/CAN */
                for (lastch = -1; ; lastch = ch) {
                        /* get the next character */
                        ch = md_get(LTIME);
                        /* check for timeout */
           if (ch == DT_TIME) {
                                say("timeout waiting for ACK/NAK/CAN");
                                break;
```

BEST AVAILABLE COPY

```
        } elseif (ch == ACK) {
          /* return on ACK */
                    return (ER_OK);
        } else if (ch == NAK) {
            /* send packet again on NAK */
                    say("received NAK");
                    break;
        } else if (ch == CAN) {
            /* cancel transfer on CAN/CAN */
                    if (lastch == CAN)
                return (ER_CANCEL);
        } else {
            /* garbage */
                    say("expecting ACK/NAK/CAN, ch=%02x",ch);
                    break;
        }
            }
    }

    /* retry count ran out */
    return (plength == 1 ? ER_EOT : ER_DATA);
}

/* processhdr - process a received header */
static Int16T processhdr(buf,len,name,psize)
unsigned char *buf;                 /* header */
Int16T len;                                     /* header length */
char *name;                                     /* file name (output) */
Int32T *psize;                              /* file size (output) */
{
    char *n;
    extern Int32T atol();
    Int16T i,j;

    /* check for end of batch */
    if (buf[0] == '\0') {
        xy_sndack();
        return (ER_DONE);
 }

    /* find the filename */
    n = name;
 for (i = 0; i < len; ) if ((*n++ = buf[i++]) == '\0') break;
 if (i >= len) return (ER_HEAD);

 /* Save the true file name, create a fake */
 fsend[numFsend] = NewPtr(strlen(name)+1);
 strcpy(fsend[numFsend], name);
 MakeFake(name,fsend[numFsend],numFsend);
 numFsend++;

    /* find the file size */
 for (j = i; j < len; ++j) if (buf[j] < '0' || buf[j] > '9') break;
 *psize = (i < j ? atol((char *)&buf[i]) : -1L);

    /* return successfully */
 return (ER_OK);
}

/* rcvblk - receive a data block */
static Int16T rcvblk(n,buf,plen)
Int16T n;                                       /* block number */
unsigned char *buf;            /* data buffer */
Int16T *plen;                               /* data length (output) */
{
    Int16T nn,sts;

    /* receive a packet */
```

modio.c

BEST AVAILABLE COPY

```
while ((sts = rcvpkt(&nn,buf,plen)) == ER_OK) {

        /* check the block number */
        if (nn == (n & 0xFF)) {
                timeout = LTIME;        /* use the longer timeout now */
                nak = NAK;                      /* and the normal NAK charac
                needack = TRUE;         /* need an ACK for this block */
                return (ER_OK);
        } else if (nn == ((n - 1) & 0xFF)) {
                say("duplicate block");
                xy_sndack();
        } else {
                say("sequence error, n=%d",n);
         sts = ER_DATA;
         xy_cancel();
         break;
        }
}

 /* return failure status */
 return (sts);
}

/* rcvpkt - receive a data packet */
static Int16T rcvpkt(pn,buf,plen)
Int16T *pn;                                     /* block number (output) */
unsigned char *buf;             /* data buffer */
Int16T *plen;                                   /* data length (output) */
{
        Int16T bc,ch,retries,sts;
        unsigned char *bp;

        /* receive data */
        for (retries = RETRY; retries > 0; --retries) {

                /* receive the packet header */
                switch (sts = rcvhdr(pn,plen)) {
                        case ER_EOF:
                        case ER_CANCEL:
                  return (sts);
                        case ER_DATA: /* really timeout */
                  if (crcmode && blknum == 1 && retries == 6) {
                                  say("switching to checksum mode");
                                  crcmode = FALSE;
                                  nak = NAK;
                  }
                  md_put(nak);
                  continue;
                }

                /* receive the data */
                for (bp = buf, bc = *plen; --bc >= 0; *bp++ = ch) {
                        if ((ch = md_get(STIME)) == DT_TIME) break;
                }

                if (bc >= 0) {
                        say("timeout within packet 1");
                 md_put(nak);
                 continue;
                }

                /* check the block check code */
                if (rcvchk(buf,*plen) != ER_OK) {
                        md_put(nak);
                        continue;
                }

                /* return successfully */
```

BEST AVAILABLE COPY

```
        return (ER_OK);
    }

  /* retry count ran out */
  return (ER_DATA);
}

/* rcvhdr - receive a packet header */
static Int16T rcvhdr(pn,plen)
Int16T *pn;                 /* block number (output) */
Int16T *plen;               /* packet length (output) */
{
    Int16T ch,lastch;

    /* wait for next packet header */
    for (lastch = -1; ; lastch = ch) {

        /* wait for SOH, STX or CAN/CAN */
        ch = md_get(timeout);           /* get next character */
        if (ch == DT_TIME) {            /* check for timeout */
      say("timeout waiting for SOH/STX");
      return (ER_DATA);
        } else if (ch == EOT) {    /* end of transfer */
      xy_sndack();
      return (ER_EOF);
        } else if (ch == SOH) {    /* start of a short packet */
      *plen = SBLKLEN;
        } else if (ch == STX) {    /* start of a long packet */
      *plen = LBLKLEN;
        } else if (ch == CAN) {    /* two cancels abort transfer */
      if (lastch == CAN) return (ER_CANCEL);
      continue;
        } else {       /* garbage */
      say("expecting SOH/STX, ch=%02x",ch);
      md_iflush(1);
      continue;
        }

        /* get the block numbers */
        if ((*pn=md_get(STIME)) == DT_TIME || (ch=md_get(STIME)) == DT_TIME)
      say("timeout within packet 2");
      return (ER_DATA);
        }

        /* check the block numbers */
        if (*pn + ch != 0xFF) {
      say("block check failed, n1=%02x, n2=%02x",*pn,ch);
      continue;
        }

        /* got a valid packet header */
        return (ER_OK);
    }
}

/* rcvchk - receive and check the checksum or CRC */
static Int16T rcvchk(buf,len)
unsigned char *buf;             /* data buffer */
Int16T len;                                         /* data length */
{
    Int16T chk;
    Int16T lastch,ch;

    /* receive and check the checksum or CRC */
  if (crcmode) {                        /* CRC */
    /* two bytes */
        if ((lastch = md_get(STIME)) == DT_TIME || (ch = md_get(STIME)) == DT_T
      say("timeout within packet 3");
```

BEST AVAILABLE COPY

```
		return (ER_DATA);
			}
			for (chk = 0; --len >= 0; ) chk = updcrc(chk,*buf++);
			chk = updcrc(chk,lastch);
			if (updcrc(chk,ch) & 0xFFFF) {
		say("CRC error");
		return (ER_DATA);
			}
	}		else {				/* checksum */
			if ((ch = md_get(STIME)) == DT_TIME) {	/* one byte */
		say("timeout within packet 4");
		return (ER_DATA);
			}
			for (chk = 0; --len >= 0; ) chk += *buf++;
			if ((chk & 0xFF) != ch) {
		say("checksum error");
		return (ER_DATA);
			}
 }

 /* return successfully */
 return (ER_OK);
}

/* Get a short block */
Int16T shortblock_get(buf, len)
char *buf;
Int16T len;
{
	char *bp, ch;
	Int16T bc;

	/* receive the data */
	for (bp = buf, bc = len; --bc >= 0; *bp++ = ch) {
		if ((ch = md_get(STIME)) == DT_TIME) break;
	}

	if (bc >= 0) {
		say("timeout within packet 5");
		md_put(nak);
	} else {
		md_put(ACK);
	}
}

void parse_parms()
{
	char *f;
	Int16T v;

	/* Extract Phone Number */
	f = strtok(varPtr(modParms)," ,");
	strcpy(phonenumber,f);

	/* Get Baud Rate */
	f = strtok(NULL," ,");
	v = atoi(f);
	switch (v) {
	 case 300: baud = baud300; break;
	 case 1200: baud = baud1200; break;
	 case 2400: baud = baud2400; break;
	 case 4800: baud = baud4800; break;
	 case 9600: baud = baud9600; break;
	}

	/* Get Partity */
	f = strtok(NULL," ,");
	switch (*f) {
```

modio.c

BEST AVAILABLE COPY

```
            case 'N':
            case 'n': parity = noParity; break;
            case 'E':
            case 'e': parity = evenParity; break;
            case 'O':
            case 'o': parity = oddParity; break;
        }

        /* Get Databits */
        f = strtok(NULL," ,");
        switch (*f) {
            case '8': databits = data8; break;
            case '7':       databits = data7; break;
        }

        /* Get Stopbits */
        f = strtok(NULL," ,");
        switch (*f) {
            case '1': stop = stop10; break;
            case '2':       stop = stop20; break;
        }
}

/* Rename received files */
Boolean rename_files()
{
        char fakename[255];
        char holdname[255];
  Int16T i, vRefNum, err;

        GetVol(fakename, &vRefNum);
  for (i=0; i<numFsend; i++) {
        MakeFake(fakename, fsend[i], i);
        strcpy(holdname, fsend[i]);
        strcat(holdname, "(hold)");
        CtoPstr(fakename);
        CtoPstr(fsend[i]);
        CtoPstr(holdname);
        /* First rename original file */
        err = Rename(fsend[i],vRefNum,holdname);
        if (err==fnfErr) {
              /* Original wasn't there, just rename the received file */
              err = Rename(fakename,vRefNum,fsend[i]);
              /* Error? do what? */
        } else if (err!=noErr) {
              /* Some other error */
                    return FALSE;
        } else {
              /* Ok, now rename the sent file */
              err = Rename(fakename,vRefNum,fsend[i]);
                    if (err != noErr) {
                      /* Problem, put things back */
                      FSDelete(fakename, vRefNum);
                    FSDelete(fsend[i], vRefNum);
                      Rename(holdname,vRefNum,fsend[i]);
                      return FALSE;
                    } else {
                      /* Ok, kill the old copy */
                      FSDelete(holdname, vRefNum);
                    }
        }
        }
        return TRUE;
}

void MakeFake(char *fake, char *real, Int16T n)
{
        char *cp;
```

modio.c

BEST AVAILABLE COPY

```
        char path[255];

        /* Extract the path name (look for the last colon) */
        cp = (real + strlen(real)) - 1;
        while (*cp!=':' && cp!=real) cp--;
        if (cp!=real) strncpy(path, real, cp-real);
        path[cp-real] = '\0';

    sprintf(fake,"%s:•zzz•temp•%d",path,n);
}
```

BEST AVAILABLE COPY

```
/*      Money Advisor
        msgSnipDialogs.c
        module to support message box/dialogs using standard message snip
        with message passing, yes/no returns.
        djs 4/6/90
        Think C 4.0

        */

#include     "standard.h"
#include     "tglMain.h"
#define      APP_ADTERM          1      /* needed for money advisor variable acces
#include     "varFns.h"
#include     "snpSnapShot.h"
#include     "libLibrary.h"
#include     "scnScan.h"
#include     "grfGraphics.h"
#include     "scrScreen.h"
#include     "tchTouch.h"

#include     "msgSnipDialogs.h"

#define      MESSAGE_SNIP_NAME          "n.message.orange.s"
#define      BUTTON_SNIP_NAME           "n.message.okay.s"
#define      HILITE_SNIP_NAME                "n.message.okay.right!.s"
#define      YES_SNIP_NAME                   "n.message.yes.s"
#define      NO_SNIP_NAME                    "n.message.no.s"
#define      HI_YES_SNIP_NAME                "n.message.yes!.s"
#define      HI_NO_SNIP_NAME                 "n.message.no!.s"

/*      ........................................................................................ */
void    msgAlert ( char *msg )
        {
        Handle                  hSnip, buttSnip, hiSnip;
        EventRecord             theEvent;
        CGrafPtr           theScrn;
        Rect               snipRect, buttRect, shadRect,textRect;
        Int16T                  shadOff = 20;

        hSnip= libFindPicPtr( MESSAGE_SNIP_NAME, TRUE  );
        if( hSnip == NULL)
                {
                scnScanError( "Image not in library", MESSAGE_SNIP_NAME );
                return;
                };
        libGetPicRect ( hSnip, &snipRect );

        buttSnip= libFindPicPtr( BUTTON_SNIP_NAME, TRUE  );
        if( buttSnip == NULL)
                {
                scnScanError( "Image not in library", BUTTON_SNIP_NAME );
                return;
                };
        libGetPicRect ( buttSnip, &buttRect );

        hiSnip= libFindPicPtr( HILITE_SNIP_NAME , TRUE );
        if( hiSnip == NULL)
                {
                scnScanError( "Image not in library", HILITE_SNIP_NAME );
                return;
                };

        shadRect = snipRect;
        shadRect.right += shadOff;            /* make room for the shadow */
        shadRect.bottom += shadOff;

        theScrn = snpSaveWindow3 ( tglMainCWindow, &shadRect );
```

BEST AVAILABLE COPY

```
        grfDrawPic( hSnip, NULL );
        grfAutoShadow ( &snipRect , shadOff );

        grfDrawPic( buttSnip, NULL );

        textRect = snipRect;
        InsetRect ( &textRect, 25, 25 );
        textRect.bottom -= 25;
        scrSetHueNow(23);
        TextBox ( msg, strlen(msg), &textRect, 0);

        tglPushCursor();
        tglCursorOnOff ( TGL_ON );

        while ( TRUE )
                {
                if ( GetNextEvent( mDownMask, &theEvent) )
                        {
                        if ( PtInRect ( theEvent.where, &buttRect) )
                                {
                                tchBeepNow(TGL_GOOD_BEEP);
                                break;
                                }
                        else
                                {
                                tchBeepNow(TGL_BAD_BEEP);
                                }
                        }
                }

        grfDrawPic( hiSnip, NULL );

        tglCursorOnOff ( TGL_OFF );
        snpRestoreWindow3 (0, theScrn);
        scrRestoreColors();
        tglPopCursor();
        }

/*      ............................................................................ */
BooleanT            msgAskYes ( char *msg )
        {
        Handle                  hSnip, yesSnip, noSnip, hiSnip;
        EventRecord             theEvent;
        CGrafPtr            theScrn;
        Rect                    snipRect, yesRect, noRect, shadRect, textRect;
        Int16T                          shadOff = 20;
        BooleanT                rtn;

        hSnip= libFindPicPtr( MESSAGE_SNIP_NAME , TRUE );
        if( hSnip == NULL)
                {
                scnScanError( "Image not in library", MESSAGE_SNIP_NAME );
                return;
                };
        libGetPicRect ( hSnip, &snipRect );

        yesSnip= libFindPicPtr( YES_SNIP_NAME, TRUE  );
        if( yesSnip == NULL)
                {
                scnScanError( "Image not in library", YES_SNIP_NAME );
                return;
                };
        libGetPicRect ( yesSnip, &yesRect );

        noSnip= libFindPicPtr( NO_SNIP_NAME , TRUE );
        if( noSnip == NULL)
                {
                scnScanError( "Image not in library", NO_SNIP_NAME );
```

BEST AVAILABLE COPY

```
		return;
		}
	libGetPicRect ( noSnip, &noRect );

	shadRect = snipRect;
	shadRect.right += shadOff;		/* make room for the shadow */
	shadRect.bottom += shadOff;

	theScrn = snpSaveWindow3 ( tglMainCWindow, &shadRect );

	grfDrawPic( hSnip, NULL );
	grfAutoShadow ( &snipRect , shadOff );
	grfDrawPic( yesSnip, NULL );
	grfDrawPic( noSnip, NULL );

	textRect = snipRect;
	InsetRect ( &textRect, 20, 20 );
	textRect.bottom -= 25;
	scrSetHueNow(23);
	TextBox ( msg, strlen(msg), &textRect, 0);

	tglPushCursor();
	tglCursorOnOff ( TGL_ON );

	while ( TRUE )
		{
		if ( GetNextEvent( mDownMask, &theEvent) )
			{
			if ( PtInRect ( theEvent.where, &yesRect) )
				{
				tchBeepNow(TGL_GOOD_BEEP);
				rtn = TRUE;
				break;
				}
			if ( PtInRect ( theEvent.where, &noRect) )
				{
				tchBeepNow(TGL_GOOD_BEEP);
				rtn = FALSE;
				break;
				}
			else
				{
				tchBeepNow(TGL_BAD_BEEP);
				}
			}
		}

	/*grfDrawPic( hiSnip, NULL );
	*/

	tglCursorOnOff ( TGL_OFF );
	snpRestoreWindow3 (0, theScrn);
	scrRestoreColors();
	tglPopCursor();
	return (rtn);
	}
```

BEST AVAILABLE COPY

```
/* Print comand routines */

#include    "standard.h"
#include    "glue.h"
#include    "varFns.h"
#include    "scnScan.h"
#include    "tglMain.h"
#include    "grfGraphics.h"
#include    "tchTouch.h"
#include    "pcmPrintCmd.h"
#include    "prtPrint.h"
#include    "wrkScrnBuffer.h"

#define DONT_SEND_DIALOG_BOX_OFF_SCREEN

/*********************************************************************
***
*     Support routines for PRINT command
**********************************************************************
***/
void  pcmSetUpGreyScale( void );
void  PSPrintRect( Rect *pRect );
void  MySwapOutProc( void );
void  MyIdleProc( void );
Int32T      pcmStartPrint( void );
Int32T      pcmEndPrint( void );
void  pcmStartPage( void );
void  pcmEndPage( void );
void  pcmOldPrint( char *s );
void  MyIdleProc(void);

/*********************************************************************
***
*     Global variables for PRINT command
**********************************************************************
***/
static GrafPtr          ScreenPort;       /* was GrafPtr in LJC code */
static GrafPtr          PrinterPort; /* was GrafPtr in LJC code */

static THPrint          hPrRec = NULL;
static TPPrPort    pPrPort;
static TPrStatus   PrStatus;

static GDHandle         hgd;  /* Handle to main graphics device -- for dirty tricks */
static PixMapHandle     hpm;  /* A place to save the graphics device's real pixmap ha
static CGrafPtr         pWorkPort = NULL;
static Ptr                    pBits = NULL;

#define PostScriptBegin         190
#define PostScriptEnd           191
#define PostScriptHandle        192
#define TextIsPostScript  194


static char   ToASCII[ 16 ]
=
{ '0', '1', '2', '3', '4', '5', '6', '7', '8', '9', 'a', 'b', 'c', 'd', 'e', 'f' }
;


static Int32T       bGreyScaleInitialized = FALSE;
static char   GreyScaleTable[ 512 ];

void MyIdleProc()
{
}
```

BEST AVAILABLE COPY

```
/***********************************************************************
***
*     SetUpGreyScale
************************************************************************
***/
void  pcmSetUpGreyScale()
{
      HSLColor   hsl;
      RGBColor   rgb;
      char       *p = &GreyScaleTable[ 0 ];
      Int32T           ColorTableIndex;
      Int32T           ScaledLuminance;

      for( ColorTableIndex = 0; ColorTableIndex < 256; ColorTableIndex++ )
      {
            /* Get rgb value corresponding to index */
            Index2Color( ColorTableIndex, &rgb );
            /* Convert to hue saturation luminance */
            RGB2HSL( &rgb, &hsl );
            /* Lightness is in range 0 - 0xFFFF.  Scale it to range 0 - 0xFF */
            ScaledLuminance = hsl.lightness >> 8;
            /* Fill in GreyScaleTable entry for this color */
            *p++ = ToASCII[ ScaledLuminance >> 4 ];         /* ASCII hex digit for hig
            *p++ = ToASCII[ ScaledLuminance & 0x000F ];     /* ASCII hex digit for low
      }
      bGreyScaleInitialized = TRUE;
      return;
}

/***********************************************************************
***
*     StartPrint
************************************************************************
***/
Int32T pcmStartPrint()
{
      Boolean     result = FALSE;

      PrOpen();
      if( PrError() != noErr )
      {
            return FALSE;
      }

      /* Create a new print record */
      hPrRec = (THPrint) NewHandle( sizeof( TPrint ) );

      /* Fill it with default values */
      PrintDefault( hPrRec );

      /* save current grafPort */
      GetPort( &ScreenPort );

      #ifndef DONT_SEND_DIALOG_BOX_OFF_SCREEN
            /* dirty trick: create an off-screen port map with an off-screen bitmap
             * and set the main device to point to this port map.  This sends the
             * 'printing' dialog offscreen */
            pWorkPort= (CGrafPtr) NewPtr( sizeof(CGrafPort));
            OpenCPort( pWorkPort );
            pBits = NewPtr( TGL_cSCREEN_BYTES );
            (**pWorkPort->portPixMap).baseAddr= pBits;
            (**pWorkPort->portPixMap).rowBytes= 0x8000 | 640;
            TGL_SETRECT( &(**pWorkPort->portPixMap).bounds, 0, 0, 640, 480 );
            hgd = GetMainDevice();
            HLock( (Handle) hgd );
            hpm = (*hgd)->gdPMap;         /* Save current value */
            (*hgd)->gdPMap = pWorkPort->portPixMap;
      #endif
```

BEST AVAILABLE COPY

```
	/* open printer grafPort */
	pPrPort = PrOpenDoc( hPrRec, NULL, NULL );
	GetPort( &PrinterPort );

	(*hPrRec)->prJob.pIdleProc = (ProcPtr) MyIdleProc;
	if( PrError() == noErr )
	{
		/* Start new page */
		PrOpenPage( pPrPort, NULL );
		If( PrError() == noErr )
		{
			/* Ready to draw page with QuickDraw */
			result = TRUE;
		}
	}

	#ifndef DONT_SEND_DIALOG_BOX_OFF_SCREEN
		/* Restore the real PixMap handle to the device */
		(*hgd)->gdPMap = hpm;
	#endif

	return (result);
}

/*********************************************************************
***
*	EndPrint
**********************************************************************
***/
Int32T pcmEndPrint()
{
	Boolean		result = FALSE;

	#ifndef DONT_SEND_DIALOG_BOX_OFF_SCREEN
		(*hgd)->gdPMap = pWorkPort->portPixMap;
	#endif

	/* End current page */
	PrClosePage( pPrPort );
	if (PrError() != noErr) {
		goto EXIT;
	}

	/* Close printing and grafPort */
	PrCloseDoc( pPrPort );
	if (PrError() != noErr) {
		goto EXIT;
	}

	if( (*hPrRec)->prJob.bJDocLoop == bSpoolLoop)
	{
		/* Swap out as much code as possible */
		prtMySwapOutProc();
		/* Print spooled document */
		PrPicFile( hPrRec, NULL, NULL, NULL, &PrStatus );
		If (PrError() != noErr) {
			goto EXIT;
		}
	}

	PrClose();
	if (PrError() != noErr) {
		goto EXIT;
	}

	result = TRUE;
```

BEST AVAILABLE COPY

```
EXIT:
	DisposHandle( (Handle) hPrRec );
	hPrRec = NULL;

	#ifndef DONT_SEND_DIALOG_BOX_OFF_SCREEN
		/* ditch extra space for port map */
		(*hgd)->gdPMap = hpm;
		HUnlock( (Handle) hgd );
		DisposPtr( pBits );
		CloseCPort( pWorkPort );
	#endif

	return result;
}

/*********************************************************************
***
*	pcmStartPage
*********************************************************************
***/
void pcmStartPage()
{
	GrafPtr		savedPort;

	GetPort( &savedPort );

	if( pcmStartPrint() )
	{
		/* Set up table to translate from pixel color codes to luminance values in ,
		pcmSetUpGreyScale();

		/* Set up to receive PostScript commands */
		PicComment( PostScriptBegin, 0, NULL );
		PicComment( TextIsPostScript, 0, NULL );
		drawstring( "initgraphics" );
	}
	else {
		SetPort( savedPort );
		TGL_ERROR( "Printer error: starting" );
	}

	SetPort( savedPort );

}

/*********************************************************************
***
*	pcmEndPage
*********************************************************************
***/
void pcmEndPage()
{
	GrafPtr savedPort;

	GetPort( &savedPort );
	SetPort( PrinterPort );

	/* End of PostScript commands */
	PicComment( PostScriptEnd, 0, NULL );

	if (!pcmEndPrint()) {
		SetPort( savedPort );
		TGL_ERROR( "Printer error: ending" );
	}

	SetPort( savedPort );
}

pcmPrintCmd.c
```

BEST AVAILABLE COPY

```
/***********************************************************************
***
*     pcmPrint
************************************************************************
***/
void pcmOldPrint( string )
      char *string;
{
      static Int32T count = 0;

      /*
       * set to the printer port and draw the string
       */
      SetPort( PrinterPort );
      drawstring( string );

      SetPort( (GrafPtr) tglMyCWindow );
}

void pcmPrint ( Int32T action, char *string )
   {
   extern GrafPtr PrinterPort;
   extern GrafPtr ScreenPort;

   switch ( action )
      {
      case  pcmSTARTPAGE :
            pcmStartPage();
            break;

            case pcmPOSTSCRIPT :
                  pcmOldPrint( string );
                  break;

            case pcmENDPAGE :
            pcmEndPage();
            break;
            }

      SetPort( ScreenPort );
      }
```

BEST AVAILABLE COPY

```
/*
 * File picPICTfns.c
 */

#include    "standard.h"
#include    "glue.h"
#include    "varFns.h"
#include    "tglMain.h"
#include    "scnScan.h"
#include    "wrkScrnBuffer.h"
#include    "picPICTfns.h"
#include    "fileAccess.h"

/*********************************************************************
 * picSaveAsPict: saves something as a pict
 *********************************************************************/
void picSaveAsPict()
    {
    SFReply             FileReply;
    OSType              osTypePICT = 'PICT';
    OSType              osTypeBLNK = '????';
    Point           DialogLocation;
    Handle              hPICT;
    Int16T              fRefNum;
    Int32T              CompPixNum;
    Rect            r, bigR;
    BooleanT        cursorWasOff;
    char            temp[255];

    TGL_SETRECT( &bigR, 0, 0, 640, 480 );

    DialogLocation.v= 100; DialogLocation.h= 150;

    SetPort( (GrafPtr) tglMyCWindow );

    wrkSaveWindow( &bigR );

    tglPushCursor();
    tglCursorOnOff( TRUE );

    sfputfile(    &DialogLocation,
                  "PICT file name: ",
                  "",
                  NULL,
                  &FileReply );


    wrkRestoreWindow();
    tglPopCursor();
    SetCursor( *tglCrossHairs );

    if( FileReply.good )
        {
        p2cstr( (char*) &FileReply.fName );

        ClipRect( &bigR );

        r.top=0;
        r.left= 0;
        r.bottom= 768;
        r.right= 1024;

        hPICT= (Handle) OpenPicture( &r );

        /* note dubious trickery here -- we count on the CopyBits in RestoreWindov
          to be spooled to PICT file */
        wrkRestoreWindow();
```

BEST AVAILABLE COPY

```
        ClosePicture();

        create( (char *) FileReply.fName, FileReply.vRefNum, osTypeBLNK, osType
        fsopen( (char *) FileReply.fName, FileReply.vRefNum, &fRefNum );
        SetFPos( fRefNum, 1, 0 );

        HLock( hPICT );
        CompPixNum= 512;
        FSWrite( fRefNum, &CompPixNum, (*hPICT) );      /* garbage header */

        CompPixNum= GetHandleSize( hPICT );
        FSWrite( fRefNum, &CompPixNum, (*hPICT) );
        HUnlock( hPICT );

        FSClose( fRefNum );
        flushvol( NULL, FileReply.vRefNum );
        KillPicture( (PicHandle) hPICT );

        SetPort( (GrafPtr) tglMyCWindow );
        wrkRestoreWindow(); /* I don't know why the above clears the screen, bu
        }

    }


/**********************************************************************
*
 D R A W P I C T F I L E 2 - read PICT file and draw to screen
**********************************************************************
/
    BooleanT picDrawPictFile2( pFileReply )
    SFReply             *pFileReply;
{
    Int16T              fRefNum;
    Int32T              l_FileSize;
    PicHandle   hPic
    OSErr               RC;
    Rect        *pRect;
    Int16T              top, left, right, bottom;
    char        temp[255];

    fsopen( (char*) (pFileReply->fName), pFileReply->vRefNum, &fRefNum );

    GetEOF( fRefNum, &l_FileSize);

    hPic= (PicHandle) NewHandle( l_FileSize );
    RC= MemError();
    if (RC)
        TGL_FATAL_ERROR( "libDrawPictFile() allocation error" );

    HLock( (Handle) hPic );

    SetFPos( fRefNum, 1, 512 );
    FSRead( fRefNum, &l_FileSize, (Ptr) *hPic );

    pRect= &((*hPic)->picFrame );
    /* Avoid rescaling by setting bounds in pict data */

    top= MIN( 0, pRect->top );
    bottom= MAX( 480, pRect->bottom );
    left= MIN( 0, pRect->left );
    right= MAX( 640, pRect->right );

    TGL_SETRECT( pRect, left, top, right, bottom );

    DrawPicture( hPic, pRect );
```

picPICTfns.c

```
        FSClose( fRefNum );

        HUnlock( (Handle) hPic );
        DisposHandle( (Handle) hPic );

        return( TRUE );
} /* DrawPictFile2 */
```

BEST AVAILABLE COPY

```
/*
 * pie charting functions (specific to Money Advisor)
 *
 *
 *    9/7/89        djs
 *                  pieSetFacts is now replaced by three new functions:
 *                  pieSetActFacts, for showing the 3-slice original actual pie
 *                  pieSetRecFacts, for the 3-slice original rec pie
 *                  pieSetBlueFacts, for the blueprint, multi-slice pie
 *
 * 11/21/89 djs
 *                  reverted from outside legends back to all-inside with new rules
 *                  for adjusting adjacent legends to avoid collisions when the slices
 *                  are tiny.
 *
 * 11/27/89  djs
 *                  support for type font sizing as parameter to drawLegend, all slices
 *                  are still 12pt except twin pies and condensed twin pies, now 10pt.
 *
 * 12/6/89   djs
 *                  support for 3-slice displays, with check to avoid 2 teeny slices all
 *                  next to each other.
 *
 * 12/20/89  djs
 *                  MMF teeny slice check, adjusting legends to avoid collisions.
 */

#include    "standard.h"
#include    "glue.h"
#define         APP_ADTERM          /* req'd to define the AT-specific variables
#include    "varFns.h"
#include   "tglMain.h"
#include    "libLibrary.h"
#include    "tchTouch.h"
#include    "pieChart.h"
#include    "grfGraphics.h"


#define D( s ) /* */

#define     MIN_ANGLE       5           /* minimum angle for a non-zero pie-slice
#define DEGS 57.2                   /* degrees per radian */
#define TEENY_SLICE_PERCENT         10    /* check for need to adjust legend locatior
#define MMF_ADJUST_INCOME           40000  /* min. $ for adj. MMF slice legend up */


/*********************************************************************
 pie chart structures
*********************************************************************
typedef struct
      {
      RGBColor   cTop;
      RGBColor   cBody;
      RGBColor   cShadow;
      RGBColor   cLegend;
      } colorsT, *colorsPT;

colorsT      bankColors =
      {
      {0, 34952, 0 },
      {0, 30583, 0 },
      {21845, 21845, 21845 },
      {61166, 61166, 61166 }
      };

colorsT      incomeColors =
      {
      {0, 13107, 65535 },
```

BEST AVAILABLE COPY

```
	{0, 0, 61166 },
	{21845, 21845, 21845 },
	{61166,61166, 61166 }
	};

colorsT	MMFColors =
	{
	{1, 4, 51111 },
	{0, 0, 61166 },
	{21845, 21845, 21845 },
	{61166,61166, 61166 }
	};

colorsT	growthColors =
	{
	{65535, 26214, 0 },
	{52428, 26214, 0 },
	{21845, 21845, 21845 },
	{61166, 61166, 61166 }
	};

typedef struct {
	char	*legendText1;
	char	*legendText2;
	Int32T		percent;
	Int32T		dollars;
	Point	legendCenter;
	Real80T		horStartRad;
	Real80T		verStartRad;
	Real80T		horMedRad;
	Real80T		verMedRad;
	Real80T		horEndRad;
	Real80T		verEndRad;
	Real80T		start;
	Real80T		extent;
	colorsT		color;
	} sliceFactT, *sliceFactPT;

#define	ACT		0
#define	REC		1
#define	BLUE	2

typedef struct {
	Rect		bounds;
	Int32T			radius;
	Point		center;
	RGBColor	lineColor;
	sliceFactT	Cinl;
	sliceFactT	Cash;
	sliceFactT	Bnk;
	sliceFactT	Inc;
	sliceFactT	Gro;
	sliceFactT	Gandl;
	Int16T			ActRecOrBlue;
	} pieFactT, *pieFactPT;

typedef enum {
	SINGLE_PIE,
	LEFT_PIE,
	RIGHT_PIE
	} pieKindT, *pieKindPT, **pieKindHT;

/***********************************************************************

PROTOTYPES for local functions

***********************************************************************

pieChart:c
```

```
Int32T       pieSetSliceFact( pieFactPT pPie, sliceFactPT pSlice, Int32T start,
                              Int32T percent, Int32T dollars,
                              char *text1, char *text2, colorsPT pColors, Boole
```

BEST AVAILABLE COPY

```
Int32T pieCalcStart( Boolean useRecommended );

void  pieSetBlueFacts( pieFactPT pPie, BooleanT bDemo );
void  pieSetActFacts( pieFactPT     pPie);
void  pieSetRecFacts( pieFactPT     pPie);

void  pieDrawCircle( pieFactPT pPie );
void  pieDrawLegend( pieFactPT pPie, sliceFactPT pSlice,
                     BooleanT bShowDollars, BooleanT bShowPercent, Bc
                     pieKindT pieKind, Int32T typeSize );
void  pieTextBackground ( RGBColor *backgroundColor, char *legend );
void  pieDrawSides( pieFactPT pPie, sliceFactPT pSlice, Int32T width );

void  pieDrawSlice( pieFactPT pPie, sliceFactPT pSlice );
void  pieDrawSliceNoFrame( pieFactPT     pPie, sliceFactPT pSlice);
void  pieDrawSlice1BitFrame( pieFactPT    pPie, sliceFactPT pSlice);
void  pieDrawShadowSlice( pieFactPT pPie, sliceFactPT  pSlice);
void  pieDrawShadow( pieFactPT pPie, Int32T hOff, Int32T vOff );

void  pieSortByExtent( sliceFactPT slices[], Int32T numSlices );
void  pieCorrectRounding( pieFactPT pPie );
void  pieRecalcRadians( sliceFactPT pSlice );

/*=================================================================
=======
  pie Fact subfunctions
=================================================================
======*/
/*****************************************************************
 * pieSortByExtent sorts pie slices by so that the slice with the greatest
 * extent comes first. After this function is called, the slices will be
 * drawn in the order of highest to lowest extent, so that tiny slices
 * will not be overrun by huge ones. This is necessary because we decided
 * that if a slice has any value at all, even if the value works out to
 * be 0 percent of the total income, then the minimum extent size is MIN_ANGLE degr
 * However, since extents are calculated exactly, the MIN_ANGLE degree minimum me
 * that the circle might have as much as 375 degrees, since up to 3 slices
 * could have artificially been increased MIN_ANGLE degrees each. If big slices are
 * drawn first, they will later be covered by little pieces, and nothing
 * will be lost visually.
 *****************************************************************/
void pieSortByExtent( sliceFactPT slices[], Int32T numSlices )
{
      Int32T               i, j;
      sliceFactPT        temp;

      for (i = 0; i < numSlices; i++) {
            for (j = i; j < numSlices; j++) {
                  if (slices[i]->extent < slices[j]->extent) {
                        temp = slices[i];
                        slices[i] = slices[j];
                        slices[j] = temp;
                  }
            }
      }
}


/*****************************************************************
recalculate the radians for the pie slice
*****************************************************************/
void pieRecalcRadians( sliceFactPT pSlice )
{
```

BEST AVAILABLE COPY

```
	pSlice->horStartRad= sin( (pSlice->start)/ DEGS );
	pSlice->verStartRad= -cos( (pSlice->start)/ DEGS );

	pSlice->horMedRad= sin( (pSlice->start + pSlice->extent/2)/ DEGS );
	pSlice->verMedRad= -cos( (pSlice->start + pSlice->extent/2)/ DEGS );

	pSlice->horEndRad= sin( ((pSlice->start + pSlice->extent))/ DEGS );
	pSlice->verEndRad= -cos( ((pSlice->start + pSlice->extent))/ DEGS );
}

/*************************************************************************
correct the rounding errors of the total pie slices extent values
*************************************************************************/
void pieCorrectRounding( pieFactPT pPie )
{
	Int32T		totalExtents;

	totalExtents = pPie->Gro.extent + pPie->Inc.extent + pPie->Bnk.extent;
	if ( totalExtents < 360 ) {
		if (pPie->Bnk.extent > 0) {
			pPie->Bnk.extent += 360 - totalExtents;
			if (pPie->Bnk.extent < MIN_ANGLE) {
				pPie->Bnk.extent = MIN_ANGLE;
			}
			pPie->Inc.start = pPie->Bnk.start + pPie->Bnk.extent;
			pPie->Gro.start = pPie->Inc.start + pPie->Inc.extent;
		}
		else {
			pPie->Inc.extent += 360 - totalExtents;
			if (pPie->Inc.extent < MIN_ANGLE) {
				pPie->Inc.extent = MIN_ANGLE;
			}
			pPie->Gro.start = pPie->Inc.start + pPie->Inc.extent;
		}
		pieRecalcRadians( &pPie->Bnk );
		pieRecalcRadians( &pPie->Inc );
		pieRecalcRadians( &pPie->Gro );
	}
}


/*************************************************************************
set up a slice with drawing information
*************************************************************************/
Int32T pieSetSliceFact( pPie, pSlice, start, percent, dollars,
				text1, text2, pColors, bAlign )
pieFactPT	pPie;
sliceFactPT	pSlice;
Int32T		start;
Int32T		percent;
Int32T		dollars;
char		*text1;
char		*text2;
colorsPT	pColors;
BooleanT	bAlign;
{
	Real80T		angle;
	Real80T		result;

	pSlice->legendText1= text1;
	pSlice->legendText2= text2;
	pSlice->percent= percent;
	pSlice->dollars= dollars;

	pSlice->color= *pColors;

	angle= (360 * percent ) / 100;
```

BEST AVAILABLE COPY

```
	if ((dollars > 0) && (angle < MIN_ANGLE)) {
		angle = MIN_ANGLE;
	}

	if( bAlign )		/* align around start radial? */
		start -= angle/2;

	if( start < 0 )
		start += 360;

	pSlice->start= start;
	pSlice->extent= angle;

	/* calculate factors for interesting radials */
	pSlice->horStartRad= sin( (start)/ DEGS );
	pSlice->verStartRad= -cos( (start)/ DEGS );

	pSlice->horMedRad= sin( (start + angle/2)/ DEGS );
	pSlice->verMedRad= -cos( (start + angle/2)/ DEGS );

	pSlice->horEndRad= sin( ((start + angle))/ DEGS );
	pSlice->verEndRad= -cos( ((start + angle))/ DEGS );


	/* return start of next slice */
	result= start + angle;
	if (result > 360)
		result -= 360;

	return( result );
}

/*************************************************************************
 calculate the starting angle for the Bank slice/Cash slice
*************************************************************************/
Int32T pieCalcStart( Boolean useRecommended )
{
	Real80T start, angle;
	Int32T		mmf, b;

	if (useRecommended) {
		sscanf( varPtr( vRMMFPercent ) , "%ld", &mmf );
		sscanf( varPtr( vRBankPercent ) , "%ld", &b );
	}
	else {
		mmf = 0;
		sscanf( varPtr( vABankPercent ) , "%ld", &b );
	}

	angle= (360 * (b+mmf) ) / 100;
	angle= (angle < MIN_ANGLE) ? MIN_ANGLE: angle;

	start = 270 - (angle/2);

	return ( start);
}

/*************************************************************************
 set up complete pie variables for drawing blueprint sections
*************************************************************************/
void	pieSetBlueFacts( pPie, bDemo )
pieFactPT	pPie;
BooleanT	bDemo;
{
	Int32T		angle;
	Int32T		b, mmf, l, g, lng;
	Int32T		bD, mmfD, lD, gD;
```

```
pPie->ActRecOrBlue = BLUE;

TGL_SETRECT( &pPie->bounds, 200, 85, 445, 330 );

SETPOINT( &pPie->center, (pPie->bounds.top + (pPie->bounds.bottom - pPie->b
      (pPie->bounds.left + (pPie->bounds.right - pPie->bounds.left)/2) );

pPie->radius= 1 + (pPie->bounds.bottom - pPie->bounds.top) / 2;

sscanf( varPtr( vRBankPercent ) , "%ld", &b );
sscanf( varPtr( vRMMFPercent ) , "%ld", &mmf );
sscanf( varPtr( vRIncomePercent ) , "%ld", &i );
sscanf( varPtr( vRGrowthPercent ) , "%ld", &g );

sscanf( varPtr( vRBankDollars ) , "%ld", &bD );
sscanf( varPtr( vRMMFDollars ) , "%ld", &mmfD );
sscanf( varPtr( vRIncomeDollars ) , "%ld", &iD );
sscanf( varPtr( vRGrowthDollars ) , "%ld", &gD );

if( bDemo )         /* create fake g/i entries from income percentage in vPieDer
      {
      lng= g + i - mmf;
      i= mmf + (varValF( vPieDemoPercent ) / 100.0 ) * lng;
      g= (1 - varValF( vPieDemoPercent) / 100.0 ) * lng;
      }

TGL_SETRGB( pPie->lineColor, 17476, 17476, 17476 );

angle= pieSetSliceFact( pPie,
                              &pPie->Cash,
                              270,
                              (mmf + b),
                              (mmfD + bD ),
                              "Available",
                              "cash",
                              &bankColors,          /* colors shoul
                              TRUE );                   /* align

angle= pieSetSliceFact( pPie,
                              &pPie->Bnk,
                              pPie->Cash.start,
                              (b),
                              (bD),
                              "Bank",
                              "",
                              &bankColors,
                              FALSE );

angle= pieSetSliceFact( pPie,
                              &pPie->CInl,
                              angle,
                              (mmf),
                              (mmfD),
                              "MMF",
                              "",
                              &MMFColors,
                              FALSE );

angle= pieSetSliceFact( pPie,                /* income without mmf
                              &pPie->Inc,
                              angle,
                              (i - mmf),
                              (iD - mmfD),
                              "Income",
                              "",
                              &IncomeColors,
                              FALSE );
```

BEST AVAILABLE COPY

```
        angle= pieSetSliceFact( pPie,
                                        &pPie->Gro,
                                        angle,
                                        (g),
                                        (gD),
                                        "Growth",
                                        "",
                                        &growthColors,
                                        FALSE );


        angle= pieSetSliceFact( pPie,
                                        &pPie->GandI,
                                        pPie->Inc.start,
                                        (i + g - mmf),
                                        (iD + gD - mmfD),
                                        "Long term",
                                        "assets",
                                        &incomeColors,
                                        FALSE );

}

/**************************************************************************
set up complete pie variables for drawing the ACTUAL pie
**************************************************************************/
void    pieSetActFacts( pPie )
pieFactPT    pPie;
{
        Int32T          angle;
        Int32T          b, i, g, bankStart;
        Int32T          bD, iD, gD;
        Int32T          totalExtents;

        pPie->ActRecOrBlue = ACT;

        TGL_SETRECT( &pPie->bounds, 200, 85, 445, 330  );

        SETPOINT( &pPie->center,  (pPie->bounds.top + (pPie->bounds.bottom - pPie->bo
              (pPie->bounds.left + (pPie->bounds.right - pPie->bounds.left)/2) );

        pPie->radius= 1 + (pPie->bounds.bottom - pPie->bounds.top) / 2;

        sscanf( varPtr( vABankPercent ) , "%ld", &b );
        sscanf( varPtr( vAIncomePercent ) , "%ld", &i );
        sscanf( varPtr( vAGrowthPercent ) , "%ld", &g );

        sscanf( varPtr( vABankDollars ) , "%ld", &bD );
        sscanf( varPtr( vAIncomeDollars ) , "%ld", &iD );
        sscanf( varPtr( vAGrowthDollars ) , "%ld", &gD );

        TGL_SETRGB( pPie->lineColor, 17476, 17476, 17476  );

        bankStart = pieCalcStart( FALSE );

        angle= pieSetSliceFact( pPie,
                                        &pPie->Bnk,
                                        270,
                                        (b),
                                        (bD),
                                        "Bank",
                                        "",
                                        &bankColors,
                                        TRUE );

        angle= pieSetSliceFact( pPie,                   /* income without mmf */
                                        &pPie->Inc,
                                        angle,
```

```
                                        (i),
                                        (iD),
                                        "Income",
                                        "",
                                        &incomeColors,
                                        FALSE );

    angle= pieSetSliceFact( pPie,
                                        &pPie->Gro,
                                        angle,
                                        (g),
                                        (gD),
                                        "Growth",
                                        "",
                                        &growthColors,
                                        FALSE );

    pieCorrectRounding( pPie );

} /* end of pieSetActFacts */

/***********************************************************************
 set up complete pie variables for drawing the RECOMMENDED pie
 similar to the pieSetBlueFacts, but with only the three slices (B,I,G)
***********************************************************************/
void  pieSetRecFacts(,pPie )
pieFactPT   pPie;
{
    Int32T      angle;
    Int32T      b, i, g, bankStart;
    Int32T      bD, ID, gD;
    Int32T      totalExtents;

    pPie->ActRecOrBlue = REC;

    TGL_SETRECT( &pPie->bounds, 200, 85, 445, 330 );

    SETPOINT( &pPie->center, (pPie->bounds.top + (pPie->bounds.bottom - pPie->bc
        (pPie->bounds.left + (pPie->bounds.right - pPie->bounds.left)/2) );

    pPie->radius= 1 + (pPie->bounds.bottom - pPie->bounds.top) / 2;

    sscanf( varPtr( vRBankPercent ) , "%ld", &b );
    sscanf( varPtr( vRIncomePercent ) , "%ld", &i );
    sscanf( varPtr( vRGrowthPercent ) , "%ld", &g );

    sscanf( varPtr( vRBankDollars ) , "%ld", &bD );
    sscanf( varPtr( vRIncomeDollars ) , "%ld", &iD );
    sscanf( varPtr( vRGrowthDollars ) , "%ld", &gD );

    TGL_SETRGB( pPie->lineColor, 17476, 17476, 17476 );

    bankStart = pieCalcStart( TRUE );

    angle= pieSetSliceFact( pPie,
                                        &pPie->Bnk,
                                        270,
                                        (b),
                                        (bD),
                                        "Bank",
                                        "",
                                        &bankColors,
                                        TRUE );

    angle= pieSetSliceFact( pPie,               /* income without mmf */
                                        &pPie->Inc,
                                        angle,
                                        (i),
```

BEST AVAILABLE COPY

```
                                        (iD),
                                        "Income",
                                        "",
                                        &incomeColors,
                                        FALSE );

    angle= pieSetSliceFact( pPie,
                                        &pPie->Gro,
                                        angle,
                                        (g),
                                        (gD),
                                        "Growth",
                                        "",
                                        &growthColors,
                                        FALSE );

    pieCorrectRounding( pPie );

} /* end of pieSetRecFacts */

/*********************************************************************
draw legend on top of slice
*********************************************************************
void pieDrawLegend( pPie, pSlice, bShowDollars, bShowPercent, bBlueText, pieKind, t
pieFactPT   pPie;
sliceFactPT pSlice;
BooleanT    bShowDollars;
BooleanT    bShowPercent;
BooleanT    bBlueText;
pieKindT    pieKind;
Int32T              typeSize;
{
    char leg1[50], leg2[50], leg3[50], s[ 50 ];
    FontInfo    info;
    Int32T              lineHeight;
    Real80T     outSet;            /* proportional  location of Legend text, close
                                                    /* the median location woul
    Boolean             outside = FALSE;
    Int32T              centerAngle;
    PenState    state;
    Rect        circle;
    Point       dot;
    RGBColor    textColor;
    static RGBColor    blueTextColor = { 17476, 17476, 17476 };
    static RGBColor    blueDarkTextColor = { 0, 0, 0 };

    if ( pSlice->dollars == 0 )  return ;           /* no display for teeny slices */

    if ( bBlueText ) textColor = blueTextColor;
    else        textColor = pSlice->color.cLegend;

    TextFont( 3 );
    TextSize( typeSize );
    TextFace( bold );
    GetFontInfo( &info );
    lineHeight= info.ascent + info.descent + info.leading - 2;

    sprintf( leg1, "%s", pSlice->legendText1 );

    if( *(pSlice->legendText2) ) {
        sprintf( leg2, "%s", pSlice->legendText2 );
        if( bShowDollars ) {
            sprintf( s, "%ld", pSlice->dollars );
            varDollarFmt( leg3, s, TRUE );
        }
        else if( bShowPercent )
            sprintf( leg3, "%ld%%", pSlice->percent );
```

BEST AVAILABLE COPY

```
		else
			*leg3= '\0';
	}
	else {
		if( bShowDollars ) {
			sprintf( s, "%ld", pSlice->dollars );
			varDollarFmt( leg2, s, TRUE );
		}
		else if( bShowPercent )
			sprintf( leg2, "%ld%%", pSlice->percent );

		else
			*leg2= '\0';

		*leg3= '\0';
	}

	/* crude rules of the fast kind */
	outSet = 1.7;
	if (pSlice->extent <  30) outSet = 1.55; /* rem: we're adjusting up and down, too '
	else if (pSlice->extent <  50) outSet = 1.5;
	else if (pSlice->extent > 120) outSet = 2.0;
	else if (pSlice->extent > 150) outSet = 2.3;

	MoveTo( (Int32T) (pSlice->horMedRad * (pPie->radius/outSet) + pPie->center.h),
		(Int32T) (pSlice->verMedRad * (pPie->radius/outSet) + pPie->center.v

	/* adjust starting point for number of lines */

	if( *leg2 && *leg3 )	Move( 0, - (lineHeight) );
	else if (*leg2)			Move( 0, - (lineHeight/2) );
	else					Move( 0, lineHeight/2 );

	/* the pen is over the center of the slice.   check for slices adjacent and thin:  */

	/* in blueprint pie only: check percentage of total assets that are income */
	if ( pPie->ActRecOrBlue == BLUE &&
		(varVal( vGrossIncome ) < ( varVal( vTotalAssets )/2 ) )){

		if ( varVal (vGrossIncome) > MMF_ADJUST_INCOME ) {

			/* adjust the MMF Legend up one line's height. */

			if ( leg1[0] == 'M' ) {				/* MMF slice up */
				Move( 0, (Int16T) -(lineHeight*1) );
			}
			if ( leg1[0] == 'B' ) {				/* Bank slice down */
				Move( 0, (Int16T) (lineHeight*1) );
			}
		}
	}

	/*  check for teenies in REC pie only  */
	if (  pPie->ActRecOrBlue == REC &&
		( pSlice->percent < TEENY_SLICE_PERCENT ) ) {
		/* check to see if another slice is also teeny... */

		switch ( leg1[0] ) {
			case ('G')	:	/* growth slice */
					if ( ( pPie->Bnk.percent <= TEENY_SLICE_PERCENT ) ||
						( pPie->Inc.percent <= TEENY_SLICE_PERCENT )

						/* Growth is always on the bottom, so drop th
						/* location of the legend down. */
						Move( 0, (Int16T) (lineHeight*2) );
					}
					break;
```

```
            case ('I')      :       /* income slice */
                            if ( ( pPie->Bnk.percent <= TEENY_SLICE_PERCENT ) ||
                                    ( pPie->Gro.percent <= TEENY_SLICE_PERCENT ) )
                                    /* Income is always on the top, so boost the */
                                    /* location of the legend up one line. */
                                    Move( 0, -(Int16T) (lineHeight*1.5) );
                            }
                            break;

            case ('B')      :       /* bank slice */
                            if  ( pPie->Inc.percent <= TEENY_SLICE_PERCENT )
                                    /* Bank will be below Income as teenies */
                                    Move( 0, (Int16T) (lineHeight*1.5)  );
                            }
                            else if ( pPie->Gro.percent <= TEENY_SLICE_PERCENT )
                                    /* Bank will be above Growth as teenies */
                                    Move( 0, -(Int16T) (lineHeight * 2.0 -
                                                    lineHeight * 0.5 *
                                                     pSlice->percent / TEENY_SLICE_PERCE
                            }
                            break;
            default                 : break;  /* do nothing else */
        }

}

/*
 *      similar check for teeny slices in Blueprint pie
 */
if (  pPie->ActRecOrBlue == BLUE && ( pSlice->percent < TEENY_SLICE_PERCENT )
        {
        switch ( leg1[0] )
                {
                case ('B')      :       /* bank slice */
                                if ( ( pPie->Cinl.percent <= TEENY_SLICE_PERCENT ) &&
                                        ( pPie->Cinl.dollars > 0 ) )
                                        {
                                        /* Bank will be below MMF as teenies */
                                        Move( 0, (Int16T) (lineHeight*1.5)  );
                                        }

                }
        }


/*  set the color for the text  */
RGBForeColor( &textColor );
if ( bBlueText )
        {
        if ( pSlice->extent < (28.0 * 3.6) ) RGBForeColor( &blueDarkTextColor );

        /*  push blueprint titles down a few pixels  */
        Move( 0, 5 );
        }

/*  this line and to the center  */
Move( - (stringwidth( leg1 ) / 2 ), 0 );
drawstring( leg1 );

/* down a line and to the center */
Move(           - ((stringwidth( leg1 ) + stringwidth(leg2)) /2), lineHeight);
drawstring( leg2 );

/* down a line and to the center */
Move(           - ((stringwidth( leg2 ) + stringwidth(leg3)) /2), lineHeight);
drawstring( leg3 );
```

```
        RGBBackColor( &tglRgbWhite );
        RGBForeColor( &tglRgbBlack );
}
```

BEST AVAILABLE COPY

```
void pieTextBackground ( RGBColor *backgroundColor, char *legend )
        {
        Point thisPoint;

        GetPen( &thisPoint );

        RGBForeColor( backgroundColor );
        /*MoveTo( thisPoint.h + 1, thisPoint.v + 1 ); drawstring( legend );
        MoveTo( thisPoint.h + 1, thisPoint.v - 1 ); drawstring( legend );
        MoveTo( thisPoint.h - 1, thisPoint.v - 1 ); drawstring( legend );
        MoveTo( thisPoint.h - 1, thisPoint.v + 1 ); drawstring( legend );*/
        MoveTo( thisPoint.h + 2, thisPoint.v    ); drawstring( legend );
        MoveTo( thisPoint.h    , thisPoint.v + 2 ); drawstring( legend );
        MoveTo( thisPoint.h - 2, thisPoint.v    ); drawstring( legend );
        MoveTo( thisPoint.h    , thisPoint.v - 2 ); drawstring( legend );
        MoveTo( thisPoint.h + 2, thisPoint.v + 2 ); drawstring( legend );
        MoveTo( thisPoint.h + 2, thisPoint.v - 2 ); drawstring( legend );
        MoveTo( thisPoint.h - 2, thisPoint.v - 2 ); drawstring( legend );
        MoveTo( thisPoint.h - 2, thisPoint.v + 2 ); drawstring( legend );
        MoveTo( thisPoint.h    , thisPoint.v    );
        }

/*********************************************************************
draw slice sides
*********************************************************************/
void pieDrawSides ( pPie, pSlice, width )
        pieFactPT     pPie;
        sliceFactPT   pSlice;
        Int32T             width;
        {
        static RGBColor     blueLightLineColor = { 26214, 26214, 26214 };

        if ( pSlice->dollars == 0 )  return ;           /* no display for teeny slices */
        if ( pSlice->percent == 100 ) return ;           /* no outline for 100% slice */

        if ( pSlice->extent < (28.0 * 3.6) )
              RGBForeColor( &blueLightLineColor );
        else
              RGBForeColor( &pPie->lineColor );
        PenSize( width, width);

        FrameArc( &pPie->bounds, (Int32T) pSlice->start, (Int32T) pSlice->extent );

        MoveTo( (Int32T) pPie->center.h, (Int32T) pPie->center.v );
        LineTo( (Int32T) (pSlice->horStartRad * pPie->radius + pPie->center.h),
                  (Int32T) (pSlice->verStartRad * pPie->radius + pPie->center.v));

        MoveTo( (Int32T) pPie->center.h, (Int32T) pPie->center.v );
        LineTo( (Int32T) (pSlice->horEndRad *  pPie->radius +  pPie->center.h),
                  (Int32T) (pSlice->verEndRad *  pPie->radius +  pPie->center.v));

        RGBBackColor( &tglRgbWhite );
        RGBForeColor( &tglRgbBlack );
        }

/*********************************************************************
draw filled-in slice
*********************************************************************/
void pieDrawSlice( pPie, pSlice )
pieFactPT    pPie;
sliceFactPT  pSlice;
{

        if ( pSlice->dollars == 0 )  return ;           /* no display for teeny slices */
```

```
     RGBBackColor( &pSlice->color.cTop );
     EraseArc( &pPie->bounds, (Int32T) pSlice->start, (Int32T) pSlice->extent );
     pieDrawSides( pPie, pSlice, 3 );        /* draw frame on top of slice */

     RGBBackColor( &tglRgbWhite );
     RGBForeColor( &tglRgbBlack );
}
```

BEST AVAILABLE COPY

```
/*********************************************************************
draw filled-in slice without framing sides
*********************************************************************
void pieDrawSliceNoFrame( pPie, pSlice )
pieFactPT    pPie;
sliceFactPT  pSlice;
{
     if ( pSlice->dollars == 0 )  return ;          /* no display for teeny slices */

     RGBBackColor( &pSlice->color.cTop );
     EraseArc( &pPie->bounds, (Int32T) pSlice->start, (Int32T) pSlice->extent );

     RGBBackColor( &tglRgbWhite );
     RGBForeColor( &tglRgbBlack );
}

/*********************************************************************
draw filled-in slice with a 1-bit frame on all sides
*********************************************************************
void pieDrawSlice1BitFrame( pPie, pSlice )
pieFactPT    pPie;
sliceFactPT  pSlice;
{
     if ( pSlice->dollars == 0 )  return ;          /* no display for teeny slices */

     RGBBackColor( &pSlice->color.cTop );
     EraseArc( &pPie->bounds, (Int32T) pSlice->start, (Int32T) pSlice->extent );
     pieDrawSides( pPie, pSlice, 1 );        /* draw thin frame on top of slice */

     RGBBackColor( &tglRgbWhite );
     RGBForeColor( &tglRgbBlack );
}

/*********************************************************************
draw shadow of a slice
*********************************************************************
void pieDrawShadowSlice( pPie, pSlice )
pieFactPT    pPie;
sliceFactPT  pSlice;
{

     Rect shadowSlice;

     if ( pSlice->dollars == 0 )  return ;          /* no display for teeny slices */
     shadowSlice = pPie->bounds;
     OffsetRect( &shadowSlice, 18, 12);
     RGBBackColor( &pSlice->color.cShadow );
     EraseArc( &shadowSlice, (Int32T) pSlice->start, (Int32T) pSlice->extent );

}
/*********************************************************************
draw shadow of a whole pie
*********************************************************************
void pieDrawShadow( pPie , hOff, vOff)
pieFactPT    pPie;
Int32T       hOff, vOff;
{
```

BEST AVAILABLE COPY

```
        Rect shadowRect;

        shadowRect = pPie->bounds;
        OffsetRect( &shadowRect, hOff, vOff);
        RGBBackColor( &pPie->Bnk.color.cShadow );          /* Bnk or any slice's color
        EraseOval( &shadowRect );

}

/**********************************************************************
draw outer circle of pie
**********************************************************************/
void pieDrawCircle( pPie )
pieFactPT    pPie;
{

        RGBForeColor( &pPie->lineColor );
        PenSize( 3, 3 );
        FrameOval( &pPie->bounds );

        RGBBackColor( &tglRgbWhite );
        RGBForeColor( &tglRgbBlack );
}



/**********************************************************************

        EXTERNALLY-CALLED PIE DRAWING ROUTINES    [ (Y) commands ]

**********************************************************************/

/**********************************************************************
draw the circle with two lines delineating the cash portion, with legend
**********************************************************************/

void pieDrawCashSector()
{
        pieFactT      pie;

        pieSetBlueFacts( &pie, FALSE );              /* set up variables for drawing */

        pieDrawCircle( &pie );
        pieDrawSides( &pie, &pie.Cash, 3);
        pieDrawLegend( &pie, &pie.Cash, TRUE, FALSE ,TRUE, SINGLE_PIE, 12 );
        pieDrawLegend( &pie, &pie.Gandl, FALSE, FALSE, TRUE, SINGLE_PIE, 12 );
}

/**********************************************************************
draw bank slice over the cash sector
**********************************************************************/

void pieDrawBankSlice()
{
        pieFactT      pie;

        pieSetBlueFacts( &pie, FALSE );              /* set up variables for drawing */

        pieDrawShadowSlice( &pie, &pie.Bnk );

        pieDrawCircle( &pie );
        pieDrawSides( &pie, &pie.Cash, 1 );

        pieDrawSlice1BitFrame( &pie, &pie.Bnk );
```

```
        pieDrawLegend( &pie, &pie.Bnk, TRUE , FALSE, FALSE, SINGLE_PIE, 12 );
        pieDrawLegend( &pie, &pie.Gandl, FALSE , FALSE, TRUE, SINGLE_PIE, 12 );
```

BEST AVAILABLE COPY

```
}

/*********************************************************************
 draw MMF slice over the cash sector
*********************************************************************/

void pieDrawMMFSlice()
{
        pieFactT      pie;

        pieSetBlueFacts( &pie, FALSE );                /* set up variables for drawing */

        pieDrawShadowSlice( &pie, &pie.Bnk );
        pieDrawShadowSlice( &pie, &pie.Cinl );

        pieDrawCircle( &pie );
        pieDrawSides( &pie, &pie.Cash, 1 );

        pieDrawSlice1BitFrame( &pie, &pie.Bnk );
        pieDrawSlice1BitFrame( &pie, &pie.Cinl );

        pieDrawLegend( &pie, &pie.Bnk, TRUE , FALSE, FALSE, SINGLE_PIE, 12 );
        pieDrawLegend( &pie, &pie.Gandl, FALSE , FALSE, TRUE, SINGLE_PIE, 12 );
        pieDrawLegend( &pie, &pie.Cinl, TRUE , FALSE, FALSE, SINGLE_PIE, 12 );

}

/*********************************************************************
 draw income/growth dollars legend
*********************************************************************/

void pieDrawGILegend()
{
        pieFactT      pie;

        pieSetBlueFacts( &pie, FALSE );                /* set up variables for drawing *

        pieDrawShadowSlice( &pie, &pie.Bnk );
        pieDrawShadowSlice( &pie, &pie.Cinl );

        pieDrawCircle( &pie );
        pieDrawSides( &pie, &pie.Cash, 3 );

        pieDrawSlice1BitFrame( &pie, &pie.Bnk );
        pieDrawSlice1BitFrame( &pie, &pie.Cinl );

        pieDrawLegend( &pie, &pie.Cinl, TRUE , FALSE, FALSE, SINGLE_PIE, 12 );
        pieDrawLegend( &pie, &pie.Bnk, TRUE , FALSE, FALSE, SINGLE_PIE, 12 );
        pieDrawLegend( &pie, &pie.Gandl, TRUE , FALSE, TRUE, SINGLE_PIE, 12 );

}

/*********************************************************************
 draw income/growth dividing lines over displayed pie
*********************************************************************/

void pieDrawGISplit()
{
        pieFactT      pie;

        pieSetBlueFacts( &pie, TRUE );         /* set up variables for drawing */

        pieDrawShadowSlice( &pie, &pie.Bnk );
        pieDrawShadowSlice( &pie, &pie.Cinl );
```

BEST AVAILABLE COPY

```
	pieDrawCircle( &pie );

	pieDrawSides( &pie, &pie.Cash, 3 );
	pieDrawSides( &pie, &pie.Inc, 3 );

	pieDrawSlice1BitFrame( &pie, &pie.Bnk );
	pieDrawSlice1BitFrame( &pie, &pie.Cinl );

	pieDrawLegend( &pie, &pie.Gro, FALSE , FALSE, TRUE, SINGLE_PIE, 12 );
	pieDrawLegend( &pie, &pie.Inc, FALSE , FALSE, TRUE, SINGLE_PIE, 12 );

}


/***********************************************************************
 draw twin pies, actual and recommended
***********************************************************************/

void pieDrawTwin( void )
{
	pieFactT	pie;
	sliceFactPT	slices[4];
	Int32T		i;

	pieSetActFacts( &pie );		/* set up variables for drawing */

	TGL_SETRECT( &(pie.bounds), 85, 103, 285, 303 );
	SETPOINT( &(pie.center), (pie.bounds.top + (pie.bounds.bottom - pie.bounds.t
		(pie.bounds.left + (pie.bounds.right - pie.bounds.left)/2) );

	pie.radius= 1 + (pie.bounds.bottom - pie.bounds.top) / 2;

	pieDrawShadow( &pie , 18, 12);

	slices[2] = &pie.Bnk;
	slices[1] = &pie.Inc;
	slices[0] = &pie.Gro;

	pieSortByExtent( slices, 3 );

	for ( i = 0; i < 3; i++ ) {
		pieDrawSliceNoFrame( &pie, slices[i] );
	}

	pieDrawLegend( &pie, &pie.Gro, FALSE , TRUE, FALSE, LEFT_PIE, 10 );
	pieDrawLegend( &pie, &pie.Inc, FALSE , TRUE, FALSE, LEFT_PIE, 10 );
	pieDrawLegend( &pie, &pie.Bnk, FALSE , TRUE, FALSE, LEFT_PIE, 10 );

	pieSetRecFacts( &pie );		/* set up variables for drawing */

	TGL_SETRECT( &(pie.bounds), 340, 103, 540, 303 );
	SETPOINT( &(pie.center), (pie.bounds.top + (pie.bounds.bottom - pie.bound
		(pie.bounds.left + (pie.bounds.right - pie.bounds.left)/2) );

	pie.radius= 1 + (pie.bounds.bottom - pie.bounds.top) / 2;

	pieDrawShadow( &pie, 18, 12 );

	slices[2] = &pie.Bnk;
	slices[1] = &pie.Inc;
	slices[0] = &pie.Gro;

	pieSortByExtent( slices, 3 );

	for ( i = 0; i < 3; i++ ) {
		pieDrawSliceNoFrame( &pie, slices[i] );
	}
```

```
        pieDrawLegend( &pie, &pie.Gro, FALSE , TRUE, FALSE, RIGHT_PIE, 10 );
        pieDrawLegend( &pie, &pie.Inc, FALSE , TRUE, FALSE, RIGHT_PIE, 10 );
        pieDrawLegend( &pie, &pie.Bnk, FALSE , TRUE, FALSE, RIGHT_PIE, 10 );
}

/************************************************************************
 draw twin pies, actual and recommended, CLOSE TOGETHER IN THE CENTER
************************************************************************

void pieDrawTwinCondensed( void )
{
        pieFactT        pie;
        sliceFactPT     slices[4];
        Int32T          i;

        pieSetActFacts( &pie );         /* set up variables for drawing */

        TGL_SETRECT( &(pie.bounds), 160, 125, 315, 280 );
        SETPOINT( &(pie.center), (pie.bounds.top + (pie.bounds.bottom - pie.bounds.top
                (pie.bounds.left + (pie.bounds.right - pie.bounds.left)/2) );

        pie.radius= 1 + (pie.bounds.bottom - pie.bounds.top) / 2;

        pieDrawShadow( &pie, 3, 3 );

        slices[2] = &pie.Bnk;
        slices[1] = &pie.Inc;
        slices[0] = &pie.Gro;

        pieSortByExtent( slices, 3 );

        for ( i = 0; i < 3; i++ ) {
                pieDrawSliceNoFrame( &pie, slices[i] );
        }

        for ( i = 0; i < 3; i++ ) {
                pieDrawLegend( &pie, slices[i], FALSE , TRUE, FALSE, LEFT_PIE, 10 );
        }

        pieSetRecFacts( &pie );         /* set up variables for drawing */

        TGL_SETRECT( &(pie.bounds), 340, 125, 495, 280 );
        SETPOINT( &(pie.center), (pie.bounds.top + (pie.bounds.bottom - pie.bounds.to
                (pie.bounds.left + (pie.bounds.right - pie.bounds.left)/2) );

        pie.radius= 1 + (pie.bounds.bottom - pie.bounds.top) / 2;

        pieDrawShadow( &pie, 3, 3  );

        slices[2] = &pie.Bnk;
        slices[1] = &pie.Inc;
        slices[0] = &pie.Gro;

        pieSortByExtent( slices, 3 );

        for ( i = 0; i < 3; i++ ) {
                pieDrawSliceNoFrame( &pie, slices[i] );
        }

        for ( i = 0; i < 3; i++ ) {
                pieDrawLegend( &pie, slices[i], FALSE , TRUE, FALSE, RIGHT_PIE, 10 );
        }
}

/************************************************************************
 draw recommend pie
```

BEST AVAILABLE COPY

```
***************************************************************************

void pieDrawRecommend( void )
{
        pieFactT      pie;
        sliceFactPT   slices[3];
        Int32T              i;

        pieSetRecFacts( &pie );          /* set up variables for drawing */

        pieDrawShadow( &pie, 18, 12 );

        slices[2] = &pie.Bnk;
        slices[1] = &pie.Inc;
        slices[0] = &pie.Gro;

        pieSortByExtent( slices, 3 );

        for ( i = 0; i < 3; i++ ) {
                pieDrawSliceNoFrame( &pie, slices[i] );
        }

        for ( i = 0; i < 3; i++ ) {
                pieDrawLegend( &pie, slices[i], FALSE , TRUE, FALSE, SINGLE_PIE, 12 );
        }
}

/***************************************************************************
 draw recommend pie
***************************************************************************

void pieDrawRecommend4Slices( void )
{
        pieFactT      pie;
        sliceFactPT   slices[4];
        Int32T              i;

        slices[3] = &pie.Cinl;
        slices[2] = &pie.Bnk;
        slices[1] = &pie.Inc;
        slices[0] = &pie.Gro;

        pieSetBlueFacts( &pie, FALSE );          /* set up variables for drawing */

        pieSortByExtent( slices, 4 );

        for ( i = 0; i < 4; i++ ) {
                pieDrawSliceNoFrame( &pie, slices[i] );
        }

        for ( i = 0; i < 4; i++ ) {
                pieDrawLegend( &pie, slices[i], FALSE , TRUE, FALSE, SINGLE_PIE, 12 );
        }
}

/***************************************************************************
 draw actual pie
***************************************************************************

void pieDrawActual( void )
{
        pieFactT      pie;
        sliceFactPT   slices[4];
        Int32T              i;

        pieSetActFacts( &pie );          /* set up variables for drawing */

        pieDrawShadow( &pie, 18, 12 );
```

BEST AVAILABLE COPY

BEST AVAILABLE COPY

```
        slices[2] = &pie.Bnk;
        slices[1] = &pie.Inc;
        slices[0] = &pie.Gro;

        pieSortByExtent( slices, 3 );

        for ( i = 0; i < 3; i++ ) {
                pieDrawSliceNoFrame( &pie, slices[i] );
        }

        for ( i = 0; i < 3; i++ ) {
                pieDrawLegend( &pie, slices[i], FALSE , TRUE, FALSE, SINGLE_PIE, 12 );
        }
}
```

BEST AVAILABLE COPY

```
/*
 * File scnScan.c
 */

#include    "standard.h"
#include    "glue.h"

#define     APP_CHILE
#define     APP_ADTERM
#include    "varFns.h"

#define EXTGEN
#include    "scnScan.h"
#include    "scnScani.h"
#undef EXTGEN

#include    "tglMain.h"
#include    "libLibrary.h"
#include    "lblLabel.h"
#include    "clcCalculator.h"
#include    "chfLoanFns.h"
#include    "tchTouch.h"
#include    "bndDetail.h"
#include    "stkDetail.h"
#include    "bnkDetail.h"
#include    "brdAlloc.h"
#include    "atfMisc.h"
#include    "prtPrint.h"

#include    "pieChart.h"
#include    "barChart.h"
#include    "pcmPrintCmd.h"
#include    "vcmViewCmd.h"
#include    "scrScreen.h"
#include    "edtEdit.h"
#include    "excExcelRead.h"
#include    "bigplot.h"
#include    "hotSheet.h"
#include    "grfGraphics.h"
#include    "snpSnapshot.h"
#include    "picPICTfns.h"
#include    "control.h"
#include    "dataStructures.h"
#include    "vrwVarFiles.h"
#include    "misData.h"
#include    "chileReport.h"
#include    "modIO.h"
#include    "taxCalc.h"
#include    "errHandler.h"
#include    "EventHandlers.h"
#include    "CTextEditEH.h"

#define NUM_LINES_OF_DEBUG          70
#define DEBUG_LINE_LENGTH           50


/*------------------------------------------*/
#define     OK                      1
#define     CANCEL                  2
#define VARIABLES_ID   2005         /* show variables */
#define FIRST_EDIT_ITEM             4          /* id of first edit item in

/*------------------------------------------
 *
 *                          Variables
 *
```

```
---------------------------------------------------------- */
#define BREAK_POINT_ID 1002

scnCommandRecordT CommandRecord;          /* record of parsing information */
DatPointerStack ClickStack, SubStack, mainXStack, altXStack;


#define NUM_VARIABLES_TO_VIEW  10
static Int32T        VariableList[NUM_VARIABLES_TO_VIEW];

/*****************************************************************
 Control file vars
****************************************************************** */
static Ptr                    pCtlFile;
static Ptr                    pCurLine;        /* next line to parse (poor naming,
static Ptr                    pLastLine;       /* line being parsed now */
static Ptr                    pEOF;
static Int32T                 CtlSize;
static char                   *CurrentLine;
static char                   *pTimeoutReturn;
static Boolean                bTimeoutActive;

void scnVariables( void );

/*******************************************************************
**
 * scnInitialize initialize whatever needs initializing in here

*******************************************************************
* */
void scnInitialize()
{
      pCtlFile = NULL;
}

/*******************************************************************
**
      scnNewCtrlFile -- ask for name of (and open) new control file
*******************************************************************
* */
Int32T scnNewCtrlFile()
      {
      SFReply                 FileReply;
      SFTypeList              typeTEXT= { 'TEXT' };
      Int16T                  fRefNum = 0, volRefNum;
      Point                   DialogLocation;
      char                    volName[255];
      Boolean                 gotFile = FALSE;

      if ( fsopen( "default.scan", 0, &fRefNum ) == noErr )
            {
            gotFile = TRUE;
            GetEOF( fRefNum, &CtlSize);
            }
      else
            {
            DialogLocation.v= 100; DialogLocation.h= 150;

            tglPushCursor();
            tglCursorOnOff( TRUE );
            sfgetfile( &DialogLocation, "", NULL, 1, typeTEXT, NULL, &FileReply
            tglPopCursor();

            if ( ! FileReply.good )
                  CtlSize = 1;
            else
                  {
                  p2cstr( (char *) &FileReply.fName );
```

BEST AVAILABLE COPY

```
                fsopen( (char *) FileReply.fName, FileReply.vRefNum, &fRefNum );

                /* change current directory to scan file directory */
                setvol( NULL, FileReply.vRefNum );

                GetEOF( fRefNum, &CtlSize);

                gotFile = TRUE;
                }
        }

/*      FUTURE: init Volume Reference and Directory ID for home directory. */

if( pCtlFile != NULL ) DisposPtr( pCtlFile );
pCtlFile= NewPtr( CtlSize );
if( pCtlFile == NULL )
        TGL_FATAL_ERROR( "pCtlFile allocation failed" );

if ( gotFile )
        {
        SetFPos( fRefNum, 1, 0 );
        FSRead( fRefNum, &CtlSize, pCtlFile );
        FSClose( fRefNum );
        }
else
        {
        *pCtlFile = ' ';                /* just to have something there */
        }

pCurLine = pCtlFile;
pEOF = pCtlFile + CtlSize;

scnFillLabelTable();                            /* scan file for labels */

return( 1 );
}


/*
**********************************************************************
        NextCtlLine() - get next line of control file
**********************************************************************
* */
Ptr scnNextCtlLine( char **ppCurLine, char *buffer, Int32T size )
        {
        register Ptr pC, pB, fastEOF;
        register Int32T      n, fastSize;

        pC = *ppCurLine;
        pB = buffer;
        fastEOF = pEOF;
        fastSize = size - 1;

        /* skip the previous "\n\r" and any completely empty lines */
        while ( ((*pC == '\n') || (*pC == '\r')) && (pC < fastEOF) ) pC++;

        /* copy the line until we hit a \r or \n */
        n = 0;
        while ( isalnum(*pC) ||           /* check for the most stuff likely first for speec
                        (*pC == ' ') ||
                        ((*pC != '\n') && (*pC != '\r') && (pC < fastEOF)) &&
                (n < fastSize ) )
                {
                *(pB++) = *(pC++);
                n++;
```

BEST AVAILABLE COPY

```
        },

    /*  we have a line; end it like a string and return it  */
    /*  (and advance the master pointer) */
    if ( n )
        {
        *ppCurLine = pC;
        *pB = '\0';

        return( buffer );
        }

    else return( NULL );
    }

/*
**************************************************************************
    scnLexScan() -- setup CommandRecord
**************************************************************************
* */
Int32T scnLexScan( char *lineBuffer )
{
    register Int32T rc, i;
    register char *p;

    CommandRecord.DefinedFields= 0;
    CommandRecord.b2Screen= 0;
    CommandRecord.NumVars = 0;             /* no variables are defined */
    CommandRecord.bShadow = 0;
    CommandRecord.bReverse = 0;

    p = lineBuffer;

    while ( p && (*p) && ! ( CommandRecord.DefinedFields & sGARBAGE ) )
        {
        switch( *p )
            {
            case 9: /* tab */
            case ' ':
                    ++p;
                    break;

            case '(':
                    if (p[2] != ')')
                        CommandRecord.DefinedFields |= sGARBAGE;
                    else
                        {
                        /*  get the command  */
                        CommandRecord.Command = *(++p);
                        CommandRecord.DefinedFields |= sCOMMANE

                        /*  advance our pointer  */
                        p += 2;
                        p = strpbrk( p, "\"@~$#:0123456789!;*" );
                        }
                    break;

            case '0': case '1': case '2': case '3': case '4':
            case '5': case '6': case '7': case '8': case '9':
                    CommandRecord.Number = atol(p);
                    CommandRecord.DefinedFields |= sNUMBER;
                    while( isdigit(*p) ) p++;
                    break;

            case '\"':
                    CommandRecord.Str1[0]= '\0';
                    rc= sscanf( p, "\"%[^\"]\"", &(CommandRecord.Str1[
filename */

nScan.c
```

```
                if( !(CommandRecord.DefinedFields & sSTRING) &&
                      (rc==1 || (rc==0 && *(p+1)=='\"')) /* empty string
                 )
                      {
                      CommandRecord.DefinedFields |= sSTRING;
                      p= strpbrk( ++p, "\"" );
                      p= strpbrk( ++p, "@$#:0123456789!;*" );
                      }
                else
                      CommandRecord.DefinedFields |= sGARBAGE;
                break;

        case '!':
                rc= sscanf( p, "!\"%[^\"]\"", &(CommandRecord.Str2[0
filename */
                if( rc == 1 && !(CommandRecord.DefinedFields & sAL
                      {
                      CommandRecord.DefinedFields |= sALTSTRING;
                      p= strpbrk( (p+2), "\"" );
                      p= strpbrk( ++p, "\"@$#:0123456789;*" );
                      }
                else
                      CommandRecord.DefinedFields |= sGARBAGE;
                break;

        case '@':
                /* find the vertical position */
                while ( *p && ! isdigit(*p) && *p != '-' ) p++;
                if (! *p) { CommandRecord.DefinedFields |= sGARBA(
                CommandRecord.Target.v = atoi(p);
                while ( *p && ( isdigit(*p) || *p == '-') ) p++;

                /* find the horizontal position */
                while ( *p && ! isdigit(*p) && *p != '-' ) p++;
                if (! *p) { CommandRecord.DefinedFields |= sGARBA
                CommandRecord.Target.h = atoi(p);

                CommandRecord.DefinedFields |= sTARGET;
                p= strpbrk( p, "\"$#:!;*" );
                break;


        case '$':  /* accept non-zero variable number */
                        /* increment the number of vars and */
                        /* then read the new varnum into the table *
                        /* of VarNums */

                CommandRecord.NumVars++;

                /* find the variable number */
                while ( *p && ! isdigit(*p) ) p++;
                if (! *p) { CommandRecord.DefinedFields |= sGARB

                /* read the number and check for zero */
                CommandRecord.VarNum[CommandRecord.NumV
                if (! CommandRecord.VarNum[CommandRecord.N
                      { CommandRecord.DefinedFields |= sGARBA

                CommandRecord.DefinedFields |= sVARNUM;
                p = strpbrk( p, "\"$@#:!;*" );
                break;

        case '#':
                rc= sscanf( p, "# %hd , %hd , %hd , %hd", &(Com
&(CommandRecord.Touch.left ),

&(CommandRecord.Touch.bottom), &(CommandRecord.Touch.right) );
                if( rc == 4 && !(CommandRecord.DefinedFields &
```

BEST AVAILABLE COPY

```
                        {
                        CommandRecord.DefinedFields |= sTOUCH;
    /* touch area */
                        p= strpbrk( ++p, "\"@$:!;*" );
                        }
                    else
                        CommandRecord.DefinedFields |= sGARBAGE;
                    break;

            case ':':
                    /*  find the label  */
                    p++;
                    while ( *p && isspace(*p) ) p++;
                    if (! *p) { CommandRecord.DefinedFields |= sGARBAGE;

                    /*  copy it  */
                    I = 0;
                    while ( *p && ! isspace(*p)) CommandRecord.EventNar
                    CommandRecord.EventName[i] = '\0';

                    CommandRecord.DefinedFields |= sEVENTNAME;
name */
                    p = strpbrk( p, "\"@$#!;*" );
                    break;

            case '*': /* star means 'apply operation to both screens' */
                    CommandRecord.b2Screen= 1;
                    p++;
                    break;

            case ';':
                    p= strpbrk( ++p, "\n" );        /* get rid of rest of lin
                    break;                                      /* t

            case '~':   /* auto-shadow flag */
                    CommandRecord.bShadow = 1;
                    p++;
                    break;

            case '-':   /* Reverse flag */
                    CommandRecord.bReverse = 1;
                    p++;
                    break;

            default:
                    CommandRecord.DefinedFields |= sGARBAGE;
                    break;
            }
        }

    return( 1 );
}

/*
*******************************************************************
    FillLabelTable()

*******************************************************************
* */
Int32T      scnFillLabelTable()
    {
    Int32T              rc;
    char   *pLocalLine, *pThisLine;
    register char *p, *label, *firstP;
    char buf[255], errorLine[300];
    BooleanT errorOccurred = FALSE;
```

BEST AVAILABLE COPY

```
        lblInitialize();                        /* create label table */
        pLocalLine = pCurLine;

        while( TRUE )
                {
                pThisLine = pLocalLine;

                /*  get the next comand line from the file  */
                firstP = p = scnNextCtlLine( &pLocalLine, &buf[0], 255 );
                if ( p == NULL ) return( 1 );  /*  EOF  */

                /*  skip indentation characters  */
                while ( ((*p == ' ') || (*p == '\t')) && ( *p ) ) p++;
                if ( *p == '\0' ) continue;

                /*  check for a paren  */
                if (*p != '(') continue;

                /*  check for a label command in the next position  */
                p++;
                if (toupper(*p) != 'B' && *p != ':') continue;
                p++;
                if ( *p != ')' )
                        {
                        sprintf( errorLine,  "bad label syntax: %s" , firstP );
                        TGL_ERROR( errorLine );
                        errorOccurred = TRUE;
                        continue;
                        }

                /*  find the beginning of the label  */
                p++;
                while (*p && isspace(*p) ) p++;
                if ( *p != ':')
                        {
                        sprintf( errorLine,  "bad label syntax: %s" , firstP );
                        TGL_ERROR( errorLine );
                        errorOccurred = TRUE;
                        continue;
                        }

                /*  find the end and make it into a string  */
                label = ++p;
                while (*p && ! isspace(*p)) p++;
                *p = '\0';

                /*  add the label to our label table  */
                lblEnterLabel( label, pThisLine );
                }

        if ( errorOccurred ) TGL_FATAL_ERROR( "bad labels encountered; unable to co
        }

/*
***********************************************************************
        scnEvaluateBoolean()
***********************************************************************
* */
BooleanT scnEvaluateBoolean ( char *booleanExpression )
        {
        #define         EQ      1
        #define         NE      2
        #define         GT      3
        #define         GE      4
        #define         LT      5
        #define         LE      6

        #define         NUM_FND_1       1
```

BEST AVAILABLE COPY

```
#define         NUM_FND_2       2
#define         OP_FND          4
#define         JUNK_FND   8

unsigned    qFoundSymbols;
Int32T      qOp;
Int32T      qNumber1;
Int32T      qNumber2;
Int32T      bJump;
Int32T      rc;
register char *p;

/* analyze comparison string */
p= booleanExpression;
qFoundSymbols= 0;

while( *p && !( qFoundSymbols & JUNK_FND ))
    {
    switch( *p )
        {
        case 9: /* tab */
        case ' ':
                ++p;
                break;

        case '-':
        case '0':
        case '1':
        case '2':
        case '3':
        case '4':
        case '5':
        case '6':
        case '7':
        case '8':
        case '9':
                if( qFoundSymbols & NUM_FND_2 )
                    {
                    qFoundSymbols |= JUNK_FND;  /* too many nur
                    break;
                    }

                if( qFoundSymbols & NUM_FND_1 )
                    {
                    qNumber2= qNumber1;
                    qFoundSymbols |= NUM_FND_2;
                    }

                rc= sscanf( ( p ), "%ld", &qNumber1);
                if( rc == 1 )
                    {
                    qFoundSymbols |= NUM_FND_1;
                    while( ( *p >= '0' && *p <= '9' ) || *p == '-' ) p++
                    }
                else
                    qFoundSymbols |= JUNK_FND;

                break;

        case '$':       /* accept non-zero variable number */
                if( qFoundSymbols & NUM_FND_2 )
                    {
                    qFoundSymbols |= JUNK_FND;  /* too many va
                    break;
                    }

                if( qFoundSymbols & NUM_FND_1 )
```

BEST AVAILABLE COPY

```
                {
                qNumber2= qNumber1;
                qFoundSymbols |= NUM_FND_2;
                }

        rc= sscanf( ( p ), "$ %ld ", &qNumber1);      /* var name
        if( rc == 1 )
                {
                p++;
                while( *p >= '0' && *p <= '9' ) p++;
                qFoundSymbols |= NUM_FND_1;
                qNumber1= varMakeLong( varPtr( qNumber1 ) )
                }
        else
                qFoundSymbols |= JUNK_FND;
        break;

case '>':
        if( qFoundSymbols & OP_FND )
                {
                qFoundSymbols |= JUNK_FND;
                break;
                }

        if( *(p+1) == '=' )
                {
                p += 2;
                qOp= GE;
                }
        else if( *(p+1) == '<' )
                {
                p += 2;
                qOp= NE;
                }
        else
                {
                p++;
                qOp= GT;
                }
        qFoundSymbols |= OP_FND;

        break;

case '<':
        if( qFoundSymbols & OP_FND )
                {
                qFoundSymbols |= JUNK_FND;
                break;
                }

        if( *(p+1) == '=' )
                {
                p += 2;
                qOp= LE;
                }
        else if( *(p+1) == '>' )
                {
                p += 2;
                qOp= NE;
                }
        else
                {
                p++;
                qOp= LT;
                }
        qFoundSymbols |= OP_FND;

        break;
```

BEST AVAILABLE COPY

```
case '=':
                if( qFoundSymbols & OP_FND )
                        {
                        qFoundSymbols |= JUNK_FND;
                        break;
                        }

                if( *(p+1) == '>' )
                        {
                        p += 2;
                        qOp= GE;
                        }
                else if( *(p+1) == '<' )
                        {
                        p += 2;
                        qOp= LE;
                        }
                else
                        {
                        p++;
                        qOp= EQ;
                        }
                qFoundSymbols |= OP_FND;

                break;


        default :
                qFoundSymbols |= JUNK_FND;;
                break;
        } /* end switch */

    } /* end while */

if( ( qFoundSymbols & JUNK_FND ) ||
    !( qFoundSymbols & OP_FND)   ||
    !( qFoundSymbols & NUM_FND_1 ) ||
    !( qFoundSymbols & NUM_FND_2 )
    )
    scnScanError( "Improperly formatted (Q) command", "" );

/* analyze what was found, and do it */

switch( qOp )
    {
    case EQ:
            bJump= qNumber2 == qNumber1;
            break;
    case NE:
            bJump= qNumber2 != qNumber1;
            break;
    case GT:
            bJump= qNumber2 > qNumber1;
            break;
    case GE:
            bJump= qNumber2 >= qNumber1;
            break;
    case LT:
            bJump= qNumber2 < qNumber1;
            break;
    case LE:
            bJump= qNumber2 <= qNumber1;
            break;
    }

return( (BooleanT) bJump );
```

'an.c

BEST AVAILABLE COPY

```
        }
/**********************************************************************
**
        scnExecuteScan()
**********************************************************************
* */
BooleanT scnExecuteScan ( void )
        {
        char *p;
        static char buf[255];

        /*  remember where we are (for (!))  */
        pLastLine= pCurLine;

        /*  get the next line from the file  */
        p = scnNextCtlLine( &pCurLine, buf, sizeof( buf ) );
        if ( p == NULL ) return( FALSE );

        CurrentLine = p;

        /*  execute it  */
        return( conExecute( p ) );
        }


void scnShowString( char *string )
{
        CWindowPtr              tempWindowP;
        PixMapHandle    tempPixMapH;
        Int16T                  oldFont, oldSize, oldMode;
        Style                   oldFace;
        static                  Rect   r = { 470, 3, 480, 637 };

        /* save the current window */
        tempWindowP             = tglMyCWindow;
        tempPixMapH             = tglHCurPixMap;

        /* draw to the main screen */
        tglMyCWindow    = tglMainCWindow;
        tglHCurPixMap   = tglHMainPixMap;
        SetPort( (GrafPtr) tglMyCWindow );

        /* save the attributes of this text */
        oldFont = tglMainCWindow->txFont;
        oldSize = tglMainCWindow->txSize;
        oldMode = tglMainCWindow->txMode;
        oldFace = tglMainCWindow->txFace;

        /* set the proper attributes */
        TextFont( 3 );
        TextFace( normal );
        TextSize( 9 );
        TextMode( srcOr );

        /* draw the string */
        EraseRect( &r );
        MoveTo ( 5, 478 );
        drawstring ( string );

        /* reset the proper attributes */
        TextFont( oldFont );
        TextSize( oldSize );
        TextMode( oldMode );
        TextFace( oldFace );

        /* reset the current window */
        tglMyCWindow    = tempWindowP;
```

BEST AVAILABLE COPY

```
    tglHCurPixMap    = tempPixMapH;
    SetPort( (GrafPtr) tglMyCWindow );

}

void scnSwitchContext( void )
{
    char   context[255];

    GetItem( tglScanMenuH, TGL_CONTEXT_ITEM, &context );
    PtoCstr( context );

    if (!strcmp( context, "No Context" )) {
        scnContext = NoContext;
        SetItem( tglScanMenuH, TGL_CONTEXT_ITEM, "\pCurrent Context" );
    }
    else if (!strcmp( context, "Current Context" )) {
        scnContext = CurrentContext;
        SetItem( tglScanMenuH, TGL_CONTEXT_ITEM, "\pPast Context" );
    }
    else if (!strcmp( context, "Past Context" )) {
        scnContext = PastContext;
        SetItem( tglScanMenuH, TGL_CONTEXT_ITEM, "\pVariable Context" );
    }
    else if (!strcmp( context, "Variable Context" )) {
        scnContext = VariableContext;
        SetItem( tglScanMenuH, TGL_CONTEXT_ITEM, "\pNo Context" );
    }

    scnShowContext();
}

void scnShowContext( void )
{
    CWindowPtr          tempWindowP;
    PixMapHandle    tempPixMapH;
    Int16T              oldFont, oldSize, oldMode;
    Style           oldFace;
    static          Rect   r = { 0, 0, 450, 640 };
    Rect            rct;
    Int32T              i;
    Int32T              numLines, start;
    char            s[300];
    Int32T              thisLine;
    char            context[NUM_LINES_OF_DEBUG][DEBUG_LINE_LENGTH];
    char            savedChar;
    char            *pEnd;
    char            *pStart;

    if (scnContext == NoContext) {
        return;
    }

    /* save the current window */
    tempWindowP         = tglMyCWindow;
    tempPixMapH         = tglHCurPixMap;

    /* draw to the second screen */
    if (tglNumVisibleScreens == 2) {

        tglMyCWindow    = tglAltCWindow;
        tglHCurPixMap   = tglHAltPixMap;
    }

    else {

        tglMyCWindow    = tglMainCWindow;
        tglHCurPixMap   = tglHMainPixMap;
```

BEST AVAILABLE COPY

```
}

SetPort( (GrafPtr) tglMyCWindow );

/* save the attributes of this text */
oldFont = tglMainCWindow->txFont;
oldSize = tglMainCWindow->txSize;
oldMode = tglMainCWindow->txMode;
oldFace = tglMainCWindow->txFace;

/* set the proper attributes */
TextFont( 3 );
TextFace( normal );
TextSize( 9 );
TextMode( srcOr );

/*
 * show the NUM_LINES_OF_DEBUG lines around the current line
 */
if (scnContext == CurrentContext) {

        /*
         * back up NUM_LINES_OF_DEBUG / 2 lines in the file
         */
        thisLine = 0;
        pStart          = pCurLine;
        while (*pStart == '\r') pStart++;                /* skip '\r' characters *
        for (i = 0; i < NUM_LINES_OF_DEBUG / 2; i++) {
                while ((pStart >= pCtlFile) && (*pStart) != '\r') {
                        pStart--;
                }
                if (pStart >= pCtlFile) {
                        pStart--;
                        thisLine++;
                }
        }

        /*
         * get the current context
         */
        pStart          = pStart + 1;                                   /*
        for (i = 0; i < NUM_LINES_OF_DEBUG; i++) {
                pEnd = strpbrk( pStart, "\r\n" );               /* find next '\r'
                while ((*pStart == '\t') || (*pStart == '\t')) pStart++;

                savedChar = *pEnd;
                *pEnd = '\0';                                           /*
buffer */

                strncpy( context[i], pStart, DEBUG_LINE_LENGTH ); /* copy the lin
                context[i][DEBUG_LINE_LENGTH - 1] = '\0';   /* make sure the line
                *pEnd = savedChar;                                      /*
                pStart = pEnd + 1;                                      /*
        }

        EraseRect( &r );
        MoveTo( 5, 20 );
        TextFace( bold );
        TextSize( 10 );
        drawstring( "Current Context" );
        TextFace( normal );
        TextSize( 9 );
        for (i = 0; i < thisLine; i++) {
                MoveTo ( 25, 40 + 11 * i );
                drawstring( context[i] );
        }

        TGL_SETRECT( &rct, 319, 34, 324, 39 );
        RGBForeColor( &tglRgbBlack );
```

BEST AVAILABLE COPY

```
        PaintRect( &rct );
        MoveTo( 325, 40 );
        drawstring( context[thisLine] );

        for (i = thisLine + 1; i < NUM_LINES_OF_DEBUG && (i - thisLine < 35); i++) {
                MoveTo ( 325, 40 + 11 * (i - thisLine));
                drawstring( context[i] );
        }
}

/*
 * show the variables selected using cmd-k
 */
else if (scnContext == VariableContext) {

        EraseRect( &r );
        MoveTo( 430, 20 );
        TextFace( bold );
        TextSize( 10 );
        drawstring( "Variables" );
        TextFace( normal );
        TextSize( 9 );
        for (i = 0; i < 10; i++) {
                MoveTo ( 450, 40 + 11 * i );
                sprintf( s, "%ld:\t\"\%s\"", VariableList[i], varPtr( VariableList[i] ));
                drawstring ( s );
        }
}

/*
 * show the CON_MAX_HISTORY_LINES lines that we just executed
 */
else if (scnContext == PastContext) {

        EraseRect( &r );
        if (conHistorySpillOver) {
                start       = conCurrentHistoryLine + 1;
                numLines    = CON_MAX_HISTORY_LINES - 1;
        }
        else {
                start       = 0;
                numLines    = conCurrentHistoryLine;
        }
        MoveTo( 5, 20 );
        TextFace( bold );
        TextSize( 10 );
        drawstring( "Last 70 lines executed" );
        TextFace( normal );
        TextSize( 9 );
        for (i = 0; i < numLines; i++) {
                if (i < CON_MAX_HISTORY_LINES / 2) {
                        MoveTo ( 25, 40 + 11 * i );
                }
                else {
                        MoveTo ( 325, 40 + 11 * (i - (CON_MAX_HISTORY_LINES / 2)));
                }
                drawstring ( (*conHistoryP)[(start + i) % CON_MAX_HISTORY_LINES]
        }
}

/* reset the proper attributes */
TextFont( oldFont );
TextSize( oldSize );
TextMode( oldMode );
TextFace( oldFace );

/* reset the current window */
tglMyCWindow     = tempWindowP;
```

```
        tglHCurPixMap       = tempPixMapH;
        SetPort( (GrafPtr) tglMyCWindow );

}
```

BEST AVAILABLE COPY

```
void scnShowCurrentLine( void )
{
        char  line[255];

        if (strstr( CurrentLine, "(M)" )) {
                sprintf( line, "Waiting for click" );
        }
        else {
                sprintf( line, "Command: %s", CurrentLine );
        }
        scnShowString( line );

}

void scnShowNextLine( Boolean showContext )
{
        char  line[256];
        char  savedChar;
        char  *pEnd;
        char  *pStart;
        Int32T       i;

        /*
         * collect the line
         */
        If ((pCurLine == NULL) || (pCurLine[0] == '\0')) {
                strcpy( line, "No current line" );
                scnShowString( line );
                return;
        }
        else {
                pStart        = pCurLine;                              /* point to
                while (*pStart == '\r') pStart++;               /* find start of real strir
                pEnd  = strpbrk( pStart, "\r" );            /* find end of real string */
                savedChar = *pEnd;                                      /* save enc
                *pEnd = '\0';                                            /* tempora

                if (strstr( pStart, "(M)" )) {                 /* is this an 'M' commar
                        sprintf( line, "Waiting for click" );
                }

                else {

                        strcpy( line, "Command: " );             /* no it's not an 'M' cor
                        strncpy( &line[9], pStart, 245 );      /* copy the line from the buff
                        line[255] = '\0';                                /* make sure the
                }

                *pEnd = savedChar;                                      /* restore t
        }


                scnShowString( line );
        if (showContext) {
                scnShowContext();
        }
}

/************************************************************************
**
        scnExecuteOldLine()
```

```
**********************************************************************
* */
void scnExecuteOldLine ( char *lineBuffer )
    {
    Int32T          rc;
    char        *pC;
    Int32UT         RequiredFields, BadFields;
    char        result[2000]; /* result of vcmCmd */
    Handle          hSnip;
    Rect        r;
    BooleanT    cursorWasOff;

    rc = scnLexScan( lineBuffer );

    if (rc == -1 )
        {
        }
    else if( rc != 1 ) /* unexpected rc */
        {
        scnScanError( "Unexpected command format in control file", "" );
        }
    else if( CommandRecord.DefinedFields & sCOMMAND ) /* expected return */
            {
            cursorWasOff= !tglCursorVisible;

            switch( CommandRecord.Command )
                {


                case 'A': /* ACCEPT INPUT */
                        RequiredFields= sCOMMAND | sVARNUM;
                        BadFields= sTOUCH | sEVENTNAME| sALTSTRING

                        if( ((CommandRecord.DefinedFields & RequiredFi
                            ((CommandRecord.DefinedFields & BadFiel

                         )
                            {
                            scnScanError( "Improperly formatted (A) cc
                            break;
                            }
                        else
                            {

                            /* if there is no string for the assignment, th
                             * assume there is a variable to copy */
                            if( !(CommandRecord.DefinedFields & sSTRI
                                {
                                strcpy( CommandRecord.Str1, varPtr(
CommandRecord.VarNum[0]) );
                                }

                            /* if there's no target position, then assume
                             * assignment is supposed to be from the str
                            if( !(CommandRecord.DefinedFields & sTAR
                                {
                                strcpy( varPtr( CommandRecord.VarN
CommandRecord.Str1 );
                                }

                            /* if there is a target position, but no numbe
                             * indicate the number of characters we're l
                             * then there's an error */
                            else if( !(CommandRecord.DefinedFields & s
                                {
                                scnScanError( "Improperly formatted
                                break;
                                }


scnScan.c
```

BEST AVAILABLE COPY

BEST AVAILABLE COPY

```
                        /* finally, if there is a target and a numbe
                         * enter edit mode */
                        else
                                {
                                tglEditGopher->StartHandler();
                                edtEditLen= CommandRecord.Numt
                                tglEditGopher->EditSetup(
                                        CommandRecord.Target,
                                        CommandRecord.Str1, FALSE,
                                        CommandRecord.VarNum[0],
                                        CommandRecord.b2Screen, ' '
                                        FALSE, 0, 0, FALSE, FALSE, '\0'

                                }
                        }
                break;

            case 'B': /* BEGIN EVENT  (syntax check only -- labels ar
startup)*/
                RequiredFields= sCOMMAND | sEVENTNAME;
                BadFields= sTOUCH | sNUMBER | sSTRING | sTARC
sGARBAGE;

                if( ((CommandRecord.DefinedFields & RequiredF
                        ((CommandRecord.DefinedFields & BadFie
                  )
                        {
                        scnScanError( "Improperly formatted (B) c
                        break;
                        }
                else
                        {
                        tchBeginEvent();
FROM (:) */
                        }
                break;


        case 'C':       /* control file comment */
                break;


        case 'D': /* Dissolve snip (and special effects) */
                RequiredFields= sCOMMAND;
                BadFields= sTOUCH | sEVENTNAME | sGARBAGE
                tglCursorOnOff( TGL_OFF );

                if( ((CommandRecord.DefinedFields & Required
                        ((CommandRecord.DefinedFields & BadFi
                  )
                        {
                        scnScanError( "Improperly formatted (D)
                        break;
                        }
                else
                        {
                        char    name[34];

                        if (CommandRecord.DefinedFields & sSTF
                                if (CommandRecord.DefinedFields
                                        scnScanError( "Can't have bc
a (D) command", "" );
                                }
                                else {
                                        strcpy( name, CommandRec
```

BEST AVAILABLE COPY

```
                hSnip = libFindPicPtr( name, TF
            }
        }
        else if (CommandRecord.DefinedFields & s'
            strcpy( name, varPtr( CommandRecc
            hSnip = libFindPicPtr( name, TRUE );
        }
        else {
            scnScanError( "No snip named in (D)
        }
        if( hSnip == NULL)
            {
            scnScanError( "Image not in library".
            break;
            };

        if( !( CommandRecord.DefinedFields & sNU
            CommandRecord.Number= 0;


        {
        Point *pTgt;

        if( !( CommandRecord.DefinedFields & sTA
            pTgt= NULL;
        else
            pTgt= &CommandRecord.Target;

        for( scrScreenSet(0, CommandRecord.b2Scr
           scrScreenSet(1, CommandRecord.b2Scre
            {
            if (tglSpeedup) CommandRecord.Nu
CommandRecord.Number < 7 ? 0 : CommandRecord.Number == 8 ? 108 : 9;
            switch( CommandRecord.Number )
                {
                case 0:
                    grfDrawPic( hSnip, pTg'
                    break;
                case 1:
                    grfWipeDnPic( hSnip, p'
                    break;
                case 2:
                    grfWipeUpPic( hSnip, p'
                    break;
                case 4:
                    /*      grfSmear( hSnip,
*/
                    /*      sprintf( varPtr(
CommandRecord.VarNum[0]) ,"%ld,%ld", 100, 100 );    */
                    break;
                case 5:
                    grfWipeLeftPic( hSnip, :
                    break;
                case 6:
                    grfWipeRightPic( hSnip
                    break;
                case 7:
                    grfDissolvePic( hSnip, p
                    break;
                case 8:
                    grfFadeout( hSnip, pTg
                    break;
                case 108:
                    grfFastFadeout( hSnip,
                    break;
                case 9:
                    grfMDrawPic( hSnip, p'
                    break;
```

```
                        default:
                                grfDissolvePic( hSnip, p
                                break;
                        }
                }
                HPurge( hSnip );
        }
        }

    if( !cursorWasOff )
        tglCursorOnOff( TGL_ON );

    break;

case 'E': /* END  EVENT  (syntax check only) */
    RequiredFields= sCOMMAND ;
    BadFields= sTOUCH | sEVENTNAME| sNUMBER | sS
                sTARGET | sALTSTRING | sGARBAG

    if( ((CommandRecord.DefinedFields & RequiredFi
        ((CommandRecord.DefinedFields & BadFiel

     )
        {
        scnScanError( "Improperly formatted (E) co
        break;
        }
    else
        {
        tchEndEvent();
        }
    break;

case 'F': /* fade to white */
    RequiredFields= sCOMMAND | sSTRING;
    BadFields= sTOUCH | sEVENTNAME | sNUMBER | s
    tglCursorOnOff( TGL_OFF );

    if( ((CommandRecord.DefinedFields & RequiredFie
        ((CommandRecord.DefinedFields & BadFielc

     )
        {
        scnScanError( "Improperly formatted (F) cor
        break;
        }
    else
        {
        hSnip= libFindPicPtr( CommandRecord.Str1,
        if( hSnip == NULL)
            {
            scnScanError( "Image not in library",
            break;
            }

        if( CommandRecord.DefinedFields & sTARGI
            for( scrScreenSet(0, CommandRecord.l
                scrScreenSet(1, CommandRecord.b
                    grfFadeout( hSnip, &Command
        else
            for( scrScreenSet(0, CommandRecord.l
                scrScreenSet(1, CommandRecord.b
                    grfFadeout( hSnip, NULL, 0 );

        HPurge( hSnip );
        }

    if( !cursorWasOff )
```

```
            tglCursorOnOff( TGL_ON );

        break;

    case 'G':   /* go execute a subroutine */
        RequiredFields= sCOMMAND;
        BadFields= sTOUCH | sNUMBER | sSTRING | sTAR(
sALTSTRING;

        If( ((CommandRecord.DefinedFields & RequiredF
            ((CommandRecord.DefinedFields & BadFie

         )
            {
            scnScanError( "Improperly formatted (G) c
            break;
            }
        else
            {
            char *pLine, *pLabel;

            If( CommandRecord.DefinedFields & sEVEN
                {
                pLabel= CommandRecord.EventNan
                }
            else if( CommandRecord.DefinedFields & s
                {
                pLabel= varPtr( CommandRecord.Va
                if( *pLabel == ':' )
                    pLabel++;        /* move pa:
                }
            else
                {
                /*  remove all (G) addresses from sta
                datPtrInit( &SubStack );
                break;
                }


            /* blank labels just fall through, others caus
            while( *pLabel == ' ' ) pLabel++;
            if( pLabel )
                {
                pLine= lblLookupLabel( pLabel );
                if( pLine == NULL )
                    {
                    scnScanError(  "Unknown targe
CommandRecord.EventName );

                    break;
                    }
                else
                    {
                    scnPushSub( pCurLine );
                    pCurLine= pLine;
                    }
                }
            }
        break;

    case 'H':   /* select color, font, size for prompted text */
        RequiredFields= sCOMMAND | sNUMBER;
        BadFields= sTOUCH | sEVENTNAME | sSTRING | sTA
sGARBAGE | sVARNUM;

        If( ((CommandRecord.DefinedFields & RequiredFie
            ((CommandRecord.DefinedFields & BadField

         )
```

BEST AVAILABLE COPY

```
                {
                scnScanError( "Improperly formatted (H) cc
                break;
                }
        else
                {
                if (!scrSetHue( CommandRecord.Number, &
                        &tglTextSize, &tglTextFace, &tglText
                        &tglTextBGColor )) {
                        scnScanError( "Unexpected number ir
                }
        }
        break;

case 'I':       /* INTERCHANGE color translation */
        RequiredFields= sCOMMAND | sVARNUM;
        BadFields=  sEVENTNAME |  sALTSTRING | sGARB/
        tglCursorOnOff( TGL_OFF );

        If( ((CommandRecord.DefinedFields & RequiredFi(
                ((CommandRecord.DefinedFields & BadFiel(

         )
                {
                scnScanError( "Improperly formatted (I) cor
                break;
                }
        else
                {

        /* 1st FORMAT: (I) <indexNum> "<snipname>" */
        /* 2nd FORMAT: (I) <indexNum> # t, l, b, r  */
        /* 3rd FORMAT: (I) <indexNum> "<snipname>" @

                /* check for 3rd format: rect only */
                if ( CommandRecord.DefinedFields & sTOU
                        {
                        r= CommandRecord.Touch;
                        }

                else            /* 2nd or 3rd formats, with nar
                        {
                        /* first, get the snip pointer */
                        hSnip = libFindPicPtr( CommandRecoı
                        if (hSnip == NULL)
                                {
                                scnScanError( "Image not in lit
CommandRecord.Str1 );
                                break;
                                }

                        /* now get the rect */
                        libGetPicRect( hSnip, &r );

                        /* handle 3rd type of format, drawn (
                        if ( CommandRecord.DefinedFields &
                                {
                                r.bottom += CommandRecord.
                                r.right += CommandRecord.Tar
                                r.top= CommandRecord.Targe
                                r.left= CommandRecord.Targe
                                }
                        }

                if ( CommandRecord.bShadow )
                        {
                        for( scrScreenSet(0, CommandRecord.
CommandRecord.b2Screen); )
```

BEST AVAILABLE COPY

```
                                grfAutoShadow ( &r , varVal(
CommandRecord.VarNum[0]) );

                        if( !cursorWasOff )
                                tglCursorOnOff( TGL_ON );

                        break;
                        }

                /* parse the variable line for I pairs */
                {
                char pairList[100]; /* copy to tokenize */
                char *c;
                Int32T oldIndex, newIndex;

                strcpy( pairList, varPtr( CommandRecord.V
                c = strtok( pairList, " ");
                while ( c != NULL )
                        {               /* format: "(123,1
                        oldIndex = strtol( ++c, NULL, 0);
                        c = strchr( c, ',');
                        newIndex = strtol( ++c, NULL, 0);

                        if ( CommandRecord.bReverse )
                                for( scrScreenSet(0, Command
scrScreenSet(1, CommandRecord.b2Screen); )
                                        grfInterchange( newInd
invert pairs */
                        else
                                for( scrScreenSet(0, Command
scrScreenSet(1, CommandRecord.b2Screen); )
                                        grfInterchange( oldInde
regular style */

                        c = strtok( NULL, " ");
                        }
                        CommandRecord.EventName[0] = '\
                }
        }

        if( !cursorWasOff )
                tglCursorOnOff( TGL_ON );

        break;


case 'J': /* JUMP */
        RequiredFields= sCOMMAND;
        BadFields= sTOUCH | sNUMBER | sSTRING | sTAR(
sALTSTRING;

        if( ((CommandRecord.DefinedFields & RequiredF
                ((CommandRecord.DefinedFields & BadFie

         )
                {
                scnScanError( "Improperly formatted (J) c
                break;
                }
        else
                {
                char *pLine, *pLabel;

                if( CommandRecord.DefinedFields & sEVE
                        {
                        pLabel= CommandRecord.EventNa
                        }
                else if( CommandRecord.DefinedFields &
```

```
                {
                pLabel= varPtr( CommandRecord.Va
                if( *pLabel == ':' )
                        pLabel++;           /* move pas
                }
        else
                {
                scnScanError( "No target specified in
                break;
                }


        /* blank labels just fall through, others cau:
        while( *pLabel == ' ' ) pLabel++;
        if( *pLabel )
                {
                pLine= lblLookupLabel( pLabel );
                if( pLine == NULL )
                        {

                        scnScanError( "Unknown targe
                        break;
                        }
                else
                        pCurLine= pLine;
                }
        }
    break;

case 'K': /* KEY ACTION DEFINITION */
    RequiredFields= sCOMMAND;
    BadFields= sSTRING | sGARBAGE | sALTSTRING | s
sTOUCH;

    if( ((CommandRecord.DefinedFields & RequiredFi
        ((CommandRecord.DefinedFields & BadFie

     )
        {
        scnScanError( "Improperly formatted (K) c
        break;
        }
    else
        {
        char *pLine;

        pLine= NULL;
        if( CommandRecord.DefinedFields & sEVEN
                {
                pLine= lblLookupLabel( CommandR
                if( pLine == NULL )
                        {

                        scnScanError( "Unknown targ
CommandRecord.EventName );

                        break;
                        }
                }

        if( CommandRecord.DefinedFields & sNUN
          {
          tchKeyDef( CommandRecord.Number &
          }
        else /* naked (K) clears all definitions */
          {
          tchClrKeyDefs();
          }
```

nScan.c

BEST AVAILABLE COPY

```
			}
			break;

		case 'L': /* load library */

			RequiredFields= sCOMMAND | sSTRING;
			BadFields= sTARGET | sTOUCH | sEVENTNAME | s
sGARBAGE;

			if( ((CommandRecord.DefinedFields & RequiredF
				((CommandRecord.DefinedFields & BadFi

			)
				{
				scnScanError( "Improperly formatted (L) 
				break;
				}
			else
				{
					libLoadLib( CommandRecord.Str1,
				}
			break;

		case 'M':	/* wait for mouse click */
			RequiredFields= sCOMMAND;
			BadFields= sTOUCH |  sSTRING | sTARGET | sAL

			if( ((CommandRecord.DefinedFields & Require
				((CommandRecord.DefinedFields & Bad

			)
				{
				scnScanError( "Improperly formatted (N
				break;
				}
			else
				{
				Int32T fieldSet;

				fieldSet= sEVENTNAME | sNUMBER;
				if( (CommandRecord.DefinedFields & fi
					{

					/*
					 * timeout was specified
					 */
					pTimeoutReturn = pLastLine;
					bTimeoutActive = TRUE;
					tglTimedClickGopher->StartHan
					tglTimedClickGopher->SetTime
CommandRecord.EventName, CommandRecord.Number );
					}

				else if( CommandRecord.DefinedField
					{
					scnScanError( "Timeout or Even
statement", "" );
					break;
					}

				else
					{
					tglClickGopher->StartHandler(
					}
				}
			break;
		case 'N':	/* zoom frame from one snip to another *
```

BEST AVAILABLE COPY

```
        RequiredFields= sCOMMAND | sSTRING | sALTSTR
sNUMBER;
        BadFields= sTOUCH | sEVENTNAME | sTARGET | s(

        tglCursorOnOff( TGL_OFF );

        if( ((CommandRecord.DefinedFields & RequiredF
            ((CommandRecord.DefinedFields & BadFie

         )
            {
            scnScanError( "Improperly formatted (N) c
            break;
            }
        else
            {
            Rect rFrom, rTo;

            hSnip= libFindPicPtr( CommandRecord.Str
            if( hSnip == NULL)
                {
                scnScanError( "Image not in library
                break;
                };
            libGetPicRect( hSnip, &rFrom );

            hSnip= libFindPicPtr( CommandRecord.St
            if( hSnip == NULL)
                {
                scnScanError( "Image not in librar
                break;
                };
            libGetPicRect( hSnip, &rTo );

            scrExplodeOrCrush( &rFrom, &rTo );

            }

        if( !cursorWasOff )
            tglCursorOnOff( TGL_ON );

        break;


    case 'O': /* Overlay. Same as 'S', except white pixels aren't
        RequiredFields= sCOMMAND | sSTRING;
        BadFields= sTOUCH | sEVENTNAME | sNUMBE
        tglCursorOnOff( TGL_OFF );

        if( ((CommandRecord.DefinedFields & Require
            ((CommandRecord.DefinedFields & Bac

         )
            {
            scnScanError( "Improperly formatted ((
            break;
            }
        else
            {
            hSnip= libFindPicPtr( CommandRecord
            if( hSnip == NULL)
                {
                scnScanError( "Image not in libr
                break;
                };

            if( CommandRecord.DefinedFields & s
                for( scrScreenSet(0, CommandR
                     scrScreenSet(1, CommandRe
```

```
                                grfMDrawPic( hSnip, &Commar
                        else
                                for( scrScreenSet(0, CommandRecord.
CommandRecord.b2Screen); )
                                        grfMDrawPic( hSnip, NULL, 0 );

                        HPurge( hSnip );
                        }

                if( !cursorWasOff )
                        tglCursorOnOff( TGL_ON );

                break;

        case 'P':       /* PRINT COMMAND */
                RequiredFields= sCOMMAND;
                BadFields= sTOUCH | sEVENTNAME| sALTSTRING | sGAR

                if( ((CommandRecord.DefinedFields & RequiredFields) !
                        ((CommandRecord.DefinedFields & BadFields) !=

                 )
                        {
                        scnScanError( "Improperly formatted (P) comma
                        break;
                        }

                /*********************************************
                 * (P) 1 says to start a new output page
                 *********************************************
                else if(( CommandRecord.DefinedFields & sNUMBER )
                        (CommandRecord.Number == 1)) {
                        pcmPrint( pcmSTARTPAGE, "" );
                }

                /*********************************************
                 * (P) 2 says to end an output page
                 *********************************************
                else if(( CommandRecord.DefinedFields & sNUMBER )
                        (CommandRecord.Number == 2)) {
                        pcmPrint( pcmENDPAGE, "" );
                }

                /*********************************************
                 * otherwise print whatever is in the string
                 *********************************************
                else {
                        vcmCmd( &CommandRecord, result );
                        pC = result;
                        pcmPrint( pcmPOSTSCRIPT, pC );
                }
                break;

        case 'Q':       /* homegrown comparison */

                        RequiredFields= sCOMMAND | sEVENTNAME |
                        BadFields= sTOUCH | sTARGET | sALTSTRING | :

                        if( ((CommandRecord.DefinedFields & Require
                                ((CommandRecord.DefinedFields & Bad:

                         )
                                {
                                scnScanError( "Improperly formatted (C
                                break;
                                }
                        else if ( scnEvaluateBoolean( CommandRecor
                                {
```

```
                char *pLine;

                pLine = lblLookupLabel( CommandRecord.
                if ( pLine == NULL )
                      scnScanError( "Unknown target: ",
CommandRecord.EventName );
                else pCurLine = pLine;
                }
          break;

     case 'R': /* return from subroutine */
          RequiredFields= sCOMMAND;
          BadFields= sTOUCH | sEVENTNAME | sNUMBER |
sSTRING | sGARBAGE;

          if( ((CommandRecord.DefinedFields & RequiredF
                ((CommandRecord.DefinedFields & BadFi

           )
                {
                scnScanError( "Improperly formatted (R)
                break;
                }
          else
                {
                char *pLine;

                pLine= scnPopSub();
                if( pLine == NULL )
                      {

                      scnScanError( "Subroutine nesting
                      break;
                      }
                else
                      pCurLine= pLine;
                }
          break;

     case 'S': /* show snip */
          RequiredFields= sCOMMAND | sSTRING;
          BadFields= sTOUCH | sEVENTNAME | sNUMBEF
          tglCursorOnOff( TGL_OFF );

          if( ((CommandRecord.DefinedFields & Require
                ((CommandRecord.DefinedFields & Bad

           )
                {
                scnScanError( "Improperly formatted (S
                break;
                }
          else
                {
                hSnip= libFindPicPtr( CommandRecord.
                if( hSnip == NULL)
                      {
                      scnScanError( "Image not in libr
                      break;
                      }

                if( CommandRecord.DefinedFields & s
                      for( scrScreenSet(0, CommandRe
CommandRecord.b2Screen); )

                            grfDrawPic( hSnip, &Com
                else
                      for( scrScreenSet(0, CommandR
CommandRecord.b2Screen); )
```

BEST AVAILABLE COPY

```
                        grfDrawPic( hSnip, NULL );

                HPurge( hSnip );
                }

        if( !cursorWasOff )
                tglCursorOnOff( TGL_ON );

        break;

case 'T': /* TOUCH AREA DEFINITION */
        RequiredFields= sCOMMAND;
        BadFields= sNUMBER | sGARBAGE | sALTSTRING;

        if( ((CommandRecord.DefinedFields & RequiredFie
                ((CommandRecord.DefinedFields & BadFiel

         )
                {
                scnScanError( "Improperly formatted (T) co
                break;
                }
        else
                {

                if( CommandRecord.DefinedFields & sEVEN
                        {
                        if( NULL== lblLookupLabel( Commar
                                {

                                scnScanError( "Unknown targe
CommandRecord.EventName );

                                break;
                                }


                        if( CommandRecord.DefinedFields &
                                {
                                r= CommandRecord.Touch;
                                }
                        else if( CommandRecord.DefinedFiel
                                {
                                hSnip= libFindPicPtr( Comman
                                if( hSnip == NULL)
                                        {
                                        scnScanError( "Image nc
CommandRecord.Str1 );

                                        break;
                                        };
                                libGetPicRect( hSnip, &r );
                                }
                        else
                                {
                                scnScanError( "No Touch area
command", "" );

                                }

                        if( CommandRecord.DefinedFields &
                                {
                                r.bottom += CommandRecord
                                r.right += CommandRecord.Ta
                                r.top= CommandRecord.Targ
                                r.left= CommandRecord.Targe
                                }

                        /* enter touch definition into table *
                        if( CommandRecord.DefinedFields &
                                {
```

BEST AVAILABLE COPY

```
                        if( VAR_MAXVAR <= Commar
                            {
                            sprintf( result, "Variable
CommandRecord.VarNum[0] );
                            scnScanError( result, "" )
                            break;
                            }
                        else
                            tchTouchDef( &r, varPtr
CommandRecord.VarNum[0]) , CommandRecord.EventName );
                        }
                    else
                        tchTouchDef( &r, NULL , Com

                    }
                else if ( CommandRecord.DefinedFields ==
                    {
                    tchClrTouchAreas();
                    }
                else
                    {
                    scnScanError( "Improperly formattec
                    break;
                    }
                }
            break;

        case 'U':
            RequiredFields= sCOMMAND;
            BadFields= sVARNUM | sALTSTRING | sGARBAGE
            tglCursorOnOff( TGL_OFF );

            if( ((CommandRecord.DefinedFields & RequiredF
                ((CommandRecord.DefinedFields & BadFie
             )
                {
                scnScanError( "Improperly formatted (U) c
                break;
                }
            else
                {

                if( CommandRecord.DefinedFields & (sTOl
anything defined? */
                    {
                    if( CommandRecord.DefinedFields &
                        {
                        r= CommandRecord.Touch;
                        }
                    else if( CommandRecord.DefinedFie
                        {
                        hSnip= libFindPicPtr( Comma
                        if( hSnip == NULL)
                            {
                            scnScanError( "Image r
CommandRecord.Str1 );
                            break;
                            }
                        libGetPicRect( hSnip, &r );
                        }
                    else
                        {
                        scnScanError( "No area speci
                        }

                    if( CommandRecord.DefinedFields
                        {
```

```
                                        r.bottom += CommandRecord.`
                                        r.right += CommandRecord.Tar
                                        r.top= CommandRecord.Targe'
                                        r.left= CommandRecord.Target
                                        }

                                if( !(CommandRecord.DefinedFields &
                                        CommandRecord.Number= 0;

                                for( scrScreenSet(0, CommandRecord
                                    scrScreenSet(1, CommandRecord.b
                                        {
                                        if (tglSpeedup) CommandReco
CommandRecord.Number < 7 ? 0 : CommandRecord.Number == 8 ? 108 : 9;
                                        switch( CommandRecord.Numl
                                        {
                                        case 0:
                                                grfAsmDrawDestSrc( tgl
tglPSavePort->portPixMap, NULL );

                                                break;
                                        case 1:
                                                grfWipeDnDestSrc( tglH
tglPSavePort->portPixMap, NULL, 100 );

                                                break;
                                        case 2:
                                                grfWipeUpDestSrc( tglH
tglPSavePort->portPixMap, NULL, 100 );

                                                break;
                                        case 4:
                                                /* Smear( hSnip, hFullPic
                                                /* sprintf( varPtr( Comr
,"%ld,%ld", 100, 100 ); */

                                                break;
                                        case 5:
                                                grfWipeLeftDestSrc( tgl
tglPSavePort->portPixMap, NULL, 100 );

                                                break;
                                        case 6:
                                                grfWipeRightDestSrc( t
tglPSavePort->portPixMap, NULL, 100 );

                                                break;
                                        case 7:
                                                grfDissolveDestSrc( tglH
tglPSavePort->portPixMap, NULL, 0 );

                                                break;
                                        case 8:
                                                grfFadeoutDestSrc( tglH
tglPSavePort->portPixMap, NULL, 0, FALSE );

                                                break;
                                        case 108:
                                                grfFadeoutDestSrc( tglH
tglPSavePort->portPixMap, NULL, 0, TRUE );

                                                break;
                                        case 9:
                                                grfMDrawDestSrc( tglH
tglPSavePort->portPixMap, NULL, 0 );

                                                break;
                                        }
                                }
                        }
                        }
                if( !cursorWasOff )
                        tglCursorOnOff( TGL_ON );

                break;

        case 'V': /* VIEW TEXT */
                RequiredFields= sCOMMAND | sTARGET;
```

```
BadFields= sTOUCH | sEVENTNAME| sALTSTRING |
tglCursorOnOff( TGL_OFF );

if( ((CommandRecord.DefinedFields & RequiredFi
      ((CommandRecord.DefinedFields & BadFiel

 )
      {
      scnScanError( "Improperly formatted (V) cc
      break;
      }
else
      {
      if( CommandRecord.DefinedFields & sSTRI
            {
            vcmCmd( &CommandRecord, result
            pC = result;
            }
      else if( ( CommandRecord.DefinedFields &
                  ( CommandRecord.VarNum[
                  )
            pC= varPtr(CommandRecord.VarNu
      else
       {
       scnScanError( "Nothing to View in (V) co
       break;
       }


       for( scrScreenSet(0, CommandRecord.b2S
CommandRecord.b2Screen); )

            {
            char *pCC;
            FontInfo  info;

            RGBForeColor( &tglTextFGColor );
            RGBBackColor( &tglTextBGColor );
            TextFont( tglTextFont );
            TextSize( tglTextSize );
            TextFace( tglTextFace );

            GetFontInfo( &info );

            if( CommandRecord.DefinedFields
before write */
                  {
                  Rect EditRect;

                  EditRect.top= CommandRecc
                  EditRect.left= CommandRecc
same as TEdit */
                  EditRect.bottom= EditRect.t
info.descent + info.leading;
                  EditRect.right= EditRect.left
                                    (Commar
info.widMax) * 0.6;
                  EraseRect( &EditRect );
                  }

            pCC= pC;
            while( pC )
                  {
                  pCC= strchr( pC, '^' );
                  if( pCC != NULL)
                        {
                        *pCC= '\0';
                        scrOurDrawAt( pC, C
CommandRecord.Target.v );


'cnScan.c
```

BEST AVAILABLE COPY

```
                                        *pCC= '^';
                                        pC= 1 + pCC;
                                        CommandRecord.Target.
info.descent + info.leading;
                                        }
                                    else
                                        {
                                        scrOurDrawAt( pC, Comi
CommandRecord.Target.v );

                                        if( !cursorWasOff )
                                            tglCursorOnOff( T
                                        break;
                                        }
                                    }
                            RGBForeColor( &tglRgbBlack );
                            RGBBackColor( &tglRgbWhite );
                            }

                        }

                    if( !cursorWasOff )
                        tglCursorOnOff( TGL_ON );

                    break;

            case 'W':   /* time til next picture */
                    RequiredFields= sCOMMAND + sNUMBER;
                    BadFields= sTOUCH | sEVENTNAME | sSTRING | sTA
sGARBAGE;

                    if( ((CommandRecord.DefinedFields & RequiredFie
                        ((CommandRecord.DefinedFields & BadFiel

                     )
                        {
                        scnScanError( "Improperly formatted (W) cc
                        break;
                        }
                    else
                        {
                            tglWaitGopher->StartHandler();
                            tglWaitGopher->SetTimeout( Comma

                        }
                    break;

            case 'X': /* WINDOW SAVE/RESTORE */
                    RequiredFields= sCOMMAND;
                    BadFields= sALTSTRING | sGARBAGE | sEVENTNAM
                    tglCursorOnOff( TGL_OFF );

                    if( ((CommandRecord.DefinedFields & RequiredFie
                        ((CommandRecord.DefinedFields & BadFiel

                     )
                        {
                        scnScanError( "Improperly formatted (X) co
                        break;
                        }
                    else
                        {
                        char *pTarget;
                        CGrafPtr portSave;

anything defined? */    if( CommandRecord.DefinedFields & (sTOU
```

```
{ /* window save */
if( CommandRecord.DefinedFields &
        {
        r= CommandRecord.Touch;
        }
else if( CommandRecord.DefinedFielc
        {
        hSnip= libFindPicPtr( Comman(
        if( hSnip == NULL)
                {
                scnScanError( "Image nc
CommandRecord.Str1 );
                break;
                };
        libGetPicRect( hSnip, &r );
        }
else
        {
        scnScanError( "No Touch area :
command", "" );
        }

if( CommandRecord.DefinedFields &
        {
        r.bottom += CommandRecord
        r.right += CommandRecord.Ta
        r.top= CommandRecord.Targe
        r.left= CommandRecord.Targe
        pTarget= (char*) &CommandR
        }
else
        {
        pTarget= NULL;
        }

if ( CommandRecord.bShadow )
        {
        r.right += varVal ( CommandF
        r.bottom += varVal ( Commar
        }

for( scrScreenSet(0, CommandRecorc
CommandRecord.b2Screen); )
        {
        portSave= snpSaveWindow3(
        if( tglMyCWindow == tglMain
                datPtrPush( &mainXSta(
        else
                datPtrPush( &altXStack,
        }

/* save the touch areas underneath
tchPushTouches( &r );
}
else    /* restore window */
{

if( !(CommandRecord.DefinedFields
   CommandRecord.Number= 0;

for( scrScreenSet(0, CommandRecor
CommandRecord.b2Screen); )
        {
        if( tglMyCWindow == tglMair
                portSave= datPtrPop( &
        else
                portSave= datPtrPop( &
```

BEST AVAILABLE COPY

```
                        if( portSave )
                          snpRestoreWindow3( Comm
portSave );
                        }

                  /*  restore the touch areas underneat
                  tchPopTouches();
                  }
            }

      if( !cursorWasOff )
            tglCursorOnOff( TGL_ON );

      break;

case 'Y':   /* special routines, e.g. compare bar, asset total
      RequiredFields= sCOMMAND | sNUMBER ;
      BadFields= sTOUCH | sALTSTRING | sGARBAGE;
      tglCursorOnOff( TGL_OFF );


      if( ((CommandRecord.DefinedFields & RequiredF
            ((CommandRecord.DefinedFields & BadFi

       )
            {
            scnScanError( "Improperly formatted (Y)
            break;
            }
      else
            {

            /*
             * clear out any old error code that we m
             */
            varSetL( vErrorFlag, 0 );

            /* assume we want to go on (may be ch
            switch( CommandRecord.Number )
                  {
                  case 10:    /* init stock table anc
                        bndReinitialize();
                        stkReinitialize();
                        break;

                  case 20:    /* input massage anc
                        brdCalcAT20();
                        break;

                  case 24:    /* recalc slush only fc
                        stkRecalcSlush();
                        break;

                  case 25:    /* recalc slush only f
                        bndRecalcSlush();
                        break;

                  case 26:    /* recalc stocks but c
                        stkRecalcStock();
                        break;

                  case 27:    /* recalc bonds but
                        bndRecalcBond();
                        break;

                  case 32:
                        brdRecalcBroad( 0 );
                        break;
```

```
case 33:
        brdRecalcBroad( 1 );
        break;

case 34:
        brdRecalcBroad( 2 );
        break;

case 35:
        /* doesn't do any direct displa
        atfMortgageUFF();
        break;

case 36:
        for( scrScreenSet(0, Commanc
scrScreenSet(1, CommandRecord.b2Screen); )
                atfCollegeUFF();
        break;

case 40:        /* allocation algorithm
        stkPickGrowth();
        break;

case 41:        /* growth card detail l
        stkRecalcStock();
        for( scrScreenSet(0, Comman
scrScreenSet(1, CommandRecord.b2Screen); )
                stkShowStockCard( FA
        break;

case 42:        /* growth card interm
        stkRecalcStock();
        for( scrScreenSet(0, Comman
scrScreenSet(1, CommandRecord.b2Screen); )
                stkShowStockCard( TR
        break;

case 43:        /* select current stock
        stkSetCurrentStock( FALSE );
        break;

case 44:        /* change the number
stock */
        for( scrScreenSet(0, Commar
scrScreenSet(1, CommandRecord.b2Screen); ) {
                stkNewNumShares();
        }
        break;

case 45:        /* change the status c
        stkChangeStatus();
        break;

case 46:        /* set up buylist */
        stkSetupBuyList();
        break;

case 47:        /* draw a page of the
        for( scrScreenSet(0, Comma
scrScreenSet(1, CommandRecord.b2Screen); ) {
                stkDrawBuyList();
        }
        break;
```

scnScan.c

BEST AVAILABLE COPY

```
case 48:    /* select current stock in
        stkSetCurrentStock( TRUE );
        break;

case 49:    /* recalculate the IMRA
        stkRecalcStock();
        stkRecalcIMRA();
        break;

case 50:    /* allocation algorithm
        bndPickBond();
        break;

case 51:    /* income card detail le\
        bndRecalcBond();
        for( scrScreenSet(0, Command
scrScreenSet(1, CommandRecord.b2Screen); )
                bndShowBondCard( FA
        break;

case 52:    /* income card intermec
        bndRecalcBond();
        for( scrScreenSet(0, Command
scrScreenSet(1, CommandRecord.b2Screen); )
                bndShowBondCard( TR
        break;

case 53:    /* select current Bond i
        bndSetCurrentBond( FALSE );
        break;

case 54:    /* change the number c
Bond */
        for( scrScreenSet(0, Commanc
scrScreenSet(1, CommandRecord.b2Screen); ) {
                bndNewNumShares();
        }
        break;

case 55:    /* change the status of
        bndChangeStatus();
        break;

case 56:    /* set up buylist */
        bndSetupBuyList();
        break;

case 57:    /* draw a page of the
        for( scrScreenSet(0, Comman
scrScreenSet(1, CommandRecord.b2Screen); ) {
                bndDrawBuyList();
        }
        break;

case 58:    /* select current Bond
        bndSetCurrentBond( TRUE );
        break;

case 59:    /* recalculate the resic
        for( scrScreenSet(0, Commar
scrScreenSet(1, CommandRecord.b2Screen); ) {
                bndRecalcBond();
                bndRecalcResidual();
        }

scnScan.c
```

BEST AVAILABLE COPY

```
scrScreenSet(1, CommandRecord.b2Screen); )

scrScreenSet(1, CommandRecord.b2Screen); )

"" );

CommandRecord.EventName, 600 );
```

```
        break;

case 60:    /* test that MMF's add u
        bndCheckMMFTotal();
        break;


case 70:    /* calc bank recommend
        bnkPickBank();
        break;

case 71:    /* show bank detail*/
        bnkRecalcBank();
        for( scrScreenSet(0, CommandR

            bnkShowBankCard( FALS
        break;

case 72:    /* show bank card interr
        bnkRecalcBank();
        for( scrScreenSet(0, CommandR

            bnkShowBankCard( TRUI
        break;

case 74:    /* show  calculator (don'
        clcShowNumPad( varVal( vcCalc
        break;

case 75:    /* activate calculator tou

        /*
         * there has to be a label to jur
         */
        if( !(CommandRecord.DefinedF

            scnScanError( "Timeout r

        }


        /*
         * set up calculator with 60 secc
         */
        pTimeoutReturn = pLastLine;
        bTimeoutActive = TRUE;
        tglChileCalcGopher->StartHanc
        tglChileCalcGopher->SetTimeoı

        break;

case 76:    /* show telephone (don't
        clcShowPhonePad( varVal( vcCa
        break;

case 77:    /* activate telephone tou
        /*

         * there has to be a label to jun
         */
        if( !(CommandRecord.DefinedF

            scnScanError( "Timeout r
        }


        /*
```

BEST AVAILABLE COPY

```
        * set up phone with 60 seconc
        */
        pTimeoutReturn = pLastLine;
        bTimeoutActive = TRUE;
        tglPhoneGopher->StartHandle
        tglPhoneGopher->SetTimeout
CommandRecord.EventName, 600 );

        break;


case 78:
        tglATCalcGopher->StartHand
        break;

case 79:
        break;

case 89: /* small twin pie */
        for( scrScreenSet(0, Comman
scrScreenSet(1, CommandRecord.b2Screen); )

                pieDrawTwinCondense
        break;

case 90:    /* recommended pie *
        for( scrScreenSet(0, Comman
scrScreenSet(1, CommandRecord.b2Screen); )

                pieDrawRecommend(
        break;

case 91:    /* actual pie */
        for( scrScreenSet(0, Commar
scrScreenSet(1, CommandRecord.b2Screen); )

                pieDrawActual();
        break;

case 92:    /* twin pies */
        for( scrScreenSet(0, Comma
scrScreenSet(1, CommandRecord.b2Screen); )

                pieDrawTwin();
        break;

case 93:    /* blueprint: cash  pie
        for( scrScreenSet(0, Comma
scrScreenSet(1, CommandRecord.b2Screen); )

                pieDrawCashSector()
        break;

case 94:    /* blueprint: bank sli
        for( scrScreenSet(0, Comma
scrScreenSet(1, CommandRecord.b2Screen); )

                pieDrawBankSlice();
        break;

case 95:    /* blueprint: money
        for( scrScreenSet(0, Comm
scrScreenSet(1, CommandRecord.b2Screen); )

                pieDrawMMFSlice();
        break;

case 96:    /* blueprint: growth
        for( scrScreenSet(0, Comm
scrScreenSet(1, CommandRecord.b2Screen); )

                pieDrawGILegend()
        break;

case 97:    /* blueprint: growt
        for( scrScreenSet(0, Comm
scrScreenSet(1, CommandRecord.b2Screen); )
```

scnScan.c

```
                pieDrawGISplit();
            break;

        case 98:    /* blueprint: growth/ inc
            for( scrScreenSet(0, CommandF
scrScreenSet(1, CommandRecord.b2Screen); )
                pieDrawRecommend4Sli
            break;

        case 100:
            prtPrintIt( 0 );            /* scr
            break;

        case 101:
            prtPrintIt( 1 );            /* pa(
            break;

        case 102:
            atfDataCapture();
            break;

        case 103:
            picSaveAsPict();            /* sav
NONAME file */
            break;

        case 104: /* indirect operator: replace
*/
            if( ( CommandRecord.DefinedF
              ( CommandRecord.VarNum[C
             )
                strcpy( varPtr( Commanc
                        varPtr(  var\
CommandRecord.VarNum[0]) )
                    );

            break;

        case 158:   /* given slot, put name ir
            stkClickLookup( varVal( vClickS
                                    varPtr
            break;

        case 159:

            for( scrScreenSet(0, CommandR
scrScreenSet(1, CommandRecord.b2Screen); )
                hotStockInvestSum();
            break;

        case 160:

            for( scrScreenSet(0, CommandR
scrScreenSet(1, CommandRecord.b2Screen); )
                hotStockProfile();
            break;

        case 161:

            for( scrScreenSet(0, CommandR
scrScreenSet(1, CommandRecord.b2Screen); )
                hotStockPerformance();
            break;


scnScan.c
```

BEST AVAILABLE COPY

```
case 162:    /* given slot, put name i
        bndClickLookup( varVal( vClick
                                varPt
        break;

case 163    :
        for( scrScreenSet(0, CommandF
scrScreenSet(1, CommandRecord.b2Screen); )
                hotBondInvestSum();
        break;

case 164    :

        for( scrScreenSet(0, CommandF
scrScreenSet(1, CommandRecord.b2Screen); )
                hotBondProfile();
        break;

case 165:

        for( scrScreenSet(0, CommandF
scrScreenSet(1, CommandRecord.b2Screen); )
                hotBondPerformance();
        break;


case 169:               /* CHILE cal
        chfCalc();
        break;

case 170:               /* CHILE cal
        chfReport();
        break;

case 171:               /* CHILE tab
        {
        Point *pTarget;

        if( CommandRecord.DefinedFi
                chfDisplay( &CommandF
        else
                chfDisplay( NULL );
        }
        break;

case 172:               /* CHILE rec
function */
        chfRecalc();
        break;

case 173:               /* CHILE wh
function */
        chfWhatIf();
        break;


case 174:               /* CHILE pri
        chfPrint();
        break;


case 175: /* CHILE screen writing */
        tglCursiveGopher->StartHandl
        break;

case 176:
        for( scrScreenSet(0, CommandF
scrScreenSet(1, CommandRecord.b2Screen); )


scnScan.c
```

BEST AVAILABLE COPY

```
        bigChart();
    break;

case 177:
    bigAltAllocate();
    break;

case 178:
    for( scrScreenSet(0, CommandF
scrScreenSet(1, CommandRecord.b2Screen); )
        bigInfo();
    break;

case 200:
    /* File Variables save */
    vrwSave();
    break;

case 201:
    /* File Variables load */
    vrwLoad();
    break;

case 202:   /* save the entire MIS da
    misWriteInfo();
    break;

case 204:   /* retrieve someone's da
    misRetrieve();
    break;

case 209:
    tglTextEditGopher->ClearBlock
    break;

case 210:   /* edit the CSR notepad
    tglTextEditGopher->StartHand
    tglTextEditGopher->CSRNotes(
    break;


case 211:   /* edit one of the 10 not

    {
    Int16T      noteNum;
    if ( ! CommandRecord.Defined
        {
        scnScanError( "Improperi
command", "" );
        break;
        }
    noteNum = varVal(CommandR
    tglTextEditGopher->StartHand
    tglTextEditGopher->EditNoteN
    break;
    }

case 212:   /* show one of the 10 nc

    scnScanError( "(Y) 212 no longe
    break;

case 213:   /* load the note abbrevi

    scnScanError( "(Y) 213 no longe
"" );
    break;
```

BEST AVAILABLE COPY

```
case 250: /* glossary lookup */
      if( CommandRecord.DefinedFi
            {
            for( scrScreenSet(0, Com
scrScreenSet(1, CommandRecord.b2Screen); )
                  hotGlossary( Com
            }
      else if ( CommandRecord.Defi:
            for( scrScreenSet(0, Com
scrScreenSet(1, CommandRecord.b2Screen); )
                  hotGlossary( varP
CommandRecord.VarNum[0] ));
      }
      else
            scnScanError( "(Y) 250 n
      break;

case 300:
      chiSaveCustomerScreen(); /* s
day report */
      break;

case 301:
      chiDontSaveCustomerScreen();
of-day report */
      break;

case 302:
      chiSaveCustomerVars(); /* sav
report */
      break;

case 303:
      chiPrintDayEndReport(); /* pr
*/
      break;

case 304:
      chiDeleteDayEndFiles(); /* pri
*/
      break;

case 305:
      chiPrintVariableReport(); /* p
      break;

case 306:
      chiPrintCustomerReport(); /*
      break;

case 307:
      chiDayEndWhatIfSave(); /* sa
what-if report */
      break;

case 308:
      chiPrintInitialReport(); /* war
      break;

case 309:
      chiCustomerWhatIfSave(); /*
customer's what-ifs */
      break;

case 310:
      chiCustomerWrite(); /* put u|
*/

scnScan.c
```

BEST AVAILABLE COPY

```
                    break;

                case 500:
                    modIOmain();
                    break;

                case 501:
                    tglTaxCalcGopher->StartHandl
                    break;

                case 502:
                    errEval();
Expression in 180 */
                    break;

                default:
                    {
                    char s[50];

                    sprintf( s, "Unexpected (Y) com
CommandRecord.Number );
                    scnScanError( s, ""  );
                    }
                    break;
                }
            }

        if( !cursorWasOff )
            tglCursorOnOff( TGL_ON );

        break;


    case 'Z':   /* switch displays */
        RequiredFields= sCOMMAND | sNUMBER;
        BadFields= sTOUCH | sEVENTNAME | sSTRING | sTA
sGARBAGE | sVARNUM;

        tglCursorOnOff( TGL_OFF );

        if( ((CommandRecord.DefinedFields & RequiredFie
            ((CommandRecord.DefinedFields & BadFielc

         )
            {
            scnScanError( "Improperly formatted (Z) cor
            break;
            }
        else
            {
            switch( CommandRecord.Number )
                {
                case 1:
                    tglMyCWindow= tglMainCWin
                    tglHCurPixMap= tglHMainPixM
                    break;
                case 2:

                    if (tglNumVisibleScreens == 2) {
                        tglMyCWindow= tglAltC
                        tglHCurPixMap= tglHAltF
                    }
                    else {
                        tglMyCWindow= tglMair
                        tglHCurPixMap= tglHMai
                    }
                    break;
                case 3:
                    tglMyCWindow= tglPSavePort;
```

BEST AVAILABLE COPY

```
                                tglHCurPixMap= tglHSaveMap
                                break;
                        default:
                                break;
                        }

                SetPort( (GrafPtr) tglMyCWindow );
                }

        if( !cursorWasOff )
                tglCursorOnOff( TGL_ON );

        break;

case ':': /* LABEL (syntax check only) */
        RequiredFields= sCOMMAND | sEVENTNAME;
        BadFields= sTOUCH | sNUMBER | sSTRING | sTARG
sGARBAGE;

        if( ((CommandRecord.DefinedFields & RequiredFi
                ((CommandRecord.DefinedFields & BadFiel

         )
                {
                scnScanError( "Improperly formatted (:) co
                break;
                }
        else if (lblBreakSet && lblIsBreakpoint( Commanc
                char message[50];
                CGrafPtr     oldImage;

                scnShowString( CurrentLine );
                oldImage = snpSaveBoxUnderDialog( BRE/
                sprintf( message, "Break at label %s.", Coi
);

                CtoPstr( message );
                ParamText( message, "\p", "\p", "\p" );
                Alert( BREAK_POINT_ID, NULL );
                snpRestoreBoxUnderDialog( &oldImage );
                tglScanGopher->SetSingleStep( TRUE );
        }
        break;
case '!': /* Timeout return */
        RequiredFields= sCOMMAND;
        BadFields= sTOUCH | sEVENTNAME | sNUMBER | s
                        sTARGET | sSTRING | sGARBAG

        if( ((CommandRecord.DefinedFields & RequiredFi
                ((CommandRecord.DefinedFields & BadFiel

         )
                {
                scnScanError( "Improperly formatted (!) co
                break;
                }
        else if( bTimeoutActive )
                {
                pCurLine = pTimeoutReturn;          /* jur
                bTimeoutActive= FALSE;
                }
        else
                scnScanError( "(!) only valid after Timeout.'
        break;

default:
        {
                char tempStr[10];
```

BEST AVAILABLE COPY

```
                    tempStr[0] = CommandRecord.Command;
                    tempStr[1] = 0;
                    scnScanError( "Unexpected () command in c
                }
                break;
            } /* switch */
        } /* command defined */


} /*  scnExecuteOldLine  */

/*-----------------------------------------
 *
 *                      Error in scan file
 *
 ------------------------------------------- */
/******************************************************************
 * scnScanError recovers from an error in a scan file by calling
 * tglError
 ******************************************************************/
void scnScanError( char *msg1, char *msg2 )
{
    char   errorMessage[256];

    /*
    sprintf( errorMessage, "%s %s\rParms= %s%s%s%s%s%s%s%s%s",
        msg1, msg2,
        (CommandRecord.DefinedFields & sCOMMAND)? "CMD " : "",
        (CommandRecord.DefinedFields & sNUMBER)? "NUM " : "",
        (CommandRecord.DefinedFields & sSTRING)? "FN ": "",
        (CommandRecord.DefinedFields & sALTSTRING)? "HI ": "",
        (CommandRecord.DefinedFields & sTARGET)? "TGT ": "",
        (CommandRecord.DefinedFields & sTOUCH)? "TCH ": "",
        (CommandRecord.DefinedFields & sEVENTNAME)? "EVT ": "",
        (CommandRecord.DefinedFields & sVARNUM)? "VAR ": "",
        (CommandRecord.DefinedFields & sGARBAGE)? "GBG": "");
    */

    if (strlen( msg2 ) == 0) {
        sprintf( errorMessage, "%s:\r\r\t\t%s\r", msg1, CurrentLine );
    }
    else {
        sprintf( errorMessage, "%s %s:\r\r\t\t%s\r", msg1, msg2, CurrentLine );
    }
    tglError( errorMessage, "", 0 );
}

/******************************************************************
 * scnRestartScan restarts the current scan file (after an error
 * for instance).
 ******************************************************************/
Boolean scnRestartScan( void )
    {
    Rect   r;
    Int32T        i;

    /*
     * reset the gopher to the top level
     */
    tglGopher = tglScanGopher;


    libCloseAllPicLibs();
    SetPort( (GrafPtr) tglMyCWindow );
    TGL_SETRECT( &r, 0, 0, 640, 480 );
    EraseRect( &r );
    pCurLine= pCtlFile;
```

BEST AVAILABLE COPY

```
	/*
	 * reinitialize variables to blanks
	 */
	for (i = 0; i < VAR_MAXVAR; i++) {
		varSetS( i, "" );
	}

	/*
	 * clear library names out of the build menu
	 */
	libDeleteLibraries();

	return ( pCurLine != NULL );
	}

/*****************************************************************
 * scnStartNewScan prompts the user to pick a new scan file and then
 * tries to open it.  If it opens it successfully, then it returns
 * TRUE, otherwise, FALSE.
 *****************************************************************/
Boolean scnStartNewScan( void )
{
	Rect	r;
	Int32T		i;

	/*
	 * reset the gopher to the top level
	 */
	tglGopher = tglScanGopher;


	libCloseAllPicLibs();
	if( !scnNewCtrlFile() ) {
		return (FALSE);
	}
	else {
		SetPort( (GrafPtr) tglMyCWindow );
	   TGL_SETRECT( &r, 0, 0, 640, 480 );
		EraseRect( &r );
		pCurLine= pCtlFile;

		/*
		 * reinitialize variables to blanks
		 */
		for (i = 0; i < VAR_MAXVAR; i++) {
			varSetS( i, "" );
		}

		/*
		 * clear library names out of the build menu
		 */
		libDeleteLibraries();

		return (TRUE);
	}
}

/*****************************************************************
 * scnBackUp handles the 'up' key, which moves backwards in a slide
 * show
 *****************************************************************/
void scnBackUp( void )
{
	if( ClickStack.numItems >= 2 )
		{
		scnPopClick();			/* current picture */
```

BEST AVAILABLE COPY

```
            pCurLine= scnPopClick();
            scnPushClick();
        }
}

/***************************************************************
 * scnTimeout is called if a Timeout occurs.  We jump
 * to the appropriate event.
 ***************************************************************/
void scnTimeout( char *jumpEvent )
{

        pCurLine = jumpEvent;

}

/***************************************************************
 * scnHotKeys handles any keys which are defined using the (K)
 * command.  It sets the current location in the scan file.  If we
 * were waiting for a mouse click, then assume we got it
 ***************************************************************/
void scnHotKeys( char key )
{
        if ( tchKeysHot() )  {
                char *p;

                if ( NULL != (p = tchKeyLabel( key )))
                        {
                        pCurLine = p;
                        if ((tglGopher == tglClickGopher) || (tglGopher == tglTimedClickGop

                                tglGopher->StopHandler();
                        }
                        }
        }
}

/***************************************************************
 * scnJump jumps to the specified label
 ***************************************************************/
void scnJump( char *label )
{
char *p;

if ( NULL != (p = lblLookupLabel( label )))
        {
        pCurLine = p;
        }
}


void scnPushClick ()
  {
        datPtrPush( &ClickStack, pCurLine );
        }

char *scnPopClick ( void )
        {
        return( (char *) datPtrPop( &ClickStack ));
        }

void scnPushSub ( char *ptr )
        {
        datPtrPush( &SubStack, ptr );
        }

char *scnPopSub ( void )
        {
```

```
        return( (char *) datPtrPop( &SubStack ));
        }

void scnSetCurrentLine( char *line )
{
        CurrentLine = line;
}
```

BEST AVAILABLE COPY

```
/**********************************************************************
 * scnVariables shows five variables and their values
 **********************************************************************/
void scnVariables( void )
{
        DialogPtr       dialogP;
        Handle                  item;
        Int16T                  itemType;
        Int16T                  itemHit;
        Rect            r;
        char            s[255];
        CGrafPtr        portSave;
        Int16T                  i, index, newVariable;

        /*
         * save whatever will be under the dialog box
         */
        portSave = snpSaveBoxUnderDialog( VARIABLES_ID, 'DLOG' );


        /*
         * get the dialog
         */
        dialogP = GetNewDialog( VARIABLES_ID, NULL, (WindowPtr) -1 );


        /*
         * for each variable in the dialog box, get the value, we assume
         * that the variables to be looked at are stored in the even
         * numbered dialog items starting with item number FIRST_EDIT_ITEM,
         * and that the values are supposed to be put in the odd numbered
         * dialog items after the variable
         */
        for (i = 0; i < NUM_VARIABLES_TO_VIEW; i++) {


                /*
                 * fill the variable number
                 */
                GetDItem( dialogP, 2 * i + FIRST_EDIT_ITEM, &itemType, &item, &r );
                sprintf( s, "%ld", VariableList[i] );
                CtoPstr( s );
                SetIText( item, s );


                /*
                 * fill the variable value
                 */
                GetDItem( dialogP, 2 * i + FIRST_EDIT_ITEM + 1, &itemType, &item, &r );
                sprintf( s, "%s", varPtr( VariableList[i] ));
                CtoPstr( s );
                SetIText( item, s );
        }
```

BEST AVAILABLE COPY

```
/*
 * show the dialog
 */
ShowWindow( dialogP );
do {
	ModalDialog( NULL, &itemHit );

	if (itemHit >= FIRST_EDIT_ITEM) {

		/*
		 * get the text in the item touched
		 */
		GetDItem( dialogP, itemHit, &itemType, &item, &r );
		GetIText( item, s );
		PtoCstr( s );
		index = (itemHit - FIRST_EDIT_ITEM) / 2;

		/*
		 * if the user changed a variable name, then find out
		 * that variable's value and stuff the value into the
		 * next dialog item
		 */
		if (itemHit % 2 == 0) {

			newVariable = atoi( s );
			if ((newVariable > 0) && (newVariable < VAR_MAXVAR)) {
				VariableList[index] = newVariable;

				GetDItem( dialogP, itemHit + 1, &itemType, &item, &r )
				sprintf( s, "%s", varPtr( VariableList[index] ));
				CtoPstr( s );
				SetIText( item, s );
			}

			/*
			 * if the variable number doesn't make sense, then
			 * don't try to find a value
			 */
			else {
				GetDItem( dialogP, itemHit + 1, &itemType, &item, &r );
				sprintf( s, "Invalid variable number" );
				CtoPstr( s );
				SetIText( item, s );
			}
		}

		/*
		 * if a variable VALUE was changed then set the variable
		 */
		else {

			varSetS( VariableList[index], s );
		}
	}
} while (itemHit != OK);

/*
 * dispose of the dialog
 */
DisposDialog( dialogP );
```

scnScan.c

```
    /*
     * put the stuff under the dialog back
     */
    snpRestoreBoxUnderDialog( &portSave );
}
```

BEST AVAILABLE COPY

BEST AVAILABLE COPY

```
/*
 * File scrScreen.c
 */

#include      "standard.h"
#include      "glue.h"

#define               APP_CHILE
#define               APP_ADTERM
#include      "varFns.h"

#define EXTGEN
#include      "scrScreen.h"
#undef EXTGEN

#include   "tglMain.h"
/*
*************************************************************************
       ScreenSet()  -- handle multiple screen displays
       ScreenSet(0) initializes
       ScreenSet(1) selects next screen, returns 1 if there is a next screen, else 0
*************************************************************************
* */
Int32T        scrScreenSet( Int32T state, Int32T applyToBoth )
       {
       static localState;

       if( !state )
              localState= 0;
       else
              localState++;

       switch( localState )
              {
              case 0:
              case 1:
                     SetPort( (GrafPtr) tglMyCWindow );
                     return(1);
                     break;

              case 2:
                     if( ! applyToBoth )
                            return( 0 );
                     else
                            { /* switch to alternate */

                            /*
                             * If there is only one screen visible, then forget it
                             */
                            if (tglNumVisibleScreens == 1) {

                                   return 0;
                            }


                            /*
                             * otherwise swap between them
                             */
                            if( tglMyCWindow == tglAltCWindow )
                                   {
                                   tglMyCWindow= tglMainCWindow;
                                   tglHCurPixMap= tglHMainPixMap;
                                   }
                            else
                                   {
                                   tglMyCWindow= tglAltCWindow;
                                   tglHCurPixMap= tglHAltPixMap;
```

BEST AVAILABLE COPY

```
                }
            SetPort( (GrafPtr) tglMyCWindow );
            return( 1 );
            }
        break;

    case 3:     /* switch back */

            /*
             * If there is only one screen visible, then forget it
             */
            if (tglNumVisibleScreens == 1) {

                return 0;
            }


            if( tglMyCWindow == tglAltCWindow )
                {
                tglMyCWindow= tglMainCWindow;
                tglHCurPixMap= tglHMainPixMap;
                }
            else
                {
                tglMyCWindow= tglAltCWindow;
                tglHCurPixMap= tglHAltPixMap;
                }
            SetPort( (GrafPtr) tglMyCWindow );
            return( 0 );
            break;

    default:
            return( 0 );
    }

}

/**************************************************************************
***
 EXPLODE OR CRUSH
**************************************************************************
**/
void scrExplodeOrCrush( prFrom, prTo )
    Rect  *prFrom;
    Rect  *prTo;
{

#define     NSTEPS 10

    Int16T      i;
    Int32T      Time;
    Rect  r;
    Rect  rIncrement;
    Pattern     patternBlack;

    /* Get a copy of the Black pattern */
    GetIndPattern( (Pattern*) patternBlack,
        0,          /* Resource id of standard pattern list */
        1           /* Index of black pattern within list */
        );

    /* Set pen pattern to Black */
    PenPat( patternBlack );

    /* Set drawing mode to XOR */
    PenMode( patXor );
```

BEST AVAILABLE COPY

```
	/* Figure out horizontal and vertical increments */
	rIncrement.top = ( prTo->top - prFrom->top ) / NSTEPS;
	rIncrement.left = ( prTo->left - prFrom->left ) / NSTEPS;
	rIncrement.bottom = ( prTo->bottom - prFrom->bottom ) / NSTEPS;
	rIncrement.right = ( prTo->right - prFrom->right ) / NSTEPS;

	/* Set starting size */
	SetRect( &r, prFrom->left, prFrom->top, prFrom->right, prFrom->bottom );
	/* For starting size to ending size */
	for( i = 0; i < NSTEPS; i++ )
	{
		Time = TickCount();
		/* wait two ticks */
		while( TickCount() < Time + 1 );
		/* draw outline rectangle */
		FrameRect( &r );
		/* wait two ticks */
		while( TickCount() < Time + 2 );
		/* undraw outline rectangle */
		FrameRect( &r );
		/* next size */
		SetRect( &r,
			r.left   + rIncrement.left,
			r.top    + rIncrement.top,
			r.right  + rIncrement.right,
			r.bottom + rIncrement.bottom
			);
	}
	/* Set pen pattern back to solid Black */
	PenPat( patternBlack );

	/* Set drawing mode to copy */
	PenMode( patCopy );
	return;
}


/*
 * scrSetHue: set the hue, based on an ID number from scanx
 * pulled out of scnParseCtl for use in drawing charts 8/17/89 JMG
 * (The selection is put into effect when (V) command is executed.)
 */

/*
Select and set the hue
*/
void scrSetHueNow( Int32T hueNumber )
	{
	Int32T		textFont, textSize, textFace;
	RGBColor	textBGColor;
	RGBColor	textFGColor;

	scrSetHue( hueNumber, &textFont, &textSize, &textFace, &textFGColor, &textBG(

	TextFont( textFont );
	TextSize( textSize );
	TextFace( textFace );

	RGBForeColor( &textFGColor );
	RGBBackColor( &textBGColor );
	}

/*
Select the hue, for setting later, returns FALSE if it fails, TRUE otherwise
*/
Boolean scrSetHue( Int32T hueNumber,
			Int32T *textFont,
			Int32T *textSize,
```

BEST AVAILABLE COPY

```
                Int32T *textFace,
                RGBColor *textFGColor,
                RGBColor *textBGColor )
{
    Int16T      lookupFont;

switch( hueNumber )
 {
 case 1: /* dk grey on med grey, pre-entry label (ie: "name") */
        *textFont= 3;
        *textSize= 12;
        *textFace= normal;
        TGL_SETRGB( *textFGColor, 21845, 21845, 21845 );
        TGL_SETRGB( *textBGColor, 43690, 43690, 43690 );
        break;

 case 2: /* med grey on lt grey, opened input window (lower light) */
        *textFont= 3;
        *textSize= 12;
        *textFace= normal;
        TGL_SETRGB( *textFGColor, 30583, 30583, 30583 );
        TGL_SETRGB( *textBGColor, 52428, 52428, 52428 );
        break;

 case 3: /* lt grey on dk grey, cursored-on label*/
        *textFont= 3;
        *textSize= 12;
        *textFace= normal;
        TGL_SETRGB( *textFGColor, 56797, 56797, 56797 );
        TGL_SETRGB( *textBGColor, 30583, 30583, 30583 );
        break;

 case 4: /* almost black on med grey, post-entry label (ie:j.seymour) */
        *textFont= 3;
        *textSize= 12;
        *textFace= normal;
        TGL_SETRGB( *textFGColor, 4369, 4369, 4369 );
        TGL_SETRGB( *textBGColor, 43690, 43690, 43690 );
        break;

 case 5: /* med grey on bright grey, opened input window (high light) */
        *textFont= 3;
        *textSize= 12;
        *textFace= normal;
        TGL_SETRGB( *textFGColor, 30583, 30583, 30583 );
        TGL_SETRGB( *textBGColor, 61166, 61166, 61166 );
        break;


 case 6: /* dark grey on bright grey -- bold, for mortgage UFF */
        *textFont= 3;
        *textSize= 12;
        *textFace= bold;
        TGL_SETRGB( *textFGColor, 21845, 21845, 21845 );
        TGL_SETRGB( *textBGColor, 61166, 61166, 61166 );
        break;

 case 7: /* dk grey on blue, college UFF year change */
        *textFont= 3;
        *textSize= 12;
        *textFace= normal;
        TGL_SETRGB( *textFGColor, 21845, 21845, 21845 );
        TGL_SETRGB( *textBGColor, 61166, 61166, 61166 );
        break;

 case 8: /* dk grey on peach, mortgage UFF % changes */
        *textFont= 3;
        *textSize= 12;
```

BEST AVAILABLE COPY

```
            *textFace= normal;
            TGL_SETRGB( *textFGColor, 21845, 21845, 21845 );
            TGL_SETRGB( *textBGColor, 65535, 52428, 39321 );
            break;

case 9: /* dk grey on light grey background */
            *textFont= 3;
            *textSize= 12;
            *textFace= normal;
            TGL_SETRGB( *textFGColor, 8738, 8738, 8738 );
            TGL_SETRGB( *textBGColor, 43690, 43690, 43690 );
            break;

case 10: /* BANK bucket recommended amount */
            *textFont= 3;
            *textSize= 12;
            *textFace= bold;
            TGL_SETRGB( *textFGColor, 61166, 61166, 61166 );
            TGL_SETRGB( *textBGColor, 0, 30583, 0 );
            break;

case 11: /* INCOME bucket recommended amount */
            *textFont= 3 ;
            *textSize= 12;
            *textFace= bold;
            TGL_SETRGB( *textFGColor, 61166, 61166, 61166 );
            TGL_SETRGB( *textBGColor, 0, 26214, 52428 );
            break;

case 12: /* GROWTH bucket recommended amount */
            *textFont= 3 ;
            *textSize= 12;
            *textFace= bold;
            TGL_SETRGB( *textFGColor, 61166, 61166, 61166 );
            TGL_SETRGB( *textBGColor, 65535, 26214, 0 );
            break;

case 13: /* BANK edit recommended amount */
            *textFont= 3;
            *textSize= 12;
            *textFace= normal;
            TGL_SETRGB( *textFGColor, 61166, 61166, 61166 );
            TGL_SETRGB( *textBGColor, 0, 43690, 0 );
            break;

case 14: /* INCOME edit recommended amount */
            *textFont= 3 ;
            *textSize= 12;
            *textFace= normal;
            TGL_SETRGB( *textFGColor, 61166, 61166, 61166 );
            TGL_SETRGB( *textBGColor, 26214, 39321, 65535 );
            break;

case 15: /* GROWTH edit recommended amount */
            *textFont= 3 ;
            *textSize= 12;
            *textFace= normal;
            TGL_SETRGB( *textFGColor, 61166, 61166, 61166 );
            TGL_SETRGB( *textBGColor, 65535, 39321, 0 );
            break;

case 16: /* NAMETAB; grey on hi yellow */
            *textFont= 3 ;
            *textSize= 12;
            *textFace= normal;
            TGL_SETRGB( *textFGColor, 21845, 21845, 21845 );
            TGL_SETRGB( *textBGColor, 65535, 65535, 26214 );
            break;
```

```
case 17: /* BANK bucket recommended amount */
            *textFont= 3;
            *textSize= 14;
            *textFace= bold;
            TGL_SETRGB( *textFGColor, 61166, 61166, 61166 );
            TGL_SETRGB( *textBGColor, 0, 30583, 0 );
            break;

case 18: /* INCOME bucket recommended amount */
            *textFont= 3 ;
            *textSize= 14;
            *textFace= bold;
            TGL_SETRGB( *textFGColor, 61166, 61166, 61166 );
            TGL_SETRGB( *textBGColor, 0, 26214, 52428 );
            break;

case 19: /* GROWTH bucket recommended amount  */
            *textFont= 3 ;
            *textSize= 14;
            *textFace= bold;
            TGL_SETRGB( *textFGColor, 61166, 61166, 61166 );
            TGL_SETRGB( *textBGColor, 65535, 26214, 0 );
            break;


case 20: /* high level green on black for prompt */
            *textFont= 3;
            *textSize= 12;
            *textFace= normal;
            TGL_SETRGB( *textFGColor, 13107, 65535, 0 );
            TGL_SETRGB( *textBGColor, 0, 0, 0 );
            break;

case 21: /* high level green on black for prompt */
            *textFont= 3;
            *textSize= 10;
            *textFace= normal;
            TGL_SETRGB( *textFGColor, 13107, 65535, 0 );
            TGL_SETRGB( *textBGColor, 0, 0, 0 );
            break;

case 22: /*  */
            *textFont= 3;
            *textSize= 10;
            *textFace= bold;
            TGL_SETRGB( *textFGColor, 61166, 61166, 61166 );
            TGL_SETRGB( *textBGColor, 0, 0, 0 );
            break;

case 23: /*  */
            *textFont= 3;
            *textSize= 12;
            *textFace= bold;
            TGL_SETRGB( *textFGColor, 17476, 17476, 17476 );
            TGL_SETRGB( *textBGColor, 52428, 52428, 52428 );
            break;

case 25: /* special considerations input: 10 point type, dk grey on white */
            *textFont= 3;
            *textSize= 10;
            *textFace= normal;
            TGL_SETRGB( *textFGColor, 17476, 17476, 17476 );
            TGL_SETRGB( *textBGColor, 65535, 65535, 65535 );
            break;

case 26: /* special considerations totals: 9 point type, dk grey on med gray */
            *textFont= 3;
```

BEST AVAILABLE COPY

BEST AVAILABLE COPY

```
        *textSize= 9;
        *textFace= bold;
        TGL_SETRGB( *textFGColor, 17476, 17476, 17476 );
        TGL_SETRGB( *textBGColor, 30583, 30583, 30583 );
        break;

case 28: /* special considerations notes input: 12 point type, dk blue on light gr
        *textFont= 3;
        *textSize= 12;
        *textFace= normal;
        TGL_SETRGB( *textFGColor, 0, 0, 30583 );
        TGL_SETRGB( *textBGColor, 52428, 52428, 52428 );
        break;

case 29: /* comparison box med. gray on bright gray bold */
        *textFont= 3;
        *textSize= 10;
        *textFace= bold;
        TGL_SETRGB( *textFGColor, 30583, 30583, 30583 );
        TGL_SETRGB( *textBGColor, 61166, 61166, 61166 );
        break;

case 30: /* lt blue on water blue for "your money" input chips */
        *textFont= 3;
        *textSize= 12;
        *textFace= normal;
        TGL_SETRGB( *textFGColor, 13107, 52428, 65535 );
        TGL_SETRGB( *textBGColor, 0, 0, 56797 );
        break;

case 31: /* lt blue on water blue for "your money" bucket amounts */
        *textFont= 3;
        *textSize= 14;
        *textFace= bold;
        TGL_SETRGB( *textFGColor, 13107, 52428, 65535 );
        TGL_SETRGB( *textBGColor, 0, 0, 56797 );
        break;

case 32: /* BANK detail card, recommended amount in green band */
        *textFont= 3;
        *textSize= 14;
        *textFace= bold;
        TGL_SETRGB( *textFGColor, 61166, 61166, 61166 );
        TGL_SETRGB( *textBGColor, 0, 34952, 0 );
        break;

case 33: /* INCOME detail card, recommended amount in blue band */
        *textFont= 3;
        *textSize= 14;
        *textFace= bold;
        TGL_SETRGB( *textFGColor, 61166, 61166, 61166 );
        TGL_SETRGB( *textBGColor, 0, 13107, 65535 );
        break;

case 34: /* GROWTH detail card, recommended amount in orange band */
        *textFont= 3;
        *textSize= 14;
        *textFace= bold;
        TGL_SETRGB( *textFGColor, 61166, 61166, 61166 );
        TGL_SETRGB( *textBGColor, 65535, 26214, 0 );
        break;

case 35: /* detail cards 10 point type, dk grey on bright grey */
        *textFont= 3;
        *textSize= 10;
        *textFace= normal;
        TGL_SETRGB( *textFGColor, 17476, 17476, 17476 );
        TGL_SETRGB( *textBGColor, 61166, 61166, 61166 );
```

```
        break;

case 36: /* detail cards 9 point type dk grey on bright grey */
        *textFont= 3;
        *textSize= 9;
        *textFace= normal;
        TGL_SETRGB( *textFGColor, 17476, 17476, 17476 );
        TGL_SETRGB( *textBGColor, 61166, 61166, 61166 );
        break;

case 37: /* detail cards 12 point type dk grey on bright grey */
        *textFont= 3;
        *textSize= 12;
        *textFace= normal;
        TGL_SETRGB( *textFGColor, 17476, 17476, 17476 );
        TGL_SETRGB( *textBGColor, 61166, 61166, 61166 );
        break;

case 38: /* detail cards 12 point type dk grey on next-to-bright grey for ck+ and r
        *textFont= 3;
        *textSize= 12;
        *textFace= normal;
        TGL_SETRGB( *textFGColor, 17476, 17476, 17476 );
        TGL_SETRGB( *textBGColor, 56797, 56797, 56797 );
        break;

case 39: /* Hist Perf graf: 10 pt purple on bright grey */
        *textFont= 3;
        *textSize= 10;
        *textFace= normal;
        TGL_SETRGB( *textFGColor, 26244, 13188, 65412 );
        TGL_SETRGB( *textBGColor, 61166, 61166, 61166 );
        break;

case 40: /* Hist Perf graf: 10 pt white on purple */
        *textFont= 3;
        *textSize= 10;
        *textFace= normal;
        TGL_SETRGB( *textFGColor, 61166, 61166, 61166 );
        TGL_SETRGB( *textBGColor, 26244, 13188, 65412 );
        break;

case 41: /* Chile - Los Angeles, dialog type */
        *textFont= 12;
        *textSize= 24;
        *textFace= bold | condense;
        TGL_SETRGB( *textFGColor, 0, 0, 0 );
        TGL_SETRGB( *textBGColor, 65535, 65535, 65535 );
        break;

case 42: /* Chile - Geneva, cloud-button type */
        *textFont= 3;
        *textSize= 14;
        *textFace= bold;
        TGL_SETRGB( *textFGColor, 17476, 17476, 17476 );
        TGL_SETRGB( *textBGColor, 65535, 65535, 65535 );
        break;

case 43: /* Tom data menu reverse highlight */
        *textFont= 3;
        *textSize= 10;
        *textFace= normal;
        TGL_SETRGB( *textFGColor, 61166, 61166, 61166 );
        TGL_SETRGB( *textBGColor, 65535, 65535, 65535 );
        break;

case 44: /* Chile - Geneva yes/no button type */
        *textFont= 3;
```

BEST AVAILABLE COPY

```
            *textSize= 18;
            *textFace= bold;
            TGL_SETRGB( *textFGColor, 17476, 17476, 17476 );
            TGL_SETRGB( *textBGColor, 65535, 65535, 65535 );
            break;

    case 45: /* Chile - Geneva recap grey type  */
            *textFont= 3;
            *textSize= 14;
            *textFace= bold;
            TGL_SETRGB( *textFGColor, 21845, 21845, 21845 );
            TGL_SETRGB( *textBGColor, 65535, 65535, 65535 );
            break;

    case 46: /* Chile - should be Century Schoolbook (maintenance screen)  */
            GetFNum( "\pNew Century Schlbk", &lookupFont );
            if( lookupFont == 0 ) lookupFont = 3;       /* Geneva is better than
            *textFont= lookupFont;
            *textSize= 14;
            *textFace= bold;
            TGL_SETRGB( *textFGColor, 4369, 4369, 4369 );
            TGL_SETRGB( *textBGColor, 39321, 52428, 65535 );
            break;

    case 47: /* Chile - should be Century Schoolbook (maintenance screen)  */
            GetFNum( "\pNew Century Schlbk", &lookupFont );
            if( lookupFont == 0 ) lookupFont = 3;       /* Geneva is better than
            *textFont= lookupFont;
            *textSize= 14;
            *textFace= bold;
            TGL_SETRGB( *textFGColor, 4369, 4369, 4369 );
            TGL_SETRGB( *textBGColor, 65535, 65535, 39321 );
            break;

    case 48: /* Chile - should be Century Schoolbook (maintenance screen)  */
            GetFNum( "\pNew Century Schlbk", &lookupFont );
            if( lookupFont == 0 ) lookupFont = 3;       /* Geneva is better than
            *textFont= lookupFont;
            *textSize= 14;
            *textFace= bold;
            TGL_SETRGB( *textFGColor, 4369, 4369, 4369 );
            TGL_SETRGB( *textBGColor, 65535, 52428, 52428 );
            break;

    case 49: /* Chile - should be Century Schoolbook (maintenance screen)  */
            GetFNum( "\pNew Century Schlbk", &lookupFont );
            if( lookupFont == 0 ) lookupFont = 3;       /* Geneva is better than
            *textFont= lookupFont;
            *textSize= 14;
            *textFace= bold;
            TGL_SETRGB( *textFGColor, 4369, 4369, 4369 );
            TGL_SETRGB( *textBGColor, 65535, 52428, 39321 );
            break;

    case 50: /* Chile - should be Century Schoolbook (maintenance screen)  */
            GetFNum( "\pNew Century Schlbk", &lookupFont );
            if( lookupFont == 0 ) lookupFont = 3;       /* Geneva is better than
            *textFont= lookupFont;
            *textSize= 14;
            *textFace= bold;
            TGL_SETRGB( *textFGColor, 4369, 4369, 4369 );
            TGL_SETRGB( *textBGColor, 26214, 52428, 52428 );
            break;

    case 51: /* Chile - Geneva "found" blue-green type  */
            *textFont= 3;
            *textSize= 18;
            *textFace= bold;
```

```
TGL_SETRGB( *textFGColor, 0, 26214, 26214 );
TGL_SETRGB( *textBGColor, 65535, 65535, 65535 );
break;

case 52: /* Chile - Geneva black type */
	*textFont= 3;
	*textSize= 10;
	*textFace= normal;
	TGL_SETRGB( *textFGColor, 0, 0, 0 );
	TGL_SETRGB( *textBGColor, 65535, 65535, 65535 );
	break;

case 53: /* Chile - Geneva grey bold type (answer primary and offered answer pr
	*textFont= 3;
	*textSize= 14;
	*textFace= bold;
	TGL_SETRGB( *textFGColor, 21845, 21845, 21845 );
	TGL_SETRGB( *textBGColor, 65535, 65535, 65535 );
	break;

case 54: /* Chile - Geneva grey type (answer secondary) */
	*textFont= 3;
	*textSize= 14;
	*textFace= normal;
	TGL_SETRGB( *textFGColor, 21845, 21845, 21845 );
	TGL_SETRGB( *textBGColor, 65535, 65535, 65535 );
	break;

case 55: /* Chile - Geneva black type (main menu icons) */
	*textFont= 3;
	*textSize= 14;
	*textFace= bold;
	TGL_SETRGB( *textFGColor, 0, 0, 0 );
	TGL_SETRGB( *textBGColor, 65535, 65535, 65535 );
	break;

case 56: /* Chile - Geneva grey type (offered answer secondary) */
	*textFont= 3;
	*textSize= 12;
	*textFace= normal;
	TGL_SETRGB( *textFGColor, 21845, 21845, 21845 );
	TGL_SETRGB( *textBGColor, 65535, 65535, 65535 );
	break;

case 57: /* Chile - Geneva blue-green answer type (offered answer secondary) */
	*textFont= 3;
	*textSize= 12;
	*textFace= bold;
	TGL_SETRGB( *textFGColor, 0, 26214, 26214 );
	TGL_SETRGB( *textBGColor, 0, 0, 0 );
	break;


case 58: /* AT - Geneva dark gray 10 pt normal */
	*textFont= 3;
	*textSize= 10;
	*textFace= normal;
	TGL_SETRGB( *textFGColor, 34952, 34952, 34952 );
	TGL_SETRGB( *textBGColor, 0, 0, 0 );
	break;

case 63: /* INCOME detail card, as of date in blue band */
	*textFont= 3;
	*textSize= 10;
	*textFace= normal;
	TGL_SETRGB( *textFGColor, 61166, 61166, 61166 );
	TGL_SETRGB( *textBGColor, 0, 13107, 65535 );
	break;
```

BEST AVAILABLE COPY

BEST AVAILABLE COPY

```
case 64: /* GROWTH detail card, as of date in orange band */
            *textFont= 3;
            *textSize= 10;
            *textFace= normal;
            TGL_SETRGB( *textFGColor, 61166, 61166, 61166 );
            TGL_SETRGB( *textBGColor, 65535, 26214, 0 );
            break;

case 80: /* BIG bar graph high yellow */
            *textFont= 3;
            *textSize= 10;
            *textFace= normal;
            TGL_SETRGB( *textFGColor, 65535, 65535, 39321 );
            TGL_SETRGB( *textBGColor, 65535, 65535, 65535 );
            break;

case 81:    /* BIG bar graph mustard */
            *textFont= 3;
            *textSize= 10;
            *textFace= normal;
            TGL_SETRGB( *textFGColor, 65535, 52428, 0 );
            TGL_SETRGB( *textBGColor, 65535, 65535, 65535 );
            break;

case 82:    /* BIG bar graph */
            *textFont= 3;
            *textSize= 10;
            *textFace= normal;
            TGL_SETRGB( *textFGColor, 0, 26214, 5248 );
            TGL_SETRGB( *textBGColor, 65535, 65535, 65535 );
            break;

case 83:    /* hotsheet graph - S & P */
            PenSize( 1, 1 );         /* this probably shouldn't be here, but it's h
            *textFont= 3;
            *textSize= 10;
            *textFace= normal;
            TGL_SETRGB( *textFGColor, 26214, 13107, 65535 );
            TGL_SETRGB( *textBGColor, 65535, 65535, 65535 );
            break;

case 84:    /* hotsheet graph - stock */
            PenSize( 2, 2 );         /* this probably shouldn't be here, but it's h
            *textFont= 3;
            *textSize= 10;
            *textFace= normal;
            TGL_SETRGB( *textFGColor, 62086, 28246, 1834 );
            TGL_SETRGB( *textBGColor, 65535, 65535, 65535 );
            break;

case 85: /* glossary BOLD 12 point type high purple on grey */
            *textFont= 3;
            *textSize= 12;
            *textFace= bold;
            TGL_SETRGB( *textFGColor, 13107, 13107, 39321 );
            TGL_SETRGB( *textBGColor, 61166, 61166, 61166 );
            break;

case 86: /* glossary 12 point type high purple on grey */
            *textFont= 3;
            *textSize= 12;
            *textFace= normal;
            TGL_SETRGB( *textFGColor, 13107, 13107, 39321 );
            TGL_SETRGB( *textBGColor, 61166, 61166, 61166 );
            break;
```

BEST AVAILABLE COPY

```
case 90: /* 'accept' stmt debug color */
        *textFont= 3;
        *textSize= 12;
        *textFace= normal;
        TGL_SETRGB( *textFGColor, 0, 0, 0 );
        TGL_SETRGB( *textBGColor, 65000, 65000, 65000 );
        TextFace( normal );
        break;

case 91: /* growth card stock > 0 shares (gray) */
        *textFont= 3;
        *textSize= 10;
        *textFace= normal;
        TGL_SETRGB( *textFGColor, 4369, 4369, 4369 );
        TGL_SETRGB( *textBGColor, 65000, 65000, 65000 );
        TextFace( normal );
        break;

case 92: /* growth card stock = 0 shares (gray) */
        *textFont= 3;
        *textSize= 10;
        *textFace= normal;
        TGL_SETRGB( *textFGColor, 26214, 26214, 26214 );
        TGL_SETRGB( *textBGColor, 65000, 65000, 65000 );
        TextFace( normal );
        break;

case 93: /* buylist stock never to be selected (gray) */
        *textFont= 3;
        *textSize= 10;
        *textFace= normal;
        TGL_SETRGB( *textFGColor, 39321, 39321, 39321 );
        TGL_SETRGB( *textBGColor, 65000, 65000, 65000 );
        TextFace( normal );
        break;

case 94: /* growth card: positive IMRA (green) */
        *textFont= 3;
        *textSize= 10;
        *textFace= normal;
        TGL_SETRGB( *textFGColor, 0, 30583, 0 );
        TGL_SETRGB( *textBGColor, 65000, 65000, 65000 );
        TextFace( normal );
        break;

case 95: /* growth card: negative IMRA (red) */
        *textFont= 3;
        *textSize= 10;
        *textFace= normal;
        TGL_SETRGB( *textFGColor, 65535, 0, 0);
        TGL_SETRGB( *textBGColor, 65000, 65000, 65000 );
        TextFace( normal );
        break;

case 96: /* category headers (dark gray) */
        *textFont= 3;
        *textSize= 10;
        *textFace= normal;
        TGL_SETRGB( *textFGColor, 17476, 17476, 17476);
        TGL_SETRGB( *textBGColor, 65000, 65000, 65000 );
        TextFace( normal );
        break;

case 97: /* category header hilight (orange) */
        *textFont= 3;
        *textSize= 10;
        *textFace= normal;
        TGL_SETRGB( *textFGColor, 65535, 26214, 0);
```

BEST AVAILABLE COPY

```
			TGL_SETRGB( *textBGColor, 65000, 65000, 65000 );
			TextFace( normal );
			break;

		case 98: /* category header hilight (blue) */
			*textFont= 3;
			*textSize= 10;
			*textFace= normal;
			TGL_SETRGB( *textFGColor, 0, 13107, 65535);
			TGL_SETRGB( *textBGColor, 65000, 65000, 65000 );
			TextFace( normal );
			break;

		case 100: /* Chile - should be Century Schoolbook (recap screens)  */
			GetFNum( "\pNew Century Schlbk", &lookupFont );
			if( lookupFont == 0 ) lookupFont = 3;		/* Geneva is better thar
			*textFont= lookupFont;
			*textSize= 18;
			*textFace= normal | extend;
			TGL_SETRGB( *textFGColor, 0, 0, 0 );
			TGL_SETRGB( *textBGColor, 65535, 65535, 65535 );
			break;

		case 101: /* Chile - should be Times (buttons)  */
			GetFNum( "\pTimes", &lookupFont );
			if( lookupFont == 0 ) lookupFont = 3;		/* Geneva is better thar
			*textFont= lookupFont;
			*textSize= 18;
			*textFace= normal | extend;
			TGL_SETRGB( *textFGColor, 30583, 30583, 30583 );
			TGL_SETRGB( *textBGColor, 0, 0, 0 );
			break;

		case 131: /* alternate amounts in dk. gray on lt. gray */
			*textFont= 3;
			*textSize= 10;
			*textFace= bold;
			TGL_SETRGB( *textFGColor, 30583, 30583, 30583 );
			TGL_SETRGB( *textBGColor, 56797, 56797, 56797 );
			break;

		case 132: /* BANK alternate percentage in green band */
			*textFont= 3;
			*textSize= 10;
			*textFace= bold;
			TGL_SETRGB( *textFGColor, 61166, 61166, 61166 );
			TGL_SETRGB( *textBGColor, 0, 34952, 0 );
			break;

		case 133: /* INCOME alternate percentage in blue band */
			*textFont= 3;
			*textSize= 10;
			*textFace= bold;
			TGL_SETRGB( *textFGColor, 61166, 61166, 61166 );
			TGL_SETRGB( *textBGColor, 0, 13107, 65535 );
			break;

		case 134: /* GROWTH highlit alternate percentage in orange band */
			*textFont= 3;
			*textSize= 10;
			*textFace= bold;
			TGL_SETRGB( *textFGColor, 61166, 61166, 61166 );
			TGL_SETRGB( *textBGColor, 65535, 39321, 0 );
			break;

		case 142: /* BANK highlit alternate percentage in green band */
			*textFont= 3;
```

BEST AVAILABLE COPY

```
        *textSize= 10;
        *textFace= bold;
        TGL_SETRGB( *textFGColor, 61166, 61166, 61166 );
        TGL_SETRGB( *textBGColor, 0, 56797, 0 );
        break;

case 143: /* INCOME highlit alternate percentage in blue band */
        *textFont= 3;
        *textSize= 10;
        *textFace= bold;
        TGL_SETRGB( *textFGColor, 61166, 61166, 61166 );
        TGL_SETRGB( *textBGColor, 0, 39321, 65535 );
        break;

case 144: /* GROWTH alternate percentage in orange band */
        *textFont= 3;
        *textSize= 10;
        *textFace= bold;
        TGL_SETRGB( *textFGColor, 61166, 61166, 61166 );
        TGL_SETRGB( *textBGColor, 65535, 39321, 0 );
        break;

case 145: /* session notes */
        *textFont= 3;
        *textSize= 10;
        *textFace= normal;
        TGL_SETRGB( *textFGColor, 0, 13107, 39321 );
        TGL_SETRGB( *textBGColor, 52428, 52428, 52428 );
        break;

case 1000: /* intro graph labels (used internally in introGraph.c)  */
        *textFont= 3;
        *textSize= 10;
        *textFace= bold;
        TGL_SETRGB( *textFGColor, 21845, 21845, 21845 );
        TGL_SETRGB( *textBGColor, 00000, 65535, 65535 );
        break;

case 1001: /* intro graph labels (used internally in introGraph.c)  */
        *textFont= 3;
        *textSize= 9;
        *textFace= normal;
        TGL_SETRGB( *textFGColor, 21845, 21845, 21845 );
        TGL_SETRGB( *textBGColor, 00000, 65535, 65535 );
        break;

case 1010: /* intro graph labels (used internally in introGraph.c)  */
        *textFont= 3;
        *textSize= 10;
        *textFace= normal;
        TGL_SETRGB( *textFGColor, 26214, 26214, 26214 );
        TGL_SETRGB( *textBGColor, 00000, 65535, 65535 );
        break;

case 1020: /* intro graph labels (used internally in introGraph.c)  */
        *textFont= 3;
        *textSize= 10;
        *textFace= bold;
        TGL_SETRGB( *textFGColor, 61166, 61166, 61166 );
        TGL_SETRGB( *textBGColor, 00000, 65535, 65535 );
        break;

case 1021: /* intro graph labels (used internally in introGraph.c)  */
        *textFont= 3;
        *textSize= 10;
        *textFace= bold;
        TGL_SETRGB( *textFGColor, 26214, 26214, 26214 );
        TGL_SETRGB( *textBGColor, 00000, 65535, 65535 );
```

BEST AVAILABLE COPY

```
                break;

        default:
                return (FALSE);
                break;
        }

    return (TRUE);
    }

/*************************************************************************
scrRestoreColor() -- set foreground and background to black and white
                        in all three possible windows. This has to be
                        done after messing with hues, because CopyBits()
                        insists on these default colors.
*************************************************************************
void scrRestoreColors( void )
    {
    SetPort( (GrafPtr) tglMainCWindow );
    RGBForeColor( &tglRgbBlack );
    RGBBackColor( &tglRgbWhite );

    SetPort( (GrafPtr) tglAltCWindow );
    RGBForeColor( &tglRgbBlack );
    RGBBackColor( &tglRgbWhite );

    SetPort( (GrafPtr) tglPSavePort );
    RGBForeColor( &tglRgbBlack );
    RGBBackColor( &tglRgbWhite );
    }


/*************************************************************************
***
OurDrawAt() -- handle special control characters at front of string
*************************************************************************
**/
void scrOurDrawAt( char *s, Int32T h, Int32T v )
    {
    FontInfo info;
    Int32T      size;

    if( *s == '~' )
     {
     s++;
     switch( *s )
        {
        case 'C': /* center text around h,v */
                s++;
                GetFontInfo( &info );
                size= stringwidth( s );
                h = h - size/2;
                break;

        case '~': /* print ~   */
        default:
                break;
        }
     }

    MoveTo( h, v );
    drawstring( s );
    }
```

BEST AVAILABLE COPY

```
#define     transparent     36

#include    "standard.h"
#include    "glue.h"
#include    "tglMain.h"
#include    "sniSnip.h"
#include    "liblibrary.h"
#include    "picPICTfns.h"
#include    "cmpcompress.h"
#include    "grfGraphics.h"
#include    "fileAccess.h"

extern void        tglIncludeMenu( void );

/* -----------------------------------------
 *
 *                         Constants
 *
 * ----------------------------------------- */
#define SIZE_RECT( RECT, SIZE )                 \
        SIZE.v = RECT.bottom - RECT.top;        \
        SIZE.h = RECT.right - RECT.left;

/* -----------------------------------------
 *
 *                         Variables
 *
 * ----------------------------------------- */
            sniPicBufferT       sniBufRecs[MAXBUF];
static sniPicBufferPT   pCurBuf;
static Rect             FullScreenRect          = { 0, 0, 480, 640 };
static Rect             EmptyR                      = { -1, -1, -2, -2 };
static Point            AnchorPoint;
static Rect             ScreenSelection         = { -1, -1, -2, -2 };
static Rect             PreDragSelection;
static Boolean              JustPasted              = FALSE;

static SFTypeList       typePICT                = { 'PICT' };
static SFTypeList       typeSNIP                = { 'SNIP' };
static SFTypeList       typeGUST                = { 'GUST' };
static OSType               osTypePICT              = { 'PICT' };
static OSType               osTypeSNIP              = { 'SNIP' };
static OSType               osTypeGUST                  = { 'GUST' };
static Point            DialogLocation          = { 150, 100 };
static SFReply              FileReply;
static Point            sniLastMouseLoc;
/* -----------------------------------------
 *
 *                         Prototypes
 *
 * ----------------------------------------- */
void sniFrameRect( Rect r );
void sniReorderRect( Rect *r );
void sniToggleMenu( Boolean *menuVisible, Boolean turnOn );

/************************************************************
 * sniInitialize initializes the various snip buffers.  It must
 * be called before any other snip function.
 ************************************************************/
void sniInitialize()
{
        Int32T          i;

        /* Prepare  off-screen pixmaps */
        for( i=0; i < MAXBUF; i++ ) {

                pCurBuf= &sniBufRecs[i];
```

BEST AVAILABLE COPY

```
                pCurBuf->BufferIndex= 1 + i;

                pCurBuf->pPort= (CGrafPtr) NewPtr( sizeof(CGrafPort));
                OpenCPort( pCurBuf->pPort );
                pCurBuf->hPixMap= (pCurBuf->pPort)->portPixMap;

                pCurBuf->pBits= NewPtr( TGL_cSCREEN_BYTES );
                (*(pCurBuf->hPixMap))->baseAddr= pCurBuf->pBits;
                (*(pCurBuf->hPixMap))->rowBytes= 0x8000 | 640;
                (*(pCurBuf->hPixMap))->bounds= FullScreenRect;

                SetPort( (GrafPtr) pCurBuf->pPort );

                RGBBackColor( &tglRgbWhite );
                RGBForeColor( &tglRgbBlack );
                EraseRect( &FullScreenRect );
                pCurBuf->SnipRect= EmptyR;
                pCurBuf->bSnipDefined= FALSE;
        }

        pCurBuf= &sniBufRecs[0];                /* start w/ first buffer */

}


/*********************************************************************
 * sniFrameRect draws a frame rect in xor mode for easy unhiliting
 * R is the rect to be drawn
 *********************************************************************/
void sniFrameRect( Rect r )
{
        PenState        state;

        GetPenState( &state );
        PenMode( patXor );
        FrameRect( &r );
        SetPenState( &state );

}

/*********************************************************************
 * sniReorderRect makes sure that the top is above the bottom and
 * the left is left of the right, or it rearranges the rectangle
 *********************************************************************/
void sniReorderRect( Rect *r )
{
        Int16T          temp;

        if (r->top > r->bottom) {
                temp = r->top;
                r->top = r->bottom;
                r->bottom = temp;
        }
        if (r->left > r->right) {
                temp = r->left;
                r->left = r->right;
                r->right = temp;
        }
}


Boolean         sniPointInSnip( Point where )
{

        return (PtInRect( where, &ScreenSelection ));

}
/* ___________________________________
```

sniSnip.c

BEST AVAILABLE COPY

```
 *
 *                    Define new snip
 *
 * ------------------------------------------------------- */
void sniStartDefine( Point where )
{
        /*
         * always find the anchor point for later rubber
         * banding
         */
        AnchorPoint = where;


        /*
         * Copy whatever is currently on the screen into the off-screen
         * buffer, since defining a new snip cements the previous snip
         */
        sniFrameRect( ScreenSelection );                /* OFF */
        sniCopySelection( SNI_BUF_TO_BUF );
        pCurBuf->SnipRect = ScreenSelection;
        pCurBuf->bSnipDefined = !EmptyRect( &pCurBuf->SnipRect );


        /*
         * the new snip is not yet defined
         */
        ScreenSelection = EmptyR;
        JustPasted = FALSE;
}

void sniExpandSnip( Point mouseLoc )
{

        /*
         * erase old selection frame
         */
        sniFrameRect( ScreenSelection );        /* OFF */

        /*
         * move the selection frame
         */
        TGL_SETRECT( &ScreenSelection, AnchorPoint.h, AnchorPoint.v,
                mouseLoc.h, mouseLoc.v );
        sniReorderRect( &ScreenSelection );

        /*
         * set up new selection frame
         */
        sniFrameRect( ScreenSelection );        /* ON */

}


void sniEndDefine( void )
{

        pCurBuf->SnipRect               = ScreenSelection;
        pCurBuf->bSnipDefined  = !EmptyRect( &pCurBuf->SnipRect );

}

/* ------------------------------------------------------
 *
 *                    Drag snip
 *
 * ------------------------------------------------------ */
void sniStartDrag( Point where )
{
```

BEST AVAILABLE COPY

```
        /*
         * always find the anchor point for later rubber
         * banding
         */
        AnchorPoint = where;


        /*
         * save the position of the snip before dragging
         */
        PreDragSelection = ScreenSelection;
}

void sniMoveSnip( Point mouseLoc )
{
        Rect    r;


        r = ScreenSelection;

        /*
         * erase old selection frame
         */
        sniFrameRect( r );                          /* OFF */


        /*
         * reposition the selection rectangle
         */
        r.top           += mouseLoc.v - AnchorPoint.v;
        r.bottom        += mouseLoc.v - AnchorPoint.v;
        r.left          += mouseLoc.h - AnchorPoint.h;
        r.right         += mouseLoc.h - AnchorPoint.h;


        /*
         * make sure the snip doesn't get off the screen
         */
        if (r.top < 0)          {r.bottom += -r.top;            r.top = 0;}
        if (r.bottom > 480)     {r.top    -= (r.bottom - 480);  r.bottom = 480;}
        if (r.left < 0)         {r.right  += -r.left;           r.left = 0;}
        if (r.right > 640)      {r.left   -= (r.right - 640);   r.right = 640;}

        /*
         * set up new selection frame
         */
        ScreenSelection = r;
        AnchorPoint = mouseLoc;
        sniFrameRect( ScreenSelection );        /* ON */
}


void sniEndDrag( void )
{

        sniFrameRect( ScreenSelection );                    /* OFF */
        sniCopySelection( SNI_BUF_TO_SCREEN_DRAG );
        sniCopySelection( SNI_BUF_TO_SCREEN );
        sniFrameRect( ScreenSelection );                    /* ON */
}


void sniToggleMenu( Boolean *menuWasVisible, Boolean turnOn )
```

BEST AVAILABLE COPY

```
{
	Boolean	inMenuArea;

	if ((turnOn == TRUE) && (*menuWasVisible)) {
		tglToggleMenu();
	}
	else {
		*menuWasVisible = FALSE;
		inMenuArea = (ScreenSelection.top < 20)    && (!EmptyRect( &ScreenSele
		inMenuArea |= ((pCurBuf->SnipRect.top < 20) && (pCurBuf->bSnipDefine
		if ((tglMenuVisible) && inMenuArea) {
			*menuWasVisible = TRUE;
			tglToggleMenu();
		}
	}
}

void sniCopySelection( sniInstructionT instruction )
{
	Point p1;
	Point p2;
	Boolean	menuWasVisible;

	switch (instruction) {

		case SNI_BUF_TO_SCREEN_DRAG:	/* only done after a drag */

			/*
			 * turn the menu off (if necessary) temporarily before moving the ir
			 */
			sniToggleMenu( &menuWasVisible, FALSE );

			/*
			 * copy from the buffer to the screen. Only done after drags
			 */
			CopyBits( (BitMap*) *(pCurBuf->hPixMap), (BitMap*) *(tglMyCWin
				&PreDragSelection, &PreDragSelection, srcCopy, (RgnHandle)

			/*
			 * turn the menu back on
			 */
			sniToggleMenu( &menuWasVisible, TRUE );
			break;

		case SNI_BUF_TO_SCREEN:

			/*
			 * turn the menu off (if necessary) temporarily before moving the ir
			 */
			sniToggleMenu( &menuWasVisible, FALSE );

			if (JustPasted) {
				PicHandle		picH;
				Int32T			offset;
				Int16T			length;

				picH = (PicHandle) NewHandle( 0 );
				length = GetScrap( (Handle) picH, (ResType) 'PICT', (Int32PT) &
				DrawPicture( picH, &ScreenSelection );
			}
			else {
				/*
				 * copy from the buffer to the screen
				 */
				SIZE_RECT( pCurBuf->SnipRect, p1 )
				SIZE_RECT( ScreenSelection, p2 )
				if (!EqualPt( p1, p2 )) {
					TGL_ERROR( "SnipRect is not the same size as screen se
```

```
                }
                CopyBits( (BitMap*) *(pCurBuf->hPixMap), (BitMap*) *(tglMy
                        &pCurBuf->SnipRect, &ScreenSelection, srcCopy, (RgnHa
            }

            /*
             * turn the menu back on
             */
            sniToggleMenu( &menuWasVisible, TRUE );
            break;

        case SNI_SCREEN_TO_BUF:

            /*
             * copy from the screen to the buffer
             */
            CopyBits( (BitMap*) *(tglMyCWindow->portPixMap), (BitMap*) *(p
                &ScreenSelection, &ScreenSelection, srcCopy, (RgnHandle) NU

            break;

        case SNI_BUF_TO_BUF:

            if (JustPasted) {
                PicHandle       picH;
                Int32T              offset;
                Int16T              length;

                picH = (PicHandle) NewHandle( 0 );
                length = GetScrap( (Handle) picH, (ResType) 'PICT', (Int32PT) &
                SetPort( (GrafPtr) pCurBuf->pPort );
                DrawPicture( picH, &ScreenSelection );
                SetPort( (GrafPtr) tglMainCWindow );
            }
            else if (!EmptyRect( &pCurBuf->SnipRect )) {
                CopyBits( (BitMap*) *(pCurBuf->hPixMap), (BitMap*) *(pCur
                    &pCurBuf->SnipRect, &ScreenSelection, srcCopy, (RgnH
            }
    }
}

/*************************************************************
 * sniEraseSelection erases the snip in the current buffer
 *************************************************************/
void sniEraseSelection()
{

    /*
     * erase the selection on the screen and in the buffer
     */
    EraseRect( &ScreenSelection );
    SetPort( (GrafPtr) pCurBuf->pPort );
    EraseRect( &ScreenSelection );
    SetPort( (GrafPtr) tglMainCWindow );

    /*
     * set new empty selections
     */
    ScreenSelection         = EmptyR;
    pCurBuf->SnipRect           = EmptyR;
    pCurBuf->bSnipDefined       = FALSE;
}

/*************************************************************
 * sniChangeBuffer puts a different off-screen buffer onto the
 * screen.
 *************************************************************/
void sniChangeBuffer( Int32T newBuffer )
```

BEST AVAILABLE COPY

```
}
        if( newBuffer < MAXBUF )
                pCurBuf= &sniBufRecs[newBuffer];
        ScreenSelection = pCurBuf->SnipRect;
        sniRedrawScreen();
}

/***********************************************************
 * sniOverlayBuffer puts the image of another buffer on top of
 * the current image on the screen.
 ***********************************************************/
void sniOverlayBuffer( int32T newBuffer )
{
        if( newBuffer < MAXBUF )
                {
                if( sniBufRecs[newBuffer].bSnipDefined )
                        {
                        CopyBits( (BitMap*) *(sniBufRecs[newBuffer].hPixMap),
                                        (BitMap*) *(pCurBuf->hPixMap),
                                        &(sniBufRecs[newBuffer].SnipRect),
                                        &(sniBufRecs[newBuffer].SnipRect),
                                        transparent,
                                        (RgnHandle) NULL
                                      );
                        sniRedrawScreen();

                        }
                }
}

/***********************************************************
 * sniLoadPict puts a pict onto the screen and into the current
 * buffer
 ***********************************************************/
void sniLoadPict()
{
        /* load PICT file and display it */

        SetPort( (GrafPtr) tglMyCWindow );

        /*
         * show cursor
         */
        tglPushCursor();
        tglCursorOnOff( TRUE );

        sfgetfile(  &DialogLocation,
                        "",
                        NULL,
                        1,
                        typePICT,
                        NULL,
                        &FileReply );

        sniRedrawScreen();

        tglPopCursor();
        SetCursor( *tglCrossHairs );

        if( FileReply.good )
                {

                p2cstr( (char *) &FileReply.fName );

        #ifdef THINK_C
                strcpy( pCurBuf->DefaultSaveName, (char *) &FileReply.fName );
        #else
                strcpy( pCurBuf->DefaultSaveName, &FileReply.fName );
```

BEST AVAILABLE COPY

```
#endif
        strcat( pCurBuf->DefaultSaveName, ".s" );
        SetPort( (GrafPtr) pCurBuf->pPort );

        picDrawPictFile2( &FileReply );

        /*
         * set new empty selections
         */
        ScreenSelection           = EmptyR;
        pCurBuf->SnipRect         = EmptyR;
        pCurBuf->bSnipDefined  = FALSE;

        sniRedrawScreen();
    }
}

/*************************************************************
 * sniLoadSnip puts a snip onto the screen and into the current
 * buffer.  It sets the SnipRect for the current buffer to
 * the new snip
 *************************************************************/
void sniLoadSnip()
{
    Int16T      fRefNum;
    Int32T      PicSize;
    char   temp[255];

    SetPort( (GrafPtr) tglMyCWindow );

    /*
     * show cursor
     */
    tglPushCursor();
    tglCursorOnOff( TRUE );

    sfgetfile(  &DialogLocation,
                "",
                NULL,
                1,
                typeSNIP,
                NULL,
                &FileReply );

    tglPopCursor();
    SetCursor( *tglCrossHairs );

    if( FileReply.good )
        {
        libSQZPictPT pPic;

        p2cstr( (char *) &FileReply.fName );

        strcpy( pCurBuf->DefaultSaveName, (char *) &FileReply.fName );
        SetPort( (GrafPtr) pCurBuf->pPort );

        EraseRect( &tglScreenRect );

        fsopen( (char *) FileReply.fName, FileReply.vRefNum, &fRefNum );

        GetEOF( fRefNum, &PicSize);
        pPic= (libSQZPictPT) NewPtr( PicSize );

        SetFPos( fRefNum, 1, 0 );
        FSRead( fRefNum, &PicSize, (Ptr) pPic );
        FSClose( fRefNum );
```

BEST AVAILABLE COPY

```
        If( pPic->Signature == libSnipSignature &&
          pPic->Version <= libSysVersion
         )
            {
            Rect            r;
            CGrafPtr        pWorkPort;
            PixMapHandle    hWorkMap;
            Ptr                     pWorkBits;

            /* Create an off-screen grafport */

            pWorkPort= (CGrafPtr) NewPtr( sizeof(CGrafPort));
            OpenCPort( pWorkPort );
            hWorkMap= pWorkPort->portPixMap;

            pWorkBits= NewPtr( TGL_cSCREEN_BYTES );
            (*hWorkMap)->baseAddr= pWorkBits;
            (*hWorkMap)->rowBytes= 0x8000 | 640;
            (*hWorkMap)->bounds= FullScreenRect;

            SetPort((GrafPtr)  pWorkPort );

            RGBBackColor( &tglRgbWhite );
            RGBForeColor( &tglRgbBlack );

            cmpExpand4( pPic, hWorkMap, &r );

            CopyBits( (BitMap*) *hWorkMap,
                    (BitMap*) *(pCurBuf->hPixMap),
                    &r,
                    &r,
                    srcCopy,
                    (RgnHandle) NULL
                   );

            DisposPtr( pWorkBits );
            CloseCPort( pWorkPort );
            DisposPtr( (Ptr) pWorkPort );


            /*
             * set new selections
             */
            ScreenSelection             = r;
            pCurBuf->SnipRect           = r;
            pCurBuf->bSnipDefined = !EmptyRect( &pCurBuf->SnipRect );

            }       /* end block */

        DisposPtr( (Ptr) pPic );
        }

    sniRedrawScreen();
}


void sniWriteOutSnip( char *name, Int16T vRefNum )
{
    libSQZPictPT        pCompBits;
    Int32T                  CompPixNum;
    Int16T                  fRefNum;
    OSErr                   err;
    char                error[50];
    char                *extraP;

    pCompBits= (libSQZPictPT) NewPtr( TGL_cSCREEN_BYTES );
```

```
CompPixNum= cmpFastCompress4( pCurBuf->hPixMap, pCompBits, &(pCurBuf

err = create( (char *) name, vRefNum, osTypeGUST, osTypeSNIP);
if (err != noErr) {
      sprintf( error, "Couldn't create file for snip: %s", name );
      TGL_ERROR( error );
}
```

BEST AVAILABLE COPY

```
err = fsopen( (char *) name, vRefNum, &fRefNum );
if (err != noErr) {
      sprintf( error, "Couldn't open file for snip: %s", name );
      TGL_ERROR( error );
}

err = SetFPos( fRefNum, 1, 0 );
if (err != noErr) {
      TGL_ERROR( "Couldn't set position in file for snip" );
}

err = FSWrite( fRefNum, &CompPixNum, (Ptr) pCompBits );
if (err != noErr) {
      TGL_ERROR( "Couldn't write snip into file" );
}

err = FSClose( fRefNum );
if (err != noErr) {
      TGL_ERROR( "Couldn't close file for snip" );
}

err = flushvol( NULL, vRefNum );
if (err != noErr) {
      TGL_ERROR( "Couldn't flush volume" );
}

DisposPtr( (Ptr) pCompBits );

}

/*************************************************************
 * sniSaveSnip saves the SnipRect of the current buffer as
 * a snip into a file
 *************************************************************/
void sniSaveSnip()
{
      /* save current image as snip*/
      SetPort( (GrafPtr) tglMyCWindow );

      /*
       * show cursor
       */
      tglPushCursor();
      tglCursorOnOff( TRUE );
      SetCursor( &arrow );

      sfputfile(    &DialogLocation,
                          "Snippet file name: ",
                          pCurBuf->DefaultSaveName,
                          NULL,
                          &FileReply );

      sniRedrawScreen();

      /*
       * turn selection frame off temporarily
       */
      sniFrameRect( ScreenSelection );          /* OFF */

      tglPopCursor();
```

```
	SetCursor( *tglCrossHairs );
	if( FileReply.good )
		{
		p2cstr( (char *) &FileReply.fName );
		sniWriteOutSnip( (char *) FileReply.fName, FileReply.vRefNum );
		};

	/*
	 * turn selection frame back on
	 */
	sniFrameRect( ScreenSelection );		/* ON */
}
```

BEST AVAILABLE COPY

```
/*************************************************************
 * sniSavePict saves the SnipRect of the current buffer as
 * a pict into a file
 *************************************************************/
void sniSavePict()
{
	PicHandle		hPICT;
	Int16T				fRefNum;
	Int32T				CompPixNum;

	/*
	 * show cursor
	 */
	tglPushCursor();
	tglCursorOnOff( TRUE );

	/* save current image as PICT */
	SetPort( (GrafPtr) tglMyCWindow );

	sfputfile(	&DialogLocation,
				"PICT file name: ",
				pCurBuf->DefaultSaveName,
				NULL,
				&FileReply );

	sniRedrawScreen();

	/*
	 * turn selection frame off for old selection
	 */
	if (pCurBuf->bSnipDefined) {
		sniFrameRect( ScreenSelection );		/* OFF */
	}

	tglPopCursor();
	SetCursor( *tglCrossHairs );
	if( FileReply.good )
		{
		p2cstr( (char *) &FileReply.fName );

		ClipRect( &tglScreenRect );

		hPICT= OpenPicture( &tglScreenRect );

		CopyBits( (BitMap*) *(pCurBuf->hPixMap),
				(BitMap*) *(tglMyCWindow->portPixMap),
				&tglScreenRect, &tglScreenRect,
				srcCopy,
				(RgnHandle) NULL );

		ClosePicture();

		create( (char *) &FileReply.fName, FileReply.vRefNum, osTypeGUST, os
		fsopen( (char *) FileReply.fName, FileReply.vRefNum, &fRefNum );
		SetFPos( fRefNum, 1, 0 );
```

```
        HLock( (Handle) hPICT );
        CompPixNum= 512;
        FSWrite( fRefNum, &CompPixNum, (Ptr) (*hPICT) );      /* garbage header

        CompPixNum= GetHandleSize( (Handle) hPICT );
        FSWrite( fRefNum, &CompPixNum, (Ptr) (*hPICT) );
        HUnlock( (Handle) hPICT );

        FSClose( fRefNum );
        flushvol( NULL, FileReply.vRefNum );
        KillPicture( (PicHandle) hPICT );

        }

    /*
     * turn selection frame back on (either the operation was cancelled and
     * we use the old ScreenSelection, or bSnipDefined is not TRUE)
     */
    if (pCurBuf->bSnipDefined) {
        sniFrameRect( ScreenSelection );            /* ON */
    }

}


/**************************************************************
 * snisniRedrawScreen redraws the current buffer onto the screen,
 * including the rectangle corresponding to the SnipRect for
 * the buffer, which is drawn in XOR mode for easy erasing
 **************************************************************/
void sniRedrawScreen()
{

    /*
     * make sure to include the menu region if necessary
     */
    tglIncludeMenu();

    SetPort( (GrafPtr) tglMyCWindow );


    /*
     * copy buffer to screen
     */
    CopyBits( (BitMap*) *(pCurBuf->hPixMap), (BitMap*) *(tglMyCWindow->por
        &tglScreenRect, &tglScreenRect, srcCopy, (RgnHandle) NULL );

    /*
     * draw selection frame if there's a snip defined
     */
    if( pCurBuf->bSnipDefined ) {

        /*
         * if the current selection is newer than the buffer's snipRect
         * then show the current selection
         */
        if (!(EqualRect( &ScreenSelection, &pCurBuf->SnipRect ))) {

            sniCopySelection( SNI_BUF_TO_SCREEN );
            sniFrameRect( ScreenSelection );      /* ON */

        }


        /*
         * otherwise just show the buffer's snipRect
         */
```

BEST AVAILABLE COPY

```
        else {

                sniFrameRect( pCurBuf->SnipRect );          /* ON */
        }
    }
}
```

BEST AVAILABLE COPY

```
/**************************************************************************
 * sniCurrentSnip compresses the current buffers snip rect and returns it
 * along with its size. This is done in advance of saving a snip to a file
 **************************************************************************
void sniCurrentSnip( Ptr *snipP, Int32PT sizeP )
{

    *snipP = NewPtr( TGL_cSCREEN_BYTES );
    *sizeP = cmpFastCompress4( pCurBuf->hPixMap, (libSQZPictPT) *snipP,
            &(pCurBuf->SnipRect) );
}


/**************************************************************************
 * sniPaste puts whatever is in the scrap in the middle of the screen
 * and makes it the current selection
 **************************************************************************
void sniPaste( void )
{
    PicHandle       picH;
    Int16T              length;
    Int16T              offset;
    Point           center;
    Rect            r;

    picH = (PicHandle) NewHandle( 0 );
    length = GetScrap( (Handle) picH, (ResType) 'PICT', (Int32PT) &offset );
    if (length < 0) {
        return;
    }
    else {

        /* ditch the old selection frame */
        sniFrameRect( ScreenSelection );        /* OFF */

        /*
         * put up the pict
         */
        r = (**picH).picFrame;
        DrawPicture( picH, &r );
        ScreenSelection = r;
        JustPasted = TRUE;
        pCurBuf->SnipRect = EmptyR;
        pCurBuf->bSnipDefined = FALSE;

        /* put up the new selection frame */
        sniFrameRect( ScreenSelection );        /* ON */

    }
}

void sniCopy( void )
{
    PicHandle   picH;
    Int32T          err;

    if (!pCurBuf->bSnipDefined) {
```

```
		TGL_ERROR( "Nothing defined to copy" );
	}

	picH = OpenPicture( &pCurBuf->SnipRect );
	HLock( (Handle) pCurBuf->hPixMap );
	CopyBits( (BitMap*) *(pCurBuf->hPixMap), (BitMap*) *(tglMyCWindow->portPi›
		&pCurBuf->SnipRect, &pCurBuf->SnipRect, srcCopy, (RgnHandle) NULL );
	HUnlock( (Handle) pCurBuf->hPixMap );
	ClosePicture();

	ZeroScrap();
	HLock( (Handle) picH );
	if ( PutScrap( GetHandleSize( (Handle) picH ), 'PICT', *picH ) != noErr) {
		TGL_ERROR( "Couldn't copy" );
	}
	HUnlock( (Handle) picH );
	DisposPtr( (Handle) picH );

}


/**********************************************************************
 * sniNudgeSelection moves the current selection rectangle and maybe the
 * snip defined within the selection rectangle. The arrow keys alone
 * move the snip and the snipRect. With the shift key down, they move
 * the snipRect but not the snip. With the option key down, they move the
 * right and bottom walls of the snip in and out. With the control key
 * down, they move the top and left walls of the snip in and out.
 **********************************************************************
void sniNudgeSelection( char direction, Int16T modifiers )
{
	Int16T		option;
	Int16T		control;
	Int16T		shift;
	Int16T		plain;
	Rect		r;

	if (!pCurBuf->bSnipDefined) {
		return;
	}

	option	= modifiers & optionKey;
	control = modifiers & controlKey;
	shift	= modifiers & shiftKey;
	plain	= !(option || control || shift);


	/*
	 * the plain arrow keys work as if the mouse were being moved to extend
	 * the selection rectangle, but the modified keys define a new snip,
	 * so the selection should be saved first
	 */
	if (!plain) {

		sniFuseSelections();
		r		= pCurBuf->SnipRect;
	}
	else {

		r		= ScreenSelection;
	}


	/*
	 * hide old selection frame
	 */
	sniFrameRect( r );		/* OFF */
```

BEST AVAILABLE COPY

```
switch (direction) {

	/* left */ case 0x1c:

		if (plain) {
			if (r.left > tglScreenRect.left) {
				r.left--;
				r.right--;
			}
		}
		else if (shift) {
			if (r.left > tglScreenRect.left) {
				r.left--;
				r.right--;
			}
		}
		else if (option) {
			if (r.right > r.left) {
				r.right--;
			}
		}
		else if (control) {
			if (r.left > tglScreenRect.left) {
				r.left--;
			}
		}
		break;

	/* right */ case 0x1d:

		if (plain) {
			if (r.right < tglScreenRect.right) {
				r.left++;
				r.right++;
			}
		}
		else if (shift) {
			if (r.right < tglScreenRect.right) {
				r.left++;
				r.right++;
			}
		}
		else if (option) {
			if (r.right < tglScreenRect.right) {
				r.right++;
			}
		}
		else if (control) {
			if (r.left < r.right) {
				r.left++;
			}
		}
		break;

	/* up */ case 0x1e:

		if (plain) {
			if (r.top > tglScreenRect.top) {
				r.top--;
				r.bottom--;
			}
		}
		else if (shift) {
			if (r.top > tglScreenRect.top) {
				r.top--;
```

BEST AVAILABLE COPY

```
                        r.bottom--;
                }
        }
        else if (option) {
                if (r.bottom > r.top) {
                        r.bottom--;
                }
        }
        else if (control) {
                if (r.top > tglScreenRect.top) {
                        r.top--;
                }
        }
        break;

/* bottom */ case 0x1f:

        if (plain) {
                if (r.bottom < tglScreenRect.bottom) {
                        r.top++;
                        r.bottom++;
                }
        }
        else if (shift) {
                if (r.bottom < tglScreenRect.bottom) {
                        r.top++;
                        r.bottom++;
                }
        }
        else if (option) {
                if (r.bottom < tglScreenRect.bottom) {
                        r.bottom++;
                }
        }
        else if (control) {
                if (r.bottom > r.top) {
                        r.top++;
                }
        }
        break;
}

/*
 * set the new selections
 */
if (plain) {

        PreDragSelection = ScreenSelection;
        sniCopySelection( SNI_BUF_TO_SCREEN_DRAG );
        ScreenSelection = r;
        sniCopySelection( SNI_BUF_TO_SCREEN );
}
else {
        ScreenSelection = r;
        pCurBuf->SnipRect = r;
        pCurBuf->bSnipDefined = !EmptyRect( &pCurBuf->SnipRect );
}

/*
 * turn on the new selection frame
 */
sniFrameRect( r );              /* ON */

/*
 * write the new coordinates
```

BEST AVAILABLE COPY

BEST AVAILABLE COPY

```
	 */
	sniWriteCoordinates( TRUE );
}

void sniFuseSelections( void )
{
	if (!EqualRect( &ScreenSelection, &pCurBuf->SnipRect )) {
		sniFrameRect( ScreenSelection );		/* OFF */
		sniCopySelection( SNI_BUF_TO_BUF );
		sniFrameRect( ScreenSelection );		/* ON */
		pCurBuf->SnipRect = ScreenSelection;
		pCurBuf->bSnipDefined = !EmptyRect( &pCurBuf->SnipRect );
		JustPasted = FALSE;
	}
}

void sniCopyScreenToBuf( void )
{
	CopyBits( (BitMap*) *(tglMyCWindow->portPixMap), (BitMap*) *(pCurBuf->hPix
		&tglScreenRect, &tglScreenRect, srcCopy, (RgnHandle) NULL );
}

void sniPutUpSnip( char *name )
{
	Handle		hSnip;
	Rect	r;
	Boolean turnMenuBackOn = FALSE;
	Rect	menuR;

	/*
	 * get the snip and its rectangle
	 */
	hSnip = libGetPicHandle( libApLib[libCurrentLibIndex].libData,
		libApLib[libCurrentLibIndex].vRefNum, name, FALSE, TRUE );
	libGetPicRect( hSnip, &r );

	/*
	 * turn off the current selection frame
	 */
	sniFrameRect( ScreenSelection );		/* OFF */

	/*
	 * if the new snip goes in the menu area, turn off the menu before drawing it
	 */
	TGL_SETRECT( &menuR, 0, 0, 640, 20 );
	SectRect( &r, &menuR, &menuR );
	if (!EmptyRect( &menuR ) && tglMenuVisible) {
		tglToggleMenu();
		turnMenuBackOn = TRUE;
	}

	/*
	 * draw the snip on the screen
	 */
	grfDrawPic( hSnip, NULL );

	/*
	 * copy the snip to the buffer and set the new selection rects
	 */
	ScreenSelection = r;
	sniCopySelection( SNI_SCREEN_TO_BUF );
	pCurBuf->SnipRect = r;
	pCurBuf->bSnipDefined = !EmptyRect( &pCurBuf->SnipRect );

	/*
	 * turn on new selection frame
	 */
	sniFrameRect( ScreenSelection );		/* ON */
```

```
        /*
         * turn the menu back on
         */
        if (turnMenuBackOn) {
                tglToggleMenu();
        }

}


void sniWriteCoordinates( Boolean forceRedraw )
{
        Rect            r;
        char            mouseString[256];
        Point           mouseLoc;

        /*
         * mouse move?
         */
        GetMouse( &mouseLoc );
        if (!forceRedraw && (mouseLoc.h == sniLastMouseLoc.h) && (mouseLoc.v == sni
                return;
        }
        else {
                sniLastMouseLoc = mouseLoc;
        }

        /*
         * Erase old coordinates
         */
        SetPort( (GrafPtr) tglCoordinateWindow );
        TGL_SETRECT( &r, 0, 0, 300, 50 );
        EraseRect( &r );

        /*
         * get new ones
         */
        if ( !EmptyRect( &ScreenSelection ) ) {
                r = ScreenSelection;
                sprintf( mouseString, "m(%3.3d,%3.3d) o(%3.3d,%3.3d) s(%3.3d,%3.3d)",
                        mouseLoc.v, mouseLoc.h, r.top, r.left,
                        r.bottom - r.top, r.right - r.left);
        }
        else if (pCurBuf->bSnipDefined) {
                r = pCurBuf->SnipRect;
                sprintf( mouseString, "m(%3.3d,%3.3d) o(%3.3d,%3.3d) s(%3.3d,%3.3d)",
                        mouseLoc.v, mouseLoc.h, r.top, r.left,
                        r.bottom - r.top, r.right - r.left);
        }
        else {
                sprintf( mouseString, "m(%3.3d,%3.3d)", mouseLoc.v, mouseLoc.h );
        }


        /*
         * show the coordinates
         */
        TextSize( 10 );
        MoveTo( 0, 15 );
        drawstring( mouseString );

        SetPort( (GrafPtr) tglMyCWindow );

}
```

BEST AVAILABLE COPY

```
/*
 * File snpSnapshot.c
 */

#ifdef THINK_C

	/* macheaders as well */
	#include	<color.h>
	#include	<colortoolbox.h>
	#include	<stdio.h>
	#include	<stdlib.h>
	#include	<ctype.h>
	#include	<math.h>
	#include	<string.h>

#else

		#include	<types.h>
		#include	<memory.h>
		#include	<palette.h>
		#include	<quickdraw.h>
		#include	<toolutils.h>
		#include	<fonts.h>
		#include	<events.h>
		#include	<windows.h>
		#include	<dialogs.h>
		#include	<menus.h>
		#include	<desk.h>
		#include	<textedit.h>
		#include	<scrap.h>
		#include	<segload.h>
		#include	<packages.h>
		#include	<errors.h>
		#include	<files.h>
		#include	<stdio.h>

	#pragma	segment Seg2

#endif

#include	"standard.h"
#include	"glue.h"
#include	"varFns.h"
#include	"tglMain.h"
#include	"scnScan.h"
#include	"libLibrary.h"
#include	"grfGraphics.h"

#define		EXTGEN	1
#include	"snpSnapshot.h"
#undef		EXTGEN


/*********************************************************************
 *
 SaveWindow3() -- used by (X) command to store image on stack
 *********************************************************************
/
CGrafPtr snpSaveWindow3( pSrcPort, pRect )
	CGrafPtr	pSrcPort;
	Rect	*pRect;
{
	CGrafPtr		pDstPort;
	Ptr			pDstBits;
	PixMapHandle		h_dst, h_src;
```

```
        Int32UT                 top, left, bottom, right;

        h_src= pSrcPort->portPixMap;

        /* create an off-screen grafport */

        pDstPort= (CGrafPtr) NewPtr( sizeof(CGrafPort));
        if( pDstPort == NULL )
              TGL_FATAL_ERROR( "saveWindow3 allocation failed" );

        OpenCPort( pDstPort );
        h_dst= pDstPort->portPixMap;

        left= pRect->left;
        left= left & 0xFFFC;                    /* align on fullword boundary */
        (*h_dst)->bounds.left= left;

        right= pRect->right;
        right= (right + 3) & 0xFFFC;        /* align on fullword boundary */
        (*h_dst)->bounds.right= right;

        top= pRect->top;
        (*h_dst)->bounds.top= top;

        bottom= pRect->bottom;
        (*h_dst)->bounds.bottom= bottom;

        pDstBits= NewPtr( (Int32T) (bottom - top) * (right - left) );
        if( pDstBits == NULL )
              TGL_FATAL_ERROR( "saveWindow3 allocation failed" );

        (*h_dst)->baseAddr= pDstBits;
        (*h_dst)->rowBytes= 0x8000 | (right- left);
        (*h_dst)->bounds= *pRect;

        SetPort( (GrafPtr) pDstPort );
        RGBForeColor( &tglRgbBlack );
        RGBBackColor( &tglRgbWhite );

        /* transfer image to new (smaller) grafport */
        CopyBits( (BitMap*) *h_src,
                (BitMap*) *h_dst,
                pRect,
                pRect,
                (Int32T) 0,
                (RgnHandle) NULL
                );

        return( pDstPort );
}


/*********************************************************************
*
 RestoreWindow3() -- used to restore image from stack of saved images
*********************************************************************
/
void snpRestoreWindow3( effect, pSrcPort )
      Int32T effect;
      CGrafPtr pSrcPort;
{
      Rect *pRect;

      tglPushCursor();
      tglCursorOnOff(FALSE);

      SetPort( (GrafPtr) tglMyCWindow );
```

BEST AVAILABLE COPY

```
if( pSrcPort == NULL ) return;

pRect= &( (*(pSrcPort->portPixMap))->bounds );

      if (tglSpeedup) effect = effect < 7 ? 0 : effect == 8 ? 108 : 9;
      switch( effect )
            {
            case 0:
                  grfAsmDrawDestSrc( tglHCurPixMap, pRect, pSrcPort->portPi
                  break;
            case 1:
                  grfWipeDnDestSrc( tglHCurPixMap, pRect, pSrcPort->portPixM
                  break;
            case 2:
                  grfWipeUpDestSrc( tglHCurPixMap, pRect, pSrcPort->portPixM
                  break;
            case 4:
                  /* Smear( hSnip, hFullPic, here, there ); */
                  /* sprintf( VarTab[ CommandRecord.VarNum ],"%ld,%ld", th
                  break;
            case 5:
                  grfWipeLeftDestSrc( tglHCurPixMap, pRect, pSrcPort->portPi
                  break;
            case 6:
                  grfWipeRightDestSrc( tglHCurPixMap, pRect, pSrcPort->portF
                  break;
            case 7:
                  grfDissolveDestSrc( tglHCurPixMap, pRect, pSrcPort->portPixl
                  break;
            case 8:
                  grfFadeoutDestSrc( tglHCurPixMap, pRect, pSrcPort->portPix
                  break;
            case 108:
                  grfFadeoutDestSrc( tglHCurPixMap, pRect, pSrcPort->portPix
                  break;
            case 9:
                  grfMDrawDestSrc( tglHCurPixMap, pRect, pSrcPort->portPixM
                  break;
            case 999:
                  /*  do nothing  */
                  break;
            default:
                  /* error */
                  break;
            }
      DisposPtr( (*(pSrcPort->portPixMap))->baseAddr );        /* get rid of pixels */
      CloseCPort( pSrcPort );                                  /* and port */
      tglPopCursor();
}


/***********************************************************************
 * snpSaveBoxUnderDialog saves a snapshot of the current screen
 * before a dialog box is put up in that space.  ResourceId is the
 * resource number of the dialog that will be put up.
 ***********************************************************************/
CGrafPtr snpSaveBoxUnderDialog( Int16T resourceId, ResType type )
{
      Rect              picRect;
      GrafPtr                 port;
      DialogTHndl             dialogTemplateH;
      RGBColor                foreColor;
      RGBColor                backColor;
      CGrafPtr          image;

      dialogTemplateH = (DialogTHndl) GetResource( type, resourceId );
```

BEST AVAILABLE COPY

```
	if (dialogTemplateH == NULL) {
		TGL_ERROR( "Didn't find dialog" );
	}
	picRect = (**dialogTemplateH).boundsRect;
	InsetRect( &picRect, -20, -20 );

	GetForeColor( &foreColor );
	GetBackColor( &backColor );

	RGBForeColor( &tglRgbBlack );
	RGBBackColor( &tglRgbWhite );

	image = snpSaveWindow3( tglMainCWindow, &picRect );

	RGBForeColor( &foreColor );
	RGBBackColor( &backColor );


	/*
	 * make sure we can see the cursor, and that it's an arrow
	 */
	tglPushCursor();
	tglCursorOnOff( TGL_ON );
	SetCursor( &arrow );

	return( image );
}

/*********************************************************************
 * snpRestoreBoxUnderDialog restores an image saved with snpSaveBoxUnderDialog
 *********************************************************************/
void snpRestoreBoxUnderDialog( CGrafPtr *oldImageP )
{
	RGBColor	foreColor;
	RGBColor	backColor;

	GetForeColor( &foreColor );
	GetBackColor( &backColor );

	RGBForeColor( &tglRgbBlack );
	RGBBackColor( &tglRgbWhite );

	snpRestoreWindow3( 0, *oldImageP );
	*oldImageP = NULL;

	RGBForeColor( &foreColor );
	RGBBackColor( &backColor );

	/*
	 * restore the cursor
	 */
	tglPopCursor();
}
```

BEST AVAILABLE COPY

```
/* Tax Rate Calculator Code                         */
/* CitiBank Money Advisor          */
/* Tax Calc.c              */
/* 1/28/90 - JDT            */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};       /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10


/* More Local variables */
static char hold_gi[VAR_MAXVARLEN];
static char hold_td[VAR_MAXVARLEN];
static Boolean two_s;

void taxCalcSetup( void )
{
        Point lp;
        char  temp[32];
        Handle      hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
```

BEST AVAILABLE COPY

```
		}
	}

	if (strlen(varPtr(taxNexempt))==0) strcpy(varPtr(taxNexempt),"1");

	if (strlen(varPtr(taxRes))==0) strcpy(varPtr(taxRes),"New York");

	/* Two screens ? */
	two_s = tglNumVisibleScreens == 2;

	PutSnipT("blank tax.s", NULL);

	/* Text */
	taxcalccolor(OUR_HUE);

	/* Default values */
	ip = topLeft(agross_rect);
	ip.h += 147; ip.v += 13;
	MoveTo2(ip.h, ip.v);
	formatNumber(temp,varPtr(vGrossIncome),INPUT_WIDTH,TRUE,0,FALSE,' ',TRUE,
	drawstring2(temp);
	ip = topLeft(nexempt_rect);
	ip.h += 147; ip.v += 13;
	MoveTo2(ip.h, ip.v);
	drawstring2(varPtr(taxNexempt));
	ip = topLeft(deduct_rect);
	ip.h += 147; ip.v += 13;
	MoveTo2(ip.h, ip.v);
	drawstring2(varPtr(taxDeduct));
	ip = topLeft(fstatus_rect);
	ip.h += 147; ip.v += 12;
	MoveTo2(ip.h, ip.v);
	drawstring2(varPtr(taxFstatus));
	ip = topLeft(res_rect);
	ip.h += 147; ip.v += 12;
	MoveTo2(ip.h, ip.v);
	drawstring2(varPtr(taxRes));
	tax_rate();
}


Boolean taxCalcMouseDown( Point where )
{
	Rect	ar;
	Point	ip;


	/*
	 * point in close box
	 */
	if (PtInRect(where, &close_rect)) {

		tchBeepNow(TCH_GOOD_BEEP);
		return (TRUE);
	}


	/*
	 * point in Gross Income box
	 */
	else if (PtInRect(where, &agross_rect)) {

		tglCursorOnOff(TGL_OFF);
		tax_rate();
		taxcalccolor(OUR_HUE);
		ar = agross_rect;
```

BEST AVAILABLE COPY

BEST AVAILABLE COPY

```
            ar.top -= 2; ar.right -= 130;
            grfInterchange2(246L, 255L, &ar);
            grfInterchange2(7L, 254L, &ar);
            tchBeepNow(TCH_GOOD_BEEP);
            grfInterchange2(255L, 246L, &ar);
            grfInterchange2(254L, 7L, &ar);
            tglCursorOnOff(TGL_ON);
            ip = topLeft(agross_rect);
            ip.h += 147; ip.v += 12;
            ar = agross_rect;
            ar.left += 146; ar.top++; ar.bottom--;

            /*
             * set up the edit gopher
             */
            edtEditLen = INPUT_WIDTH;
            tglEditGopher->StartHandler();
            tglEditGopher->EditSetup(ip,varPtr(vGrossIncome),TRUE,vGrossIncome,tw
INPUT_WIDTH, 0,
                    FALSE, FALSE, '$', &ar);

        }


        /*
         * point in number of exemptions box
         */
        else if (PtInRect(where, &nexempt_rect)) {

            tglCursorOnOff(TGL_OFF);
            tax_rate();
            taxcalccolor(OUR_HUE);
            ar = nexempt_rect;
            ar.top -= 2; ar.right -= 130;
            grfInterchange2(2L, 255L, &ar);
            grfInterchange2(246L, 254L, &ar);
            tchBeepNow(TCH_GOOD_BEEP);
            grfInterchange2(255L, 2L, &ar);
            grfInterchange2(254L, 246L, &ar);
            tglCursorOnOff(TGL_ON);
            ip = topLeft(nexempt_rect);
            ip.h += 147; ip.v += 12;
            ar = nexempt_rect;
            ar.left += 146; ar.top++; ar.bottom--;

            /*
             * set up edit gopher
             */
            edtEditLen = 2;
            tglEditGopher->StartHandler();
            tglEditGopher->EditSetup(ip,varPtr(taxNexempt),TRUE,taxNexempt,two_
FALSE, FALSE, '\0', &ar);

    }


    /*
     * point in deduction box
     */
        else if (PtInRect(where, &deduct_rect)) {

            tglCursorOnOff(TGL_OFF);
            tax_rate();
            taxcalccolor(OUR_HUE);
    ar = deduct_rect;
    ar.top -= 2; ar.right -= 130;
            grfInterchange2(73L, 255L, &ar);
            grfInterchange2(246L, 254L, &ar);
```

```
            tchBeepNow(TCH_GOOD_BEEP);
            grfInterchange2(255L, 73L, &ar);
            grfInterchange2(254L, 246L, &ar);
            tglCursorOnOff(TGL_ON);
```

BEST AVAILABLE COPY

```
            /*
             * standard deduction
             */
            if (strcmp(varPtr(taxDeduct),"Standard")==0) {
                    strcpy(varPtr(taxDeduct),hold_td);
        ip = topLeft(deduct_rect);
            ip.h += 147; ip.v += 12;
        ar = deduct_rect;
        ar.left += 146; ar.top++; ar.bottom--;

                    /*
                     * set up edit gopher
                     */
                    edtEditLen = INPUT_WIDTH;
                    tglEditGopher->StartHandler();
                    tglEditGopher->EditSetup(ip,varPtr(taxDeduct),TRUE,taxDeduct,two_
INPUT_WIDTH, 0, FALSE, FALSE, '$', &ar);
            }

            /*
             * itemized deduction
             */
            else {

                    strcpy(hold_td,varPtr(taxDeduct));
                    taxcalccolor(OUR_HUE);
            ar = deduct_rect;
            ar.left += 147; ar.top += 3;
                    EraseRect2(&ar);
                    strcpy(varPtr(taxDeduct),"Standard");
                    ip = topLeft(deduct_rect);
                    ip.h += 147; ip.v += 12;
                    MoveTo2(ip.h, ip.v);
                    drawstring2(varPtr(taxDeduct));
                    tax_rate();
            }
        }

    /*
     * filing status box
     */
        else if (PtInRect(where, &fstatus_rect)) {

            tglCursorOnOff(TGL_OFF);
            tax_rate();
    ar = fstatus_rect;
    ar.top -= 2; ar.right -= 130;
            grfInterchange2(8L, 255L, &ar);
            grfInterchange2(246L, 254L, &ar);
            tchBeepNow(TCH_GOOD_BEEP);
            grfInterchange2(255L, 8L, &ar);
            grfInterchange2(254L, 246L, &ar);
            tglCursorOnOff(TGL_ON);
            taxcalccolor(OUR_HUE);
     ar = fstatus_rect;
     ar.left += 147; ar.top += 3;
            EraseRect2(&ar);
            switch (varPtr(taxFstatus)[1]) {
                    case 'I': strcpy(varPtr(taxFstatus),"Joint"); break;
```

```
            case 'o': strcpy(varPtr(taxFstatus),"Separate"); break;
            case 'e': strcpy(varPtr(taxFstatus),"Hd. of Household"); break;
            case 'd': strcpy(varPtr(taxFstatus),"Single"); break;
        }
        ip = topLeft(fstatus_rect);
        ip.h += 147; ip.v += 12;
        MoveTo2(ip.h, ip.v);
        drawstring2(varPtr(taxFstatus));
        tax_rate();
    }

/*
 * result box
 */
    else if (PtInRect(where, &res_rect)) {

        tglCursorOnOff(TGL_OFF);
        tax_rate();
  ar = res_rect;
  ar.top -= 2; ar.right -= 130;
        grfInterchange2(114L, 255L, &ar);
        grfInterchange2(246L, 254L, &ar);
        tchBeepNow(TCH_GOOD_BEEP);
        grfInterchange2(255L, 114L, &ar);
        grfInterchange2(254L, 246L, &ar);
        tglCursorOnOff(TGL_ON);
        taxcalccolor(OUR_HUE);
   ar = res_rect;
   ar.left += 147; ar.top += 3;
        EraseRect2(&ar);
        switch (varPtr(taxRes)[8]) {
            case '\0': strcpy(varPtr(taxRes),"New York City"); break;
            case ' ': strcpy(varPtr(taxRes),"New York"); break;
        }
        ip = topLeft(res_rect);
        ip.h += 147; ip.v += 12;
        MoveTo2(ip.h, ip.v);
        drawstring2(varPtr(taxRes));
        tax_rate();
    }


    /*
     * valid touch outside calculator kills calculator
     */
    else if ( tchValidTouch ( &where )) {

        tchBeepNow(TCH_GOOD_BEEP);
        return (TRUE);
    }


    /*
     * any other point is bad
     */
    else {

        tchBeepNow(TCH_BAD_BEEP);
    }


    return (FALSE);
}

Boolean taxCalcKeyDown( EventRecord theEvent )
{
    char   key;
```

BEST AVAILABLE COPY

```
        key = theEvent.message;
        if      (key == '\n' || key == 0x0D ) {
                tax_rate();
                taxcalccolor(OUR_HUE);
                return (TRUE);
        }

        return (FALSE);
}
```

BEST AVAILABLE COPY

```
void taxCalcCleanup( void )
{
        Handle      hSnip;

        strcpy(varPtr(vGrossIncome), hold_gi);
        hSnip = libFindPicPtr("blank tax.s", TRUE);
        HPurge(hSnip);
        scrRestoreColors();

}


Real80T tax_rate()
{
        Real80T fed_tax, state_tax, city_tax, tax, taxable;
        Rect r;
        char temp[40];

        strcpy(temp, varPtr(vGrossIncome));
        strstrip(temp, "$,");
        taxable = varAtof(temp);

        if (varPtr(taxDeduct)[0]=='S' || varPtr(taxDeduct)[0]=='s') {
                /* Standard deduction */
          switch (varPtr(taxFstatus)[1]) {
                case 'i': taxable -= 3100.; break;
                case 'o': taxable -= 5200.; break;
                case 'e': taxable -= 2600.; break;
                case 'd': taxable -= 4550.; break;
          }
        } else {
                /* What you said */
                strcpy(temp, varPtr(taxDeduct));
                strstrip(temp, "$,");
                taxable -= varAtof(temp);
        }
        taxable -= varValF(taxNexempt)         * 2000.;

        fed_tax = state_tax = city_tax = 0.0;
        switch (varPtr(taxFstatus)[1]) {
                /* Single */
          case 'i':
                        if (taxable <= 33400.) {
                                fed_tax = 0.15;
                                state_tax = 0.063;
                        if (varPtr(taxRes)[8] == ' ') city_tax = 0.029;
                } else if (taxable <= 72750.) {
                                fed_tax = 0.28;
                                state_tax = 0.074;
                        if (varPtr(taxRes)[8] == ' ') city_tax = 0.03;
                } else if (taxable <= 137360.) {
                                fed_tax = 0.33;
                                state_tax = 0.079;
                        if (varPtr(taxRes)[8] == ' ') city_tax = 0.031;
                } else {
                                fed_tax = 0.28;
```

```
                state_tax = 0.086;
            if (varPtr(taxRes)[8] == ' ') city_tax = 0.033;
            }
        break;
/* Joint Married */
case 'o':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
/* Seperate Married */
case 'e':
            if (taxable <= 20075.) {
                fed_tax = 0.15;
                state_tax = 0.063;
            if (varPtr(taxRes)[8] == ' ') city_tax = 0.029;
        } else if (taxable <= 42025.) {
                fed_tax = 0.28;
                state_tax = 0.074;
            if (varPtr(taxRes)[8] == ' ') city_tax = 0.03;
        } else if (taxable <= 122495.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
/* Head of Household */
case 'd':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
default:
            fed_tax = 0.28;
            state_tax = 0.079;
        if (varPtr(taxRes)[8] == ' ') city_tax = 0.031;
```

BEST AVAILABLE COPY

BEST AVAILABLE COPY

```
                break;
        }

        tax = fed_tax + state_tax + city_tax;

        /* Show Rate */
        for (scrScreenSet(0, 1); scrScreenSet(1, 1); ) {
                TextFont(3);
                TextSize(12);
                TextFace(bold);
                RGBForeColor(&tglRgbWhite);
                RGBBackColor(&tglRgbBlack);
                r.top = 145; r.left = 357; r.bottom = 160; r.right = 398;
                EraseRect(&r);
        }
        sprintf(temp,"%2.0lf%%",tax*100.0);
        sprintf(varPtr(taxRate),"%2.0lf",tax*100.0);
        MoveTo2(365,157);
        drawstring2(temp);

        for (scrScreenSet(0, 1); scrScreenSet(1, 1); ) {
                scrSetHue(OUR_HUE, &tglTextFont, &tglTextSize, &tglTextFace,
                                        &tglTextFGColor, &tglTextBGColor);
        }
        scrSetHueNow2(OUR_HUE);
        return tax;
}

static void    taxcalccolor(hue)
Int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

Int16T strstrip(s, rid)
char *s;                                        /* The string to str
char *rid;                                      /* Chars to get rid of */
{
        Int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
                cont_do: ;
        } while ( *(s-1) != '\0');
        return count;
```

BEST AVAILABLE COPY

```
}

void grfInterchange2(cf, ct, r)
Int32T cf,ct;
Rect *r;
{
        Rect lr;

        lr = *r;
        for (scrScreenSet(0, 1); scrScreenSet(1, 1); ) {
                grfInterchange(cf, ct, &lr);
        }
}

void EraseRect2(r)
Rect *r;
{
        for (scrScreenSet(0, 1); scrScreenSet(1, 1); ) {
                EraseRect(r);
        }
}

void PutSnipT(name, r)
char *name;                                                     /* Sni
Rect *r;                                                        /* Op
*/
{
        Handle hSnip;
        Rect theRect;
        Point p;

        hSnip= libFindPicPtr( name, TRUE );
        libGetPicRect(hSnip, &theRect);
        p = topLeft(theRect);
        for (scrScreenSet(0, 1); scrScreenSet(1, 1); ) {
                grfMDrawPic(hSnip, &p, 0);
        }
        if (r != NULL) *r = theRect;
}


void MoveTo2(h, v)
Int16T h, v;
{
        for (scrScreenSet(0, 1); scrScreenSet(1, 1); ) {
                MoveTo(h, v);
        }
}

void drawstring2(s)
char *s;
{
        for (scrScreenSet(0, 1); scrScreenSet(1, 1); ) {
                drawstring(s);
        }
}

void scrSetHueNow2(h)
Int16T h;
{
        for (scrScreenSet(0, 1); scrScreenSet(1, 1); ) {
                scrSetHueNow(h);
        }
}

/* Tax Rate Calculator Code                          */
/* CitiBank Money Advisor          */


taxClac.c
```

BEST AVAILABLE COPY

```
/* Tax Calc.c                    */
/* 1/28/90 - JDT                 */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};        /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10



/* More Local variables */
static char hold_gi[VAR_MAXVARLEN];
static char hold_td[VAR_MAXVARLEN];
static Boolean two_s;

void taxCalcSetup( void )
{
        Point ip;
        char  temp[32];
        Handle      hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
                }
        }
```

```
	if (strlen(varPtr(taxNexempt))==0) strcpy(varPtr(taxNexempt),"1");

	if (strlen(varPtr(taxRes))==0) strcpy(varPtr(taxRes),"New York");

	/* Two screens ? */
	two_s = tglNumVisibleScreens == 2;

	PutSnipT("blank tax.s", NULL);

	/* Text */
	taxcalccolor(OUR_HUE);

	/* Default values */
	ip = topLeft(agross_rect);
	ip.h += 147; ip.v += 13;
	MoveTo2(ip.h, ip.v);
	formatNumber(temp,varPtr(vGrossIncome),INPUT_WIDTH,TRUE,0,FALSE,' ',TRUE,
	drawstring2(temp);
	ip = topLeft(nexempt_rect);
	ip.h += 147; ip.v += 13;
	MoveTo2(ip.h, ip.v);
	drawstring2(varPtr(taxNexempt));
	ip = topLeft(deduct_rect);
	ip.h += 147; ip.v += 13;
	MoveTo2(ip.h, ip.v);
	drawstring2(varPtr(taxDeduct));
	ip = topLeft(fstatus_rect);
	ip.h += 147; ip.v += 12;
	MoveTo2(ip.h, ip.v);
	drawstring2(varPtr(taxFstatus));
	ip = topLeft(res_rect);
	ip.h += 147; ip.v += 12;
	MoveTo2(ip.h, ip.v);
	drawstring2(varPtr(taxRes));
	tax_rate();
}


Boolean taxCalcMouseDown( Point where )
{
	Rect  ar;
	Point ip;


	/*
	 * point in close box
	 */
	if (PtInRect(where, &close_rect)) {

		tchBeepNow(TCH_GOOD_BEEP);
		return (TRUE);
	}


	/*
	 * point in Gross Income box
	 */
	else if (PtInRect(where, &agross_rect)) {

		tglCursorOnOff(TGL_OFF);
		tax_rate();
		taxcalccolor(OUR_HUE);
		ar = agross_rect;
		ar.top -= 2; ar.right -= 130;
		grfInterchange2(246L, 255L, &ar);
```

BEST AVAILABLE COPY

```
            grfInterchange2(7L, 254L, &ar);
            tchBeepNow(TCH_GOOD_BEEP);
            grfInterchange2(255L, 246L, &ar);
            grfInterchange2(254L, 7L, &ar);
            tglCursorOnOff(TGL_ON);
            ip = topLeft(agross_rect);
            ip.h += 147; ip.v += 12;
            ar = agross_rect;
            ar.left += 146; ar.top++; ar.bottom--;

            /*
             * set up the edit gopher
             */
            edtEditLen = INPUT_WIDTH;
            tglEditGopher->StartHandler();
            tglEditGopher->EditSetup(ip,varPtr(vGrossIncome),TRUE,vGrossIncome,two
INPUT_WIDTH, 0,
                    FALSE, FALSE, '$', &ar);

      }


      /*
       * point in number of exemptions box
       */
      else if (PtInRect(where, &nexempt_rect)) {

            tglCursorOnOff(TGL_OFF);
            tax_rate();
            taxcalccolor(OUR_HUE);
            ar = nexempt_rect;
            ar.top -= 2; ar.right -= 130;
            grfInterchange2(2L, 255L, &ar);
            grfInterchange2(246L, 254L, &ar);
            tchBeepNow(TCH_GOOD_BEEP);
            grfInterchange2(255L, 2L, &ar);
            grfInterchange2(254L, 246L, &ar);
            tglCursorOnOff(TGL_ON);
            ip = topLeft(nexempt_rect);
            ip.h += 147; ip.v += 12;
            ar = nexempt_rect;
            ar.left += 146; ar.top++; ar.bottom--;

            /*
             * set up edit gopher
             */
            edtEditLen = 2;
            tglEditGopher->StartHandler();
            tglEditGopher->EditSetup(ip,varPtr(taxNexempt),TRUE,taxNexempt,two_s,'
FALSE, FALSE, '\0', &ar);

    }


  /*
   * point in deduction box
   */
      else if (PtInRect(where, &deduct_rect)) {

            tglCursorOnOff(TGL_OFF);
            tax_rate();
            taxcalccolor(OUR_HUE);
    ar = deduct_rect;
    ar.top -= 2; ar.right -= 130;
            grfInterchange2(73L, 255L, &ar);
            grfInterchange2(246L, 254L, &ar);
            tchBeepNow(TCH_GOOD_BEEP);
            grfInterchange2(255L, 73L, &ar);
```

BEST AVAILABLE COPY

BEST AVAILABLE COPY

```
        grfInterchange2(254L, 246L, &ar);
        tglCursorOnOff(TGL_ON);

        /*
         * standard deduction
         */
        if (strcmp(varPtr(taxDeduct),"Standard")==0) {
                strcpy(varPtr(taxDeduct),hold_td);
    ip = topLeft(deduct_rect);
        ip.h += 147; ip.v += 12;
    ar = deduct_rect;
    ar.left += 146; ar.top++; ar.bottom--;

                /*
                 * set up edit gopher
                 */
                edtEditLen = INPUT_WIDTH;
                tglEditGopher->StartHandler();
                tglEditGopher->EditSetup(ip,varPtr(taxDeduct),TRUE,taxDeduct,two_
INPUT_WIDTH, 0, FALSE, FALSE, '$', &ar);
        }

        /*
         * Itemized deduction
         */
        else {

                strcpy(hold_td,varPtr(taxDeduct));
                taxcalccolor(OUR_HUE);
        ar = deduct_rect;
        ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
        }
    }

 /*
  * filing status box
  */
    else if (PtInRect(where, &fstatus_rect)) {

        tglCursorOnOff(TGL_OFF);
        tax_rate();
   ar = fstatus_rect;
   ar.top -= 2; ar.right -= 130;
        grfInterchange2(8L, 255L, &ar);
        grfInterchange2(246L, 254L, &ar);
        tchBeepNow(TCH_GOOD_BEEP);
        grfInterchange2(255L, 8L, &ar);
        grfInterchange2(254L, 246L, &ar);
        tglCursorOnOff(TGL_ON);
        taxcalccolor(OUR_HUE);
    ar = fstatus_rect;
    ar.left += 147; ar.top += 3;
        EraseRect2(&ar);
        switch (varPtr(taxFstatus)[1]) {
                case 'I': strcpy(varPtr(taxFstatus),"Joint"); break;
                case 'o': strcpy(varPtr(taxFstatus),"Separate"); break;
                case 'e': strcpy(varPtr(taxFstatus),"Hd. of Household"); break;
```

```
                case 'd': strcpy(varPtr(taxFstatus), "Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
        }

/*
 * result box
 */
        else if (PtInRect(where, &res_rect)) {

            tglCursorOnOff(TGL_OFF);
            tax_rate();
    ar = res_rect;
    ar.top -= 2; ar.right -= 130;
            grfInterchange2(114L, 255L, &ar);
            grfInterchange2(246L, 254L, &ar);
            tchBeepNow(TCH_GOOD_BEEP);
            grfInterchange2(255L, 114L, &ar);
            grfInterchange2(254L, 246L, &ar);
            tglCursorOnOff(TGL_ON);
            taxcalccolor(OUR_HUE);
        ar = res_rect;
        ar.left += 147; ar.top += 3;
            EraseRect2(&ar);
            switch (varPtr(taxRes)[8]) {
                case '\0': strcpy(varPtr(taxRes), "New York City"); break;
                case ' ': strcpy(varPtr(taxRes), "New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }


        /*
         * valid touch outside calculator kills calculator
         */
        else if ( tchValidTouch ( &where )) {

            tchBeepNow(TCH_GOOD_BEEP);
            return (TRUE);
        }

        /*
         * any other point is bad
         */
        else {

            tchBeepNow(TCH_BAD_BEEP);
        }

        return (FALSE);
}

Boolean taxCalcKeyDown( EventRecord theEvent )
{
        char    key;

        key = theEvent.message;
```

BEST AVAILABLE COPY

```
	if	(key == '\n' || key == 0x0D ) {
		tax_rate();
		taxcalccolor(OUR_HUE);
		return (TRUE);
	}

	return (FALSE);
}
```

BEST AVAILABLE COPY

```
void taxCalcCleanup( void )
{
	Handle	hSnip;

	strcpy(varPtr(vGrossIncome), hold_gi);
	hSnip = libFindPicPtr("blank tax.s", TRUE);
	HPurge(hSnip);
	scrRestoreColors();

}


Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	 switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	 }
	} else {
		/* What you said */
		strcpy(temp, varPtr(taxDeduct));
		strstrip(temp,"$,");
		taxable -= varAtof(temp);
	}
	taxable -= varValF(taxNexempt)	* 2000.;

	fed_tax = state_tax = city_tax = 0.0;
	switch (varPtr(taxFstatus)[1]) {
		/* Single */
	 case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
```

BEST AVAILABLE COPY

```
			}
		break;
	/* Joint Married */
	case 'o':
			if (taxable <= 42150.) {
				fed_tax = 0.15;
				state_tax = 0.063;
			if (varPtr(taxRes)[8] == ' ') city_tax = 0.029;
		} else if (taxable <= 86050.) {
				fed_tax = 0.28;
				state_tax = 0.074;
			if (varPtr(taxRes)[8] == ' ') city_tax = 0.03;
		} else if (taxable <= 166520.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	/* Seperate Married */
	case 'e':
			if (taxable <= 20075.) {
				fed_tax = 0.15;
				state_tax = 0.063;
			if (varPtr(taxRes)[8] == ' ') city_tax = 0.029;
		} else if (taxable <= 42025.) {
				fed_tax = 0.28;
				state_tax = 0.074;
			if (varPtr(taxRes)[8] == ' ') city_tax = 0.03;
		} else if (taxable <= 122495.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	/* Head of Household */
	case 'd':
			if (taxable <= 42150.) {
				fed_tax = 0.15;
				state_tax = 0.063;
			if (varPtr(taxRes)[8] == ' ') city_tax = 0.029;
		} else if (taxable <= 86050.) {
				fed_tax = 0.28;
				state_tax = 0.074;
			if (varPtr(taxRes)[8] == ' ') city_tax = 0.03;
		} else if (taxable <= 166520.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	default:
			fed_tax = 0.28;
			state_tax = 0.079;
		if (varPtr(taxRes)[8] == ' ') city_tax = 0.031;
		break;
	}
```

taxClac.c

```
	tax = fed_tax + state_tax + city_tax;

	/* Show Rate */
	for (scrScreenSet(0, 1); scrScreenSet(1, 1); ) {
		TextFont(3);
		TextSize(12);
		TextFace(bold);
		RGBForeColor(&tglRgbWhite);
		RGBBackColor(&tglRgbBlack);
		r.top = 145; r.left = 357; r.bottom = 160; r.right = 398;
		EraseRect(&r);
	}
	sprintf(temp,"%2.0lf%%",tax*100.0);
	sprintf(varPtr(taxRate),"%2.0lf",tax*100.0);
	MoveTo2(365,157);
	drawstring2(temp);

	for (scrScreenSet(0, 1); scrScreenSet(1, 1); ) {
		scrSetHue(OUR_HUE, &tglTextFont, &tglTextSize, &tglTextFace,
					&tglTextFGColor, &tglTextBGColor);
	}
	scrSetHueNow2(OUR_HUE);
	return tax;
}

static void	taxcalccolor(hue)
Int16T hue;
{
	for (scrScreenSet(0, 1); scrScreenSet(1, 1); ) {
		tglTextFont = 3;
		tglTextSize = 12;
		tglTextFace = normal;
		TGL_SETRGB(tglTextFGColor, 13107, 13107, 39321);
		TGL_SETRGB(tglTextBGColor, 48059, 48059, 48059);

		TextFont(tglTextFont);
		TextSize(tglTextSize);
		TextFace(tglTextFace);
		RGBForeColor(&tglTextFGColor);
		RGBBackColor(&tglTextBGColor );
	}
}

Int16T strstrip(s, rid)
char *s;					/* The string to stri
char *rid;					/* Chars to get rid of */
{
	Int16T i,n,count;
	char *t;

	count=0;
	n = strlen(rid);
	t=s;
	do {
		for (i=0; i<n; i++) {
			if (*s==rid[i]) {
				count++;
				s++;
				goto cont_do;
			}
		}
		*t++ = *s++;
		cont_do: ;
	} while (*(s-1) != '\0');
	return count;
}
```

BEST AVAILABLE COPY

```
void grfInterchange2(cf, ct, r)
int32T cf,ct;
Rect *r;
{
	Rect lr;

	lr = *r;
	for (scrScreenSet(0, 1); scrScreenSet(1, 1); ) {
		grfInterchange(cf, ct, &lr);
	}
}

void EraseRect2(r)
Rect *r;
{
	for (scrScreenSet(0, 1); scrScreenSet(1, 1); ) {
		EraseRect(r);
	}
}

void PutSnipT(name, r)
char *name;                                           /* Sn
Rect *r;                                              /* O|
*/
{
	Handle hSnip;
	Rect theRect;
	Point p;

	hSnip= libFindPicPtr( name, TRUE );
	libGetPicRect(hSnip, &theRect);
	p = topLeft(theRect);
	for (scrScreenSet(0, 1); scrScreenSet(1, 1); ) {
		grfMDrawPic(hSnip, &p, 0);
	}
	if (r != NULL) *r = theRect;
}


void MoveTo2(h, v)
int16T h, v;
{
	for (scrScreenSet(0, 1); scrScreenSet(1, 1); ) {
		MoveTo(h, v);
	}
}

void drawstring2(s)
char *s;
{
	for (scrScreenSet(0, 1); scrScreenSet(1, 1); ) {
		drawstring(s);
	}
}

void scrSetHueNow2(h)
int16T h;
{
	for (scrScreenSet(0, 1); scrScreenSet(1, 1); ) {
		scrSetHueNow(h);
	}
}
```

taxClac.c

BEST AVAILABLE COPY

```
/*	file:	tchTouch.c

	Description: Touch and keyboard routines

*/

#include	"standard.h"
#include	"glue.h"
#include	"tglMain.h"
#include	"scnScan.h"
#include	"libLibrary.h"
#include	"dataStructures.h"
#include	"control.h"

#define		EXTGEN
#include	"tchTouch.h"

/* Beep generation structures */
static struct
{
  Int16T   mode;
  Tone     beep;
} BadBeep
=
{
  swMode,
  { 3709, 255, 10 }
};

static struct
{
  Int16T   mode;
  Tone     beep;
} GoodBeep
=
{
  swMode,
  { 890, 100, 3 }
};

#define		MAXTOUCHAREAS	80L

typedef struct
{
	Rect	r;				/* Touch area coordinates */
	char	Label[ 45 ];		/* program label */
	char	*pSlot;				/* address of variable into which to s:
immediate jumps) */
} T_AREA, *T_AREAP;

T_AREA		*TouchArea;
Int16T		nTouchAreas;

/* global touch (X) save stack */
DatInt16Stack tchXStack;


/* B E E P  N O W */
void	tchBeepNow( BeepType )
	Int16T		BeepType;
{
	switch( BeepType )
	{
	case TGL_GOOD_BEEP:
		if (tglBeep)
			StartSound( (Ptr) &GoodBeep, 8L, (Ptr) -1 );
		break;
```

BEST AVAILABLE COPY

```
  case TGL_BAD_BEEP:
                StartSound( (Ptr) &BadBeep, 8L, (Ptr) -1 );
            break;

        default:
     /* BeepType is garbage */
     break;
  }
  return;
}

/*-----------------------------------------------------------*/
/* C L R  T O U C H  A R E A S */ /* Set # of active touch areas to zero */
void  tchClrTouchAreas()
{
        nTouchAreas = 0;
        datInt16Init( &tchXStack );
}

/*-----------------------------------------------------------*/
/* I N I T  T O U C H  A R E A S */
void tchInitTouchAreas ( void )
        {
        extern T_AREA *TouchArea;
        extern Int16T nTouchAreas;

        /* grab dynamic memory for the stack */
        if ( TouchArea == (T_AREA *) NULL )
              TouchArea = (T_AREA *) NewPtr( ((Int32T) sizeof( T_AREA )) *
                                                       ((Int32T) MAXTOUCHAREAS)
        if ( TouchArea == (T_AREA *) NULL )
              TGL_FATAL_ERROR( "Can't allocate space for touch area stack." );

        /* empty the stack */
        nTouchAreas = 0;
        }

/*-----------------------------------------------------------*/
/* N  D E F I N E D  T O U C H  A R E A S */
Int32T        tchNDefinedTouchAreas()
        {
        Int16T        actCount = 0, i;
        extern Int16T nTouchAreas;

        for( i = nTouchAreas - 1; i >= 0; i-- )
              {
              if( TouchArea[ i ].Label[0] )
                    actCount++;
              }


        return( actCount );
        }


/*********************************************************************
        tchPushTouches
*********************************************************************
void tchPushTouches ( Rect *r )
        {
        extern Int16T nTouchAreas;

        datInt16Push( &tchXStack, nTouchAreas );
        tchTouchDef( r, (char *) NULL, "");
        }

/*********************************************************************
        tchRememberTouches
```

BEST AVAILABLE COPY

```
This differs from pushTouches because it allows a later popTouches to this positi
but does not hide the touches currently in the stack.
*************************************************************************/
void tchRememberTouches ( Rect *r )
	{
	extern Int16T nTouchAreas;

	datInt16Push( &tchXStack, nTouchAreas );
	tchTouchDef( r, (char *) NULL, "@@transparent@@");
	}

/*************************************************************************
	tchPopTouches
*************************************************************************/
void tchPopTouches ( void )
	{
	extern Int16T nTouchAreas;

	nTouchAreas = datInt16Pop( &tchXStack );
	}

/* T O U C H  D E F */ /* Define and activate a touch area */
void tchTouchDef( r, pSlot, pLabel )
	Rect *r;
	char *pSlot;
	char *pLabel;
	{
	if( nTouchAreas +1 < MAXTOUCHAREAS )
		{
		TouchArea[ nTouchAreas ].pSlot= pSlot;	/* may be NULL */
		strcpy( TouchArea[ nTouchAreas ].Label, pLabel );
		TouchArea[ nTouchAreas ].r = *r;
		++nTouchAreas;
		}
	else TGL_FATAL_ERROR("Too many touch areas.");
	}

/* Touch  Handler (beeps also) */
BooleanT	tchTouchHandler( pt )
	Point *pt;
	{
	Int16T		i;

	/* Scan backwards for the first time touch is in an active area */
	for ( i = nTouchAreas - 1; i >= 0; i-- )
		{
		/* check to see if this is a real touch area before breaking out of this loop
		/* (tchRememberTouches can put in false "transparent" touch areas) */
		if ( TouchArea[ i ].pSlot == (char *) NULL &&
		    strcmp( TouchArea[ i ].Label, "@@transparent@@") == 0 )
		    continue;

		/* we found a touch area */
		if ( ptinrect( pt, &(TouchArea[ i ].r) )) break;
		}


	/* If the label is NULL this is a noTouch area used in the (X) command */
	/* (pretend that we hit the end of the above loop) */
	if (i > -1) if ( *(TouchArea[ i ].Label) == '\0' ) i = -1;


	if( i >= 0 )		/* he hit a touch area */
		{
		tchBeepNow( TGL_GOOD_BEEP );

		if( TouchArea[ i ].pSlot != NULL )
			{
```

BEST AVAILABLE COPY

```
                /* stuff label string into variable (indirect jump) */
                strcpy( TouchArea[ i ].pSlot, TouchArea[ i ].Label );
                }
            else
                {
                /* we should jump immediately */
                scnJump( TouchArea[ i ].Label );
                }
            return( TRUE );
            }
        else
            {
            tchBeepNow( TGL_BAD_BEEP );

            /* If the chile comment number has been initialized, remember this bad tc
            conRememberChileBadTouch();

            return( FALSE );
            }

        }
```

BEST AVAILABLE COPY

```
/* T O U C H  Area tester  */
/* handle beep as well */
BooleanT    tchValidTouch( Point *pt )
        {
        Int16T          i;

        /* Scan backwards for the first time touch is in an active area
         * if the touch's label is empty, then it's a special touch area
         * needed for restoring an 'X' command
         */

        for( i = nTouchAreas - 1; i >= 0; i-- )
            {
            if( TouchArea[ i ].Label[0] ) {
                if( ptinrect( pt, &(TouchArea[ i ].r) ))
                    return TRUE;
                }
            }
        return( FALSE );
        }


#define MAXKEY  256
static char *(KeyTab[ MAXKEY ]);
static Int32T bKeysHot= 0;

/* K E Y D E F */
/* make entry into key/label table */
void   tchKeyDef( key, label )
        char key;
        char *label;
{
        KeyTab[ (Int32T) key ]= label;
        bKeysHot= TRUE;
}

/* C L R K E Y D E F S */
/* clear key/label table */
void   tchClrKeyDefs( )
{
        Int32T i;

        for(i=0; i < MAXKEY; i++) KeyTab[i]= NULL;
        bKeysHot= FALSE;
}
```

tchTouch.c

BEST AVAILABLE COPY

```
/* K E Y L A B E L */
/* return label corresponding to key, NULL if none */
char	*tchKeyLabel( key )
	char key;
{
	return( KeyTab[ (Int32T) key ] );
}

/* K E Y S H O T */
/* return true if any kbd actions have been defined */
Int32T		tchKeysHot()
{
	return( bKeysHot );
}

/* B E G I N  E V E N T */
void	tchBeginEvent()
{

	#ifdef OLD_STYLE

	ClrTouchAreas();
	ClrKeyDefs();

	#endif

}

/* E N D  E V E N T */
void	tchEndEvent()
{

	#ifdef OLD_STYLE

	ClrTouchAreas();
	ClrKeyDefs();

	#endif

}


#ifdef OLD_STYLE

/* this is the old touch handler and touchdef from the days when jumps were immediat

typedef struct
{
	Rect	r;				/* Touch area coordinates */
	Int16T		hilo;			/* current button state */
	SQZPTR		loSnip;				/* lolite snip */
	SQZPTR		hiSnip;				/* hilite snip */
	char	*pLine;				/* pointer to goto line */
	Point	Target;				/* where to put snip */
	Int16T		bTarget;		/* is target defined ? */
} T_AREA, *T_AREAP;


/* T O U C H  D E F */ /* Define and activate a touch area */
BooleanT	tchTouchDef( r, loSnip, hiSnip, pTarget, pLine )
	Rect *r;
	libSQZPictPT loSnip;
	libSQZPictPT hiSnip;
	Point *pTarget;
	char *pLine;
{
```

BEST AVAILABLE COPY

```
	if( nTouchAreas +1 < MAXTOUCHAREAS )
	{
		TouchArea[ nTouchAreas ].hilo= 0;
		TouchArea[ nTouchAreas ].r=  *r;
		TouchArea[ nTouchAreas ].loSnip= loSnip;
		TouchArea[ nTouchAreas ].hiSnip= hiSnip;
		TouchArea[ nTouchAreas ].bTarget= ( pTarget != NULL );
		if( pTarget != NULL )
			TouchArea[ nTouchAreas ].Target=  *pTarget;
		TouchArea[ nTouchAreas ].pLine= pLine;
		++nTouchAreas;
		return TRUE;
	}
	else
		return FALSE;
}

/* T O U C H   H A N D L E R */
/* handle beep and hilite as well */
char	*tchTouchHandler( pt )
	Point *pt;
{
	Int16T		i;
	SQZPTR		pPic;

	/* Scan backwards for the first time touch is in an active area */

	for( i = nTouchAreas - 1; i >= 0; i-- )
		{
		if( ptinrect( pt, &(TouchArea[ i ].r) ))
			break;
		}

	if( i >= 0 )
		{
		tchBeepNow( TGL_GOOD_BEEP );

		TouchArea[ i ].hilo= ! TouchArea[ i ].hilo;

		if( TouchArea[ i ].hilo )
			pPic= TouchArea[ i ].hiSnip;
		else
			pPic= TouchArea[ i ].loSnip;

		if( pPic != NULL )
			if( TouchArea[ i ].bTarget )
				DrawPic( pPic, &TouchArea[ i ].Target );
			else
				DrawPic( pPic, NULL );

		return( TouchArea[ i ].pLine );
		}
	else
		{
		tchBeepNow( TGL_BAD_BEEP );
		return( NULL );
		}

}
#endif /* OLD_STYLE */

/* E N D  O F  T O U C H . C */
```

```
#include    "standard.h"
#include    "glue.h"
#include    "scnScan.h"
#include    "snpSnapshot.h"
#include    "control.h"
#include    "lblLabel.h"

#define EXTGEN
      #include    "EventHandlers.h"
      #include    "tglmain.h"
#undef EXTGEN

#include    "bndDetail.h"
#include    "grfGraphics.h"
#include    "sniSnip.h"
#include    "stkDetail.h"
#include    "tchTouch.h"
#include    "CTextEditEH.h"
#include    "varFns.h"
#include    "wrkScrnBuffer.h"
#include    "IntroGraph.h"


/**********************************************************************/
#define TWO_SCREENS                  /* always define for production versions */


#define WINDOW_ID                    128          /* window resources */


#define ERROR_DIALOG_ID              1000 /* dialog resources */
#define FATAL_ERROR_DIALOG_ID   1001
#define ENTER_TEXT_ID           2002
#define VARIABLES_ID            2005

#define     CONTINUE                 1            /* error dialog (1000) items */
#define     QUIT                     2
#define     ERROR_TEXT                    3
#define     RESTART                       4
#define     NEW_FILE                 5


#define     OK                            1             /* variable dialog (2005)
#define     CANCEL                        2
#define TEXT_ITEM                    3
#define FIRST_VARIABLE_ITEM          4


#define     DONE                          2             /* restart after error? */
#define NOT_DONE                     3

#define           SuspendResumeEvt    0x01  /* Suspend/Resume event code */
#define           ResumeEvtMask       0x1         /* Supend or Resume selector *

#define     CURSOR_STACK_DEPTH       10           /* depth of cursor stack */
/**********************************************************************/
static jmp_buf          Error;             /* spot to jump to after error */

static Handle               Ballast;       /* some memory to throw away */

static RgnHandle        MenuRgn;       /* region underneath the menu bar */


static Boolean              CursorVisible[CURSOR_STACK_DEPTH];
```

tglmain.c

BEST AVAILABLE COPY

```
static Int16T           TopOfCursorStack = -1;
static Rect             MouseWindowRect = { -1, -1, -1, -1 };

/*******************************************************************
void  tglProcessUpdate( EventRecord myEvent );
void  tglProcessActivate( EventRecord myEvent );
Boolean    tglProcessMouseDown( EventRecord myEvent );
Boolean    tglProcessMouseUp( EventRecord myEvent );
Boolean tglProcessKeyPress( EventRecord myEvent );
void  tglInitialize( void );
void  tglInitMac( void );
void  tglInitDisplay( void );
void  tglInitAscan ( void );
void  tglCleanup ( void );
Int32T      tglGrowZone( Size bytesNeeded );
Boolean tglProcessEvent( EventRecord myEvent );
void  tglProcessSuspend( EventRecord myEvent );
void  tglProcessResume( EventRecord myEvent );
void  tglHideWindows( void );
void  tglShowWindows( void );
void  tglIncludeMenu( void );
void  tglMouseCoords( Boolean on );

/*******************************************************************
/*******************************************************************
/*******************************************************************
/*******************************************************************
void main( void )
{
      Boolean              done;
      EventRecord          myEvent;
      Int16T               status;


      /*
       * Set up long jumps for regular and fatal errors
       * Fatal errors stop the program, regular ones don't.
       *
       * Note that if setjmp doesn't return a 0, there
       * was an error.  If the result is DONE, then
       * the program should stop, otherwise it should
       * keep going
       */
      status = setjmp( Error );
      if ( status == 0 )
            {
            tglInitialize();
            done = ! scnNewCtrlFile();       /* returns 0 if no .scan file chosen */
            }
      else done = (status == DONE);  /* remember: status is NOT boolean */


      while ( ! done )
            {
            /*
             * Give the system some time and then reset the visRgn and
             * clipRgn every cycle to make sure that the menu is always
             * obscured if it's supposed to be
             */
            SystemTask();
            tglIncludeMenu();

            /*
             * handle an event and then let the gopher do what it wants
             */
            GetNextEvent( everyEvent, &myEvent );
            done = tglProcessEvent( myEvent );
            tglGopher->EveryCycle();
```

BEST AVAILABLE COPY

BEST AVAILABLE COPY

```
        }

    /*
     * exit
     */
    tglCleanup();
    ExitToShell();
}


/******************************************************************
 * tglProcessEvent handles a single Macintosh event
 ******************************************************************/
Boolean tglProcessEvent( EventRecord myEvent )
{

    switch( myEvent.what ) {

        case mouseDown:
            return (tglProcessMouseDown( myEvent ));

        case keyDown:
        case autoKey:
            return (tglProcessKeyPress( myEvent ));

        case mouseUp:
            return (tglGopher->MouseUp( myEvent.where, myEvent.modifiers ));

        case activateEvt:
            tglProcessActivate( myEvent );
            return (FALSE);

        case updateEvt:
            tglProcessUpdate( myEvent );
            return (FALSE);

        case app4Evt:
            switch ((unsigned long) myEvent.message >> 24) {

                case SuspendResumeEvt:

                    if (myEvent.message & ResumeEvtMask) {

                        tglProcessResume( myEvent );

                    } else {

                        tglProcessSuspend( myEvent );

                    }
                    break;
            }

        case diskEvt:           /* spit it out again and pretend nothing happene

            /* If it has been mounted, dismount it */
            if ( (( myEvent.message & 0xffff0000 ) >> 16 ) == noErr )
                {
                char volName[64];
                Int16T vRefNum;
                Int32T freeBytes;

                GetVInfo( myEvent.message & 0xffff, volName, &vRefNum, &f
                UnmountVol( volName, vRefNum );
                }
```

```
                DiskEject( myEvent.message & 0xffff );

                return( FALSE );

            case nullEvent:
                return (tglGopher->Idle());

            default:
                TGL_ERROR( "Weird event" );

        }
}
```

BEST AVAILABLE COPY

```
/*******************************************************************
 * tglProcessKeyPress processes keys, deciding whether this is
 * a command-key equivalent of a menu item, or just some normal key,
 * and then asks the gopher to deal with it in either case.
 *******************************************************************/
Boolean tglProcessKeyPress( EventRecord myEvent )
{
    Int32T          menuChoice;
    Boolean         done;


    if (myEvent.modifiers & cmdKey) {


        /*
         * send the key to the menu manager to see what it means.
         * (If the menu isn't visible then temporarily set the menu
         * height to 0, so that when MenuKey highlights the appropriate
         * menu it doesn't flash on the screen)
         */
        if (tglMenuVisible) {
            menuChoice = MenuKey( myEvent.message & charCodeMask );
        }
        else {
            MBarHeight = 0;
            menuChoice = MenuKey( myEvent.message & charCodeMask );
            MBarHeight = 20;
        }


        /*
         * if it's a real command, then send it to the gopher (the
         * first EventHandler in the list of event handlers) and
         * then unhilight it the menu item
         */
        if (HiWord(menuChoice)) {
            done = tglGopher->DoCommand( HiWord(menuChoice),
                    LoWord(menuChoice), myEvent.modifiers );
            HiliteMenu(0);
            return (done);
        }
    }


    else {


        /*
         * if it's not a command key, then let the gopher decide
         * to do with it
         */
        return (tglGopher->KeyDown( myEvent ));

    }
```

```
}

/*****************************************************************
 * tglProcessMouseDown handles mouse events in the menu bar and passes
 * any command along to the gopher.  Mouse events outside the menu bar
 * are passed straight to the gopher.
 *****************************************************************/
Boolean tglProcessMouseDown( EventRecord myEvent )
{
	Int32T		menuChoice;
	WindowPtr	whichWindow;
	Int16T		windowPart;
	Boolean		done;
	Rect		r;
	static		RgnHandle  rgn;

	windowPart = FindWindow( myEvent.where, &whichWindow );


	/*
	 * if the mouse went down in somebody elses window, then
	 * let the system handle it
	 */
	if (windowPart == inSysWindow) {
		SystemClick( &myEvent, whichWindow );
		return (FALSE);
	}


	/*
	 * if the mouse went down in the menu bar (assuming that it's on)
	 * then let the menu manager decide which command was selected
	 * and pass that along to the gopher
	 */
	else if ((windowPart == inMenuBar) && (tglMenuVisible)) {
		menuChoice = MenuSelect( myEvent.where );
		if (HiWord(menuChoice)) {
			done = tglGopher->DoCommand( HiWord(menuChoice),
				LoWord(menuChoice), myEvent.modifiers );
			HiliteMenu(0);
			return (done);
		}
	}


	/*
	 * if the mouse went down in the mouse coordinate window then
	 * check to see if the user is dragging or closing the window
	 */
	else if (whichWindow == (WindowPtr) tglCoordinateWindow) {

		SelectWindow( whichWindow );


		/*
		 * drag the window if the user clicked on the drag region
		 */
		if (windowPart == inDrag) {

			/*
			 * drag the window
			 */
			TGL_SETRECT( &r, 4, 0, 636, 935 );
			DragWindow( (WindowPtr) tglCoordinateWindow, myEvent.where, &
```

BEST AVAILABLE COPY

BEST AVAILABLE COPY

```
            /*
             * redraw window
             */
            snlRedrawScreen();
        }


        /*
         * close the window if the user clicked in the go-away region
         */
        else if (windowPart == inGoAway) {

            tglMouseCoords( FALSE );
        }


        return (FALSE);
    }


    /*
     * otherwise, let the gopher deal with it
     */
    else {

        tglGopher->MouseDown( myEvent.where, myEvent.modifiers );
        return (FALSE);
    }
}


/*********************************************************************
 * tglProcessUpdate handles update events.
 *********************************************************************/
void tglProcessUpdate( EventRecord myEvent )
{
    Rect            r;
    WindowPeek      wPeek;
    int16T          wKind;


    /*
     * find out which window to update
     */
    wPeek = (WindowPeek) myEvent.message;
    wKind = wPeek->windowKind;


    /*
     * right now, there are only two kinds of windows: dialogs and
     * the main window where all drawing is done. The gopher does
     * the drawing.
     */
    switch (wKind) {


        case dialogKind:
            BeginUpdate( (WindowPtr) myEvent.message );
            EndUpdate( (WindowPtr) myEvent.message );
            break;


        case userKind:


            /*
             * mouse coordinate window
```

```
                */
                if (myEvent.message == (Int32T) tglCoordinateWindow) {

                        BeginUpdate( (WindowPtr) myEvent.message );
                        EndUpdate( (WindowPtr) myEvent.message );
                }


                /*
                 * other window
                 */
                else {

                        BeginUpdate( (WindowPtr) myEvent.message );
                        tglGopher->Draw();
                        EndUpdate( (WindowPtr) myEvent.message );
                }
                break;

        }
}

/*********************************************************************
 * tglProcessActivate handles activate events.
 *********************************************************************/
void tglProcessActivate( EventRecord myEvent )
{

        WindowPeek      wPeek;
        Int16T          wKind;


        /*
         * find out which window to update
         */
        wPeek = (WindowPeek) myEvent.message;
        wKind = wPeek->windowKind;


        /*
         * if this isn't a user window, then let somebody else worry about it
         */
        if (wKind != userKind) {
                return;
        }


        /*
         * if we're activating, then redraw the current window
         */
        if( (myEvent.modifiers & activeFlag) ) {


                /*
                 * mouse coordinate window
                 */
                if (myEvent.message == (Int32T) tglCoordinateWindow) {
                        return;
                }


                /*
                 * main windows
                 */
                else {

                        tglGopher->Draw();
                }
```

BEST AVAILABLE COPY

```
	}
}
```

BEST AVAILABLE COPY

```
/********************************************************************
 * tglHideWindows hides both windows
 ********************************************************************/
void tglHideWindows( void )
{

	HideWindow( (WindowPtr) tglMainCWindow );

	if (tglNumVisibleScreens == 2) {
		HideWindow( (WindowPtr) tglAltCWindow );
	}


	if (tglMouseCoordsVisible) {

		HideWindow( (WindowPtr) tglCoordinateWindow );
	}
}

/********************************************************************
 * tglShowWindows shows both windows
 ********************************************************************/
void tglShowWindows( void )
{

	ShowWindow( (WindowPtr) tglMainCWindow );

	if (tglNumVisibleScreens == 2) {
		ShowWindow( (WindowPtr) tglAltCWindow );
	}


	if (tglMouseCoordsVisible) {

		ShowWindow( (WindowPtr) tglCoordinateWindow );
	}
}


/********************************************************************
 * tglProcessSuspend handles suspend events
 ********************************************************************/
void tglProcessSuspend( EventRecord myEvent )
{

	/*
	 * let the gopher do what it wants about this
	 */
	tglGopher->Suspend();


	/*
	 * hide the windows
	 */
	tglHideWindows();

}


/********************************************************************
 * tglProcessResume handles resume events
 ********************************************************************/
void tglProcessResume( EventRecord myEvent )
```

BEST AVAILABLE COPY

```
{
	tglShowWindows();


	/*
	 * erase the menu
	 */
	if (!tglMenuVisible) {

		tglIncludeMenu();
		EraseRgn( MenuRgn );
	}


	/*
	 * let the gopher do what it wants about this
	 */
	tglGopher->Resume();
}



/*********************************************************************
 * tglInitialize initializes the Mac, the display, the modules of ascan
 * starts a new scan file and turns the menu off
 ********************************************************************/
void tglInitialize( void )
	{
	tglInitMac();
	tglInitDisplay();
  tglInitAscan();
	SetPort( (GrafPtr) tglMainCWindow );
	tglMenuVisible = TRUE;
	tglToggleMenu();

	#ifdef TWO_SCREENS
		tglToggleScreens();
	#endif
	}


/*********************************************************************
 * tglInitMac initializes all of the Mac managers, memory, the grow zone
 * function, the cursors and turns on the watch
 ********************************************************************/
void tglInitMac( void )
{
	Int32T		i;

	/*
	 * initialize cursors and set to the watch
	 */
	InitGraf( &thePort );
	InitCursor();
	tglWatch		= GetCursor(watchCursor);
	tglCrossHairs		= GetCursor(crossCursor);
	SetCursor(*tglWatch);


	/*
	 * initialize mac managers
	 */
	InitFonts();
	TEInit();
```

```
	FlushEvents(everyEvent, 0);
	InitWindows();
	InitMenus();
	InitDialogs( NULL );

	/*
	 * get 50k more stack space
	 */
	SetApplLimit( GetApplLimit() - (Int32UT) 50000L );

	/*
	 * get more master pointers
	 */
	for ( i = 0; i < 20; i++ ) {
		MoreMasters();
	}

	/*
	 * create some ballast to be thrown overboard if we run out of memory
	 */
	Ballast = NewHandle( 20000 );

	/*
	 * initialize GrowZone function
	 */
	SetGrowZone( tglGrowZone );

}

/*********************************************************************
 * tglInitDisplay sets up the menu bar, and the pixel maps and opens the
 * windows
 *********************************************************************/
void tglInitDisplay( void )
{
	GDHandle		hDevice;	/* device handle */
	Handle			menuBarH; /* menu bar from resource
	Rect			r;
	Rect			windowRect;
	Str255			title;
	Ptr			p = 0;

	/*
	 * create menus
	 */
	menuBarH = GetNewMBar( 1 );
	SetMenuBar( menuBarH );
	DrawMenuBar();
	tglAppleMenuH	= GetMHandle( TGL_APPLE_MENU_ID );
	tglFileMenuH	= GetMHandle( TGL_FILE_MENU_ID );
	tglEditMenuH	= GetMHandle( TGL_EDIT_MENU_ID );
	tglScanMenuH	= GetMHandle( TGL_SCAN_MENU_ID );
	tglSnipMenuH	= GetMHandle( TGL_SNIP_MENU_ID );
	tglBuildMenuH	= GetMHandle( TGL_BUILD_MENU_ID );
	AddResMenu( tglAppleMenuH, 'DRVR' );

	/*
	 * create MenuRgn for use later in rubbing out the menu
	 */
	MenuRgn = NewRgn();
```

BEST AVAILABLE COPY

```
SetRectRgn( MenuRgn, 0, 0, 640, MBarHeight );
```

BEST AVAILABLE COPY

```
/*
 * get the pixel map and coordinates of the main screen
 */
hDevice             = GetMainDevice();
tglHMainPixMap  = (*hDevice)->gdPMap;
tglScreenRect     = (*hDevice)->gdRect;


/*
 * create the window on the main screen
 */
tglMainCWindow = (CGrafPtr) NewCWindow(
        (Ptr) NULL, &tglScreenRect, "\p", TRUE, plainDBox,
        (WindowPtr) -1, FALSE, 0x0 );


/*
 * initialize the new window, including setting the clipRgn and
 * visRgn to the full screen size
 */
SetPort( (GrafPtr) tglMainCWindow );
SetOrigin( 0, 0 );
ClipRect( &tglScreenRect );
RectRgn( tglMainCWindow->visRgn, &tglScreenRect );
RGBForeColor( &tglRgbBlack );
RGBBackColor( &tglRgbWhite );


/*
 * find the second screen if there is one
 */
hDevice= GetDeviceList();
do {
        if( !TestDeviceAttribute( hDevice, mainScrn)  &&
                TestDeviceAttribute( hDevice, screenDevice) &&
                TestDeviceAttribute( hDevice, scrnActive)) {
                break;
        }
        else {
          hDevice= GetNextDevice( hDevice );
        }
} while( hDevice != NULL );


/*
 * initialize the second screen if there is one
 */
if ( hDevice != NULL )
{

        /*
         * create window for second screen
         */
        tglHAltPixMap     = (*hDevice)->gdPMap;
        r                       = (*hDevice)->gdRect;
        tglAltCWindow    = (CGrafPtr) NewCWindow(
                (Ptr) NULL, &r, "\p", FALSE, plainDBox,
                (WindowPtr) -1, FALSE, 0x0 );


        /*
         * initialize second window
         */
        SetPort( (GrafPtr) tglAltCWindow );
```

```
        ClipRect( &tglScreenRect );
        RectRgn( tglAltCWindow->visRgn, &tglScreenRect );
        RGBForeColor( &tglRgbBlack );
        RGBBackColor( &tglRgbWhite );


        /*
         * set the number of physical screens to 2
         */
        tglNumPhysicalScreens    = 2;
    }


    /*
     * otherwise, if there is no second window, set the number of
     * physical screens to 1 and turn off menu item to switch from
     * 1 screen to 2
     */
    else {

        tglNumPhysicalScreens    = 1;
        DisableItem( tglFileMenuH, TGL_TWO_SCREENS_ITEM );
    }

#ifdef SWITCH_SCREENS
{
CWindowPtr              . tgltempMyCWindow;
PixMapHandle            tgltempHCurPixMap;


tgltempMyCWindow        = tglMainCWindow;
tgltempHCurPixMap       = tglHMainPixMap;

tglMainCWindow          = tglAltCWindow;
tglHMainPixMap  = tglHAltPixMap;

tglAltCWindow      = tgltempMyCWindow;
tglHAltPixMap      = tgltempHCurPixMap;
}
#endif

    /*
     * set up tglMyCWindow, which points to the current window
     */
    tglMyCWindow       = tglMainCWindow;
    tglHCurPixMap      = tglHMainPixMap;


    /*
     * assume that we're supposed to start with only one screen at
     * startup.  If this is a production version, then turn the second
     * screen on.
     */
    tglNumVisibleScreens = 1;


    /*
     * create the offscreen bitmap (640 x 480)
     */
    tglPSavePort                    = (CGrafPort*) NewPtr( sizeof(CGrafPor
    OpenCPort( tglPSavePort );
    tglHSaveMap                          = tglPSavePort->portPixMap;
    p                                    = NewPtr( TGL_cSCREEN_BYTES );
    (*tglHSaveMap)->baseAddr      = p;
    (*tglHSaveMap)->rowBytes      = 0x8000 | 640;
    (*tglHSaveMap)->bounds             = tglScreenRect;
    tglPSavePort->portPixMap      = tglHSaveMap;
```

BEST AVAILABLE COPY

BEST AVAILABLE COPY

```
	/*
	 * initialize the offscreen bitmap
	 */
	SetPort( (GrafPtr) tglPSavePort );
	RGBForeColor( &tglRgbBlack );
	RGBBackColor( &tglRgbWhite );



	/*
	 * create the mouse coordinate window
	 */
	TGL_SETRECT( &MouseWindowRect, 0, 0, 300, 50 );
	tglCoordinateWindow = (CGrafPtr) NewCWindow( NULL, &MouseWindowRect,
		"\pMouse Coordinates", FALSE, noGrowDocProc, (WindowPtr) -1, TRUE, 0
	SetPort( (WindowPtr) tglCoordinateWindow );
	MoveWindow( (WindowPtr) tglCoordinateWindow, 100, 100, FALSE );


	/*
	 * reset the port
	 */
	SetPort( (WindowPtr) tglMainCWindow );
}

/**********************************************************************
 * tglInitAscan initializes all Ascan modules that must be initialized
 **********************************************************************/
void tglInitAscan ( void )
{
	varInitialize();			/* create variable table */
	tchInitTouchAreas();			/* init touch area stack */
	grfInitPics();				/* initialize libsub graphics routines
	grfShadowTableInit();			/* lookup table for shadow indexes */
	wrkInitialize();			/* work screen buffer */
	bndInitialize();			/* initialize bond table stuff */
	stkInitialize();			/* initialize stock table stuff */
	scnInitialize();			/* initialize scan parsing */
	sniInitialize();			/* initialize snip data structures */
	introInitialize();			/* get tables and bitmap for */
	conInit();				/* init commands */


	/*
	 * create event handlers
	 */
	tglAscanGopher		= new( CAscanEH );
	tglScanGopher		= new( CScanEH );
	tglSnipGopher		= new( CSnipEH );
	tglSnipDefineGopher	= new( CSnipDefineEH );
	tglSnipDragGopher	= new( CSnipDragEH );
	tglPauseGopher		= new( CPauseEH );
	tglWaitGopher		= new( CWaitEH );
	tglEditGopher		= new( CEditEH );
	tglCursiveGopher = new( CCursiveEH );
	tglATCalcGopher		= new( CATCalcEH );
	tglTaxCalcGopher	= new( CTaxCalcEH );
	tglTextEditGopher	= new( CTextEditEH );
	tglClickGopher		= new( CClickEH );
	tglTimedClickGopher	= new( CTimedClickEH );
	tglChileCalcGopher	= new( CChileCalcEH );
	tglPhoneGopher		= new( CPhoneEH );

	/*
	 * initialize event handlers
	 */
```

```
	tglAscanGopher->IAscanEH();
	tglScanGopher->IScanEH();
	tglSnipGopher->ISnipEH();
	tglSnipDefineGopher->ISnipDefineEH();
	tglSnipDragGopher->ISnipDragEH();
	tglPauseGopher->IPauseEH();
	tglWaitGopher->IWaitEH();
	tglEditGopher->IEditEH();
	tglCursiveGopher->ICursiveEH();
	tglATCalcGopher->IATCalcEH();
	tglTaxCalcGopher->ITaxCalcEH();
	tglTextEditGopher->ITextEditEH();
	tglClickGopher->IClickEH();
	tglTimedClickGopher->ITimedClickEH();
	tglChileCalcGopher->IChileCalcEH();
	tglPhoneGopher->IPhoneEH();


	/*
	 * start the main ascan event handler and the main scan event handler
	 */
	tglAscanGopher->StartHandler();
	tglScanGopher->StartHandler();


	/*
	 * set up default colors and styles
	 */
	tglTextFont		= 3;
	tglTextSize	= 10;
	tglTextFace		= normal;
	tglTextFGColor	= tglRgbBlack;
	tglTextBGColor	= tglRgbWhite;

}


/*********************************************************************
 * tglCleanup cleans all parts of ascan that need to be cleaned up
 *********************************************************************/
void tglCleanup ( void )
{
	ShowCursor();
	CloseWindow( (WindowPtr) tglMainCWindow);
	if (tglNumPhysicalScreens == 2) {
		CloseWindow( (WindowPtr) tglAltCWindow);
	}
}


/****************************************************************
 * tglGrowZone is called by the Mac operating system if it thinks
 * that it's flat out of space, so we warn the user by three
 * beeps and then try to put up a dialog box
 ****************************************************************/
int32T		tglGrowZone( Size bytesNeeded )
{

	DisposHandle( Ballast );

	TGL_FATAL_ERROR( "Out of memory" );
	return (0);
}
```

BEST AVAILABLE COPY

BEST AVAILABLE COPY

```
/* ------------------------------------------
 *
 *                    ERROR HANDLING
 *
 * ------------------------------------------*/

/*********************************************************************
 * tglError notifies the user of an error, waits for his reaction to
 * the error and then jumps back to the main loop of the program.
 *
 * message is a string to display for the user about what went wrong.
 * file is the name of the file where the error occured. Line is the
 * line number in that file. File and line are for programmer
 * debugging only.
 *
 * The macro TGL_ERROR will fill in file and line number
 * information automatically
 *********************************************************************/
void tglError( char *message, char *file, Int32T line )
{
	DialogPtr		dialogP;
	Int16T			itemHit;
	char			locLine[20];
	char			locMessage[256];
	char			locFile[64];
	CGrafPtr		oldImage = NULL;


	/*
	 * initialize: unhighlight the menu bar, in case we were in the middle of
	 * executing a command, save whatever's underneath the dialog
	 * box we're about to put up and turn the cursor on and set it
	 * to an arrow
	 */
	HiliteMenu( 0 );
	oldImage = snpSaveBoxUnderDialog( ERROR_DIALOG_ID, 'DLOG' );

	/*
	 * copy the file name if there is one
	 */
	if (strlen( file ) > 0) {

		sprintf( locFile, "file: %s; ", file );
		CtoPstr( locFile );
	}
	else {

		strcpy( locFile, "\p" );
	}


	/*
	 * copy the line number if there is one
	 */
	if (line > 0) {

		sprintf( locLine, "line: %ld", line );
		CtoPstr( locLine );
	}
	else {

		strcpy( locLine, "\p" );
	}


	/*
	 * copy the message
```

BEST AVAILABLE COPY

```
 */
sprintf( locMessage, "%s\r", message );
CtoPstr( locMessage );

/*
 * set up the dialog box
 */
ParamText( locMessage, locFile, locLine, "\p" );
dialogP = GetNewDialog( ERROR_DIALOG_ID, NULL, (WindowPtr) -1 );

/*
 * wait for something to happen
 */
do {

        ModalDialog( NULL, &itemHit );
} while (itemHit == ERROR_TEXT);

/*
 * cleanup: throw away the dialog box, restore whatever was underneath
 * the dialog, and restore the previous cursor
 */
DisposDialog( dialogP );
snpRestoreBoxUnderDialog( &oldImage );

/*
 * respond to the user's action
 */
switch (itemHit) {

        case QUIT:

                longjmp( Error, DONE );

        case RESTART:

                scnRestartScan();
                longjmp( Error, NOT_DONE );

        case NEW_FILE:

                scnStartNewScan();
                longjmp( Error, NOT_DONE );

        case CONTINUE:
        default:

                longjmp( Error, NOT_DONE );
        }
}

/*********************************************************************
 * tglFatalError notifies the user of an error, waits for his reaction to
 * the error and then exits the program.
 *
 * message is a string to display for the user about what went wrong.
 * file is the name of the file where the error occured. Line is the
 * line number in that file. File and line are for programmer
 * debugging only.
 *
 * Note that the macro TGL_FATAL_ERROR will fill in file and line number
```

```
 * information automatically
 ********************************************************************/
void tglFatalError( char *message, char *file, Int32T line )
{
        char        locMessage[256];
        char        locFile[64];
        char        lineStr[20];

        /*
         * show the cursor
         */
        tglCursorOnOff( TGL_ON );


        /*
         * copy the message
         */
        strcpy( locMessage, message );
        CtoPstr( locMessage );


        /*
         * copy the file name
         */
        strcpy( locFile, file );
        CtoPstr( locFile );


        /*
         * copy the line number
         */
        sprintf( lineStr, "%ld", line );
        CtoPstr( lineStr );


        /*
         * put up the alert
         */
        ParamText( locMessage, locFile, lineStr, "\p" );
        Alert( FATAL_ERROR_DIALOG_ID, NULL );


        /*
         * exit
         */
        longjmp( Error, DONE );
}


/* ---------------------------------------------------
 *
 *                              CURSOR HANDLING
 *
 * ---------------------------------------------------*/


/********************************************************************
 * CursorOnOff sets the visibility of the cursor keeping track
 * of whether the cursor is currently visible.
 ********************************************************************/
void tglCursorOnOff( Boolean on )
{

        /*
         * turn the cursor on
         */
        if ((on == TRUE) && !tglCursorVisible) {
```

BEST AVAILABLE COPY

```
        ShowCursor();
        tglCursorVisible = TRUE;
        SetItem( tglFileMenuH, TGL_TOGGLE_CURSOR_ITEM, "\pHide Cursor" );
    }

    /*
     * turn the cursor off
     */
    else if ((on == FALSE) && tglCursorVisible) {

        HideCursor();
        tglCursorVisible = FALSE;
        SetItem( tglFileMenuH, TGL_TOGGLE_CURSOR_ITEM, "\pShow Cursor" );
    }
}

/******************************************************************
 * tglPushCursor pushes the state of the cursor (visible or not) onto
 * a stack, in advance of changing the cursor to a specific state.
 ******************************************************************/
void tglPushCursor( void )
{
    if (TopOfCursorStack > CURSOR_STACK_DEPTH) {

        TGL_ERROR( "Cursor stack overflow" );
    }

    CursorVisible[++TopOfCursorStack] = tglCursorVisible;

}

/******************************************************************
 * tglPopCursor pops the last cursor state (visible or invisible) off
 * the stack and sets the cursor to that state.
 ******************************************************************/
void tglPopCursor( void )
{

    if (TopOfCursorStack < 0) {

        TGL_ERROR( "Cursor stack underflow" );
    }

    tglCursorOnOff( CursorVisible[TopOfCursorStack--] );

}

/******************************************************************
 * tglToggleMenu toggles the state of the menu (visible or invisible)
 ******************************************************************/
void tglToggleMenu( void )
{

    /*
     * reverse flag
     */
    tglMenuVisible = !tglMenuVisible;

    /*
     * turn the menu off
     */
    if (!tglMenuVisible) {

        /*
```

BEST AVAILABLE COPY

BEST AVAILABLE COPY

```
         * unhighlight the current menu selection before turning
         * the menu off, so that if it's unhighlighted again later,
         * it really stays off
         */
        HiliteMenu( 0 );


        /*
         * increase the screen rect and add the menu region to the visRgn
         * and the clipRgn
         */
        TGL_SETRECT( &tglScreenRect, 0, 0, 640, 480 );
        tglIncludeMenu();


        /*
         * erase the menu region
         */
        EraseRgn( MenuRgn );


        /*
         * redraw the current screen
         */
        tglGopher->Draw();
    }


    /*
     * turn the menu on
     */
    else {

        /*
         * decrease the screen rect and subtract the menu region from the visRgn
         * and the clipRgn
         */
        TGL_SETRECT( &tglScreenRect, 0, 20, 640, 480 );
        XorRgn( tglMainCWindow->clipRgn, MenuRgn, tglMainCWindow->clipRgr
        XorRgn( tglMainCWindow->visRgn, MenuRgn, tglMainCWindow->visRgn);


        /*
         * draw the now-visible menu
         */
        DrawMenuBar();
    }


    /*
     * set the flag
     */

}



/*********************************************************************
 * tglToggleScreens turns the second screen on or off, if it's physically
 * available.
 *********************************************************************/
void tglToggleScreens( void )
{

    /*
     * skip it if there's only one screen
     */
```

```
        if (tglNumPhysicalScreens < 2) {

                return;
        }


        /*
         * turn on second screen
         */
        if (tglNumVisibleScreens == 1) {

                tglNumVisibleScreens = 2;
                SetItem( tglFileMenuH, TGL_TWO_SCREENS_ITEM, "\pOne Screen" );
                ShowWindow( (WindowPtr) tglAltCWindow );
        }


        /*
         * turn off second screen
         */
        else if (tglNumVisibleScreens == 2) {

                tglNumVisibleScreens    = 1;
                tglMyCWindow                    = tglMainCWindow;
                tglHCurPixMap                   = tglHMainPixMap;

                SetItem( tglFileMenuH, TGL_TWO_SCREENS_ITEM, "\pTwo Screens" );
                HideWindow( (WindowPtr) tglAltCWindow );
        }
}


/*********************************************************************
 * tglEnterCommand allows the user to type a command into a dialog box
 * for immediate execution
 *********************************************************************/
void tglEnterCommand( void )
{
        DialogPtr       dialogP;
        Handle                  item;
        Int16T                  itemType;
        Int16T                  itemHit;
        Rect            r;
        char            command[255];
        CGrafPtr        portSave;

        /*
         * get the dialog and its size
         */
        portSave = snpSaveBoxUnderDialog( ENTER_TEXT_ID, 'DLOG' );


        /*
         * show the dialog
         */
        ParamText( "\pEnter command:", "\p", "\p", "\p" );
        dialogP = GetNewDialog( ENTER_TEXT_ID, NULL, (WindowPtr) -1 );
        do {
                ModalDialog( NULL, &itemHit );
        } while ((itemHit != OK) && (itemHit != CANCEL));


        /*
         * get the command
         */
        GetDItem( dialogP, TEXT_ITEM, &itemType, &item, &r );
        GetIText( item, command );
        PtoCstr( command );
```

BEST AVAILABLE COPY

BEST AVAILABLE COPY

```
	/*
	 * dispose of the dialog
	 */
	DisposDialog( dialogP );

	/*
	 * put the stuff under the dialog back
	 */
	snpRestoreBoxUnderDialog( &portSave );

	/*
	 * cancel?
	 */
	if (itemHit == CANCEL) {
		return;
	}

	/*
	 * execute the command
	 */
	scnSetCurrentLine( command );
	conExecute( command );

}

/***********************************************************************
 * tglBreakAt asks the user for a label in a dialog. When the scan file
 * gets to that label, it throws the program into single step mode
 ***********************************************************************/
void tglBreakAt( void )
{
	DialogPtr		dialogP;
	Handle			item;
	Int16T			itemType;
	Int16T			itemHit;
	Rect			r;
	char			label[255];
	CGrafPtr		portSave;

	/*
	 * get the dialog and its size
	 */
	portSave = snpSaveBoxUnderDialog( ENTER_TEXT_ID, 'DLOG' );

	/*
	 * show the dialog
	 */
	ParamText( "\pBreak at label:", "\p", "\p", "\p" );
	dialogP = GetNewDialog( ENTER_TEXT_ID, NULL, (WindowPtr) -1 );
	do {
		ModalDialog( NULL, &itemHit );
	} while ((itemHit != OK) && (itemHit != CANCEL));

	/*
	 * get the label
	 */
	GetDItem( dialogP, TEXT_ITEM, &itemType, &item, &r );
	GetIText( item, label );
	PtoCstr( label );
```

```
        /*
         * dispose of the dialog
         */
        DisposDialog( dialogP );

        /*
         * put the stuff under the dialog back
         */
        snpRestoreBoxUnderDialog( &portSave );


        /*
         * cancel?
         */
        if (itemHit == CANCEL) {
                return;
        }

        /*
         * mark the label
         */
        lblBreakAt( label );

}


void tglIncludeMenu( void )
{
        if (!tglMenuVisible) {
                #ifndef SWITCH_SCREENS
                UnionRgn( tglMainCWindow->clipRgn, MenuRgn, tglMainCWindow->clipF
                UnionRgn( tglMainCWindow->visRgn, MenuRgn, tglMainCWindow->visRg
                #else
                UnionRgn( tglAltCWindow->clipRgn, MenuRgn, tglAltCWindow->clipRgn
                UnionRgn( tglAltCWindow->visRgn, MenuRgn, tglAltCWindow->visRgn );
                #endif
        }
}


void tglMouseCoords( Boolean on )
{

        /*
         * open mouse coordinate window
         */
        if (on) {

                CheckItem( tglSnipMenuH, TGL_MOUSE_COORDS_ITEM, TRUE );
                ShowWindow( (WindowPtr) tglCoordinateWindow );
                SelectWindow( (WindowPtr) tglCoordinateWindow );
                snlWriteCoordinates( TRUE );
                tglMouseCoordsVisible = TRUE;
        }

        /*
         * close mouse coordinate window
         */
        else {

                CheckItem( tglSnipMenuH, TGL_MOUSE_COORDS_ITEM, FALSE );
                HideWindow( (WindowPtr) tglCoordinateWindow );
                tglMouseCoordsVisible = FALSE;
        }
}


tglmain.c
```

BEST AVAILABLE COPY

```
/* ---------------------------------------------------- *
 *
 *          Don't use these.  They're holdovers from old code
 *
 * ---------------------------------------------------- */
void  tglTask( EventRecord myEvent );
void  tglTask( EventRecord myEvent )
{

      /*
       * Give the system some time and then reset the visRgn and
       * clipRgn every cycle to make sure that the menu is always
       * obscured if it's supposed to be
       */
      SystemTask();
      tglIncludeMenu();

}


Boolean      tglEvent( EventRecord myEvent );
Boolean      tglEvent( EventRecord myEvent )
{

      return (tglProcessEvent( myEvent ));

}
```

BEST AVAILABLE COPY

```
/*	txtEditor.c
 *	Money Advisor module
 *	generic text block editing functions
 *
 *	1/11/90	djs
 *	started.
 */
```

BEST AVAILABLE COPY

```
#include "txtEditor.h"
#include "scnScan.h"
#include "libLibrary.h"
#include "tchTouch.h"
#include "tglMain.h"
#include "grfGraphics.h"
#include "scrScreen.h"
#include "control.h"
#include "varFns.h"

#define	deleteKey	8		/* used in the key handler */

static	EditBlock	textBlocks[TXT_MAX_TEXT_BLOCKS];		/* text o

/*		local functions */
void		txtChangeCursor ( void );
Boolean		txtKeyHandle ( EventRecord *theEvent );
void		txtUpdateThumb ( void );
void		txtLoadNote ( Int16T noteNum, Int32T varNum );


static Rect			TheViewRect;
static TEHandle			TheText;
static Boolean			Scrollable;
static Rect			ThumbAreaRect;
static Rect			TheUpRect;
static Rect			TheDownRect;
static Handle			TheUpSnip;
static Handle			TheDownSnip;
static Handle			TheUpHighSnip;
static Handle			TheDownHighSnip;
static Handle			TheThumbAreaSnip;
static Handle			TheThumbSnip;
static Int16T			TheLineHeight;
static EditBlock		*TheBlock;
static Boolean			ValidNextEvent = FALSE;
static Point			TheNextEventPoint = { -1, -1 };


/* ----------------------------------------------------------------------
void txtInitialize()
	{
	Int16T		i;

	for (i = 0; i < TXT_MAX_TEXT_BLOCKS; i++ )
		{
		textBlocks[i].content = NewHandle(1);
		**(textBlocks[i].content) = '\0';
		SetRect ( &(textBlocks[i].destRect), 0, 0, 0, 0 );
		textBlocks[i].selPoint = 0;
		}

	}

/* ----------------------------------------------------------------------
Handle txtGetText(Int16T blockNum)
	{
```

```
        return ( textBlocks[blockNum].content);
        }

/* -------------------------------------------------------------------------------
EditBlock *txtGetEditBlock(Int16T blockNum)
        {
        return ( &(textBlocks[blockNum]) );
        }

/* -------------------------------------------------------------------------------
/* Edit
        This is the workhorse editor function that serves both scrolling and non-scrolling
        Pass the rect of the view area, and the pointer to the EditBlock. The EditBlock cc
        the persistent data for the text, including content, current scroll position, and ins
        point. Passing rects for up and down scroll areas makes this text scrollable by clic
        those rects.
        The edit is ended by a click in any valid touch area outside of the viewRect, or by
        Cmd-. (for emergencies). When ended by a valid touch externally, the point of t
        is preserved, the TE is cleaned up, and the touch is invoked as the last line.
        For more details, see the full notes in the TXT Notes file.
        */

void txtEditSetup( Rect *viewRect,          /* visible rect */
                   EditBlock  *itsBlock,    /* persistent data struct */
                   Handle upSnip,           /* scroll up button snip */
                   Handle downSnip,                 /* scroll down button snip */
                   Handle upHighSnip,       /* handle to snips for up and down highlic
                   Handle downHighSnip,
                   Handle thumbAreaSnip,
                   Handle thumbSnip)
        {
        Boolean         extend,
                        done = FALSE;
        Int32T          selPoint, totalHeight, lnAdjust;
        Handle          inText;
        Rect            destRect;
        EventRecord     theEvent;

        /*
         * set up globals
         */
        TheViewRect             = *viewRect;
        TheUpSnip               = upSnip;
        TheDownSnip             = downSnip;
        TheUpHighSnip           = upHighSnip;
        TheDownHighSnip         = downHighSnip;
        TheThumbAreaSnip        = thumbAreaSnip;
        TheThumbSnip            = thumbSnip;
        TheBlock                = itsBlock;

        if ( TheUpSnip && TheDownSnip )
                {
                libGetPicRect( TheUpSnip, &TheUpRect );
                libGetPicRect( TheDownSnip, &TheDownRect );
                libGetPicRect( TheThumbAreaSnip, &ThumbAreaRect );
                Scrollable = TRUE;
                }

        inText = TheBlock->content;
        destRect = TheBlock->destRect;
        selPoint = TheBlock->selPoint;

        /* pay attention to (H) commands */
        conSetUpTextAttributes();

        if ( destRect.left == 0 )          /* assume it's not yet initialized */
                {
```

BEST AVAILABLE COPY

BEST AVAILABLE COPY

```
        destRect = TheViewRect;
        selPoint = 0;
        }

    TheText = TENew(&destRect, &TheViewRect);

    /*  this sets the text handle of the TE rec to the text handle of the inText para
        persistent storage of the text block exists in the program.
    */
    HLock ( (Handle) TheText);
    HLock ( (Handle)(**TheText).hText );
    (**TheText).hText = inText;
    (**TheText).txFont = tglTextFont;
    (**TheText).txFace = tglTextFace;
    (**TheText).txSize = tglTextSize;
    HUnlock((Handle)(**TheText).hText);
    (**TheText).teLength = (inText) ? strlen(*inText) : 0;          /* might not be a
    HUnlock ((Handle)TheText);

    TESetSelect( selPoint, selPoint, TheText);

    TECalText (TheText);
    TEUpdate ( &TheViewRect, TheText);

    TheLineHeight = TEGetHeight( 1, 1, TheText );           /* get one line's height
    TEActivate(TheText);
    if (TheUpSnip != NULL )
        { TEAutoView(TRUE, TheText); }              /* autoview for scrolling edits
    else
        { TEAutoView(FALSE, TheText); }

    scrRestoreColors();
    txtUpdateThumb ();
    conSetUpTextAttributes();
}


void txtEditEveryCycle( void )
{

    TEIdle ( TheText );
    txtChangeCursor();

}


Boolean txtEditKeyDown( EventRecord theEvent )
{
    Boolean     done;

    done = txtKeyHandle( &theEvent );
    scrRestoreColors();
    txtUpdateThumb ();
    conSetUpTextAttributes();
    return (done);

}


Boolean txtEditMouseDown( Point where, Int32T modifiers )
{
    Int32T      totalHeight;

    if ( PtInRect( where, &TheViewRect) )
        {
        TEClick(where, modifiers & shiftKey, TheText);
        scrRestoreColors();
```

BEST AVAILABLE COPY

```
            txtUpdateThumb ();
            conSetUpTextAttributes();
            return (FALSE);
            }

    if ( Scrollable )           /* only if there were valid rects specified */
        {
        if ( PtInRect( where, &TheUpRect) )
            {
            scrRestoreColors();
            grfDrawPic ( TheUpHighSnip, NULL );
            conSetUpTextAttributes();
            while (StillDown())
                {
                if ( TheViewRect.top >= ((**TheText).destRect.top + TheLineH
                    {
                    TEScroll ( 0, TheLineHeight, TheText );
                    scrRestoreColors();
                    txtUpdateThumb ();
                    conSetUpTextAttributes();
                    }
                }
            scrRestoreColors();
            grfDrawPic ( TheUpSnip, NULL );
            conSetUpTextAttributes();
            return (FALSE);
            }

        if ( PtInRect( where, &TheDownRect) )
            {
            scrRestoreColors();
            grfDrawPic ( TheDownHighSnip, NULL );
            conSetUpTextAttributes();
            while (StillDown())
                {
                totalHeight =  ((**TheText).nLines ) * TheLineHeight;
                if  ( totalHeight + (**TheText).destRect.top > TheViewRect.bo
                    {
                    TEScroll ( 0, -TheLineHeight, TheText );
                    scrRestoreColors();
                    txtUpdateThumb ();
                    conSetUpTextAttributes();
                    }
                }
            scrRestoreColors();
            grfDrawPic ( TheDownSnip, NULL );
            conSetUpTextAttributes();
            return (FALSE);
            }
        } /* end of scrolling checks */

    if ( tchValidTouch ( (Point *) &(where) ) ) {
        ValidNextEvent = TRUE;
        TheNextEventPoint = where;
        return (TRUE);
    }
    else tchBeepNow( TGL_BAD_BEEP );

}


void txtEditCleanup( void )
{
    RGBColor        oldColor, backColor;

    /* close up shop and save the channel */
    TheBlock->selPoint = (**TheText).selStart;
    TheBlock->destRect = (**TheText).destRect;
```

```
	TEDeactivate(TheText);
	TEUpdate (&TheViewRect, TheText);
	(**TheText).hText = NULL;		/* protect the text from being wiped out */
	TEDispose (TheText);
	RGBBackColor(&oldColor);		/* restore that background color */
	InitCursor();
	if (ValidNextEvent)		/* they exited via a valid touch area outside */
		{
		tchTouchHandler( &TheNextEventPoint);
		ValidNextEvent = FALSE;
		}

/* new stuff: clean up after (H) commands */
conFixTextAttributes();
}
```

BEST AVAILABLE COPY

```
/* ---------------------------------------------------------------------------
/* Show
	This just shows the text without editing it for when a note pad first comes up

*/

void txtShow( Rect *viewRect,		/* visible rect */
		EditBlock *itsBlock,	/* persistent data struct */
		Handle upSnip,		/* scroll up button snip */
		Handle downSnip,		/* scroll down button snip */
		Handle upHighSnip,	/* handle to snips for up and down highlig!
		Handle downHighSnip,
		Handle thumbAreaSnip,
		Handle thumbSnip )
	{
	Boolean			extend, done = FALSE;
	int32T			selPoint, totalHeight, lnAdjust;
	Handle			inText;
	Rect			destRect;
	EventRecord		theEvent;
	RGBColor		oldColor, backColor;

	/*
	 * set up globals
	 */
	TheViewRect		= *viewRect;
	TheUpSnip		= upSnip;
	TheDownSnip		= downSnip;
	TheUpHighSnip		= upHighSnip;
	TheDownHighSnip		= downHighSnip;
	TheThumbAreaSnip	= thumbAreaSnip;
	TheThumbSnip		= thumbSnip;
	TheBlock		= itsBlock;


	#ifdef BOB
	libGetPicRect( TheUpSnip, &TheUpRect );
	libGetPicRect( TheDownSnip, &TheDownRect );
	libGetPicRect( TheThumbAreaSnip, &ThumbAreaRect );
	#endif

	inText = TheBlock->content;
	destRect = TheBlock->destRect;
	selPoint = TheBlock->selPoint;

	/*  pay attention to (H) commands */
	conSetUpTextAttributes();

	if ( destRect.left == 0 )		/* assume it's not yet initialized */
```

BEST AVAILABLE COPY

```
		{
		destRect = TheViewRect;
		selPoint = 0;
		}

	TheText = TENew(&destRect, &TheViewRect);

	/*	this sets the text handle of the TE rec to the text handle of the inText para
		persistent storage of the text block exists in the program.
	*/
	HLock ( (Handle) TheText);
	HLock ( (Handle)(**TheText).hText );
	(**TheText).hText = inText;
	(**TheText).txFont = tglTextFont;
	(**TheText).txFace = tglTextFace;
	(**TheText).txSize = tglTextSize;
	HUnlock((Handle)(**TheText).hText);
	(**TheText).teLength = (inText) ? strlen(*inText) : 0;		/* might not be a
	HUnlock ((Handle)TheText);

	TESetSelect( selPoint, selPoint, TheText);

	TECalText (TheText);
	TEUpdate ( &TheViewRect, TheText);

	TheLineHeight = TEGetHeight( 1, 1, TheText );		/* get one line's height
	TEActivate(TheText);
	if (TheUpSnip != NULL )
		{ TEAutoView(TRUE, TheText); }		/* autoview for scrolling edits
	else
		{ TEAutoView(FALSE, TheText); }

	scrRestoreColors();
	txtUpdateThumb ();
	conSetUpTextAttributes();
#ifdef BOB
	while ( !done )
		{
		TEIdle ( TheText);
		txtChangeCursor( &TheViewRect);

		GetNextEvent(everyEvent, &theEvent);

		switch ( theEvent.what )
			{
			case (keyDown) :
			case (autoKey) :

				done = txtKeyHandle( &theEvent );
				scrRestoreColors();
				txtUpdateThumb ();
				conSetUpTextAttributes();
				break;

			case (mouseDown) :

				if ( PtInRect( theEvent.where, &TheViewRect) )
					{
					extend = (theEvent.modifiers & shiftKey );
					TEClick(theEvent.where, extend, TheText);
					scrRestoreColors();
					txtUpdateThumb ();
					conSetUpTextAttributes();
					break;
					}

				if ( TheUpSnip && TheDownSnip )		/* only if there w
					{
```

```
                    if ( PtInRect( theEvent.where, &TheUpRect) )
                        {
                        scrRestoreColors();
                        grfDrawPic ( TheUpHighSnip, NULL );
                        conSetUpTextAttributes();
                        while (StillDown())
                            {
                            if ( TheViewRect.top >= ((**TheText).destR
                                {
                                TEScroll ( 0, TheLineHeight, TheText
                                scrRestoreColors();
                                txtUpdateThumb ();
                                conSetUpTextAttributes();
                                }
                            }
                        scrRestoreColors();
                        grfDrawPic ( TheUpSnip, NULL );
                        conSetUpTextAttributes();
                        break;
                        }

                    if ( PtInRect( theEvent.where, &TheDownRect) )
                        {
                        scrRestoreColors();
                        grfDrawPic ( TheDownHighSnip, NULL );
                        conSetUpTextAttributes();
                        while (StillDown())
                            {
                            totalHeight =  ((**TheText).nLines ) * TheL
                            if  ( totalHeight + (**TheText).destRect.tor
                                {
                                TEScroll ( 0, -TheLineHeight, TheText
                                scrRestoreColors();
                                txtUpdateThumb ();
                                conSetUpTextAttributes();
                                }
                            }
                        scrRestoreColors();
                        grfDrawPic ( TheDownSnip, NULL );
                        conSetUpTextAttributes();
                        break;
                        }
                    } /* end of scrolling checks */

                if ( tchValidTouch ( (Point *) &(theEvent.where) ) )
                    {
                    done = TRUE;
                    TheNextEventPoint = theEvent.where;
                    ValidNextEvent = TRUE;
                    break;
                    }


                break;
            }   /* end of switch statement */
        }   /* end of while loop */
#endif
        /* close up shop and save the channel */
        TheBlock->selPoint = (**TheText).selStart;
        TheBlock->destRect = (**TheText).destRect;
        TEDeactivate(TheText);
        TEUpdate (&TheViewRect, TheText);
        (**TheText).hText = NULL;          /* protect the text from being wipe
        TEDispose (TheText);
        RGBBackColor(&oldColor);           /* restore that background color */
        InitCursor();
        if (ValidNextEvent)             /* they exited via a valid touch area outsid
            {
```

BEST AVAILABLE COPY

```
			tchTouchHandler(&TheNextEventPoint);
			ValidNextEvent = FALSE;
			}

	/*  new stuff: clean_up after (H) commands  */
	conFixTextAttributes();
	}


/* ----------------------------------------------------------------
/* UpdateThumb
	redraws the thumb in the scroll bar area to the correct current position
	*/

void txtUpdateThumb ( void )
	{
	Point		atLoc;
	Int16T			totalHeight, viewHeight, vertOffset, newVert, i;
	Real80T			percDisp;
	Rect			thumbRect;
	static Int16T		oldVert = 0, thumbAreaHeight = 0;

	atLoc.h = ThumbAreaRect.left;

	TheLineHeight = TEGetHeight( 1, 1, TheText );		/* get one line's height

	totalHeight =  ((**TheText).nLines) * TheLineHeight;

	/* compensate the height of the visible rectangle of text when there is more thai
	if ( totalHeight > ( totalHeight - ((**TheText).viewRect.bottom - (**TheText).view
		{
		totalHeight -= ((**TheText).viewRect.bottom - (**TheText).viewRect.top);
		}

	viewHeight =  (**TheText).viewRect.top - (**TheText).destRect.top;

	percDisp = ( viewHeight == 0) ? 0 : (Real80T) viewHeight / totalHeight;

	if ( percDisp > 1 ) percDisp = 1.0;

	if ( ! thumbAreaHeight )			/* init the ACTUAL thumb area height */
		/* remember that the thumb snip is drawn from the top, and so the atLoc.
			be compared to the thumb area minus the height of the thumb */
		{
		libGetPicRect( TheThumbSnip, &thumbRect);
		thumbAreaHeight =
			( (ThumbAreaRect.bottom - ThumbAreaRect.top) -		/*  thumb a
			( thumbRect.bottom - thumbRect.top) );				/*  th
		}

	vertOffset = thumbAreaHeight * percDisp;

	newVert = ThumbAreaRect.top + vertOffset;

	if ( ! oldVert )		{ oldVert = newVert; }

	if ( newVert > oldVert )  /* going down */
		{
		for ( i = oldVert; i <= newVert; i++ )
			{
			atLoc.v = i;
			grfDrawPic ( TheThumbSnip, &atLoc );
			}
		}
	else
		{
		for ( i = oldVert; i >= newVert; i-- )
			{
```

BEST AVAILABLE COPY

```
			atLoc.v = i;
			grfDrawPic ( TheThumbSnip, &atLoc );
			}
		}'

	oldVert = atLoc.v;
	}

/* ------------------------------------------------------------------------
/* KeyHandle
		handles all keyDown events for the event loop of the txtEdit() call.
		Checks for Cmd-. (advanced user interrupt shortcut) or passes the key alo
		Checks for non-scrolling Edit type, and if so deletes back a keystroke that
		the last character out of the viewRect.
		*/

Boolean txtKeyHandle ( EventRecord *theEvent )
	{
	char		theChar;
	int32T		totalHeight;

	theChar = theEvent->message & charCodeMask;

	if (  ( theChar == '.') && (theEvent->modifiers & cmdKey ) )
		{
		return TRUE;			/* signal done state */
		}

	TEKey ( theChar, TheText );
	TESelView(TheText);

	if  ((! Scrollable ) && ((**TheText).teLength > 0 ))			/* non-scrolling e
		{
		TheLineHeight = TEGetHeight( 1, 1, TheText );			/* get one line's h
		totalHeight =  ((**TheText).nLines ) * TheLineHeight;
		if  ( totalHeight + (**TheText).viewRect.top > (**TheText).viewRect.bottor
			{
			SysBeep(1);
			TEKey (deleteKey, TheText);
			}
		}
		return FALSE;
	}

/* ------------------------------------------------------------------------
/* ChangeCursor
		checks the current mouse position to see if it is in the active text area. If it
		is changed to an I-beam, else back to the arrow.
		Should be called once each time through the event loop.
		*/

void txtChangeCursor ()
	{
	CursHandle  iBeam;
	Point			mouseLoc;

	GetMouse (&mouseLoc);
	if (PtInRect ( mouseLoc, &TheViewRect ) )
		{
		iBeam = GetCursor( iBeamCursor);
		SetCursor(*iBeam);
		}
	else
		{
		InitCursor();
		}
	}
```

```
/* -----------------------------------------------------------------------
/*      FirstLine
                Displays the first line of the text block in the rectange, followed by
                */
```

BEST AVAILABLE COPY

```
void txtFirstLine ( Rect *viewRect, EditBlock *itsBlock )
        {
        char            *next, *prev, buf[200];
        Int32T          spaceLeft, spaceElls, subLen;
        Handle          inText;

        /*
         * set up TheViewRect
         */
        TheViewRect = *viewRect;
        TheBlock     = itsBlock;

        inText = TheBlock->content;

        /*      get the length of the rect        */
        spaceLeft = TheViewRect.right - TheViewRect.left;

        /*      get the length of the ellipsis  */
        spaceElls = StringWidth("\p...");
        spaceLeft -= spaceElls;

        HLock ( inText );
        next = *inText;

        do
                {
                prev = next;
                next = strchr ( prev+1, ' ');
                subLen = next - (char *) *inText;
                }
                while ( (next ) && ( TextWidth( *inText, 1, subLen) <= spaceLeft ) );

        subLen = prev - (char *) *inText;
        strncpy ( buf,  (char *) *inText, subLen);
        buf[subLen] = '\0';
        if ( prev = strchr(buf,'\r') )
                {
                *prev = '\0';
                }
        strcat (buf, "...");
        HUnlock (inText);
        TextBox ( buf, strlen(buf), &TheViewRect, teJustLeft );
        }

/* ===================================================================
/* A P P L I C A T I O N - S P E C I F I C   Y - C O M M A N D S
/* For editing the different notepads.



/* -----------------------------------------------------------------------
/*  LoadNotes
        load five of the ten special edit notepads 1-10, selected by number.
*/

void txtLoadNotes ( Int16T noteNum )
        {
        Int16T          i;

    if ( noteNum < 1 || noteNum > 10 )
        { TGL_ERROR ( "Bad note number for editing (out of range)"); return; }
```

BEST AVAILABLE COPY

```
/* get a 0 for the first five, or a 1 for the second five */
noteNum = noteNum / 5;

/* note: these variable numbers are hard-wired (sorry) */
for ( i = 1; i < 6; i++ )
    txtLoadNote( i + noteNum * 5, 349 + i * 3 );
    }

void txtLoadNote ( Int16T noteNum, Int32T varNum )
    {
    EditBlock    *theText;
    Handle           hText;
    Int16T           i, j;
    char         *varStart, *text;

    /* get a pointer to our source */
    theText = txtGetEditBlock(noteNum);
    hText = theText->content;
    HLock( hText );
    text = *hText;

    /* get a pointer to our target */
    varStart = varPtr( varNum );

    /* copy the first line or 30 characters */
    i = 0;
    while ( text[i] != '\r' &&
                text[i] != '\n' &&
                text[i] != '\0' &&
                i < 30 )
        {
        *(varStart + i) = text[i];
        i++;
        }

    /* if we copied exactly 30 characters, back up to a space so we don't split a wor
    if ( i == 30 )
        while ( *(varStart + i) != ' ' && i > 0 ) i--;

    /* end the variable */
    *(varStart + i) = '\0';

    /* add an ellipsis if we should... */
    j = i;
    while ( text[j] != '\0' )
        {
        if ( ! isspace( text[j] ) ) break;
        j++;
        }

    if ( isalnum( text[j] ) ) strcat( varStart, "..." );

    HUnlock( hText );
    }


/* ---------------------------------------------------------------------------
/* ShowNoteNum
    edit one of the ten special edit notepads 1-10, selected by number.
    */

void txtShowNoteNum ( Int16T noteNum )
    {
    EditBlock              *theText;
    Rect                   viewRect, upRect, downRect;
    Handle                 hSnip;
```

BEST AVAILABLE COPY

```
if ( noteNum < 1 || noteNum > 10 )
    { TGL_ERROR ( "Bad note number for showing (out of range)"); return; }

    hSnip = libFindPicPtr( NOTE_VIEW_SNIP, TRUE  );
    if (hSnip == NULL)
        { scnScanError( "Image not in library", NOTE_VIEW_SNIP );       return;
    libGetPicRect( hSnip, &viewRect );

    theText = txtGetEditBlock(noteNum);

    txtShow(&viewRect, theText, NULL, NULL, NULL, NULL, NULL, NULL );
    }


/* ------------------------------------------------------------------------
void txtClearBlocks()
    {
    Int16T              i;

    for (i = 0; i < TXT_MAX_TEXT_BLOCKS; i++ )
        {
        SetHandleSize(textBlocks[i].content, 1);
        **(textBlocks[i].content) = '\0';
        SetRect ( &(textBlocks[i].destRect), 0, 0, 0, 0 );
        textBlocks[i].selPoint = 0;
        }

    }
```

BEST AVAILABLE COPY

```
/*
	Variable storage, retrieval, and formatting
*/

	#include	"standard.h"
	#include	"tglMain.h"
	#include	"glue.h"
	#include	"varFns.h"
	#include	"format.h"


/*  VARIABLE TABLE  */

/* dynamically allocated array of size [MAXVAR] [MAXLEN]*/
/* VarTab= NewPtr( VAR_MAXVAR * VAR_MAXVARLEN ); */

varVarStringT  *VarTab;

/************************************************************************
	varInitialize() -- allocate heap space for variable table
************************************************************************
BooleanT varInitialize( void )
{
int32T		i;

	VarTab= (varVarStringT*) NewPtr( VAR_MAXVAR *  VAR_MAXVARLEN );  /* all
	if( VarTab == NULL )
		TGL_FATAL_ERROR( "Can't allocate space for variable table" );

	for(i=0; i < VAR_MAXVAR; i++)				/* initialize it */
		VarTab[i][0] = '\0';

	return( FALSE );
}


/*
************************************************************************
 Dollar formatting
	assumes pS points to string of digits
	puts floating $ in front, commas every 3 digits
************************************************************************
*/
void varDollarFmt( pD, pS, useDollarSign )
	char *pD;
	char *pS;
	BooleanT useDollarSign;
	{
	formatNumber(pD, pS, 100, FALSE, 10, FALSE, 'L', TRUE, FALSE,
		useDollarSign ? '$' : '\0');
	}

/*
************************************************************************
	Dollar format return variable value
	puts floating $ in front, commas every 3 digits
	returns pointer to formatted string located in dest string.
************************************************************************
*/
char *varDollar( dest, varnum )
char *dest;
int32T varnum;
{
	char   *vp;

	vp = varPtr( varnum );
	if (*vp == '$')
		vp++;
```

BEST AVAILABLE COPY

```
        return ( DollarConv(dest, vp) );
}

/* ------------------------------------------------------------*/
char *val2Dollar( dest, value )
char *dest;
Int32T value;
{
        char    buf[20];

        sprintf( buf, "%ld", value);
        return ( DollarConv(dest, buf) );
}

/* ------------------------------------------------------------*/
/* takes value in vp and adds $ and commas, stores into buf, returns pointer */
char *DollarConv( dest, source )
char *dest;
char *source;
{
        Int32T          len,
                        destIndex = 1,                  /* rem: dest[0] holds '$'
                        sourcePos = 1;

        *dest = '\0';
        len = strlen( source );
        if ( len == 0)                          /* make sure there's something to cc
                return (dest);

        *dest = '$';

        if ( *source == '-' )           /* negative number */
                {
                dest[destIndex++] = '-';
                source++;
                len = strlen(source);
                }

        while (*source != '\0') {

                dest[destIndex++] = *source++;

                if ( (len - sourcePos++ ) % 3  == 0)    /* add ',' and skip a pos */
                        dest[destIndex++] = ',';

        }
        dest[destIndex-1] = '\0';
        return (dest);
}

/***********************************************************************
*
        NotBlank() -- return TRUE iff string has value
***********************************************************************
/
BooleanT    varNotBlank( pC)
        char *pC;
{
        Int32T I;

        for(i=0; *pC; pC++)
                if( *pC > ' ') return( TRUE );
        return( FALSE );
}

/***********************************************************************
*
        MakeLong() -- extract Int32T number from string
```

varFns.c

BEST AVAILABLE COPY

```
*************************************************************************
/
Int32T      varMakeLong( pC )
      char *pC;
{
      Int32T sign;
      Int32T retval;
      char c;


      retval=0;
      sign= 1;
      for(; c= *pC; pC++)
            {
            if( isdigit( c ))
                  {
                  retval *= 10;
                  retval += c - '0';
                  }
            else  /* note the unusually forgiving criteria for what is a 'number' */
                  {
                  if( c == '.')
                        break;                                          /* ig
                  else if( c == '-' && retval == 0 )
                        sign= -1;                                    /* but obe
                  }
            }

      return( sign * retval );
}

/*************************************************************************
*
      MakeReal() -- extract Real80T number from string, possibily with commas and c
*************************************************************************
/
Real80T     varMakeReal( pC )
      char *pC;
{
      Real80T sign;
      Real80T retval;
      char c;


      retval= 0,0;
      sign= 1.0;
      for(; c= *pC; pC++)
            {
            if( isdigit( c ))
                  {
                  retval *= 10.0;
                  retval += c - '0';
                  }
            else  /* note the unusually forgiving criteria for what is a 'number' */
                  {
                  if( c == '.')
                        break;                                          /* i
                  else if( c == '-' && retval == 0 )
                        sign= -1.0;                                  /* but obe
                  }
            }

      return( (Real80T) (sign * retval) );
}
```

BEST AVAILABLE COPY

```
/****************************************************************************
*
       SetF() -- set variable
****************************************************************************
/
#define ABS(a) ((a) < 0 ? (-(a)) : (a) )
void varSetF( varnum, value )
       Int32T varnum;
       Real80T value;
{
       if ( ( value != 0.0 && ABS( value ) < 1.0e-30 ) || ABS( value ) > 1.0e30 )
              TGL_ERROR( "float out of range, uninitialized variable?" );
       sprintf( VarTab[ varnum ], "%1.0Lf", value );
}

/****************************************************************************
*
       SetL() -- set variable
****************************************************************************
/
void varSetL( varnum, value )
       Int32T varnum;
       Int32T value;
{
       sprintf( VarTab[ varnum ], "%.1ld", value );
}

/****************************************************************************
*
       SetS() -- set variable
****************************************************************************
/
void varSetS( varnum, value )
       Int32T varnum;
       char * value;
{
       sprintf( VarTab[ varnum ], "%s", value );
}

/****************************************************************************
*
       val() -- get value of variable as integer
       NOTE THAT THIS GUY STRIPS $ signs and commas, whilw varValF does not
       ( stupid decision, but I dont want to fix now 2-4-90 /hmh )
****************************************************************************
/
Int32T       varVal( varnum )
       Int32T varnum;
{
       return( varMakeLong( VarTab[ varnum ] ) );
}

/****************************************************************************
*
       varAtof() -- atof() in MPW 3.0 is buggy; use sscanf instead
****************************************************************************
/
Real80T       varAtof ( pC )
       char *pC;
       {
       register char *here;
       char temp[256];
       register int i;
       Real80T x;

       /* remove anything that doesn't look like a number */
       here = pC;
```

BEST AVAILABLE COPY

```
	i = 0;
	while ( *here != '\0' )
		{
		if ( isdigit( *here ) ||
			*here == '.' ||
			*here == '-' )
			temp[i++] = *here;
		here++;
		}
	temp[i] = '\0';

	#ifdef THINK_C
		x= atof( temp );
	#else
		sscanf( temp, "%Lf", &x );
	#endif

	return( x );
	}

/**********************************************************************
*
	valF() -- get value of variable as Real80T
**********************************************************************
/
Real80T		varValF ( varnum )
	Int32T varnum;
	{
	return( (Real80T) varAtof( varPtr( varnum ) ) );
	}

/**********************************************************************
*
	varPtr() -- return pointer to value
**********************************************************************
/
char *		varPtr( varnum )
	Int32T varnum;
{
	return( VarTab[ varnum ] );
}

/**********************************************************************
*
	qDef() -- return TRUE if variable defined
**********************************************************************
/
Int32T		varQDef( varnum )
	Int32T varnum;
{
	return( varNotBlank( VarTab[ varnum ] ) );
}

/* Tax Rate Calculator Code			*/
/* CitiBank Money Advisor		*/
/* Tax Calc.c		*/
/* 1/28/90 - JDT		*/

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
```

BEST AVAILABLE COPY

```
#include "tchTouch.h"
#include "edtEdit.h"
#include "scrScreen.h"
#include "grfGraphics.h"

/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};        /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10


/* More Local variables */
static char hold_gi[VAR_MAXVARLEN];
static char hold_td[VAR_MAXVARLEN];
static Boolean two_s;

void taxCalcSetup( void )
{
        Point ip;
        char  temp[32];
        Handle      hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
                }
        }

        if (strlen(varPtr(taxNexempt))==0) strcpy(varPtr(taxNexempt),"1");

        if (strlen(varPtr(taxRes))==0) strcpy(varPtr(taxRes),"New York");

        /* Two screens ? */
        two_s = tglNumVisibleScreens == 2;

        PutSnipT("blank tax.s", NULL);

        /* Text */
        taxcalccolor(OUR_HUE);
```

```
        /* Default values */
        ip = topLeft(agross_rect);
        ip.h += 147; ip.v += 13;
        MoveTo2(ip.h, ip.v);
        formatNumber(temp,varPtr(vGrossIncome),INPUT_WIDTH,TRUE,0,FALSE,' ',TRUE
        drawstring2(temp);
        ip = topLeft(nexempt_rect);
        ip.h += 147; ip.v += 13;
        MoveTo2(ip.h, ip.v);
        drawstring2(varPtr(taxNexempt));
        ip = topLeft(deduct_rect);
        ip.h += 147; ip.v += 13;
        MoveTo2(ip.h, ip.v);
        drawstring2(varPtr(taxDeduct));
        ip = topLeft(fstatus_rect);
        ip.h += 147; ip.v += 12;
        MoveTo2(ip.h, ip.v);
        drawstring2(varPtr(taxFstatus));
        ip = topLeft(res_rect);
        ip.h += 147; ip.v += 12;
        MoveTo2(ip.h, ip.v);
        drawstring2(varPtr(taxRes));
        tax_rate();
}


Boolean taxCalcMouseDown( Point where )
{
        Rect  ar;
        Point ip;

        /*
         * point in close box
         */
        if (PtInRect(where, &close_rect)) {

                tchBeepNow(TCH_GOOD_BEEP);
                return (TRUE);
        }


        /*
         * point in Gross Income box
         */
        else if (PtInRect(where, &agross_rect)) {

                tglCursorOnOff(TGL_OFF);
                tax_rate();
                taxcalccolor(OUR_HUE);
                ar = agross_rect;
                ar.top -= 2; ar.right -= 130;
                grfInterchange2(246L, 255L, &ar);
                grfInterchange2(7L, 254L, &ar);
                tchBeepNow(TCH_GOOD_BEEP);
                grfInterchange2(255L, 246L, &ar);
                grfInterchange2(254L, 7L, &ar);
                tglCursorOnOff(TGL_ON);
                ip = topLeft(agross_rect);
                ip.h += 147; ip.v += 12;
                ar = agross_rect;
                ar.left += 146; ar.top++; ar.bottom--;

                /*
                 * set up the edit gopher
                 */
```

BEST AVAILABLE COPY

```
        edtEditLen = INPUT_WIDTH;
        tglEditGopher->StartHandler();
        tglEditGopher->EditSetup(ip,varPtr(vGrossIncome),TRUE,vGrossIncome,tw
INPUT_WIDTH, 0,
                FALSE, FALSE, '$', &ar);

    }

    /*
     * point in number of exemptions box
     */
    else if (PtInRect(where, &nexempt_rect)) {

        tglCursorOnOff(TGL_OFF);
        tax_rate();
        taxcalccolor(OUR_HUE);
        ar = nexempt_rect;
        ar.top -= 2; ar.right -= 130;
        grfinterchange2(2L, 255L, &ar);
        grfinterchange2(246L, 254L, &ar);
        tchBeepNow(TCH_GOOD_BEEP);
        grfinterchange2(255L, 2L, &ar);
        grfinterchange2(254L, 246L, &ar);
        tglCursorOnOff(TGL_ON);
        ip = topLeft(nexempt_rect);
        ip.h += 147; ip.v += 12;
        ar = nexempt_rect;
        ar.left += 146; ar.top++; ar.bottom--;

        /*
         * set up edit gopher
         */
        edtEditLen = 2;
        tglEditGopher->StartHandler();
        tglEditGopher->EditSetup(ip,varPtr(taxNexempt),TRUE,taxNexempt,two_s,
FALSE, FALSE, '\0', &ar);

   }


  /*
   * point in deduction box
   */
     else if (PtInRect(where, &deduct_rect)) {

        tglCursorOnOff(TGL_OFF);
        tax_rate();
        taxcalccolor(OUR_HUE);
  ar = deduct_rect;
  ar.top -= 2; ar.right -= 130;
        grfinterchange2(73L, 255L, &ar);
        grfinterchange2(246L, 254L, &ar);
        tchBeepNow(TCH_GOOD_BEEP);
        grfinterchange2(255L, 73L, &ar);
        grfinterchange2(254L, 246L, &ar);
        tglCursorOnOff(TGL_ON);


        /*
         * standard deduction
         */
        if (strcmp(varPtr(taxDeduct),"Standard")==0) {
                strcpy(varPtr(taxDeduct),hold_td);
   ip = topLeft(deduct_rect);
        ip.h += 147; ip.v += 12;
   ar = deduct_rect;
   ar.left += 146; ar.top++; ar.bottom--;
```

BEST AVAILABLE COPY

```
                    * set up edit gopher
                    */
                    edtEditLen = INPUT_WIDTH;
                    tglEditGopher->StartHandler();
                    tglEditGopher->EditSetup(ip,varPtr(taxDeduct),TRUE,taxDeduct,twc
INPUT_WIDTH, 0, FALSE, FALSE, '$', &ar);
            }

            /*
             * Itemized deduction
             */
            else {

                    strcpy(hold_td,varPtr(taxDeduct));
                    taxcalccolor(OUR_HUE);
            ar = deduct_rect;
            ar.left += 147; ar.top += 3;
                    EraseRect2(&ar);
                    strcpy(varPtr(taxDeduct),"Standard");
                    ip = topLeft(deduct_rect);
                    ip.h += 147; ip.v += 12;
                    MoveTo2(ip.h, ip.v);
                    drawstring2(varPtr(taxDeduct));
                    tax_rate();
            }
    }

/*
 * filing status box
 */
    else if (PtInRect(where, &fstatus_rect)) {

            tglCursorOnOff(TGL_OFF);
            tax_rate();
   ar = fstatus_rect;
   ar.top -= 2; ar.right -= 130;
            grfInterchange2(8L, 255L, &ar);
            grfInterchange2(246L, 254L, &ar);
            tchBeepNow(TCH_GOOD_BEEP);
            grfInterchange2(255L, 8L, &ar);
            grfInterchange2(254L, 246L, &ar);
            tglCursorOnOff(TGL_ON);
            taxcalccolor(OUR_HUE);
    ar = fstatus_rect;
    ar.left += 147; ar.top += 3;
            EraseRect2(&ar);
            switch (varPtr(taxFstatus)[1]) {
                    case 'i': strcpy(varPtr(taxFstatus),"Joint"); break;
                    case 'o': strcpy(varPtr(taxFstatus),"Separate"); break;
                    case 'e': strcpy(varPtr(taxFstatus),"Hd. of Household"); break;
                    case 'd': strcpy(varPtr(taxFstatus),"Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
    }

/*
 * result box
 */
    else if (PtInRect(where, &res_rect)) {
```

BEST AVAILABLE COPY

```
		tglCursorOnOff(TGL_OFF);
		tax_rate();
	ar = res_rect;
	ar.top -= 2; ar.right -= 130;
		grfInterchange2(114L, 255L, &ar);
		grfInterchange2(246L, 254L, &ar);
		tchBeepNow(TCH_GOOD_BEEP);
		grfInterchange2(255L, 114L, &ar);
		grfInterchange2(254L, 246L, &ar);
		tglCursorOnOff(TGL_ON);
		taxcalccolor(OUR_HUE);
	ar = res_rect;
	ar.left += 147; ar.top += 3;
		EraseRect2(&ar);
		switch (varPtr(taxRes)[8]) {
			case '\0': strcpy(varPtr(taxRes),"New York City"); break;
			case ' ': strcpy(varPtr(taxRes),"New York"); break;
		}
		ip = topLeft(res_rect);
		ip.h += 147; ip.v += 12;
		MoveTo2(ip.h, ip.v);
		drawstring2(varPtr(taxRes));
		tax_rate();
	}


	/*
	 * valid touch outside calculator kills calculator
	 */
	else if ( tchValidTouch ( &where )) {

		tchBeepNow(TCH_GOOD_BEEP);
		return (TRUE);
	}


	/*
	 * any other point is bad
	 */
	else {

		tchBeepNow(TCH_BAD_BEEP);
	}

	return (FALSE);
}


Boolean taxCalcKeyDown( EventRecord theEvent )
{
	char	key;

	key = theEvent.message;
	if	(key == '\n' || key == 0x0D ) {
		tax_rate();
		taxcalccolor(OUR_HUE);
		return (TRUE);
	}

	return (FALSE);
}


void taxCalcCleanup( void )
{
	Handle		hSnip;
```

varFns.c

BEST AVAILABLE COPY

```
	strcpy(varPtr(vGrossIncome), hold_gi);
	hSnip = libFindPicPtr("blank tax.s", TRUE);
	HPurge(hSnip);
	scrRestoreColors();
}


Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	 switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	 }
	} else {
		/* What you said */
		strcpy(temp, varPtr(taxDeduct));
		strstrip(temp,"$,");
		taxable -= varAtof(temp);
	}
	taxable -= varValF(taxNexempt)	* 2000.;

	fed_tax = state_tax = city_tax = 0.0;
	switch (varPtr(taxFstatus)[1]) {
		/* Single */
	 case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	/* Joint Married */
	case 'o':
			if (taxable <= 42150.) {
				fed_tax = 0.15;
				state_tax = 0.063;
			if (varPtr(taxRes)[8] == ' ') city_tax = 0.029;
		} else if (taxable <= 86050.) {
				fed_tax = 0.28;
				state_tax = 0.074;
			if (varPtr(taxRes)[8] == ' ') city_tax = 0.03;
		} else if (taxable <= 166520.) {
```

BEST AVAILABLE COPY

```
                                fed_tax = 0.33;
                                state_tax = 0.079;
                        if (varPtr(taxRes)[8] == ' ') city_tax = 0.031;
                } else {
                                fed_tax = 0.28;
                                state_tax = 0.086;
                        if (varPtr(taxRes)[8] == ' ') city_tax = 0.033;
                        }
                break;
        /* Seperate Married */
        case 'e':
                        if (taxable <= 20075.) {
                                fed_tax = 0.15;
                                state_tax = 0.063;
                        if (varPtr(taxRes)[8] == ' ') city_tax = 0.029;
                } else if (taxable <= 42025.) {
                                fed_tax = 0.28;
                                state_tax = 0.074;
                        if (varPtr(taxRes)[8] == ' ') city_tax = 0.03;
                } else if (taxable <= 122495.) {
                                fed_tax = 0.33;
                                state_tax = 0.079;
                        if (varPtr(taxRes)[8] == ' ') city_tax = 0.031;
                } else {
                                fed_tax = 0.28;
                                state_tax = 0.086;
                        if (varPtr(taxRes)[8] == ' ') city_tax = 0.033;
                        }
                break;
        /* Head of Household */
        case 'd':
                        if (taxable <= 42150.) {
                                fed_tax = 0.15;
                                state_tax = 0.063;
                        if (varPtr(taxRes)[8] == ' ') city_tax = 0.029;
                } else if (taxable <= 86050.) {
                                fed_tax = 0.28;
                                state_tax = 0.074;
                        if (varPtr(taxRes)[8] == ' ') city_tax = 0.03;
                } else if (taxable <= 166520.) {
                                fed_tax = 0.33;
                                state_tax = 0.079;
                        if (varPtr(taxRes)[8] == ' ') city_tax = 0.031;
                } else {
                                fed_tax = 0.28;
                                state_tax = 0.086;
                        if (varPtr(taxRes)[8] == ' ') city_tax = 0.033;
                        }
                break;
        default:
                        fed_tax = 0.28;
                        state_tax = 0.079;
                if (varPtr(taxRes)[8] == ' ') city_tax = 0.031;
                break;
        }

        tax = fed_tax + state_tax + city_tax;

        /* Show Rate */
        for (scrScreenSet(0, 1); scrScreenSet(1, 1); ) {
                TextFont(3);
                TextSize(12);
                TextFace(bold);
                RGBForeColor(&tglRgbWhite);
                RGBBackColor(&tglRgbBlack);
                r.top = 145; r.left = 357; r.bottom = 160; r.right = 398;
                EraseRect(&r);
        }
```

varFns.c

BEST AVAILABLE COPY

```
	sprintf(temp,"%2.0lf%%",tax*100.0);
	sprintf(varPtr(taxRate),"%2.0lf",tax*100.0);
	MoveTo2(365,157);
	drawstring2(temp);

	for (scrScreenSet(0, 1); scrScreenSet(1, 1); ) {
		scrSetHue(OUR_HUE, &tglTextFont, &tglTextSize, &tglTextFace,
						&tglTextFGColor, &tglTextBGColor);
	}
	scrSetHueNow2(OUR_HUE);
	return tax;
}

static void	taxcalccolor(hue)
Int16T hue;
{
	for (scrScreenSet(0, 1); scrScreenSet(1, 1); ) {
		tglTextFont = 3;
		tglTextSize = 12;
		tglTextFace = normal;
		TGL_SETRGB(tglTextFGColor, 13107, 13107, 39321);
		TGL_SETRGB(tglTextBGColor, 48059, 48059, 48059);

		TextFont(tglTextFont);
		TextSize(tglTextSize);
		TextFace(tglTextFace);
		RGBForeColor(&tglTextFGColor);
		RGBBackColor(&tglTextBGColor );
	}
}

Int16T strstrip(s, rid)
char *s;						/* The string to st
char *rid;						/* Chars to get rid of */
{
	Int16T i,n,count;
	char *t;

	count=0;
	n = strlen(rid);
	t=s;
	do {
		for (i=0; i<n; i++) {
			if (*s==rid[i]) {
				count++;
				s++;
				goto cont_do;
			}
		}
		*t++ = *s++;
		cont_do: ;
	} while ( *(s-1) != '\0');
	return count;
}

void grfInterchange2(cf, ct, r)
Int32T cf,ct;
Rect *r;
{
	Rect lr;

	lr = *r;
	for (scrScreenSet(0, 1); scrScreenSet(1, 1); ) {
		grfInterchange(cf, ct, &lr);
	}
}

void EraseRect2(r)
```

```
Rect *r;
{
	for (scrScreenSet(0, 1); scrScreenSet(1, 1); ) {
		EraseRect(r);
	}
}

void PutSnipT(name, r)
char *name;                                    /* Sn
Rect *r;                                       /* Op
*/
{
	Handle hSnip;
	Rect theRect;
	Point p;

	hSnip= libFindPicPtr( name, TRUE );
	libGetPicRect(hSnip, &theRect);
	p = topLeft(theRect);
	for (scrScreenSet(0, 1); scrScreenSet(1, 1); ) {
		grfMDrawPic(hSnip, &p, 0);
	}
	if (r != NULL) *r = theRect;
}


void MoveTo2(h, v)
Int16T h, v;
{
	for (scrScreenSet(0, 1); scrScreenSet(1, 1); ) {
		MoveTo(h, v);
	}
}

void drawstring2(s)
char *s;
{
	for (scrScreenSet(0, 1); scrScreenSet(1, 1); ) {
		drawstring(s);
	}
}

void scrSetHueNow2(h)
Int16T h;
{
	for (scrScreenSet(0, 1); scrScreenSet(1, 1); ) {
		scrSetHueNow(h);
	}
}

/* Tax Rate Calculator Code                    */
/* CitiBank Money Advisor          */
/* Tax Calc.c               */
/* 1/28/90 - JDT              */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
```

varFns.c

BEST AVAILABLE COPY

```
#include "scrScreen.h"
#include "grfGraphics.h"
```

BEST AVAILABLE COPY

```
/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};       /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10


/* More Local variables */
static char hold_gi[VAR_MAXVARLEN];
static char hold_td[VAR_MAXVARLEN];
static Boolean two_s;

void taxCalcSetup( void )
{
      Point ip;
      char   temp[32];
      Handle       hSnip;

      /* Save copy of Gross Income */
      strcpy(hold_gi,varPtr(vGrossIncome));
      strcpy(hold_td,"0");

      /* Init some Variables if they haven't been */
      if (strlen(varPtr(taxFstatus))==0) {
            if (*varPtr(vMaritalB)=='0') {
                  strcpy(varPtr(taxFstatus),"Single");
            } else {
                  strcpy(varPtr(taxFstatus),"Joint");
            }
      }

      if (strlen(varPtr(taxNexempt))==0) strcpy(varPtr(taxNexempt),"1");

      if (strlen(varPtr(taxRes))==0) strcpy(varPtr(taxRes),"New York");

      /* Two screens ? */
      two_s = tglNumVisibleScreens == 2;

      PutSnipT("blank tax.s", NULL);

      /* Text */
      taxcalccolor(OUR_HUE);

      /* Default values */
      ip = topLeft(agross_rect);
```

```
        ip.h += 147; ip.v += 13;
        MoveTo2(ip.h, ip.v);
        formatNumber(temp,varPtr(vGrossIncome),INPUT_WIDTH,TRUE,0,FALSE,' ',TRUE.
        drawstring2(temp);
        ip = topLeft(nexempt_rect);
        ip.h += 147; ip.v += 13;
        MoveTo2(ip.h, ip.v);
        drawstring2(varPtr(taxNexempt));
        ip = topLeft(deduct_rect);
        ip.h += 147; ip.v += 13;
        MoveTo2(ip.h, ip.v);
        drawstring2(varPtr(taxDeduct));
        ip = topLeft(fstatus_rect);
        ip.h += 147; ip.v += 12;
        MoveTo2(ip.h, ip.v);
        drawstring2(varPtr(taxFstatus));
        ip = topLeft(res_rect);
        ip.h += 147; ip.v += 12;
        MoveTo2(ip.h, ip.v);
        drawstring2(varPtr(taxRes));
        tax_rate();
}


Boolean taxCalcMouseDown( Point where )
{
        Rect   ar;
        Point  ip;


        /*
         * point in close box
         */
        if (PtInRect(where, &close_rect)) {

                tchBeepNow(TCH_GOOD_BEEP);
                return (TRUE);
        }


        /*
         * point in Gross Income box
         */
        else if (PtInRect(where, &agross_rect)) {

                tglCursorOnOff(TGL_OFF);
                tax_rate();
                taxcalccolor(OUR_HUE);
                ar = agross_rect;
                ar.top -= 2; ar.right -= 130;
                grfInterchange2(246L, 255L, &ar);
                grfInterchange2(7L, 254L, &ar);
                tchBeepNow(TCH_GOOD_BEEP);
                grfInterchange2(255L, 246L, &ar);
                grfInterchange2(254L, 7L, &ar);
                tglCursorOnOff(TGL_ON);
                ip = topLeft(agross_rect);
                ip.h += 147; ip.v += 12;
                ar = agross_rect;
                ar.left += 146; ar.top++; ar.bottom--;

                /*
                 * set up the edit gopher
                 */
                edtEditLen = INPUT_WIDTH;
                tglEditGopher->StartHandler();
```

BEST AVAILABLE COPY

```
        tglEditGopher->EditSetup(ip,varPtr(vGrossIncome),TRUE,vGrossIncome,twc
INPUT_WIDTH, 0,
            FALSE, FALSE, '$', &ar);

    }


    /*
     * point in number of exemptions box
     */
    else if (PtInRect(where, &nexempt_rect)) {

        tglCursorOnOff(TGL_OFF);
        tax_rate();
        taxcalccolor(OUR_HUE);
        ar = nexempt_rect;
        ar.top -= 2; ar.right -= 130;
        grfInterchange2(2L, 255L, &ar);
        grfInterchange2(246L, 254L, &ar);
        tchBeepNow(TCH_GOOD_BEEP);
        grfInterchange2(255L, 2L, &ar);
        grfInterchange2(254L, 246L, &ar);
        tglCursorOnOff(TGL_ON);
        ip = topLeft(nexempt_rect);
        ip.h += 147; ip.v += 12;
        ar = nexempt_rect;
        ar.left += 146; ar.top++; ar.bottom--;

        /*
         * set up edit gopher
         */
        edtEditLen = 2;
        tglEditGopher->StartHandler();
        tglEditGopher->EditSetup(ip,varPtr(taxNexempt),TRUE,taxNexempt,two_s,
FALSE, FALSE, '\0', &ar);

  }


  /*
   * point in deduction box
   */
    else if (PtInRect(where, &deduct_rect)) {

        tglCursorOnOff(TGL_OFF);
        tax_rate();
        taxcalccolor(OUR_HUE);
    ar = deduct_rect;
    ar.top -= 2; ar.right -= 130;
        grfInterchange2(73L, 255L, &ar);
        grfInterchange2(246L, 254L, &ar);
        tchBeepNow(TCH_GOOD_BEEP);
        grfInterchange2(255L, 73L, &ar);
        grfInterchange2(254L, 246L, &ar);
        tglCursorOnOff(TGL_ON);


        /*
         * standard-deduction
         */
        if (strcmp(varPtr(taxDeduct),"Standard")==0) {
                strcpy(varPtr(taxDeduct),hold_td);
    ip = topLeft(deduct_rect);
        ip.h += 147; ip.v += 12;
    ar = deduct_rect;
    ar.left += 146; ar.top++; ar.bottom--;
```

```
                /*
                 * set up edit gopher
                 */
                edtEditLen = INPUT_WIDTH;
                tglEditGopher->StartHandler();
                tglEditGopher->EditSetup(ip,varPtr(taxDeduct),TRUE,taxDeduct,two_
INPUT_WIDTH, 0, FALSE, FALSE, '$', &ar);
            }


            /*
             * Itemized deduction
             */
            else {

                strcpy(hold_td,varPtr(taxDeduct));
                taxcalccolor(OUR_HUE);
            ar = deduct_rect;
            ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
            }
        }


    /*
     * filing status box
     */
        else if (PtInRect(where, &fstatus_rect)) {

            tglCursorOnOff(TGL_OFF);
            tax_rate();
      ar = fstatus_rect;
      ar.top -= 2; ar.right -= 130;
            grfInterchange2(8L, 255L, &ar);
            grfInterchange2(246L, 254L, &ar);
            tchBeepNow(TCH_GOOD_BEEP);
            grfInterchange2(255L, 8L, &ar);
            grfInterchange2(254L, 246L, &ar);
            tglCursorOnOff(TGL_ON);
            taxcalccolor(OUR_HUE);
        ar = fstatus_rect;
        ar.left += 147; ar.top += 3;
            EraseRect2(&ar);
            switch (varPtr(taxFstatus)[1]) {
                case 'i': strcpy(varPtr(taxFstatus),"Joint"); break;
                case 'o': strcpy(varPtr(taxFstatus),"Separate"); break;
                case 'e': strcpy(varPtr(taxFstatus),"Hd. of Household"); break;
                case 'd': strcpy(varPtr(taxFstatus),"Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
        }

    /*
     * result box
     */
        else if (PtInRect(where, &res_rect)) {

            tglCursorOnOff(TGL_OFF);
```

```
            tax_rate();
    ar = res_rect;
    ar.top -= 2; ar.right -= 130;
            grfInterchange2(114L, 255L, &ar);
            grfInterchange2(246L, 254L, &ar);
            tchBeepNow(TCH_GOOD_BEEP);
            grfInterchange2(255L, 114L, &ar);
            grfInterchange2(254L, 246L, &ar);
            tglCursorOnOff(TGL_ON);
            taxcalccolor(OUR_HUE);
        ar = res_rect;
        ar.left += 147; ar.top += 3;
            EraseRect2(&ar);
            switch (varPtr(taxRes)[8]) {
                case '\0': strcpy(varPtr(taxRes),"New York City"); break;
                case ' ': strcpy(varPtr(taxRes),"New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }


        /*
         * valid touch outside calculator kills calculator
         */
        else if ( tchValidTouch ( &where )) {

            tchBeepNow(TCH_GOOD_BEEP);
            return (TRUE);
        }


        /*
         * any other point is bad
         */
        else {

            tchBeepNow(TCH_BAD_BEEP);
        }


        return (FALSE);
}


Boolean taxCalcKeyDown( EventRecord theEvent )
{
        char    key;

        key = theEvent.message;
        if      (key == '\n' || key == 0x0D ) {
                tax_rate();
                taxcalccolor(OUR_HUE);
                return (TRUE);
        }

        return (FALSE);
}


void taxCalcCleanup( void )
{
        Handle      hSnip;

        strcpy(varPtr(vGrossIncome), hold_gl);
```

BEST AVAILABLE COPY

```
        hSnip = libFindPicPtr("blank tax.s", TRUE);
        HPurge(hSnip);
        scrRestoreColors();

}

Real80T tax_rate()
{
        Real80T fed_tax, state_tax, city_tax, tax, taxable;
        Rect r;
        char temp[40];

        strcpy(temp, varPtr(vGrossIncome));
        strstrip(temp,"$,");
        taxable = varAtof(temp);

        if (varPtr(taxDeduct)[0]=='S' || varPtr(taxDeduct)[0]=='s') {
                /* Standard deduction */
          switch (varPtr(taxFstatus)[1]) {
                case 'i': taxable -= 3100.; break;
                case 'o': taxable -= 5200.; break;
                case 'e': taxable -= 2600.; break;
                case 'd': taxable -= 4550.; break;
          }
        } else {
                /* What you said */
                strcpy(temp, varPtr(taxDeduct));
                strstrip(temp,"$,");
                taxable -= varAtof(temp);
        }
        taxable -= varValF(taxNexempt)      * 2000.;

        fed_tax = state_tax = city_tax = 0.0;
        switch (varPtr(taxFstatus)[1]) {
                /* Single */
          case 'i':
                        if (taxable <= 33400.) {
                                fed_tax = 0.15;
                                state_tax = 0.063;
                        if (varPtr(taxRes)[8] == ' ') city_tax = 0.029;
                } else if (taxable <= 72750.) {
                                fed_tax = 0.28;
                                state_tax = 0.074;
                        if (varPtr(taxRes)[8] == ' ') city_tax = 0.03;
                } else if (taxable <= 137360.) {
                                fed_tax = 0.33;
                                state_tax = 0.079;
                        if (varPtr(taxRes)[8] == ' ') city_tax = 0.031;
                } else {
                                fed_tax = 0.28;
                                state_tax = 0.086;
                        if (varPtr(taxRes)[8] == ' ') city_tax = 0.033;
                        }
                break;
          /* Joint Married */
          case 'o':
                        if (taxable <= 42150.) {
                                fed_tax = 0.15;
                                state_tax = 0.063;
                        if (varPtr(taxRes)[8] == ' ') city_tax = 0.029;
                } else if (taxable <= 86050.) {
                                fed_tax = 0.28;
                                state_tax = 0.074;
                        if (varPtr(taxRes)[8] == ' ') city_tax = 0.03;
                } else if (taxable <= 166520.) {
                                fed_tax = 0.33;
                                state_tax = 0.079;
```

BEST AVAILABLE COPY

```
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    /* Seperate Married */
    case 'e':
            if (taxable <= 20075.) {
                fed_tax = 0.15;
                state_tax = 0.063;
            if (varPtr(taxRes)[8] == ' ') city_tax = 0.029;
        } else if (taxable <= 42025.) {
                fed_tax = 0.28;
                state_tax = 0.074;
            if (varPtr(taxRes)[8] == ' ') city_tax = 0.03;
        } else if (taxable <= 122495.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    /* Head of Household */
    case 'd':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    default:
            fed_tax = 0.28;
            state_tax = 0.079;
        if (varPtr(taxRes)[8] == ' ') city_tax = 0.031;
        break;
    }

    tax = fed_tax + state_tax + city_tax;

    /* Show Rate */
    for (scrScreenSet(0, 1); scrScreenSet(1, 1); ) {
        TextFont(3);
        TextSize(12);
        TextFace(bold);
        RGBForeColor(&tglRgbWhite);
        RGBBackColor(&tglRgbBlack);
        r.top = 145; r.left = 357; r.bottom = 160; r.right = 398;
        EraseRect(&r);
    }
    sprintf(temp,"%2.0lf%%",tax*100.0);
    sprintf(varPtr(taxRate),"%2.0lf",tax*100.0);
```

```
        MoveTo2(365,157);
        drawstring2(temp);

        for (scrScreenSet(0, 1); scrScreenSet(1, 1); ) {
                scrSetHue(OUR_HUE, &tglTextFont, &tglTextSize, &tglTextFace,
                                        &tglTextFGColor, &tglTextBGColor);
        }
        scrSetHueNow2(OUR_HUE);
        return tax;
}

static void    taxcalccolor(hue)
Int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

Int16T strstrip(s, rid)
char *s;                                                /* The string to str
char *rid;                                        /* Chars to get rid of */
{
        Int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
                cont_do: ;
        } while ( *(s-1) != '\0');
        return count;
}

void grfInterchange2(cf, ct, r)
Int32T cf,ct;
Rect *r;
{
        Rect lr;

        lr = *r;
        for (scrScreenSet(0, 1); scrScreenSet(1, 1); ) {
                grfInterchange(cf, ct, &lr);
        }
}

void EraseRect2(r)
Rect *r;
{
```

BEST AVAILABLE COPY

```
	for (scrScreenSet(0, 1); scrScreenSet(1, 1); ) {
		EraseRect(r);
	}
}

void PutSnipT(name, r)
char *name;                                                          /* Sr
Rect *r;                                                             /* O;
*/
{
	Handle hSnip;
	Rect theRect;
	Point p;

	hSnip= libFindPicPtr( name, TRUE );
	libGetPicRect(hSnip, &theRect);
	p = topLeft(theRect);
	for (scrScreenSet(0, 1); scrScreenSet(1, 1); ) {
		grfMDrawPic(hSnip, &p, 0);
	}
	if (r != NULL) *r = theRect;
}


void MoveTo2(h, v)
Int16T h, v;
{
	for (scrScreenSet(0, 1); scrScreenSet(1, 1); ) {
		MoveTo(h, v);
	}
}

void drawstring2(s)
char *s;
{
	for (scrScreenSet(0, 1); scrScreenSet(1, 1); ) {
		drawstring(s);
	}
}

void scrSetHueNow2(h)
Int16T h;
{
	for (scrScreenSet(0, 1); scrScreenSet(1, 1); ) {
		scrSetHueNow(h);
	}
}
```

```
/*
 * File vcmd.c
 */

#ifdef THINK_C

    /* macheaders as well */

    #include    <color.h>
    #include    <colortoolbox.h>
    #include    <stdio.h>
    #include    <stdlib.h>
    #include    <ctype.h>
    #include    <math.h>
    #include    <string.h>

#else

        #include    <types.h>
        #include    <memory.h>
        #include    <palette.h>
        #include    <quickdraw.h>
        #include    <toolutils.h>
        #include    <fonts.h>
        #include    <events.h>
        #include    <windows.h>
        #include    <dialogs.h>
        #include    <menus.h>
        #include    <desk.h>
        #include    <textedit.h>
        #include    <scrap.h>
        #include    <segload.h>
        #include    <packages.h>
        #include    <String.h>
        #include    <stdio.h>
        #include    <CType.h>
        #include    <Math.h>
        #include    <printing.h>

        #include    <stdio.h>
        #include    <strings.h>
        #include    <CType.h>
        #pragma segment Seg2
#endif

#include    "standard.h"
#include    "glue.h"
#include    "varFns.h"
#include    "scnScan.h"
#include    "scnScani.h"
#include    "vcmViewCmd.h"

/*****************************************************************
 ***************                                        **********
 ***************    Local Constants     **************
 ***************                                        **********
 ****************************************************************/
#define SEPARATOR_MARK    '#'

/*****************************************************************
 ***************                                        **********
 ***************    Local Variables     **************
 ***************                                        **********
 ****************************************************************/
```

BEST AVAILABLE COPY

```
/****************************************************************
 * parameter information used throughout this file
 *
 *          vcmNumParams:   number of params needed for format string
 *          vcmParams:              copies of substitution variables
 *          vcmSubTypes:    type of substitution to make on each variable
 *          vcmFormatString:copy of format string
 ****************************************************************/
Int32T                  vcmNumParams;
char                    vcmParams[MAX_VAR_NUMS][VAR_MAXVARLEN];
char               *vcmParamPosition[MAX_VAR_NUMS];
vcmSubTypeT        vcmSubTypes[MAX_VAR_NUMS];
char               vcmFormatString[VAR_MAXVARLEN];
BooleanT           vcmEndFound;


/****************************************************************
 ***************                                          **********
 ***************      vcmGet1Value            **************
 ***************                                          **********
 ****************************************************************
 * inputs:
 *
 *  commandRecP:        number of variable to retrieve
 *     type:            the type of substitution to do for this variable
 *
 * Purpose:  stores information about the kind of substitution
 *           which must be done before the value of the variable can
 *           be used in the format string.
 *
 ****************************************************************/
vcmErrorT vcmGet1Param( commandRecP, subType )
      scnCommandRecordPT commandRecP;
      vcmSubTypeT subType;
{

      /****************************************
       * Mark the substitution type
       ****************************************/
      vcmSubTypes[vcmNumParams] = subType;

      /****************************************
       * make sure there really is a parameter
       * available to substitute
       ****************************************/
      if (vcmNumParams >= commandRecP->NumVars) {
            return (VCM_TOO_FEW_PARAMS);
      }

      /****************************************
       * copy the parameter into the table of
       * parameters for ease of use
       ****************************************/
      strcpy( vcmParams[vcmNumParams],
            varPtr(commandRecP->VarNum[vcmNumParams])  );

      /****************************************
       * initialize the pointer to the parameter
       ****************************************/
      vcmParamPosition[vcmNumParams] = vcmParams[vcmNumParams];

      /****************************************
       * increment the number of parameters found
       ****************************************/
      vcmNumParams++;

      /****************************************
       * return
```

BEST AVAILABLE COPY

```
    ****************************************/
    return (VCM_NO_ERROR);

} /* vcmGet1Param */


/*****************************************************************
 ***************                                        **********
 ***************      vcmGetParams             **************
 ***************                                        **********
 *****************************************************************
 * inputs:
 *
 *  commandRecP: information about the V command
 *
 * returns:          an error code
 *
 * Purpose:  copies information from the command record into
 *           local variables, for ease of use.  Determines if
 *           there is a discrepency between the number of values
 *           specified by the format string, and the number of values
 *           actually passed.  Determines what kind of substitution
 *           to do on each variable before creating the output string.
 *
 *****************************************************************/
vcmErrorT vcmGetParams( commandRecP )
    scnCommandRecordPT commandRecP;
{
    Int32T          length;         /* number of characters in the format strir
    Int32T          i;
    vcmErrorT   error;      /* error condition found */


    /****************************************
     * Make sure there is a format string
     ****************************************/
    if (!(commandRecP->DefinedFields & sSTRING)) {
        return( VCM_NO_FORMAT_STRING );
    }

    /******************************************
     * Read through the string finding parameters
     ******************************************/
    length = strlen( vcmFormatString );
    for (i = 0; i < length; i++ ) {


        /******************************************
         * find a parameter for each special character
         * which follows a '%'
         ******************************************/
        if (vcmFormatString[i] == '%') {

            switch (vcmFormatString[i + 1]) {

                case '$':
                    error = vcmGet1Param( commandRecP, VCM_DOLLAR
                    if (error != VCM_NO_ERROR) {
                        return( error );
                    }
                    vcmFormatString[i + 1] = 's';
                    break;

                case 's':
                case 'S':
                    error = vcmGet1Param( commandRecP, VCM_NORMAL
                    if (error != VCM_NO_ERROR) {
                        return( error );
```

```
                        }
                        vcmFormatString[i + 1] = 's';
                        break;

                    default:
                        break;
                }
            }
        }

        /*******************************************
         * Make sure the number of parameters expected
         * because of the formatting string matches the
         * number passed in with the (V) command of
         * the scan file
         *******************************************/
        if (vcmNumParams != commandRecP->NumVars) {
            return ( VCM_TOO_MANY_PARAMS );
        }

        return( VCM_NO_ERROR );

} /* vcmGetParams */

/**************************************************************
 ***************                                     **********
 ***************      vcmValue          ***************
 ***************                                     **********
 **************************************************************
 * inputs:
 *
 *  number:        number of variable to retrieve
 *
 * returns:        the variable
 *
 * Purpose:  retrieves a value from the variable without
 *           formatting it.  A value ends at either a '\0' character
 *           or a SEPARATOR_MARK.  If it ends with a '\0' then it
 *           also sets vcmFoundEnd to TRUE.
 *
 **************************************************************/
char *vcm1Value( number, atEndP )
        Int32T          number;
        BooleanT    *atEndP;
{
        char            *lP;
        char            *tP;

        /*******************************************
         * if the parameter has already ended then
         * set the atEnd code and return
         *******************************************/
        if ((*vcmParamPosition[number]) == '\0') {
            (*atEndP) = TRUE;
            return ("");
        }


        /*******************************************
         * loop through the parameter up to a SEPARATOR_MARK
         * or end of string
         *******************************************/
        lP = vcmParamPosition[number];
        while (((*lP) != SEPARATOR_MARK) && ((*lP) != '\0')) {
            lP++;
        }

        /*******************************************
```

```
 * If we're really at the end, then say so,]
 * and return the last value from this parameter
 *********************************************/
if ((*lP) == '\0') {
        (*atEndP) = TRUE;
}

/*********************************************
 * otherwise, substitute a NULL for the
 * SEPARATOR_MARK
 *********************************************/
else {
        (*atEndP) = FALSE;
        (*lP) = '\0';
}

/*********************************************
 *return the string, and set
 * the paramter position to the next value
 * in the parameter
 *********************************************/
tP = vcmParamPosition[number];
vcmParamPosition[number] = lP + 1;
return (tP);
}

/***************************************************************
 ***************                                    **********
 ***************     vcmValue              **************
 ***************                                    **********
 ***************************************************************
 * inputs:
 *
 *  number:        number of variable to retrieve
 *
 * returns:        the formatted version of the variable
 *
 * Purpose:  retrieves a value from a variable, and
 *           formats it, as a preamble to putting the variable into
 *           the fully formatted string
 *
 ***************************************************************/
void vcmValue( answer, number, atEndP )
        char          *answer;
        Int32T              number;
        BooleanT    *atEndP;
{
        switch (vcmSubTypes[number]) {

                case VCM_NORMAL:
                        strcpy( answer, vcm1Value( number, atEndP ));
                        break;

                case VCM_DOLLAR:
                        varDollarFmt( answer, vcm1Value( number, atEndP ), TRUE);
                        break;

                default:
                        (*atEndP) = TRUE;
                        break;

        }
}

/***************************************************************
 ***************                                    **********
 ***************     vcmCmd                    **************
```

BEST AVAILABLE COPY

```
***************                                              ***************
**************************************************************
* inputs:
*
*  commandRecord:           Information about the line from the scan file
*     result:                       the process value of the (V) command
*
*
* Purpose: translates a formatting string and variable values
*           into a usable string.  The formatting string can have the
*           following special characters:
*
*                  %s:   include the value of a variable verbatim into the output
*                  %$: same as %s, but the variable is formatted as a dollar amount
*                  ^:     start a new line
*                  ~C:    center the current line
*
* Notes: if the value of a variable contains a special character
*           (right now, it's a '#'), then this function assumes that
*           the variable contains more than one value, separated by the
*           special character, and repeats the format on separate lines
*           for each value in the variable.  If more than 1 variable
*           is needed for the format, then each variable must contain
*           the same number of special characters, and that number of
*           formatted strings will appear.  For instance:
*
*           format                  var1     var2                    output
*    _______________________________________________________________
*  1. "%$ for %s"             1000       5 years                "$1,000 for 5 years
*
*  2. "%$ for %s"             1000#2000  6 months#8 years  "$1,000 for 6 months"
*                                                                     "$2,00
*
**************************************************************/
void vcmCmd( commandRecP, result )
      scnCommandRecordPT commandRecP;
      char *result;
{
      Int32T              i;
      Int32T              length;
      BooleanT        atEnd;
      BooleanT        tempBool;
      varVarStringT   answers[MAX_VAR_NUMS];
      char            tempStr[VAR_MAXVARLEN];

      /*****************************************
       * Initialize
       *****************************************/
      vcmNumParams = 0;
      strcpy( vcmFormatString, commandRecP->Str1 );
      vcmEndFound = FALSE;

      /*********************************************
       * Collect the parameters required by the
       * format string
       *********************************************/
      switch (vcmGetParams( commandRecP )) {

            case VCM_NO_ERROR:
                  break;

            case VCM_NO_FORMAT_STRING:
                  strcpy( result, "No format string found in V command" );
                  return;

            case VCM_TOO_FEW_PARAMS:
                  strcpy( result, "Too few parameters passed to V command" );
                  return;
```

```
        case VCM_TOO_MANY_PARAMS:
            strcpy( result, "Too many parameters passed to V command" );
            return;

        default:
            break;
    }

    /*******************************************
     * substitute
     *******************************************/
    result[0] = '\0';
    atEnd = FALSE;
    while (!atEnd) {

        for (i = 0; i < vcmNumParams; i++) {
            vcmValue( answers[i], i, &tempBool );
            atEnd |= tempBool;
        }
        switch (vcmNumParams) {

            case 0:
                sprintf( tempStr, vcmFormatString );
                atEnd = TRUE;
                break;

            case 1:
                sprintf( tempStr, vcmFormatString,
                    answers[0]);
                break;

            case 2:
                sprintf( tempStr, vcmFormatString,
                    answers[0], answers[1]);
                break;

            case 3:
                sprintf( tempStr, vcmFormatString,
                    answers[0], answers[1], answers[2]);
                break;

            case 4:
                sprintf( tempStr, vcmFormatString,
                    answers[0], answers[1], answers[2],
                    answers[3]);
                break;

            case 5:
                sprintf( tempStr, vcmFormatString,
                    answers[0], answers[1], answers[2],
                    answers[3], answers[4]);
                break;

            case 6:
                sprintf( tempStr, vcmFormatString,
                    answers[0], answers[1], answers[2],
                    answers[3], answers[4], answers[5]);
                break;

            case 7:
                sprintf( tempStr, vcmFormatString,
                    answers[0], answers[1], answers[2],
                    answers[3], answers[4], answers[5],
                    answers[6]);
                break;
```

BEST AVAILABLE COPY

BEST AVAILABLE COPY

```
        case 8:
            sprintf( tempStr, vcmFormatString,
                answers[0], answers[1], answers[2],
                answers[3], answers[4], answers[5],
                answers[6], answers[7]);
            break;

        case 9:
            sprintf( tempStr, vcmFormatString,
                answers[0], answers[1], answers[2],
                answers[3], answers[4], answers[5],
                answers[6], answers[7], answers[8]);
            break;

        case 10:
            sprintf( tempStr, vcmFormatString,
                answers[0], answers[1], answers[2],
                answers[3], answers[4], answers[5],
                answers[6], answers[7], answers[8],
                answers[9]);
            break;

        default:
            strcpy( result, "More than 10 parameters to V command" );
            break;
    }

    /*******************************************
     * copy temp string into result
     *******************************************/
    length = strlen( result );
    if (length == 0) {
        strcpy( result, tempStr );
    }
    else {
        sprintf( &result[length], "^%s", tempStr );
    }
  }
}
/* Tax Rate Calculator Code                    */
/* CitiBank Money Advisor          */
/* Tax Calc.c              */
/* 1/28/90 - JDT           */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T          strstrip(char *, char *);
void        grfInterchange2(Int32T, Int32T, Rect *);
```

vcmViewCmd.c

BEST AVAILABLE COPY

```
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};        /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10


/* More Local variables */
static char hold_gi[VAR_MAXVARLEN];
static char hold_td[VAR_MAXVARLEN];
static Boolean two_s;

void taxCalcSetup( void )
{
        Point ip;
        char  temp[32];
        Handle     hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
                }
        }

        if (strlen(varPtr(taxNexempt))==0) strcpy(varPtr(taxNexempt),"1");

        if (strlen(varPtr(taxRes))==0) strcpy(varPtr(taxRes),"New York");

        /* Two screens ? */
        two_s = tglNumVisibleScreens == 2;

        PutSnipT("blank tax.s", NULL);

        /* Text */
        taxcalccolor(OUR_HUE);

        /* Default values */
        ip = topLeft(agross_rect);
        ip.h += 147; ip.v += 13;
        MoveTo2(ip.h, ip.v);
        formatNumber(temp,varPtr(vGrossIncome),INPUT_WIDTH,TRUE,0,FALSE,' ',TRUE,F
        drawstring2(temp);
        ip = topLeft(nexempt_rect);
        ip.h += 147; ip.v += 13;
        MoveTo2(ip.h, ip.v);
        drawstring2(varPtr(taxNexempt));
        ip = topLeft(deduct_rect);
        ip.h += 147; ip.v += 13;
        MoveTo2(ip.h, ip.v);
        drawstring2(varPtr(taxDeduct));
```

BEST AVAILABLE COPY

```
        ip = topLeft(fstatus_rect);
        ip.h += 147; ip.v += 12;
        MoveTo2(ip.h, ip.v);
        drawstring2(varPtr(taxFstatus));
        ip = topLeft(res_rect);
        ip.h += 147; ip.v += 12;
        MoveTo2(ip.h, ip.v);
        drawstring2(varPtr(taxRes));
        tax_rate();
}


Boolean taxCalcMouseDown( Point where )
{
        Rect   ar;
        Point  ip;

        /*
         * point in close box
         */
        if (PtInRect(where, &close_rect)) {

                tchBeepNow(TCH_GOOD_BEEP);
                return (TRUE);
        }

        /*
         * point in Gross Income box
         */
        else if (PtInRect(where, &agross_rect)) {

                tglCursorOnOff(TGL_OFF);
                tax_rate();
                taxcalccolor(OUR_HUE);
                ar = agross_rect;
                ar.top -= 2; ar.right -= 130;
                grfInterchange2(246L, 255L, &ar);
                grfInterchange2(7L, 254L, &ar);
                tchBeepNow(TCH_GOOD_BEEP);
                grfInterchange2(255L, 246L, &ar);
                grfInterchange2(254L, 7L, &ar);
                tglCursorOnOff(TGL_ON);
                ip = topLeft(agross_rect);
                ip.h += 147; ip.v += 12;
                ar = agross_rect;
                ar.left += 146; ar.top++; ar.bottom--;

                /*
                 * set up the edit gopher
                 */
                edtEditLen = INPUT_WIDTH;
                tglEditGopher->StartHandler();
                tglEditGopher->EditSetup(ip,varPtr(vGrossIncome),TRUE,vGrossIncome,two
INPUT_WIDTH, 0,
                        FALSE, FALSE, '$', &ar);
        }

        /*
         * point in number of exemptions box
         */
        else if (PtInRect(where, &nexempt_rect)) {
```

BEST AVAILABLE COPY

```
            tglCursorOnOff(TGL_OFF);
            tax_rate();
            taxcalccolor(OUR_HUE);
            ar = nexempt_rect;
            ar.top -= 2; ar.right -= 130;
            grfInterchange2(2L, 255L, &ar);
            grfInterchange2(246L, 254L, &ar);
            tchBeepNow(TCH_GOOD_BEEP);
            grfInterchange2(255L, 2L, &ar);
            grfInterchange2(254L, 246L, &ar);
            tglCursorOnOff(TGL_ON);
            ip = topLeft(nexempt_rect);
            ip.h += 147; ip.v += 12;
            ar = nexempt_rect;
            ar.left += 146; ar.top++; ar.bottom--;

            /*
             * set up edit gopher
             */
            edtEditLen = 2;
            tglEditGopher->StartHandler();
            tglEditGopher->EditSetup(ip,varPtr(taxNexempt),TRUE,taxNexempt,two_s,'
FALSE, FALSE, '\0', &ar);

    }

  /*
   * point in deduction box
   */
     else if (PtInRect(where, &deduct_rect)) {

            tglCursorOnOff(TGL_OFF);
            tax_rate();
            taxcalccolor(OUR_HUE);
    ar = deduct_rect;
    ar.top -= 2; ar.right -= 130;
            grfInterchange2(73L, 255L, &ar);
            grfInterchange2(246L, 254L, &ar);
            tchBeepNow(TCH_GOOD_BEEP);
            grfInterchange2(255L, 73L, &ar);
            grfInterchange2(254L, 246L, &ar);
            tglCursorOnOff(TGL_ON);

          /*
           * standard deduction
           */
          if (strcmp(varPtr(taxDeduct),"Standard")==0) {
                 strcpy(varPtr(taxDeduct),hold_td);
    ip = topLeft(deduct_rect);
          ip.h += 147; ip.v += 12;
    ar = deduct_rect;
    ar.left += 146; ar.top++; ar.bottom--;

                /*
                 * set up edit gopher
                 */
                edtEditLen = INPUT_WIDTH;
                tglEditGopher->StartHandler();
                tglEditGopher->EditSetup(ip,varPtr(taxDeduct),TRUE,taxDeduct,two_s
INPUT_WIDTH, 0, FALSE, FALSE, '$', &ar);
          }

          /*
           * itemized deduction
```

BEST AVAILABLE COPY

```
	*/
	else {

		strcpy(hold_td,varPtr(taxDeduct));
		taxcalccolor(OUR_HUE);
	ar = deduct_rect;
	ar.left += 147; ar.top += 3;
		EraseRect2(&ar);
		strcpy(varPtr(taxDeduct),"Standard");
		ip = topLeft(deduct_rect);
		ip.h += 147; ip.v += 12;
		MoveTo2(ip.h, ip.v);
		drawstring2(varPtr(taxDeduct));
		tax_rate();
	}
    }

/*
 * filing status box
 */
    else if (PtInRect(where, &fstatus_rect)) {

		tglCursorOnOff(TGL_OFF);
		tax_rate();
	ar = fstatus_rect;
	ar.top -= 2; ar.right -= 130;
		grfinterchange2(8L, 255L, &ar);
		grfinterchange2(246L, 254L, &ar);
		tchBeepNow(TCH_GOOD_BEEP);
		grfinterchange2(255L, 8L, &ar);
		grfinterchange2(254L, 246L, &ar);
		tglCursorOnOff(TGL_ON);
		taxcalccolor(OUR_HUE);
	ar = fstatus_rect;
	ar.left += 147; ar.top += 3;
		EraseRect2(&ar);
		switch (varPtr(taxFstatus)[1]) {
			case 'i': strcpy(varPtr(taxFstatus),"Joint"); break;
			case 'o': strcpy(varPtr(taxFstatus),"Separate"); break;
			case 'e': strcpy(varPtr(taxFstatus),"Hd. of Household"); break;
			case 'd': strcpy(varPtr(taxFstatus),"Single"); break;
		}
		ip = topLeft(fstatus_rect);
		ip.h += 147; ip.v += 12;
		MoveTo2(ip.h, ip.v);
		drawstring2(varPtr(taxFstatus));
		tax_rate();
    }

/*
 * result box
 */
    else if (PtInRect(where, &res_rect)) {

		tglCursorOnOff(TGL_OFF);
		tax_rate();
	ar = res_rect;
	ar.top -= 2; ar.right -= 130;
		grfinterchange2(114L, 255L, &ar);
		grfinterchange2(246L, 254L, &ar);
		tchBeepNow(TCH_GOOD_BEEP);
		grfinterchange2(255L, 114L, &ar);
		grfinterchange2(254L, 246L, &ar);
		tglCursorOnOff(TGL_ON);
		taxcalccolor(OUR_HUE);
	ar = res_rect;
	ar.left += 147; ar.top += 3;
```

BEST AVAILABLE COPY

BEST AVAILABLE COPY

```
        EraseRect2(&ar);
        switch (varPtr(taxRes)[8]) {
            case '\0': strcpy(varPtr(taxRes),"New York City"); break;
            case ' ': strcpy(varPtr(taxRes),"New York"); break;
        }
        ip = topLeft(res_rect);
        ip.h += 147; ip.v += 12;
        MoveTo2(ip.h, ip.v);
        drawstring2(varPtr(taxRes));
        tax_rate();
    }


    /*
     * valid touch outside calculator kills calculator
     */
    else if ( tchValidTouch ( &where )) {

        tchBeepNow(TCH_GOOD_BEEP);
        return (TRUE);
    }


    /*
     * any other point is bad
     */
    else {

        tchBeepNow(TCH_BAD_BEEP);
    }

    return (FALSE);
}


Boolean taxCalcKeyDown( EventRecord theEvent )
{
    char  key;

    key = theEvent.message;
    if    (key == '\n' || key == 0x0D ) {
        tax_rate();
        taxcalccolor(OUR_HUE);
        return (TRUE);
    }

    return (FALSE);
}


void taxCalcCleanup( void )
{
    Handle      hSnip;

    strcpy(varPtr(vGrossIncome), hold_gi);
    hSnip = libFindPicPtr("blank tax.s", TRUE);
    HPurge(hSnip);
    scrRestoreColors();

}


Real80T tax_rate()
{
    Real80T fed_tax, state_tax, city_tax, tax, taxable;
    Rect r;
    char temp[40];
```

BEST AVAILABLE COPY

```
strcpy(temp, varPtr(vGrossIncome));
strstrip(temp,"$,");
taxable = varAtof(temp);

if (varPtr(taxDeduct)[0]=='S' || varPtr(taxDeduct)[0]=='s') {
        /* Standard deduction */
  switch (varPtr(taxFstatus)[1]) {
        case 'i': taxable -= 3100.; break;
        case 'o': taxable -= 5200.; break;
        case 'e': taxable -= 2600.; break;
        case 'd': taxable -= 4550.; break;
  }
} else {
        /* What you said */
        strcpy(temp, varPtr(taxDeduct));
        strstrip(temp,"$,");
        taxable -= varAtof(temp);
}
taxable -= varValF(taxNexempt)        * 2000.;

fed_tax = state_tax = city_tax = 0.0;
switch (varPtr(taxFstatus)[1]) {
        /* Single */
  case 'i':
                if (taxable <= 33400.) {
                        fed_tax = 0.15;
                        state_tax = 0.063;
                if (varPtr(taxRes)[8] == ' ') city_tax = 0.029;
        } else if (taxable <= 72750.) {
                        fed_tax = 0.28;
                        state_tax = 0.074;
                if (varPtr(taxRes)[8] == ' ') city_tax = 0.03;
        } else if (taxable <= 137360.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
/* Joint Married */
case 'o':
                if (taxable <= 42150.) {
                        fed_tax = 0.15;
                        state_tax = 0.063;
                if (varPtr(taxRes)[8] == ' ') city_tax = 0.029;
        } else if (taxable <= 86050.) {
                        fed_tax = 0.28;
                        state_tax = 0.074;
                if (varPtr(taxRes)[8] == ' ') city_tax = 0.03;
        } else if (taxable <= 166520.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
/* Seperate Married */
case 'e':
                if (taxable <= 20075.) {
                        fed_tax = 0.15;
                        state_tax = 0.063;
```

BEST AVAILABLE COPY

```
                if (varPtr(taxRes)[8] == ' ') city_tax = 0.029;
            } else if (taxable <= 42025.) {
                        fed_tax = 0.28;
                        state_tax = 0.074;
                if (varPtr(taxRes)[8] == ' ') city_tax = 0.03;
            } else if (taxable <= 122495.) {
                        fed_tax = 0.33;
                        state_tax = 0.079;
                if (varPtr(taxRes)[8] == ' ') city_tax = 0.031;
            } else {
                        fed_tax = 0.28;
                        state_tax = 0.086;
                if (varPtr(taxRes)[8] == ' ') city_tax = 0.033;
                }
            break;
        /* Head of Household */
        case 'd':
                if (taxable <= 42150.) {
                        fed_tax = 0.15;
                        state_tax = 0.063;
                if (varPtr(taxRes)[8] == ' ') city_tax = 0.029;
            } else if (taxable <= 86050.) {
                        fed_tax = 0.28;
                        state_tax = 0.074;
                if (varPtr(taxRes)[8] == ' ') city_tax = 0.03;
            } else if (taxable <= 166520.) {
                        fed_tax = 0.33;
                        state_tax = 0.079;
                if (varPtr(taxRes)[8] == ' ') city_tax = 0.031;
            } else {
                        fed_tax = 0.28;
                        state_tax = 0.086;
                if (varPtr(taxRes)[8] == ' ') city_tax = 0.033;
                }
            break;
        default:
                fed_tax = 0.28;
                state_tax = 0.079;
            if (varPtr(taxRes)[8] == ' ') city_tax = 0.031;
            break;
    }

    tax = fed_tax + state_tax + city_tax;

    /* Show Rate */
    for (scrScreenSet(0, 1); scrScreenSet(1, 1); ) {
            TextFont(3);
            TextSize(12);
            TextFace(bold);
            RGBForeColor(&tglRgbWhite);
            RGBBackColor(&tglRgbBlack);
            r.top = 145; r.left = 357; r.bottom = 160; r.right = 398;
            EraseRect(&r);
    }
    sprintf(temp,"%2.0lf%%",tax*100.0);
    sprintf(varPtr(taxRate),"%2.0lf",tax*100.0);
    MoveTo2(365,157);
    drawstring2(temp);

    for (scrScreenSet(0, 1); scrScreenSet(1, 1); ) {
            scrSetHue(OUR_HUE, &tglTextFont, &tglTextSize, &tglTextFace,
                                        &tglTextFGColor, &tglTextBGColor);
    }
    scrSetHueNow2(OUR_HUE);
    return tax;
}

static void    taxcalccolor(hue)

vcmViewCmd.c
```

```
Int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

Int16T strstrip(s, rid)
char *s;                                        /* The string to str
char *rid;                                      /* Chars to get rid of */
{
        Int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
                cont_do: ;
        } while ( *(s-1) != '\0');
        return count;
}

void grfInterchange2(cf, ct, r)
Int32T cf,ct;
Rect *r;
{
        Rect lr;

        lr = *r;
        for (scrScreenSet(0, 1); scrScreenSet(1, 1); ) {
                grfInterchange(cf, ct, &lr);
        }
}

void EraseRect2(r)
Rect *r;
{
        for (scrScreenSet(0, 1); scrScreenSet(1, 1); ) {
                EraseRect(r);
        }
}

void PutSnipT(name, r)
char *name;                                     /* Sni
Rect *r;                                        /* Op
*/
{
        Handle hSnip;
        Rect theRect;
```

BEST AVAILABLE COPY

```
        Point p;

        hSnip= libFindPicPtr( name, TRUE );
        libGetPicRect(hSnip, &theRect);
        p = topLeft(theRect);
        for (scrScreenSet(0, 1); scrScreenSet(1, 1); ) {
                grfMDrawPic(hSnip, &p, 0);
        }
        if (r != NULL) *r = theRect;
}


void MoveTo2(h, v)
Int16T h, v;
{
        for (scrScreenSet(0, 1); scrScreenSet(1, 1); ) {
                MoveTo(h, v);
        }
}

void drawstring2(s)
char *s;
{
        for (scrScreenSet(0, 1); scrScreenSet(1, 1); ) {
                drawstring(s);
        }
}

void scrSetHueNow2(h)
Int16T h;
{
        for (scrScreenSet(0, 1); scrScreenSet(1, 1); ) {
                scrSetHueNow(h);
        }
}

/* Tax Rate Calculator Code                              */
/* CitiBank Money Advisor          */
/* Tax Calc.c                 */
/* 1/28/90 - JDT               */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void            drawstring2(char *);
void            MoveTo2(Int16T, Int16T);
void            scrSetHueNow2(Int16T);
Real80T         tax_rate(void);
void            taxcalccolor(Int16T);
Int16T                  strstrip(char *, char *);
void            grfInterchange2(Int32T, Int32T, Rect *);
void            EraseRect2(Rect *);
void            PutSnipT(char *, Rect *);
```

BEST AVAILABLE COPY

```
/* Local variables */
static Rect close_rect = {121,403,130,412};          /* Close Box */
static Rect agross_rect = {168,140,185,405};   /* Annual Gross Income */
static Rect nexempt_rect = {191,140,208,405};        /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10


/* More Local variables */
static char hold_gi[VAR_MAXVARLEN];
static char hold_td[VAR_MAXVARLEN];
static Boolean two_s;

void taxCalcSetup( void )
{
        Point ip;
        char   temp[32];
        Handle        hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
                }
        }

        if (strlen(varPtr(taxNexempt))==0) strcpy(varPtr(taxNexempt),"1");

        if (strlen(varPtr(taxRes))==0) strcpy(varPtr(taxRes),"New York");

        /* Two screens ? */
        two_s = tglNumVisibleScreens == 2;

        PutSnipT("blank tax.s", NULL);

        /* Text */
        taxcalccolor(OUR_HUE);

        /* Default values */
        ip = topLeft(agross_rect);
        ip.h += 147; ip.v += 13;
        MoveTo2(ip.h, ip.v);
        formatNumber(temp,varPtr(vGrossIncome),INPUT_WIDTH,TRUE,0,FALSE,' ',TRUE
        drawstring2(temp);
        ip = topLeft(nexempt_rect);
        ip.h += 147; ip.v += 13;
        MoveTo2(ip.h, ip.v);
        drawstring2(varPtr(taxNexempt));
        ip = topLeft(deduct_rect);
        ip.h += 147; ip.v += 13;
        MoveTo2(ip.h, ip.v);
        drawstring2(varPtr(taxDeduct));
        ip = topLeft(fstatus_rect);
        ip.h += 147; ip.v += 12;
```

BEST AVAILABLE COPY

```
        MoveTo2(ip.h, ip.v);
        drawstring2(varPtr(taxFstatus));
        ip = topLeft(res_rect);
        ip.h += 147; ip.v += 12;
        MoveTo2(ip.h, ip.v);
        drawstring2(varPtr(taxRes));
        tax_rate();
}



Boolean taxCalcMouseDown( Point where )
{
        Rect    ar;
        Point   ip;


        /*
         * point in close box
         */
        if (PtInRect(where, &close_rect)) {

                tchBeepNow(TCH_GOOD_BEEP);
                return (TRUE);
        }


        /*
         * point in Gross Income box
         */
        else if (PtInRect(where, &agross_rect)) {

                tglCursorOnOff(TGL_OFF);
                tax_rate();
                taxcalccolor(OUR_HUE);
                ar = agross_rect;
                ar.top -= 2; ar.right -= 130;
                grfInterchange2(246L, 255L, &ar);
                grfInterchange2(7L, 254L, &ar);
                tchBeepNow(TCH_GOOD_BEEP);
                grfInterchange2(255L, 246L, &ar);
                grfInterchange2(254L, 7L, &ar);
                tglCursorOnOff(TGL_ON);
                ip = topLeft(agross_rect);
                ip.h += 147; ip.v += 12;
                ar = agross_rect;
                ar.left += 146; ar.top++; ar.bottom--;

                /*
                 * set up the edit gopher
                 */
                edtEditLen = INPUT_WIDTH;
                tglEditGopher->StartHandler();
                tglEditGopher->EditSetup(ip,varPtr(vGrossIncome),TRUE,vGrossIncome,tw
INPUT_WIDTH, 0,
                        FALSE, FALSE, '$', &ar);
        }


        /*
         * point in number of exemptions box
         */
        else if (PtInRect(where, &nexempt_rect)) {

                tglCursorOnOff(TGL_OFF);
                tax_rate();
```

BEST AVAILABLE COPY

```
                taxcalccolor(OUR_HUE);
                ar = nexempt_rect;
                ar.top -= 2; ar.right -= 130;
                grfInterchange2(2L, 255L, &ar);
                grfInterchange2(246L, 254L, &ar);
                tchBeepNow(TCH_GOOD_BEEP);
                grfInterchange2(255L, 2L, &ar);
                grfInterchange2(254L, 246L, &ar);
                tglCursorOnOff(TGL_ON);
                ip = topLeft(nexempt_rect);
                ip.h += 147; ip.v += 12;
                ar = nexempt_rect;
                ar.left += 146; ar.top++; ar.bottom--;

                /*
                 * set up edit gopher
                 */
                edtEditLen = 2;
                tglEditGopher->StartHandler();
                tglEditGopher->EditSetup(ip,varPtr(taxNexempt),TRUE,taxNexempt,two_s
FALSE, FALSE, '\0', &ar);

    }

    /*
     * point in deduction box
     */
        else if (PtInRect(where, &deduct_rect)) {

                tglCursorOnOff(TGL_OFF);
                tax_rate();
                taxcalccolor(OUR_HUE);
    ar = deduct_rect;
    ar.top -= 2; ar.right -= 130;
                grfInterchange2(73L, 255L, &ar);
                grfInterchange2(246L, 254L, &ar);
                tchBeepNow(TCH_GOOD_BEEP);
                grfInterchange2(255L, 73L, &ar);
                grfInterchange2(254L, 246L, &ar);
                tglCursorOnOff(TGL_ON);

                /*
                 * standard deduction
                 */
                if (strcmp(varPtr(taxDeduct),"Standard")==0) {
                        strcpy(varPtr(taxDeduct),hold_td);
    ip = topLeft(deduct_rect);
                ip.h += 147; ip.v += 12;
    ar = deduct_rect;
    ar.left += 146; ar.top++; ar.bottom--;

                        /*
                         * set up edit gopher
                         */
                        edtEditLen = INPUT_WIDTH;
                        tglEditGopher->StartHandler();
                        tglEditGopher->EditSetup(ip,varPtr(taxDeduct),TRUE,taxDeduct,twc
INPUT_WIDTH, 0, FALSE, FALSE, '$', &ar);
                }

                /*
                 * Itemized deduction
                 */
                else {
```

BEST AVAILABLE COPY

```
                strcpy(hold_td,varPtr(taxDeduct));
                taxcalccolor(OUR_HUE);
            ar = deduct_rect;
            ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
            }
        }

    /*
     * filing status box
     */
        else if (PtInRect(where, &fstatus_rect)) {

                tglCursorOnOff(TGL_OFF);
                tax_rate();
          ar = fstatus_rect;
          ar.top -= 2; ar.right -= 130;
                grfInterchange2(8L, 255L, &ar);
                grfInterchange2(246L, 254L, &ar);
                tchBeepNow(TCH_GOOD_BEEP);
                grfInterchange2(255L, 8L, &ar);
                grfInterchange2(254L, 246L, &ar);
                tglCursorOnOff(TGL_ON);
                taxcalccolor(OUR_HUE);
          ar = fstatus_rect;
          ar.left += 147; ar.top += 3;
                EraseRect2(&ar);
                switch (varPtr(taxFstatus)[1]) {
                        case 'I': strcpy(varPtr(taxFstatus),"Joint"); break;
                        case 'o': strcpy(varPtr(taxFstatus),"Separate"); break;
                        case 'e': strcpy(varPtr(taxFstatus),"Hd. of Household"); break;
                        case 'd': strcpy(varPtr(taxFstatus),"Single"); break;
                }
                ip = topLeft(fstatus_rect);
                ip.h += 147; ip.v += 12;
                MoveTo2(ip.h, ip.v);
                drawstring2(varPtr(taxFstatus));
                tax_rate();
        }

    /*
     * result box
     */
        else if (PtInRect(where, &res_rect)) {

                tglCursorOnOff(TGL_OFF);
                tax_rate();
          ar = res_rect;
          ar.top -= 2; ar.right -= 130;
                grfInterchange2(114L, 255L, &ar);
                grfInterchange2(246L, 254L, &ar);
                tchBeepNow(TCH_GOOD_BEEP);
                grfInterchange2(255L, 114L, &ar);
                grfInterchange2(254L, 246L, &ar);
                tglCursorOnOff(TGL_ON);
                taxcalccolor(OUR_HUE);
          ar = res_rect;
          ar.left += 147; ar.top += 3;
                EraseRect2(&ar);
                switch (varPtr(taxRes)[8]) {
```

```
                case '\0': strcpy(varPtr(taxRes), "New York City"); break;
                case ' ': strcpy(varPtr(taxRes), "New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }

        /*
         * valid touch outside calculator kills calculator
         */
        else if ( tchValidTouch ( &where )) {

            tchBeepNow(TCH_GOOD_BEEP);
            return (TRUE);
        }

        /*
         * any other point is bad
         */
        else {

            tchBeepNow(TCH_BAD_BEEP);
        }

        return (FALSE);
}

Boolean taxCalcKeyDown( EventRecord theEvent )
{
        char    key;

        key = theEvent.message;
        if      (key == '\n' || key == 0x0D ) {
                tax_rate();
                taxcalccolor(OUR_HUE);
                return (TRUE);
        }

        return (FALSE);
}

void taxCalcCleanup( void )
{
        Handle      hSnip;

        strcpy(varPtr(vGrossIncome), hold_gi);
        hSnip = libFindPicPtr("blank tax.s", TRUE);
        HPurge(hSnip);
        scrRestoreColors();

}

Real80T tax_rate()
{
        Real80T fed_tax, state_tax, city_tax, tax, taxable;
        Rect r;
        char temp[40];

        strcpy(temp, varPtr(vGrossIncome));
```

```
strstrip(temp,"$,");
taxable = varAtof(temp);

if (varPtr(taxDeduct)[0]=='S' || varPtr(taxDeduct)[0]=='s') {
        /* Standard deduction */
  switch (varPtr(taxFstatus)[1]) {
        case 'i': taxable -= 3100.; break;
        case 'o': taxable -= 5200.; break;
        case 'e': taxable -= 2600.; break;
        case 'd': taxable -= 4550.; break;
  }
} else {
        /* What you said */
        strcpy(temp, varPtr(taxDeduct));
        strstrip(temp,"$,");
        taxable -= varAtof(temp);
}
taxable -= varValF(taxNexempt)       * 2000.;

fed_tax = state_tax = city_tax = 0.0;
switch (varPtr(taxFstatus)[1]) {
        /* Single */
  case 'i':
                if (taxable <= 33400.) {
                        fed_tax = 0.15;
                        state_tax = 0.063;
                if (varPtr(taxRes)[8] == ' ') city_tax = 0.029;
        } else if (taxable <= 72750.) {
                        fed_tax = 0.28;
                        state_tax = 0.074;
                if (varPtr(taxRes)[8] == ' ') city_tax = 0.03;
        } else if (taxable <= 137360.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
/* Joint Married */
case 'o':
                if (taxable <= 42150.) {
                        fed_tax = 0.15;
                        state_tax = 0.063;
                if (varPtr(taxRes)[8] == ' ') city_tax = 0.029;
        } else if (taxable <= 86050.) {
                        fed_tax = 0.28;
                        state_tax = 0.074;
                if (varPtr(taxRes)[8] == ' ') city_tax = 0.03;
        } else if (taxable <= 166520.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
/* Seperate Married */
case 'e':
                if (taxable <= 20075.) {
                        fed_tax = 0.15;
                        state_tax = 0.063;
                if (varPtr(taxRes)[8] == ' ') city_tax = 0.029;
        } else if (taxable <= 42025.) {
```

```
                        fed_tax = 0.28;
                        state_tax = 0.074;
                if (varPtr(taxRes)[8] == ' ') city_tax = 0.03;
            } else if (taxable <= 122495.) {
                        fed_tax = 0.33;
                        state_tax = 0.079;
                if (varPtr(taxRes)[8] == ' ') city_tax = 0.031;
            } else {
                        fed_tax = 0.28;
                        state_tax = 0.086;
                if (varPtr(taxRes)[8] == ' ') city_tax = 0.033;
                }
            break;
        /* Head of Household */
        case 'd':
                if (taxable <= 42150.) {
                        fed_tax = 0.15;
                        state_tax = 0.063;
                if (varPtr(taxRes)[8] == ' ') city_tax = 0.029;
            } else if (taxable <= 86050.) {
                        fed_tax = 0.28;
                        state_tax = 0.074;
                if (varPtr(taxRes)[8] == ' ') city_tax = 0.03;
            } else if (taxable <= 166520.) {
                        fed_tax = 0.33;
                        state_tax = 0.079;
                if (varPtr(taxRes)[8] == ' ') city_tax = 0.031;
            } else {
                        fed_tax = 0.28;
                        state_tax = 0.086;
                if (varPtr(taxRes)[8] == ' ') city_tax = 0.033;
                }
            break;
        default:
                fed_tax = 0.28;
                state_tax = 0.079;
            if (varPtr(taxRes)[8] == ' ') city_tax = 0.031;
            break;
        }

        tax = fed_tax + state_tax + city_tax;

        /* Show Rate */
        for (scrScreenSet(0, 1); scrScreenSet(1, 1); ) {
            TextFont(3);
            TextSize(12);
            TextFace(bold);
            RGBForeColor(&tglRgbWhite);
            RGBBackColor(&tglRgbBlack);
            r.top = 145; r.left = 357; r.bottom = 160; r.right = 398;
            EraseRect(&r);
        }
        sprintf(temp,"%2.0lf%%",tax*100.0);
        sprintf(varPtr(taxRate),"%2.0lf",tax*100.0);
        MoveTo2(365,157);
        drawstring2(temp);

        for (scrScreenSet(0, 1); scrScreenSet(1, 1); ) {
            scrSetHue(OUR_HUE, &tglTextFont, &tglTextSize, &tglTextFace,
                                        &tglTextFGColor, &tglTextBGColor);
        }
        scrSetHueNow2(OUR_HUE);
        return tax;
}

static void    taxcalccolor(hue)
Int16T hue;
{
```

vcmViewCmd.c

```
	for (scrScreenSet(0, 1); scrScreenSet(1, 1); ) {
		tglTextFont = 3;
		tglTextSize = 12;
		tglTextFace = normal;
		TGL_SETRGB(tglTextFGColor, 13107, 13107, 39321);
		TGL_SETRGB(tglTextBGColor, 48059, 48059, 48059);

		TextFont(tglTextFont);
		TextSize(tglTextSize);
		TextFace(tglTextFace);
		RGBForeColor(&tglTextFGColor);
		RGBBackColor(&tglTextBGColor );
	}
}

Int16T strstrip(s, rid)
char *s;                                        /* The string to st
char *rid;                                   /* Chars to get rid of */
{
	Int16T i,n,count;
	char *t;

	count=0;
	n = strlen(rid);
	t=s;
	do {
		for (i=0; i<n; i++) {
			if (*s==rid[i]) {
				count++;
				s++;
				goto cont_do;
			}
		}
		*t++ = *s++;
		cont_do: ;
	} while ( *(s-1) != '\0');
	return count;
}

void grfInterchange2(cf, ct, r)
Int32T cf,ct;
Rect *r;
{
	Rect lr;

	lr = *r;
	for (scrScreenSet(0, 1); scrScreenSet(1, 1); ) {
		grfInterchange(cf, ct, &lr);
	}
}

void EraseRect2(r)
Rect *r;
{
	for (scrScreenSet(0, 1); scrScreenSet(1, 1); ) {
		EraseRect(r);
	}
}

void PutSnipT(name, r)
char *name;                                          /* Sr
Rect *r;                                             /* O
*/
{
	Handle hSnip;
	Rect theRect;
	Point  p;
```

BEST AVAILABLE COPY

```
        hSnip= libFindPicPtr( name, TRUE );
        libGetPicRect(hSnip, &theRect);
        p = topLeft(theRect);
        for (scrScreenSet(0, 1); scrScreenSet(1, 1); ) {
                grfMDrawPic(hSnip, &p, 0);
        }
        if (r != NULL) *r = theRect;
}


void MoveTo2(h, v)
Int16T h, v;
{
        for (scrScreenSet(0, 1); scrScreenSet(1, 1); ) {
                MoveTo(h, v);
        }
}

void drawstring2(s)
char *s;
{
        for (scrScreenSet(0, 1); scrScreenSet(1, 1); ) {
                drawstring(s);
        }
}

void scrSetHueNow2(h)
Int16T h;
{
        for (scrScreenSet(0, 1); scrScreenSet(1, 1); ) {
                scrSetHueNow(h);
        }
}
```

vcmViewCmd.c

BEST AVAILABLE COPY

```
/*

	Variable saving and loading
	vrwVarFiles.c
	djs 11/1/89
*/

#define APP_ADTERM

#include	"standard.h"
#include	"tglMain.h"
#include	"glue.h"
#include	"varFns.h"
#include	"vrwVarFiles.h"
#include	"fileAccess.h"

/* local function prototypes */
Int32T vrwLoadVar( FILE *fp, Int32T *vNumP, char *vPtr );
Int32T vrwSaveVar( FILE *fp, Int32T vNum, char *vPtr );

/* end of variables tag -- used to separate multiple variable sets in a single file */
#define END_TAG_NUMBER 99999

/************************************************************************
	vrwSave -- to save the current set of variables to a text file.
************************************************************************/
void vrwSave(void)
{
	char *varFName;

	/* check the file name var */
	varFName = varPtr(vVarFileName);
	if (strlen(varFName) == 0) {
		TGL_ERROR("No file name specified.");
		return;
	}

	/* do the saving */
	vrwSaveVarsInFile( varFName, "w" );
}

/************************************************************************
	vrwSaveVarsInFile -- to save the current set of variables to a file
	of a specified name.
************************************************************************/
void vrwSaveVarsInFile ( char *varFName, char *mode )
{
	FILE *fp;
	Int32T vNum;
	char *vPtr, temp[255];

	/* open the output file */
	if (NULL == (fp = fopen( filePrependDir( temp, FILE_DATA_DIR, varFName), mode
		TGL_ERROR("Cannot open variable file");
		return;
	}

	/* seq thru the vars in the table */
	for (vNum = 1; vNum < VAR_MAXVAR; vNum++) {
		vPtr = varPtr(vNum);
		if ((strlen(vPtr) != 0) && (strlen(vPtr) <= VAR_MAXVARLEN)) {
				/* don't bother with empty values and trap out bad values */

			if (vrwSaveVar(fp,vNum,vPtr) < 0) {
				TGL_ERROR("Cannot complete save");
				return;
			}
		}
```

BEST AVAILABLE COPY

```
    }

    /*  save a tag at the end of the file  */
    if (fprintf(fp,"%ld\t\"(end tag)\"\n", END_TAG_NUMBER) < 0) {
          TGL_ERROR("Cannot end save");
          return;
    }

    fclose(fp);          /* close the variables file */

}

/*********************************************************************
      vrwSaveVar -- to save a specific variables in a specified file.
*********************************************************************/
Int32T vrwSaveVar( FILE *fp, Int32T vNum, char *vPtr )
{
      Int32T rc;
      rc = fprintf(fp,"%ld\t\"%s\"\n",vNum,vPtr);
      return rc;
}

/*********************************************************************
      vrwLoadVarsFromFile -- to load the current set of variables from a file
  of a specified name.
*********************************************************************/
void vrwLoadVarsFromFile ( char *varFName )
      {
      FILE   *fp;
      char   temp[255];

      /* open the output file */
      if (NULL == (fp = fopen( filePrependDir( temp, FILE_DATA_DIR, varFName ),"r"
            {
            TGL_ERROR("Cannot open variable file for reading");
            return;
            }

      /*  do a load of the whole file (starting at the beginning)  */
      vrwPartialLoad( fp );

      fclose(fp);          /* close the variables file */
      }

/*********************************************************************
      vrwLoad -- to load the current set of variables from a file
  that is named in the variable vVarFileName.
*********************************************************************/
void vrwLoad ( void )
      {
      char *varFName, temp[255];
      FILE *fp;

      /* check the file name var */
      varFName = varPtr(vVarFileName);
      if (strlen(varFName) == 0)
            {
            TGL_ERROR("No file name specified.");
            return;
            }

      /* open the output file */
      if (NULL == (fp = fopen( filePrependDir( temp, FILE_DATA_DIR, varFName ),"r"
            {
            TGL_ERROR("Cannot open variable file for reading");
            return;
            }
```

```
	/* do a load of the whole file (starting at the beginning) */
	vrwPartialLoad( fp );

	fclose(fp);		/* close the variables file */
	}

/***********************************************************************
	vrwLoad -- to load the current set of variables from a specified file
   starting at the current position in the file and ending at END_TAG_NUMBER.
***********************************************************************/
BooleanT vrwPartialLoad ( FILE *fp )
	{
	Int32T vNum, rc;
	char vPtr[VAR_MAXVARLEN];

	rc = 0;

	/* seq thru the vars in the table, */
	/* starting at the current file position */
	/* and ending when we hit the end tag number */
	while ( 0 < ( rc = vrwLoadVar(fp,&vNum,&vPtr[0]) ) )
		{
		if ( vNum < VAR_MAXVAR ) varSetS(vNum,&vPtr[0]);
		else
			{
			if ( vNum == END_TAG_NUMBER ) break;
			else
				{
				TGL_ERROR("Error reading from variable file");
				return( FALSE );
				}
			}
		}

	return( ( BooleanT ) ( rc > 0 ) );
	}


/***********************************************************************
	vrwLoad -- to get the contents of a specified variable out of a specified file.
***********************************************************************/
Int32T vrwLoadVar( FILE *fp, Int32T *vNumP, char *vPtr )
{
	Int32T rc;
	char c;
	rc = fscanf(fp,"%ld\t\"%[^\"]\"\n",vNumP,vPtr);
	return rc;
}

/* Tax Rate Calculator Code			*/
/* CitiBank Money Advisor		*/
/* Tax Calc.c			*/
/* 1/28/90 - JDT			*/

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"
```

```
/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};        /* # of exemptions */
static Rect deduct_rect = {214,140,230,405};  /* deductions */
static Rect fstatus_rect = {237,140,253,405};  /* filing status */
static Rect res_rect = {260,140,276,405};              /* place of residence */

/* Global Script Variables we play with */
#define OUR_HUE 37
Who knows ? */
#define INPUT_WIDTH 10



/* More Local variables */
static char hold_gi[VAR_MAXVARLEN];
static char hold_td[VAR_MAXVARLEN];
static Boolean two_s;

void taxCalcSetup( void )
{
        Point ip;
        char  temp[32];
        Handle       hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
                if (*varPtr(vMaritalB)=='0') {
                        strcpy(varPtr(taxFstatus),"Single");
                } else {
                        strcpy(varPtr(taxFstatus),"Joint");
                }
        }

        if (strlen(varPtr(taxNexempt))==0) strcpy(varPtr(taxNexempt),"1");

        if (strlen(varPtr(taxRes))==0) strcpy(varPtr(taxRes),"New York");

        /* Two screens ? */
        two_s = tglNumVisibleScreens == 2;

        PutSnipT("blank tax.s", NULL);

        /* Text */
        taxcalccolor(OUR_HUE);

        /* Default values */
        ip = topLeft(agross_rect);
        ip.h += 147; ip.v += 13;
        MoveTo2(ip.h, ip.v);
```

```
	formatNumber(temp,varPtr(vGrossIncome),INPUT_WIDTH,TRUE,0,FALSE,' ',TRUE,F
	drawstring2(temp);
	ip = topLeft(nexempt_rect);
	ip.h += 147; ip.v += 13;
	MoveTo2(ip.h, ip.v);
	drawstring2(varPtr(taxNexempt));
	ip = topLeft(deduct_rect);
	ip.h += 147; ip.v += 13;
	MoveTo2(ip.h, ip.v);
	drawstring2(varPtr(taxDeduct));
	ip = topLeft(fstatus_rect);
	ip.h += 147; ip.v += 12;
	MoveTo2(ip.h, ip.v);
	drawstring2(varPtr(taxFstatus));
	ip = topLeft(res_rect);
	ip.h += 147; ip.v += 12;
	MoveTo2(ip.h, ip.v);
	drawstring2(varPtr(taxRes));
	tax_rate();
}



Boolean taxCalcMouseDown( Point where )
{
	Rect	ar;
	Point	ip;


	/*
	 * point in close box
	 */
	if (PtInRect(where, &close_rect)) {

		tchBeepNow(TCH_GOOD_BEEP);
		return (TRUE);
	}


	/*
	 * point in Gross Income box
	 */
	else if (PtInRect(where, &agross_rect)) {

		tglCursorOnOff(TGL_OFF);
		tax_rate();
		taxcalccolor(OUR_HUE);
		ar = agross_rect;
		ar.top -= 2; ar.right -= 130;
		grfInterchange2(246L, 255L, &ar);
		grfInterchange2(7L, 254L, &ar);
		tchBeepNow(TCH_GOOD_BEEP);
		grfInterchange2(255L, 246L, &ar);
		grfInterchange2(254L, 7L, &ar);
		tglCursorOnOff(TGL_ON);
		ip = topLeft(agross_rect);
		ip.h += 147; ip.v += 12;
		ar = agross_rect;
		ar.left += 146; ar.top++; ar.bottom--;

		/*
		 * set up the edit gopher
		 */
		edtEditLen = INPUT_WIDTH;
		tglEditGopher->StartHandler();
		tglEditGopher->EditSetup(ip,varPtr(vGrossIncome),TRUE,vGrossIncome,two_
INPUT_WIDTH, 0,
```

```
                    FALSE, FALSE, '$', &ar);

        }

        /*
         * point in number of exemptions box
         */
        else if (PtInRect(where, &nexempt_rect)) {

                tglCursorOnOff(TGL_OFF);
                tax_rate();
                taxcalccolor(OUR_HUE);
                ar = nexempt_rect;
                ar.top -= 2; ar.right -= 130;
                grfInterchange2(2L, 255L, &ar);
                grfInterchange2(246L, 254L, &ar);
                tchBeepNow(TCH_GOOD_BEEP);
                grfInterchange2(255L, 2L, &ar);
                grfInterchange2(254L, 246L, &ar);
                tglCursorOnOff(TGL_ON);
                ip = topLeft(nexempt_rect);
                ip.h += 147; ip.v += 12;
                ar = nexempt_rect;
                ar.left += 146; ar.top++; ar.bottom--;

                /*
                 * set up edit gopher
                 */
                edtEditLen = 2;
                tglEditGopher->StartHandler();
                tglEditGopher->EditSetup(ip,varPtr(taxNexempt),TRUE,taxNexempt,two_s,'
FALSE, FALSE, '\0', &ar);

    }


    /*
     * point in deduction box
     */
        else if (PtInRect(where, &deduct_rect)) {

                tglCursorOnOff(TGL_OFF);
                tax_rate();
                taxcalccolor(OUR_HUE);
    ar = deduct_rect;
    ar.top -= 2; ar.right -= 130;
                grfInterchange2(73L, 255L, &ar);
                grfInterchange2(246L, 254L, &ar);
                tchBeepNow(TCH_GOOD_BEEP);
                grfInterchange2(255L, 73L, &ar);
                grfInterchange2(254L, 246L, &ar);
                tglCursorOnOff(TGL_ON);


                /*
                 * standard deduction
                 */
                if (strcmp(varPtr(taxDeduct),"Standard")==0) {
                        strcpy(varPtr(taxDeduct),hold_td);
    ip = topLeft(deduct_rect);
            ip.h += 147; ip.v += 12;
    ar = deduct_rect;
    ar.left += 146; ar.top++; ar.bottom--;


                        /*
                         * set up edit gopher
```

BEST AVAILABLE COPY

```
                */
                edtEditLen = INPUT_WIDTH;
                tglEditGopher->StartHandler();
                tglEditGopher->EditSetup(ip,varPtr(taxDeduct),TRUE,taxDeduct,two_s
INPUT_WIDTH, 0, FALSE, FALSE, '$', &ar);
            }


            /*
             * Itemized deduction
             */
            else {

                strcpy(hold_td,varPtr(taxDeduct));
                taxcalccolor(OUR_HUE);
            ar = deduct_rect;
            ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
            }
        }


    /*
     * filing status box
     */
        else if (PtInRect(where, &fstatus_rect)) {

            tglCursorOnOff(TGL_OFF);
            tax_rate();
      ar = fstatus_rect;
      ar.top -= 2; ar.right -= 130;
            grfinterchange2(8L, 255L, &ar);
            grfinterchange2(246L, 254L, &ar);
            tchBeepNow(TCH_GOOD_BEEP);
            grfinterchange2(255L, 8L, &ar);
            grfinterchange2(254L, 246L, &ar);
            tglCursorOnOff(TGL_ON);
            taxcalccolor(OUR_HUE);
        ar = fstatus_rect;
        ar.left += 147; ar.top += 3;
            EraseRect2(&ar);
            switch (varPtr(taxFstatus)[1]) {
                case 'l': strcpy(varPtr(taxFstatus),"Joint"); break;
                case 'o': strcpy(varPtr(taxFstatus),"Separate"); break;
                case 'e': strcpy(varPtr(taxFstatus),"Hd. of Household"); break;
                case 'd': strcpy(varPtr(taxFstatus),"Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
        }

    /*
     * result box
     */
        else if (PtInRect(where, &res_rect)) {

            tglCursorOnOff(TGL_OFF);
            tax_rate();
      ar = res_rect;
```

BEST AVAILABLE COPY

```
    ar.top -= 2; ar.right -= 130;
            grfinterchange2(114L, 255L, &ar);
            grfinterchange2(246L, 254L, &ar);
            tchBeepNow(TCH_GOOD_BEEP);
            grfinterchange2(255L, 114L, &ar);
            grfinterchange2(254L, 246L, &ar);
            tglCursorOnOff(TGL_ON);
            taxcalccolor(OUR_HUE);
        ar = res_rect;
        ar.left += 147; ar.top += 3;
            EraseRect2(&ar);
            switch (varPtr(taxRes)[8]) {
                case '\0': strcpy(varPtr(taxRes),"New York City"); break;
                case ' ': strcpy(varPtr(taxRes),"New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }


        /*
         * valid touch outside calculator kills calculator
         */
        else if ( tchValidTouch ( &where )) {

            tchBeepNow(TCH_GOOD_BEEP);
            return (TRUE);
        }


        /*
         * any other point is bad
         */
        else {

            tchBeepNow(TCH_BAD_BEEP);
        }


        return (FALSE);
}


Boolean taxCalcKeyDown( EventRecord theEvent )
{
        char    key;

        key = theEvent.message;
        if      (key == '\n' || key == 0x0D ) {
                tax_rate();
                taxcalccolor(OUR_HUE);
                return (TRUE);
        }

        return (FALSE);
}


void taxCalcCleanup( void )
{
        Handle      hSnip;

        strcpy(varPtr(vGrossIncome), hold_gi);
        hSnip = libFindPicPtr("blank tax.s", TRUE);
        HPurge(hSnip);
```

vrwVarfiles.c

```
	scrRestoreColors();

}


Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	  switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	  }
	} else {
		/* What you said */
		strcpy(temp, varPtr(taxDeduct));
		strstrip(temp,"$,");
		taxable -= varAtof(temp);
	}
	taxable -= varValF(taxNexempt)	* 2000.;

	fed_tax = state_tax = city_tax = 0.0;
	switch (varPtr(taxFstatus)[1]) {
		/* Single */
	  case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	  /* Joint Married */
	  case 'o':
			if (taxable <= 42150.) {
				fed_tax = 0.15;
				state_tax = 0.063;
			if (varPtr(taxRes)[8] == ' ') city_tax = 0.029;
		} else if (taxable <= 86050.) {
				fed_tax = 0.28;
				state_tax = 0.074;
			if (varPtr(taxRes)[8] == ' ') city_tax = 0.03;
		} else if (taxable <= 166520.) {
				fed_tax = 0.33;
				state_tax = 0.079;
			if (varPtr(taxRes)[8] == ' ') city_tax = 0.031;
		} else {
```

BEST AVAILABLE COPY

```
                fed_tax = 0.28;
                state_tax = 0.086;
            if (varPtr(taxRes)[8] == ' ') city_tax = 0.033;
            }
        break;
    /* Seperate Married */
    case 'e':
            if (taxable <= 20075.) {
                fed_tax = 0.15;
                state_tax = 0.063;
            if (varPtr(taxRes)[8] == ' ') city_tax = 0.029;
        } else if (taxable <= 42025.) {
                fed_tax = 0.28;
                state_tax = 0.074;
            if (varPtr(taxRes)[8] == ' ') city_tax = 0.03;
        } else if (taxable <= 122495.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    /* Head of Household */
    case 'd':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    default:
            fed_tax = 0.28;
            state_tax = 0.079;
        if (varPtr(taxRes)[8] == ' ') city_tax = 0.031;
        break;
    }

    tax = fed_tax + state_tax + city_tax;

    /* Show Rate */
    for (scrScreenSet(0, 1); scrScreenSet(1, 1); ) {
        TextFont(3);
        TextSize(12);
        TextFace(bold);
        RGBForeColor(&tglRgbWhite);
        RGBBackColor(&tglRgbBlack);
        r.top = 145; r.left = 357; r.bottom = 160; r.right = 398;
        EraseRect(&r);
    }
    sprintf(temp,"%2.0lf%%",tax*100.0);
    sprintf(varPtr(taxRate),"%2.0lf",tax*100.0);
    MoveTo2(365,157);
    drawstring2(temp);
```

```
	for (scrScreenSet(0, 1); scrScreenSet(1, 1); ) {
		scrSetHue(OUR_HUE, &tglTextFont, &tglTextSize, &tglTextFace,
						&tglTextFGColor, &tglTextBGColor);
	}
	scrSetHueNow2(OUR_HUE);
	return tax;
}

static void	taxcalccolor(hue)
Int16T hue;
{
	for (scrScreenSet(0, 1); scrScreenSet(1, 1); ) {
		tglTextFont = 3;
		tglTextSize = 12;
		tglTextFace = normal;
		TGL_SETRGB(tglTextFGColor, 13107, 13107, 39321);
		TGL_SETRGB(tglTextBGColor, 48059, 48059, 48059);

		TextFont(tglTextFont);
		TextSize(tglTextSize);
		TextFace(tglTextFace);
		RGBForeColor(&tglTextFGColor);
		RGBBackColor(&tglTextBGColor );
	}
}

Int16T strstrip(s, rid)
char *s;						/* The string to str
char *rid;					/* Chars to get rid of */
{
	Int16T i,n,count;
	char *t;

	count=0;
	n = strlen(rid);
	t=s;
	do {
		for (i=0; i<n; i++) {
			if (*s==rid[i]) {
				count++;
				s++;
				goto cont_do;
			}
		}
		*t++ = *s++;
		cont_do: ;
	} while ( *(s-1) != '\0');
	return count;
}

void grfInterchange2(cf, ct, r)
Int32T cf,ct;
Rect *r;
{
	Rect lr;

	lr = *r;
	for (scrScreenSet(0, 1); scrScreenSet(1, 1); ) {
		grfInterchange(cf, ct, &lr);
	}
}

void EraseRect2(r)
Rect *r;
{
	for (scrScreenSet(0, 1); scrScreenSet(1, 1); ) {
		EraseRect(r);
```

BEST AVAILABLE COPY

```
	}
}

void PutSnipT(name, r)
char *name;                                        /* Sni:
Rect *r;                                           /* Op
*/
{
	Handle hSnip;
	Rect theRect;
	Point p;

	hSnip= libFindPicPtr( name, TRUE );
	libGetPicRect(hSnip, &theRect);
	p = topLeft(theRect);
	for (scrScreenSet(0, 1); scrScreenSet(1, 1); ) {
		grfMDrawPic(hSnip, &p, 0);
	}
	if (r != NULL) *r = theRect;
}


void MoveTo2(h, v)
Int16T h, v;
{
	for (scrScreenSet(0, 1); scrScreenSet(1, 1); ) {
		MoveTo(h, v);
	}
}

void drawstring2(s)
char *s;
{
	for (scrScreenSet(0, 1); scrScreenSet(1, 1); ) {
		drawstring(s);
	}
}

void scrSetHueNow2(h)
Int16T h;
{
	for (scrScreenSet(0, 1); scrScreenSet(1, 1); ) {
		scrSetHueNow(h);
	}
}

/* Tax Rate Calculator Code                    */
/* CitiBank Money Advisor           */
/* Tax Calc.c              */
/* 1/28/90 - JDT              */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"
```

```
/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T           strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};      /* # of exemptions */
static Rect deduct_rect = {214,140,230,405};  /* deductions */
static Rect fstatus_rect = {237,140,253,405};  /* filing status */
static Rect res_rect = {260,140,276,405};            /* place of residence */

/* Global Script Variables we play with */
#define OUR_HUE 37
Who knows ? */
#define INPUT_WIDTH 10



/* More Local variables */
static char hold_gi[VAR_MAXVARLEN];
static char hold_td[VAR_MAXVARLEN];
static Boolean two_s;

void taxCalcSetup( void )
{
      Point ip;
      char  temp[32];
      Handle      hSnip;

      /* Save copy of Gross Income */
      strcpy(hold_gi,varPtr(vGrossIncome));
      strcpy(hold_td,"0");

      /* Init some Variables if they haven't been */
      if (strlen(varPtr(taxFstatus))==0) {
            if (*varPtr(vMaritalB)=='0') {
                  strcpy(varPtr(taxFstatus),"Single");
            } else {
                  strcpy(varPtr(taxFstatus),"Joint");
            }
      }

      if (strlen(varPtr(taxNexempt))==0) strcpy(varPtr(taxNexempt),"1");

      if (strlen(varPtr(taxRes))==0) strcpy(varPtr(taxRes),"New York");

      /* Two screens ? */
      two_s = tglNumVisibleScreens == 2;

      PutSnipT("blank tax.s", NULL);

      /* Text */
      taxcalccolor(OUR_HUE);

      /* Default values */
      ip = topLeft(agross_rect);
      ip.h += 147; ip.v += 13;
      MoveTo2(ip.h, ip.v);
      formatNumber(temp,varPtr(vGrossIncome),INPUT_WIDTH,TRUE,0,FALSE,' ',TRUE
      drawstring2(temp);
```

```
	ip = topLeft(nexempt_rect);
	ip.h += 147; ip.v += 13;
	MoveTo2(ip.h, ip.v);
	drawstring2(varPtr(taxNexempt));
	ip = topLeft(deduct_rect);
	ip.h += 147; ip.v += 13;
	MoveTo2(ip.h, ip.v);
	drawstring2(varPtr(taxDeduct));
	ip = topLeft(fstatus_rect);
	ip.h += 147; ip.v += 12;
	MoveTo2(ip.h, ip.v);
	drawstring2(varPtr(taxFstatus));
	ip = topLeft(res_rect);
	ip.h += 147; ip.v += 12;
	MoveTo2(ip.h, ip.v);
	drawstring2(varPtr(taxRes));
	tax_rate();
}


Boolean taxCalcMouseDown( Point where )
{
	Rect  ar;
	Point ip;


	/*
	 * point in close box
	 */
	if (PtInRect(where, &close_rect)) {

		tchBeepNow(TCH_GOOD_BEEP);
		return (TRUE);
	}


	/*
	 * point in Gross Income box
	 */
	else if (PtInRect(where, &agross_rect)) {

		tglCursorOnOff(TGL_OFF);
		tax_rate();
		taxcalccolor(OUR_HUE);
		ar = agross_rect;
		ar.top -= 2; ar.right -= 130;
		grfInterchange2(246L, 255L, &ar);
		grfInterchange2(7L, 254L, &ar);
		tchBeepNow(TCH_GOOD_BEEP);
		grfInterchange2(255L, 246L, &ar);
		grfInterchange2(254L, 7L, &ar);
		tglCursorOnOff(TGL_ON);
		ip = topLeft(agross_rect);
		ip.h += 147; ip.v += 12;
		ar = agross_rect;
		ar.left += 146; ar.top++; ar.bottom--;

		/*
		 * set up the edit gopher
		 */
		edtEditLen = INPUT_WIDTH;
		tglEditGopher->StartHandler();
		tglEditGopher->EditSetup(ip,varPtr(vGrossIncome),TRUE,vGrossIncome,two_
INPUT_WIDTH, 0,
			FALSE, FALSE, '$', &ar);
```

```
}

/*
 * point in number of exemptions box
 */
else if (PtInRect(where, &nexempt_rect)) {

        tglCursorOnOff(TGL_OFF);
        tax_rate();
        taxcalccolor(OUR_HUE);
        ar = nexempt_rect;
        ar.top -= 2; ar.right -= 130;
        grfInterchange2(2L, 255L, &ar);
        grfInterchange2(246L, 254L, &ar);
        tchBeepNow(TCH_GOOD_BEEP);
        grfInterchange2(255L, 2L, &ar);
        grfInterchange2(254L, 246L, &ar);
        tglCursorOnOff(TGL_ON);
        ip = topLeft(nexempt_rect);
        ip.h += 147; ip.v += 12;
        ar = nexempt_rect;
        ar.left += 146; ar.top++; ar.bottom--;

        /*
         * set up edit gopher
         */
        edtEditLen = 2;
        tglEditGopher->StartHandler();
        tglEditGopher->EditSetup(ip,varPtr(taxNexempt),TRUE,taxNexempt,two_s,'
FALSE, FALSE, '\0', &ar);

    }

/*
 * point in deduction box
 */
    else if (PtInRect(where, &deduct_rect)) {

        tglCursorOnOff(TGL_OFF);
        tax_rate();
        taxcalccolor(OUR_HUE);
ar = deduct_rect;
ar.top -= 2; ar.right -= 130;
        grfInterchange2(73L, 255L, &ar);
        grfInterchange2(246L, 254L, &ar);
        tchBeepNow(TCH_GOOD_BEEP);
        grfInterchange2(255L, 73L, &ar);
        grfInterchange2(254L, 246L, &ar);
        tglCursorOnOff(TGL_ON);


        /*
         * standard deduction
         */
        if (strcmp(varPtr(taxDeduct),"Standard")==0) {
                strcpy(varPtr(taxDeduct),hold_td);
ip = topLeft(deduct_rect);
        ip.h += 147; ip.v += 12;
ar = deduct_rect;
ar.left += 146; ar.top++; ar.bottom--;

                /*
                 * set up edit gopher
                 */
                edtEditLen = INPUT_WIDTH;
```

```
		tglEditGopher->StartHandler().
		tglEditGopher->EditSetup(ip,varPtr(taxDeduct),TRUE,taxDeduct,two_:
INPUT_WIDTH, 0, FALSE, FALSE, '$', &ar);
	}


	/*
	 * Itemized deduction
	 */
	else {

		strcpy(hold_td,varPtr(taxDeduct));
		taxcalccolor(OUR_HUE);
	ar = deduct_rect;
	ar.left += 147; ar.top += 3;
		EraseRect2(&ar);
		strcpy(varPtr(taxDeduct),"Standard");
		ip = topLeft(deduct_rect);
		ip.h += 147; ip.v += 12;
		MoveTo2(ip.h, ip.v);
		drawstring2(varPtr(taxDeduct));
		tax_rate();
	}
    }


/*
 * filing status box
 */
    else if (PtInRect(where, &fstatus_rect)) {

		tglCursorOnOff(TGL_OFF);
		tax_rate();
	ar = fstatus_rect;
	ar.top -= 2; ar.right -= 130;
		grfinterchange2(8L, 255L, &ar);
		grfinterchange2(246L, 254L, &ar);
		tchBeepNow(TCH_GOOD_BEEP);
		grfinterchange2(255L, 8L, &ar);
		grfinterchange2(254L, 246L, &ar);
		tglCursorOnOff(TGL_ON);
		taxcalccolor(OUR_HUE);
	ar = fstatus_rect;
	ar.left += 147; ar.top += 3;
		EraseRect2(&ar);
		switch (varPtr(taxFstatus)[1]) {
			case 'i': strcpy(varPtr(taxFstatus),"Joint"); break;
			case 'o': strcpy(varPtr(taxFstatus),"Separate"); break;
			case 'e': strcpy(varPtr(taxFstatus),"Hd. of Household"); break;
			case 'd': strcpy(varPtr(taxFstatus),"Single"); break;
		}
		ip = topLeft(fstatus_rect);
		ip.h += 147; ip.v += 12;
		MoveTo2(ip.h, ip.v);
		drawstring2(varPtr(taxFstatus));
		tax_rate();
    }

/*
 * result box
 */
    else if (PtInRect(where, &res_rect)) {

		tglCursorOnOff(TGL_OFF);
		tax_rate();
	ar = res_rect;
	ar.top -= 2; ar.right -= 130;
		grfinterchange2(114L, 255L, &ar);
```

```
            grfInterchange2(246L, 254L, &ar);
            tchBeepNow(TCH_GOOD_BEEP);
            grfInterchange2(255L, 114L, &ar);
            grfInterchange2(254L, 246L, &ar);
            tglCursorOnOff(TGL_ON);
            taxcalccolor(OUR_HUE);
    ar = res_rect;
    ar.left += 147; ar.top += 3;
            EraseRect2(&ar);
            switch (varPtr(taxRes)[8]) {
                    case '\0': strcpy(varPtr(taxRes), "New York City"); break;
                    case ' ': strcpy(varPtr(taxRes), "New York"); break;
            }
            ip = topLeft(res_rect);
            ip.h += 147; ip.v += 12;
            MoveTo2(ip.h, ip.v);
            drawstring2(varPtr(taxRes));
            tax_rate();
    }


    /*
     * valid touch outside calculator kills calculator
     */
    else if ( tchValidTouch ( &where )) {

            tchBeepNow(TCH_GOOD_BEEP);
            return (TRUE);
    }


    /*
     * any other point is bad
     */
    else {

            tchBeepNow(TCH_BAD_BEEP);
    }

    return (FALSE);
}

Boolean taxCalcKeyDown( EventRecord theEvent )
{
    char    key;

    key = theEvent.message;
    if      (key == '\n' || key == 0x0D ) {
            tax_rate();
            taxcalccolor(OUR_HUE);
            return (TRUE);
    }

    return (FALSE);
}

void taxCalcCleanup( void )
{
    Handle      hSnip;

    strcpy(varPtr(vGrossIncome), hold_gi);
    hSnip = libFindPicPtr("blank tax.s", TRUE);
    HPurge(hSnip);
    scrRestoreColors();
```

vrwVarfiles.c

BEST AVAILABLE COPY

```
}

Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	 switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	 }
	} else {
		/* What you said */
		strcpy(temp, varPtr(taxDeduct));
		strstrip(temp,"$,");
		taxable -= varAtof(temp);
	}
	taxable -= varValF(taxNexempt)	* 2000.;

	fed_tax = state_tax = city_tax = 0.0;
	switch (varPtr(taxFstatus)[1]) {
		/* Single */
	 case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
			if (varPtr(taxRes)[8] == ' ') city_tax = 0.033;
			}
		break;
	/* Joint Married */
	case 'o':
			if (taxable <= 42150.) {
				fed_tax = 0.15;
				state_tax = 0.063;
			if (varPtr(taxRes)[8] == ' ') city_tax = 0.029;
		} else if (taxable <= 86050.) {
				fed_tax = 0.28;
				state_tax = 0.074;
			if (varPtr(taxRes)[8] == ' ') city_tax = 0.03;
		} else if (taxable <= 166520.) {
				fed_tax = 0.33;
				state_tax = 0.079;
			if (varPtr(taxRes)[8] == ' ') city_tax = 0.031;
		} else {
				fed_tax = 0.28;
				state_tax = 0.086;
```

BEST AVAILABLE COPY

```
                if (varPtr(taxRes)[8] == ' ') city_tax = 0.033;
                }
        break;
    /* Seperate Married */
    case 'e':
                if (taxable <= 20075.) {
                        fed_tax = 0.15;
                        state_tax = 0.063;
                if (varPtr(taxRes)[8] == ' ') city_tax = 0.029;
        } else if (taxable <= 42025.) {
                        fed_tax = 0.28;
                        state_tax = 0.074;
                if (varPtr(taxRes)[8] == ' ') city_tax = 0.03;
        } else if (taxable <= 122495.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
    /* Head of Household */
    case 'd':
                if (taxable <= 42150.) {
                        fed_tax = 0.15;
                        state_tax = 0.063;
                if (varPtr(taxRes)[8] == ' ') city_tax = 0.029;
        } else if (taxable <= 86050.) {
                        fed_tax = 0.28;
                        state_tax = 0.074;
                if (varPtr(taxRes)[8] == ' ') city_tax = 0.03;
        } else if (taxable <= 166520.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
    default:
                fed_tax = 0.28;
                state_tax = 0.079;
        if (varPtr(taxRes)[8] == ' ') city_tax = 0.031;
        break;
    }

    tax = fed_tax + state_tax + city_tax;

    /* Show Rate */
    for (scrScreenSet(0, 1); scrScreenSet(1, 1); ) {
            TextFont(3);
            TextSize(12);
            TextFace(bold);
            RGBForeColor(&tglRgbWhite);
            RGBBackColor(&tglRgbBlack);
            r.top = 145; r.left = 357; r.bottom = 160; r.right = 398;
            EraseRect(&r);
    }
    sprintf(temp,"%2.0lf%%",tax*100.0);
    sprintf(varPtr(taxRate),"%2.0lf",tax*100.0);
    MoveTo2(365,157);
    drawstring2(temp);

    for (scrScreenSet(0, 1); scrScreenSet(1, 1); ) {
```

BEST AVAILABLE COPY

```
            scrSetHue(OUR_HUE, &tglTextFont, &tglTextSize, &tglTextFace,
                                    &tglTextFGColor, &tglTextBGColor);
        }
        scrSetHueNow2(OUR_HUE);
        return tax;
}

static void   taxcalccolor(hue)
Int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

Int16T strstrip(s, rid)
char *s;                                        /* The string to str
char *rid;                                      /* Chars to get rid of */
{
        Int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
                cont_do: ;
        } while ( *(s-1) != '\0');
        return count;
}

void grfInterchange2(cf, ct, r)
Int32T cf,ct;
Rect *r;
{
        Rect lr;

        lr = *r;
        for (scrScreenSet(0, 1); scrScreenSet(1, 1); ) {
                grfInterchange(cf, ct, &lr);
        }
}

void EraseRect2(r)
Rect *r;
{
        for (scrScreenSet(0, 1); scrScreenSet(1, 1); ) {
                EraseRect(r);
        }
}

vrwVarfiles.c
```

BEST AVAILABLE COPY

```
void PutSnipT(name, r)
char *name;
Rect *r;
*/
{
        Handle hSnip;
        Rect theRect;
        Point p;

        hSnip= libFindPicPtr( name, TRUE );
        libGetPicRect(hSnip, &theRect);
        p = topLeft(theRect);
        for (scrScreenSet(0, 1); scrScreenSet(1, 1); ) {
                grfMDrawPic(hSnip, &p, 0);
        }
        if (r != NULL) *r = theRect;
}
```

```
/* Snip
/* Opt
```

```
void MoveTo2(h, v)
Int16T h, v;
{
        for (scrScreenSet(0, 1); scrScreenSet(1, 1); ) {
                MoveTo(h, v);
        }
}

void drawstring2(s)
char *s;
{
        for (scrScreenSet(0, 1); scrScreenSet(1, 1); ) {
                drawstring(s);
        }
}

void scrSetHueNow2(h)
Int16T h;
{
        for (scrScreenSet(0, 1); scrScreenSet(1, 1); ) {
                scrSetHueNow(h);
        }
}
```

```
*
* File wrkScrnBuffer.c    — off-screen buffer manager
*

#ifdef THINK_C

      /* macheaders as well */
      #include     <color.h>
      #include     <colortoolbox.h>
      #include     <stdio.h>
      #include     <stdlib.h>
      #include     <ctype.h>
      #include     <math.h>
      #include     <string.h>

#else

            #include     <types.h>
            #include     <memory.h>
            #include     <palette.h>
            #include     <quickdraw.h>
            #include     <toolutils.h>
            #include     <fonts.h>
            #include     <events.h>
            #include     <windows.h>
            #include     <dialogs.h>
            #include     <menus.h>
            #include     <desk.h>
            #include     <textedit.h>
            #include     <scrap.h>
            #include     <segload.h>
            #include     <packages.h>
            #include     <errors.h>
            #include     <files.h>
            #include     <stdio.h>

      #pragma    segment Seg2

#endif

#include     "standard.h"
#include     "glue.h"
#include     "varFns.h"
#include     "tglMain.h"
#include     "scnScan.h"

#define            EXTGEN
#include     "wrkScrnBuffer.h"

/*************************************************************************
*
      wrkInitialize()
*************************************************************************
/
void wrkInitialize( void )
{
Rect   bigR;

TGL_SETRECT( &bigR, 0, 0, 640, 480 );

/* create an off-screen grafport (for window save/restore) */

wrkPSavePort= (CGrafPort*) NewPtr( sizeof(CGrafPort));
if( wrkPSavePort == NULL )
      TGL_FATAL_ERROR( "wrk wrkPSavePort allocation failed" );
OpenCPort( wrkPSavePort );
```

```
wrkHSaveMap= wrkPSavePort->portPixMap;

wrkPSaveBits= NewPtr( TGL_cSCREEN_BYTES );
if( wrkPSaveBits == NULL )
        TGL_FATAL_ERROR( "wrk wrkPSaveBits allocation failed" );
(*wrkHSaveMap)->baseAddr= wrkPSaveBits;
(*wrkHSaveMap)->rowBytes= 0x8000 | 640;
(*wrkHSaveMap)->bounds= bigR;

SetPort( (GrafPtr) wrkPSavePort );
RGBForeColor( &tglRgbBlack );
RGBBackColor( &tglRgbWhite );

}

/***********************************************************************
wrkDispose() -- get rid of offscreen buffer
***********************************************************************

void  wrkDispose( void )
{
        DisposPtr( (*(wrkPSavePort->portPixMap))->baseAddr ); /* get rid of pixels */
        CloseCPort( wrkPSavePort );                            /* and port *
}

/***********************************************************************
*
        SaveWindow() -- save rectangle on current screen to offscreen buffer
***********************************************************************
/
void wrkSaveWindow( pRect)
        Rect *pRect;
{


        wrkSaveRect= *pRect;

        SetPort( (GrafPtr) tglMyCWindow );

        CopyBits(
                (BitMap*) *(tglMyCWindow->portPixMap),
                (BitMap*) *wrkHSaveMap,
                pRect,
                pRect,
                (Int32T) 0,
                (RgnHandle) NULL
                );
}

/***********************************************************************
*
        RestoreWindow() -- restore myCwindow from saved buffer
***********************************************************************
/
void wrkRestoreWindow()
{
        SetPort( (GrafPtr) tglMyCWindow );

        CopyBits(
                (BitMap*) *wrkHSaveMap,
                (BitMap*) *(tglMyCWindow->portPixMap),
                &wrkSaveRect,
                &wrkSaveRect,
                (Int32T) 0,
                (RgnHandle) NULL
                );
```

```
}

/* Tax Rate Calculator Code                    */
/* CitiBank Money Advisor          */
/* Tax Calc.c          */
/* 1/28/90 - JDT          */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};       /* # of exemptions */
static Rect deduct_rect = {214,140,230,405};  /* deductions */
static Rect fstatus_rect = {237,140,253,405};  /* filing status */
static Rect res_rect = {260,140,276,405};             /* place of residence */

/* Global Script Variables we play with */
#define OUR_HUE 37
Who knows ? */
#define INPUT_WIDTH 10



/* More Local variables */
static char hold_gi[VAR_MAXVARLEN];
static char hold_td[VAR_MAXVARLEN];
static Boolean two_s;

void taxCalcSetup( void )
{
        Point ip;
        char  temp[32];
        Handle       hSnip;

        /* Save copy of Gross Income */
        strcpy(hold_gi,varPtr(vGrossIncome));
        strcpy(hold_td,"0");

        /* Init some Variables if they haven't been */
        if (strlen(varPtr(taxFstatus))==0) {
              if (*varPtr(vMaritalB)=='0') {
```

```
                strcpy(varPtr(taxFstatus),"Single").
        } else {
                strcpy(varPtr(taxFstatus),"Joint").
        }
    }

    if (strlen(varPtr(taxNexempt))==0) strcpy(varPtr(taxNexempt),"1");

    if (strlen(varPtr(taxRes))==0) strcpy(varPtr(taxRes),"New York");

    /* Two screens ? */
    two_s = tglNumVisibleScreens == 2;

    PutSnipT("blank tax.s", NULL);

    /* Text */
    taxcalccolor(OUR_HUE);

    /* Default values */
    ip = topLeft(agross_rect);
    ip.h += 147; ip.v += 13;
    MoveTo2(ip.h, ip.v);
    formatNumber(temp,varPtr(vGrossIncome),INPUT_WIDTH,TRUE,0,FALSE,' ',TRUE,F
    drawstring2(temp);
    ip = topLeft(nexempt_rect);
    ip.h += 147; ip.v += 13;
    MoveTo2(ip.h, ip.v);
    drawstring2(varPtr(taxNexempt));
    ip = topLeft(deduct_rect);
    ip.h += 147; ip.v += 13;
    MoveTo2(ip.h, ip.v);
    drawstring2(varPtr(taxDeduct));
    ip = topLeft(fstatus_rect);
    ip.h += 147; ip.v += 12;
    MoveTo2(ip.h, ip.v);
    drawstring2(varPtr(taxFstatus));
    ip = topLeft(res_rect);
    ip.h += 147; ip.v += 12;
    MoveTo2(ip.h, ip.v);
    drawstring2(varPtr(taxRes));
    tax_rate();
}



Boolean taxCalcMouseDown( Point where )
{
    Rect  ar;
    Point ip;


    /*
     * point in close box
     */
    if (PtInRect(where, &close_rect)) {

        tchBeepNow(TCH_GOOD_BEEP);
        return (TRUE);
    }


    /*
     * point in Gross Income box
     */
    else if (PtInRect(where, &agross_rect)) {

        tglCursorOnOff(TGL_OFF);
```

BEST AVAILABLE COPY

```
            tax_rate();
            taxcalccolor(OUR_HUE);
            ar = agross_rect;
            ar.top -= 2; ar.right -= 130;
            grfInterchange2(246L, 255L, &ar);
            grfInterchange2(7L, 254L, &ar);
            tchBeepNow(TCH_GOOD_BEEP);
            grfInterchange2(255L, 246L, &ar);
            grfInterchange2(254L, 7L, &ar);
            tglCursorOnOff(TGL_ON);
            ip = topLeft(agross_rect);
            ip.h += 147; ip.v += 12;
            ar = agross_rect;
            ar.left += 146; ar.top++; ar.bottom--;

            /*
             * set up the edit gopher
             */
            edtEditLen = INPUT_WIDTH;
            tglEditGopher->StartHandler();
            tglEditGopher->EditSetup(ip,varPtr(vGrossIncome),TRUE,vGrossIncome,two
INPUT_WIDTH, 0,
                    FALSE, FALSE, '$', &ar);

        }


        /*
         * point in number of exemptions box
         */
        else if (PtInRect(where, &nexempt_rect)) {

            tglCursorOnOff(TGL_OFF);
            tax_rate();
            taxcalccolor(OUR_HUE);
            ar = nexempt_rect;
            ar.top -= 2; ar.right -= 130;
            grfInterchange2(2L, 255L, &ar);
            grfInterchange2(246L, 254L, &ar);
            tchBeepNow(TCH_GOOD_BEEP);
            grfInterchange2(255L, 2L, &ar);
            grfInterchange2(254L, 246L, &ar);
            tglCursorOnOff(TGL_ON);
            ip = topLeft(nexempt_rect);
            ip.h += 147; ip.v += 12;
            ar = nexempt_rect;
            ar.left += 146; ar.top++; ar.bottom--;

            /*
             * set up edit gopher
             */
            edtEditLen = 2;
            tglEditGopher->StartHandler();
            tglEditGopher->EditSetup(ip,varPtr(taxNexempt),TRUE,taxNexempt,two_s,'
FALSE, FALSE, '\0', &ar);

    }


   /*
    * point in deduction box
    */
       else if (PtInRect(where, &deduct_rect)) {

            tglCursorOnOff(TGL_OFF);
            tax_rate();
            taxcalccolor(OUR_HUE);
     ar = deduct_rect;
```

```
ar.top -= 2; ar.right -= 130;
        grfInterchange2(73L, 255L, &ar);
        grfInterchange2(246L, 254L, &ar);
        tchBeepNow(TCH_GOOD_BEEP);
        grfInterchange2(255L, 73L, &ar);
        grfInterchange2(254L, 246L, &ar);
        tglCursorOnOff(TGL_ON);


        /*
         * standard deduction
         */
        if (strcmp(varPtr(taxDeduct),"Standard")==0) {
                strcpy(varPtr(taxDeduct),hold_td);
    ip = topLeft(deduct_rect);
        ip.h += 147; ip.v += 12;
    ar = deduct_rect;
    ar.left += 146; ar.top++; ar.bottom--;


                /*
                 * set up edit gopher
                 */
                edtEditLen = INPUT_WIDTH;
                tglEditGopher->StartHandler();
                tglEditGopher->EditSetup(ip,varPtr(taxDeduct),TRUE,taxDeduct,two_
INPUT_WIDTH, 0, FALSE, FALSE, '$', &ar);
        }


        /*
         * Itemized deduction
         */
        else {

                strcpy(hold_td,varPtr(taxDeduct));
                taxcalccolor(OUR_HUE);
        ar = deduct_rect;
        ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
        }
    }


/*
 * filing status box
 */
    else if (PtInRect(where, &fstatus_rect)) {

        tglCursorOnOff(TGL_OFF);
        tax_rate();
  ar = fstatus_rect;
  ar.top -= 2; ar.right -= 130;
        grfInterchange2(8L, 255L, &ar);
        grfInterchange2(246L, 254L, &ar);
        tchBeepNow(TCH_GOOD_BEEP);
        grfInterchange2(255L, 8L, &ar);
        grfInterchange2(254L, 246L, &ar);
        tglCursorOnOff(TGL_ON);
        taxcalccolor(OUR_HUE);
   ar = fstatus_rect;
   ar.left += 147; ar.top += 3;
```

BEST AVAILABLE COPY

```
            EraseRect2(&ar);
            switch (varPtr(taxFstatus)[1]) {
                case 'I': strcpy(varPtr(taxFstatus),"Joint"); break;
                case 'o': strcpy(varPtr(taxFstatus),"Separate"); break;
                case 'e': strcpy(varPtr(taxFstatus),"Hd. of Household"); break;
                case 'd': strcpy(varPtr(taxFstatus),"Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
        }

    /*
     * result box
     */
        else if (PtInRect(where, &res_rect)) {

            tglCursorOnOff(TGL_OFF);
            tax_rate();
      ar = res_rect;
      ar.top -= 2; ar.right -= 130;
            grfInterchange2(114L, 255L, &ar);
            grfInterchange2(246L, 254L, &ar);
            tchBeepNow(TCH_GOOD_BEEP);
            grfInterchange2(255L, 114L, &ar);
            grfInterchange2(254L, 246L, &ar);
            tglCursorOnOff(TGL_ON);
            taxcalccolor(OUR_HUE);
        ar = res_rect;
        ar.left += 147; ar.top += 3;
            EraseRect2(&ar);
            switch (varPtr(taxRes)[8]) {
                case '\0': strcpy(varPtr(taxRes),"New York City"); break;
                case ' ': strcpy(varPtr(taxRes),"New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }


        /*
         * valid touch outside calculator kills calculator
         */
        else if ( tchValidTouch ( &where )) {

            tchBeepNow(TCH_GOOD_BEEP);
            return (TRUE);
        }


        /*
         * any other point is bad
         */
        else {

            tchBeepNow(TCH_BAD_BEEP);
        }


        return (FALSE);
}
```

wrkScrnBuffer.c

```
Boolean taxCalcKeyDown( EventRecord theEvent )
{
	char	key;

	key = theEvent.message;
	if	(key == '\n' || key == 0x0D ) {
		tax_rate();
		taxcalccolor(OUR_HUE);
		return (TRUE);
	}

	return (FALSE);
}


void taxCalcCleanup( void )
{
	Handle		hSnip;

	strcpy(varPtr(vGrossIncome), hold_gi);
	hSnip = libFindPicPtr("blank tax.s", TRUE);
	HPurge(hSnip);
	scrRestoreColors();

}


Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	 switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	 }
	} else {
		/* What you said */
		strcpy(temp, varPtr(taxDeduct));
		strstrip(temp,"$,");
		taxable -= varAtof(temp);
	}
	taxable -= varValF(taxNexempt)		* 2000.;

	fed_tax = state_tax = city_tax = 0.0;
	switch (varPtr(taxFstatus)[1]) {
		/* Single */
	 case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
```

```
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
    /* Joint Married */
    case 'o':
                if (taxable <= 42150.) {
                        fed_tax = 0.15;
                        state_tax = 0.063;
                if (varPtr(taxRes)[8] == ' ') city_tax = 0.029;
        } else if (taxable <= 86050.) {
                        fed_tax = 0.28;
                        state_tax = 0.074;
                if (varPtr(taxRes)[8] == ' ') city_tax = 0.03;
        } else if (taxable <= 166520.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
    /* Seperate Married */
    case 'e':
                if (taxable <= 20075.) {
                        fed_tax = 0.15;
                        state_tax = 0.063;
                if (varPtr(taxRes)[8] == ' ') city_tax = 0.029;
        } else if (taxable <= 42025.) {
                        fed_tax = 0.28;
                        state_tax = 0.074;
                if (varPtr(taxRes)[8] == ' ') city_tax = 0.03;
        } else if (taxable <= 122495.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
    /* Head of Household */
    case 'd':
                if (taxable <= 42150.) {
                        fed_tax = 0.15;
                        state_tax = 0.063;
                if (varPtr(taxRes)[8] == ' ') city_tax = 0.029;
        } else if (taxable <= 86050.) {
                        fed_tax = 0.28;
                        state_tax = 0.074;
                if (varPtr(taxRes)[8] == ' ') city_tax = 0.03;
        } else if (taxable <= 166520.) {
                        fed_tax = 0.33;
                        state_tax = 0.079;
                if (varPtr(taxRes)[8] == ' ') city_tax = 0.031;
        } else {
                        fed_tax = 0.28;
                        state_tax = 0.086;
                if (varPtr(taxRes)[8] == ' ') city_tax = 0.033;
                }
        break;
default:
```

```
                fed_tax = 0.28;
                state_tax = 0.079;
            if (varPtr(taxRes)[8] == ' ') city_tax = 0.031;
            break;
        }

        tax = fed_tax + state_tax + city_tax;

        /* Show Rate */
        for (scrScreenSet(0, 1); scrScreenSet(1, 1); ) {
                TextFont(3);
                TextSize(12);
                TextFace(bold);
                RGBForeColor(&tglRgbWhite);
                RGBBackColor(&tglRgbBlack);
                r.top = 145; r.left = 357; r.bottom = 160; r.right = 398;
                EraseRect(&r);
        }
        sprintf(temp,"%2.0lf%%",tax*100.0);
        sprintf(varPtr(taxRate),"%2.0lf",tax*100.0);
        MoveTo2(365,157);
        drawstring2(temp);

        for (scrScreenSet(0, 1); scrScreenSet(1, 1); ) {
                scrSetHue(OUR_HUE, &tglTextFont, &tglTextSize, &tglTextFace,
                                        &tglTextFGColor, &tglTextBGColor);
        }
        scrSetHueNow2(OUR_HUE);
        return tax;
}

static void     taxcalccolor(hue)
int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

int16T strstrip(s, rid)
char *s;                                        /* The string to str
char *rid;                                   /* Chars to get rid of */
{
        int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
```

```
		cont_do: ;
	} while ( *(s-1) != '\0');
	return count;
}

void grfInterchange2(cf, ct, r)
int32T cf,ct;
Rect *r;
{
	Rect lr;

	lr = *r;
	for (scrScreenSet(0, 1); scrScreenSet(1, 1); ) {
		grfInterchange(cf, ct, &lr);
	}
}

void EraseRect2(r)
Rect *r;
{
	for (scrScreenSet(0, 1); scrScreenSet(1, 1); ) {
		EraseRect(r);
	}
}

void PutSnipT(name, r)
char *name;                                                    /* Sni
Rect *r;                                                       /* Op
*/
{
	Handle hSnip;
	Rect theRect;
	Point p;

	hSnip= libFindPicPtr( name, TRUE );
	libGetPicRect(hSnip, &theRect);
	p = topLeft(theRect);
	for (scrScreenSet(0, 1); scrScreenSet(1, 1); ) {
		grfMDrawPic(hSnip, &p, 0);
	}
	if (r != NULL) *r = theRect;
}


void MoveTo2(h, v)
int16T h, v;
{
	for (scrScreenSet(0, 1); scrScreenSet(1, 1); ) {
		MoveTo(h, v);
	}
}

void drawstring2(s)
char *s;
{
	for (scrScreenSet(0, 1); scrScreenSet(1, 1); ) {
		drawstring(s);
	}
}

void scrSetHueNow2(h)
int16T h;
{
	for (scrScreenSet(0, 1); scrScreenSet(1, 1); ) {
		scrSetHueNow(h);
	}
}
```

wrkScrnBuffer.c

BEST AVAILABLE COPY

```
/* Tax Rate Calculator Code                    */
/* CitiBank Money Advisor        */
/* Tax Calc.c          */
/* 1/28/90 - JDT         */

#define APP_ADTERM

#include "standard.h"
#include "glue.h"
#include "tglMain.h"
#include "taxCalc.h"
#include "EventHandlers.h"
#include "varfns.h"
#include "liblibrary.h"
#include "format.h"
#include "tchTouch.h"
#include "edtEdit.h"
#include "scrScreen.h"
#include "grfGraphics.h"


/* Local Prototypes */
void        drawstring2(char *);
void        MoveTo2(Int16T, Int16T);
void        scrSetHueNow2(Int16T);
Real80T     tax_rate(void);
void        taxcalccolor(Int16T);
Int16T              strstrip(char *, char *);
void        grfInterchange2(Int32T, Int32T, Rect *);
void        EraseRect2(Rect *);
void        PutSnipT(char *, Rect *);

/* Local variables */
static Rect close_rect = {121,403,130,412};          /* Close Box */
static Rect agross_rect = {168,140,185,405};  /* Annual Gross Income */
static Rect nexempt_rect = {191,140,208,405};       /* # of exemptions */
static Rect deduct_rect = {214,140,230,405};  /* deductions */
static Rect fstatus_rect = {237,140,253,405};  /* filing status */
static Rect res_rect = {260,140,276,405};             /* place of residence */

/* Global Script Variables we play with */
#define OUR_HUE 37
Who knows ? */
#define INPUT_WIDTH 10



/* More Local variables */
static char hold_gi[VAR_MAXVARLEN];
static char hold_td[VAR_MAXVARLEN];
static Boolean two_s;

void taxCalcSetup( void )
{
      Point lp;
      char  temp[32];
      Handle      hSnip;

      /* Save copy of Gross Income */
      strcpy(hold_gi,varPtr(vGrossIncome));
      strcpy(hold_td,"0");

      /* Init some Variables if they haven't been */
      if (strlen(varPtr(taxFstatus))==0) {
            if (*varPtr(vMaritalB)=='0') {
                  strcpy(varPtr(taxFstatus),"Single");
            } else {
```

BEST AVAILABLE COPY

```
            strcpy(varPtr(taxFstatus),"Joint");
        }
    }

    if (strlen(varPtr(taxNexempt))==0) strcpy(varPtr(taxNexempt),"1");

    if (strlen(varPtr(taxRes))==0) strcpy(varPtr(taxRes),"New York");

    /* Two screens ? */
    two_s = tglNumVisibleScreens == 2;

    PutSnipT("blank tax.s", NULL);

    /* Text */
    taxcalccolor(OUR_HUE);

    /* Default values */
    ip = topLeft(agross_rect);
    ip.h += 147; ip.v += 13;
    MoveTo2(ip.h, ip.v);
    formatNumber(temp,varPtr(vGrossIncome),INPUT_WIDTH,TRUE,0,FALSE,' ',TRUE,
    drawstring2(temp);
    ip = topLeft(nexempt_rect);
    ip.h += 147; ip.v += 13;
    MoveTo2(ip.h, ip.v);
    drawstring2(varPtr(taxNexempt));
    ip = topLeft(deduct_rect);
    ip.h += 147; ip.v += 13;
    MoveTo2(ip.h, ip.v);
    drawstring2(varPtr(taxDeduct));
    ip = topLeft(fstatus_rect);
    ip.h += 147; ip.v += 12;
    MoveTo2(ip.h, ip.v);
    drawstring2(varPtr(taxFstatus));
    ip = topLeft(res_rect);
    ip.h += 147; ip.v += 12;
    MoveTo2(ip.h, ip.v);
    drawstring2(varPtr(taxRes));
    tax_rate();
}


Boolean taxCalcMouseDown( Point where )
{
    Rect  ar;
    Point ip;


    /*
     * point in close box
     */
    if (PtInRect(where, &close_rect)) {

        tchBeepNow(TCH_GOOD_BEEP);
        return (TRUE);
    }


    /*
     * point in Gross Income box
     */
    else if (PtInRect(where, &agross_rect)) {

        tglCursorOnOff(TGL_OFF);
        tax_rate();
        taxcalccolor(OUR_HUE);
```

```
            ar = agross_rect;
            ar.top -= 2; ar.right -= 130;
            grfInterchange2(246L, 255L, &ar);
            grfInterchange2(7L, 254L, &ar);
            tchBeepNow(TCH_GOOD_BEEP);
            grfInterchange2(255L, 246L, &ar);
            grfInterchange2(254L, 7L, &ar);
            tglCursorOnOff(TGL_ON);
            ip = topLeft(agross_rect);
            ip.h += 147; ip.v += 12;
            ar = agross_rect;
            ar.left += 146; ar.top++; ar.bottom--;

            /*
             * set up the edit gopher
             */
            edtEditLen = INPUT_WIDTH;
            tglEditGopher->StartHandler();
            tglEditGopher->EditSetup(ip,varPtr(vGrossIncome),TRUE,vGrossIncome,tw(
INPUT_WIDTH, 0,
                    FALSE, FALSE, '$', &ar);

        }


        /*
         * point in number of exemptions box
         */
        else if (PtInRect(where, &nexempt_rect)) {

            tglCursorOnOff(TGL_OFF);
            tax_rate();
            taxcalccolor(OUR_HUE);
            ar = nexempt_rect;
            ar.top -= 2; ar.right -= 130;
            grfInterchange2(2L, 255L, &ar);
            grfInterchange2(246L, 254L, &ar);
            tchBeepNow(TCH_GOOD_BEEP);
            grfInterchange2(255L, 2L, &ar);
            grfInterchange2(254L, 246L, &ar);
            tglCursorOnOff(TGL_ON);
            ip = topLeft(nexempt_rect);
            ip.h += 147; ip.v += 12;
            ar = nexempt_rect;
            ar.left += 146; ar.top++; ar.bottom--;

            /*
             * set up edit gopher
             */
            edtEditLen = 2;
            tglEditGopher->StartHandler();
            tglEditGopher->EditSetup(ip,varPtr(taxNexempt),TRUE,taxNexempt,two_s,
FALSE, FALSE, '\0', &ar);

    }


    /*
     * point in deduction box
     */
        else if (PtInRect(where, &deduct_rect)) {

            tglCursorOnOff(TGL_OFF);
            tax_rate();
            taxcalccolor(OUR_HUE);
    ar = deduct_rect;
    ar.top -= 2; ar.right -= 130;
            grfInterchange2(73L, 255L, &ar);
```

```
        grfInterchange2(246L, 254L, &ar);
        tchBeepNow(TCH_GOOD_BEEP);
        grfInterchange2(255L, 73L, &ar);
        grfInterchange2(254L, 246L, &ar);
        tglCursorOnOff(TGL_ON);


        /*
         * standard deduction
         */
        if (strcmp(varPtr(taxDeduct),"Standard")==0) {
                strcpy(varPtr(taxDeduct),hold_td);
    ip = topLeft(deduct_rect);
        ip.h += 147; ip.v += 12;
    ar = deduct_rect;
    ar.left += 146; ar.top++; ar.bottom--;


                /*
                 * set up edit gopher
                 */
                edtEditLen = INPUT_WIDTH;
                tglEditGopher->StartHandler();
                tglEditGopher->EditSetup(ip,varPtr(taxDeduct),TRUE,taxDeduct,two_
INPUT_WIDTH, 0, FALSE, FALSE, '$', &ar);
        }


        /*
         * itemized deduction
         */
        else {

                strcpy(hold_td,varPtr(taxDeduct));
                taxcalccolor(OUR_HUE);
        ar = deduct_rect;
        ar.left += 147; ar.top += 3;
                EraseRect2(&ar);
                strcpy(varPtr(taxDeduct),"Standard");
                ip = topLeft(deduct_rect);
                ip.h += 147; ip.v += 12;
                MoveTo2(ip.h, ip.v);
                drawstring2(varPtr(taxDeduct));
                tax_rate();
        }
    }


 /*
  * filing status box
  */
    else if (PtInRect(where, &fstatus_rect)) {

        tglCursorOnOff(TGL_OFF);
        tax_rate();
   ar = fstatus_rect;
   ar.top -= 2; ar.right -= 130;
        grfInterchange2(8L, 255L, &ar);
        grfInterchange2(246L, 254L, &ar);
        tchBeepNow(TCH_GOOD_BEEP);
        grfInterchange2(255L, 8L, &ar);
        grfInterchange2(254L, 246L, &ar);
        tglCursorOnOff(TGL_ON);
        taxcalccolor(OUR_HUE);
    ar = fstatus_rect;
    ar.left += 147; ar.top += 3;
        EraseRect2(&ar);
        switch (varPtr(taxFstatus)[1]) {
```

BEST AVAILABLE COPY

```
                case 'l': strcpy(varPtr(taxFstatus),"Joint"); break;
                case 'o': strcpy(varPtr(taxFstatus),"Separate"); break;
                case 'e': strcpy(varPtr(taxFstatus),"Hd. of Household"); break;
                case 'd': strcpy(varPtr(taxFstatus),"Single"); break;
            }
            ip = topLeft(fstatus_rect);
            ip.h += 147; ip.v += 12;
            MoveTo2(ip.h, ip.v);
            drawstring2(varPtr(taxFstatus));
            tax_rate();
        }

    /*
     * result box
     */
        else if (PtInRect(where, &res_rect)) {

            tglCursorOnOff(TGL_OFF);
            tax_rate();
      ar = res_rect;
      ar.top -= 2; ar.right -= 130;
            grfInterchange2(114L, 255L, &ar);
            grfInterchange2(246L, 254L, &ar);
            tchBeepNow(TCH_GOOD_BEEP);
            grfInterchange2(255L, 114L, &ar);
            grfInterchange2(254L, 246L, &ar);
            tglCursorOnOff(TGL_ON);
            taxcalccolor(OUR_HUE);
        ar = res_rect;
        ar.left += 147; ar.top += 3;
            EraseRect2(&ar);
            switch (varPtr(taxRes)[8]) {
                case '\0': strcpy(varPtr(taxRes),"New York City"); break;
                case ' ': strcpy(varPtr(taxRes),"New York"); break;
            }
            ip = topLeft(res_rect);
            ip.h += 147; ip.v += 12;
            MoveTo2(ip.h, ip.v);
            drawstring2(varPtr(taxRes));
            tax_rate();
        }


        /*
         * valid touch outside calculator kills calculator
         */
        else if ( tchValidTouch ( &where )) {

            tchBeepNow(TCH_GOOD_BEEP);
            return (TRUE);
        }


        /*
         * any other point is bad
         */
        else {

            tchBeepNow(TCH_BAD_BEEP);
        }

        return (FALSE);
}

Boolean taxCalcKeyDown( EventRecord theEvent )
{
```

wrkScrnBuffer.c

```
	char	key;

	key = theEvent.message;
	if	(key == '\n' || key == 0x0D ) {
		tax_rate();
		taxcalccolor(OUR_HUE);
		return (TRUE);
	}

	return (FALSE);
}


void taxCalcCleanup( void )
{
	Handle		hSnip;

	strcpy(varPtr(vGrossIncome), hold_gi);
	hSnip = libFindPicPtr("blank tax.s", TRUE);
	HPurge(hSnip);
	scrRestoreColors();

}


Real80T tax_rate()
{
	Real80T fed_tax, state_tax, city_tax, tax, taxable;
	Rect r;
	char temp[40];

	strcpy(temp, varPtr(vGrossIncome));
	strstrip(temp,"$,");
	taxable = varAtof(temp);

	if (varPtr(taxDeduct)[0]=='S' || varPtr(taxDeduct)[0]=='s') {
		/* Standard deduction */
	  switch (varPtr(taxFstatus)[1]) {
		case 'i': taxable -= 3100.; break;
		case 'o': taxable -= 5200.; break;
		case 'e': taxable -= 2600.; break;
		case 'd': taxable -= 4550.; break;
	  }
	} else {
		/* What you said */
		strcpy(temp, varPtr(taxDeduct));
		strstrip(temp,"$,");
		taxable -= varAtof(temp);
	}
	taxable -= varValF(taxNexempt)		* 2000.;

	fed_tax = state_tax = city_tax = 0.0;
	switch (varPtr(taxFstatus)[1]) {
		/* Single */
	  case 'i':
			if (taxable <= 33400.) {
				fed_tax = 0.15;
				state_tax = 0.063;
			if (varPtr(taxRes)[8] == ' ') city_tax = 0.029;
		} else if (taxable <= 72750.) {
				fed_tax = 0.28;
				state_tax = 0.074;
			if (varPtr(taxRes)[8] == ' ') city_tax = 0.03;
		} else if (taxable <= 137360.) {
				fed_tax = 0.33;
				state_tax = 0.079;
			if (varPtr(taxRes)[8] == ' ') city_tax = 0.031;
		} else {
```

```
                fed_tax = 0.28;
                state_tax = 0.086;
            if (varPtr(taxRes)[8] == ' ') city_tax = 0.033;
            }
        break;
    /* Joint Married */
    case 'o':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    /* Seperate Married */
    case 'e':
            if (taxable <= 20075.) {
                fed_tax = 0.15;
                state_tax = 0.063;
            if (varPtr(taxRes)[8] == ' ') city_tax = 0.029;
        } else if (taxable <= 42025.) {
                fed_tax = 0.28;
                state_tax = 0.074;
            if (varPtr(taxRes)[8] == ' ') city_tax = 0.03;
        } else if (taxable <= 122495.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    /* Head of Household */
    case 'd':
            if (taxable <= 42150.) {
                fed_tax = 0.15;
                state_tax = 0.063;
            if (varPtr(taxRes)[8] == ' ') city_tax = 0.029;
        } else if (taxable <= 86050.) {
                fed_tax = 0.28;
                state_tax = 0.074;
            if (varPtr(taxRes)[8] == ' ') city_tax = 0.03;
        } else if (taxable <= 166520.) {
                fed_tax = 0.33;
                state_tax = 0.079;
            if (varPtr(taxRes)[8] == ' ') city_tax = 0.031;
        } else {
                fed_tax = 0.28;
                state_tax = 0.086;
            if (varPtr(taxRes)[8] == ' ') city_tax = 0.033;
            }
        break;
    default:
            fed_tax = 0.28;
            state_tax = 0.079;
```

```
                if (varPtr(taxRes)[8] == ' ') city_tax = 0.031.
                break;
        }

        tax = fed_tax + state_tax + city_tax;

        /* Show Rate */
        for (scrScreenSet(0, 1); scrScreenSet(1, 1); ) {
                TextFont(3);
                TextSize(12);
                TextFace(bold);
                RGBForeColor(&tglRgbWhite);
                RGBBackColor(&tglRgbBlack);
                r.top = 145; r.left = 357; r.bottom = 160; r.right = 398;
                EraseRect(&r);
        }
        sprintf(temp,"%2.0lf%%",tax*100.0);
        sprintf(varPtr(taxRate),"%2.0lf",tax*100.0);
        MoveTo2(365,157);
        drawstring2(temp);

        for (scrScreenSet(0, 1); scrScreenSet(1, 1); ) {
                scrSetHue(OUR_HUE, &tglTextFont, &tglTextSize, &tglTextFace,
                                        &tglTextFGColor, &tglTextBGColor);
        }
        scrSetHueNow2(OUR_HUE);
        return tax;
}

static void    taxcalccolor(hue)
Int16T hue;
{
        for (scrScreenSet(0, 1); scrScreenSet(1, 1); ) {
                tglTextFont = 3;
                tglTextSize = 12;
                tglTextFace = normal;
                TGL_SETRGB(tglTextFGColor, 13107, 13107, 39321);
                TGL_SETRGB(tglTextBGColor, 48059, 48059, 48059);

                TextFont(tglTextFont);
                TextSize(tglTextSize);
                TextFace(tglTextFace);
                RGBForeColor(&tglTextFGColor);
                RGBBackColor(&tglTextBGColor );
        }
}

Int16T strstrip(s, rid)
char *s;                                        /* The string to str
char *rid;                                  /* Chars to get rid of */
{
        Int16T i,n,count;
        char *t;

        count=0;
        n = strlen(rid);
        t=s;
        do {
                for (i=0; i<n; i++) {
                        if (*s==rid[i]) {
                                count++;
                                s++;
                                goto cont_do;
                        }
                }
                *t++ = *s++;
                cont_do: ;
        } while ( *(s-1) != '\0');
```

```
        return count;
}

void grfInterchange2(cf, ct, r)
Int32T cf,ct;
Rect *r;
{
        Rect lr;

        lr = *r;
        for (scrScreenSet(0, 1); scrScreenSet(1, 1); ) {
                grfInterchange(cf, ct, &lr);
        }
}

void EraseRect2(r)
Rect *r;
{
        for (scrScreenSet(0, 1); scrScreenSet(1, 1); ) {
                EraseRect(r);
        }
}

void PutSnipT(name, r)
char *name;                                          /* Snip
Rect *r;                                             /* Opt
*/
{
        Handle hSnip;
        Rect theRect;
        Point  p;

        hSnip= libFindPicPtr( name, TRUE );
        libGetPicRect(hSnip, &theRect);
        p = topLeft(theRect);
        for (scrScreenSet(0, 1); scrScreenSet(1, 1); ) {
                grfMDrawPic(hSnip, &p, 0);
        }
        if (r != NULL) *r = theRect;
}


void MoveTo2(h, v)
Int16T h, v;
{
        for (scrScreenSet(0, 1); scrScreenSet(1, 1); ) {
                MoveTo(h, v);
        }
}

void drawstring2(s)
char *s;
{
        for (scrScreenSet(0, 1); scrScreenSet(1, 1); ) {
                drawstring(s);
        }
}

void scrSetHueNow2(h)
Int16T h;
{
        for (scrScreenSet(0, 1); scrScreenSet(1, 1); ) {
                scrSetHueNow(h);
        }
}
```

wrkScrnBuffer.c

BEST AVAILABLE COPY

BSCAN HEADER FILES

Copyright 1991 Citibank, N.A.
As an unpublished work.
All Rights Reserved.

BEST AVAILABLE COPY

```
void    atfSmearInit( void );
void    atfMortgageUFF( void );
void    atfCollegeUFF( void );
void    atfRecalcEarmark( void );
void    atfDataCapture( void );
Real80T atfRound100( Real80T num );
```

atfMisc.h

BEST AVAILABLE COPY

```
/*
 * bar charting functions
 */

void    barDrawRange( Int32T xBase, Int32T yBase, Int32T pixScale, Int32T
Real80T hiValue, Real80T midValue, Real80T loValue );
void    barDrawRange2( Int32T xBase, Int32T yBase, Int32T pixScale, Int32
Real80T hiValue, Real80T midValue, Real80T loValue );
Int32T barLoadData( Int32T period );
Int32T barDoHPGraph( void );
Int32T barDoHPCmpGraph( void );
```

barChart.h

BEST AVAILABLE COPY

```
/* header file for bigPlot.c */

/* externally visible functions */
void bigChart ( void );
void bigInfo ( void );
void bigAltAllocate ( void );
```

BEST AVAILABLE COPY

```
void bioReadLibrary( void );
void bioWriteLibrary( void );
```

bioBuildIO.h

```
void    bldOpenLibrary( void );
void    bldViewSnip( void );
void    bldCreateNewLibrary( char *name );
void    bldNewLibrary( void );
void    bldAddSnipToLibrary( char *name );
void    bldAddSnip( void );
void    bldDeleteSnip( void );
void    bldWriteLibrary( void );
Boolean         bldGetFileName( SFReply *fileReply, SFTypeList fileType );
void    bldOpenTempFile( Int16PT libRefNumP );
void    bldRenameTempFile( char *name );
void    bldDumpLibrary( void );
```

BEST AVAILABLE COPY

```
#ifndef CASCANEH
#define CASCANEH

#include "CEventHandler.h"

struct CAscanEH: CEventHandler {

        void IAscanEH( void );
        void StartHandler( void );
        void TurningMyselfOff( CEventHandler *whoAmI );
        Boolean KeyDown( EventRecord myEvent );
        Boolean DoCommand( Int16T menuId, Int16T menuItem, Int32T mo

};

#endif
```

CAscanEH.h

BEST AVAILABLE COPY

```
#ifndef CATCALCEH
#define CATCALCEH

#include "CEventHandler.h"

struct CATCalcEH: CEventHandler {

        void    IATCalcEH( void );
        void    StartHandler( void );
        void    StopHandler( void );
        Boolean KeyDown( EventRecord myEvent );
        Boolean MouseDown( Point where, Int32T modifiers );

};

#endif
```

CATCalcEH.h

BEST AVAILABLE COPY

```
#ifndef CCLICKEH
#define CCLICKEH

#include "CEventHandler.h"

struct CClickEH: CEventHandler {

	void		IClickEH( void );
	Boolean		MouseDown( Point where, Int32T modifiers );
	Boolean		KeyDown( EventRecord myEvent );

};

#endif
```

CClickEH.h

BEST AVAILABLE COPY

```
#ifndef CCURSIVEEH
#define CCURSIVEEH

#include "CEventHandler.h"

struct CCursiveEH: CEventHandler {

        Boolean         PenDown;
        Point   MousePoint;


        void    ICursiveEH( void );
        void    StartHandler( void );
        Boolean         EveryCycle( void );
        Boolean MouseUp( Point where, Int32T modifiers );

};

#endif
```

CCursiveEH.h

```
#ifndef CEDITEH
#define CEDITEH

#include "CEventHandler.h"

struct CEditEH: CEventHandler {


        void            IEditEH( void );
        void            EditSetup( Point tgt, char *iniText, Boolean useForm
varNum, Boolean secondScreen,
                                        char justify, Boolean commas, Boolea
Int32T length, Int32T decimals,
                                        Boolean forceLength, Boolean force
floatingID, Rect *EditRect );
        Boolean         KeyDown( EventRecord myEvent );
        Boolean         MouseDown( Point where, Int32T modifiers );
        Boolean                 EveryCycle( void );

};

#endif
```

BEST AVAILABLE COPY

```
#ifndef CEVENTHANDLER
#define CEVENTHANDLER

struct CEventHandler: indirect {

        CEventHandler        *itsSupervisor;

        void    IEventHandler( void );
        void    Cleanup( void );
        void    StartHandler( void );
        void    StopHandler( void );
        void    TurningMyselfOff( CEventHandler *whoAmI );
        void    Suspend( void );
        void    Resume( void );

        Boolean MouseDown( Point where, Int32T modifiers );
        Boolean MouseUp( Point where, Int32T modifiers );
        Boolean KeyDown( EventRecord myEvent );
        Boolean DoCommand( Int16T menuId, Int16T menuItem, Int32T mc
        Boolean Idle( void );
        Boolean EveryCycle( void );


        void    Draw( void );

};

#endif
```

BEST AVAILABLE COPY

```
/* header file for calculator */

void    clcShowVal( void );
void    clcShowNumPad( Int32T calcVar );
void    clcActivateNumPad( void );
BooleanT clcNumPad( void );

void    clcPhoneShowVal( void);
void    clcShowPhonePad( Int32T varNum );
void    clcActivatePhonePad( void );
BooleanT clcPhonePad( void );


void    clcATShowNumPad( void );
void    clcATActivateNumPad( void );
Boolean clcATNumPad( char key );


/* calculator defines */
#define     INACTIVE    0xFFF
#define     NEXT        0xFFE
#define PREVIOUS    0xFFD
#define     STARTOVER   0xFFC
#define     ABORT               0xFFB
#define CLEAR               0xFFA
```

ClcCalculator.h

- Int32T cmmConstraintAlloc( Real80PT pBank, Real80PT pMmf, Real80PT p!
Real80PT pGrowth );

BEST AVAILABLE COPY cmmMinMax.h

```
Int32T          cmpCompress4( PixMap **h_src, libSQZPictPT sqz, Rect *pRe
Int32T          cmpFastCompress4( PixMap **h_src, libSQZPictPT sqz, Rect '
void            cmpExpand4( libSQZPictPT sqz, PixMap **h_dst, Rect *pRec
```

BEST AVAILABLE COPY cmpCompress.h

BEST AVAILABLE COPY

```
/*
 * Header file for control structure code
 */

void conInit ( void );
BooleanT conExecute ( char *line );
void con_AtomFormattedInput( char *line, Int16T *offset );
void con_AtomDisplayAround2 ( char *line, Int16T *offset );

void conSetUpTextAttributes ( void );
void conFixTextAttributes ( void );

void conRememberChileBadTouch ( void );

/* defines */
#define REMEMBER_CHILE_FILENAME          "Chile Events"
#define REMEMBER_CLIENT_FILENAME      "Chile Clients"
#define REMEMBER_WHAT_IF_FILENAME     "Chile What Ifs"

#define CONTEXT
#ifdef CONTEXT

        #define                          CON_MAX_HISTORY_LINES
        #define                          CON_HISTORY_LINE_LENGTH
        typedef char
        conHistoryT[CON_MAX_HISTORY_LINES][CON_HISTORY_LINE_LEN(
        typedef conHistoryT   *conHistoryPT;
        extern Int32T         conCurrentHistoryLine;
        extern Boolean                conHistorySpillOver;
        extern conHistoryPT   conHistoryP;

#endif
```

control.h

```
#ifndef CPAUSEEH
#define CPAUSEEH

#include "CEventHandler.h"

struct CPauseEH: CEventHandler {

        void    IPauseEH( void );
        void    StartHandler( void );
        void    StopHandler( void );
        Boolean KeyDown( EventRecord myEvent );
        Boolean MouseDown( Point where, Int32T modifiers );
        Boolean DoCommand( Int16T menuId, Int16T menuItem, Int32T mo

};

#endif
```

BEST AVAILABLE COPY

CPauseEH.h

BEST AVAILABLE COPY

```
#ifndef CSCANEH
#define CSCANEH

#include "CEventHandler.h"

struct CScanEH: CEventHandler {

        Boolean itUnderstandsCommandKeys;

        void    SetSingleStep( Boolean on );
        void    SetCmdKeys( Boolean on );
        void    Suspend( void );
        void    Resume( void );


        void    IScanEH( void );
        void    StartHandler( void );
        void    StopHandler( void );
        void    TurningMyselfOff( CEventHandler *whoAmI );
        Boolean MouseDown( Point where, Int32T modifiers );
        Boolean KeyDown( EventRecord myEvent );
        Boolean DoCommand( Int16T menuId, Int16T menuItem, Int32T mo
        Boolean Idle( void );
        void    Draw( void );


};

#endif
```

```
#ifndef CSNIPDEFINEEH
#define CSNIPDEFINEEH

#include "CEventHandler.h"

struct CSnipDefineEH: CEventHandler {

        void    ISnipDefineEH( void );
        void    StartHandler( void );
        void    StopHandler( void );
        Boolean MouseDown( Point where, Int32T modifiers );
        Boolean MouseUp( Point where, Int32T modifiers );
        Boolean EveryCycle( void );

};

#endif
```

BEST AVAILABLE COPY

CSnipDefineEH.h

```
#ifndef CSNIPDRAGEH
#define CSNIPDRAGEH

#include "CEventHandler.h"

struct CSnipDragEH: CEventHandler {

        void    ISnipDragEH( void );
        void    StartHandler( void );
        void    StopHandler( void );
        Boolean MouseDown( Point where, Int32T modifiers );
        Boolean MouseUp( Point where, Int32T modifiers );
        Boolean EveryCycle( void );


};

#endif
```

BEST AVAILABLE COPY

CSnipDragEH.h

BEST AVAILABLE COPY

```
#ifndef CSNIPEH
#define CSNIPEH

#include "CEventHandler.h"
#include "CSnipDefineEH.h"
#include "CSnipDragEH.h"

struct CSnipEH: CEventHandler {

        void    ISnipEH( void );
        void    StartHandler( void );
        void    StopHandler( void );
        Boolean MouseDown( Point where, Int32T modifiers );
        Boolean KeyDown( EventRecord myEvent );
        Boolean DoCommand( Int16T menuId, Int16T menuItem, Int32T mo
        void    Draw( void );
        Boolean EveryCycle( void );

};

#endif
```

CSnipEH.h

BEST AVAILABLE COPY

```
#ifndef CTAXCALCEH
#define CTAXCALCEH

#include "CEventHandler.h"
#include "taxCalc.h"

struct CTaxCalcEH: CEventHandler {

        void        ITaxCalcEH( void );
        void        StartHandler( void );
        void        StopHandler( void );
        void        TurningMyselfOff( CEventHandler *whoAmI );
        Boolean     KeyDown( EventRecord myEvent );
        Boolean     MouseDown( Point where, Int32T modifiers );

};

#endif
```

CTaxCalcEH.h

```
#ifndef CTEXTEDITEH
#define CTEXTEDITEH

#include "standard.h"
#include "CEventHandler.h"
```

BEST AVAILABLE COPY

```
#define     CSR_NOTES_BLOCK         0           /* first block i

#define     TXT_MAX_TEXT_BLOCKS     11              /* CSR
#define     TXT_MAX_TEXT_SIZE       5000        /* characters

#define     CSR_VIEW_SNIP           "edit csr view"
#define     CSR_DOWN_SNIP           "edit csr down"
#define     CSR_UP_SNIP             "edit csr up"
#define     CSR_HI_UP_SNIP          "edit csr up high"
#define     CSR_HI_DOWN_SNIP   "edit csr down high"
#define     CSR_THUMB_AREA_SNIP     "edit csr thumb area"
#define     CSR_THUMB_SNIP          "edit csr thumb"

#define     NOTE_VIEW_SNIP          "n.edit.note.view.s"
#define     NOTE_DOWN_SNIP          "n.edit.note.down.s"
#define     NOTE_UP_SNIP            "n.edit.note.up.s"
#define     NOTE_HI_UP_SNIP         "n.edit.note.up.high.s"
#define     NOTE_HI_DOWN_SNIP       "n.edit.note.down.high.s"

typedef struct
        {
        Rect                destRect;
        Int16T      selPoint;
        Handle              content;
        } EditBlock;

struct CTextEditEH: CEventHandler {

/*      ________________________________________________
______________________________________

        Instance Variables
        ________________________________________________
______________________________________ */

        EditBlock           textBlocks [TXT_MAX_TEXT_BLOCKS];
of note pads + info */

        Boolean             itsScrollable;                  /* shou
editor be scrollable? */
        Int16T      itsLineHeight;                  /* current sing
*/
        Int32T      itsTotalHeight;                     /* tota
pixels of all lines */

        Handle              itsUpSnip;
        Handle              itsDownSnip;
        Handle              itsUpHighSnip;
        Handle              itsDownHighSnip;
        Handle              itsThumbAreaSnip;
        Handle              itsThumbSnip;
```

BEST AVAILABLE COPY

```
        Rect            itsUpSnipRect;
        Rect            itsDownSnipRect;
        Rect            itsThumbAreaSnipRect;
        Rect            itsThumbSnipRect;
        Rect            itsViewRect;

        EditBlock       *itsText;
        TEHandle        itsTERec;

        Boolean         ValidNextEvent;
        Point           TheNextEventPoint;

/*      ________________________________________________
______________________________________
        Class Methods
        ________________________________________________
______________________________________ */

        void            ITextEditEH( void );
        void            StartHandler( void );
        void            StopHandler( void );
        Boolean         KeyDown( EventRecord theEvent );
        Boolean         MouseDown( Point where, Int32T modifiers
        Boolean         EveryCycle( void );
        void            FirstLine ( char *dest, Int16T blockNum , Int
        void            UpdateThumb ( void );
        void            Setup(void);
        void            CSRNotes(void);
        void            EditNoteNum ( Int16T noteNum );
        void            Cleanup( void );
        void            ClearBlocks ( void );
        EditBlock       *GetEditBlock(Int16T blockNum);
        Handle          GetText (Int16T blockNum);

};


#endif
```

BEST AVAILABLE COPY

```
#ifndef CTIMEDCLICKEH
#define CTIMEDCLICKEH

#include "CEventHandler.h"

struct CTimedClickEH: CEventHandler {

        char        *itsLabel;
        Int32T      itsTimeout;
        Int32T      itsDuration;

        void        ITimedClickEH( void );
        void        TurningMyselfOff( CEventHandler *whoAmI );
        void        SetTimeout( char *label, Int32T tenths );
        Boolean     MouseDown( Point where, Int32T modifiers );
        Boolean             EveryCycle( void );
        Boolean     KeyDown( EventRecord myEvent );

};

#endif
```

CTimedClickEH.h

BEST AVAILABLE COPY

```
#ifndef CWAITEH
#define CWAITEH

#include "CEventHandler.h"

struct CWaitEH: CEventHandler {

	Int32T	itsTimeout;


	void	IWaitEH( void );
	void	SetTimeout( Int32T tenths );
	Boolean		EveryCycle( void );
	Boolean		MouseDown( Point where, Int32T modifiers );

};

#endif
```

CWaitEH.h

```
/*
 *          dataStructures.h
 */


/*----------------------------------------------------------
 *
 *                                          Constants
 *
 ----------------------------------------------------------*/
#define         DAT_STACK_SIZE        100

/*----------------------------------------------------------
 *
 *                                          Types
 *
 ----------------------------------------------------------*/
typedef struct  DAT_PTR_STACK
        {
        Int32T top;
        Int32T start;
        Int32T numItems;
        void *(stack[ DAT_STACK_SIZE ] );
        } DatPointerStack;

typedef struct  DAT_INT16_STACK
        {
        Int32T top;
        Int32T start;
        Int32T numItems;
        Int16T (stack[ DAT_STACK_SIZE ] );
        } DatInt16Stack;

/*----------------------------------------------------------
 *
 *                                          Function Prototypes
 *
 ----------------------------------------------------------*/
Int32T datPtrNumItems ( DatPointerStack *pStack );
void datPtrInit ( DatPointerStack *pStack );
void    datPtrPush ( DatPointerStack *pStack, char *ptr );
void    *datPtrPop ( DatPointerStack *pStack );

Int32T datInt16NumItems ( DatInt16Stack *pStack );
void datInt16Init ( DatInt16Stack *pStack );
void    datInt16Push ( DatInt16Stack *pStack, Int16T );
Int16T datInt16Pop ( DatInt16Stack *pStack );
```

```
Boolean dlgSelectByDialog( CharsHandle namesH, char *label, Int32T num
listOnly, char *result, Int32PT numberP);
```

BEST AVAILABLE COPY dlgDialog.h

BEST AVAILABLE COPY

```
/*
 * edit.h
 */


#ifdef EXT
#undef EXT
#endif
#ifdef EQUALS
#undef EQUALS
#endif

#ifdef EXTGEN
        #define     EXT    /* */
        #define     EQUALS( X )        = X
#else
        #define     EXT    extern
        #define     EQUALS( X )        /* */
#endif


/*------------------------------------------
 *
 *          VARIABLES
 *
 *------------------------------------------*/
EXT TEHandle        edtHEdit;
EXT Int32T          edtEditLen                  EQUALS( 0 );
EXT Int32T          edtEditWidth;
EXT Rect            edtEditRect;
EXT Int32T          edtEditVar;
EXT Int16T          edtEditBaseLine;


/* function prototypes */
void edtEditSetup(     Point tgt, char *iniText, Boolean useFormat, Int32T
Boolean secondScreen,
        char justify, Boolean commas, Boolean euroStyle, Int32T length, Int
        Boolean forceLength, Boolean forceDecimals, char floatingID, Rect
Int32T edtEditAction( char key );
void    edtEditAlt ( void );
```

BEST AVAILABLE COPY

```
/* Err Handler Include File */

#ifndef ERRHANDLERH

#define ERRHANDLERH 1

/* Prototypes */
void errEval(void);
void errEvalString(char *input);

#endif
```

errHandler.h

BEST AVAILABLE COPY

```
#ifdef EXT
#undef EXT
#undef EQUALS
#undef EQUALS_2
#undef EQUALS_3
#endif

#ifdef EXTGEN
	#define	EXT	/* */
	#define EQUALS( X )		= X
	#define EQUALS_2( X, Y )		= { X, Y }
	#define EQUALS_3( X, Y, Z )	= { X, Y, Z }
#else
	#define	EXT	extern
	#define EQUALS( X )		/* */
	#define EQUALS_2( X, Y )		/* */
	#define EQUALS_3( X, Y, Z )	/* */
#endif


#ifndef CEVENTHANDLER
#include "CEventHandler.h"
#endif


#ifndef CASCANEH
#include "CAscanEH.h"
#endif


#ifndef CSCANEH
#include "CScanEH.h"
#endif


#ifndef CSNIPEH
#include "CSnipEH.h"
#endif


#ifndef CSNIPDEFINEEH
#include "CSnipDefineEH.h"
#endif


#ifndef CSNIPDRAGEH
#include "CSnipDragEH.h"
#endif


#ifndef		CPAUSEEH
#include "CPauseEH.h"
#endif


#ifndef CWAITEH
#include "CWaitEH.h"
#endif
```

EventHandlers.h

BEST AVAILABLE COPY

```
#ifndef CCURSIVEEH
#include "CCursiveEH.h"
#endif

#ifndef CATCALCEH
#include "CATCalcEH.h"
#endif

#ifndef CEDITEH
#include "CEditEH.h"
#endif

#ifndef CTEXTEDITEH
#include "CTextEditEH.h"
#endif

#ifndef CTAXCALCEH
#include "CTaxCalcEH.h"
#endif

#ifndef CCLICKEH
#include "CClickEH.h"
#endif

#ifndef CTIMEDCLICKEH
#include "CTimedClickEH.h"
#endif

#ifndef CCHILECALCEH
#include "CChileCalcEH.h"
#endif

#ifndef CPHONEEH
#include "CPhoneEH.h"
#endif

EXT CEventHandler        *tglGopher                EQUALS( N
EXT CAscanEH                   *tglAscanGopher            EQ(
);
EXT CScanEH                    *tglScanGopher             EQ(
);
EXT CSnipEH                    *tglSnipGopher             EQ(
);
EXT CSnipDefineEH        *tglSnipDefineGopher      EQUALS( NULL );
EXT CSnipDragEH                *tglSnipDragGopher     EQUALS( N
EXT CPauseEH                   *tglPauseGopher            EQ(
);
```

EventHandlers.h

```
EXT CWaitEH                 *tglWaitGopher                EQU
);
EXT CCursiveEH              *tglCursiveGopher          EQUALS( N
EXT CATCalcEH               *tglATCalcGopher           EQUALS( N
EXT CTaxCalcEH              *tglTaxCalcGopher          EQUALS( N
EXT CEditEH                 *tglEditGopher                EQU
);
EXT CTextEditEH             *tglTextEditGopher         EQUALS( N
EXT CClickEH           *tglClickGopher                 EQUALS( N
EXT CTimedClickEH      *tglTimedClickGopher       EQUALS( NULL );
EXT CChileCalcEH       *tglChileCalcGopher        EQUALS( NULL );
EXT CPhoneEH                *tglPhoneGopher               EQU
);
```

BEST AVAILABLE COPY

EventHandlers.h

BEST AVAILABLE COPY

```
#ifndef EXCEXCELREAD_H
#define EXCEXCELREAD_H

#define        EXC_BAD_FILE_ID           -1

typedef Int32T         excFileIdT, *excFileIdPT, **excFileIdHT;


void excOpenFile( char *, excFileIdPT, Boolean useFilter );
void excCloseFile( excFileIdT );
void excLookupCell( excFileIdT, Int32T, Int32T, char * );
Int32T excNumRows( excFileIdT fileId );

#endif
```

excExcelRead.h

BEST AVAILABLE COPY

```
/*    fileAccess.h */

#ifndef     _fileAccess_
#define     _fileAccess_

#define          FILE_DATA_DIR          "Data"
#define          FILE_LIBS_DIR     "Libraries"


char *filePrependDir ( char *buf, char *dirName, char *fileName);
OSErr fileOpenWithPrepend( char *dirName, char *fName, int vRefNum, in

#endif
```

BEST AVAILABLE COPY

```
/*
 *          format header file
 */

void formatNumber (char *to,
                   char *from,
                   Int16T length,
                   BooleanT forceLength,
                   Int16T decimals,
                   BooleanT forceDecimals,
                   char justify,
                 BooleanT commas,
                   BooleanT euroStyle,
                   char floatingID
                   );

void formatDate (char *str);
void formatTime (char *str);
void formatDateTime(char *str);
float   dollar2float ( char *str );
```

format.h

BEST AVAILABLE COPY

```
/*
	COMPILER AND TOOLBOX "GLUE"
*/

/*
	these glue.c (for THINK 4.0) functions take standard C strings and c
Pascal strings
	before passing them off to the Mac toolbox.  They are predefined
libraries;
	the THINK version defines them in glue.c
*/
#ifdef THINK_C
void		drawstring( char * );
Int16T		stringwidth( char * );
CGrafPtr	newcwindow( Ptr, Rect *, char *, BooleanT, Int16T, Windov
Int32T );
BooleanT	ptinrect( Point *, Rect * );
OSErr		fsopen( char *, Int16T, Int16PT );
OSErr		fsdelete ( char *, Int16T );
void		sfgetfile( Point *, char *, ProcPtr, Int16T, SFTypeList, ProcPt
void		sfputfile( Point *, char *, char *, ProcPtr, SFReply * );
OSErr		setvol( char *, Int16T );
OSErr		create( char *, Int16T, OSType, OSType );
OSErr		flushvol( char *, Int16T );
OSErr		getvol( char *, Int16PT );
#endif

/*
	following QuickDraw.h defines are missing from Think's headers
*/
#ifdef THINK_C
	#define normal 0
	#define bold 1
	#define italic 2
	#define underline 4
	#define outline 8
	#define shadow 0x10
	#define condense 0x20
	#define extend 0x40
#endif

/*
	misnamed ANSI function in MPW 3.0
*/
#ifndef THINK_C
	#define		pow	power
#endif

/*
	same functions, different capitalizations in the two compilers
*/
#ifdef THINK_C

	#define p2cstr		PtoCstr
	#define c2pstr		CtoPstr

#else
```

```
#define PtoCstr        p2cstr
#define CtoPstr        c2pstr

#endif
```

BEST AVAILABLE COPY glue.h

BEST AVAILABLE COPY

```
/*
 * File grfGraphics.h
 */

#ifdef EXT
#undef EXT
#endif

#ifdef EXTGEN
      #define       EXT    /* */
#else
      #define       EXT    extern
#endif

/* Global, used by this module and control.c's shadow command: */
/* the Shadow Table of lookup values for each CLUT item */
EXT unsigned char shadowTable[255];

EXT   Handle                  grfHSnip;                  /* utilit
pointer */

void          grfInitPics(void);

void          grfDrawPic( Handle hSnip, Point *target );
void          grfMDrawPicPortion(Handle, Point *, Int32T, Rect); /* JDT *
void          grfEDrawPic( Handle hSnip, Point *target );
void          grfMDrawPic( Handle hSnip, Point *target, Int32T tColorInd
void          grfDissolvePic( Handle hSnip, Point *target, Int32T tColorInc
void          grfFadeout( Handle hSnip, Point *target, Int32T tColorIndex
void          grfFastFadeout( Handle hSnip, Point *target, Int32T tColorIr

void          grfSmear( Handle hSnip, Handle hSnip, Int32T here, Int32T *

void          grfWipeUpPic( Handle hSnip, Point *target, Int32T percent)
void          grfWipeDnPic( Handle hSnip, Point *target, Int32T percent)
void          grfWipeLeftPic( Handle hSnip, Point *target, Int32T percent
void          grfWipeRightPic( Handle hSnip, Point *target, Int32T percer

void          grfDrawDestSrc( PixMapHandle hDestMap, Rect * pRect, Pi
hSrcMap, Point * pTarget );
void          grfAsmDrawDestSrc( PixMapHandle hDestMap, Rect * pRec
PixMapHandle hSrcMap, Point * pTarget );
void          grfMDrawDestSrc( PixMapHandle hDestMap, Rect * pRect,
hSrcMap, Point * pTarget, Int32T tColorIndex );
void          grfDissolveDestSrc( PixMapHandle hDestMap, Rect * pRect,
PixMapHandle hSrcMap, Point * pTarget, Int32T tColorIndex );
void          grfFadeoutDestSrc( PixMapHandle hDestMap, Rect * pRect,
PixMapHandle hSrcMap, Point * pTarget, Int32T tColorIndex, BooleanT fas

void          grfWipeDnDestSrc( PixMapHandle hDestMap, Rect * pRect,
PixMapHandle hSrcMap, Point * pTarget, Int32T percent );
void          grfWipeUpDestSrc( PixMapHandle hDestMap, Rect * pRect,
PixMapHandle hSrcMap, Point * pTarget, Int32T percent );
void          grfWipeLeftDestSrc( PixMapHandle hDestMap, Rect * pRec
PixMapHandle hSrcMap, Point * pTarget, Int32T percent );
void          grfWipeRightDestSrc( PixMapHandle hDestMap, Rect * pRe
PixMapHandle hSrcMap, Point * pTarget, Int32T percent );
```

BEST AVAILABLE COPY

```
void           grfMyCopyBits( PixMapHandle hSourceMap, PixMapHandle
Rect *pSrcRect, Rect *pDestRect);
Int32T         grfSnipToScreen( Handle hScreen, Handle hSnip, Rect *pRe

Int32T         grfGetWipeDelay( void );
void           grfInterchange( Int32T oldSlot, Int32T newSlot, Rect *pRect
void           grfAutoShadow ( Rect *pRect, Int16T offset );
void           grfShadowTableInit( void);
```

grfGraphics.h

BEST AVAILABLE COPY

```
#ifndef HOTSHEET_H
#define HOTSHEET_T

#include "excExcelRead.h"

#define MAX_HOT_DATA_POINTS          50
#define MAX_HOT_NUM_MEASURES         10

#define      HOT_DATA_FILE "Stock.Summaries"
#define HOT_BOND_FILE "Bond.Summaries"
#define GLOSSARY_FILE "Glossary"

/*******************************************************
 * Data points for a single measure in a chart.
 *
 * For simplicity, we assume that there is a fixed maximum
 * number of data points
 *
 *******************************************************
typedef Real80T                  hotDataPointsT[MAX_HOT_DATA_P
typedef hotDataPointsT      *hotDataPointsPT;
typedef hotDataPointsPT     *hotDataPointsHT;

/*******************************************************
 * Data points for all measures in a chart.
 *
 * Since this information is dynamically allocated, it
 * is safe to give it size 1. The real data will possibly
 * be bigger than one, but the typedef still holds.
 *******************************************************
typedef hotDataPointsT      hotChartDataT[1];
typedef hotChartDataT       *hotChartDataPT;
typedef hotChartDataPT      *hotChartDataHT;

Int32T            hotBlksLoad(char *);              /* loads the d
blocks */
char        *hotBlkGet(char *);               /* get pointer to spe
Int32T            hotGetSize(FILE *);               /* get total ch
for data file */
BooleanT      hotDisposBlock( void );           /* release block */
void      hotconvASC_Date(char *);
void          hotLineGraph(
                        Int32T            numMeasures,
                        Int32T            numDataPoints,
                        hotChartDataHT    chartData,
                        Real80T               dataPointHei
                        Rect              boundsRect,
                        Int32T            hues[MAX_HOT_NUM

void          hotSetHue( Int32T *hues, Int32T );
void          hotStripQuotes( char *s );
Real80T       hotLookupAndCalcMax( excFileIdT, Int32T, Int32T, Real80F
void          hotReadUserInputs( Rect      *, Real80T     *, Int32T
hues[MAX_HOT_NUM_MEASURES], Point     * );

void          hotGlossary( char *s );
```

hotSheet.h

BEST AVAILABLE COPY

```
void        hotStockLoad( void *pT, Int32T *pStockIndex );
void    hotStockFind( excFileIdT, char     *, Int32PT, Int32T );
void        hotStockTransform( excFileIdT, hotChartDataHT, Real80PT
void        hotStockInvestSum( void );
void        hotStockProfile( void );
void        hotStockPerformance( void );

void        hotBondLoad ( void    *pT, Int32T *pBondIndex, Real80T *
);
void    hotBondFind( excFileIdT, char     *, Int32PT, Int32T );
void        hotBondTransform( excFileIdT, hotChartDataHT, Real80PT,
void        hotBondInvestSum( void );
void        hotBondProfile( void );
void        hotBondPerformance( void );
void        hotBondGraph(
                Int32T              numMeasures,
                Int32T              numDataPoints,
                hotChartDataHT      chartData,
                Real80T                   maxDataPoin
                Rect                boundsRect,
                Int32T              hues[MAX_HOT_NUI
void        hotPrice2Fract ( char *dest, char *decValue );

void hotIntroLoad( char *fileName,
                Int16T *introEndYear,
                Real80T *introCPIAmounts,
                Real80T *introBankAmounts,
                Real80T *introIncomeAmounts,
                Real80T *introSmoothIncomeAmounts,
                Real80T *introGrowthAmounts,
                Int16T *firstValidQuarter,
                Int16T maxQuarters );

#endif
```

hotSheet.h

BEST AVAILABLE COPY

```
/* introGraph.h */

/* function prototypes */
void introInitialize ( void );
void introDrawGraph ( char *description );
```

BEST AVAILABLE COPY introGraph.h

```
/*
 * label handling header file
 */

/* function prototypes */
Int32T      lblEnterLabel(char *label, char *offset);
char        *lblLookupLabel(char *label);
void        lblInitialize(void);
Int32T      lblGetTag (char *varName);
void        lblBreakAt( char *label );
Boolean     lblIsBreakpoint( char *label );

extern      Boolean lblBreakSet;

/* label table sizes */
#define     MAXLABEL        1800L
#define     MAXLABELLEN          40
```

BEST AVAILABLE COPY lblLabel.h

BEST AVAILABLE COPY

```
/*
 * File libLibrary.h
 */

#ifdef EXT
#undef EXT
#endif

#ifdef EXTGEN

        #define         EXT     /* */

#else

        #define         EXT     extern

#endif

/* SYSTEM VERSION NUMBER: placed into all snippets and libraries */
#define libSysVersion           1
#define libLibSignature                 'LB'
#define libSnipSignature        'SN'

/* Library File Prefix */
typedef struct libFPrefix {
        Int16T Signature;
        Int16T Version;
        Int32T PixNum;                  /* Number of pictures */
        Int32T FATstart;        /* Offset of FAT */
        } libFPrefixT, *libFPrefixPT, **libFPrefixHT;

#define         LIBNAMEMAXCHARS  32
typedef         struct {
        char    szLibName[ LIBNAMEMAXCHARS ];
        struct  libFPrefix      fp;
} libInfoT, *libInfoPT, **libInfoHT;


/* File Allocation Table entry (kept at end of library file) */
/* actual table in file will have less than 200 entries */
/* Built at end of lib build */

#define LIB_MaxPics 200

typedef struct
        {
        char    SnipName[32];           /* Null terminated */
        Int32T SnipFOffset;     /* Offset from BOF (lseek with this points to
        Int32T SnipSize;                /* Including header structure */
        Handle          hSnip;                  /* Handle for relocatable me
where snip data are stored */
                                                        /* Should be zero in
data not read in */
        } libFatT, *libFatPT, **libFatHT;


typedef struct          /* New (August '88) SNIP header structure */
        {
```

BEST AVAILABLE COPY

```
                                        Int16T Signature;
                                        Int16T Version;
                                        Int16T CompAlgVer;          /* Compression
Version */
                                        Int32T        CheckSum;
        unsigned        char    TransColor;           /* Index of transparen
                                        Int32UT               numBytes;
data bytes */
                                        Int16UT       rowBytes;             /* Num
a row */
                                        Rect    bounds;                     /* Snip
normalized to upper left a 0,0 */
                                        Rect    dst;                /* Destination:
snip should be placed */
                                        Int16UT       LTable[128];  /* Table of mo
used length/value pairs */
                                        Int32T DataOffset;          /* Offset from
this snip to first data byte */
        } libSQZPictT, *libSQZPictPT, **libSQZPictHT;

/*
 * information about open libraries
 */
typedef struct {
        char            libName[64];
        Int16T          vRefNum;
        Int32T          numSnips;
        CharsHandle     snipNames;
        Handle                  libData;
        Int32T          *tags;
        } libDataT, *libDataPT, **libDataHT;

#define         MaxLib                  20
EXT     Int16T          libLibIndex
#ifdef EXTGEN
        = 0
#endif
;
EXT     Int16T          libCurrentLibIndex
#ifdef EXTGEN
        = -1
#endif
;
EXT     libDataT        libApLib[ MaxLib ];


Handle          libOpenPicLib( Int16T vRefNum, char *LibName, Boolean pre
void            libClosePicLib( Handle hLib );

Handle          libGetPicHandle( Handle hLib, Int16T vRefNum, char *PicNa
PurgeFlag, Boolean Prepend );
void            libReleasePic( Handle hLib, char * PicName);

void            libGetPicRect( Handle hSnip, Rect *pRect );

void            libLoadPicLib( Handle hLibInfo );

Handle libFindPicPtr(char * PicName, Boolean prepend );


libLibrary.h
```

BEST AVAILABLE COPY

```
void        libCloseAllPicLibs( void );
void        libLoadLib( char *libName, Boolean reload, Boolean preper
void        libListSnips( Handle hLib, CharsHandle *snipNames, Int32PT
void        libAlphabetize( CharsHandle list );
void        libAddLibToList( char *libName, Int16T vRefNum, Handle li

void        libDeleteLibraries( void );
void        libSwitchLibraries( Int16T menuItem );
```

libLibrary.h

BEST AVAILABLE COPY

```
/*      misData.h
 */

#ifndef         _misData_
#define         _misData_

void    misWriteInfo (void);            /* complete save of all info/session re
printing */
void misRetrieve (void);                /* reload someone's records from last

#endif
```

BEST AVAILABLE COPY

```
/* Modem io Include File */

#ifndef MODIOH

#define MODIOH 1

/* Prototypes */
void modIOmain(void);

#endif
```

modIO.h

BEST AVAILABLE COPY

```
/*      msgSnipDialogs.h
                 */

void                                   msgAlert
BooleanT                   msgAskYes        ( char *msg );
```

msgSnipDialogs.h

BEST AVAILABLE COPY

```
#define         pcmSTARTPAGE        1
#define         pcmPOSTSCRIPT       2
#define pcmENDPAGE                  3
void    pcmPrint( Int32T action, char *string );
```

pcmPrintCmd.h

BEST AVAILABLE COPY

```
void            picSaveAsPict( void );
BooleanT        picDrawPictFile2( SFReply * pFileReply );
```

picPICTfns.h

BEST AVAILABLE COPY

```
/* pie charting functions */

void    pieDrawTwin( void );
void    pieDrawTwinCondensed( void );          /* close together in th
void    pieDrawRecommend( void );
void    pieDrawRecommend4Slices( void );
void    pieDrawActual( void );

/* new "blueprint" pie functions */
void pieDrawCashSector( void );
void pieDrawBankSlice( void );
void pieDrawMMFSlice( void );
void pieDrawGISplit( void );
void pieDrawGILegend( void );

void pieBugTest( void );
```

BEST AVAILABLE COPY

```
#ifndef SCANLIB
#define SCANLIB

/* scanlib exported definitions */

#ifdef EXT
#undef EXT
#endif

#ifdef EXTGEN
        #define         EXT     /* */
#else
        #define         EXT     extern
#endif

 typedef enum {
        NoContext,
        CurrentContext,
        VariableContext,
        PastContext
        }       scnContextT;

EXT     scnContextT     scnContext;
/* -------------------------------------------
 *
 *              FUNCTIONS
 *
 * ------------------------------------------- */

void    scnInitialize( void );
Int32T scnNewCtrlFile( void );
Ptr     scnNextCtlLine( char **ppCurLine, char *buffer, Int32T size );
Int32T  scnLexScan( char *lineBuffer );
Int32T scnFillLabelTable( void );
BooleanT scnEvaluateBoolean ( char *booleanExpression );
BooleanT        scnExecuteScan( void );
void scnExecuteOldLine ( char *lineBuffer );
void    scnScanError( char *msg1, char *msg2 );
void    scnPushClick ( void );
char    *scnPopClick ( void );
void    scnPushSub ( char *ptr );
char    *scnPopSub ( void );
Boolean scnRestartScan( void );
Boolean         scnStartNewScan( void );
void    scnBackUp( void );
void    scnHotKeys( char key );
void    scnJump( char *label );
void    scnTimeout( char *jumpEvent );
void    scnShowNextLine( Boolean showContext );
void    scnShowCurrentLine( void );
void    scnShowString( char *string );
void    scnSetCurrentLine( char *line );
void    scnShowContext( void );
void    scnVariables( void );
void    scnSwitchContext( void );

#endif
```

scnScan.h

BEST AVAILABLE COPY

```
/*----------------------------------------
 *
 *                                      Constants
 *
 ----------------------------------------*/

#define MAX_VAR_NUMS    10      /* max number of variables in a V cm

#define     sCOMMAND        1       /* equates for Defined Fields
#define     sNUMBER                 2
#define sSTRING             4
#define sTARGET         8
#define sTOUCH              16
#define sEVENTNAME          32
#define     sGARBAGE        64
#define sALTSTRING      128
#define sVARNUM             256

/*----------------------------------------
 *
 *                                      Types
 *
 ----------------------------------------*/

typedef     struct scnCMDREC
        {
        Int32T  DefinedFields;          /* what type of info in this lin
        char    Command;                /* what command is it */
        Int32T  Number;                     /* variation of comma
        char    Str1[VAR_MAXVARLEN];
        char    Str2[VAR_MAXVARLEN];
        Point   Target;                     /* position where com
*/
        Rect    Touch;                      /* rect defining touch
*/
        char    EventName[32];
        Int32T  VarNum[MAX_VAR_NUMS]; /* table of variables acted upor
        Int32T  NumVars;                /* number of variables acted
        Int32T  b2Screen;
        Int16T  bReverse;
        Int16T  bShadow;
        } scnCommandRecordT, *scnCommandRecordPT;
```

BEST AVAILABLE COPY

```
/*
 * screen.h
 */

#ifdef EXT
#undef EXT
#endif

#ifdef EXTGEN
      #define      EXT /*  */
#else
      #define      EXT    extern
#endif

/* error handling variables */
EXT   BooleanT                 ErrorFlag
#ifdef EXTGEN
   = FALSE
#endif
   ;
EXT   BooleanT                 FatalErrorFlag
#ifdef EXTGEN
   = FALSE
#endif
   ;
EXT   char              ErrorMessage1[100]
#ifdef EXTGEN
   = ""
#endif
   ;
EXT   char              ErrorMessage2[100]
#ifdef EXTGEN
   = ""
#endif
   ;
EXT   char              ErrorMessage3[100];

/* function prototypes */
Int32T scrScreenSet( Int32T state, Int32T applyToBoth );

void scrSetHueNow( Int32T hueNumber );

Boolean scrSetHue( Int32T hueNumber,
                   Int32T *textFont,
                   Int32T *textSize,
                   Int32T *textFace,
                   RGBColor *textFGColor,
                   RGBColor *textBGColor );

void scrRestoreColors( void );

void scrOurDrawAt( char *s, Int32T h, Int32T v );

void scrExplodeOrCrush( Rect *prFrom, Rect *prTo );
```

scrScreen.h

BEST AVAILABLE COPY

```
#ifndef SNISNIP
#define SNISNIP

#ifndef STANDARD
#include "standard.h"
#endif

#ifndef TGLMAIN
#include "tglmain.h"
#endif

typedef enum {

		SNI_BUF_TO_SCREEN,
		SNI_BUF_TO_BUF,
		SNI_BUF_TO_SCREEN_DRAG,
		SNI_SCREEN_TO_BUF

	} sniInstructionT;

typedef struct {
	CGrafPtr		pPort;
	Ptr				pBits;
	PixMapHandle	hPixMap;
	char			DefaultSaveName[64];
	BooleanT		bSnipDefined;
	Rect			SnipRect;
	Int32T			BufferIndex;
	} sniPicBufferT, *sniPicBufferPT, **sniPicBufferHT;


#define		MAXBUF		3		/* number of buffers */

extern sniPicBufferT	sniBufRecs[MAXBUF];

void	sniInitialize( void );
void	sniEraseSelection( void );
void	sniChangeBuffer( Int32T newBuffer );
void	sniOverlayBuffer( Int32T newBuffer );
void	sniLoadPict( void );
void	sniLoadSnip( void );
void	sniSaveSnip( void );
void	sniSavePict( void );
void	sniRedrawScreen( void );
Boolean		sniPointInSnip( Point where );
void	sniStartDefine( Point where );
void	sniExpandSnip( Point mouseLoc );
void	sniEndDefine( void );
void sniStartDrag( Point where );
void	sniMoveSnip( Point mouseLoc );
void	sniEndDrag( void );
void	sniCopyScreenToBuf( void );
void	sniWriteCoordinates( Boolean forceRedraw );
void	sniCurrentSnip( Ptr *snipP, Int32PT sizeP );
void	sniMoveSelection( Rect newLocation );
void	sniSetCurrentSnip( Rect r );
void	sniPaste( void );
void	sniCopy( void );
```

sniSnip.h

```
void    sniNudgeSelection( char direction, Int16T modifiers );
void    sniCementBuffer( void );
void    sniFuseSelections( void );
void    sniCopyScreenToBuf( void );
void    sniPutUpSnip( char *name );
void    sniCopySelection( sniInstructionT instruction );
void    sniWriteOutSnip( char *name, Int16T vRefNum );

#endif
```

BEST AVAILABLE COPY sniSnip.h

BEST AVAILABLE COPY

```
/* function prototypes */

CGrafPtr      snpSaveWindow3( CGrafPtr pSrcPort, Rect *pRect );
void          snpRestoreWindow3( Int32T effect, CGrafPtr pSrcPort );
CGrafPtr      snpSaveBoxUnderDialog( Int16T resourceId, ResType type );
void          snpRestoreBoxUnderDialog( CGrafPtr *oldImageP );
```

BEST AVAILABLE COPY

```
#ifndef STANDARD
#define STANDARD

/************************************************
 * Constants
 ************************************************/

#define  TRUE  1
#define  FALSE 0
#ifndef NULL
#define         NULL   (0)
#endif

#define   MAX_FILE_NAME_LENGTH          40

/************************************************
 * Macros
 ************************************************/

#ifdef MIN
 #undef MIN
#endif
#define MIN( a, b )  ( ((a) < (b)) ? (a) : (b) )

#ifdef MAX
 #undef MAX
#endif
#define MAX( a, b )  ( ((a) > (b)) ? (a) : (b) )

/************************************************
 * Types
 ************************************************/
typedef unsigned char               BooleanT,      BooleanPT;
typedef long int                    Int32T,              *Int32PT;
typedef short int                   Int16T,              *Int16PT;
typedef unsigned long int      Int32UT,      *Int32UPT;
typedef unsigned short int     Int16UT,      *Int16UPT;
typedef long double                 Real80T,       *Real80PT;
*/

#endif
```

standard.h

BEST AVAILABLE COPY

```
/* Tax Rate Calculator Include File   */
/* CitiBank Money Advisor             */
/* Tax Calc.c                         */
/* 1/28/90 - JDT                      */

#ifndef TAXCALCH

#define TAXCALCH


void taxCalcSetup( void );
Boolean taxCalcMouseDown( Point where );
Boolean taxCalcKeyDown( EventRecord theEvent );
void taxCalcCleanup( void );
Real80T tax_rate( void );

#endif
```

taxCalc.h

BEST AVAILABLE COPY

```
/*      file:   Touch.h

        Monday, 18 April 1988

        Description: Header file for Touch.c

*/

/* Touch area handling */

#ifdef EXT
#undef EXT
#endif

#ifdef EXTGEN

        #define         EXT     /* */

#else

        #define         EXT     extern

#endif

/* Touch handlers plus Beep */


#define  TCH_GOOD_BEEP   1
#define          TCH_BAD_BEEP   2

void tchInitTouchAreas ( void );
void    tchBeepNow( Int16T );

void            tchPushTouches ( Rect *r );
void            tchRememberTouches ( Rect *r );
void            tchPopTouches ( void );
void            tchTouchDef( Rect *r, char *pSlot, char *pLabel );
Int32T          tchNDefinedTouchAreas(void);
BooleanT        tchTouchHandler( Point * );
void            tchClrTouchAreas(void);
void            tchKeyDef( char key, char *label );
void            tchClrKeyDefs(void);
char            *tchKeyLabel( char key );
Int32T          tchKeysHot(void);

void            tchBeginEvent(void);
void            tchEndEvent(void);
BooleanT        tchValidTouch( Point *pt );

/* E N D  O F  T O U C H . H  */
```

BEST AVAILABLE COPY

```
#ifndef TGLMAIN
#define TGLMAIN

#ifdef EXT
#undef EXT
#undef EQUALS
#undef EQUALS_2
#undef EQUALS_3
#endif

#ifdef EXTGEN
        #define         EXT     /* */
        #define EQUALS( X )                 = X
        #define EQUALS_2( X, Y )            = { X, Y }
        #define EQUALS_3( X, Y, Z )   = { X, Y, Z }
#else
        #define         EXT     extern
        #define EQUALS( X )                 /* */
        #define EQUALS_2( X, Y )            /* */
        #define EQUALS_3( X, Y, Z )   /* */
#endif

/* ------------------------------------------
 *
 *              CONSTANTS
 *
 * ------------------------------------------ */
#define         TGL_ON                                  1
cursor on */
#define TGL_OFF                                 0
off */
#define TGL_TOGGLE                              -1
cursor visibility */

#define         TGL_cSCREEN_BYTES               307200L         /* nur
640 x 480 */

#define         THISYEAR        1990

#define TGL_GOOD_BEEP                   1
#define         TGL_BAD_BEEP                    2

#define         TGL_APPLE_MENU_ID                       128     /* mer
#define         TGL_FILE_MENU_ID                129
#define         TGL_EDIT_MENU_ID                130
#define         TGL_SCAN_MENU_ID                131
#define         TGL_SNIP_MENU_ID                132
#define         TGL_BUILD_MENU_ID                       133


#define         TGL_ABOUT_ITEM                          1
items */


#define         TGL_TOGGLE_MENU_BAR_ITEM        1               /* file
#define         TGL_MODE_ITEM                           2
#define         TGL_TOGGLE_CURSOR_ITEM          3
#define         TGL_TWO_SCREENS_ITEM            4
```

BEST AVAILABLE COPY

```
#define     TGL_CLOSE_ITEM                  6
#define     TGL_QUIT_ITEM                   7

#define     TGL_UNDO_ITEM                   1
items */
#define     TGL_CUT_ITEM                    3
#define     TGL_COPY_ITEM                   4
#define     TGL_PASTE_ITEM                  5
#define     TGL_CLEAR_ITEM                  6

#define     TGL_NEW_SCAN_ITEM               1
items */
#define     TGL_RESTART_ITEM           2
#define     TGL_SPEEDUP_ITEM           4
#define     TGL_PAUSE_ITEM                  5
#define     TGL_SINGLE_STEP_ITEM       7
#define     TGL_ENTER_COMMAND_ITEM          8
#define     TGL_BREAK_AT_ITEM               9
#define     TGL_VARIABLES_ITEM              10
#define     TGL_CONTEXT_ITEM           11

#define     TGL_LOAD_PICT_ITEM              1
items */
#define     TGL_SAVE_PICT_ITEM              2
#define     TGL_LOAD_SNIP_ITEM              4
#define     TGL_SAVE_SNIP_ITEM              5
#define     TGL_MOUSE_COORDS_ITEM      7
#define     TGL_BUFFER_1_ITEM          9
#define     TGL_BUFFER_2_ITEM          10
#define     TGL_BUFFER_3_ITEM          11
#define     TGL_OVERLAY_1_ITEM              12
#define     TGL_OVERLAY_2_ITEM              13
#define     TGL_OVERLAY_3_ITEM              14

#define     TGL_NEW_LIB_ITEM           1              /* bui
#define     TGL_OPEN_LIB_ITEM          2
#define     TGL_VIEW_SNIP_ITEM              4
#define     TGL_ADD_SNIP_ITEM               5
#define     TGL_DEL_SNIP_ITEM          6
#define     TGL_WRITE_LIB_ITEM              8
#define     TGL_DUMP_LIB_ITEM               9
#define     TGL_READ_LIB_ITEM          10
#define     TGL_FIRST_LIBRARY          12

/* ----------------------------------------
 *
 *           VARIABLES
 *
 * ---------------------------------------- */

/*
 * Global states
 */
EXT Boolean            tglMenuVisible             EQUA
```

BEST AVAILABLE COPY

```
EXT Boolean                tglBeep
);
EXT    Int32T              tglNumPhysicalScreens        EQUAI
EXT    Int32T              tglNumVisibleScreens EQUALS( 1 );
EXT Rect                   tglScreenRect;
EXT    Boolean                    tglSpeedup
       EQUALS( FALSE );
EXT Boolean                tglCursorVisible             EQUALS( TRU!
EXT Boolean                tglMouseCoordsVisible        EQUAI

/*
 * main window
 */
EXT    CWindowPtr          tglMainCWindow;
EXT PixMapHandle           tglHMainPixMap;


/*
 * second screen window
 */
EXT CWindowPtr             tglAltCWindow;
EXT    PixMapHandle        tglHAltPixMap;


/*
 * current window
 */
EXT CWindowPtr             tglMyCWindow;
EXT    PixMapHandle        tglHCurPixMap;


/*
 * offscreen buffer
 */
EXT    CGrafPtr            tglPSavePort;
EXT    PixMapHandle        tglHSaveMap;


/*
 * mouse coordinate window
 */
EXT CWindowPtr             tglCoordinateWindow;


/*
 * cursors
 */
EXT    CursHandle          tglCrossHairs;
EXT    CursHandle          tglWatch;


/*
 * menus
 */
EXT    MenuHandle          tglAppleMenuH;
EXT    MenuHandle          tglFileMenuH;
EXT    MenuHandle          tglEditMenuH;
```

tglMain.h

BEST AVAILABLE COPY

```
EXT    MenuHandle              tglScanMenuH;
EXT    MenuHandle              tglSnipMenuH;
EXT    MenuHandle              tglBuildMenuH;


/*
 * colors
 */
EXT    RGBColor                tglRgbWhite
0xFFFF, 0xFFFF, 0xFFFF );
EXT    RGBColor                tglRgbBlack
0x0000, 0x0000, 0x0000 );


/*
 * Text information
 */
EXT Int32T                     tglTextFont;
EXT Int32T                     tglTextSize;
EXT Int32T                     tglTextFace;
EXT RGBColor              tglTextBGColor;
EXT RGBColor              tglTextFGColor;


/* ------------------------------------
 *
 *             MACROS
 *
 * ------------------------------------ */

#define TGL_ERROR( MESSAGE ) \
        tglError( MESSAGE, __FILE__, __LINE__ );

#define TGL_FATAL_ERROR( MESSAGE ) \
        tglFatalError( MESSAGE, __FILE__, __LINE__ );

/* Inline SetRect() macro, efficient when (rectp) is a constant. */
/* Must not be used if (rectp) has side effects. */
#define TGL_SETRECT(rectp, _left, _top, _right, _bottom)     \
        (rectp)->left = (_left), (rectp)->top = (_top),    \
        (rectp)->right = (_right), (rectp)->bottom = (_bottom)

#define SETPOINT(pPt, _v, _h ) (pPt)->h =_h;(pPt)->v=_v

/* HIWORD and LOWORD macros, for readability */
#define TGL_HIWORD(aLong)              (((aLong) >> 16) & 0xFFFF)
#define TGL_LOWORD(aLong)              ((aLong) & 0xFFFF)

#define TGL_SETRGB(rgb,r,g,b) (rgb).red=(r);(rgb).green=(g);(rgb).blue=(b)


/* ------------------------------------
 *
 *             FUNCTIONS
 *
 * ------------------------------------ */
void    tglError( char *message, char *file, Int32T line );
```

BEST AVAILABLE COPY

```
void    tglFatalError( char *message, char *file, Int32T line );
void    tglCursorOnOff( Boolean on );
void    tglPushCursor( void );
void    tglPopCursor( void );
void    tglToggleMenu( void );
void    tglToggleScreens( void );
void    tglEnterCommand( void );
void    tglBreakAt( void );

#endif
```

tglMain.h

BEST AVAILABLE COPY

```
/*            txtEditor.h
 */

#ifndef _txtEditor_
#define _txtEditor_

#include "standard.h"

#define TXT_MAX_TEXT_BLOCKS     11                    /* CSR notes, E
#define TXT_MAX_TEXT_SIZE                   5000          /* char

#define       txtCSRnotes    0

#define       txtEditNotes1  1
#define       txtEditNotes2  2
#define       txtEditNotes3  3
#define       txtEditNotes4  4
#define       txtEditNotes5  5

#define       txtSpecialNotes1      6
#define       txtSpecialNotes2      7
#define       txtSpecialNotes3      8
#define       txtSpecialNotes4      9
#define       txtSpecialNotes5      10

/*******************************************************************
***/
#define CSR_VIEW_SNIP             "edit csr view"
#define CSR_DOWN_SNIP             "edit csr down"
#define       CSR_UP_SNIP                   "edit csr up"
#define       CSR_HI_UP_SNIP                "edit csr up high"
#define       CSR_HI_DOWN_SNIP   "edit csr down high"
#define       CSR_THUMB_AREA_SNIP       "edit csr thumb area"
#define       CSR_THUMB_SNIP            "edit csr thumb"

#define NOTE_VIEW_SNIP            "n.edit.note.view.s"
#define NOTE_DOWN_SNIP            "n.edit.note.down.s"
#define .     NOTE_UP_SNIP                  "n.edit.note.up.s"
#define       NOTE_HI_UP_SNIP               "n.edit.note.up.high.s"
#define       NOTE_HI_DOWN_SNIP             "n.edit.note.down.high.s"

typedef struct
       {
       Rect          destRect;
       Int16T        selPoint;
       Handle               content;
       } EditBlock;

void                 txtInitialize ( void );
EditBlock            *txtGetEditBlock(Int16T blockNum);
Handle               txtGetText (Int16T blockNum);
void                 txtFirstLine ( Rect *viewRect, EditBlock *theBlock );
void txtEditSetup( Rect *viewRect,            /* visible rect */
                      EditBlock     *theBlock,     /* persistent data stru
                      Handle upSnip,               /* scroll up button sni;
                      Handle downSnip,             /* scroll down button
                      Handle upHighSnip,           /* handle to snips for
highlights. */
```

BEST AVAILABLE COPY

```
                    Handle downHighSnip,
                    Handle thumbAreaSnip,
                    Handle thumbSnip);
void            txtShow(    Rect            *viewRect,
visible rect */
                            EditBlock       *inText,
    /* the text to edit */
                            Handle          upSnip,
    /* scroll up button snip */
                            Handle          downSnip,
scroll down button snip */
                            Handle          upHighSnip,
handle to snips for up */
                            Handle          downHighSni
down highlights. */
                            Handle          thumbAreaSn
                            Handle          thumbSnip);


void txtEditCSRNotes ( void );
void txtEditNoteNum ( Int16T noteNum );
void txtShowNoteNum ( Int16T noteNum );
void txtLoadNotes ( Int16T noteNum );


void txtEditEveryCycle( void );
Boolean txtEditKeyDown( EventRecord theEvent );
Boolean txtEditMouseDown( Point where, Int32T modifiers );
void txtEditCleanup( void );
void txtClearBlocks ( void );

#endif
```

BEST AVAILABLE COPY

```
/*
	Variables
*/

#ifndef VARFNS
#define VARFNS


#define VAR_MAXVAR			400L /* max number of variat
#define VAR_MAXVARLEN		254L /* length of a variable in bytes

typedef char varVarStringT[VAR_MAXVARLEN];

/* variable handling functions */
BooleanT	varInitialize( void );
Real80T		varAtof( char *pC );
BooleanT	varNotBlank( char *pC );

Int32T		varMakeLong( char *pC );
Real80T		varMakeReal( char *pC );

void		varSetF( Int32T varnum, Real80T value );
void		varSetL( Int32T varnum, Int32T value );
void		varSetS( Int32T varnum, char *value );

char *		varPtr( Int32T varnum );
Int32T		varVal( Int32T varnum );
Real80T		varValF( Int32T varnum );
Int32T		varQDef( Int32T varnum );

void		varDollarFmt( char *pD, char *pS, BooleanT useDollarSign );
char *		varDollar( char *dest, Int32T varnum );
char *		val2Dollar( char *dest, Int32T value );
char *		DollarConv( char *buf, char *vp);


/* num			type		value	*/
/*************************************************************
***************************

 Chile only !

*************************************************************
****************************/
#ifdef APP_CHILE

#define		vcShowCurrency			3
#define		vcPath				10

#define		vcAmtNeeded			14
#define		vc1AmtNeeded			114
#define		vc2AmtNeeded			214

#define		vcWhatIfLoanAmount		15
#define		vc1WhatIfLoanAmount		115
#define		vc2WhatIfLoanAmount		215

#define		vcCashAvail			16
```

BEST AVAILABLE COPY

```
#define         vc1CashAvail        116
#define         vc2CashAvail        216

#define         vcProfession        18
#define         vcMarital                 20
#define         vcSpouseWork              22
#define         vcMnthlyIncome            24
#define         vcMnthlyPmnts             26
#define         vcCarNewOrUsed            28
#define         vcReservedForJumps  33
#define         vcBestTimeToCall    34
#define         vcErrorCode               36
#define         vcPrinterErrorCode  37

/* so-called "maintenance" variables */
#define         vcMortRate                50
#define         vcPersonalRatePesos 51
#define         vcPersonalRateUF    52
#define         vcAutoRateUF              53
#define         vcAutoRatePesos           54
#define         vcUnsecuredRate           55
#define         vcSecuredRate             56

#define         vcMinPersonalLoan   60
#define         vcMinAutoLoan             61
#define         vcMinMortgageLoan   62
#define         vcMinMortgageLoan20       63
#define         vcMaxUnsecuredLoan        64
#define         vcMinCreditLine           65

/* mortgage, addition, and credit line are always enabled -- is this right? */

#define         vcEnableAutoUF                  70
#define         vcEnableAutoPesos         71
#define         vcEnablePersonalUF        72
#define         vcEnablePersonalPesos     73

#define         vcPesosPerUF  80
#define         vcRepName           81
#define         vcRepNumber         82

/*******************************************************
 ***************                ***************
 ***************    output variables    ***************
 ***************                        ***************
 ***************                ***************
 *******************************************************

#define         vcMaxLoanDown       102 /* down payment for ma
can get */
#define         vc2MaxLoanDown      202 /* down payment for ma
can get (secondary currency) */

#define         vcMaxTerm           103 /* maximum payment I c
#define         vc2MaxTerm          203 /* maximum payment I c
(secondary currency) */
```

BEST AVAILABLE COPY

```
#define         vcMaxLoan            104 /* maximum loan I can g
#define         vc2MaxLoan           204 /* maximum loan I can g
currency) */

#define         vcMaxTime            105 /* time span of maximum
*/

#define         vcMaxLoanEver        106    /* maximum loan valu
amount needed or down specified */
#define         vc2MaxLoanEver       206    /* maximum loan valu
amount needed or down specified (secondary currency) */

/*************************************************************
 ***************                 ***************
 ***************    General Output       ***************
 ***************                 ***************
 *************************************************************

#define         vcSecuredCreditLine       130
#define         vc2SecuredCreditLine 230

#define         vcUnsecuredCreditLine     131
#define         vc2UnsecuredCreditLine    231

#define         vcMaxHousePrice           140
loan + cashAvail */
#define         vc2MaxHousePrice    240              /* quali
cashAvail (secondary currency) */

#define         vcMaxPmnt                 141
qualified */

#define         vcShortfall               142
- max qualified loan */
#define         vc2Shortfall        242              /* amtN
qualified loan (secondary currency) */

#define         vcMinDown                 143
needed for found amt */
#define         vc2MinDown                243
needed for found amt (secondary currency) */

#define         vcPriceBasedOnDown        144
amt based on cashAvail */
#define         vc2PriceBasedOnDown       244
amt based on cashAvail (secondary currency) */

#define         vcLoanMinimum             145
loan min error */
#define         vc2LoanMinimum            245
loan min error (secondary currency) */

#define         vcLoanMinimumPayment      146        /* set if
min error */
#define         vc2LoanMinimumPayment     246        /* set if
min error (secondary currency) */
```

BEST AVAILABLE COPY

```
#define         vcLoanNeeded              147
amount needed */
#define         vc2LoanNeeded             247
amount needed (secondary currency) */

#define         vcMinLoanPrice            148
minimum loan */
#define         vc2MinLoanPrice           248
minimum loan (secondary currency) */

#define         vcMinLoanDown             149
minimum loan */
#define         vc2MinLoanDown            249
minimum loan (secondary currency) */

#define    vcLoanBasedOnDown 150               /* loan based (
avaliable */
#define    vc2LoanBasedOnDown        250              /* loan
avaliable (secondary currency) */

#define    vcWhatIfLoanDown    153         /* loan based on cash
#define    vc2WhatIfLoanDown   253         /* loan based on cash

#define         vcMaxSecuredPersonalLoan  154         /* max
unsecured personal loan (used only in addition what-if)  */
#define         vc2MaxSecuredPersonalLoan 254         /* max
unsecured personal loan (secondary currency)  */

#define    vcSubPath                  155         /*  sub path fo

#define    vcTwoCurrencies            156         /*  after (Y)16!
qualifying loans were of the same currency (else 1)  */

/********************************************************
        ERROR REPORTING
*********************************************************

#define         vcAmtNeededERR            160
is less than pers. loan min */
#define         vcDownTooBigERR           161
down pmnt., amt. needed too small */
#define         vcDownTooSmallERR  162              /* perc(
adequate */
#define         vcEachPmntERR             163
rule"; pmnt above 25/28% */
#define         vcLoanPlusExpenseTooHighERR 164  /* loan pmnt p
would be above debt limit */
#define         vcEligibleBelowMinERR      165          /* only
amt below credit line min */
#define         vcExpensesTooHighERR       166          /* curr(
exceed 40/50/60 of monthly income */


/********************************************************
 CALCULATOR
*********************************************************
#define vcCalcSwitch              196    /* control calculator currency
#define vcCalcVal                 197  /* calculator and telephone resu
```

varFns.h

```
#define vcCategory                    320 /*  customer category (1
day report  */

/*  counters for end of day summary report  */
#define vcTimeoutCounter          321
#define vcTerminarCounter         322
#define vcFinishCounter                323
#define vcStartCounter                 324
#define vcWhatIfCounter                325

#define vcTimeTaken                    326

#define vcSignatureSaved          327

#define vcUSVersion                    397

#endif

/***********************************************************
****************************

 Advisory terminal only !

************************************************************
****************************/
#ifdef APP_ADTERM

#define vName                            1  /* i          name   */
#define vAge                        2  /* i          age     */

#define vPlannedRetireAge   3  /* i          planned retirement age

#define vNumChildren                4  /* c 20              # of children (
      */
#define vChildAges                  5  /* i          ages of children

#define vOwnHome                    6  /* i          own/rent/plantobuy

#define vGrossIncome                7  /* i          gross income   */

#define vAvgMonthlyExpense          8  /* ic 20      average monthly exp
(calculated from gross income)     */
#define vMarital                    9  /* i               marital status

#define vChecking                   10  /* i              checking

#define vSavings                    11  /* i              savings

/* 13 */
#define vGovtBonds                  14  /* i                    */

#define vStocks                          15  /* i               stocks
```

BEST AVAILABLE COPY

BEST AVAILABLE COPY

```
#define vLongCD                        16 /* i              long te
        */
#define vCheckingPlus             17      /* i           UNUSED ? */
#define       vLinesOfCredit           18      /* i             UNUSE
#define vStockFund                19 /* i                stock mutual f

#define vTotalAssets        20 /* c 20          total assets
/* 21 */
#define vRBankDollars             22 /* c 20             rec bank $

#define vRIncomeDollars           23 /* c 30             rec income $

#define vRGrowthDollars           24 /* c 30             rec growth $
        */
#define vRBankPercent             25 /* cw 30    rec bank %

#define vRIncomePercent           26 /* cw 30    rec income %

#define vRGrowthPercent           27 /* cw 30    rec growth %

/* 28, 29 */
#define vCorpBonds                30 /* i
        */
#define vComPaper                 31 /* i
        */
#define modParms                  32      /* Modem Parameters */
/* $33 is widely used as the indirect jump variable */
#define vTakeHome                 34 /* i                take home pa)

#define vYrToRetire               35 /* c 20             years to retire

        */
#define vYrToCollege              36 /* c 20             years to colleg

#define vAgencies                 37 /* i
              */
#define vMnyMkt                        38 /* i                money
        */
#define vBondFund                 39 /* i                bond funds

#define vMuniBonds                40 /* i                       */

/* 41 */
#define vABankDollars             42 /* c 20             current bank $

#define vAIncomeDollars           43 /* c 20             current income

#define vAGrowthDollars           44 /* c 20             current growth

#define vABankPercent             45 /* cw 20    current bank %

#define vAIncomePercent           46 /* cw 20    current income %

#define vAGrowthPercent           47 /* cw 20    current growth %

/* 48 */
/* 49 */
#define vRSumChecking             50
#define vRSumSaving               51
```

varFns.h

```
#define vRegChecking                52
#define vNOW1                              53
#define vNOW2                              54
#define vDTDSaving                  55
#define vIMRASaving                 56
#define vABankPercentOnly  57  /*            actual bank percenta
format) cf var 45      */
#define vAIncomePercentOnly         58  /*             actual incom
(not "smear" format) cf  var 46     */
#define vAGrowthPercentOnly         59  /*             actual growtl
(not "smear" format) cf  var 47     */
/* 60, 61, 62 */
#define        vECash                         63      /*
cash amount (overrides allocation) */
#define vRCashDollars               64
/* 65 */
#define vVisa                       66  /*       visa limit  */
#define vLifeInsurance              67      /* c 20       recommendec
insurance */

#define        vRStocksMF                    68      /* $ of stock recomm
mutual fund */
/* 69 */
#define vGrowthSlush                70  /*             growth slush
/* 71 - 84 : stock edit slots (unnamed, but in use!) */
#define        vRMMFDollars                  85      /*
recommendation to be kept in income (MnyMktFnd) */
#define        vRMMFPercent                  86
#define vRStocksA                   87  /*             sum of recom
in group A */
#define vRStocksB                   88  /*             dollar sum of
stocks in group B */
#define vRStocksC                   89  /*             dollar sum of
stocks in group C */
#define vIncomeSlush          90  /* c 50/51  income detail card - total

/*------------------------------*/
/* 91 - 104: bond edit slots (unnamed, but in use!) */
/*------------------------------*/

#define vEBank                             105  /* i             click-i
allocation bank  $      */
#define vEIncome                    106  /* i             click-input: b
income  $      */
#define vEGrowth                    107  /* i             click-input: b
growth  $      */
/* 108 - 110 */
#define vRIncomeS                   111  /*             dollar value c
short term Income instruments */
#define vRIncomeM                   112  /*             dollar value c
medium term Income instruments */
#define vRIncomeL                   113  /*             dollar value c
long term Income instruments */
#define vCurYr                             114  /*             currer
1989 */
/* 115 */
#define vRCheckingPlus              116  /* c 20    checking plus limit
```

BEST AVAILABLE COPY

```
#define vRReadyCredit          117 /* c 20    ready credit limit

#define vPrintDate             118 /* c              date (print forn

#define vCardDate              119 /* c              date (card form

#define vMonMortPmnt           120 /*                monthly mortgi

#define vTotalMort             121 /*                total mortgage

#define vMortIntRate           122 /*                interest rate */

#define vMortPercentDown  123 /*                     percent down */

#define vMortDownAmt           124 /*                          down p

#define vMortTotalHomeCost     125 /*                total home cos
#define taxDeduct              126    /* Tax Calculator - # of deduc
#define taxFstatus             127    /* Tax Calculator - filing statu
#define taxRes                      128 /* Tax Calculator - place
*/
#define vUFFYrToCollege        129 /*                click-edited yei
*/
#define vKidsExist             130 /* i              children (yes/nc

#define vKidsExistB            131 /* c 20    (children) if = yes, the
0       */
#define vTuitionB              132 /* c 20    (tuition) if = yes, then
0       */
#define vPlanToBuyB            133 /* c 20    (plan to buy) if = buy,
else 0  */
#define vTuition               134 /* i              tuition (yes/no)


/* 135 - 178 (check w/ Tom about use in program)*/

#define vMaritalB              149
#define        vHomeOwnerB                150
#define taxNexempt             151 /* Tax Calculator - # of exemptio
#define        vDeltaBankSign         152    /* Rec dollars - actual
#define        vDeltaIncomeSign  153
#define        vDeltaGrowthSign  154
#define        vDeltaBank             155    /* Rec dollars - actual
#define        vDeltaIncome      156
#define        vDeltaGrowth           157

#define taxRate                       173    /* Tax calculator - Tax
#define vCitibankFee           174           /* citibank's fee, expressed as
"1.0" or "1.5" */

#define vBarTouched                          176      /* c ?:  label tc
interpreted as a number (ignore the text part) */
#define vBarDisplayHiLoOrAverage  177      /* c 1:  'h'= hi-low, 'a'= averai
#define vBarDisplayBasis              178     /* c 1:  'c'= current, 'r'
recommended, 'a'= alternate */

#define vReadyForRec                  179 /* (Y)              20 says
for recommendation */
```

varFns.h

BEST AVAILABLE COPY

```
#define        errReturnCode                       180

/* golden bar stuff (?) */
#define vAltBankDollars                    182  /* c 20          alt ban
    */
#define vAltIncomeDollars            183  /* c 30          alt income $

#define vAltGrowthDollars            184  /* c 30          alt growth $

#define vAltBankPercent                    185  /* cw 30         alt ban
    */
#define vAltIncomePercent            186  /* cw 30         alt income %

#define vAltGrowthPercent            187  /* cw 30         alt growth %

#define vRBondDollars                      188    /* recommended bonc
#define vRBondPercent                      189 /* % of total */

#define vHistPerfPeriod                    198    /* number of years in

/* which of the following are still being used ???    */
#define        vExcelFileName                       200
#define        vNumCharts                           201
#define        vGraphRect                           202
#define        vDataWhitespaceRatio       203
#define        vHues                                204

/* #define     vShadowOffset                        205  */
#define        vClickSlotNumber           207
#define        vPieDemoPercent                      208

#define vBankEditFlag                244
#define        vIncomeEditFlag            245
#define        vGrowthEditFlag            246

#define        vProgramVersion            268 /*  0 for stock; 1 for func
*/

/* $290        general purpose temp var */

#define        vRLongDollars              291
#define        vRLongPercent              292

/* 298, 299 are the BACK/NEXT button event holders. */


#define vBeginTime                   301
#define vShadowOffset                302
#define vELong                             303 /*
term amount */
#define vRCashPercent                304
#define        vBondCUSIP                 305
#define vVarFileName                 306

#define vCashMin                     350
#define vCashMax                     351
#define vCashNote                    352
#define        vLongMin                   353
```

BEST AVAILABLE COPY

```
#define       vLongMax                 354
#define       vLongNote                355
#define       vBankMin                 356
#define       vBankMax                 357
#define       vBankNote                358
#define       vIncomeMax               359
#define       vIncomeMin               360
#define       vIncomeNote              361
#define       vGrowthMax               362
#define       vGrowthMin               363
#define       vGrowthNote              364

#define vCurrentInstName      375          /*      name of curre
        */
#define vCurrentInstStatus    376          /*      status of curre
        */
#define vCurrentInstGloss     377          /*      glossary index
instrument      */
#define vBuylistNumPages      378          /*      number of pa(
buylist         */
#define vBuylistPageNum             379           /*     curren
in buy list     */
#define vErrorFlag                  380           /*     error f

#define vMMFTotal                   381           /*     total o
card, should = vRMMFDollars         */
#define vIsItMMF                    382           /* is the curre
with a MMF? */


#endif

/*************************************************************
***************************

 EVERYBODY !

*************************************************************
***************************/

/* $197 used in Chile */
/* $198 used in AT */
#define vWipeDelay                  199


#endif
```

varFns.h

BEST AVAILABLE COPY

```
#ifndef VCMD
#define VCMD

/*************************************************************
 ***************
       ***************
 ***************        Types
       ***************
 ***************
       ***************
 *************************************************************

/*************************************************************
 * vcmSubTypeT:  substitution type:
 *
 *              NORMAL: substitute string directly
 *              DOLLAR: translate string into dollars and then substitute
 *
 *************************************************************
 typedef enum {
        VCM_NORMAL,
        VCM_DOLLAR
        } vcmSubTypeT, *vcmSubTypePT;

/*************************************************************
 * vcmErrorT: things that might go wrong in here
 *************************************************************
 typedef enum {
        VCM_NO_ERROR,
        VCM_NO_FORMAT_STRING,
        VCM_TOO_FEW_PARAMS,
        VCM_TOO_MANY_PARAMS
        } vcmErrorT, *vcmErrorPT;


/*************************************************************
 ***************
       ***************
 ***************         Functions                      *****
 ***************
       ***************
 *************************************************************
char          *vcm1Value( Int32T number, BooleanT *atEndP );
void          vcmValue( char *answer, Int32T number, BooleanT *atEndF
void          vcmCmd( scnCommandRecordPT commandRecP, char *result
vcmErrorT     vcmGetParams( scnCommandRecordPT commandRecP );
vcmErrorT     vcmGet1Param( scnCommandRecordPT commandRecP, vcmS
subType );
#endif
```

BEST AVAILABLE COPY

```
/*
vrwVarFiles.h
*/

void vrwSave( void );
void vrwLoad( void );

void vrwSaveVarsInFile ( char *varFName, char *mode );
void vrwLoadVarsFromFile ( char *varFName );

BooleanT vrwPartialLoad ( FILE *fp );
```

BEST AVAILABLE COPY

```
#ifndef WRKSCRNBUFFER
#define         WRKSCRNBUFFER

#ifdef EXT
#undef EXT
#endif

#ifdef EXTGEN
        #define         EXT     /* */
#else
        #define         EXT     extern
#endif

EXT     CGrafPtr                wrkPSavePort;
EXT Ptr                                 wrkPSaveBits;
EXT PixMapHandle        wrkHSaveMap;

EXT Rect                        wrkSaveRect;

void            wrkSaveWindow( Rect *pRect);
void            wrkRestoreWindow( void );
void            wrkInitialize( void );
void            wrkDispose( void );

#endif
```

wrkScrnBuffer.h

BEST AVAILABLE COPY

SCAN

Copyright 1991 Citibank, N.A.
As an unpublished work.
All Rights Reserved.

BEST AVAILABLE COPY

```
;MONEY ADVISOR SCAN FILE
;Date
;Friday, April 20, 1990 2:15 PM

;author: Tom Nicholson

(J) :LOAD.MONEY.ADVISOR

;*****************************************************************************
;DEBUG EVENT (called from MAIN.WAIT)
;*****************************************************************************

;*
(:) :TOGGLE.DEBUG

        if $399 = 0
                (A) $399 "1"

        else
                (A) $399 "0"

        (J) :MAIN.WAIT

;*
(:) :TOGGLE.TRACE

        if $398 = 0
                {
                (G) :TRACE.ON
                (A) $398 "1"
                (H) 20
                (G) :GET.CLEAR.PROMPT
                (V) "TRACE ON" @440,5
                }
        else
                {
                (G) :TRACE.OFF
                (A) $398 "0"
                ;CLEAR TRACE
                (S) "n.undertabs.blnk.s"
                }
        (J) :MAIN.WAIT

                        ;*
                        (:) :TRACE.ON  ;(trace doesn't get ignored in the { }'s
                        ;trace on
                        (R)

                        ;*
                        (:) :TRACE.OFF
                        ;trace off
                        (R)

;*
(:) :DEBUG

        ;SHOW VARIABLES
                (H) 20
                (G) :GET.CLEAR.PROMPT
                (V) "$33 " @472,445        ;'JUMP TO' VARIABLE
                (V) $33 @472,475
```

BEST AVAILABLE COPY

```
;LEFT SIDE
(O) "n.format.debug.lt.s"

        (H) 36
        (V) "$220 " ●11,05        ;button flag
        (V) $220 ●21,05

        (V) "$252 " ●35,05        ;dialogue box
        (V) $252 ●45,05

        (V) "$241 " ●59,05  ;main menu (location)
        (V) $241 ●69,05

        (V) "$179 " ●83,05        ;recommendation cooked
        (V) $179 ●93,05

        (V) "$290 " ●107,05 ;a submenu is now open
        (V) $290 ●117,05

        (V) "$376 " ●131,05       ;submenu (location)
        (V) $376 ●141,05

        (V) "$180 " ●155,05       ;tabs are up/down
        (V) $180 ●165,05

        (V) "$298 " ●179,05       ;back event
        (V) $298 ●189,05

        (V) "$299 " ●203,05       ;next event
        (V) $299 ●213,05

        (V) "$251" ●227,05        ;card flag
        (V) $251 ●237,05

        (V) "$264 " ●251,05       ;card yours
        (V) $264 ●261,05

        (V) "$265 " ●275,05       ;card hotsheet
        (V) $265 ●285,05

        (V) "$266 " ●299,05       ;card buylist
        (V) $266 ●309,05

        (V) "$267 " ●323,05       ;card int or detail
        (V) $267 ●333,05

        (V) "$375 " ●347,05       ;name of stock
        (V)  $375 ●357,05

        (V) "$376 " ●371,05       ;status of stock
        (V)  $376 ●381,05

        (V) "$377" ●395,05
        (V)  $377 ●405,05         ;glossary index

        (V) "$378" ●419,05        ;number of pgs
        (V)  $378 ●429,05

        (V) "$379" ●443,05        ;current page number
        (V)  $379  ●453,05

;*
;RIGHT SIDE
(O) "n.format.debug.rt.s"
```

BEST AVAILABLE COPY

```
(V) "$264 " ●11,600            ;card ask
(V) $264 ●21,600

(V) "$265 " ●35,600            ;card hotsheet/glossary
(V) $265 ●45,600

(V) "$266 " ●59,600       ;card buylist
(V) $266 ●69,600

(V) "$267 " ●83,600            ;card int or det
(V) $267 ●93,600

(V) "$207" ●107,600            ;click slot number
(V) $207 ●117,600

(V) "$290 " ●131,600      ;general purpose temporary variable
(V) $290 ●141,600

(V) "$330" ●155,600            ;number of prompts
(V) $330 ●165,600

(V) "$331" ●179,600            ;prompt 1
(V) $331 ●189,600

(V) "332" ●203,600             ;prompt 2
(V) $332 ●213,600

(V) "$339 " ●227,600      ;prompt counter
(V) $339 ●237,600

(V) "$180 " ●251,600      ;error condition
(V) $180 ●261,600

(V) "$240 " ●275,600           ;click line0
(V) $240 ●285,600

(V) "$241 " ●299,600           ;click line1
(V) $241 ●309,600

(V) "$73 " ●323,600            ;click line2
(V) $73 ●333,600

(V) "$42 " ●347,600            ;current bank
(V) $42 ●357,600

(V) "$43 " ●371,600       ;current income
(V) $43 ●381,600

(V) "$44 " ●395,600            ;current growth
(V) $44 ●405,600

(V) "$227 " ●419,600           ;button 7
(V) $227 ●429,600

(V) "$230 " ●443,600      ;flag for button10
(V) $230 ●453,600

;RETURN to MAIN.WAIT
(R)

;*************************************************************************
```

Money Advice Scan File

MIS VARIABLES

```
.••••••••••••••••••••••••••••••••••••••••••••••••••••••••••••••••••••••••••••••••

( ) SETUP.MIS.VARIABLES

        ;clear MIS
        MISSaveList clear

        ;system information
        MISSaveList 21,268

        ;personal information
        MISSaveList 1,2,3,4,5,6,7,8,9,28,34,35,36,129,130,131,132,133,134,136,137,138,14!

        ;current assets
        MISSaveList 10,11,12,14,15,16,18,19,30,31,37,38,39,40

        ;current assets flags
        MISSaveList 160,161,162,163,164,165,166,167,168,169,170,171,172

        ;recommended bank
        MISSaveList 52,53,54,55,56,66,67,116,117

        ;tax calculator (deductions,filing status,residence,exemptions,rate)
        MISSaveList 126,127,128,151,173

        ;special considerations
        MISSaveList 105,106,107,63,303,350,351,352,353,354,355
        MISSaveList 356,357,358,359,360,361,362,363,364

(R)

;••••••••••••••••••••••••••••••••••••••••••••••••••••••••••••••••••••••••••••••••
; SET INITIAL VARIABLES
;••••••••••••••••••••••••••••••••••••••••••••••••••••••••••••••••••••••••••••••••

(:) :INITIALIZE.VARIABLES

        ;CLEAR KEYS AND TOUCH
        (T)
        (K)

        ;DATA INPUT - INITIAL VALUES
        (A) $1 ""               ;name
        (A) $2 ""               ;age
        (A) $3 ""               ;planned retirement age
        (A) $4 ""               ;# of children (from ages)
        (A) $5 ""               ;ages of children (under 18)
        (A) $6 ""               ;own/rent, plan to buy
        (A) $7 ""               ;gross income
        (A) $8 ""               ;average monthly expenses (calc)
        (A) $9 ""               ;marital status

        (A) $35 ""              ;yrs to retirement
        (A) $36 ""              ;yrs to college

        (G)     :INITIALIZE.ASSET.VARIABLES
        (G)     :INITIALIZE.SPECIAL.VARIABLES

        (A) $21 ""              ;csr's name

        ;RECOMMENDATION IN DOLLARS $
        (A) $22 "$"             ;rec bank $
```

BEST AVAILABLE COPY

```
(A) $23 "$"                ;rec income $
(A) $24 "$"                ;rec growth $

;BUCKET INITIALIZATION
(A) $25 "0,100"            ;rec bank %
(A) $26 "0,100"            ;rec income %
(A) $27 "0,100"            ;growth %

(A) $28 ""                 ;next appointment

(A) $29 ""        ;*

(A) $32 ""                 ;modem parameters

(A) $33 ""                 ;use for last touch

(A) $34 ""        ;*

(A) $41 ""        ;*

(A) $48 "" ;*
(A) $49 "" ;*

;BANK CARD CLICK SLOTS
(A) $50 ""      ;slot 1 checking intermediate
(A) $51 ""      ;slot 5 savings intermediate
(A) $52 ""      ;slot 2 reg checking
(A) $53 ""      ;slot 3 NOW I
(A) $54 ""      ;slot 4 NOW II
(A) $55 ""      ;slot 6 DTD savings
(A) $56 ""      ;slot 7 IMRA savings

;YOUR MONEY - PCT (%)
(A) $57 ""      ;your BANK %
(A) $58 ""      ;your INCOME %
(A) $59 ""      ;your GROWTH %

(A) $60 "" ;growth detail slot 15
(A) $61 "" ;growth detail slot 16

(A) $62 ""    ;*

(A) $63 ""      ;special considerations - exact edit cash
(A) $64 ""      ;recommended available cash
(A) $65 ""      ;growth detail - slot 17
(A) $66 ""      ;recommended bank - VISA
(A) $67 ""      ;recommended bank - life insurance
(A) $68 ""      ;recommended growth - mutual fund

(A) $69 ""    ;*

;DETAIL CARDS
(A) $70 ""      ;growth detail - total
(A) $71 ""      ;growth detail slot 1
(A) $72 ""      ;growth detail slot 2
(A) $73 ""      ;growth detail slot 3
(A) $74 ""      ;growth detail slot 4
(A) $75 ""      ;growth detail slot 5
(A) $76 ""      ;growth detail slot 6
(A) $77 ""      ;growth detail slot 7
(A) $78 ""      ;growth detail slot 8
(A) $79 ""      ;growth detail slot 9
(A) $80 ""      ;growth detail slot 10
```

Money Advice Scan File

BEST AVAILABLE COPY

BEST AVAILABLE COPY

```
(A) $81 ""      ;growth detail slot 11
(A) $82 ""      ;growth detail slot 12
(A) $83 ""      ;growth detail slot 13
(A) $84 ""      ;growth detail slot 14
(A) $85 ""      ;$cash - income bucket (MMF)
(A) $86 ""      ;% of total that's MMF
(A) $87 ""      ;$ sum of conservative stocks A
(A) $88 ""      ;$ sum of market-like stocks B
(A) $89 ""      ;$ sum of aggressive stocks C

(A) $90 ""      ;income detail - total
(A) $91 ""      ;income detail - slot 1
(A) $92 ""      ;income detail - slot 2
(A) $93 ""      ;income detail - slot 3
(A) $94 ""      ;income detail - slot 4
(A) $95 ""      ;income detail - slot 5
(A) $96 ""      ;income detail - slot 6
(A) $97 ""      ;income detail - slot 7
(A) $98 ""      ;income detail - slot 8
(A) $99 ""      ;income detail - slot 9
(A) $100 ""     ;income detail - slot 10
(A) $101 ""     ;income detail - slot 11
(A) $102 ""     ;income detail - slot 12
(A) $103 ""     ;income detail - slot 13
(A) $104 ""     ;income detail - slot 14

;CLICK INPUTS - EDITING
(A) $105 ""     ;click input - bank $
(A) $106 ""     ;click input - income $
(A) $107 ""     ;click input - growth $

(A) $108 ""     ;income detail - slot 15
(A) $109 ""     ;income detail - slot 16
(A) $110 ""     ;income detail - slot 17

(A) $111 ""     ;recommended income - short bonds
(A) $112 ""     ;recommended income - med bonds
(A) $113 ""     ;recommended income - long bonds

(A) $114 "1990"                 ; current year for college uff

(A) $115 "" ;•

(A) $116 ""             ; checking plus limit
(A) $117 ""             ; ready credit limit

(A) $118 "27 Sep 89" ;today's date for printout

(A) $119 "" ;•

;MORTGAGE  CALCULATOR
(A) $120 ""     ;mortgage
(A) $121 ""     ;mortgage
(A) $122 ""     ;mortgage
(A) $123 ""     ;mortgage
(A) $124 ""     ;mortgage
(A) $125 ""     ;mortgage

;TAX RATE  CALCULATOR
(A) $126 "" ;deductions
(A) $127 "" ;filing status
(A) $128 "" ;place of residence

;FLAGS (AND SOME INPUTS)
```

```
        (A) $129 "" ;years to start tuition
        (A) $130 "" ;children yes/no input
        (A) $131 "0" ;children yes/no flag (from $130 by HH) init as 2 (not entered yet)
        (A) $132 "0" ;tuition yes/no flag (from $134)
        (A) $133 "0" ;plan to buy flag (from $6)
        (A) $134 "" ;tuition yes/no input
(A) $135 "" ;•
        (A) $136 "0" ;children has been edited
        (A) $137 "1" ;expenses icon flag
        (A) $138 "0" ;preface flag
        (A) $139 ""  ;ERROR flag?

(A) $140 "" ;•
(A) $141 "" ;•
(A) $142 "" ;•
(A) $143 "" ;•
(A) $144 "" ;•
(A) $145 "" ;•
(A) $146 "" ;•
(A) $147 "" ;•
(A) $148 "" ;•

        (A) $149 "2" ;married? 1=y 0=n 2=blank (from c calc)
        (A) $150 "2" ;homeowner? 1=y 0=n 2=blank (from c calc)
        (A) $151 ""  ;number of exemptions (tax rate calculator)

        (A) $152 ""        ;BANK difference (rec-current)
        (A) $153 ""        ;INCOME difference (rec-current)
        (A) $154 ""        ;GROWTH difference (rec-current)

        (A) $155 ""        ;BANK difference (rec-current) w/out +-
        (A) $156 ""        ;INCOME difference (rec-current) w/out +-
        (A) $157 ""        ;GROWTH difference (rec-current) w/out +-

        (A) $158 "%,n" ;general purpose formatting variable

(A) $159 "" ;•

        (A) $173 "" ;marginal tax rate

        ;GOLDEN BARS - part 1
        (A) $174 "1.0" ;MA fee for golden bars
        (A) $175 "" ;golden bars - edit counter
        (A) $176 "" ;golden bars - which touched
        (A) $177 "" ;golden bars - growth type  1=avg 2=hi-lo
        (A) $178 "" ;golden bars - allocation type 1=current,2=recommended

3=alternate
        (A) $179 "0" ;RECOMMENDATION IS COOKED (from ascan)
        (A) $180 "" ;ERROR condition

        ;GOLDEN BARS - part 2
        (A) $181 "0" ;golden bars - flag: Comparison window is up or down (if it's up di
touch areas )
        (A) $182 "" ;golden bars - alt bank $
        (A) $183 "" ;golden bars - alt income $
        (A) $184 "" ;golden bars - alt growth $
        (A) $185 "" ;golden bars - alt bank %
        (A) $186 "" ;golden bars - alt inc %
        (A) $187 "" ;golden bars - alt gro %

        (A) $188 "" ;recommended income - bond $
        (A) $189 "" ;recommended income - bond %
```

BEST AVAILABLE COPY

BEST AVAILABLE COPY

```
;DATA INPUT LABELS - INITIAL NAMES
(A) $190 "name"
(A) $191 "income"
(A) $192 "assets"
(A) $193 "age"
(A) $194 "marital"
(A) $195 "children"
(A) $196 "home"
(A) $197 "retire"

(A) $198 "0" ;no. of years on HP graph

(A) $199 "0" ;(D) command speed
                ;(default=5000; fast=0; slow= 50000)

;THESE ARE INITIALIZED LOCALLY FOR CERTAIN (Y) COMMANDS
(A) $200 ""             ;vExcelFileName
(A) $201 "0"    ;vNumCharts
(A) $202 "0"    ;vGraphRect
(A) $203 "0"    ;vDataWhitespaceRatio
(A) $204 "0"    ;vHues
(A) $205 "0"    ;vShadowOffset
(A) $206 ""             ;vStockName
(A) $207 "0"    ;vClickSlotNumber

;E.G.
;(A) $200 "text.average.high.low-15.years"      ; vExcelFileName
;(A) $201 "2"                                    ; vNumCharts
;(A) $202 "100 108 325 545"            ; vGraphRect
;(A) $203 "2"                                    ; vDataWhitespaceR.
;(A) $204 "30 20 35 34"                     ; vHues
;(A) $205 "5 5"                                  ; vShadowOffset
;(A) $206 "Intel (INTC)"               ; vStockName
;(A) $207 "2"                                    ; vClickSlotNumber

(A) $208 "" ;buildpie %
(A) $209 "" ;data menu events open?  y/n

(A) $210 "1000000" ; maximum total per asset category
(A) $211 "" ;are assets too much? 1=yes 0=no

(A) $212 "" ;•
(A) $213 "" ;•
(A) $214 "" ;•
(A) $215 "" ;•
(A) $216 "" ;•
(A) $217 "" ;•
(A) $218 "" ;•

(A) $219 "" ;Data menu (open/closed)

;CENTER SCREEN EVENTS
(A) $220 "99" ;BUTTON FLAG
(1=preface,2=your$bars,(3=your$Pie,4=ourRecPie,etc.99=START)
(A) $221 "" ; Button1 flag PREFACE 99=TITLE
(A) $222 "" ; Button2 flag YOURS PIE
(A) $223 "" ; Button3 flag CLEAR   0=clear
(A) $224 "" ; Button4 flag REC PIE
(A) $225 "" ; Button5 flag EDIT BROAD
(A) $226 "" ; Button6 flag GOLD BARS
(A) $227 "" ; Button7 flag BUILD PIE
(A) $228 "" ; Button8 flag HOME UFF
(A) $229 "" ; Button9 flag COLLEGE UFF
```

BEST AVAILABLE COPY

```
        (A) $230 "" ; Button10 flag HP
        (A) $231 "" ; Button11 flag SUMMARY
        (A) $232 "" ; Button12 flag COMPARE PIES
        (A) $233 "" ; Button13 flag

(A) $234 "" ;•
(A) $235 "" ;•
(A) $236 "" ;•

        (A) $237 "" ;A refresh is needed

        ;FLAGS
        (A) $238 "0" ; Hotsheet FLAG
        (A) $239 "0" ; hold for $220 temporarily
        (A) $240 "0" ; Mainmenu FLAG (open/closed)
        (A) $241 "0" ; Mainmenu FLAG (location)
        (A) $242 "0" ; Submenu (which is now opened/closed)
        (A) $243 "0" ; Screen location (by submenu numbers e.g. 61)
        (A) $244 "0" ; DETAIL BANK EDIT has been made
        (A) $245 "0" ; DETAIL BOND EDIT has been made
        (A) $246 "0" ; DETAIL STOCK EDIT has been made
        (A) $247 "0" ; BROAD ButtonEDIT has been made
        (A) $248 "0" ; TABS ARE UP/DOWN
        (A) $249 ""  ; recommendation has been SEEN

(A) $250 "" ;•

        ;CARD FLAGS
        (A) $251 "0" ; CARD FLAG (open/closed) B=5,I=6,G=7
        (A) $252 ""  ;DIALOGUE BOX 1=inc, 2=incbuylist, 3=gro, 4=grobuylist, 5=messa
7=etc.

        ;SUBMENU FLAGS
        (A) $253 "" ;submenu intro flag
        (A) $254 "" ;submenu ask flag
        (A) $255 "" ;submenu build flag
        (A) $256 "" ;submenu show rec flag
        (A) $257 "" ;submenu show outcome flag
        (A) $258 "" ;submenu conclude flag
        (A) $259 "" ;submenu tools flag 1,2,3,4

        (A) $260 "" ; Income summary line
        (A) $261 "" ; Growth summary line
        (A) $262 "" ; Income summary
        (A) $263 "" ; Growth summary

        (A) $264 "0" ;card - Ask 1=bank, 2=income, 3=growth
        (A) $265 "0" ;card - Hotsheet/category
        (A) $266 "0" ;card - buylist
        (A) $267 "0" ;card - int or detail 1,2
        (A) $268 "1" ;stocks or funds (0 = stocks, 1 = funds)

(A) $269 "" ;•
(A) $270 "" ;•
(A) $271 "" ;•
(A) $272 "" ;•

        ;INTER-CHANGE COLOR VARIABLES;(old, new)

        ;csr mainmenu norm to hi
        (A) $273 "(249,247) (252,250) (248,246)"
        ;csr mainmenu norm to low
        (A) $274 "(249,251) (252,253) (248,129) (255,245)"
        ;csr mainmenu hi to low
```

BEST AVAILABLE COPY

```
(A) $275 "(247,251) (250,253) (246,129) (255,245)"
;csr submenu - order for 252 is imp.
(A) $276 " (252,253) (43,252) (246,252) (251,253) (248,252) (254,245)"
;bank tab
(A) $277 "(228,243) (229,241) (231,228)"
;income tab
(A) $278 "(168,192) (162,186) (242,199)"
;growth tab
(A) $279 "(23,16) (16,9) (137,23)"
;csr menu (type)(arrows)
(A) $280 "(129,255) (250,253)"
;csr submenu (type)
(A) $281 "(254,86)"
;nametab
(A) $282 "(11,4)"
;csr mainmenu norm to lo
(A) $283 "(249,252) (252,253) (248,129) (255,245)"
;income det (type)(snip)
(A) $284 "(252,50) (1,2)"
;desktop (grey-for light)
(A) $285 "(249,248)"
;growth card - highlight a line
(A) $286 "(246,0) (43,245)"
;buylist - highlight a line
(A) $287 "(42,245)"

;FLAGS
(A) $288 "0" ; Customer assets entered
(A) $289 "0" ; Demographic data entered
(A) $290 ""  ;general purpose temporary variable

;GOLDEN BARS
(A) $291 "" ;REC LONG $'S
(A) $292 "" ;REC LONG %
(A) $293 "0" ;edit bank %
(A) $294 "0" ;edit income %
(A) $295 "0" ;edit growth %

(A) $296 "" ;•

(A) $297 "" ;RETURN event (misc)
(A) $298 "" ;BACK event
(A) $299 "" ;NEXT event

(A) $300 "" ;•

(A) $301 "" ;Begin time
(A) $302 "" ;vShadow offset
(A) $303 "" ;edited Long $
(A) $304 "" ;rec cash $
(A) $305 "" ;Bond cusip
(A) $306 "" ;Variable file name

(A) $307 "" ;•
(A) $308 "" ;•
(A) $309 "" ;•
(A) $310 "" ;•

(A) $317 "" ;•
(A) $318 "" ;•
(A) $319 "" ;•
(A) $320 "" ;•
(A) $321 "" ;•
```

Money Advice Scan File

BEST AVAILABLE COPY

```
(A) $322 "" ;•
(A) $323 "" ;•
(A) $324 "" ;•
(A) $325 "" ;•
(A) $326 "" ;•
(A) $327 "" ;•
(A) $328 "" ;•
(A) $329 "" ;•

        ;PROMPTS
        (A) $330 "" ;number of prompts
        (A) $331 "" ;prompt 1
        (A) $332 "" ;prompt 2
        (A) $333 "" ;prompt 3
        (A) $334 "" ;prompt 4
        (A) $335 "" ;prompt 5
        (A) $336 "" ;prompt
        (A) $337 "" ;prompt
        (A) $338 "" ;prompt
        (A) $339 "" ;current prompt number
        (A) $340 "" ;number of customer prompts
        (A) $341 "" ;customer prompt 1

(A) $342 "" ;•
(A) $343 "" ;•
(A) $344 "" ;•
(A) $345 "" ;•
(A) $346 "" ;•
(A) $347 "" ;•
(A) $348 "" ;•
(A) $349 "" ;•

(A) $365 "" ;•
(A) $366 "" ;•
(A) $367 "" ;•
(A) $368 "" ;•
(A) $369 "" ;•
(A) $370 "" ;•
(A) $371 "" ;•
(A) $372 "" ;•
(A) $373 "" ;•

        (A) $374 "" ;detail cards - current slot highlit
        (A) $375 "" ;detail cards - current instrument name
        (A) $376 "" ;detail cards - current instrument status 0=exc, 1=buylist, 2=normal
        (A) $377 "" ;detail cards - current instrument glossary index
        (A) $378 "" ;detail cards - buylist # of pages
        (A) $379 "" ;detail cards - buylist current page number
        (A) $380 "" ;detail cards - ERROR condition

(A) $381 "" ;• ; Actual total of MMF $ values, which should add up to the contents of $E
(A) $382 "" ;•    ; Set by (Y) 53: "1" if current bond is an MMF, "0" otherwise
(A) $383 "" ;•
(A) $384 "" ;•
(A) $385 "" ;•
(A) $386 "" ;•
(A) $387 "" ;•
(A) $388 "" ;•
(A) $389 "" ;•

        (A) $390 "" ;temp variable to save prompt while in dialog box  (look for (:) :SAV
        (A) $391 "" ;temp variable to save prompt while in dialog box  (look for (:) :SAV
```

```
(A) $392 "" ;temp variable to save prompt while in dialog box  (look for (:) :SA'

(A) $393 "" ;saves name of last person for whom we did an MIS save.
(A) $394 "" ;•
(A) $395 "" ;•

        (A) $396 "" ;TESTDATA LOADED
        (A) $397 "" ;STARTUP FLAG  1=already loaded, 2=coldstart
        (A) $398 "" ;TRACE FLAG
        (A) $399 "" ;DEBUG FLAG  1=on

(R)


;••••••••••••••••••••••••••••••••••••••••••••••••••••••••••••••••••••••••••••
;       SPECIAL CONSIDERATIONS VARIABLE INITIALIZATION
;       at startup and before MIS re-load
;••••••••••••••••••••••••••••••••••••••••••••••••••••••••••••••••••••••••••••

( )     :INITIALIZE.SPECIAL.VARIABLES

        ;SET SPECIAL CONSIDERATIONS
        (A) $311 "" ;allocation window state      0 = closed; 1 = full; 2 = minimum/ma›
        (A) $312 "" ;confirmation window state   0 = closed; 1 = open
        (A) $313 "" ;edit window state                0 = closed; 1 = open
        (A) $314 "%,n" ;formatted input type
        (A) $315 "" ;note pad number
        (A) $316 "" ;general purpose temporary variable
        ;SPECIAL CONSIDERATIONS
        (A) $350 "" ;CASH MIN
        (A) $351 "" ;CASH MAX
        (A) $352 "" ;CASH NOTE
        (A) $353 "" ;LONG MIN
        (A) $354 "" ;LONG MAX
        (A) $355 "" ;LONG NOTE
        (A) $356 "" ;BANK MIN
        (A) $357 "" ;BANK MAX
        (A) $358 "" ;BANK NOTE
        (A) $359 "" ;INCOME MAX                    NOTE: this is not an error: th‹
min are inconsistent
        (A) $360 "" ;INCOME MIN
        (A) $361 "" ;INCOME NOTE
        (A) $362 "" ;GROWTH MAX
        (A) $363 "" ;GROWTH MIN
        (A) $364 "" ;GROWTH NOTE

(R)


;••••••••••••••••••••••••••••••••••••••••••••••••••••••••••••••••••••••••••••
;       ASSET VARIABLE INITIALIZATION
;       at startup and before MIS re-load
;••••••••••••••••••••••••••••••••••••••••••••••••••••••••••••••••••••••••••••

(:)     :INITIALIZE.ASSET.VARIABLES
        ;YOUR MONEY VALUES
        (A) $10 ""              ;checking
        (A) $11 ""              ;savings
        (A) $12 ""              ;money market savings
        (A) $13 ""              ;•
        (A) $14 ""              ;government bonds
        (A) $15 ""              ;stocks
```

BEST AVAILABLE COPY

BEST AVAILABLE COPY

```
        (A) $16 ""              ;long term CD
        (A) $17 ""              ;*
        (A) $18 ""              ;lines of credit
        (A) $19 ""              ;stock mutual funds
        (A) $20 ""              ;total customer's assets
        (A) $30 ""              ;Corporate Bonds (yours)
        (A) $31 ""              ;Commercial Paper (yours)
        (A) $37 ""              ;government agencies
        (A) $38 ""              ;money market funds
        (A) $39 ""              ;bond funds
        (A) $40 ""              ;municipal bonds

        ;YOUR MONEY - DOLLARS
        (A) $42 ""              ;current bank $
        (A) $43 ""              ;current income $
        (A) $44 ""              ;current growth $

        ;YOUR MONEY - PERCENTAGE
        (A) $45 "0"     ;current bank %
        (A) $46 "0"     ;current income %
        (A) $47 "0"     ;current growth %

        ;CUSTOMER'S CURRENT HOLDINGS FLAGS (NOT AMOUNTS!)
        (A) $160 "0" ;checking
        (A) $161 "0" ;savings
        (A) $162 "0" ;credit
        (A) $163 "0" ;corporate bonds
        (A) $164 "0" ;government bonds
        (A) $165 "0" ;municipal bonds
        (A) $166 "0" ;bond fund
        (A) $167 "0" ;commercial paper
        (A) $168 "0" ;government agencies
        (A) $169 "0" ;money market funds
        (A) $170 "0" ;stocks
        (A) $171 "0" ;stock funds
        (A) $172 "0" ;long CD
(R)

;*******************************************************************************
;       STATE VARIABLE INITIALIZATION
;  (done after MIS information load to start the program from scratch)
;*******************************************************************************

(:) :INITIALIZE.STATE.VARIABLES

        ; this routine initializes only the variables that are used to store the Money Adv

        (A) $33 ""              ;use for last touch

        ;FLAGS (AND SOME INPUTS)

        ;GOLDEN BARS partial
        (A) $176 "" ;golden bars - which touched
        (A) $177 "" ;golden bars - growth type  1=avg 2=hi-lo
        (A) $178 "" ;golden bars - allocation type 1=current,2=recommended
3=alternate
        (A) $179 "0" ;RECOMMENDATION IS COOKED (from ascan)
        (A) $180 "" ;ERROR condition

        (A) $181 "0" ; flag: Comparison window is up or down (if it's up disable bar tou

        (A) $209 "" ;data menu goals open?  y/n
```

BEST AVAILABLE COPY

```
;NOTES
(A) $210 "1000000" ;maximum total per asset category
(A) $219 "" ; DATA MENU (open/closed)

;CENTER SCREEN EVENTS
(A) $220 "99" ;BUTTON FLAG (1=preface,2=your$bars,
                    ; (3=your$Pie,4=ourRecPie,etc.99=START)
(A) $221 "" ; Button1 flag PREFACE 99=TITLE
(A) $222 "" ; Button2 flag YOURS PIE
(A) $223 "" ; Button3 flag CLEAR
(A) $224 "" ; Button4 flag REC PIE
(A) $225 "" ; Button5 flag EDIT BROAD
(A) $226 "" ; Button6 flag GOLD BARS
(A) $227 "" ; Button7 flag BUILD PIE
(A) $228 "" ; Button8 flag HOME UFF
(A) $229 "" ; Button9 flag COLLEGE UFF
(A) $230 "" ; Button10 flag HP
(A) $231 "" ; Button11 flag SUMMARY
(A) $232 "" ; Button12 flag COMPARE PIES
(A) $233 "" ; Button13 flag

;FLAGS
(A) $238 "0" ; Hotsheet FLAG
(A) $239 "0" ; hold for $220 temporarily
(A) $240 "0" ; Mainmenu FLAG (open/closed)
(A) $241 "0" ; Mainmenu FLAG (location)
(A) $242 "0" ; Submenu (which is now opened/closed)
(A) $243 "0" ; Screen location (by submenu numbers e.g. 61)
;(A) $244 "0" ; DETAIL BANK EDIT has been made
;(A) $245 "0" ; DETAIL BOND EDIT has been made
; (A) $246 "0" ; DETAIL STOCK EDIT has been made
(A) $247 "0" ; BROAD ButtonEDIT has been made
(A) $248 "0" ; TABS ARE UP/DOWN
(A) $249 "" ; recommendation has been SEEN
(A) $250 "0" ; CARD STATUS flag   B=5,I=6,G=7
                    ; Int,Detail,Buylist
                    ; (e.g.50100 = Bank, detail is up)
(A) $251 "0" ; CARD FLAG (open/closed) B=5,I=6,G=7

;SUBMENU FLAGS
(A) $253 "" ;submenu intro flag
(A) $254 "" ;submenu ask flag
(A) $255 "" ;submenu build flag
(A) $256 "" ;submenu show rec flag
(A) $257 "" ;submenu show outcome flag
(A) $258 "" ;submenu conclude flag
(A) $259 "" ;submenu tools flag

;
(A) $260 "" ; Income summary line
(A) $261 "" ; Growth summary line
(A) $262 "" ; Income summary
(A) $263 "" ; Growth summary

;FLAGS
(A) $288 "0" ; Customer assets entered
(A) $289 "0" ; Demographic data entered
(A) $290 ""  ;general purpose temporary variable

(A) $298 "" ;BACK event
(A) $299 "" ;NEXT event
```

BEST AVAILABLE COPY

```
        (A) $374 "" ;detail cards - current slot highlit
        (A) $375 "" ;detail cards - current instrument name
        (A) $376 "" ;detail cards - current instrument status
        (A) $377 "" ;detail cards - current instrument glossary index
        (A) $378 "" ;detail cards - buylist # of pages
        (A) $379 "" ;detail cards - buylist current page number
        (A) $380 "" ;detail cards - ERROR condition

        ; special considerations
        stringFormat $311       "0"     ; allocation window state: 0 = closed; 1 = ful
minimum/maximum
        stringFormat $312       "0"     ; confirmation window state: 0 = closed; 1 =
        stringFormat $313       "0"     ; edit window state: 0 = closed; 1 = open

(R)

;*****************************************************************************
;       VARIABLE INITIALIZATION
;  (done after MIS information load to start the program from scratch)
;*****************************************************************************

(:) :INITIALIZE.VARIABLES.AFTER.MIS

        ;this routine initializes only the variables that may change from visit to visit

        (A) $174 "1.0" ;fee percentage either 1.0 or 1.5

(R)


;*****************************************************************************
;START PROGRAM
;*****************************************************************************

(:) :LOAD.MONEY.ADVISOR

                switchCursor WATCH

        ;- set trace for debugging
        ;       trace off
        ;       trace on

        ;- deactivate command keys for release
        ;;;     commandKeys off

        ;- load library for startup
                if $397 = 0             ;if libraries aren't loaded
                        (L) "ATn10.STARTUP.lib"

        ;- show the basic screen background
                (S)*  "n.base.s"
                (S) "n.csr.mainmenu.blnk.s"

        ;- load libraries
                (G) :LOAD.LIBRARIES

        ;- setup variables to be saved by MIS
                (G) :SETUP.MIS.VARIABLES

        ;- initialize variables
                (G) :INITIALIZE.VARIABLES

(:) :START.MONEY.ADVISOR
```

BEST AVAILABLE COPY

```
;- show the basic screen background (for re-start situations)
        (S)* "n.base.s"
        (S) "n.csr.mainmenu.blnk.s"

;- show the title
        (A) $199 "0"
        (D)* 7 "n.title.s"

;- load the touches
        (T)
        (T) $33 "n.base.s" :NEXT

;- do the prompts
        (G) :FILL.PROMPT.0.1      ;csr prompt
        (G) :SHOW.FIRST.PROMPT

;- show copyright
        ;;(Z) 2
        ;;(S) "n.copyright.cust.s"
        ;;(Z) 1
        (S) "n.copyright.s"

;- set flag
        (A) $397 "1" ;libraries loaded

;- set next/back
        (A) $298 "99"
        (A) $299 ":SIGN.IN"
        (G) :SHOW.NEXT.BUTTON

;- wait for touch (at start)
        switchCursor ARROW
        (M)       ;wait
        switchCursor WAIT

;- highlight next arrow
        (I) $273 "n.csr.mainmenu.next.s"

;- clear center
        (S)* "n.center.blnk.s"
        (A) $220 "0"

;- leave
        (J) $33

;******************************************************************************
;LOAD LIBRARIES
;******************************************************************************

(:) :LOAD.LIBRARIES

(H) 20

(S) "n.prompt.s"
(V) "Loading ATn1.MAIN.lib" @472,20
(L) "ATn1.MAIN.lib"
(S) "n.prompt.s"
(V) "Loading ATn2.CARDS.lib" @472,20
(L) "ATn2.CARDS.lib"
(S) "n.prompt.s"
(V) "Loading ATn2a.ASK.lib" @472,20
(L) "ATn2a.ASK.lib"
(S) "n.prompt.s"
(V) "Loading ATn3.CALC.lib" @472,20
```

BEST AVAILABLE COPY

```
(L) "ATn3.CALC.lib"
(S) "n.prompt.s"
(V) "Loading ATn4.PREFACE.lib" ●472,20
(L) "ATn4.PREFACE.lib"
(S) "n.prompt.s"
(V) "Loading ATn5.PIES.lib" ●472,20
(L) "ATn5.PIES.lib"
(S) "n.prompt.s"
(V) "Loading ATn6.PREFACE2.lib" ●472,20
(L) "ATn6.PREFACE2.lib"
(S) "n.prompt.s"
(V) "Loading ATn7.HP.lib" ●472,20
(L) "ATn7.HP.lib"
(S) "n.prompt.s"
(V) "Loading ATn8.CSR.lib" ●472,20
(L) "ATn8.CSR.lib"
(S) "n.prompt.s"
(V) "Loading ATn9.DATAMENU.lib" ●472,20
(L) "ATn9.DATAMENU.lib"
(S) "n.prompt.s"
(V) "Loading ATn11.gold.BARS.lib" ●472,20
(L) "ATn11.GOLD.BARS.lib"
(S) "n.prompt.s"
(V) "Loading ATn12.special.lib" ●472,20
(L) "ATn12.special.lib"
(S) "n.prompt.s"
(V) "Loading ATn13.MISC.lib" ●472,20
(L) "ATn13.MISC.lib"
(S) "n.prompt.s"
(V) "Loading ATn14.JDT.lib" ●472,20
(L) "ATn14.JDT.lib"
(S) "n.prompt.s"
(V) "Libraries are loaded." ●472,20
(R)

;•••••••••••••••••••••••••••••••••••••••••••••••••••••••••••••••••••••••••••••••
;(Y) COMMAND DOCUMENTATION
;•••••••••••••••••••••••••••••••••••••••••••••••••••••••••••••••••••••••••••••••

        ;(Y) 20 process inputs, after personal data input
        ;;(Y) 30 calc l/g split: setup water & bucket variables

        ;(Y) 32   distribute allocation after BIG edit ($105,6,7);
        ;(Y) 34 initialize current-state # in water & bucket vars.

        ;(Y) 40 pick stocks, don't do after variables are edited.
        ;(Y) 41 show stocks , considering edited variables
        ;(Y) 42 show stock categories (interm), considering edited variables

        ;(Y) 50 pick bonds, DON'T do after variables are edited.
        ;(Y) 51 show bonds, considering edited variables
        ;(Y) 52 show bond categories (interm), considering edited variables

        ;(Y) 70 pick bank
        ;(Y) 71 show bank instruments, considering edited variables
        ;(Y) 72 show bank categories (interm), considering edited variables

        ;(Y) 90   recommend pie
        ;(Y) 91   actual pie
        ;(Y) 92   two pies
        ;(Y) 93 Build Pie - avail cash $ vs LT assets
        ;(Y) 94 Build Pie - bank slice
        ;(Y) 95 Build Pie - Bank & MMF slice
        ;(Y) 96 Build Pie - Bank & MMF + LT assets $
```

```
;(Y) 97 Build Pie - I/G split
;(Y) 98 Build Pie - draw 4 slice pie

;(Y) 100 print screen
;(Y) 101 print report
;(Y) 102 data capture
;(Y) 103 dump to screen file

;(Y) 158 accepts value for $207 card slot
;(Y) 159 growth hotsheet pg1
;(Y) 160 growth hotsheet pg2
;(Y) 161 growth hotsheet pg3

;(Y) 162  accepts value for $207 card slot
;(Y) 163 income hotsheet pg1
;(Y) 164 income hotsheet pg2
;(Y) 165 income hotsheet pg3

;(Y) 157 hi-lo golden bars
;(Y) 176 avg golden bars
```

BEST AVAILABLE COPY

```
;*********************************************************************************
;*********************************************************************************
;MAIN WAITING PLACE
;*********************************************************************************
;*********************************************************************************

(:) :MAIN.WAIT

        If $399 = 1
                (G) :DEBUG

        (G) :GET.TOUCHES

(:) :MAIN.WAIT.LOADED

        switchCursor ARROW
        (M)        ;wait
        switchCursor WAIT

(J) $33

;*********************************************************************************
;TOUCHES - MAIN LOGIC
;*********************************************************************************
;level 1

;*
(:) :GET.TOUCHES
        (T)                 ;clear touches
        (K)                 ;clear keystrokes
        ;;(K) 27 :TOGGLE.DEBUG
        ;;(K) 20 :TOGGLE.TRACE

        ;---- exclusive touches ---

        ;*
        (:) :TOUCHES.DIALOGUE.BOX
                If $252 <> 0 ; If a dialogue box is open
                        (J) :GET.TOUCHES.DIALOGUE.BOX ;and don't return

        ;*
```

```
(:) :TOUCHES.SET.SPECIAL
        If $311 <> 0 ;If the specials window is open get the touches
                (J) :GET.TOUCHES.SET.SPECIAL ;and don't return
```

BEST AVAILABLE COPY

```
;---- non-exclusive touches --

;*
(:) :TOUCHES.PROMPT
        If $339 < $330 ;If there are more prompts
                (G) :GET.TOUCHES.PROMPT
;*
(:) :TOUCHES.MAINMENU
        (G) :GET.TOUCHES.MAINMENU
;*
(:) :TOUCHES.SUBMENU
        If $242 > 0 ;If a submenu is open
                (J) :GET.TOUCHES.SUBMENU ;and don't return

;---- non-exclusive touches --

;*
(:) :TOUCHES.DATA.MENU
        If $219 = 1 ;If data menu is open
                (G) :GET.TOUCHES.DATA.MENU
;*
(:) :TOUCHES.NAMETAB
        If $219 = 1 ;If data menu is open
                (G) :GET.TOUCHES.NAMETAB.OPEN

        If $219 = 0 ;If data menu is closed
                (G) :GET.TOUCHES.NAMETAB.CLOSED
;*
(:) :TOUCHES.BIG.TABS
        If $179 = 1 ; If recommendation is cooked
                {
                If $251 = 0 ; If tabs aren't covered by cards
                        (G) :GET.TOUCHES.RECOMMENDATION.TABS
                }
;*
(:) :TOUCHES.CENTER.SCREEN

        If $251 <> 0 ; If a card is open , ask assets handled
                (J) :WHICH.CARD.IS.OPEN

        If $220 <> 0 ; If there is a selection from csr menu active
                (J) :WHICH.MENU.CHOICE.IS.ACTIVE

        If $264 <> 0        ;ask assets, not over a card
                (G) :GET.TOUCHES.ASK.ASSETS

;*
(:) :DONE.WITH.TOUCHES
        (R)

;**************************************************************************
; TOUCHES - SUBLOGIC
;**************************************************************************
;level 2

;*
(:) :GET.TOUCHES.PROMPT
        (T) $33 "n.prompt.cont.s" :SHOW.NEXT.PROMPT
        (R)
```

BEST AVAILABLE COPY

```
;*
( ) :WHICH.CARD.IS.OPEN

        (Q) "$251 = 5" :GET.TOUCHES.BANK.CARD
        (Q) "$251 = 6" :GET.TOUCHES.INCOME.CARD
        (Q) "$251 = 7" :GET.TOUCHES.GROWTH.CARD
        (H) 30
        (V) "FAILED IN WHICH.CARD.IS.OPEN" @400,100

;*
(:) :WHICH.MENU.CHOICE.IS.ACTIVE

        (Q) "$220 = 0" :GET.TOUCHES.BUTTON0.EVENT
        (Q) "$220 = 1" :GET.TOUCHES.BUTTON1.EVENT     ;intro
        (Q) "$220 = 2" :GET.TOUCHES.BUTTON2.EVENT     ;your money pie
        (Q) "$220 = 3" :GET.TOUCHES.BUTTON3.EVENT     ;clear center
        (Q) "$220 = 4" :GET.TOUCHES.BUTTON4.EVENT     ;proposed pie
        ;(Q) "$220 = 5" :GET.TOUCHES.BUTTON5.EVENT    ;edit recommendation
        (Q) "$220 = 61" :GET.TOUCHES.BUTTON6.EVENT    ;golden bars
        (Q) "$220 = 7" :GET.TOUCHES.BUTTON7.EVENT     ;build a pie
        (Q) "$220 = 8" :GET.TOUCHES.BUTTON8.EVENT     ;home calc
        (Q) "$220 = 9" :GET.TOUCHES.BUTTON9.EVENT     ;college calc
        (Q) "$220 = 10" :GET.TOUCHES.BUTTON10.EVENT          ;hp demo
        (Q) "$220 = 11" :GET.TOUCHES.BUTTON11.EVENT          ;summary
        (Q) "$220 = 111" :GET.TOUCHES.BUTTON11.EVENT         ;summary
        (Q) "$220 = 112" :GET.TOUCHES.BUTTON11.EVENT         ;summary
        (Q) "$220 = 113" :GET.TOUCHES.BUTTON11.EVENT         ;summary
        (Q) "$220 = 12" :GET.TOUCHES.BUTTON12.EVENT                 ;compare p

        (H) 30
        (V) "FAILED IN WHICH.BUTTON.IS.ACTIVE" @400,100

;*
(:) :GET.TOUCHES.DIALOGUE.BOX

        (Q) "$252 = 1" :GET.TOUCHES.INC.DIBOX
        (Q) "$252 = 2" :GET.TOUCHES.INC.BUYLIST.DIBOX
        (Q) "$252 = 3" :GET.TOUCHES.GRO.DIBOX
        (Q) "$252 = 4" :GET.TOUCHES.GRO.BUYLIST.DIBOX

                ;*
                (:) :GET.TOUCHES.INC.DIBOX      ; JMG

                        ; If this is a MMF, there is only one choice: 'See Information'
                        if $382 = 1
                        {
                                (T) $33 "n.card.dibox.button1.s" :SEE.INFORMATION.I
                                (T) $33 "n.card.dibox.cancel.s" :REQUEST.CANCEL.INC
                        }

                        else
                        {
                                (T) $33 "n.card.dibox.button1.s" :SEE.INFORMATION.I
                                (T) $33 "n.card.dibox.button2.s" :REMOVE.FROM.INC(
                                (T) $33 "n.card.dibox.button3.s"
:REMOVE.EXCLUDE.FROM.INCOME
                                (T) $33 "n.card.dibox.cancel.s" :REQUEST.CANCEL.INC
                        }
                        (R)

                ;*
                (:) :GET.TOUCHES.INC.BUYLIST.DIBOX
```

BEST AVAILABLE COPY

```
        (T) $33 "n.card.dibox.button1.s" :SEE.INFORMATION.I

    If $376 = 0        ;if excluded
        (T) $33 "n.card.dibox.button3.s" :RESTORE.TO.INCOM
    else
        {
        (T) $33 "n.card.dibox.button2.s" :ADD.TO.INCOME.C/
        (T) $33 "n.card.dibox.button3.s" :EXCLUDE.FROM.INC
        }
    (T) $33 "n.card.dibox.cancel.s" :REQUEST.CANCEL.INC.DIBOX
    (R)

;•
(:) :GET.TOUCHES.GRO.DIBOX

    (T) $33 "n.card.dibox.button1.s" :SEE.INFORMATION.GROWTH
    (T) $33 "n.card.dibox.button2.s" :REMOVE.FROM.GROWTH
    (T) $33 "n.card.dibox.button3.s" :REMOVE.EXCLUDE.FROM.GI
    (T) $33 "n.card.dibox.cancel.s" :REQUEST.CANCEL.GRO.DIBOX
    (R)

;•
(:) :GET.TOUCHES.GRO.BUYLIST.DIBOX

    (T) $33 "n.card.dibox.button1.s" :SEE.INFORMATION.GROWTH

    If $376 = 0                ;if excluded
        (T) $33 "n.card.dibox.button3.s" :RESTORE.TO.GROW
    else
        {
        (T) $33 "n.card.dibox.button2.s" :ADD.TO.GROWTH.C
        (T) $33 "n.card.dibox.button3.s"
:EXCLUDE.FROM.GROWTH.BUYLIST
        }

    (T) $33 "n.card.dibox.cancel.s" :REQUEST.CANCEL.GRO.DIBOX
    (R)

;•••••••••••••••••••••••••••••••••••••••••••••••••••••••••••••••••••••••••••••
;GET TOUCHES FOR MAINMENU
;•••••••••••••••••••••••••••••••••••••••••••••••••••••••••••••••••••••••••••••
;level 1
;•
(:) :GET.TOUCHES.MAINMENU ;which items are active?

    ;- always active
        (G) :GET.TOUCHES.MAINMENU.NEXTBACK
        (G) :GET.TOUCHES.MAINMENU.CLEAR

    ;- if menu is closed
        If $240 = 0
            (R)
    ;- always active
        (G) :GET.TOUCHES.MAINMENU1/2

    ;- If assets are entered
        If $20 > 0
            (G) :GET.TOUCHES.MAINMENU3

    ;- If recommendation is cooked
        If $179 = 1
            (G) :GET.TOUCHES.MAINMENU4/5/6
    ;- leave
```

```
        (R)
```

BEST AVAILABLE COPY

```
;------------------------------------------------------------------
;level 2

        ;*
        (:) :GET.TOUCHES.MAINMENU.CLEAR
                (T) $33 "n.csr.mainmenu.>.s" :CLEAR.CENTER
                (R)

        ;*
        (:) :GET.TOUCHES.MAINMENU1/2

                (T) $33 "n.csr.mainmenu.intro.s" :GO.FROM.MAINMENU.INTRO
                (T) $33 "n.csr.mainmenu.ask.s" :GO.FROM.MAINMENU.ASK
                (T) $33 "n.csr.mainmenu.tools.s" :GO.FROM.MAINMENU.TOOLS
                (R)

        ;*
        (:) :GET.TOUCHES.MAINMENU3
                (T) $33 "n.csr.mainmenu.build.s" :GO.FROM.MAINMENU.BUILD
                (R)

        ;*
        (:) :GET.TOUCHES.MAINMENU4/5/6
                (T) $33 "n.csr.mainmenu.showrec.s" :GO.FROM.MAINMENU.SHOWREC
                (T) $33 "n.csr.mainmenu.showout.s" :GO.FROM.MAINMENU.SHOWOU
                (T) $33 "n.csr.mainmenu.conclude.s" :GO.FROM.MAINMENU.CONCLUI
                (R)

        ;*
        (:) :GET.TOUCHES.MAINMENU.NEXTBACK

                if $299 <> 99     ;if there is a next
                        (T) $33 "n.csr.mainmenu.next.s" :NEXT

                if $298 <> 99     ;if there is a back
                        (T) $33 "n.csr.mainmenu.back.s" :BACK
                (R)

;**************************************************************************
;GET TOUCHES FOR SUBMENU
;**************************************************************************
;level 1

        ;*
        (:) :GET.TOUCHES.SUBMENU

        ;WHICH SUBMENU IS OPEN...
        (Q) "$242 = 1" :GET.TOUCHES.SUBMENU1
        (Q) "$242 = 2" :GET.TOUCHES.SUBMENU2
        (Q) "$242 = 3" :GET.TOUCHES.SUBMENU3
        (Q) "$242 = 4" :GET.TOUCHES.SUBMENU4
        (Q) "$242 = 5" :GET.TOUCHES.SUBMENU5
        (Q) "$242 = 6" :GET.TOUCHES.SUBMENU6
        (Q) "$242 = 7" :GET.TOUCHES.SUBMENU7
        (H) 30
        (V) "FAILED IN GET.TOUCHES.SUBMENU" ●400,100

;****************************************
;level 2

        ;*
```

BEST AVAILABLE COPY

```
(:) :GET.TOUCHES.SUBMENU1
(T) $33 "n.csr.mainmenu.intro.s" :GO.FROM.INTRO.MAIN
(T) $33 "n.csr.submenu.intro1.s" :GO.FROM.INTRO1
(T) $33 "n.csr.submenu.intro2.s" :GO.FROM.INTRO2
(T) $33 "n.csr.submenu.intro3.s" :GO.FROM.INTRO3

        testEmpty $1 ;name empty?
        If $380 = 1 ;if empty
                {
                (A) $380 "0" ;reset
                (T) $33 "n.csr.submenu.intro4.s" :GO.FROM.INTRO4
                }

        testEmpty $9 ;marital empty?
        If $380 = 1 ;if empty
                {
                (A) $380 "0" ;reset
                (T) $33 "n.csr.submenu.intro4.s" :GO.FROM.INTRO4
                (R)
                }

        ;if none of above
        (R)

;*
(:) :GET.TOUCHES.SUBMENU2
(T) $33 "n.csr.mainmenu.ask.s" :GO.FROM.ASK.MAIN
(T) $33 "n.csr.submenu.ask1.s" :GO.FROM.ASK.BANK
(T) $33 "n.csr.submenu.ask2.s" :GO.FROM.ASK.INCOME
(T) $33 "n.csr.submenu.ask3.s" :GO.FROM.ASK.GROWTH
if $20 > 0 ;if assets are entered
        (T) $33 "n.csr.submenu.ask4.s" :GO.FROM.ASK.PIE.CURRENT
(R)

;*
(:) :GET.TOUCHES.SUBMENU3
(T) $33 "n.csr.mainmenu.build.s" :GO.FROM.BUILD.MAIN
(T) $33 "n.csr.submenu.build1.s" :GO.FROM.BUILD1
if $7 <> 0                      ;if income was entered
        {
        if $64 <> $20    ;and if avail cash is not equal to total assets
                (T) $33 "n.csr.submenu.build2.s" :GO.FROM.BUILD2
        }
(R)

;*
(:) :GET.TOUCHES.SUBMENU4
(T) $33 "n.csr.mainmenu.showrec.s" :GO.FROM.SHOWREC.MAIN
(T) $33 "n.csr.submenu.showrec1.s" :GO.FROM.SHOWREC1          ;show p
(T) $33 "n.csr.submenu.showrec2.s" :GO.FROM.SHOWREC2

if $251 <> 5 ;if bank card is not showing
        (T) $33 "n.csr.submenu.showrec3.s" :GO.FROM.SHOWREC3
if $251 <> 6 ;if income card is not showing
        (T) $33 "n.csr.submenu.showrec4.s" :GO.FROM.SHOWREC4
if $251 <> 7 ;if growth card is not showing
        (T) $33 "n.csr.submenu.showrec5.s" :GO.FROM.SHOWREC5

;if $267 = 2 ;if detail card is showing
        ;if $266 = C ;if buylist is not showing
                ;(T) $33 "n.csr.submenu.showrec6.s" :GO.FROM.SHOWREC6 ;l
(R)

;*
```

```
(:) :GET.TOUCHES.SUBMENU5
(T) $33 "n.csr.mainmenu.showout.s" :GO.FROM.SHOWOUT.MAIN
(T) $33 "n.csr.submenu.showout1.s" :GO.FROM.SHOWOUT1        ;show prop
(T) $33 "n.csr.submenu.showout2.s" :GO.FROM.SHOWOUT2        ;show curre
(T) $33 "n.csr.submenu.showout3.s" :GO.FROM.SHOWOUT3        ;show alterr
(R)

;*
(:) :GET.TOUCHES.SUBMENU6
(T) $33 "n.csr.mainmenu.conclude.s" :GO.FROM.CONCLUDE.MAIN
(T) $33 "n.csr.submenu.conclude1.s" :GO.FROM.CONCLUDE1          ;su
(T) $33 "n.csr.submenu.conclude2.s" :GO.FROM.CONCLUDE2          ;ma
(T) $33 "n.csr.submenu.conclude3.s" :GO.FROM.CONCLUDE3          ;pri
(R)

;*
(:) :GET.TOUCHES.SUBMENU7
(T) $33 "n.csr.mainmenu.tools.s" :GO.FROM.TOOLS.MAIN
(T) $33 "n.csr.submenu.tools1.s" :GO.FROM.TOOLS1 ;session notes
(T) $33 "n.csr.submenu.tools2.s" :GO.FROM.TOOLS2 ;special consid
(T) $33 "n.csr.submenu.tools3.s" :GO.FROM.TOOLS3 ;calculator
(T) $33 "n.csr.submenu.tools4.s" :GO.FROM.TOOLS4 ;file update
(T) $33 "n.csr.submenu.tools5.s" :GO.FROM.TOOLS5 ;customer records
(T) $33 "n.csr.submenu.tools6.s" :GO.FROM.TOOLS6 ;restart
(T) $33 "n.csr.submenu.tools7.s" :GO.FROM.TOOLS7 ;quit
(R)

;*************************************************************************
;GET TOUCHES FOR DATA MENU, TABS
;*************************************************************************

;*
(:) :GET.TOUCHES.DATA.MENU

      (T) $33 "n.data.menu.marital.s" :EDIT.MARITAL
      (T) $33 "n.data.menu.income.s" :EDIT.INCOME
      (T) $33 "n.data.menu.child.s" :EDIT.CHILDREN
      (T) $33 "n.data.menu.home.s" :EDIT.HOME
      (T) $33 "n.data.menu.age.s" :EDIT.AGE

      if $209 = 1 ;if events is open
            {
            (T) $33 "n.data.menu.events.s" :MAIN.WAIT
            (T) $33 "n.data.input.events1!.s" :MAIN.WAIT
            (T) $33 "n.data.input.events2!.s" :MAIN.WAIT
            (T) $33 "n.data.input.events3!.s" :MAIN.WAIT
            (K) 13 :EVENTS.FINISHED
            }
      else      ;if events is not open
            (T) $33 "n.data.menu.events.s" :EDIT.EVENTS

      (R)

;*
(:) :GET.TOUCHES.NAMETAB.CLOSED
      (T) $33 "n.tab.name.blnk.s" :EDIT.NAME
      (T) $33 "n.data.menu.tabopen.s" :OPEN.DATA.MENU
      (R)

;*
(:) :GET.TOUCHES.NAMETAB.OPEN
      (T) $33 "n.data.menu.nametab.s" :EDIT.NAME
      (T) $33 "n.data.menu.tabclose.s" :DATA.MENU.CLOSE
      (R)
```

BEST AVAILABLE COPY

```
;*
        (:) :GET.TOUCHES.RECOMMENDATION.TABS
        (T) $33 "n.tab.bank.s" :REQUEST.BANK.REC.INT
        (T) $33 "n.tab.inc.s" :REQUEST.INCOME.REC.INT
        (T) $33 "n.tab.gro.s" :REQUEST.GROWTH.REC.INT
        (R)

;**************************************************************************
;GET TOUCHES FOR BUTTON EVENTS
;**************************************************************************
;the button events

    ;*
    (:) :GET.TOUCHES.BUTTON0.EVENT
        ;none
        (R)

    ;*
    (:) :GET.TOUCHES.BUTTON1.EVENT

        ;WHERE IN THE PREFACE?
        (Q) "$221 = 0" :GET.TOUCHES.PREFACE0
        (Q) "$221 = 1" :GET.TOUCHES.PREFACE1
        (Q) "$221 = 2" :GET.TOUCHES.PREFACE2
        (Q) "$221 = 3" :GET.TOUCHES.PREFACE3
        (Q) "$221 = 31" :GET.TOUCHES.PREFACE31
        (Q) "$221 = 4" :GET.TOUCHES.PREFACE4
        (Q) "$221 = 41" :GET.TOUCHES.PREFACE41
        (Q) "$221 = 5" :GET.TOUCHES.PREFACE5
        (Q) "$221 = 6" :GET.TOUCHES.PREFACE6
        (Q) "$221 = 7" :GET.TOUCHES.PREFACE7
        (H) 30
        (V) "FAILED IN GET.TOUCHES.BUTTON1" ●400,100

    ;*
    (:) :GET.TOUCHES.BUTTON2.EVENT
        ;none
        (R)

    ;*
    (:) :GET.TOUCHES.BUTTON3.EVENT
        ;none
        (R)

    ;*
    (:) :GET.TOUCHES.BUTTON4.EVENT
        ;none
        (R)

    ;*
    (:) :GET.TOUCHES.BUTTON5.EVENT

        ;clear all other touches
        (T)

        (T) $33 "n.tool.revise.bank.s" :EDIT.BROAD.BANK
        (T) $33 "n.tool.revise.income.s" :EDIT.BROAD.INCOME
        (T) $33 "n.tool.revise.growth.s" :EDIT.BROAD.GROWTH
        (T) $33 "n.revise.broad.tabclose.s" :CLOSE.EDIT.BROAD
        (R)

    ;*
```

BEST AVAILABLE COPY

```
(:) :GET.TOUCHES.BUTTON6.EVENT
            if $293 = 1
                (J) :PERCENT.ONLY
            else
            if $294 = 1
                (J) :PERCENT.ONLY
            else
            if $295 = 1
                (J) :PERCENT.ONLY

        if $181 = 0        ; comparison window is not visible, so allow most tou(
            {
            (T) $33 "n.portfolio.bartab.s" :BARTAB3
            if $178 = 2
                (T) $33 "n.proposed.bartab.s" :BARTAB1
            else
            if $178 = 1
                (T) $33 "n.current.bartab.s" :BARTAB2
            else
            if $178 = 3
                (T) $33 "n.other.bartab.s" :BARTAB3

            (T) $33 "n.average.bartab.s" :AVERAGE
            (T) $33 "n.range.bartab.s" :RANGE
            (T) $33 "n.bartabclose.s" :CLOSE.BARS

            ; allow editing of percentages only if we are in 'other allocatio
            if $178 = 3
                {
                (T) $33 "n.%bank.bar.s" :EDIT.OTHER.BANK%
                (T) $33 "n.%income.bar.s" :EDIT.OTHER.INCOME%
                (T) $33 "n.%growth.bar.s" :EDIT.OTHER.GROWTH%
                }

            ; don't enable the bars if we're in 'other allocation'
            ; and nothing has been entered, otherwise enable all of them
            ; (a trick: if all of the 'other allocation' percentages add to 0, a
            ;  we are editing 'other' ($178 = 3) the total of all four is 3)
            $290 := $178 + $185 + $186 + $187
            if $290 <> 3
                {
                (T) $33 "n.bar1.s" :1BUTTON.BAR.LABEL
                (T) $33 "n.bar2.s" :2BUTTON.BAR.LABEL
                (T) $33 "n.bar3.s" :3BUTTON.BAR.LABEL
                (T) $33 "n.bar4.s" :4BUTTON.BAR.LABEL
                (T) $33 "n.bar5.s" :5BUTTON.BAR.LABEL
                (T) $33 "n.bar6.s" :6BUTTON.BAR.LABEL
                (T) $33 "n.bar7.s" :7BUTTON.BAR.LABEL
                (T) $33 "n.bar8.s" :8BUTTON.BAR.LABEL
                (T) $33 "n.bar9.s" :9BUTTON.BAR.LABEL
                (T) $33 "n.bar10.s" :10BUTTON.BAR.LABEL
                (T) $33 "n.bar11.s" :11BUTTON.BAR.LABEL
                (T) $33 "n.bar12.s" :12BUTTON.BAR.LABEL
                (T) $33 "n.bar13.s" :13BUTTON.BAR.LABEL
                (T) $33 "n.bar14.s" :14BUTTON.BAR.LABEL
                (T) $33 "n.bar15.s" :15BUTTON.BAR.LABEL
                }
            }
        else        ; comparison window IS visible, so the only live touches are the
the close
        if $181 = 1
                {
                if $177 = 2  ; comparison window has range up so fee
touchable
```

BEST AVAILABLE COPY

```
                    {
CLOSE.COMPARISON.WINDOW  (T) $33  "n.bar.chart.det.tabclose.s"
                    }
              else
                    {
CLOSE.COMPARISON.WINDOW  (T) $33  "n.bar.chart.det.tabclose.s"
                    (T) $33  "n.bar.chart.pro.det.s":SHOW.FEE.OR.NOT
              }
          }
    (R)

    (:) :PERCENT.ONLY
          (T)
          ; allow editing of percentages only if we are in 'other allocatio
          if $178 = 3
                {
                (T) $33 "n.%bank.bar.s" :EDIT.BANK%
                (T) $33 "n.%income.bar.s" :EDIT.INCOME%
                (T) $33 "n.%growth.bar.s" :EDIT.GROWTH%
                }
    (R)
;*
(:) :GET.TOUCHES.BUTTON7.EVENT

    ;WHERE IN BUTTON7?
    (Q) "$227 = 4" :GET.TOUCHES.BUTTON7.4
    (Q) "$227 = 404" :GET.TOUCHES.BUTTON7.404
    (Q) "$227 = 405" :GET.TOUCHES.BUTTON7.405
    (Q) "$227 = 5" :GET.TOUCHES.BUTTON7.5
    (Q) "$227 = 51" :GET.TOUCHES.BUTTON7.51
    (Q) "$227 = 52" :GET.TOUCHES.BUTTON7.52
    (Q) "$227 = 53" :GET.TOUCHES.BUTTON7.53
    (Q) "$227 = 6" :GET.TOUCHES.BUTTON7.6
    (R)

;*
(:) :GET.TOUCHES.BUTTON8.EVENT
    ;none
    (R)

;*
(:) :GET.TOUCHES.BUTTON9.EVENT
    ;none
    (R)

;*
(:) :GET.TOUCHES.BUTTON10.EVENT

    ;WHERE IN BUTTON10?
    ;stringFormat $290 ":GET.TOUCHES.BUTTON10.%n" $230
    ;(J) $290

    (Q) "$230 = 1" :GET.TOUCHES.BUTTON10.1
    (Q) "$230 = 2" :GET.TOUCHES.BUTTON10.2
    (Q) "$230 = 3" :GET.TOUCHES.BUTTON10.3
    (Q) "$230 = 4" :GET.TOUCHES.BUTTON10.4
    (Q) "$230 = 5" :GET.TOUCHES.BUTTON10.5
    (Q) "$230 = 6" :GET.TOUCHES.BUTTON10.6
    (Q) "$230 = 7" :GET.TOUCHES.BUTTON10.7
    (Q) "$230 = 8" :GET.TOUCHES.BUTTON10.8
    (Q) "$230 = 81" :GET.TOUCHES.BUTTON10.81
    (Q) "$230 = 82" :GET.TOUCHES.BUTTON10.82
```

```
(Q) "$230 = 83" :GET.TOUCHES.BUTTON10.83
(Q) "$230 = 9" :GET.TOUCHES.BUTTON10.9
(Q) "$230 = 13" :GET.TOUCHES.BUTTON10.13
(H) 30
(V) "FAILED IN GET.TOUCHES.BUTTON10" ●400,100
```

BEST AVAILABLE COPY

```
;•
(:) :GET.TOUCHES.BUTTON11.EVENT
        (T) $33 "n.summary.button1.s" :SUMMARY.PG1
        (T) $33 "n.summary.button2.s" :SUMMARY.PG2
        (T) $33 "n.summary.button3.s" :SUMMARY.PG3
        (T) $33 "n.summary.tabclose.s" :CLOSE.SUMMARY
        (R)

;•
(:) :GET.TOUCHES.BUTTON12.EVENT
        ;none
        (R)


        (H) 30
        (V) "FAILED IN GET.TOUCHES.BUTTON EVENT" ●400,100

;••••••••••••••••••••••••••••••••••••••••••••••••••••••••••••••••••••••••••••••
. GET TOUCHES BUTTON1 - PREFACE
;••••••••••••••••••••••••••••••••••••••••••••••••••••••••••••••••••••••••••••••

;•
(:) :GET.TOUCHES.PREFACE0  ;title
;none
(R)

;•
(:) :GET.TOUCHES.PREFACE1
(T) $33 "n.preface.sea.ck.s" :ACCEPT.SEA.CHECKING
(T) $33 "n.preface.sea.saving.s" :ACCEPT.SEA.SAVING
(T) $33 "n.preface.sea.credit.s" :ACCEPT.SEA.CREDIT
(T) $33 "n.preface.sea.govtB.s" :ACCEPT.SEA.GOVTB
(T) $33 "n.preface.sea.bondfund.s" :ACCEPT.SEA.BONDFUND
(T) $33 "n.preface.sea.muniB.s" :ACCEPT.SEA.MUNIB
(T) $33 "n.preface.sea.corpB.s" :ACCEPT.SEA.CORPB
(T) $33 "n.preface.sea.govtAg.s" :ACCEPT.SEA.GOVTAG
(T) $33 "n.preface.sea.C/paper.s" :ACCEPT.SEA.C/PAPER
(T) $33 "n.preface.sea.$mktfund.s" :ACCEPT.SEA.MMF
(T) $33 "n.preface.sea.stock.s" :ACCEPT.SEA.STOCK
(T) $33 "n.preface.sea.stkfund.s" :ACCEPT.SEA.STKFUND
(R)

;•
(:) :GET.TOUCHES.PREFACE2
(T) $33 "n.preface.tidy.ck.s" :ACCEPT.TIDY.CHECKING
(T) $33 "n.preface.tidy.saving.s" :ACCEPT.TIDY.SAVINGS
(T) $33 "n.preface.tidy.credit.s" :ACCEPT.TIDY.CREDIT
(T) $33 "n.preface.tidy.govtB.s" :ACCEPT.TIDY.GOVTB
(T) $33 "n.preface.tidy.bondfund.s" :ACCEPT.TIDY.BONDFUND
(T) $33 "n.preface.tidy.muniB.s" :ACCEPT.TIDY.MUNIB
(T) $33 "n.preface.tidy.corpB.s" :ACCEPT.TIDY.CORPB
(T) $33 "n.preface.tidy.C/paper.s" :ACCEPT.TIDY.C/PAPER
(T) $33 "n.preface.tidy.$mktfund.s" :ACCEPT.TIDY.MMF
(T) $33 "n.preface.tidy.stock.s" :ACCEPT.TIDY.STOCK
(T) $33 "n.preface.tidy.stkfund.s" :ACCEPT.TIDY.STKFUND
(R)
```

```
;*
(:) :GET.TOUCHES.PREFACE3
(R)

;*
(:) :GET.TOUCHES.PREFACE31
(R)

;*
(:) :GET.TOUCHES.PREFACE4
(R)

;*
(:) :GET.TOUCHES.PREFACE41
(R)

;*
(:) :GET.TOUCHES.PREFACE5
(R)

;*
(:) :GET.TOUCHES.PREFACE6
(R)

;*
(:) :GET.TOUCHES.PREFACE7
(R)

;**************************************************************************
; GET TOUCHES BUTTON7 - BUILD PIE
;**************************************************************************

;*
(:) :GET.TOUCHES.BUTTON7.1
(R)

;*
(:) :GET.TOUCHES.BUTTON7.3
(R)

;*
(:) :GET.TOUCHES.BUTTON7.31

;IF INCOME NOT ENTERED
(Q) "$7 > 0" :GET.TOUCHES.BUTTON7.31a
(R)

;IF INCOME ENTERED
(:) :GET.TOUCHES.BUTTON7.31a
(R)

;*
(:) :GET.TOUCHES.BUTTON7.4
(R)

;*
(:) :GET.TOUCHES.BUTTON7.404
(R)

;*
(:) :GET.TOUCHES.BUTTON7.405
(R)
```

BEST AVAILABLE COPY

BEST AVAILABLE COPY

```
;•
(:) :GET.TOUCHES.BUTTON7.41
(R)

;•
(:) :GET.TOUCHES.BUTTON7.42
(R)

;•
(:) :GET.TOUCHES.BUTTON7.5
(T) $33 "n.bar.choice.retire!.s" :BUTTON7.51
(T) $33 "n.bar.choice.college!.s" :BUTTON7.52
(T) $33 "n.bar.choice.home!.s" :BUTTON7.53
(R)

    ;•
    (:) :GET.TOUCHES.BUTTON7.51
    (T) $33 "n.bar.retire.title.s" :CLOSE.BAR.RETIRE
    (T) $33 "n.bar.retire.1/9!.s" :RETIRE.1/9
    (T) $33 "n.bar.retire.2/8!.s" :RETIRE.2/8
    (T) $33 "n.bar.retire.3/7!.s" :RETIRE.3/7
    (T) $33 "n.bar.retire.4/6!.s" :RETIRE.4/6
    (T) $33 "n.bar.retire.5/5!.s" :RETIRE.5/5
    (T) $33 "n.bar.retire.6/4!.s" :RETIRE.6/4
    (T) $33 "n.bar.retire.7/3!.s" :RETIRE.7/3
    (T) $33 "n.bar.retire.8/2!.s" :RETIRE.8/2
    (T) $33 "n.bar.retire.9/1!.s" :RETIRE.9/1
    (R)

    ;•
    (:) :GET.TOUCHES.BUTTON7.52
    (T) $33 "n.bar.college.title.s" :CLOSE.BAR.COLLEGE
    (T) $33 "n.bar.college.3/7!.s" :COLLEGE.3/7
    (T) $33 "n.bar.college.4/6!.s" :COLLEGE.4/6
    (T) $33 "n.bar.college.5/5!.s" :COLLEGE.5/5
    (T) $33 "n.bar.college.6/4!.s" :COLLEGE.6/4
    (T) $33 "n.bar.college.7/3!.s" :COLLEGE.7/3
    (R)

    ;•
    (:) :GET.TOUCHES.BUTTON7.53
    (T) $33 "n.bar.home.title.s" :CLOSE.BAR.HOME
    (T) $33 "n.bar.home.yes!.s" :HOME.YES
    (T) $33 "n.bar.home.no!.s" :HOME.NO
    (R)

    ;•
    (:) :GET.TOUCHES.BUTTON7.6
    (R)

;• ERROR MESSAGE
(H) 10
(V) "ERROR IN END TOUCHES BUTTON7" ●200,240

;••••••••••••••••••••••••••••••••••••••••••••••••••••••••••••••••••••••••••••••
; GET TOUCHES BUTTON10 - HP IN PREFACE
;••••••••••••••••••••••••••••••••••••••••••••••••••••••••••••••••••••••••••••••

  ;•
  (:) :GET.TOUCHES.BUTTON10.1
```

```
;(T) $33 "n.graph.hp.lt.date.74.s" :BUTTON10.10
(R)

;•
(:) :GET.TOUCHES.BUTTON10.2
;(T) $33 "n.graph.hp.lt.date.74.s" :BUTTON10.10
(R)

;•
(:) :GET.TOUCHES.BUTTON10.3
;(T) $33 "n.graph.hp.lt.date.74.s" :BUTTON10.10
(R)

;•
(:) :GET.TOUCHES.BUTTON10.4
;(T) $33 "n.graph.hp.lt.date.74.s" :BUTTON10.10
(R)

;•
(:) :GET.TOUCHES.BUTTON10.5
;(T) $33 "n.graph.hp.lt.date.74.s" :BUTTON10.10
(R)

;•
(:) :GET.TOUCHES.BUTTON10.6
;(T) $33 "n.graph.hp.lt.date.74.s" :BUTTON10.10
(R)

;•
(:) :GET.TOUCHES.BUTTON10.7 ;15yr b.i.g. graph
;(T) $33 "n.graph.hp.dates.15yr.s" :BUTTON10.8
;(T) $33 "n.graph.hp.lt.date.74.s" :BUTTON10.10
(R)

;•
(:) :GET.TOUCHES.BUTTON10.8 ;open 1yr card
;(T) $33 "n.graph.hp.75!.s" :HP.1YR.75
;(T) $33 "n.graph.hp.76!.s" :HP.1YR.76
;(T) $33 "n.graph.hp.77!.s" :HP.1YR.77
;(T) $33 "n.graph.hp.78!.s" :HP.1YR.78
;(T) $33 "n.graph.hp.79!.s" :HP.1YR.79
;(T) $33 "n.graph.hp.80!.s" :HP.1YR.80
;(T) $33 "n.graph.hp.81!.s" :HP.1YR.81
;(T) $33 "n.graph.hp.82!.s" :HP.1YR.82
;(T) $33 "n.graph.hp.83!.s" :HP.1YR.83
;(T) $33 "n.graph.hp.84!.s" :HP.1YR.84
;(T) $33 "n.graph.hp.85!.s" :HP.1YR.85
;(T) $33 "n.graph.hp.86!.s" :HP.1YR.86
;(T) $33 "n.graph.hp.87!.s" :HP.1YR.87
;(T) $33 "n.graph.hp.88!.s" :HP.1YR.88

;(T) $33 "n.graph.hp.lt.date.74.s" :BUTTON10.10
;(T) $33 "n.graph.hp.1yr.close.s" :BUTTON10.9
(R)

;•
(:) :GET.TOUCHES.BUTTON10.81 ;open 1yr card
;(T) $33 "n.graph.hp.lt.date.74.s" :BUTTON10.10
;(T) $33 "n.graph.hp.1yr.close.s" :BUTTON10.9
(R)

;•
(:) :GET.TOUCHES.BUTTON10.82 ;open 1yr card
;(T) $33 "n.graph.hp.lt.date.74.s" :BUTTON10.10
```

BEST AVAILABLE COPY

BEST AVAILABLE COPY

```
;(T) $33 "n.graph.hp.1yr.close.s" :BUTTON10.9
(R)

;*
(:) :GET.TOUCHES.BUTTON10.83 ;open 1yr card
;(T) $33 "n.graph.hp.lt.date.74.s" :BUTTON10.10
;(T) $33 "n.graph.hp.1yr.close.s" :BUTTON10.9
(R)

;*
(:) :GET.TOUCHES.BUTTON10.9  ;open 30 year b.i.g.graph
;(T) $33 "n.graph.hp.lt.date.59.s" :BUTTON10.12
(R)

;*
(:) :GET.TOUCHES.BUTTON10.13 ;15yr b.i.g. graph
;(T) $33 "n.graph.hp.dates.15yr.s" :BUTTON10.8
;(T) $33 "n.graph.hp.lt.date.74.s" :BUTTON10.10
(R)

        ;* ERROR MESSAGE
        (H) 10
        (V) "ERROR: END TOUCHES BUTTON10" @200,240

;**************************************************************************
;GET TOUCHES - BANK CARD
;**************************************************************************
;level 1

;*
( ) :GET.TOUCHES.BANK.CARD

        (T) $33 "n.tabup.bank.s" :REQUEST.BANK.CARD.CLOSE

        ;WHAT'S OPEN...
        (Q) "$264 <> 0" :GET.TOUCHES.ASK.ASSETS
        (Q) "$267 = 1" :GET.TOUCHES.BANK.INT
        (Q) "$267 = 2" :GET.TOUCHES.BANK.DET
        ;
        END TOUCHES BANK CARD

;------------------------------------------------------------------------
;level 2

    ;*
    (:) :GET.TOUCHES.BANK.INT

            (T) $33 "n.bank.card.tabswitch.s" :REQUEST.BANK.REC.DET
            (G) :GET.TOUCHES.BANK.INT.LINES
            ;;(G) :GET.TOUCHES.BANK.EDIT.INT
            (R)

    ;*
    (:) :GET.TOUCHES.BANK.DET

            (T) $33 "n.bank.card.tabswitch.s" :REQUEST.BANK.REC.INT
            (G) :GET.TOUCHES.BANK.LINES
            (G) :GET.TOUCHES.BANK.EDIT.AMOUNT
            (R)

            ;----------------------------------------------------------
```

BEST AVAILABLE COPY

```
;*
(:) :GET.TOUCHES.BANK.EDIT.INT
        ;nothing here
        (R)

;*
(:) :GET.TOUCHES.BANK.EDIT.AMOUNT

        ;(T) $33 "n.bank.line0.$.s" @133,241 :EDIT.BANK.REC.LINE0
        (T) $33 "n.bank.line0.$.s" @149,241 :EDIT.BANK.REC.LINE1
        (T) $33 "n.bank.line0.$.s" @165,241 :EDIT.BANK.REC.LINE2
        (T) $33 "n.bank.line0.$.s" @181,241 :EDIT.BANK.REC.LINE3
        ;(T) $33 "n.bank.line0.$.s" @197,241 :EDIT.BANK.REC.LINE4
        (T) $33 "n.bank.line0.$.s" @213,241 :EDIT.BANK.REC.LINE5
        (T) $33 "n.bank.line0.$.s" @229,241 :EDIT.BANK.REC.LINE6
        ;(T) $33 "n.bank.line0.$.s" @245,241 :EDIT.BANK.REC.LINE7
        ;(T) $33 "n.bank.line0.$.s" @261,241 :EDIT.BANK.REC.LINE8
        ;(T) $33 "n.bank.line0.$.s" @277,241 :EDIT.BANK.REC.LINE9
        ;(T) $33 "n.bank.line0.$.s" @293,241 :EDIT.BANK.REC.LINE10
        (T) $33 "n.bank.line0.$.s" @309,241 :EDIT.BANK.REC.LINE11
        (T) $33 "n.bank.line0.$.s" @325,241 :EDIT.BANK.REC.LINE12
        (T) $33 "n.bank.line0.$.s" @341,241 :EDIT.BANK.REC.LINE13
        ;(T) $33 "n.bank.line0.$.s" @355,241 :EDIT.BANK.REC.LINE14
        ;(T) $33 "n.bank.line0.$.s" @371,241 :EDIT.BANK.REC.LINE15
        ;(T) $33 "n.bank.line0.$.s" @387,241 :EDIT.BANK.REC.LINE16
        (R)

;*
(:) :GET.TOUCHES.BANK.LINES

        (T) $33 "n.rec.inc.line0.s" @133,060 :BANK.CARD.LINE0
        (T) $33 "n.rec.inc.line0.s" @149,060 :BANK.CARD.LINE1
        (T) $33 "n.rec.inc.line0.s" @165,060 :BANK.CARD.LINE2
        (T) $33 "n.rec.inc.line0.s" @181,060 :BANK.CARD.LINE3
        (T) $33 "n.rec.inc.line0.s" @197,060 :BANK.CARD.LINE4
        (T) $33 "n.rec.inc.line0.s" @213,060 :BANK.CARD.LINE5
        (T) $33 "n.rec.inc.line0.s" @229,060 :BANK.CARD.LINE6
        (T) $33 "n.rec.inc.line0.s" @245,060 :BANK.CARD.LINE7
        (T) $33 "n.rec.inc.line0.s" @261,060 :BANK.CARD.LINE8
        (T) $33 "n.rec.inc.line0.s" @277,060 :BANK.CARD.LINE9
        (T) $33 "n.rec.inc.line0.s" @293,060 :BANK.CARD.LINE10
        (T) $33 "n.rec.inc.line0.s" @309,060 :BANK.CARD.LINE11
        (T) $33 "n.rec.inc.line0.s" @325,060 :BANK.CARD.LINE12
        (T) $33 "n.rec.inc.line0.s" @341,060 :BANK.CARD.LINE13
        (T) $33 "n.rec.inc.line0.s" @355,060 :BANK.CARD.LINE14
        (T) $33 "n.rec.inc.line0.s" @371,060 :BANK.CARD.LINE15
        (T) $33 "n.rec.inc.line0.s" @387,060 :BANK.CARD.LINE16

        (R)

;*
(:) :GET.TOUCHES.BANK.INT.LINES

        ;(T) $33 "n.rec.inc.line0.s" @133,060 :BANK.CARD.LINE0
        ;(T) $33 "n.rec.inc.line4.s" @197,060 :BANK.CARD.LINE4
        ;(T) $33 "n.rec.inc.line9.s" @277,060 :BANK.CARD.LINE9
        ;(T) $33 "n.rec.inc.line13.s" @341,060 :BANK.CARD.LINE13
        (R)

;*****************************************************************************
;TOUCHES - INCOME CARD
;*****************************************************************************
;level 1
```

BEST AVAILABLE COPY

```
;GET.TOUCHES.INCOME.CARD

        (T) $33 "n.tabup.inc.s" :REQUEST.INCOME.CARD.CLOSE

        ;WHAT'S OPEN...
        (Q) "$264 <> 0" :GET.TOUCHES.ASK.ASSETS
        (Q) "$265 <> 0" :GET.TOUCHES.INCOME.HOTSHEET
        (Q) "$266 <> 0" :GET.TOUCHES.INCOME.BUYLIST
        (Q) "$267 = 1" :GET.TOUCHES.INCOME.INT
        (Q) "$267 = 2" :GET.TOUCHES.INCOME.DET
        END GET TOUCHES INCOME CARD

;-----------------------------------------------------------------
;level 2

        ;•
        (:) :GET.TOUCHES.INCOME.HOTSHEET
                (T) $33 "n.hotsheet.inc.button1.s" :HOTSHEET.INCOME.PAGE.1
                (T) $33 "n.hotsheet.inc.button2.s" :HOTSHEET.INCOME.PAGE.2
                ;(T) $33 "n.hotsheet.inc.button3.s" :HOTSHEET.INCOME.PAGE.3
                (T) $33 "n.hotsheet.inc.tabclose.s" :CLOSE.HOTSHEET.INC
                (R)

        ;•
        (:) :GET.TOUCHES.INCOME.BUYLIST

                (T) $33 "n.buylist.tabclose.s" :REQUEST.CLOSE.INCOME.BUYLIST
                (G) :GET.TOUCHES.INCOME.BUYLIST.PGTURN
                (G) :GET.TOUCHES.INC.BUYLIST.LINES
                (R)

        ;•
        (:) :GET.TOUCHES.INCOME.INT

                (T) $33 #116,349,131,392 :INCOME.CARD.LINE105
                (T) $33 #116,393,131,424 :INCOME.CARD.LINE106
                (T) $33 #116,425,131,492 :INCOME.CARD.LINE107
                (T) $33 #116,493,131,539 :INCOME.CARD.LINE108
                (T) $33 #116,540,131,583 :INCOME.CARD.LINE109
                (T) $33 "n.inc.card.tabswitch.s" :REQUEST.INCOME.REC.DET
                (G) :GET.TOUCHES.INCOME.INT.LINES
                ;;(G) :GET.TOUCHES.INCOME.EDIT.INT
                (R)

        ;•
        (:) :GET.TOUCHES.INCOME.DET

                (T) $33 "n.buylist.tabopen.s" :REQUEST.INCOME.BUYLIST
                (T) $33 "n.inc.card.tabswitch.s" :REQUEST.INCOME.REC.INT   ; .CHECK
                (G) :GET.TOUCHES.INCOME.LINES
                (G) :GET.TOUCHES.INCOME.EDIT.SHARES
                (R)

                ;-----------------------------------------------------------
                ;level 3

                ;•
                (:) :GET.TOUCHES.INCOME.BUYLIST.PGTURN

                        ;HOW MANY PAGES?
                        if $378 = 1
```

BEST AVAILABLE COPY

```
            (R)

        If $378 = 2
            {
            if $379 = 1
                {
                (T) $33 "n.buylist.pg12.2!.s" :REQUEST.INC.BU'
                }
            if $379 = 2
                {
                (T) $33 "n.buylist.pg12.1!.s" :REQUEST.INC.BU'
                }
            }

        if $378 = 3
            {
            if $379 = 1
                {
REQUEST.INC.BUYLIST.PAGE2       (T) $33 "n.buylist.pg123.2!.s"

REQUEST.INC.BUYLIST.PAGE3       (T) $33 "n.buylist.pg123.3!.s"

                }
            if $379 = 2
                {
:REQUEST.INC.BUYLIST.PAGE1      (T) $33 "n.buylist.pg123.1!.s"

:REQUEST.INC.BUYLIST.PAGE3      (T) $33 "n.buylist.pg123.3!.s"

                }
            if $379 = 3
                {
:REQUEST.INC.BUYLIST.PAGE1      (T) $33 "n.buylist.pg123.1!.s"

:REQUEST.INC.BUYLIST.PAGE2      (T) $33 "n.buylist.pg123.2!.s"

                }
            }
            ;RETURN
            (R)

    ;*
    (:) :GET.TOUCHES.INCOME.EDIT.INT

        ;NOTHING HERE

        (R)

    ;*
    (:) :GET.TOUCHES.INCOME.EDIT.SHARES

        (T) $33 "n.inc.line0.$.s" :EDIT.INCOME.REC.LINE0
        (T) $33 "n.inc.line1.$.s" :EDIT.INCOME.REC.LINE1
        (T) $33 "n.inc.line2.$.s" :EDIT.INCOME.REC.LINE2
        (T) $33 "n.inc.line3.$.s" :EDIT.INCOME.REC.LINE3
        (T) $33 "n.inc.line4.$.s" :EDIT.INCOME.REC.LINE4
        (T) $33 "n.inc.line5.$.s" :EDIT.INCOME.REC.LINE5
        (T) $33 "n.inc.line6.$.s" :EDIT.INCOME.REC.LINE6
        (T) $33 "n.inc.line7.$.s" :EDIT.INCOME.REC.LINE7
        (T) $33 "n.inc.line8.$.s" :EDIT.INCOME.REC.LINE8
        (T) $33 "n.inc.line9.$.s" :EDIT.INCOME.REC.LINE9
        (T) $33 "n.inc.line10.$.s" :EDIT.INCOME.REC.LINE10
        (T) $33 "n.inc.line11.$.s" :EDIT.INCOME.REC.LINE11
        (T) $33 "n.inc.line12.$.s" :EDIT.INCOME.REC.LINE12
```

BEST AVAILABLE COPY

```
(T) $33 "n.inc.line13.$.s" :EDIT.INCOME.REC.LINE13
(T) $33 "n.inc.line14.$.s" :EDIT.INCOME.REC.LINE14
(T) $33 "n.inc.line15.$.s" :EDIT.INCOME.REC.LINE15
(R)

;*
(:) :GET.TOUCHES.INCOME.LINES

    (T) $33 "n.rec.inc.line0.s" :INCOME.CARD.LINE0
    (T) $33 "n.rec.inc.line1.s" :INCOME.CARD.LINE1
    (T) $33 "n.rec.inc.line2.s" :INCOME.CARD.LINE2
    (T) $33 "n.rec.inc.line3.s" :INCOME.CARD.LINE3
    (T) $33 "n.rec.inc.line4.s" :INCOME.CARD.LINE4
    (T) $33 "n.rec.inc.line5.s" :INCOME.CARD.LINE5
    (T) $33 "n.rec.inc.line6.s" :INCOME.CARD.LINE6
    (T) $33 "n.rec.inc.line7.s" :INCOME.CARD.LINE7
    (T) $33 "n.rec.inc.line8.s" :INCOME.CARD.LINE8
    (T) $33 "n.rec.inc.line9.s" :INCOME.CARD.LINE9
    (T) $33 "n.rec.inc.line10.s" :INCOME.CARD.LINE10
    (T) $33 "n.rec.inc.line11.s" :INCOME.CARD.LINE11
    (T) $33 "n.rec.inc.line12.s" :INCOME.CARD.LINE12
    (T) $33 "n.rec.inc.line13.s" :INCOME.CARD.LINE13
    (T) $33 "n.rec.inc.line14.s" :INCOME.CARD.LINE14
    (T) $33 "n.rec.inc.line15.s" :INCOME.CARD.LINE15
    (T) $33 "n.rec.inc.line16.s" :INCOME.CARD.LINE16

    if $267 = 1
            (R)

    (T) $33 #116,349,131,392 :INCOME.CARD.LINE105
    (T) $33 #116,393,131,424 :INCOME.CARD.LINE106
    (T) $33 #116,425,131,492 :INCOME.CARD.LINE107
    (T) $33 #116,493,131,539 :INCOME.CARD.LINE108
    (T) $33 #116,540,131,583 :INCOME.CARD.LINE109
    (R)

;*
(:) :GET.TOUCHES.INCOME.INT.LINES

    (T) $33 "n.rec.inc.line0.s" :INCOME.CARD.LINE0
    (T) $33 "n.rec.inc.line3.s" :INCOME.CARD.LINE3
    (T) $33 "n.rec.inc.line6.s" :INCOME.CARD.LINE6
    (T) $33 "n.rec.inc.line9.s" :INCOME.CARD.LINE9
    (R)

;*
(:) :GET.TOUCHES.INC.BUYLIST.LINES

    (T) $33 "n.inc.buylist.line.s" @148,143 :INC.BUYLIST.LINE0
    (T) $33 "n.inc.buylist.line.s" @164,143 :INC.BUYLIST.LINE1
    (T) $33 "n.inc.buylist.line.s" @180,143 :INC.BUYLIST.LINE2
    (T) $33 "n.inc.buylist.line.s" @196,143 :INC.BUYLIST.LINE3
    (T) $33 "n.inc.buylist.line.s" @212,143 :INC.BUYLIST.LINE4
    (T) $33 "n.inc.buylist.line.s" @228,143 :INC.BUYLIST.LINE5
    (T) $33 "n.inc.buylist.line.s" @244,143 :INC.BUYLIST.LINE6
    (T) $33 "n.inc.buylist.line.s" @260,143 :INC.BUYLIST.LINE7
    (T) $33 "n.inc.buylist.line.s" @276,143 :INC.BUYLIST.LINE8
    (T) $33 "n.inc.buylist.line.s" @292,143 :INC.BUYLIST.LINE9
    (T) $33 "n.inc.buylist.line.s" @308,143 :INC.BUYLIST.LINE10
    (T) $33 "n.inc.buylist.line.s" @324,143 :INC.BUYLIST.LINE11
    (T) $33 "n.inc.buylist.line.s" @340,143 :INC.BUYLIST.LINE12
    (T) $33 "n.inc.buylist.line.s" @356,143 :INC.BUYLIST.LINE13
    (T) $33 "n.inc.buylist.line.s" @372,143 :INC.BUYLIST.LINE14
    (T) $33 #134,309,146,353 :INC.BUYLIST.LINE105
```

BEST AVAILABLE COPY

```
(T) $33 #134,354,146,393 :INC.BUYLIST.LINE106
(T) $33 #134,394,146,460 :INC.BUYLIST.LINE107
(T) $33 #134,461,146,517 :INC.BUYLIST.LINE108
(T) $33 #134,518,146,556 :INC.BUYLIST.LINE109

(R)

*************************************************************************
TOUCHES - GROWTH CARD
*************************************************************************
level 1

*
. GET.TOUCHES.GROWTH.CARD

    (T) $33 "n.tabup.gro.s" :REQUEST.GROWTH.CARD.CLOSE

    ;WHAT'S OPEN...
    (Q) "$264 <> 0" :GET.TOUCHES.ASK.ASSETS
    (Q) "$265 <> 0" :GET.TOUCHES.GROWTH.HOTSHEET
    (Q) "$266 <> 0" :GET.TOUCHES.GROWTH.BUYLIST
    (Q) "$267 = 1" :GET.TOUCHES.GROWTH.INT
    (Q) "$267 = 2" :GET.TOUCHES.GROWTH.DET
    END GET TOUCHES GROWTH CARD

------------------------------------------------------------------
.level 2

    ;*
    (:) :GET.TOUCHES.ASK.ASSETS

        if $264 = 1 ;ask bank
            {
            (T) $33 "n.ask.line0.name.s" :EDIT.ASK.BANK.CHECKING
            (T) $33 "n.ask.line0.$.s" :EDIT.ASK.BANK.CHECKING
            (T) $33 "n.ask.line1.name.s" :EDIT.ASK.BANK.SAVINGS
            (T) $33 "n.ask.line1.$.s" :EDIT.ASK.BANK.SAVINGS
            (T) $33 "n.ask.line9.name.s" :EDIT.ASK.BANK.CREDIT
            (T) $33 "n.ask.line9.$.s" :EDIT.ASK.BANK.CREDIT

            (T) $33 "n.ask.tabclose.s" :GO.FROM.ASK.ASSETS.CLOSE
            (T) $33 "n.ask.tabswitch.s" :GO.FROM.ASK.BANK.SWITCH
            (R)
            }

        if $264 = 2 ;ask income
            {
            (T) $33 "n.ask.line0.name.s" :EDIT.ASK.INCOME.GOVTBOND
            (T) $33 "n.ask.line0.$.s" :EDIT.ASK.INCOME.GOVTBOND
            (T) $33 "n.ask.line1.name.s" :EDIT.ASK.INCOME.BONDFUND
            (T) $33 "n.ask.line1.$.s" :EDIT.ASK.INCOME.BONDFUND
            (T) $33 "n.ask.line2.name.s" :EDIT.ASK.INCOME.MUNIBOND
            (T) $33 "n.ask.line2.$.s" :EDIT.ASK.INCOME.MUNIBOND
            (T) $33 "n.ask.line3.name.s" :EDIT.ASK.INCOME.CORPBOND
            (T) $33 "n.ask.line3.$.s" :EDIT.ASK.INCOME.CORPBOND
            (T) $33 "n.ask.line4.name.s" :EDIT.ASK.INCOME.GOVTAGENC
            (T) $33 "n.ask.line4.$.s" :EDIT.ASK.INCOME.GOVTAGENCIES
            (T) $33 "n.ask.line5.name.s" :EDIT.ASK.INCOME.COMMLPAPE
            (T) $33 "n.ask.line5.$.s" :EDIT.ASK.INCOME.COMMLPAPER
            (T) $33 "n.ask.line6.name.s" :EDIT.ASK.INCOME.MMF
            (T) $33 "n.ask.line6.$.s" :EDIT.ASK.INCOME.MMF
            (T) $33 "n.ask.line7.name.s" :EDIT.ASK.INCOME.LONGCD
            (T) $33 "n.ask.line7.$.s" :EDIT.ASK.INCOME.LONGCD
```

BEST AVAILABLE COPY

```
                (T) $33 "n.ask.tabclose.s" :GO.FROM.ASK.ASSETS.CLOSE
                (T) $33 "n.ask.tabswitch.s" :GO.FROM.ASK.INCOME.SWITCH
                (R)
                }

        if $264 = 3 ;ask growth
                {
                (T) $33 "n.ask.line0.name.s" :EDIT.ASK.GROWTH.STOCKS  ;som
glossary?
                (T) $33 "n.ask.line0.$.s" :EDIT.ASK.GROWTH.STOCKS
                (T) $33 "n.ask.line1.name.s" :EDIT.ASK.GROWTH.STOCKFUNDS
glossary?
                (T) $33 "n.ask.line1.$.s" :EDIT.ASK.GROWTH.STOCKFUNDS

                (T) $33 "n.ask.tabclose.s" :GO.FROM.ASK.ASSETS.CLOSE
                (T) $33 "n.ask.tabswitch.s" :GO.FROM.ASK.GROWTH.SWITCH
                (R)
                }

;•
(:) :GET.TOUCHES.GROWTH.HOTSHEET
        (T) $33 "n.hotsheet.gro.button1.s" :HOTSHEET.GROWTH.PAGE.1
        (T) $33 "n.hotsheet.gro.button2.s" :HOTSHEET.GROWTH.PAGE.2
        (T) $33 "n.hotsheet.gro.button3.s" :HOTSHEET.GROWTH.PAGE.3
        (T) $33 "n.hotsheet.gro.tabclose.s" :CLOSE.HOTSHEET.GRO
        (R)

;•
(:) :GET.TOUCHES.GROWTH.BUYLIST

        (T) $33 "n.buylist.tabclose.s" :REQUEST.CLOSE.GROWTH.BUYLIST
        (G) :GET.TOUCHES.GROWTH.BUYLIST.PGTURN
        (G) :GET.TOUCHES.GRO.BUYLIST.LINES
        (R)

;•
(:) :GET.TOUCHES.GROWTH.INT

        (T) $33 #116,341,131,386 :GROWTH.CARD.LINE105
        (T) $33 #116,387,131,477 :GROWTH.CARD.LINE106
        (T) $33 #116,478,131,511 :GROWTH.CARD.LINE107
        (T) $33 #116,512,131,546 :GROWTH.CARD.LINE108
        (T) $33 #116,547,131,583 :GROWTH.CARD.LINE109
        (T) $33 "n.gro.card.tabswitch.s" :REQUEST.GROWTH.REC.DET
        (G) :GET.TOUCHES.GROWTH.INT.LINES
        ;;(G) :GET.TOUCHES.GROWTH.EDIT.INT
        (R)

;•
(:) :GET.TOUCHES.GROWTH.DET

        (T) $33 "n.buylist.tabopen.s" :REQUEST.GROWTH.BUYLIST
        (T) $33 "n.gro.card.tabswitch.s" :REQUEST.GROWTH.REC.INT
        (G) :GET.TOUCHES.GROWTH.LINES
        (G) :GET.TOUCHES.GROWTH.EDIT.SHARES
        (R)


        ;---------------------------------------------------
        ;level 3

        ;•
        (:) :GET.TOUCHES.GROWTH.BUYLIST.PGTURN
```

BEST AVAILABLE COPY

```
                        ;HOW MANY PAGES?
                        if $378 = 1
                                (R)

                        if $378 = 2
                                {
                                if $379 = 1
                                        {
REQUEST.GRO.BUYLIST.PAGE2               (T) $33 "n.buylist.pg12.2!.s"
                                        }
                                if $379 = 2
                                        {
REQUEST.GRO.BUYLIST.PAGE1               (T) $33 "n.buylist.pg12.1!.s"
                                        }
                                }

                        if $378 = 3
                                {
                                if $379 = 1
                                        {
.REQUEST.GRO.BUYLIST.PAGE2              (T) $33 "n.buylist.pg123.2!.s"
REQUEST.GRO.BUYLIST.PAGE3               (T) $33 "n.buylist.pg123.3!.s"
                                        }
                                if $379 = 2
                                        {
REQUEST.GRO.BUYLIST.PAGE1               (T) $33 "n.buylist.pg123.1!.s"
REQUEST.GRO.BUYLIST.PAGE3               (T) $33 "n.buylist.pg123.3!.s"
                                        }
                                if $379 = 3
                                        {
:REQUEST.GRO.BUYLIST.PAGE1              (T) $33 "n.buylist.pg123.1!.s"
:REQUEST.GRO.BUYLIST.PAGE2              (T) $33 "n.buylist.pg123.2!.s"
                                        }
                                }
                                ;RETURN
                                (R)

                ;*
                (:) :GET.TOUCHES.GROWTH.EDIT.INT

                        ;NOTHING HERE

                        (R)

                ;*
                (:) :GET.TOUCHES.GROWTH.EDIT.SHARES

                        (T) $33 "n.gro.line0.$.s" :EDIT.GROWTH.REC.LINE0
                        (T) $33 "n.gro.line1.$.s" :EDIT.GROWTH.REC.LINE1
                        (T) $33 "n.gro.line2.$.s" :EDIT.GROWTH.REC.LINE2
                        (T) $33 "n.gro.line3.$.s" :EDIT.GROWTH.REC.LINE3
                        (T) $33 "n.gro.line4.$.s" :EDIT.GROWTH.REC.LINE4
                        (T) $33 "n.gro.line5.$.s" :EDIT.GROWTH.REC.LINE5
                        (T) $33 "n.gro.line6.$.s" :EDIT.GROWTH.REC.LINE6
                        (T) $33 "n.gro.line7.$.s" :EDIT.GROWTH.REC.LINE7
```

```
(T) $33 "n.gro.line8.$.s" :EDIT.GROWTH.REC.LINE8
(T) $33 "n.gro.line9.$.s" :EDIT.GROWTH.REC.LINE9
(T) $33 "n.gro.line10.$.s" :EDIT.GROWTH.REC.LINE10
(T) $33 "n.gro.line11.$.s" :EDIT.GROWTH.REC.LINE11
(T) $33 "n.gro.line12.$.s" :EDIT.GROWTH.REC.LINE12
(T) $33 "n.gro.line13.$.s" :EDIT.GROWTH.REC.LINE13
(T) $33 "n.gro.line14.$.s" :EDIT.GROWTH.REC.LINE14
(T) $33 "n.gro.line15.$.s" :EDIT.GROWTH.REC.LINE15
(R)

;*
(:) :GET.TOUCHES.GROWTH.LINES

(T) $33 "n.rec.line0.s" :GROWTH.CARD.LINE0
(T) $33 "n.rec.line1.s" :GROWTH.CARD.LINE1
(T) $33 "n.rec.line2.s" :GROWTH.CARD.LINE2
(T) $33 "n.rec.line3.s" :GROWTH.CARD.LINE3
(T) $33 "n.rec.line4.s" :GROWTH.CARD.LINE4
(T) $33 "n.rec.line5.s" :GROWTH.CARD.LINE5
(T) $33 "n.rec.line6.s" :GROWTH.CARD.LINE6
(T) $33 "n.rec.line7.s" :GROWTH.CARD.LINE7
(T) $33 "n.rec.line8.s" :GROWTH.CARD.LINE8
(T) $33 "n.rec.line9.s" :GROWTH.CARD.LINE9
(T) $33 "n.rec.line10.s" :GROWTH.CARD.LINE10
(T) $33 "n.rec.line11.s" :GROWTH.CARD.LINE11
(T) $33 "n.rec.line12.s" :GROWTH.CARD.LINE12
(T) $33 "n.rec.line13.s" :GROWTH.CARD.LINE13
(T) $33 "n.rec.line14.s" :GROWTH.CARD.LINE14
(T) $33 "n.rec.line15.s" :GROWTH.CARD.LINE15
(T) $33 "n.rec.line16.s" :GROWTH.CARD.LINE16

if $267 = 1
        (R)

(T) $33 #116,341,131,386 :GROWTH.CARD.LINE105
(T) $33 #116,387,131,477 :GROWTH.CARD.LINE106
(T) $33 #116,478,131,511 :GROWTH.CARD.LINE107
(T) $33 #116,512,131,546 :GROWTH.CARD.LINE108
(T) $33 #116,547,131,583 :GROWTH.CARD.LINE109
(R)

;*
(:) :GET.TOUCHES.GROWTH.INT.LINES

(T) $33 "n.rec.line0.s" :GROWTH.CARD.LINE0
(T) $33 "n.rec.line3.s" :GROWTH.CARD.LINE3
(T) $33 "n.rec.line6.s" :GROWTH.CARD.LINE6
if $268 = 0
        (T) $33 "n.rec.line9.s" :GROWTH.CARD.LINE9
(R)

;*
(:) :GET.TOUCHES.GRO.BUYLIST.LINES

(T) $33 "n.gro.buylist.line.s" @148,143 :GRO.BUYLIST.LINE0
(T) $33 "n.gro.buylist.line.s" @164,143 :GRO.BUYLIST.LINE1
(T) $33 "n.gro.buylist.line.s" @180,143 :GRO.BUYLIST.LINE2
(T) $33 "n.gro.buylist.line.s" @196,143 :GRO.BUYLIST.LINE3
(T) $33 "n.gro.buylist.line.s" @212,143 :GRO.BUYLIST.LINE4
(T) $33 "n.gro.buylist.line.s" @228,143 :GRO.BUYLIST.LINE5
(T) $33 "n.gro.buylist.line.s" @244,143 :GRO.BUYLIST.LINE6
(T) $33 "n.gro.buylist.line.s" @260,143 :GRO.BUYLIST.LINE7
(T) $33 "n.gro.buylist.line.s" @276,143 :GRO.BUYLIST.LINE8
(T) $33 "n.gro.buylist.line.s" @292,143 :GRO.BUYLIST.LINE9
```

BEST AVAILABLE COPY

```
(T) $33 "n.gro.buylist.line.s" @308,143 :GRO.BUYLIST.LINE10
(T) $33 "n.gro.buylist.line.s" @324,143 :GRO.BUYLIST.LINE11
(T) $33 "n.gro.buylist.line.s" @340,143 :GRO.BUYLIST.LINE12
(T) $33 "n.gro.buylist.line.s" @356,143 :GRO.BUYLIST.LINE13
(T) $33 "n.gro.buylist.line.s" @372,143 :GRO.BUYLIST.LINE14
(T) $33 #134,310,146,354 :GRO.BUYLIST.LINE105
(T) $33 #134,355,146,451 :GRO.BUYLIST.LINE106
(T) $33 #134,452,146,487 :GRO.BUYLIST.LINE107
(T) $33 #134,488,146,524 :GRO.BUYLIST.LINE108
(T) $33 #134,525,146,556 :GRO.BUYLIST.LINE109

(R)

;*****************************************************************************
;Re run broad alloc and (maybe) bond pick and growth pick after data input...
;*****************************************************************************
;level 1

;*
( ) :RERUN.ALLOCS

        ; Broad alloc
        (Y) 20

        ; if this customer has entered the minimum data necessary for a recommenda
        if $179 = 1
                {
                ; and we haven't saved him before
                ; take the spaces out of the strings
                stringFormat $394 $1
                replacePart $394 " " "."
                replacePart $394 " " "."
                replacePart $394 " " "."
                replacePart $394 " " "."
                replacePart $394 " " "."
                replacePart $393 " " "."
                replacePart $393 " " "."
                replacePart $393 " " "."
                replacePart $393 " " "."
                replacePart $393 " " "."
                testValid $394 $393
                if $380 = 0
                        {
                        ; save him now, and remember his name
                        (Y) 202
                        stringFormat $393 $1
                        }
                }

        ; Income card
        if $245 = 0 ; no edit has been made on the income card, we can recalc everythi
                {
                (A) $200 "hotsheet.text"
                (Y) 50
                }
        else
                (Y) 25

        ; Growth card
        if $246 = 0 ; no edit has been made on the growth card, we can recalc
                {
                (A) $200 "hotsheet.text"
                (Y) 40
```

BEST AVAILABLE COPY

```
        }
    .else
            (Y) 24

    ; do our detail recalc but don't display on the screen
    (Y) 26
    (Y) 27

(R)
```

BEST AVAILABLE COPY

```
.*****************************************************************************
.REFRESH DISPATCH after data input...
.*****************************************************************************
.level 1

.*
( ) :REFRESH.DISPATCH


        (G) :REFRESH.TABS
        (G) :REFRESH.MAINMENU

        (A) $237 "0" ;set flag - refresh no longer needed

        (J) :REFRESH.CENTER.SCREEN

.-----------------------------------------------------------
.level 2

.*
( ) :REFRESH.MAINMENU

        ;- if mainmenu is not open
                if $240 = 0
                        (R) ;return

        ;- prepare menu on z3
                (Z) 3

        ;- blank current highlight
                (S) "n.csr.mainmenu.grey.s"

        ;- show always available sections
                (I) $280 "n.csr.mainmenu.intro.s"       ; (black type)
                (I) $280 "n.csr.mainmenu.ask.s"         ; (black type)
                (I) $280 "n.csr.mainmenu.tools.s"       ; (black type)

        ;- show conditional sections
                if $20 > 0  ;if any assets are entered
                        (I) $280 "n.csr.mainmenu.build.s"       ;(black type)

                if $179 = 1 ;if recommendation is cooked
                        {
                        (I) $280 "n.csr.mainmenu.showrec.s"     ;(black type)
                        (I) $280 "n.csr.mainmenu.showout.s"     ;(black type)
                        (I) $280 "n.csr.mainmenu.conclude.s"    ;(black type)
                        }

        ;- highlight currently active section

                if $241 = 1                                     ;introduction
                        (I) $273 "n.csr.mainmenu.intro.s"
```

BEST AVAILABLE COPY

```
        else
        if $241 = 2                                   ;ask assets
                (I) $273 "n.csr.mainmenu.ask.s"
        else
        if $241 = 3                                   ;build allocation
                (I) $273 "n.csr.mainmenu.build.s"
        else
        if $241 = 4                                   ;show recommendation
                (I) $273 "n.csr.mainmenu.showrec.s"
        else
        if $241 = 5                                   ;show outcome
                (I) $273 "n.csr.mainmenu.showout.s"
        else
        if $241 = 6                                   ;conclude
                (I) $273 "n.csr.mainmenu.conclude.s"

;- grey next/back!!!

;- show on main screen
        (Z)1
        (A) $199 "150" ;speed
        (U) 6 "n.csr.mainmenu.grey.s"

;- return
        (R)

;-----------------------------------------------------------------
;level 2

;*
(:) :REFRESH.CENTER.SCREEN

    ;just continue if center is blank (nothing in center to refresh + no cards open)
    $290 := $220 + $251
    if $290 = 0
            (J) :MAIN.WAIT


    ;*
    ;IS A CARD OPEN? (must come before buttons & tabs)

    ;  Bank card is open
    (Q) "$251 = 5" :REQUEST.BANK.REFRESH

    ;  Income card is open
    (Q) "$251 = 6" :REQUEST.INCOME.REFRESH

    ;  Growth card is open
    (Q) "$251 = 7" :REQUEST.GROWTH.REFRESH


    ;*
    ;ANYTHING IN CENTER FOR REFRESH
    (:) :IS.A.BUTTON.ACTIVE.TO.REFRESH

    (Q) "$220 = 1" :MAIN.WAIT                                ;preface
    (Q) "$220 = 2" :BUTTON2                                       ;you
    ;(Q) "$220 = 3" :REQUEST.BUTTON3.REFRESH    ;clear center to tabs
    (Q) "$220 = 4" :BUTTON4                                       ;our
recommendation - pie
    ;(Q) "$220 = 5" :REQUEST.BUTTON5.REFRESH    ;edit the recommendation
    (Q) "$220 = 61" :REQUEST.BUTTON6.REFRESH   ;golden bars
    (Q) "$220 = 7" :REQUEST.BUTTON7.REFRESH    ;build a pie
    (Q) "$220 = 8" :MAIN.WAIT                               ;home uff
```

```
(Q) "$220 = 9" :MAIN.WAIT                                           ;college uff
(Q) "$220 = 10" :MAIN.WA'T                                          ;hp demo
(Q) "$220 = 111" :REQUEST.BUTTON11.REFRESH   ;summary
(Q) "$220 = 112" :REQUEST.BUTTON11.REFRESH   ;summary
(Q) "$220 = 113" :REQUEST.BUTTON11.REFRESH   ;summary
(Q) "$220 = 12" :BUTTON12                                           ;two pies

(J) :MAIN.WAIT
```

BEST AVAILABLE COPY

```
;-----------------------------------
;level 2

;*
( ) :REFRESH.TABS

        if $179 = 1                                 ; If recommendation cooked
                {
                if $248 = 1                             ; and if tabs are up
                        (R)                                     ; return, or
                else                                    ; else tabs aren't up
                        (G) :PUT.TABS.UP            ; so put them up.
                }

        else                                            ; if recommendation not coc
                {
                if $248 = 0                             ; and tabs are not up
                        (R)                                     ; return
                else                                    ; else tabs are up
                        (G) :PUT.TABS.DOWN          ; so put them down
                }

        (R)

                ;*
                (:) :PUT.TABS.UP

                        ;WIPE UP TABS
                        (A) $199 "2000" ;speed
                        (D)* 2 "n.tabs.s"

                        ;SET TAB FLAG
                        (A) $248 "1"

                        (W) 3

                        (R)

                ;*
                (:) :PUT.TABS.DOWN

                        ;WIPE DOWN TABS
                        (A) $199 "1500"
                        (D)* 1 "n.slot.s"

                        ;SET TAB FLAG
                        (A) $248 "0" ;no tabs

                        (W) 3

                        (R)

;******************************************************************************
; CLEAR CENTER SCREEN EVENTS (incl closed card)
;******************************************************************************
```

.level 1

BEST AVAILABLE COPY

```
;*
(:) :CLEAR.CENTER.SCREEN.FROM.BUTTON

        ;(do card test first so button flag
        ;can be left active until card closes)

        If $251 > 0 ;is a card up?
                {
                (G) :CLOSE.CARD
                (G) :CLEAR.CENTER.WITH.SNAP
                (R)
                }

        else    ;is a button active to clear?
                {
                If $264 <> 0        ;ask assets card is up
                        {
                        (G) :REMOVE.ASK.CARD
                        (R)
                        }

                If $220 = 99        ;title at program start
                        {
                        (G) :CLEAR.CENTER.WITH.DISSOLVE
                        (R)
                        }

                If $220 > 0                 ;center button is up
                        (G) :CLEAR.CENTER.WITH.SNAP
                }

;IF NONE OF THE ABOVE, SCREEN IS ALREADY CLEAR
(R)


;*****************************
;level 2
;*
(:) :CLEAR.CENTER.WITH.SNAP
        (S)* "n.center2.blnk.s"
        (A) $220 "0" ;center is clear
        (A) $264 "0" ;ask card is closed
        (R)

;*
(:) :CLEAR.CENTER.WITH.DISSOLVE
        (A) $199 "0" ;speed
        (D)* 7 "n.center2.blnk.s"

        (A) $220 "0" ;center is clear
        (A) $264 "0" ;ask card is closed
        (R)

;*
(:) :CLOSE.CARD
        If $264 <> 0
                (G) :REMOVE.ASK.CARD

        If $265 <> 0
                (G) :REMOVE.HOTSHEET

        If $266 <> 0
```

BEST AVAILABLE COPY

```
        (G) :REMOVE.BUYLIST

;RESTORE BACKGROUND - WIPE DOWN
(A) $199 "50" ;speed
(X)* 1

;UNLIGHT TABS
(S)* "n.tabs.s"

;SET FLAGS
(A) $251 "0" ;all cards closed
(A) $379 "0" ;current buylist pg reset

(R)

    ;*
    (:) :REMOVE.ASK.CARD
            (A) $199 "0"
            (X)*

            ;SET FLAG
            (A) $264 "0"
            (R)

    ;*
    (:) :REMOVE.HOTSHEET
            (A) $199 "50" ;speed
            (X)* 1

            ;SET FLAG
            (A) $265 "0"
            (R)

    ;*
    (:) :REMOVE.BUYLIST

            ; what's underneath is not saved, start from scratch
            (Z) 3
            if $251 = 6 ;if income card is open
                    (S) "n.inc.card.s"
            if $251 = 7 ;if growth card is open
                    (S) "n.gro.card.s"

            (Z) 1
            (A) $199 "50" ;speed for (U) wipe down
            (U)* 1 "n.inc.buylist.s"     ; income buylist used just for :

            ;SET FLAG
            (A) $266 "0"
            (R)

;*************************************************************************
;SHOW MAINMENU BUTTONS
;*************************************************************************

;are these used?

        ;*
        (:) :SHOW.MAINMENU1&2&7
        (I) $280 "n.csr.mainmenu.intro.s"
        (I) $280 "n.csr.mainmenu.ask.s"
        (I) $280 "n.csr.mainmenu.tools.s"
```

```
(R)

;*
(:) :SHOW.MAINMENU3
(I) $280 "n.csr.mainmenu.build.s"
(R)

;*
(:) :SHOW.MAINMENU4&5&6
(I) $280 "n.csr.mainmenu.showrec.s"
(I) $280 "n.csr.mainmenu.showout.s"
(I) $280 "n.csr.mainmenu.conclude.s"
(R)

;*
(:) :SHOW.NEXTBACK

  if $298 = 99
                (G) :GREY.BACK.BUTTON
        else
                (G) :SHOW.BACK.BUTTON

if $299 = 99
                (G) :GREY.NEXT.BUTTON
        else
                (G) :SHOW.NEXT.BUTTON

        (R)

;* ----------------------------------------------------------------
;level 2

        (:) :SHOW.NEXT.BUTTON
                (S) "n.csr.mainmenu.next.s"
                (R)

        (:) :GREY.NEXT.BUTTON
                (S) "n.csr.mainmenu.next.grey.s"
                (R)

        (:) :SHOW.BACK.BUTTON
                (S) "n.csr.mainmenu.back.s"
                (R)

        (:) :GREY.BACK.BUTTON
                (S) "n.csr.mainmenu.back.grey.s"
                (R)

;**********************************************************************
; HIGHLIGHTS - CSR MENU
;**********************************************************************

;* ----------------------------------------------------------------
; LOWLIGHT MAINMENU

    ;*
    (:) :LOWLIGHT.MAINMENU.INTRO
            (I) $274 "n.csr.mainmenu.intro.s"
            (R)

    ;*
    (:) :LOWLIGHT.MAINMENU.ASK
            (I) $274 "n.csr.mainmenu.ask.s"
```

BEST AVAILABLE COPY

BEST AVAILABLE COPY

```
        (R)

    ;*
    (:) :LOWLIGHT.MAINMENU.BUILD
        (I) $274 "n.csr.mainmenu.build.s"
        (R)

    ;*
    (:) :LOWLIGHT.MAINMENU.SHOWREC
        (I) $274 "n.csr.mainmenu.showrec.s"
        (R)

    ;*
    (:) :LOWLIGHT.MAINMENU.SHOWOUT
        (I) $274 "n.csr.mainmenu.showout.s"
        (R)

    ;*
    (:) :LOWLIGHT.MAINMENU.CONCLUDE
        (I) $274 "n.csr.mainmenu.conclude.s"
        (R)

    ;*
    (:) :LOWLIGHT.MAINMENU.TOOLS
        (I) $274 "n.csr.mainmenu.tools.s"
        (R)

.* -----------------------------------------------------------
.HIGHLIGHT MAINMENU - OUT???

    ;*
    (:) :MAINMENU.NOT.OPEN
        (R)

    ;*
    (:) :HIGHLIGHT.MAINMENU.INTRO
        (I) $273 "n.csr.mainmenu.intro.s"
        (R)

    ;*
    (:) :HIGHLIGHT.MAINMENU.ASK
        (I) $273 "n.csr.mainmenu.ask.s"
        (R)

    ;*
    (:) :HIGHLIGHT.MAINMENU.BUILD
        (I) $273 "n.csr.mainmenu.build.s"
        (R)

    ;*
    (:) :HIGHLIGHT.MAINMENU.SHOWREC
        (I) $273 "n.csr.mainmenu.showrec.s"
        (R)

    ;*
    (:) :HIGHLIGHT.MAINMENU.SHOWOUT
        (I) $273 "n.csr.mainmenu.showout.s"
        (R)

    ;*
    (:) :HIGHLIGHT.MAINMENU.CONCLUDE
        (I) $273 "n.csr.mainmenu.conclude.s"
        (R)
```

```
;*
(:) :HIGHLIGHT.MAINMENU.TOOLS
        (I) $273 "n.csr.mainmenu.tools.s"
        (R)
-----------------------------------

;*
(:) :HIGHLIGHT.NEXT
        (I) $273 "n.csr.mainmenu.next.s"
        (W) 4
        (I)- $273 "n.csr.mainmenu.next.s"
        (R)

;*
(:) :HIGHLIGHT.BACK
        (I) $273 "n.csr.mainmenu.back.s"
        (W) 4
        (I)- $273 "n.csr.mainmenu.back.s"
        (R)

;*
(:) :HIGHLIGHT.START.BUTTON
        (S) "n.start!.s"
        (W) 4
        (S) "n.start.s"
        (R)

;*
(:) :HIGHLIGHT.CONTINUE.PROMPT
        (S) "n.prompt.cont!.s"
        (W) 3
        (S) "n.prompt.cont.s"
        (R)
;* ---------------------------------------------------------------------
;turn mainmenu from highlight to lowlight

    (:) :HI.TO.LO.MAINMENU.INTRO
            (I) $275 "n.csr.mainmenu.intro.s"
            (R)

    (:) :HI.TO.LO.MAINMENU.ASK
            (I) $275 "n.csr.mainmenu.ask.s"
            (R)

    (:) :HI.TO.LO.MAINMENU.BUILD
            (I) $275 "n.csr.mainmenu.build.s"
            (R)

    (:) :HI.TO.LO.MAINMENU.SHOWREC
            (I) $275 "n.csr.mainmenu.showrec.s"
            (R)

    (:) :HI.TO.LO.MAINMENU.SHOWOUT
            (I) $275 "n.csr.mainmenu.showout.s"
            (R)

    (:) :HI.TO.LO.MAINMENU.CONCLUDE
            (I) $275 "n.csr.mainmenu.conclude.s"
            (R)

    (:) :HI.TO.LO.MAINMENU.TOOLS
            (I) $275 "n.csr.mainmenu.tools.s"
```

BEST AVAILABLE COPY

```
(R)

;* ---------------------------------------------------------------
(:) :LOW.TO.HI.MAINMENU.CURRENT

        ; erase the customer's prompt
        if $340 <> 0
                {
                (Z) 2
                (D) 6 "n.clearprompt.s"   ;customer screen
                (Z) 1
                (A) $340 "0"
                }

        ;- which menu?
                stringFormat $290 ":LOW.TO.HI.MAINMENU%n", $241
                (J) $290

        (:) :LOW.TO.HI.MAINMENU1
                (I)- $275 "n.csr.mainmenu.intro.s"
                (R)

        (:) :LOW.TO.HI.MAINMENU2
                (I)- $275 "n.csr.mainmenu.ask.s"
                (R)

        (:) :LOW.TO.HI.MAINMENU3
                (I)- $275 "n.csr.mainmenu.build.s"
                (R)

        (:) :LOW.TO.HI.MAINMENU4
                (I)- $275 "n.csr.mainmenu.showrec.s"
                (R)

        (:) :LOW.TO.HI.MAINMENU5
                (I)- $275 "n.csr.mainmenu.showout.s"
                (R)

        (:) :LOW.TO.HI.MAINMENU6
                (I)- $275 "n.csr.mainmenu.conclude.s"
                (R)

        (:) :LOW.TO.HI.MAINMENU7
                (I)- $275 "n.csr.mainmenu.tools.s"
                (R)
;* ---------------------------------------------------------------
(:) :UNLOWLIGHT.MAINMENU.CURRENT

        if $242 = 0 ;if no submenu was just open
                (R)

        ;CHECK WHICH LINE IS HIGHLIT
        stringFormat $290 ":UNLOWLIGHT.MAINMENU%n", $242
        (J) $290

        (:) :UNLOWLIGHT.MAINMENU1
                (I)- $274 "n.csr.mainmenu.intro.s"
                (R)

        (:) :UNLOWLIGHT.MAINMENU2
                (I)- $274 "n.csr.mainmenu.ask.s"
                (R)
```

BEST AVAILABLE COPY

BEST AVAILABLE COPY

```
(:) :UNLOWLIGHT.MAINMENU3
        (I)- $274 "n.csr.mainmenu.build.s"
        (R)

(:) :UNLOWLIGHT.MAINMENU4
        (I)- $274 "n.csr.mainmenu.showrec.s"
        (R)

(:) :UNLOWLIGHT.MAINMENU5
        (I)- $274 "n.csr.mainmenu.showout.s"
        (R)

(:) :UNLOWLIGHT.MAINMENU6
        (I)- $274 "n.csr.mainmenu.conclude.s"
        (R)

(:) :UNLOWLIGHT.MAINMENU7
        (I)- $274 "n.csr.mainmenu.tools.s"
        (R)

;* -----------------------------------------------------------
(.) :UNHIGHLIGHT.MAINMENU.CURRENT

    if $241 = 0 ;if no current highlight
        (R)

    ;CHECK WHICH LINE IS HIGHLIT
    stringFormat $290 ":UNHIGHLIGHT.MAINMENU%n", $241
    (J) $290

    (:) :UNHIGHLIGHT.MAINMENU1
        (I)- $273 "n.csr.mainmenu.intro.s"
        (R)

    (:) :UNHIGHLIGHT.MAINMENU2
        (I)- $273 "n.csr.mainmenu.ask.s"
        (R)

    (:) :UNHIGHLIGHT.MAINMENU3
        (I)- $273 "n.csr.mainmenu.build.s"
        (R)

    (:) :UNHIGHLIGHT.MAINMENU4
        (I)- $273 "n.csr.mainmenu.showrec.s"
        (R)

    (:) :UNHIGHLIGHT.MAINMENU5
        (I)- $273 "n.csr.mainmenu.showout.s"
        (R)

    (:) :UNHIGHLIGHT.MAINMENU6
        (I)- $273 "n.csr.mainmenu.conclude.s"
        (R)

;* -----------------------------------------------------------
:LOWLIGHT SUBMENU

    ;*
    (:) :LOWLIGHT.SUBMENU.INTRO1
        (I) $276 "n.csr.submenu.intro1.s"
        (W) 6
        (R)
```

BEST AVAILABLE COPY

```
(:) :LOWLIGHT.SUBMENU.INTRO2
        (I) $276 "n.csr.submenu.intro2.s"
        (W) 6
        (R)

(:) :LOWLIGHT.SUBMENU.INTRO3
        (I) $276 "n.csr.submenu.intro3.s"
        (W) 6
        (R)

(:) :LOWLIGHT.SUBMENU.INTRO4
        (I) $276 "n.csr.submenu.intro4.s"
        (W) 6
        (R)

(:) :LOWLIGHT.SUBMENU.INTRO5
        (I) $276 "n.csr.submenu.intro5.s"
        (W) 6
        (R)

;*
(:) :LOWLIGHT.SUBMENU.ASK1
        (I) $276 "n.csr.submenu.ask1.s"
        (W) 6
        (R)

(:) :LOWLIGHT.SUBMENU.ASK2
        (I) $276 "n.csr.submenu.ask2.s"
        (W) 6
        (R)

(:) :LOWLIGHT.SUBMENU.ASK3
        (I) $276 "n.csr.submenu.ask3.s"
        (W) 6
        (R)

(:) :LOWLIGHT.SUBMENU.ASK4
        (I) $276 "n.csr.submenu.ask4.s"
        (W) 6
        (R)

;*

(:) :LOWLIGHT.SUBMENU.BUILD1
        (I) $276 "n.csr.submenu.build1.s"
        (W) 6
        (R)

(:) :LOWLIGHT.SUBMENU.BUILD2
        (I) $276 "n.csr.submenu.build2.s"
        (W) 6
        (R)

;*
(:) :LOWLIGHT.SUBMENU.SHOWREC1
        (I) $276 "n.csr.submenu.showrec1.s"
        (W) 6
        (R)

(:) :LOWLIGHT.SUBMENU.SHOWREC2
        (I) $276 "n.csr.submenu.showrec2.s"
        (W) 6
        (R)
```

BEST AVAILABLE COPY

```
(:) :LOWLIGHT.SUBMENU.SHOWREC3
        (I) $276 "n.csr.submenu.showrec3.s"
        (W) 6
        (R)

(:) :LOWLIGHT.SUBMENU.SHOWREC4
        (I) $276 "n.csr.submenu.showrec4.s"
        (W) 6
        (R)

(:) :LOWLIGHT.SUBMENU.SHOWREC5
        (I) $276 "n.csr.submenu.showrec5.s"
        (W) 6
        (R)

(:) :LOWLIGHT.SUBMENU.SHOWREC6
        (I) $276 "n.csr.submenu.showrec6.s"
        (W) 6
        (R)

;*
(:) :LOWLIGHT.SUBMENU.SHOWOUT1
        (I) $276 "n.csr.submenu.showout1.s"
        (W) 6
        (R)

(:) :LOWLIGHT.SUBMENU.SHOWOUT2
        (I) $276 "n.csr.submenu.showout2.s"
        (W) 6
        (R)

(:) :LOWLIGHT.SUBMENU.SHOWOUT3
        (I) $276 "n.csr.submenu.showout3.s"
        (W) 6
        (R)

;*
(:) :LOWLIGHT.SUBMENU.CONCLUDE1
        (I) $276 "n.csr.submenu.conclude1.s"
        (W) 6
        (R)

(:) :LOWLIGHT.SUBMENU.CONCLUDE2
        (I) $276 "n.csr.submenu.conclude2.s"
        (W) 6
        (R)

(:) :LOWLIGHT.SUBMENU.CONCLUDE3
        (I) $276 "n.csr.submenu.conclude3.s"
        (W) 6
        (R)

;*
(:) :LOWLIGHT.SUBMENU.TOOLS1
        (I) $276 "n.csr.submenu.tools1.s"
        (W) 6
        (R)

(:) :LOWLIGHT.SUBMENU.TOOLS2
        (I) $276 "n.csr.submenu.tools2.s"
        (W) 6
```

```
(R)

(:) :LOWLIGHT.SUBMENU.TOOLS3
        (I) $276 "n.csr.submenu.tools3.s"
        (W) 6
        (R)

(:) :LOWLIGHT.SUBMENU.TOOLS4
        (I) $276 "n.csr.submenu.tools4.s"
        (W) 6
        (R)

(:) :LOWLIGHT.SUBMENU.TOOLS5
        (I) $276 "n.csr.submenu.tools5.s"
        (W) 6
        (R)

(:) :LOWLIGHT.SUBMENU.TOOLS6
        (I) $276 "n.csr.submenu.tools6.s"
        (W) 6
        (R)

(:) :LOWLIGHT.SUBMENU.TOOLS7
        (I) $276 "n.csr.submenu.tools7.s"
        (W) 6
        (R)

(:) :LOWLIGHT.SUBMENU.TOOLS8
        (I) $276 "n.csr.submenu.tools8.s"
        (W) 6
        (R)

;*****************************************************************************
. HIGHLIGHTS - LOAD CUSTOMER DATA
;*****************************************************************************

;*
(:) :HIGHLIGHT.LOAD.DATA.SQUARE1
        (S) "n.load.data.name.square!.s" @30,65
        (W) 2
        (S) "n.load.data.name.square.s" @30,65
        (R)

;*
(:) :HIGHLIGHT.LOAD.DATA.SQUARE2
        (S) "n.load.data.name.square!.s" @51,65
        (W) 2
        (S) "n.load.data.name.square.s" @51,65
        (R)

;*
(:) :HIGHLIGHT.LOAD.DATA.SQUARE3
        (S) "n.load.data.name.square!.s" @72,65
        (W) 2
        (S) "n.load.data.name.square.s" @72,65
        (R)

;*
(:) :HIGHLIGHT.LOAD.DATA.SQUARE4
        (S) "n.load.data.name.square!.s" @93,65
        (W) 2
        (S) "n.load.data.name.square.s" @93,65
        (R)
```

BEST AVAILABLE COPY

BEST AVAILABLE COPY

```
;•
(:) :HIGHLIGHT.LOAD.DATA.SQUARE5
        (S) "n.load.data.name.square!.s" @114,65
        (W) 2
        (S) "n.load.data.name.square.s" @114,65
        (R)

;•
(:) :HIGHLIGHT.LOAD.DATA.SQUARE6
        (S) "n.load.data.name.square!.s" @135,65
        (W) 2
        (S) "n.load.data.name.square.s" @135,65
        (R)

;•
(:) :HIGHLIGHT.LOAD.DATA.SQUARE7
        (S) "n.load.data.name.square!.s" @156,65
        (W) 2
        (S) "n.load.data.name.square.s" @156,65
        (R)

;•
(:) :HIGHLIGHT.LOAD.DATA.SQUARE8
        (S) "n.load.data.name.square!.s" @177,65
        (W) 2
        (S) "n.load.data.name.square.s" @177,65
        (R)

;•
(:) :HIGHLIGHT.LOAD.DATA.SQUARE9
        (S) "n.load.data.name.square!.s" @198,65
        (W) 2
        (S) "n.load.data.name.square.s" @198,65
        (R)

;•
(:) :HIGHLIGHT.LOAD.DATA.SQUARE10
        (S) "n.load.data.name.square!.s" @219,65
        (W) 2
        (S) "n.load.data.name.square.s" @219,65
        (R)

;•
(:) :HIGHLIGHT.LOAD.DATA.SQUARE11
        (S) "n.load.data.name.square!.s" @240,65
        (W) 2
        (S) "n.load.data.name.square.s" @240,65
        (R)

;•
(:) :HIGHLIGHT.LOAD.DATA.SQUARE12
        (S) "n.load.data.name.square!.s" @261,65
        (W) 2
        (S) "n.load.data.name.square.s" @261,65
        (R)

;•
(:) :HIGHLIGHT.LOAD.DATA.SQUARE13
        (S) "n.load.data.name.square!.s" @282,65
        (W) 2
        (S) "n.load.data.name.square.s" @282,65
        (R)
```

BEST AVAILABLE COPY

```
;•
(:) :HIGHLIGHT.LOAD.DATA.SQUARE14
        (S) "n.load.data.name.square!.s" @303,65
        (W) 2
        (S) "n.load.data.name.square.s" @303,65
        (R)

;•
(:) :HIGHLIGHT.LOAD.DATA.SQUARE15
        (S) "n.load.data.name.square!.s" @324,65
        (W) 2
        (S) "n.load.data.name.square.s" @324,65
        (R)

;•
(:) :HIGHLIGHT.LOAD.DATA.SQUARE16
        (S) "n.load.data.name.square!.s" @30,288
        (W) 2
        (S) "n.load.data.name.square.s" @30,288
        (R)

;•
(:) :HIGHLIGHT.LOAD.DATA.SQUARE17
        (S) "n.load.data.name.square!.s" @51,288
        (W) 2
        (S) "n.load.data.name.square.s" @51,288
        (R)

;•
(:) :HIGHLIGHT.LOAD.DATA.SQUARE18
        (S) "n.load.data.name.square!.s" @72,288
        (W) 2
        (S) "n.load.data.name.square.s" @72,288
        (R)

;•
(:) :HIGHLIGHT.LOAD.DATA.SQUARE19
        (S) "n.load.data.name.square!.s" @93,288
        (W) 2
        (S) "n.load.data.name.square.s" @93,288
        (R)

;•
(:) :HIGHLIGHT.LOAD.DATA.SQUARE20
        (S) "n.load.data.name.square!.s" @114,288
        (W) 2
        (S) "n.load.data.name.square.s" @114,288
        (R)

;•
(:) :HIGHLIGHT.LOAD.DATA.SQUARE21
        (S) "n.load.data.name.square!.s" @135,288
        (W) 2
        (S) "n.load.data.name.square.s" @135,288
        (R)

;•
(:) :HIGHLIGHT.LOAD.DATA.SQUARE22
        (S) "n.load.data.name.square!.s" @156,288
        (W) 2
        (S) "n.load.data.name.square.s" @156,288
        (R)

;•
```

BEST AVAILABLE COPY

```
(:) :HIGHLIGHT.LOAD.DATA.SQUARE23
        (S) "n.load.data.name.square!.s" @177,288
        (W) 2
        (S) "n.load.data.name.square.s" @177,288
        (R)

;•
(:) :HIGHLIGHT.LOAD.DATA.SQUARE24
        (S) "n.load.data.name.square!.s" @198,288
        (W) 2
        (S) "n.load.data.name.square.s" @198,288
        (R)

;•
(:) :HIGHLIGHT.LOAD.DATA.SQUARE25
        (S) "n.load.data.name.square!.s" @219,288
        (W) 2
        (S) "n.load.data.name.square.s" @219,288
        (R)

;•
(:) :HIGHLIGHT.LOAD.DATA.SQUARE26
        (S) "n.load.data.name.square!.s" @240,288
        (W) 2
        (S) "n.load.data.name.square.s" @240,288
        (R)

;•
(:) :HIGHLIGHT.LOAD.DATA.SQUARE27
        (S) "n.load.data.name.square!.s" @261,288
        (W) 2
        (S) "n.load.data.name.square.s" @261,288
        (R)

;•
(:) :HIGHLIGHT.LOAD.DATA.SQUARE28
        (S) "n.load.data.name.square!.s" @282,288
        (W) 2
        (S) "n.load.data.name.square.s" @282,288
        (R)

;•
(:) :HIGHLIGHT.LOAD.DATA.SQUARE29
        (S) "n.load.data.name.square!.s" @303,288
        (W) 2
        (S) "n.load.data.name.square.s" @303,288
        (R)

;•
(:) :HIGHLIGHT.LOAD.DATA.SQUARE30
        (S) "n.load.data.name.square!.s" @324,288
        (W) 2
        (S) "n.load.data.name.square.s" @324,288
        (R)

;••••••••••••••••••••••••••••••••••••••••••••••••••••••••••••••••••••••••••••••
; HIGHLIGHTS - GEN'L
;••••••••••••••••••••••••••••••••••••••••••••••••••••••••••••••••••••••••••••••

;HIGHLIGHTS - B.I.G. TABS
;•
(:) :HIGHLIGHT.BANK.TAB
        (S)* "n.tab.bank!.s"
```

BEST AVAILABLE COPY

```
        ;SAVE BACKGROUND FOR CLEAR CENTER
        (X)* "n.bank.card.s"

        ;UN-LIGHT TAB
        (S)* "n.tab.bank.s"
        (R)

( ) HIGHLIGHT.BANK.TABUP
        (S)* "n.tabup.bank!.s"
        (R)

( ) HIGHLIGHT.INC.TAB
        (S)* "n.tab.inc!.s"

        ;SAVE BACKGROUND FOR CLEAR CENTER
        (X)* "n.inc.card.s"

        ;UN-LIGHT TAB
        (S)* "n.tab.inc.s"
        (R)

( ) :HIGHLIGHT.INC.TABUP
        (S)* "n.tabup.inc!.s"
        (R)

( ) :HIGHLIGHT.GRO.TAB
        (S)* "n.tab.gro!.s"

        ;SAVE BACKGROUND FOR CLEAR CENTER
        (X)* "n.gro.card.s"

        ;UN-LIGHT TAB
        (S)* "n.tab.gro.s"
        (R)

(:) :HIGHLIGHT.GRO.TABUP
        (S)* "n.tabup.gro!.s"
        (R)

;-----------------------------------------------------------------------
-------------
;HIGHLIGHTS -- GROWTH

(:) :HIGHLIGHT.BUYLIST.TABOPEN
        (O)* "n.buylist.tabopen!.s"
        (W) 3
        (O)* "n.buylist.tabopen.s"
        (R)

(:) :HIGHLIGHT.BUYLIST.TABCLOSE
        (S)* "n.buylist.tabclose!.s"
        (W) 5
        (S)* "n.buylist.tabclose.s"
        (R)

(:) :HIGHLIGHT.BANK.TABSWITCH
        (S)* "n.bank.card.tabswitch!.s"
        (W) 7
        (S)* "n.bank.card.tabswitch.s"
        (R)

(:) :HIGHLIGHT.INCOME.TABSWITCH
```

```
        (S)* "n.inc.card.tabswitch!.s"
        (W) 7
        (S)* "n.inc.card.tabswitch.s"
        (R)

( ) :HIGHLIGHT.GROWTH.TABSWITCH
        (S)* "n.gro.card.tabswitch!.s"
        (W) 7
        (S)* "n.gro.card.tabswitch.s"
        (R)

;----------------------------------------------------------------------------
-------------
.highlights - ask

( ) :HIGHLIGHT.ASK.TABSWITCH
        (S)* "n.ask.tabswitch!.s
        (W) 2
        (S)* "n.ask.tabswitch.s
        (R)

( ) :HIGHLIGHT.ASK.ASSETS.CLOSE
        (S)* "n.ask.test!.s
        (S)* "n.ask.test!!!.s
        (S)* "n.ask.test!!.s
        (S)* "n.ask.test!!!.s
        (S)* "n.ask.tabclose.s
        (W) 3

        (R)

;****************************************************************************
;NEXT/BACK
;****************************************************************************
;each event in the program must specify where it will go
;if next or back is touched.

;*
(:) :NEXT
        (G) :HIGHLIGHT.NEXT

        if $242 <> 0        ;if a submenu is open
                (G) :CLOSE.THIS.SUBMENU

        ; erase the customer's prompt
        if $340 <> 0
                {
                (Z) 2
                (D) 6 "n.clearprompt.s"    ;customer screen
                (Z) 1
                (A) $340 "0"
                }

        (J) $299

;*
(:) :BACK
        (G) :HIGHLIGHT.BACK

        ; erase the customer's prompt
        if $340 <> 0
                {
                (Z) 2
```

BEST AVAILABLE COPY

BEST AVAILABLE COPY

```
        (D) 6 "n.clearprompt.s"   ;customer screen
        (Z) 1
        (A) $340 "0"
        }

if $242 <> 0        ;if a submenu is open
        (G) :CLOSE.THIS.SUBMENU

(J) $298

;**************************************************************************
;GLOSSARY
;**************************************************************************
;level 0

;*
( ) :GLOSSARY.DISPATCH

                ;if $266 = 0  ;if buylist is not showing
                        ;{
                        ;REMOVE HIGHLIGHT UNTIL XPAR PROBLEM IS FIXE
                        ;if $251 = 6
                        ;(G) :UNHIGH.INC.LINE.CURRENT

                        ;if $251 = 7
                        ;(G) :UNHIGH.GRO.LINE.CURRENT
                        ;}

        (G) :FILL.PROMPT.4.12
        (G) :SHOW.FIRST.PROMPT

        ;SAVE BACKGROUND
        (A) $302 "20"                       ; pixel offset for shadow
        (X)-* $302 "glossary.s"   ; save the area under the snip with the shadow

        ;POP UP GLOSSARY PAGE
        (S)* "glossary.s"                   ; draw the snip
        (I)-* $302 "glossary.s"   ; draw the shadow with the offset from the var $1

        ;SHOW DATA
        (Y)* 250 $375                                  ;(variable $377 is already set)

        (T)
        (T) $33 "glossary.tabclose.s" :CLOSE.GLOSSARY

        ;SET FLAG
        (A) $265 "1"

        (J) :MAIN.WAIT.LOADED

;-----------------------------------------------------------------------
;level 1

;*
(:) :CLOSE.GLOSSARY

        (A) $199 "0"

        ;restore
        (X)*

                ;if $266 = 0  ;If buylist is not showing
                        ;{
```

BEST AVAILABLE COPY

```
                    ;TEMP UNTIL XPAR PROBLEM IS FIXED...
                    ;if $251 = 6
                    ;(G) :HIGH.INC.LINE.CURRENT

                    ;if $251 = 7
                    ;(G) :HIGH.GRO.LINE.CURRENT
                    ;}

    if $251 = 6 ;income card
        {
        if $267 = 1  ;intermediate level
            (G) :FILL.PROMPT.4.4
        else            ;if detail level
            (G) :FILL.PROMPT.4.5
        }
    if $251 = 7 ;growth card
        {
        if $267 = 1  ;intermediate level
            (G) :FILL.PROMPT.4.6
        else            ;if detail level
            (G) :FILL.PROMPT.4.7
        }
    (G) :SHOW.FIRST.PROMPT

    ;SET FLAG
    (A) $265 "0"

    (J) :MAIN.WAIT

;*****************************************************************************
;PROMPTS (OLD)
;*****************************************************************************

;*
;(:) :GET.CLEAR.PROMPT

    (A) $199 "30" ;speed
    (D) 6 "n.prompt.s"

    (T) "n.prompt.s" :MAIN.WAIT
    (H) 20

    (R)
;*
;(:) :GET.2ND.PROMPT

    (G) :HIGHLIGHT.CONTINUE.PROMPT

    (A) $199 "100" ;speed
    (D) 6 "n.prompt.s"

    ;BLANK CONTINUE PROMPT
    (S) "n.prompt.cont.blnk.s"

    (H) 20

    (R)

;*
;(:) :2ND.PROMPT
    ;check which prompt, then go there...
    stringFormat $290 ":GET.2ND.PROMPT%n", $115
    (J) $290
```

```
;*****************************************************************************
;GRAPHICS - SHOW PIE
;*****************************************************************************

;*
( ) PREP.PIE

;ADJUST PIE ON Z3
(Z) 3
(S) "n.buildpie.blnk.s"
(R)

;*
( ) :SHOW.PIE ;dissolves

;SHOW ON Z1
(Z) 1
(A) $199 "1"
(U) 7 "n.buildpie.blnk.s"

;SHOW ON Z2
(A) $199 "1"
(Z) 2
(U) 7 "n.buildpie.blnk.s"

(Z) 1
(R)

;*
( ) :SNAP.PIE ;snaps

;SHOW ON Z1
(Z) 1
(A) $199 "1"
(U) 9 "n.buildpie.blnk.s"

;SHOW ON Z2
(A) $199 "1"
(Z) 2
(U) 9 "n.buildpie.blnk.s"

(Z) 1
(R)


;*****************************************************************************
;GO FROM MAINMENU
;*****************************************************************************

;*
(:) :GO.FROM.MAINMENU.INTRO

        ;- cleanup elsewhere
                if $242 <> 0   ;if another submenu is open (this one can't be open from
                        (G) :CLOSE.OTHER.SUBMENU

                if $241 = 1                    ;if this menu is highlit
                        (G) :HI.TO.LO.MAINMENU.INTRO
                else                           ;if other menu is highlit
                        (G) :UNHIGHLIGHT.MAINMENU.CURRENT

        ;- lowlight this mainmenu
```

BEST AVAILABLE COPY

```
(G) :LOWLIGHT.MAINMENU.INTRO

;- save background
        (X) "n.csr.submenu.intro.s"

;- open submenu
        (S) "n.csr.submenu.intro.s"
        (G) :GREYOUT.SUBMENU1

;- do prompt
        (G) :FILL.PROMPT.NONE
        (G) :SHOW.FIRST.PROMPT

;- do next/back
        (A) $298 "99"
        (A) $299 ":PREFACE.1"
        (G) :SHOW.NEXTBACK

;- set flags
        (A) $220 "1" ;preface on center screen
        (A) $241 "1" ;mainmenu location
        (A) $242 "1" ;a submenu is open

;- leave
        (J) :MAIN.WAIT

;*
(.) :GO.FROM.MAINMENU.ASK

;- cleanup elsewhere
        if $242 <> 0  ;if another submenu is open (this one can't be open from
                (G) :CLOSE.OTHER.SUBMENU

        if $241 = 2             ;if this menu is highlit
                (G) :HI.TO.LO.MAINMENU.ASK

        else                    ;if other menu is highlit
                (G) :UNHIGHLIGHT.MAINMENU.CURRENT

;- lowlight this mainmenu
                (G) :LOWLIGHT.MAINMENU.ASK

;- save background
        (X) "n.csr.submenu.ask.s"

;- open submenu
        (S) "n.csr.submenu.ask.s"
        (G) :GREYOUT.SUBMENU2

;- do prompt
        (G) :FILL.PROMPT.NONE
        (G) :SHOW.FIRST.PROMPT

;- do next/back
        (A) $298 "99"
        (A) $299 ":ASK.ASSETS.FIRST.TIME"
        (G) :SHOW.NEXTBACK

;- set flags
        (A) $241 "2" ;mainmenu location
        (A) $242 "2" ;a submenu is open

;- leave
        (J) :MAIN.WAIT
```

BEST AVAILABLE COPY

```
(:) GO.FROM.MAINMENU.BUILD

    ;- cleanup elsewhere
        if $242 <> 0   ;if another submenu is open (this one can't be open from
                (G) :CLOSE.OTHER.SUBMENU

        if $241 = 3                ;if this menu is highlit
                (G) :HI.TO.LO.MAINMENU.BUILD

        else                       ;if other menu is highlit
                (G) :UNHIGHLIGHT.MAINMENU.CURRENT

    ;- lowlight this mainmenu
                (G) :LOWLIGHT.MAINMENU.BUILD

    ;- save background
        (X) "n.csr.submenu.build.s"

    ;- open submenu
        (S) "n.csr.submenu.build.s"
        (G) :GREYOUT.SUBMENU3

    ;- do prompt
        (G) :FILL.PROMPT.NONE
        (G) :SHOW.FIRST.PROMPT

    ;- do next/back
        (A) $298 "99"
        (A) $299 ":BUTTON7"
        (G) :SHOW.NEXTBACK

    ;- set flags
        (A) $241 "3" ;mainmenu location
        (A) $242 "3" ;a submenu is open

    ;- leave
        (J) :MAIN.WAIT

;*
(:) :GO.FROM.MAINMENU.SHOWREC

    ;- cleanup elsewhere
        if $242 <> 0   ;if another submenu is open (this one can't be open from
                (G) :CLOSE.OTHER.SUBMENU

        if $241 = 4                ;if this menu is highlit
                (G) :HI.TO.LO.MAINMENU.SHOWREC

        else                       ;if other menu is highlit
                (G) :UNHIGHLIGHT.MAINMENU.CURRENT

    ;- lowlight this mainmenu
                (G) :LOWLIGHT.MAINMENU.SHOWREC

    ;- save background
        (X) "n.csr.submenu.showrec.s"

    ;- open submenu
        (S) "n.csr.submenu.showrec.s"
        (G) :GREYOUT.SUBMENU4

    ;- do prompt
```

BEST AVAILABLE COPY

BEST AVAILABLE COPY

```
        (G) :FILL.PROMPT.NONE
        (G) :SHOW.FIRST.PROMPT

    ;- do next/back
        (A) $298 "99"
        (A) $299 ":BUTTON4"
        (G) :SHOW.NEXTBACK

    ;- set flags
        (A) $241 "4" ;mainmenu location
        (A) $242 "4" ;a submenu is open

    ;- leave
        (J) :MAIN.WAIT

;*
( ) :GO.FROM.MAINMENU.SHOWOUT

    ;- cleanup elsewhere
        if $242 <> 0   ;if another submenu is open (this one can't be open from
                (G) :CLOSE.OTHER.SUBMENU

        if $241 = 5         ;if this menu is highlit
                (G) :HI.TO.LO.MAINMENU.SHOWOUT

        else                    ;if other menu is highlit
                (G) :UNHIGHLIGHT.MAINMENU.CURRENT

    ;- lowlight this mainmenu
                (G) :LOWLIGHT.MAINMENU.SHOWOUT

    ;- save background
        (X) "n.csr.submenu.showout.s"

    ;- open submenu
        (S) "n.csr.submenu.showout.s"
        (G) :GREYOUT.SUBMENUS

    ;- do prompt
        (G) :FILL.PROMPT.NONE
        (G) :SHOW.FIRST.PROMPT

    ;- do next/back
        (A) $298 "99"
        (A) $299 ":PROPOSED.CSR"
        (G) :SHOW.NEXTBACK

    ;- set flags
        (A) $241 "5" ;mainmenu location
        (A) $242 "5" ;a submenu is open

    ;- leave
        (J) :MAIN.WAIT

;*
( ) :GO.FROM.MAINMENU.CONCLUDE

    ;- cleanup elsewhere
        if $242 <> 0   ;if another submenu is open (this one can't be open from
                (G) :CLOSE.OTHER.SUBMENU

        if $241 = 6         ;if this menu is highlit
                (G) :HI.TO.LO.MAINMENU.CONCLUDE
```

```
            else                          ;if other menu is highlit
                      (G) :UNHIGHLIGHT.MAINMENU CURRENT

      ;- lowlight this mainmenu
                      (G) :LOWLIGHT.MAINMENU.CONCLUDE

      ;- save background
              (X) "n.csr.submenu.conclude.s"

      ;- open submenu
              (S) "n.csr.submenu.conclude.s"
              (G) :GREYOUT.SUBMENU6

      ;- do prompt
              (G) :FILL.PROMPT.NONE
              (G) :SHOW.FIRST.PROMPT

      ;- do next/back
              (A) $298 "99"
              (A) $299 ":BUTTON11"
              (G) :SHOW.NEXTBACK

      ;- set flags
              (A) $241 "6" ;mainmenu location
              (A) $242 "6" ;a submenu is open

      ;- leave
              (J) :MAIN.WAIT

;*
(:) :GO.FROM.MAINMENU.TOOLS

      ;- cleanup elsewhere
              if $242 <> 0   ;if another submenu is open (tools CAN'T be)
                      {
                      (X) ;put other submenu away
                      (G) :LOW.TO.HI.MAINMENU.CURRENT
                      }

      ;- lowlight this mainmenu
              (G) :LOWLIGHT.MAINMENU.TOOLS

      ;- save background
              (X) "n.csr.submenu.tools.s"

      ;- open submenu
              (S) "n.csr.submenu.tools.s"
              (G) :GREYOUT.SUBMENU7

      ;- don't clear prompt

      ;- do next/back
              ;not for tools

      ;- set flags
              ;don't reset $241 "7" for tools ;mainmenu location
              (A) $259 "1"  ;tools is open
              (A) $242 "7" ;a submenu is open

      ;- leave
              (J) :MAIN.WAIT

;*----------------------------------------------------------------
```

Money Advice Scan File

BEST AVAILABLE COPY

.level 2

BEST AVAILABLE COPY

```
.
( ) CLOSE.OTHER.SUBMENU

        ;- close other submenu (restore background)
                (X)

        ;- undo lowlight
                if $259 = 1  ;if tools is open
                        (G) :UNLOWLIGHT.MAINMENU7
                else
                        (G) :UNLOWLIGHT.MAINMENU.CURRENT

        ;- set flag
                (A) $242 "0"  ;no submenu is open
                (A) $259 "0"  ;tools is closed

        ;-leave
                (R)

.
( ) :CLOSE.THIS.SUBMENU

        ;- close this submenu (restore background)
                (X)

        ;- undo lowlights
                if $259 = 1  ;if tools is open
                        (G) :UNLOWLIGHT.MAINMENU7
                else
                        (G) :LOW.TO.HI.MAINMENU.CURRENT

        ;- set flag
                (A) $242 "0"  ;no submenu is open
                (A) $259 "0"  ;tools is closed

        ;-leave
                (R)

.
;       SUBMENU GREYOUT EVENTS

        (:) :GREYOUT.SUBMENU1  ;intro

                (A) $380 "0"
                testEmpty $1 ;name empty?

                if $380 = 1 ;if name is empty
                        {
                        (A) $380 "0"  ;reset
                        (R)
                        }

                testEmpty $9  ;is marital empty

                if $380 = 1 ;if marital is empty
                        {
                        (A) $380 "0"  ;reset
                        (R)
                        }

                else  ;grey it out
                        (I) $281 "n.csr.submenu.intro4.s"
```

BEST AVAILABLE COPY

```
        (R)

(:) :GREYOUT.SUBMENU2   ;ask assets

        If $20 = 0                  ;if no assets are entered yet
                (I) $281 "n.csr.submenu.ask4.s"
        (R)

(:) :GREYOUT.SUBMENU3   ;build

        If $7 = 0                   ;if income's not entered yet
                (I) $281 "n.csr.submenu.build2.s"
        If $64 = $20        ;if avail cash = total assets
                (I) $281 "n.csr.submenu.build2.s"
        (R)

(:) :GREYOUT.SUBMENU4

        If $251 = 5  ;if BANK card is showing
                (I) $281 "n.csr.submenu.showrec3.s"
        If $251 = 6  ;if INCOME card is showing
                (I) $281 "n.csr.submenu.showrec4.s"
        If $251 = 7  ;if GROWTH card is showing
                (I) $281 "n.csr.submenu.showrec5.s"

        ;if $267 <> 2  ;if DETAIL card is NOT showing ;buylist          , out
                ;(I) $281 "n.csr.submenu.showrec6.s"
        ;if $266 <> 0  ;or if BUYLIST is showing
                ;(I) $281 "n.csr.submenu.showrec6.s"
        (R)

(:) :GREYOUT.SUBMENU5
        (R)

(:) :GREYOUT.SUBMENU6
        (R)

(:) :GREYOUT.SUBMENU7

        ;(:) :HAVE.ANY.CHILDREN
        ;(Q) "$131 = 0" :IS.INCOME.ENTERED
        ;(I) $281 "n.csr.submenu.intro4.s"

        ;(:) :IS.INCOME.ENTERED
        ;(Q) "$7 = 0" :END.BUTTON.REFRESH
        ;(G) :SHOW.BUTTON8

        (R)

;*****************************************************************************
*********
; GO FROM OPEN SUBMENU'S
;*****************************************************************************
*********
;level 0

;*
;FROM INTRO SUBMENU

    (:) :GO.FROM.INTRO.MAIN                         ;mainmenu click
            (G) :CLOSE.THIS.SUBMENU
```

BEST AVAILABLE COPY

```
        (G) :SHOW.NEXTBACK
        (J) :MAIN.WAIT

(:) :GO.FROM.INTRO1                  ;show investment options
        (G) :LOWLIGHT.SUBMENU.INTRO1
        (G) :CLOSE.THIS.SUBMENU
        (J) :PREFACE.1

(:) :GO.FROM.INTRO2                  ;define 3 categories
        (G) :LOWLIGHT.SUBMENU.INTRO2
        (G) :CLOSE.THIS.SUBMENU
        (J) :PREFACE.2

(:) :GO.FROM.INTRO3                  ;compare past performance
        (G) :LOWLIGHT.SUBMENU.INTRO3
        (G) :CLOSE.THIS.SUBMENU
        (J) :BUTTON10

(:) :GO.FROM.INTRO4                  ;sign on customer
        (G) :LOWLIGHT.SUBMENU.INTRO4
        (G) :CLOSE.THIS.SUBMENU
        (J) :SIGN.ON.CUSTOMER

.
.FROM ASK SUBMENU

(:) :GO.FROM.ASK.MAIN                        ;mainmenu click
        (G) :CLOSE.THIS.SUBMENU
        (J) :MAIN.WAIT

(:) :GO.FROM.ASK.BANK
        (G) :LOWLIGHT.SUBMENU.ASK1
        (G) :CLOSE.THIS.SUBMENU

                if $220 <> 0  ;if center isn't clear
                        {
                        if $251 < 5  ;if b.i.g. card isn't up
                                (G) :CLEAR.CENTER.SCREEN.FROM.BUTTON
                        if $251 > 7  ;if b.i.g. card isn't up
                                (G) :CLEAR.CENTER.SCREEN.FROM.BUTTON
                        }

        (G) :OPEN.ASK.BANK

        ;SET NEXT/BACK
        (A) $298 "99"
        (A) $299 "99"
        (G) :SHOW.NEXTBACK

        (J) :MAIN.WAIT

(:) :GO.FROM.ASK.INCOME
        (G) :LOWLIGHT.SUBMENU.ASK2
        (G) :CLOSE.THIS.SUBMENU

                if $220 <> 0  ;if center isn't clear
                        {
                        if $251 < 5  ;if b.i.g. card isn't up
                                (G) :CLEAR.CENTER.SCREEN.FROM.BUTTON
                        if $251 > 7  ;if b.i.g. card isn't up
                                (G) :CLEAR.CENTER.SCREEN.FROM.BUTTON
                        }
```

BEST AVAILABLE COPY

```
        (G) :OPEN.ASK.INCOME

        ;SET NEXT/BACK
        (A) $298 "99"
        (A) $299 "99"
        (G) :SHOW.NEXTBACK

        (J) :MAIN.WAIT

(:) :GO.FROM.ASK.GROWTH
        (G) :LOWLIGHT.SUBMENU.ASK3
        (G) :CLOSE.THIS.SUBMENU

                if $220 <> 0 ;if center isn't clear
                        {
                        if $251 < 5 ;if b.i.g. card isn't up
                                (G) :CLEAR.CENTER.SCREEN.FROM.BUTTON
                        if $251 > 7 ;if b.i.g. card isn't up
                                (G) :CLEAR.CENTER.SCREEN.FROM.BUTTON
                        }

        (G) :OPEN.ASK.GROWTH

        ;SET NEXT/BACK
        (A) $298 "99"
        (A) $299 "99"
        (G) :SHOW.NEXTBACK

        (J) :MAIN.WAIT

(:) :GO.FROM.ASK.PIE.CURRENT
        (G) :LOWLIGHT.SUBMENU.ASK4
        (G) :CLOSE.THIS.SUBMENU
        (J) :BUTTON2

;*
;FROM BUILD SUBMENU

    (:) :GO.FROM.BUILD.MAIN                          ;mainmenu click
            (G) :CLOSE.THIS.SUBMENU
            (J) :MAIN.WAIT

    (:) :GO.FROM.BUILD1
            (G) :LOWLIGHT.SUBMENU.BUILD1
            (G) :CLOSE.THIS.SUBMENU

            If $220 <> 4        ;if center
                    (G) :CLEAR.CENTER.SCREEN.FROM.BUTTON  ;do this on all fro

            (J) :BUTTON7

    (:) :GO.FROM.BUILD2
            (G) :LOWLIGHT.SUBMENU.BUILD2
            (G) :CLOSE.THIS.SUBMENU

            if $220 <> 4
                    (G) :CLEAR.CENTER.SCREEN.FROM.BUTTON  ;do this on all fro

            (J) :BUTTON7 41

;*
;FROM SHOWREC SUBMENU
```

```
(:) :GO.FROM.SHOWREC.MAIN                 ;mainmenu click
        (G) :CLOSE.THIS.SUBMENU
        (J) :MAIN.WAIT

(:) :GO.FROM.SHOWREC1                         ;show proposed pie
        (G) :LOWLIGHT.SUBMENU.SHOWREC1
        (G) :CLOSE.THIS.SUBMENU
        (J) :BUTTON4

(:) :GO.FROM.SHOWREC2                         ;compare pies
        (G) :LOWLIGHT.SUBMENU.SHOWREC2
        (G) :CLOSE.THIS.SUBMENU
        (J) :BUTTON12

(:) :GO.FROM.SHOWREC3                         ;show bank
        (G) :LOWLIGHT.SUBMENU.SHOWREC3
        (G) :CLOSE.THIS.SUBMENU
        (J) :REQUEST.BANK.REC.INT

(:) :GO.FROM.SHOWREC4                         ;show income
        (G) :LOWLIGHT.SUBMENU.SHOWREC4
        (G) :CLOSE.THIS.SUBMENU
        (J) :REQUEST.INCOME.REC.INT

(:) :GO.FROM.SHOWREC5                         ;show growth
        (G) :LOWLIGHT.SUBMENU.SHOWREC5
        (G) :CLOSE.THIS.SUBMENU
        (J) :REQUEST.GROWTH.REC.INT

;out (:) :GO.FROM.SHOWREC6                ;show buylist
        (G) :LOWLIGHT.SUBMENU.SHOWREC6
        (G) :CLOSE.THIS.SUBMENU
        if $251 = 6
                (G) :REQUEST.INCOME.BUYLIST
        if $251 = 7
                (G) :REQUEST.GROWTH.BUYLIST

;*
;FROM SHOWOUT SUBMENU

(:) :GO.FROM.SHOWOUT.MAIN                 ;mainmenu click
        (G) :CLOSE.THIS.SUBMENU
        (J) :MAIN.WAIT

(:) :GO.FROM.SHOWOUT1
        (G) :LOWLIGHT.SUBMENU.SHOWOUT1
        (G) :CLOSE.THIS.SUBMENU
        (J) :PROPOSED.CSR

(:) :GO.FROM.SHOWOUT2
        (G) :LOWLIGHT.SUBMENU.SHOWOUT2
        (G) :CLOSE.THIS.SUBMENU
        (J) :CURRENT.CSR

(:) :GO.FROM.SHOWOUT3
        (G) :LOWLIGHT.SUBMENU.SHOWOUT3
        (G) :CLOSE.THIS.SUBMENU
        (J) :OTHER.CSR

;*
;FROM CONCLUDE SUBMENU

(:) :GO.FROM.CONCLUDE.MAIN
```

BEST AVAILABLE COPY

BEST AVAILABLE COPY

```
        (G) :CLOSE.THIS.SUBMENU                   ;mainmenu click
        (J) :MAIN.WAIT

    (:) :GO.FROM.CONCLUDE1                        ;summarize
        (G) :LOWLIGHT.SUBMENU.CONCLUDE1
        (G) :CLOSE.THIS.SUBMENU
        (J) :BUTTON11

    (:) :GO.FROM.CONCLUDE2                        ;session notes
        (G) :LOWLIGHT.SUBMENU.CONCLUDE2
        (G) :CLOSE.THIS.SUBMENU
        (J) :SESSION.NOTES

    (:) :GO.FROM.CONCLUDE3                        ;print handout out
        (G) :LOWLIGHT.SUBMENU.CONCLUDE3
        (G) :CLOSE.THIS.SUBMENU
        (J) :PRINTOUT

;*
;FROM TOOLS SUBMENU

    (:) :GO.FROM.TOOLS.MAIN
        (G) :CLOSE.THIS.SUBMENU               ;mainmenu click
        (J) :MAIN.WAIT

    (:) :GO.FROM.TOOLS1                       ;session notes
        (G) :LOWLIGHT.SUBMENU.TOOLS1
        (G) :CLOSE.THIS.SUBMENU
        (J) :SESSION.NOTES

    (:) :GO.FROM.TOOLS2                       ;special considerations
        (G) :LOWLIGHT.SUBMENU.TOOLS2
        (G) :CLOSE.THIS.SUBMENU
        (J) :BUTTON5

            ;(:) :GO.FROM.TOOLS3                   ;edit (out)
            ;;      (G) :LOWLIGHT.SUBMENU.TOOLS3
            ;       (G) :CLOSE.THIS.SUBMENU
            ;       (J) :BUTTON5

    (:) :GO.FROM.TOOLS3                       ;calculator
        (G) :LOWLIGHT.SUBMENU.TOOLS3
        (G) :CLOSE.THIS.SUBMENU
        (J) :CALCULATOR.MENU

    (:) :GO.FROM.TOOLS4                       ;file update
        (G) :LOWLIGHT.SUBMENU.TOOLS4
        (G) :CLOSE.THIS.SUBMENU
        (J) :FILE.UPDATE

    (:) :GO.FROM.TOOLS5                       ;customer records
        (G) :LOWLIGHT.SUBMENU.TOOLS5
        (G) :CLOSE.THIS.SUBMENU
        (J) :CUSTOMER.RECORDS

 (:) :GO.FROM.TOOLS6                          ;restart
        (G) :LOWLIGHT.SUBMENU.TOOLS6
        (G) :CLOSE.THIS.SUBMENU
        (J) :RESTART.MONEY.ADVISOR

 (:) :GO.FROM.TOOLS7                          ;quit
        (G) :LOWLIGHT.SUBMENU.TOOLS7
        (G) :CLOSE.THIS.SUBMENU
        (J) :QUIT.MONEY.ADVISOR
```

BEST AVAILABLE COPY

```
;**************************************************************************
OPEN THE DATA MENU
;**************************************************************************

;*------------------------------------------------------------------------
;level 1

(:) OPEN.DATA.MENU

        (Q) "$219 = 1" :MAIN.WAIT ;if menu is open already

        ;HIGHLIGHT TOUCH
        (S)* "n.data.menu.tabopen!.s"

        (G) :SHOW.DATA.MENU

        (J) :MAIN.WAIT

;*------------------------------------------------------------------------
;level 2

        (:) :SHOW.DATA.MENU

                If $219 = 1 ;if it is open already
                        (R)

                ;SET FLAG
                (A) $219 "1" ;data menu is open

                ;;PREP MENU BAR - OFF SCREEN
                ;(Z) 3

                ;SHOW BLANK MENU
                (A) $199 "1" ;speed
                (D)* 1 "n.data.menu.blnk.s"

                (G) :SHOW.NAME.ON.NAMETAB
                (H) 35
                (G) :SHOW.MARITAL.DATA.MENU
                (G) :SHOW.INCOME.DATA.MENU
                (G) :SHOW.CHILDREN.DATA.MENU
                (G) :SHOW.HOME.DATA.MENU
                (G) :SHOW.AGE.DATA.MENU
                (G) :SHOW.EVENTS.DATA.MENU

                ;SEND TO MAIN SCREEN
                ;(Z) 1
                ;mpw (A) $199 "1000" ;speed
                ;(A) $199 "200" ;speed
                ;(U)* 1 "n.data.menu.blnk.s"

                ;SHOW SQUARE TO CLOSE
                (S)* "n.data.menu.tabclose.s"

                (R)

;*------------------------------------------------------------------------
;level 3

                ;*
                (:) :SHOW.NAME.ON.NAMETAB
                        (H) 16
```

BEST AVAILABLE COPY

```
        if $219 = 0         ;if menu is closed
                (V)* $1 @14,50
        else                ;if menu is open
                (V)* $1 @34,50
        (R)

;*
(:) :SHOW.INCOME.DATA.MENU
        if $7<>0
                {
                stringFormat $290 "income %$,n" $7
                display* $290 @13,139
                }
        else
                display* "income" @13,139
        (R)

;*
(:) :SHOW.MARITAL.DATA.MENU

if $149=0
        (V)* "single" @13,67
if $149=1
        (V)* "married" @13,67
if $149=2
        (V)* "marital" @13,67

(R)

;*
(:) :SHOW.CHILDREN.DATA.MENU

if $136 = 1 ;if children has been edited
        {
        if $131 = 0  ;if no children
                stringFormat $195 "no children"

        else                    ;if there are children
                {
                if $4 = 1               ;if one child
                        stringFormat $195 "1 child"
                if $4 > 1               ;if more than 1 child
                        stringFormat $195 "%n children", $4
                }
        }

;SHOW LABEL
(V)* $195 @13,263 ;label

(R)

;*
(:) :SHOW.HOME.DATA.MENU

if $150=0
        (V)* "renter" @13,355
if $150=1
        (V)* "homeowner" @13,355
if $150=2
        (V)* "home" @13,355

(R)

;*
```

BEST AVAILABLE COPY

```
(:) :SHOW.AGE.DATA.MENU
(V)* $193 ●13,443        ;age label
(V)* $2 ●13,462          ;age value
        (R)

;*
(:) :SHOW.EVENTS.DATA.MENU
(V)* "events" ●13,507 ;events
        (R)

;**********************************************************************
;CLOSE THE DATA MENU
;**********************************************************************
;*--------------------------------------------------------------------
;level 1

(:) :DATA.MENU.CLOSE

        ;HIGHLIGHT CLOSE-SQUARE
        (S)* "n.data.menu.tabclose!.s"

        ;PAUSE
        (W) 4

        (:) :DATA.MENU.CLOSE.2

        (G) :REMOVE.DATA.MENU

        (J) :MAIN.WAIT
;*--------------------------------------------------------------------
;level 2

(:) :REMOVE.DATA.MENU

        if $219 = 0 ;if it is closed already
                (R)

        ;CLOSE DATA MENU
        ;mpw (A) $199 "1000" ;speed
        (A) $199 "200" ;speed
        (D)* 2 "n.data.menu.close.s"

        ;SHOW NAME ON CLOSED TAB
        (H) 16
        (V)* $1 ●14,50

        ;SHOW SQUARE ON CLOSED TAB
        (S)* "n.data.menu.tabopen.s"

        ;SET FLAG
        (A) $219 "0"  ;DATA MENU CLOSED

        (R)

;**********************************************************************
;CHECK DATA ENTRY
;**********************************************************************

;this event is used to check the data entry for all yes/no questions
;in the personal data entry
;-------------------------------------
```

level 1

BEST AVAILABLE COPY

```
;•
(:) :NOT.A.VALID.ENTRY.YN

        ;SAVE BACKGROUND
        (A) $302 "35"                    ; shadow offset
        (X)- $302 "n.message.orange.s"

        ;SHOW MESSAGE BOX
        (S) "n.message.orange.s"
        (I)- $302 "n.message.orange.s" ;shadow
        (S) "n.message.finger.s"
        (S) "n.message.okay.right.s" @237,414

        (H) 23
        (V) "Sorry, I don't recognize^that entry.^Please enter YES or NO." @17!

        (T)
        (T) $33 "n.message.okay.right.s" @237,414 :MESSAGE.BOX.OKAY

        (A) $380 "0"  ;remove error code

(J) :MAIN.WAIT.LOADED


;•
(:) :NOT.A.VALID.ENTRY.NUMBER

        ;SAVE BACKGROUND
        (A) $302 "35"                    ; shadow offset
        (X)- $302 "n.message.orange.s"

        ;SHOW MESSAGE BOX
        (S) "n.message.orange.s"
        (I)- $302 "n.message.orange.s" ;shadow
        (S) "n.message.finger.s"
        (S) "n.message.okay.right.s" @237,414

        (H) 23
        (V) "Sorry, you must enter^a number in this field." @179,242

        (T)
        (T) $33 "n.message.okay.right.s" @237,414 :MESSAGE.BOX.OKAY

        (A) $380 "0"  ;remove error code

(J) :MAIN.WAIT.LOADED


;•••••••••••••••••••••••••••••••••••••••••••••••••••••••••••••••••••••••••••••
;EDIT CUSTOMER'S NAME
;•••••••••••••••••••••••••••••••••••••••••••••••••••••••••••••••••••••••••••••

;•
(:) :EDIT.NAME

        if $219 = 1
                (G) :EDIT.NAME.OPENMENU
        else
                (G) :EDIT.NAME.CLOSEDMENU

        ;SET NEXT/BACK
        (A) $298 "99"
```

```
(A) $299 "99"
(G) :SHOW.NEXTBACK

(J) :MAIN.WAIT
```

BEST AVAILABLE COPY

```
;-----------------------------------------------------------
( ) :EDIT.NAME.OPENMENU

        HIGHLIGHT OPEN NAME TAB
        (S)* "n.data.menu.nametab!.s"

        (G) :FILL.PROMPT.1.20  ;yellow space for name opened
        (G) :SHOW.FIRST.PROMPT

        ;WAIT FOR NAME INPUT - OPEN
        (H) 16
        (A)* 21 $1 ●34,50

        (G) :FILL.PROMPT.NONE
        (G) :SHOW.FIRST.PROMPT

        ;UN-HILIGHT OPEN NAME TAB
        (S)* "n.data.menu.nametab.s"

        (G) :SHOW.NAME.ON.NAMETAB
        (R)

;*
(:) :EDIT.NAME.CLOSEDMENU

        HIGHLIGHT NAME TAB
        (S)* "n.tab.name.blnk!.s"

        (G) :FILL.PROMPT.1.20  ;yellow space for name opened
        (G) :SHOW.FIRST.PROMPT

        ;WAIT FOR NAME INPUT
        (H) 16
        (A)* 21 $1 ●14,50

        (G) :FILL.PROMPT.NONE
        (G) :SHOW.FIRST.PROMPT

        ;UN-HILIGHT CLOSED NAME TAB
        (S)* "n.tab.name.blnk.s"

        (G) :SHOW.NAME.ON.NAMETAB

        (R)


;••••••••••••••••••••••••••••••••••••••••••••••••••••••••••••••••••••••••
;EDIT MARITAL
;••••••••••••••••••••••••••••••••••••••••••••••••••••••••••••••••••••••••
;level 1

(:) :EDIT.MARITAL

        (G) :DO.EDIT.MARITAL

        ;- prompt
                (G) :FILL.PROMPT.NONE
                (G) :SHOW.FIRST.PROMPT
```

BEST AVAILABLE COPY

```
;- set next/back
        (A) $298 "99"
        (A) $299 "99"
        (G) :SHOW.NEXTBACK

;- reallocate assets
(G) :RERUN.ALLOCS

(J) :REFRESH.DISPATCH
```

---

```
.level 2

( ) :DO.EDIT.MARITAL

        ;HIGHLIGHT BAR
        (S)* "n.data.menu.marital!.s"

        ;SHOW "MARITAL" REVERSED
        (H) 43
        (V)* "marital" @13,67

        ;SAVE BACKGROUND
        (X)* "n.data.input.marital1!.s"

        ;SHOW ENTRY BAR
        (S)* "n.data.input.marital1!.s"

        (G) :FILL.PROMPT.1.21  ;marital status box opened
        (G) :SHOW.FIRST.PROMPT

        ;*
        (:) :WAIT.FOR.MARITAL.INPUT
        (H) 35
        ;(A) $9 ""                        ;CLEAR marital
        (A)* 1 $9 @34,143

                ;SPECIFY RETURN POINT
                stringFormat $297 ":WAIT.FOR.MARITAL.INPUT"

                ;STRIP ENTRY TO FIRST LETTER THEN TEST IT
                LEFTCHARS $9 1 $290
                TESTVALID $290 "n N y Y"

                If $380 = 0  ;If there's an error
                (J) :NOT.A.VALID.ENTRY.YN

        ;RESTORE BACKGROUND
        (A) $199 "0" ;speed
        (X)* 2

        ;UNLIGHT BAR ON MENU
        (S)* "n.data.menu.marital.s"

        ;- reallocate assets
        (G) :RERUN.ALLOCS

        (H) 35
        (G) :SHOW.MARITAL.DATA.MENU

        ;SET FLAG
        (A) $247 "0"  ;edit flag cancelled
```

```
(R) :

••••••••••••••••••••••••••••••••••••••••••••••••••••••••••••••••••••••••••••••
.EDIT CHILDREN
••••••••••••••••••••••••••••••••••••••••••••••••••••••••••••••••••••••••••••••
```

BEST AVAILABLE COPY

```
( ) EDIT.CHILDREN

    ;HIGHLIGHT BAR
    (S)* "n.data.menu.child!.s"

    ;REPLACE TEXT IN BAR (WHITE)
    (H) 43
    (V)* "children" ●13,263

    ;SAVE BACKGROUND
    (X)* "n.data.input.child1!.s"

    ;SHOW ENTRY BAR #1
    (S)* "n.data.input.child1!.s"

    (G) :FILL.PROMPT.3.13.int ;children info entry
    (G) :SHOW.FIRST.PROMPT

    ;•
    (:) :WAIT.FOR.CHILDREN.INPUT ;Y or N
    (H) 35
    (A)* 1 $130 ●34,353
    (A)* $136 "1"    ;children has been edited

        ;SPECIFY RETURN POINT
        stringFormat $297 ":WAIT.FOR.CHILDREN.INPUT"

        ;STRIP ENTRY TO FIRST LETTER THEN TEST IT
        LEFTCHARS $130 1 $290
        TESTVALID $290 "n N y Y"

        if $380 = 0 ;if there's an error
        (J) :NOT.A.VALID.ENTRY.YN

    ;UNHIGHLIGHT BAR #1
    (S)* "n.data.input.child1.s"

    ;REPLACE TEXT
    (H) 35
    (V)* $130 ●34,353

    ;CALC TO CHECK $130 FOR YES/NO then put in $131
    ;- reallocate assets
    (G) :RERUN.ALLOCS

    ;IF NO CHILDREN
    (Q) "$131 = 0" :CLOSE.CHILDREN.ENTRY

    ;SAVE BACKGROUND
    (X)* "n.data.input.child2!.s"

    ;SHOW ENTRY BAR #2
    (S)* "n.data.input.child2!.s"

    ;•
    (:) :WAIT.FOR.AGES
    ;WAIT FOR AGES OF CHILDREN
    (H) 35
```

```
(A)* 12 $5 ●55,300

        ;SPECIFY RETURN POINT
        stringFormat $297 ":WAIT.FOR.AGES"

        ;See if there's a number in here
        if $5 = 0
                {
                testEmpty $5

                if $380 = 1 ;if there's no number
                (J) :NOT.A.VALID.ENTRY.NUMBER
                }

;UNHIGHLIGHT BAR #2
(S)* "n.data.input.child2.s"

;SHOW AGES OF CHILDREN
(H) 35
(V)* $5 ●55,300

;SAVE BACKGROUND
(X)* "n.data.input.child3!.s"

;SHOW ENTRY BAR #3
(S)* "n.data.input.child3!.s"

;*
(:) :WAIT.FOR.COLLEGE.INPUT   ;Y or N
(H) 35
(A)* 1 $134 ●76,370

        ;SPECIFY RETURN POINT
        stringFormat $297 ":WAIT.FOR.COLLEGE.INPUT"

        ;STRIP ENTRY TO FIRST LETTER THEN TEST IT
        LEFTCHARS $134 1 $290
        TESTVALID $290 "n N y Y"

        if $380 = 0 ;if there's an error
        (J) :NOT.A.VALID.ENTRY.YN

;*
(:) :CLOSE.CHILDREN.ENTRY

;SET SPEED
(A) $199 "0"

if $131 = 0 ;no children
        (X)* 2 ;restore background
else
        {
        (X)* 2
        (X)* 2
        (X)* 2
        }

;UNLIGHT BAR ON MENU
(S)* "n.data.menu.child.s"

;- reallocate assets
(G) :RERUN.ALLOCS

(H) 35
```

BEST AVAILABLE COPY

BEST AVAILABLE COPY

```
        (G) :SHOW.CHILDREN.DATA.MENU

        (G) :FILL.PROMPT.NONE
        (G) :SHOW.FIRST.PROMPT

        ;SET FLAG
        (A) $247 "0" ;edit flag cancelled

        (J) :REFRESH.DISPATCH

;**************************************************************************
;EDIT DATA INPUT - HOME
;**************************************************************************

(.) :EDIT.HOME

        ;HIGHLIGHT BAR
        (S)* "n.data.menu.home!.s"

        ;SHOW LABEL REVERSED
        (H) 43
        (V)* "home" @13,355

        ;SAVE BACKGROUND
        (X)* "n.data.input.home1!.s"

        ;SHOW ENTRY BAR
        (S)* "n.data.input.home1!.s"

        (G) :FILL.PROMPT.3.15.int  ;home info entry
        (G) :SHOW.FIRST.PROMPT

        *
        (:) :WAIT.FOR.HOME.INPUT
        (H) 35
        ;(A) $6 ""                        ;CLEAR home
        (A)* 1 $6 @34,459

                ;SPECIFY RETURN POINT
                stringFormat $297 ":WAIT.FOR.HOME.INPUT"

                ;STRIP ENTRY TO 1 LETTER THEN TEST IT
                LEFTCHARS $6 1 $290
                TESTVALID $290 "n N y Y"

                If $380 = 0  ;If there's an error
                (J) :NOT.A.VALID.ENTRY.YN

        ;RESTORE BACKGROUND
        (A) $199 "0" ;speed
        (X)* 2

        ;UNLIGHT BAR ON MENU
        (S)* "n.data.menu.home.s"

        ;- reallocate assets
        (G) :RERUN.ALLOCS

        (H) 35
        (G) :SHOW.HOME.DATA.MENU

        (G) :FILL.PROMPT.NONE
        (G) :SHOW.FIRST.PROMPT
```

```
;SET FLAG
(A) $247 "0"      ;edit flag cancelled

;LEAVE
(J) :REFRESH.DISPATCH

(E)

;••••••••••••••••••••••••••••••••••••••••••••••••••••••••••••••••••••••••••••••••••••
;EDIT DATA INPUT - INCOME
;••••••••••••••••••••••••••••••••••••••••••••••••••••••••••••••••••••••••••••••••••••

(:) :EDIT.INCOME

        ;HIGHLIGHT BAR
        (S)* "n.data.menu.income!.s"

        ;REPLACE TEXT IN BAR (WHITE)
        (H) 43
        (V)* $191 @13,139

        ;SAVE BACKGROUND
        (X)* "n.data.input.income1!.s"

        ;SHOW ENTRY BAR
        (S)* "n.data.input.income1!.s"

        (G) :FILL.PROMPT.1.21  ;status box opened
        (G) :SHOW.FIRST.PROMPT

        ;*
        (:) :WAIT.FOR.GROSS.INCOME.INPUT
        ;WAIT FOR GROSS INCOME
        (H) 35
        formattedInput * $7 "%,n" @34,324 7 56 ;income

                ;SPECIFY RETURN POINT
                stringFormat $297 ":WAIT.FOR.GROSS.INCOME.INPUT"

                ;See If there's a number in here
                if $7 = 0
                        {
                        testEmpty $7

                        if $380 = 1  ;if there's no number
                        (J) :NOT.A.VALID.ENTRY.NUMBER
                        }

        ;UNHIGHLIGHT
        (S)* "n.data.input.income1!.s"

        ;SHOW AMOUNT
        displayLeft* $7, @34,324

        ;SAVE BACKGROUND
        (X)* "n.data.input.income2!.s"

        ;SHOW ENTRY BAR #2
        (S)* "n.data.input.income2!.s"

        ;*
        (:) :WAIT.FOR.EXPENSES
        ;WAIT FOR AVERAGE MONTHLY EXPENSES
```

BEST AVAILABLE COPY

BEST AVAILABLE COPY

```
(H) 35
formattedInput * $8 "%,n" ●55,324 5 ;monthly expenses

        ;SPECIFY RETURN POINT
        stringFormat $297 ":WAIT.FOR.EXPENSES"

        ;See If there's a number in here
        if $8 = 0
                {
                testEmpty $8

                If $380 = 1 ;If there's no number
                (J) :NOT.A.VALID.ENTRY.NUMBER
                }

;UNHIGHLIGHT
(S)* "n.data.input.income2!.s"

;SHOW AMOUNT
displayLeft* $8, ●55,324

;SAVE BACKGROUND
(X)* "n.data.input.income3!.s"

;SHOW ENTRY BAR 3
(S)* "n.data.input.income3!.s" ;entry bar 3

;*
(:) :WAIT.FOR.MARGINAL.TAX.RATE
(H) 35
display* "%", ●76,316
formattedInput * $173 "%n" ●76,316 2 ;income

testEmpty $173
if $380 = 1 ;If there's nothing here go to the tax calculator
        {
        (G) :DO.TAX.RATE.CALCULATOR
        (J) :WAIT.FOR.MARGINAL.TAX.RATE
        }

;RESTORE BACKGROUND
(A) $199 "0" ;speed
(X)* 2
(X)* 2
(X)* 2

;UNLIGHT BAR ON MENU
(S)* "n.data.menu.income.s"

;- reallocate assets
(G) :RERUN.ALLOCS

(H) 35
(G) :SHOW.INCOME.DATA.MENU

(G) :FILL.PROMPT.NONE
(G) :SHOW.FIRST.PROMPT

;SET FLAG
(A) $247 "0" ;cancel edit's been made

;LEAVE
(J) :REFRESH.DISPATCH
```

EDIT DATA INPUT - AGE

BEST AVAILABLE COPY

```
( ) EDIT.AGE

        ;LOWLIGHT BAR
        (S)* "n.data.menu.age!.s"

        ;MAKE TEXT WHITE
        (H) 43
        (V)* $193 ●13,443

        ;SAVE BACKGROUND
        (X)* "n.data.input.age1!.s"

        ;SHOW ENTRY BAR
        (S)* "n.data.input.age1!.s"

        (G) :FILL.PROMPT.3.17.int  ;age info entry
        (G) :SHOW.FIRST.PROMPT

        (:) :WAIT.FOR.AGE
        ;WAIT FOR AGE INPUT
        (H) 35
        formattedInput * $2 "%n" ●34,523 2

                ;SPECIFY RETURN POINT
                stringFormat $297 ":WAIT.FOR.AGE"

                ;See  if there's a number in here
                if $2 = 0
                        {
                        testEmpty $2

                        if $380 = 1  ;if there's no number
                        (J) :NOT.A.VALID.ENTRY.NUMBER
                        }

        ;UN-HIGHLIGHT ENTRY
        (S)* "n.data.input.age1.s"
        (V)* $2 ●34,508

        ;*

        ;SAVE BACKGROUND
        (X)* "n.data.input.age2!.s"

        ;SHOW ENTRY BAR
        (S)* "n.data.input.age2!.s"

        (G) :FILL.PROMPT.3.17.int  ;age info entry
        (G) :SHOW.FIRST.PROMPT

        (:) :WAIT.FOR.RETIRE
        ;WAIT FOR RETIRE INPUT
        (H) 35
        formattedInput * $3 "%n" ●55,523 2

                ;SPECIFY RETURN POINT
                stringFormat $297 "WAIT.FOR.RETIRE"

                ;See  if there's a number in here
                if $3 = 0
```

BEST AVAILABLE COPY

```
{
testEmpty $3

if $380 = 1 ;If there's no number
(J) :NOT.A.VALID.ENTRY.NUMBER
}

;*

;RESTORE BACKGROUNDS
(A) $199 "0" ;speed
(X)* 2
(X)* 2

;UNLIGHT BAR ON MENU
(S)* "n.data.menu.age.s"

;- reallocate assets
(G) :RERUN.ALLOCS

(H) 35
(G) :SHOW.AGE.DATA.MENU

(G) :FILL.PROMPT.NONE
(G) :SHOW.FIRST.PROMPT

;SET FLAG
(A) $247 "0" ;cancel edit's been made

;LEAVE
(J) :REFRESH.DISPATCH

;*****************************************************************************
;EDIT DATA INPUT - EVENTS
;*****************************************************************************

(:) :EDIT.EVENTS

;SET FLAG
(A) $209 "1"

(G) :SHOW.EVENTS

If $220 <> 7 ;If not in buildpie
        (G) :FILL.PROMPT.3.19c ;events box opens if recommendation is ready
else
        (G) :FILL.PROMPT.3.19b ;events box opens if recommendation is ready

(G) :SHOW.FIRST.PROMPT

(J) :EVENTS.WAIT


;*
(:) :EVENTS.WAIT

        (G) :GET.TOUCHES

        ;WAIT
        switchCursor ARROW
        (M)
        switchCursor WATCH

        ;to force closing of goals
```

```
(G) :CLOSE.EVENTS

(G) :FILL.PROMPT.NONE
(G) :SHOW.FIRST.PROMPT

(J) $33

;*
(:) :EVENTS.FINISHED ;used for <return> key only

(G) :CLOSE.EVENTS

(G) :FILL.PROMPT.NONE
(G) :SHOW.FIRST.PROMPT

(J) :MAIN.WAIT

;* ------------------------------------------------------------
;level 2

;*
(:) :SHOW.EVENTS

if $219 = 0 ;if personal bar (data menu) is closed
        (G) :SHOW.DATA.MENU

;HIGHLIGHT BAR
(S)* "n.data.menu.events!.s"

;REPLACE TEXT IN BAR (WHITE)
(H) 43
(V)* "events" ●13,507

;--------------------

;SHOW FIRST EVENT - RETIREMENT
(X)* "n.data.input.events1!.s"

(S)* "n.data.input.events1!.s"

if $35 < -1
        stringFormat $290 "retired"
if $35 = -1
        stringFormat $290 "retired last year"
if $35 = 0
        stringFormat $290 "retire this year"
if $35 = 1
        stringFormat $290 "retire in 1 year"
if $35 > 1
        stringFormat $290 "retire in %n years", $35

(H) 35
(V)* $290 ●34,506

;--------------------
;SHOW SECOND EVENT - COLLEGE
(X)* "n.data.input.events2!.s"

if $131 = 0 ;if no children
        (S)* "n.data.input.events2a!.s" ;no college costs

else ;if yes children
        {
        if $132 = 0 ;if no tuition
```

BEST AVAILABLE COPY

BEST AVAILABLE COPY

```
                (S)* "n.data.input events2a!.s" ;no college costs

                else ;if tuition
                        {
                        (S)* "n.data.input.events2!.s"

                        if $36 = 0          ;if one year to college
                                stringFormat $290 "college costs righ
                        if $36 = 1          ;if one year to college
                                stringFormat $290 "college costs in 1
                        if $36 > 1          ;if more than 1 year to collec
                                stringFormat $290 "college costs in %

                        (H) 35
                        (V)* $290 @55,506
                        }
        }

;
;SHOW THIRD EVENT - HOME
        if $150 = 0 ;if renting
                {
                (X)* "n.data.input.events3!.s"
                (S)* "n.data.input.events3!.s"
                }

        (R)

;*

(:) :CLOSE.EVENTS

        ;RESTORE BACKGROUNDS
        (A) $199 "0" ;speed
        (X)* 2
        (X)* 2

        if $150 = 0 ;If renting
                (X)* 2

        ;UNLIGHT BAR ON MENU
        (S)* "n.data.menu.events.s"

        (H) 35
        (G) :SHOW.EVENTS.DATA.MENU

        ;SET FLAG
        (A) $209 "0"

        (R)

;**********************************************************************
;HOTSHEETS
;**********************************************************************

;INCOME HOTSHEET


;*
(:) :OPEN.INCOME.HOTSHEET

        (G) :FILL.PROMPT.4.8
        (G) :SHOW.FIRST.PROMPT
```

BEST AVAILABLE COPY

```
;SET FLAG
(A) $265 "1"  ;hotsheet

;SETUP VARIABLES
(A) $200 "bond.text"                    ; vExcelFileName
(A) $201 "2"                                    ; vNumCharts
(A) $202 "221 227 302 485"              ; vGraphRect
(A) $203 "1"                                    ; vDataWhitespaceF
(A) $204 "80 20 81 34"                  ; vHues
(A) $205 "2 2"                                  ; vShadowOffset
;(A) $206 "Intel (INTC)"            ; vStockName
;(A) $207 "2"                                   ; vClickSlotNumber

;PAUSE
(W) 1

; IF WE'RE NOT ON THE HOTSHEET THEN TURN HIGHLIGHTING OFF TO GET A
PICTURE
if $266 = 0
        (G) :UNHIGH.INC.LINE.CURRENT

;SAVE BACKGROUND
(X)* "n.hotsheet.inc.s"

; IF WE'RE NOT ON THE BUYLIST THEN TURN HIGHLIGHTING BACK ON
if $266 = 0
        (G) :HIGH.INC.LINE.CURRENT

;SHOW HOTSHEET

;mpw (A) $199 "1000" ;speed
(A) $199 "200" ;speed
(D)* 2 "n.hotsheet.inc.s"

;SHOW SQUARE TO CLOSE
(S)* "n.hotsheet.inc.tabclose.s"

;JUMP TO
(J) :HOTSHEET.INCOME.PAGE.INIT

;*
(:) :CLOSE.HOTSHEET.INC

;HIGHLIGHT CLOSE-SQUARE
(S)* "n.hotsheet.inc.tabclose!.s"

;PAUSE
(W) 4

;UN-HIGHLIGHT CLOSE-SQUARE
(S)* "n.hotsheet.inc.tabclose.s"

;CLOSE HOTSHEET
(A) $199 "50" ;speed
(X)* 1

;SET FLAG
(A) $265 "0"  ;hotsheet
;(A) $238 "0"  ;hotsheet closed

; REHIGHLIGHT THE CURRENT STOCK IF WE'RE ON THE INCOME CARD
if $266 = 0
        (G) :HIGH.INC.LINE.CURRENT
```

BEST AVAILABLE COPY

```
(G) :FILL.PROMPT.NONE
(G) :SHOW.FIRST.PROMPT

;LEAVE
(J) :MAIN.WAIT

=====================================================================
RESPONSES TO BUTTON PRESS ON HOTSHEETS


;
  HOTSHEET.INCOME.PAGE.INIT

    (G) :FILL.PROMPT.4.8
    (G) :SHOW.FIRST.PROMPT

    ;SHOW DATA PG 1
    (Y)* 163

    ;HIGHLIGHT BUTTON
    (S)* "n.hotsheet.inc.button1!.s"

    (J) :MAIN.WAIT

;
  HOTSHEET.INCOME.PAGE.1

    (G) :FILL.PROMPT.4.8
    (G) :SHOW.FIRST.PROMPT

    ;UNHIGHLIGHT BUTTONS
    (S)* "n.hotsheet.inc.buttons.s"

    ;HIGHLIGHT BUTTON
    (S)* "n.hotsheet.inc.button1!.s"

    (W) 2

    ;CLEAR DISPLAY AREA
    (S)* "n.hotsheet.blnk.s"

    ;SHOW DATA PG 1
    (Y)* 163

    (J) :MAIN.WAIT

;
  HOTSHEET.INCOME.PAGE.2

    (G) :FILL.PROMPT.4.8
    (G) :SHOW.FIRST.PROMPT

    ;UNHIGHLIGHT BUTTONS
    (S)* "n.hotsheet.inc.buttons.s"

    ;HIGHLIGHT BUTTON
    (S)* "n.hotsheet.inc.button2!.s"

    (W) 2

    ;CLEAR DISPLAY AREA
    (S)* "n.hotsheet.blnk.s"

    ;SHOW DATA PG 2
```

```
(Y)* 164

(J) :MAIN.WAIT
```

BEST AVAILABLE COPY

```
;*
( ) HOTSHEET.INCOME.PAGE.3

        (G) :FILL.PROMPT.4.8
        (G) :SHOW.FIRST.PROMPT

        ;UNHIGHLIGHT BUTTONS
        (S)* "n.hotsheet.inc.buttons.s"

        ;HIGHLIGHT BUTTON
        (S)* "n.hotsheet.inc.button3!.s"

        (W) 2

        ;CLEAR DISPLAY AREA
        (S)* "n.hotsheet.blnk.s"

        ;SHOW DATA PG 3
        (Y)* 165

        (J) :MAIN.WAIT

;================================================================
;================================================================

;GROWTH HOTSHEET


;*
(.) :OPEN.GROWTH.HOTSHEET

        (G) :FILL.PROMPT.4.8
        (G) :SHOW.FIRST.PROMPT

        ;SET FLAG
        (A) $265 "1"   ;hotsheet

        ;SETUP VARIABLES
        (A) $200 "stock.text"              ; vExcelFileName
        (A) $201 "2"                                   ; vNumCharts
        (A) $202 "221 227 302 485"              ; vGraphRect
        (A) $203 "1"                                   ; vDataWhitespaceF
        (A) $204 "80 20 81 34"                  ; vHues
        (A) $205 "2 2"                                 ; vShadowOffset
        ;(A) $206 "Intel (INTC)"            ; vStockName
        ;(A) $207 "2"                                  ; vClickSlotNumber

        ;PAUSE
        (W) 1

        ; IF WE'RE NOT ON THE HOTSHEET THEN TURN HIGHLIGHTING OFF TO GET A
PICTURE
        if $266 = 0
                (G) :UNHIGH.GRO.LINE.CURRENT

        ;SAVE BACKGROUND
        (X)* "n.hotsheet.gro.s"

        ; IF WE'RE NOT ON THE BUYLIST THEN TURN HIGHLIGHTING BACK ON
```

BEST AVAILABLE COPY

```
        if $266 = 0
                (G) :HIGH.GRO.LINE.CURRENT

        ;SHOW HOTSHEET
        (A) $199 "200" ;speed
        (D)* 2 "n.hotsheet.gro.s"

        ;SHOW SQUARE TO CLOSE
        (S)* "n.hotsheet.gro.tabclose.s"

        ;JUMP TO
        (J) :HOTSHEET.GROWTH.PAGE.INIT

;*
(:) :CLOSE.HOTSHEET.GRO

        ;HIGHLIGHT CLOSE-SQUARE
        (S)* "n.hotsheet.gro.tabclose!.s"

        ;PAUSE
        (W) 4

        ;UN-HIGHLIGHT CLOSE-SQUARE
        (S)* "n.hotsheet.gro.tabclose.s"

        ;CLOSE HOTSHEET
        (A) $199 "50" ;speed
        (X)* 1

        ;SET FLAG
        (A) $265 "0"  ;hotsheet
        ;(A) $238 "0"  ;hotsheet closed

        ; REHIGHLIGHT THE CURRENT STOCK IF WE'RE ON THE GROWTH CARD
        if $266 = 0
                (G) :HIGH.GRO.LINE.CURRENT

        (G) :FILL.PROMPT.NONE
        (G) :SHOW.FIRST.PROMPT

        ;LEAVE
        (J) :MAIN.WAIT

;==================================================================
;RESPONSES TO BUTTON PRESS ON HOTSHEETS


;*
(:) :HOTSHEET.GROWTH.PAGE.INIT

        (G) :FILL.PROMPT.4.8
        (G) :SHOW.FIRST.PROMPT

        ;SHOW DATA PG 1
        (Y)* 159

        ;HIGHLIGHT BUTTON
        (S)* "n.hotsheet.gro.button1!.s"

        (J) :MAIN.WAIT

;*
(:) :HOTSHEET.GROWTH.PAGE.1
```

```
(G) :FILL.PROMPT.4.8
(G) :SHOW.FIRST.PROMPT

;UNHIGHLIGHT BUTTONS
(S)* "n.hotsheet.gro.buttons.s"

;HIGHLIGHT BUTTON
(S)* "n.hotsheet.gro.button1!.s"

(W) 2

;CLEAR DISPLAY AREA
(S)* "n.hotsheet.blnk.s"

;SHOW DATA PG 1
(Y)* 159

(J) :MAIN.WAIT

;*
( ) :HOTSHEET.GROWTH.PAGE.2

(G) :FILL.PROMPT.4.8D2
(G) :SHOW.FIRST.PROMPT

;UNHIGHLIGHT BUTTONS
(S)* "n.hotsheet.gro.buttons.s"

;HIGHLIGHT BUTTON
(S)* "n.hotsheet.gro.button2!.s"

(W) 2

;CLEAR DISPLAY AREA
(S)* "n.hotsheet.blnk.s"

;SHOW DATA PG 2
(Y)* 160

(J) :MAIN.WAIT

;*
(:) :HOTSHEET.GROWTH.PAGE.3

(G) :FILL.PROMPT.4.8D3
(G) :SHOW.FIRST.PROMPT

;UNHIGHLIGHT BUTTONS
(S)* "n.hotsheet.gro.buttons.s"

;HIGHLIGHT BUTTON
(S)* "n.hotsheet.gro.button3!.s"

(W) 2

;CLEAR DISPLAY AREA
(S)* "n.hotsheet.blnk.s"

;SHOW DATA PG 3
(Y)* 161

(J) :MAIN.WAIT
```

Money Advice Scan File

BEST AVAILABLE COPY

SIGN IN

BEST AVAILABLE COPY

```
;- erase customer's copyright
        ;;(Z) 2
        ;;(S) "n.copyright.cust.blnk.s"
        ;;(Z) 1

;- save background
        (A) $302 "30"                ; shadow offset
        (X)- $302 "n.message.green.s"

;- do prompt
        (G) :FILL.PROMPT.NONE
        (G) :SHOW.FIRST.PROMPT

;- show message card on Z
        (Z) 3
        (S) "n.message.green.s"
        (S) "n.message.sign.in.window.s"
  ;(S) "n.message.cancel.s"
        (H) 23
        (V) "Hello, please type your name^below  Then press RETURN." @165,2

;- show on main screen
        (Z) 1
        (U) 0 "n.message.green.s"
        (I)- $302 "n.message.green.s" ;shadow

;- wait for csr's name entry
        (H) 23
        (A) 22 $21 @212,225

;- blank the name
        (S) "n.message.sign.in.window.s"

;- show the CSR name
        (V) $21 @212,225

;- put message box away
        (W) 1
        (X) 0

;- set flags
        (A) $220 "1" ;button flag - preface
        (A) $240 "1" ;mainmenu is open
        (A) $241 "0" ;mainmenu section
        (A) $242 "0" ;submenu is not open

;- refresh things
        (G) :REFRESH.MAINMENU
        (W) 1
        (G) :REFRESH.TABS

;- show nametab + name
        if $219 = 1  ;if it is open
                (G) :DATA.MENU.CLOSE.2

        (A) $199 "50" ;speed
        (D)* 1 "n.tab.name.blnk.s"
        (S)* "n.data.menu.tabopen.s"
        (H) 16
        (V)* $1 @14,50
```

BEST AVAILABLE COPY

```
;- do prompt
        (G) :FILL.PROMPT.1.0
        (G) :SHOW.FIRST.PROMPT

;- highlight "introduce"
        (A) $241 "1" ;mainmenu section
        (G) :REFRESH.MAINMENU

;- set next/back
        (A) $298 ":SIGN.IN"
        (A) $299 ":PREFACE.1"
        (G) :SHOW.NEXTBACK

;- leave
        (J) :MAIN.WAIT


.******************************************************************************
.BLACK SCREEN FOR OPTIONAL LABTEST STARTUP
.******************************************************************************

( ) :BLACK.SCREEN

    ;SHOW BLACK SCREEN
    (S)* "n.black.s"

    ;SHOW NAMETAB ON CSR'S SCREEN
    (S) "n.load.data.nametab.s"

    ;CLICK HERE LABEL
    (H) 16
    (V) "Click here to pre-load" @14,50

    (J) :SKIP.RETURN.TO.BLACK.SCREEN

        (:) :RETURN.TO.BLACK.SCREEN

        ;SHOW BLANK TAB
        (S) "n.load.data.nametab.s"

        (G) :SHOW.NAME.ON.NAMETAB

    (:) :SKIP.RETURN.TO.BLACK.SCREEN

    ;SHOW START BUTTON
    (S) "n.start.s"

    ;PROMPT
    (S) "n.clearprompt.s"
    (S) "n.prompt.s"
    (H) 20
    (V) "Click START to begin program." @470,28

    ;SHOW TODAY'S DATE
    (V) $118 @470,250

    ;LOAD TOUCHES
    (T)
    (T) $33 "n.tab.name.blnk.s" :LOAD.DATA.PG1.INITIAL
    (T) $33 "n.start.s" :TITLE

    (J) :MAIN.WAIT.LOADED
```

```
•••••••••••••••••••••••••••••••••••••••••••••••••••••••••••••••••••••••••••
PROGRAM TITLE - PREFACE 0     FLAG=99
•••••••••••••••••••••••••••••••••••••••••••••••••••••••••••••••••••••••••••
FROM BLACK SCREEN

', TITLE

        (G) :HIGHLIGHT.START.BUTTON

        ;SHOW TITLE SCREEN
        (S)* "n.title.s"

        ;SHOW NAME TAB & NAME
        (S)* "n.tab.name.blnk.s"
        (S)* "n.data.menu.tabopen.s"
        (H) 16
        (V)* $1 @14,50

        ;SHOW MENU OPENER
        (S) "n.csr.mainmenu.blnk.s"

        (G) :SHOW.NEXT.BUTTON

        (G) :GET.CLEAR.PROMPT
        (V) "Click NEXT to begin." @472,20

        ;SET NEXT/BACK
        (A) $298 ":BLACK.SCREEN"
        (A) $299 ":BEGIN"
        ;no;(G) :SHOW.NEXTBACK

        ;SET FLAGS
        (A) $220 "1" ;button flag (preface is active)
        (A) $221 "0" ;preface flag
        (A) $240 "0" ;mainmenu is not open
        (A) $241 "0" ;submenu is not open

        (J) :MAIN.WAIT

;•
;(:) :BEGIN

        (G) :GET.CLEAR.PROMPT
        (V) "Click NEXT to introduce Money Advisor." @472,20

        ;SET NEXT/BACK
        (A) $298 ":BLACK.SCREEN"
        (A) $299 ":PREFACE.1"
        (G) :SHOW.NEXTBACK

        ;(A) $241 "1" ;mainmenu location

        (J) :OPEN.MAINMENU

                ;•••••••••••••••••••

        ;F O R   T E S T I N G   O N L Y
        ;(G) :GET.FAKE.DATA
        ;how about (:) :MAIN.WAIT ?
        ;JUMP TO CURRENT WORKPLACE
        ;(J) :REQUEST.GROWTH.REC.INT

;•••••••••••••••••••••••••••••••••••••••••••••••••••••••••••••••••••••••••••
```

BEST AVAILABLE COPY

ASK THE ASSETS FROM SEQUENCE

```
;••••••••••••••••••••••••••••••••••••••••••••••••••••••••••••••••••••••••••
; ASK.ASSETS.2

        ;VERIFY MENU HIGHLIGHT
        if $241 <> 2
                {
                (A) $241 "2" ;mainmenu location
                (G) :REFRESH.MAINMENU
                }

        (G) :FILL.PROMPT.NONE
        (G) :SHOW.FIRST.PROMPT

        ;SET NEXT/BACK
        (A) $298 "99"
        (A) $299 ":REQUEST.BANK.YOURS"
        (G) :SHOW.NEXTBACK

        (J) :MAIN.WAIT

;••••••••••••••••••••••••••••••••••••••••••••••••••••••••••••••••••••••••••
;PRE-LOAD CUSTOMER'S DATA PAGE 1
;••••••••••••••••••••••••••••••••••••••••••••••••••••••••••••••••••••••••••

;•
( ) :LOAD.DATA.PG1.INITIAL

        (G) :GET.CLEAR.PROMPT
        (V) "" @472,20

        ;SAVE BACKGROUND
        (X) "n.load.data.blnk.s"

        ;HIGHLIGHT
        (S) "n.load.data.nametab!.s"

        (S) "n.load.data.nametab.s"
        (G) :SHOW.NAME.ON.NAMETAB

;•
( ) :LOAD.DATA.PG1

        (G) :GET.CLEAR.PROMPT
        (V) "" @472,20

        ;OPEN LOAD-DATA MENU
        (A) $199 "50" ;speed
        (D) 1 "n.load.data.blnk.s"

        ;SHOW RESPONDENTS' NAMES & ID #'S
        ;COLUMN 1

        (H) 4

        (V) "1" @40,250
        (S) "n.load.data.name.square.s" @30,65
        (V) "John Thompkins" @40,88

        (V) "2" @61,250
        (S) "n.load.data.name.square.s" @51,65
        (V) "Jeffrey Kahan" @61,88
```

BEST AVAILABLE COPY (V) "3" ●82,250
(S) "n.load.data.name.square.s" ●72,65
(V) "Alice Allen" ●82,88

(V) "4" ●103,250
(S) "n.load.data.name.square.s" ●93,65
(V) "Fern Square" ●103,88

(V) "5" ●124,250
(S) "n.load.data.name.square.s" ●114,65
(V) "Humberto Arango" ●124,88

(V) "6" ●145,250
(S) "n.load.data.name.square.s" ●135,65
(V) "Nina Geller" ●145,88

(V) "7" ●166,250
(S) "n.load.data.name.square.s" ●156,65
(V) "Jim Fennelly" ●166,88

(V) "8" ●187,250
(S) "n.load.data.name.square.s" ●177,65
(V) "George Lockett" ●187,88

(V) "9" ●208,250
(S) "n.load.data.name.square.s" ●198,65
(V) "Alaeden Jielaty" ●208,88

(V) "10" ●229,250
(S) "n.load.data.name.square.s" ●219,65
(V) "Eric Ferrari" ●229,88

(V) "11" ●250,250
(S) "n.load.data.name.square.s" ●240,65
(V) "Cindy Greenberg" ●250,88

(V) "12" ●271,250
(S) "n.load.data.name.square.s" ●261,65
(V) "Phyllis Baumrind" ●271,88

(V) "13" ●292,250
(S) "n.load.data.name.square.s" ●282,65
(V) "Laurette Nierenberg" ●292,88

(V) "14" ●313,250
(S) "n.load.data.name.square.s" ●303,65
(V) "Arthur Lesser" ●313,88

(V) "15" ●334,250
(S) "n.load.data.name.square.s" ●324,65
(V) "Carol Grossman" ●334,88

;COLUMN 2

(V) "16" ●40,474
(S) "n.load.data.name.square.s" ●30,288
(V) "Andi Marks" ●40,311

(V) "17" ●61,474
(S) "n.load.data.name.square.s" ●51,288
(V) "Mohammed Islim" ●61,311

(V) "18" ●82,474

Money Advice Scan File

BEST AVAILABLE COPY

BEST AVAILABLE COPY

```
(S) "n.load.data.name.square.s" @72,288
(V) "Esther Rothstein" @82,311

(V) "19" @103,473
(S) "n.load.data.name.square.s" @93,288
(V) "deleted" @103,311

(V) "20" @124,473
(S) "n.load.data.name.square.s" @114,288
(V) "Linda Hill" @124,311

(V) "21" @145,473
(S) "n.load.data.name.square.s" @135,288
(V) "Anthony J. Regusis" @145,311

(V) "22" @166,473
(S) "n.load.data.name.square.s" @156,288
(V) "Antoinette Cavarra" @166,311

(V) "23" @187,473
(S) "n.load.data.name.square.s" @177,288
(V) "Norman Rossinow" @187,311

(V) "24" @208,473
(S) "n.load.data.name.square.s" @198,288
(V) "Richard Komar" @208,311

(V) "25" @229,473
(S) "n.load.data.name.square.s" @219,288
(V) "Gloria Yanuck" @229,311

(V) "26" @250,473
(S) "n.load.data.name.square.s" @240,288
(V) "Andi Henig" @250,311

(V) "27" @271,473
(S) "n.load.data.name.square.s" @261,288
(V) "June Palmisano" @271,311

(V) "28" @292,473
(S) "n.load.data.name.square.s" @282,288
(V) "Lynda Simonelli" @292,311

(V) "" @313,473
(S) "n.load.data.name.square.s" @303,288
(V) "GO TO PAGE 2" @313,311

(S) "n.load.data.name.square.s" @324,288
(V) "NO PRE-LOAD" @334,311

;
;WAIT

    ;PROMPT
    (S) "n.clearprompt.s"
    (S) "n.prompt.s"
    (H) 20
    (V) "Which customer's data would you like?" @470,28

    ;LOAD TOUCHES
    (T)
    (T) $33 #26,64,47,266 :LOAD.CUSTOMER1
    (T) $33 #47,64,68,266 :LOAD.CUSTOMER2
    (T) $33 #68,64,89,266 :LOAD.CUSTOMER3
```

Money Advice Scan File

```
(T) $33 #89,64,110,266 :LOAD.CUSTOMER4
(T) $33 #110,64,131,266 :LOAD.CUSTOMER5
(T) $33 #131,64,157,266 :LOAD.CUSTOMER6
(T) $33 #157,64,173,266 :LOAD.CUSTOMER7
(T) $33 #173,64,194,266 :LOAD.CUSTOMER8
(T) $33 #194,64,215,266 :LOAD.CUSTOMER9
(T) $33 #215,64,236,266 :LOAD.CUSTOMER10
(T) $33 #236,64,257,266 :LOAD.CUSTOMER11
(T) $33 #257,64,278,266 :LOAD.CUSTOMER12
(T) $33 #278,64,299,266 :LOAD.CUSTOMER13
(T) $33 #299,64,320,266 :LOAD.CUSTOMER14
(T) $33 #320,64,341,266 :LOAD.CUSTOMER15

(T) $33 #26,289,47,491 :LOAD.CUSTOMER16
(T) $33 #47,289,68,491 :LOAD.CUSTOMER17
(T) $33 #68,289,89,491 :LOAD.CUSTOMER18
;void(T) $33 #89,289,110,491 :LOAD.CUSTOMER19
(T) $33 #110,289,131,491 :LOAD.CUSTOMER20
(T) $33 #131,289,157,491 :LOAD.CUSTOMER21
(T) $33 #157,289,173,491 :LOAD.CUSTOMER22
(T) $33 #173,289,194,491 :LOAD.CUSTOMER23
(T) $33 #194,289,215,491 :LOAD.CUSTOMER24
(T) $33 #215,289,236,491 :LOAD.CUSTOMER25
(T) $33 #236,289,257,491 :LOAD.CUSTOMER26
(T) $33 #257,289,278,491 :LOAD.CUSTOMER27
(T) $33 #278,289,299,491 :LOAD.CUSTOMER28
;(T) $33 #299,289,320,491 :CHANGE.TO.PG2
(T) $33 #320,289,341,491 :LOAD.NO.DATA

(T) $33 "n.start.s" :TITLE

(J) :MAIN.WAIT.LOADED

;
( ) :CLOSE.LOAD.DATA.PG1

(G) :GET.CLEAR.PROMPT
(V) "" @472,20

(W) 3

;RESTORE BACKGROUND
(A) $199 "50" ;speed
(X) 2

(A) $179 "1"     ;recommendation is cooked

(J) :RETURN.TO.BLACK.SCREEN

;*************************************************************************
;PRE-LOAD CUSTOMER'S DATA PAGE 2
;*************************************************************************

;
( ) :LOAD.DATA.PG2

(G) :GET.CLEAR.PROMPT
(V) "" @472,20

;HIGHLIGHT &
;SAVE BACKGROUND ONLY ON FIRST SCREEN!!!

;OPEN LOAD-DATA MENU
```

BEST AVAILABLE COPY (A) $199 "50" ;speed
(D) 1 "n.load.data.blnk.s"

BEST AVAILABLE COPY

.SHOW RESPONDENTS' NAMES & ID #'S (H) 4

;COLUMN 1

(V) "29" ●40,250
(S) "n.load.data.name.square.s" ●30,65
(V) "Mickey Haltman" ●40,88

(V) "30" ●61,250
(S) "n.load.data.name.square.s" ●51,65
(V) "Al Greene" ●61,88

(V) "31" ●82,250
(S) "n.load.data.name.square.s" ●72,65
(V) "Ann Pinkerton" ●82,88

(V) "32" ●103,250
(S) "n.load.data.name.square.s" ●93,65
(V) "Veleska DeSouza" ●103,88

(V) "33" ●124,250
(S) "n.load.data.name.square.s" ●114,65
(V) "Mary Erra" ●124,88

(V) "34" ●145,250
(S) "n.load.data.name.square.s" ●135,65
(V) "Angela Di Muccio" ●145,88

(V) "35" ●166,250
(S) "n.load.data.name.square.s" ●156,65
(V) "Elias Gabriel" ●166,88

(V) "36" ●187,250
(S) "n.load.data.name.square.s" ●177,65
(V) "Fred Dohrman" ●187,88

(V) "37" ●208,250
(S) "n.load.data.name.square.s" ●198,65
(V) "Deena Schecter" ●208,88

(V) "38" ●229,250
(S) "n.load.data.name.square.s" ●219,65
(V) "Geraldine Herlihy" ●229,88

(V) "39" ●250,250
(S) "n.load.data.name.square.s" ●240,65
(V) "Patricia Panzer" ●250,88

(V) "40" ●271,250
(S) "n.load.data.name.square.s" ●261,65
(V) "Andy Sigismondo" ●271,88

(V) "41" ●292,250
(S) "n.load.data.name.square.s" ●282,65
(V) "Maria Leal" ●292,88

(V) "42" ●313,250
(S) "n.load.data.name.square.s" ●303,65

BEST AVAILABLE COPY (V) "Debra Rubino" ●313,88

(V) "43" ●334,250
(S) "n.load.data.name.square.s" ●324,65
(V) "" ●334,88

;COLUMN 2

(V) "44" ●40,474
(S) "n.load.data.name.square.s" ●30,288
(V) "" ●40,311

(V) "45" ●61,474
(S) "n.load.data.name.square.s" ●51,288
(V) "" ●61,311

(V) "46" ●82,474
(S) "n.load.data.name.square.s" ●72,288
(V) "" ●82,311

(V) "47" ●103,473
(S) "n.load.data.name.square.s" ●93,288
(V) "" ●103,311

(V) "48" ●124,473
(S) "n.load.data.name.square.s" ●114,288
(V) "" ●124,311

(V) "49" ●145,473
(S) "n.load.data.name.square.s" ●135,288
(V) "" ●145,311

(V) "50" ●166,473
(S) "n.load.data.name.square.s" ●156,288
(V) "" ●166,311

(V) "51" ●187,473
(S) "n.load.data.name.square.s" ●177,288
(V) "" ●187,311

(V) "52" ●208,473
(S) "n.load.data.name.square.s" ●198,288
(V) "" ●208,311

(V) "53" ●229,473
(S) "n.load.data.name.square.s" ●219,288
(V) "" ●229,311

(V) "54" ●250,473
(S) "n.load.data.name.square.s" ●240,288
(V) "" ●250,311

(V) "55" ●271,473
(S) "n.load.data.name.square.s" ●261,288
(V) "" ●271,311

(V) "56" ●292,473
(S) "n.load.data.name.square.s" ●282,288
(V) "" ●292,311

(V) "" ●313,473
(S) "n.load.data.name.square.s" ●303,288
(V) "GO TO PAGE 1" ●313,311

Money Advice Scan File

```
(S) "n.load.data.name.square.s" @324,288
(V) "NO PRE-LOAD" @334,311
```

BEST AVAILABLE COPY

```
;*
.WAIT

;PROMPT
(S) "n.clearprompt.s"
(S) "n.prompt.s"
(H) 20
(V) "Which customer's data would you like?" @470,28

;LOAD TOUCHES
(T)
(T) $33 #26,64,47,266 :LOAD.CUSTOMER29
(T) $33 #47,64,68,266 :LOAD.CUSTOMER30
(T) $33 #68,64,89,266 :LOAD.CUSTOMER31
(T) $33 #89,64,110,266 :LOAD.CUSTOMER32
(T) $33 #110,64,131,266 :LOAD.CUSTOMER33
(T) $33 #131,64,157,266 :LOAD.CUSTOMER34
(T) $33 #157,64,173,266 :LOAD.CUSTOMER35
(T) $33 #173,64,194,266 :LOAD.CUSTOMER36
(T) $33 #194,64,215,266 :LOAD.CUSTOMER37
(T) $33 #215,64,236,266 :LOAD.CUSTOMER38
(T) $33 #236,64,257,266 :LOAD.CUSTOMER39
(T) $33 #257,64,278,266 :LOAD.CUSTOMER40
(T) $33 #278,64,299,266 :LOAD.CUSTOMER41
(T) $33 #299,64,320,266 :LOAD.CUSTOMER42
;(T) $33 #320,64,341,266 :LOAD.CUSTOMER43

;(T) $33 #26,289,47,491 :LOAD.CUSTOMER44
;(T) $33 #47,289,68,491 :LOAD.CUSTOMER45
;(T) $33 #68,289,89,491 :LOAD.CUSTOMER46
;(T) $33 #89,289,110,491 :LOAD.CUSTOMER47
;(T) $33 #110,289,131,491 :LOAD.CUSTOMER48
;(T) $33 #131,289,157,491 :LOAD.CUSTOMER49
;(T) $33 #157,289,173,491 :LOAD.CUSTOMER50
;(T) $33 #173,289,194,491 :LOAD.CUSTOMER51
;(T) $33 #194,289,215,491 :LOAD.CUSTOMER52
;(T) $33 #215,289,236,491 :LOAD.CUSTOMER53
;(T) $33 #236,289,257,491 :LOAD.CUSTOMER54
;(T) $33 #257,289,278,491 :LOAD.CUSTOMER55
;(T) $33 #278,289,299,491 :LOAD.CUSTOMER56
(T) $33 #299,289,320,491 :CHANGE.TO.PG1
(T) $33 #320,289,341,491 :LOAD.NO.DATA

(T) $33 "n.start.s" :TITLE

(J) :MAIN.WAIT.LOADED

;*
(:) :CLOSE.LOAD.DATA.PG2

(G) :GET.CLEAR.PROMPT
(V) "" @472,20

(W) 3

;RESTORE BACKGROUND
(A) $199 "50" ;speed
(X) 2

(A) $179 "1"     ;recommendation is cooked
```

BEST AVAILABLE COPY

```
(J) :RETURN.TO.BLACK.SCREEN

******************************************************************************
BANK CARD - REQUESTS
******************************************************************************
level 1

;*
(:) REQUEST.BANK.REC.INT

        ;WHAT'S ON THE SCREEN...

        if $264 <> 0 ;if ask card is open
                        (G) :REMOVE.ASK.CARD

        if $251 = 0 ;if cards are closed
                {
                (G) :OPEN.BANK.CARD
                (G) :SHOW.BANK.REC.INT
                (J) :MAIN.WAIT
                }
        if $251 = 6 ;if income card is open
                {
                (G) :CLOSE.CARD
                (G) :OPEN.BANK.CARD
                (G) :SHOW.BANK.REC.INT
                (J) :MAIN.WAIT
                }
        if $251 = 7 ;if growth card is open
                {
                (G) :CLOSE.CARD
                (G) :OPEN.BANK.CARD
                (G) :SHOW.BANK.REC.INT
                (J) :MAIN.WAIT
                }
        ;if $264 <> 0 ;if ask card is open
                ;(G) :REMOVE.ASK.CARD

        if $265 <> 0 ;if hotsheet is open
                (G) :REMOVE.HOTSHEET

        if $266 <> 0 ;if buylist is open
                (G) :REMOVE.BUYLIST

        if $267 = 1  ;bank int is showing
                (J) :MAIN.WAIT

        if $267 = 2  ;bank detail is showing
                {
                (G) :HIGHLIGHT.BANK.TABSWITCH
                (G) :CLEAR.BANK.CARD.DET
                (G) :SHOW.BANK.REC.INT
                (J) :MAIN.WAIT
                }

        (H) 1
        (V) "Problem with REQUEST BANK.REC.INT." @100,200

;*
(:) :REQUEST.BANK.REC.DET

        ;WHAT'S ON THE SCREEN...
        ;(can't request detail unless this card is open)
```

BEST AVAILABLE COPY

```
if $264 <> 0 ;If yours card is open
        (G) :REMOVE.ASK.CARD

if $265 <> 0 ;if hotsheet is open
        (G) :REMOVE.HOTSHEET

if $266 <> 0 ;If buylist is open
        (G) :REMOVE.BUYLIST

if $267 = 1 ;intermediate level is showing (must be)
        {
        (G) :HIGHLIGHT.BANK.TABSWITCH
        (G) :CLEAR.BANK.CARD.DET
        (G) :SHOW.BANK.REC.DET
        (J) :MAIN.WAIT
        }

(H) 1
(V) "Problem with REQUEST BANK.REC.DET." @100,200

;------------------------------------------------------------------
;level 2

;*
(:) :SHOW.BANK.REC.INT

        (G) :SHOW.BANK.INT.DATA

        (G) :FILL.PROMPT.4.2
        (G) :SHOW.FIRST.PROMPT

        ;SET FLAG
        (A) $207 "-1" ;current line to -1 (no current line)
        (A) $267 "1" ;intermediate card

        ;SET NEXT/BACK
        (A) $298 "99"
        (A) $299 "99"

        (G) :SHOW.NEXTBACK

        (R)

;*
(:) :SHOW.BANK.REC.DET

        (G) :SHOW.BANK.DET.DATA

        (G) :FILL.PROMPT.4.3
        (G) :SHOW.FIRST.PROMPT

        ;SET FLAG
        (A) $207 "-1" ;current line to -1 (no current line)
        (A) $267 "2" ;detail card

        ;SET NEXT/BACK
        (A) $298 "99"
        (A) $299 "99"
        (G) :SHOW.NEXTBACK
        (R)
```

```
;oooooooooooooooooooooooooooooooooooooooooooooooooooooooooooooooooooooooooo
oooooooooooooooooooooooo

;------------------------------------------------------------------
;level 1

;*
(:) :REQUEST.BANK.REFRESH
        ; recalc with card open.

        ;WHAT'S ON THE SCREEN...
        if $264 <> 0 ;if yours card is open
                (G) :REMOVE.ASK.CARD

        if $265 <> 0 ;if hotsheet is open
                (G) :REMOVE.HOTSHEET

        if $266 <> 0 ;if buylist is open
                (G) :REMOVE.BUYLIST

        if $267 = 1  ;if on bank int
                {
                (G) :CLEAR.BANK.CARD.DET
                (G) :SHOW.BANK.REC.INT
                (J) :MAIN.WAIT
                }

        if $267 = 2  ;if on bank det
                {
                (G) :CLEAR.BANK.CARD.DET
                (G) :SHOW.BANK.REC.DET
                (J) :MAIN.WAIT
                }
;------------------------------------------------------------------
;level 1

;*
(:) :REQUEST.BANK.CARD.CLOSE

        (G) :CLOSE.BANK.CARD

        (G) :FILL.PROMPT.NONE
        (G) :SHOW.FIRST.PROMPT

        ;SET NEXT/BACK
        (A) $298 "99"
        (A) $299 "99"

        (J) :MAIN.WAIT

;**************************************************************************
; BANK CARD GRAPHIC TRANSITIONS
;**************************************************************************
        ;level 2 - card

        ;*
        (:) :OPEN.BANK.CARD

                ;PRE-HIGHLIGHT TAB
                (S)* "n.tab.bank!.s"
```

BEST AVAILABLE COPY

BEST AVAILABLE COPY

```
;check for conditions that require a cleared screen
if $220 <> 4        ;if proposed pie is not up
          if $220 <> 12      ;and if compare pies is not up
                    (G) :CLEAR.CENTER.SCREEN.FROM.BUTTON

(G) :HIGHLIGHT.BANK.TAB ;and save background

;SHOW CARD
(A) $199 "30"
(D)* 2 "n.bank.card.s"

;SET FLAG
(A) $251 "5" ;bank card
(A) $207 "0" ;reset click slot flag

(R)

;*
(:) :CLOSE.BANK.CARD

(G) :HIGHLIGHT.BANK.TABUP

;PAUSE
(W) 2

(G) :CLOSE.CARD

;SET FLAG
(A) $251 "0" ;card
(A) $207 "0" ;reset click slot flag

(R)

;*
(:) :CLEAR.BANK.CARD.DET
          (S)* "n.bank.card.det.clear.s"
          (R)

;*
(:) :CLEAR.BANK.CARD.TOTAL
          (S)* "n.bank.card.total$.clear.s"
          (R)

;*************************************************************************
;BANK CARD - LINE GRAPHICS
;*************************************************************************
;level 1 note: some sections are not relevant unless bank gets a buylist later.

;*
(:) :BANK.CARD.LINE0

          ;IF THIS LINE IS HIGHLIT
          (Q) "$207 = 0" :MAIN.WAIT

          (G) :UNHIGH.BANK.LINE.CURRENT

          ;ACCEPT LINE NUMBER
          (A) $207 "0"

          (G) :HIGH.BANK.LINE.CURRENT

          (J) :MAIN.WAIT
```

Money Advice Scan File

BEST AVAILABLE COPY

```
;*
(:) :BANK.CARD.LINE1

        ;IF THIS LINE IS HIGHLIT
        (Q) "$207 = 1" :MAIN.WAIT

        (G) :UNHIGH.BANK.LINE.CURRENT

        ;ACCEPT LINE NUMBER
        (A) $207 "1"

        (G) :HIGH.BANK.LINE.CURRENT

        (J) :MAIN.WAIT

;*
(:) :BANK.CARD.LINE2

        ;IF THIS LINE IS HIGHLIT
        (Q) "$207 = 2" :MAIN.WAIT

        (G) :UNHIGH.BANK.LINE.CURRENT

        ;ACCEPT LINE NUMBER
        (A) $207 "2"

        (G) :HIGH.BANK.LINE.CURRENT

        (J) :MAIN.WAIT

;*
(:) :BANK.CARD.LINE3

        ;IF THIS LINE IS HIGHLIT
        (Q) "$207 = 3" :MAIN.WAIT

        (G) :UNHIGH.BANK.LINE.CURRENT

        ;ACCEPT LINE NUMBER
        (A) $207 "3"

        ;SELECT CURRENT BOND
        ;(Y) 53

        (G) :HIGH.BANK.LINE.CURRENT

        (J) :MAIN.WAIT

;*
(:) :BANK.CARD.LINE4

        ;IF THIS LINE IS HIGHLIT
        (Q) "$207 = 4" :MAIN.WAIT

        (G) :UNHIGH.BANK.LINE.CURRENT

        ;ACCEPT LINE NUMBER
        (A) $207 "4"

        (G) :HIGH.BANK.LINE.CURRENT

        (J) :MAIN.WAIT

;*
```

```
(:) :BANK.CARD.LINE5

        ;IF THIS LINE IS HIGHLIT
        (Q) "$207 = 5" :MAIN.WAIT

        (G) :UNHIGH.BANK.LINE.CURRENT

        ;ACCEPT LINE NUMBER
        (A) $207 "5"

        (G) :HIGH.BANK.LINE.CURRENT

        (J) :MAIN.WAIT

;*
(:) :BANK.CARD.LINE6

        ;IF THIS LINE IS HIGHLIT
        (Q) "$207 = 6" :MAIN.WAIT

        (G) :UNHIGH.BANK.LINE.CURRENT

        ;ACCEPT LINE NUMBER
        (A) $207 "6"

        (G) :HIGH.BANK.LINE.CURRENT

        (J) :MAIN.WAIT

;*
(:) :BANK.CARD.LINE7

        ;IF THIS LINE IS HIGHLIT
        (Q) "$207 = 7" :MAIN.WAIT

        (G) :UNHIGH.BANK.LINE.CURRENT

        ;ACCEPT LINE NUMBER
        (A) $207 "7"

        (G) :HIGH.BANK.LINE.CURRENT

        (J) :MAIN.WAIT

;*
(:) :BANK.CARD.LINE8

        ;IF THIS LINE IS HIGHLIT
        (Q) "$207 = 8" :MAIN.WAIT

        (G) :UNHIGH.BANK.LINE.CURRENT

        ;ACCEPT LINE NUMBER
        (A) $207 "8"

        (G) :HIGH.BANK.LINE.CURRENT

        (J) :MAIN.WAIT

;*
(:) :BANK.CARD.LINE9

        ;IF THIS LINE IS HIGHLIT
        (Q) "$207 = 9" :MAIN.WAIT
```

BEST AVAILABLE COPY

```
(G) :UNHIGH.BANK.LINE.CURRENT

;ACCEPT LINE NUMBER
(A) $207 "9"

(G) :HIGH.BANK.LINE.CURRENT

(J) :MAIN.WAIT

;*
(:) :BANK.CARD.LINE10

;IF THIS LINE IS HIGHLIT
(Q) "$207 = 10" :MAIN.WAIT

(G) :UNHIGH.BANK.LINE.CURRENT

;ACCEPT LINE NUMBER
(A) $207 "10"

(G) :HIGH.BANK.LINE.CURRENT

(J) :MAIN.WAIT

;*
(:) :BANK.CARD.LINE11

;IF THIS LINE IS HIGHLIT
(Q) "$207 = 11" :MAIN.WAIT

(G) :UNHIGH.BANK.LINE.CURRENT

;ACCEPT LINE NUMBER
(A) $207 "11"

(G) :HIGH.BANK.LINE.CURRENT

(J) :MAIN.WAIT

;*
(:) :BANK.CARD.LINE12

;IF THIS LINE IS HIGHLIT
(Q) "$207 = 12" :MAIN.WAIT

(G) :UNHIGH.BANK.LINE.CURRENT

;ACCEPT LINE NUMBER
(A) $207 "12"

(G) :HIGH.BANK.LINE.CURRENT

(J) :MAIN.WAIT

;*
(:) :BANK.CARD.LINE13

;IF THIS LINE IS HIGHLIT
(Q) "$207 = 13" :MAIN.WAIT

(G) :UNHIGH.BANK.LINE.CURRENT

;ACCEPT LINE NUMBER
```

BEST AVAILABLE COPY

BEST AVAILABLE COPY

```
      (A) $207 "13"

      (G) :HIGH.BANK.LINE.CURRENT

      (J) :MAIN.WAIT

;*
(:) :BANK.CARD.LINE14

      ;IF THIS LINE IS HIGHLIT
      (Q) "$207 = 14" :MAIN.WAIT

      (G) :UNHIGH.BANK.LINE.CURRENT

      ;ACCEPT LINE NUMBER
      (A) $207 "14"

      (G) :HIGH.BANK.LINE.CURRENT

      (J) :MAIN.WAIT

;*
(:) :BANK.CARD.LINE15

      ;IF THIS LINE IS HIGHLIT
      (Q) "$207 = 15" :MAIN.WAIT

      (G) :UNHIGH.BANK.LINE.CURRENT

      ;ACCEPT LINE NUMBER
      (A) $207 "15"

      (G) :HIGH.BANK.LINE.CURRENT

      (J) :MAIN.WAIT

;*
(:) :BANK.CARD.LINE16

      ;IF THIS LINE IS HIGHLIT
      (Q) "$207 = 16" :MAIN.WAIT

      (G) :UNHIGH.BANK.LINE.CURRENT

      ;ACCEPT LINE NUMBER
      (A) $207 "16"

      (G) :HIGH.BANK.LINE.CURRENT

      (J) :MAIN.WAIT

;------------------------------------------------------------
;level 2

;*
(:) :HIGH.BANK.LINE.CURRENT

      ; IF $207 < 0 THEN THERE IS NO CURRENT LINE
      if $207 < 0
            (R)

      ;CHECK WHICH LINE TO HIGHLIGHT
```

```
stringFormat $290 ":HIGH.BANK.LINE%n", $207
(J) $290

(:) :HIGH.BANK.LINE0
        (I)* $286 "n.rec.inc.line0.s"
        (R)

(:) :HIGH.BANK.LINE1
        (I)* $286 "n.rec.inc.line1.s"
        (R)

(:) :HIGH.BANK.LINE2
        (I)* $286 "n.rec.inc.line2.s"
        (R)

(:) :HIGH.BANK.LINE3
        (I)* $286 "n.rec.inc.line3.s"
        (R)

(:) :HIGH.BANK.LINE4
        (I)* $286 "n.rec.inc.line4.s"
        (R)

(:) :HIGH.BANK.LINE5
        (I)* $286 "n.rec.inc.line5.s"
        (R)

(:) :HIGH.BANK.LINE6
        (I)* $286 "n.rec.inc.line6.s"
        (R)

(:) :HIGH.BANK.LINE7
        (I)* $286 "n.rec.inc.line7.s"
        (R)

(:) :HIGH.BANK.LINE8
        (I)* $286 "n.rec.inc.line8.s"
        (R)

(:) :HIGH.BANK.LINE9
        (I)* $286 "n.rec.inc.line9.s"
        (R)

(:) :HIGH.BANK.LINE10
        (I)* $286 "n.rec.inc.line10.s"
        (R)

(:) :HIGH.BANK.LINE11
        (I)* $286 "n.rec.inc.line11.s"
        (R)

(:) :HIGH.BANK.LINE12
        (I)* $286 "n.rec.inc.line12.s"
        (R)

(:) :HIGH.BANK.LINE13
        (I)* $286 "n.rec.inc.line13.s"
        (R)

(:) :HIGH.BANK.LINE14
        (I)* $286 "n.rec.inc.line14.s"
        (R)

(:) :HIGH.BANK.LINE15
```

BEST AVAILABLE COPY

```
        (I)* $286 "n.rec.inc.line15.s"
        (R)

    (:) :HIGH.BANK.LINE16
        (I)* $286 "n.rec.inc.line16.s"
        (R)


;*
(:) :UNHIGH.BANK.LINE.CURRENT

    ; IF $207 < 0 THEN THERE IS NO CURRENT LINE
    if $207 < 0
        (R)

    ;CHECK WHICH LINE IS HIGHLIT
    stringFormat $290 ":UNHIGH.BANK.LINE%n", $207
    (J) $290

    (:) :UNHIGH.BANK.LINE0
        (I)*- $286 "n.rec.inc.line0.s"
        (R)

    (:) :UNHIGH.BANK.LINE1
        (I)*- $286 "n.rec.inc.line1.s"
        (R)

    (:) :UNHIGH.BANK.LINE2
        (I)*- $286 "n.rec.inc.line2.s"
        (R)

    (:) :UNHIGH.BANK.LINE3
        (I)*- $286 "n.rec.inc.line3.s"
        (R)

    (:) :UNHIGH.BANK.LINE4
        (I)*- $286 "n.rec.inc.line4.s"
        (R)

    (:) :UNHIGH.BANK.LINE5
        (I)*- $286 "n.rec.inc.line5.s"
        (R)

    (:) :UNHIGH.BANK.LINE6
        (I)*- $286 "n.rec.inc.line6.s"
        (R)

    (:) :UNHIGH.BANK.LINE7
        (I)*- $286 "n.rec.inc.line7.s"
        (R)

    (:) :UNHIGH.BANK.LINE8
        (I)*- $286 "n.rec.inc.line8.s"
        (R)

    (:) :UNHIGH.BANK.LINE9
        (I)*- $286 "n.rec.inc.line9.s"
        (R)

    (:) :UNHIGH.BANK.LINE10
        (I)*- $286 "n.rec.inc.line10.s"
        (R)

    (:) :UNHIGH.BANK.LINE11
```

BEST AVAILABLE COPY

```
        (I)*- $286 "n.rec.inc.line11.s"
        (R)

(:) :UNHIGH.BANK.LINE12
        (I)*- $286 "n.rec.inc.line12.s"
        (R)

(:) :UNHIGH.BANK.LINE13
        (I)*- $286 "n.rec.inc.line13.s"
        (R)

(:) :UNHIGH.BANK.LINE14
        (I)*- $286 "n.rec.inc.line14.s"
        (R)

(:) :UNHIGH.BANK.LINE15
        (I)*- $286 "n.rec.inc.line15.s"
        (R)

(:) :UNHIGH.BANK.LINE16
        (I)*- $286 "n.rec.inc.line16.s"
        (R)


;*
(:) :ERASE.BANK.LINE.CURRENT

    ; IF $207 < 0 THEN THERE IS NO CURRENT LINE
    if $207 < 0
        (R)

    ;CHECK WHICH LINE TO ERASE
    stringFormat $290 ":ERASE.BANK.LINE%n", $207
    (J) $290

    (:) :ERASE.BANK.LINE0
        (S)* "bank.blank.line0.s"
        (R)

    (:) :ERASE.BANK.LINE1
        (S)* "bank.blank.line1.s"
        (R)

    (:) :ERASE.BANK.LINE2
        (S)* "bank.blank.line2.s"
        (R)

    (:) :ERASE.BANK.LINE3
        (S)* "bank.blank.line3.s"
        (R)

    (:) :ERASE.BANK.LINE4
        (S)* "bank.blank.line4.s"
        (R)

    (:) :ERASE.BANK.LINE5
        (S)* "bank.blank.line5.s"
        (R)

    (:) :ERASE.BANK.LINE6
        (S)* "bank.blank.line6.s"
        (R)

    (:) :ERASE.BANK.LINE7
```

BEST AVAILABLE COPY

```
        (S)* "bank.blank.line7.s"
        (R)

(:) :ERASE.BANK.LINE8
        (S)* "bank.blank.line8.s"
        (R)

(:) :ERASE.BANK.LINE9
        (S)* "bank.blank.line9.s"
        (R)

(:) :ERASE.BANK.LINE10
        (S)* "bank.blank.line10.s"
        (R)

(:) :ERASE.BANK.LINE11
        (S)* "bank.blank.line11.s"
        (R)

(:) :ERASE.BANK.LINE12
        (S)* "bank.blank.line12.s"
        (R)

(:) :ERASE.BANK.LINE13
        (S)* "bank.blank.line13.s"
        (R)

(:) :ERASE.BANK.LINE14
        (S)* "bank.blank.line14.s"
        (R)

(:) :ERASE.BANK.LINE15
        (S)* "bank.blank.line15.s"
        (R)

(:) :ERASE.BANK.LINE16
        (S)* "bank.blank.line16.s"
        (R)

;****************************************************************************
; GET BANK CARD DATA & EDIT
;****************************************************************************
        ;level 2

        ;*
        (:) :SHOW.BANK.INT.DATA

                If $244 = 0        ;if a detail edit has been made
                        (Y) 70  ;pick bank

                ;THEN SHOW BANK
                (Y)* 72

                (G)  :CLEAR.BANK.CARD.TOTAL

                ;SHOW TOTAL AT TOP OF CARD
                (H) 22
                stringFormat $290  "%$,n" $22
                display* $290, @111,187

                (R)

        ;*
```

BEST AVAILABLE COPY

```
(:) :SHOW.BANK.DET.DATA

        if $244 = 0          ;if a detail edit has been made
                (Y) 70  ;pick bank

        ;SHOW BANK
        (Y)* 71

        (G)  :CLEAR.BANK.CARD.TOTAL

        ;SHOW TOTAL AT TOP OF CARD
        (H) 22
        stringFormat $290  "%$,n" $22
        display* $290, @111,187

        ;LOAD FORMATTING VARIABLE
        (A) $158 "%,n"

        (R)

;*----------------------------------------------------
;level 1 - EDIT BANK RECOMMENDATION


;*
(:) :EDIT.BANK.REC.LINE1          ;Reg Checking

        (G) :UNHIGH.BANK.LINE.CURRENT

        ;ACCEPT LINE NUMBER
        (A) $207 "1"

        ;HIGHLIGHT THE AMOUNT
        (I)* $286 "n.bank.line0.$.s" @149,241 ;current line

        ;WAIT FOR INPUT
        (H) 35
        formattedInput * $52 $158 @160, 310 7  ;reg checking

        ;SET FLAG
        (A) $244 "1" ;detail edit made

        ;BLANK THIS LINE + TOTAL
        (S)* "n.bank.line0.$.s" @149,241 ;current line
        (S)* "n.bank.line0.$.s" @245,241 ;total line

        ; clear the line if there's no money here
        if $52 <> 0
                (G) :HIGH.BANK.LINE.CURRENT
        else
                (G) :ERASE.BANK.LINE.CURRENT

        ;SHOW NEW DETAIL
        (Y)* 71

        (J) :MAIN.WAIT

;*
(:) :EDIT.BANK.REC.LINE2          ;NOW I

        (G) :UNHIGH.BANK.LINE.CURRENT

        ;ACCEPT LINE NUMBER
```

BEST AVAILABLE COPY

```
(A) $207 "2"

;HIGHLIGHT THE AMOUNT
(I)* $286 "n.bank.line0.$.s" @165,241 ;hi current line
```

BEST AVAILABLE COPY

```
(.) :debug

;WAIT FOR INPUT
(H) 35
formattedInput * $53 $158 @176, 310 7  ;NOW I checking

;SET FLAG
(A) $244 "1" ;detail edit made

;BLANK THIS LINE
(S)* "n.bank.line0.$.s" @165,241 ;current line
(S)* "n.bank.line0.$.s" @245,241 ;total line

; clear the line if there's no money here
if $53 <> 0
        (G) :HIGH.BANK.LINE.CURRENT
else
        (G) :ERASE.BANK.LINE.CURRENT

;SHOW NEW DETAIL
(Y)* 71

(J) :MAIN.WAIT

;*
(:) :EDIT.BANK.REC.LINE3          ;NOW II

(G) :UNHIGH.BANK.LINE.CURRENT

;ACCEPT LINE NUMBER
(A) $207 "3"

;HIGHLIGHT THE AMOUNT
(I)* $286 "n.bank.line0.$.s" @181,241 ;hi current line

;WAIT FOR INPUT
(H) 35
formattedInput * $54 $158 @192, 310 7    ;NOW II

;SET FLAG
(A) $244 "1" ;detail edit made

;BLANK THIS LINE
(S)* "n.bank.line0.$.s" @181,241 ;current line
(S)* "n.bank.line0.$.s" @245,241 ;total line

; clear the line if there's no money here
if $54 <> 0
        (G) :HIGH.BANK.LINE.CURRENT
else
        (G) :ERASE.BANK.LINE.CURRENT

;SHOW NEW DETAIL
(Y)* 71

(J) :MAIN.WAIT
```

BEST AVAILABLE COPY

```
;*
(:) :EDIT.BANK.REC.LINE5          ;Day to Day savings

        (G) :UNHIGH.BANK.LINE.CURRENT

        ;ACCEPT LINE NUMBER
        (A) $207 "5"

        ;HIGHLIGHT THE AMOUNT
        (I)* $286 "n.bank.line0.$.s" @213,241 ;hi current line

        ;WAIT FOR INPUT
        (H) 35
        formattedInput * $55 $158 @224, 310 7    ;day to day savings

        ;SET FLAG
        (A) $244 "1" ;detail edit made

        ;BLANK THIS LINE
        (S)* "n.bank.line0.$.s" @213,241 ;current line
        (S)* "n.bank.line0.$.s" @245,241 ;total line

        ; clear the line if there's no money here
        if $55 <> 0
                (G) :HIGH.BANK.LINE.CURRENT
        else
                (G) :ERASE.BANK.LINE.CURRENT

        ;SHOW NEW DETAIL
        (Y)* 71

        (J) :MAIN.WAIT

;*
(:) :EDIT.BANK.REC.LINE6          ;IMRA

        (G) :UNHIGH.BANK.LINE.CURRENT

        ;ACCEPT LINE NUMBER
        (A) $207 "6"

        ;HIGHLIGHT THE AMOUNT
        (I)* $286 "n.bank.line0.$.s" @229,241 ;hi current line

        ;WAIT FOR INPUT
        (H) 35
        formattedInput * $56 $158 @240, 310 7    ;IMRA

        ;SET FLAG
        (A) $244 "1" ;detail edit made

        ;BLANK THIS LINE
        (S)* "n.bank.line0.$.s" @229,241 ;current line
        (S)* "n.bank.line0.$.s" @245,241 ;total line

        ; clear the line if there's no money here
        if $56 <> 0
                (G) :HIGH.BANK.LINE.CURRENT
        else
                (G) :ERASE.BANK.LINE.CURRENT

        ;SHOW NEW DETAIL
```

BEST AVAILABLE COPY

```
(Y)* 71

(J) :MAIN.WAIT

;*
( ) :EDIT.BANK.REC.LINE11          ;Ready Credit

(G) :UNHIGH.BANK.LINE.CURRENT

;ACCEPT LINE NUMBER
(A) $207 "11"

;HIGHLIGHT THE AMOUNT
(I)* $286 "n.bank.line0.$.s" @309,241 ;hi current line

;WAIT FOR INPUT
(H) 35
formattedInput * $117 $158 @320, 310 7   ;ready credit

;SET FLAG
(A) $244 "1" ;detail edit made

;BLANK THIS LINE
(S)* "n.bank.line0.$.s" @309,241 ;current line

; clear the line if there's no money here
if $53 <> 0
        (G) :HIGH.BANK.LINE.CURRENT
else
        (G) :ERASE.BANK.LINE.CURRENT

;SHOW NEW DETAIL
(Y)* 71

(J) :MAIN.WAIT

;*
(:) :EDIT.BANK.REC.LINE12          Checking Plus

(G) :UNHIGH.BANK.LINE.CURRENT

;ACCEPT LINE NUMBER
(A) $207 "12"

;HIGHLIGHT THE AMOUNT
(I)* $286 "n.bank.line0.$.s" @325,241 ;hi current line

;WAIT FOR INPUT
(H) 35
formattedInput * $116 $158 @336, 310 7   ;checking plus

;SET FLAG
(A) $244 "1" ;detail edit made

;BLANK THIS LINE
(S)* "n.bank.line0.$.s" @325,241 ;current line

; clear the line if there's no money here
if $53 <> 0
        (G) :HIGH.BANK.LINE.CURRENT
else
        (G) :ERASE.BANK.LINE.CURRENT
```

```
        ;SHOW NEW DETAIL
        (Y)* 71

        (J) :MAIN.WAIT

;*
(.) :EDIT.BANK.REC.LINE13                ;visa

        (G) :UNHIGH.BANK.LINE.CURRENT

        ;ACCEPT LINE NUMBER
        (A) $207 "13"

        ;HIGHLIGHT THE AMOUNT
        (I)* $286 "n.bank.line0.$.s" @341,241 ;hi current line

        ;WAIT FOR INPUT
        (H) 35
        formattedInput * $66 $158 @352, 310 7  ;visa

        ;SET FLAG
        (A) $244 "1" ;detail edit made

        ;BLANK THIS LINE
        (S)* "n.bank.line0.$.s" @341,241 ;current line

        ; clear the line if there's no money here
        if $53 <> 0
                (G) :HIGH.BANK.LINE.CURRENT
        else
                (G) :ERASE.BANK.LINE.CURRENT


        ;SHOW NEW DETAIL
        (Y)* 71

        (J) :MAIN.WAIT

;* this has been removed, but may be put back in
;(:) :EDIT.BANK.REC.LINE13                ;insurance
;
;       (G) :UNHIGH.BANK.LINE.CURRENT
;
;       ;ACCEPT LINE NUMBER
;       (A) $207 "13"
;
;       ;HIGHLIGHT THE AMOUNT
;       (I)* $286 "n.bank.line0.$.s" @341,241 ;hi current line
;
;       ;WAIT FOR INPUT
;       (H) 35
;       formattedInput * $67 $158 @352, 310 7  ;insurance
;
;       ;SET FLAG
;       (A) $244 "1" ;detail edit made;
;
;       ;BLANK THIS LINE
;       (S)* "n.bank.line0.$.s" @341,241 ;current line
;       (S)* "n.bank.line0.$.s" @245,241 ;total line
;
;       ; clear the line if there's no money here
;       if $53 <> 0
;               (G) :HIGH.BANK.LINE.CURRENT
```

Money Advice Scan File

BEST AVAILABLE COPY

BEST AVAILABLE COPY

```
else
        (G) :ERASE.BANK.LINE.CURRENT

        ;SHOW NEW DETAIL
        (Y)* 71

        (J) :MAIN.WAIT

;**********************************************************************
;INCOME CARD -  REQUESTS
;**********************************************************************
;level 1

;*
(:) :REQUEST.INCOME.REC.INT.CHECK

        (Y) 60                  ; Check to see if Total of MMF funds = vRMMFDolla
        if $380 = 4         ; It doesn't, so warn the user
        {

                (J) :MMF.ERROR

        }
        else
        {

                (J) :REQUEST.INCOME.REC.INT
        }

        ;* There was an error in the MMF TOTALS
        (:) :MMF.ERROR

                ;SAVE BACKGROUND
                (A) $302 "20"                   ; shadow offset
                (X)~ $302 "n.message.orange.s"

                ;SHOW MESSAGE BOX
                (S) "n.message.orange.s"
                (I)~ $302 "n.message.orange.s" ;shadow
                (S) "n.message.finger.s"
                (S) "n.message.cancel.s"

                (H) 23
                stringFormat $290 "Total of Money Market^funds is %$,n,^but must b
$85
                (V) $290 @179,242

                (T)
                (T) $33 "n.message.cancel.s" :MMF.UPDATE

                (J) :MAIN.WAIT.LOADED

                ;*
                (:) :MMF.UPDATE

                        ;HIGHLIGHT BUTTON
                        (S) "n.message.cancel!.s"
                        (W) 2
                        (S) "n.message.cancel.s"
                        (W) 4
```

```
;RESTORE BACKGROUND
(X)

(J) :MAIN.WAIT

( ) :REQUEST.INCOME.REC.INT

    ;WHAT'S ON THE SCREEN...

    if $264 <> 0 ;if ask card is open
                (G) :REMOVE.ASK.CARD

    if $251 = 0 ;if cards are closed
        {
        (G) :OPEN.INCOME.CARD
        (G) :SHOW.INCOME.REC.INT
        (J) :MAIN.WAIT
        }
    if $251 = 5 ;if bank card is open
        {
        (G) :CLOSE.CARD
        (G) :OPEN.INCOME.CARD
        (G) :SHOW.INCOME.REC.INT
        (J) :MAIN.WAIT
        }
    if $251 = 7 ;if growth card is open
        {
        (G) :CLOSE.CARD
        (G) :OPEN.INCOME.CARD
        (G) :SHOW.INCOME.REC.INT
        (J) :MAIN.WAIT
        }
    ;if $264 <> 0 ;if ask card is open
        ;(G) :REMOVE.ASK.CARD

    if $265 <> 0 ;if hotsheet is open
        (G) :REMOVE.HOTSHEET

    if $266 <> 0 ;if buylist is open
        (G) :REMOVE.BUYLIST

    if $267 = 1 ;income int is showing
        (J) :MAIN.WAIT

    if $267 = 2 ;income detail is showing
        {
        (G) :HIGHLIGHT.INCOME.TABSWITCH
        (G) :CLEAR.INCOME.CARD.INT
        (G) :SHOW.INCOME.REC.INT
        (J) :MAIN.WAIT
        }

    (H) 1
    (V) "Problem with REQUEST INCOME.REC.INT." @100,200

;*
(:) :REQUEST.INCOME.REC.DET

    ;WHAT'S ON THE SCREEN...
    ;(can't request detail unless this card is open)

    if $264 <> 0 ;if yours card is open
        (G) :REMOVE.ASK.CARD
```

BEST AVAILABLE COPY

BEST AVAILABLE COPY

```
if $265 <> 0 ;If hotsheet is open
        (G) :REMOVE.HOTSHEET

if $266 <> 0 ;If buylist is open
        (G) :REMOVE.BUYLIST

if $267 = 1 ;intermediate level is showing (must be)
        {
        (G) :HIGHLIGHT.INCOME.TABSWITCH
        (G) :CLEAR.INCOME.CARD.INT
        (G) :SHOW.INCOME.REC.DET
        (J) :MAIN.WAIT
        }

(H) 1
(V) "Problem with REQUEST INCOME.REC.DET." @100,200

;------------------------------------------------------------
;level 2

;*
(:) :SHOW.INCOME.REC.INT

        (G) :SHOW.INCOME.INT.DATA

        (G) :FILL.PROMPT.4.4
        (G) :SHOW.FIRST.PROMPT

        ;SET FLAG
        (A) $207 "-1" ;current line to -1 (no current line)
        (A) $267 "1" ;intermediate card

        ;SET NEXT/BACK
        (A) $298 "99"
        (A) $299 "99"

        (G) :SHOW.NEXTBACK

        (R)

;*
(:) :SHOW.INCOME.REC.DET

        (G) :SHOW.INCOME.DET.DATA

        (G) :WIPE.UP.INC.BUYLIST.TAB

        (G) :FILL.PROMPT.4.5
        (G) :SHOW.FIRST.PROMPT

        ;SET FLAG
        (A) $207 "-1" ;current line to -1 (no current line)
        (A) $267 "2" ;detail card

        ;SET NEXT/BACK
        (A) $298 "99"
        (A) $299 "99"
        (G) :SHOW.NEXTBACK
        (R)

;------------------------------------------------------------
;level 1
```

```
;
:REQUEST.INCOME.BUYLIST

    (G) :HIGHLIGHT.BUYLIST.TABOPEN
    (Y) 56 ;SETUP BUYLIST PICKS
    (A) $379 "1" ;buylist pg 1
    (G) :UNHIGH.INC.LINE.CURRENT

    (G) :WIPE.UP.INCOME.BUYLIST
    (G) :SHOW.INC.BUYLIST.PAGE.NUMBERS

    (Y)* 57 ;SHOW CURRENT PAGE DATA

    (G) :FILL.PROMPT.4.9
    (G) :SHOW.FIRST.PROMPT

    (A) $207 "-1" ;reset click slot flag
    (J) :MAIN.WAIT

;*
( ) :REQUEST.INC.BUYLIST.PAGE1

    ;SET CURRENT PAGE
    (A) $379 "1" ;buylist pg 1
    (A) $207 "-1" ;reset click slot flag

    (G) :SHOW.INC.BUYLIST.PAGE.NUMBERS
    (G) :CLEAR.INCOME.BUYLIST
    (Y)* 57 ;SHOW CURRENT PAGE

    (J) :MAIN.WAIT

;*
( ) :REQUEST.INC.BUYLIST.PAGE2

    ;SET CURRENT PAGE
    (A) $379 "2" ;buylist pg 2
    (A) $207 "-1" ;reset click slot flag

    (G) :SHOW.INC.BUYLIST.PAGE.NUMBERS
    (G) :CLEAR.INCOME.BUYLIST
    (Y)* 57 ;SHOW CURRENT PAGE

    (J) :MAIN.WAIT

;*
( ) :REQUEST.INC.BUYLIST.PAGE3

    ;SET CURRENT PAGE
    (A) $379 "3" ;buylist pg 3
    (A) $207 "-1" ;reset click slot flag

    (G) :SHOW.INC.BUYLIST.PAGE.NUMBERS
    (G) :CLEAR.INCOME.BUYLIST
    (Y)* 57 ;SHOW CURRENT PAGE

    (J) :MAIN.WAIT

;*
( ) :REQUEST.CLOSE.INCOME.BUYLIST
```

Money Advice Scan File

BEST AVAILABLE COPY

```
(A) $207 "-1" ;reset click slot flag
(G) :HIGHLIGHT.BUYLIST.TABCLOSE
(G) :WIPE.DOWN.INCOME.BUYLIST

;note: don't reset page # variable here, only
;when closing whole card. (so can return
;to current page)

(J) :MAIN.WAIT

;_______________________________________________
;level 2
;•
(:) :SHOW.INC.BUYLIST.PAGE.NUMBERS

        ;SHOW PAGE NUMBERS
        (Q) "$378 = 1" :SHOW.INC.ONE.PAGE
        (Q) "$378 = 2" :SHOW.INC.TWO.PAGE
        (Q) "$378 = 3" :SHOW.INC.THREE.PAGE

        ;_______________
        ;level 3

        (:) :SHOW.INC.ONE.PAGE
                (S)* "n.buylist.pg1.s"
                (R)

        (:) :SHOW.INC.TWO.PAGE

                ;SHOW PAGE NO'S
                (S)* "n.buylist.pg12.s"

                ;HIGHLIGHT CURRENT PAGE
                if $379 = 1
                        (S)* "n.buylist.pg12.1!.s"
                if $379 = 2
                        (S)* "n.buylist.pg12.2!.s"
                (R)

        (:) :SHOW.INC.THREE.PAGE

                ;SHOW PAGE NO'S
                (S)* "n.buylist.pg123.s"

                ;HIGHLIGHT CURRENT PAGE
                if $379 = 1
                        (S)* "n.buylist.pg123.1!.s"
                if $379 = 2
                        (S)* "n.buylist.pg123.2!.s"
                if $379 = 3
                        (S)* "n.buylist.pg123.3!.s"
                (R)
;-----------------------------------------------------
;level 1

;•
(:) :REQUEST.INCOME.REFRESH
        ; recalc with card open.

        ;WHAT'S ON THE SCREEN...
        if $264 <> 0 ;if yours card is open
                (G) :REMOVE.ASK.CARD

        if $265 <> 0 ;if hotsheet is open
```

```
        (G) :REMOVE.HOTSHEET

if $266 <> 0 ;if buylist is open
        (G) :REMOVE.BUYLIST

if $267 = 1  ;if on income int
        {
        (G) :CLEAR.INCOME.CARD.INT
        (G) :SHOW.INCOME.REC.INT
        }

if $267 = 2  ;if on income det
        {
        (G) :CLEAR.INCOME.CARD.DET
        (G) :SHOW.INCOME.REC.DET
        }

(J) :MAIN.WAIT
```

BEST AVAILABLE COPY

```
;------------------------------------------------------------
;level 1

;*
(.) :REQUEST.INCOME.CARD.CLOSE
        ;       If $267 = 2             ; if this is the detail card, then check the MMF':
        ;       {
        ;
        ;               (Y) 60                  ; Check to see if Total of MMF funds =
vRMMFDollars
        ;               If $380 = 4     ; It doesn't, so warn the user
        ;               {
        ;                       (J) :MMF.ERROR
        ;               }
        ;       }


(G) :CLOSE.INCOME.CARD

(G) :FILL.PROMPT.NONE
(G) :SHOW.FIRST.PROMPT

;SET NEXT/BACK
(A) $298 "99"
(A) $299 "99"

(J) :MAIN.WAIT
;**************************************************************************
; INCOME CARD GRAPHIC TRANSITIONS
;**************************************************************************
;level 2 - card

;*
(:) :OPEN.INCOME.CARD

        ;PRE-HIGHLIGHT TAB
        (S)* "n.tab.inc!.s"

        ;check for conditions that require a cleared screen
        If $220 <> 4    ;if proposed pie is not up
                If $220 <> 12   ;and if compare pies is not up
                        (G) :CLEAR.CENTER.SCREEN.FROM.BUTTON
```

```
(G) :HIGHLIGHT.INC.TAB ;and save background

;SHOW CARD
(A) $199 "30"
(D)* 2 "n.inc.card.s"

;SET FLAG
(A) $251 "6" ;income card
(A) $379 "1" ;set buylist pg
(A) $207 "0" ;reset click slot flag

(R)
```

BEST AVAILABLE COPY

```
;*
(:) :CLOSE.INCOME.CARD

(G) :HIGHLIGHT.INC.TABUP

;PAUSE
(W) 2

(G) :CLOSE.CARD

;SET FLAG
(A) $251 "0" ;card
(A) $207 "0" ;reset click slot flag

(R)

;------------------------------------------------------------------------------------------------

;level 2 - buylist

;*
(:) :WIPE.UP.INCOME.BUYLIST

;DON'T SAVE BACKGROUND - REBUILD LATER
;(X)* "n.inc.buylist.s"

;SHOW CARD
(A) $199 "100"
(D)* 2 "n.inc.buylist.s"

;SET FLAG
(A) $207 "0" ;reset click slot flag
(A) $266 "1" ;buylist
(R)

;*
(:) :WIPE.DOWN.INCOME.BUYLIST

;REDRAW.INCOME.DETAIL...

;SHOW CARD ON Z
(Z) 3
(S) "n.inc.card.s"
(O) "n.buylist.tabopen.s"

;REFRESH DATA ON Z
(Z) 3
(Y) 51
```

```
;SHOW TOTAL AT TOP OF CARD
(H) 22
stringFormat $290  "%$.n" $23
display* $290, ●111,197

;DRAW ON MAIN SCREEN
(Z) 1
(U) 1 "n.inc.card.s"

;DRAW ON CUST SCREEN
(Z) 2
(U) 1 "n.inc.card.s"
(Z) 1

;SET FLAG
(A) $207 "0" ;current line to 0
(A) $266 "0" ;buylist gone

(R)

;————————————
;level 3
;•
(:) :WIPE.UP.INC.BUYLIST.TAB
        (A) $199 "2000"
        (D)* 2 "n.buylist.tabopen.s"
        (R)

;•
(:) :CLEAR.INCOME.CARD.INT
        (S)* "n.inc.card.s"
        (S)* "n.inc.card.int.clear.s"
        (R)

;•
(:) :CLEAR.INCOME.CARD.DET
        (S)* "n.inc.card.s"
        (S)* "n.inc.card.det.clear.s"
        (R)

;•
(:) :CLEAR.INCOME.BUYLIST
        (S)* "n.inc.buylist.clear.s"
        (R)

;•
(:) :CLEAR.INC.CARD.TOTAL
        (S)* "n.inc.card.total$.clear.s"
        (R)

;••••••••••••••••••••••••••••••••••••••••••••••••••••••••••••••••••••••••••••••
;INCOME CARD -  LINE GRAPHICS
;••••••••••••••••••••••••••••••••••••••••••••••••••••••••••••••••••••••••••••••
;level 1

    ;•
    (:) :INCOME.CARD.LINE0

        ;IF THIS LINE IS HIGHLIT
        if $207 = 0
            {

            ; SHOW THE GLOSSARY IF WE'RE ON THE INTERMEDIATE PAC
```

BEST AVAILABLE COPY

```
If $267 = 1
        {
        (A) $375 "Bond Term"
        (J) :GLOSSARY.DISPATCH
        }
```

BEST AVAILABLE COPY

```
; SHOW THE DIALOG BOX IF WE'RE ON THE DETAIL PAGE
else
        (J) :SHOW.INCOME.DIBOX
}

; IF THIS LINE IS NOT HIGHLIT, THEN HIGHLIGHT IT AND JUMP TO MAI
else
        {
        (G) :UNHIGH.INC.LINE.CURRENT

        ;ACCEPT LINE NUMBER
        (A) $207 "0"

        ;SELECT CURRENT BOND
        (Y) 53

        (G) :HIGH.INC.LINE.CURRENT

        (J) :MAIN.WAIT
        }

;*
(:) :INCOME.CARD.LINE1

        ;IF THIS LINE IS HIGHLIT
        (Q) "$207 = 1" :SHOW.INCOME.DIBOX

        (G) :UNHIGH.INC.LINE.CURRENT

        ;ACCEPT LINE NUMBER
        (A) $207 "1"

        ;SELECT CURRENT BOND
        (Y) 53

        (G) :HIGH.INC.LINE.CURRENT

        (J) :MAIN.WAIT

;*
(:) :INCOME.CARD.LINE2

        ;IF THIS LINE IS HIGHLIT
        (Q) "$207 = 2" :SHOW.INCOME.DIBOX

        (G) :UNHIGH.INC.LINE.CURRENT

        ;ACCEPT LINE NUMBER
        (A) $207 "2"

        ;SELECT CURRENT BOND
        (Y) 53

        (G) :HIGH.INC.LINE.CURRENT

        (J) :MAIN.WAIT
```

BEST AVAILABLE COPY

```
;*
(:) :INCOME.CARD.LINE3

        ;IF THIS LINE IS HIGHLIT
        If $207 = 3
                {

                ; SHOW THE GLOSSARY IF WE'RE ON THE INTERMEDIATE PA(
                If $267 = 1
                        {
                        (A) $375 "Bond Term"
                        (J) :GLOSSARY.DISPATCH
                        }

                ; SHOW THE DIALOG BOX IF WE'RE ON THE DETAIL PAGE
                else
                        (J) :SHOW.INCOME.DIBOX
                }

        ; IF THIS LINE IS NOT HIGHLIT, THEN HIGHLIGHT IT AND JUMP TO MAI
        else
                {
                (G) :UNHIGH.INC.LINE.CURRENT

                ;ACCEPT LINE NUMBER
                (A) $207 "3"

                ;SELECT CURRENT BOND
                (Y) 53

                (G) :HIGH.INC.LINE.CURRENT

                (J) :MAIN.WAIT
                }

;*
(:) :INCOME.CARD.LINE4

        ;IF THIS LINE IS HIGHLIT
        (Q) "$207 = 4" :SHOW.INCOME.DIBOX

        (G) :UNHIGH.INC.LINE.CURRENT

        ;ACCEPT LINE NUMBER
        (A) $207 "4"

        ;SELECT CURRENT BOND
        (Y) 53

        (G) :HIGH.INC.LINE.CURRENT

        (J) :MAIN.WAIT

;*
(:) :INCOME.CARD.LINE5

        ;IF THIS LINE IS HIGHLIT
        (Q) "$207 = 5" :SHOW.INCOME.DIBOX

        (G) :UNHIGH.INC.LINE.CURRENT
```

BEST AVAILABLE COPY

```
        ;ACCEPT LINE NUMBER
        (A) $207 "5"

        ;SELECT CURRENT BOND
        (Y) 53

        (G) :HIGH.INC.LINE.CURRENT

        (J) :MAIN.WAIT

;*
(:) :INCOME.CARD.LINE6

        ;IF THIS LINE IS HIGHLIT
        If $207 = 6
                {

                ; SHOW THE GLOSSARY IF WE'RE ON THE INTERMEDIATE PAC
                If $267 = 1
                        {
                        (A) $375 "Bond Term"
                        (J) :GLOSSARY.DISPATCH
                        }

                ; SHOW THE DIALOG BOX IF WE'RE ON THE DETAIL PAGE
                else
                        (J) :SHOW.INCOME.DIBOX
                }

        ; IF THIS LINE IS NOT HIGHLIT, THEN HIGHLIGHT IT AND JUMP TO MAI
        else
                {
                (G) :UNHIGH.INC.LINE.CURRENT

                ;ACCEPT LINE NUMBER
                (A) $207 "6"

                ;SELECT CURRENT BOND
                (Y) 53

                (G) :HIGH.INC.LINE.CURRENT

                (J) :MAIN.WAIT
                }

;*
(:) :INCOME.CARD.LINE7

        ;IF THIS LINE IS HIGHLIT
        (Q) "$207 = 7" :SHOW.INCOME.DIBOX

        (G) :UNHIGH.INC.LINE.CURRENT

        ;ACCEPT LINE NUMBER
        (A) $207 "7"

        ;SELECT CURRENT BOND
        (Y) 53

        (G) :HIGH.INC.LINE.CURRENT

        (J) :MAIN.WAIT
```

BEST AVAILABLE COPY

```
;*
(:) :INCOME.CARD.LINE8

        ;IF THIS LINE IS HIGHLIT
        (Q) "$207 = 8" :SHOW.INCOME.DIBOX

        (G) :UNHIGH.INC.LINE.CURRENT

        ;ACCEPT LINE NUMBER
        (A) $207 "8"

        ;SELECT CURRENT BOND
        (Y) 53

        (G) :HIGH.INC.LINE.CURRENT

        (J) :MAIN.WAIT

;*
(:) :INCOME.CARD.LINE9

        ;IF THIS LINE IS HIGHLIT
        if $207 = 9
                {

                ; SHOW THE GLOSSARY IF WE'RE ON THE INTERMEDIATE PA(
                if $267 = 1
                        {
                        (A) $375 "Money Market Fund"
                        (J) :GLOSSARY.DISPATCH
                        }

                ; SHOW THE DIALOG BOX IF WE'RE ON THE DETAIL PAGE
                else
                        (J) :SHOW.INCOME.DIBOX
                }

        ; IF THIS LINE IS NOT HIGHLIT, THEN HIGHLIGHT IT AND JUMP TO MAI
        else
                {
                (G) :UNHIGH.INC.LINE.CURRENT

                ;ACCEPT LINE NUMBER
                (A) $207 "9"

                ;SELECT CURRENT BOND
                (Y) 53

                (G) :HIGH.INC.LINE.CURRENT

                (J) :MAIN.WAIT
                }

;*
(:) :INCOME.CARD.LINE10

        ;IF THIS LINE IS HIGHLIT
        (Q) "$207 = 10" :SHOW.INCOME.DIBOX

        (G) :UNHIGH.INC.LINE.CURRENT

        ;ACCEPT LINE NUMBER
```

```
        (A) $207 "10"

        ;SELECT CURRENT BOND
        (Y) 53

        (G) :HIGH.INC.LINE.CURRENT

        (J) :MAIN.WAIT

;*
(:) :INCOME.CARD.LINE11

        ;IF THIS LINE IS HIGHLIT
        (Q) "$207 = 11" :SHOW.INCOME.DIBOX

        (G) :UNHIGH.INC.LINE.CURRENT

        ;ACCEPT LINE NUMBER
        (A) $207 "11"

        ;SELECT CURRENT BOND
        (Y) 53

        (G) :HIGH.INC.LINE.CURRENT

        (J) :MAIN.WAIT

;*
(:) :INCOME.CARD.LINE12

        ;IF THIS LINE IS HIGHLIT
        (Q) "$207 = 12" :SHOW.INCOME.DIBOX

        (G) :UNHIGH.INC.LINE.CURRENT

        ;ACCEPT LINE NUMBER
        (A) $207 "12"

        ;SELECT CURRENT BOND
        (Y) 53

        (G) :HIGH.INC.LINE.CURRENT

        (J) :MAIN.WAIT

;*
(:) :INCOME.CARD.LINE13

        ;IF THIS LINE IS HIGHLIT
        (Q) "$207 = 13" :SHOW.INCOME.DIBOX

        (G) :UNHIGH.INC.LINE.CURRENT

        ;ACCEPT LINE NUMBER
        (A) $207 "13"

        ;SELECT CURRENT BOND
        (Y) 53

        (G) :HIGH.INC.LINE.CURRENT

        (J) :MAIN.WAIT
```

BEST AVAILABLE COPY

```
(:) :INCOME.CARD.LINE14

        ;IF THIS LINE IS HIGHLIT
        (Q) "$207 = 14" :SHOW.INCOME.DIBOX

        (G) :UNHIGH.INC.LINE.CURRENT

        ;ACCEPT LINE NUMBER
        (A) $207 "14"

        ;SELECT CURRENT BOND
        (Y) 53

        (G) :HIGH.INC.LINE.CURRENT

        (J) :MAIN.WAIT

;*
(:) :INCOME.CARD.LINE15

        ;IF THIS LINE IS HIGHLIT
        (Q) "$207 = 15" :SHOW.INCOME.DIBOX

        (G) :UNHIGH.INC.LINE.CURRENT

        ;ACCEPT LINE NUMBER
        (A) $207 "15"

        ;SELECT CURRENT BOND
        (Y) 53

        (G) :HIGH.INC.LINE.CURRENT

        (J) :MAIN.WAIT

;*
(:) :INCOME.CARD.LINE16

        ;IF THIS LINE IS HIGHLIT
        (Q) "$207 = 16" :SHOW.INCOME.DIBOX

        (G) :UNHIGH.INC.LINE.CURRENT

        ;ACCEPT LINE NUMBER
        (A) $207 "16"

        ;SELECT CURRENT BOND
        (Y) 53

        (G) :HIGH.INC.LINE.CURRENT

        (J) :MAIN.WAIT

;*
(:) :INCOME.CARD.LINE105

        (G) :UNHIGH.INC.LINE.CURRENT
        (A) $207 "-1"              ; reset current line
        (G) :HIGH.INC.GLOSSARY.105

        (A) $375 "Price"

        (J) :GLOSSARY.DISPATCH
```

BEST AVAILABLE COPY

BEST AVAILABLE COPY

```
;*
(:) :INCOME.CARD.LINE106

        (G) :UNHIGH.INC.LINE.CURRENT
        (A) $207 "-1"              ; reset current line
        (G) :HIGH.INC.GLOSSARY.106

        (A) $375 "S&P Rating"

        (J) :GLOSSARY.DISPATCH

;*
(:) :INCOME.CARD.LINE107

        (G) :UNHIGH.INC.LINE.CURRENT
        (A) $207 "-1"              ; reset current line
        (G) :HIGH.INC.GLOSSARY.107

        (A) $375 "Maturity"

        (J) :GLOSSARY.DISPATCH

;*
(:) :INCOME.CARD.LINE108

        (G) :UNHIGH.INC.LINE.CURRENT
        (A) $207 "-1"              ; reset current line
        (G) :HIGH.INC.GLOSSARY.108

        (A) $375 "Coupon"

        (J) :GLOSSARY.DISPATCH

;*
(:) :INCOME.CARD.LINE109

        (G) :UNHIGH.INC.LINE.CURRENT
        (A) $207 "-1"              ; reset current line
        (G) :HIGH.INC.GLOSSARY.109

        (A) $375 "YTM (Yield to Maturity)"

        (J) :GLOSSARY.DISPATCH

;------------------------------------------------------------
;level 2

;*
(:) :HIGH.INC.LINE.CURRENT

        ; IF $207 < 0 THEN THERE IS NO CURRENT LINE
        if $207 < 0
                (R)

        ;CHECK WHICH LINE TO HIGHLIGHT
        stringFormat $290 ":HIGH.INC.LINE%n", $207
        (J) $290

        (:) :HIGH.INC.LINE0
                (I)* $286 "n.rec.inc.line0.s"
                (:) :NO.INC.HIEVENT0
                (R)
```

```
(:) :HIGH.INC.LINE1
        (I)* $286 "n.rec.inc.line1.s"
        (:) :NO.INC.HIEVENT1
        (R)

(:) :HIGH.INC.LINE2
        (I)* $286 "n.rec.inc.line2.s"
        (:) :NO.INC.HIEVENT2
        (R)

(:) :HIGH.INC.LINE3
        (I)* $286 "n.rec.inc.line3.s"
        (:) :NO.INC.HIEVENT3
        (R)

(:) :HIGH.INC.LINE4
        (I)* $286 "n.rec.inc.line4.s"
        (:) :NO.INC.HIEVENT4
        (R)

(:) :HIGH.INC.LINE5
        (I)* $286 "n.rec.inc.line5.s"
        (:) :NO.INC.HIEVENT5
        (R)

(:) :HIGH.INC.LINE6
        (I)* $286 "n.rec.inc.line6.s"
        (:) :NO.INC.HIEVENT6
        (R)

(:) :HIGH.INC.LINE7
        (I)* $286 "n.rec.inc.line7.s"
        (:) :NO.INC.HIEVENT7
        (R)

(:) :HIGH.INC.LINE8
        (I)* $286 "n.rec.inc.line8.s"
        (:) :NO.INC.HIEVENT8
        (R)

(:) :HIGH.INC.LINE9
        (I)* $286 "n.rec.inc.line9.s"
        (:) :NO.INC.HIEVENT9
        (R)

(:) :HIGH.INC.LINE10
        (I)* $286 "n.rec.inc.line10.s"
        (:) :NO.INC.HIEVENT10
        (R)

(:) :HIGH.INC.LINE11
        (I)* $286 "n.rec.inc.line11.s"
        (:) :NO.INC.HIEVENT11
        (R)

(:) :HIGH.INC.LINE12
        (I)* $286 "n.rec.inc.line12.s"
        (:) :NO.INC.HIEVENT12
        (R)

(:) :HIGH.INC.LINE13
        (I)* $286 "n.rec.inc.line13.s"
        (:) :NO.INC.HIEVENT13
```

BEST AVAILABLE COPY

```
        (R)

(:) :HIGH.INC.LINE14
        (I)* $286 "n.rec.inc.line14.s"
        (:) :NO.INC.HIEVENT14
        (R)

(:) :HIGH.INC.LINE15
        (I)* $286 "n.rec.inc.line15.s"
        (:) :NO.INC.HIEVENT15
        (R)

(:) :HIGH.INC.LINE16
        (I)* $286 "n.rec.inc.line16.s"
        (:) :NO.INC.HIEVENT16
        (R)

;GLOSSARY LINES
(:) :HIGH.INC.GLOSSARY.105                      ;price
        (I)* #116,349,132,392 $286
        (W) 4
        (I)*- #116,349,132,392 $286
        (:) :NO.INC.HIEVENT105
        (R)

(:) :HIGH.INC.GLOSSARY.106                      ;S & P
        (I)* #116,393,132,424 $286
        (W) 4
        (I)*- #116,393,132,424 $286
        (:) :NO.INC.HIEVENT106
        (R)

(:) :HIGH.INC.GLOSSARY.107                      ;maturity
        (I)* #116,425,132,492 $286
        (W) 4
        (I)*- #116,425,132,492 $286
        (:) :NO.INC.HIEVENT107
        (R)

(:) :HIGH.INC.GLOSSARY.108                      ;coupon
        (I)* #116,493,132,539 $286
        (W) 4
        (I)*- #116,493,132,539 $286
        (:) :NO.INC.HIEVENT108
        (R)

(:) :HIGH.INC.GLOSSARY.109                      ;YTM
        (I)* #116,540,132,584 $286
        (W) 4
        (I)*- #116,540,132,584 $286
        (:) :NO.INC.HIEVENT109
        (R)

;*
(:) :UNHIGH.INC.LINE.CURRENT

    ; IF $207 < 0 THEN THERE IS NO CURRENT LINE
    if $207 < 0
        (R)

    ;CHECK WHICH LINE IS HIGHLIT
    stringFormat $290 ":UNHIGH.INC.LINE%n", $207
    (J) $290
```

BEST AVAILABLE COPY

```
(:) :UNHIGH.INC.LINE0
        (I)*- $286 "n.rec.inc.line0.s"
        (:) :NO.INC.EVENT0
        (R)

(:) :UNHIGH.INC.LINE1
        (I)*- $286 "n.rec.inc.line1.s"
        (:) :NO.INC.EVENT1
        (R)

(:) :UNHIGH.INC.LINE2
        (I)*- $286 "n.rec.inc.line2.s"
        (:) :NO.INC.EVENT2
        (R)

(:) :UNHIGH.INC.LINE3
        (I)*- $286 "n.rec.inc.line3.s"
        (:) :NO.INC.EVENT3
        (R)

(:) :UNHIGH.INC.LINE4
        (I)*- $286 "n.rec.inc.line4.s"
        (:) :NO.INC.EVENT4
        (R)

(:) :UNHIGH.INC.LINE5
        (I)*- $286 "n.rec.inc.line5.s"
        (:) :NO.INC.EVENT5
        (R)

(:) :UNHIGH.INC.LINE6
        (I)*- $286 "n.rec.inc.line6.s"
        (:) :NO.INC.EVENT6
        (R)

(:) :UNHIGH.INC.LINE7
        (I)*- $286 "n.rec.inc.line7.s"
        (:) :NO.INC.EVENT7
        (R)

(:) :UNHIGH.INC.LINE8
        (I)*- $286 "n.rec.inc.line8.s"
        (:) :NO.INC.EVENT8
        (R)

(:) :UNHIGH.INC.LINE9
        (I)*- $286 "n.rec.inc.line9.s"
        (:) :NO.INC.EVENT9
        (R)

(:) :UNHIGH.INC.LINE10
        (I)*- $286 "n.rec.inc.line10.s"
        (:) :NO.INC.EVENT10
        (R)

(:) :UNHIGH.INC.LINE11
        (I)*- $286 "n.rec.inc.line11.s"
        (:) :NO.INC.EVENT11
        (R)

(:) :UNHIGH.INC.LINE12
        (I)*- $286 "n.rec.inc.line12.s"
        (:) :NO.INC.EVENT12
```

BEST AVAILABLE COPY

Money Advice Scan File

```
(R)

(:) :UNHIGH.INC.LINE13
        (I)*- $286 "n.rec.inc.line13.s"
        (:) :NO.INC.EVENT13
        (R)

(:) :UNHIGH.INC.LINE14
        (I)*- $286 "n.rec.inc.line14.s"
        (:) :NO.INC.EVENT14
        (R)

(:) :UNHIGH.INC.LINE15
        (I)*- $286 "n.rec.inc.line15.s"
        (:) :NO.INC.EVENT15
        (R)

(:) :UNHIGH.INC.LINE16
        (I)*- $286 "n.rec.inc.line16.s"
        (:) :NO.INC.EVENT16
        (R)

;GLOSSARY LINES
(:) :UNHIGH.INC.LINE105                        ;price
        (I)*- #116,341,132,386 $286
        (:) :NO.INC.EVENT105
        (R)

(:) :UNHIGH.INC.LINE106                        ;52wk hi lo
        (I)*- #116,387,132,477 $286
        (:) :NO.INC.EVENT106
        (R)

(:) :UNHIGH.INC.LINE107                        ;dividend
        (I)*- #116,478,132,511 $286
        (:) :NO.INC.EVENT107
        (R)

(:) :UNHIGH.INC.LINE108                        ;p/e
        (I)*- #116,512,132,546 $286
        (:) :NO.INC.EVENT108
        (R)

(:) :UNHIGH.INC.LINE109                        ;beta
        (I)*- #116,547,132,583 $286
        (:) :NO.INC.EVENT109
        (R)

;*
(:) :BLANK.INC.LINE.CURRENT

    ;CHECK WHICH LINE TO BLANK
    stringFormat $290 ":BLANK.INC.LINE%n", $207
    (J) $290

    (:) :BLANK.INC.LINE0
    (S)* "n.rec.inc.line0.s"
    (R)

    (:) :BLANK.INC.LINE1
    (S)* "n.rec.inc.line1.s"
    (R)
```

BEST AVAILABLE COPY (:) :BLANK.INC.LINE2
(S)* "n.rec.inc.line2.s"
(R)

(:) :BLANK.INC.LINE3
(S)* "n.rec.inc.line3.s"
(R)

BEST AVAILABLE COPY (:) :BLANK.INC.LINE4
(S)* "n.rec.inc.line4.s"
(R)

(:) :BLANK.INC.LINE5
(S)* "n.rec.inc.line5.s"
(R)

(:) :BLANK.INC.LINE6
(S)* "n.rec.inc.line6.s"
(R)

(:) :BLANK.INC.LINE7
(S)* "n.rec.inc.line7.s"
(R)

(:) :BLANK.INC.LINE8
(S)* "n.rec.inc.line8.s"
(R)

(:) :BLANK.INC.LINE9
(S)* "n.rec.inc.line9.s"
(R)

(:) :BLANK.INC.LINE10
(S)* "n.rec.inc.line10.s"
(R)

(:) :BLANK.INC.LINE11
(S)* "n.rec.inc.line11.s"
(R)

(:) :BLANK.INC.LINE12
(S)* "n.rec.inc.line12.s"
(R)

(:) :BLANK.INC.LINE13
(S)* "n.rec.inc.line13.s"
(R)

(:) :BLANK.INC.LINE14
(S)* "n.rec.inc.line14.s"
(R)

(:) :BLANK.INC.LINE15
(S)* "n.rec.inc.line15.s"
(R)

(:) :BLANK.INC.LINE16
(S)* "n.rec.inc.line16.s"
(R)

;*
(:) :BLANK.INC.LINE.RESIDUAL (S)* "n.inc.$value.resid.blnk.s" ;RESIDUAL

Money Advice Scan File (R)

```
••••••••••••••••••••••••••••••••••••••••••••••••••••••••••••••••••••••
INCOME BUYLIST - LINE GRAPHICS
••••••••••••••••••••••••••••••••••••••••••••••••••••••••••••••••••••••
level 1

    ;•
    (:) :INC.BUYLIST.LINE0

         ;IF THIS LINE IS HIGHLIT
         (Q) "$207 = 0" :SHOW.INC.BUYLIST.DIBOX

         (G) :UNHIGH.INC.BUYLIST.LINE.CURRENT

         ;ACCEPT LINE NUMBER
         (A) $207 "0"

         ;SELECT CURRENT BOND
         (Y) 58

         (G) :HIGH.INC.BUYLIST.LINE.CURRENT

         (J) :MAIN.WAIT

    ;•
    (:) :INC.BUYLIST.LINE1

         ;IF THIS LINE IS HIGHLIT
         (Q) "$207 = 1" :SHOW.INC.BUYLIST.DIBOX

         (G) :UNHIGH.INC.BUYLIST.LINE.CURRENT

         ;ACCEPT LINE NUMBER
         (A) $207 "1"

         ;SELECT CURRENT BOND
         (Y) 58

         (G) :HIGH.INC.BUYLIST.LINE.CURRENT

         (J) :MAIN.WAIT

    ;•
    (:) :INC.BUYLIST.LINE2

         ;IF THIS LINE IS HIGHLIT
         (Q) "$207 = 2" :SHOW.INC.BUYLIST.DIBOX

         (G) :UNHIGH.INC.BUYLIST.LINE.CURRENT

         ;ACCEPT LINE NUMBER
         (A) $207 "2"

         ;SELECT CURRENT BOND
         (Y) 58

         (G) :HIGH.INC.BUYLIST.LINE.CURRENT

         (J) :MAIN.WAIT

    ;•
```

BEST AVAILABLE COPY

```
(:) :INC.BUYLIST.LINE3

        ;IF THIS LINE IS HIGHLIT
        (Q) "$207 = 3" :SHOW.INC.BUYLIST.DIBOX

        (G) :UNHIGH.INC.BUYLIST.LINE.CURRENT

        ;ACCEPT LINE NUMBER
        (A) $207 "3"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE4

        ;IF THIS LINE IS HIGHLIT
        (Q) "$207 = 4" :SHOW.INC.BUYLIST.DIBOX

        (G) :UNHIGH.INC.BUYLIST.LINE.CURRENT

        ;ACCEPT LINE NUMBER
        (A) $207 "4"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE5

        ;IF THIS LINE IS HIGHLIT
        (Q) "$207 = 5" :SHOW.INC.BUYLIST.DIBOX

        (G) :UNHIGH.INC.BUYLIST.LINE.CURRENT

        ;ACCEPT LINE NUMBER
        (A) $207 "5"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE6

        ;IF THIS LINE IS HIGHLIT
        (Q) "$207 = 6" :SHOW.INC.BUYLIST.DIBOX

        (G) :UNHIGH.INC.BUYLIST.LINE.CURRENT

        ;ACCEPT LINE NUMBER
        (A) $207 "6"
```

BEST AVAILABLE COPY

```
        ;SELECT CURRENT BOND
        (Y) 58

        (G) :HIGH.INC.BUYLIST.LINE.CURRENT

        (J) :MAIN.WAIT
```

BEST AVAILABLE COPY

```
;*
(:) :INC.BUYLIST.LINE7

        ;IF THIS LINE IS HIGHLIT
        (Q) "$207 = 7" :SHOW.INC.BUYLIST.DIBOX

        (G) :UNHIGH.INC.BUYLIST.LINE.CURRENT

        ;ACCEPT LINE NUMBER
        (A) $207 "7"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE8

        ;IF THIS LINE IS HIGHLIT
        (Q) "$207 = 8" :SHOW.INC.BUYLIST.DIBOX

        (G) :UNHIGH.INC.BUYLIST.LINE.CURRENT

        ;ACCEPT LINE NUMBER
        (A) $207 "8"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE9

        ;IF THIS LINE IS HIGHLIT
        (Q) "$207 = 9" :SHOW.INC.BUYLIST.DIBOX

        (G) :UNHIGH.INC.BUYLIST.LINE.CURRENT

        ;ACCEPT LINE NUMBER
        (A) $207 "9"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE10
```

```
        ;IF THIS LINE IS HIGHLIT
        (Q) "$207 = 10" :SHOW.INC.BUYLIST.DIBOX

        (G) :UNHIGH.INC.BUYLIST.LINE.CURRENT

        ;ACCEPT LINE NUMBER
        (A) $207 "10"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE11

        ;IF THIS LINE IS HIGHLIT
        (Q) "$207 = 11" :SHOW.INC.BUYLIST.DIBOX

        (G) :UNHIGH.INC.BUYLIST.LINE.CURRENT

        ;ACCEPT LINE NUMBER
        (A) $207 "11"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE12

        ;IF THIS LINE IS HIGHLIT
        (Q) "$207 = 12" :SHOW.INC.BUYLIST.DIBOX

        (G) :UNHIGH.INC.BUYLIST.LINE.CURRENT

        ;ACCEPT LINE NUMBER
        (A) $207 "12"

        ;SELECT CURRENT BOND
        (Y) 58

        (G) :HIGH.INC.BUYLIST.LINE.CURRENT

        (J) :MAIN.WAIT

;*
(:) :INC.BUYLIST.LINE13

        ;IF THIS LINE IS HIGHLIT
        (Q) "$207 = 13" :SHOW.INC.BUYLIST.DIBOX

        (G) :UNHIGH.INC.BUYLIST.LINE.CURRENT

        ;ACCEPT LINE NUMBER
        (A) $207 "13"

        ;SELECT CURRENT BOND
        (Y) 58
```

BEST AVAILABLE COPY

```
        (G) :HIGH.INC.BUYLIST.LINE.CURRENT

        (J) :MAIN.WAIT

;*
(:) :INC.BUYLIST.LINE14

        ;IF THIS LINE IS HIGHLIT
        (Q) "$207 = 14" :SHOW.INC.BUYLIST.DIBOX

        (G) :UNHIGH.INC.BUYLIST.LINE.CURRENT

        ;ACCEPT LINE NUMBER
        (A) $207 "14"

        ;SELECT CURRENT BOND
        (Y) 58

        (G) :HIGH.INC.BUYLIST.LINE.CURRENT

        (J) :MAIN.WAIT

;GLOSSARY LINES

;*
(:) :INC.BUYLIST.LINE105

        (G) :UNHIGH.INC.BUYLIST.LINE.CURRENT
        (A) $207 "-1"              ; reset current line
        (G) :HIGH.INC.GLOSSARY.BUYLIST.105

        (A) $375 "Price"

        (J) :GLOSSARY.DISPATCH

;*
(:) :INC.BUYLIST.LINE106

        (G) :UNHIGH.INC.BUYLIST.LINE.CURRENT
        (A) $207 "-1"              ; reset current line
        (G) :HIGH.INC.GLOSSARY.BUYLIST.106

        (A) $375 "S&P Rating"

        (J) :GLOSSARY.DISPATCH

;*
(:) :INC.BUYLIST.LINE107

        (G) :UNHIGH.INC.BUYLIST.LINE.CURRENT
        (A) $207 "-1"              ; reset current line
        (G) :HIGH.INC.GLOSSARY.BUYLIST.107

        (A) $375 "Maturity"

        (J) :GLOSSARY.DISPATCH

;*
(:) :INC.BUYLIST.LINE108

        (G) :UNHIGH.INC.BUYLIST.LINE.CURRENT
        (A) $207 "-1"              ; reset current line
        (G) :HIGH.INC.GLOSSARY.BUYLIST.108
```

BEST AVAILABLE COPY

BEST AVAILABLE COPY

```
        (A) $375 "Coupon"

        (J) :GLOSSARY.DISPATCH

;*
(:) :INC.BUYLIST.LINE109

        (G) :UNHIGH.INC.BUYLIST.LINE.CURRENT
        (A) $207 "-1"              ; reset current line
        (G) :HIGH.INC.GLOSSARY.BUYLIST.109

        (A) $375 "YTM (Yield to Maturity)"

        (J) :GLOSSARY.DISPATCH

;----------------------------------------------------------------------
---------------
;level 2

;*
(:) :HIGH.INC.BUYLIST.LINE.CURRENT

    ; RETURN IF IT'S NOT A REAL LINE
    if $207 < 0
            (R)

    ;CHECK WHICH LINE TO HIGHLIGHT
    stringFormat $290 ":HIGH.INC.BUYLIST.LINE%n", $207
    (J) $290

    ;****
    (:) :HIGH.INC.BUYLIST.LINE0
            (I)* $287 "n.inc.buylist.line.s" @148,143
            (:) :NO2.INC.HIEVENT0
            (R)

    (:) :HIGH.INC.BUYLIST.LINE1
            (I)* $287 "n.inc.buylist.line.s" @164,143
            (:) :NO2.INC.HIEVENT1
            (R)

    (:) :HIGH.INC.BUYLIST.LINE2
            (I)* $287 "n.inc.buylist.line.s" @180,143
            (:) :NO2.INC.HIEVENT2
            (R)

    (:) :HIGH.INC.BUYLIST.LINE3
            (I)* $287 "n.inc.buylist.line.s" @196,143
            (:) :NO2.INC.HIEVENT3
            (R)

    (:) :HIGH.INC.BUYLIST.LINE4
            (I)* $287 "n.inc.buylist.line.s" @212,143
            (:) :NO2.INC.HIEVENT4
            (R)

    (:) :HIGH.INC.BUYLIST.LINE5
            (I)* $287 "n.inc.buylist.line.s" @228,143
            (:) :NO2.INC.HIEVENT5
            (R)

    (:) :HIGH.INC.BUYLIST.LINE6
            (I)* $287 "n.inc.buylist.line.s" @244,143
```

```
(:) :NO2.INC.HIEVENT6
(R)

(:) :HIGH.INC.BUYLIST.LINE7
    (I)* $287 "n.inc.buylist.line.s" @260,143
    (:) :NO2.INC.HIEVENT7
    (R)

(:) :HIGH.INC.BUYLIST.LINE8
    (I)* $287 "n.inc.buylist.line.s" @276,143
    (:) :NO2.INC.HIEVENT8
    (R)

(:) :HIGH.INC.BUYLIST.LINE9
    (I)* $287 "n.inc.buylist.line.s" @292,143
    (:) :NO2.INC.HIEVENT9
    (R)

(:) :HIGH.INC.BUYLIST.LINE10
    (I)* $287 "n.inc.buylist.line.s" @308,143
    (:) :NO2.INC.HIEVENT10
    (R)

(:) :HIGH.INC.BUYLIST.LINE11
    (I)* $287 "n.inc.buylist.line.s" @324,143
    (:) :NO2.INC.HIEVENT11
    (R)

(:) :HIGH.INC.BUYLIST.LINE12
    (I)* $287 "n.inc.buylist.line.s" @340,143
    (:) :NO2.INC.HIEVENT12
    (R)

(:) :HIGH.INC.BUYLIST.LINE13
    (I)* $287 "n.inc.buylist.line.s" @356,143
    (:) :NO2.INC.HIEVENT13
    (R)

(:) :HIGH.INC.BUYLIST.LINE14
    (I)* $287 "n.inc.buylist.line.s" @372,143
    (:) :NO2.INC.HIEVENT14
    (R)

;GLOSSARY LINES

(:) :HIGH.INC.GLOSSARY.BUYLIST.105              ;price

    (I)* #134,309,146,353 $287
    (W) 4
    (I)*- #134,309,146,353 $287
    (:) :NO.INC.HIEVENT105BB
    (R)

(:) :HIGH.INC.GLOSSARY.BUYLIST.106              ;S & P

    (I)* #134,354,146,393 $287
    (W) 4
    (I)*- #134,354,146,393 $287
    (:) :NO.INC.HIEVENT106B
    (R)

(:) :HIGH.INC.GLOSSARY.BUYLIST.107              ;maturity

    (I)* #134,394,146,460 $287
```

BEST AVAILABLE COPY

```
(W) 4
(I)*- #134,394,146,460 $287
(:) :NO.INC.HIEVENT107B
(R)

(:) :HIGH.INC.GLOSSARY.BUYLIST.108                ;coupon

(I)* #134,461,146,517 $287
(W) 4
(I)*- #134,461,146,517 $287
(:) :NO.INC.HIEVENT108B
(R)

(:) :HIGH.INC.GLOSSARY.BUYLIST.109                ;ytm

(I)* #134,518,146,556 $287
(W) 4
(I)*- #134,518,146,556 $287
(:) :NO.INC.HIEVENT109B
(R)


(:) :UNHIGH.INC.BUYLIST.LINE.CURRENT

; MAKE SURE THERE is A CURRENT LINE
if $207 < 0
    (R)

;CHECK WHICH LINE IS HIGHLIT
stringFormat $290 ":UNHIGH.INC.BUYLIST.LINE%n", $207
(J) $290

(:) :UNHIGH.INC.BUYLIST.LINE0
    (I)*- $287 "n.inc.buylist.line.s" @148,143
    (:) :NO2.INC.EVENT0
    (R)

(:) :UNHIGH.INC.BUYLIST.LINE1
    (I)*- $287 "n.inc.buylist.line.s" @164,143
    (:) :NO2.INC.EVENT1
    (R)

(:) :UNHIGH.INC.BUYLIST.LINE2
    (I)*- $287 "n.inc.buylist.line.s" @180,143
    (:) :NO2.INC.EVENT2
    (R)

(:) :UNHIGH.INC.BUYLIST.LINE3
    (I)*- $287 "n.inc.buylist.line.s" @196,143
    (:) :NO2.INC.EVENT3
    (R)

(:) :UNHIGH.INC.BUYLIST.LINE4
    (I)*- $287 "n.inc.buylist.line.s" @212,143
    (:) :NO2.INC.EVENT4
    (R)

(:) :UNHIGH.INC.BUYLIST.LINE5
    (I)*- $287 "n.inc.buylist.line.s" @228,143
    (:) :NO2.INC.EVENT5
    (R)

(:) :UNHIGH.INC.BUYLIST.LINE6
```

BEST AVAILABLE COPY

```
        (I)*- $287 "n.Inc.buylist.line.s" ●244,143
        (:) :NO2.INC.EVENT6
        (R)

(:) :UNHIGH.INC.BUYLIŠT.LINE7
        (I)*- $287 "n.inc.buylist.line.s" ●260,143
        (:) :NO2.INC.EVENT7
        (R)

(:) :UNHIGH.INC.BUYLIST.LINE8
        (I)*- $287 "n.inc.buylist.line.s" ●276,143
        (:) :NO2.INC.EVENT8
        (R)

(:) :UNHIGH.INC.BUYLIST.LINE9
        (I)*- $287 "n.inc.buylist.line.s" ●292,143
        (:) :NO2.INC.EVENT9
        (R)

(:) :UNHIGH.INC.BUYLIST.LINE10
        (I)*- $287 "n.inc.buylist.line.s" ●308,143
        (:) :NO2.INC.EVENT10
        (R)

(:) :UNHIGH.INC.BUYLIST.LINE11
        (I)*- $287 "n.inc.buylist.line.s" ●324,143
        (:) :NO2.INC.EVENT11
        (R)

(:) :UNHIGH.INC.BUYLIST.LINE12
        (I)*- $287 "n.inc.buylist.line.s" ●340,143
        (:) :NO2.INC.EVENT12
        (R)

(:) :UNHIGH.INC.BUYLIST.LINE13
        (I)*- $287 "n.inc.buylist.line.s" ●356,143
        (:) :NO2.INC.EVENT13
        (R)

(:) :UNHIGH.INC.BUYLIST.LINE14
        (I)*- $287 "n.inc.buylist.line.s" ●372,143
        (:) :NO2.INC.EVENT14
        (R)

;*
(:) :BLANK.CURRENT.INC.BUY.LINE

    ;CHECK WHICH LINE TO BLANK
    stringFormat $290 ":BLANK.INC.BUY.LINE%n", $207
    (J) $290

    (:) :BLANK.INC.BUY.LINE0
    (S)* "n.inc.buylist.line.s" ●148,143
    (R)

    (:) :BLANK.INC.BUY.LINE1
    (S)* "n.inc.buylist.line.s" ●164,143
    (R)

    (:) :BLANK.INC.BUY.LINE2
    (S)* "n.inc.buylist.line.s" ●180,143
    (R)
```

BEST AVAILABLE COPY

```
(:) :BLANK.INC.BUY.LINE3
(S)* "n.inc.buylist.line.s" @196,143
(R)

(:) :BLANK.INC.BUY.LINE4
(S)* "n.inc.buylist.line.s" @212,143
(R)

(:) :BLANK.INC.BUY.LINE5
(S)* "n.inc.buylist.line.s" @228,143
(R)

(:) :BLANK.INC.BUY.LINE6
(S)* "n.inc.buylist.line.s" @244,143
(R)

(:) :BLANK.INC.BUY.LINE7
(S)* "n.inc.buylist.line.s" @260,143
(R)

(:) :BLANK.INC.BUY.LINE8
(S)* "n.inc.buylist.line.s" @276,143
(R)

(:) :BLANK.INC.BUY.LINE9
(S)* "n.inc.buylist.line.s" @292,143
(R)

(:) :BLANK.INC.BUY.LINE10
(S)* "n.inc.buylist.line.s" @308,143
(R)

(:) :BLANK.INC.BUY.LINE11
(S)* "n.inc.buylist.line.s" @324,143
(R)

(:) :BLANK.INC.BUY.LINE12
(S)* "n.inc.buylist.line.s" @340,143
(R)

(:) :BLANK.INC.BUY.LINE13
(S)* "n.inc.buylist.line.s" @356,143
(R)

(:) :BLANK.INC.BUY.LINE14
(S)* "n.inc.buylist.line.s" @372,143
(R)

(:) :BLANK.INC.BUY.LINE15
(S)* "n.inc.buylist.line.s" @388,143
(R)

;*****************************************************************************
;INCOME - DIALOGUE BOXES
;*****************************************************************************
;level 1

;*
(:) :SHOW.INCOME.DIBOX

(T)

;IS THERE A STOCK HERE?
(Q) "$376 = 1" :MAIN.WAIT  ;was removed
```

BEST AVAILABLE COPY

BEST AVAILABLE COPY

```
(Q) "$377 = 0" :MAIN.WAIT ;blank line
(Q) "$377 > 99" :GLOSSARY.DISPATCH ;for pg header & stock type
(Q) "267 = 1" :MAIN.WAIT ;on intermediate page

;SAVE BACKGROUND
(A) $302 "15"                    ; pixel offset for shadow


; If this is a MMF then show the dialog box with only 'See Information'
; in it, since there is nothing else you can do
If $382 = 1
{
        (X)- $302 "n.inc.dibox.mmf.s"                ; JMG

        ;SHOW BOX
        (S) "n.inc.dibox.mmf.s"                           ; JM
        (I)- $302 "n.inc.dibox.mmf.s" ;shadow     ; JMG
}


; otherwise, show the full dialog box
else
{
        (X)- $302 "n.inc.card.dibox.s"               ; JMG

        ;SHOW BOX
        (S) "n.inc.card.dibox.s"                     ; JMG
        (I)- $302 "n.inc.card.dibox.s" ;shadow     ; JMG
}


;SHOW NAME OF STOCK
(H) 6
(V) $375 @197,214

;SET FLAG
(A) $252 "1" ;income dibox

;PUT UP PROMPT
(G) :SAVE.PROMPT
(G) :FILL.PROMPT.4.10
(G) :SHOW.FIRST.PROMPT

(J) :MAIN.WAIT

;------------------------------------------------------------------------
-----------------
;level 2

    ;*
    (:) :SEE.INFORMATION.INCOME

        (G) :CLOSE.INC.DIBOX
        ;(G) :UNHIGH.INC.LINE.CURRENT

        (Q) "$377 < 100" :OPEN.INCOME.HOTSHEET
        (Q) "$377 > 99" :GLOSSARY.DISPATCH

;------------------------------------------------------------------------
-----------------
;level 1


Money Advice Scan File
```

BEST AVAILABLE COPY

```
;*
( ) :REMOVE.FROM.INCOME

        (A) $290 "1"
        (A) $376 "1"  ;set flag

        (J) :INC.COMBINED.REMOVE

;*
( ) :REMOVE.EXCLUDE.FROM.INCOME

        (A) $290 "0"  ;set flag temporary
        (A) $376 "0"  ;set flag

        (J) :INC.COMBINED.REMOVE

;*
( ) :INC.COMBINED.REMOVE

        (A) $380 "0"  ;initialize error flag
        (Y) 55 ;change status

        if $380 = 3 ;error - shares are held
                {
                ;SHOW MESSAGE
                (O) "n.card.dibox.message.s"      ; JMG
                (S) "n.card.dibox.okay.s"                 ; JMG
                (S) "n.card.dibox.cancel.s"               ; JMG

                (H) 1
                (V) "Remove all the issues you are^considering for this selection?" @24

                (T)
                (T) $33 "n.card.dibox.okay.s" :DUMP.INC.SHARES
        ; JMG
                (T) $33 "n.card.dibox.cancel.s" :REQUEST.CANCEL.INC.DIBOX

                (J) :MAIN.WAIT.LOADED
                }
        else
                {
                (G) :CLOSE.INC.DIBOX
                (W) 10
                (G) :BLANK.INC.LINE.RESIDUAL
                (Y)* 59 ;REDISPLAY IMRA
                (G) :BLANK.INC.LINE.CURRENT
                (G) :HIGH.INC.LINE.CURRENT

                (A) $245 "1"      ;set edit was made flag

                (J) :MAIN.WAIT
        }

        ;*
        (:) :REQUEST.CANCEL.INC.DIBOX

                (G) :CLOSE.INC.DIBOX
                (J) :MAIN.WAIT

        ;*
        (:) :CLOSE.INC.DIBOX
```

BEST AVAILABLE COPY

```
;RESTORE BACKGROUND AND PROMPT
(X)
(G) :RESTORE.PROMPT

;SET FLAG
(A) $252 "0"

(R)

;*
(:) :DUMP.INC.SHARES

;ZERO OUT PROPER VARIABLE
if $207 = 0
        (A) $91 "0"
else
        if $207 = 1
        (A) $92 "0"
else
        if $207 = 2
        (A) $93 "0"
else
        if $207 = 3
        (A) $94 "0"
else
        if $207 = 4
        (A) $95 "0"
else
        if $207 = 5
        (A) $96 "0"
else
        if $207 = 6
        (A) $97 "0"
else
        if $207 = 7
        (A) $98 "0"
else
        if $207 = 8
        (A) $99 "0"
else
        if $207 = 9
        (A) $100 "0"
else
        if $207 = 10
        (A) $101 "0"
else
        if $207 = 11
        (A) $102 "0"
else
        if $207 = 12
        (A) $103 "0"
else
        if $207 = 13
        (A) $104 "0"
else
        if $207 = 14
        (A) $108 "0"
else
        if $207 = 15
        (A) $109 "0"

(G) :BLANK.INC.LINE.RESIDUAL
(Y)* 59 ;REDISPLAY IMRA
stringFormat $376 $290
```

```
(Y) 55 ;change status

(G) :CLOSE.INC.DIBOX
(W) 10
(G) :BLANK.INC.LINE.RESIDUAL
(Y)* 59 ;REDISPLAY IMRA
(G) :BLANK.INC.LINE.CURRENT
(G) :HIGH.INC.LINE.CURRENT

(A) $245 "1"        ;set edit was made flag

(J) :MAIN.WAIT
```

BEST AVAILABLE COPY

---

```
.level 1 - buylist

;*
(:) :SHOW.INC.BUYLIST.DIBOX

        (T)

        ;IS THIS A BLANK LINE?
        (Q) "$376 = 2" :MAIN.WAIT  ;removed to income card
        (Q) "$377 = 0" :MAIN.WAIT  ;blank line
        (Q) "$377 > 99"  :GLOSSARY.DISPATCH

        ;SAVE BACKGROUND
        (A) $302 "15"                    ; pixel offset for shadow
        (X)~ $302 "n.inc.buylist.dibox.s"                              ; JM

        ;SHOW BOX
        if $376 = 0 ;excluded
                {
                (S) "n.inc.buylist.dibox.restore.s"                ; JMG
                (I)~ $302 "n.inc.buylist.dibox.restore.s" ;shadow    ; JMG
                }

        if $376 = 1 ;buylist
                {
                ;  use special dialog box if this is a MMF and there's already one on the
                BondCardHasMMF $290
                $290 := $290 + $382
                if $290 = 2
                        (S) "n.inc.buylist.mmf.s"
                else
                        (S) "n.inc.buylist.dibox.s"
        ; JMG

                (I)~ $302 "n.inc.buylist.dibox.s" ;shadow               ; JMG
                }

        ;SHOW NAME OF STOCK
        (H) 6
        (V) $375 @197,214

        ;SET FLAG
        (A) $252 "2" ;income buylist dibox

        ;PUT UP PROMPT
        (G) :SAVE.PROMPT
        (G) :FILL.PROMPT.4.10
        (G) :SHOW.FIRST.PROMPT
```

```
(J) :MAIN.WAIT

;-----------------------------------------------------------------------
----------------
;level 2

    ;*
    (:) :ADD.TO.INCOME.CARD

        (A) $380 "0"  ;initialize error flag
        (A) $376 "2"  ;set status flag
        (Y) 55 ;change status

            If $380 = 1  ;income card is full
                (J) :INC.CARD.IS.FULL

            If $380 = 2  ;category is full
                (J) :INC.CATEG.IS.FULL

            If $382 = 1        ; MMF
            {
                (G) :CLOSE.INC.DIBOX                    ; clo:
box
                (W) 5
    ; wait
                (G) :REDRAW.INCOME.CARD.SIDES.SUB   ; draw new i
                (A) $207 "-1"
click slot flag
                (Y) 56
    ; setup new buylist
                (G) :CLEAR.INCOME.BUYLIST               ; cle
buylist
                (Y)* 57 .
    ; draw new buylist
                (A) $245 "1"
was made flag
                (J) :MAIN.WAIT
            }

        (G) :CLOSE.INC.DIBOX
        (W) 5

        (G) :BLANK.CURRENT.INC.BUY.LINE
        (G) :HIGH.INC.BUYLIST.LINE.CURRENT ;(HIGHLIGHT LINE)

        (A) $245 "1"     ;set edit was made flag

        (J) :REDRAW.INCOME.CARD.SIDES

            ;*
            (:) :REDRAW.INCOME.CARD.SIDES

                (G) :REDRAW.INCOME.CARD.SIDES.SUB
                (J) :MAIN.WAIT

                (:) :REDRAW.INCOME.CARD.SIDES.SUB

                    ;CLEAR INCOME CARD
                    (A) $199 "1" ;speed
                    (D)* 1 "n.inc.card.sides.s"
```

BEST AVAILABLE COPY

```
;SETUP Z3
(Z) 3
(S) "n.inc.card.sides.s"

;SHOW STOCKS ON Z
(Z) 3
(Y) 51

;BLANK CENTER TYPE
(Z) 3
(S) "n.inc.card.sides.blnk.s"

(Z) 2

;SHOW ON SCREEN 2
(A) $199 "1" ;speed
(U) 1 "n.inc.card.sides.s"

(Z) 1

;SHOW ON SCREEN 1
(U) 1 "n.inc.card.sides.s"

(R)

;*
(:) :EXCLUDE.FROM.INCOME.BUYLIST

        (G) :CLOSE.INC.DIBOX
        (W) 5

        (A) $380 "0" ;initialize error flag
        (A) $376 "0" ;SET FLAG
        (Y) 55 ;change status
        (Y)* 57 ;redraw page

        (J) :MAIN.WAIT

;*
(:) :RESTORE.TO.INCOME.BUYLIST

        (G) :CLOSE.INC.DIBOX

        (A) $380 "0" ;initialize error flag
        (A) $376 "1" ;SET FLAG
        (Y) 55 ;change status
        (Y)* 57 ;redraw page
        (J) :MAIN.WAIT

;*
(:) :INC.CARD.IS.FULL

        ;SHOW MESSAGE
        (O) "n.card.dibox.message.s"        ; JMG
        ;;(S) "n.card.dibox.okay.s"                ; JMG
        (S) "n.card.dibox.cancel.s"               ; JMG

        (H) 1
        (V) "The income card is full." @230,250

        (T)
        (T) $33 "n.card.dibox.cancel.s" :CLOSE.INC.ERROR.DIBOX  ; JMG

        If $399 = 1
```

BEST AVAILABLE COPY

```
        (G) :DEBUG

    (J) :MAIN.WAIT.LOADED


;*
(:) :INC.CATEG.IS.FULL

    ;SHOW MESSAGE
    (O) "n.card.dibox.message.s"      ; JMG
    ;(S) "n.card.dibox.okay.s"              ; JMG
    (S) "n.card.dibox.cancel.s"             ; JMG

    (H) 1
    (V) "This category on the Income^ card is full." @230,250

    (T)
    (T) $33 "n.card.dibox.cancel.s" :CLOSE.INC.ERROR.DIBOX  ; JMG

    if $399 = 1
            (G) :DEBUG

    (J) :MAIN.WAIT.LOADED
;------------------------------------------------------------------
------------
;level 3

    ;*
    (:) :CLOSE.INC.ERROR.DIBOX

        (G) :CLOSE.INC.DIBOX
        (J) :MAIN.WAIT


;**************************************************************************
; GET INCOME CARD DATA
;**************************************************************************
    ;level 2

    ;*
    (:) :SHOW.INCOME.INT.DATA

        ;HAVE THE DETAILS BEEN EDITED?
        (Q) "$245 = 1" :DONT.PICK.BONDS.INT

        ;PICK.BONDS
        (A) $200 "hotsheet.text"
        (Y) 50

        (:) :DONT.PICK.BONDS.INT
        (Y)* 52

        (G) :CLEAR.INC.CARD.TOTAL


        ;SHOW TOTAL AT TOP OF CARD
        (H) 22
        stringFormat $290 "%$,n" $23
        display* $290, @111,197

        (R)
```

BEST AVAILABLE COPY

BEST AVAILABLE COPY

```
;*
(:) :SHOW.INCOME.DET.DATA

        ;HAVE THE DETAILS BEEN EDITED?
        (Q) "$245 = 1" :DONT.PICK.BONDS.DET

        ;PICK.STOCKS
        (A) $200 "hotsheet.text"
        (Y) 50

        (:) :DONT.PICK.BONDS.DET
        (Y)* 51

        (G) :CLEAR.INC.CARD.TOTAL

        ;SHOW TOTAL AT TOP OF CARD
        (H) 22
        stringFormat $290 "%$,n" $23
        display* $290, @111,197

        (R)

;*------------------------------------------------
;level 1 - EDIT INCOME RECOMMENDATION

;*
(:) :EDIT.INCOME.REC.LINE0

        ; IF THE NEW LINE IS A HEADER THEN PRETEND WE HIT SOMEWHERE BESIDES
BUTTON
        stringFormat $290 $207              ; save the old stock
        (A) $207 "0"                              ; temporarily set the new stc
        (Y) 53                                              ; find out if it's a he
        stringFormat $207 $290              ; restore the stock number to the old
        if $377 > 99                              ; if the new stock is a header
                (J) :INCOME.CARD.LINE0            ;       pretend we hit some
        if $382 = 1                                         ; if the new stock is a
                (J) :INCOME.CARD.LINE0            ;       pretend we hit some


        (G) :UNHIGH.INC.LINE.CURRENT

        ;ACCEPT LINE NUMBER
        stringFormat $290 $207
        (A) $207 "0"

        (Y) 53 ;select current stock

        if $377 = 0
                {
                (G) :HIGH.INC.LINE.CURRENT
                (J) :MAIN.WAIT
                }

        ;HIGHLIGHT THE SHARES
        (I)* $286 "n.inc.line.shrs.s" @133,231

        ;WAIT FOR INPUT
        (H) 35
        formattedInput * $91 $158 @145,272 5 40 ;number of shares
```

```
;SET FLAG
(A) $245 "1" ;detail edit made

;BLANK THIS LINE
(S)* "n.inc.line.shrs.s" ●133,231 ;current line
(S)* "n.inc.$value.blnk.s" ●133,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
( ) :EDIT.INCOME.REC.LINE1

; IF THE NEW LINE IS A HEADER THEN PRETEND WE HIT SOMEWHERE BESIDES
BUTTON
stringFormat $290 $207          ; save the old stock
(A) $207 "1"                        ; temporarily set the new stc
(Y) 53                                      ; find out if it's a he
stringFormat $207 $290          ; restore the stock number to the old
if $377 > 99                        ; if the new stock is a header
        (J) :INCOME.CARD.LINE1      ;         pretend we hit some
if $382 = 1                                 ; if the new stock is a
        (J) :INCOME.CARD.LINE1      ;         pretend we hit some


(G) :UNHIGH.INC.LINE.CURRENT

;ACCEPT LINE NUMBER
(A) $207 "1"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" ●149,231 ;current line

;WAIT FOR INPUT
(H) 35
formattedInput * $92 $158 ●161,272 5 40  ;number of shares

;SET FLAG
(A) $245 "1" ;detail edit made

;BLANK THIS LINE
(S)* "n.inc.line.shrs.s" ●149,231 ;current line
(S)* "n.inc.$value.blnk.s" ●149,278 ;current line
```

BEST AVAILABLE COPY

```
(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
( ) :EDIT.INCOME.REC.LINE2

; IF THE NEW LINE IS A HEADER THEN PRETEND WE HIT SOMEWHERE BESIDES T
BUTTON
stringFormat $290 $207              ; save the old stock
(A) $207 "2"                        ; temporarily set the new stoc
(Y) 53                              ; find out if it's a hea
stringFormat $207 $290              ; restore the stock number to the old (
if $377 > 99                        ; if the new stock is a header t
        (J) :INCOME.CARD.LINE2      ;         pretend we hit some\
if $382 = 1                         ; if the new stock is a
        (J) :INCOME.CARD.LINE2      ;         pretend we hit some\

(G) :UNHIGH.INC.LINE.CURRENT

;ACCEPT LINE NUMBER
(A) $207 "2"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" @165,231 ;hi current line

;WAIT FOR INPUT
(H) 35
formattedInput * $93 $158 @177,272 5 40   ;number of shares

;SET FLAG
(A) $245 "1" ;detail edit made

;BLANK THIS LINE
(S)* "n.inc.line.shrs.s" @165,231 ;current line
(S)* "n.inc.$value.blnk.s" @165,278 ;current line

(G) :BLANK.INC.LINE.RESIDUAL
(G) :HIGH.INC.LINE.CURRENT

;REDISPLAY THIS LINE & IMRA
(Y)* 54
```

BEST AVAILABLE COPY

```
(J) :MAIN.WAIT
```

BEST AVAILABLE COPY

```
•
( ) :EDIT.INCOME.REC.LINE3

        ; IF THE NEW LINE IS A HEADER THEN PRETEND WE HIT SOMEWHERE BESIDES
BUTTON
        stringFormat $290 $207                  ; save the old stock
        (A) $207 "3"                                    ; temporarily set the new stc
        (Y) 53                                                  ; find out if it's a hea
        stringFormat $207 $290                  ; restore the stock number to the old
        if $377 > 99                                    ; if the new stock is a header
                (J) :INCOME.CARD.LINE3          ;           pretend we hit some
        if $382 = 1                                             ; if the new stock is a
                (J) :INCOME.CARD.LINE3          ;           pretend we hit some


        (G) :UNHIGH.INC.LINE.CURRENT

        ;ACCEPT LINE NUMBER
        (A) $207 "3"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }

        ;HIGHLIGHT THE SHARES
        (I)* $286 "n.inc.line.shrs.s" @181,231 ;hi current line

        ;WAIT FOR INPUT
        (H) 35
        formattedInput * $94 $158 @193,272 5 40  ;number of shares

        ;SET FLAG
        (A) $245 "1" ;detail edit made

        ;BLANK THIS LINE
        (S)* "n.inc.line.shrs.s" @181,231 ;current line
        (S)* "n.inc.$value.blnk.s" @181,278 ;current line

        (G) :BLANK.INC.LINE.RESIDUAL
        (G) :HIGH.INC.LINE.CURRENT

        ;REDISPLAY THIS LINE & IMRA
        (Y)* 54

        (J) :MAIN.WAIT

•
(:) :EDIT.INCOME.REC.LINE4
```

BEST AVAILABLE COPY

```
        ; IF THE NEW LINE IS A HEADER THEN PRETEND WE HIT SOMEWHERE BESIDES
BUTTON
        stringFormat $290 $207                  ; save the old stock
        (A) $207 "4"                                    ; temporarily set the new stc
        (Y) 53                                                  ; find out if it's a hea
        stringFormat $207 $290                  ; restore the stock number to the old
        if $377 > 99                                    ; if the new stock is a header
                (J) :INCOME.CARD.LINE4                  ;       pretend we hit some
        if $382 = 1                                             ; if the new stock is
                (J) :INCOME.CARD.LINE4                  ;       pretend we hit some


        (G) :UNHIGH.INC.LINE.CURRENT

        ;ACCEPT LINE NUMBER
        (A) $207 "4"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }


        ;HIGHLIGHT THE SHARES
        (I)* $286 "n.inc.line.shrs.s" @197,231 ;hi current line

        ;WAIT FOR INPUT
        (H) 35
        formattedInput * $95 $158 @209,272 5 40  ;number of shares

        ;SET FLAG
        (A) $245 "1" ;detail edit made

        ;BLANK THIS LINE
        (S)* "n.inc.line.shrs.s" @197,231 ;current line
        (S)* "n.inc.$value.blnk.s" @197,278 ;current line

        (G) :BLANK.INC.LINE.RESIDUAL
        (G) :HIGH.INC.LINE.CURRENT

        ;REDISPLAY THIS LINE & IMRA
        (Y)* 54

        (J) :MAIN.WAIT

;*
(.) :EDIT.INCOME.REC.LINES

        ; IF THE NEW LINE IS A HEADER THEN PRETEND WE HIT SOMEWHERE BESIDES TI
BUTTON
        stringFormat $290 $207                  ; save the old stock
        (A) $207 "5"                                    ; temporarily set the new stocl
        (Y) 53                                                  ; find out if it's a heac
        stringFormat $207 $290                  ; restore the stock number to the old c
```

BEST AVAILABLE COPY

```
if $377 > 99                              ; if the new stock is a heade
        (J) :INCOME.CARD.LINE5                    pretend we hit som
if $382 = 1                                       ; if the new stock is
        (J) :INCOME.CARD.LINE5            ;       pretend we hit som


(G) :UNHIGH.INC.LINE.CURRENT

;ACCEPT LINE NUMBER
(A) $207 "5"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }


;HIGHLIGHT THE SHARES
(I)* $286 "n.inc.line.shrs.s" @213,231 ;hi current line

;WAIT FOR INPUT
(H) 35
formattedInput * $96 $158 @225,272 5 40  ;number of shares

;SET FLAG
(A) $245 "1" ;detail edit made

;BLANK THIS LINE
(S)* "n.inc.line.shrs.s" @213,231 ;current line
(S)* "n.inc.$value.blnk.s" @213,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
(.) :EDIT.INCOME.REC.LINE6

        ; IF THE NEW LINE IS A HEADER THEN PRETEND WE HIT SOMEWHERE BESIDES T
BUTTON
        stringFormat $290 $207          ; save the old stock
        (A) $207 "6"                            ; temporarily set the new stoc
        (Y) 53                                          ; find out if it's a hea
        stringFormat $207 $290          ; restore the stock number to the old c
        if $377 > 99                            ; if the new stock is a header t
                (J) :INCOME.CARD.LINE6          ;       pretend we hit some
        if $382 = 1                                     ; if the new stock is a
                (J) :INCOME.CARD.LINE6          ;       pretend we hit somev
```

BEST AVAILABLE COPY

```
(G) :UNHIGH.INC.LINE.CURRENT

;ACCEPT LINE NUMBER
(A) $207 "6"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" @229,231 ;hi current line

;WAIT FOR INPUT
(H) 35
formattedInput * $97 $158 @241,272 5 40  ;number of shares

;SET FLAG
(A) $245 "1" ;detail edit made

;BLANK THIS LINE
(S)* "n.inc.line.shrs.s" @229,231 ;current line
(S)* "n.inc.$value.blnk.s" @229,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
( ) :EDIT.INCOME.REC.LINE7

        ; IF THE NEW LINE IS A HEADER THEN PRETEND WE HIT SOMEWHERE BESIDES TH
BUTTON
        stringFormat $290 $207              ; save the old stock
        (A) $207 "7"                              ; temporarily set the new stock
        (Y) 53                                          ; find out if it's a head
        stringFormat $207 $290              ; restore the stock number to the old or
        if $377 > 99                              ; if the new stock is a header th
                (J) :INCOME.CARD.LINE7        ;       pretend we hit somewh
        if $382 = 1                                     ; if the new stock is a M
                (J) :INCOME.CARD.LINE7        ;       pretend we hit somewh


        (G) :UNHIGH.INC.LINE.CURRENT

        ;ACCEPT LINE NUMBER
        (A) $207 "7"
```

BEST AVAILABLE COPY

```
(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" @245,231 ;hi current line

;WAIT FOR INPUT
(H) 35
formattedInput * $98 $158 @257,272 5 40  ;number of shares

;SET FLAG
(A) $245 "1" ;detail edit made

;BLANK THIS LINE
(S)* "n.inc.line.shrs.s" @245,231 ;current line
(S)* "n.inc.$value.blnk.s" @245,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
(:) :EDIT.INCOME.REC.LINE8

        ; IF THE NEW LINE IS A HEADER THEN PRETEND WE HIT SOMEWHERE BESIDES
BUTTON
        stringFormat $290 $207              ; save the old stock
        (A) $207 "8"                                ; temporarily set the new sto
        (Y) 53                                              ; find out if it's a hea
        stringFormat $207 $290              ; restore the stock number to the old
        if $377 > 99                                ; if the new stock is a header
                (J) :INCOME.CARD.LINE8      ;           pretend we hit some
        if $382 = 1                                         ; if the new stock is a
                (J) :INCOME.CARD.LINE8      ;           pretend we hit some


        (G) :UNHIGH.INC.LINE.CURRENT

        ;ACCEPT LINE NUMBER
        (A) $207 "8"

        (Y) 53 ;select current stock

        if $377 = 0
                {
                (G) :HIGH.INC.LINE.CURRENT
                (J) :MAIN.WAIT
                }
```

BEST AVAILABLE COPY

```
if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" @261,231 ;hi current line

;WAIT FOR INPUT
(H) 35
formattedInput * $99 $158 @273,272 5 40  ;number of shares

;SET FLAG
(A) $245 "1" ;detail edit made

;BLANK THIS LINE
(S)* "n.inc.line.shrs.s" @261,231 ;current line
(S)* "n.inc.$value.blnk.s" @261,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;*
( ) :EDIT.INCOME.REC.LINE9

        ; IF THE NEW LINE IS A HEADER THEN PRETEND WE HIT SOMEWHERE BESIDES T
BUTTON
        stringFormat $290 $207              ; save the old stock
        (A) $207 "9"                            ; temporarily set the new stoc
        (Y) 53                                          ; find out if it's a heac
        stringFormat $207 $290              ; restore the stock number to the old o
        if $377 > 99                            ; if the new stock is a header th
                (J) :INCOME.CARD.LINE9          ;       pretend we hit somew
        if $382 = 1                                     ; if the new stock is a h
                (J) :INCOME.CARD.LINE9          ;       pretend we hit somew


        (G) :UNHIGH.INC.LINE.CURRENT

        ;ACCEPT LINE NUMBER
        (A) $207 "9"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }
```

```
;HIGHLIGHT THE SHARES
(I)* $286 "n.Inc.line.shrs.s" @277,231 ;hi current line

;WAIT FOR INPUT
(H) 35
formattedInput * $100 $158 @289,272 5 40  ;number of shares

;SET FLAG
(A) $245 "1" ;detail edit made

;BLANK THIS LINE
(S)* "n.Inc.line.shrs.s" @277,231 ;current line
(S)* "n.inc.$value.blnk.s" @277,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

*
( ) :EDIT.INCOME.REC.LINE10

; IF THE NEW LINE IS A HEADER THEN PRETEND WE HIT SOMEWHERE BESIDES
BUTTON
stringFormat $290 $207                ; save the old stock
(A) $207 "10"                         ; temporarily set the new st
(Y) 53                                ; find out if it's a he
stringFormat $207 $290                ; restore the stock number to the olc
if $377 > 99                          ; if the new stock is a header
        (J) :INCOME.CARD.LINE10       ;      pretend we hit som
if $382 = 1                           ; if the new stock is
        (J) :INCOME.CARD.LINE10       ;      pretend we hit som


(G) :UNHIGH.INC.LINE.CURRENT

;ACCEPT LINE NUMBER
(A) $207 "10"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }

;HIGHLIGHT THE SHARES
(I)* $286 "n.inc.line.shrs.s" @293,231 ;hi current line

;WAIT FOR INPUT
```

BEST AVAILABLE COPY

```
(H) 35
formattedInput * $101 $158 @305,272 5 40  ;number of shares

;SET FLAG
(A) $245 "1" ;detail edit made

;BLANK THIS LINE
(S)* "n.inc.line.shrs.s" @293,231 ;current line
(S)* "n.inc.$value.blnk.s" @293,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

;
( ) :EDIT.INCOME.REC.LINE11

        ; IF THE NEW LINE IS A HEADER THEN PRETEND WE HIT SOMEWHERE BESIDES T
BUTTON
        stringFormat $290 $207              ; save the old stock
        (A) $207 "11"                             ; temporarily set the new stoc
        (Y) 53                                            ; find out if it's a hea
        stringFormat $207 $290              ; restore the stock number to the old (
        if $377 > 99                                ; if the new stock is a header t
                (J) :INCOME.CARD.LINE11         ;       pretend we hit somev
        if $382 = 1                                       ; if the new stock is a
                (J) :INCOME.CARD.LINE11         ;       pretend we hit somev


        (G) :UNHIGH.INC.LINE.CURRENT

        ;ACCEPT LINE NUMBER
        (A) $207 "11"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }


        ;HIGHLIGHT THE SHARES
        (I)* $286 "n.inc.line.shrs.s" @309,231 ;hi current line

        ;WAIT FOR INPUT
        (H) 35
        formattedInput * $102 $158 @321,272 5 40  ;number of shares

        ;SET FLAG
        (A) $245 "1" ;detail edit made
```

BEST AVAILABLE COPY

```
        ;BLANK THIS LINE
        (S)* "n.inc.line.shrs.s" @309,231 ;current line
        (S)* "n.inc.$value.blnk.s" @309,278 ;current line

        (G) :BLANK.INC.LINE.RESIDUAL
        (G) :HIGH.INC.LINE.CURRENT

        ;REDISPLAY THIS LINE & IMRA
        (Y)* 54

        (J) :MAIN.WAIT

;*
(:) :EDIT.INCOME.REC.LINE12

        ; IF THE NEW LINE IS A HEADER THEN PRETEND WE HIT SOMEWHERE BESIDES
BUTTON
        stringFormat $290 $207              ; save the old stock
        (A) $207 "12"                       ; temporarily set the new st
        (Y) 53                              ; find out if it's a he
        stringFormat $207 $290              ; restore the stock number to the ol
        if $377 > 99                        ; if the new stock is a heade
                (J) :INCOME.CARD.LINE12     ;       pretend we hit som
        if $382 = 1                         ; if the new stock is
                (J) :INCOME.CARD.LINE12     ;       pretend we hit som


        (G) :UNHIGH.INC.LINE.CURRENT

        ;ACCEPT LINE NUMBER
        (A) $207 "12"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }

        ;HIGHLIGHT THE SHARES
        (I)* $286 "n.inc.line.shrs.s" @325,231 ;hi current line

        ;WAIT FOR INPUT
        (H) 35
        formattedInput * $103 $158 @337,272 5 40  ;number of shares

        ;SET FLAG
        (A) $245 "1" ;detail edit made

        ;BLANK THIS LINE
        (S)* "n.inc.line.shrs.s" @325,231 ;current line
        (S)* "n.inc.$value.blnk.s" @325,278 ;current line

        (G) :BLANK.INC.LINE.RESIDUAL
        (G) :HIGH.INC.LINE.CURRENT
```

BEST AVAILABLE COPY

```
;REDISPLAY THIS LINE & IMRA
(Y)* 54

(J) :MAIN.WAIT

;
( ) :EDIT.INCOME.REC.LINE13

; IF THE NEW LINE IS A HEADER THEN PRETEND WE HIT SOMEWHERE BESIDES
BUTTON
stringFormat $290 $207               ; save the old stock
(A) $207 "13"                        ; temporarily set the new sto
(Y) 53                               ; find out if it's a hea
stringFormat $207 $290               ; restore the stock number to the old
if $377 > 99                         ; if the new stock is a header
        (J) :INCOME.CARD.LINE13      ;     pretend we hit some
if $382 = 1                          ; if the new stock is a
        (J) :INCOME.CARD.LINE13      ;     pretend we hit some


(G) :UNHIGH.INC.LINE.CURRENT

;ACCEPT LINE NUMBER
(A) $207 "13"

(Y) 53 ;select current stock

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }


;HIGHLIGHT THE SHARES
(I)* $286 "n.inc.line.shrs.s" @341,231 ;hi current line

;WAIT FOR INPUT
(H) 35
formattedInput * $104 $158 @352,272 5 40  ;number of shares

;SET FLAG
(A) $245 "1" ;detail edit made

;BLANK THIS LINE
(S)* "n.inc.line.shrs.s" @341,231 ;current line
(S)* "n.inc.$value.blnk.s" @341,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT
```

BEST AVAILABLE COPY

```
(:) :EDIT.INCOME.REC.LINE14

        ; IF THE NEW LINE IS A HEADER THEN PRETEND WE HIT SOMEWHERE BESIDE
BUTTON
        stringFormat $290 $207              ; save the old stock
        (A) $207 "14"                       ; temporarily set the new s
        (Y) 53                              ; find out if it's a h
        stringFormat $207 $290              ; restore the stock number to the ol
        if $377 > 99                        ; if the new stock is a heade
                (J) :INCOME.CARD.LINE14     ;       pretend we hit son
        if $382 = 1                         ; if the new stock is
                (J) :INCOME.CARD.LINE14     ;       pretend we hit son


        (G) :UNHIGH.INC.LINE.CURRENT

        ;ACCEPT LINE NUMBER
        (A) $207 "14"

        (Y) 53 ;select current stock

        if $377 = 0
                {
                (G) :HIGH.INC.LINE.CURRENT
                (J) :MAIN.WAIT
                }

        if $377 > 99
                {
                (G) :HIGH.INC.LINE.CURRENT
                (J) :MAIN.WAIT
                }

        ;HIGHLIGHT THE SHARES
        (I)* $286 "n.inc.line.shrs.s" @357,231 ;hi current line

        ;WAIT FOR INPUT
        (H) 35
        formattedInput * $108 $158 @368,272 5 40  ;number of shares

        ;SET FLAG
        (A) $245 "1" ;detail edit made

        ;BLANK THIS LINE
        (S)* "n.inc.line.shrs.s" @357,231 ;current line
        (S)* "n.inc.$value.blnk.s" @357,278 ;current line

        (G) :BLANK.INC.LINE.RESIDUAL
        (G) :HIGH.INC.LINE.CURRENT

        ;REDISPLAY THIS LINE & IMRA
        (Y)* 54

        (J) :MAIN.WAIT

;*
(:) :EDIT.INCOME.REC.LINE15 ;16th & last slot on card

        ; IF THE NEW LINE IS A HEADER THEN PRETEND WE HIT SOMEWHERE BESIDES TH
BUTTON
        stringFormat $290 $207              ; save the old stock
```

BEST AVAILABLE COPY

```
(A) $207 "15"                    ; temporarily set the new st
(Y) 53                                  ; find out if it's a he
stringFormat $207 $290           ; restore the stock number to the ol
if $377 > 99                     ; if the new stock is a heade
        (J) :INCOME.CARD.LINE15  ;          pretend we hit som
if $382 = 1                             ; if the new stock is
        (J) :INCOME.CARD.LINE15  ;          pretend we hit som


(G) :UNHIGH.INC.LINE.CURRENT

;ACCEPT LINE NUMBER
(A) $207 "15"

(Y) 53   ;SELECT CURRENT STOCK

if $377 = 0
        {
        (G) :HIGH.INC.LINE.CURRENT
        (J) :MAIN.WAIT
        }

if $377 > 99
        {
        (G) :HIGH.INC.LINE.CURRENT
        (J) :MAIN.WAIT
        }


;HIGHLIGHT THE SHARES
(I)* $286 "n.inc.line.shrs.s" @373,231 ;hi current line

;WAIT FOR INPUT
(H) 35
formattedInput * $109 $158 @385,272 5 40 ;number of shares

;SET FLAG
(A) $245 "1" ;detail edit made

;BLANK THIS LINE
(S)* "n.inc.line.shrs.s" @373,231 ;current line
(S)* "n.inc.$value.blnk.s" @373,278 ;current line

(G) :BLANK.INC.LINE.RESIDUAL
(G) :HIGH.INC.LINE.CURRENT

;REDISPLAY THIS LINE & IMRA
(Y)* 54

(J) :MAIN.WAIT

. JMG


;****************************************************************************
;GROWTH CARD - REQUESTS
;****************************************************************************
;level 1

;*
(:) :REQUEST.GROWTH.REC.INT

        ;WHAT'S ON THE SCREEN...
```

BEST AVAILABLE COPY

```
If $264 <> 0 ;If ask card is open
        (G) :REMOVE.ASK.CARD

If $251 = 0 ;If cards are closed
        {
        (G) :OPEN.GROWTH.CARD
        (G) :SHOW.GROWTH.REC.INT
        (J) :MAIN.WAIT
        }
If $251 = 5 ;If bank card is open
        {
        (G) :CLOSE.CARD
        (G) :OPEN.GROWTH.CARD
        (G) :SHOW.GROWTH.REC.INT
        (J) :MAIN.WAIT
        }
If $251 = 6 ;If income card is open
        {
        (G) :CLOSE.CARD
        (G) :OPEN.GROWTH.CARD
        (G) :SHOW.GROWTH.REC.INT
        (J) :MAIN.WAIT
        }
;If $264 <> 0 ;If ask card is open
        ;(G) :REMOVE.ASK.CARD

If $265 <> 0 ;If hotsheet is open
        (G) :REMOVE.HOTSHEET

If $266 <> 0 ;If buylist is open
        (G) :REMOVE.BUYLIST

If $267 = 1  ;growth int is showing
        (J) :MAIN.WAIT

If $267 = 2  ;growth detail is showing
        {
        (G) :HIGHLIGHT.GROWTH.TABSWITCH
        (G) :CLEAR.GROWTH.CARD.INT
        (G) :SHOW.GROWTH.REC.INT
        (J) :MAIN.WAIT
        }

(H) 1
(V) "Problem with REQUEST GROWTH.REC.INT." @100,200

;•
(:) :REQUEST.GROWTH.REC.DET

        ;WHAT'S ON THE SCREEN...
        ;(can't request detail unless this card is open)

        If $264 <> 0 ;if yours card is open
                (G) :REMOVE.ASK.CARD

        If $265 <> 0 ;If hotsheet is open
                (G) :REMOVE.HOTSHEET

        If $266 <> 0 ;If buylist is open
                (G) :REMOVE.BUYLIST

        If $267 = 1 ;intermediate level is showing (must be)
                {
```

BEST AVAILABLE COPY

```
        (G) :HIGHLIGHT.GROWTH.TABSWITCH
        (G) :CLEAR.GROWTH.CARD.INT
        (G) :SHOW.GROWTH.REC.DET
        (J) :MAIN.WAIT
        }

(H) 1
(V) "Problem with REQUEST GROWTH.REC.DET." @100,200

;------------------------------------------------------------
;level 2

;*
(:) :SHOW.GROWTH.REC.INT

        (G) :SHOW.GROWTH.INT.DATA

        (G) :FILL.PROMPT.4.6
        (G) :SHOW.FIRST.PROMPT

        ;SET FLAG
        (A) $207 "-1" ;current line to -1 (no current line)
        (A) $267 "1" ;intermediate card

        ;SET NEXT/BACK
        (A) $298 "99"
        (A) $299 "99"

        (G) :SHOW.NEXTBACK

        (R)

;*
(:) :SHOW.GROWTH.REC.DET

        (G) :SHOW.GROWTH.DET.DATA

        (G) :WIPE.UP.GRO.BUYLIST.TAB

        (G) :FILL.PROMPT.4.7
        (G) :SHOW.FIRST.PROMPT

        ;SET FLAG
        (A) $207 "-1" ;current line to -1 (no current line)
        (A) $267 "2" ;detail card

        ;SET NEXT/BACK
        (A) $298 "99"
        (A) $299 "99"
        (G) :SHOW.NEXTBACK
        (R)

;------------------------------------------------------------
;level 1

;*
(:) :REQUEST.GROWTH.BUYLIST

        (G) :HIGHLIGHT.BUYLIST.TABOPEN
        (Y) 46 ;SETUP BUYLIST PICKS
        (A) $379 "1" ;buylist pg 1
        (G) :UNHIGH.GRO.LINE.CURRENT
        (G) :WIPE.UP.GROWTH.BUYLIST
```

BEST AVAILABLE COPY

```
        (G) :SHOW.GRO.BUYLIST.PAGE.NUMBERS
        (Y)* 47 ;SHOW CURRENT PAGE DATA

        (G) :FILL.PROMPT.4.9
        (G) :SHOW.FIRST.PROMPT

        (A) $207 "-1" ;reset click slot flag
        (J) :MAIN.WAIT

;*
( ) :REQUEST.GRO.BUYLIST.PAGE1

        ;SET CURRENT PAGE
        (A) $379 "1" ;buylist pg 1
        (A) $207 "-1" ;reset click slot flag

        (G) :SHOW.GRO.BUYLIST.PAGE.NUMBERS
        (G) :CLEAR.GROWTH.BUYLIST
        (Y)* 47 ;SHOW CURRENT PAGE

        (J) :MAIN.WAIT

;*
(:) :REQUEST.GRO.BUYLIST.PAGE2

        ;SET CURRENT PAGE
        (A) $379 "2" ;buylist pg 2
        (A) $207 "-1" ;reset click slot flag

        (G) :SHOW.GRO.BUYLIST.PAGE.NUMBERS
        (G) :CLEAR.GROWTH.BUYLIST
        (Y)* 47 ;SHOW CURRENT PAGE

        (J) :MAIN.WAIT

;*
(:) :REQUEST.GRO.BUYLIST.PAGE3

        ;SET CURRENT PAGE
        (A) $379 "3" ;buylist pg 3
        (A) $207 "-1" ;reset click slot flag

        (G) :SHOW.GRO.BUYLIST.PAGE.NUMBERS
        (G) :CLEAR.GROWTH.BUYLIST
        (Y)* 47 ;SHOW CURRENT PAGE

        (J) :MAIN.WAIT

;*
(:) :REQUEST.CLOSE.GROWTH.BUYLIST

        (A) $207 "-1" ;reset click slot flag
        (G) :HIGHLIGHT.BUYLIST.TABCLOSE
        (G) :WIPE.DOWN.GROWTH.BUYLIST

        ;note: don't reset page # variable here, only
        ;when closing whole card. (so can return
        ;to current page)

        (J) :MAIN.WAIT

        ;------------------------------------------------
```

BEST AVAILABLE COPY

```
;level 2
;*
(:) :SHOW.GRO.BUYLIST.PAGE.NUMBERS

        ;SHOW PAGE NUMBERS
        (Q) "$378 = 1" :SHOW.GRO.ONE.PAGE
        (Q) "$378 = 2" :SHOW.GRO.TWO.PAGE
        (Q) "$378 = 3" :SHOW.GRO.THREE.PAGE

        ;-----------------
        ;level 3

        (:) :SHOW.GRO.ONE.PAGE
                (S)* "n.buylist.pg1.s"
                (R)

        (:) :SHOW.GRO.TWO.PAGE

                ;SHOW PAGE NO'S
                (S)* "n.buylist.pg12.s"

                ;HIGHLIGHT CURRENT PAGE
                if $379 = 1
                        (S)* "n.buylist.pg12.1!.s"
                if $379 = 2
                        (S)* "n.buylist.pg12.2!.s"
                (R)

        (:) :SHOW.GRO.THREE.PAGE

                ;SHOW PAGE NO'S
                (S)* "n.buylist.pg123.s"

                ;HIGHLIGHT CURRENT PAGE
                if $379 = 1
                        (S)* "n.buylist.pg123.1!.s"
                if $379 = 2
                        (S)* "n.buylist.pg123.2!.s"
                if $379 = 3
                        (S)* "n.buylist.pg123.3!.s"
                (R)

;--------------------------------------------------
;level 1

;*
(:) :REQUEST.GROWTH.REFRESH
        ; recalc with card open.

        ;WHAT'S ON THE SCREEN...
        if $264 <> 0 ;if yours card is open
                (G) :REMOVE.ASK.CARD

        if $265 <> 0 ;if hotsheet is open
                (G) :REMOVE.HOTSHEET

        if $266 <> 0 ;if buylist is open
                (G) :REMOVE.BUYLIST

        if $267 = 1  ;if on growth int
                {
                (G) :CLEAR.GROWTH.CARD.INT
                (G) :SHOW.GROWTH.REC.INT
                }
```

```
if $267 = 2 ;if on growth det
        {
        (G) :CLEAR.GROWTH.CARD.DET
        (G) :SHOW.GROWTH.REC.DET
        }

(J) :MAIN.WAIT
```

BEST AVAILABLE COPY

```
;-------------------------------------------------------------
;level 1

;*
( ) :REQUEST.GROWTH.CARD.CLOSE

        (G) :CLOSE.GROWTH.CARD

        (G) :FILL.PROMPT.NONE
        (G) :SHOW.FIRST.PROMPT

        ;SET NEXT/BACK
        (A) $298 "99"
        (A) $299 "99"

        (J) :MAIN.WAIT


;*****************************************************************
; GROWTH CARD GRAPHIC TRANSITIONS
;*****************************************************************
        ;level 2 - card

        ;*
        (:) :OPEN.GROWTH.CARD

                ;PRE-HIGHLIGHT TAB
                (S)* "n.tab.gro!.s"

                ;check for conditions that require a cleared screen
                if $220 <> 4      ;if proposed pie is not up
                        if $220 <> 12     ;and if compare pies is not up
                                (G) :CLEAR.CENTER.SCREEN.FROM.BUTTON

                (G) :HIGHLIGHT.GRO.TAB ;and save background

                ;SHOW CARD
                (A) $199 "30"
                if $268 = 0 ;stocks are recommended
                        (D)* 2 "n.gro.card.s"
                else            ;funds are recommended
                        (D)* 2 "n.gro.fund.card.s"

                ;SET FLAG
                (A) $251 "7" ;growth card
                (A) $379 "1" ;set buylist pg
                (A) $207 "0" ;reset click slot flag

                (R)

        ;*
        (:) :CLOSE.GROWTH.CARD

                (G) :HIGHLIGHT.GRO.TABUP
```

```
        (W) 2
        (G) :CLOSE.CARD

        ;SET FLAG
        (A) $251 "0" ;card
        (A) $207 "0" ;reset click slot flag

        (R)

;-----------------------------------------------------------------------
;level 2 - buylist

;*
(:) :WIPE.UP.GROWTH.BUYLIST

        ;DON'T SAVE BACKGROUND - REBUILD LATER
        ;(X)* "n.gro.buylist.s"

        ;SHOW CARD
        (A) $199 "100"
        if $268 = 0  ;stocks are recommended
                (D)* 2 "n.gro.buylist.s"
        else            ;funds are recommended
                (D)* 2 "n.gro.fund.buylist.s"

        ;SET FLAG
        (A) $207 "0" ;reset click slot flag
        (A) $266 "1" ;buylist
        (R)


;*
(:) :WIPE.DOWN.GROWTH.BUYLIST

        ;REDRAW.GROWTH.DETAIL...

        ;SHOW CARD ON Z
        (Z) 3
        if $268 = 0  ;stocks are recommended
                (S) "n.gro.card.s"
        else            ;funds are recommended
                (S) "n.gro.fund.card.s"

        (O) "n.buylist.tabopen.s"

        ;REFRESH DATA ON Z
        (Z) 3
        (Y) 41

        ;SHOW TOTAL AT TOP OF CARD
        (H) 22
        stringFormat $290  "%$,n" $24
        display* $290, @111,197

        ;DRAW ON MAIN SCREEN
        (Z) 1
        (U) 1 "n.gro.card.s"

        ;DRAW ON CUST SCREEN
        (Z) 2
        (U) 1 "n.gro.card.s"
        (Z) 1
```

BEST AVAILABLE COPY

```
;SET FLAG
(A) $207 "0" ;current line to 0
(A) $266 "0" ;buylist gone

(R)

;_____________________
;level 3
;*
(:) :WIPE.UP.GRO.BUYLIST.TAB
        (A) $199 "2000"
        (D)* 2 "n.buylist.tabopen.s"
        (R)

;*
(:) :CLEAR.GROWTH.CARD.INT
        (S)* "n.gro.card.int.clear.s"
        (R)

;*
(:) :CLEAR.GROWTH.CARD.DET
        (S)* "n.gro.card.det.clear.s"
        (R)

;*
(:) :CLEAR.GROWTH.BUYLIST
        (S)* "n.gro.buylist.clear.s"
        (R)

;*
(:) :CLEAR.GRO.CARD.TOTAL
        (S)* "n.gro.card.total$.clear.s"
        (R)

;*****************************************************************************
;GROWTH CARD -  LINE GRAPHICS
;*****************************************************************************
;level 1

    ;*
    (:) :GROWTH.CARD.LINE0

        ;IF THIS LINE IS HIGHLIT
        if $207 = 0
            {

            ; SHOW THE GLOSSARY IF WE'RE ON THE INTERMEDIATE PAG
            if $267 = 1
                {
                if $268 = 0  ;if stocks
                    (A) $375 "Stock Categories/beta"
                else            ;if funds
                    (A) $375 "Conservative Fund"

                (J) :GLOSSARY.DISPATCH
                }


            ; SHOW THE DIALOG BOX IF WE'RE ON THE DETAIL PAGE
            else
                (J) :SHOW.GROWTH.DIBOX
            }
```

BEST AVAILABLE COPY

BEST AVAILABLE COPY
BEST AVAILABLE COPY

```
; IF THIS LINE IS NOT HIGHLIT, THEN HIGHLIGHT IT AND JUMP TO M
else
        {
        (G) :UNHIGH.GRO.LINE.CURRENT

        ;ACCEPT LINE NUMBER
        (A) $207 "0"

        ;SELECT CURRENT STOCK
        (Y) 43

        (G) :HIGH.GRO.LINE.CURRENT

        (J) :MAIN.WAIT
        }

;*
(:) :GROWTH.CARD.LINE1

        ;IF THIS LINE IS HIGHLIT
        (Q) "$207 = 1" :SHOW.GROWTH.DIBOX

        (G) :UNHIGH.GRO.LINE.CURRENT

        ;ACCEPT LINE NUMBER
        (A) $207 "1"

        ;SELECT CURRENT STOCK
        (Y) 43

        (G) :HIGH.GRO.LINE.CURRENT

        (J) :MAIN.WAIT

;*
(:) :GROWTH.CARD.LINE2

        ;IF THIS LINE IS HIGHLIT
        (Q) "$207 = 2" :SHOW.GROWTH.DIBOX

        (G) :UNHIGH.GRO.LINE.CURRENT

        ;ACCEPT LINE NUMBER
        (A) $207 "2"

        ;SELECT CURRENT STOCK
        (Y) 43

        (G) :HIGH.GRO.LINE.CURRENT

        (J) :MAIN.WAIT

;*
(:) :GROWTH.CARD.LINE3

        ;IF THIS LINE IS HIGHLIT
        if $207 = 3
                {

                ; SHOW THE GLOSSARY IF WE'RE ON THE INTERMEDIATE PAGE
                if $267 = 1
                        {
                        if $268 = 0  ;if stocks
                                (A) $375 "Stock Categories/beta"
```

```
        else              ;if funds
                  (A) $375 "Market-Like Fund"

        (J) :GLOSSARY.DISPATCH
        }

    ; SHOW THE DIALOG BOX IF WE'RE ON THE DETAIL PAGE
    else
        (J) :SHOW.GROWTH.DIBOX
    }

; IF THIS LINE IS NOT HIGHLIT, THEN HIGHLIGHT IT AND JUMP TO M
else
    {
    (G) :UNHIGH.GRO.LINE.CURRENT

    ;ACCEPT LINE NUMBER
    (A) $207 "3"

    ;SELECT CURRENT STOCK
    (Y) 43

    (G) :HIGH.GRO.LINE.CURRENT

    (J) :MAIN.WAIT
    }

;*
(:) :GROWTH.CARD.LINE4

    ;IF THIS LINE IS HIGHLIT
    (Q) "$207 = 4" :SHOW.GROWTH.DIBOX

    (G) :UNHIGH.GRO.LINE.CURRENT

    ;ACCEPT LINE NUMBER
    (A) $207 "4"

    ;SELECT CURRENT STOCK
    (Y) 43

    (G) :HIGH.GRO.LINE.CURRENT

    (J) :MAIN.WAIT

;*
(:) :GROWTH.CARD.LINE5

    ;IF THIS LINE IS HIGHLIT
    (Q) "$207 = 5" :SHOW.GROWTH.DIBOX

    (G) :UNHIGH.GRO.LINE.CURRENT

    ;ACCEPT LINE NUMBER
    (A) $207 "5"

    ;SELECT CURRENT STOCK
    (Y) 43

    (G) :HIGH.GRO.LINE.CURRENT

    (J) :MAIN.WAIT
```

BEST AVAILABLE COPY

BEST AVAILABLE COPY

```
;*
(:) :GROWTH.CARD.LINE6

        ;IF THIS LINE IS HIGHLIT
        if $207 = 6
                {

                ; SHOW THE GLOSSARY IF WE'RE ON THE INTERMEDIATE P.
                if $267 = 1
                        {
                        if $268 = 0  ;if stocks
                                (A) $375 "Stock Categories/beta"
                        else            ;if funds
                                (A) $375 "Dynamic Fund"

                        (J) :GLOSSARY.DISPATCH
                        }

                ; SHOW THE DIALOG BOX IF WE'RE ON THE DETAIL PAGE
                else
                        (J) :SHOW.GROWTH.DIBOX
                }

        ; IF THIS LINE IS NOT HIGHLIT, THEN HIGHLIGHT IT AND JUMP TO MA
        else
                {
                (G) :UNHIGH.GRO.LINE.CURRENT

                ;ACCEPT LINE NUMBER
                (A) $207 "6"

                ;SELECT CURRENT STOCK
                (Y) 43

                (G) :HIGH.GRO.LINE.CURRENT

                (J) :MAIN.WAIT
                }
;*
(:) :GROWTH.CARD.LINE7

        ;IF THIS LINE IS HIGHLIT
        (Q) "$207 = 7" :SHOW.GROWTH.DIBOX

        (G) :UNHIGH.GRO.LINE.CURRENT

        ;ACCEPT LINE NUMBER
        (A) $207 "7"

        ;SELECT CURRENT STOCK
        (Y) 43

        (G) :HIGH.GRO.LINE.CURRENT

        (J) :MAIN.WAIT

;*
(:) :GROWTH.CARD.LINE8

        ;IF THIS LINE IS HIGHLIT
        (Q) "$207 = 8" :SHOW.GROWTH.DIBOX
```

```
        (G) :UNHIGH.GRO.LINE.CURRENT

        ;ACCEPT LINE NUMBER
        (A) $207 "8"

        ;SELECT CURRENT STOCK
        (Y) 43

        (G) :HIGH.GRO.LINE.CURRENT

        (J) :MAIN.WAIT

;*
(:) :GROWTH.CARD.LINE9

        ;IF THIS LINE IS HIGHLIT
        if $207 = 9
                {
                ; SHOW THE GLOSSARY IF WE'RE ON THE INTERMEDIATE P/
                if $267 = 1
                        {
                        (A) $375 "Mutual Fund"
                        (J) :GLOSSARY.DISPATCH
                        }

                ; SHOW THE DIALOG BOX IF WE'RE ON THE DETAIL PAGE
                else
                        (J) :SHOW.GROWTH.DIBOX
                }

        ; IF THIS LINE IS NOT HIGHLIT, THEN HIGHLIGHT IT AND JUMP TO MA
        else
                {
                (G) :UNHIGH.GRO.LINE.CURRENT

                ;ACCEPT LINE NUMBER
                (A) $207 "9"

                ;SELECT CURRENT STOCK
                (Y) 43

                (G) :HIGH.GRO.LINE.CURRENT

                (J) :MAIN.WAIT
                }

;*
(:) :GROWTH.CARD.LINE10

        ;IF THIS LINE IS HIGHLIT
        (Q) "$207 = 10" :SHOW.GROWTH.DIBOX

        (G) :UNHIGH.GRO.LINE.CURRENT

        ;ACCEPT LINE NUMBER
        (A) $207 "10"

        ;SELECT CURRENT STOCK
        (Y) 43

        (G) :HIGH.GRO.LINE.CURRENT
```

BEST AVAILABLE COPY

BEST AVAILABLE COPY

```
(J) :MAIN.WAIT

;*
(:) :GROWTH.CARD.LINE11

        ;IF THIS LINE IS HIGHLIT
        (Q) "$207 = 11" :SHOW.GROWTH.DIBOX

        (G) :UNHIGH.GRO.LINE.CURRENT

        ;ACCEPT LINE NUMBER
        (A) $207 "11"

        ;SELECT CURRENT STOCK
        (Y) 43

        (G) :HIGH.GRO.LINE.CURRENT

        (J) :MAIN.WAIT

;*
(:) :GROWTH.CARD.LINE12

        ;IF THIS LINE IS HIGHLIT
        (Q) "$207 = 12" :SHOW.GROWTH.DIBOX

        (G) :UNHIGH.GRO.LINE.CURRENT

        ;ACCEPT LINE NUMBER
        (A) $207 "12"

        ;SELECT CURRENT STOCK
        (Y) 43

        (G) :HIGH.GRO.LINE.CURRENT

        (J) :MAIN.WAIT

;*
(:) :GROWTH.CARD.LINE13

        ;IF THIS LINE IS HIGHLIT
        (Q) "$207 = 13" :SHOW.GROWTH.DIBOX

        (G) :UNHIGH.GRO.LINE.CURRENT

        ;ACCEPT LINE NUMBER
        (A) $207 "13"

        ;SELECT CURRENT STOCK
        (Y) 43

        (G) :HIGH.GRO.LINE.CURRENT

        (J) :MAIN.WAIT

;*
(:) :GROWTH.CARD.LINE14

        ;IF THIS LINE IS HIGHLIT
        (Q) "$207 = 14" :SHOW.GROWTH.DIBOX

        (G) :UNHIGH.GRO.LINE.CURRENT
```

BEST AVAILABLE COPY

```
        ;ACCEPT LINE NUMBER
        (A) $207 "14"

        ;SELECT CURRENT STOCK
        (Y) 43

        (G) :HIGH.GRO.LINE.CURRENT

        (J) :MAIN.WAIT

;*
(:) :GROWTH.CARD.LINE15

        ;IF THIS LINE IS HIGHLIT
        (Q) "$207 = 15" :SHOW.GROWTH.DIBOX

        (G) :UNHIGH.GRO.LINE.CURRENT

        ;ACCEPT LINE NUMBER
        (A) $207 "15"

        ;SELECT CURRENT STOCK
        (Y) 43

        (G) :HIGH.GRO.LINE.CURRENT

        (J) :MAIN.WAIT

;*
(:) :GROWTH.CARD.LINE16

        ;IF THIS LINE IS HIGHLIT
        (Q) "$207 = 16" :SHOW.GROWTH.DIBOX

        (G) :UNHIGH.GRO.LINE.CURRENT

        ;ACCEPT LINE NUMBER
        (A) $207 "16"

        ;SELECT CURRENT STOCK
        (Y) 43

        (G) :HIGH.GRO.LINE.CURRENT

        (J) :MAIN.WAIT

;*
(:) :GROWTH.CARD.LINE105

        (G) :UNHIGH.GRO.LINE.CURRENT
        (A) $207 "-1"             ; reset current line
        (G) :HIGH.GRO.GLOSSARY.105

        (A) $375 "Price (Price per Share)"

        (J) :GLOSSARY.DISPATCH

;*
(:) :GROWTH.CARD.LINE106

        (G) :UNHIGH.GRO.LINE.CURRENT
        (A) $207 "-1"             ; reset current line
        (G) :HIGH.GRO.GLOSSARY.106
```

```
        If $268 = 0  ;stocks are recommended
                (A) $375 "52 week hi/lo"
        else                    ;funds
                (A) $375 "1 YR TOTAL RTN"

        (J) :GLOSSARY.DISPATCH

;*
(:) :GROWTH.CARD.LINE107

        (G) :UNHIGH.GRO.LINE.CURRENT
        (A) $207 "-1"                   ; reset current line
        (G) :HIGH.GRO.GLOSSARY.107

        (A) $375 "Dividend"

        (J) :GLOSSARY.DISPATCH

;*
(:) :GROWTH.CARD.LINE108

        (G) :UNHIGH.GRO.LINE.CURRENT
        (A) $207 "-1"                   ; reset current line
        (G) :HIGH.GRO.GLOSSARY.108

        If $268 = 0  ;stocks are recommended
                (A) $375 "P/E (Price/Earnings ratio)"
        else
                (A) $375 "N/A"

        (J) :GLOSSARY.DISPATCH

;*
(:) :GROWTH.CARD.LINE109

        (G) :UNHIGH.GRO.LINE.CURRENT
        (A) $207 "-1"                   ; reset current line
        (G) :HIGH.GRO.GLOSSARY.109

        If $268 = 0  ;stocks are recommended
                (A) $375 "Stock Categories/beta"
        else
                (A) $375 "LOAD"

        (J) :GLOSSARY.DISPATCH

;------------------------------------------------------------
;level 2

;*
(:) :HIGH.GRO.LINE.CURRENT

        ; IF $207 < 0 THEN THERE IS NO CURRENT LINE
        if $207 < 0
                (R)

        ;CHECK WHICH LINE TO HIGHLIGHT
        stringFormat $290 ":HIGH.GRO.LINE%n", $207
        (J) $290

        (:) :HIGH.GRO.LINE0
                (I)* $286 "n.rec.line0.s"
```

BEST AVAILABLE COPY

```
(:) :NO.GRO.HIEVENT0
(R)

(:) :HIGH.GRO.LINE1
    (I)* $286 "n.rec.line1.s"
    (:) :NO.GRO.HIEVENT1
    (R)

(:) :HIGH.GRO.LINE2
    (I)* $286 "n.rec.line2.s"
    (:) :NO.GRO.HIEVENT2
    (R)

(:) :HIGH.GRO.LINE3
    (I)* $286 "n.rec.line3.s"
    (:) :NO.GRO.HIEVENT3
    (R)

(:) :HIGH.GRO.LINE4
    (I)* $286 "n.rec.line4.s"
    (:) :NO.GRO.HIEVENT4
    (R)

(:) :HIGH.GRO.LINE5
    (I)* $286 "n.rec.line5.s"
    (:) :NO.GRO.HIEVENT5
    (R)

(:) :HIGH.GRO.LINE6
    (I)* $286 "n.rec.line6.s"
    (:) :NO.GRO.HIEVENT6
    (R)

(:) :HIGH.GRO.LINE7
    (I)* $286 "n.rec.line7.s"
    (:) :NO.GRO.HIEVENT7
    (R)

(:) :HIGH.GRO.LINE8
    (I)* $286 "n.rec.line8.s"
    (:) :NO.GRO.HIEVENT8
    (R)

(:) :HIGH.GRO.LINE9
    (I)* $286 "n.rec.line9.s"
    (:) :NO.GRO.HIEVENT9
    (R)

(:) :HIGH.GRO.LINE10
    (I)* $286 "n.rec.line10.s"
    (:) :NO.GRO.HIEVENT10
    (R)

(:) :HIGH.GRO.LINE11
    (I)* $286 "n.rec.line11.s"
    (:) :NO.GRO.HIEVENT11
    (R)

(:) :HIGH.GRO.LINE12
    (I)* $286 "n.rec.line12.s"
    (:) :NO.GRO.HIEVENT12
    (R)

(:) :HIGH.GRO.LINE13
```

BEST AVAILABLE COPY

BEST AVAILABLE COPY

```
        (I)* $286 "n.rec.line13.s"
        (:) :NO.GRO.HIEVENT13
        (R)

(:) :HIGH.GRO.LINE14
        (I)* $286 "n.rec.line14.s"
        (:) :NO.GRO.HIEVENT14
        (R)

(:) :HIGH.GRO.LINE15
        (I)* $286 "n.rec.line15.s"
        (:) :NO.GRO.HIEVENT15
        (R)

(:) :HIGH.GRO.LINE16
        (I)* $286 "n.rec.line16.s"
        (:) :NO.GRO.HIEVENT16
        (R)

;GLOSSARY LINES
(:) :HIGH.GRO.GLOSSARY.105          ;price
        (I)* #116,341,132,387 $286
        (W) 4
        (I)*- #116,341,132,387 $286
        (:) :NO.GRO.HIEVENT105
        (R)

(:) :HIGH.GRO.GLOSSARY.106              ;52wk hi lo
        (I)* #116,387,132,478 $286
        (W) 4
        (I)*- #116,387,132,478 $286
        (:) :NO.GRO.HIEVENT106
        (R)

(:) :HIGH.GRO.GLOSSARY.107              ;dividend
        (I)* #116,478,132,512 $286
        (W) 4
        (I)*- #116,478,132,512 $286
        (:) :NO.GRO.HIEVENT107
        (R)

(:) :HIGH.GRO.GLOSSARY.108              ;p/e
        (I)* #116,512,132,547 $286
        (W) 4
        (I)*- #116,512,132,547 $286
        (:) :NO.GRO.HIEVENT108
        (R)

(:) :HIGH.GRO.GLOSSARY.109              ;beta
        (I)* #116,547,132,584 $286
        (W) 4
        (I)*- #116,547,132,584 $286
        (:) :NO.GRO.HIEVENT109
        (R)


;*
(:) :UNHIGH.GRO.LINE.CURRENT

    ; IF $207 < 0 THEN THERE IS NO CURRENT LINE
    if $207 < 0
        (R)

    ;CHECK WHICH LINE IS HIGHLIT
```

```
stringFormat $290 ":UNHIGH.GRO.LINE%n", $207
(J) $290

(:) :UNHIGH.GRO.LINE0
        (I)*- $286 "n.rec.line0.s"
        (:) :NO.GRO.EVENT0
        (R)

(:) :UNHIGH.GRO.LINE1
        (I)*- $286 "n.rec.line1.s"
        (:) :NO.GRO.EVENT1
        (R)

(:) :UNHIGH.GRO.LINE2
        (I)*- $286 "n.rec.line2.s"
        (:) :NO.GRO.EVENT2
        (R)

(:) :UNHIGH.GRO.LINE3
        (I)*- $286 "n.rec.line3.s"
        (:) :NO.GRO.EVENT3
        (R)

(:) :UNHIGH.GRO.LINE4
        (I)*- $286 "n.rec.line4.s"
        (:) :NO.GRO.EVENT4
        (R)

(:) :UNHIGH.GRO.LINE5
        (I)*- $286 "n.rec.line5.s"
        (:) :NO.GRO.EVENT5
        (R)

(:) :UNHIGH.GRO.LINE6
        (I)*- $286 "n.rec.line6.s"
        (:) :NO.GRO.EVENT6
        (R)

(:) :UNHIGH.GRO.LINE7
        (I)*- $286 "n.rec.line7.s"
        (:) :NO.GRO.EVENT7
        (R)

(:) :UNHIGH.GRO.LINE8
        (I)*- $286 "n.rec.line8.s"
        (:) :NO.GRO.EVENT8
        (R)

(:) :UNHIGH.GRO.LINE9
        (I)*- $286 "n.rec.line9.s"
        (:) :NO.GRO.EVENT9
        (R)

(:) :UNHIGH.GRO.LINE10
        (I)*- $286 "n.rec.line10.s"
        (:) :NO.GRO.EVENT10
        (R)

(:) :UNHIGH.GRO.LINE11
        (I)*- $286 "n.rec.line11.s"
        (:) :NO.GRO.EVENT11
        (R)

(:) :UNHIGH.GRO.LINE12
```

BEST AVAILABLE COPY

```
		(I)*- $286 "n.rec.line12.s"
		(:) :NO.GRO.EVENT12
		(R)

	(:) :UNHIGH.GRO.LINE13
		(I)*- $286 "n.rec.line13.s"
		(:) :NO.GRO.EVENT13
		(R)

	(:) :UNHIGH.GRO.LINE14
		(I)*- $286 "n.rec.line14.s"
		(:) :NO.GRO.EVENT14
		(R)

	(:) :UNHIGH.GRO.LINE15
		(I)*- $286 "n.rec.line15.s"
		(:) :NO.GRO.EVENT15
		(R)

	(:) :UNHIGH.GRO.LINE16
		(I)*- $286 "n.rec.line16.s"
		(:) :NO.GRO.EVENT16
		(R)

	;GLOSSARY LINES
	(:) :UNHIGH.GRO.LINE105				;price
		(I)*- #116,341,132,386 $286
		(:) :NO.GRO.EVENT105
		(R)

	(:) :UNHIGH.GRO.LINE106				;52wk hi lo
		(I)*- #116,387,132,477 $286
		(:) :NO.GRO.EVENT106
		(R)

	(:) :UNHIGH.GRO.LINE107				;dividend
		(I)*- #116,478,132,511 $286
		(:) :NO.GRO.EVENT107
		(R)

	(:) :UNHIGH.GRO.LINE108				;p/e
		(I)*- #116,512,132,546 $286
		(:) :NO.GRO.EVENT108
		(R)

	(:) :UNHIGH.GRO.LINE109				;beta
		(I)*- #116,547,132,583 $286
		(:) :NO.GRO.EVENT109
		(R)

;*
(:) :BLANK.GRO.LINE.CURRENT

	;CHECK WHICH LINE TO BLANK
	stringFormat $290 ":BLANK.GRO.LINE%n", $207
	(J) $290

	(:) :BLANK.GRO.LINE0
	(S)* "n.rec.line0.s"
	(R)

	(:) :BLANK.GRO.LINE1
	(S)* "n.rec.line1.s"
```

BEST AVAILABLE COPY (R)

(:) :BLANK.GRO.LINE2
(S)* "n.rec.line2.s"
(R)

(:) :BLANK.GRO.LINE3
(S)* "n.rec.line3.s"
(R)

(:) :BLANK.GRO.LINE4
(S)* "n.rec.line4.s"
(R)

(:) :BLANK.GRO.LINE5
(S)* "n.rec.line5.s"
(R)

(:) :BLANK.GRO.LINE6
(S)* "n.rec.line6.s"
(R)

(:) :BLANK.GRO.LINE7
(S)* "n.rec.line7.s"
(R)

(:) :BLANK.GRO.LINE8
(S)* "n.rec.line8.s"
(R)

(:) :BLANK.GRO.LINE9
(S)* "n.rec.line9.s"
(R)

(:) :BLANK.GRO.LINE10
(S)* "n.rec.line10.s"
(R)

(:) :BLANK.GRO.LINE11
(S)* "n.rec.line11.s"
(R)

(:) :BLANK.GRO.LINE12
(S)* "n.rec.line12.s"
(R)

(:) :BLANK.GRO.LINE13
(S)* "n.rec.line13.s"
(R)

(:) :BLANK.GRO.LINE14
(S)* "n.rec.line14.s"
(R)

(:) :BLANK.GRO.LINE15
(S)* "n.rec.line15.s"
(R)

(:) :BLANK.GRO.LINE16
(S)* "n.rec.line16.s"
(R)

;*
(:) :BLANK.GRO.LINE.IMRA

Money Advice Scan File

BEST AVAILABLE COPY

```
(S)* "n.gro.$value.resid.blnk.s" ;IMRA
(R)

.**************************************************************************
. GROWTH BUYLIST -  LINE GRAPHICS
.**************************************************************************
.level 1

;*
(:) :GRO.BUYLIST.LINE0

        ;IF THIS LINE IS HIGHLIT
        (Q) "$207 = 0" :SHOW.GRO.BUYLIST.DIBOX

        (G) :UNHIGH.GRO.BUYLIST.LINE.CURRENT

        ;ACCEPT LINE NUMBER
        (A) $207 "0"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE1

        ;IF THIS LINE IS HIGHLIT
        (Q) "$207 = 1" :SHOW.GRO.BUYLIST.DIBOX

        (G) :UNHIGH.GRO.BUYLIST.LINE.CURRENT

        ;ACCEPT LINE NUMBER
        (A) $207 "1"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE2

        ;IF THIS LINE IS HIGHLIT
        (Q) "$207 = 2" :SHOW.GRO.BUYLIST.DIBOX

        (G) :UNHIGH.GRO.BUYLIST.LINE.CURRENT

        ;ACCEPT LINE NUMBER
        (A) $207 "2"

        ;SELECT CURRENT STOCK
        (Y) 48

        (G) :HIGH.GRO.BUYLIST.LINE.CURRENT

        (J) :MAIN.WAIT
```

BEST AVAILABLE COPY

```
;*
(:) :GRO.BUYLIST.LINE3

        ;IF THIS LINE IS HIGHLIT
        (Q) "$207 = 3" :SHOW.GRO.BUYLIST.DIBOX

        (G) :UNHIGH.GRO.BUYLIST.LINE.CURRENT

        ;ACCEPT LINE NUMBER
        (A) $207 "3"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE4

        ;IF THIS LINE IS HIGHLIT
        (Q) "$207 = 4" :SHOW.GRO.BUYLIST.DIBOX

        (G) :UNHIGH.GRO.BUYLIST.LINE.CURRENT

        ;ACCEPT LINE NUMBER
        (A) $207 "4"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE5

        ;IF THIS LINE IS HIGHLIT
        (Q) "$207 = 5" :SHOW.GRO.BUYLIST.DIBOX

        (G) :UNHIGH.GRO.BUYLIST.LINE.CURRENT

        ;ACCEPT LINE NUMBER
        (A) $207 "5"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE6

        ;IF THIS LINE IS HIGHLIT
        (Q) "$207 = 6" :SHOW.GRO.BUYLIST.DIBOX

        (G) :UNHIGH.GRO.BUYLIST.LINE.CURRENT

        ;ACCEPT LINE NUMBER
```

BEST AVAILABLE COPY

```
        (A) $207 "6"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE7

        ;IF THIS LINE IS HIGHLIT
        (Q) "$207 = 7" :SHOW.GRO.BUYLIST.DIBOX

        (G) :UNHIGH.GRO.BUYLIST.LINE.CURRENT

        ;ACCEPT LINE NUMBER
        (A) $207 "7"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE8

        ;IF THIS LINE IS HIGHLIT
        (Q) "$207 = 8" :SHOW.GRO.BUYLIST.DIBOX

        (G) :UNHIGH.GRO.BUYLIST.LINE.CURRENT

        ;ACCEPT LINE NUMBER
        (A) $207 "8"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE9

        ;IF THIS LINE IS HIGHLIT
        (Q) "$207 = 9" :SHOW.GRO.BUYLIST.DIBOX

        (G) :UNHIGH.GRO.BUYLIST.LINE.CURRENT

        ;ACCEPT LINE NUMBER
        (A) $207 "9"

        ;SELECT CURRENT STOCK
        (Y) 48

        (G) :HIGH.GRO.BUYLIST.LINE.CURRENT

        (J) :MAIN.WAIT

;*
```

BEST AVAILABLE COPY

```
(:) :GRO.BUYLIST.LINE10

        ;IF THIS LINE IS HIGHLIT
        (Q) "$207 = 10" :SHOW.GRO.BUYLIST.DIBOX

        (G) :UNHIGH.GRO.BUYLIST.LINE.CURRENT

        ;ACCEPT LINE NUMBER
        (A) $207 "10"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE11

        ;IF THIS LINE IS HIGHLIT
        (Q) "$207 = 11" :SHOW.GRO.BUYLIST.DIBOX

        (G) :UNHIGH.GRO.BUYLIST.LINE.CURRENT

        ;ACCEPT LINE NUMBER
        (A) $207 "11"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE12

        ;IF THIS LINE IS HIGHLIT
        (Q) "$207 = 12" :SHOW.GRO.BUYLIST.DIBOX

        (G) :UNHIGH.GRO.BUYLIST.LINE.CURRENT

        ;ACCEPT LINE NUMBER
        (A) $207 "12"

        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE13

        ;IF THIS LINE IS HIGHLIT
        (Q) "$207 = 13" :SHOW.GRO.BUYLIST.DIBOX

        (G) :UNHIGH.GRO.BUYLIST.LINE.CURRENT

        ;ACCEPT LINE NUMBER
        (A) $207 "13"
```

BEST AVAILABLE COPY

```
        ;SELECT CURRENT STOCK
        (Y) 48

        (G) :HIGH.GRO.BUYLIST.LINE.CURRENT

        (J) :MAIN.WAIT

;*
(:) :GRO.BUYLIST.LINE14

        ;IF THIS LINE IS HIGHLIT
        (Q) "$207 = 14" :SHOW.GRO.BUYLIST.DIBOX

        (G) :UNHIGH.GRO.BUYLIST.LINE.CURRENT

        ;ACCEPT LINE NUMBER
        (A) $207 "14"

        ;SELECT CURRENT STOCK
        (Y) 48

        (G) :HIGH.GRO.BUYLIST.LINE.CURRENT

        (J) :MAIN.WAIT

;GLOSSARY LINES

;*
(:) :GRO.BUYLIST.LINE105

        (G) :UNHIGH.GRO.BUYLIST.LINE.CURRENT
        (A) $207 "-1"              ; reset current line
        (G) :HIGH.GRO.GLOSSARY.BUYLIST.105

        (A) $375 "Price (Price per Share)"

        (J) :GLOSSARY.DISPATCH

;*
(:) :GRO.BUYLIST.LINE106

        (G) :UNHIGH.GRO.BUYLIST.LINE.CURRENT
        (A) $207 "-1"              ; reset current line
        (G) :HIGH.GRO.GLOSSARY.BUYLIST.106

        If $268 = 0        ;stocks program
                (A) $375 "52 week hi/lo"
        else                       ;funds program
                (A) $375 "1 YR TOTAL RTN"

        (J) :GLOSSARY.DISPATCH

;*
(:) :GRO.BUYLIST.LINE107

        (G) :UNHIGH.GRO.BUYLIST.LINE.CURRENT
        (A) $207 "-1"              ; reset current line
        (G) :HIGH.GRO.GLOSSARY.BUYLIST.107

        (A) $375 "Dividend"

        (J) :GLOSSARY.DISPATCH

;*
```

Money Advice Scan File

BEST AVAILABLE COPY

```
(:) :GRO.BUYLIST.LINE108

        (G) :UNHIGH.GRO.BUYLIST.LINE.CURRENT
        (A) $207 "-1"              ; reset current line
        (G) :HIGH.GRO.GLOSSARY.BUYLIST.108

        if $268 = 0                ;stocks program
                (A) $375 "P/E (Price/Earnings ratio)"
        else                       ;funds program
                (A) $375 "N/A"

        (J) :GLOSSARY.DISPATCH

;*
(:) :GRO.BUYLIST.LINE109

        (G) :UNHIGH.GRO.BUYLIST.LINE.CURRENT
        (A) $207 "-1"              ; reset current line
        (G) :HIGH.GRO.GLOSSARY.BUYLIST.109

        if $268 = 0                ;stocks program
                (A) $375 "Stock Categories/beta"
        else                       ;funds program
                (A) $375 "LOAD"

        (J) :GLOSSARY.DISPATCH

;-----------------------------------------------------------------------
---------------
.level 2

;*
(:) :HIGH.GRO.BUYLIST.LINE.CURRENT

        ; RETURN IF IT'S NOT A REAL LINE
        if $207 < 0
                (R)

        ;CHECK WHICH LINE TO HIGHLIGHT
        stringFormat $290 ":HIGH.GRO.BUYLIST.LINE%n", $207
        (J) $290

        ;****
        (:) :HIGH.GRO.BUYLIST.LINE0
                (I)* $287 "n.gro.buylist.line.s" @148,143
                (:) :NO2.GRO.HIEVENT0
                (R)

        (:) :HIGH.GRO.BUYLIST.LINE1
                (I)* $287 "n.gro.buylist.line.s" @164,143
                (:) :NO2.GRO.HIEVENT1
                (R)

        (:) :HIGH.GRO.BUYLIST.LINE2
                (I)* $287 "n.gro.buylist.line.s" @180,143
                (:) :NO2.GRO.HIEVENT2
                (R)

        (:) :HIGH.GRO.BUYLIST.LINE3
                (I)* $287 "n.gro.buylist.line.s" @196,143
                (:) :NO2.GRO.HIEVENT3
                (R)

        (:) :HIGH.GRO.BUYLIST.LINE4
```

BEST AVAILABLE COPY

```
        (I)* $287 "n.gro.buylist.line.s" ●212,143
        (:) :NO2.GRO.HIEVENT4
        (R)

(:) :HIGH.GRO.BUYLIST.LINE5
        (I)* $287 "n.gro.buylist.line.s" ●228,143
        (:) :NO2.GRO.HIEVENT5
        (R)

(:) :HIGH.GRO.BUYLIST.LINE6
        (I)* $287 "n.gro.buylist.line.s" ●244,143
        (:) :NO2.GRO.HIEVENT6
        (R)

(:) :HIGH.GRO.BUYLIST.LINE7
        (I)* $287 "n.gro.buylist.line.s" ●260,143
        (:) :NO2.GRO.HIEVENT7
        (R)

(:) :HIGH.GRO.BUYLIST.LINE8
        (I)* $287 "n.gro.buylist.line.s" ●276,143
        (:) :NO2.GRO.HIEVENT8
        (R)

(:) :HIGH.GRO.BUYLIST.LINE9
        (I)* $287 "n.gro.buylist.line.s" ●292,143
        (:) :NO2.GRO.HIEVENT9
        (R)

(:) :HIGH.GRO.BUYLIST.LINE10
        (I)* $287 "n.gro.buylist.line.s" ●308,143
        (:) :NO2.GRO.HIEVENT10
        (R)

(:) :HIGH.GRO.BUYLIST.LINE11
        (I)* $287 "n.gro.buylist.line.s" ●324,143
        (:) :NO2.GRO.HIEVENT11
        (R)

(:) :HIGH.GRO.BUYLIST.LINE12
        (I)* $287 "n.gro.buylist.line.s" ●340,143
        (:) :NO2.GRO.HIEVENT12
        (R)

(:) :HIGH.GRO.BUYLIST.LINE13
        (I)* $287 "n.gro.buylist.line.s" ●356,143
        (:) :NO2.GRO.HIEVENT13
        (R)

(:) :HIGH.GRO.BUYLIST.LINE14
        (I)* $287 "n.gro.buylist.line.s" ●372,143
        (:) :NO2.GRO.HIEVENT14
        (R)

;GLOSSARY LINES

(:) :HIGH.GRO.GLOSSARY.BUYLIST.105              ;price

        (I)* #134,310,146,354 $287
        (W) 4
        (I)*- #134,310,146,354 $287
        (:) :NO.GRO.HIEVENT105BB
        (R)
```

Money Advice Scan File

BEST AVAILABLE COPY

```
(:) :HIGH.GRO.GLOSSARY.BUYLIST.106          ;52 weed

        (I)* #134,355,146,451 $287
        (W) 4
        (I)*- #134,355,146,451 $287
        (:) :NO.GRO.HIEVENT106B
        (R)

(:) :HIGH.GRO.GLOSSARY.BUYLIST.107          ;dividend

        (I)* #134,452,146,487 $287
        (W) 4
        (I)*- #134,452,146,487 $287
        (:) :NO.GRO.HIEVENT107B
        (R)

(:) :HIGH.GRO.GLOSSARY.BUYLIST.108          ;p/e

        (I)* #134,488,146,524 $287
        (W) 4
        (I)*- #134,488,146,524 $287
        (:) :NO.GRO.HIEVENT108B
        (R)

(:) :HIGH.GRO.GLOSSARY.BUYLIST.109          ;beta

        (I)* #134,525,146,556 $287
        (W) 4
        (I)*- #134,525,146,556 $287
        (:) :NO.GRO.HIEVENT109B
        (R)

;*
(:) :UNHIGH.GRO.BUYLIST.LINE.CURRENT

    ; MAKE SURE THERE is A CURRENT LINE
    if $207 < 0
            (R)

    ;CHECK WHICH LINE IS HIGHLIT
    stringFormat $290 ":UNHIGH.GRO.BUYLIST.LINE%n", $207
    (J) $290

    (:) :UNHIGH.GRO.BUYLIST.LINE0
            (I)*- $287 "n.gro.buylist.line.s" @148,143
            (:) :NO2.GRO.EVENT0
            (R)

    (:) :UNHIGH.GRO.BUYLIST.LINE1
            (I)*- $287 "n.gro.buylist.line.s" @164,143
            (:) :NO2.GRO.EVENT1
            (R)

    (:) :UNHIGH.GRO.BUYLIST.LINE2
            (I)*- $287 "n.gro.buylist.line.s" @180,143
            (:) :NO2.GRO.EVENT2
            (R)

    (:) :UNHIGH.GRO.BUYLIST.LINE3
            (I)*- $287 "n.gro.buylist.line.s" @196,143
            (:) :NO2.GRO.EVENT3
            (R)
```

BEST AVAILABLE COPY

```
(:) :UNHIGH.GRO.BUYLIST.LINE4
        (I)*- $287 "n.gro.buylist.line.s" ●212,143
        (:) :NO2.GRO.EVENT4
        (R)

(:) :UNHIGH.GRO.BUYLIST.LINE5
        (I)*- $287 "n.gro.buylist.line.s" ●228,143
        (:) :NO2.GRO.EVENT5
        (R)

(:) :UNHIGH.GRO.BUYLIST.LINE6
        (I)*- $287 "n.gro.buylist.line.s" ●244,143
        (:) :NO2.GRO.EVENT6
        (R)

(:) :UNHIGH.GRO.BUYLIST.LINE7
        (I)*- $287 "n.gro.buylist.line.s" ●260,143
        (:) :NO2.GRO.EVENT7
        (R)

(:) :UNHIGH.GRO.BUYLIST.LINE8
        (I)*- $287 "n.gro.buylist.line.s" ●276,143
        (:) :NO2.GRO.EVENT8
        (R)

(:) :UNHIGH.GRO.BUYLIST.LINE9
        (I)*- $287 "n.gro.buylist.line.s" ●292,143
        (:) :NO2.GRO.EVENT9
        (R)

(:) :UNHIGH.GRO.BUYLIST.LINE10
        (I)*- $287 "n.gro.buylist.line.s" ●308,143
        (:) :NO2.GRO.EVENT10
        (R)

(:) :UNHIGH.GRO.BUYLIST.LINE11
        (I)*- $287 "n.gro.buylist.line.s" ●324,143
        (:) :NO2.GRO.EVENT11
        (R)

(:) :UNHIGH.GRO.BUYLIST.LINE12
        (I)*- $287 "n.gro.buylist.line.s" ●340,143
        (:) :NO2.GRO.EVENT12
        (R)

(:) :UNHIGH.GRO.BUYLIST.LINE13
        (I)*- $287 "n.gro.buylist.line.s" ●356,143
        (:) :NO2.GRO.EVENT13
        (R)

(:) :UNHIGH.GRO.BUYLIST.LINE14
        (I)*- $287 "n.gro.buylist.line.s" ●372,143
        (:) :NO2.GRO.EVENT14
        (R)

;*
(:) :BLANK.CURRENT.GRO.BUY.LINE

        ;CHECK WHICH LINE TO BLANK
        stringFormat $290 ":BLANK.GRO.BUY.LINE%n", $207
        (J) $290

        (:) :BLANK.GRO.BUY.LINE0
```

BEST AVAILABLE COPY

BEST AVAILABLE COPY

```
(S)* "n.gro.buylist.line.s" ●148,143
(R)

(:) :BLANK.GRO.BUY.LINE1
(S)* "n.gro.buylist.line.s" ●164,143
(R)

(:) :BLANK.GRO.BUY.LINE2
(S)* "n.gro.buylist.line.s" ●180,143
(R)

(:) :BLANK.GRO.BUY.LINE3
(S)* "n.gro.buylist.line.s" ●196,143
(R)

(:) :BLANK.GRO.BUY.LINE4
(S)* "n.gro.buylist.line.s" ●212,143
(R)

(:) :BLANK.GRO.BUY.LINE5
(S)* "n.gro.buylist.line.s" ●228,143
(R)

(:) :BLANK.GRO.BUY.LINE6
(S)* "n.gro.buylist.line.s" ●244,143
(R)

(:) :BLANK.GRO.BUY.LINE7
(S)* "n.gro.buylist.line.s" ●260,143
(R)

(:) :BLANK.GRO.BUY.LINE8
(S)* "n.gro.buylist.line.s" ●276,143
(R)

(:) :BLANK.GRO.BUY.LINE9
(S)* "n.gro.buylist.line.s" ●292,143
(R)

(:) :BLANK.GRO.BUY.LINE10
(S)* "n.gro.buylist.line.s" ●308,143
(R)

(:) :BLANK.GRO.BUY.LINE11
(S)* "n.gro.buylist.line.s" ●324,143
(R)

(:) :BLANK.GRO.BUY.LINE12
(S)* "n.gro.buylist.line.s" ●340,143
(R)

(:) :BLANK.GRO.BUY.LINE13
(S)* "n.gro.buylist.line.s" ●356,143
(R)

(:) :BLANK.GRO.BUY.LINE14
(S)* "n.gro.buylist.line.s" ●372,143
(R)

(:) :BLANK.GRO.BUY.LINE15
(S)* "n.gro.buylist.line.s" ●388,143
(R)

;•••••••••••••••••••••••••••••••••••••••••••••••••••••••••••••••••••••••••••••••••••••••••••

Money Advice Scan File
```

BEST AVAILABLE COPY

```
;GROWTH - DIALOGUE BOXES
;*************************************************************************
;level 1

    ;*
    (:) :SHOW.GROWTH.DIBOX

        (T)

        ;IS THERE A STOCK HERE?
        (Q) "$376 = 1" :MAIN.WAIT  ;was removed
        (Q) "$377 = 0" :MAIN.WAIT  ;blank line
        (Q) "$377 > 99" :GLOSSARY.DISPATCH ;for pg header & stock type
        (Q) "267 = 1" :MAIN.WAIT ;on intermediate page

        ;SAVE BACKGROUND
        (A) $302 "15"                ; pixel offset for shadow
        (X)- $302 "n.gro.card.dibox.s

        ;SHOW BOX
        (S) "n.gro.card.dibox.s"
        (I)- $302 "n.gro.card.dibox.s" ;shadow

        ;SHOW NAME OF STOCK
        (H) 6
        (V) $375 @197,214

        ;SET FLAG
        (A) $252 "3" ;growth dibox

        ;PUT UP PROMPT
        (G) :SAVE.PROMPT
        (G) :FILL.PROMPT.4.10
        (G) :SHOW.FIRST.PROMPT

        (J) :MAIN.WAIT

;--------------------------------------------------------------------------
;level 2

    ;*
    (:) :SEE.INFORMATION.GROWTH

        (G) :CLOSE.GRO.DIBOX
        ;(G) :UNHIGH.GRO.LINE.CURRENT

        (Q) "$377 < 100" :OPEN.GROWTH.HOTSHEET
        (Q) "$377 > 99" :GLOSSARY.DISPATCH

;--------------------------------------------------------------------------
;level 1

;*
(:) :REMOVE.FROM.GROWTH

    (A) $290 "1"  ;set flag temporary
    (A) $376 "1"  ;set flag

    (J) :GRO.COMBINED.REMOVE
```

BEST AVAILABLE COPY

BEST AVAILABLE COPY

```
;*
( ) :REMOVE.EXCLUDE.FROM.GROWTH

        (A) $290 "0"  ;set flag temporary
        (A) $376 "0"  ;set flag

        (J) :GRO.COMBINED.REMOVE


;*
( ) :GRO.COMBINED.REMOVE

        (A) $380 "0"  ;initialize error flag
        (Y) 45 ;change status

        if $380 = 3 ;error - shares are held
                {
                ;SHOW MESSAGE
                (O) "n.card.dibox.message.s"
                (S) "n.card.dibox.okay.s"
                (S) "n.card.dibox.cancel.s"

                (H) 1
                (V) "Remove all the shares you are^considering for this selection?" @2

                (T)
                (T) $33 "n.card.dibox.okay.s" :DUMP.GRO.SHARES
                (T) $33 "n.card.dibox.cancel.s" :REQUEST.CANCEL.GRO.DIBOX

                (J) :MAIN.WAIT.LOADED
                }
        else
                {
                (G) :CLOSE.GRO.DIBOX
                (W) 10
                (G) :BLANK.GRO.LINE.IMRA
                (Y)* 49 ;REDISPLAY IMRA
                (G) :BLANK.GRO.LINE.CURRENT
                (G) :HIGH.GRO.LINE.CURRENT

                (A) $246 "1"      ;set edit was made flag

                (J) :MAIN.WAIT
        }


        ;*
        (:) :REQUEST.CANCEL.GRO.DIBOX

                (G) :CLOSE.GRO.DIBOX
                (J) :MAIN.WAIT

        ;*
        (:) :CLOSE.GRO.DIBOX

                ;RESTORE BACKGROUND AND PROMPT
                (X)
                (G) :RESTORE.PROMPT

                ;SET FLAG
                (A) $252 "0"

                (R)
```

BEST AVAILABLE COPY

```
;*
(:) :DUMP.GRO.SHARES

;ZERO OUT PROPER VARIABLE
If $207 = 0
        (A) $71 "0"
else
        If $207 = 1
        (A) $72 "0"
else
        If $207 = 2
        (A) $73 "0"
else
        If $207 = 3
        (A) $74 "0"
else
        If $207 = 4
        (A) $75 "0"
else
        If $207 = 5
        (A) $76 "0"
else
        If $207 = 6
        (A) $77 "0"
else
        If $207 = 7
        (A) $78 "0"
else
        If $207 = 8
        (A) $79 "0"
else
        If $207 = 9
        (A) $80 "0"
else
        If $207 = 10
        (A) $81 "0"
else
        If $207 = 11
        (A) $82 "0"
else
        If $207 = 12
        (A) $83 "0"
else
        If $207 = 13
        (A) $84 "0"
else
        If $207 = 14
        (A) $60 "0"
else
        If $207 = 15
        (A) $61 "0"

(G) :BLANK.GRO.LINE.IMRA
(Y)* 49 ;REDISPLAY IMRA
stringFormat $376 $290
(Y) 45 ;change status

(G) :CLOSE.GRO.DIBOX
(W) 10
(G) :BLANK.GRO.LINE.IMRA
(Y)* 49 ;REDISPLAY IMRA
(G) :BLANK.GRO.LINE.CURRENT
(G) :HIGH.GRO.LINE.CURRENT
```

BEST AVAILABLE COPY

```
        (A) $246 "1"     ;set edit was made flag

        (J) :MAIN.WAIT
```

---

```
level 1 -  buylist

.
( )  SHOW.GRO.BUYLIST.DIBOX

    (T)

    ;IS THIS A BLANK LINE?
    (Q) "$376 = 2" :MAIN.WAIT  ;removed to growth card
    (Q) "$377 = 0" :MAIN.WAIT  ;blank line
    (Q) "$377 > 99" :GLOSSARY.DISPATCH

    ;SAVE BACKGROUND
    (A) $302 "15"                  ; pixel offset for shadow
    (X)~ $302 "n.gro.buylist.dibox.s"

    ;SHOW BOX
    if $376 = 0 ;excluded
            (S) "n.gro.buylist.dibox.restore.s"
            (I)~ $302 "n.gro.buylist.dibox.restore.s" ;shadow

    if $376 = 1 ;buylist
            (S) "n.gro.buylist.dibox.s"
            (I)~ $302 "n.gro.buylist.dibox.s" ;shadow

    ;SHOW NAME OF STOCK
    (H) 6
    (V) $375 ●197,214

    ;SET FLAG
    (A) $252 "4" ;growth buylist dibox

    ;PUT UP PROMPT
    (G) :SAVE.PROMPT
    (G) :FILL.PROMPT.4.10
    (G) :SHOW.FIRST.PROMPT

    (J) :MAIN.WAIT
```

---

```
.level 2

    ;•
    (:) :ADD.TO.GROWTH.CARD

            (A) $380 "0"  ;initialize error flag
            (A) $376 "2"  ;set status flag
            (Y) 45 ;change status

                    if $380 = 1  ;growth card is full
                            (J) :GRO.CARD.IS.FULL

                    if $380 = 2  ;category is full
                            (J) :GRO.CATEG.IS.FULL
```

```
(G) :CLOSE.GRO.DIBOX
(W) 5

(G) :BLANK.CURRENT.GRO.BUY.LINE
(G) :HIGH.GRO.BUYLIST.LINE.CURRENT ;(HIGHLIGHT LINE)

(A) $246 "1"    ;set edit was made flag

(J) :REDRAW.GROWTH.CARD.SIDES

        ;*
        (:) :REDRAW.GROWTH.CARD.SIDES

                ;CLEAR GROWTH CARD
                (A) $199 "1" ;speed
                (D)* 1 "n.gro.card.sides.s"

                ;SETUP Z3
                (Z) 3
                (S) "n.gro.card.sides.s"

                ;SHOW STOCKS ON Z
                (Z) 3
                (Y) 41

                ;BLANK CENTER TYPE
                (Z) 3
                (S) "n.gro.card.sides.blnk.s"

                (Z) 2

                ;SHOW ON SCREEN 2
                (A) $199 "1" ;speed
                (U) 1 "n.gro.card.sides.s"

                (Z) 1

                ;SHOW ON SCREEN 1
                (U) 1 "n.gro.card.sides.s"

                (J) :MAIN.WAIT

;*
(:) :EXCLUDE.FROM.GROWTH.BUYLIST

        (G) :CLOSE.GRO.DIBOX
        (W) 5

        (A) $380 "0" ;initialize error flag
        (A) $376 "0" ;SET FLAG
        (Y) 45 ;change status
        (Y)* 47 ;redraw page

        (J) :MAIN.WAIT

;*
(:) :RESTORE.TO.GROWTH.BUYLIST

        (G) :CLOSE.GRO.DIBOX

        (A) $380 "0" ;initialize error flag
        (A) $376 "1" ;SET FLAG
        (Y) 45 ;change status
        (Y)* 47 ;redraw page
```

BEST AVAILABLE COPY

```
        (J) :MAIN.WAIT

    ;•
    (:) :GRO.CARD.IS.FULL

        ;SHOW MESSAGE
        (O) "n.card.dibox.message.s"
        ;;(S) "n.card.dibox.okay.s"
        (S) "n.card.dibox.cancel.s"

        (H) 1
        (V) "The Growth card is full." ●230,250

        (T)
        (T) $33 "n.card.dibox.cancel.s" :CLOSE.GRO.ERROR.DIBOX

        if $399 = 1
                (G) :DEBUG

        (J) :MAIN.WAIT.LOADED

    ;•
    (:) :GRO.CATEG.IS.FULL

        ;SHOW MESSAGE
        (O) "n.card.dibox.message.s"
        ;(S) "n.card.dibox.okay.s"
        (S) "n.card.dibox.cancel.s"

        (H) 1
        (V) "This category on the Growth^ card is full." ●230,250

        (T)
        (T) $33 "n.card.dibox.cancel.s" :CLOSE.GRO.ERROR.DIBOX

        If $399 = 1
                (G) :DEBUG

        (J) :MAIN.WAIT.LOADED
;-----------------------------------------------------------------------------
-------------
;level 3

    ;•
    (:) :CLOSE.GRO.ERROR.DIBOX

        (G) :CLOSE.GRO.DIBOX
        (J) :MAIN.WAIT


;•••••••••••••••••••••••••••••••••••••••••••••••••••••••••••••••••••••••••••••
; GET GROWTH CARD DATA
;•••••••••••••••••••••••••••••••••••••••••••••••••••••••••••••••••••••••••••••
    ;level 2

    ;•
    (:) :SHOW.GROWTH.INT.DATA

        ;HAVE THE DETAILS BEEN EDITED?
        (Q) "$246 = 1" :DONT.PICK.STOCKS.INT
```

BEST AVAILABLE COPY

```
;PICK.STOCKS
(A) $200 "hotsheet.text"
(Y) 40

(:) :DONT.PICK.STOCKS.INT ;but display them
(Y)* 42

(G) :CLEAR.GRO.CARD.TOTAL

;SHOW TOTAL AT TOP OF CARD
(H) 22
stringFormat $290 "%$,n" $24tool
display* $290, ●111,197

(R)

;*
(:) :SHOW.GROWTH.DET.DATA

;HAVE THE DETAILS BEEN EDITED?
(Q) "$246 = 1" :DONT.PICK.STOCKS.DET

;PICK.STOCKS
(A) $200 "hotsheet.text"
(Y) 40

(:) :DONT.PICK.STOCKS.DET
(Y)* 41

(G) :CLEAR.GRO.CARD.TOTAL

;SHOW TOTAL AT TOP OF CARD
(H) 22
stringFormat $290 "%$,n" $24
display* $290, ●111,197

(R)

;*--------------------------------------------------
;level 1 - EDIT GROWTH RECOMMENDATION

;*
(:) :EDIT.GROWTH.REC.LINE0

        ; IF THE NEW LINE IS A HEADER THEN PRETEND WE HIT SOMEWHERE BESIDES
BUTTON
        stringFormat $290 $207          ; save the old stock
        (A) $207 "0"                          ; temporarily set the new st
        (Y) 43                                     ; find out if it's a h
        stringFormat $207 $290          ; restore the stock number to the ol
        if $377 > 99                          ; if the new stock is a heade
                (J) :GROWTH.CARD.LINE0        ;          pretend we hit som

        (G) :UNHIGH.GRO.LINE.CURRENT

        ;ACCEPT LINE NUMBER
        stringFormat $290 $207
        (A) $207 "0"
```

BEST AVAILABLE COPY

BEST AVAILABLE COPY

```
        (Y) 43 ;select current stock

        if $377 = 0
                {
                (G) :HIGH.GRO.LINE.CURRENT
                (J) :MAIN.WAIT
                }

        ;HIGHLIGHT THE SHARES
        (I)* $286 "n.gro.line.shrs.s" ●133,224

        ;WAIT FOR INPUT
        (H) 35
        formattedinput * $71 $158 ●145,266 5 40  ;number of shares

        ;SET FLAG
        (A) $246 "1" ;detail edit made

        ;BLANK THIS LINE
        (S)* "n.gro.line.shrs.s" ●133,224 ;current line
        (S)* "n.gro.$value.blnk.s" ●133,270 ;current line

        (G) :BLANK.GRO.LINE.IMRA
        (G) :HIGH.GRO.LINE.CURRENT

        ;REDISPLAY THIS LINE & IMRA
        (Y)* 44

        (J) :MAIN.WAIT

;*
(:) :EDIT.GROWTH.REC.LINE1

        ; IF THE NEW LINE IS A HEADER THEN PRETEND WE HIT SOMEWHERE BESIDES
BUTTON
        stringFormat $290 $207              ; save the old stock
        (A) $207 "1"                                ; temporarily set the new st
        (Y) 43                                              ; find out if it's a he
        stringFormat $207 $290              ; restore the stock number to the olc
        if $377 > 99                                ; if the new stock is a header
                (J) :GROWTH.CARD.LINE1              ;       pretend we hit som


        (G) :UNHIGH.GRO.LINE.CURRENT

        ;ACCEPT LINE NUMBER
        (A) $207 "1"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }
```

```
;HIGHLIGHT THE SHARES
(I)* $286 "n.gro.line.shrs.s" ●149,224 ;current line

;WAIT FOR INPUT
(H) 35
formattedInput * $72 $158 ●161,266 5 40 ;number of shares

;SET FLAG
(A) $246 "1" ;detail edit made

;BLANK THIS LINE
(S)* "n.gro.line.shrs.s" ●149,224 ;current line
(S)* "n.gro.$value.blnk.s" ●149,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

.*
( ) :EDIT.GROWTH.REC.LINE2

        ; IF THE NEW LINE IS A HEADER THEN PRETEND WE HIT SOMEWHERE BESIDES
BUTTON
        stringFormat $290 $207             ; save the old stock
        (A) $207 "2"                               ; temporarily set the new st
        (Y) 43                                               ; find out if it's a he
        stringFormat $207 $290             ; restore the stock number to the olc
        if $377 > 99                               ; if the new stock is a heade
                (J) :GROWTH.CARD.LINE2             ;       pretend we hit som


(G) :UNHIGH.GRO.LINE.CURRENT

;ACCEPT LINE NUMBER
(A) $207 "2"

(Y) 43 ;select current stock

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }


;HIGHLIGHT THE SHARES
(I)* $286 "n.gro.line.shrs.s" ●165,224 ;hi current line

;WAIT FOR INPUT
(H) 35
formattedInput * $73 $158 ●177,266 5 40 ;number of shares

;SET FLAG
```

BEST AVAILABLE COPY

```
(A) $246 "1" ;detail edit made

;BLANK THIS LINE
(S)* "n.gro.line.shrs.s" ●165,224 ;current line
(S)* "n.gro.$value.blnk.s" ●165,270 ;current line

(G) :BLANK.GRO.LINE.IMRA
(G) :HIGH.GRO.LINE.CURRENT
```

BEST AVAILABLE COPY

```
;REDISPLAY THIS LINE & IMRA
(Y)* 44

(J) :MAIN.WAIT

.*
(.) :EDIT.GROWTH.REC.LINE3

        ; IF THE NEW LINE IS A HEADER THEN PRETEND WE HIT SOMEWHERE BESIDE
BUTTON
        stringFormat $290 $207                  ; save the old stock
        (A) $207 "3"                                    ; temporarily set the new s
        (Y) 43                                                  ; find out if it's a h
        stringFormat $207 $290                  ; restore the stock number to the o
        if $377 > 99                                    ; if the new stock is a head
                (J) :GROWTH.CARD.LINE3          ;       pretend we hit son


        (G) :UNHIGH.GRO.LINE.CURRENT

        ;ACCEPT LINE NUMBER
        (A) $207 "3"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }


        ;HIGHLIGHT THE SHARES
        (I)* $286 "n.gro.line.shrs.s" ●181,224 ;hi current line

        ;WAIT FOR INPUT
        (H) 35
        formattedInput * $74 $158 ●193,266 5 40 ;number of shares

        ;SET FLAG
        (A) $246 "1" ;detail edit made

        ;BLANK THIS LINE
        (S)* "n.gro.line.shrs.s" ●181,224 ;current line
        (S)* "n.gro.$value.blnk.s" ●181,270 ;current line

        (G) :BLANK.GRO.LINE.IMRA
        (G) :HIGH.GRO.LINE.CURRENT
```

BEST AVAILABLE COPY

```
        ;REDISPLAY THIS LINE & IMRA
        (Y)* 44

        (J) :MAIN.WAIT

•
( ) :EDIT.GROWTH.REC.LINE4

        ; IF THE NEW LINE IS A HEADER THEN PRETEND WE HIT SOMEWHERE BESIDES
BUTTON
        stringFormat $290 $207              ; save the old stock
        (A) $207 "4"                               ; temporarily set the new stc
        (Y) 43                                             ; find out if it's a he.
        stringFormat $207 $290              ; restore the stock number to the old
        if $377 > 99                               ; if the new stock is a header
                (J) :GROWTH.CARD.LINE4             ;           pretend we hit som

        (G) :UNHIGH.GRO.LINE.CURRENT

        ;ACCEPT LINE NUMBER
        (A) $207 "4"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }

        ;HIGHLIGHT THE SHARES
        (I)* $286 "n.gro.line.shrs.s" @197,224 ;hi current line

        ;WAIT FOR INPUT
        (H) 35
        formattedinput * $75 $158 @209,266 5 40  ;number of shares

        ;SET FLAG
        (A) $246 "1" ;detail edit made

        ;BLANK THIS LINE
        (S)* "n.gro.line.shrs.s" @197,224 ;current line
        (S)* "n.gro.$value.blnk.s" @197,270 ;current line

        (G) :BLANK.GRO.LINE.IMRA
        (G) :HIGH.GRO.LINE.CURRENT

        ;REDISPLAY THIS LINE & IMRA
        (Y)* 44

        (J) :MAIN.WAIT

;•
( ) :EDIT.GROWTH.REC.LINE5
```

```
        ; IF THE NEW LINE IS A HEADER THEN PRETEND WE HIT SOMEWHERE BESIDE
BUTTON
        stringFormat $290 $207              ; save the old stock
        (A) $207 "5"                                ; temporarily set the new s
        (Y) 43                                              ; find out if it's a h
        stringFormat $207 $290              ; restore the stock number to the c
        if $377 > 99                                ; if the new stock is a head
                (J) :GROWTH.CARD.LINES5             ;       pretend we hit sor
```

BEST AVAILABLE COPY

```
        (G) :UNHIGH.GRO.LINE.CURRENT

        ;ACCEPT LINE NUMBER
        (A) $207 "5"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }


        ;HIGHLIGHT THE SHARES
        (I)* $286 "n.gro.line.shrs.s" ●213,224 ;hi current line

        ;WAIT FOR INPUT
        (H) 35
        formattedInput * $76 $158 ●225,266 5 40  ;number of shares

        ;SET FLAG
        (A) $246 "1" ;detail edit made

        ;BLANK THIS LINE
        (S)* "n.gro.line.shrs.s" ●213,224 ;current line
        (S)* "n.gro.$value.blnk.s" ●213,270 ;current line

        (G) :BLANK.GRO.LINE.IMRA
        (G) :HIGH.GRO.LINE.CURRENT

        ;REDISPLAY THIS LINE & IMRA
        (Y)* 44

        (J) :MAIN.WAIT

;*
(:) :EDIT.GROWTH.REC.LINE6

        ; IF THE NEW LINE IS A HEADER THEN PRETEND WE HIT SOMEWHERE BESIDES
BUTTON
        stringFormat $290 $207              ; save the old stock
        (A) $207 "6"                                ; temporarily set the new stc
        (Y) 43                                              ; find out if it's a he
        stringFormat $207 $290              ; restore the stock number to the old
        if $377 > 99                                ; if the new stock is a header
```

```
(J) :GROWTH.CARD.LINE6                  ;         pretend we hit some

(G) :UNHIGH.GRO.LINE.CURRENT

;ACCEPT LINE NUMBER
(A) $207 "6"

(Y) 43 ;select current stock

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }

;HIGHLIGHT THE SHARES
(I)* $286 "n.gro.line.shrs.s" @229,224 ;hi current line

;WAIT FOR INPUT
(H) 35
formattedInput * $77 $158 @241,266 5 40  ;number of shares

;SET FLAG
(A) $246 "1" ;detail edit made

;BLANK THIS LINE
(S)* "n.gro.line.shrs.s" @229,224 ;current line
(S)* "n.gro.$value.blnk.s" @229,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
(:) :EDIT.GROWTH.REC.LINE7

        ; IF THE NEW LINE IS A HEADER THEN PRETEND WE HIT SOMEWHERE BESIDES
BUTTON
        stringFormat $290 $207          ; save the old stock
        (A) $207 "7"                           ; temporarily set the new sto
        (Y) 43                                         ; find out if it's a hea
        stringFormat $207 $290          ; restore the stock number to the old
        if $377 > 99                           ; if the new stock is a header
                (J) :GROWTH.CARD.LINE7         ;        pretend we hit some

        (G) :UNHIGH.GRO.LINE.CURRENT

        ;ACCEPT LINE NUMBER
        (A) $207 "7"
```

BEST AVAILABLE COPY

BEST AVAILABLE COPY

```
(Y) 43 ;select current stock

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }


;HIGHLIGHT THE SHARES
(I)* $286 "n.gro.line.shrs.s" @245,224 ;hi current line

;WAIT FOR INPUT
(H) 35
formattedInput * $78 $158 @257,266 5 40  ;number of shares

;SET FLAG
(A) $246 "1" ;detail edit made

;BLANK THIS LINE
(S)* "n.gro.line.shrs.s" @245,224 ;current line
(S)* "n.gro.$value.blnk.s" @245,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
( ) :EDIT.GROWTH.REC.LINE8

        ; IF THE NEW LINE IS A HEADER THEN PRETEND WE HIT SOMEWHERE BESIDES
BUTTON
        stringFormat $290 $207                  ; save the old stock
        (A) $207 "8"                                     ; temporarily set the new sto
        (Y) 43                                                   ; find out if it's a hea
        stringFormat $207 $290                  ; restore the stock number to the old
        if $377 > 99                                     ; if the new stock is a header
                (J) :GROWTH.CARD.LINE8           ;         pretend we hit some


        (G) :UNHIGH.GRO.LINE.CURRENT

        ;ACCEPT LINE NUMBER
        (A) $207 "8"

        (Y) 43 ;select current stock

        if $377 = 0
                {
                (G) :HIGH.GRO.LINE.CURRENT
                (J) :MAIN.WAIT
                }
```

```
if $377 > 99
        {
        (G) :HIGH.GRO.LINE.CURRENT
        (J) :MAIN.WAIT
        }
```

BEST AVAILABLE COPY

```
;HIGHLIGHT THE SHARES
(I)* $286 "n.gro.line.shrs.s" ●261,224 ;hi current line

;WAIT FOR INPUT
(H) 35
formattedInput * $79 $158 ●273  56 5 40  ;number of shares

;SET FLAG
(A) $246 "1" ;detail edit made

;BLANK THIS LINE
(S)* "n.gro.line.shrs.s" ●261,224 ;current line
(S)* "n.gro.$value.blnk.s" ●261,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
(L) :EDIT.GROWTH.REC.LINE9

        ; IF THE NEW LINE IS A HEADER THEN PRETEND WE HIT SOMEWHERE BESIDES
BUTTON
        stringFormat $290 $207                  ; save the old stock
        (A) $207 "9"                                    ; temporarily set the new stc
        (Y) 43                                              ; find out if it's a he
        stringFormat $207 $290                  ; restore the stock number to the old
        if $377 > 99                                    ; if the new stock is a header
                (J) :GROWTH.CARD.LINE9                  ;         pretend we hit som

        (G) :UNHIGH.GRO.LINE.CURRENT

        ;ACCEPT LINE NUMBER
        (A) $207 "9"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }
```

BEST AVAILABLE COPY

```
;HIGHLIGHT THE SHARES
(I)* $286 "n.gro.line.shrs.s" ●277,224 ;hi current line

;WAIT FOR INPUT
(H) 35
formattedInput * $80 $158 ●289,266 5 40  ;number of shares

;SET FLAG
(A) $246 "1" ;detail edit made

;BLANK THIS LINE
(S)* "n.gro.line.shrs.s" ●277,224 ;current line
(S)* "n.gro.$value.blnk.s" ●277 70 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
(:) :EDIT.GROWTH.REC.LINE10

; IF THE NEW LINE IS A HEADER THEN PRETEND WE HIT SOMEWHERE BESIDE
BUTTON
stringFormat $290 $207                  ; save the old stock
(A) $207 "10"                                ; temporarily set the new s
(Y) 43                                            ; find out if it's a h
stringFormat $207 $290                  ; restore the stock number to the ol
if $377 > 99                                   ; if the new stock is a heade
        (J) :GROWTH.CARD.LINE10       ;         pretend we hit son

(G) :UNHIGH.GRO.LINE.CURRENT

;ACCEPT LINE NUMBER
(A) $207 "10"

(Y) 43 ;select current stock

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }

;HIGHLIGHT THE SHARES
(I)* $286 "n.gro.line.shrs.s" ●293,224 ;hi current line

;WAIT FOR INPUT
(H) 35
formattedInput * $81 $158 ●305,266 5 40  ;number of shares

;SET FLAG
```

```
(A) $246 "1" ;detail edit made

;BLANK THIS LINE
(S)* "n.gro.line.shrs.s" ●293,224 ;current line
(S)* "n.gro.$value.blnk.s" ●293,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
( ) :EDIT.GROWTH.REC.LINE11

    ; IF THE NEW LINE IS A HEADER THEN PRETEND WE HIT SOMEWHERE BESIDES
BUTTON
    stringFormat $290 $207            ; save the old stock
    (A) $207 "11"                        ; temporarily set the new st
    (Y) 43                                  ; find out if it's a he
    stringFormat $207 $290            ; restore the stock number to the olc
    if $377 > 99                         ; if the new stock is a header
        (J) :GROWTH.CARD.LINE11          ;       pretend we hit som


    (G) :UNHIGH.GRO.LINE.CURRENT

    ;ACCEPT LINE NUMBER
    (A) $207 "11"

    (Y) 43 ;select current stock

    if $377 = 0
        {
        (G) :HIGH.GRO.LINE.CURRENT
        (J) :MAIN.WAIT
        }

    If $377 > 99
        {
        (G) :HIGH.GRO.LINE.CURRENT
        (J) :MAIN.WAIT
        }


    ;HIGHLIGHT THE SHARES
    (I)* $286 "n.gro.line.shrs.s" ●309,224 ;hi current line

    ;WAIT FOR INPUT
    (H) 35
    formattedInput * $82 $158 ●321,266 5 40  ;number of shares

    ;SET FLAG
    (A) $246 "1" ;detail edit made

    ;BLANK THIS LINE
    (S)* "n.gro.line.shrs.s" ●309,224 ;current line
    (S)* "n.gro.$value.blnk.s" ●309,270 ;current line

    (G) :BLANK.GRO.LINE.IMRA
    (G) :HIGH.GRO.LINE.CURRENT
```

BEST AVAILABLE COPY

```
;REDISPLAY THIS LINE & IMRA
(Y)* 44

(J) :MAIN.WAIT
```

BEST AVAILABLE COPY

```
;*
( ) :EDIT.GROWTH.REC.LINE12

        ; IF THE NEW LINE IS A HEADER THEN PRETEND WE HIT SOMEWHERE BESIDES
BUTTON
        stringFormat $290 $207                  ; save the old stock
        (A) $207 "12"                                   ; temporarily set the new st
        (Y) 43                                                  ; find out if it's a he
        stringFormat $207 $290                  ; restore the stock number to the ol
        if $377 > 99                                    ; if the new stock is a heade
                (J) :GROWTH.CARD.LINE12                 ;       pretend we hit som


        (G) :UNHIGH.GRO.LINE.CURRENT

        ;ACCEPT LINE NUMBER
        (A) $207 "12"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }


        ;HIGHLIGHT THE SHARES
        (I)* $286 "n.gro.line.shrs.s" @325,224 ;hi current line

        ;WAIT FOR INPUT
        (H) 35
        formattedInput * $83 $158 @337,266 5 40  ;number of shares

        ;SET FLAG
        (A) $246 "1" ;detail edit made

        ;BLANK THIS LINE
        (S)* "n.gro.line.shrs.s" @325,224 ;current line
        (S)* "n.gro.$value.blnk.s" @325,270 ;current line

        (G) :BLANK.GRO.LINE.IMRA
        (G) :HIGH.GRO.LINE.CURRENT

        ;REDISPLAY THIS LINE & IMRA
        (Y)* 44

        (J) :MAIN.WAIT

;*
(:) :EDIT.GROWTH.REC.LINE13
```

```
        ; IF THE NEW LINE IS A HEADER THEN PRETEND WE HIT SOMEWHERE BESIDE!
BUTTON
        stringFormat $290 $207              ; save the old stock
        (A) $207 "13"                               ; temporarily set the new st
        (Y) 43                                              ; find out if it's a h
        stringFormat $207 $290              ; restore the stock number to the ol
        if $377 > 99                                ; if the new stock is a heade
                (J) :GROWTH.CARD.LINE13             ;           pretend we hit som


        (G) :UNHIGH.GRO.LINE.CURRENT

        ;ACCEPT LINE NUMBER
        (A) $207 "13"

        (Y) 43 ;select current stock

        if $377 = 0
                {
                (G) :HIGH.GRO.LINE.CURRENT
                (J) :MAIN.WAIT
                }

        if $377 > 99
                {
                (G) :HIGH.GRO.LINE.CURRENT
                (J) :MAIN.WAIT
                }

        ;HIGHLIGHT THE SHARES
        (I)* $286 "n.gro.line.shrs.s" @341,224 ;hi current line

        ;WAIT FOR INPUT
        (H) 35
        formattedInput * $84 $158 @352,266 5 40  ;number of shares

        ;SET FLAG
        (A) $246 "1" ;detail edit made

        ;BLANK THIS LINE
        (S)* "n.gro.line.shrs.s" @341,224 ;current line
        (S)* "n.gro.$value.blnk.s" @341,270 ;current line

        (G) :BLANK.GRO.LINE.IMRA
        (G) :HIGH.GRO.LINE.CURRENT

        ;REDISPLAY THIS LINE & IMRA
        (Y)* 44

        (J) :MAIN.WAIT

;*
(:) :EDIT.GROWTH.REC.LINE14

        ; IF THE NEW LINE IS A HEADER THEN PRETEND WE HIT SOMEWHERE BESIDES T
BUTTON
        stringFormat $290 $207              ; save the old stock
        (A) $207 "14"                               ; temporarily set the new sto
        (Y) 43                                              ; find out if it's a hea
        stringFormat $207 $290              ; restore the stock number to the old
        if $377 > 99                                ; if the new stock is a header t
```

BEST AVAILABLE COPY

```
(J) :GROWTH.CARD.LINE14                    ;        pretend we hit sor

(G) :UNHIGH.GRO.LINE.CURRENT

;ACCEPT LINE NUMBER
(A) $207 "14"

(Y) 43 ;select current stock

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }

;HIGHLIGHT THE SHARES
(I)* $286 "n.gro.line.shrs.s" @357,224 ;hi current line

;WAIT FOR INPUT
(H) 35
formattedInput * $60 $158 @368,266 5 40  ;number of shares

;SET FLAG
(A) $246 "1" ;detail edit made

;BLANK THIS LINE
(S)* "n.gro.line.shrs.s" @357,224 ;current line
(S)* "n.gro.$value.blnk.s" @357,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;*
(:) :EDIT.GROWTH.REC.LINE15 ;16th & last slot on card

        ; IF THE NEW LINE IS A HEADER THEN PRETEND WE HIT SOMEWHERE BESIDES
BUTTON
        stringFormat $290 $207              ; save the old stock
        (A) $207 "15"                               ; temporarily set the new sto
        (Y) 43                                               ; find out if it's a hea
        stringFormat $207 $290              ; restore the stock number to the old
        if $377 > 99                                ; if the new stock is a header
                (J) :GROWTH.CARD.LINE15             ;        pretend we hit some

        (G) :UNHIGH.GRO.LINE.CURRENT

        ;ACCEPT LINE NUMBER
        (A) $207 "15"
```

Money Advice Scan File

BEST AVAILABLE COPY

BEST AVAILABLE COPY

```
(Y) 43   ;SELECT CURRENT STOCK

if $377 = 0
        {
        (G) :HIGH.GRO.LINE.CURRENT
        (J) :MAIN.WAIT
        }

if $377 > 99
        {
        (G) :HIGH.GRO.LINE.CURRENT
        (J) :MAIN.WAIT
        }


;HIGHLIGHT THE SHARES
(I)* $286 "n.gro.line.shrs.s" ●373,224 ;hi current line

;WAIT FOR INPUT
(H) 35
formattedInput * $61 $158 ●385,266 5 40  ;number of shares

;SET FLAG
(A) $246 "1" ;detail edit made

;BLANK THIS LINE
(S)* "n.gro.line.shrs.s" ●373,224 ;current line
(S)* "n.gro.$value.blnk.s" ●373,270 ;current line

(G) :BLANK.GRO.LINE.IMRA
(G) :HIGH.GRO.LINE.CURRENT

;REDISPLAY THIS LINE & IMRA
(Y)* 44

(J) :MAIN.WAIT

;••••••••••••••••••••••••••••••••••••••••••••••••••••••••••••••••••••••••••••••••
•••••••
;SECTION 0 - CLEAR SCREEN
;••••••••••••••••••••••••••••••••••••••••••••••••••••••••••••••••••••••••••••••••
•••••••

;•
( ) :CLEAR.CENTER
                ; clears center screen and subsection flags,
                ; leaves mainmenu section active and highlit,
                ; resets <next> to head of section

        ;- check for any submenu's
                if $242 <> 0        ;if a submenu is open
                (G) :CLOSE.THIS.SUBMENU

        ;- clear center
                (G) :CLEAR.CENTER.SCREEN.FROM.BUTTON

        ;- do prompt
                (G) :FILL.PROMPT.CLEAR
                (G) :SHOW.FIRST.PROMPT

        ;- set next/back to head of section. Any attempt to maintain a place
         ;internally in a section would be impossible because graphics are aggregated.
```

BEST AVAILABLE COPY

```
;back
        (A) $298 "99"

;next
        if $241 = 1
                (A) $299 ":PREFACE.1"
        else
        if $241 = 2
                (A) $299 "99"
        else
        if $241 = 3
                (A) $299 "99"
        else
        if $241 = 4
                (A) $299 "99"
        else
        if $241 = 5
                (A) $299 "99"
        else
        if $241 = 6
                (A) $299 "99"

(G) :SHOW.NEXTBACK

;- set flags
        ;no ;(A) $241 "0" ;no mainmenu section active
        (A) $243 "0" ;no submenu segment is on center screen
        ;(A) $220 "0" ;center is inactive

;- redraw mainmenu only if clear is used to reset everything
        ;no ;(G) :REFRESH.MAINMENU

;- leave
        (J) :MAIN.WAIT

;**************************************************************************
*******
;SECTION 1 - SHOW INVESTMENT OPTIONS
;**************************************************************************
*******

;*
(:) :PREFACE.1    ;SEA OF OPTIONS

        (G) :CLEAR.CENTER.SCREEN.FROM.BUTTON

        (J) :SHOW.THE.SEA

                (:) :PREFACE.1.BACK
                (S)* "n.tidy.muniB.blnk.s"
                (S)* "n.tidy.saving.blnk.s"
                (S)* "n.tidy.stock.blnk.s"
                (S)* "n.tidy.$mktfund.blnk.s"
                (S)* "n.tidy.credit.blnk.s"
                (S)* "n.tidy.bondfund.blnk.s"
                (S)* "n.tidy.govtB.blnk.s"
        (S)* "n.tidy.stkfund.blnk.s"
                (S)* "n.tidy.C/paper.blnk.s"
                (S)* "n.tidy.ck.blnk.s"
                (S)* "n.tidy.corpB.blnk.s"

        ;*
        (:) :SHOW.THE.SEA
```

```
(G) :FILL.PROMPT.1.1
(G) :SHOW.FIRST.PROMPT

(S)* "n.preface.sea.govtB.s"
(S)* "n.preface.sea.ck.s"
(S)* "n.preface.sea.bondfund.s"
(S)* "n.preface.sea.stkfund.s"
(S)* "n.preface.sea.muniB.s"
(S)* "n.preface.sea.credit.s"
(S)* "n.preface.sea.corpB.s"
(S)* "n.preface.sea.govtAg.s"
(S)* "n.preface.sea.C/paper.s"
(S)* "n.preface.sea.saving.s"
(S)* "n.preface.sea.$mktfund.s"
(S)* "n.preface.sea.stock.s"

;SHOW THE SEA HIGHLIGHTS
;1 •
        (:) :SEA.CREDIT
        (Q) "$162 = 1" :HIGHLIGHT.SEA.CREDIT
        (J) :SEA.NO.CREDIT

        (:) :HIGHLIGHT.SEA.CREDIT
        (S)* "n.preface.sea.credit!.s"

        (:) :SEA.NO.CREDIT

;2      •
        (:) :SEA.GOVTB
        (Q) "$164 = 1" :HIGHLIGHT.SEA.GOVTB
        (J) :SEA.NO.GOVTB

        (:) :HIGHLIGHT.SEA.GOVTB
        (S)* "n.preface.sea.govtB!.s"

        (:) :SEA.NO.GOVTB

;3      •
        (:) :SEA.STKFUND
        (Q) "$171 = 1" :HIGHLIGHT.SEA.STKFUND
        (J) :SEA.NO.STKFUND

        (:) :HIGHLIGHT.SEA.STKFUND
        (S)* "n.preface.sea.stkfund!.s"

        (:) :SEA.NO.STKFUND

;4      ;•
        (:) :SEA.SAVINGS
        (Q) "$161 = 1" :HIGHLIGHT.SEA.SAVINGS
        (J) :SEA.NO.SAVINGS

        (:) :HIGHLIGHT.SEA.SAVINGS
        (S)* "n.preface.sea.saving!.s"

        (:) :SEA.NO.SAVINGS

;5      •
        (:) :SEA.CORPB
        (Q) "$163 = 1" :HIGHLIGHT.SEA.CORPB
        (J) :SEA.NO.CORPB

        (:) :HIGHLIGHT.SEA.CORPB
```

BEST AVAILABLE COPY

```
(S)* "n.preface.sea.corpB!.s"

(:) :SEA.NO.CORPB
```

BEST AVAILABLE COPY

```
;6      •
        (:) :SEA.STOCK
        (Q) "$170 = 1" :HIGHLIGHT.SEA.STOCK
        (J) :SEA.NO.STOCK

        (:) :HIGHLIGHT.SEA.STOCK
        (S)* "n.preface.sea.stock!.s"

        (:) :SEA.NO.STOCK

;7      ;•
        (:) :SEA.CHECKING
        (Q) "$160 = 1" :HIGHLIGHT.SEA.CHECKING
        (J) :SEA.NO.CHECKING

        (:) :HIGHLIGHT.SEA.CHECKING
        (S)* "n.preface.sea.ck!.s"

        (:) :SEA.NO.CHECKING

;8      •
        (:) :SEA.MMF
        (Q) "$169 = 1" :HIGHLIGHT.SEA.MMF
        (J) :SEA.NO.MMF

        (:) :HIGHLIGHT.SEA.MMF
        (S)* "n.preface.sea.$mktfund!.s"

        (:) :SEA.NO.MMF

;9 •
        (:) :SEA.C/PAPER
        (Q) "$167 = 1" :HIGHLIGHT.SEA.C/PAPER
        (J) :SEA.NO.C/PAPER

        (:) :HIGHLIGHT.SEA.C/PAPER
        (S)* "n.preface.sea.C/paper!.s"

        (:) :SEA.NO.C/PAPER

;10     •
        (:) :SEA.BONDFUND
        (Q) "$166 = 1" :HIGHLIGHT.SEA.BONDFUND
        (J) :SEA.NO.BONDFUND

        (:) :HIGHLIGHT.SEA.BONDFUND
        (S)* "n.preface.sea.bondfund!.s"

        (:) :SEA.NO.BONDFUND

;11 •
        (:) :SEA.MUNIB
        (Q) "$165 = 1" :HIGHLIGHT.SEA.MUNIB
        (J) :SEA.NO.MUNIB

        (:) :HIGHLIGHT.SEA.MUNIB
        (S)* "n.preface.sea.muniB!.s"

        (:) :SEA.NO.MUNIB
```

BEST AVAILABLE COPY

```
;12 •
        (:) :SEA.GOVTAG
        (Q) "$168 = 1" :HIGHLIGHT.SEA.GOVTAG
        (J) :SEA.NO.GOVTAG

        (:) :HIGHLIGHT.SEA.GOVTAG
        (S)* "n.preface.sea.govtAg!.s"

        (:) :SEA.NO.GOVTAG

(G) :REFRESH.MAINMENU

;SET NEXT/BACK
(A) $298 "99"
(A) $299 ":PREFACE.2.NEXT"
(G) :SHOW.NEXTBACK

;SET PREFACE FLAG
(A) $220 "1" ;preface on center
(A) $221 "1" ;preface1
(A) $241 "1" ;mainmenu position

(J) :MAIN.WAIT

    ;————————————————————————————————

    ;LEVEL 2 FOR SEA

    ;1      •
            (:) :ACCEPT.SEA.CHECKING

            (Q) "$160 = 1" :UNACCEPT.SEA.CHECKING
            (A) $160 "1"
            (S)* "n.preface.sea.ck!.s"

            (J) :MAIN.WAIT

            (:) :UNACCEPT.SEA.CHECKING
            (A) $160 "0"
            (S)* "n.preface.sea.ck.s"

            (J) :MAIN.WAIT

    ;2      •
            (:) :ACCEPT.SEA.SAVING

            (Q) "$161 = 1" :UNACCEPT.SEA.SAVING
            (A) $161 "1"
            (S)* "n.preface.sea.saving!.s"

            (J) :MAIN.WAIT

            (:) :UNACCEPT.SEA.SAVING
            (A) $161 "0"
            (S)* "n.preface.sea.saving.s"

            (J) :MAIN.WAIT

    ;3      •
            (:) :ACCEPT.SEA.CREDIT

            (Q) "$162 = 1" :UNACCEPT.SEA.CREDIT
```

BEST AVAILABLE COPY

```
        (A) $162 "1"
        (S)* "n.preface.sea.credit!.s"

        (J) :MAIN.WAIT

        (:) :UNACCEPT.SEA.CREDIT
        (A) $162 "0"
        (S)* "n.preface.sea.credit.s"

        (J) :MAIN.WAIT

;4      *
        (:) :ACCEPT.SEA.GOVTB

        (Q) "$164 = 1" :UNACCEPT.SEA.GOVTB
        (A) $164 "1"
        (S)* "n.preface.sea.govtB!.s"

        (J) :MAIN.WAIT

        (:) :UNACCEPT.SEA.GOVTB
        (A) $164 "0"
        (S)* "n.preface.sea.govtB.s"

        (J) :MAIN.WAIT

;5      *
        (:) :ACCEPT.SEA.BONDFUND

        (Q) "$166 = 1" :UNACCEPT.SEA.BONDFUND
        (A) $166 "1"
        (S)* "n.preface.sea.bondfund!.s"

        (J) :MAIN.WAIT

        (:) :UNACCEPT.SEA.BONDFUND
        (A) $166 "0"
        (S)* "n.preface.sea.bondfund.s"

        (J) :MAIN.WAIT

;6      *
        (:) :ACCEPT.SEA.MUNIB

        (Q) "$165 = 1" :UNACCEPT.SEA.MUNIB
        (A) $165 "1"
        (S)* "n.preface.sea.muniB!.s"

        (J) :MAIN.WAIT

        (:) :UNACCEPT.SEA.MUNIB
        (A) $165 "0"
        (S)* "n.preface.sea.muniB.s"

        (J) :MAIN.WAIT

;7      *
        (:) :ACCEPT.SEA.CORPB

        (Q) "$163 = 1" :UNACCEPT.SEA.CORPB
        (A) $163 "1"
        (S)* "n.preface.sea.corpB!.s"

        (J) :MAIN.WAIT
```

```
(:) :UNACCEPT.SEA.CORPB
(A) $163 "0"
(S)* "n.preface.sea.corpB.s"

(J) :MAIN.WAIT

;8      •
(:) :ACCEPT.SEA.GOVTAG

(Q) "$168 = 1" :UNACCEPT.SEA.GOVTAG
(A) $168 "1"
(S)* "n.preface.sea.govtAg!.s"

(J) :MAIN.WAIT

(:) :UNACCEPT.SEA.GOVTAG
(A) $168 "0"
(S)* "n.preface.sea.govtAg.s"

(J) :MAIN.WAIT

;9      •
(:) :ACCEPT.SEA.C/PAPER

(Q) "$167 = 1" :UNACCEPT.SEA.C/PAPER
(A) $167 "1"
(S)* "n.preface.sea.C/paper!.s"

(J) :MAIN.WAIT

(:) :UNACCEPT.SEA.C/PAPER
(A) $167 "0"
(S)* "n.preface.sea.C/paper.s"

(J) :MAIN.WAIT

;10     •
(:) :ACCEPT.SEA.LONGCD

(Q) "$172 = 1" :UNACCEPT.SEA.LONGCD
(A) $172 "1"
(S)* "n.preface.sea.longCD!.s"

(J) :MAIN.WAIT

(:) :UNACCEPT.SEA.LONGCD
(A) $172 "0"
(S)* "n.preface.sea.LongCD.s"

(J) :MAIN.WAIT

;11     •
(:) :ACCEPT.SEA.MMF

(Q) "$169 = 1" :UNACCEPT.SEA.MMF
(A) $169 "1"
(S)* "n.preface.sea.$mktfund!.s"

(J) :MAIN.WAIT

(:) :UNACCEPT.SEA.MMF
(A) $169 "0"
(S)* "n.preface.sea.$mktfund.s"
```

BEST AVAILABLE COPY

BEST AVAILABLE COPY

```
        (J) :MAIN.WAIT

;12     •
        (:) :ACCEPT.SEA.STOCK

        (Q) "$170 = 1" :UNACCEPT.SEA.STOCK
        (A) $170 "1"
        (S)* "n.preface.sea.stock!.s"

        (J) :MAIN.WAIT

        (:) :UNACCEPT.SEA.STOCK
        (A) $170 "0"
        (S)* "n.preface.sea.stock.s"

        (J) :MAIN.WAIT

;13     •
        (:) :ACCEPT.SEA.STKFUND

        (Q) "$171 = 1" :UNACCEPT.SEA.STKFUND
        (A) $171 "1"
        (S)* "n.preface.sea.stkfund!.s"

        (J) :MAIN.WAIT

        (:) :UNACCEPT.SEA.STKFUND
        (A) $171 "0"
        (S)* "n.preface.sea.stkfund.s"

        (J) :MAIN.WAIT

;***************************************************************************
;SECTION 1 - DEFINE THREE CATEGORIES
;***************************************************************************

;*
(:) :PREFACE.2    ;TIDY

    (G) :CLEAR.CENTER.SCREEN.FROM.BUTTON

(:) :PREFACE.2.NEXT

    ;SHOW.TIDY
    (S)* "n.preface.sea.s"
    (S)* "n.sea.govtAg.blnk.s"
    (S)* "n.sea.muniB.blnk.s"
    (S)* "n.sea.saving.blnk.s"
    (S)* "n.sea.stock.blnk.s"
    (S)* "n.sea.$mktfund.blnk.s"
    (S)* "n.sea.credit.blnk.s"
    (S)* "n.sea.bondfund.blnk.s"
    (S)* "n.sea.govtB.blnk.s"
    (S)* "n.sea.stkfund.blnk.s"
    (S)* "n.sea.C/paper.blnk.s"
    (S)* "n.sea.ck.blnk.s"
    (S)* "n.sea.corpB.blnk.s"

    (S)* "n.preface.tidy.muniB.s"
    (S)* "n.preface.tidy.saving.s"
    (S)* "n.preface.tidy.stock.s"
    (S)* "n.preface.tidy.$mktfund.s"
    (S)* "n.preface.tidy.credit.s"
```

```
(S)* "n.preface.tidy.bondfund.s"
(S)* "n.preface.tidy.govtB.s"
(S)* "n.preface.tidy.stkfund.s"
(S)* "n.preface.tidy.C/paper.s"
(S)* "n.preface.tidy.ck.s"
(S)* "n.preface.tidy.corpB.s"

(J) :TIDY.NEXT

(:)      :PREFACE.2.BACK   ;TIDY
(S)* "n.preface.tidy.s"

(:) :TIDY.NEXT

(G) :FILL.PROMPT.1.2
(G) :SHOW.FIRST.PROMPT

;1 •
        (:) :TIDY.CREDIT
        (Q) "$162 = 1" :HIGHLIGHT.TIDY.CREDIT
        (J) :TIDY.NO.CREDIT

        (:) :HIGHLIGHT.TIDY.CREDIT
        (S)* "n.preface.tidy.credit!.s"

        (:) :TIDY.NO.CREDIT

;2      •
        (:) :TIDY.GOVTB
        (Q) "$164 = 1" :HIGHLIGHT.TIDY.GOVTB
        (J) :TIDY.NO.GOVTB

        (:) :HIGHLIGHT.TIDY.GOVTB
        (S)* "n.preface.tidy.govtB!.s"

        (:) :TIDY.NO.GOVTB

;3      •
        (:) :TIDY.STKFUND
        (Q) "$171 = 1" :HIGHLIGHT.TIDY.STKFUND
        (J) :TIDY.NO.STKFUND

        (:) :HIGHLIGHT.TIDY.STKFUND
        (S)* "n.preface.tidy.stkfund!.s"

        (:) :TIDY.NO.STKFUND

;4      ;•
        (:) :TIDY.SAVINGS
        (Q) "$161 = 1" :HIGHLIGHT.TIDY.SAVINGS
        (J) :TIDY.NO.SAVINGS

        (:) :HIGHLIGHT.TIDY.SAVINGS
        (S)* "n.preface.tidy.saving!.s"

        (:) :TIDY.NO.SAVINGS

;5      •
        (:) :TIDY.CORPB
        (Q) "$163 = 1" :HIGHLIGHT.TIDY.CORPB
        (J) :TIDY.NO.CORPB

        (:) :HIGHLIGHT.TIDY.CORPB
        (S)* "n.preface.tidy.corpB!.s"
```

BEST AVAILABLE COPY (:) :TIDY.NO.CORPB

BEST AVAILABLE COPY

```
;6      •
        (:) :TIDY.STOCK
        (Q) "$170 = 1" :HIGHLIGHT.TIDY.STOCK
        (J) :TIDY.NO.STOCK

        (:) :HIGHLIGHT.TIDY.STOCK
        (S)* "n.preface.tidy.stock!.s"

        (:) :TIDY.NO.STOCK

;7      ;•
        (:) :TIDY.CHECKING
        (Q) "$160 = 1" :HIGHLIGHT.TIDY.CHECKING
        (J) :TIDY.NO.CHECKING

        (:) :HIGHLIGHT.TIDY.CHECKING
        (S)* "n.preface.tidy.ck!.s"

        (:) :TIDY.NO.CHECKING

;8      •
        (:) :TIDY.MMF
        (Q) "$169 = 1" :HIGHLIGHT.TIDY.MMF
        (J) :TIDY.NO.MMF

        (:) :HIGHLIGHT.TIDY.MMF
        (S)* "n.preface.tidy.$mktfund!.s"

        (:) :TIDY.NO.MMF

;9 •
        (:) :TIDY.C/PAPER
        (Q) "$167 = 1" :HIGHLIGHT.TIDY.C/PAPER
        (J) :TIDY.NO.C/PAPER

        (:) :HIGHLIGHT.TIDY.C/PAPER
        (S)* "n.preface.tidy.C/paper!.s"

        (:) :TIDY.NO.C/PAPER

;10     •
        (:) :TIDY.BONDFUND
        (Q) "$166 = 1" :HIGHLIGHT.TIDY.BONDFUND
        (J) :TIDY.NO.BONDFUND

        (:) :HIGHLIGHT.TIDY.BONDFUND
        (S)* "n.preface.tidy.bondfund!.s"

        (:) :TIDY.NO.BONDFUND

;11 •
        (:) :TIDY.MUNIB
        (Q) "$165 = 1" :HIGHLIGHT.TIDY.MUNIB
        (J) :TIDY.NO.MUNIB

        (:) :HIGHLIGHT.TIDY.MUNIB
        (S)* "n.preface.tidy.muniB!.s"

        (:) :TIDY.NO.MUNIB
```

```
;SET NEXT/BACK
(A) $298 ":PREFACE.1.BACK"
(A) $299 ":PREFACE.3"
(G) :SHOW.NEXTBACK

;SET PREFACE FLAG
(A) $220 "1" ;preface on center
(A) $221 "2" ;preface2

(J) :MAIN.WAIT

;------------------------------------------------------------
; LEVEL 2 FOR TIDY

;1        •
          (:) :ACCEPT.TIDY.CHECKING
          (Q) "$160 = 1" :UNACCEPT.TIDY.CHECKING
          (A) $160 "1"
          (S)* "n.preface.tidy.ck!.s"

          (J) :MAIN.WAIT

          (:) :UNACCEPT.TIDY.CHECKING
          (A) $160 "0"
          (S)* "n.preface.tidy.ck.s"

          (J) :MAIN.WAIT

;2        •

          (:) :ACCEPT.TIDY.SAVINGS
          (Q) "$161 = 1" :UNACCEPT.TIDY.SAVINGS
          (A) $161 "1"
          (S)* "n.preface.tidy.saving!.s"

          (J) :MAIN.WAIT

          (:) :UNACCEPT.TIDY.SAVINGS
          (A) $161 "0"
          (S)* "n.preface.tidy.saving.s"

          (J) :MAIN.WAIT

;3        •

          (:) :ACCEPT.TIDY.CREDIT
          (Q) "$162 = 1" :UNACCEPT.TIDY.CREDIT
          (A) $162 "1"
          (S)* "n.preface.tidy.credit!.s"

          (J) :MAIN.WAIT

          (:) :UNACCEPT.TIDY.CREDIT
          (A) $162 "0"
          (S)* "n.preface.tidy.credit.s"

          (J) :MAIN.WAIT

;4        •
```

BEST AVAILABLE COPY

BEST AVAILABLE COPY

```
(:) :ACCEPT.TIDY.GOVTB
(Q) "$164 = 1" :UNACCEPT.TIDY.GOVTB
(A) $164 "1"
(S)* "n.preface.tidy.govtB!.s"

(J) :MAIN.WAIT

(:) :UNACCEPT.TIDY.GOVTB
(A) $164 "0"
(S)* "n.preface.tidy.govtB.s"

(J) :MAIN.WAIT

;5      •

(:) :ACCEPT.TIDY.BONDFUND
(Q) "$166 = 1" :UNACCEPT.TIDY.BONDFUND
(A) $166 "1"
(S)* "n.preface.tidy.bondfund!.s"

(J) :MAIN.WAIT

(:) :UNACCEPT.TIDY.BONDFUND
(A) $166 "0"
(S)* "n.preface.tidy.bondfund.s"

(J) :MAIN.WAIT

;6      •

(:) :ACCEPT.TIDY.MUNIB
(Q) "$165 = 1" :UNACCEPT.TIDY.MUNIB
(A) $165 "1"
(S)* "n.preface.tidy.muniB!.s"

(J) :MAIN.WAIT

(:) :UNACCEPT.TIDY.MUNIB
(A) $165 "0"
(S)* "n.preface.tidy.muniB.s"

(J) :MAIN.WAIT

;7      •

(:) :ACCEPT.TIDY.CORPB
(Q) "$163 = 1" :UNACCEPT.TIDY.CORPB
(A) $163 "1"
(S)* "n.preface.tidy.corpB!.s"

(J) :MAIN.WAIT

(:) :UNACCEPT.TIDY.CORPB
(A) $163 "0"
(S)* "n.preface.tidy.corpB.s"

(J) :MAIN.WAIT

;8      •

(:) :ACCEPT.TIDY.GOVTAG
(Q) "$168 = 1" :UNACCEPT.TIDY.GOVTAG
(A) $168 "1"
(S)* "n.preface.tidy.govtAg!.s"
```

BEST AVAILABLE COPY

```
(J) :MAIN.WAIT

(:) :UNACCEPT.TIDY.GOVTAG
(A) $168 "0"
(S)* "n.preface.tidy.govtAg.s"

(J) :MAIN.WAIT

;9      *

(:) :ACCEPT.TIDY.C/PAPER
(Q) "$167 = 1" :UNACCEPT.TIDY.C/PAPER
(A) $167 "1"
(S)* "n.preface.tidy.C/paper!.s"

(J) :MAIN.WAIT

(:) :UNACCEPT.TIDY.C/PAPER
(A) $167 "0"
(S)* "n.preface.tidy.C/paper.s"

(J) :MAIN.WAIT

;10     *

(:) :ACCEPT.TIDY.MMF
(Q) "$169 = 1" :UNACCEPT.TIDY.MMF
(A) $169 "1"
(S)* "n.preface.tidy.$mktfund!.s"

(J) :MAIN.WAIT

(:) :UNACCEPT.TIDY.MMF
(A) $169 "0"
(S)* "n.preface.tidy.$mktfund.s"

(J) :MAIN.WAIT

;11     *

(:) :ACCEPT.TIDY.STOCK
(Q) "$170 = 1" :UNACCEPT.TIDY.STOCK
(A) $170 "1"
(S)* "n.preface.tidy.stock!.s"

(J) :MAIN.WAIT

(:) :UNACCEPT.TIDY.STOCK
(A) $170 "0"
(S)* "n.preface.tidy.stock.s"

(J) :MAIN.WAIT

;12     *

(:) :ACCEPT.TIDY.STKFUND
(Q) "$171 = 1" :UNACCEPT.TIDY.STKFUND
(A) $171 "1"
(S)* "n.preface.tidy.stkfund!.s"

(J) :MAIN.WAIT

(:) :UNACCEPT.TIDY.STKFUND
```

```
(A) $171 "0"
(S)* "n.preface.tidy.stkfund.s"

(J) :MAIN.WAIT
```

BEST AVAILABLE COPY

```
;* ----------------------------------------------------------------
( ) PREFACE.3   ;BANK LIGHT

        ;UNLIGHT LIT CHIPS
        (S)* "n.preface.tidy.s"

        (:) :PREFACE.3.BACK

        (G) :FILL.PROMPT.1.3
        (G) :SHOW.FIRST.PROMPT

        ;SHOW BANK CHIPS LIT
        (A) $199 ""
        (D)* 7 "n.preface.tidy.bankT.lit.s"
        (W) 1

        ;SET NEXT/BACK
        (A) $298 ":PREFACE.2.BACK"
        (A) $299 ":PREFACE.31"
        (G) :SHOW.NEXTBACK

        ;SET PREFACE FLAG
        (A) $220 "1" ;preface on center
        (A) $221 "3"

        (J) :MAIN.WAIT

;* ----------------------------------------------------------------
( ) :PREFACE.31   ;BANK ICONS

        if $221 = 4  ;if coming back from preface.4
                (S)* "n.preface.tidy.s"  ;unlight lt asset chips

        (G) :FILL.PROMPT.1.4 ;bank use icons
        (G) :SHOW.FIRST.PROMPT

        ;REMOVE BANK CHIPS
        (A) $199 "0" ;speed
        (D)* 7 "n.preface.function.bank.0.s"

        ;DISSOLVE TO FUNCTIONS
        (A) $199 "0" ;speed
        (D)* 7 "n.preface.function.bank.1.s"

        ;SET NEXT/BACK
        (A) $298 ":PREFACE.3.BACK"
        (A) $299 ":PREFACE.4"
        (G) :SHOW.NEXTBACK

        ;SET PREFACE FLAG
        (A) $220 "1" ;preface on center
        (A) $221 "31"

        (J) :MAIN.WAIT

;* ----------------------------------------------------------------
(:) :PREFACE.4   ;LONG TERM ASSETS

        (G) :FILL.PROMPT.1.5 ;long term assets highlighted
```

BEST AVAILABLE COPY

```
(G) :SHOW.FIRST.PROMPT

;UNLIGHT BANK CHIPS
(A) $199 "1"
(D)* 7 "n.preface.tidy.bank.s"

;LIGHT THE INVESTABLES
(A) $199 "0"
(D)* 7 "n.preface.tidy.invT.lit.s"

;SET NEXT/BACK
(A) $298 ":PREFACE.31"
(A) $299 ":PREFACE.41"
(G) :SHOW.NEXTBACK

;SET PREFACE FLAG
(A) $220 "1" ;preface on center
(A) $221 "4"

(J) :MAIN.WAIT

;* ---------------------------------------------------------------
( ) :PREFACE.41  ;INCOME & GROWTH HIGHLIT

        if $221 = 5  ;if coming back from preface 5
                {
                (A) $199 "1"
                (D)* 7 "n.preface.tidy.bank.s"   ;show bank chips
                }

        (G) :FILL.PROMPT.1.6 ;Income and growth divided & highlighted
        (G) :SHOW.FIRST.PROMPT

        ;SPLIT THE INVESTABLES
        (D)* 7 "n.preface.tidy.i/g.lit.s"
        (W) 1

        ;SHOW TITLE
        (D)* 7 "n.preface.tidy.incT.lit.s"
        (W) 1
        (D)* 7 "n.preface.tidy.groT.lit.s"

        ;SET NEXT/BACK
        (A) $298 ":PREFACE.4"
        (A) $299 ":PREFACE.5"
        (G) :SHOW.NEXTBACK

        ;SET PREFACE FLAG
        (A) $220 "1" ;preface on center
        (A) $221 "41"

        (J) :MAIN.WAIT

;* ---------------------------------------------------------------
(:) :PREFACE.5 ;bank mini- graph

        if $221 = 6  ;if coming back from preface.6
                {
                (A) $199 "1" ;speed
                (D)* 7 "n.preface.tidy.incT.lit.s"   ;show income chips
                }

        (G) :FILL.PROMPT.1.7 ;bank mini-graph
        (G) :SHOW.FIRST.PROMPT
```

BEST AVAILABLE COPY

```
;LIGHT BANK CHIPS
(A) $199 "1" ;speed
(D)* 7 "n.preface.tidy.bankT.lit.s"

;REMOVE BANK CHIPS
(A) $199 "1" ;speed
(D)* 7 "n.preface.function.bank.0.s"

(W) 2

;ADD GRAPH
(A) $199 "1000" ;speed
(D)* 6 "n.preface.function.bank.1a.s"

;FILL IN GREY AREA
(S)* "n.preface.function.bank.2a.s"

;SET NEXT/BACK
(A) $298 ":PREFACE.41"
(A) $299 ":PREFACE.6"
(G) :SHOW.NEXTBACK

;SET PREFACE FLAG
(A) $220 "1" ;preface on center
(A) $221 "5"

(J) :MAIN.WAIT

;*--------------------------------------------------------------
(:) :PREFACE.6 ;income mini-graph

if $221 = 7 ;if coming back from preface 7
        {
        (A) $199 "1"
        (D)* 7 "n.preface.tidy.groT.lit.s"   ;show growth chips
        }

(G) :FILL.PROMPT.1.8 ;income mini-graph
(G) :SHOW.FIRST.PROMPT

;REMOVE INCOME CHIPS, ADD TITLES
(A) $199 "0" ;speed
(D)* 7 "n.preface.function.inc.0.s"

(W) 10

;ADD INCOME GRAPH
(A) $199 "1000" ;speed
(D)* 6 "n.preface.function.inc.1.s"

;FILL IN GREY AREA
(S)* "n.preface.function.inc.2.s"

;SET NEXT/BACK
(A) $298 ":PREFACE.5"
(A) $299 ":PREFACE.7"
(G) :SHOW.NEXTBACK

;SET PREFACE FLAG
(A) $220 "1" ;preface on center
(A) $221 "6"
```

```
(J) :MAIN.WAIT

;-------------------------------------------------------------------
( ) PREFACE.7 ;growth mini-graph

        (G) :FILL.PROMPT.1.9 ;growth mini-graph
        (G) :SHOW.FIRST.PROMPT

        ;REMOVE GROWTH CHIPS, ADD TITLES
        (A) $199 "0" ;speed
        (D)* 7 "n.preface.function.gro.0.s"

        (W) 8

        ;ADD GROWTH GRAPH
        (A) $199 "1000" ;speed
        (D)* 6 "n.preface.function.gro.1.s"

        ;FILL IN GREY AREA
        (S)* "n.preface.function.gro.2.s"

        ;SET NEXT/BACK
        (A) $298 ":PREFACE.6"
        (A) $299 ":BUTTON10"
        (G) :SHOW.NEXTBACK

        ;SET PREFACE FLAG
        (A) $220 "1" ;preface on center
        (A) $221 "7"

        (J) :MAIN.WAIT

;*****************************************************************************
;SECTION 1 - COMPARE PAST PERFORMANCE (HP)
;*****************************************************************************

;*
(:) :BUTTON10

        (G) :CLEAR.CENTER.SCREEN.FROM.BUTTON

;* ;SETUP
(:) :BUTTON10.1

        (G) :CLEAR.CENTER.WITH.DISSOLVE

        (:) :BUTTON10.1BACK

        (G) :FILL.PROMPT.1.10 ;field for 15 yr market performance graphs
        (G) :SHOW.FIRST.PROMPT

        ;SHOW GRAPH
        (A) $199 "0" ;speed
        (D)* 7 "n.graph.hp.15yr.nolbl.s"

        ;SHOW YEARS AT BOTTOM
        (Z) 3
        (S) "n.graph.hp.15yr.blnk.s"
        drawIntroGraph 15, years
        (Z) 1
        (U)* 7 "n.graph.hp.15yr.blnk.s"

        ;SET NEXT/BACK
```

BEST AVAILABLE COPY

```
        (A) $298 "99"
        (A) $299 ":BUTTON10.2"
        (G) :SHOW.NEXTBACK

        ;SET PREFACE FLAG
        (A) $220 "10"     ;button flag
        (A) $221 "0"      ;preface off
        (A) $230 "1"      ;button10 on

        (J) :MAIN.WAIT

;* ;BANK GRAPH
( ) :BUTTON10.2

        (G) :FILL.PROMPT.1.11 ;15yr bank graph
        (G) :SHOW.FIRST.PROMPT

        ;ADD BANK GRAPH
        (A) $199 "400" ;speed
        ;(D)* 6 "n.graph.hp.B.s"
        (Z) 3
        (S) "n.graph.hp.15yr.blnk.s"
        drawIntroGraph 15, years, bank
        (Z) 1
        (U)* 6 "n.graph.hp.15yr.blnk.s"

        ;SET NEXT/BACK
        (A) $298 ":BUTTON10.1BACK"
        (A) $299 ":BUTTON10.3"
        (G) :SHOW.NEXTBACK

        ;SET FLAG
        (A) $230 "2"

        (J) :MAIN.WAIT

;* ;CPI GRAPH
(:) :BUTTON10.3

        (G) :FILL.PROMPT.1.12 ;bank vs cpi graph
        (G) :SHOW.FIRST.PROMPT

        ;ADD CPI GRAPH WITH GREY
        (A) $199 "0" ;speed
        ;(D)* 7 "n.graph.hp.BvsCPI.grey.s"
        (Z) 3
        (S) "n.graph.hp.15yr.blnk.s"
        drawIntroGraph 15, years, bank, cpi+shade
        (Z) 1
        (U)* 7 "n.graph.hp.15yr.blnk.s"

        ;SET NEXT/BACK
        (A) $298 ":BUTTON10.2"
        (A) $299 ":BUTTON10.4"
        (G) :SHOW.NEXTBACK

        ;SET FLAG
        (A) $230 "3"

        (J) :MAIN.WAIT
```

BEST AVAILABLE COPY

BEST AVAILABLE COPY

```
.• .REMOVE CPI
( ) .BUTTON10.4

        (G) :FILL.PROMPT.1.13 ;income vs bank
        (G) :SHOW.FIRST.PROMPT

        ;REMOVE CPI
        (A) $199 "0" ;speed
        ;(D)* 7 "n.graph.hp.B.s"
        (Z) 3
        (S) "n.graph.hp.15yr.blnk.s"
        drawIntroGraph 15, years, bank
        (Z) 1
        (U)* 7 "n.graph.hp.15yr.blnk.s"

        ;ADD BANK GREY
        (A) $199 "100" ;speed
        ;(D)* 1 "n.graph.hp.Bgrey.s"
        (Z) 3
        (S) "n.graph.hp.15yr.blnk.s"
        drawIntroGraph 15, years, bank+shade
        (Z) 1
        (U)* 1 "n.graph.hp.15yr.blnk.s"

        ;ADD INCOME
        (A) $199 "400" ;speed
        ;(D)* 6 "n.graph.hp.BvsI.s"
        (Z) 3
        (S) "n.graph.hp.15yr.blnk.s"
        drawIntroGraph 15, years, bank+shade, income
        (Z) 1
        (U)* 6 "n.graph.hp.15yr.blnk.s"

        ;SET NEXT/BACK
        (A) $298 ":BUTTON10.3"
        (A) $299 ":BUTTON10.5"
        (G) :SHOW.NEXTBACK

        ;SET FLAG
        (A) $230 "4"

        (J) :MAIN.WAIT

.• ;STRETCH INCOME (HELD TO MATURITY)
( ) :BUTTON10.5

        (G) :FILL.PROMPT.1.14 income rounded curve
        (G) :SHOW.FIRST.PROMPT

        ;SHOW STRETCHED INCOME LINE
        ;(S)* "n.graph.hp.BvsI(fixed).s"
        (Z) 3
        (S) "n.graph.hp.15yr.blnk.s"
        drawIntroGraph 15, years, bank+shade, smoothIncome
        (Z) 1
        (U)* 0 "n.graph.hp.15yr.blnk.s"

        ;SET NEXT/BACK
        (A) $298 ":BUTTON10.4"
        (A) $299 ":BUTTON10.6"
        (G) :SHOW.NEXTBACK

        ;SET FLAG
```

BEST AVAILABLE COPY

```
        (A) $230 "5"

        (J) :MAIN.WAIT

.* ;ADD GROWTH GRAPH
( ) BUTTON10.6

        (G) :FILL.PROMPT.1.15 ;growth vs bank graph
        (G) :SHOW.FIRST.PROMPT

        ;REMOVE INCOME
        (A) $199 "0" ;speed
        ;(D)* 7 "n.graph.hp.Bgrey.s"
        (Z) 3
        (S) "n.graph.hp.15yr.blnk.s"
        drawIntroGraph 15, years, bank+shade
        (Z) 1
        (U)* 7 "n.graph.hp.15yr.blnk.s"

        ;ADD GROWTH
        (A) $199 "400" ;speed
        ;(D)* 6 "n.graph.hp.BvsG.s"
        (Z) 3
        (S) "n.graph.hp.15yr.blnk.s"
        drawIntroGraph 15, years, bank+shade, growth
        (Z) 1
        (U)* 6 "n.graph.hp.15yr.blnk.s"

        ;SET NEXT/BACK
        (A) $298 ":BUTTON10.5"
        (A) $299 ":BUTTON10.7"
        (G) :SHOW.NEXTBACK

        ;SET FLAG
        (A) $230 "6"

        (J) :MAIN.WAIT

;* ;B.I.G. GRAPH

(:) :BUTTON10.7BACK ;return from 10.8 event

        ;SHOW GRAPH, BIG and YEARS AT BOTTOM
        ;(RESTORE BACKGROUND)
        (Z) 3
        (S) "n.graph.hp.15yr.blnk.s"
        (S) "n.graph.hp.BIG.s"
        (S) "n.graph.hp.dates.15yr.s"
        (Z) 1
        (A) $199 "0" ;speed
        (U)* 7 "n.graph.hp.15yr.blnk.s"

        (G) :FILL.PROMPT.1.16 ;three graphs over 15 yrs
        (G) :SHOW.FIRST.PROMPT

        (J) :BUTTON10.7.AFTER.DISSOLVE

(:) :BUTTON10.7

        (G) :FILL.PROMPT.1.16 ;three graphs over 15 yrs
        (G) :SHOW.FIRST.PROMPT
```

BEST AVAILABLE COPY

```
        ;SHOW BIG
        (A) $199 "1" ;speed
        ;(D)* 7 "n.graph.hp.BIG.s"
        (Z) 3
        (S) "n.graph.hp.15yr.blnk.s"
        drawIntroGraph 15, years, bank+shade, income, growth
        (Z) 1
        (U)* 7 "n.graph.hp.15yr.blnk.s"

        (:) :BUTTON10.7.AFTER.DISSOLVE

        ;SET NEXT/BACK
        (A) $298 ":BUTTON10.6"
        (A) $299 ":BUTTON10.8"
        (G) :SHOW.NEXTBACK

        ;SET FLAG
        (A) $230 "7"

        (J) :MAIN.WAIT

;* ;OPEN 1YR GRAPH CARD
(:) :BUTTON10.8

        (G) :FILL.PROMPT.1.17a ;single year 1987
        (G) :SHOW.FIRST.PROMPT

        ;SHOW 1 YR CARD
        (A) $302 "45"                  ; pixel offset for shadow
        ;(S)* "n.graph.hp.1yr.87.s"
        ;(I)-* $302 "n.graph.hp.1yr.87.s" ;shadow
        (Z) 3
        (S) "n.graph.hp.15yr.blnk.s"
        drawIntroGraph 15, years+87, bank+shade, income, growth
        (S) "n.graph.hp.1yr.87.s"
        (I)- $302 "n.graph.hp.1yr.87.s" ;shadow
        (Z) 1
        (U)* 7 "n.graph.hp.15yr.blnk.s"

        ;SET NEXT/BACK
        (A) $298 ":BUTTON10.7BACK"
        (A) $299 ":BUTTON10.81"
        (G) :SHOW.NEXTBACK

        ;SET FLAG
        (A) $230 "8"

        (J) :MAIN.WAIT

;* ;1YR GRAPH CARD
(:) :BUTTON10.81

        (G) :FILL.PROMPT.1.17b ;single year 1980
        (G) :SHOW.FIRST.PROMPT

        ;SHOW 1 YR CARD
        ;(S)* "n.graph.hp.1yr.80.s"
        (A) $302 "45"                  ; pixel offset for shadow
        (Z) 3
        (S) "n.graph.hp.15yr.blnk.s"
        drawIntroGraph 15, years+80, bank+shade, income, growth
        (S) "n.graph.hp.1yr.80.s"
```

BEST AVAILABLE COPY

```
(I)~ $302 "n.graph.hp.1yr.80.s" ;shadow
(Z) 1
(U)* 7 "n.graph.hp.15yr.blnk.s"

;SET NEXT/BACK
(A) $298 ":BUTTON10.8"
(A) $299 ":BUTTON10.82"
(G) :SHOW.NEXTBACK

;SET FLAG
(A) $230 "81"

(J) :MAIN.WAIT

;* ;1YR GRAPH CARD
(:) :BUTTON10.82

(G) :FILL.PROMPT.1.17c ;single year 1981
(G) :SHOW.FIRST.PROMPT

;SHOW 1 YR CARD
;(S)* "n.graph.hp.1yr.81.s"
(A) $302 "45"                    ; pixel offset for shadow
(Z) 3
(S) "n.graph.hp.15yr.blnk.s"
drawIntroGraph 15, years+81, bank+shade, income, growth
(S) "n.graph.hp.1yr.81.s"
(I)~ $302 "n.graph.hp.1yr.81.s" ;shadow
(Z) 1
(U)* 7 "n.graph.hp.15yr.blnk.s"

;SET NEXT/BACK
(A) $298 ":BUTTON10.81"
(A) $299 ":BUTTON10.83"
(G) :SHOW.NEXTBACK

;SET FLAG
(A) $230 "82"

(J) :MAIN.WAIT

;* ;1YR GRAPH CARD
(:) :BUTTON10.83.BACK

;SHOW GRAPH, BIG, and YEARS AT BOTTOM
(Z) 3
(S) "n.graph.hp.15yr.blnk.s"
(S) "n.graph.hp.BIG.s"
(S) "n.graph.hp.dates.15yr.s"
(Z) 1
(A) $199 "0" ;speed
(U)* 7 "n.graph.hp.15yr.blnk.s"

(:) :BUTTON10.83

(G) :FILL.PROMPT.1.17d ;single year 1977
(G) :SHOW.FIRST.PROMPT

;SHOW 1 YR CARD
;(S)* "n.graph.hp.1yr.77.s"
(A) $302 "45"                    ; pixel offset for shadow
(Z) 3
(S) "n.graph.hp.15yr.blnk.s"
drawIntroGraph 15, years+77, bank+shade, income, growth
```

```
(S) "n.graph.hp.1yr.77.s"
(I)- $302 "n.graph.hp.1yr.77.s" ;shadow
(Z) 1
(U)* 7 "n.graph.hp.15yr.blnk.s"

;SET NEXT/BACK
(A) $298 ":BUTTON10.82"
(A) $299 ":BUTTON10.9"
(G) :SHOW.NEXTBACK

;SET FLAG
(A) $230 "83"

(J) :MAIN.WAIT

;* ;GO TO 30 YR GRAPH
(:) :BUTTON10.9

(G) :FILL.PROMPT.1.18 ;thirty year graph
(G) :SHOW.FIRST.PROMPT

;SHOW GRAPH, BIG, and YEARS AT BOTTOM
;(RESTORE BACKGROUND)
;(Z) 3
;(S) "n.graph.hp.15yr.blnk.s"
;(S) "n.graph.hp.BIG.s"
;(S) "n.graph.hp.dates.15yr.s"
;(Z) 1
(A) $199 "0" ;speed
;(U)* 7 "n.graph.hp.15yr.blnk.s"
(Z) 3
(S) "n.graph.hp.15yr.blnk.s"
drawIntroGraph 15, years, bank+shade, income, growth
(Z) 1
(U)* 7 "n.graph.hp.15yr.blnk.s"

;SHOW 1959 LT DATE
;(S)* "n.graph.hp.lt.date.59.s"
(S)* "n.graph.hp.30yr.blnk.s"

;SHOW 30 YR DATES
(A) $199 "1"
;(D)* 7 "n.graph.hp.dates.30yr.s"
(Z) 3
(S) "n.graph.hp.30yr.blnk.s"
drawIntroGraph 30, years
(Z) 1
(U)* 7 "n.graph.hp.30yr.blnk.s"

(W) 4

;SHOW 30 YR GRAPH
;(S)* "n.graph.hp.30yr.s"
(Z) 3
(S) "n.graph.hp.30yr.blnk.s"
drawIntroGraph 30, years, bank+shade, income, growth
(Z) 1
(U)* 7 "n.graph.hp.30yr.blnk.s"

;SET NEXT/BACK
(A) $298 ":BUTTON10.83.BACK"
(A) $299 ":BUTTON10.13"
(G) :SHOW.NEXTBACK
```

BEST AVAILABLE COPY

BEST AVAILABLE COPY

```
        ;SET FLAG
        (A) $230 "9"

        (J) :MAIN.WAIT

.* ;GO TO 15 YR GRAPH AGAIN
( ) .BUTTON10.13

        (G) :FILL.PROMPT.1.19 ;three instruments over 15 years
        (G) :SHOW.FIRST.PROMPT

        ;SHOW GRAPH and 15 YEAR DATES AT BOTTOM
        ;(Z) 3
        ;(S) "n.graph.hp.15yr.blnk.s"
        ;(S) "n.graph.hp.dates.15yr.s"
        ;(Z) 1
        (A) $199 "0"
        ;(U)* 7 "n.graph.hp.15yr.blnk.s"
        (Z) 3
        (S) "n.graph.hp.15yr.blnk.s"
        drawIntroGraph 15, years
        (Z) 1
        (U)* 7 "n.graph.hp.15yr.blnk.s"

        (W) 4

        ;SHOW 15 YR GRAPH
        (A) $199 "1"
        ;(D)* 7 "n.graph.hp.BIG.s"
        (Z) 3
        (S) "n.graph.hp.15yr.blnk.s"
        drawIntroGraph 15, years, bank+shade, income, growth
        (Z) 1
        (U)* 7 "n.graph.hp.15yr.blnk.s"

        ;SET NEXT/BACK
        (A) $298 ":BUTTON10.9"
        (A) $299 ":SIGN.ON.CUSTOMER"
        (G) :SHOW.NEXTBACK

        ;SET FLAG
        (A) $230 "13"

        (J) :MAIN.WAIT

;-------------------------
;EVENTS FOR 1YR "INTERACTIVE" —      PUT BACK!!!

        ;*
        (:) :HP.1YR.88

                ;UNHIGHLIGHT DATE
                (S)* "n.graph.hp.dates2.s"

                ;HIGHLIGHT DATE
                (S)* "n.graph.hp.88!.s"

                ;SHOW CARD
                (S)* "n.graph.hp.1yr.88.s"

                (G) :FILL.PROMPT.1.17.int ;interactive on any single year
```

```
        (G) :SHOW.FIRST.PROMPT

        (J) :MAIN.WAIT
```

BEST AVAILABLE COPY

```
;*
(:) :HP.1YR.87

        ;UNHIGHLIGHT DATE
        (S)* "n.graph.hp.dates2.s"

        ;HIGHLIGHT DATE
        (S)* "n.graph.hp.87!.s"

        ;SHOW CARD
        (S)* "n.graph.hp.1yr.87.s"

        (G) :FILL.PROMPT.1.17.int ;interactive on any single year
        (G) :SHOW.FIRST.PROMPT

        (J) :MAIN.WAIT

;*
(:) :HP.1YR.86

        ;UNHIGHLIGHT DATE
        (S)* "n.graph.hp.dates2.s"

        ;HIGHLIGHT DATE
        (S)* "n.graph.hp.86!.s"

        ;SHOW CARD
        (S)* "n.graph.hp.1yr.86.s"

        (G) :FILL.PROMPT.1.17.int ;interactive on any single year
        (G) :SHOW.FIRST.PROMPT

        (J) :MAIN.WAIT

;*
(:) :HP.1YR.85

        ;UNHIGHLIGHT DATE
        (S)* "n.graph.hp.dates2.s"

        ;HIGHLIGHT DATE
        (S)* "n.graph.hp.85!.s"

        ;SHOW CARD
        (S)* "n.graph.hp.1yr.85.s"

        (G) :FILL.PROMPT.1.17.int ;interactive on any single year
        (G) :SHOW.FIRST.PROMPT

        (J) :MAIN.WAIT

;*
(:) :HP.1YR.84

        ;UNHIGHLIGHT DATE
        (S)* "n.graph.hp.dates2.s"
```

```
        ;HIGHLIGHT DATE
        (S)* "n.graph.hp.84!.s"

        ;SHOW CARD
        (S)* "n.graph.hp.1yr.84.s"

        (G) :FILL.PROMPT.1.17.int ;interactive on any single year
        (G) :SHOW.FIRST.PROMPT

        (J) :MAIN.WAIT

;*
(:) :HP.1YR.83

        ;UNHIGHLIGHT DATE
        (S)* "n.graph.hp.dates2.s"

        ;HIGHLIGHT DATE
        (S)* "n.graph.hp.83!.s"

        ;SHOW CARD
        (S)* "n.graph.hp.1yr.83.s"

        (G) :FILL.PROMPT.1.17.int ;interactive on any single year
        (G) :SHOW.FIRST.PROMPT

        (J) :MAIN.WAIT

;*
(:) :HP.1YR.82

        ;UNHIGHLIGHT DATE
        (S)* "n.graph.hp.dates2.s"

        ;HIGHLIGHT DATE
        (S)* "n.graph.hp.82!.s"

        ;SHOW CARD
        (S)* "n.graph.hp.1yr.82.s"

        (G) :FILL.PROMPT.1.17.int ;interactive on any single year
        (G) :SHOW.FIRST.PROMPT

        (J) :MAIN.WAIT

;*
(:) :HP.1YR.81

        ;UNHIGHLIGHT DATE
        (S)* "n.graph.hp.dates2.s"

        ;HIGHLIGHT DATE
        (S)* "n.graph.hp.81!.s"

        ;SHOW CARD
        (S)* "n.graph.hp.1yr.81.s"

        (G) :FILL.PROMPT.1.17.int ;interactive on any single year
        (G) :SHOW.FIRST.PROMPT
```

BEST AVAILABLE COPY

BEST AVAILABLE COPY

```
(J) :MAIN.WAIT

;*
(:) :HP.1YR.80

        ;UNHIGHLIGHT DATE
        (S)* "n.graph.hp.dates2.s"

        ;HIGHLIGHT DATE
        (S)* "n.graph.hp.80!.s"

        ;SHOW CARD
        (S)* "n.graph.hp.1yr.80.s"

        (G) :FILL.PROMPT.1.17.int ;interactive on any single year
        (G) :SHOW.FIRST.PROMPT

        (J) :MAIN.WAIT

;*
(:) :HP.1YR.79

        ;UNHIGHLIGHT DATE
        (S)* "n.graph.hp.dates2.s"

        ;HIGHLIGHT DATE
        (S)* "n.graph.hp.79!.s"

        ;SHOW CARD
        (S)* "n.graph.hp.1yr.79.s"

        (G) :FILL.PROMPT.1.17.int ;interactive on any single year
        (G) :SHOW.FIRST.PROMPT

        (J) :MAIN.WAIT

;*
(:) :HP.1YR.78

        ;UNHIGHLIGHT DATE
        (S)* "n.graph.hp.dates2.s"

        ;HIGHLIGHT DATE
        (S)* "n.graph.hp.78!.s"

        ;SHOW CARD
        (S)* "n.graph.hp.1yr.78.s"

        (G) :FILL.PROMPT.1.17.int ;interactive on any single year
        (G) :SHOW.FIRST.PROMPT

        (J) :MAIN.WAIT

;*
(:) :HP.1YR.77

        ;UNHIGHLIGHT DATE
        (S)* "n.graph.hp.dates2.s"

        ;HIGHLIGHT DATE
        (S)* "n.graph.hp.77!.s"
```

```
        ;SHOW CARD
        (S)* "n.graph.hp.1yr.77.s"

        (G) :FILL.PROMPT.1.17.int ;interactive on any single year
        (G) :SHOW.FIRST.PROMPT

        (J) :MAIN.WAIT


    ;*
    (:) :HP.1YR.76

        ;UNHIGHLIGHT DATE
        (S)* "n.graph.hp.dates2.s"

        ;HIGHLIGHT DATE
        (S)* "n.graph.hp.76!.s"

        ;SHOW CARD
        (S)* "n.graph.hp.1yr.76.s"

        (G) :FILL.PROMPT.1.17.int ;interactive on any single year
        (G) :SHOW.FIRST.PROMPT

        (J) :MAIN.WAIT


    ;*
    (:) :HP.1YR.75

        ;UNHIGHLIGHT DATE
        (S)* "n.graph.hp.dates2.s"

        ;HIGHLIGHT DATE
        (S)* "n.graph.hp.75!.s"

        ;SHOW CARD
        (S)* "n.graph.hp.1yr.75.s"

        (G) :FILL.PROMPT.1.17.int ;interactive on any single year
        (G) :SHOW.FIRST.PROMPT

        (J) :MAIN.WAIT

;****************************************************************************
;SECTION 1 - SIGN-ON CUSTOMER
;****************************************************************************
;level 1 -

;*
(:) :SIGN.ON.CUSTOMER

    ;-------------------------
    ;- clear center
        (G) :CLEAR.CENTER.SCREEN.FROM.BUTTON

    ;- pull down data menu
        (G) :SHOW.DATA.MENU

    ;-------------------------
    ;- edit name
        (A) $380 "0"
```

Money Advice Scan File

BEST AVAILABLE COPY

```
                testEmpty $1

                if $380 = 1 ;if name empty
                        {
                        (A) $380 "0" ;reset
                        (G) :EDIT.NAME.OPENMENU

                        (W) 1
                        }

        ;- edit marital
                (A) $380 "0"
                testEmpty $9

                if $380 = 1 ;if marital empty
                        {
                        (A) $380 "0" ;reset
                        (G) :DO.EDIT.MARITAL
                        }

        ;________________________
        ;- set flags
                (A) $241 "2" ;mainmenu location
                (A) $242 "0" ;a submenu is open

        ;- shift highlight to ask assets
                (G) :REFRESH.MAINMENU

        ;- prompt
                (G) :FILL.PROMPT.2.1  ;we need to know the assets
                (G) :SHOW.FIRST.PROMPT

        ;- set next/back
                (A) $298 "99"
                (A) $299 ":ASK.ASSETS.FIRST.TIME"
                (G) :SHOW.NEXTBACK

        ;-leave
                (J) :MAIN.WAIT

;*******************************************************************************
;SECTION 2 - ASK ASSETS
;*******************************************************************************
;level 1 -

;*
(:) :ASK.ASSETS.FIRST.TIME

        (G) :CLEAR.CENTER.SCREEN.FROM.BUTTON
        (G)       :OPEN.ASK.BANK

        (A) $298 "99"
        (A) $299 ":GO.FROM.ASK.BANK.SWITCH"
        (G) :SHOW.NEXTBACK

        (J) :MAIN.WAIT

;*
(:) :GO.FROM.ASK.BANK.SWITCH

        (G) :HIGHLIGHT.ASK.TABSWITCH

        (G) :OPEN.ASK.INCOME
```

BEST AVAILABLE COPY

BEST AVAILABLE COPY

```
        (A) $298 "99"
        (A) $299 ":GO.FROM.ASK.INCOME.SWITCH"
        (G) :SHOW.NEXTBACK

        (J) :MAIN.WAIT

;*
( ) :GO.FROM.ASK.INCOME.SWITCH

        (G) :HIGHLIGHT.ASK.TABSWITCH

        (G) :OPEN.ASK.GROWTH

        if $20 > 0 ;If some assets are entered, do current pie
                {
                (A) $298 "99"
                (A) $299 ":BUTTON2"
                (G) :SHOW.NEXTBACK
                }
        else            ;If no assets are entered, show bank card
                {
                (A) $298 "99"
                (A) $299 ":GO.FROM.ASK.GROWTH.SWITCH"
                (G) :SHOW.NEXTBACK
                }

        (J) :MAIN.WAIT

;*
(:) :GO.FROM.ASK.GROWTH.SWITCH

        (G) :HIGHLIGHT.ASK.TABSWITCH

        (G) :OPEN.ASK.BANK

        (A) $298 "99"
        (A) $299 ":GO.FROM.ASK.BANK.SWITCH"
        (G) :SHOW.NEXTBACK

        (J) :MAIN.WAIT

;*
(:) :GO.FROM.ASK.ASSETS.CLOSE

        (G) :HIGHLIGHT.ASK.ASSETS.CLOSE

        ;RESTORE BACKGROUND
        (A) $199 "0"
        (X)*

        ;SET FLAG
        (A) $264 "0"

        if $179 = 0 ;If recommendation not cooked, do current pie
                {
                (A) $298 "99"

                if $20 > 0 ;If there are assets
                        (A) $299 ":BUTTON2"
                else            ;If there are not assets
                        (A) $299 "99"

                (G) :SHOW.NEXTBACK
```

```
        If $20 > 0
                (G) :FILL.PROMPT.2.41 ;click next for current pie
        else
                (G) :FILL.PROMPT.NONE

        (G) :SHOW.FIRST.PROMPT
        }

else    ;if recommendation is cooked, reallocate and do nothing with no pr
        {
        ;- reallocate assets
        (G) :RERUN.ALLOCS

        (G) :FILL.PROMPT.NONE
        (G) :SHOW.FIRST.PROMPT
        }

If $237 = 1       ;if refresh is needed;(can put a message in here to confirm ov
allocation.)
        (J) :REFRESH.DISPATCH
else
        {
        (G) :REFRESH.MAINMENU
        (G) :REFRESH.TABS
        }

(J) :MAIN.WAIT


;----------------------------------------------------------------------
----------------------------
;level 2 - ask assets

;•
(:) :OPEN.ASK.BANK

        If $264 = 0 ;ask card is not open
                {
                ;SAVE BACKGROUND
                (A) $302 "20"                  ; shadow offset in pixels
                (X)~* $302 "n.ask.bank.card.s"

                ;SHOW CARD WITH SHADOW
                (S)* "n.ask.bank.card.s"
                (I)~* $302 "n.ask.bank.card.s" ;shadow
                }

        else    ;ask card is open
                ;SHOW CARD ALONE
                (A) $199 "10"
                (D)* 1 "n.ask.bank.card.s"

        (G) :SHOW.ASK.BANK.DATA

        (G) :FILL.PROMPT.2.2  ;bank assets card open
        (G) :SHOW.FIRST.PROMPT

        ;SET FLAG
        (A) $264 "1" ;ask bank

        (R)
```

BEST AVAILABLE COPY

BEST AVAILABLE COPY

```
;*
(:) :OPEN.ASK.INCOME

        If $264 = 0         ;ask card is not open
                {
                ;SAVE BACKGROUND
                (A) $302 "20"                  ; shadow offset in pixels
                (X)-* $302 "n.ask.inc.card.s"

                ;SHOW CARD WITH SHADOW
                (S)* "n.ask.inc.card.s"
                (I)-* $302 "n.ask.inc.card.s" ;shadow
                }

        else    ;ask card is open
                ;SHOW CARD ONLY
                (A) $199 "10"
                (D)* 1 "n.ask.inc.card.s"

        (G) :SHOW.ASK.INCOME.DATA

        (G) :FILL.PROMPT.2.3  ;income assets card open
        (G) :SHOW.FIRST.PROMPT

        ;SET FLAG
        (A) $264 "2" ;ask income

        (R)

;*
(:) :OPEN.ASK.GROWTH

        If $264 = 0         ;ask card is not open
                {
                ;SAVE BACKGROUND
                (A) $302 "20"                  ; shadow offset in pixels
                (X)-* $302 "n.ask.gro.card.s"

                ;SHOW CARD & SHADOW
                (S)* "n.ask.gro.card.s"
                (I)-* $302 "n.ask.gro.card.s" ;shadow
                }

        else ;ask card is open
                (A) $199 "10"
                (D)* 1 "n.ask.gro.card.s"

        (G) :SHOW.ASK.GROWTH.DATA

        (G) :FILL.PROMPT.2.4  ;growth assets card open
        (G) :SHOW.FIRST.PROMPT

        ;SET FLAG
        (A) $264 "3" ;ask growth

        (R)

        ;-----------------------------------------------------------
        ;level 3 - ask assets DATA

        ;*
        (:) :SHOW.ASK.BANK.DATA
        ;show labels and values on ask card,
        ;if no value then show muted grey label only.
```

BEST AVAILABLE COPY

```
;CHECKING ———————————————
        if $160 = 1         ;if $ set dark & show amount
                {
                            (H) 35   ;dark grey

                            ;SHOW AMOUNT
                            stringFormat $290  "%$,n" $10
                            displayLeft* $290, ●166, 449
                }
        else
                            (H) 58  ;lt grey

        ;SHOW LABEL
        (V)* "Checking" ●166,205

;SAVINGS ———————————————
        if $161 = 1         ;if $ set dark & show amount
                {
                            (H) 35   ;dark grey

                            ;SHOW AMOUNT
                            stringFormat $290  "%,n" $11
                            displayLeft* $290, ●182, 449
                }
        else
                            (H) 58  ;lt grey

        ;SHOW LABEL
        (V)* "Savings" ●182,205

;CREDIT ———————————————
        if $162 = 1         ;if $ set dark & show amount
                {
                            (H) 35   ;dark grey

                            ;SHOW AMOUNT
                            stringFormat $290  "%,n" $18
                            displayLeft* $290, ●310, 449
                }
        else
                            (H) 58  ;lt grey

        ;SHOW LABEL
        (V)* "Credit" ●310,205


;BANK TOTAL ———————————————
(G) :SHOW.ASK.BANK.TOTAL
(R)

;*
(:) :SHOW.ASK.INCOME.DATA

;show labels and values on ask card,
;if no value then show muted grey label only.

;GOVERNMENT BONDS ———————————————
        if $164 = 1         ;if $ set dark & show amount
                {
                            (H) 35   ;dark grey

                            ;SHOW AMOUNT
                            stringFormat $290  "%$,n" $14
```

BEST AVAILABLE COPY

```
                displayLeft* $290, ●166, 449
        }
    else
                (H) 58  ;lt grey

    ;SHOW LABEL
    (V)* "Government Bonds" ●166,205

;BOND FUNDS ------------------------
    If $166 = 1         ;If $ set dark & show amount
        {
                (H) 35   ;dark grey

                ;SHOW AMOUNT
                stringFormat $290  "%,n" $39
                displayLeft* $290, ●182, 449
        }
    else
                (H) 58  ;lt grey

    ;SHOW LABEL
    (V)* "Bond Funds" ●182,205

    ;MUNICIPAL BONDS ------------------------
    if $165 = 1         ;if $ set dark & show amount
        {
                (H) 35   ;dark grey

                ;SHOW AMOUNT
                stringFormat $290  "%,n" $40
                displayLeft* $290, ●198, 449
        }
    else
                (H) 58  ;lt grey

    ;SHOW LABEL
    (V)* "Municipal Bonds" ●198,205

;CORPORATE BONDS ------------------------
    If $163 = 1         ;If $ set dark & show amount
        {
                (H) 35   ;dark grey

                ;SHOW AMOUNT
                stringFormat $290  "%,n" $30
                displayLeft* $290, ●214, 449
        }
    else
                (H) 58  ;lt grey

    ;SHOW LABEL
    (V)* "Corporate Bonds" ●214,205

;GOVERNMENT AGENCIES ------------------------
    If $168 = 1         ;If $ set dark & show amount
        {
                (H) 35   ;dark grey

                ;SHOW AMOUNT
                stringFormat $290  "%,n" $37
```

BEST AVAILABLE COPY

```
                    displayLeft* $290, @230, 449
        }
else
                    (H) 58  ;lt grey

;SHOW LABEL
(V)* "Government Agencies" @230,205

;COMMERCIAL PAPER ————————————
if $167 = 1         ;if $ set dark & show amount
        {
                    (H) 35   ;dark grey

                    ;SHOW AMOUNT
                    stringFormat $290  "%,n" $31
                    displayLeft* $290, @246, 449
        }
else
                    (H) 58  ;lt grey

;SHOW LABEL
(V)* "Commercial Paper" @246,205

;MONEY MARKET FUNDS ————————————
if $169 = 1         ;if $ set dark & show amount
        {
                    (H) 35   ;dark grey

                    ;SHOW AMOUNT
                    stringFormat $290  "%,n" $38
                    displayLeft* $290, @262, 449
        }
else
                    (H) 58  ;lt grey

;SHOW LABEL
(V)* "Money Market Funds" @262,205

;LONG TERM CD'S ————————————
if $172 = 1         ;if $ set dark & show amount
        {
                    (H) 35   ;dark grey

                    ;SHOW AMOUNT
                    stringFormat $290  "%,n" $16
                    displayLeft* $290, @278, 449
        }
else
                    (H) 58  ;lt grey

;SHOW LABEL
(V)* "Long Term CD's" @278,205

;INCOME TOTAL ————————————
(G) :SHOW.ASK.INCOME.TOTAL
(R)

;*
(:) :SHOW.ASK.GROWTH.DATA
```

```
;show labels and values on ask card,
;if no value then show muted grey label only.

;STOCKS ———————————
        if $170 = 1         ;if $ set dark & show amount
                {
                            (H) 35   ;dark grey

                            ;SHOW AMOUNT
                            stringFormat $290  "%$,n" $15
                            displayLeft* $290, ●166, 449
                }
        else
                            (H) 58  ;lt grey

        ;SHOW LABEL
        (V)* "Stocks" ●166,205

;STOCKFUNDS ———————————
        if $171 = 1         .;if $ set dark & show amount
                {
                            (H) 35   ;dark grey

                            ;SHOW AMOUNT
                            stringFormat $290  "%,n" $19
                            displayLeft* $290, ●182, 449
                }
        else
                            (H) 58  ;lt grey

        ;SHOW LABEL
        (V)* "Stock Funds" ●182,205

;GROWTH TOTAL ———————————
(G) :SHOW.ASK.GROWTH.TOTAL
(R)

;————————————————————————————————————
;level 1 - edit bank


;*
(:) :EDIT.ASK.BANK.CHECKING

    ;SAVE CURRENT VALUES
    stringFormat $390 $10
    stringFormat $391 $42

    ;WAIT FOR NEW INPUT
    (H) 35
    if $211 = 1 ;if maximum assets are too much
            stringFormat $10 "" ;blank the variable
    formattedInput * $10 $158 ●166,450 7

    ;- reallocate assets
    (G) :RERUN.ALLOCS

    ;CHECK NEW TOTAL
    if $42 > $210  ;if total is too large
            {
            ;SPECIFY RETURN POINT
            stringFormat $297 ":EDIT.ASK.BANK.CHECKING"
```

BEST AVAILABLE COPY

BEST AVAILABLE COPY

```
        (G) :TOO.MUCH.ON.ASK.CARD
        stringFormat $10 $390 ;restore original INPUT value
        stringFormat $42 $391 ;restore original TOTAL value
        (J) :MAIN.WAIT.LOADED
        }

(A) $211 "0"            ;total assets are okay
(A) $247 "0"            ;clear "edit's been made flag"

if $10 > 0                      ;has some
        {
        (A) $160 "1"    ;set flag
        (H) 35                  ;change label color
        }

if $10 = 0                      ;has none
        {
        (A) $160 "0"    ;set flag
        (H) 58                  ;change label color
        }

;SHOW LABEL
(V)* "Checking" @166,205

;SHOW AMOUNT
(S)* "n.ask.line0.$.s" ;blank area
(H) 35
stringFormat $290 "%,n" $10 ;$ on first line only
displayLeft* $290, @166, 449

(G) :SHOW.ASK.BANK.TOTAL

(A) $237 "1" ;set refresh needed flag

(J) :MAIN.WAIT

;*
(:) :EDIT.ASK.BANK.SAVINGS

;SAVE CURRENT VALUES
stringFormat $390 $11
stringFormat $391 $43

;WAIT FOR NEW INPUT
(H) 35
if $211 = 1 ;If maximum assets are too much
        stringFormat $11 "" ;blank the variable
formattedInput * $11 $158 @182,450 7

;- reallocate assets
(G) :RERUN.ALLOCS

;CHECK NEW TOTAL
if $42 > $210 ;If total is too large
        {
        ;SPECIFY RETURN POINT
        stringFormat $297 ":EDIT.ASK.BANK.SAVINGS"

        (G) :TOO.MUCH.ON.ASK.CARD
        stringFormat $11 $390 ;restore original INPUT value
        stringFormat $42 $391 ;restore original TOTAL value
        (J) :MAIN.WAIT.LOADED
        }
```

```
(A' $211 "0"                ;total assets are okay
(A) $247 "0"                ;clear "edit's been made flag"

If $11 > 0                          ;has some
        {
        (A) $161 "1"        ;set flag
        (H) 35                      ;change label color
        }

if $11 = 0                          ;has none
        {
        (A) $161 "0"        ;set flag
        (H) 58                      ;change label color
        }

;SHOW LABEL
(V)* "Savings" ●182,205

;SHOW AMOUNT
(S)* "n.ask.line1.$.s"  ;blank area
(H) 35
stringFormat $290  "%,n" $11 ;$ on first line only
displayLeft* $290, ●182, 449

(G) :SHOW.ASK.BANK.TOTAL

(A) $237 "1" ;set refresh needed flag

(J) :MAIN.WAIT

;*
(:) :EDIT.ASK.BANK.CREDIT

;WAIT FOR INPUT
(H) 35
formattedInput * $18 $158 ●310,450 7

;- reallocate assets
(G) :RERUN.ALLOCS

(A) $247 "0"                ;clear "edit's been made flag"

If $18 > 0                          ;has some
        {
        (A) $162 "1"        ;set flag
        (H) 35                      ;change label color
        }

If $18 = 0                          ;has none
        {
        (A) $162 "0"        ;set flag
        (H) 58                      ;change label color
        }

;SHOW LABEL
(V)* "Credit" ●310,205

;SHOW AMOUNT
(S)* "n.ask.line9.$.s"  ;blank area
(H) 35
stringFormat $290  "%,n" $18 ;$ on first line only
displayLeft* $290, ●310, 449

(G) :SHOW.ASK.BANK.TOTAL
```

```
(A) $237 "1" ;set refresh needed flag

(J) :MAIN.WAIT
```

BEST AVAILABLE COPY

```
;-------------
;level 1 - edit income


;*
(:) :EDIT.ASK.INCOME.GOVTBOND

        ;SAVE CURRENT VALUES
        stringFormat $390 $14
        stringFormat $391 $43

        ;WAIT FOR NEW INPUT
        (H) 35
        if $211 = 1 ;if maximum assets are too much
                stringFormat $14 "" ;blank the variable
        formattedInput * $14 $158 @166,450 7

        ;- reallocate assets
        (G) :RERUN.ALLOCS

        ;CHECK NEW TOTAL
        if $43 > $210 ;if total is too large
                {
                ;SPECIFY RETURN POINT
                stringFormat $297 ":EDIT.ASK.INCOME.GOVTBOND"

                (G) :TOO.MUCH.ON.ASK.CARD
                stringFormat $14 $390 ;restore original INPUT value
                stringFormat $43 $391 ;restore original TOTAL value
                (J) :MAIN.WAIT.LOADED
                }

        (A) $211 "0"            ;total assets are okay
        (A) $247 "0"            ;clear "edit's been made flag"

        if $14 > 0                      ;has some
                {
                (A) $164 "1"    ;set flag
                (H) 35                  ;change label color
                }

        if $14 = 0                      ;has none
                {
                (A) $164 "0"    ;set flag
                (H) 58                  ;change label color
                }

        ;SHOW LABEL
        (V)* "Government Bonds" @166,205

        ;SHOW AMOUNT
        (S)* "n.ask.line0.$.s" ;blank area
        (H) 35
        stringFormat $290 "%,n" $14 ;$ on first line only
        displayLeft* $290, @166, 449

        (G) :SHOW.ASK.INCOME.TOTAL
```

BEST AVAILABLE COPY

```
        (A) $237 "1" ;set refresh needed flag

        (J) :MAIN.WAIT

;*
(:) :EDIT.ASK.INCOME.BONDFUND

        ;SAVE CURRENT VALUES
        stringFormat $390 $39
        stringFormat $391 $43

        ;WAIT FOR NEW INPUT
        (H) 35
        if $211 = 1 ;if maximum assets are too much
                stringFormat $39 "" ;blank the variable
        formattedInput * $39 $158 @182,450 7

        ;- reallocate assets
        (G) :RERUN.ALLOCS

        ;CHECK NEW TOTAL
        if $43 > $210 ;if total is too large
                {
                ;SPECIFY RETURN POINT
                stringFormat $297 ":EDIT.ASK.INCOME.BONDFUND"

                (G) :TOO.MUCH.ON.ASK.CARD
                stringFormat $39 $390 ;restore original INPUT value
                stringFormat $43 $391 ;restore original TOTAL value
                (J) :MAIN.WAIT.LOADED
                }

        (A) $211 "0"            ;total assets are okay
        (A) $247 "0"            ;clear "edit's been made flag"

        if $39 > 0                      ;has some
                {
                (A) $166 "1"    ;set flag
                (H) 35                  ;change label color
                }

        if $39 = 0                      ;has none
                {
                (A) $166 "0"    ;set flag
                (H) 58                  ;change label color
                }

        ;SHOW LABEL
        (V)* "Bond Funds" @182,205

        ;SHOW AMOUNT
        (S)* "n.ask.line1.$.s" ;blank area
        (H) 35
        stringFormat $290 "%,n" $39
        displayLeft* $290, @182, 449

        (G) :SHOW.ASK.INCOME.TOTAL

        (A) $237 "1" ;set refresh needed flag

        (J) :MAIN.WAIT

;*
```

```
( ) :EDIT.ASK.INCOME.MUNIBOND

        ;SAVE CURRENT VALUES
        stringFormat $390 $40
        stringFormat $391 $43

        ;WAIT FOR NEW INPUT
        (H) 35
        if $211 = 1 ;if maximum assets are too much
                stringFormat $40 "" ;blank the variable
        formattedInput * $40 $158 ●198,450 7

        ;- reallocate assets
        (G) :RERUN.ALLOCS

        ;CHECK NEW TOTAL
        if $43 > $210 ;if total is too large
                {
                ;SPECIFY RETURN POINT
                stringFormat $297 ":EDIT.ASK.INCOME.MUNIBOND"

                (G) :TOO.MUCH.ON.ASK.CARD
                stringFormat $40 $390 ;restore original INPUT value
                stringFormat $43 $391 ;restore original TOTAL value
                (J) :MAIN.WAIT.LOADED
                }

        (A) $211 "0"            ;total assets are okay
        (A) $247 "0"            ;clear "edit's been made flag"

        if $40 > 0                      ;has some
                {
                (A) $165 "1"    ;set flag
                (H) 35                  ;change label color
                }

        if $40 = 0                      ;has none
                {
                (A) $165 "0"    ;set flag
                (H) 58                  ;change label color
                }

        ;SHOW LABEL
        (V)* "Municipal Bonds" ●198,205

        ;SHOW AMOUNT
        (S)* "n.ask.line2.$.s" ;blank area
        (H) 35
        stringFormat $290 "%,n" $40
        displayLeft* $290, ●198, 449

        (G) :SHOW.ASK.INCOME.TOTAL

        (A) $237 "1" ;set refresh needed flag

        (J) :MAIN.WAIT

;*
(:) :EDIT.ASK.INCOME.CORPBOND

        ;SAVE CURRENT VALUES
        stringFormat $390 $30
        stringFormat $391 $43
```

BEST AVAILABLE COPY

BEST AVAILABLE COPY

```
;WAIT FOR NEW INPUT
(H) 35
if $211 = 1 ;if maximum assets are too much
        stringFormat $30 "" ;blank the variable
formattedInput * $30 $158 @214,450 7

;- reallocate assets
(G) :RERUN.ALLOCS

;CHECK NEW TOTAL
if $43 > $210 ;if total is too large
        {
        ;SPECIFY RETURN POINT
        stringFormat $297 ":EDIT.ASK.INCOME.CORPBOND"

        (G) :TOO.MUCH.ON.ASK.CARD
        stringFormat $30 $390 ;restore original INPUT value
        stringFormat $43 $391 ;restore original TOTAL value
        (J) :MAIN.WAIT.LOADED
        }

(A) $211 "0"            ;total assets are okay
(A) $247 "0"            ;clear "edit's been made flag"

if $30 > 0                      ;has some
        {
        (A) $163 "1"    ;set flag
        (H) 35                  ;change label color
        }

if $30 = 0                      ;has none
        {
        (A) $163 "0"    ;set flag
        (H) 58                  ;change label color
        }

;SHOW LABEL
(V)* "Corporate Bonds" @214,205

;SHOW AMOUNT
(S)* "n.ask.line3.$.s" ;blank area
(H) 35
stringFormat $290 "%,n" $30
displayLeft* $290, @214, 449

(G) :SHOW.ASK.INCOME.TOTAL

(A) $237 "1" ;set refresh needed flag

(J) :MAIN.WAIT

;*
(:) :EDIT.ASK.INCOME.GOVTAGENCIES

        ;SAVE CURRENT VALUES
        stringFormat $390 $37
        stringFormat $391 $43

        ;WAIT FOR NEW INPUT
        (H) 35
        if $211 = 1 ;if maximum assets are too much
                stringFormat $37 "" ;blank the variable
        formattedInput * $37 $158 @230,450 7
```

BEST AVAILABLE COPY

```
;- reallocate assets
(G) :RERUN.ALLOCS

;CHECK NEW TOTAL
if $43 > $210  ;if total is too large
        {
        ;SPECIFY RETURN POINT
        stringFormat $297 ":EDIT.ASK.INCOME.GOVTAGENCIES"

        (G) :TOO.MUCH.ON.ASK.CARD
        stringFormat $37 $390 ;restore original INPUT value
        stringFormat $43 $391 ;restore original TOTAL value
        (J) :MAIN.WAIT.LOADED
        }

(A) $211 "0"                ;total assets are okay
(A) $247 "0"                ;clear "edit's been made flag"

if $37 > 0                          ;has some
        {
        (A) $168 "1"        ;set flag
        (H) 35                      ;change label color
        }

if $37 = 0                          ;has none
        {
        (A) $168 "0"        ;set flag
        (H) 58                      ;change label color
        }

;SHOW LABEL
(V)* "Government Agencies" ●230,205

;SHOW AMOUNT
(S)* "n.ask.line4.$.s"  ;blank area
(H) 35
stringFormat $290  "%,n" $37
displayLeft* $290, ●230, 449

(G) :SHOW.ASK.INCOME.TOTAL

(A) $237 "1" ;set refresh needed flag

(J) :MAIN.WAIT

;*
(:) :EDIT.ASK.INCOME.COMMLPAPER

        ;SAVE CURRENT VALUES
        stringFormat $390 $31
        stringFormat $391 $43

        ;WAIT FOR NEW INPUT
        (H) 35
        if $211 = 1 ;if maximum assets are too much
                stringFormat $31 ""  ;blank the variable
        formattedInput * $31 $158 ●246,450 7

        ;- reallocate assets
        (G) :RERUN.ALLOCS

        ;CHECK NEW TOTAL
        if $43 > $210  ;if total is too large
                {
```

BEST AVAILABLE COPY

```
        ;SPECIFY RETURN POINT
        stringFormat $297 ":EDIT.ASK.INCOME.COMMLPAPER"

        (G) :TOO.MUCH.ON.ASK.CARD
        stringFormat $31 $390 ;restore original INPUT value
        stringFormat $43 $391 ;restore original TOTAL value
        (J) :MAIN.WAIT.LOADED
        }

(A) $211 "0"            ;total assets are okay
(A) $247 "0"            ;clear "edit's been made flag"

If $31 > 0                      ;has some
        {
        (A) $167 "1"    ;set flag
        (H) 35                  ;change label color
        }

If $31 = 0                      ;has none
        {
        (A) $167 "0"    ;set flag
        (H) 58                  ;change label color
        }

;SHOW LABEL
(V)* "Commercial Paper" @246,205

;SHOW AMOUNT
(S)* "n.ask.line5.$.s" ;blank area
(H) 35
stringFormat $290  "%,n" $31
displayLeft* $290, @246, 449

(G) :SHOW.ASK.INCOME.TOTAL

(A) $237 "1" ;set refresh needed flag

(J) :MAIN.WAIT

;*
(:) :EDIT.ASK.INCOME.MMF

        ;SAVE CURRENT VALUES
        stringFormat $390 $38
        stringFormat $391 $43

        ;WAIT FOR NEW INPUT
        (H) 35
        if $211 = 1 ;if maximum assets are too much
                stringFormat $38 "" ;blank the variable
        formattedInput * $38 $158 @262,450 7

        ;- reallocate assets
        (G) :RERUN.ALLOCS

        ;CHECK NEW TOTAL
        if $43 > $210  ;if total is too large
                {
                ;SPECIFY RETURN POINT
                stringFormat $297 ":EDIT.ASK.INCOME.MMF"

                (G) :TOO.MUCH.ON.ASK.CARD
                stringFormat $38 $390 ;restore original INPUT value
                stringFormat $43 $391 ;restore original TOTAL value
```

```
        (J) :MAIN.WAIT.LOADED
        }

(A) $211 "0"            ;total assets are okay
(A) $247 "0"            ;clear "edit's been made flag"

if $38 > 0                      ;has some
        {
        (A) $169 "1"    ;set flag
        (H) 35                  ;change label color
        }

if $38 = 0                      ;has none
        {
        (A) $169 "0"    ;set flag
        (H) 58                  ;change label color
        }

;SHOW LABEL
(V)* "Money Market Funds" @262,205

;SHOW AMOUNT
(S)* "n.ask.line6.$.s" ;blank area
(H) 35
stringFormat $290 "%,n" $38
displayLeft* $290, @262, 449

(G) :SHOW.ASK.INCOME.TOTAL

(A) $237 "1" ;set refresh needed flag

(J) :MAIN.WAIT

;*
(:) :EDIT.ASK.INCOME.LONGCD

;SAVE CURRENT VALUES
stringFormat $390 $16
stringFormat $391 $43

;WAIT FOR NEW INPUT
(H) 35
if $211 = 1 ;if maximum assets are too much
        stringFormat $16 "" ;blank the variable
formattedInput * $16 $158 @278,450 7

;- reallocate assets
(G) :RERUN.ALLOCS

;CHECK NEW TOTAL
if $43 > $210 ;if total is too large
        {
        ;SPECIFY RETURN POINT
        stringFormat $297 ":EDIT.ASK.INCOME.LONGCD"

        (G) :TOO.MUCH.ON.ASK.CARD
        stringFormat $16 $390 ;restore original INPUT value
        stringFormat $43 $391 ;restore original TOTAL value
        (J) :MAIN.WAIT.LOADED
        }

(A) $211 "0"            ;total assets are okay
(A) $247 "0"            ;clear "edit's been made flag"
```

BEST AVAILABLE COPY

```
 If $16 > 0                              ;has some
         {
         (A) $172 "1"       ;set flag
         (H) 35                          ;change label color
         }

 If $16 = 0                              ;has none
         {
         (A) $172 "0"       ;set flag
         (H) 58                          ;change label color
         }

 ;SHOW LABEL
 (V)* "Long Term CD's" @278,205

 ;SHOW AMOUNT
 (S)* "n.ask.line7.$.s"  ;blank area
 (H) 35
 stringFormat $290  "%,n" $16
 displayLeft* $290, @278, 449

 (G) :SHOW.ASK.INCOME.TOTAL

 (A) $237 "1" ;set refresh needed flag

 (J) :MAIN.WAIT


;--------------
;level 1 - edit growth


;*
(:) :EDIT.ASK.GROWTH.STOCKS

        ;SAVE CURRENT VALUES
        stringFormat $390 $15
        stringFormat $391 $43

        ;WAIT FOR NEW INPUT
        (H) 35
        If $211 = 1 ;If maximum assets are too much
                stringFormat $15 "" ;blank the variable
        formattedInput * $15 $158 @166,450 7

        ;- reallocate assets
        (G) :RERUN.ALLOCS

        ;CHECK NEW TOTAL
        If $44 > $210  ;If total is too large
                {
                ;SPECIFY RETURN POINT
                stringFormat $297 ":EDIT.ASK.GROWTH.STOCKS"

                (G) :TOO.MUCH.ON.ASK.CARD
                stringFormat $15 $390 ;restore original INPUT value
                stringFormat $44 $391 ;restore original TOTAL value
                (J) :MAIN.WAIT.LOADED
                }

       (A) $211 "0"            ;total assets are okay
       (A) $247 "0"            ;clear "edit's been made flag"

       If $15 > 0                        ;has some
```

BEST AVAILABLE COPY

BEST AVAILABLE COPY

```
        {
        (A) $170 "1"     ;set flag
        (H) 35                    ;change label color
        }

if $15 = 0                        ;has none
        {
        (A) $170 "0"     ;set flag
        (H) 58                    ;change label color
        }

;SHOW LABEL
(V)* "Stocks" ●166,205

;SHOW AMOUNT
(S)* "n.ask.line0.$.s" ;blank area
(H) 35
stringFormat $290 "%,n" $15 ;$ on first line only
displayLeft* $290, ●166, 449

(G) :SHOW.ASK.GROWTH.TOTAL

(A) $237 "1" ;set refresh needed flag

(J) :MAIN.WAIT


( ) :EDIT.ASK.GROWTH.STOCKFUNDS

    ;SAVE CURRENT VALUES
    stringFormat $390 $19
    stringFormat $391 $43

    ;WAIT FOR NEW INPUT
    (H) 35
    if $211 = 1 ;if maximum assets are too much
            stringFormat $19 "" ;blank the variable
    formattedInput * $19 $158 ●182,450 7

    ;- reallocate assets
    (G) :RERUN.ALLOCS

    ;CHECK NEW TOTAL
    if $44 > $210 ;if total is too large
            {
            ;SPECIFY RETURN POINT
            stringFormat $297 ":EDIT.ASK.GROWTH.STOCKFUNDS"

            (G) :TOO.MUCH.ON.ASK.CARD
            stringFormat $19 $390 ;restore original INPUT value
            stringFormat $44 $391 ;restore original TOTAL value
            (J) :MAIN.WAIT.LOADED
            }

    (A) $211 "0"           ;total assets are okay
    (A) $247 "0"           ;clear "edit's been made flag"

    if $19 > 0                    ;has some
            {
            (A) $171 "1"   ;set flag
            (H) 35                ;change label color
            }
```

```
If $19 = 0                              ;has none
        {
        (A) $171 "0"     ;set flag
        (H) 58                          ;change label color
        }

;SHOW LABEL
(V)* "Stock Funds" ●182,205

;SHOW AMOUNT
(S)* "n.ask.line1.$.s"  ;blank area
(H) 35
stringFormat $290  "%,n" $19
displayLeft* $290, ●182, 449

(G) :SHOW.ASK.GROWTH.TOTAL

(A) $237 "1" ;set refresh needed flag

(J) :MAIN.WAIT

;------------------------------------------------------------
;level 2

;*
(:) :TOO.MUCH.ON.ASK.CARD

        ;SAVE BACKGROUND
        (A) $302 "35"                   ; shadow offset
        (X)- $302 "n.message.orange.s"

        ;SHOW MESSAGE BOX
        (S) "n.message.orange.s"
        (I)- $302 "n.message.orange.s" ;shadow
        (S) "n.message.finger.s"
        (S) "n.message.okay.right.s" ●237,414

        (H) 23
        If $264 = 1
                (V) "Sorry. We can't work with^more than $1,000,000 in^Bar
●179,242
        If $264 = 2
                (V) "Sorry. We can't work with^more than $1,000,000 in^Incc
●179,242
        If $264 = 3
                (V) "Sorry. We can't work with^more than $1,000,000 in^Gro
●179,242

        (T)
        (T) $33 "n.message.okay.right.s" ●237,414 :MESSAGE.BOX.OKAY

        ;SET FLAG
        (A) $211 "1"  ;assets are too much

        (R)

;*
(:) :MESSAGE.BOX.OKAY

        ;HIGHLIGHT
        (S) "n.message.okay.right!.s" ●237,414
        (W) 4
        (S) "n.message.okay.right.s" ●237,414
```

BEST AVAILABLE COPY

```
;RESTORE BACKGROUND
(X)

;RETURN TO AWAIT NEW INPUT
(J) $297
```

BEST AVAILABLE COPY

```
;____________________
;level 2

;•
(:) :SHOW.ASK.BANK.TOTAL

        ;SHOW TOTAL AMOUNT
        (S)* "n.ask.line7.8.name.s"  ;blank area
        (H) 35
        displayLeft* "Total (rounded to nearest $100):" ●278, 373
        stringFormat $290  "%$,n" $42
        displayLeft* $290, ●278, 449
        (R)

;•
(:) :SHOW.ASK.INCOME.TOTAL

        ;SHOW TOTAL AMOUNT
        (S)* "n.ask.line11.total.s" ;blank area
        (H) 35
        displayLeft* "Total (rounded to nearest $100):" ●341, 373
        stringFormat $290  "%$,n" $43
        displayLeft* $290, ●342, 449
        (R)

;•
(:) :SHOW.ASK.GROWTH.TOTAL

        ;SHOW TOTAL AMOUNT
        (S)* "n.ask.line11.total.s" ;blank area
        (H) 35
        displayLeft* "Total (rounded to nearest $100):" ●341, 373
        stringFormat $290  "%$,n" $44
        displayLeft* $290, ●342, 449
        (R)

;•••••••••••••••••••••••••••••••••••••••••••••••••••••••••••••••••••••••••••••••
•••••••
;SECTION 2 - SHOW CURRENT PIE
;•••••••••••••••••••••••••••••••••••••••••••••••••••••••••••••••••••••••••••••••
•••••••

;•
(:) :BUTTON2  ;current pie

    if $251 <> 0  ;if a card is open
        (G) :CLOSE.CARD

    if $220 <> 2 ;if current pie is not showing
        if $220 <> 4      ;and if proposed pie is not showing
            if $220 <> 7  ;and if builu pie is not showing
                (G) :CLEAR.CENTER.SCREEN.FROM.BUTTON

    (G) :FILL.PROMPT.2.5
    (G) :SHOW.FIRST.PROMPT

    ;LABEL PIE on both screens
```

```
(A) $199 "1" ;speed
(D)* 7 "n.pie.current.label.s"

;SETUP Z3
(Z) 3
(S) "n.pie.bink.s"

;DRAW YOURS PIE on Z3
(Z) 3
(Y) 91

(Z) 1

;SHOW PIE ON MAIN SCREEN
(A) $199 "1" ;speed
(U) 7 "n.pie.bink.s"

(Z) 2

;SHOW PIE ON CUST SCREEN
(A) $199 "" ;speed
(U) 7 "n.pie.bink.s"

(Z) 1

;SET NEXT/BACK
(A) $298 "99"
(A) $299 ":BUTTON7"
(G) :SHOW.NEXTBACK

;SET FLAGS
(A) $220 "2"

(J) :MAIN.WAIT

;***************************************************************************
;SECTION 3 - BUILD AVAILABLE CASH
;***************************************************************************

;*
(:) :REQUEST.BUTTON7.REFRESH            ;refresh from any data entry

        ;- if on available cash wedge
                (Q) "$227 = 31" :BUTTON7.4        ;if in dimension lines, show wedge s

        ;- check to see if data have all been entered
                (G) :IS.BUILD.DONE

        ;- leave
                (J) :MAIN.WAIT

;* BUILD PIE
(:) :BUTTON7

;* DRAW CIRCLE WITH ASSET TOTAL
(:) :BUTTON7.1

        (G) :CLEAR.CENTER.SCREEN.FROM.BUTTON

        if $241 <> 3 ;if menu is not on "build recommendation"
                {
```

BEST AVAILABLE COPY

```
(A) $241 "3" ;mainmenu flag
(G) :REFRESH.MAINMENU
}

(G) :FILL.PROMPT.3.1 ;full circle drawn - total current assets
(G) :SHOW.FIRST.PROMPT

;SHOW 'BUILD ALLOCATION' LABEL
(A) $199 "0"
(D)* 7 "n.pie.build.label.s"

;SHOW "TOTAL ASSETS" IN CENTER
(A) $199 "0" ;speed
(D)* 7 "n.buildpie.a.s"

;SHOW AMOUNT
(H) 6
(V)* "%$" $20 @236,286

;DRAW CIRCLE

    ;SHOW TOTAL ASSET AMOUNT ON Z3
    (Z) 3
    (S) "n.buildpie.blnk.s" ;blank rt pixel line
    (S) "n.buildpie.b2.s"
    (H) 6
    (V) "%$" $20 @236,286

    ;DRAW CIRCLE Z1
    (Z) 1
    (A) $199 "1000" ;speed
    (D) 6 "n.buildpie.b1.s"
    (U) 5 "n.buildpie.b2.s"

    ;DRAW CIRCLE Z2
    (Z) 2
    (A) $199 "1000" ;speed
    (D) 6 "n.buildpie.b1.s"
    (U) 5 "n.buildpie.b2.s"

    (Z) 1

;SET NEXT/BACK
(A) $298 "99"
(A) $299 ":BUTTON7.3"
(G) :SHOW.NEXTBACK

;SET FLAGS
(A) $220 "7" ;build flag
(A) $227 "1"

(J) :MAIN.WAIT

;* DIVIDE CIRCLE IN HALF
(:) :BUTTON7.3

(G) :FILL.PROMPT.3.2 ;available cash wedge
(G) :SHOW.FIRST.PROMPT

;DIVIDE IN HALF
(A) $199 "0"
(D)* 7 "n.buildpie.c.s"
```

BEST AVAILABLE COPY

```
        (W) 4

        ;SHRINK THE CASH WEDGE
        (A) $199 "0"
        (D)* 7 "n.buildpie.d.s"

        ;SET NEXT/BACK
        (A) $298 ":BUTTON7.1"
        (A) $299 ":BUTTON7.31"
        (G) :SHOW.NEXTBACK

        ;SET FLAGS
        (A) $220 "7" ;button flag
        (A) $227 "3"

        (J) :MAIN.WAIT

;* MAKE CASH WEDGE WITH DIMENSION LINES
(:) :BUTTON7.31

        (G) :FILL.PROMPT.3.3  ;three month income bucket
        (G) :SHOW.FIRST.PROMPT

        ;SHOW DIMENSION LINES
        (D)* 7 "n.buildpie.e.s"

        ;SET NEXT/BACK
        (A) $298 ":BUTTON7.3"
        (A) $299 ":BUTTON7.31a"
        (G) :SHOW.NEXTBACK

        ;SET FLAGS
        (A) $220 "7" ;button flag
        (A) $227 "31"

        (J) :MAIN.WAIT

;* OPEN DATA ENTRY BAR AT TOP PULL DOWN INCOME
(:) :BUTTON7.31a

        ;SET NEXT/BACK
        (A) $298 ":BUTTON7.31"
        (A) $299 ":BUTTON7.4"
        (G) :SHOW.NEXTBACK

        ;SET FLAGS
        (A) $220 "7" ;button flag
        (A) $227 "31a"

        if $7 = 0  ;if income has not been entered
                {
                (G) :SHOW.DATA.MENU
                (J) :EDIT.INCOME
                }

        else            ;income has already beer entered
                (J) :BUTTON7.4

;* ADJUST WEDGE, ADD CASH AMTS
(:) :BUTTON7.4

        (G) :FILL.PROMPT.3.7     ;available cash allocation
```

BEST AVAILABLE COPY

```
(G) :SHOW.FIRST.PROMPT

(:) :BUTTON7.4.REFRESH

;ADJUST AVAILABLE-CASH WEDGE, ADD $
(G) :PREP.PIE
(Z) 3
(Y) 93
(G) :SHOW.PIE

;SET NEXT/BACK
(A) $298 ":BUTTON7.31"
(A) $299 ":BUTTON7.405"
(G) :SHOW.NEXTBACK

;SET FLAGS
(A) $220 "7" ;button flag
(A) $227 "4"

(J) :MAIN.WAIT

;       ____________________________________________
;       djs 4/17/90
;       Brian requests that for the case where all $ are in Bank+MMF, then skip the
;       G vs. I steps right to getting personal info.
;       Note: $298 is BACK event var, $299 is the NEXT event var


;* SHOW BANK SLICE W/$
(:) :BUTTON7.405

        (G) :FILL.PROMPT.3.8 ;bank allocated - green filled in
        (G) :SHOW.FIRST.PROMPT

        ;SHOW GREEN BANK SLICE IN Z3
        (G) :PREP.PIE
        (Z) 3
        (Y) 94
        (G) :SHOW.PIE

        (A) $298 ":BUTTON7.4"   ; set backup to ADJUST WEDGE, ADD CASH AMTS

        if $25 = 100            ; check the vRBankPercent variable
                {
                (A)     $299 ":GET.PERSONAL.INFO"
                }
        else
                {
                if $85 > 0                              ; vRMMFDollars: MFF $ ha
allocated
                        {
                        (A) $299 ":BUTTON7.406"                 ; go on to display
                        }
                else
                        {
                        (A) $299 ":BUTTON7.41"                  ; go to SHOW LOI
ASSETS $ AMOUNT
                        }
                }

        (G) :SHOW.NEXTBACK

        ;SET FLAGS
```

BEST AVAILABLE COPY

BEST AVAILABLE COPY

```
        (A) $220 "7" ;button flag
        (A) $227 "405"

        (J) :MAIN.WAIT


;* SHOW MMF SLICE W/$
(:) :BUTTON7.406

        (G) :FILL.PROMPT.3.9  ;money market fund allocated - blue filled in
        (G) :SHOW.FIRST.PROMPT

        ;SHOW COLOR MMF SLICE, ADD $
        (G) :PREP.PIE
        (Z) 3
        (Y) 95
        (W) 7
        (G) :SHOW.PIE
        (W) 4

        ;SET NEXT/BACK
        (A) $298 ":BUTTON7.405"

        $290 := $86 + $25
        ; temp var $290 now holds RBank% + RMMF%
        if $290 = 100                                   ; All $ in Bank+MMF
                {
                (A) $299 ":GET.PERSONAL.INFO"           ; go straight to personal ir
                }
        else
                {
                (A) $299 ":BUTTON7.41"                          ; on to SHOW LON
ASSETS $ AMOUNT
                }

        (G) :SHOW.NEXTBACK

        ;SET FLAGS
        (A) $220 "7" ;button flag
        (A) $227 "406"

        (J) :MAIN.WAIT


;*      GET PERSONAL INFO
;       When all $ are in Bank or Bank+MMF, skip the I/G split and go direct to the
;       personal info bar before cooking the recommendation.    ADD: djs 4/18/90

(:)     :GET.PERSONAL.INFO
        if $179 = 0 ;if recommendation is not cooked
                {
                (G) :FILL.PROMPT.3.12.skip3  ; skip 3 buttons, go to personal bar info
                (G) :SHOW.FIRST.PROMPT

                ;SET NEXT/BACK
                (A) $298 "99"
                (A) $29S "99"
                (G) :SHOW.NEXTBACK
                }
        else            ;if recommendation is cooked
                {
                (G) :FILL.PROMPT.3.19a  ;a recommendation is ready
                (G) :SHOW.FIRST.PROMPT
```

```
                  ;SET NEXT/BACK
                  (A) $298 "99"
                  (A) $299 ":BUTTON4"
                  (G) :SHOW.NEXTBACK
                  }

          ;SET FLAG
          (A) $220 "7" ;button flag
          (A) $227 "5"

          (J) :MAIN.WAIT


;*****************************************************************************
*******
;SECTION 3 - BUILD LONG TERM ASSETS
;*****************************************************************************
*******


;* SHOW LONG TERM ASSETS $ AMOUNT
(:) :BUTTON7.41

          (G) :FILL.PROMPT.3.10  ;amount of long term assets shown in pie
          (G) :SHOW.FIRST.PROMPT

          ;SHOW LONGTERM ASSETS $AMOUNT
          (G) :PREP.PIE
                  (Z) 3
                  (Y) 96
          (G) :SHOW.PIE

          ;SET NEXT/BACK
          (A) $298 ":BUTTON7.405"
          (A) $299 ":BUTTON7.42"
          (G) :SHOW.NEXTBACK

          ;SET FLAGS
          (A) $220 "7" ;button flag
          (A) $227 "41"

          (J) :MAIN.WAIT


;* DIVIDE I/G LABEL
(:) :BUTTON7.42

          (G) :FILL.PROMPT.3.11  ;line divides between income and growth
          (G) :SHOW.FIRST.PROMPT

          ;SPLIT I/G LABEL
          (G) :PREP.PIE
                  (A) $208 "50"
                  (Z) 3
                  (Y) 97
          (G) :SHOW.PIE

          ;SHOW GRO TAB W/$
          ;(A) $199 ""
          ;(D)* 2 "n.tab.gro.$.s"
          ;(H) 10
          ;(V)* "$" @400,511
```

BEST AVAILABLE COPY

BEST AVAILABLE COPY

```
;SET NEXT/BACK
(A) $298 ":BUTTON7.41"
(A) $299 ":BUTTON7.5"
(G) :SHOW.NEXTBACK

;SET FLAGS
(A) $220 "7" ;button flag
(A) $227 "42"

(J) :MAIN.WAIT


;*
(:) :BUTTON7.5 ;SHOW BAR CHOICES

;SHOW BAR CHOICES
(S)* "n.bar.choices.s"

if $179 = 0 ;if recommendation is not cooked
        {
        (G) :FILL.PROMPT.3.12.int  ; three buttons appear "we base this mix..
        (G) :SHOW.FIRST.PROMPT

        ;SET NEXT/BACK
        (A) $298 "99"
        (A) $299 "99"
        (G) :SHOW.NEXTBACK
        }
else                ;if recommendation is cooked
        {
        if $209 = 0         ;events box is closed
                {
                (G) :FILL.PROMPT.3.19a  ;a recommendation is ready, events
                (G) :SHOW.FIRST.PROMPT
                }
        else                        ;events box is open
                {
                (G) :FILL.PROMPT.3.19b  ;a recommendation is ready, events
                (G) :SHOW.FIRST.PROMPT
                }
        ;SET NEXT/BACK
        (A) $298 "99"
        (A) $299 ":BUTTON4"
        (G) :SHOW.NEXTBACK
        }

;SET FLAG
(A) $220 "7" ;button flag
(A) $227 "5"

(J) :MAIN.WAIT


;*
(:) :BUTTON7.51 ;SHOW RETIRE BAR

        ;HIGHLIGHT BUTTON
        (S)* "n.bar.choice.retire!.s"
        (W) 1
        (S)* "n.bar.choices.s"

        ;SHOW RETIRE BAR
        (S)* "n.bar.retire.s"
```

```
        (G) :FILL.PROMPT.3.18.int  ;years to retirement button
        (G) :SHOW.FIRST.PROMPT

        ;SET FLAG
        (A) $220 "7" ;button flag
        (A) $227 "51"

        (J) :MAIN.WAIT

;*
(:) :BUTTON7.52 ;SHOW COLLEGE BAR

        ;HIGHLIGHT BUTTON
        (S)* "n.bar.choice.college!.s"
        (W) 1
        (S)* "n.bar.choices.s"

        ;SHOW RETIRE BAR
        (S)* "n.bar.college.s"

        (G) :FILL.PROMPT.3.14.int  ;years to college button
        (G) :SHOW.FIRST.PROMPT

        ;SET FLAG
        (A) $220 "7" ;button flag
        (A) $227 "52"

        (J) :MAIN.WAIT

;*
(:) :BUTTON7.53 ;SHOW HOME BAR

        ;HIGHLIGHT BUTTON
        (S)* "n.bar.choice.home!.s"
        (W) 1
        (S)* "n.bar.choices.s"

        ;SHOW RETIRE BAR
        (S)* "n.bar.home.s"

        (G) :FILL.PROMPT.3.16.int  ;home ownership button
        (G) :SHOW.FIRST.PROMPT

        ;SET FLAG
        (A) $220 "7" ;button flag
        (A) $227 "53"

        (J) :MAIN.WAIT

;*  SHOW EVENTS PULLDOWN
(:) :BUTTON7.6

(G) :FILL.PROMPT.3.19b  ;It's based on these events
(G) :SHOW.FIRST.PROMPT

;BLANK OUT BUTTONS
(S)* "n.bar.blnk.s"

(W) 1

(G) :SHOW.EVENTS
```

BEST AVAILABLE COPY

BEST AVAILABLE COPY

```
        ;SET NEXT/BACK
        (A) $298 "99"
        (A) $299 ":BUTTON4"
        (G) :SHOW.NEXTBACK

        ;SET FLAGS
        (A) $220 "7" ;button flag
        (A) $227 "6"

        (J) :EVENTS.WAIT

;* ------------------------------------------------------------
;level 2

        ;RETIREMENT BAR

        ;*
        (:) :CLOSE.BAR.RETIRE

        ;HIGHLIGHT YR
        (S)* "n.bar.retire.title!.s"
        (W) 1
        (S)* "n.bar.retire.title.s"

        (G) :FILL.PROMPT.3.12.Int ;3 buttons
        (G) :SHOW.FIRST.PROMPT

        (J) :BUTTON7.5

        ;*
        (:) :RETIRE.1/9

        ;HIGHLIGHT YR
        (S)* "n.bar.retire.s"
        (S)* "n.bar.retire.1/9!.s"

        (G) :PREP.PIE
                (A) $208 "20" ;ratio
                (Y) 97
        (G) :SNAP.PIE

        (J) :MAIN.WAIT

        ;*
        (:) :RETIRE.2/8

        ;HIGHLIGHT YR
        (S)* "n.bar.retire.s"
        (S)* "n.bar.retire.2/8!.s"

        (G) :PREP.PIE
                (A) $208 "25" ;ratio
                (Y) 97
        (G) :SNAP.PIE

        (J) :MAIN.WAIT

        ;*
        (:) :RETIRE.3/7
```

```
;HIGHLIGHT YR
(S)* "n.bar.retire.s"
(S)* "n.bar.retire.3/7!.s"

(G) :PREP.PIE
        (A) $208 "30" ;ratio
        (Y) 97
(G) :SNAP.PIE

(J) :MAIN.WAIT

;*
(:) :RETIRE.4/6

;HIGHLIGHT YR
(S)* "n.bar.retire.s"
(S)* "n.bar.retire.4/6!.s"

(G) :PREP.PIE
        (A) $208 "35" ;ratio
        (Y) 97
(G) :SNAP.PIE

(J) :MAIN.WAIT

;*
(:) :RETIRE.5/5

;HIGHLIGHT YR
(S)* "n.bar.retire.s"
(S)* "n.bar.retire.5/5!.s"

(G) :PREP.PIE
        (A) $208 "40" ;ratio
        (Y) 97
(G) :SNAP.PIE

(J) :MAIN.WAIT

;*
(:) :RETIRE.6/4

;HIGHLIGHT YR
(S)* "n.bar.retire.s"
(S)* "n.bar.retire.6/4!.s"

(G) :PREP.PIE
        (A) $208 "50" ;ratio
        (Y) 97
(G) :SNAP.PIE

(J) :MAIN.WAIT

;*
(:) :RETIRE.7/3

;HIGHLIGHT YR
(S)* "n.bar.retire.s"
(S)* "n.bar.retire.7/3!.s"

(G) :PREP.PIE
        (A) $208 "60" ;ratio
        (Y) 97
(G) :SNAP.PIE
```

BEST AVAILABLE COPY

```
(J) :MAIN.WAIT

;•
(:) :RETIRE.8/2

;HIGHLIGHT YR
(S)* "n.bar.retire.s"
(S)* "n.bar.retire.8/2!.s"

(G) :PREP.PIE
        (A) $208 "70" ;ratio
        (Y) 97
(G) :SNAP.PIE

(J) :MAIN.WAIT

;•
(:) :RETIRE.9/1

;HIGHLIGHT YR
(S)* "n.bar.retire.s"
(S)* "n.bar.retire.9/1!.s"

(G) :PREP.PIE
        (A) $208 "80" ;ratio
        (Y) 97
(G) :SNAP.PIE

(J) :MAIN.WAIT

;• ____________________

;•
(:) :CLOSE.BAR.COLLEGE

;HIGHLIGHT YR
(S)* "n.bar.college.title!.s"
(W) 1
(S)* "n.bar.college.title.s"

(G) :FILL.PROMPT.3.12.int  ;3 buttons
(G) :SHOW.FIRST.PROMPT

(J) :BUTTON7.5


;•
(:) :COLLEGE.3/7

;HIGHLIGHT YR
(S)* "n.bar.college.s"
(S)* "n.bar.college.3/7!.s"

(G) :PREP.PIE
        (A) $208 "35" ;ratio
        (Y) 97
(G) :SNAP.PIE

(J) :MAIN.WAIT

;•
(:) :COLLEGE.4/6
```

BEST AVAILABLE COPY

```
;HIGHLIGHT YR
(S)* "n.bar.college.s"
(S)* "n.bar.college.4/6!.s"

(G) :PREP.PIE
        (A) $208 "40" ;ratio
        (Y) 97
(G) :SNAP.PIE

(J) :MAIN.WAIT

;*
(:) :COLLEGE.5/5

;HIGHLIGHT YR
(S)* "n.bar.college.s"
(S)* "n.bar.college.5/5!.s"

(G) :PREP.PIE
        (A) $208 "45" ;ratio
        (Y) 97
(G) :SNAP.PIE

(J) :MAIN.WAIT

;*
(:) :COLLEGE.6/4

;HIGHLIGHT YR
(S)* "n.bar.college.s"
(S)* "n.bar.college.6/4!.s"

(G) :PREP.PIE
        (A) $208 "55" ;ratio
        (Y) 97
(G) :SNAP.PIE

(J) :MAIN.WAIT

;*
(:) :COLLEGE.7/3

;HIGHLIGHT YR
(S)* "n.bar.college.s"
(S)* "n.bar.college.7/3!.s"

(G) :PREP.PIE
        (A) $208 "65" ;ratio
        (Y) 97
(G) :SNAP.PIE

(J) :MAIN.WAIT


;* ---------------------------
;HOME BAR

        ;*
        (:) :CLOSE.BAR.HOME

        ;HIGHLIGHT YR
        (S)* "n.bar.home.title!.s"
```

BEST AVAILABLE COPY

```
(W: 1
(S)* "n.bar.home.title.s"

(G) :FILL.PROMPT.3.12.int  ;3 buttons
(G) :SHOW.FIRST.PROMPT

(J) :BUTTON7.5


;*
(:) :HOME.YES

;HIGHLIGHT  YR
(S)* "n.bar.home.s"
(S)* "n.bar.home.yes!.s"

(G) :PREP.PIE
        (A) $208 "40" ;ratio
        (Y) 97
(G) :SNAP.PIE

(J) :MAIN.WAIT


;*
(:) :HOME.NO

;HIGHLIGHT  YR
(S)* "n.bar.home.s"
(S)* "n.bar.home.no!.s"

(G) :PREP.PIE
        (A) $208 "60" ;ratio
        (Y) 97
(G) :SNAP.PIE

(J) :MAIN.WAIT


;*
(:) :IS.BUILD.DONE

        If $179 = 1         ;if recommendation is cooked
                {
                (A) $298 "99"
                (A) $299 ":BUTTON4"     ;show proposed pie
                (G) :SHOW.NEXTBACK
                (G) :FILL.PROMPT.3.19a
                (G) :SHOW.FIRST.PROMPT
                }
        else                ;if recommendation is not cooked
                {
                ;(A) $298 "99"
                ;(A) $299 "99"
                (G) :SHOW.NEXTBACK
                (G) :FILL.PROMPT.3.15.int ;temp til real prompt
                (G) :SHOW.FIRST.PROMPT
                }

        (R)

;****************************************************************************
*******
;SECTION 4 - SHOW PROPOSED PIE
```

BEST AVAILABLE COPY

```
;*****************************************************************************
*******

;*
( ) :BUTTON4     ;recommendation pie

        if $251 <> 0        ;if a card is open
                (G) :CLOSE.CARD

        if $220 <> 4        ;if rec pie is not showing
                if $220 <> 2        ;if curr pie is not showing
                        if $220 <> 7        ;if build pie is not showing
                                (G) :CLEAR.CENTER.SCREEN.FROM.BUTTON

        if $241 <> 4        ;if mainmenu is not highlit here
                {
                (A) $241 "4" ;mainmenu location
                (G) :REFRESH.MAINMENU
                (G) :REFRESH.TABS
                }

        ;- show prompt
                (G) :FILL.PROMPT.4.1  ;recommended allocation pie
                (G) :SHOW.FIRST.PROMPT

        ;- blank out 3 buttons (in case)
                (S)* "n.bar.blnk.s"

        ;- label pie on both screens
                (A) $199 "1" ;speed
                (D)* 7 "n.pie.rec.label.s"

        ;- show pie
                (G) :PREP.PIE
                (Z) 3
                (Y) 90
                (G) :SHOW.PIE

        ;-      next/back
                (A) $298 "99"
                (A) $299 ":BUTTON12"
                (G) :SHOW.NEXTBACK

        ;- set flags
                (A) $220 "4" ;button4
                (A) $249 "1" ;recommendation has been seen

        ;- leave
                (J) :MAIN.WAIT

;*****************************************************************************
*******
;SECTION 4 - COMPARE PIES
;*****************************************************************************
*******

;*
(:) :BUTTON12  ;TWO PIES

        if $251 <> 0        ;if a card is open
                (G) :CLOSE.CARD

        if $220 <> 12       ;if pies are not currently showing
```

BEST AVAILABLE COPY

```
(G) :CLEAR.CENTER.SCREEN.FROM.BUTTON

(G) :FILL.PROMPT.4.1a ;two pies
(G) :SHOW.FIRST.PROMPT

;LABEL PIES on both screens
(A) $199 "1" ;speed
(D)* 7 "n.pie.two.label.s"

;SETUP Z3
(Z) 3
(S) "n.center2.blnk.s"

;DRAW TWO PIES on Z3
(Z) 3
(Y) 92

;LABEL PIES on z
(S) "n.pie.two.label.s"

(Z) 1

;SHOW PIES ON MAIN SCREEN
(A) $199 "1" ;speed
(U) 7 "n.center2.blnk.s"

(Z) 2

;SHOW PIES ON CUST SCREEN
(A) $199 " " ;speed
(U) 7 "n.center2.blnk.s"

(Z) 1

;SET NEXT/BACK
(A) $298 "99"
(A) $299 ":REQUEST.BANK.REC.INT"
(G) :SHOW.NEXTBACK

;SET FLAG
(A) $220 "12"

(J) :MAIN.WAIT

;*****************************************************************************
*******
;SECTION 5 - SHOW GOLDEN BARS
;*****************************************************************************
*******
;*

(:) :REQUEST.BUTTON6.REFRESH

        ;need logic for deciding what is on screen to refresh.
        ;to be built.

(J) :MAIN.WAIT

;*------------------------------------------------------------

;from csr menu selections...

(:) :PROPOSED.CSR ;from csr menu
```

Money Advice Scan File

BEST AVAILABLE COPY

```
(G) :CLEAR.CENTER.SCREEN.FROM.BUTTON
(A) $220 "7" ;button flag , is this number right?

(A) $178 "2"
(G) :INITIAL.CSR

;SET NEXT/BACK
(A) $298 "99"
(A) $299 "99"
(G) :SHOW.NEXTBACK

(J) :MAIN.WAIT

;*--------------------
(:) :CURRENT.CSR                ;from csr menu

    (G) :CLEAR.CENTER.SCREEN.FROM.BUTTON
    (A) $220 "7" ;button flag , is this number right?

    (A) $178 "1"
    (G) :INITIAL.CSR

    ;SET NEXT/BACK
    (A) $298 "99"
    (A) $299 "99"
    (G) :SHOW.NEXTBACK

    (J) :MAIN.WAIT

;*--------------------
(:) :OTHER.CSR              ;from csr menu

    (G) :CLEAR.CENTER.SCREEN.FROM.BUTTON
    (A) $220 "7" .;button flag , is this number right?

    (A) $178 "3"
    (G) :INITIAL.CSR

    ;SET NEXT/BACK
    (A) $298 "99"
    (A) $299 "99"
    (G) :SHOW.NEXTBACK

    (J) :MAIN.WAIT

;*--------------------
;level 2

    (:) :INITIAL.CSR
        (A) $177 "2"

        ; set flag to say that the comparison window is closed
        (A) $181 "0"
        (A) $176 ""

        ;SET BUTTON FLAGS
        (A) $220 "61"

        (G) :SHOW.NEW.BARS
        (G) :SHOW.FIRST.BAR.PROMPT

        (R)
```

BEST AVAILABLE COPY

BEST AVAILABLE COPY

```
;*----------------------------------------------------------
      (:) :CLOSE.BARS

       ;HIGHLIGHT
       (S)* "n.bartabclose!.s"
       (W) 4
       (S)* "n.bartabclose.s"

             ; set flag to say that the comparison window is closed
             (A) $181 "0"
             (A) $220 "0"  ;button flag          clear
             (A) $176 ""

             ;restore background
       (A) $199 "0"
       (S)* "n.center2.blnk.s"
       (A) $220 "0"

             (G) :FILL.PROMPT.NONE
             (G) :SHOW.FIRST.PROMPT

      (J) :MAIN.WAIT
;*--------------------
      (:) :CLOSE.COMPARISON.WINDOW

       ;HIGHLIGHT
      (S)     "n.bar.chart.det.tabclose!.s"
      (W) 4
      (S)     "n.bar.chart.det.tabclose.s"

             ; set flag to say that the comparison window is closed
             (A) $181 "0"
             (A) $176 ""

             ;restore background
      (A) $199 "3"
             ;build new backround without losing info in key
             (Z) 3
             (D)1 "n.bar.chart.keyhole.s"
             ;rewrite bars
             (Y) 176

             (Z) 2
             (U) 1 "n.bar.chart.s"

             (Z) 1
             (U) 1 "n.bar.chart.s"

             (G) :SHOW.FIRST.BAR.PROMPT

      (J) :MAIN.WAIT
;*----------------------------------------------------------

  (:) :BARTAB1
          ;PUT UP HI-LO & AVERAGE CHOICES FOR PROPOSED
                (S)* "n.proposed.bartab!.s"

      (J) :CURRENT

      (:) :BARTAB2
          ;PUT UP HI-LO & AVERAGE CHOICES FOR CURRENT
```

```
        (S)* "n.current.bartab!.s"

(J) :OTHER

(:) :BARTAB3
   ;PUT UP HI-LO & AVERAGE CHOICES FOR OTHER
        (S)* "n.other.bartab!.s"

(J) :PROPOSED
;*-----------------------------------------------------------
(:) :SHOW.MIX

        if $178 = 1
                {
                (G) :SHOW.CURRENT.MIX
(S) "n.current.bartab.s"
                }
        if $178 = 2
                {
                (G) :SHOW.PROPOSED.MIX
(S) "n.proposed.bartab.s"
                }
        if $178 = 3
                {
                (G) :SHOW.OTHER.MIX
(S) "n.other.bartab.s"
                }

(R)
;*-----------------------------------------------------------
.level 2

(:) :SHOW.CURRENT.MIX          ;in box at left
   (S) "n.current.bartab.s"

        ;SHOW CURRENT $ AND %
   (H) 131
stringFormat $290 "%$,n" $42
        displayLeft $290 @120,178
   stringFormat $290 "%$,n" $43
   displayLeft $290 @140,178
   stringFormat $290 "%$,n" $44
   displayLeft $290 @160,178
   (H) 132
   displayLeft $45 @120,211
   (H) 133
   displayLeft $46 @140,211
   (H) 134
   displayLeft $47 @160,211
 (R)

(:) :SHOW.PROPOSED.MIX         ;in box at left
   (S) "n.proposed.bartab.s"

        ;SHOW PROPOSED $ AND %
   (H) 131
stringFormat $290 "%$,n" $22
        displayLeft $290 @120,178
   stringFormat $290 "%$,n" $23
   displayLeft $290 @140,178
   stringFormat $290 "%$,n" $24
   displayLeft $290 @160,178
   (H) 132
```

BEST AVAILABLE COPY

BEST AVAILABLE COPY

```
    displayLeft $25 ●120,211
    (H) 133
    displayLeft $26 ●140,211
    (H) 134
    displayLeft $27 ●160,211
  (R)

  (:) :SHOW.OTHER.MIX    ;in box at left
    (S) "n.other.bartab.s"

    ;SHOW OTHERS AND %
    (H) 131
    stringFormat $290 "%$,n" $182
    if $290 = 0
                stringFormat $290 "$0"
         displayLeft $290 ●120,178
         stringFormat $290 "%$,n" $183
    if $290 = 0
                stringFormat $290 "$0"
    displayLeft $290 ●140,178
         stringFormat $290 "%$,n" $184
    if $290 = 0
                stringFormat $290 "$0"
    displayLeft $290 ●160,178
         (H) 132
displayLeft $185 ●120,212
    (H) 133
    displayLeft $186 ●140,212
    (H) 134
    displayLeft $187 ●160,212
  (R)

;•------------------------------------------------------------
  (:) :CURRENT

         ;  tell (Y) 176 which mix to use
         (A) $178 "1"
         (G)  :SHOW.NEW.BARS
         (G)  :SHOW.FIRST.BAR.PROMPT

  (J) :MAIN.WAIT

;•------------------------------------------------------------
  (:) :OTHER

         ;  tell (Y) 176 which mix to use
         (A) $178 "3"

         (G)  :SHOW.NEW.BARS

         ;  If other is uninitialized, prompt the user to fill in the allocation
         $290 := $185 + $186 + $187
         if $290 = 0
                {
                (G) :FILL.PROMPT.5.4 ;fill other description
                (G) :SHOW.FIRST.PROMPT
                }

         else
                (G)  :SHOW.FIRST.BAR.PROMPT

  (J) :MAIN.WAIT

;•------------------------------------------------------------
```

BEST AVAILABLE COPY

```
(:) :PROPOSED

        ; tell (Y) 176 which mix to use
        (A) $178 "2"
        (G) :SHOW.NEW.BARS
        (G) :SHOW.FIRST.BAR.PROMPT

(J) :MAIN.WAIT

;*------------------------------------------------------------
(:) :AVERAGE

        ; tell (Y) 176 which mix to use
        (A) $177 "1"
   (S) "n.average.bartabl.s"
        (G) :SHOW.NEW.BARS
        (G) :SHOW.FIRST.BAR.PROMPT

(J) :MAIN.WAIT

;*------------------------------------------------------------
(:) :RANGE

        ; tell (Y) 176 which mix to use
        (A) $177 "2"
   (S) "n.range.bartabl.s"
        (G) :SHOW.NEW.BARS
        (G) :SHOW.FIRST.BAR.PROMPT

(J) :MAIN.WAIT

;*------------------------------------------------------------
(:) :SHOW.NEW.BARS

  (Z) 3
        (A) $176 ""

        ; clear the back screen
(S) "n.bar.chart.s"

        ; show the average / hi-lo tab
        if $177 = 1
        (S) "n.average.bartab.s"
        if $177 = 2
        (S) "n.range.bartab.s"
        ; show the mix tab and fill in our mix window
        (G) :SHOW.MIX

        ; put up the bars
        (Y) 176

        ; bring it to the front screen
        (Z) 2
        (U) 1 "n.bar.chart.s"
        (Z) 1
        (U) 1 "n.bar.chart.s"

(R)

;*------------------------------------------------------------
(:) :SHOW.FIRST.BAR.PROMPT

        ; show the appropriate first prompt
```

```
; If percentages a.e not initialized and we are looking at the alterna
$290 := $185 + $186 + $187 + $178
If $290 = 3
                (G) :FILL.PROMPT.5.4 ;fill in the percentages to get a
else
        {
        If $177 = 2
                (G) :FILL.PROMPT.5.3 ;range description
        else
                (G) :FILL.PROMPT.5.1 ;average description
        }

(G) :SHOW.FIRST.PROMPT
(R)

;*----------------------------------------
(:) :EDIT.OTHER.BANK%

        ; tell (Y) 176 which mix to use
        (A) $178 "3"
        (G) :SHOW.NEW.BARS ; debug
        (G) :SHOW.MIX

        (A) $293 "1"
        (G) :CLEAR.294
        (G) :CLEAR.295
        (G) :PERCENT.ONLY
        (G) :FILL.PROMPT.5.4.A ;ask for percentage
        (G) :SHOW.FIRST.PROMPT

        (:) :EDIT.BANK%

    ;WAIT FOR NEW BANK %
    (H) 142
    (A) $185 ""
        formattedInput " $185 "%n" @120,213 3 25

        ;SHOW BLANK ENTRY BARS
        (S)" "n.%bank.bar.s"
        (H) 132
displayLeft" $185 @120,212

        If $185 >= 100
            (G) :CHANGE.PERCENT
        else
                {
                (G) :FILL.PROMPT.5.4.D ;ask for another percentage
                (G) :SHOW.FIRST.PROMPT
                }

        If $294 = 1
            (G) :CHANGE.PERCENT
        else
        If $295 = 1
            (G) :CHANGE.PERCENT

(J) :MAIN.WAIT
;*----------------------------------------
(:) :EDIT.OTHER.INCOME%

        ; tell (Y) 176 which mix to use
        (A) $178 "3"
        (G) :SHOW.NEW.BARS ; debug
```

BEST AVAILABLE COPY

```
        (G) :SHOW.MIX
        (A) $294 "1"
        (G) :CLEAR.293
        (G) :CLEAR.295
        (G) :PERCENT.ONLY
        (G) :FILL.PROMPT.5.4.B ;ask for percentage
        (G) :SHOW.FIRST.PROMPT

        (:) :EDIT.INCOME%

  ;WAIT FOR NEW INCOME %
        (H) 143
  (A) $186 ""
        formattedInput * $186 "%n" @140,213 3 25

        ;SHOW BLANK ENTRY BARS
        (S)* "n.%income.bar.s"
        (H) 133
  displayLeft* $186 @140,212

        If $186 >= 100
           (G) :CHANGE.PERCENT
        else
                {
                (G) :FILL.PROMPT.5.4.D ;ask for another percentage
                (G) :SHOW.FIRST.PROMPT
                }

        If $293 = 1
           (G) :CHANGE.PERCENT
        else
        If $295 = 1
           (G) :CHANGE.PERCENT

(J) :MAIN.WAIT
;*------------------------------------
(:) :EDIT.OTHER.GROWTH%

        ; tell (Y) 176 which mix to use
        (A) $178 "3"
        (G) :SHOW.NEW.BARS ; debug
        (G) :SHOW.MIX
        (A) $295 "1"
        (G) :CLEAR.293
        (G) :CLEAR.294
        (G) :PERCENT.ONLY
        (G) :FILL.PROMPT.5.4.C ;ask for percentage
        (G) :SHOW.FIRST.PROMPT

        (:) :EDIT.GROWTH%

  ;WAIT FOR NEW GROWTH %
        (H) 144
  (A) $187 ""
        formattedInput * $187 "%n" @160,213 3 25

        ;SHOW BLANK ENTRY BARS
        (S)* "n.%growth.bar.s"
        (H) 134
  displayLeft* $187 @160,212

        If $187 >= 100
           (G) :CHANGE.PERCENT
        else
```

BEST AVAILABLE COPY

BEST AVAILABLE COPY

```
                {
                (G) :FILL.PROMPT.5.4.D ;ask for another percentage
                (G) :SHOW.FIRST.PROMPT
                }

        If $293 = 1
           (G) :CHANGE.PERCENT
        else
        If $294 = 1
           (G) :CHANGE.PERCENT

   (J) :MAIN.WAIT

   ;* ___________________
   (:) :CLEAR.293
       (A) $293 "0"
       (A) $185 ""
             (D)7 "n.bar.chart.clear.s"
   (R)

   (:) :CLEAR.294
       (A) $294 "0"
       (A) $186 ""
             (D)7 "n.bar.chart.clear.s"
   (R)

   (:) :CLEAR.295
       (A) $295 "0"
       (A) $187 ""
             (D)7 "n.bar.chart.clear.s"
   (R)

   ;* ___________________
   (:) :CHANGE.PERCENT

           (G) :FILL.PROMPT.5.4  ;edit other %
           (G) :SHOW.FIRST.PROMPT

; do our real totalling calculation
           (Y) 177
           (G) :SHOW.NEW.BARS

           ; set flag to say that the comparison window is closed
           (A) $181 "0"
           (A) $176 ""

; set flag to say that all percents are editable agin
           (A) $293 "0"
           (A) $294 "0"
           (A) $295 "0"

  (R)

  ;* ___________________
  (:) :COMPARISON.WINDOW.PROMPT

          ;put up the appropriate prompt for the comparison window
          If $177 = 2
                  (G) :FILL.PROMPT.5.9 ;range comparison description
          else
                  {
                  ; see if our bar click counter is odd or even (it will never get h
                  If $175 > 1
```

```
                $175 := $175 - 2

            if $175 = 1
                (G) :FILL.PROMPT.5.7 ;average comparison descripti
            else
                (G) :FILL.PROMPT.5.8 ;average comparison descripti
            }
        (G) :SHOW.FIRST.PROMPT
(R)
```

BEST AVAILABLE COPY

```
;* ___________________
(:) :1BUTTON.BAR.LABEL
(:) :2BUTTON.BAR.LABEL
(:) :3BUTTON.BAR.LABEL
(:) :4BUTTON.BAR.LABEL
(:) :5BUTTON.BAR.LABEL
(:) :6BUTTON.BAR.LABEL
(:) :7BUTTON.BAR.LABEL
(:) :8BUTTON.BAR.LABEL
(:) :9BUTTON.BAR.LABEL
(:) :10BUTTON.BAR.LABEL
(:) :11BUTTON.BAR.LABEL
(:) :12BUTTON.BAR.LABEL
(:) :13BUTTON.BAR.LABEL
(:) :14BUTTON.BAR.LABEL
(:) :15BUTTON.BAR.LABEL

if $176 = $33  ;if second (or third, ...) click on a bar
        {
        ;increment our bar click counter
        $175 := $175 + 1

        ;  bring the complete golden bars screen forward to erase any old lal
comparison box
        (Z) 2
        (U) 1 "n.bar.chart.s"

        (Z) 1
        (U) 1 "n.bar.chart.s"

        ;put bar comparison window on back screen
        (Z)3
        (S) "n.bar.chart.det.s"
                (A) $302 "20"                                   ; pixel off
                (I)- $302 "n.bar.chart.det.s"       ; draw the shadow with th
the var $1

        ; set flag to indicate that the comparison window is open
        (A) $181 "1"

        ;draw amounts above bar either on main screen or comparison wind
on whether $33 = $176
        (Y) 178

        ;bring background foward
        (Z) 2
        (U) 1 "n.bar.chart.s"

        (Z) 1
        (U) 1 "n.bar.chart.s"

        (G) :COMPARISON.WINDOW.PROMPT
        }
```

BEST AVAILABLE COPY

```
        else            ;if first click on a bar
                {
                ;reset our bar click counter
                (A) $175 "0"

                ;build new backround without losing info in key
                (Z)3
                (D)1 "n.bar.chart.keyhole.s"

                ;rewrite bars
                (Y) 176
                stringFormat $176 $33

                ;draw amounts above bar either on main screen or comparison windo
on whether $33 = $176
                (Y) 178

                ;bring background foward
                (Z) 2
                (U) 1 "n.bar.chart.s"
                (Z) 1
                (U) 1 "n.bar.chart.s"

                ;put up the appropriate prompt
                if $177 = 2
                        (G) :FILL.PROMPT.5.6 ;range label description
                else
                        (G) :FILL.PROMPT.5.5 ;average label description
                (G) :SHOW.FIRST.PROMPT
                }

        (J) :MAIN.WAIT

        ;* ___________________
        (:) :SHOW.FEE.OR.NOT   ; ("OR.NOT" because (Y) 178 toggles between showin
not)

                ;increment our bar click counter
                $175 := $175 + 1

                (G) :COMPARISON.WINDOW.PROMPT

                ;build new proposed comparison bar
                (Z)3
                (S) "n.bar.chart.pro.det.s"
                (Y) 178

                ;bring backround foward
                (Z) 2
                (U) 1 "n.bar.chart.s"
                (Z) 1
                (U) 1 "n.bar.chart.s"

        (J) :MAIN.WAIT

;*************************************************************************
;SECTION 6 - SUMMARY EVENT
;*************************************************************************

;*
(:) :BUTTON11

        (G) :CLEAR.CENTER.SCREEN.FROM.BUTTON
```

```
        ;SET FLAGS
        (A) $220 "11"  ;button flag

;*
(:) :OPEN.SUMMARY

        (G) :FILL.PROMPT.6.0
        (G) :SHOW.FIRST.PROMPT

        ;SHOW SUMMARY
        (S)* "n.summary.pg0.s"

        ;SHOW SQUARE TO CLOSE
        (S)* "n.summary.tabclose.s"

        ;SET NEXT/BACK
        (A) $298 "99"
        (A) $299 "99"
        (G) :SHOW.NEXTBACK

        ;LEAVE
        (J) :MAIN.WAIT

;*
(:) :CLOSE.SUMMARY

        ;HIGHLIGHT CLOSE-SQUARE
        (S)* "n.summary.tabclose!.s"

        ;PAUSE
        (W) 4

        ;UN-HIGHLIGHT CLOSE-SQUARE
        (S)* "n.summary.tabclose.s"

        ;CLOSE SUMMARY
        (S)* "n.center2.blnk.s"

        (G) :FILL.PROMPT.NONE
        (G) :SHOW.FIRST.PROMPT

        ;SET FLAG
        (A) $220 "0"  ;button flag

        ;LEAVE
        (J) :MAIN.WAIT

;*
(:) :REQUEST.BUTTON11.REFRESH

        (G) :FILL.PROMPT.6.0
        (G) :SHOW.FIRST.PROMPT

        (Q) "$220 = 111" :REQUEST.BUTTON11.1.REFRESH ;summary pg 1
        (Q) "$220 = 112" :REQUEST.BUTTON11.2.REFRESH ;summary pg 2
        (Q) "$220 = 113" :REQUEST.BUTTON11.3.REFRESH ;summary pg 3

        (H) 1
        (V) "PROBLEM AT BUTTON 11 REFRESH" @100,200

;=====================================================================
;RESPONSES TO BUTTON PRESS ON SUMMARY PAGES

;*
```

BEST AVAILABLE COPY

BEST AVAILABLE COPY

```
( ) :SUMMARY.PG1

        ;SET FLAG
        (A) $220 "111" ;button flag

        ;UNHIGHLIGHT BUTTONS
        (S)* "n.summary.buttons.s"

        ;HIGHLIGHT BUTTON
        (S)* "n.summary.button1!.s"

        (W) 2

        (:) :REQUEST.BUTTON11.1.REFRESH

        ;CLEAR DISPLAY AREA
        (S)* "n.summary.blnk.s"

        ;SHOW 2 PIES (CONDENSED) PG 1
        (S)* "n.summary.pg1.blnk.s"
        (Y)* 89

        (J) :MAIN.WAIT

;*
(:) :SUMMARY.PG2

        ;SET FLAG
        (A) $220 "112" ;button flag

        ;UNHIGHLIGHT BUTTONS
        (S)* "n.summary.buttons.s"

        ;HIGHLIGHT BUTTON
        (S)* "n.summary.button2!.s"

        (W) 2

        (:) :REQUEST.BUTTON11.2.REFRESH

        ;CLEAR DISPLAY AREA
        (S)* "n.summary.blnk.s"

        ;SHOW DATA PG 2
        (S)* "n.summary.pg2.blnk.s"

        (H) 12

        ;LABELS
        (V)* "Bank" @170,157
        (V)* "Income" @196,157
        (V)* "Growth" @222,157

        if $20 > 10000000
                (H) 22

        ;CURRENT
        stringFormat $290 "%$,n" $42
        displayLeft* $290 @170, 314

        stringFormat $290 "%$,n" $43
        displayLeft* $290 @196, 314

        stringFormat $290 "%$,n" $44
```

```
displayLeft* $290 ●222, 314

stringFormat $290 "%$,n" $20
displayLeft* $290 ●248, 314

;RECOMMENDED
stringFormat $290 "%$,n" $22
displayLeft* $290 ●170, 408

stringFormat $290 "%$,n" $23
displayLeft* $290 ●196, 408

stringFormat $290 "%$,n" $24
displayLeft* $290 ●222, 408

stringFormat $290 "%$,n" $20
displayLeft* $290 ●248, 408

;DIFFERENCE
displayLeft* $152 ●170, 501
displayLeft* $153 ●196, 501
displayLeft* $154 ●222, 501

(J) :MAIN.WAIT

;*
(:) :SUMMARY.PG3

;SET FLAG
(A) $220 "113" ;button flag

;UNHIGHLIGHT BUTTONS
(S)* "n.summary.buttons.s"

;HIGHLIGHT BUTTON
(S)* "n.summary.button3!.s"

(W) 2

(:) :REQUEST.BUTTON11.3.REFRESH

;CLEAR DISPLAY AREA
(S)* "n.summary.blnk.s"

;SHOW PG 3
(S)* "n.summary.pg3.blnk.s"

;*
(:) :SUMMARY.OF.BANK

if $152 = 0
        (J) :BANK.IS.FINE
if $152 > 0
        (J) :INCREASE.BANK
if $152 < 0
        (J) :DECREASE.BANK

    (:) :BANK.IS.FINE
    (H) 6
    (V)* "You currently nave the right amount" ●126,179
    (V)* "of Bank money in your portfolio." ●142,179

    (J) :SUMMARY.OF.INCOME
```

BEST AVAILABLE COPY

```
(:) :INCREASE.BANK
(H) 6
(V)* "Increase your Bank money by %$" $155 ●126,179
(V)* "to cover your short term needs." ●142,179

(J) :SUMMARY.OF.INCOME

(:) :DECREASE.BANK
(H) 6
(V)* "Move %$ of your Bank money into" $155 ●126,179
(V)* "longer term instruments with a higher yield." ●142,179

(J) :SUMMARY.OF.INCOME

;*
(:) :SUMMARY.OF.INCOME

If $153 = 0
        (J) :INCOME.IS.FINE
If $153 > 0
        (J) :INCREASE.INCOME
If $153 < 0
        (J) :DECREASE.INCOME

        (:) :INCOME.IS.FINE
        (H) 6
        (V)* "You currently have the right amount" ●174,179
        (V)* "of Income money in your portfolio." ●190,179

        (J) :SUMMARY.OF.GROWTH

        (:) :INCREASE.INCOME
        (H) 6
        (V)* "Increase your Income money by %$" $156 ●174,179
        (V)* "to take advantage of predictable yields." ●190,179

        (J) :SUMMARY.OF.GROWTH

        (:) :DECREASE.INCOME
        (H) 6
        (V)* "Decrease the Income money in your" ●174,179
        (V)* "portfolio by %$." $156 ●190,179

        (J) :SUMMARY.OF.GROWTH

;*
(:) :SUMMARY.OF.GROWTH

If $154 = 0
        (J) :GROWTH.IS.FINE
If $154 > 0
        (J) :INCREASE.GROWTH
If $154 < 0
        (J) :DECREASE.GROWTH

        (:) :GROWTH.IS.FINE
        (H) 6
        (V)* "You currently have the right amount" ●222,179
        (V)* "of Growth money in your portfolio." ●238,179

        (J) :MAIN.WAIT
```

Money Advice Scan File

BEST AVAILABLE COPY

BEST AVAILABLE COPY

```
(:) :INCREASE.GROWTH
(H) 6
(V)* "Increase your Growth money by %S" $157 ●222,179
(V)* "to ensure long-term capital gain." ●238,179

(J) :MAIN.WAIT

(:) :DECREASE.GROWTH
(H) 6
(V)* "Decrease the Growth money in your" ●222,179
(V)* "portfolio by %S." $157 ●238,179

(J) :MAIN.WAIT

;*****************************************************************************
*******
;SECTION 6 - PRINTOUT
;*****************************************************************************
*******

;*
(:) :PRINTOUT

        ;SAVE BACKGROUND
        (A) $302 "20"                    ; shadow offset
        (X)~ $302 "n.message.orange.s"

        ;SHOW MESSAGE BOX
        (S) "n.message.orange.s"
        (I)~ $302 "n.message.orange.s" ;shadow
        (S) "n.message.finger.s"
        (S) "n.message.proceed.s"
        (S) "n.message.cancel.s"

        (H) 23
        (V) "This print-out will take a few^minutes to complete.^Would you like to prc
●179,242

        (T)
        (T) $33 "n.message.proceed.s" :DO.PRINTOUT
        (T) $33 "n.message.cancel.s" :REQUEST.CANCEL.PRINTOUT

        (J) :MAIN.WAIT.LOADED

;*---------------------------------------------------------------------

        ;*
        (:) :DO.PRINTOUT

                ;- highlight button
                        (S) "n.message.proceed!.s"
                        (W) 2
                        (S) "n.message.proceed.s"

                ;- show message card on Z
                        (Z) 3
                        (S) "n.message.green.s"
                        (S) "n.message.sign.in.window.s"
                  ;(S) "n.message.cancel.s"
                        (H) 23
                        (V) "How many print-outs^would you like?" ●165,217

                ;- show on main screen
```

BEST AVAILABLE COPY

```
        (Z) 1
        (U) 0 "n.messane.green.s"
        ;;(I)~ $302 "n.message.green.s" ;shadow

; wait for number of printouts
        (H) 23
        (A) $316 "3"
        formattedInput $316 "%-n" ●212,225 1

        If $316 = 0
                (J) :after.print.loop

;- blank the name
        (S) "n.message.sign.in.window.s"

;- show the number of print-outs
        (V) $316 ●212,225
        (W) 4

;- clear previous message
        (S) "n.message.orange.s"

;- show message
        (H) 23
        (V) "The report is printing.^To cancel, hold down the^'Apple'
press^'period'." ●179,240  ;use chicago font to make an apple.

;- make up a name if there is not one here
testEmpty $1 ;name empty?
If $380 = 1 ;if empty
        {
        (A) $380 "0"  ;reset
        (A) $1 "Money Advisor Client"
        (G) :SHOW.NAME.ON.NAMETAB
        }

;- save the part of the screen that Apple's printing box will overwrite
        (X) #0,0,200,640

;- do the printout
        $290 := 0
        (:) :print.loop.top

        (Y) 101
        $290 := $290 + 1

        If $290 < $316
                (J) :print.loop.top

;- restore the part of the screen that Apple's printing box overwrote
        (X) 0

;- save variables ( MIS )
        (Y) 202
        ;  and remember his name as saved so we don't do another au
        stringFormat $393 $1

;- clear previous message
        (S) "n.message.orange.s"

;- show message
        (H) 23
        (V) "The printing is finished." ●179,240
```

BEST AVAILABLE COPY

```
        (W) 30

    (:) :after.print.loop

    ;- restore background
        (X)

    ;- put up name again just in case we made one up
        (G) :SHOW.NAME.ON.NAMETAB

    ;- leave
        (J) :MAIN.WAIT

  ;*
  (:) :REQUEST.CANCEL.PRINTOUT

    ;HIGHLIGHT BUTTON
    (S) "n.message.cancel!.s"
    (W) 2
    (S) "n.message.cancel.s"
    (W) 4

    ;RESTORE BACKGROUND
    (X)

    (J) :MAIN.WAIT

;****************************************************************************
*******
;SECTION 7 - HOME MORTGAGE CALCULATOR
;****************************************************************************
*******

;*
(:) :BUTTON8 ;

(:) :mortgage.uff

    ;DON'T SET BUTTON FLAG

    ;save what's under mortgage card
    (A) $302 "30"                    ; shadow offset
    (X)*~ "j.m.uff.s"

    ;show mortgage uff card
    (S)* "j.m.uff.s"
    (I)*~ $302 "j.m.uff.s" ;shadow

    ; set default interest rate, downpayment
    (A) $122  "10"
    (A) $123  "20"

    ;set up card
    (:) :m.uff.1

    ;clear mortgage uff card
    (S)* "j.m.uff.s"

    ;show interest rate
    (H) 8
    (V)* $122 @244,275

    ;show % of downpayment
```

BEST AVAILABLE COPY

```
(V)* $123 @272,233

;show customer's income
(V)* "%$" $7 @195,386

;calculates monthly mortgage, downpayment and home cost amounts
(Y)* 35

;display calculated quantities
(H) 8 ;or 8 for bold
(V)* "%$" $120 @162,335             ;monthly mort pmnt
(H) 8
(V)* "%$" $121 @222,315             ;total mortgage
(V)* "%$" $124 @273,357             ;down pmnt $
(V)* "%$" $125 @294,336             ;total home cost


;set up touch areas button 8

(T)
(T) $33 "j.m.uff.interest.s" :m.uff.2
(T) $33 "j.m.uff.dwnpymnt.s" :m.uff.3
(T) $33 "j.m.uff.tabclose!.s" :m.uff.ok

(J) :MAIN.WAIT.LOADED


;do the one of following routines depending on click

(:) :m.uff.2 ;interest rate change
        ;(S)* "j.m.uff.interest.s"
        (H) 7
        stringFormat $122 "" ; blank the interest rate %
        formattedInput * $122 "%,n" @244,292 2 ;% interest rate
(J) :m.uff.1

(:) :m.uff.3 ;% downpayment change
        ;(S)* "j.m.uff.dwnpymnt.s"
        (H) 7
        stringFormat $123 "" ; blank the downpayment
        formattedInput * $123 "%,n" @272,250 2 ;% downpayment change
(J) :m.uff.1


(:) :m.uff.ok
        (A) $220 $239 ;reset variable
        (S)* "j.m.uff.tabclose!.s"
        (W) 4

;restore background
(A) $199 "0"
(X)*

;LEAVE
(J) :MAIN.WAIT

;**************************************************************************
*******
;SECTION 7 - COLLEGE COSTS CALCULATOR
;**************************************************************************
*******

;*
(:) :BUTTON9 ;
```

BEST AVAILABLE COPY

```
( ) college.uff

        ;DON'T SET BUTTON FLAG

        ;save what's under college card
        (A) $302 "30"                   ; shadow offset
        (X)*~ "j.c.uff.s"

        ;show college uff card - blank
        (S)* "j.c.uff.s"
        (I)*~ $302 "j.c.uff.s" ;shadow

        ;*
        ;set up card
        (:) :c.uff.1

                ;clear the card
                (S)* "j.c.uff.s"

                ;*;IF YOU DO THIS BEFORE (Y)* 36 - REVERTS TO ORIG $129
                ;(Z) 3
                ;(Y) 36
                ;(Z) 1

                ;calculates cost of college and shows this info
                (Y)* 36

                ;set up touch areas button9
                (T)
                (T) $33 "j.c.uff.yrs.s" :c.uff.2
                (T) $33 "j.c.uff.tabclose!.s" :c.uff.ok

                (J) :MAIN.WAIT.LOADED

        ;do the one of following routines depending on click

        ;*
        (:) :c.uff.2
                (H) 7
                stringFormat $129 "" ;blank yrs to college
                formattedInput * $129 "%,n" ●199,395 2 ;yrs to college
                ;(A)* 2 $129 ●200,378 ;yrs to college

                If $129 > 25 ;if years too many for total $cost to fit at bottom
                        (J) :c.uff.2

                (J) :c.uff.1

        ;*
        (:) :c.uff.ok
                (S)* "j.c.uff.tabclose!.s"
                (W) 3

        ;restore background
        (A) $199 "0"
        (X)*

        ;LEAVE
        (J) :MAIN.WAIT

;*****************************************************************************
;SECTION 7 - SPECIAL CONSIDERATIONS
```

BEST AVAILABLE COPY

```
;*******************************************************************************
;*
( ) :BUTTONS
        (J) :SET.SPECIAL.STARTUP


;------------------------------------------------------------
;------------------------------------------------------------
. main special considerations startup routine
.
(.) :SET.SPECIAL.STARTUP

        ; start us looking at the min/max window
        stringFormat $311       "2"     ; allocation window state: 0 = closed; 1 = ful
minimum/maximum

        ;       set up format for input vars.
        ;       added djs 5/15
        (A)     $3·4    "%,n"   ; format string for dollar input


        ; do our local initialization
        if $311 = 1
                (G) :SET.SPECIAL.STARTUP.FOR.FULL
        else
                (G) :SET.SPECIAL.STARTUP.FOR.MIN/MAX

        ; save what's on the the current screen behind the special considerations winc
        (A) $302 "30"                   ; shadow offset
        (X)-" $302 "n.set.special.min/max.s"  ;save special window

        ;put up window & shadow
        (S)" "n.set.special.min/max.s"
        (I)"- $302 "n.set.special.min/max.s" ;shadow

        ; paint the screen
        (G) :SET.SPECIAL.PAINT

(J) :MAIN.WAIT

;------------------------------------------------------------
(:) :SET.SPECIAL.STARTUP.FOR.FULL

        ; blank the min/max variables
        (A) $350 ""
        (A) $351 ""
        (A) $353 ""
        (A) $354 ""
        (A) $356 ""
        (A) $357 ""
        (A) $359 ""
        (A) $360 ""
        (A) $362 ""
        (A) $363 ""

        ;start up the C variables
        (Y) 32

(R)

;------------------------------------------------------------
(:) :SET.SPECIAL.STARTUP.FOR.MIN/MAX
```

BEST AVAILABLE COPY

```
        ; blank the full alloc variables
        (A) $303 ""
        (A) $63 ""
        (A) $105 ""
        (A) $106 ""
        (A) $107 ""

(R)

;----------------------------------------------------------
;----------------------------------------------------------
; set up touches for the special allocation window
;
(:) :GET.TOUCHES.SET.SPECIAL

                (T)

        ; If the confirm window is open allow only proceed or cancel touches
                If $312 = 1
                {
                (T) $33 "n.message.proceed.s" @237,340 :SET.SPECIAL.PROCEED
                (T) $33 "n.message.cancel.s" @237,414 :SET.SPECIAL.CANCEL
                }

        ; else put up the common stuff for the full and min/max windows
                else
                {
                ; touch areas for the min/max & full radio buttons
                (T) $33 "n.set.min/max.dot.s" :SET.SPECIAL.MIN/MAX
                (T) $33 "n.set.fullalloc.dot.s" :SET.SPECIAL.FULL

                ; touch area for the close window button
                (T) $33 "n.set.special.tabclose.s" :SET.SPECIAL.CLOSE

                ; touch areas for the note buttons
                (T) $33 "n.set.special.cash.s"          :1.SET.SPECIAL.NOTE
                (T) $33 "n.set.special.assets.s"   :2.SET.SPECIAL.NOTE
                (T) $33 "n.set.special.bank.s"          :3.SET.SPECIAL.NOTE
                (T) $33 "n.set.special.income.s"   :4.SET.SPECIAL.NOTE
                (T) $33 "n.set.special.growth.s"   :5.SET.SPECIAL.NOTE

                ; touch areas for the full allocation window
                If $311 = 1
                        {
                        ; touch areas for the number fields - full
                        (T) $33 "n.set.special.edit1a.s"    :SET.SPECIAL.FULL.CASH
                        (T) $33 "n.set.special.edit2a.s"    :SET.SPECIAL.FULL.ASSETS
                        (T) $33 "n.set.special.edit3a.s"    :SET.SPECIAL.FULL.BANK
                        (T) $33 "n.set.special.edit4a.s"    :SET.SPECIAL.FULL.INCOME
                        (T) $33 "n.set.special.edit5a.s"    :SET.SPECIAL.FULL.GROWTH
                        }
                else
                        {
                        ; touch areas for the number fields - min/max
                        (T) $33 "n.set.special.edit1.s"          :SET.SPECIAL.MIN.C
                        (T) $33 "n.set.special.edit2.s"     :SET.SPECIAL.MIN.ASSETS
                        (T) $33 "n.set.special.edit3.s"     :SET.SPECIAL.MIN.BANK
                        (T) $33 "n.set.special.edit4.s"     :SET.SPECIAL.MIN.INCOME
                        (T) $33 "n.set.special.edit5.s"     :SET.SPECIAL.MIN.GROWTH

                        (T) $33 "n.set.special.edit1a.s"    :SET.SPECIAL.MAX.CASH
                        (T) $33 "n.set.special.edit2a.s"    :SET.SPECIAL.MAX.ASSETS
```

BEST AVAILABLE COPY

```
(T) $33 "n.set.special.edit3a.s"     :SET.SPECIAL.MAX.BANK
(T) $33 "n.set.special.edit4a.s"     :SET.SPECIAL.MAX.INCOME
(T) $33 "n.set.special.edit5a.s"     :SET.SPECIAL.MAX.GROWTI
)
    }

(R)

;----------------------------------------------------------------
;----------------------------------------------------------------
; deal with the request to input a number for full allocation
;
(:) :SET.SPECIAL.FULL.CASH

        ; highlight the input area
        (S)* "n.set.special.edit1a!.s"

        ; accept the typed number
        (H) 25
        formattedInput * $63 $314 ●165, 388 6

        ; lowlight and redisplay
        (H) 35
        (G) :SET.SPECIAL.FULL.CASH.PAINT

        ; refigure the numbers
        (Y) 33
        (G) :SET.SPECIAL.FULL.EDIT.PAINT

(J) :MAIN.WAIT

(:) :SET.SPECIAL.FULL.CASH.PAINT
        (S)* "n.set.special.edit1a.s"
        stringFormat $290 "%,n" $63
        displayLeft* $290 ●165, 387
(R).

(:) :SET.SPECIAL.FULL.REC.CASH.PAINT
        (S)* "n.set.special.edit1.s"
        stringFormat $290 "%,n" $64
        displayLeft* $290 ●165, 306
(R)

;----------------------------------------------------------------
(:) :SET.SPECIAL.FULL.ASSETS

        ; highlight the input area
        (S)* "n.set.special.edit2a!.s"

        ; accept the typed number
        (H) 25
        formattedInput * $303 $314 ●181, 388 8

        ; lowlight and redisplay
        (H) 35
        (G) :SET.SPECIAL.FULL.ASSETS.PAINT

        ; refigure the numbers
        (Y) 33
        (G) :SET.SPECIAL.FULL.EDIT.PAINT

(J) :MAIN.WAIT

(:) :SET.SPECIAL.FULL.ASSETS.PAINT
```

```
        (S)* "n.set.special.edit2a.s"
        stringFormat $290 "%,n" $303
        displayLeft* $290 ●181, 387
(R)

(:) :SET.SPECIAL.FULL.REC.ASSETS.PAINT
        (S)* "n.set.special.edit2.s"

        /* do the arithmetic: assets = growth + bonds */
        stringFormat $24 "%n" $24
        stringFormat $188 "%n" $188
        $41 := $24 + $188

        stringFormat $290 "%,n" $41
        displayLeft* $290 ●181, 306
(R)

(:) :SET.SPECIAL.FULL.TOTAL1.PAINT
        (H) 26
        display* "total:" ●197, 198
        stringFormat $290 "%,n" $20
        displayLeft* $290 ●197, 306
(R)

;------------------------------------------------------------
(:) :SET.SPECIAL.FULL.BANK

        ; highlight the input area
        (S)* "n.set.special.edit3a!.s"

        ; accept the typed number
        (H) 25
        formattedInput * $105 $314 ●213, 388 7

        ; lowlight and redisplay
        (H) 35
        (G) :SET.SPECIAL.FULL.BANK.PAINT

        ; refigure the numbers
        (Y) 33
        (G) :SET.SPECIAL.FULL.EDIT.PAINT

(J) :MAIN.WAIT

(:) :SET.SPECIAL.FULL.BANK.PAINT
        (S)* "n.set.special.edit3a.s"
        stringFormat $290 "%,n" $105
        displayLeft* $290 ●213, 387
(R)

(:) :SET.SPECIAL.FULL.REC.BANK.PAINT
        (S)* "n.set.special.edit3.s"
        stringFormat $290 "%,n" $22
        displayLeft* $290 ●213, 306
(R)

;------------------------------------------------------------
(:) :SET.SPECIAL.FULL.INCOME

        ; highlight the input area
        (S)* "n.set.special.edit4a!.s"

        ; accept the typed number
        (H) 25
```

BEST AVAILABLE COPY

BEST AVAILABLE COPY

```
        formattedInput * $106 $314 ●229, 388 7

        ; lowlight and redisplay
        (H) 35
        (G) :SET.SPECIAL.FULL.INCOME.PAINT

        ; refigure the numbers
        (Y) 33
        (G) :SET.SPECIAL.FULL.EDIT.PAINT

(J) :MAIN.WAIT

( ) :SET.SPECIAL.FULL.INCOME.PAINT
        (S)* "n.set.special.edit4a.s"
        stringFormat $290 "%,n" $106
        displayLeft* $290 ●229, 387
(R)

(:) :SET.SPECIAL.FULL.REC.INCOME.PAINT
        (S)* "n.set.special.edit4.s"
        stringFormat $290 "%,n" $23
        displayLeft* $290 ●229, 306
(R)

;------------------------------------------------------------
(:) :SET.SPECIAL.FULL.GROWTH

        ; highlight the input area
        (S)* "n.set.special.edit5a!.s"

        ; accept the typed number
        (H) 25
        formattedInput * $107 $314 ●245, 388 7

        ; lowlight and redisplay
        (H) 35
        (G) :SET.SPECIAL.FULL.GROWTH.PAINT

        ; refigure the numbers
        (Y) 33
        (G) :SET.SPECIAL.FULL.EDIT.PAINT

(J) :MAIN.WAIT

(:) :SET.SPECIAL.FULL.GROWTH.PAINT
        (S)* "n.set.special.edit5a.s"
        stringFormat $290 "%,n" $107
        displayLeft* $290 ●245, 387
(R)

(:) :SET.SPECIAL.FULL.REC.GROWTH.PAINT
        (S)* "n.set.special.edit5.s"
        stringFormat $290 "%,n" $24
        displayLeft* $290 ●245, 306
(R)

(:) :SET.SPECIAL.FULL.TOTAL2.PAINT
        (H) 26
        display* "total:" ●261, 198
        stringFormat $290 "%,n" $20
        displayLeft* $290 ●261, 306
(R)

;------------------------------------------------------------
```

Money Advice Scan File

```
;-----------------------------------------------------------------
; deal with the request to input a number for min/max specification

( ) :SET.SPECIAL.MAX.CASH

        ; highlight the input area
        (S)* "n.set.special.edit1a!.s"

        ; accept the typed number
        (H) 25
        formattedInput * $351 $314 @165, 388 6

        ; lowlight and redisplay
        (H) 35
        (G) :SET.SPECIAL.MAX.CASH.PAINT

(J) :MAIN.WAIT

(:) :SET.SPECIAL.MAX.CASH.PAINT
        (S)* "n.set.special.edit1a.s"
        stringFormat $351 "%,n" $351
        displayLeft* $351 @165, 387
(R)

;-----------------------------------------------------------------
(:) :SET.SPECIAL.MAX.ASSETS

        ; highlight the input area
        (S)* "n.set.special.edit2a!.s"

        ; accept the typed number
        (H) 25
        formattedInput * $354 $314 @181, 388 8

        ; lowlight and redisplay
        (H) 35
        (G) :SET.SPECIAL.MAX.ASSETS.PAINT

(J) :MAIN.WAIT

(:) :SET.SPECIAL.MAX.ASSETS.PAINT
        (S)* "n.set.special.edit2a.s"
        stringFormat $354 "%,n" $354
        displayLeft* $354 @181, 387
(R)

;-----------------------------------------------------------------
(:) :SET.SPECIAL.MAX.BANK

        ; highlight the input area
        (S)* "n.set.special.edit3a!.s"

        ; accept the typed number
        (H) 25
        formattedInput * $357 $314 @213, 388 7

        ; lowlight and redisplay
        (H) 35
        (G) :SET.SPECIAL.MAX.BANK.PAINT

(J) :MAIN.WAIT

(:) :SET.SPECIAL.MAX.BANK.PAINT
        (S)* "n.set.special.edit3a.s"
```

BEST AVAILABLE COPY

```
        stringFormat $357 "%,n" $357
        displayLeft* $357 ●213, 387
(R)

;-----------------------------------------------------------------
(:) :SET.SPECIAL.MAX.INCOME

        ; highlight the input area
        (S)* "n.set.special.edit4a!.s"

        ; accept the typed number
        (H) 25
        formattedInput * $359 $314 ●229, 388 7

        ; lowlight and redisplay
        (H) 35
        (G) :SET.SPECIAL.MAX.INCOME.PAINT

(J) :MAIN.WAIT

(:) :SET.SPECIAL.MAX.INCOME.PAINT
        (S)* "n.set.special.edit4a.s"
        stringFormat $359 "%,n" $359
        displayLeft* $359 ●229, 387
(R)

;-----------------------------------------------------------------
(:) :SET.SPECIAL.MAX.GROWTH

        ; highlight the input area
        (S)* "n.set.special.edit5a!.s"

        ; accept the typed number
        (H) 25
        formattedInput * $362 $314 ●245, 388 7

        ; lowlight and redisplay
        (H) 35
        (G) :SET.SPECIAL.MAX.GROWTH.PAINT

(J) :MAIN.WAIT

(:) :SET.SPECIAL.MAX.GROWTH.PAINT
        (S)* "n.set.special.edit5a.s"
        stringFormat $362 "%,n" $362
        displayLeft* $362 ●245, 387
(R)

;-----------------------------------------------------------------
;-----------------------------------------------------------------
(:) :SET.SPECIAL.MIN.CASH

        ; highlight the input area
        (S)* "n.set.special.edit1!.s"

        ; accept the typed number
        (H) 25
        formattedInput * $350 $314 ●165, 307 6

        ; lowlight and redisplay
        (H) 35
        (G) :SET.SPECIAL.MIN.CASH.PAINT

(J) :MAIN.WAIT
```

BEST AVAILABLE COPY

```
(:) :SET.SPECIAL.MIN.CASH.PAINT
        (S)* "n.set.special.edit1.s"
        stringFormat $350 "%,n" $350
        displayLeft* $350 ●165, 306
(R)

;--------------------------------------------------------------
(:) :SET.SPECIAL.MIN.ASSETS

        ; highlight the input area
        (S)* "n.set.special.edit2!.s"

        ; accept the typed number
        (H) 25
        formattedInput * $353 $314 ●181, 307 8

        ; lowlight and redisplay
        (H) 35
        (G) :SET.SPECIAL.MIN.ASSETS.PAINT

(J) :MAIN.WAIT

(:) :SET.SPECIAL.MIN.ASSETS.PAINT
        (S)* "n.set.special.edit2.s"
        stringFormat $353 "%,n" $353
        displayLeft* $353 ●181, 306
(R)

;--------------------------------------------------------------
(:) :SET.SPECIAL.MIN.BANK

        ; highlight the input area
        (S)* "n.set.special.edit3!.s"

        ; accept the typed number
        (H) 25
        formattedInput * $356 $314 ●213, 307 7

        ; lowlight and redisplay
        (H) 35
        (G) :SET.SPECIAL.MIN.BANK.PAINT

(J) :MAIN.WAIT

(:) :SET.SPECIAL.MIN.BANK.PAINT
        (S)* "n.set.special.edit3.s"
        stringFormat $356 "%,n" $356
        displayLeft* $356 ●213, 306
(R)

;--------------------------------------------------------------
(:) :SET.SPECIAL.MIN.INCOME

        ; highlight the input area
        (S)* "n.set.special.edit4!.s"

        ; accept the typed number
        (H) 25
        formattedInput * $360 $314 ●229, 307 7

        ; lowlight and redisplay
        (H) 35
        (G) :SET.SPECIAL.MIN.INCOME.PAINT
```

BEST AVAILABLE COPY

BEST AVAILABLE COPY

```
(J) :MAIN.WAIT

(.) :SET.SPECIAL.MIN.INCOME.PAINT
        (S)* "n.set.special.edit4.s"
        stringFormat $360 "%,n" $360
        displayLeft* $360 @229, 306
(R)

;-------------------------------------------------------------
(:) :SET.SPECIAL.MIN.GROWTH

        ; highlight the input area
        (S)* "n.set.special.edit5!.s"

        ; accept the typed number
        (H) 25
        formattedInput * $363 $314 @245,307 7

        ; lowlight and redisplay
        (H) 35
        (G) :SET.SPECIAL.MIN.GROWTH.PAINT

(J) :MAIN.WAIT

(:) :SET.SPECIAL.MIN.GROWTH.PAINT
        (S)* "n.set.special.edit5.s"
        stringFormat $363 "%,n" $363
        displayLeft* $363 @245, 306
(R)

;-------------------------------------------------------------
;-------------------------------------------------------------
; deal with an attempt to change from full to min/max or vice versa
;
(:) :SET.SPECIAL.MIN/MAX

        ; highlight the dot and unhighlight the other one
        (S)* "n.set.min/max.dot!.s"
        (S)* "n.set.fullalloc.dot.s"

        ; do something only if we're not already in min/max
        if $311 <> 2
                {
                (A) $316 "0"

                testEmpty $303
                if $380 = 1 ;if empty
                        {
                        testEmpty $63
                        if $380 = 1 ;if empty
                                {
                                testEmpty $105
                                if $380 = 1 ;if empty
                                        {
                                        testEmpty $106
                                        if $380 = 1 ;if empty
                                                {
                                                testEmpty $107
                                                if $380 = 1 ;if empty
                                                        {
                                                        (A) $316 "1"
                                                        }
                                                }
```

BEST AVAILABLE COPY

```
                        }
                }
        }
    If $316 = 1
        {
        (G) :SET.SPECIAL.SWITCH.WINDOW
        }
    else
        {
        ;save background
        (A) $302 "25"                   ; shadow offset
        (X)~ $302 "n.message.orange.s" @130,184  ;save message box

        ;  display the message box
        (Z) 3
        (S) "n.message.orange.s" @130,184
        (S) "n.message.proceed.s" @237,340
        (S) "n.message.cancel.s" @237,414
        (S) "n.message.finger.s" @169,209

        (H) 23
        (V) "The full-allocation settings^will be erased if you edit^the
settings." @179,242

        (Z) 1  ;show on main screen
        (U) 0 "n.message.orange.s" @130,184
        (I)~ $302 "n.message.orange.s" @130,184 ;shadow

        ;  let MAIN.WAIT know that we're in the confirm window
        stringFormat $312 "1"
        }
    }

(J) :MAIN.WAIT

;-----------------------------------------------------------
(:) :SET.SPECIAL.FULL

    ;  highlight the dot and unhighlight the other one
    (S)* "n.set.fullalloc.dot!.s"
    (S)* "n.set.min/max.dot.s"

    ;  do something only if we're not already in full
    if $311 <> 1
        {
        (A) $316 "0"

        testEmpty $350
        If $380 = 1 ;if empty
            {
            testEmpty $351
            If $380 = 1 ;if empty
                {
                testEmpty $353
                If $380 = 1 ;if empty
                    {
                    testEmpty $354
                    If $380 = 1 ;if empty
                        {
                        testEmpty $356
                        If $380 = 1 ;if empty
                            {
                            testEmpty $357
```

BEST AVAILABLE COPY

```
if $380 = 1 ;if empty
        {
        testEmpty $359
        if $380 = 1 ;if empty
                {
                testEmpty
                if $380 = 1
                        {
                        te
                        if :
empty

testEmpty $363

1 ;if empty

{

(A) $316 "1"

}

                                        }
                                }
                        }
                }
        }
    }
  }
}
if $316 = 1
        {
        (G) :SET.SPECIAL.SWITCH.WINDOW
        }

else
        {
        ;save background
        (A) $302 "25"                   ; shadow offset
        (X)- $302 "n.message.orange.s" ●130,184 ;save message box

        ; display the message box
        (Z) 3
        (S) "n.message.orange.s" ●130,184
        (S) "n.message.proceed.s" ●237,340
        (S) "n.message.cancel.s" ●237,414
        (S) "n.message.finger.s" ●169,209

        (H) 23
●179,242 (V) "Min/max considerations^will be erased if you^edit the f

        (Z) 1 ;show on main screen
        (U) 0 "n.message.orange.s" ●130,184
        (I)- $302 "n.message.orange.s" ●130,184 ;shadow

        ; let MAIN.WAIT know that we're in the confirm window
        stringFormat $312 "1"
        }
}
(J) :MAIN.WAIT
```

Money Advice Scan File

```
;-----------------------------------------------------------------
;-----------------------------------------------------------------
; process the proceed or cancel buttons in the confirm window
;
( ) :SET.SPECIAL.PROCEED

        ; show the user that we heard him
        (S) "n.message.proceed!.s" ●237,340
        (W) 4
        (S) "n.message.proceed.s" ●237,340

        ;restore background message box
        (X) 0

        (G) :SET.SPECIAL.SWITCH.WINDOW

        ; and let MAIN.WAIT know that the confirm window is closed
        stringFormat $312 "0"

(J) :MAIN.WAIT

(:) :SET.SPECIAL.SWITCH.WINDOW

        ; do what he told us to do: switch to the other state of the window
        if $311 = 1
                {
                stringFormat $311 "2"
                (G) :SET.SPECIAL.STARTUP.FOR.MIN/MAX
                }
        else
                {
                stringFormat $311 "1"
                (G) :SET.SPECIAL.STARTUP.FOR.FULL
                }

        ; display the window
        (G) :SET.SPECIAL.PAINT

(R)

;-----------------------------------------------------------------
(:) :SET.SPECIAL.CANCEL

        ; show the user that we heard him
        (S) "n.message.cancel!.s" ●237,414
        (W) 4
        (S) "n.message.cancel.s" ●237,414

        ;restore background message
        (X) 0

        ; do what he told us to do: nothing

        ; redisplay the window
        (G) :SET.SPECIAL.PAINT

        ; and let MAIN.WAIT know that the confirm window is closed
        stringFormat $312 "0"

(J) :MAIN.WAIT

;-----------------------------------------------------------------
```

BEST AVAILABLE COPY

BEST AVAILABLE COPY

```
;--------------------------------------------------------------
; paint the appropriate state of the special considerations window
;
( ) :SET.SPECIAL.PAINT
        if $311 = 1
                (G) :SET.SPECIAL.PAINT.FULL
        else
                (G) :SET.SPECIAL.PAINT.MIN/MAX
(R)

;--------------------------------------------------------------
(:) :SET.SPECIAL.PAINT.FULL

        (S)* "n.set.special.fullalloc.s"
        (S)* "n.set.fullalloc.dot!.s"

        ; put up the full allocation variables entered by hand
        (H) 35
        (G) :SET.SPECIAL.FULL.CASH.PAINT
        (G) :SET.SPECIAL.FULL.ASSETS.PAINT
        (G) :SET.SPECIAL.FULL.BANK.PAINT
        (G) :SET.SPECIAL.FULL.INCOME.PAINT
        (G) :SET.SPECIAL.FULL.GROWTH.PAINT

        ; and the recommended versions of the same numbers
        (G) :SET.SPECIAL.FULL.REC.CASH.PAINT
        (G) :SET.SPECIAL.FULL.REC.ASSETS.PAINT
        (G) :SET.SPECIAL.FULL.REC.BANK.PAINT
        (G) :SET.SPECIAL.FULL.REC.INCOME.PAINT
        (G) :SET.SPECIAL.FULL.REC.GROWTH.PAINT

        (G) :SET.SPECIAL.FULL.TOTAL1.PAINT
        (G) :SET.SPECIAL.FULL.TOTAL2.PAINT

        (H) 35
        stringFormat $310 "1"
        (G) :SET.SPECIAL.PAINT.NOTES
(R)

;--------------------------------------------------------------
(:) :SET.SPECIAL.FULL.EDIT.PAINT

        (H) 35
        (G) :SET.SPECIAL.FULL.CASH.PAINT
        (G) :SET.SPECIAL.FULL.ASSETS.PAINT
        (G) :SET.SPECIAL.FULL.BANK.PAINT
        (G) :SET.SPECIAL.FULL.INCOME.PAINT
        (G) :SET.SPECIAL.FULL.GROWTH.PAINT

        (H) 35
        stringFormat $310 "1"
        (G) :SET.SPECIAL.PAINT.NOTES

(R)

;--------------------------------------------------------------
(:) :SET.SPECIAL.PAINT.MIN/MAX

        (S)* "n.set.special.min/max.s"
        (S)* "n.set.min/max.dot!.s"

        ; put up the current values for the min and max variables
        (H) 35
        (G) :SET.SPECIAL.MIN.CASH.PAINT
```

```
        (G) :SET.SPECIAL.MIN.ASSETS.PAINT
        (G) :SET.SPECIAL.MIN.BANK.PAINT
        (G) :SET.SPECIAL.MIN.INCOME.PAINT
        (G) :SET.SPECIAL.MIN.GROWTH.PAINT

        (G) :SET.SPECIAL.MAX.CASH.PAINT
        (G) :SET.SPECIAL.MAX.ASSETS.PAINT
        (G) :SET.SPECIAL.MAX.BANK.PAINT
        (G) :SET.SPECIAL.MAX.INCOME.PAINT
        (G) :SET.SPECIAL.MAX.GROWTH.PAINT

        stringFormat $310 "6"
        (G) :SET.SPECIAL.PAINT.NOTES

(R)

;-----------------------------------------------------------
(:) :SET.SPECIAL.PAINT.NOTES

        if $311 = 2
                {
                firstLine $290 6 140        ; put the first line of notepad 6 up to 140 pix
                display $290 @165, 399      ; show $290 on the correct line.

                firstLine $290 7 140
                display $290 @181, 399

                firstLine $290 8 140
                display $290 @213, 399

                firstLine $290 9 140
                display $290 @229, 399

                firstLine $290 10 140
                display $290 @245, 399
                }

                else
                {
                firstLine $290 1 140        ; put the first line of notepad 6 up to 140 pix
                display $290 @165, 399      ; show $290 on the correct line.

                firstLine $290 2 140
                display $290 @181, 399

                firstLine $290 3 140
                display $290 @213, 399

                firstLine $290 4 140
                display $290 @229, 399

                firstLine $290 5 140
                display $290 @245, 399
                }

        (R)
;-----------------------------------------------------------
;-----------------------------------------------------------
; put up the editing window
;
(:) :1.SET.SPECIAL.NOTE

        ; let the user know that we heard him
        (S) "n.set.special.cash!.s"
```

BEST AVAILABLE COPY

```
        ; save the stuff under this snip on the (X) stack
        (A) $302 "30"                       ; shadow offset
        (X)- $302 "n.set.notes.fullalloc.s"          ;save notes

        (S) "n.set.special.cash.s"

        (G) :SET.SPECIAL.NOTE

        ; special case: (Y) 211 (in :SET.SPECIAL.NOTE) fills $33 for us;
        ; we don't go to main wait
        (J) $33

(E)

;------------------------------------------------------------
( ) :2.SET.SPECIAL.NOTE

        ; let the user know that we heard him
        (S) "n.set.special.assets!.s"

        ; save the stuff under this snip on the (X) stack
        (A) $302 "30"                       ; shadow offset
        (X)- $302 "n.set.notes.fullalloc.s"               ;save notes

        (S) "n.set.special.assets.s"

        (G) :SET.SPECIAL.NOTE

        ; special case: (Y) 211 (in :SET.SPECIAL.NOTE) fills $33 for us;
        ; we don't go to main wait
        (J) $33

(E)

;------------------------------------------------------------
(:) :3.SET.SPECIAL.NOTE

        ; let the user know that we heard him
        (S) "n.set.special.bank!.s"

        ; save the stuff under this snip on the (X) stack
        (A) $302 "30"                       ; shadow offset
        (X)- $302 "n.set.notes.fullalloc.s"               ;save notes

        (S) "n.set.special.bank.s"

        (G) :SET.SPECIAL.NOTE

        ; special case: (Y) 211 (in :SET.SPECIAL.NOTE) fills $33 for us;
        ; we don't go to main wait
        (J) $33

(E)

;------------------------------------------------------------
(:) :4.SET.SPECIAL.NOTE

        ; let the user know that we heard him
        (S) "n.set.special.income!.s"

        ; save the stuff under this snip on the (X) stack
        (A) $302 "30"                       ; shadow offset
        (X)- $302 "n.set.notes.fullalloc.s"               ;save notes
```

BEST AVAILABLE COPY

```
        (S) "n.set.special.income.s"

        (G) :SET.SPECIAL.NOTE

        ; special case: (Y) 211 (in :SET.SPECIAL.NOTE) fills $33 for us;
        ; we don't go to main wait
        (J) $33

(E)

;-----------------------------------------------------------
( ) :5.SET.SPECIAL.NOTE

        ; let the user know that we heard him
        (S) "n.set.special.growth!.s"

        ; save the stuff under this snip on the (X) stack
        (A) $302 "30"                   ; shadow offset
        (X)~ $302 "n.set.notes.fullalloc.s"                    ;save notes

        (S) "n.set.special.growth.s"

        (G) :SET.SPECIAL.NOTE

        ; special case: (Y) 211 (in :SET.SPECIAL.NOTE) fills $33 for us;
        ; we don't go to main wait
        (J) $33

(E)

;-----------------------------------------------------------
( ) :SET.SPECIAL.NOTE

        ; when the edit window is open allow only editing touches
        (T)
        (T) $33 "n.set.notes.tabclose.s" :SET.SPECIAL.EDIT.TABCLOSE

        ; put up the appropriate window for editing
        if $312 = 1
                {
                (S) "n.set.notes.fullalloc.s"
                (I)~ $302 "n.set.notes.fullalloc.s" ;shadow
                }
        else
                {
                (S) "n.set.notes.min/max.s"
                (I)~ $302 "n.set.notes.min/max.s" ;shadow
                }

        /* get the number of this edit window */
        /* get the number of the label to which we jumped */
        stringFormat $315 "%n" $33

        /* do the arithmetic that we need to get the window number */
        $315 := $315 + ( ( $311 - 1 ) * 5 )

        /*      show full or min max values */
        (H) 28
        if $315 = 6
                {
                (V) $350 ●134,223
                (V) $351 ●134,361
                }
```

BEST AVAILABLE COPY

BEST AVAILABLE COPY

```
        else
        if $315 = 7
                {
                (V) $353 ●134,223
                (V) $354 ●134,361
                }
        else
        if $315 = 8
                {
                (V) $356 ●134,223
                (V) $357 ●134,361
                }
        else
        if $315 = 9
                {
                (V) $360 ●134,223
                (V) $359 ●134,361
                }
        else
        if $315 = 10
                {
                (V) $363 ●134,223
                (V) $362 ●134,361
                }

        /* edit the text in the edit window */
        (H) 28
        (Y) 211 $315                          ; editor call
(R)

;-----------------------------------------------------------------
;-----------------------------------------------------------------
; close the notes window
;
(:) :SET.SPECIAL.EDIT.TABCLOSE

        ; let the user know that we heard him
        (S) "n.set.notes.tabclose!.s"
        (W) 4
        (S) "n.set.notes.tabclose!.s"

        ; bring back the old screen and refresh the window in case there's a change
        (X) 0                       ;restore notes
        (G) :SET.SPECIAL.PAINT

        ; let MAIN.WAIT know that we're done with the edit window
        stringFormat $313 "0"

(J) :MAIN.WAIT

;-----------------------------------------------------------------
;-----------------------------------------------------------------
; close the whole special considerations window
;
(:) :SET.SPECIAL.CLOSE

        ; highlight close button
        (S) "n.set.special.tabclose!.s"
        (W) 4
        (S) "n.set.special.tabclose.s"
        (W) 1

        ; if we're in the full window, calculate
```

```
        if $311 = 1
                (Y) 34

        ;- reallocate assets
        (G) :RERUN.ALLOCS

        ; check for an error
        if $180 <> 0
                {
                        ; save background
                        (A) $302 "25"                   ; shadow offset
                        (X)~ $302 "n.message.orange.s" @130,184
message

                        ; display the message box
                        (Z) 3
                        (S) "n.message.orange.s" @130,184
                        (S) "n.message.retry.s" @237,354
                        (S) "n.message.cancel.s" @237,414
                        (S) "n.message.finger.s" @169,209

                        (H) 23
                        (V) "The conditions you've^requested cannot be met.^^What
like to do? " @179,242

                        (Z) 1  ;show on main screen
                        (U) 0 "n.message.orange.s" @130,184
                        (I)~ $302 "n.message.orange.s" @130,184 ;shadow

                        ; set flag for the confirm window
                        stringFormat $312 "1"

                        (T)
                        (T) $33 "n.message.retry.s" @237,354 :RETRY.CONSIDERATION
                        (T) $33 "n.message.cancel.s" @237,414 :CANCEL.CONSIDERAT

                        (J) :MAIN.WAIT.LOADED
                }

        else
                {
                (G) :SET.SPECIAL.CLOSE.WINDOW

                ;  assume that an edit has taken place, so we need to reallocate refres

                ;- reallocate assets
                (G) :RERUN.ALLOCS

                (A) $237 "1"
                (J) :REFRESH.DISPATCH
                }

;-------------------------------------------------------------
;level 2

        ;•
        (:) :RETRY.CONSIDERATIONS

                ;highlight
                (S) "n.message.retry!.s" @237,354
                (W) 3
                (S) "n.message.retry.s" @237,354
                (W) 1
```

BEST AVAILABLE COPY

```
; restore background
(X) 0 ;message card                              ;restore message

; set flag for the confirm window
stringFormat $312 "0"

(J) :MAIN.WAIT
```

BEST AVAILABLE COPY

```
;*
(:) :CANCEL.CONSIDERATIONS

;highlight
(S) "n.message.cancel!.s" @237,414
(W) 3
(S) "n.message.cancel.s" @237,414
(W) 1

; display the message box
(S) "n.message.orange.s" @130,184
(S) "n.message.okay.right.s" @237,424

(H) 23
(V) "All current settings^have been cancelled." @189,242

(T)
(T) $33 "n.message.okay.right.s" @237,424 :CANCEL.CONSIDERATIONS

(J) :MAIN.WAIT.LOADED


;*
(:) :CANCEL.CONSIDERATIONS.OKAY

;highlight
(S) "n.message.okay.right!.s" @237,424
(W) 3
(S) "n.message.okay.right.s" @237,424
(W) 1

;restore background
(X) 0 ;message box                               ;restore message

; set flag for the confirm window
stringFormat $312 "0"

;reset variables
stringFormat $350      ""     ; vCashMin
stringFormat $351      ""     ; vCashMax
stringFormat $352      ""     ; vCashNote

stringFormat $353      ""     ; vLongMin
stringFormat $354      ""     ; vLongMax
stringFormat $355      ""     ; vLongNote

stringFormat $356      ""     ; vBankMin
stringFormat $357      ""     ; vBankMax
stringFormat $358      ""     ; vBankNote

stringFormat $359      ""     ; vIncomeMax
stringFormat $360      ""     ; vIncomeMin
stringFormat $361      ""     ; vIncomeNote

stringFormat $362      ""     ; vGrowthMax
stringFormat $363      ""     ; vGrowthMin
```

```
        stringFormat $364        • •        ; vGrowthNote

        (G) :SET.SPECIAL.CLOSE.WINDOW
        (J) :MAIN.WAIT

    ;•
    (:) :SET.SPECIAL.CLOSE.WINDOW

        ;restore background
        (A) $199 "0"
        (X)•

        ;set flag - closed
        stringFormat $311 "0"

        (R)

;••••••••••••••••••••••••••••••••••••••••••••••••••••••••••••••••••••••••••••••••••
•••••••
;SECTION 7 - SESSION NOTES
;••••••••••••••••••••••••••••••••••••••••••••••••••••••••••••••••••••••••••••••••••
•••••••

;•
(:) :SESSION.NOTES

    ;SAVE BACKGROUND
    (A) $302 "30"
    (X)~ $302 "csr.notepad.s"         ; shadow offset

    ;(G) :FILL.PROMPT.7.0
    ;(G) :SHOW.FIRST.PROMPT

    ;SHOW NOTEPAD
    (S) "csr.notepad.s"
    (I)~ $302 "csr.notepad.s" ;shadow

    ;SHOW NAME & APPOINTMENT DATE
    (H) 145
    (V) $1 ● 134,199
    (V) $28 ● 134,364

    (:) :EDIT.NOTES
        (T)
        (T) $33 "csr.notepad.name.s" :EDIT.NAME.NOTEPAD
        (T) $33 "csr.notepad.appt.s" :EDIT.NEXT.APPOINTMENT
        (T) $33 "csr.notepad.tabclose!.s" :CLOSE.SESSION.NOTES

    ;SET TYPE COLOR
    (H) 28

    ;DO NOTES
    (Y) 210

    (J) $33
;•-----------------------------------------------------------
;level 2

;-
    (:) :CLOSE.SESSION.NOTES
```

BEST AVAILABLE COPY

```
;HIGHLIGHT BUTTON
(S) "csr.notepad.tabclose!.s"
(W) 4
(S) "csr.notepad.tabclose!.s"

;RESTORE BACKGROUND
(X)

;(G) :FILL.PROMPT.NONE
;(G) :SHOW.FIRST.PROMPT

(J) :MAIN.WAIT

;*
(:) :EDIT.NAME.NOTEPAD

    ;HIGHLIGHT
    (S) "csr.notepad.name!.s"

    ;AWAIT INPUT
    (H) 25   ;diff color than display fo proper background
    (A) 21 $1 @134,199

    ;VIEW INPUT
    (S) "csr.notepad.name.s"
    (V) $1 @134,199

    ;LOAD TOUCH FOR NOTES
    (T) $33 "edit csr view" :EDIT.NOTES

    (J) :MAIN.WAIT.LOADED

;*
(:) :EDIT.NEXT.APPOINTMENT

    ;HIGHLIGHT
    (S) "csr.notepad.appt!.s"

    ;AWAIT INPUT
    (H) 25   ;diff color than display fo proper background
    (A) 14 $28 @134,364

    ;VIEW INPUT
    (S) "csr.notepad.appt.s"
    (V) $28 @134,364

    ;LOAD TOUCH FOR NOTES
    (T) $33 "edit csr view" :EDIT.NOTES

    (J) :MAIN.WAIT.LOADED


;**************************************************************************
*******
;SECTION 7 - CALCULATOR MENU
;**************************************************************************
******

;*
(:) :CALCULATOR.MENU

    ;SAVE BACKGROUND
    (A) $302 "20"             ; shadow offset
```

BEST AVAILABLE COPY

```
(X)- $302 "n.calculator.menu.s"

;SHOW CALCULATOR MENU
(S) "n.calculator.menu.s"
(I)- $302 "n.calculator.menu.s" ;shadow

(:) :GET.TOUCHES.CALCULATOR.MENU
(T)
(T) $33 "n.calculator.menu1.s" :CALCULATOR.MENU1.STANDARD
(T) $33 "n.calculator.menu2.s" :CALCULATOR.MENU2.MORTGAGE
(T) $33 "n.calculator.menu3.s" :CALCULATOR.MENU3.COLLEGE
(T) $33 "n.calculator.menu4.s" :CALCULATOR.MENU4.TAXRATE
(T) $33 "n.calculator.menu.tabclose.s" :REQUEST.CANCEL.CALCULATOR.MENU

;(G) :FILL.PROMPT.7.1
;(G) :SHOW.FIRST.PROMPT

(J) :MAIN.WAIT.LOADED

;*
(:) :CALCULATOR.MENU1.STANDARD

;HIGHLIGHT
(S)      "n.calculator.menu1!.s"
(W) 3
(S)      "n.calculator.menu1.s"

;(G) :FILL.PROMPT.7.0
;(G) :SHOW.FIRST.PROMPT

(G) :CLOSE.CALCULATOR.MENU

;SAVE BACKGROUND
(A) $302 "15"                    ; shadow offset
(X)*- $302 "n.calc.s"

;PUT UP CALCULATOR
(O)* "n.calc.s"
(I)*- $302 "n.calc.s" ;shadow

switchCursor ARROW
(Y)* 78 ;show calculator
switchCursor WAIT

;RESTORE BACKGROUND
(A) $199 "0"
(X)*

(J) :MAIN.WAIT


;*
(:) :CALCULATOR.MENU2.MORTGAGE

;HIGHLIGHT
(S)      "n.calculator.menu2!.s"
(W) 3
(S)      "n.calculator.menu2.s"

(G) :CLOSE.CALCULATOR.MENU

;(G) :FILL.PROMPT.7.0
;(G) :SHOW.FIRST.PROMPT
```

BEST AVAILABLE COPY

```
(J) :BUTTON8


;*
(:) :CALCULATOR.MENU3.COLLEGE

;HIGHLIGHT
(S)      "n.calculator.menu3!.s"
(W) 3
(S)      "n.calculator.menu3.s"

(G) :CLOSE.CALCULATOR.MENU

;(G) :FILL.PROMPT.7.0
;(G) :SHOW.FIRST.PROMPT

(J) :BUTTON9


;*
(:) :CALCULATOR.MENU4.TAXRATE

;HIGHLIGHT
(S)      "n.calculator.menu4!.s"
(W) 3
(S)      "n.calculator.menu4.s"

(G) :CLOSE.CALCULATOR.MENU

;(G) :FILL.PROMPT.7.0
;(G) :SHOW.FIRST.PROMPT

(G) :DO.TAX.RATE.CALCULATOR

(J) :MAIN.WAIT

;*
(:) :DO.TAX.RATE.CALCULATOR

        ;INITIALIZE VARIABLES
        (A) $151 ""                       ;# exemptions
        (A) $126 "Standard"           ;deductions
        (A) $127 ""                       ;Filing Status
        (A) $128 ""                       ;Place of residence
        (A) $173 ""                       ;Marginal Tax Rate

        (T) ;CLEAR TOUCHES

        ;SAVE BACKGROUND
        (X)* "blank tax.s"

        ;DO IT
        switchCursor ARROW
        (Y) 501
        switchCursor WAIT

        ;RESTORE BACKGROUND
        (A) $199 "0"
        (X)*

        (R)

;*
```

BEST AVAILABLE COPY

```
(:) :REQUEST.CANCEL.CALCULATOR.MENU

;HIGHLIGHT CANCEL BUTTON
(S)       "n.calculator.menu.tabclose!.s"
(W) 4
(S)       "n.calculator.menu.tabclose.s"

(G) :CLOSE.CALCULATOR.MENU
(J) :MAIN.WAIT
```

BEST AVAILABLE COPY

```
;-------------------------------------------------------------------------------
;level 2

;*
(:) :CLOSE.CALCULATOR.MENU

;CLOSE CARD
(X)

(R)

;*****************************************************************************
*******
;SECTION 7 - FILE UPDATE
;*****************************************************************************
*******

;*
(:) :FILE.UPDATE

; see if they want to save the customer's data
TestEmpty $1                                ; test the name variable to se
empty
if $380 = 1                                 ; the name was emp
     (J)       :UPDATE.DONT.SAVE.DATA       ; skip prompt to save if there
customer name

;SAVE BACKGROUND
(A) $302 "20"                ; shadow offset
(X)~ $302 "n.message.orange.s"

;SHOW MESSAGE BOX ON Z3
(Z) 3
(S) "n.message.orange.s"
(S) "n.message.finger.s"
(S) "n.message.yes.s"
(S) "n.message.no.s"

;SHOW MESSAGE
(H) 23
(V) "Do you want to save the^current customer's data?" @189,242

;SHOW ON MAIN SCREEN
(Z) 1
(U) 0 "n.message.orange.s"
(I)~ $302 "n.message.orange.s" ;shadow

(T)
(T) $33 "n.message.yes.s" :UPDATE.SAVE.DATA
(T) $33 "n.message.no.s" :UPDATE.DONT.SAVE.DATA

(J) :MAIN.WAIT.LOADED

;-----------------------
```

Money Advice Scan File

```
.level 2
.
( ) UPDATE.SAVE.DATA

        ;HIGHLIGHT
        (S)     "n.message.yes!.s"
        (W) 3
        (S)     "n.message.yes.s"
        (W) 1

        ;save data
        (Y) 202 ;save variables
        ;  and remember his name as saved so we don't do another automatic save
        stringFormat $393 $1

        ;CLOSE CARD
        (X)

(J) :CONFIRM.FILE.UPDATE

.
( ) :UPDATE.DONT.SAVE.DATA

        ; awkward little kludge to highlight the button if this is in response to the dialc
        TestEmpty $1                                ; test the name for empty
        if $380 = 0                                         ; the name was not
                {
                ;HIGHLIGHT
                (S)     "n.message.no!.s"           ; so they came here by clickir
button
                (W) 3
                (S) "n.message.no.s"
                (W) 1

                ;CLOSE CARD
                (X)
                }

(J) :CONFIRM.FILE.UPDATE

;-------------------


(:) :CONFIRM.FILE.UPDATE

        ;  ask if we really want to proceed
        ;SAVE BACKGROUND
        (A) $302 "20"                   ; shadow offset
        (X)- $302 "n.message.orange.s"

        ;SHOW MESSAGE BOX
        (S) "n.message.orange.s"
        (I)- $302 "n.message.orange.s" ;shadow
        (S) "n.message.finger.s"
        (S) "n.message.proceed.s"
        (S) "n.message.cancel.s"

        (H) 23
        (V) "The update will take a few^minutes to complete.^Would you like to proc
@179,242

        (T)
        (T) $33 "n.message.proceed.s" :DO.FILE.UPDATE
```

BEST AVAILABLE COPY

```
      (T) $33 "n.message.cancel.s" :REQUEST.CANCEL.FILE.UPDATE
(J) :MAIN.WAIT.LOADED

;*-----------------------------------------------------------------

;*
( ) :DO.FILE.UPDATE

        ;- highlight button
        (S) "n.message.proceed!.s"
        (W) 2
        (S) "n.message.proceed.s"

        ;- restore background
        (X)

        ;  put away any card that is up and clear the center background
        if $251 > 0 ;is a card up?
                (G) :CLOSE.CARD
        (G) :CLEAR.CENTER.WITH.SNAP

        ;SET THE MODEM PARAMETERS
        ;(A) $32 "5879412,2400,N,8,1"      ;Modem Parms
        (A) $32 "7508132,2400,N,8,1"       ;Modem Parms

        ;SAVE BACKGROUND
        (X) "blank.s"

        ;BEGIN UPDATE
        switchCursor ARROW
        (Y) 500

        ;RESTORE BACKGROUND
        (X)

        ;empty the stock and bond tables in the C code
        ;so we read them from the new files
        (Y) 10

        ;do restart cleanup
        (Y) 209
        (G) :INITIALIZE.VARIABLES

(J) :START.MONEY.ADVISOR

;*
(:) :REQUEST.CANCEL.FILE.UPDATE

        ;HIGHLIGHT BUTTON
        (S) "n.message.cancel!.s"
        (W) 2
        (S) "n.message.cancel.s"
        (W) 4

        ;RESTORE BACKGROUND
        (X)

(J) :MAIN.WAIT

;****************************************************************************
*******
;SECTION 7 - CUSTOMER RECORDS
```

Money Advice Scan File

BEST AVAILABLE COPY

```
;*****************************************************************************
*******

;*
(:) :CUSTOMER.RECORDS

        (G) :CLEAR.CENTER.SCREEN.FROM.BUTTON

        TestEmpty $1                                ; test the name variable to s
empty
        if $380 = 1                                     ; the name was em
            (J)      :LOAD.DONT.SAVE.DATA           ; skip prompt to save if the
customer name

        ;SAVE BACKGROUND
        (A) $302 "20"                   ; shadow offset
        (X)~ $302 "n.message.orange.s"

        ;SHOW MESSAGE BOX ON Z3
        (Z) 3
        (S) "n.message.orange.s"
        (S) "n.message.finger.s"
        (S) "n.message.yes.s"
        (S) "n.message.no.s"

        ;SHOW MESSAGE
        (H) 23
        (V) "Do you want to save the^current customer's data?" ●189,242

        ;SHOW ON MAIN SCREEN
        (Z) 1
        (U) 0 "n.message.orange.s"
        (I)~ $302 "n.message.orange.s" ;shadow

        (T)
        (T) $33 "n.message.finger!.s" :WAVE
        (T) $33 "n.message.yes.s" :LOAD.SAVE.DATA
        (T) $33 "n.message.no.s" :LOAD.DONT.SAVE.DATA

        (J) :MAIN.WAIT.LOADED

;___________________________
;level 2

;*
(:) :WAVE

        ;HIGHLIGHT
        (S) "n.message.finger!.s
        (W) 2
        (S) "n.message.finger.s
        (W) 4
        (S) "n.message.finger!.s
        (W) 2
        (S) "n.message.finger.s

        (J)      :MAIN.WAIT.LOADED

;*
(:) :LOAD.SAVE.DATA

        ;HIGHLIGHT
        (S)      "n.message.yes!.s"
```

BEST AVAILABLE COPY

BEST AVAILABLE COPY

```
        (W) 3
        (S)      "n.message.yes.s"
        (W) 1

        ;save data
        (Y) 202 ;save variables
        ;  and remember his name as saved so we don't do another automatic save
        stringFormat $393 $1

        ;CLOSE  CARD
        (X)

        (G) :RETRIEVE.DATA

        (J) :START.MONEY.ADVISOR

;•
(:) :LOAD.DONT.SAVE.DATA

        ; awkward little kludge to highlight the button if this is in response to the dialo
        TestEmpty $1                              ; test the name for empty
        if $380 = 0                                        ; the name was not e
                {
                ;HIGHLIGHT
                (S)      "n.message.no!.s"        ; so they came here by clickin
button
                (W) 3
                (S) "n.message.no.s"
                (W) 1

                ;CLOSE  CARD
                (X)
                }

        (G) :RETRIEVE.DATA

        (J) :START.MONEY.ADVISOR

;------------------
;level 3

;•
(:) :RETRIEVE.DATA

        ;  save all variables in case the CSR cancels the MIS load in the Apple dialog box
        stringFormat $306 "MIS snapshot"
        (Y) 200

        (G)      :INITIALIZE.ASSET.VARIABLES
        (G) :INITIALIZE.SPECIAL.VARIABLES

        (Y) 204  ;load data - MIS

        if $380 = 99  ;if retrieve was cancelled
                {
                ;  reload saved snapshot of all variables
                stringFormat $306 "MIS snapshot"
                (Y) 201
                (J) :MAIN.WAIT
                }

        (G) :INIT.RETRIEVE.VARIABLES

(R)
```

Money Advice Scan File

BEST AVAILABLE COPY

```
;------------------------------
;level 5

        ;•
        (:) :INIT.RETRIEVE.VARIABLES

                switchCursor WATCH

                ;CLEAN UP STATE VARIABLES AND REINIT THE THINGS THAT MAY CH
TIME TO TIME
                (G) :INITIALIZE.STATE.VARIABLES
                (G) :INITIALIZE.VARIABLES.AFTER.MIS

                ;- reallocate assets
                (G) :RERUN.ALLOCS

                switchCursor ARROW
        (R)

        ;•
        (:) :NOT.A.SELECTION

                {
                ;SHOW MESSAGE
                (O) "n.card.dibox.message.s"
                (S) "n.card.dibox.okay.s"
                (S) "n.card.dibox.cancel.s"

                (H) 1
                (V) "This instrument is no longer on^the selection list. The money^allo
instrument^is now in residual." @240,240

                (T)
                (T) $33 "n.card.dibox.okay.s" :NOT.A.SELECTION.CONTINUE

                (J) :MAIN.WAIT.LOADED
                }

        ;•
        (:) :NOT.A.SELECTION.CONTINUE

                ;fill later with test for number of "not a selections"

                (J) :MAIN.WAIT


;••••••••••••••••••••••••••••••••••••••••••••••••••••••••••••••••••••••••••••
•••••••
;SECTION 7 - RESTART
;••••••••••••••••••••••••••••••••••••••••••••••••••••••••••••••••••••••••••••
•••••••
;•
(:) :RESTART.MONEY.ADVISOR

        TestEmpty $1                                    ; test the name variable to se
empty
        If $380 = 1                                     ; the name was emp
                {
                ;CLOSE CARD
                (X)
```

BEST AVAILABLE COPY

```
        (Y) 209
        (G) :INITIALIZE.VARIABLES
        (J) :START.MONEY.ADVISOR
        }

    ;SAVE BACKGROUND
    (A) $302 "20"                ; shadow offset
    (X)~ $302 "n.message.orange.s"

    ;SHOW MESSAGE BOX ON Z3
    (Z) 3
    (S) "n.message.orange.s"
    (S) "n.message.finger.s"
    (S) "n.message.yes.s"
    (S) "n.message.no.s"
    (H) 23

    ;SHOW MESSAGE
    (V) "Do you want to save^current customer's data?" @189,242

    ;SHOW ON MAIN SCREEN
    (Z) 1
    (U) 0 "n.message.orange.s"
    (I)~ $302 "n.message.orange.s" ;shadow

    (T)
    (T) $33 "n.message.finger!.s" :WAVE
    (T) $33 "n.message.yes.s" :RESTART.SAVE.DATA
    (T) $33 "n.message.no.s" :RESTART.DONT.SAVE.DATA

    (J) :MAIN.WAIT.LOADED

;------------------------
.level 2

;*
(:) :RESTART.SAVE.DATA

    ;HIGHLIGHT
    (S)      "n.message.yes!.s"
    (W) 3
    (S)      "n.message.yes.s"
    (W) 1

    ;save data
    (Y) 202 ;save variables
    ;  and remember his name as saved so we don't do another automatic save
    stringFormat $393 $1

    ;CLOSE CARD
    (X)

    (Y) 209
    (G) :INITIALIZE.VARIABLES
    (J) :START.MONEY.ADVISOR

;*
(:) :RESTART.DONT.SAVE.DATA

    ;HIGHLIGHT
    (S)      "n.message.no!.s"
    (W) 3
    (S) "n.message.no.s"
    (W) 1
```

BEST AVAILABLE COPY

```
    ;CLOSE CARD
    (X)

    (Y) 209
    (G) :INITIALIZE.VARIABLES
    (J) :START.MONEY.ADVISOR

;••••••••••••••••••••••••••••••••••••••••••••••••••••••••••••••••••••••••••••••
•••••••
;SECTION 7 - QUIT
;••••••••••••••••••••••••••••••••••••••••••••••••••••••••••••••••••••••••••••••
•••••••

;•
( ) :QUIT.MONEY.ADVISOR

        TestEmpty $1
        if $380 = 1                ; no name, so don't bother offering to save file...
            {
            ;LEAVE
            (A) $199 ""
            (D) 1 "n.black.s"

            quit
            }

        ;SAVE BACKGROUND
        (A) $302 "20"                      ; shadow offset
        (X)~ $302 "n.message.orange.s"

        ;SHOW MESSAGE BOX ON Z3
        (Z) 3
        (S) "n.message.orange.s"
        (S) "n.message.finger.s"
        (S) "n.message.yes.s"
        (S) "n.message.no.s"
        (H) 23

        (H) 23

        ;SHOW MESSAGE
        (V) "Do you want to save^current customer's data?" ●189,242

        ;SHOW ON MAIN SCREEN
        (Z) 1
        (U) 0 "n.message.orange.s"
        (I)~ $302 "n.message.orange.s" ;shadow

        (T)
        (T) $33 "n.message.finger!.s" :WAVE
        (T) $33 "n.message.yes.s" :QUIT.SAVE.DATA
        (T) $33 "n.message.no.s" :QUIT.DONT.SAVE.DATA

        (J) :MAIN.WAIT.LOADED

;————————————————
;level 2

;•
(:) :QUIT.SAVE.DATA

        ;HIGHLIGHT
```

BEST AVAILABLE COPY

```
        (S)      "n.message.yes!.s"
        (W) 3
        (S)      "n.message.yes.s"
        (W) 1

        ;save data
        (Y) 202 ;save variables
        ;  and remember his name as saved so we don't do another automatic save
        stringFormat $393 $1

        ;CLOSE  CARD
        (X)

        ;LEAVE
        (A) $199 ""
        (D) 1 "n.black.s"

        quit

;*
(:) :QUIT.DONT.SAVE.DATA

        ;HIGHLIGHT
        (S)      "n.message.no!.s"
        (W) 3
        (S) "n.message.no.s"
        (W) 1

        ;CLOSE  CARD
        (X)

        ;LEAVE
        (A) $199 ""
        (D) 1 "n.black.s"

        quit

;**************************************************************************
;SHOW PROMPTS
;**************************************************************************
;level 1

        ;*
        (:) :SHOW.FIRST.PROMPT

                if $330 = 0  ;if no prompts
                        (G) :CLEAR.PROMPT
                else
                        {
                        (A) $339 "1"      ;start counter
                        (G) :SHOW.PROMPT
                        }

                if $340 <> 0  ;if there's a customer prompt
                        (G) :SHOW.CUST.PROMPT

                (R)

        ;*
        (:) :SHOW.NEXT.PROMPT            ;if more than one prompt

                (G) :HIGHLIGHT.CONTINUE.PROMPT
```

```
;Increment counter
$339 := $339 +1

(G) :SHOW.PROMPT
(J) :MAIN.WAIT
```

BEST AVAILABLE COPY

```
;------------------------
.level 2

;*
(:) :SHOW.PROMPT

    (G) :CLEAR.PROMPT

    (H) 20
    if $339 = 1
            (V) $331 ●472,20
    else
    if $339 = 2
            (V) $332 ●472,20
    else
    if $339 = 3
            (V) $333 ●472,20
    else
    if $339 = 4
            (V) $334 ●472,20
    else
    if $339 = 5
            (V) $335 ●472,20
    else
    if $339 = 6
            (V) "To add a 6th prompt, you need to set up a larger prompt
the scan file." ●472,20

    ;anymore prompts?

    if $339 = $330
            {
            (G) :REMOVE.PROMPT.CONTINUE
            (R)
            }

    else
            {
            (G) :SHOW.PROMPT.CONTINUE
            (R)
            }

;*
(:) :SHOW.CUST.PROMPT          ;show customer prompt

    (H) 21

    (Z) 2
;   (S) "n.prompt.s"
    (V) $341 ●472,20
    (Z) 1

    (R)

;------------------------
;level 3
```

Money Advice Scan File

```
;•
(:) :CLEAR.PROMPT
        (A) $199 "20" ;speed
        (D) 6 "n.prompt.s"   ;csr screen

        (R)

;•
(:) :SHOW.PROMPT.CONTINUE
        (S) "n.prompt.cont.s"
        (R)

;•
(:) :REMOVE.PROMPT.CONTINUE
        (S) "n.prompt.cont.blnk.s"
        (R)

;••••••••••••••••••••••••••••••••••••••••••••••••••••••••••••••••••••••••••
; SAVE AND RESTORE PROMPTS
;••••••••••••••••••••••••••••••••••••••••••••••••••••••••••••••••••••••••••

(:) :SAVE.PROMPT
        stringFormat $390 $330
        stringFormat $391 $331
        stringFormat $392 $332
(R)

(:) :RESTORE.PROMPT
        stringFormat $330 $390
        stringFormat $331 $391
        stringFormat $332 $392
        (G) :SHOW.FIRST.PROMPT
(R)

;••••••••••••••••••••••••••••••••••••••••••••••••••••••••••••••••••••••••••
; FILL PROMPTS - MONEY ADVISOR PROMPTS
;••••••••••••••••••••••••••••••••••••••••••••••••••••••••••••••••••••••••••
```

"Sections" and "Subsections" refer to the CSR navigational menu and submenus.

The "Prompts" are the words within quotation marks after the variable numbers (A)$:
Variable number (A)$330 specifies the number of prompts per screen. (A)$340 specifie
of
customer prompts.

```
;--------------------------------------------------------
SECTION 0:      STARTUP

Screen 0.1:  TITLE SCREEN

(:) :FILL.PROMPT.0.1
        (A) $330 "1"
        (A) $331 "(<Click> NEXT to sign-on to Money Advisor.)"
        (A) $332 ""
        (A) $340 "1"
        (A) $341 "©1990, Citibank, N.A., member FDIC, and Citicorp Brokerage, mem
Patent pending."
        (R)

Screen 0.2:  Sign-on Screen

(:) :FILL.PROMPT.0.2
        (A) $330 "0"
;       (A) $340 "0"
```

BEST AVAILABLE COPY (R)

---

SECTION 1: INTRODUCE

• SUBSECTION 1.0: INTRODUCE

BEST AVAILABLE COPY ( ) FILL.PROMPT.1.0
(A) $330 "1"
(A) $331 "(<Click> NEXT to introduce the Money Advisor.)"
(A) $332 ""
(A) $340 "0"
(R)

• SUBSECTION 1.1: SHOW INVESTMENT OPTIONS

Screen 1.1. Sea of Options ( ) :FILL.PROMPT.1.1
(A) $330 "2"
(A) $331 "The financial world offers many ways of putting money to work."
(A) $332 "Which of these does customer already use? (<Click> on those name
(A) $340 "0"
(R)

Screen 1.2. Three stacks of chips ( ) :FILL.PROMPT.1.2
(A) $330 "1"
(A) $331 "We organize them into three groups according to their purpose."
(A) $332 ""
(A) $340 "0"
(R)

Screen 1.3. Green Stack Highlighted (:) :FILL.PROMPT.1.3
(A) $330 "1"
(A) $331 "The Bank group includes these products."
(A) $332 ""
; (A) $340 "0"
(R)

Screen 1.4. Bank Use Icons (:) :FILL.PROMPT.1.4
(A) $330 "1"
(A) $331 "Bank products provide ready cash to meet these needs."
(A) $332 ""
; (A) $340 "0"
(R)

Screen 1. 5: Long term Assets Highlighted (:) :FILL.PROMPT.1.5
(A) $330 "1"
(A) $331 "Keeping enough available cash prevents tapping long-term assets fc
needs."
(A) $332 ""
; (A) $340 "0"
(R)

Screen 1.6: Income and Growth Divided and Highlighted.

FILL.PROMPT.1.6
(A) $330 "2"
(A) $331 "We divide long-term investments into two main groups..."
(A) $332 "Income Investments (mostly bonds) and Growth investments (mostly
(A) $340 "0"
(R)

Screen 1.7: Bank Mini-Graph.

( ) .FILL.PROMPT.1.7
(A) $330 "1"
(A) $331 "Money in the bank is insured and offers a modest return."
(A) $332 ""
(A) $340 "0"
(R)

BEST AVAILABLE COPY

Screen 1.8: Income Mini-Graph.

( ) :FILL.PROMPT.1.8
(A) $330 "1"
(A) $331 "Bonds yield a predictable return when held to maturity."
(A) $332 ""
(A) $340 "0"
(R)

Screen 1.9: Growth Mini-Graph.

( ) :FILL.PROMPT.1.9
(A) $330 "2"
(A) $331 "Stocks offer the greatest opportunity for capital growth..."
(A) $332 "...if held through down markets."
(A) $340 "0"
(R)

• SUBSECTION 1.3: COMPARE PAST PERFORMANCE

Screen 1.10: Field for Fifteen Year Market Performance Graphs.

(:) :FILL.PROMPT.1.10
(A) $330 "1"
(A) $331 "Let's look at the performance of $1000 in each category over the pa
(A) $332 ""
(A) $340 "0"
(R)

Screen 1.11: 15 year Bank Graph.

(:) :FILL.PROMPT.1.11
(A) $330 "1"
(A) $331 "That amount placed in the bank 15 years ago would have grown to today."
(A) $332 ""
(A) $340 "1"
(A) $341 "Based on Treasury bill rate (minus 35 basis points) from 9/30/75 - 9/3
(R)

Screen 1.12: Bank vs. CPI graph (:) :FILL.PROMPT.1.12
(A) $330 "1"
(A) $331 "...not much better than the cost of living as measured by the Consum Index."
(A) $332 ""
(A) $340 "0"

(R)

Screen 1.13: Income vs. Bank.

BEST AVAILABLE COPY ( ) :FILL.PROMPT.1.13
(A) $330 "2"
(A) $331 "Money in bonds would have appreciated more after 15 years."
(A) $332 "The bond market, however, did fluctuate during this period."
(A) $340 "1"
(A) $341 "Based on Shearson Lehman Intermediate Government Bond Index fr
9/30/90."
(R)

Screen 1.14: Income rounded curve.

(:) :FILL.PROMPT.1.14
(A) $330 "2"
(A) $331 "If you had held bonds to their maturity, varying interest rates and ch
prices..."
(A) $332 "...would not have affected your returns."
(A) $340 "0"
(R)

Screen 15: Growth vs. Bank Graph.

(:) :FILL.PROMPT.1.15
(A) $330 "2"
(A) $331 "The stock market would have provided the greatest return..."
(A) $332 "...but would have required investing for the long term."
(A) $340 "1"
(A) $341 "Based on S&P 500 from 9/30/75 - 9/30/90."
(R)

Screen 1.16: Three graphs over 15 years.

(:) :FILL.PROMPT.1.16
(A) $330 "1"
(A) $331 "Investments that make long term sense may not be wise for the short
(A) $340 "1"
(A) $341 "Past performance is no guarantee of future results."
(R)

NOTE: PREPARED SINGLE YEAR SEQUENCE BEGINS HERE

Screen 1.17a: Single year 1987

(:) :FILL.PROMPT.1.17a
(A) $330 "1"
(A) $331 "Over any short term, stock and bond markets can be quite volatile."
(A) $332 ""
; (A) $340 "0"
(R)

Screen 1.17b: Single year 1980
(:) :FILL.PROMPT.1.17b
(A) $330 "1"
(A) $331 "A long term plan protects investments from short-term market down
(A) $332 ""
; (A) $340 "0"
(R)

Screen 1.17c: Single year 1981

(:) :FILL.PROMPT.1.17c

Money Advice Scan File (A) $330 "1"
(A) $331 "...so you don't have to sell at a time that is not optimal."
(A) $332 ""
; (A) $340 "0"
(R)

Screen 1.17d: Single year 1977

( ) :FILL.PROMPT.1.17d
(A) $330 "1"
(A) $331 "A long term plan protects investments during short term market dov
(A) $332 ""
; (A) $340 "0"
(R)

BEST AVAILABLE COPY

Screen 1.18: Thirty year Graph (:) :FILL.PROMPT.1.18
(A) $330 "2"
(A) $331 "Looked at over the past 30 years..."
(A) $332 "...the benefit of holding some money in growth instruments is clear."
; (A) $340 "0"
(R)

Screen 1.19: Three instruments over 15 years.

(:) :FILL.PROMPT.1.19
(A) $330 "2"
(A) $331 "We can put together the right combination of the three groups to fi
needs."
(A) $332 "To do that, we need first to know some things about the customer."
; (A) $340 "0"
(R)

• SUBSECTION 1.4: SIGN-ON CUSTOMER

Screen 1.20: Yellow space for name opened.

(:) :FILL.PROMPT.1.20
(A) $330 "1"
(A) $331 "(Please enter information at the top of the screen and press return.)"
(A) $332 ""
; (A) $340 "0"
(R)

Screen 1.21:. Marital status box opened.

(:) :FILL.PROMPT.1.21
(A) $330 "1"
(A) $331 "(Please enter information at the top of the screen and press return.)"
(A) $332 ""
; (A) $340 "0"
(R)

;------------------------------------------------

SECTION 2: ASK ASSETS

Screen 2.1: Three tabs Ask Assets highlighted on Menu (:) :FILL.PROMPT.2.1
(A) $330 "1"
(A) $331 "We need to know the assets available for allocation."

(A) $332 ""
(A) $340 "0"
(R)

BEST AVAILABLE COPY

• SUBSECTION 2.1: ASK BANK

Screen 2.2: Bank Asset Card Open ( ) :FILL.PROMPT.2.2
(A) $330 "1"
(A) $331 "(<Click> on the card's grey area to enter an amount.)"
(A) $340 "0"
(R)

• SUBSECTION 2.2: ASK INCOME

Screen 2.3: Income Asset Card Open (:) :FILL.PROMPT.2.3
(A) $330 "1"
(A) $331 "(<Click> on the card's grey area to enter an amount.)"
; (A) $340 "0"
(R)

• SUBSECTION 2.3: ASK GROWTH

Screen 2.4: Growth Asset Card Open (:) :FILL.PROMPT.2.4
(A) $330 "1"
(A) $331 "(<Click> on the card's grey area to enter an amount.)"
; (A) $340 "0"
(R)

Screen 2.5: Done with ask assets (:) :FILL.PROMPT.2.41
(A) $330 "1"
(A) $331 "(<Click> NEXT to show customer's current allocation.)"
(A) $332 ""
; (A) $340 "0"
(R)

• SUBSECTION 2.4: SHOW CURRENT PIE

Screen 2.5: Current pie showing (:) :FILL.PROMPT.2.5
(A) $330 "1"
(A) $331 "Here is the current allocation of the customer's assets."
(A) $332 ""
; (A) $340 "0"
(R)

;———————————————————————————
SECTION 3: BUILD ALLOCATION

• SUBSECTION 3.1:BUILD AVAILABLE CASH

Screen 3.1: Full Circle Drawn-Total Current Assets

```
( ) FILL.PROMPT.3.1
        (A) $330 "1"
        (A) $331 "Let's build an allocation of the total current assets."
        (A) $332 ""
        (A) $340 "0"
        (R)
```

BEST AVAILABLE COPY

Screen 3.2: Available Cash Wedge Drawn

```
( ) FILL.PROMPT.3.2
        (A) $330 "1"
        (A) $331 "First we determine the amount of money that should be kept readil
        (A) $332 ""
        (A) $340 "0"
        (R)
```

Screen 3.3: Three month Income Bracket

```
( ) :FILL.PROMPT.3.3
        (A) $330 "1"
        (A) $331 "We base this amount on gross annual household income."
        (A) $332 ""
        (A) $340 "0"
        (R)
```

Screen 3.4: Income Entry Open

```
(.) :FILL.PROMPT.3.4
        (A) $330 "1"
        (A) $331 "(Please enter information at the top of the screen and press return.)"
        (A) $332 ""
        (A) $340 "0"
        (R)
```

Screen 3.5: Cash Needs entry open.

```
(:) :FILL.PROMPT.3.5
        (A) $330 "1"
        (A) $331 "(Please enter information at the top of the screen and press return.)"
        (A) $332 ""
;       (A) $340 "0"
        (R)
```

Screen 3. 6: Marginal Tax rate entry open

```
(:) :FILL.PROMPT.3.6
        (A) $330 "1"
        (A) $331 "(Please enter information at the top of the screen and press return.)"
        (A) $332 ""
;       (A) $340 "0"
        (R)
```

Screen 3. 7: Available cash allocation

```
(:) :FILL.PROMPT.3.7
        (A) $330 "1"
        (A) $331 "We recommend this much cash be kept available."
        (A) $332 ""
;       (A) $340 "0"
        (R)
```

Screen 3.8: Bank Allocated-Green Filled In

Money Advice Scan File

BEST AVAILABLE COPY ( ) FILL.PROMPT.3.8
(A) $330 "1"
(A) $331 "We recommend this amount be kept in insured bank accounts."
(A) $332 ""
(A) $340 "0"
(R)

Screen 3.9: Money Market Fund Allocated.-Blue Filled In ( ) :FILL.PROMPT.3.9
(A) $330 "1"
(A) $331 "The rest is kept in a money market mutual fund for greater return."
(A) $332 ""
(A) $340 "0"
(R)

• SUBSECTION 3.2 BUILD LONG TERM ASSETS

Screen 3.10: Amount of long term Assets shown in pie ( ) :FILL.PROMPT.3.10
(A) $330 "1"
(A) $331 "That leaves this amount for long term investment."
(A) $332 ""
(A) $340 "0"
(R)

Screen 3.11: Line divides Income and Growth ( ) :FILL.PROMPT.3.11
(A) $330 "1"
(A) $331 "We allocate this into Income and Growth instruments."
(A) $332 ""
(A) $340 "0"
(R)

NOTE: LINEAR SEQUENCE ENDS HERE. INTERACTIVE MODE BEGINS.

Screen 3.12: Three Buttons Appear (:) :FILL.PROMPT.3.12.int
(A) $330 "2"
(A) $331 "We base the mix of Income and Growth instruments on these factor
(A) $332 "(<Click> on any factor to discuss, or <click> at top of screen to enter information.)"
; (A) $340 "0"
(R)

Screen 3.12.skip3: Skip 3 buttons, go right to personal bar info (:) :FILL.PROMPT.3.12.skip3
(A) $330 "1"
(A) $331 "(<Click> at top of screen to enter information.)"
(A) $332 ""
; (A) $340 "0"
(R)

Screen 3.13.int: Children Information Entry opens(y/n)

(:) :FILL.PROMPT.3.13.int
(A) $330 "1"
(A) $331 "(Please enter information at the top of the screen and press return.)'
(A) $332 ""
; (A) $340 "0"

(R)

Screen 3.14 Int.: "Year to College" Button open, any year can be selected

```
( ) :FILL.PROMPT.3.14.int
        (A) $330 "1"
        (A) $331 "(<Click> on any year to show effect of college or <click> on button tc
        (A) $332 ""
.       (A) $340 "0"
        (R)
```

BEST AVAILABLE COPY

Screen 3.15 Int: Home Information entry Opens.

```
(.) :FILL.PROMPT.3.15.int
        (A) $330 "1"
        (A) $331 "(Please enter information at the top of the screen and press return.)"
        (A) $332 ""
,       (A) $340 "0"
        (R)
```

Screen 3.16 Int: Home Ownership button Opens.

```
(:) :FILL.PROMPT.3.16.int
        (A) $330 "1"
        (A) $331 "(<Click> on YES or NO to show effect of home ownership or <click> c
close.)"
        (A) $332 ""
;       (A) $340 "0"
        (R)
```

Screen 3.17.int.: Age Information Entry Opens( age)

```
(:) :FILL.PROMPT.3.17.int
        (A) $330 "1"
        (A) $331 "(Please enter information at the top of the screen and press return.)"
;       (A) $340 "0"
        (R)
```

Screen 3.18 Int: "Year to Retirement" Button opens.

```
(:) :FILL.PROMPT.3.18.int
        (A) $330 "1"
        (A) $331 "(<Click> on any year or <click> on button to close.)"
        (A) $332 ""
;       (A) $340 "0"
        (R)
```

Screen 3.19a Recommendation available; events box not open

```
(:) :FILL.PROMPT.3.19a
        (A) $330 "2"
        (A) $331 "A recommended allocation is now available."
        (A) $332 "(<Click> NEXT to show the recommendation.)"
;       (A) $340 "0"
        (R)
```

Screen 3.19b: Events Box Open on Information Entry Bar; recommendation available

```
(:) :FILL.PROMPT.3.19b
        (A) $330 "2"
        (A) $331 "A recommended allocation which considers these events is now avail.
        (A) $332 "(<Click> NEXT to show the recommendation.)"
;       (A) $340 "0"
        (R)
```

Money Advice Scan File

Screen 3.19c: Events Box Opens (not in build pie sequence)

```
(:) :FILL.PROMPT.3.19c
        (A) $330 "1"
        (A) $331 "The recommended allocation considers these events."
        (A) $332 ""
;       (A) $340 "0"
        (R)
```

BEST AVAILABLE COPY

---

SECTION 4: SHOW RECOMMENDATION

Screen 4.1. On Recommended Allocation Pie Chart.

```
(:) :FILL.PROMPT.4.1
        (A) $330 "1"
        (A) $331 "Here is the allocation we recommend."
        (A) $332 ""
;       (A) $340 "0"
        (R)
```

Screen 4.1a. On Comparison of Pie Charts.

```
(:) :FILL.PROMPT.4.1a
        (A) $330 "1"
        (A) $331 "Here is a comparison of the customer's current and proposed alloca
        (A) $332 ""
;       (A) $340 "0"
        (R)
```

Screen 4.2: Bank Intermediate Card.

```
(:) :FILL.PROMPT.4.2
        (A) $330 "1"
        (A) $331 "(<Click> on the double arrows to see the detailed Bank recommenda
        (A) $332 ""
;       (A) $340 "0"
        (R)
```

Screen 4.3: Bank Detail Card

```
(:) :FILL.PROMPT.4.3
        (A) $330 "1"
        (A) $331 "(<Click> on any dollar amount to modify values.)"
        (A) $340 "1"
        (A) $341 "Deposits are insured by the FDIC to a maximum of $100,000 for eact
        (R)
```

Screen 4.4: Income Intermediate Card.

```
(:) :FILL.PROMPT.4.4
        (A) $330 "1"
        (A) $331 "(<Click> on the double arrows to see detailed Income recommendati
        (A) $332 ""
;       (A) $340 "0"
        (R)
```

Screen 4.5: Income Detail Card

```
(:) :FILL.PROMPT.4.5
        (A) $330 "2"
        (A) $331 "(<Click> twice on a selection for more information.)"
```

Money Advice Scan File

```
(A) $332 "(<Click> on the number of issues to edit.)"
(A) $340 "0"
(R)
```

BEST AVAILABLE COPY

Screen 4.6: Growth Intermediate Card

```
(:) :FILL.PROMPT.4.6
(A) $330 "1"
(A) $331 "(<Click> on the double arrows to see detailed Growth recommenda
(A) $332 ""
(A) $340 "0"
(R)
```

Screen 4.7: Growth Detail Card

```
(:) :FILL.PROMPT.4.7
(A) $330 "2"
(A) $331 "(<Click> twice on a selection for more information.)"
(A) $332 "(<Click> on the number of shares to edit.)"
(A) $340 "0"
(R)
```

Screen 4.8: Stock hotsheets

```
(:) :FILL.PROMPT.4.8
(A) $330 "1"
(A) $331 "For more information, <click> another button on the card.)"
(A) $332 ""
(A) $340 "0"
(R)
```

Screen 4.8a: Stock hotsheets - Profile

```
(:) :FILL.PROMPT.4.8D2
(A) $330 "1"
(A) $331 "For more information, <click> another button on the card.)"
(A) $332 ""
(A) $340 "1"
(A) $341 "Please read the prospectus carefully before you invest or send mone
(R)
```

Screen 4.8b: Stock hotsheets - Performance

```
(:) :FILL.PROMPT.4.8D3
(A) $330 "1"
(A) $331 "For more information, <click> another button on the card.)"
(A) $332 ""
(A) $340 "1"
(A) $341 "Past performance is no guarantee of future results."
(R)
```

Screen 4.9: Other Selections List

```
(:) :FILL.PROMPT.4.9
(A) $330 "1"
(A) $331 "(<Click> twice on a selection for more information.)"
(A) $332 ""
(A) $340 "0"
(R)
```

Screen 4.10: Selection Action Box

```
(:) :FILL.PROMPT.4.10
```

Money Advice Scan File (A) $330 "1"
(A) $331 "(<Click> on any button to work with this selection.)"
(A) $332 ""
(A) $340 "0"
(R)

Screen 4.11: Overlay of asset cards

BEST AVAILABLE COPY ( ) FILL.PROMPT.4.11
(A) $330 "1"
(A) $331 "(<Click> on the upper right of the asset card to continue.)"
(A) $332 ""
(A) $340 "0"
(R)

Screen 4.12: Glossary definition cards ( ) :FILL.PROMPT.4.12
(A) $330 "1"
(A) $331 "(<Click> on the upper right of the glossary card to continue.)"
(A) $332 ""
(A) $340 "0"
(R)

---

SECTION 5: SHOW OUTCOME

Screen 5.1: Average outcome screen ( ) :FILL.PROMPT.5.1
(A) $330 "2"
(A) $331 "Each bar shows the average value of such an allocation after a certai
years."
(A) $332 "(<Click> on any bar to see dollar value or <click> Range .)"
(A) $340 "1"
(A) $341 "Past performance is no guarantee of future results."
(R)

Screen: 5.2 Extra Extra read all about it!!!!!

(:) :FILL.PROMPT.5.2
(A) $330 "0"
(A) $340 "0"
(R)

Screen 5.3: Range of outcome screen (.) :FILL.PROMPT.5.3
(A) $330 "2"
(A) $331 "Each bar shows the range of value of such an allocation after a certai
years. "
(A) $332 "(<Click> on any bar to see dollar values or <click> Average.)"
(A) $340 "1"
(A) $341 "Based on data from Ibbotson Associates, Chicago, IL."
(R)

Screen 5.4: Alternate allocation–initial screen (:) :FILL.PROMPT.5.4
(A) $330 "1"
(A) $331 "(To create an alternate allocation, enter new percentages.)"
(A) $332 ""
(A) $340 "0"
(R)

Screen 5.4.A: Alternate allocation–enter bank percentage

```
( ) FILL.PROMPT.5.4.A
        (A) $330 "1"
        (A) $331 "(Enter a percentage for Bank and press return.)"
        (A) $332 ""
.       (A) $340 "0"
        (R)
```

Screen 5.4.B: Alternate allocation–enter income percentage

```
( ) :FILL.PROMPT.5.4.B
        (A) $330 "1"
        (A) $331 "(Enter a percentage for Income and press return.)"
        (A) $332 ""
.       (A) $340 "0"
        (R)
```

BEST AVAILABLE COPY

Screen 5.4.C: Alternate allocation–enter growth percentage

```
(:) :FILL.PROMPT.5.4.C
        (A) $330 "1"
        (A) $331 "(Enter a percentage for Growth and press return.)"
        (A) $332 ""
.       (A) $340 "0"
        (R)
```

Screen 5.4.D: Alternate allocation–enter growth percentage

```
(:) :FILL.PROMPT.5.4.D
        (A) $330 "1"
        (A) $331 "(Enter another percentage and press return.)"
        (A) $332 ""
;       (A) $340 "0"
        (R)
```

Screen 5.5: Average outcome screen /amount displayed over single bar

```
(:) :FILL.PROMPT.5.5
        (A) $330 "2
        (A) $331 "(<Click> on another bar, <click> Range, or..."
        (A) $332 " (<click> again on the same bar to compare portfolios.")
;       (A) $340 "0"
        (R)
```

Screen 5.6: Range of outcome screen/ amounts displayed over single bar

```
(:) :FILL.PROMPT.5.6
        (A) $330 "2"
        (A) $331 "(<Click> on another bar, <click> Average or...)"
        (A) $332 "(<click> again on the same bar to compare portfolios.)"
;       (A) $340 "0"
        (R)
```

Screen 5.7: Comparison of average outcomes

```
(:) :FILL.PROMPT.5.7
        (A) $330 "2"
        (A) $331 "These bars compare the average value of the allocations for the sarr
period."
        (A) $332 "(<Click> on the proposed allocation bar to show the effect of fees.)"
;       (A) $340 "0"
        (R)
```

Money Advice Scan File

Screen 5.8: Net value screen

```
( ) :FILL.PROMPT.5.8
        (A) $330 "2"
        (A) $331 "This shows the portfolio value after Money Advisor fees are consider
        (A) $332 "(<Click> on the upper right of the comparison card to continue.)"
.       (A) $340 "0"
        (R)
```

Screen 5.9: Comparison of range of outcomes

```
(.) :FILL.PROMPT.5.9
        (A) $330 "2"
        (A) $331 "These bars compare the range of value of the allocations for the sarr
period."
        (A) $332 "(<Click> on the upper right of the comparison card to continue.)"
;       (A) $340 "0"
        (R)
```

BEST AVAILABLE COPY

```
;-------------------------------------------------------------
```

SECTION 6: CONCLUDE

Screen 6.0: Conclusion

```
(:) :FILL.PROMPT.6.0
        (A) $330 "1"
        (A) $331 "To see summary information, <click> any button on the card."
        (A) $332 ""
;       (A) $340 "0"
        (R)

;-------------------------------------------------------------
```

SECTION 7: TOOLS

Screen 7.0: Generic tool prompt

```
(:) :FILL.PROMPT.7.0
        (A) $330 "1"
        (A) $331 "When finished,<Click> on the upper right to close."
        (A) $332 ""
;       (A) $340 "0"
        (R)
```

Screen 7.1: Calculator menu

```
(:) :FILL.PROMPT.7.1
        (A) $330 "1"
        (A) $331 "<Click> on any button to work with a calculator."
        (A) $332 ""
;       (A) $340 "0"
        (R)

;-------------------------------------------------------------
;MISCELLANEOUS AND GENERAL PROMPTS

(:) :FILL.PROMPT.CLEAR
        (A) $330 "0"
;       (A) $340 "0"
        (R)

(:) :FILL.PROMPT.LIBRARIES
        (A) $330 "1"
        (A) $331 "Loading the libraries..."
        (A) $332 ""
;       (A) $340 "0"
        (R)
```

Money Advice Scan File

```
(:) :FILL.PROMPT.NONE
        (A) $330 "0"
        (A) $331 ""
;       (A) $340 "0"
        (R)

;the template...

;(:) :FILL.PROMPT
        (A) $330 "0"
        (A) $331 ""
        (A) $332 ""
;       (A) $340 "0"
        (R)


;****************************************************************************
; PRINT EVENT
;****************************************************************************
;(:) :PRINT.EVENT

        ;*** REMOVE, WILL OVERRIDE EDITS
        ;(Y) 40
        ;(Y) 41 ;show stock DETAIL, considering edited variables
        ;(Y) 42 ;show stock INTERMEDIATE, considering edited variables
        ;(Y) 50
        ;(Y) 51 ;show bond DETAIL, considering edited variables
        ;(Y) 52 ;show bond INTERMEDIATE, considering edited variables
        ;(Y) 70

        ;(K)

        ;(K) 112 :PRINT.EVENT
        ;(K) 80 :PRINT.EVENT

        ;(K) 114 :START ;waits for lower-case r
        ;(K) 82  :START ;waits for upper-case R

        ;(K) 120 :EXIT ;waits for lower-case x
        ;(K) 88 :EXIT ; waits for upper-case X

        ;(H) 20
        ;(S) "n.clearprompt.s"
        ;(V) "Your report is printing. Please wait..." @470,28

        ;(Y) 101

        ;(H) 20
        ;(S) "n.clearprompt.s"
        ;(V) "Your SECOND report is printing. Please wait..." @470,28

        ;(Y) 101

        ;(H) 20
        ;(S) "n.clearprompt.s"
        ;(V) "Your THIRD report is printing. Please wait..." @470,28

        ;(Y) 101

        ;(J) :RESUME.PROGRAM
```

BEST AVAILABLE COPY

BEST AVAILABLE COPY

```
        ;(:) :RESUME.PROGRAM

        ;RESTORE BACKGROUND
        ;(A) $199 "0"
        ;(X)"

        ;SETUP KEY
        ;(K)
        ;(K) 27 :SYS.EVENT

        (J) :MAIN.WAIT

;*****************************************************************************
; EXIT    ;all done
;*****************************************************************************
;(:) :EXIT

;CLEAR KEYSTROKES
(K)

;PROMPT
(S) "n.clearprompt.s"
(H) 20
(V) "Press APPLE Q to exit" @470,28

;WAIT
(M)

;FOR AFTER SCREEN DUMP
(J) :START


;*****************************************************************************
;       D A T A   F O R   D E V E L O P M E N T   W O R K
;*****************************************************************************

(:) :GET.TEST.DATA

        (A) $396 "1" ;set flag for test data loaded

;* this is customer #13 NIERENBERG

        ;(G) :HIGHLIGHT.LOAD.DATA.SQUARE13

        ;*
        ;INFORMATION YOU TOLD US

                (A) $1 "Tess Kusstoemer"            ;name
                (A) $7 "40000"              ;gross income
                (A) $34 "30000"             ;take home pay
                (A) $9 "single"             ;marital status
                (A) $2 "60"                 ;age
                (A) $3 "65"                         ;planned retirement age
                (A) $130 "no"               ;children yes/no input
                (A) $5 ""                   ;children, ages of (under 18)
                (A) $134 "no"               ;tuition yes/no input
                (A) $6 "rents home"     ;own/rent, plan to buy
                (A) $8 "5005"   ;own/rent, plan to buy

        *
        ;YOUR ASSETS TODAY, AMOUNTS ;$194,000 total

                (A) $10 "4000"   ;checking
```

```
        (A) $11 "65000"          ;savings

        (A) $16 ""        ;long term CD
        (A) $14 ""        ;government bonds
        (A) $38 "55000"          ;money market funds
        (A) $39 ""        ;bond funds
        (A) $40 ""        ;municipal bonds
        (A) $30 "10000"          ;Corporate Bonds
        (A) $37 ""        ;government agencies
        (A) $31 ""        ;Commercial Paper

        (A) $15 "60000"          ;stocks
        (A) $19 ""        ;stock mutual funds


;*
;YOUR ASSETS TODAY, FLAGS (not amounts)

        (A) $160 "1"  ;checking
        (A) $161 "1"  ;savings
        ;
        (A) $172 "0"  ;long CD
        (A) $164 "0"  ;government bonds
        (A) $169 "1"  ;money market funds
        (A) $166 "0"  ;bond fund
        (A) $165 "0"  ;municipal bonds
        (A) $163 "1"  ;corporate bonds
        (A) $168 "0"  ;government agencies
        (A) $167 "0"  ;commercial paper
        ;
        (A) $170 "1"  ;stocks
        (A) $171 "0"  ;stock funds

        (A) $173 "28"  ;marginal tax rate

;*
;COOK THESE (TO FILL MISC VARIABLES)
;- reallocate assets
(G) :RERUN.ALLOCS

;(A) $179 "1"     ;recommendation is cooked

;*
;EDIT AT BROAD LEVEL (if required)
        ;(A) $22 ""  ;REC BANK
        ;(A) $23 ""  ;REC INCOME
        ;(A) $24 ""  ;REC GROWTH

        ;IF BROAD EDIT WAS MADE
        ;(A) $247 "1" ;broad edit made

;*
;EDIT AT DETAIL LEVEL (if required)
        ;(A) $244 "0"  ;DETAIL BANK EDIT has been made
        ;(A) $245 "0"  ;DETAIL BOND EDIT has been made
        ;(A) $246 "0"  ;DETAIL STOCK EDIT has been made

(R)


;**************************************************************************
;END HOLDING AREA
;**************************************************************************


;**************************************************************************
;E
```

Money Advice Scan File

BEST AVAILABLE COPY

What is claimed is:

1. A system for demonstrating financial concepts and displaying financial information comprising:

a central processing unit for processing financial information, said central processing unit including means for creating graphic displays from numerical data input;

a viewer station connected to said central processing unit, said viewer station comprising means for displaying financial information in graphic and textual form;

a demonstrator station connected to said central processing unit, said demonstrator station comprising:

means for displaying financial information in graphic and textual form; and data entry means for entering personal financial alphanumeric data;

means for preparing individualized financial information in response to said data entry means; and means for generating the display of individualized financial information on said means for displaying at both said demonstrator station and said viewer station, wherein the graphic individualized financial information displayed on said viewer station displaying means is a subset of the individualized financial information displayed on said demonstrator station displaying means.

2. The system of claim 1 further comprising means for displaying at least one help menu at said demonstrator station, said help menu being activated by said data entry means and said means for generating the display of individualized financial information to input a signal to direct the display of information on said means for displaying of both said demonstrator station and said viewer station, wherein at least one help menu is not displayed at said viewer station.

3. The system of claim 1 further comprising means for displaying at least one text field at said demonstrator station, wherein said text field is not displayed at said viewer station.

4. The system of claim 3 further comprising means for displaying at least one text field at said viewer station, wherein said text field is not displayed at said demonstrator station.

5. The system of claim 2, wherein said at least one help menu at said demonstrator station is activatable by said data entry means.

6. The system of claim 2, wherein said at least one help menu at said demonstrator station is activatable by said input means.

7. The system of claim 6, wherein said input means comprises a mouse.

8. The system of claim 6, wherein said input means comprises a touch screen display.

9. The system of claim 6, wherein said input means comprises a light pen.

10. The system of claim 2, wherein said help menu comprises an icon.

11. The system of claim 2, wherein said help menu comprises text.

12. The system of claim 1, wherein said data entry means comprises a keyboard.

13. The system of claim 5, wherein said data entry means comprises a keyboard.

14. The system of claim 1, where said viewer station is located at a location remote from said demonstrator station.

15. A system for demonstrating financial concepts and displaying financial information comprising:

means for inputting customer data;

a central processing unit for processing financial information, said central processing unit including means for creating graphic displays of individualized financial information in response to customer data;

a viewer station connected to said central processing unit, said viewer station comprising means for displaying individualized financial information in graphic and textual form;

a demonstrator station connected to said central processing unit, said demonstrator station comprising means for displaying individualized financial information in graphic and textual form and data entry means for entering at least a first set and a second set of individualized financial numerical data; wherein:

said system generates at least a first graphic display from said first set of entered individualized financial numerical data and a second graphic display from said second set of entered individualized financial numerical data, said first and second graphic displays being displayed on said viewer and demonstrator station display means.

16. The system of claim 15, wherein said graphic displays comprise charts generated from said entered individualized financial numerical data.

17. The system of claim 15, wherein said first and second graphic displays are simultaneously displayed on said viewer and demonstrator station display means.

18. The system of claim 15, further comprising means for printing said entered individualized financial numerical data.

19. A method for displaying personalized financial information comprising the steps of:

displaying financial concepts and at least one help menu, inputting customer data in response to said help menus, computing financial forecasts based upon said customer data wherein said computing comprises, accessing a first library of numerical data, said library having means for calculating financial forecasts using said customer data, accessing a second library of graphical data; calculating financial forecasts using said library of numerical data and creating a graphic display of said financial forecast based upon said library graphical data;

generating graphical displays of financial forecasts having prompts;

displaying at least a first set of said financial forecasts having prompts;

selecting a subset of said first set of financial forecasts in response to said prompts; and displaying said subset of said first set of financial forecasts omitting said prompts.

20. A method for presenting personalized financial information as claimed in claim 19, further comprising the step of accessing and using historical customer data for calculating financial forecasts.

21. A method for displaying personalized financial information as claimed in claim 19, wherein the step of inputting of customer data is prompted by help menus.

22. A method for displaying personalized financial information as claimed in claim 19 wherein the step of selecting a subset of said first set of financial forecasts, is prompted by help menus.

23. A method for displaying personalized financial information as claimed in claim 19, wherein the step of computing financial forecasts includes computing alternate forecasts based upon at least one economic model.

24. A method for displaying personalized financial information as claimed in claim 19, comprises the further step of storing customer data and accessing said stored customer data to computer financial forecasts.

25. A method for displaying personalized financial information as claimed in claim 19, wherein said computing of financial forecasts based upon customer data is in response to at least one set of customer data.

26. A method for displaying personalized financial information as claimed in claim 19, wherein said displaying of financial information is graphical.

27. Method for displaying personalized financial information as claimed in claim 19, wherein said displaying of financial information is textual.

28. A method for displaying personalized financial information as claimed in claim 19, wherein said displaying of financial information is both graphical and textual.

29. A display station for displaying financial concepts and personalized financial data, comprising:

a frame having at least one working surface, a first viewer display screen mounted on said frame, a second demonstrator display screen mounted on said frame, means for displaying financial concepts on said first viewer and second demonstrator display screens, means for calculating personalized financial forecasts in response to said means for inputting data, and means for selecting personalized financial forecasts for presentation on said viewer display screen.

* * * * *